US012519546B2

(12) United States Patent
Huang et al.

(10) Patent No.: US 12,519,546 B2
(45) Date of Patent: Jan. 6, 2026

(54) TRANSMISSION METHOD AND RECEPTION METHOD FOR OPTICAL COMMUNICATION, AND CORRESPONDING DEVICE

(71) Applicant: HUAWEI TECHNOLOGIES CO., LTD., Shenzhen (CN)

(72) Inventors: Kechao Huang, Shenzhen (CN); Wai Kong Raymond Leung, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 198 days.

(21) Appl. No.: 18/490,448

(22) Filed: Oct. 19, 2023

(65) Prior Publication Data

US 2024/0178920 A1 May 30, 2024

Related U.S. Application Data

(63) Continuation of application No. PCT/CN2022/087770, filed on Apr. 19, 2022.

(30) Foreign Application Priority Data

Apr. 20, 2021 (CN) ......................... 202110424596.8
Dec. 1, 2021 (CN) ......................... 202111456537.5
Jan. 27, 2022 (CN) ......................... 202210102040.1

(51) Int. Cl.
*H04B 10/54* (2013.01)
*H04B 10/61* (2013.01)

(52) U.S. Cl.
CPC ......... *H04B 10/541* (2013.01); *H04B 10/612* (2013.01)

(58) Field of Classification Search
None
See application file for complete search history.

(56) References Cited

U.S. PATENT DOCUMENTS

2009/0324223 A1 12/2009 Liu
2015/0110492 A1 4/2015 Yu et al.
(Continued)

FOREIGN PATENT DOCUMENTS

CN 106487673 A 3/2017
CN 104380639 B 8/2017
(Continued)

OTHER PUBLICATIONS

Kota et al., "Jitter specifications for 800ZR/800LR coherent interfaces," OIF, oif2021.146.00, Total 10 pages (Mar. 2021).
(Continued)

*Primary Examiner* — David W Lambert
(74) *Attorney, Agent, or Firm* — Leydig, Voit & Mayer, Ltd.

(57) ABSTRACT

A transmission method for optical communication and a related device and system are provided, which may be applied to various scenarios such as a metropolitan area network, a backbone network, and data center interconnect of over 400 Gbps (including 600 Gbps, 800 Gbps, and the like). The method includes: generating a super-frame including a plurality of sub-frames; and transmitting the super-frame, wherein each sub-frame includes training symbols and pilot symbols, and each of the training symbols and the pilot symbols is one of −A−Aj, −A+Aj, A−Aj, and A+Aj, A being a real number. In addition, in the training symbols and the pilot symbols included in each sub-frame, quantities of −A−Aj, −A+Aj, A−Aj, and A+Aj in two mutually perpendicular polarization directions meet specific requirements,
(Continued)

so that direct current balance can be achieved, which helps a receiver end restore a signal.

40 Claims, 39 Drawing Sheets

(56) References Cited

U.S. PATENT DOCUMENTS

| | | | | |
|---|---|---|---|---|
| 2019/0305854 | A1* | 10/2019 | Campos ................. | H04B 10/40 |
| 2020/0374097 | A1 | 11/2020 | Wang et al. | |

FOREIGN PATENT DOCUMENTS

| | | | |
|---|---|---|---|
| CN | 107682118 | A | 2/2018 |
| CN | 109889318 | A | 6/2019 |
| CN | 110213191 | A | 9/2019 |
| CN | 110460387 | A | 11/2019 |
| CN | 107005525 | B | 1/2020 |
| CN | 112118053 | A | 12/2020 |
| WO | 2016188563 | A1 | 12/2016 |

OTHER PUBLICATIONS

Peng et al., "Scattered pilot channel tracking method for PDM-COOFDM transmissions using polar-based intra-symbol frequency-domain average," 2011 Optical Fiber Communication Conference and Exposition and the National Fiber Optic Engineers Conference, total 3 pages (Mar. 2011).

Li et al., "Inter-Channel Fiber Nonlinearity Mitigation in High Baud-Rate Optical Communication Systems," Journal of Lightwave Technology, vol. 39, No. 6, Total 9 pages (Mar. 2021).

Kota et al., "Modulation and FEC considerations for 800ZR Specifications," OIF, oif2021.067.00, Total 14 pages (Feb. 2021).

Yao et al., "Phase noise and IQ imbalance suppression for PDM CO-OFDM system," Department of Computer and Commuincation Engineering, Tianjin University of Technology, Total 3 pages (Feb. 2017).

"Implementation Agreement 400ZR," Physical and Link Layer (PLL) Working Group, OIF Working Group, OIF-400ZR-01.0, total 100 pages (Mar. 2021).

Sluyski, "Open Roadm Msa 3.01 W-Port Digital Specification (200G-400G)," Open Roadm, MSA_3.01 W-Port Digital Specification, www.Open ROADM.org, Total 56 pages (Jun. 2019).

Williams, "OpenZR+ MSA Specification," Acacia Communications, version 1.0, Total 74 pages (Sep. 2020).

"ITU-T G.709.3/Y.1331.3, Series G: Transmission Systems and Media, Digital Systems and Networks, Digital terminal equipments-General Series Y: Global Information Infrastructure, Internet Protocol Aspects, Next-Generation Networks, Internet of Things and Smart Cities, Internet protocol aspects-Transport, Flexible OTN long-reach interfaces," International Telecommunication Union, Total 118 pages (Dec. 2020).

Chunlei Zheng et al, "Multiple CFOs and CIRs jointly estimation algorithm research based on pilot," Application Research of Computers, vol. 26, Issue No. 8, Total 5 pages (Aug. 2009).

Peng et al., "Hybrid PN-ZP-DMT Scheme for Spectrum-Efficient Optical Communications and Its Application to SI-POF," Journal of Lightwave Technology, IEEE, vol. 32, No. 18, Total 12 pages (Sep. 15, 2014).

"Implementation Agreement 400ZR," Physical And Link Layer (PLL) Working Group, OIF-400ZR-01.0, Total 100 pages (Mar. 10, 2020).

* cited by examiner

TRANSMISSION METHOD AND RECEPTION METHOD FOR OPTICAL COMMUNICATION, AND CORRESPONDING DEVICE

CROSS-REFERENCE TO RELATED APPLICATIONS

This application is a continuation of International Application No. PCT/CN2022/087770, filed on Apr. 19, 2022, which claims priority to Chinese Patent Application No. 202110424596.8, filed on Apr. 20, 2021 and Chinese Patent Application No. 202111456537.5, filed on Dec. 1, 2021 and Chinese Patent Application No. 202210102040.1, filed on Jan. 27, 2022. All of the aforementioned patent applications are hereby incorporated by reference in their entireties.

TECHNICAL FIELD

Embodiments of this application relate to the field of optical communication, and in particular, to a transmission method and a reception method for optical communication, and a corresponding device.

BACKGROUND

Driven by the continuous development of 5G, cloud computing, big data, artificial intelligence, and other technologies, high-speed optical transport networks are developing toward high capacity, packet-based, and intelligence. A coherent optical communication system uses the amplitude, phase, polarization, and frequency of light waves to carry information. To combat optical signal distortion caused by dispersion, polarization-dependent impairment, noise, non-linear effect, and other factors in a transmission process and maintain long-distance transmission, a coherent optical communication system usually adds some designed fixed symbol sequences to a transmission symbol sequence, so as to help a receiver end restore transmitted symbols.

An existing transmission symbol sequence is mainly applied to a 400-Gbps scenario, and cannot adapt to a future scenario of over 400 Gbps (including 600 Gbps, 800 Gbps, and the like). In addition, there is a poor cross-correlation between transmission symbol sequences in different polarization directions. These are problems that need to be urgently resolved in the future.

SUMMARY

This application provides a transmission method for optical communication, to resolve the problems of an inability of the conventional technology to be applied to a scenario of over 400 Gbps, and a poor cross-correlation between symbol sequences in different polarization directions.

According to a first aspect, a transmission method for optical communication is provided. The method includes: generating a super-frame including a plurality of sub-frames, where the sub-frame includes training symbols and pilot symbols; in one polarization direction, a sum of quantities of training symbols and pilot symbols included in the sub-frame is not less than 5, and there is one symbol that is both a training symbol and a pilot symbol; and each of the training symbols and the pilot symbols is one of −A−Aj, −A+Aj, A−Aj, or A+Aj, A being a real number; in the training symbols and the pilot symbols included in each sub-frame, quantities of −A−Aj, −A+Aj, A−Aj, and A+Aj in one polarization direction are respectively $\lfloor (N_{TS}+N_{PS}-1)/4 \rfloor$, $(N_{TS}+N_{PS}-1)/2-\lfloor (N_{TS}+N_{PS}-1)/4 \rfloor$, $(N_{TS}+N_{PS}-1)/2-\lfloor (N_{TS}+N_{PS}-1)/4 \rfloor$, and $\lfloor (N_{TS}+N_{PS}-1)/4 \rfloor$, and quantities thereof in the other polarization direction are respectively $(N_{TS}+N_{PS}-1)/2-\lfloor (N_{TS}+N_{PS}-1)/4 \rfloor$, $\lfloor (N_{TS}+N_{PS}-1)/4 \rfloor$, $\lfloor (N_{TS}+N_{PS}-1)/4 \rfloor$, and $(N_{TS}+N_{PS}-1)/2-\lfloor (N_{TS}+N_{PS}-1)/4 \rfloor$, where $N_{TS}$ is a quantity of the training symbols in each sub-frame in one polarization direction, $N_{PS}$ is a quantity of the pilot symbols in each sub-frame in one polarization direction, $N_{TS}+N_{PS}$ is an odd number, and the two polarization directions are orthogonal to each other; and transmitting the super-frame.

According to a second aspect, a reception method for optical communication is provided. The method includes: receiving a super-frame including a plurality of sub-frames, where the sub-frame includes training symbols and pilot symbols; in one polarization direction, a sum of quantities of training symbols and pilot symbols included in the sub-frame is not less than 5, and there is one symbol that is both a training symbol and a pilot symbol; and each of the training symbols and the pilot symbols is one of −A−Aj, −A+Aj, A−Aj, or A+Aj, A being a real number; in the training symbols and the pilot symbols included in each sub-frame, quantities of −A−Aj, −A+Aj, A−Aj, and A+Aj in one polarization direction are respectively $\lfloor (N_{TS}+N_{PS}-1)/4 \rfloor$, $(N_{TS}+N_{PS}-1)/2-\lfloor (N_{TS}+N_{PS}-1)/4 \rfloor$, $(N_{TS}+N_{PS}-1)/2-\lfloor (N_{TS}+N_{PS}-1)/4 \rfloor$, and $\lfloor (N_{TS}+N_{PS}-1)/4 \rfloor$, and quantities thereof in the other polarization direction are respectively $(N_{TS}+N_{PS}-1)/2-\lfloor (N_{TS}+N_{PS}-1)/4 \rfloor$, $\lfloor (N_{TS}+N_{PS}-1)/4 \rfloor$, $\lfloor (N_{TS}+N_{PS}-1)/4 \rfloor$, and $(N_{TS}+N_{PS}-1)/2-\lfloor (N_{TS}+N_{PS}-1)/4 \rfloor$, where $N_{TS}$ is a quantity of the training symbols in each sub-frame in one polarization direction, $N_{PS}$ is a quantity of the pilot symbols in each sub-frame in one polarization direction, $N_{TS}+N_{PS}$ is an odd number, and the two polarization directions are orthogonal to each other; and decoding the received super-frame.

In embodiments of this application, in each polarization direction, one sub-frame includes a total of $N_{TS}+N_{PS}-1$ training symbols and pilot symbols. For these symbols, a difference between quantities of −A−Aj, −A+Aj, A−Aj, and A+Aj is not greater than 1. In addition, in one sub-frame, quantities of the four complex numbers representing the training symbols and the pilot symbols are the same in the two polarization directions, and are all $(N_{TS}+N_{PS}-1)/2$, thereby effectively ensuring a balance between symbol quantities. In addition, it is also possible that a sequence consisting of the training symbols and a sequence consisting of the pilot symbols achieve direct current (DC) balance, which facilitates quality of a signal restored at a receiver end.

With reference to the first aspect or the second aspect, in a first possible implementation, in one sub-frame, a sequence consisting of training symbols in one polarization direction is different from a sequence consisting of training symbols in the other polarization direction, and a sequence consisting of pilot symbols in one polarization direction is different from a sequence consisting of pilot symbols in the other polarization direction. This avoids the problem that the receiver end cannot distinguish the two polarization directions in actual transmission.

With reference to the foregoing implementations, in a second possible implementation, the training symbols are consecutively arranged in the sub-frame, and in either of the polarization directions, in the training symbols included in the sub-frame, a quantity of consecutive same real part elements is not greater than 5, and a quantity of consecutive same imaginary part elements is not greater than 5. Further, in either of the polarization directions, a quantity of consecutive same training symbols in one sub-frame does not exceed 4. A training sequence obtained in this condition facilitates clock recovery, thereby helping improve quality of a signal restored at the receiver end.

With reference to the foregoing implementations, in a third possible implementation of the first aspect, the plurality of sub-frames further include a first sub-frame, the first sub-frame includes consecutively arranged frame alignment word symbols, and each frame alignment word symbol is one of −A−Aj, −A+Aj, A−Aj, and A+Aj; and in either of the polarization directions, in the frame alignment word symbols included in the sub-frame, a quantity of consecutive same real part elements is not greater than 5, and a quantity of consecutive same imaginary part elements is not greater than 5. Further, in either of the polarization directions, a quantity of consecutive same frame alignment word symbols in the first sub-frame does not exceed 4. A frame alignment word sequence obtained in this condition also facilitates clock recovery, thereby helping improve quality of a signal restored at the receiver end.

With reference to the third possible implementation, in a fourth possible implementation, in the frame alignment word symbols included in the first sub-frame, quantities of −A−Aj, −A+Aj, A−Aj, and A+Aj in one polarization direction are respectively $\lfloor N_{FAW}/4 \rfloor$, $N_{FAW}/2-\lfloor N_{FAW}/4 \rfloor$, $N_{FAW}/2-\lfloor N_{FAW}/4 \rfloor$, and $\lfloor N_{FAW}/4 \rfloor$, and quantities thereof in the other polarization direction are respectively $N_{FAW}/2-\lfloor N_{FAW}/4 \rfloor$, $\lfloor N_{FAW}/4 \rfloor$, $\lfloor N_{FAW}/4 \rfloor$, and $N_{FAW}/2-\lfloor N_{FAW}/4 \rfloor$, where $N_{FAW}$ is a quantity of the frame alignment word symbols in the first sub-frame in one polarization direction, and $N_{FAW}$ is an even number. This embodiment ensures that the plurality of frame alignment word symbols meet direct current balance, and a difference between quantities of the four available symbols −A−Aj, −A+Aj, A−Aj, and A+Aj is not greater than 1, which facilitates quality of a signal restored at the receiver end.

With reference to the foregoing implementations, in a fifth possible implementation, $N_{TS}$ is an even number, and in the training symbols included in each sub-frame, quantities of −A−Aj, −A+Aj, A−Aj, and A+Aj in one polarization direction are respectively $\lfloor N_{TS}/4 \rfloor$, $N_{TS}/2-\lfloor N_{TS}/4 \rfloor$, $N_{TS}/2-\lfloor N_{TS}/4 \rfloor$, and $\lfloor N_{TS}/4 \rfloor$, and quantities thereof in the other polarization direction are respectively $N_{TS}/2-\lfloor N_{TS}/4 \rfloor$, $\lfloor N_{TS}/4 \rfloor$, $\lfloor N_{TS}/4 \rfloor$, and $N_{TS}/2-\lfloor N_{TS}/4 \rfloor$.

With reference to any one of the possible implementations of the first aspect, the second aspect, or the first to the fourth possible implementations, in a sixth possible implementation, $N_{TS}$ is an odd number, and in the training symbols included in each sub-frame, except the training symbol that is also used as a pilot symbol, quantities of −A−Aj, −A+Aj, A−Aj, and A+Aj in one polarization direction are respectively $\lfloor (N_{TS}-1)/4 \rfloor$, $(N_{TS}-1)/2-\lfloor (N_{TS}-1)/4 \rfloor$, $(N_{TS}-1)/2-\lfloor (N_{TS}-1)/4 \rfloor$, and $\lfloor (N_{TS}-1)/4 \rfloor$, and quantities thereof in the other polarization direction are respectively $(N_{TS}-1)/2-\lfloor (N_{TS}-1)/4 \rfloor$, $\lfloor (N_{TS}-1)/4 \rfloor$, $\lfloor (N_{TS}-1)/4 \rfloor$, and $(N_{TS}-1)/2-\lfloor (N_{TS}-1)/4 \rfloor$.

The foregoing two embodiments provide the quantities of several possible symbols of the training sequence in different polarization directions in two different cases, and the quantities of training symbols −A−Aj, −A+Aj, A−Aj, and A+Aj included in one sub-frame are close to each other. In addition, in each polarization direction, except the training symbol that is also used as a pilot symbol (if there are an odd number of training symbols), a sum of real parts of complex numbers corresponding to the other training symbols is 0, and a sum of imaginary parts thereof is also 0, so that direct current balance can be achieved, which facilitates quality of a signal restored at the receiver end.

With reference to any one of the possible implementations of the first aspect, the second aspect, or the first to the fourth possible implementations, in a seventh possible implementation, $N_{PS}$ is an even number, and in the pilot symbols included in each sub-frame, quantities of −A−Aj, −A+Aj, A−Aj, and A+Aj in one polarization direction are respectively $\lfloor N_{PS}/4 \rfloor$, $N_{PS}/2-\lfloor N_{PS}/4 \rfloor$, $N_{PS}/2-\lfloor N_{PS}/4 \rfloor$, and $\lfloor N_{PS}/4 \rfloor$, and quantities thereof in the other polarization direction are respectively $N_{PS}/2-\lfloor N_{PS}/4 \rfloor$, $\lfloor N_{PS}/4 \rfloor$, $\lfloor N_{PS}/4 \rfloor$, and $N_{PS}/2-\lfloor N_{PS}/4 \rfloor$.

With reference to any one of the possible implementations of the first aspect, the second aspect, or the first to the fourth possible implementations, in an eighth possible implementation, $N_{PS}$ is an odd number, and in the pilot symbols included in each sub-frame, except the pilot symbol that is also used as a training symbol, quantities of −A−Aj, −A+Aj, A−Aj, and A+Aj in one polarization direction are respectively $\lfloor (N_{PS}-1)/4 \rfloor$, $(N_{PS}-1)/2-\lfloor (N_{PS}-1)/4 \rfloor$, $(N_{PS}-1)/2-\lfloor (N_{PS}-1)/4 \rfloor$, and $\lfloor (N_{PS}-1)/4 \rfloor$, and quantities thereof in the other polarization direction are respectively $(N_{PS}-1)/2-\lfloor (N_{PS}-1)/4 \rfloor$, $\lfloor (N_{PS}-1)/4 \rfloor$, $\lfloor (N_{PS}-1)/4 \rfloor$, and $(N_{PS}-1)/2-\lfloor (N_{PS}-1)/4 \rfloor$.

With reference to any one of the possible implementations of the first aspect, the second aspect, or the first to the fourth possible implementations, in a ninth possible implementation, in each sub-frame, a remainder of a quantity of pilot symbols in one polarization direction divided by 4 is 0, and in the pilot symbols included in each sub-frame, quantities of −A−Aj, −A+Aj, A−Aj, and A+Aj in one polarization direction are respectively $N_{PS}/4+1$, $N_{PS}/4-1$, $N_{PS}/4-1$, and $N_{PS}/4+1$, and quantities thereof in the other polarization direction are respectively $N_{PS}/4-1$, $N_{PS}/4+1$, $N_{PS}/4+1$, and $N_{PS}/4-1$; or quantities thereof in both polarization directions are $N_{PS}/4$.

With reference to any one of the possible implementations of the first aspect, the second aspect, or the first to the fourth possible implementations, in a tenth possible implementation, in each sub-frame, a remainder of a quantity of pilot symbols in one polarization direction divided by 4 is 2, and in the pilot symbols included in each sub-frame, quantities of −A−Aj, −A+Aj, A−Aj, and A+Aj in one polarization direction are respectively $(N_{PS}-2)/4$, $(N_{PS}-2)/4+1$, $(N_{PS}-2)/4+1$, and $(N_{PS}-2)/4$, and quantities thereof in the other polarization direction are respectively $(N_{PS}-2)/4+1$, $(N_{PS}-2)/4$, $(N_{PS}-2)/4$, and $(N_{PS}-2)/4+1$.

With reference to any one of the possible implementations of the first aspect, the second aspect, or the first to the fourth possible implementations, in an eleventh possible implementation, in each sub-frame, a remainder of a quantity of pilot symbols in one polarization direction divided by 4 is 1, and in the pilot symbols included in each sub-frame, except the pilot symbol that is also used as a training symbol, quantities of −A−Aj, −A+Aj, A−Aj, and A+Aj in one polarization direction are respectively $(N_{PS}-1)/4+1$, $(N_{PS}-1)/4-1$, $(N_{PS}-1)/4-1$, and $(N_{PS}-1)/4+1$, and quantities thereof in the other polarization direction are respectively $(N_{PS}-1)/4-1$, $(N_{PS}-1)/4+1$, $(N_{PS}-1)/4+1$, and $(N_{PS}-1)/4-1$; or quantities thereof in both polarization directions are $(N_{PS}-1)/4$.

With reference to any one of the possible implementations of the first aspect, the second aspect, or the first to the fourth possible implementations, in a twelfth possible implementation, in each sub-frame, a remainder of a quantity of pilot symbols in one polarization direction divided by 4 is 3, and in the pilot symbols included in each sub-frame, except the pilot symbol that is also used as a training symbol, quantities of −A−Aj, −A+Aj, A−Aj, and A+Aj in one polarization direction are respectively $(N_{PS}-3)/4$, $(N_{PS}-3)/4+1$, $(N_{PS}-$ 3)/4+1, and $(N_{PS}-3)/4$, and quantities thereof in the other polarization direction are respectively $(N_{PS}-3)/4+1$, $(N_{PS}-3)/4$, $(N_{PS}-3)/4$, and $(N_{PS}-3)/4+1$.

The seventh to the twelfth implementations provide the quantities of several possible symbols of the pilot sequence in different polarization directions in several different cases, and the quantities of pilot symbols −A−Aj, −A+Aj, A−Aj, and A+Aj included in one sub-frame are close to each other, thereby effectively ensuring balance between the training symbols. In addition, in each polarization direction, except the pilot symbol that is also used as a training symbol (if there are an odd number of pilot symbols), a sum of real parts of the complex numbers corresponding to the other pilot symbols is 0, and a sum of imaginary parts thereof is also 0, so that direct current balance can be achieved, which facilitates quality of a signal restored at the receiver end.

With reference to the foregoing implementations, in a thirteenth possible implementation, a modulation format of the symbols in the super-frame is 16QAM, and a value of A is 1 or 3. Alternatively, symbols in a constellation diagram may be compressed, and the value of A is also compressed accordingly. Taking 16QAM as an example, power normalization is performed on the 16 symbols in the 16QAM constellation diagram, in which case the value is changed to $$\left\{\pm\frac{1}{\sqrt{10}}\pm\frac{1}{\sqrt{10}}j,\ \pm\frac{1}{\sqrt{10}}\pm\frac{3}{\sqrt{10}}j,\ \pm\frac{3}{\sqrt{10}}\pm\frac{1}{\sqrt{10}}j,\ \pm\frac{3}{\sqrt{10}}\pm\frac{3}{\sqrt{10}}j\right\},$$

and the value of A is $$\frac{1}{\sqrt{10}} \text{ or } \frac{3}{\sqrt{10}}.$$

It should be understood that, when the pilot symbols and the training symbols, −A−Aj, −A+Aj, A−Aj, and A+Aj, are the outermost four symbols in the constellation diagram, the training symbols and the pilot symbols have a relatively high sensitivity, but have a relatively large peak-to-average power ratio; and when the values of the pilot symbols and the training symbols, −A−Aj, −A+Aj, A−Aj, and A+Aj, are the innermost four symbols in the constellation diagram, the training symbols and the pilot symbols have relatively small noise, but have a relatively low sensitivity.

It should be noted that, in some actual application scenarios, the pilot symbols and the training symbols, −A−Aj, −A+Aj, A−Aj, and A+Aj, may not be symbols in the constellation diagram of the used modulation format, and may be four symbols in a middle area between the outermost four symbols and the innermost four symbols in the constellation diagram. In this case, the training symbols and the pilot symbols have fair noise and sensitivity, but have a relatively low peak-to-average power ratio. Taking 16QAM as an example, values of the 16 symbols in the 16QAM constellation diagram are {±1±1j, ±1±3j, ±3±1j, ±3±3j}, and a value of the real number A meets 1≤A≤3. More specifically, the outermost four symbols in the constellation diagram are 3+3j, 3−3j, −3+3j, and −3−3j, and the innermost four symbols in the constellation diagram are 1+1j, 1−1j, −1+1j, and −1−1j. The values of the pilot symbols and the training symbols, −A−Aj, −A+Aj, A−Aj, and A+Aj, may be four symbols in the middle area between the outermost four symbols and the innermost four symbols in the 16QAM constellation diagram. A specific value of the real number A may be selected according to an actual application scenario, so that the peak-to-average power ratio, noise, and sensitivity of the training symbols and the pilot symbols have a good compromise. For example, the real number $A=-\sqrt{5}$, and the values of the pilot symbols and the training symbols are $\{-\sqrt{5}-\sqrt{5}j, -\sqrt{5}+\sqrt{5}j, \sqrt{5}-\sqrt{5}j, \sqrt{5}+\sqrt{5}j\}$. In addition, when the 16 symbols in the 16QAM constellation diagram are subjected to power normalization and have values of $$\left\{\pm\frac{1}{\sqrt{10}}\pm\frac{1}{\sqrt{10}}j,\ \pm\frac{1}{\sqrt{10}}\pm\frac{3}{\sqrt{10}}j,\ \pm\frac{3}{\sqrt{10}}\pm\frac{1}{\sqrt{10}}j,\ \pm\frac{3}{\sqrt{10}}\pm\frac{3}{\sqrt{10}}j\right\},$$

the value of the real number A meets $$\frac{1}{\sqrt{10}} \le A \le \frac{3}{\sqrt{10}}.$$

For example, the real number $A=\sqrt{2}/2$ and the values of the pilot symbols and the training symbols are $$\left\{-\frac{\sqrt{2}}{2}-\frac{\sqrt{2}}{2}j,\ -\frac{\sqrt{2}}{2}+\frac{\sqrt{2}}{2}j,\ \frac{\sqrt{2}}{2}-\frac{\sqrt{2}}{2}j,\ \frac{\sqrt{2}}{2}+\frac{\sqrt{2}}{2}j\right\}.$$

With reference to the foregoing implementations, in a fourteenth possible implementation, in each sub-frame, a symbol at a fixed position in every 64 symbols is the pilot symbol. For example, the 1st symbol in every 64 symbols is the pilot symbol.

With reference to any one of the possible implementations of the first aspect, the second aspect, or the first to the thirteenth possible implementations, in a fifteenth possible implementation, in each sub-frame, a symbol at a fixed position in every 48 symbols is the pilot symbol. For example, the 1st symbol in every 48 symbols is the pilot symbol.

It should be understood that the foregoing implementations may all be combined with the first aspect or the second aspect, which is not limited in this application.

According to a third aspect, a transmitting device for optical communication is provided. The transmitting device includes a processor and a memory. The memory is configured to store instructions, and the processor is configured to execute the instructions, to cause the transmitting device to perform the method in any one of the first aspect or the possible implementations of the first aspect.

According to a fourth aspect, a receiving device for optical communication is provided. The transmitting device includes a processor and a memory. The memory is configured to store instructions, and the processor is configured to execute the instructions, to cause the receiving device to perform the method in any one of the second aspect or the possible implementations of the second aspect.

According to a fifth aspect, a system for optical communication is provided. The system includes the transmitting device according to the third aspect and the receiving device according to the fourth aspect.

It should be understood that the processor may be a central processing unit (CPU), or may be another general-purpose processor, a digital signal processor (DSP), an application-specific integrated circuit (ASIC), a field-programmable gate array (FPGA) or another programmable logic device, a discrete gate or a transistor logic device, a discrete hardware component, or the like. The general-purpose processor may be a microprocessor, or the processor may be any conventional processor or the like, which is not limited in embodiments of this application.

According to a sixth aspect, a computer-readable storage medium is provided. The computer-readable storage medium stores instructions that, when executed on a terminal device, cause the terminal device to perform the method in any one of the first aspect or the possible implementations of the first aspect, or cause the terminal device to perform the method in any one of the second aspect or the possible implementations of the second aspect.

According to a seventh aspect, a computer program product including instructions is provided. The computer program product, when run on a terminal device, causes the terminal device to perform the method according to any one of the first aspect or the possible implementations of the first aspect, or causes the terminal device to perform the method according to any one of the second aspect or the possible implementations of the second aspect. It should be understood that the terminal device may be a chip, a processor, or the like, which is not limited in this application.

According to an eighth aspect, a transmission method for optical communication is provided. The method includes: generating a super-frame including a plurality of sub-frames, where the sub-frame includes training symbols and pilot symbols; in one polarization direction, there is one symbol that is both a training symbol and a pilot symbol, and each of the training symbols and the pilot symbols is one of −A−Aj, −A+Aj, A−Aj, and A+Aj, A being a real number; in each sub-frame, in the one polarization direction, the pilot symbols are generated based on a target polynomial and a seed, there are $N_{PS}$ pilot symbols combined with $N_{TS}$ training symbols to achieve direct current balance, $N_{TS}$ is a quantity of the training symbols in each sub-frame in one polarization direction, and $N_{TS}+N_{PS}$ is an odd number; and the target polynomial is one item in the following table; and

| Index | Target polynomial |
|---|---|
| 1 | $x^{10} + x^9 + x^8 + x^7 + x^6 + 1$ |
| 2 | $x^{10} + x^9 + x^8 + x^6 + x^4 + 1$ |
| 3 | $x^{10} + x^9 + x^7 + x^6 + x^4 + 1$ |
| 4 | $x^{10} + x^9 + x^6 + x^3 + 1$ |
| 5 | $x^{10} + x^8 + x^5 + x^3 + 1$ |
| 6 | $x^{10} + x^8 + x^6 + x^5 + x^3 + 1$ |
| 7 | $x^{10} + x^8 + x^7 + x^4 + x^3 + 1$ |
| 8 | $x^{10} + x^6 + x^5 + x^4 + x^3 + 1$ |
| 9 | $x^{10} + x^9 + x^6 + x^2 + 1$ |
| 10 | $x^{10} + x^7 + x^6 + x^2 + 1$ |
| 11 | $x^{10} + x^7 + x^5 + x^2 + 1$ |
| 12 | $x^{10} + x^8 + x^7 + x^5 + x^2 + 1$ |
| 13 | $x^{10} + x^9 + x^8 + x^7 + x^4 + x^2 + 1$ |
| 14 | $x^{10} + x^7 + x^5 + x^4 + x^2 + 1$ |
| 15 | $x^{10} + x^9 + x^7 + x^5 + x^4 + x^2 + 1$ |
| 16 | $x^{10} + x^9 + x^8 + x^3 + x^2 + 1$ |
| 17 | $x^{10} + x^9 + x^8 + x^7 + x^3 + x^2 + 1$ |
| 18 | $x^{10} + x^7 + x^6 + x^3 + x^2 + 1$ |
| 19 | $x^{10} + x^8 + x^5 + x + 1$ |
| 20 | $x^{10} + x^8 + x^4 + x + 1$ |
| 21 | $x^{10} + x^9 + x^8 + x^7 + x^4 + x + 1$ |
| 22 | $x^{10} + x^8 + x^5 + x^4 + x + 1$ |
| 23 | $x^{10} + x^5 + x^3 + x + 1$ |
| 24 | $x^{10} + x^8 + x^6 + x^5 + x^3 + x + 1$ |
| 25 | $x^{10} + x^9 + x^8 + x^7 + x^4 + x^3 + x + 1$ |
| 26 | $x^{10} + x^6 + x^4 + x^3 + x + 1$ |
| 27 | $x^{10} + x^8 + x^7 + x^2 + x + 1$ |
| 28 | $x^{10} + x^9 + x^8 + x^7 + x^4 + x^2 + x + 1$ |
| 29 | $x^{10} + x^9 + x^6 + x^3 + x^2 + x + 1$ |
| 30 | $x^{10} + x^8 + x^6 + x^3 + x^2 + x + 1$ |
| 31 | $x^{10} + x^6 + x^5 + x^3 + x^2 + x + 1$ |
| 32 | $x^{10} + x^4 + x^3 + x^2 + x + 1$ |
| 33 | $x^{10} + x^9 + x^7 + x^3 + 1$ |
| 34 | $x^{10} + x^9 + x^6 + x + 1$ |
| 35 | $x^{10} + x^9 + x^4 + x + 1$ |
| 36 | $x^{10} + x^7 + x^3 + x + 1$ |

-continued transmitting the super-frame.

According to a ninth aspect, a reception method for optical communication is provided. The method includes:

receiving a super-frame including a plurality of sub-frames, where the sub-frame includes training symbols and pilot symbols; in one polarization direction, there is one symbol that is both a training symbol and a pilot symbol, and each of the training symbols and the pilot symbols is one of −A−Aj, −A+Aj, A−Aj, and A+Aj, A being a real number; in each sub-frame, in the one polarization direction, the pilot symbols are generated based on a target polynomial and a seed, there are $N_{PS}$ pilot symbols combined with $N_{TS}$ training symbols to achieve direct current balance, $N_{TS}$ is a quantity of the training symbols in each sub-frame in one polarization direction, and $N_{TS}+N_{PS}$ is an odd number; and the target polynomial is one item in the following table; and Index Target polynomial

| Index | Target polynomial |
|---|---|
| 1 | $x^{10} + x^9 + x^8 + x^7 + x^6 + 1$ |
| 2 | $x^{10} + x^9 + x^8 + x^6 + x^4 + 1$ |
| 3 | $x^{10} + x^9 + x^7 + x^6 + x^4 + 1$ |
| 4 | $x^{10} + x^9 + x^6 + x^3 + 1$ |
| 5 | $x^{10} + x^8 + x^5 + x^3 + 1$ |
| 6 | $x^{10} + x^8 + x^6 + x^5 + x^3 + 1$ |
| 7 | $x^{10} + x^8 + x^7 + x^4 + x^3 + 1$ |
| 8 | $x^{10} + x^6 + x^5 + x^4 + x^3 + 1$ |
| 9 | $x^{10} + x^9 + x^6 + x^2 + 1$ |
| 10 | $x^{10} + x^7 + x^6 + x^2 + 1$ |
| 11 | $x^{10} + x^7 + x^5 + x^2 + 1$ |
| 12 | $x^{10} + x^8 + x^7 + x^5 + x^2 + 1$ |
| 13 | $x^{10} + x^9 + x^8 + x^7 + x^4 + x^2 + 1$ |
| 14 | $x^{10} + x^7 + x^5 + x^4 + x^2 + 1$ |
| 15 | $x^{10} + x^9 + x^7 + x^5 + x^4 + x^2 + 1$ |
| 16 | $x^{10} + x^9 + x^8 + x^3 + x^2 + 1$ |
| 17 | $x^{10} + x^9 + x^8 + x^7 + x^3 + x^2 + 1$ |
| 18 | $x^{10} + x^7 + x^6 + x^3 + x^2 + 1$ |
| 19 | $x^{10} + x^8 + x^5 + x + 1$ |
| 20 | $x^{10} + x^8 + x^4 + x + 1$ |
| 21 | $x^{10} + x^9 + x^8 + x^7 + x^4 + x + 1$ |
| 22 | $x^{10} + x^8 + x^5 + x^4 + x + 1$ |
| 23 | $x^{10} + x^5 + x^3 + x + 1$ |
| 24 | $x^{10} + x^8 + x^6 + x^5 + x^3 + x + 1$ |
| 25 | $x^{10} + x^9 + x^8 + x^7 + x^4 + x^3 + x + 1$ |
| 26 | $x^{10} + x^6 + x^4 + x^3 + x + 1$ |
| 27 | $x^{10} + x^8 + x^7 + x^2 + x + 1$ |
| 28 | $x^{10} + x^9 + x^8 + x^7 + x^4 + x^2 + x + 1$ |
| 29 | $x^{10} + x^9 + x^6 + x^3 + x^2 + x + 1$ |
| 30 | $x^{10} + x^8 + x^6 + x^3 + x^2 + x + 1$ |
| 31 | $x^{10} + x^6 + x^5 + x^3 + x^2 + x + 1$ |
| 32 | $x^{10} + x^4 + x^3 + x^2 + x + 1$ |
| 33 | $x^{10} + x^9 + x^7 + x^3 + 1$ |
| 34 | $x^{10} + x^9 + x^6 + x + 1$ |
| 35 | $x^{10} + x^9 + x^4 + x + 1$ |
| 36 | $x^{10} + x^7 + x^3 + x + 1$ |

decoding the received super-frame.

In the eighth aspect or the ninth aspect, the pilot symbol is generated based on the target polynomial and the corresponding seed. The target polynomial is any item in the foregoing Table, and the target polynomial and the corresponding seed can meet that a combination of the generated $N_{PS}$ pilot symbols and $N_{TS}$ training symbols achieves direct current balance, that is, in one polarization direction, a sum of real parts of complex numbers corresponding to the training symbols and the pilot symbols in one sub-frame is 0, and a sum of imaginary parts thereof is also 0, which helps a receiver end restore a signal better, and improves quality of the signal at the receiver end.

With reference to the eighth aspect or the ninth aspect, in a possible implementation, in one polarization direction, a total quantity $N_F$ of symbols in the super-frame is 175104, a quantity $N_{SF}$ of sub-frames is 24, a quantity $N_S$ of symbols in each sub-frame is 7296, $N_{TS}$=11, and $N_{PS}$=114, a sum $N_{FAW}$+$N_{RES}$ of a quantity $N_{FAW}$ of frame alignment word symbols and a quantity $N_{RES}$ of reserved symbols is 96, and a quantity of symbols before framing of the super-frame is 172032. Such a super-frame structure can help the receiver end restore a signal better, and improve quality of the signal at the receiver end.

With reference to any one of the eighth aspect, the ninth aspect, or the possible implementations, in another possible implementation, when the target polynomial and hexadecimal seeds in two polarization directions are one row in the following Table, a normalized amplitude of a sidelobe value of a periodic autocorrelation function of pilot symbols in the same polarization direction is not greater than 0.2, and a normalized amplitude of a periodic cross-correlation function value of pilot symbols in different polarization directions is not greater than 0.2:

| Index | Target polynomial | Seed in the direction of polarization 1 | Seed in the direction of polarization 2 |
|---|---|---|---|
| 1 | $x^{10} + x^9 + x^8 + x^7 + x^6 + 1$ | 0x122 | 0x0E4 |
| 2 | $x^{10} + x^9 + x^8 + x^7 + x^6 + 1$ | 0x122 | 0x06C |
| 3 | $x^{10} + x^9 + x^8 + x^7 + x^6 + 1$ | 0x362 | 0x1C4 |
| 4 | $x^{10} + x^9 + x^8 + x^7 + x^6 + 1$ | 0x362 | 0x0DC |
| 5 | $x^{10} + x^9 + x^8 + x^7 + x^6 + 1$ | 0x31A | 0x0E4 |
| 6 | $x^{10} + x^9 + x^8 + x^7 + x^6 + 1$ | 0x31A | 0x06C |
| 7 | $x^{10} + x^9 + x^8 + x^7 + x^6 + 1$ | 0x046 | 0x384 |
| 8 | $x^{10} + x^9 + x^8 + x^7 + x^6 + 1$ | 0x046 | 0x3C4 |
| 9 | $x^{10} + x^9 + x^8 + x^7 + x^6 + 1$ | 0x046 | 0x2DC |
| 10 | $x^{10} + x^9 + x^8 + x^7 + x^6 + 1$ | 0x246 | 0x348 |
| 11 | $x^{10} + x^9 + x^8 + x^7 + x^6 + 1$ | 0x246 | 0x1C4 |
| 12 | $x^{10} + x^9 + x^8 + x^7 + x^6 + 1$ | 0x246 | 0x0DC |
| 13 | $x^{10} + x^9 + x^8 + x^7 + x^6 + 1$ | 0x0F6 | 0x384 |
| 14 | $x^{10} + x^9 + x^8 + x^7 + x^6 + 1$ | 0x0F6 | 0x1C4 |
| 15 | $x^{10} + x^9 + x^8 + x^7 + x^6 + 1$ | 0x0F6 | 0x0DC |
| 16 | $x^{10} + x^9 + x^8 + x^7 + x^6 + 1$ | 0x08E | 0x0E4 |
| 17 | $x^{10} + x^9 + x^8 + x^7 + x^6 + 1$ | 0x08E | 0x06C |
| 18 | $x^{10} + x^9 + x^8 + x^6 + x^4 + 1$ | 0x022 | 0x080 |
| 19 | $x^{10} + x^9 + x^8 + x^6 + x^4 + 1$ | 0x022 | 0x220 |
| 20 | $x^{10} + x^9 + x^8 + x^6 + x^4 + 1$ | 0x022 | 0x1FC |
| 21 | $x^{10} + x^9 + x^7 + x^6 + x^4 + 1$ | 0x3A2 | 0x1A4 |
| 22 | $x^{10} + x^9 + x^7 + x^6 + x^4 + 1$ | 0x03A | 0x1A4 |
| 23 | $x^{10} + x^9 + x^6 + x^3 + 1$ | 0x076 | 0x07C |
| 24 | $x^{10} + x^8 + x^5 + x^3 + 1$ | 0x3CE | 0x19C |
| 25 | $x^{10} + x^8 + x^6 + x^5 + x^3 + 1$ | 0x186 | 0x048 |
| 26 | $x^{10} + x^8 + x^6 + x^5 + x^3 + 1$ | 0x186 | 0x034 |
| 27 | $x^{10} + x^8 + x^7 + x^4 + x^3 + 1$ | 0x1A2 | 0x2A0 |
| 28 | $x^{10} + x^8 + x^7 + x^4 + x^3 + 1$ | 0x1A2 | 0x330 |
| 29 | $x^{10} + x^8 + x^7 + x^4 + x^3 + 1$ | 0x10A | 0x334 |
| 30 | $x^{10} + x^8 + x^7 + x^4 + x^3 + 1$ | 0x10A | 0x08C |
| 31 | $x^{10} + x^8 + x^7 + x^4 + x^3 + 1$ | 0x3EA | 0x350 |
| 32 | $x^{10} + x^8 + x^7 + x^4 + x^3 + 1$ | 0x3EA | 0x184 |
| 33 | $x^{10} + x^8 + x^7 + x^4 + x^3 + 1$ | 0x2E6 | 0x2A0 |
| 34 | $x^{10} + x^8 + x^7 + x^4 + x^3 + 1$ | 0x2E6 | 0x330 |
| 35 | $x^{10} + x^6 + x^5 + x^4 + x^3 + 1$ | 0x166 | 0x0CC |
| 36 | $x^{10} + x^9 + x^6 + x^2 + 1$ | 0x21E | 0x028 |
| 37 | $x^{10} + x^9 + x^6 + x^2 + 1$ | 0x21E | 0x014 |
| 38 | $x^{10} + x^7 + x^6 + x^2 + 1$ | 0x0BE | 0x1B8 |
| 39 | $x^{10} + x^7 + x^5 + x^2 + 1$ | 0x342 | 0x16C |
| 40 | $x^{10} + x^8 + x^7 + x^5 + x^2 + 1$ | 0x0D6 | 0x0CC |
| 41 | $x^{10} + x^9 + x^8 + x^7 + x^4 + x^2 + 1$ | 0x16A | 0x0DC |
| 42 | $x^{10} + x^9 + x^8 + x^7 + x^4 + x^2 + 1$ | 0x2A6 | 0x0DC |

-continued

| Index | Target polynomial | Seed in the direction of polarization 1 | Seed in the direction of polarization 2 |
|---|---|---|---|
| 43 | $x^{10} + x^7 + x^5 + x^4 + x^2 + 1$ | 0x18A | 0x324 |
| 44 | $x^{10} + x^7 + x^5 + x^4 + x^2 + 1$ | 0x1C6 | 0x324 |
| 45 | $x^{10} + x^9 + x^7 + x^5 + x^4 + x^2 + 1$ | 0x26E | 0x38C |
| 46 | $x^{10} + x^9 + x^7 + x^5 + x^4 + x^2 + 1$ | 0x26E | 0x27C |
| 47 | $x^{10} + x^9 + x^8 + x^3 + x^2 + 1$ | 0x102 | 0x1F0 |
| 48 | $x^{10} + x^9 + x^8 + x^3 + x^2 + 1$ | 0x022 | 0x1AC |
| 49 | $x^{10} + x^9 + x^8 + x^3 + x^2 + 1$ | 0x00A | 0x144 |
| 50 | $x^{10} + x^9 + x^8 + x^3 + x^2 + 1$ | 0x14A | 0x07C |
| 51 | $x^{10} + x^9 + x^8 + x^3 + x^2 + 1$ | 0x0A6 | 0x07C |
| 52 | $x^{10} + x^9 + x^8 + x^3 + x^2 + 1$ | 0x176 | 0x1AC |
| 53 | $x^{10} + x^9 + x^8 + x^3 + x^2 + 1$ | 0x0BE | 0x07C |
| 54 | $x^{10} + x^9 + x^8 + x^7 + x^3 + x^2 + 1$ | 0x082 | 0x264 |
| 55 | $x^{10} + x^7 + x^6 + x^3 + x^2 + 1$ | 0x202 | 0x170 |
| 56 | $x^{10} + x^7 + x^6 + x^3 + x^2 + 1$ | 0x202 | 0x3F4 |
| 57 | $x^{10} + x^7 + x^6 + x^3 + x^2 + 1$ | 0x142 | 0x2E0 |
| 58 | $x^{10} + x^7 + x^6 + x^3 + x^2 + 1$ | 0x142 | 0x054 |
| 59 | $x^{10} + x^7 + x^6 + x^3 + x^2 + 1$ | 0x142 | 0x07C |
| 60 | $x^{10} + x^7 + x^6 + x^3 + x^2 + 1$ | 0x2EA | 0x150 |
| 61 | $x^{10} + x^7 + x^6 + x^3 + x^2 + 1$ | 0x306 | 0x220 |
| 62 | $x^{10} + x^7 + x^6 + x^3 + x^2 + 1$ | 0x306 | 0x094 |
| 63 | $x^{10} + x^8 + x^5 + x + 1$ | 0x3FE | 0x0E0 |
| 64 | $x^{10} + x^8 + x^4 + x + 1$ | 0x28E | 0x0F4 |
| 65 | $x^{10} + x^9 + x^8 + x^7 + x^4 + x + 1$ | 0x102 | 0x248 |
| 66 | $x^{10} + x^8 + x^5 + x^4 + x + 1$ | 0x10A | 0x0EC |
| 67 | $x^{10} + x^5 + x^3 + x + 1$ | 0x1C6 | 0x07C |
| 68 | $x^{10} + x^8 + x^6 + x^5 + x^3 + x + 1$ | 0x246 | 0x24C |
| 69 | $x^{10} + x^9 + x^8 + x^7 + x^4 + x^3 + x + 1$ | 0x1C6 | 0x130 |
| 70 | $x^{10} + x^6 + x^4 + x^3 + x + 1$ | 0x25A | 0x23C |
| 71 | $x^{10} + x^6 + x^4 + x^3 + x + 1$ | 0x2F6 | 0x23C |
| 72 | $x^{10} + x^8 + x^7 + x^2 + x + 1$ | 0x022 | 0x1CC |
| 73 | $x^{10} + x^8 + x^7 + x^2 + x + 1$ | 0x022 | 0x3DC |
| 74 | $x^{10} + x^8 + x^7 + x^2 + x + 1$ | 0x226 | 0x1CC |
| 75 | $x^{10} + x^8 + x^7 + x^2 + x + 1$ | 0x226 | 0x3DC |
| 76 | $x^{10} + x^8 + x^7 + x^2 + x + 1$ | 0x316 | 0x1C4 |
| 77 | $x^{10} + x^8 + x^7 + x^2 + x + 1$ | 0x316 | 0x2EC |
| 78 | $x^{10} + x^8 + x^7 + x^2 + x + 1$ | 0x12E | 0x1C4 |
| 79 | $x^{10} + x^8 + x^7 + x^2 + x + 1$ | 0x12E | 0x2EC |
| 80 | $x^{10} + x^9 + x^8 + x^7 + x^4 + x^2 + x + 1$ | 0x38A | 0x07C |
| 81 | $x^{10} + x^9 + x^6 + x^3 + x^2 + x + 1$ | 0x252 | 0x398 |
| 82 | $x^{10} + x^9 + x^6 + x^3 + x^2 + x + 1$ | 0x13A | 0x330 |
| 83 | $x^{10} + x^9 + x^6 + x^3 + x^2 + x + 1$ | 0x13A | 0x398 |
| 84 | $x^{10} + x^8 + x^6 + x^3 + x^2 + x + 1$ | 0x31A | 0x310 |
| 85 | $x^{10} + x^8 + x^6 + x^3 + x^2 + x + 1$ | 0x31A | 0x1C4 |
| 86 | $x^{10} + x^6 + x^5 + x^3 + x^2 + x + 1$ | 0x262 | 0x3A4 |
| 87 | $x^{10} + x^6 + x^5 + x^3 + x^2 + x + 1$ | 0x292 | 0x36C |
| 88 | $x^{10} + x^4 + x^3 + x^2 + x + 1$ | 0x222 | 0x048 |
| 89 | $x^{10} + x^4 + x^3 + x^2 + x + 1$ | 0x222 | 0x138 |
| 90 | $x^{10} + x^4 + x^3 + x^2 + x + 1$ | 0x322 | 0x368 |
| 91 | $x^{10} + x^4 + x^3 + x^2 + x + 1$ | 0x322 | 0x1D8 |
| 92 | $x^{10} + x^4 + x^3 + x^2 + x + 1$ | 0x322 | 0x0E4 |
| 93 | $x^{10} + x^4 + x^3 + x^2 + x + 1$ | 0x0E2 | 0x368 |
| 94 | $x^{10} + x^4 + x^3 + x^2 + x + 1$ | 0x0E2 | 0x1D8 |
| 95 | $x^{10} + x^4 + x^3 + x^2 + x + 1$ | 0x0E2 | 0x0E4 |
| 96 | $x^{10} + x^4 + x^3 + x^2 + x + 1$ | 0x07A | 0x2C4 |
| 97 | $x^{10} + x^4 + x^3 + x^2 + x + 1$ | 0x07A | 0x3B4 |
| 98 | $x^{10} + x^4 + x^3 + x^2 + x + 1$ | 0x04E | 0x2F0 |
| 99 | $x^{10} + x^4 + x^3 + x^2 + x + 1$ | 0x04E | 0x224 |
| 100 | $x^{10} + x^4 + x^3 + x^2 + x + 1$ | 0x36E | 0x2C4 |
| 101 | $x^{10} + x^4 + x^3 + x^2 + x + 1$ | 0x36E | 0x0EC |
| 102 | $x^{10} + x^4 + x^3 + x^2 + x + 1$ | 0x21E | 0x368 |
| 103 | $x^{10} + x^4 + x^3 + x^2 + x + 1$ | 0x21E | 0x1D8 |

With reference to any one of the eighth aspect, the ninth aspect, or the possible implementations, in another possible implementation, when the target polynomial and hexadecimal seeds in two polarization directions are one row in the following Table, in one polarization direction, in a combination of 114 pilot symbols and 11 training symbols, quantities of −A−Aj, −A+Aj, A−Aj, and A+Aj in one polarization direction are all 31:

| Index | Target polynomial | Seed in the direction of polarization 1 | Seed in the direction of polarization 2 |
|---|---|---|---|
| 1 | $x^{10} + x^9 + x^8 + x^7 + x^6 + 1$ | 0x046 | 0x384 |
| 2 | $x^{10} + x^9 + x^8 + x^7 + x^6 + 1$ | 0x046 | 0x3C4 |
| 3 | $x^{10} + x^9 + x^6 + x^3 + 1$ | 0x076 | 0x07C |
| 4 | $x^{10} + x^8 + x^7 + x^4 + x^3 + 1$ | 0x1A2 | 0x330 |
| 5 | $x^{10} + x^8 + x^7 + x^4 + x^3 + 1$ | 0x2E6 | 0x330 |
| 6 | $x^{10} + x^8 + x^7 + x^2 + x + 1$ | 0x226 | 0x3DC |
| 7 | $x^{10} + x^9 + x^6 + x^3 + x^2 + x + 1$ | 0x13A | 0x330 |
| 8 | $x^{10} + x^4 + x^3 + x^2 + x + 1$ | 0x322 | 0x368 |
| 9 | $x^{10} + x^4 + x^3 + x^2 + x + 1$ | 0x322 | 0x0E4 |
| 10 | $x^{10} + x^4 + x^3 + x^2 + x + 1$ | 0x0E2 | 0x368 |
| 11 | $x^{10} + x^4 + x^3 + x^2 + x + 1$ | 0x0E2 | 0x0E4 |
| 12 | $x^{10} + x^4 + x^3 + x^2 + x + 1$ | 0x04E | 0x2F0 |

With reference to any one of the eighth aspect, the ninth aspect, or the possible implementations, when the target polynomial is a primitive polynomial and there are no more than 5 non-zero terms of the target polynomial, and when the target polynomial and hexadecimal seeds in two polarization directions are one row in the following Table, a normalized amplitude of a sidelobe value of a periodic autocorrelation function of pilot symbols in the same polarization direction is not greater than 0.25, and a normalized amplitude of a periodic cross-correlation function value of pilot symbols in different polarization directions is not greater than 0.25:

| Index | Target polynomial | Seed in the direction of polarization 1 | Seed in the direction of polarization 2 |
|---|---|---|---|
| 1 | $x^{10} + x^9 + x^7 + x^3 + 1$ | 0x23E | 0x094 |
| 2 | $x^{10} + x^7 + x^6 + x^2 + 1$ | 0x0BE | 0x1B8 |
| 3 | $x^{10} + x^9 + x^6 + x + 1$ | 0x002 | 0x210 |
| 4 | $x^{10} + x^9 + x^6 + x + 1$ | 0x002 | 0x308 |
| 5 | $x^{10} + x^9 + x^6 + x + 1$ | 0x002 | 0x184 |
| 6 | $x^{10} + x^9 + x^6 + x + 1$ | 0x1C2 | 0x040 |
| 7 | $x^{10} + x^8 + x^5 + x + 1$ | 0x3FE | 0x0E0 |
| 8 | $x^{10} + x^8 + x^5 + x + 1$ | 0x3FE | 0x270 |
| 9 | $x^{10} + x^8 + x^5 + x + 1$ | 0x3FE | 0x304 |
| 10 | $x^{10} + x^9 + x^4 + x + 1$ | 0x3B6 | 0x1A0 |
| 11 | $x^{10} + x^9 + x^4 + x + 1$ | 0x3B6 | 0x0D0 |
| 12 | $x^{10} + x^9 + x^4 + x + 1$ | 0x3B6 | 0x058 |
| 13 | $x^{10} + x^9 + x^4 + x + 1$ | 0x3B6 | 0x22C |
| 14 | $x^{10} + x^7 + x^3 + x + 1$ | 0x34E | 0x084 |

With reference to any one of the eighth aspect, the ninth aspect, or the possible implementations, in another possible implementation, when the target polynomial is $x^{10}+x^7+x^3+x+1$, and the corresponding hexadecimal seeds in the two polarization directions are 0x34E and 0x084, in one polarization direction, in a combination of 114 pilot symbols and 11 training symbols, quantities of −A−Aj, −A+Aj, A−Aj, and A+Aj in the one polarization direction are all 31, and the respective 114 pilot symbols in the two polarization directions are shown in the following table:

| Polarization direction | Pilot symbol |
|---|---|
| Polarization 1 | −A + Aj, A + Aj, −A − Aj, A − Aj, A + Aj, −A + Aj, A − Aj, A + Aj, −A − Aj, −A − Aj, A + Aj, −A − Aj, A + Aj, −A − Aj, −A + Aj, −A − Aj, −A + Aj, −A + Aj, −A − Aj, −A + Aj, A − Aj, A − Aj, A − Aj, A − Aj, A − Aj, A + Aj, A + Aj, −A + Aj, −A − Aj, A − Aj, A + Aj, A − Aj, −A + Aj, −A − Aj, A − Aj, −A + Aj, −A − Aj, −A − Aj, −A + Aj, −A − Aj, −A + Aj, −A − Aj, −A − Aj, A + Aj, A + Aj, −A − Aj, A + Aj, A + Aj, −A + Aj, A − Aj, −A + Aj, A − Aj, −A + Aj, A − Aj, A − Aj, A + Aj, −A − Aj, −A + Aj, A − Aj, A − Aj, −A − Aj, A + Aj, A − Aj, −A − Aj, A + Aj, A + Aj, A + Aj, −A − Aj, −A − Aj, A + Aj, A + Aj, A − Aj, A − Aj, A + Aj, A − Aj, A − Aj, A + Aj, −A + Aj, A + Aj, −A + Aj, A + Aj, −A + Aj, A − Aj, −A + Aj, −A − Aj, −A − Aj, A − Aj, −A + Aj, A + Aj, A − Aj, A − Aj, −A − Aj, −A + Aj, −A + Aj, −A + Aj, −A − Aj, −A − Aj, −A + Aj, −A + Aj, −A + Aj, A − Aj, −A + Aj, −A + Aj, A − Aj, −A + Aj, −A − Aj, A − Aj, A + Aj, −A + Aj, −A − Aj, A − Aj, −A − Aj, A + Aj, A + Aj |
| Polarization 2 | −A − Aj, A − Aj, −A − Aj, −A + Aj, −A − Aj, A + Aj, A + Aj, −A + Aj, −A − Aj, −A − Aj, A − Aj, A − Aj, A − Aj, −A − Aj, −A − Aj, A − Aj, A − Aj, A + Aj, −A − Aj, A − Aj, A + Aj, −A − Aj, A − Aj, −A + Aj, −A + Aj, A − Aj, A − Aj, −A + Aj, −A − Aj, −A + Aj, A + Aj, A + Aj, −A − Aj, −A + Aj, −A + Aj, −A − Aj, A + Aj, A + Aj, A − Aj, −A + Aj, A − Aj, −A − Aj, −A − Aj, −A + Aj, A − Aj, −A + Aj, −A − Aj, −A + Aj, A − Aj, A + Aj, A − Aj, −A − Aj, A + Aj, −A + Aj, A − Aj, −A − Aj, A + Aj, A + Aj, −A + Aj, −A + Aj, −A − Aj, −A − Aj, A + Aj, −A − Aj, −A + Aj, −A + Aj, −A + Aj, A + Aj, −A + Aj, A + Aj, A + Aj, A + Aj, −A + Aj, A + Aj, −A − Aj, −A − Aj, A − Aj, −A + Aj, −A + Aj, A + Aj, A − Aj, A + Aj, −A + Aj, A + Aj, A − Aj, A − Aj, A + Aj, −A − Aj, A + Aj, A + Aj, A − Aj, A + Aj, A + Aj, −A − Aj, A + Aj, −A + Aj, −A − Aj, A − Aj, A − Aj, A − Aj, A + Aj, −A + Aj, −A − Aj, −A − Aj, −A + Aj, A + Aj, −A − Aj, A − Aj, A − Aj, −A + Aj, −A − Aj, A − Aj, A − Aj, −A + Aj |

With reference to any one of the eighth aspect, the ninth aspect, or the possible implementations, in another possible implementation, when the target polynomial is $x^{10}+x^7+x^6+x^2+1$, and the corresponding hexadecimal seeds in the two polarization directions are 0x0BE and 0x1B8, the respective 114 pilot symbols in the two polarization directions are shown in the following table:

| Polarization direction | Pilot symbol |
|---|---|
| Polarization 1 | −A + Aj, A + Aj, A + Aj, −A + Aj, −A − Aj, −A + Aj, −A − Aj, −A + Aj, −A + Aj, A − Aj, A + Aj, A − Aj, −A − Aj, −A + Aj, −A + Aj, A − Aj, −A − Aj, A + Aj, −A + Aj, A − Aj, −A − Aj, −A + Aj, A − Aj, −A + Aj, −A − Aj, A − Aj, A − Aj, −A − Aj, A + Aj, A + Aj, −A − Aj, A + Aj, A − Aj, −A − Aj, −A + Aj, A + Aj, A + Aj, A − Aj, −A + Aj, −A − Aj, A + Aj, −A − Aj, A − Aj, −A − Aj, −A + Aj, A + Aj, −A − Aj, A + Aj, −A − Aj, A + Aj, A − Aj, A + Aj, −A − Aj, A − Aj, −A − Aj, A + Aj, A − Aj, A − Aj, −A + Aj, −A + Aj, A − Aj, A − Aj, −A − Aj, A − Aj, A − Aj, A + Aj, −A + Aj, A + Aj, A − Aj, −A + Aj, −A − Aj, −A + Aj, −A + Aj, −A − Aj, A − Aj, −A − Aj, A − Aj, −A − Aj, −A − Aj, A − Aj, |

-continued

| Polarization direction | Pilot symbol |
|---|---|
| | A + Aj, –A + Aj, –A + Aj, –A + Aj, A – Aj, –A – Aj, A – Aj, –A + Aj, –A + Aj, –A + Aj, –A + Aj, –A – Aj, A + Aj, –A + Aj, –A + Aj, A – Aj, –A + Aj, –A – Aj, A + Aj, A – Aj, A + Aj, A – Aj, A + Aj, A – Aj, –A + Aj, A + Aj, A + Aj, –A + Aj, A – Aj, –A – Aj, A – Aj, A + Aj, –A – Aj, A + Aj |
| Polarization 2 | –A – Aj, –A + Aj, A + Aj, –A + Aj, A – Aj, A + Aj, –A + Aj, A + Aj, –A + Aj, –A – Aj, –A + Aj, A – Aj, –A – Aj, A + Aj, –A – Aj, A – Aj, A + Aj, –A – Aj, A – Aj, A + Aj, A – Aj, A + Aj, –A + Aj, –A – Aj, A – Aj, –A – Aj, –A – Aj, –A + Aj, A – Aj, –A – Aj, A – Aj, –A – Aj, –A + Aj, A – Aj, –A – Aj, –A – Aj, –A + Aj, A + Aj, –A – Aj, –A + Aj, –A + Aj, –A + Aj, –A – Aj, A – Aj, –A + Aj, A – Aj, A + Aj, –A + Aj, A – Aj, –A + Aj, A + Aj, –A – Aj, A – Aj, A – Aj, –A + Aj, –A + Aj, –A + Aj, A + Aj, –A + Aj, –A + Aj, A + Aj, –A – Aj, A + Aj, –A + Aj, A + Aj, –A + Aj, A – Aj, –A – Aj, –A – Aj, A – Aj, A – Aj, –A + Aj, A – Aj, –A – Aj, A – Aj, A – Aj, –A – Aj, –A – Aj, A – Aj, –A + Aj, –A – Aj, A + Aj, A + Aj, A + Aj, –A + Aj, A – Aj, A – Aj, A + Aj, –A + Aj, A – Aj, A – Aj, A – Aj, –A + Aj, –A + Aj, A + Aj, A – Aj, A + Aj, A + Aj, A – Aj, –A + Aj, A + Aj, A – Aj, –A + Aj, –A + Aj, –A + Aj, A – Aj, –A + Aj, A – Aj, A – Aj, –A – Aj, –A + Aj, A + Aj, A – Aj, A – Aj |

With reference to any one of the eighth aspect, the ninth aspect, or the possible implementations, in another possible implementation, in one polarization direction, a total quantity $N_F$ of symbols in the super-frame is 175104, a quantity $N_{SF}$ of sub-frames is 48, a quantity $N_S$ of symbols in each sub-frame is 3648, $N_{TS}$=6, and $N_{PS}$=57, a sum $N_{FAW}$+$N_{RES}$ of a quantity $N_{FAW}$ of frame alignment word symbols and a quantity $N_{RES}$ of reserved symbols is 96, and a quantity of symbols before framing of the super-frame is 172032.

With reference to any one of the eighth aspect, the ninth aspect, or the possible implementations, in another possible implementation, when the target polynomial and hexadecimal seeds in two polarization directions are one row in the following Table, a normalized amplitude of a sidelobe value of a periodic autocorrelation function of pilot symbols in the same polarization direction is not greater than 0.23, and a normalized amplitude of a periodic cross-correlation function value of pilot symbols in different polarization directions is not greater than 0.23:

| Index | Target polynomial | Seed in the direction of polarization 1 | Seed in the direction of polarization 2 |
|---|---|---|---|
| 1 | $x^{10} + x^7 + x^3 + x + 1$ | 0x204 | 0x279 |
| 2 | $x^{10} + x^7 + x^3 + x + 1$ | 0x0B1 | 0x3E9 |
| 3 | $x^{10} + x^7 + x^3 + x + 1$ | 0x0B1 | 0x279 |

With reference to any one of the eighth aspect, the ninth aspect, or the possible implementations, in another possible implementation, when the target polynomial is $x^{10}+x^7+x^3+x+1$, and the corresponding hexadecimal seeds in the two polarization directions are 0x0B1 and 0x3E9, the respective 57 pilot symbols in the two polarization directions are shown in the following table:

| Polarization direction | Pilot symbol |
|---|---|
| Polarization 1 | A – Aj, –A – Aj, A + Aj, –A + Aj, –A – Aj, –A + Aj, A + Aj, –A – Aj, –A + Aj, A + Aj, A + Aj, A – Aj, –A – Aj, –A + Aj, A + Aj, A + Aj, –A + Aj, –A + Aj, A + Aj, –A + Aj, –A + Aj, A – Aj, A + Aj, A – Aj, A + Aj, A – Aj, A + Aj, –A – Aj, A – Aj, –A – Aj, –A + Aj, –A – Aj, A + Aj, A + Aj, –A + Aj, –A – Aj, –A – Aj, A – Aj, A – Aj, A – Aj, –A – Aj, –A – Aj, A – Aj, A – Aj, A + Aj, –A – Aj, A – Aj, A + Aj, –A – Aj, A – Aj, –A + Aj, –A + Aj, A – Aj, A – Aj, –A + Aj, –A – Aj, –A + Aj |
| Polarization 2 | A – Aj, –A + Aj, –A + Aj, A + Aj, A + Aj, A + Aj, A + Aj, A – Aj, –A – Aj, A + Aj, A – Aj, A + Aj, A – Aj, –A + Aj, –A + Aj, A – Aj, A + Aj, –A + Aj, A – Aj, –A – Aj, –A + Aj, A – Aj, –A + Aj, A – Aj, –A – Aj, A – Aj, –A – Aj, A – Aj, A – Aj, –A – Aj, A + Aj, –A + Aj, –A + Aj, –A + Aj, –A + Aj, –A + Aj, A + Aj, A – Aj, A – Aj, –A + Aj, –A + Aj, A + Aj, –A – Aj, A – Aj, –A + Aj, –A – Aj, A – Aj, –A – Aj, –A – Aj, A – Aj, –A – Aj, A – Aj, –A – Aj, –A + Aj, A + Aj, A – Aj, –A + Aj |

According to a tenth aspect, a transmitting device for optical communication is provided. The transmitting device includes a processor and a memory. The memory is configured to store instructions, and the processor is configured to execute the instructions, to cause the transmitting device to perform the method in any one of the eighth aspect or the possible implementations of the eighth aspect.

According to an eleventh aspect, a receiving device for optical communication is provided. The transmitting device includes a processor and a memory. The memory is configured to store instructions, and the processor is configured to execute the instructions, to cause the receiving device to perform the method in any one of the ninth aspect or the possible implementations of the ninth aspect.

According to a twelfth aspect, a system for optical communication is provided. The system includes the transmitting device according to the tenth aspect and the receiving device according to the tenth aspect.

It should be understood that the processor may be a central processing unit (CPU), or may be another general-purpose processor, a digital signal processor (DSP), an application-specific integrated circuit (ASIC), a field-programmable gate array (FPGA) or another programmable logic device, a discrete gate or a transistor logic device, a discrete hardware component, or the like. The general-purpose processor may be a microprocessor, or the processor may be any conventional processor or the like, which is not limited in embodiments of this application.

According to a thirteenth aspect, a computer-readable storage medium is provided. The computer-readable storage medium stores instructions that, when executed on a terminal device, cause the terminal device to perform the method in any one of the eighth aspect or the possible implementations of the eighth aspect, or cause the terminal device to perform the method in any one of the ninth aspect or the possible implementations of the ninth aspect.

According to a fourteenth aspect, a computer program product including instructions is provided. The computer program product, when run on a terminal device, causes the terminal device to perform the method according to any one of the eighth aspect or the possible implementations of the eighth aspect, or causes the terminal device to perform the method according to any one of the ninth aspect or the possible implementations of the ninth aspect. It should be understood that the terminal device may be a chip, a processor, or the like, which is not limited in this application.

According to a fifteenth aspect, a transmission method for optical communication is provided. The method includes: generating a super-frame including a plurality of sub-frames, where the sub-frame includes training symbols and pilot symbols; in each sub-frame, in one polarization direction, there are $N_{PS}$ pilot symbols, a value of which is one of $-A_2-A_2j$, $-A_2+A_2j$, $A_2-A_2j$, and $A_2+A_2j$, $A_2$ being a real number, and $N_{PS}$ being an even number; the $N_{PS}$ pilot symbols achieve direct current balance, and a combination of the training symbols and the $N_{PS}$ pilot symbols achieves direct current balance; the pilot symbols are generated based on a target polynomial and a seed, the target polynomial is a primitive polynomial, and there are no more than 5 non-zero terms of the target polynomial; and the target polynomial is one item in the following Table; and

| Index | Target polynomial |
|---|---|
| 1 | $x^{10} + x^9 + x^7 + x^6 + 1$ |
| 2 | $x^{10} + x^9 + x^7 + x^3 + 1$ |
| 3 | $x^{10} + x^8 + x^4 + x^3 + 1$ |
| 4 | $x^{10} + x^7 + x^6 + x^2 + 1$ |
| 5 | $x^{10} + x^9 + x^6 + x + 1$ |
| 6 | $x^{10} + x^9 + x^4 + x + 1$ |
| 7 | $x^{10} + x^7 + x^3 + x + 1$ |
| 8 | $x^{10} + x^4 + x^3 + x + 1$ |

transmitting the super-frame.

According to a sixteenth aspect, a reception method for optical communication is provided. The method includes: receiving a super-frame including a plurality of sub-frames, where the sub-frame includes training symbols and pilot symbols; in each sub-frame, in one polarization direction, there are $N_{PS}$ pilot symbols, a value of which is one of $-A_2-A_2j$, $-A_2+A_2j$, $A_2-A_2j$, and $A_2+A_2j$, $A_2$ being a real number, and $N_{PS}$ being an even number; the $N_{PS}$ pilot symbols achieve direct current balance, and a combination of the training symbols and the $N_{PS}$ pilot symbols achieves direct current balance; the pilot symbols are generated based on a target polynomial and a seed, the target polynomial is a primitive polynomial, and there are no more than 5 non-zero terms of the target polynomial; and the target polynomial is one item in the following Table; and

| Index | Target polynomial |
|---|---|
| 1 | $x^{10} + x^9 + x^7 + x^6 + 1$ |
| 2 | $x^{10} + x^9 + x^7 + x^3 + 1$ |
| 3 | $x^{10} + x^8 + x^4 + x^3 + 1$ |
| 4 | $x^{10} + x^7 + x^6 + x^2 + 1$ |
| 5 | $x^{10} + x^9 + x^6 + x + 1$ |
| 6 | $x^{10} + x^9 + x^4 + x + 1$ |
| 7 | $x^{10} + x^7 + x^3 + x + 1$ |
| 8 | $x^{10} + x^4 + x^3 + x + 1$ |

decoding the received super-frame.

In the fifteenth aspect or the sixteenth aspect, the pilot symbols are generated based on the target polynomial and the seed. The target polynomial is any item in the foregoing Table, and the target polynomial and the corresponding seed can meet that the $N_{PS}$ pilot symbols achieve direct current balance, and that a combination of the training symbols and the $N_{PS}$ pilot symbols achieves direct current balance, which helps a receiver end restore a signal better, and improves quality of the signal at the receiver end.

With reference to the fifteenth aspect or the sixteenth aspect, in a possible implementation, in one polarization direction, a total quantity $N_F$ of symbols in the super-frame is 175104, a quantity $N_{SF}$ of sub-frames is 24, a quantity $N_S$ of symbols in each sub-frame is 7296, $N_{PS}$=114, a sum $N_{FAW}$+$N_{RES}$ of a quantity $N_{FAW}$ of frame alignment word symbols and a quantity $N_{RES}$ of reserved symbols is 96, and a quantity of symbols before framing of the super-frame is 172032; and when the target polynomial for generating the pilot symbols and hexadecimal seeds in two polarization directions are one row in the following Table, a normalized amplitude of a sidelobe value of a periodic autocorrelation function of pilot symbols in the same polarization direction is not greater than 0.25, and a normalized amplitude of a periodic cross-correlation function value of pilot symbols in different polarization directions is not greater than 0.25:

| Index | Target polynomial | Seed in the direction of polarization 1 | Seed in the direction of polarization 2 |
|---|---|---|---|
| 1 | $x^{10} + x^9 + x^7 + x^6 + 1$ | 0x002 | 0x3C6 |
| 2 | $x^{10} + x^9 + x^7 + x^6 + 1$ | 0x002 | 0x38D |
| 3 | $x^{10} + x^9 + x^7 + x^3 + 1$ | 0x094 | 0x11F |
| 4 | $x^{10} + x^9 + x^7 + x^3 + 1$ | 0x129 | 0x11F |
| 5 | $x^{10} + x^8 + x^4 + x^3 + 1$ | 0x07A | 0x167 |
| 6 | $x^{10} + x^8 + x^4 + x^3 + 1$ | 0x07A | 0x2CF |
| 7 | $x^{10} + x^7 + x^6 + x^2 + 1$ | 0x1B8 | 0x22F |
| 8 | $x^{10} + x^7 + x^6 + x^2 + 1$ | 0x1B8 | 0x05F |
| 9 | $x^{10} + x^9 + x^6 + x + 1$ | 0x040 | 0x210 |
| 10 | $x^{10} + x^9 + x^6 + x + 1$ | 0x040 | 0x308 |
| 11 | $x^{10} + x^9 + x^6 + x + 1$ | 0x040 | 0x184 |
| 12 | $x^{10} + x^9 + x^6 + x + 1$ | 0x040 | 0x0C2 |
| 13 | $x^{10} + x^9 + x^6 + x + 1$ | 0x040 | 0x0E1 |
| 14 | $x^{10} + x^9 + x^6 + x + 1$ | 0x040 | 0x0D7 |
| 15 | $x^{10} + x^9 + x^6 + x + 1$ | 0x040 | 0x1AF |
| 16 | $x^{10} + x^9 + x^6 + x + 1$ | 0x210 | 0x201 |
| 17 | $x^{10} + x^9 + x^6 + x + 1$ | 0x308 | 0x201 |
| 18 | $x^{10} + x^9 + x^6 + x + 1$ | 0x184 | 0x201 |
| 19 | $x^{10} + x^9 + x^6 + x + 1$ | 0x0C2 | 0x201 |
| 20 | $x^{10} + x^9 + x^6 + x + 1$ | 0x201 | 0x0E1 |
| 21 | $x^{10} + x^9 + x^6 + x + 1$ | 0x201 | 0x0D7 |
| 22 | $x^{10} + x^9 + x^6 + x + 1$ | 0x201 | 0x1AF |
| 23 | $x^{10} + x^9 + x^4 + x + 1$ | 0x1A0 | 0x2D9 |
| 24 | $x^{10} + x^9 + x^4 + x + 1$ | 0x1A0 | 0x3DB |
| 25 | $x^{10} + x^9 + x^4 + x + 1$ | 0x0D0 | 0x2D9 |
| 26 | $x^{10} + x^9 + x^4 + x + 1$ | 0x0D0 | 0x3DB |
| 27 | $x^{10} + x^9 + x^4 + x + 1$ | 0x058 | 0x2D9 |
| 28 | $x^{10} + x^9 + x^4 + x + 1$ | 0x058 | 0x3DB |
| 29 | $x^{10} + x^9 + x^4 + x + 1$ | 0x22C | 0x2D9 |
| 30 | $x^{10} + x^9 + x^4 + x + 1$ | 0x22C | 0x3DB |
| 31 | $x^{10} + x^9 + x^4 + x + 1$ | 0x2D2 | 0x2D9 |
| 32 | $x^{10} + x^9 + x^4 + x + 1$ | 0x2D2 | 0x3DB |
| 33 | $x^{10} + x^9 + x^4 + x + 1$ | 0x2D9 | 0x1A5 |
| 34 | $x^{10} + x^9 + x^4 + x + 1$ | 0x2D9 | 0x3DD |
| 35 | $x^{10} + x^9 + x^4 + x + 1$ | 0x1A5 | 0x3DB |
| 36 | $x^{10} + x^9 + x^4 + x + 1$ | 0x3DD | 0x3DB |
| 37 | $x^{10} + x^7 + x^3 + x + 1$ | 0x084 | 0x1A7 |
| 38 | $x^{10} + x^7 + x^3 + x + 1$ | 0x109 | 0x1A7 |
| 39 | $x^{10} + x^4 + x^3 + x + 1$ | 0x365 | 0x3EB |
| 40 | $x^{10} + x^4 + x^3 + x + 1$ | 0x2CB | 0x3EB |

With reference to ay one of the fifteenth aspect, the sixteenth aspect, or the possible implementations, in another possible implementation, when the target polynomial is $x^{10}+x^9+x^7+x^6+1$, and the corresponding hexadecimal seeds in the two polarization directions are 0x002 and 0x3C6, the respective 114 pilot symbols in the two polarization directions are shown in the following table:

| Polarization direction | Pilot symbol |
|---|---|
| Polarization 1 | $-A_2 + A_2j, -A_2 - A_2j, -A_2 - A_2j, -A_2 - A_2j, -A_2 - A_2j, -A_2 + A_2j, A_2 + A_2j, -A_2 - A_2j, -A_2 + A_2j, A_2 + A_2j, -A_2 + A_2j, -A_2 - A_2j, A_2 - A_2j, -A_2 - A_2j, -A_2 + A_2j, A_2 - A_2j, A_2 + A_2j, A_2 - A_2j, -A_2 - A_2j, A_2 - A_2j, A_2 - A_2j, -A_2 - A_2j, -A_2 - A_2j, -A_2 - A_2j, A_2 + A_2j, -A_2 + A_2j, A_2 - A_2j, A_2 + A_2j, -A_2 + A_2j, -A_2 - A_2j, A_2 + A_2j, -A_2 + A_2j, -A_2 - A_2j, A_2 + A_2j, A_2 - A_2j, A_2 - A_2j, A_2 + A_2j, -A_2 + A_2j, -A_2 - A_2j, -A_2 + A_2j, -A_2 - A_2j, -A_2 - A_2j, -A_2 + A_2j, A_2 + A_2j, -A_2 + A_2j, A_2 - A_2j, A_2 + A_2j, -A_2 - A_2j, A_2 + A_2j, A_2 + A_2j, -A_2 - A_2j, A_2 + A_2j, A_2 - A_2j, A_2 - A_2j, -A_2 - A_2j, A_2 + A_2j, -A_2 - A_2j, A_2 - A_2j, A_2 - A_2j, A_2 - A_2j, -A_2 - A_2j, A_2 + A_2j, -A_2 + A_2j, -A_2 + A_2j, A_2 - A_2j, A_2 + A_2j, A_2 + A_2j, A_2 - A_2j, -A_2 + A_2j, A_2 + A_2j, A_2 - A_2j, A_2 - A_2j, -A_2 + A_2j, -A_2 + A_2j, A_2 + A_2j, A_2 + A_2j, -A_2 - A_2j, -A_2 - A_2j, -A_2 + A_2j, -A_2 + A_2j, A_2 + A_2j, -A_2 - A_2j, -A_2 + A_2j, A_2 - A_2j, A_2 - A_2j, -A_2 - A_2j, A_2 + A_2j, A_2 + A_2j, -A_2 - A_2j, A_2 - A_2j, -A_2 + A_2j, A_2 - A_2j, -A_2 + A_2j, -A_2 - A_2j, -A_2 + A_2j, A_2 - A_2j, -A_2 - A_2j, A_2 - A_2j, -A_2 + A_2j, -A_2 + A_2j, A_2 - A_2j, A_2 + A_2j, A_2 - A_2j, -A_2 + A_2j, -A_2 + A_2j, A_2 - A_2j, -A_2 + A_2j, A_2 + A_2j, -A_2 + A_2j, A_2 + A_2j, A_2 + A_2j, A_2 - A_2j, A_2 - A_2j, A_2 + A_2j$ |
| Polarization 2 | $-A_2 + A_2j, A_2 - A_2j, -A_2 - A_2j, A_2 + A_2j, A_2 + A_2j, A_2 - A_2j, A_2 + A_2j, -A_2 + A_2j, -A_2 - A_2j, -A_2 - A_2j, A_2 + A_2j, -A_2 - A_2j, -A_2 - A_2j, -A_2 - A_2j, -A_2 - A_2j, A_2 - A_2j, -A_2 + A_2j, -A_2 - A_2j, A_2 - A_2j, -A_2 + A_2j, A_2 + A_2j, -A_2 + A_2j, A_2 - A_2j, -A_2 - A_2j, A_2 - A_2j, A_2 + A_2j, -A_2 - A_2j, A_2 - A_2j, -A_2 + A_2j, A_2 + A_2j, A_2 - A_2j, -A_2 - A_2j, -A_2 - A_2j, -A_2 + A_2j, -A_2 + A_2j, A_2 - A_2j, A_2 + A_2j, -A_2 + A_2j, A_2 + A_2j, -A_2 + A_2j, -A_2 + A_2j, A_2 + A_2j, -A_2 + A_2j, -A_2 - A_2j, A_2 + A_2j, A_2 + A_2j, -A_2 + A_2j, A_2 + A_2j, -A_2 - A_2j, A_2 + A_2j, -A_2 - A_2j, -A_2 - A_2j, A_2 - A_2j, -A_2 + A_2j, A_2 - A_2j, A_2 + A_2j, -A_2 + A_2j, -A_2 + A_2j, -A_2 - A_2j, -A_2 + A_2j, -A_2 + A_2j, -A_2 - A_2j, A_2 + A_2j, A_2 - A_2j, -A_2 + A_2j, -A_2 + A_2j, -A_2 + A_2j, A_2 + A_2j, A_2 + A_2j, A_2 - A_2j, -A_2 + A_2j, -A_2 + A_2j, A_2 + A_2j, A_2 - A_2j, A_2 + A_2j, -A_2 - A_2j, -A_2 - A_2j, A_2 - A_2j, A_2 - A_2j, -A_2 - A_2j, A_2 + A_2j, A_2 - A_2j, A_2 + A_2j, A_2 - A_2j, -A_2 - A_2j, -A_2 + A_2j, -A_2 - A_2j, -A_2 - A_2j, A_2 + A_2j, A_2 - A_2j, -A_2 + A_2j, -A_2 - A_2j, A_2 - A_2j, A_2 + A_2j, A_2 - A_2j, -A_2 + A_2j, -A_2 - A_2j, -A_2 + A_2j, -A_2 + A_2j, A_2 - A_2j, A_2 - A_2j, A_2 - A_2j, A_2 + A_2j, -A_2 - A_2j, A_2 - A_2j, A_2 - A_2j, -A_2 + A_2j, A_2 - A_2j, A_2 + A_2j, A_2 - A_2j, A_2 + A_2j, -A_2 - A_2j, A_2 - A_2j, A_2 + A_2j$ |

With reference to any one of the fifteenth aspect, the sixteenth aspect, or the possible implementations, in another possible implementation, in each sub-frame, in one polarization direction, when a remainder of the quantity of the pilot symbols divided by 4 is 0, in the pilot symbols included in each sub-frame, a quantity of $-A_2-A_2j$ is equal to a quantity of $A_2+A_2j$, a quantity of $-A_2+A_2j$ is equal to a quantity of $A_2-A_2j$, and a difference between the quantity of $-A_2-A_2j$ and a quantity of is 2; or the quantities of $-A_2-A_2j$, $-A_2+A_2j$, $A_2-A_2j$, and $A_2+A_2j$ are equal; and when a remainder of the quantity of the pilot symbols divided by 4 is 2, in the pilot symbols included in each sub-frame, a quantity of $-A_2-A_2j$ is equal to a quantity of $A_2+A_2j$, a quantity of $-A_2+A_2j$ is equal to a quantity of $A_2-A_2j$, and a difference between the quantity of $-A_2-A_2j$ and a quantity of is 1.

According to a seventeenth aspect, a transmitting device for optical communication is provided. The transmitting device includes a processor and a memory. The memory is configured to store instructions, and the processor is configured to execute the instructions, to cause the transmitting device to perform the method in any one of the fifteenth aspect or the possible implementations of the fifteenth aspect.

According to an eighteenth aspect, a receiving device for optical communication is provided. The transmitting device includes a processor and a memory. The memory is configured to store instructions, and the processor is configured to execute the instructions, to cause the receiving device to perform the method in any one of the sixteenth aspect or the possible implementations of the sixteenth aspect.

According to a nineteenth aspect, a system for optical communication is provided. The system includes the transmitting device according to the seventeenth aspect and the receiving device according to the eighteenth aspect.

It should be understood that the processor may be a central processing unit ("CPU"), or may be another general-purpose processor, a digital signal processor (DSP), an application-specific integrated circuit (ASIC), a field-programmable gate array (FPGA) or another programmable logic device, a discrete gate or a transistor logic device, a discrete hardware component, or the like. The general-purpose processor may be a microprocessor, or the processor may be any conventional processor or the like, which is not limited in embodiments of this application.

According to a twentieth aspect, a computer-readable storage medium is provided. The computer-readable storage medium stores instructions that, when executed on a terminal device, cause the terminal device to perform the method in any one of the fifteenth aspect or the possible implementations of the fifteenth aspect, or cause the terminal device to perform the method in any one of the sixteenth aspect or the possible implementations of the sixteenth aspect.

According to a twenty-first aspect, a computer program product including instructions is provided. The computer program product, when run on a terminal device, causes the terminal device to perform the method in any one of the fifteenth aspect or the possible implementations of the fifteenth aspect, or causes the terminal device to perform the method in any one of the sixteenth aspect or the possible implementations of the sixteenth aspect. It should be understood that the terminal device may be a chip, a processor, or the like, which is not limited in this application.

In the foregoing embodiments of this application, in each polarization direction, a difference between quantities of $-A-Aj$, $-A+Aj$, $A-Aj$, and $A+Aj$ that represent the training symbols and the pilot symbols is not greater than 1, thereby effectively ensuring equalization between symbols. In addition, in each polarization direction, a sum of real parts of the complex numbers corresponding to the training symbols and the pilot symbols in one sub-frame is 0, and a sum of imaginary parts thereof is also 0, so that direct current balance can be achieved, which facilitates quality of a signal restored at the receiver end.

DESCRIPTION OF EMBODIMENTS

Figure 1:
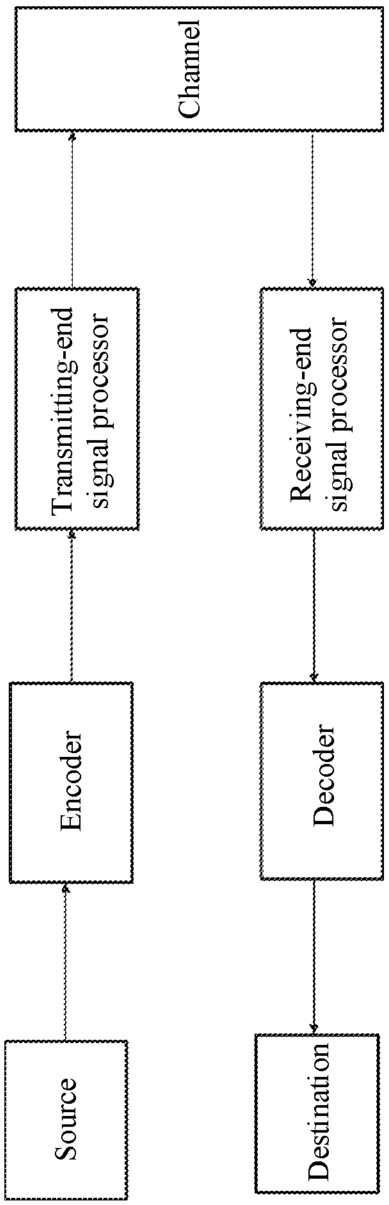
FIG. 1 is a block diagram of a structure of a communication system.

Before embodiments of this application are described in detail, application scenarios of embodiments of this application are described first. FIG. 1 is a block diagram of a structure of a communication system. At a transmitting end, a source provides a data stream to be transmitted. An encoder receives and encodes the data stream. Codeword information that is obtained through encoding and that combines parity bits and information bits is sent to a transmitting-end signal processor for framing, and is transmitted through a channel to a receiver end. After receiving a distorted signal caused by noise or other impairments in the channel, the receiver end sends the signal to a receiver-end signal processor for dispersion compensation, alignment, phase recovery, and other operations. Then, a decoder decodes the signal to restore the original data and sends the data to a destination. The encoding method provided in this application is applied to the transmitting-end signal processor shown in FIG. 1, and is a very important part in the communication system.

Figure 2:
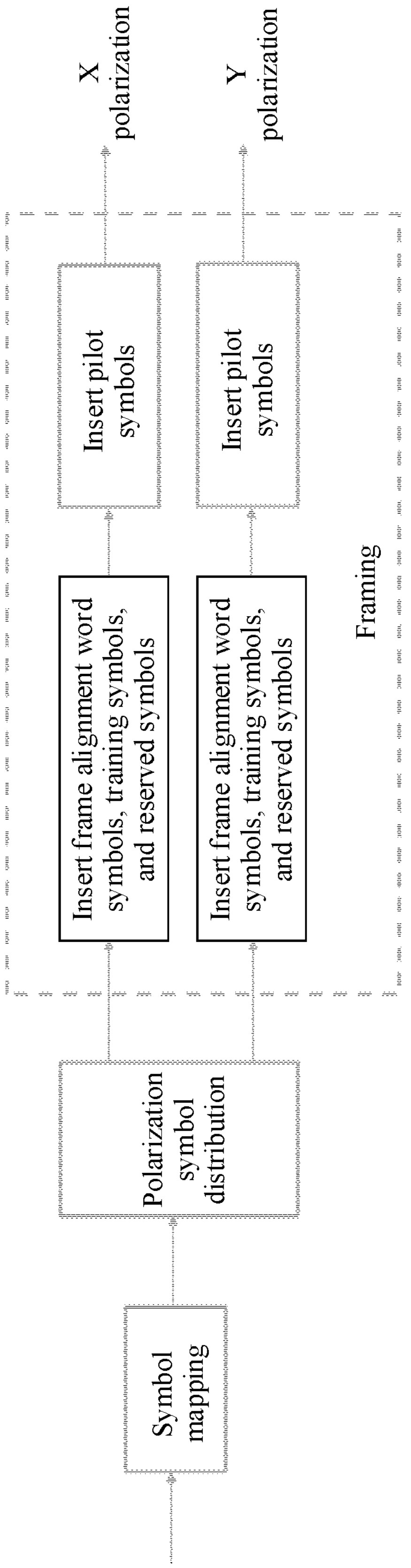
FIG. 2 is a schematic diagram of a framing process.
Figure 3:
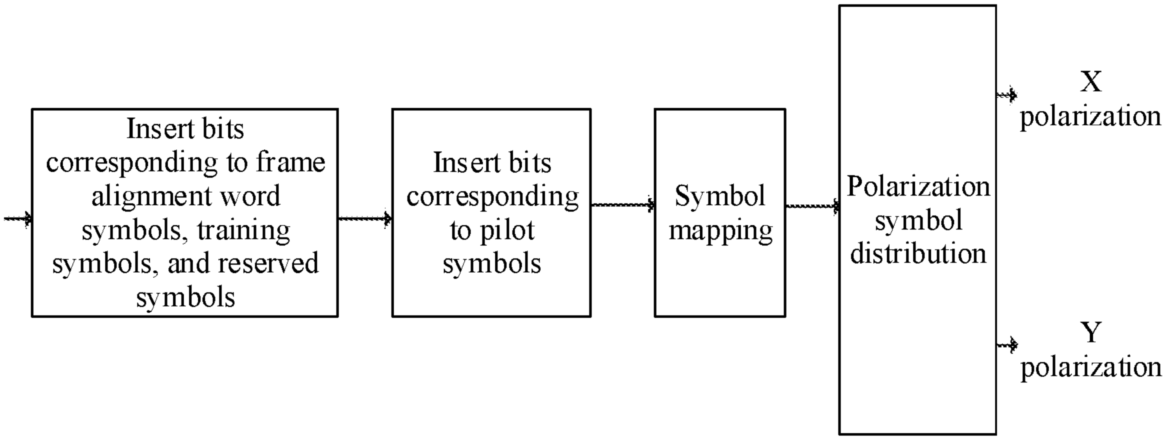
FIG. 3 is a schematic diagram of another framing process.

In the transmitting-end signal processor, a framing process may be shown in FIG. 2 or FIG. 3. In a framing method, as shown in FIG. 2, symbol mapping is performed on a received data sequence, including, but not limited to, quadrature phase shift keying (QPSK) and quadrature amplitude modulation (QAM), and then polarization symbol distribution is performed to obtain dual-polarization (DP) symbols, for example, DP-QPSK, DP-8QAM, DP-16QAM, DP-32QAM, and DP-64QAM. The following framing is performed on a specific quantity of dual-polarization symbols: inserting frame alignment word symbols, training symbols, reserved symbols, and pilot symbols in each of X and Y polarization directions to obtain a dual-polarization symbol sequence to be transmitted, which is referred to as a super-frame. It should be noted that, after the symbol mapping, symbols may be further interleaved, and the foregoing framing is performed on the interleaved symbols. In this application, one dual-polarization symbol may be represented by two symbols, one of which is in an X polarization direction, and the other in a Y polarization direction. Each symbol may be represented by a complex number. For example, a symbol modulated using 16QAM may be represented by any one of the following 16 complex numbers: ±1±1j, ±1±3j, ±3±1j, and ±3±3j. It should be understood that, in some cases, the real part and the imaginary part may be normalized, but the essence does not change. Further, a sequence having N dual-polarization symbols may be completely represented by two complex sequences having a length of N, where one complex sequence represents symbols on the X polarization, and the other complex sequence represents symbols on the Y polarization. Each complex sequence with a length of N is represented by a real part sequence with a length of N and an imaginary part sequence with a length of N, where N is an integer greater than 1.

Generally, the received data sequence is an information and parity sequence obtained through forward error correction (FEC). The framing operations shown in FIG. 2 are performed on the symbols. As shown in FIG. 3, alternatively, for a received data sequence, according to a used symbol mapping rule, bits corresponding to frame alignment word symbols, training symbols, reserved symbols, and pilot symbols are inserted before symbol mapping, and then the symbol mapping and polarization symbol distribution are performed to obtain the same super-frame as that obtained in the operation in FIG. 2. In this case, before the symbol mapping, interleaving may be further performed on the bit sequence into which the bits corresponding to the symbols are inserted, and then the symbol mapping and polarization symbol distribution are performed to obtain the same super-frame as that obtained in the operation in FIG. 2. It should be understood that another framing method is not excluded, and details are not described in this application.

Figure 4:
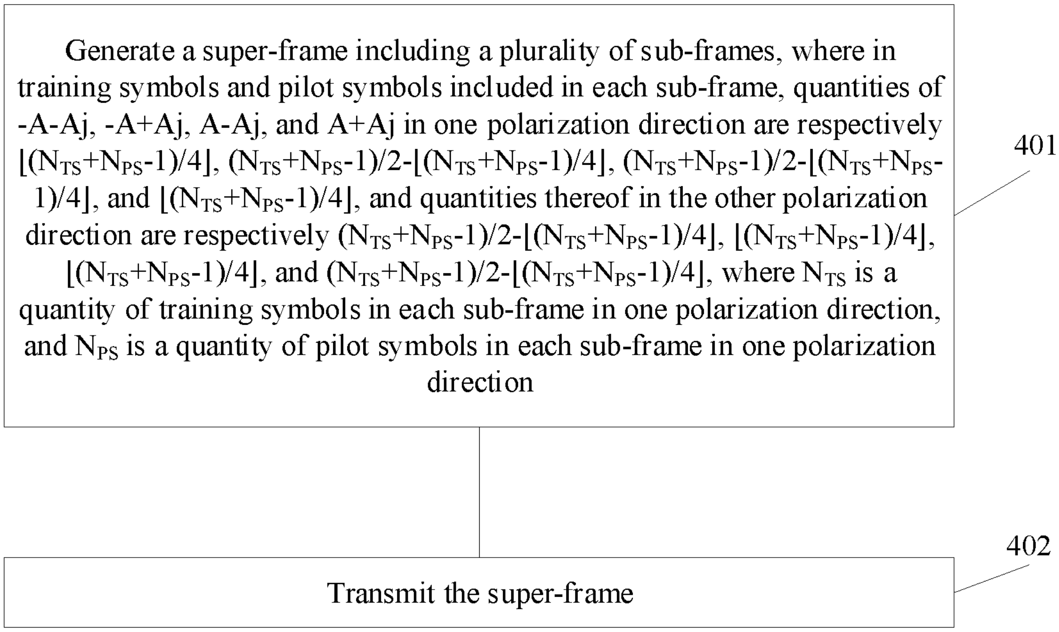
FIG. 4 is a flowchart of a transmission method for optical communication according to this application.

An embodiment of this application provides a transmission method for optical communication. As shown in FIG. 4, the transmission method includes the following steps.

401: Generate a super-frame including a plurality of sub-frames, where one sub-frame includes training symbols and pilot symbols, and each of the training symbols and the pilot symbols is one of −A−Aj, −A+Aj, A−Aj, and A+Aj; in the training symbols and the pilot symbols included in each sub-frame, quantities of −A−Aj, −A+Aj, A−Aj, and A+Aj in one polarization direction are respectively $\lfloor(N_{TS}+N_{PS}-1)/4\rfloor$, $(N_{TS}+N_{PS}-1)/2-\lfloor(N_{TS}+N_{PS}-1)/4\rfloor$, $(N_{TS}+N_{PS}-1)/2-\lfloor(N_{TS}+N_{PS}-1)/4\rfloor$, and $\lfloor(N_{TS}+N_{PS}-1)/4\rfloor$, and quantities thereof in the other polarization direction are respectively $(N_{TS}+N_{PS}-1)/2-\lfloor(N_{TS}+N_{PS}-1)/4\rfloor$, $\lfloor(N_{TS}+N_{PS}-1)/4\rfloor$, $\lfloor(N_{TS}+N_{PS}-1)/4\rfloor$, and $(N_{TS}+N_{PS}-1)/2-\lfloor(N_{TS}+N_{PS}-1)/4\rfloor$, where $N_{TS}$ is a quantity of training symbols in each sub-frame in one polarization direction, $N_{PS}$ is a quantity of pilot symbols in each sub-frame in one polarization direction, $N_{TS}+N_{PS}$ is an odd number, and $\lfloor a\rfloor$ represents rounding down a positive real number a.

402: Transmit the super-frame.

In this embodiment of this application, a value of A is determined by a modulation format used when a symbol is generated. In some actual application scenarios, −A−Aj, −A+Aj, A−Aj, and A+Aj are symbols in a constellation diagram of a used modulation format. For example, if QPSK is used, there are only four symbols, in which case A=±1, and each training symbol may be represented by one of −1−1j, −1+1j, 1−1j, and 1+1j. In one sub-frame, training symbols represented by the four complex numbers all exist, and the same is true for pilot symbols. If 16QAM is used, there are 16 symbols, in which case A=±1 or ±3. Generally, both training symbols and pilot symbols are the outermost four symbols in the constellation diagram, as indicated by the hollow symbols in FIG. 5A. In this case, when A=3 or −3, each training symbol may be represented by one of −3−3j, −3+3j, 3−3j, and 3+3j. In one sub-frame, training symbols represented by the four complex numbers also all exist, and the same is true for pilot symbols. Similarly, if 64QAM is used, A=±1, ±3, ±5, or ±7. Generally, in complex numbers representing a training symbol and a pilot symbol, A=±5 or ±7. Assuming that A=5 or −5, each training symbol may be represented by one of −5−5j, −5+5j, 5−5j, and 5+5j. In one sub-frame, training symbols represented by the four complex numbers all exist. Similarly, the same is true for pilot symbols. Alternatively, a higher-order modulation format may be used, and details are not described in this application. In an actual transmission process, this can result in a relatively low probability of symbol errors, facilitating channel estimation.

It should be noted that, alternatively, symbols in a constellation diagram may be compressed, and the value of A is also compressed accordingly. Taking 16QAM as an example, power normalization is performed on the 16 symbols in the 16QAM constellation diagram, in which case the value is changed to $$\left\{\pm\frac{1}{\sqrt{10}}\pm\frac{1}{\sqrt{10}}j,\pm\frac{1}{\sqrt{10}}\pm\frac{3}{\sqrt{10}}j,\pm\frac{3}{\sqrt{10}}\pm\frac{1}{\sqrt{10}}j,\pm\frac{3}{\sqrt{10}}\pm\frac{3}{\sqrt{10}}j\right\},$$

and the value of A is $$\frac{1}{\sqrt{10}}\text{ or }\frac{3}{\sqrt{10}}.$$

Alternatively, another manner of normalization may be used, which is not limited in this application.

It should be understood that, when the pilot symbols and the training symbols, −A−Aj, −A+Aj, A−Aj, and A+Aj, are the outermost four symbols in the constellation diagram, the training symbols and the pilot symbols have a relatively high sensitivity, but have a relatively large peak-to-average power ratio; and when the values of the pilot symbols and the training symbols, −A−Aj, −A+Aj, A−Aj, and A+Aj, are the innermost four symbols in the constellation diagram, the training symbols and the pilot symbols have relatively small noise, but have a relatively low sensitivity.

It should be noted that, in some actual application scenarios, the pilot symbols and the training symbols, −A−Aj, −A+Aj, A−Aj, and A+Aj, may not be symbols in the constellation diagram of the used modulation format, and may be four symbols in a middle area between the outermost four symbols and the innermost four symbols in the constellation diagram. In this case, the training symbols and the pilot symbols have fair noise and sensitivity, but have a relatively low peak-to-average power ratio. Taking 16QAM as an example, values of the 16 symbols in the 16QAM constellation diagram are {±1±1j, ±1±3j, ±3±1j, ±3±3j}, and a value of the real number A meets 1≤A≤3. More specifically, as shown in FIG. 5B, the outermost four symbols in the constellation diagram are 3+3j, 3−3j, −3+3j, and −3−3j, and the innermost four symbols in the constellation diagram are 1+1j, 1−1j, −1+1j, and −1−1j. The values of the pilot symbols and the training symbols, −A−Aj, −A+Aj, A−Aj, and A+Aj, may be four symbols in the middle area between the outermost four symbols and the innermost four symbols in the 16QAM constellation diagram. A specific value of the real number A may be selected according to an actual application scenario, so that the peak-to-average power ratio, noise, and sensitivity of the training symbols and the pilot symbols have a good compromise. For example, the real number $A=\sqrt{5}$, and the values of the pilot symbols and the training symbols are $\{-\sqrt{5}-\sqrt{5}j, -\sqrt{5}+\sqrt{5}j, \sqrt{5}-\sqrt{5}j, \sqrt{5}+\sqrt{5}j\}$. In addition, when the 16 symbols in the 16QAM constellation diagram are subjected to power normalization and have values of $$\left\{\pm\frac{1}{\sqrt{10}}\pm\frac{1}{\sqrt{10}}j,\ \pm\frac{1}{\sqrt{10}}\pm\frac{3}{\sqrt{10}}j,\ \pm\frac{3}{\sqrt{10}}\pm\frac{1}{\sqrt{10}}j,\ \pm\frac{3}{\sqrt{10}}\pm\frac{3}{\sqrt{10}}j\right\},$$

the value of the real number A meets $$\frac{1}{\sqrt{10}} \le A \le \frac{3}{\sqrt{10}}.$$

For example, the real number $$A = \frac{\sqrt{2}}{2},$$

and the values of the pilot symbols and the training symbols are $$\left\{-\frac{\sqrt{2}}{2}-\frac{\sqrt{2}}{2}j,\ -\frac{\sqrt{2}}{2}+\frac{\sqrt{2}}{2}j,\ \frac{\sqrt{2}}{2}-\frac{\sqrt{2}}{2}j,\ \frac{\sqrt{2}}{2}+\frac{\sqrt{2}}{2}j\right\}.$$

In addition, the two polarization directions are orthogonal to each other. In other words, when one polarization direction is the X polarization, the other polarization direction is the Y polarization; and when one polarization direction is the Y polarization, the other polarization direction is the X polarization. In this embodiment of this application, in one polarization direction, a sum of quantities of training symbols and pilot symbols included in one sub-frame is $N_{TS}+N_{PS}-1$, which is not less than 5. Because one symbol is both a training symbol and a pilot symbol, the sum of quantities is not $N_{TS}+N_{PS}$, and is one less than the sum of quantities of the two types of symbols.

In one sub-frame, a sequence consisting of training symbols in one polarization direction is different from a sequence consisting of training symbols in the other polarization direction, and a sequence consisting of pilot symbols in one polarization direction is different from a sequence consisting of pilot symbols in the other polarization direction. For example, if a sequence consisting of training symbols in one polarization direction is −A−Aj, −A−Aj, A+Aj, and A−Aj, a sequence consisting of training symbols in the other polarization direction cannot be the same according to the same sequence, and may be −A−Aj, −A−Aj, A+Aj, and A+Aj, that is, one of the symbols is different, so as to avoid the problem that a receiver end cannot distinguish the two polarization directions in actual transmission.

In the solution of this embodiment of this application, in each polarization direction, one sub-frame includes $N_{TS}+N_{PS}-1$ training symbols and pilot symbols in total, that is, a total quantity of −A−Aj, −A+Aj, A−Aj, and A+Aj that represent the training symbols and the pilot symbols is $N_{TS}+N_{PS}-1$, and a difference between quantities of the four symbols is not greater than 1. In addition, in one sub-frame, quantities of the four complex numbers (−A−Aj, −A+Aj, A−Aj, and A+Aj) that represent the training symbols and the pilot symbols are the same in the two polarization directions, and are both $(N_{TS}+N_{PS}-1)/2$, which effectively ensures that symbol quantity balance. In addition, in each polarization direction, a sum of real parts of the complex numbers corresponding to the training symbols and the pilot symbols in one sub-frame is 0, and a sum of imaginary parts thereof is also 0, so that direct current balance can be achieved, which facilitates quality of a signal restored at the receiver end.

Figure 6:
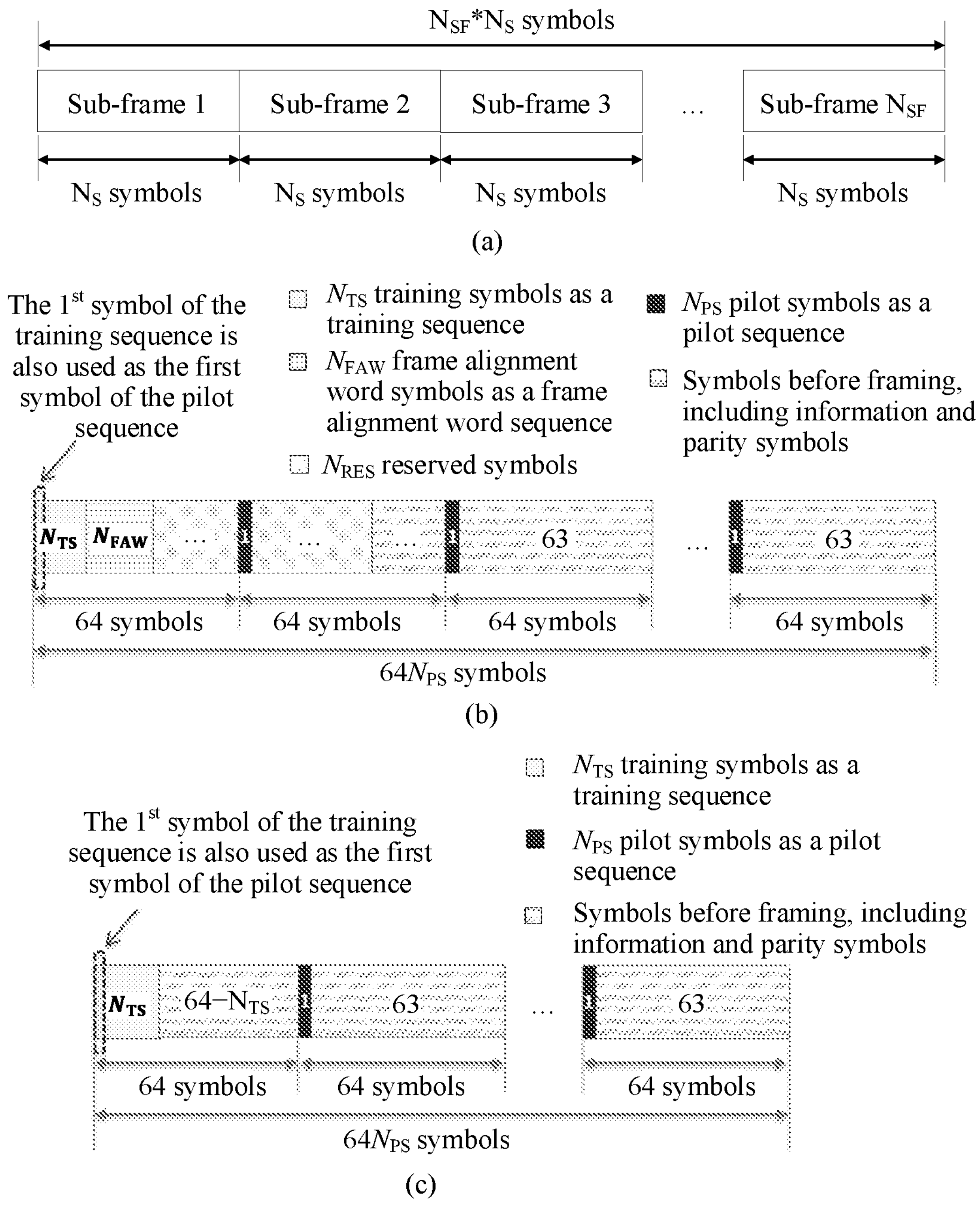
FIG. 6 shows a diagram of a structure of a super-frame, a diagram of a structure of a first-type sub-frame in the super-frame, and a diagram of a structure of a second-type sub-frame in the super-frame according to this application.

A super-frame (superframe) in this application, which may also be referred to as a multi-frame (multiframe), includes a plurality of sub-frames, and has a structure shown in (a) in FIG. 6. Each sub-frame includes a same quantity of symbols ($N_S$ symbols). There are mainly two types of sub-frames. One type of sub-frame includes frame alignment word symbols, and is usually the 1st sub-frame in the super-frame, but the possibility is not ruled out that the sub-frame is in another position in the super-frame. The other sub-frames are of a second type. A structure of a first-type sub-frame is shown in (b) in FIG. 6. The first $N_{TS}$ symbols in the sub-frame are training symbols, which may be used for link training and/or sub-frame alignment. Generally, the 1st symbol of the sub-frame is both a training symbol and a pilot symbol. Certainly, any one of the first $N_{TS}$ symbols may be both a training symbol and a pilot symbol, which is not limited in this application. In addition, in the first-type sub-frame, a symbol at a fixed position in every 64 symbols or 48 symbols is a pilot symbol, which is used for carrier phase recovery. In (b) in FIG. 6, for example, the 1st symbol in every 64 symbols is a pilot symbol, providing a diagram of a frame structure of the first-type sub-frame. The pilot signal is followed by a plurality of frame alignment word symbols, which are used for alignment between super-frames. The frame alignment word symbols may be used together with the training symbols for alignment between super-frames, or may be used together with the pilot symbols to implement the same function. It should be understood that the frame alignment word symbols are consecutively arranged, and may be adjacent to the training signals, which case is shown in (b) in FIG. 6. Alternatively, there may be a gap of one or more symbols between the frame alignment word signals and the training signals. In addition, after the plurality of frame alignment word symbols, there are usually a plurality of reserved symbols, which may be reserved for other purposes in the future. Alternatively, the reserved symbols may be in one of the plurality of second-type sub-frames, which is not limited in this application. The remaining symbols are symbols before framing that include information and parity bits, where the pilot symbol does not overlap the reserved symbol or the symbol before framing. For example, there is no symbol that is both a pilot symbol and a symbol before framing.

A frame structure of the second-type sub-frame is shown in (c) in FIG. 6. The first $N_{TS}$ symbols in the sub-frame are also training symbols. Generally, the 1st symbol of the sub-frame is both a training symbol and a pilot symbol. Certainly, any one of the first $N_{TS}$ symbols may be both a training symbol and a pilot symbol, which is not limited in this application. Similar to the first-type sub-frame, a symbol at a fixed position in every 64 symbols or 48 symbols is also a pilot symbol, which is used for carrier phase recovery. In (c) in FIG. 6, for example, the 1st symbol in every 64 symbols is a pilot symbol, providing a diagram of a frame structure of the second-type sub-frame. Except the training symbols and the pilot symbols, the other symbols are generally symbols before framing including information and parity bits, where the pilot symbol does not overlap with the symbol before framing.

Further, this application further provides a specific possible quantity of symbols for several different cases. Examples of the several cases are as follows:

(1) A quantity $N_{CW}$ of symbols before framing is 175616. For example, a CFEC encoding scheme in which a staircase code and a Hamming code are concatenated is used, or another encoding scheme may be used. The $1^{st}$ symbol in every 64 symbols is a pilot symbol. In this case, one item in Table 1 indicates the following parameters: a quantity $N_{SF}$ of sub-frames, a quantity $N_{TS}$ of training symbols and a quantity $N_{PS}$ of pilot symbols in each sub-frame, a quantity $N_S$ of symbols in each sub-frame, a quantity $N_F$ of Symbols in a super-frame, a super-frame overhead OH, a sum of a quantity $N_{FAW}$ of frame alignment word symbols and a quantity $N_{RES}$ of reserved symbols, and the like, where $N_{FAW}$ is an even number, the corresponding $N_{RES}>0$, and $OH=(N_F-N_{CW})/N_{CW}$.

Except the OH, the other parameters are all symbol quantities, which may be understood as a quantity of dual-polarization symbols, or may be understood as a quantity of symbols in one polarization direction. In addition, quantities of different symbols in two polarization directions are the same. For example, there are 10 training symbols in one polarization direction, and there are also 10 training symbols in the other polarization direction. On the whole, there are 10 dual-polarization training symbols. Subsequent tables may all be understood in this way, which is not repeated in this application.

TABLE 1

| Index | $N_{SF}$ | $N_{PS}$ | $N_S$ | $N_F$ | OH | $N_{TS}$ | $N_{FAW}$ + $N_{RES}$ |
|---|---|---|---|---|---|---|---|
| 1 | 88 | 32 | 2048 | 180224 | 2.62% | 19 | 208 |
| 2 | 85 | 33 | 2112 | 179520 | 2.22% | 12 | 164 |
| 3 | 80 | 35 | 2240 | 179200 | 2.04% | 10 | 64 |
| 4 | 78 | 36 | 2304 | 179712 | 2.33% | 15 | 196 |
| 5 | 74 | 38 | 2432 | 179968 | 2.48% | 19 | 208 |
| 6 | 72 | 39 | 2496 | 179712 | 2.33% | 16 | 208 |
| 7 | 72 | 39 | 2496 | 179712 | 2.33% | 18 | 64 |
| 8 | 70 | 40 | 2560 | 179200 | 2.04% | 11 | 84 |
| 9 | 70 | 40 | 2560 | 179200 | 2.04% | 9 | 224 |
| 10 | 65 | 43 | 2752 | 178880 | 1.86% | 6 | 144 |
| 11 | 61 | 46 | 2944 | 179584 | 2.26% | 19 | 64 |
| 12 | 61 | 46 | 2944 | 179584 | 2.26% | 17 | 186 |
| 13 | 57 | 49 | 3136 | 178752 | 1.79% | 6 | 58 |
| 14 | 56 | 50 | 3200 | 179200 | 2.04% | 13 | 112 |
| 15 | 56 | 50 | 3200 | 179200 | 2.04% | 11 | 224 |
| 16 | 55 | 51 | 3264 | 179520 | 2.22% | 18 | 164 |
| 17 | 50 | 56 | 3584 | 179200 | 2.04% | 15 | 84 |
| 18 | 50 | 56 | 3584 | 179200 | 2.04% | 13 | 184 |
| 19 | 49 | 57 | 3648 | 178752 | 1.79% | 6 | 98 |
| 20 | 43 | 65 | 4160 | 178880 | 1.86% | 10 | 82 |
| 21 | 40 | 70 | 4480 | 179200 | 2.04% | 19 | 64 |
| 22 | 40 | 70 | 4480 | 179200 | 2.04% | 17 | 144 |
| 23 | 40 | 70 | 4480 | 179200 | 2.04% | 15 | 224 |
| 24 | 35 | 80 | 5120 | 179200 | 2.04% | 19 | 154 |
| 25 | 35 | 80 | 5120 | 179200 | 2.04% | 17 | 224 |

(2) A quantity $N_{CW}$ of symbols before framing is 172032. For example, an open FEC (OFEC) encoding scheme is used, or another encoding scheme may be used. The $1^{st}$ symbol in every 64 symbols is a pilot symbol. In this case, one item in Table 2 indicates the following parameters: a quantity $N_{SF}$ of sub-frames, a quantity $N_{TS}$ of training symbols and a quantity $N_{PS}$ of pilot symbols in each sub-frame, a quantity $N_S$ of symbols in each sub-frame, a quantity $N_F$ of symbols in a super-frame, a super-frame overhead OH, a sum of a quantity $N_{FAW}$ of frame alignment word symbols and a quantity $N_{RES}$ of reserved symbols, and the like, where $N_{FAW}$ is an even number, the corresponding $N_{RES}>0$, and $OH=(N_F-N_{CW})/N_{CW}$.

TABLE 2

| Index | $N_{SF}$ | $N_{PS}$ | $N_S$ | $N_F$ | OH | $N_{TS}$ | $N_{FAW}$ + $N_{RES}$ |
|---|---|---|---|---|---|---|---|
| 1 | 83 | 33 | 2112 | 175296 | 1.90% | 6 | 110 |
| 2 | 74 | 37 | 2368 | 175232 | 1.86% | 6 | 92 |
| 3 | 67 | 41 | 2624 | 175808 | 2.19% | 14 | 158 |
| 4 | 61 | 45 | 2880 | 175680 | 2.12% | 14 | 110 |
| 5 | 56 | 49 | 3136 | 175616 | 2.08% | 14 | 112 |
| 6 | 56 | 49 | 3136 | 175616 | 2.08% | 12 | 224 |
| 7 | 49 | 56 | 3584 | 175616 | 2.08% | 17 | 56 |
| 8 | 49 | 56 | 3584 | 175616 | 2.08% | 15 | 154 |
| 9 | 48 | 57 | 3648 | 175104 | 1.79% | 6 | 96 |
| 10 | 45 | 61 | 3904 | 175680 | 2.12% | 18 | 138 |
| 11 | 38 | 72 | 4608 | 175104 | 1.79% | 7 | 108 |
| 12 | 37 | 74 | 4736 | 175232 | 1.86% | 11 | 92 |
| 13 | 37 | 74 | 4736 | 175232 | 1.86% | 9 | 166 |
| 14 | 36 | 76 | 4864 | 175104 | 1.79% | 9 | 48 |
| 15 | 33 | 83 | 5312 | 175296 | 1.90% | 14 | 96 |
| 16 | 33 | 83 | 5312 | 175296 | 1.90% | 12 | 162 |
| 17 | 24 | 114 | 7296 | 175104 | 1.79% | 13 | 48 |
| 18 | 24 | 114 | 7296 | 175104 | 1.79% | 11 | 96 |
| 19 | 24 | 114 | 7296 | 175104 | 1.79% | 9 | 144 |
| 20 | 24 | 114 | 7296 | 175104 | 1.79% | 7 | 192 |
| 21 | 23 | 119 | 7616 | 175168 | 1.82% | 16 | 54 |
| 22 | 23 | 119 | 7616 | 175168 | 1.82% | 14 | 100 |
| 23 | 23 | 119 | 7616 | 175168 | 1.82% | 12 | 146 |
| 24 | 23 | 119 | 7616 | 175168 | 1.82% | 10 | 192 |

(3) A quantity $N_{CW}$ of symbols before framing is 175616. For example, a CFEC encoding scheme is used. The $1^{st}$ symbol in every 48 symbols is a pilot symbol. In this case, one item in Table 3 indicates the following parameters: a quantity $N_{SF}$ of sub-frames, a quantity $N_{TS}$ of training symbols and a quantity $N_{PS}$ of pilot symbols in each sub-frame, a quantity $N_S$ of symbols in each sub-frame, a quantity $N_F$ of symbols in a super-frame, a super-frame overhead OH, a sum of a quantity $N_{FAW}$ of frame alignment word symbols and a quantity $N_{RES}$ of reserved symbols, and the like, where $N_{FAW}$ is an even number, the corresponding $N_{RES}>0$, and $OH=(N_F-N_{CW})/N_{CW}$.

TABLE 3

| Index | $N_{SF}$ | $N_{PS}$ | $N_S$ | $N_F$ | OH | $N_{TS}$ | $N_{FAW}$ + $N_{RES}$ |
|---|---|---|---|---|---|---|---|
| 1 | 121 | 31 | 1488 | 180048 | 2.52% | 6 | 76 |
| 2 | 114 | 33 | 1584 | 180576 | 2.82% | 10 | 172 |
| 3 | 99 | 38 | 1824 | 180576 | 2.82% | 11 | 208 |
| 4 | 94 | 40 | 1920 | 180480 | 2.77% | 11 | 164 |
| 5 | 80 | 47 | 2256 | 180480 | 2.77% | 14 | 64 |
| 6 | 80 | 47 | 2256 | 180480 | 2.77% | 12 | 224 |
| 7 | 75 | 50 | 2400 | 180000 | 2.50% | 7 | 184 |
| 8 | 75 | 50 | 2400 | 180000 | 2.50% | 9 | 34 |
| 9 | 71 | 53 | 2544 | 180624 | 2.85% | 18 | 38 |
| 10 | 71 | 53 | 2544 | 180624 | 2.85% | 16 | 180 |
| 11 | 67 | 56 | 2688 | 180096 | 2.55% | 9 | 192 |
| 12 | 67 | 56 | 2688 | 180096 | 2.55% | 11 | 58 |
| 13 | 66 | 57 | 2736 | 180576 | 2.82% | 16 | 208 |
| 14 | 66 | 57 | 2736 | 180576 | 2.82% | 18 | 76 |
| 15 | 57 | 66 | 3168 | 180576 | 2.82% | 19 | 172 |
| 16 | 56 | 67 | 3216 | 180096 | 2.55% | 10 | 224 |
| 17 | 56 | 67 | 3216 | 180096 | 2.55% | 12 | 112 |
| 18 | 52 | 72 | 3456 | 179712 | 2.33% | 7 | 40 |
| 19 | 50 | 75 | 3600 | 180000 | 2.50% | 12 | 84 |
| 20 | 50 | 75 | 3600 | 180000 | 2.50% | 10 | 184 |
| 21 | 48 | 78 | 3744 | 179712 | 2.33% | 7 | 64 |
| 22 | 39 | 96 | 4608 | 179712 | 2.33% | 9 | 40 |
| 23 | 39 | 96 | 4608 | 179712 | 2.33% | 7 | 118 |
| 24 | 36 | 104 | 4992 | 179712 | 2.33% | 9 | 64 |
| 25 | 36 | 104 | 4992 | 179712 | 2.33% | 7 | 136 |
| 26 | 35 | 107 | 5136 | 179760 | 2.36% | 10 | 84 |
| 27 | 35 | 107 | 5136 | 179760 | 2.36% | 8 | 154 |
| 28 | 35 | 107 | 5136 | 179760 | 2.36% | 6 | 224 |
| 29 | 32 | 117 | 5616 | 179712 | 2.33% | 10 | 64 |
| 30 | 32 | 117 | 5616 | 179712 | 2.33% | 8 | 128 |

TABLE 3-continued

| Index | $N_{SF}$ | $N_{PS}$ | $N_S$ | $N_F$ | OH | $N_{TS}$ | $N_{FAW}+N_{RES}$ |
|---|---|---|---|---|---|---|---|
| 31 | 32 | 117 | 5616 | 179712 | 2.33% | 6 | 192 |
| 32 | 31 | 121 | 5808 | 180048 | 2.52% | 20 | 92 |
| 33 | 31 | 121 | 5808 | 180048 | 2.52% | 18 | 154 |
| 34 | 31 | 121 | 5808 | 180048 | 2.52% | 16 | 216 |
| 35 | 30 | 125 | 6000 | 180000 | 2.50% | 20 | 64 |
| 36 | 30 | 125 | 6000 | 180000 | 2.50% | 18 | 124 |
| 37 | 30 | 125 | 6000 | 180000 | 2.50% | 16 | 184 |

(4) A quantity $N_{CW}$ of symbols before framing is 172032. For example, an OFEC encoding scheme is used. The 1st symbol in every 48 symbols is a pilot symbol. In this case, one item in Table 4 indicates the following parameters: a quantity $N_{SF}$ of sub-frames, a quantity $N_{TS}$ of training symbols and a quantity $N_{PS}$ of pilot symbols in each sub-frame, a quantity $N_S$ of symbols in each sub-frame, a quantity $N_F$ of symbols in a super-frame, a super-frame overhead OH, a sum of a quantity $N_{FAW}$ of frame alignment word symbols and a quantity $N_{RES}$ of reserved symbols, and the like, where $N_{FAW}$ is an even number, the corresponding $N_{RES}>0$, and $OH=(N_F-N_{CW})/N_{CW}$.

TABLE 4

| Index | $N_{SF}$ | $N_{PS}$ | $N_S$ | $N_F$ | OH | $N_{TS}$ | $N_{FAW}+N_{RES}$ |
|---|---|---|---|---|---|---|---|
| 1 | 119 | 31 | 1488 | 177072 | 2.93% | 12 | 42 |
| 2 | 105 | 35 | 1680 | 176400 | 2.54% | 6 | 168 |
| 3 | 97 | 38 | 1824 | 176928 | 2.85% | 13 | 46 |
| 4 | 92 | 40 | 1920 | 176640 | 2.68% | 9 | 192 |
| 5 | 90 | 41 | 1968 | 177120 | 2.96% | 16 | 48 |
| 6 | 82 | 45 | 2160 | 177120 | 2.96% | 16 | 168 |
| 7 | 80 | 46 | 2208 | 176640 | 2.68% | 11 | 128 |
| 8 | 75 | 49 | 2352 | 176400 | 2.54% | 8 | 168 |
| 9 | 72 | 51 | 2448 | 176256 | 2.46% | 8 | 48 |
| 10 | 72 | 51 | 2448 | 176256 | 2.46% | 6 | 192 |
| 11 | 68 | 54 | 2592 | 176256 | 2.46% | 7 | 144 |
| 12 | 67 | 55 | 2640 | 176880 | 2.82% | 16 | 158 |
| 13 | 55 | 67 | 3216 | 176880 | 2.82% | 20 | 118 |
| 14 | 54 | 68 | 3264 | 176256 | 2.46% | 9 | 120 |
| 15 | 51 | 72 | 3456 | 176256 | 2.46% | 11 | 42 |
| 16 | 51 | 72 | 3456 | 176256 | 2.46% | 9 | 144 |
| 17 | 49 | 75 | 3600 | 176400 | 2.54% | 14 | 56 |
| 18 | 49 | 75 | 3600 | 176400 | 2.54% | 12 | 154 |
| 19 | 46 | 80 | 3840 | 176640 | 2.68% | 19 | 100 |
| 20 | 46 | 80 | 3840 | 176640 | 2.68% | 17 | 192 |
| 21 | 40 | 92 | 4416 | 176640 | 2.68% | 19 | 208 |
| 22 | 39 | 94 | 4512 | 175968 | 2.29% | 7 | 36 |
| 23 | 36 | 102 | 4896 | 176256 | 2.46% | 15 | 48 |
| 24 | 36 | 102 | 4896 | 176256 | 2.46% | 13 | 120 |
| 25 | 36 | 102 | 4896 | 176256 | 2.46% | 11 | 192 |
| 26 | 35 | 105 | 5040 | 176400 | 2.54% | 18 | 98 |
| 27 | 35 | 105 | 5040 | 176400 | 2.54% | 16 | 168 |
| 28 | 34 | 108 | 5184 | 176256 | 2.46% | 15 | 76 |
| 29 | 34 | 108 | 5184 | 176256 | 2.46% | 13 | 144 |
| 30 | 34 | 108 | 5184 | 176256 | 2.46% | 11 | 212 |

Optionally, training symbols are consecutively arranged in a sub-frame. In one polarization direction, in training symbols included in one sub-frame, a quantity of consecutive real-part elements "−A" or "A" is not greater than M0, and a quantity of consecutive imaginary part elements "−A" or "A" is not greater than M0. In addition, a quantity of consecutive same training symbols in one sub-frame does not exceed M1, where both M0 and M1 are positive integers, and $2 \le M1 \le M0 \le 5$. A training sequence obtained in this condition facilitates clock recovery, thereby helping improve quality of a signal restored at the receiver end.

Further, in one polarization direction, in training symbols included in one sub-frame, a quantity of consecutive real part elements "−A" or "A" is not greater than 5, and a quantity of consecutive imaginary part elements "−A" or "A" is not greater than 5. For example, there are six training symbols in one polarization direction. For the sequence −A−Aj, −A−Aj, −A−Aj, −A−Aj, −A−Aj, and A+Aj, the real part elements have five consecutive −A, which meets the requirement of this embodiment. However, if the sequence is −A−Aj, −A−Aj, −A−Aj, −A−Aj, −A−Aj, and −A+Aj, the real part elements have six consecutive −A, which does not meet the requirement of this embodiment. Further, in one polarization direction, a quantity of consecutive same training symbols in one sub-frame does not exceed 4. In this case, the sequence −A−Aj, −A−Aj, −A−Aj, −A−Aj, −A−Aj, and A+Aj that originally meet the requirement no longer meets the requirement of this embodiment because there are five consecutive −A−Aj.

Optionally, when $N_{TS}$ is an even number, that is, in each sub-frame, there are an even number of training symbols in one polarization direction, in the training symbols included in each sub-frame, quantities of −A−Aj, −A+Aj, A−Aj, and A+Aj in one polarization direction are respectively $\lfloor N_{TS}/4 \rfloor$, $N_{TS}/2-\lfloor N_{TS}/4 \rfloor$, $N_{TS}/2-\lfloor N_{TS}/4 \rfloor$, and $\lfloor N_{TS}/4 \rfloor$, and quantities thereof in the other polarization direction are respectively $N_{TS}/2-\lfloor N_{TS}/4 \rfloor$, $\lfloor N_{TS}/4 \rfloor$, $\lfloor N_{TS}/4 \rfloor$, and $N_{TS}/2-\lfloor N_{TS}/4 \rfloor$. Because $N_{TS}+N_{PS}$ is an odd number, and $N_{TS}$ is an even number, $N_{PS}$ is definitely an odd number, that is, in each sub-frame, there are an odd number of pilot symbols in one polarization direction. In this case, in the pilot symbols included in each sub-frame, except the pilot symbol that is also used as a training symbol, −A−Aj, −A+Aj, A−Aj, and A+Aj may also meet the following condition: Quantities thereof in one polarization direction are respectively $\lfloor (N_{PS}-1)/4 \rfloor$, $(N_{PS}-1)/2-\lfloor (N_{PS}-1)/4 \rfloor$, $(N_{PS}-1)/2-\lfloor (N_{PS}-1)/4 \rfloor$, and $\lfloor (N_{PS}-1)/4 \rfloor$, and quantities thereof in the other polarization direction are respectively $(N_{PS}-1)/2-\lfloor (N_{PS}-1)/4 \rfloor$, $\lfloor (N_{PS}-1)/4 \rfloor$, $\lfloor (N_{PS}-1)/4 \rfloor$, and $(N_{PS}-1)/2-\lfloor (N_{PS}-1)/4 \rfloor$.

When $N_{TS}$ is an odd number, that is, in each sub-frame, there are an odd number of training symbols in one polarization direction, in the training symbols included in each sub-frame, except the training symbol that is also used as a pilot symbol, quantities of −A−Aj, −A+Aj, A−Aj, and A+Aj in one polarization direction are respectively $\lfloor (N_{TS}-1)/4 \rfloor$, $(N_{TS}-1)/2-\lfloor (N_{TS}-1)/4 \rfloor$, $(N_{TS}-1)/2-\lfloor (N_{TS}-1)/4 \rfloor$, and $\lfloor (N_{TS}-1)/4 \rfloor$, and quantities thereof in the other polarization direction are respectively $(N_{TS}-1)/2-\lfloor (N_{TS}-1)/4 \rfloor$, $\lfloor (N_{TS}-1)/4 \rfloor$, $\lfloor (N_{TS}-1)/4 \rfloor$, and $(N_{TS}-1)/2-\lfloor (N_{TS}-1)/4 \rfloor$. Because $N_{TS}+N_{PS}$ is an odd number, and $N_{TS}$ is an odd number, $N_{PS}$ is definitely an even number, that is, in each sub-frame, there are an even number of pilot symbols in one polarization direction. In this case, in the pilot symbols included in each sub-frame, −A−Aj, −A+Aj, A−Aj, and A+Aj may also meet the following condition: Quantities thereof in one polarization direction are respectively $\lfloor N_{PS}/4 \rfloor$, $N_{PS}/2-\lfloor N_{PS}/4 \rfloor$, $N_{PS}/2-\lfloor N_{PS}/4 \rfloor$, and $\lfloor N_{PS}/4 \rfloor$, and quantities thereof in the other polarization direction are respectively $N_{PS}/2-\lfloor N_{PS}/4 \rfloor$, $\lfloor N_{PS}/4 \rfloor$, $\lfloor N_{PS}/4 \rfloor$, and $N_{PS}/2-\lfloor N_{PS}/4 \rfloor$.

In the solution of the foregoing embodiment, in each polarization direction, quantities of training symbols −A−Aj, −A+Aj, A−Aj, and A+Aj included in one sub-frame are close to each other. In addition, when $N_{TS}$ is an even number, in one sub-frame, quantities of four different symbols (in the form of complex numbers) representing the training symbols in the two polarization directions are the same, quantities of the four symbols are all $N_{TS}/2$, a sum of real parts of the complex numbers corresponding to the training symbols is 0, and a sum of imaginary parts thereof is also 0. When $N_{TS}$ is an odd number, in one sub-frame, except the training symbol that is also used as a pilot symbol, quantities of four different symbols (in the form of complex numbers) representing the training symbols in the two polarization directions are the same, quantities of the four symbols are all $(N_{TS}-1)/2$, a sum of real parts of the complex numbers corresponding to the $N_{TS}-1$ training symbols is 0, and a sum of imaginary parts thereof is also 0. This effectively ensures the balance of the quantity of symbols, and can achieve direct current balance, which facilitates quality of a signal restored at the receiver end. It should be understood that a pilot sequence consisting of the pilot symbols also has a similar effect.

Optionally, in each sub-frame, when a remainder of a quantity $N_{PS}$ of pilot symbols in one polarization direction divided by 4 is 0, in the pilot symbols included in each sub-frame, quantities of −A−Aj, −A+Aj, A−Aj, and A+Aj in one polarization direction are respectively $N_{PS}/4+1$, $N_{PS}/4-1$, $N_{PS}/4-1$, and $N_{PS}/4+1$, and quantities thereof in the other polarization direction are respectively $N_{PS}/4-1$, $N_{PS}/4+1$, $N_{PS}/4+1$, and $N_{PS}/4-1$; or quantities thereof in both polarization directions are $N_{PS}/4$. When a remainder of $N_{PS}$ divided by 4 is 2, in the pilot symbols included in each sub-frame, quantities of −A−Aj, −A+Aj, A−Aj, and A+Aj in one polarization direction are respectively $(N_{PS}-2)/4$, $(N_{PS}-2)/4+1$, $(N_{PS}-2)/4+1$, and $(N_{PS}-2)/4$, and quantities thereof in the other polarization direction are respectively $(N_{PS}-2)/4+1$, $(N_{PS}-2)/4$, $(N_{PS}-2)/4$, and $(N_{PS}-2)/4+1$. When a remainder of $N_{PS}$ divided by 4 is 1, in the pilot symbols included in each sub-frame, except the pilot symbol that is also used as a training symbol, quantities of −A−Aj, −A+Aj, A−Aj, and A+Aj in one polarization direction are respectively $(N_{PS}-1)/4+1$, $(N_{PS}-1)/4-1$, $(N_{PS}-1)/4-1$, and $(N_{PS}-1)/4+1$, and quantities thereof in the other polarization direction are respectively $(N_{PS}-1)/4-1$, $(N_{PS}-1)/4+1$, $(N_{PS}-1)/4+1$, and $(N_{PS}-1)/4-1$; or quantities thereof in both polarization directions are $(N_{PS}-1)/4$. When a remainder of $N_{PS}$ divided by 4 is 3, in the pilot symbols included in each sub-frame, except the pilot symbol that is also used as a training symbol, quantities of −A−Aj, −A+Aj, A−Aj, and A+Aj in one polarization direction are respectively $(N_{PS}-3)/4$, $(N_{PS}-3)/4+1$, $(N_{PS}-3)/4+1$, and $(N_{PS}-3)/4$, and quantities thereof in the other polarization direction are respectively $(N_{PS}-3)/4+1$, $(N_{PS}-3)/4$, $(N_{PS}-3)/4$, and $(N_{PS}-3)/4+1$.

In the foregoing embodiment, a difference between quantities of the pilot symbols −A−Aj, −A+Aj, A−Aj, and A+Aj included in one sub-frame is relatively small, thereby effectively ensuring balance between symbols. In addition, in each polarization direction, except the pilot symbol that is also used as a training symbol (if there are an odd number of pilot symbols), a sum of real parts of the complex numbers corresponding to the other pilot symbols is 0, and a sum of imaginary parts thereof is also 0, so that direct current balance can be achieved, which facilitates quality of a signal restored at the receiver end.

In a plurality of sub-frame structures included in the super-frame, the first-type sub-frame further includes frame alignment word symbols, as shown in (b) in FIG. 6. A plurality of frame alignment word symbols are consecutively arranged in the first-type sub-frame, and each frame alignment word symbol is one of −A−Aj, −A+Aj, A−Aj, and A+Aj, where a value of A corresponding to the frame alignment word symbol is also determined by a modulation format used, which is consistent with the method of determining a value of A corresponding to a training symbol and a pilot symbol described in the foregoing embodiment, and details are not described herein again. It should be understood that, in some application scenarios, each of the frame alignment word symbols is one of −A−Aj, −A+Aj, A−Aj, and A+Aj, and a value of A corresponding to the frame alignment word symbols may be a real number different from that corresponding to the training symbols and the pilot symbols described in the foregoing embodiment. For simplicity of description, the values of A, for example, are equal in this application.

Optionally, in one polarization direction, in the frame alignment word symbols included in the first-type sub-frame, a quantity of consecutive real part elements "−A" or "A" is not greater than M2, and a quantity of consecutive imaginary part elements "−A" or "A" is not greater than M2. In addition, a quantity of consecutive same frame alignment word symbols in the first-type sub-frame does not exceed M3, where both M2 and M3 are positive integers, and $2 \leq M3 \leq M2 \leq 5$. A frame alignment word sequence obtained in this condition facilitates clock recovery, thereby helping improve quality of a signal restored at the receiver end.

Further, in one polarization direction, in frame alignment word symbols included in the first-type sub-frame, a quantity of consecutive real part elements "−A" or "A" is not greater than 5, and a quantity of consecutive imaginary part elements "−A" or "A" is not greater than 5. Optionally, in one polarization direction, a quantity of consecutive same frame alignment word symbols in the first-type sub-frame does not exceed 4. A specific example has been described in the example of the training symbol in the foregoing embodiment, which is not repeated in this application.

In the first-type sub-frame, there are an even number of frame alignment word symbols in one polarization direction, and the following condition may be met: In the frame alignment word symbols included in the first-type sub-frame, quantities of −A−Aj, −A+Aj, A−Aj, and A+Aj in one polarization direction are respectively $\lfloor N_{FAW}/4 \rfloor$, $N_{FAW}/2-\lfloor N_{FAW}/4 \rfloor$, $N_{FAW}/2-\lfloor N_{FAW}/4 \rfloor$, and $\lfloor N_{FAW}/4 \rfloor$, and quantities thereof in the other polarization direction are respectively $N_{FAW}/2-\lfloor N_{FAW}/4 \rfloor$, $\lfloor N_{FAW}/4 \rfloor$, $\lfloor N_{FAW}/4 \rfloor$, and $N_{FAW}/2-\lfloor N_{FAW}/4 \rfloor$, where $N_{FAW}$ is a quantity of the frame alignment word symbols in the first-type sub-frame in one polarization direction. This condition ensures that the plurality of frame alignment word symbols meet direct current balance, and a difference between quantities of the four available symbols −A−Aj, −A+Aj, A−Aj, and A+Aj is not greater than 1, which facilitates quality of a signal restored at the receiver end.

For example, when $N_{FAW}=22$, quantities of symbols −A−Aj, −A+Aj, A−Aj, and A+Aj in the X polarization direction are respectively 5, 6, 6, and 5, and quantities of symbols −A−Aj, −A+Aj, A−Aj, and A+Aj in the Y polarization direction are respectively 6, 5, 5, and 6, where the two polarization directions are perpendicular to each other. When $N_{FAW}=24$, quantities of symbols −A−Aj, −A+Aj, A−Aj, and A+Aj in either polarization direction is 6, and inter-symbol balance and direct current balance can be achieved, which facilitates quality of a signal restored at the receiver end.

Next, this application provides some possible symbol sequences, including a frame alignment word sequence consisting of frame alignment word symbols in a first-type sub-frame, a training sequence consisting of training symbols in each sub-frame, and a pilot sequence consisting of pilot symbols in each sub-frame. Training sequences in different sub-frames are the same, and pilot sequences in different sub-frames are also the same.

First, there may be the following several possible frame alignment word sequences, which can ensure a relatively good cross-correlation between frame alignment word sequences in the two polarization directions, with the overhead being not too large.

(1) Assuming that $N_{FAW}$=20, the frame alignment word sequence may be any item in Table 5. It should be understood that one index corresponds to a group of frame alignment word sequences in two polarizations, and one item represents the sequences corresponding to one index. In addition, when a polarization 1 for any item in the table is the X polarization, a polarization 2 is the Y polarization; and when the polarization 1 is the Y polarization, the polarization 2 is the X polarization. The same representation manner applies to the subsequent training sequence and pilot sequence tables, and details are not described in this application again.

TABLE 5

| Index | Polarization | Frame alignment word sequence |
|---|---|---|
| 1 | Polarization 1 | A − Aj, A − Aj, A − Aj, −A + Aj, −A + Aj, A + Aj, A − Aj, A + Aj, −A − Aj, A + Aj, A + Aj, −A − Aj, −A + Aj, −A + Aj, A − Aj, −A + Aj, A + Aj, −A − Aj, −A − Aj, −A − Aj |
| | Polarization 2 | A − Aj, A − Aj, A − Aj, −A + Aj, −A + Aj, −A − Aj, A − Aj, −A − Aj, A + Aj, −A − Aj, −A − Aj, A + Aj, −A + Aj, −A + Aj, A − Aj, −A + Aj, −A − Aj, A + Aj, A + Aj, A + Aj |
| 2 | Polarization 1 | A + Aj, A + Aj, A + Aj, −A − Aj, −A − Aj, A − Aj, A + Aj, A − Aj, −A + Aj, A − Aj, A − Aj, −A + Aj, −A − Aj, −A − Aj, A + Aj, −A − Aj, A − Aj, −A + Aj, −A + Aj, −A + Aj |
| | Polarization 2 | −A − Aj, −A − Aj, −A − Aj, A + Aj, A + Aj, A − Aj, −A − Aj, A − Aj, −A + Aj, A − Aj, A − Aj, −A + Aj, A + Aj, A + Aj, −A − Aj, A + Aj, A − Aj, −A + Aj, −A + Aj, −A + Aj |
| 3 | Polarization 1 | A − Aj, A − Aj, A − Aj, −A + Aj, A + Aj, −A − Aj, A + Aj, A + Aj, A − Aj, −A + Aj, −A + Aj, A − Aj, −A + Aj, −A − Aj, −A + Aj, A + Aj, A + Aj, −A − Aj, −A − Aj, −A − Aj |
| | Polarization 2 | A − Aj, A − Aj, A − Aj, −A + Aj, −A − Aj, A + Aj, −A − Aj, −A − Aj, A − Aj, −A + Aj, −A + Aj, A − Aj, −A + Aj, A + Aj, −A + Aj, −A − Aj, −A − Aj, A + Aj, A + Aj, A + Aj |
| 4 | Polarization 1 | A + Aj, A + Aj, A + Aj, −A − Aj, A − Aj, −A + Aj, A − Aj, A − Aj, A + Aj, −A − Aj, −A − Aj, A + Aj, −A − Aj, −A + Aj, −A − Aj, A − Aj, A − Aj, −A + Aj, −A + Aj, −A + Aj |
| | Polarization 2 | −A − Aj, −A − Aj, −A − Aj, A + Aj, A − Aj, −A + Aj, A − Aj, A − Aj, −A − Aj, A + Aj, A + Aj, −A − Aj, A + Aj, −A + Aj, A + Aj, A − Aj, A − Aj, −A + Aj, −A + Aj, −A + Aj |
| 5 | Polarization 1 | −A + Aj, −A + Aj, −A + Aj, A − Aj, A − Aj, A + Aj, −A + Aj, A + Aj, −A − Aj, A + Aj, A + Aj, −A − Aj, A − Aj, A − Aj, −A + Aj, A − Aj, A + Aj, −A − Aj, −A − Aj, −A − Aj |
| | Polarization 2 | −A + Aj, −A + Aj, −A + Aj, A − Aj, A − Aj, −A − Aj, −A + Aj, −A − Aj, A + Aj, −A − Aj, −A − Aj, A + Aj, A − Aj, A − Aj, −A + Aj, A − Aj, −A − Aj, A + Aj, A + Aj, A + Aj |
| 6 | Polarization 1 | −A − Aj, −A − Aj, −A − Aj, A + Aj, A + Aj, A − Aj, −A − Aj, A − Aj, −A + Aj, A − Aj, A − Aj, −A + Aj, A + Aj, A + Aj, −A − Aj, A + Aj, A − Aj, −A + Aj, −A + Aj, −A + Aj |
| | Polarization 2 | A + Aj, A + Aj, A + Aj, −A − Aj, −A − Aj, A − Aj, A + Aj, A − Aj, −A + Aj, A − Aj, A − Aj, −A + Aj, −A − Aj, −A − Aj, A + Aj, −A − Aj, A − Aj, −A + Aj, −A + Aj, −A + Aj |
| 7 | Polarization 1 | −A + Aj, −A + Aj, −A + Aj, A − Aj, A + Aj, −A − Aj, A + Aj, A + Aj, −A + Aj, A − Aj, A − Aj, −A + Aj, A − Aj, −A − Aj, A − Aj, A + Aj, A + Aj, −A − Aj, −A − Aj, −A − Aj |
| | Polarization 2 | −A + Aj, −A + Aj, −A + Aj, A − Aj, −A − Aj, A + Aj, −A − Aj, −A − Aj, −A + Aj, A − Aj, A − Aj, −A + Aj, A − Aj, A + Aj, A − Aj, −A − Aj, −A − Aj, A + Aj, A + Aj, A + Aj |
| 8 | Polarization 1 | −A − Aj, −A − Aj, −A − Aj, A + Aj, A − Aj, −A + Aj, A − Aj, A − Aj, −A − Aj, A + Aj, A + Aj, −A − Aj, A + Aj, −A + Aj, A + Aj, A − Aj, A − Aj, −A + Aj, −A + Aj, −A + Aj |
| | Polarization 2 | A + Aj, A + Aj, A + Aj, −A − Aj, A − Aj, −A + Aj, A − Aj, A − Aj, A + Aj, −A − Aj, −A − Aj, A + Aj, −A − Aj, −A + Aj, −A − Aj, A − Aj, A − Aj, −A + Aj, −A + Aj, −A + Aj |
| 9 | Polarization 1 | A + Aj, A + Aj, A + Aj, −A − Aj, −A + Aj, A − Aj, −A + Aj, −A + Aj, A + Aj, −A − Aj, −A − Aj, A + Aj, −A − Aj, A − Aj, −A − Aj, −A + Aj, −A + Aj, A − Aj, A − Aj, A − Aj |
| | Polarization 2 | −A − Aj, −A − Aj, −A − Aj, A + Aj, −A + Aj, A − Aj, −A + Aj, −A + Aj, −A − Aj, A + Aj, A + Aj, −A − Aj, A + Aj, A − Aj, A + Aj, −A + Aj, −A + Aj, A − Aj, A − Aj, A − Aj |
| 10 | Polarization 1 | A − Aj, A − Aj, A − Aj, −A + Aj, −A − Aj, A + Aj, −A − Aj, −A − Aj, A − Aj, −A + Aj, −A + Aj, A − Aj, −A + Aj, A + Aj, −A + Aj, −A − Aj, −A − Aj, A + Aj, A + Aj, A + Aj |
| | Polarization 2 | A − Aj, A − Aj, A − Aj, −A + Aj, A + Aj, −A − Aj, A + Aj, A + Aj, A − Aj, −A + Aj, −A + Aj, A − Aj, −A + Aj, −A − Aj, −A + Aj, A + Aj, A + Aj, −A − Aj, −A − Aj, −A − Aj |
| 11 | Polarization 1 | A + Aj, A + Aj, A + Aj, −A − Aj, −A − Aj, −A + Aj, A + Aj, −A + Aj, A − Aj, −A + Aj, −A + Aj, A − Aj, −A − Aj, −A − Aj, A + Aj, −A − Aj, −A + Aj, A − Aj, A − Aj, A − Aj |
| | Polarization 2 | −A − Aj, −A − Aj, −A − Aj, A + Aj, A + Aj, −A + Aj, −A − Aj, −A + Aj, A − Aj, −A + Aj, −A + Aj, A − Aj, A + Aj, A + Aj, −A − Aj, A + Aj, −A + Aj, A − Aj, A − Aj, A − Aj |
| 12 | Polarization 1 | A − Aj, A − Aj, A − Aj, −A + Aj, −A + Aj, −A − Aj, A − Aj, −A − Aj, A + Aj, −A − Aj, −A − Aj, A + Aj, −A + Aj, −A + Aj, A − Aj, −A + Aj, −A − Aj, A + Aj, A + Aj, A + Aj |
| | Polarization 2 | A − Aj, A − Aj, A − Aj, −A + Aj, −A + Aj, A + Aj, A − Aj, A + Aj, −A − Aj, A + Aj, A + Aj, −A − Aj, −A + Aj, −A + Aj, A − Aj, −A + Aj, A + Aj, −A − Aj, −A − Aj, −A − Aj |
| 13 | Polarization 1 | −A − Aj, −A − Aj, −A − Aj, A + Aj, −A + Aj, A − Aj, −A + Aj, −A + Aj, −A − Aj, A + Aj, A + Aj, −A − Aj, A + Aj, A − Aj, A + Aj, −A + Aj, −A + Aj, A − Aj, A − Aj, A − Aj |
| | Polarization 2 | A + Aj, A + Aj, A + Aj, −A − Aj, −A + Aj, A − Aj, −A + Aj, −A + Aj, A + Aj, −A − Aj, −A − Aj, A + Aj, −A − Aj, A − Aj, −A − Aj, −A + Aj, −A + Aj, A − Aj, A − Aj, A − Aj |
| 14 | Polarization 1 | −A + Aj, −A + Aj, −A + Aj, A − Aj, −A − Aj, A + Aj, −A − Aj, −A − Aj, −A + Aj, A − Aj, A − Aj, −A + Aj, A − Aj, A + Aj, A − Aj, −A − Aj, −A − Aj, A + Aj, A + Aj, A + Aj |
| | Polarization 2 | −A + Aj, −A + Aj, −A + Aj, A − Aj, A + Aj, −A − Aj, A + Aj, A + Aj, −A + Aj, A − Aj, A − Aj, −A + Aj, A − Aj, −A − Aj, A − Aj, A + Aj, A + Aj, −A − Aj, −A − Aj, −A − Aj |
| 15 | Polarization 1 | −A − Aj, −A − Aj, −A − Aj, A + Aj, A + Aj, −A + Aj, −A − Aj, −A + Aj, A − Aj, −A + Aj, −A + Aj, A − Aj, A + Aj, A + Aj, −A − Aj, A + Aj, −A + Aj, A − Aj, A − Aj, A − Aj |
| | Polarization 2 | A + Aj, A + Aj, A + Aj, −A − Aj, −A − Aj, −A + Aj, A + Aj, −A + Aj, A − Aj, −A + Aj, −A + Aj, A − Aj, −A − Aj, −A − Aj, A + Aj, −A − Aj, −A + Aj, A − Aj, A − Aj, A − Aj |
| 16 | Polarization 1 | −A + Aj, −A + Aj, −A + Aj, A − Aj, A − Aj, −A − Aj, −A + Aj, −A − Aj, A + Aj, −A − Aj, −A − Aj, A + Aj, A − Aj, A − Aj, −A + Aj, A − Aj, −A − Aj, A + Aj, A + Aj, A + Aj |
| | Polarization 2 | −A + Aj, −A + Aj, −A + Aj, A − Aj, A − Aj, A + Aj, −A + Aj, A + Aj, −A − Aj, A + Aj, A + Aj, −A − Aj, A − Aj, A − Aj, −A + Aj, A − Aj, A + Aj, −A − Aj, −A − Aj, −A − Aj |
| 17 | Polarization 1 | −A + Aj, A + Aj, A + Aj, −A + Aj, A − Aj, A − Aj, A + Aj, A − Aj, −A + Aj, −A − Aj, A − Aj, A − Aj, −A + Aj, A + Aj, −A − Aj, A + Aj, −A + Aj, −A − Aj, −A − Aj, −A − Aj |

TABLE 5-continued

| Index | Polarization | Frame alignment word sequence |
|---|---|---|
| | Polarization 2 | −A + Aj, −A − Aj, −A − Aj, −A + Aj, A − Aj, A − Aj, −A − Aj, A − Aj, −A + Aj, A + Aj, A − Aj, A − Aj, −A + Aj, −A − Aj, A + Aj, −A − Aj, −A + Aj, A + Aj, A + Aj, A + Aj |
| 18 | Polarization 1 | −A − Aj, A − Aj, A − Aj, −A − Aj, A + Aj, A + Aj, A − Aj, A + Aj, −A − Aj, −A + Aj, A + Aj, A + Aj, −A − Aj, A − Aj, −A + Aj, A − Aj, −A − Aj, −A + Aj, −A + Aj, −A + Aj |
| | Polarization 2 | A + Aj, A − Aj, A − Aj, A + Aj, −A − Aj, −A − Aj, A − Aj, −A − Aj, A + Aj, −A + Aj, −A − Aj, −A − Aj, A + Aj, A − Aj, −A + Aj, A − Aj, A + Aj, −A + Aj, −A + Aj, −A + Aj |
| 19 | Polarization 1 | A − Aj, A − Aj, A − Aj, −A − Aj, −A + Aj, A − Aj, −A + Aj, −A − Aj, A + Aj, A + Aj, A − Aj, −A − Aj, A + Aj, −A + Aj, A + Aj, A + Aj, −A − Aj, −A + Aj, −A + Aj, −A − Aj |
| | Polarization 2 | A − Aj, A − Aj, A − Aj, A + Aj, −A + Aj, A − Aj, −A + Aj, A + Aj, −A − Aj, −A − Aj, A − Aj, A + Aj, −A − Aj, −A + Aj, −A − Aj, −A − Aj, A + Aj, −A + Aj, −A + Aj, A + Aj |
| 20 | Polarization 1 | A + Aj, A + Aj, A + Aj, −A + Aj, −A − Aj, A + Aj, −A − Aj, −A + Aj, A − Aj, A − Aj, A + Aj, −A + Aj, A − Aj, −A − Aj, A − Aj, A − Aj, −A + Aj, −A − Aj, −A − Aj, −A + Aj |
| | Polarization 2 | −A − Aj, −A − Aj, −A − Aj, −A + Aj, A + Aj, −A − Aj, A + Aj, −A + Aj, A − Aj, A − Aj, −A − Aj, −A + Aj, A − Aj, A + Aj, A − Aj, A − Aj, −A + Aj, A + Aj, A + Aj, −A + Aj |

(2) Assuming that $N_{FAW}$=22, the frame alignment word sequence may be any item in Table 6.

TABLE 6

| Index | Polarization | Frame alignment word sequence |
|---|---|---|
| 1 | Polarization 1 | A − Aj, A − Aj, A + Aj, −A + Aj, −A + Aj, A − Aj, A + Aj, A − Aj, −A + Aj, A + Aj, A + Aj, −A − Aj, A + Aj, −A − Aj, A − Aj, −A + Aj, −A − Aj, −A + Aj, A + Aj, −A − Aj, −A − Aj, −A − Aj |
| | Polarization 2 | A + Aj, A + Aj, −A + Aj, A − Aj, −A − Aj, −A − Aj, −A + Aj, A − Aj, A − Aj, −A − Aj, A + Aj, A − Aj, −A + Aj, A − Aj, −A + Aj, −A + Aj, −A − Aj, A + Aj, A − Aj, A + Aj, −A + Aj, −A − Aj |
| 2 | Polarization 1 | A − Aj, A − Aj, A + Aj, −A + Aj, −A + Aj, A − Aj, A + Aj, A − Aj, −A + Aj, A + Aj, A + Aj, −A − Aj, A + Aj, −A − Aj, A − Aj, −A + Aj, −A − Aj, −A + Aj, A + Aj, −A − Aj, −A − Aj, −A − Aj |
| | Polarization 2 | −A − Aj, −A − Aj, A − Aj, −A + Aj, A + Aj, A + Aj, A − Aj, −A + Aj, −A + Aj, A + Aj, −A − Aj, −A + Aj, A − Aj, −A + Aj, A − Aj, A − Aj, A + Aj, −A − Aj, −A + Aj, −A − Aj, A − Aj, A + Aj |
| 3 | Polarization 1 | A + Aj, A + Aj, A − Aj, −A − Aj, −A − Aj, A + Aj, A − Aj, A + Aj, −A − Aj, A − Aj, A − Aj, −A + Aj, A − Aj, −A + Aj, A + Aj, −A − Aj, −A + Aj, −A − Aj, A − Aj, −A + Aj, −A + Aj, −A + Aj |
| | Polarization 2 | A − Aj, A − Aj, −A − Aj, A + Aj, −A + Aj, −A + Aj, −A − Aj, A + Aj, A + Aj, −A + Aj, A − Aj, A + Aj, −A − Aj, A + Aj, −A − Aj, −A − Aj, −A + Aj, A − Aj, A + Aj, A − Aj, −A − Aj, −A + Aj |
| 4 | Polarization 1 | A + Aj, A + Aj, A − Aj, −A − Aj, −A − Aj, A + Aj, A − Aj, A + Aj, −A − Aj, A − Aj, A − Aj, −A + Aj, A − Aj, −A + Aj, A + Aj, −A − Aj, −A + Aj, −A − Aj, A − Aj, −A + Aj, −A + Aj, −A + Aj |
| | Polarization 2 | −A + Aj, −A + Aj, A + Aj, −A − Aj, A − Aj, A − Aj, A + Aj, −A − Aj, −A − Aj, A − Aj, −A + Aj, −A − Aj, A + Aj, −A − Aj, A + Aj, A + Aj, A − Aj, −A + Aj, −A − Aj, −A + Aj, A + Aj, A − Aj |
| 5 | Polarization 1 | A − Aj, A − Aj, A − Aj, −A + Aj, A + Aj, A − Aj, A + Aj, −A − Aj, A − Aj, −A + Aj, A − Aj, −A + Aj, −A + Aj, A + Aj, −A − Aj, −A + Aj, −A − Aj, A + Aj, A + Aj, −A + Aj, −A − Aj, −A − Aj |
| | Polarization 2 | A − Aj, A + Aj, −A + Aj, −A − Aj, −A + Aj, A − Aj, A + Aj, A + Aj, −A − Aj, A + Aj, −A − Aj, −A + Aj, A − Aj, −A − Aj, −A − Aj, A + Aj, A − Aj, A − Aj, −A − Aj, A + Aj, −A + Aj, −A + Aj |
| 6 | Polarization 1 | A − Aj, A − Aj, A − Aj, −A + Aj, A + Aj, A − Aj, A + Aj, −A − Aj, A − Aj, −A + Aj, A − Aj, −A + Aj, −A + Aj, A + Aj, −A − Aj, −A + Aj, −A − Aj, A + Aj, A + Aj, −A + Aj, −A − Aj, −A − Aj |
| | Polarization 2 | −A + Aj, −A − Aj, A − Aj, A + Aj, A − Aj, −A + Aj, −A − Aj, −A − Aj, A + Aj, −A − Aj, A + Aj, A − Aj, −A + Aj, A + Aj, A + Aj, −A − Aj, −A + Aj, −A + Aj, A + Aj, −A − Aj, A − Aj, A − Aj |
| 7 | Polarization 1 | A + Aj, A + Aj, A + Aj, −A − Aj, A − Aj, A + Aj, A − Aj, −A + Aj, A + Aj, −A − Aj, A + Aj, −A − Aj, −A − Aj, A − Aj, −A + Aj, −A − Aj, −A + Aj, A − Aj, A − Aj, −A − Aj, −A + Aj, −A + Aj |
| | Polarization 2 | A + Aj, A − Aj, −A − Aj, −A + Aj, −A − Aj, A + Aj, A − Aj, A − Aj, −A + Aj, A − Aj, −A + Aj, −A − Aj, A + Aj, −A + Aj, −A + Aj, A − Aj, A + Aj, A + Aj, −A + Aj, A − Aj, −A − Aj, −A − Aj |
| 8 | Polarization 1 | A + Aj, A + Aj, A + Aj, −A − Aj, A − Aj, A + Aj, A − Aj, −A + Aj, A + Aj, −A − Aj, A + Aj, −A − Aj, −A − Aj, A − Aj, −A + Aj, −A − Aj, −A + Aj, A − Aj, A − Aj, −A − Aj, −A + Aj, −A + Aj |
| | Polarization 2 | −A − Aj, −A + Aj, A + Aj, A − Aj, A + Aj, −A − Aj, −A + Aj, −A + Aj, A − Aj, −A + Aj, A − Aj, A + Aj, −A − Aj, A − Aj, A − Aj, −A + Aj, −A − Aj, −A − Aj, A − Aj, −A + Aj, A + Aj, A + Aj |
| 9 | Polarization 1 | A + Aj, A + Aj, A − Aj, −A + Aj, A − Aj, A − Aj, A − Aj, −A − Aj, A + Aj, A + Aj, −A + Aj, A + Aj, A − Aj, −A − Aj, −A + Aj, −A − Aj, −A − Aj, A − Aj, −A + Aj, −A + Aj, −A + Aj, −A − Aj |
| | Polarization 2 | A − Aj, −A − Aj, −A − Aj, A − Aj, A + Aj, A + Aj, A − Aj, −A + Aj, −A − Aj, A + Aj, −A − Aj, −A + Aj, A + Aj, −A − Aj, A − Aj, −A − Aj, A + Aj, −A + Aj, A − Aj, A + Aj, −A + Aj, −A + Aj |
| 10 | Polarization 1 | A + Aj, A + Aj, A − Aj, −A + Aj, A − Aj, A − Aj, A − Aj, −A − Aj, A + Aj, A + Aj, −A + Aj, A + Aj, A − Aj, −A − Aj, −A + Aj, −A − Aj, −A − Aj, A − Aj, −A + Aj, −A + Aj, −A + Aj, −A − Aj |
| | Polarization 2 | −A + Aj, A + Aj, A + Aj, −A + Aj, −A − Aj, −A − Aj, −A + Aj, A − Aj, A + Aj, −A − Aj, A + Aj, A − Aj, −A − Aj, A + Aj, −A + Aj, A + Aj, −A − Aj, A − Aj, −A + Aj, −A − Aj, A − Aj, A − Aj |
| 11 | Polarization 1 | A − Aj, A − Aj, A + Aj, −A − Aj, A + Aj, A + Aj, A + Aj, −A + Aj, A − Aj, A − Aj, −A − Aj, A − Aj, A + Aj, −A + Aj, −A − Aj, −A + Aj, −A + Aj, A + Aj, −A − Aj, −A − Aj, −A − Aj, −A + Aj |
| | Polarization 2 | A + Aj, −A + Aj, −A + Aj, A + Aj, A + Aj, A − Aj, A − Aj, A + Aj, −A − Aj, −A + Aj, A − Aj, −A + Aj, −A − Aj, A − Aj, −A + Aj, A + Aj, −A + Aj, A − Aj, −A − Aj, A + Aj, A + Aj, A − Aj, −A − Aj, −A − Aj |
| 12 | Polarization 1 | A − Aj, A − Aj, A + Aj, −A − Aj, A + Aj, A + Aj, A + Aj, −A + Aj, A − Aj, A − Aj, −A − Aj, A − Aj, A + Aj, −A + Aj, −A − Aj, −A + Aj, −A + Aj, A + Aj, −A − Aj, −A − Aj, −A − Aj, −A + Aj |
| | Polarization 2 | −A − Aj, A − Aj, A − Aj, −A − Aj, −A + Aj, −A + Aj, −A − Aj, A + Aj, A − Aj, −A + Aj, A − Aj, A + Aj, −A + Aj, A − Aj, −A − Aj, A − Aj, −A + Aj, A + Aj, −A − Aj, −A + Aj, A + Aj, A + Aj |

(3) Assuming that $N_{FAW}$=24, the frame alignment word sequence may be any item in Table 7.

TABLE 7

| Index | Polarization | Frame alignment word sequence |
|---|---|---|
| 1 | Polarization 1 | −A + Aj, −A + Aj, A − Aj, −A − Aj, −A + Aj, A − Aj, A + Aj, A − Aj, −A − Aj, A − Aj, A + Aj,<br>−A + Aj, A + Aj, −A − Aj, A + Aj, A − Aj, A − Aj, −A − Aj, A + Aj, −A + Aj, −A − Aj, A + Aj,<br>−A + Aj, −A − Aj |
| | Polarization 2 | −A + Aj, −A + Aj, A − Aj, A + Aj, −A + Aj, A − Aj, −A − Aj, A − Aj, A + Aj, A − Aj, −A − Aj,<br>−A + Aj, −A − Aj, A + Aj, −A − Aj, A − Aj, A − Aj, A + Aj, −A − Aj, −A + Aj, A + Aj, −A − Aj,<br>−A + Aj, A + Aj |
| 2 | Polarization 1 | −A − Aj, −A − Aj, A + Aj, −A + Aj, −A − Aj, A + Aj, A − Aj, A + Aj, −A + Aj, A + Aj, A − Aj, −A −<br>Aj, A − Aj, −A + Aj, A − Aj, A + Aj, A + Aj, −A + Aj, A − Aj, −A − Aj, −A + Aj, A − Aj, −A − Aj,<br>−A + Aj |
| | Polarization 2 | A + Aj, A + Aj, −A − Aj, −A + Aj, A + Aj, −A − Aj, A − Aj, −A − Aj, −A + Aj, −A − Aj, A − Aj,<br>A + Aj, A − Aj, −A + Aj, A − Aj, −A − Aj, −A − Aj, −A + Aj, A − Aj, A + Aj, −A + Aj, A − Aj, A + Aj,<br>−A + Aj |
| 3 | Polarization 1 | −A + Aj, −A − Aj, A − Aj, −A + Aj, −A − Aj, A − Aj, −A + Aj, A + Aj, A + Aj, A − Aj, −A + Aj, A −<br>Aj, −A − Aj, A − Aj, A + Aj, −A + Aj, A + Aj, A − Aj, A + Aj, −A − Aj, −A + Aj, A + Aj, −A − Aj,<br>−A − Aj |
| | Polarization 2 | −A + Aj, A + Aj, A − Aj, −A + Aj, A + Aj, A − Aj, −A + Aj, −A − Aj, −A − Aj, A − Aj, −A + Aj, A −<br>Aj, A + Aj, A − Aj, −A − Aj, −A + Aj, −A − Aj, A − Aj, −A − Aj, A + Aj, −A + Aj, −A − Aj, A + Aj,<br>A + Aj |
| 4 | Polarization 1 | −A − Aj, −A + Aj, A + Aj, −A − Aj, −A + Aj, A + Aj, −A − Aj, A − Aj, A − Aj, A + Aj, −A − Aj,<br>A + Aj, −A + Aj, A + Aj, A − Aj, −A − Aj, A − Aj, A + Aj, A − Aj, −A + Aj, −A − Aj, A − Aj, −A + Aj,<br>−A + Aj |
| | Polarization 2 | A + Aj, −A + Aj, −A − Aj, A + Aj, −A + Aj, −A − Aj, A + Aj, A − Aj, A − Aj, −A − Aj, A + Aj, −A −<br>Aj, −A + Aj, −A − Aj, A − Aj, A + Aj, A − Aj, −A − Aj, A − Aj, −A + Aj, A + Aj, A − Aj, −A + Aj,<br>−A + Aj |
| 5 | Polarization 1 | A − Aj, −A − Aj, −A + Aj, A − Aj, −A − Aj, −A + Aj, A − Aj, A + Aj, A + Aj, −A + Aj, A − Aj,<br>−A + Aj, −A − Aj, −A + Aj, A + Aj, A − Aj, A + Aj, −A + Aj, A + Aj, −A − Aj, A − Aj, A + Aj, −A −<br>Aj, −A − Aj |
| | Polarization 2 | A − Aj, A + Aj, −A + Aj, A − Aj, A + Aj, −A + Aj, A − Aj, −A − Aj, −A − Aj, −A + Aj, A − Aj,<br>−A + Aj, A + Aj, −A + Aj, −A − Aj, A − Aj, −A − Aj, −A + Aj, −A − Aj, A + Aj, A − Aj, −A − Aj,<br>A + Aj, A + Aj |
| 6 | Polarization 1 | A + Aj, −A + Aj, A − Aj, A + Aj, A − Aj, −A − Aj, A − Aj, A − Aj, A + Aj, A + Aj, −A + Aj, −A − Aj,<br>A + Aj, −A − Aj, −A + Aj, −A + Aj, −A + Aj, A − Aj, −A − Aj, A + Aj, A − Aj, −A − Aj, −A + Aj, −A − Aj<br>−A − Aj, −A + Aj, A − Aj, −A − Aj, A − Aj, A + Aj, A − Aj, A − Aj, −A − Aj, −A − Aj, −A + Aj, A + Aj, |
| | Polarization 2 | −A − Aj, A + Aj, −A + Aj, −A + Aj, −A + Aj, A − Aj, A + Aj, −A − Aj, A − Aj, A + Aj, −A + Aj,<br>A + Aj<br>A − Aj, −A − Aj, A + Aj, A − Aj, A + Aj, −A + Aj, A + Aj, A + Aj, A − Aj, A − Aj, −A − Aj, −A + Aj, |
| 7 | Polarization 1 | A − Aj, −A + Aj, −A − Aj, −A − Aj, −A − Aj, A + Aj, −A + Aj, A − Aj, A + Aj, −A + Aj, −A − Aj,<br>−A + Aj<br>A − Aj, A + Aj, −A − Aj, A − Aj, −A − Aj, −A + Aj, −A − Aj, −A − Aj, A − Aj, A − Aj, A + Aj, −A + Aj, |
| | Polarization 2 | A − Aj, −A + Aj, A + Aj, A + Aj, A + Aj, −A − Aj, −A + Aj, A − Aj, −A − Aj, −A + Aj, A + Aj,<br>−A + Aj<br>A + Aj, −A + Aj, A + Aj, A − Aj, −A − Aj, A + Aj, A − Aj, −A + Aj, −A + Aj, −A + Aj, A + Aj, −A − |
| 8 | Polarization 1 | Aj, A + Aj, −A + Aj, −A − Aj, −A − Aj, A − Aj, A − Aj, A + Aj, A − Aj, −A − Aj, A − Aj, −A + Aj, −A − Aj<br>−A − Aj, −A + Aj, −A − Aj, A − Aj, A + Aj, −A − Aj, A − Aj, −A + Aj, −A + Aj, −A + Aj, −A − Aj,<br>A + Aj, −A − Aj, −A + Aj, A + Aj, A + Aj, A − Aj, A − Aj, −A − Aj, A − Aj, A + Aj, A − Aj, −A + Aj, |
| | Polarization 2 | A + Aj<br>A − Aj, −A − Aj, A − Aj, A + Aj, −A + Aj, A − Aj, A + Aj, −A − Aj, −A − Aj, −A − Aj, A − Aj, −A + Aj,<br>A − Aj, −A − Aj, −A + Aj, −A + Aj, A + Aj, A + Aj, A − Aj, A + Aj, −A + Aj, A + Aj, −A − Aj, |
| 9 | Polarization 1 | −A + Aj<br>A − Aj, A + Aj, A − Aj, −A − Aj, −A + Aj, A − Aj, −A − Aj, A + Aj, A + Aj, A + Aj, A − Aj, −A + Aj,<br>A − Aj, A + Aj, −A + Aj, −A + Aj, −A − Aj, −A − Aj, A − Aj, −A − Aj, −A + Aj, −A − Aj, A + Aj, |
| | Polarization 2 | −A + Aj<br>A + Aj, A − Aj, A + Aj, −A + Aj, −A − Aj, A + Aj, −A + Aj, A − Aj, A − Aj, A − Aj, A + Aj, −A − Aj,<br>A + Aj, A − Aj, −A − Aj, −A − Aj, −A + Aj, −A + Aj, A + Aj, −A + Aj, −A − Aj, −A + Aj, A − Aj, −A − Aj |
| 10 | Polarization 1 | −A − Aj, A − Aj, −A − Aj, −A + Aj, A + Aj, −A − Aj, −A + Aj, A − Aj, A − Aj, A − Aj, −A − Aj, A + Aj,<br>−A − Aj, A − Aj, A + Aj, A + Aj, −A + Aj, −A + Aj, −A − Aj, −A + Aj, A + Aj, −A + Aj, A − Aj,<br>A + Aj |
| | Polarization 2 | A + Aj, A − Aj, −A + Aj, A + Aj, −A + Aj, −A − Aj, −A + Aj, −A + Aj, A + Aj, A + Aj, A − Aj, −A −<br>Aj, A + Aj, −A − Aj, A − Aj, A − Aj, A − Aj, −A + Aj, −A − Aj, A + Aj, −A + Aj, −A − Aj, A − Aj, −A − Aj<br>−A − Aj, A − Aj, −A + Aj, −A − Aj, −A + Aj, A + Aj, −A + Aj, −A + Aj, −A − Aj, −A − Aj, A − Aj, |
| 11 | Polarization 1 | A + Aj, −A − Aj, A + Aj, A − Aj, A − Aj, A − Aj, −A + Aj, A + Aj, −A − Aj, −A + Aj, A + Aj, A − Aj,<br>A + Aj<br>−A + Aj, −A − Aj, A + Aj, −A + Aj, A + Aj, A − Aj, A + Aj, A + Aj, −A + Aj, −A + Aj, −A − Aj, A − |
| | Polarization 2 | Aj, −A + Aj, A − Aj, −A − Aj, −A − Aj, −A − Aj, A + Aj, A − Aj, −A + Aj, A + Aj, A − Aj, −A − Aj, A − Aj<br>−A + Aj, A + Aj, −A − Aj, −A + Aj, −A − Aj, A − Aj, −A − Aj, −A − Aj, −A + Aj, −A + Aj, A + Aj, A −<br>Aj, −A + Aj, A − Aj, A + Aj, A + Aj, A + Aj, −A − Aj, A − Aj, −A + Aj, −A − Aj, A − Aj, A + Aj, A − Aj |
| 12 | Polarization 1 | −A + Aj, −A − Aj, −A + Aj, A + Aj, A − Aj, −A + Aj, A + Aj, −A − Aj, −A − Aj, −A − Aj, −A + Aj, A −<br>Aj, −A + Aj, −A − Aj, A − Aj, A − Aj, A + Aj, A + Aj, −A + Aj, A + Aj, A − Aj, A + Aj, −A − Aj, A − Aj<br>−A + Aj, A + Aj, −A + Aj, −A − Aj, A − Aj, −A + Aj, −A − Aj, A + Aj, A + Aj, A + Aj, −A + Aj, A − |
| | Polarization 2 | Aj, −A + Aj, A + Aj, A − Aj, A − Aj, −A − Aj, −A − Aj, −A + Aj, −A − Aj, A − Aj, −A − Aj, A + Aj, A − Aj<br>A − Aj, A + Aj, A − Aj, −A − Aj, A − Aj, −A + Aj, A + Aj, A + Aj, −A − Aj, A − Aj, A − Aj, −A − Aj,<br>A + Aj, A + Aj, −A − Aj, −A + Aj, −A + Aj, A + Aj, A − Aj, −A + Aj, −A + Aj, −A − Aj, −A + Aj, |

TABLE 7-continued

| Index | Polarization | Frame alignment word sequence |
|---|---|---|
| 13 | Polarization 1 | −A − Aj A − Aj, −A − Aj, A − Aj, A + Aj, A − Aj, −A + Aj, −A − Aj, −A − Aj, A + Aj, A − Aj, A − Aj, A + Aj, −A − Aj, −A − Aj, A + Aj, −A + Aj, −A + Aj, −A − Aj, A − Aj, −A + Aj, −A + Aj, A + Aj, −A + Aj, |
| | Polarization 2 | A + Aj A + Aj, A − Aj, A + Aj, −A + Aj, A + Aj, −A − Aj, A − Aj, A − Aj, −A + Aj, A + Aj, A + Aj, −A + Aj, A − Aj, A − Aj, −A + Aj, −A − Aj, −A − Aj, A − Aj, A + Aj, −A − Aj, −A − Aj, −A + Aj, −A − Aj, |
| 14 | Polarization 1 | −A + Aj −A − Aj, A − Aj, −A − Aj, −A + Aj, −A − Aj, A + Aj, A − Aj, A − Aj, −A + Aj, −A − Aj, −A − Aj, −A + Aj, A − Aj, A − Aj, −A + Aj, A + Aj, A + Aj, A − Aj, −A − Aj, A + Aj, A + Aj, −A + Aj, A + Aj, |
| | Polarization 2 | −A + Aj A + Aj, −A − Aj, A − Aj, A − Aj, A − Aj, −A − Aj, −A + Aj, A + Aj, A + Aj, A − Aj, −A + Aj, −A + Aj, A − Aj, −A + Aj, A + Aj, A + Aj, −A − Aj, A + Aj, A − Aj, −A + Aj, −A + Aj, −A − Aj, −A − Aj, −A − Aj |
| 15 | Polarization 1 | −A − Aj, A + Aj, A − Aj, A − Aj, A − Aj, A + Aj, −A + Aj, −A − Aj, −A − Aj, A − Aj, −A + Aj, −A + Aj, A − Aj, −A + Aj, −A − Aj, −A − Aj, A + Aj, −A − Aj, A − Aj, −A + Aj, −A + Aj, A + Aj, A + Aj, A + Aj |
| | Polarization 2 | A − Aj, −A + Aj, A + Aj, A + Aj, A + Aj, −A + Aj, −A − Aj, A − Aj, A − Aj, A + Aj, −A − Aj, −A − Aj, A + Aj, −A − Aj, A − Aj, A − Aj, −A + Aj, A − Aj, A + Aj, −A − Aj, −A − Aj, −A + Aj, −A + Aj, −A + Aj |
| 16 | Polarization 1 | A − Aj, −A + Aj, −A − Aj, −A − Aj, −A − Aj, −A + Aj, A + Aj, A − Aj, A − Aj, −A − Aj, A + Aj, A + Aj, −A − Aj, A + Aj, A − Aj, A − Aj, −A + Aj, A − Aj, −A − Aj, A + Aj, A + Aj, −A + Aj, −A + Aj, −A + Aj |
| | Polarization 2 | A − Aj, A − Aj, −A + Aj, −A + Aj, A − Aj, −A − Aj, A − Aj, A − Aj, −A − Aj, −A + Aj, −A + Aj, A + Aj, −A − Aj, A + Aj, A + Aj, A − Aj, A + Aj, −A − Aj, A + Aj, A + Aj, −A + Aj, −A − Aj, −A + Aj, −A − Aj |
| 17 | Polarization 1 | A − Aj, A − Aj, −A + Aj, −A + Aj, A − Aj, A + Aj, A − Aj, A − Aj, A + Aj, −A + Aj, −A + Aj, −A − Aj, A + Aj, −A − Aj, −A − Aj, A − Aj, −A − Aj, A + Aj, −A − Aj, −A − Aj, −A + Aj, A + Aj, −A + Aj, A + Aj |
| | Polarization 2 | A + Aj, A + Aj, −A − Aj, −A − Aj, A + Aj, −A + Aj, A + Aj, A + Aj, −A + Aj, −A − Aj, −A − Aj, A − Aj, −A + Aj, A − Aj, A − Aj, A + Aj, A − Aj, −A + Aj, A − Aj, A − Aj, −A − Aj, −A + Aj, −A − Aj, −A + Aj |
| 18 | Polarization 1 | −A − Aj, −A − Aj, A + Aj, A + Aj, −A − Aj, −A + Aj, −A − Aj, −A − Aj, −A + Aj, A + Aj, A + Aj, A − Aj, −A + Aj, A − Aj, A − Aj, −A − Aj, A − Aj, −A + Aj, A − Aj, A − Aj, A + Aj, −A + Aj, A + Aj, −A + Aj |
| | Polarization 2 | −A + Aj, −A + Aj, A − Aj, A + Aj, −A − Aj, −A − Aj, A − Aj, −A + Aj, −A + Aj, A + Aj, −A − Aj, A − Aj, A − Aj, A − Aj, A + Aj, A − Aj, −A − Aj, A + Aj, A + Aj, A + Aj, −A − Aj, −A + Aj, −A + Aj, −A − Aj |
| 19 | Polarization 1 | −A + Aj, −A + Aj, A − Aj, −A − Aj, A + Aj, A + Aj, A − Aj, −A + Aj, −A + Aj, −A − Aj, A + Aj, A − Aj, A − Aj, A − Aj, −A − Aj, A − Aj, A + Aj, −A − Aj, −A − Aj, −A − Aj, A + Aj, −A + Aj, −A + Aj, A + Aj |
| | Polarization 2 | −A − Aj, −A − Aj, A + Aj, A − Aj, −A + Aj, −A + Aj, A + Aj, −A − Aj, −A − Aj, A − Aj, −A + Aj, A + Aj, A + Aj, A + Aj, A − Aj, A + Aj, −A + Aj, A − Aj, A − Aj, A − Aj, −A + Aj, −A − Aj, −A − Aj, −A + Aj |
| 20 | Polarization 1 | A + Aj, A + Aj, −A − Aj, A − Aj, −A + Aj, −A + Aj, −A − Aj, A + Aj, A + Aj, A − Aj, −A + Aj, −A − Aj, −A − Aj, −A − Aj, A − Aj, −A − Aj, −A + Aj, A − Aj, A − Aj, A − Aj, −A + Aj, A + Aj, A + Aj, −A + Aj |
| | Polarization 2 | −A + Aj, −A + Aj, A − Aj, −A − Aj, −A + Aj, A − Aj, A + Aj, A − Aj, −A − Aj, A − Aj, A + Aj, −A + Aj, A + Aj, −A − Aj, A + Aj, A − Aj, A − Aj, −A − Aj, A + Aj, −A + Aj, −A − Aj, A + Aj, −A + Aj, −A − Aj |
| 21 | Polarization 1 | −A + Aj, −A + Aj, A − Aj, A + Aj, −A + Aj, A − Aj, −A − Aj, A − Aj, A + Aj, A − Aj, −A − Aj, −A + Aj, −A − Aj, A + Aj, −A − Aj, A − Aj, A − Aj, A + Aj, −A − Aj, −A + Aj, A + Aj, −A − Aj, −A + Aj, A + Aj |
| | Polarization 2 | −A − Aj, −A − Aj, A + Aj, −A + Aj, −A − Aj, A + Aj, A − Aj, A + Aj, −A + Aj, A + Aj, A − Aj, −A − Aj, A − Aj, −A + Aj, A − Aj, A + Aj, A + Aj, −A + Aj, A − Aj, −A − Aj, −A + Aj, A − Aj, −A − Aj, −A + Aj |

Second, there may be the following several possible pilot sequences, which can ensure a relatively good cross-correlation between pilot sequences in the two polarization directions.

(1) It is assumed that $N_{PS}$=48. If a remainder of $N_{TS}$ divided by 4 is 1, the pilot sequence is one item in the following Table 8-1. If a remainder of $N_{TS}$ divided by 4 is 3, the pilot sequence is one item in the following Table 8-1 or Table 8-2. It should be understood that $N_{TS}$+$N_{PS}$ is an odd number; if $N_{PS}$ is an even number, $N_{TS}$ needs to be an odd number, and the remainder of $N_{TS}$ divided by 4 is definitely 1 or 3; and if $N_{PS}$ is an odd number, $N_{TS}$ needs to be an even number, and the remainder of $N_{TS}$ divided by 4 is definitely 0 or 2, which is not repeated later.

TABLE 8-1

| Index | Polarization | Pilot sequence |
|---|---|---|
| 1 | Polarization 1 | −A − Aj, −A + Aj, −A + Aj, A − Aj, −A + Aj, −A + Aj, −A − Aj, −A + Aj, −A + Aj, −A + Aj, A − Aj, A − Aj, A − Aj, A + Aj, A + Aj, A + Aj, A + Aj, −A − Aj, A + Aj, −A − Aj, A − Aj, −A − Aj, A − Aj, −A − Aj, −A + Aj, A + Aj, A − Aj, −A + Aj, −A − Aj, A + Aj, A − Aj, A − Aj, −A − Aj, A + Aj, A + Aj, A − Aj, −A − Aj, A + Aj, −A − Aj, −A + Aj, A + Aj, −A + Aj, A − Aj, A + Aj, −A + Aj, −A − Aj, −A − Aj, A − Aj |

TABLE 8-1-continued

| Index | Polarization | Pilot sequence |
|---|---|---|
| | Polarization 2 | −A + Aj, −A − Aj, −A − Aj, A + Aj, −A − Aj, −A − Aj, −A + Aj, −A − Aj, −A − Aj, −A − Aj, A + Aj, A + Aj, A + Aj, A − Aj, A − Aj, A − Aj, A − Aj, −A + Aj, A − Aj, −A + Aj, A + Aj, −A + Aj, A + Aj, −A + Aj, −A − Aj, A − Aj, A + Aj, −A − Aj, −A + Aj, A − Aj, A + Aj, A + Aj, −A + Aj, A − Aj, A − Aj, A + Aj, −A + Aj, A − Aj, −A + Aj, −A − Aj, A − Aj, −A − Aj, A + Aj, A − Aj, −A − Aj, −A + Aj, −A + Aj, A + Aj |
| 2 | Polarization 1 | −A − Aj, −A + Aj, −A + Aj, A − Aj, −A + Aj, −A + Aj, −A − Aj, −A + Aj, −A + Aj, −A + Aj, A − Aj, A − Aj, A − Aj, A + Aj, A + Aj, A + Aj, A + Aj, −A − Aj, A + Aj, −A − Aj, A − Aj, −A − Aj, A − Aj, −A − Aj, −A + Aj, A + Aj, A − Aj, −A + Aj, −A − Aj, A + Aj, A − Aj, A − Aj, −A − Aj, A + Aj, A + Aj, A − Aj, −A − Aj, A + Aj, −A − Aj, −A + Aj, A + Aj, −A + Aj, A − Aj, A + Aj, −A + Aj, −A − Aj, −A − Aj, A − Aj |
| | Polarization 2 | A − Aj, A + Aj, A + Aj, −A − Aj, A + Aj, A + Aj, A − Aj, A + Aj, A + Aj, A + Aj, −A − Aj, −A − Aj, −A − Aj, −A + Aj, −A + Aj, −A + Aj, −A + Aj, A − Aj, −A + Aj, A − Aj, −A − Aj, A − Aj, −A − Aj, A − Aj, A + Aj, −A + Aj, −A − Aj, A + Aj, A − Aj, −A + Aj, −A − Aj, −A − Aj, A − Aj, −A + Aj, −A + Aj, −A − Aj, A − Aj, −A + Aj, A − Aj, A + Aj, −A + Aj, A + Aj, −A − Aj, −A + Aj, A + Aj, A − Aj, A − Aj, −A − Aj |
| 3 | Polarization 1 | −A + Aj, −A − Aj, −A − Aj, A + Aj, −A − Aj, −A − Aj, −A + Aj, −A − Aj, −A − Aj, −A − Aj, A + Aj, A + Aj, A + Aj, A − Aj, A − Aj, A − Aj, A − Aj, −A + Aj, A − Aj, −A + Aj, A + Aj, −A + Aj, A + Aj, −A + Aj, −A − Aj, A − Aj, A + Aj, −A − Aj, −A + Aj, A − Aj, A + Aj, A + Aj, −A + Aj, A − Aj, A − Aj, A + Aj, −A + Aj, A − Aj, −A + Aj, −A − Aj, A − Aj, −A − Aj, A + Aj, A − Aj, −A − Aj, −A + Aj, −A + Aj, A + Aj |
| | Polarization 2 | A + Aj, A − Aj, A − Aj, −A + Aj, A − Aj, A − Aj, A + Aj, A − Aj, A − Aj, A − Aj, −A + Aj, −A + Aj, −A + Aj, −A − Aj, −A − Aj, −A − Aj, −A − Aj, A + Aj, −A − Aj, A + Aj, −A + Aj, A + Aj, −A + Aj, A + Aj, A − Aj, −A − Aj, −A + Aj, A − Aj, A + Aj, −A − Aj, −A + Aj, −A + Aj, A + Aj, −A − Aj, −A − Aj, −A + Aj, A + Aj, −A − Aj, A + Aj, A − Aj, −A − Aj, A − Aj, −A + Aj, −A − Aj, A − Aj, A + Aj, A + Aj, −A + Aj |
| 4 | Polarization 1 | A − Aj, A + Aj, A + Aj, −A − Aj, A + Aj, A + Aj, A − Aj, A + Aj, A + Aj, A + Aj, −A − Aj, −A − Aj, −A − Aj, −A + Aj, −A + Aj, −A + Aj, −A + Aj, A − Aj, −A + Aj, A − Aj, −A − Aj, A − Aj, −A − Aj, A − Aj, A + Aj, −A + Aj, −A − Aj, A + Aj, A − Aj, −A + Aj, −A − Aj, −A − Aj, A − Aj, −A + Aj, −A + Aj, −A − Aj, A − Aj, −A + Aj, A − Aj, A + Aj, −A + Aj, A + Aj, −A − Aj, −A + Aj, A + Aj, A − Aj, A − Aj, −A − Aj |
| | Polarization 2 | A + Aj, A − Aj, A − Aj, −A + Aj, A − Aj, A − Aj, A + Aj, A − Aj, A − Aj, A − Aj, −A + Aj, −A + Aj, −A + Aj, −A − Aj, −A − Aj, −A − Aj, −A − Aj, A + Aj, −A − Aj, A + Aj, −A + Aj, A + Aj, −A + Aj, A + Aj, A − Aj, −A − Aj, −A + Aj, A − Aj, A + Aj, −A − Aj, −A + Aj, −A + Aj, A + Aj, −A − Aj, −A − Aj, −A + Aj, A + Aj, −A − Aj, A + Aj, A − Aj, −A − Aj, A − Aj, −A + Aj, −A − Aj, A − Aj, A + Aj, A + Aj, −A + Aj |
| 5 | Polarization 1 | −A − Aj, −A + Aj, −A + Aj, A + Aj, A − Aj, −A − Aj, A + Aj, A − Aj, A + Aj, −A + Aj, A − Aj, −A + Aj, −A − Aj, A − Aj, A − Aj, −A + Aj, −A − Aj, −A − Aj, A − Aj, −A + Aj, A + Aj, −A − Aj, A − Aj, A + Aj, −A + Aj, −A − Aj, −A + Aj, −A − Aj, −A + Aj, A − Aj, −A + Aj, A − Aj, A − Aj, A − Aj, A − Aj, −A − Aj, −A − Aj, −A − Aj, A + Aj, A + Aj, A + Aj, −A + Aj, A + Aj, A + Aj, −A − Aj, A + Aj, A + Aj, −A + Aj |
| | Polarization 2 | −A + Aj, −A − Aj, −A − Aj, A − Aj, A + Aj, −A + Aj, A − Aj, A + Aj, A − Aj, −A − Aj, A + Aj, −A − Aj, −A + Aj, A + Aj, A + Aj, −A − Aj, −A + Aj, −A + Aj, A + Aj, −A − Aj, A − Aj, −A + Aj, A + Aj, A − Aj, −A − Aj, −A + Aj, −A − Aj, −A + Aj, −A − Aj, A + Aj, −A − Aj, A + Aj, A + Aj, A + Aj, A + Aj, −A + Aj, −A + Aj, −A + Aj, A − Aj, A − Aj, A − Aj, −A − Aj, A − Aj, A − Aj, −A + Aj, A − Aj, A − Aj, −A − Aj |
| 6 | Polarization 1 | −A − Aj, −A + Aj, −A + Aj, A + Aj, A − Aj, −A − Aj, A + Aj, A − Aj, A + Aj, −A + Aj, A − Aj, −A + Aj, −A − Aj, A − Aj, A − Aj, −A + Aj, −A − Aj, −A − Aj, A − Aj, −A + Aj, A + Aj, −A − Aj, A − Aj, A + Aj, −A + Aj, −A − Aj, −A + Aj, −A − Aj, −A + Aj, A − Aj, −A + Aj, A − Aj, A − Aj, A − Aj, A − Aj, −A − Aj, −A − Aj, −A − Aj, A + Aj, A + Aj, A + Aj, −A + Aj, A + Aj, A + Aj, −A − Aj, A + Aj, A + Aj, −A + Aj |
| | Polarization 2 | A − Aj, A + Aj, A + Aj, −A + Aj, −A − Aj, A − Aj, −A + Aj, −A − Aj, −A + Aj, A + Aj, −A − Aj, A + Aj, A − Aj, −A − Aj, −A − Aj, A + Aj, A − Aj, A − Aj, −A − Aj, A + Aj, −A + Aj, A − Aj, −A − Aj, −A + Aj, A + Aj, A − Aj, A + Aj, A − Aj, A + Aj, −A − Aj, A + Aj, −A − Aj, −A − Aj, −A − Aj, −A − Aj, A − Aj, A − Aj, A − Aj, −A + Aj, −A + Aj, −A + Aj, A + Aj, −A + Aj, −A + Aj, A − Aj, −A + Aj, −A + Aj, A + Aj |
| 7 | Polarization 1 | −A + Aj, −A − Aj, −A − Aj, A − Aj, A + Aj, −A + Aj, A − Aj, A + Aj, A − Aj, −A − Aj, A + Aj, −A − Aj, −A + Aj, A + Aj, A + Aj, −A − Aj, −A + Aj, −A + Aj, A + Aj, −A − Aj, A − Aj, −A + Aj, A + Aj, A − Aj, −A − Aj, −A + Aj, −A − Aj, −A + Aj, −A − Aj, A + Aj, −A − Aj, A + Aj, A + Aj, A + Aj, A + Aj, −A + Aj, −A + Aj, −A + Aj, A − Aj, A − Aj, A − Aj, −A − Aj, A − Aj, A − Aj, −A + Aj, A − Aj, A − Aj, −A − Aj |
| | Polarization 2 | A + Aj, A − Aj, A − Aj, −A − Aj, −A + Aj, A + Aj, −A − Aj, −A + Aj, −A − Aj, A − Aj, −A + Aj, A − Aj, A + Aj, −A + Aj, −A + Aj, A − Aj, A + Aj, A + Aj, −A + Aj, A − Aj, −A − Aj, A + Aj, −A + Aj, −A − Aj, A − Aj, A + Aj, A − Aj, A + Aj, A − Aj, −A + Aj, A − Aj, −A + Aj, −A + Aj, −A + Aj, −A + Aj, A + Aj, A + Aj, A + Aj, −A − Aj, −A − Aj, −A − Aj, A − Aj, −A − Aj, −A − Aj, A + Aj, −A − Aj, −A − Aj, A − Aj |
| 8 | Polarization 1 | A − Aj, A + Aj, A + Aj, −A + Aj, −A − Aj, A − Aj, −A + Aj, −A − Aj, −A + Aj, A + Aj, −A − Aj, A + Aj, A − Aj, −A − Aj, −A − Aj, A + Aj, A − Aj, A − Aj, −A − Aj, A + Aj, −A + Aj, A − Aj, −A − Aj, −A + Aj, A + Aj, A − Aj, A + Aj, A − Aj, A + Aj, −A − Aj, A + Aj, −A − Aj, −A − Aj, −A − Aj, −A − Aj, A − Aj, A − Aj, A − Aj, −A + Aj, −A + Aj, −A + Aj, A + Aj, −A + Aj, −A + Aj, A − Aj, −A + Aj, −A + Aj, A + Aj |
| | Polarization 2 | A + Aj, A − Aj, A − Aj, −A − Aj, −A + Aj, A + Aj, −A − Aj, −A + Aj, −A − Aj, A − Aj, −A + Aj, A − Aj, A + Aj, −A + Aj, −A + Aj, A − Aj, A + Aj, A + Aj, −A + Aj, A − Aj, −A − Aj, A + Aj, −A + Aj, −A − Aj, A − Aj, A + Aj, A − Aj, A + Aj, A − Aj, −A + Aj, A − Aj, −A + Aj, −A + Aj, −A + Aj, −A + Aj, A + Aj, A + Aj, A + Aj, −A − Aj, −A − Aj, −A − Aj, A − Aj, −A − Aj, −A − Aj, A + Aj, −A − Aj, −A − Aj, A − Aj |

TABLE 8-1-continued

| Index | Polarization | Pilot sequence |
|---|---|---|
| 9 | Polarization 1 | A − Aj, −A − Aj, −A + Aj, A − Aj, −A − Aj, A + Aj, A − Aj, A + Aj, −A + Aj, A + Aj, −A + Aj, −A + Aj, A + Aj, −A + Aj, A − Aj, −A + Aj, −A + Aj, −A + Aj, A − Aj, A + Aj, A + Aj, A + Aj, −A − Aj, −A − Aj, −A + Aj, A − Aj, A + Aj, −A + Aj, A − Aj, −A − Aj, A − Aj, −A + Aj, A + Aj, −A − Aj, −A − Aj, A − Aj, −A − Aj, A + Aj, A − Aj, −A + Aj, A − Aj, −A − Aj, −A − Aj, −A − Aj, A + Aj, A − Aj, −A − Aj, A + Aj |
| | Polarization 2 | A + Aj, −A + Aj, A + Aj, −A − Aj, A − Aj, A + Aj, −A − Aj, −A + Aj, A − Aj, −A − Aj, −A + Aj, −A + Aj, −A − Aj, −A − Aj, A − Aj, −A + Aj, A − Aj, −A + Aj, A + Aj, −A − Aj, A − Aj, −A + Aj, A + Aj, A − Aj, A + Aj, −A + Aj, −A + Aj, A − Aj, A − Aj, A − Aj, −A − Aj, A − Aj, A − Aj, A + Aj, A + Aj, −A − Aj, −A − Aj, A + Aj, −A + Aj, −A − Aj, −A − Aj, A + Aj, −A − Aj, −A + Aj, A + Aj, −A + Aj, A − Aj, A + Aj |
| 10 | Polarization 1 | A + Aj, −A − Aj, −A + Aj, A + Aj, −A − Aj, −A − Aj, −A − Aj, −A + Aj, A − Aj, −A + Aj, A + Aj, −A − Aj, −A + Aj, −A − Aj, −A − Aj, A + Aj, A − Aj, −A + Aj, −A − Aj, −A + Aj, A − Aj, A + Aj, −A + Aj, A − Aj, −A − Aj, −A − Aj, A + Aj, A + Aj, A + Aj, −A + Aj, A − Aj, A − Aj, A − Aj, −A + Aj, A − Aj, A + Aj, A − Aj, A − Aj, A + Aj, A − Aj, A + Aj, −A + Aj, A + Aj, −A − Aj, −A + Aj, A − Aj, −A − Aj, −A + Aj |
| | Polarization 2 | A + Aj, −A + Aj, A − Aj, A + Aj, A − Aj, −A − Aj, A + Aj, −A − Aj, −A − Aj, A − Aj, A + Aj, −A − Aj, −A − Aj, A + Aj, A + Aj, −A + Aj, −A + Aj, −A − Aj, −A + Aj, −A + Aj, −A + Aj, A − Aj, A − Aj, A + Aj, −A + Aj, A + Aj, A − Aj, −A + Aj, −A − Aj, A + Aj, A − Aj, −A + Aj, A − Aj, −A + Aj, −A − Aj, −A − Aj, A − Aj, A − Aj, −A − Aj, −A + Aj, A − Aj, −A − Aj, A + Aj, −A + Aj, −A − Aj, A + Aj, A − Aj, A + Aj |
| 11 | Polarization 1 | −A − Aj, A + Aj, A − Aj, −A + Aj, −A − Aj, A − Aj, A − Aj, −A + Aj, −A + Aj, A − Aj, A + Aj, A + Aj, −A + Aj, A + Aj, −A + Aj, A − Aj, −A − Aj, A + Aj, −A − Aj, A + Aj, −A + Aj, −A − Aj, A − Aj, A − Aj, A − Aj, A + Aj, A − Aj, A + Aj, A + Aj, A + Aj, A − Aj, −A + Aj, A − Aj, −A − Aj, −A − Aj, −A + Aj, −A + Aj, −A + Aj, −A − Aj, −A − Aj, −A + Aj, A + Aj, A + Aj, A − Aj, −A − Aj, −A + Aj, −A − Aj, −A − Aj |
| | Polarization 2 | A + Aj, −A − Aj, −A + Aj, −A − Aj, −A − Aj, A − Aj, A − Aj, −A + Aj, A − Aj, −A − Aj, A + Aj, A + Aj, −A + Aj, −A + Aj, −A − Aj, A − Aj, −A − Aj, A + Aj, A + Aj, A − Aj, A + Aj, −A − Aj, A − Aj, −A − Aj, −A + Aj, A − Aj, A − Aj, A + Aj, −A − Aj, −A + Aj, −A + Aj, A + Aj, A − Aj, A − Aj, −A + Aj, A + Aj, −A − Aj, −A + Aj, A + Aj, −A + Aj, −A − Aj, A − Aj, −A + Aj, −A − Aj, A + Aj, A − Aj, A + Aj, −A + Aj |
| 12 | Polarization 1 | −A − Aj, −A − Aj, A − Aj, −A − Aj, −A + Aj, A + Aj, A + Aj, A − Aj, −A − Aj, −A − Aj, A − Aj, A − Aj, A − Aj, −A − Aj, −A − Aj, −A + Aj, A − Aj, −A + Aj, A + Aj, A + Aj, A + Aj, −A + Aj, A + Aj, −A + Aj, −A + Aj, −A + Aj, −A − Aj, A − Aj, A + Aj, −A − Aj, A + Aj, −A − Aj, −A + Aj, A − Aj, A + Aj, A − Aj, A + Aj, A + Aj, −A + Aj, A − Aj, A − Aj, −A + Aj, −A + Aj, −A − Aj, A − Aj, −A + Aj, A + Aj, −A − Aj |
| | Polarization 2 | A − Aj, A − Aj, −A − Aj, A + Aj, −A + Aj, −A + Aj, A − Aj, −A − Aj, −A + Aj, −A − Aj, A + Aj, −A + Aj, A + Aj, A + Aj, −A − Aj, −A + Aj, −A − Aj, A − Aj, A − Aj, A + Aj, A + Aj, −A − Aj, −A + Aj, A − Aj, −A + Aj, −A + Aj, −A − Aj, −A − Aj, A − Aj, −A − Aj, A + Aj, −A − Aj, −A − Aj, −A + Aj, A + Aj, A − Aj, A + Aj, A + Aj, A + Aj, −A + Aj, −A + Aj, A − Aj, A − Aj, A − Aj, A + Aj, −A − Aj, A − Aj, −A + Aj |

TABLE 8-2

| Index | Polarization | Pilot sequence |
|---|---|---|
| 1 | Polarization 1 | −A − Aj, A − Aj, A − Aj, −A + Aj, −A + Aj, −A + Aj, −A + Aj, A − Aj, −A − Aj, −A + Aj, −A − Aj, −A − Aj, −A − Aj, −A + Aj, −A + Aj, A + Aj, −A − Aj, A + Aj, A + Aj, A + Aj, −A − Aj, −A + Aj, A − Aj, A − Aj, A + Aj, A + Aj, A − Aj, A + Aj, −A + Aj, −A − Aj, −A − Aj, A + Aj, A + Aj, −A − Aj, A − Aj, −A − Aj, A + Aj, A − Aj, A + Aj, A − Aj, A − Aj, −A + Aj, A − Aj, A + Aj, −A − Aj, A + Aj, −A − Aj, −A + Aj |
| | Polarization 2 | −A + Aj, A + Aj, A + Aj, −A − Aj, −A − Aj, −A − Aj, −A − Aj, A + Aj, −A + Aj, −A − Aj, −A + Aj, −A + Aj, −A + Aj, −A − Aj, −A − Aj, A − Aj, −A + Aj, A − Aj, A − Aj, A − Aj, −A + Aj, −A − Aj, A + Aj, A + Aj, A − Aj, A − Aj, A + Aj, A − Aj, −A − Aj, −A + Aj, −A + Aj, A − Aj, A − Aj, −A + Aj, A + Aj, −A + Aj, A − Aj, A + Aj, A − Aj, A + Aj, A + Aj, −A − Aj, A + Aj, A − Aj, −A + Aj, A − Aj, −A + Aj, −A − Aj |
| 2 | Polarization 1 | −A − Aj, A − Aj, A − Aj, −A + Aj, −A + Aj, −A + Aj, −A + Aj, A − Aj, −A − Aj, −A + Aj, −A − Aj, −A − Aj, −A − Aj, −A + Aj, −A + Aj, A + Aj, −A − Aj, A + Aj, A + Aj, A + Aj, −A − Aj, −A + Aj, A − Aj, A − Aj, A + Aj, A + Aj, A − Aj, A + Aj, −A + Aj, −A − Aj, −A − Aj, A + Aj, A + Aj, −A − Aj, A − Aj, −A − Aj, A + Aj, A − Aj, A + Aj, A − Aj, A − Aj, −A + Aj, A − Aj, A + Aj, −A − Aj, A + Aj, −A − Aj, −A + Aj |
| | Polarization 2 | A − Aj, −A − Aj, −A − Aj, A + Aj, A + Aj, A + Aj, A + Aj, −A − Aj, A − Aj, A + Aj, A − Aj, A − Aj, A − Aj, A + Aj, A + Aj, −A + Aj, A − Aj, −A + Aj, −A + Aj, −A + Aj, A − Aj, A + Aj, −A − Aj, −A − Aj, −A + Aj, −A + Aj, −A − Aj, −A + Aj, A + Aj, A − Aj, A − Aj, −A + Aj, −A + Aj, A − Aj, −A − Aj, A − Aj, −A + Aj, −A − Aj, −A + Aj, −A − Aj, −A − Aj, A + Aj, −A − Aj, −A + Aj, A − Aj, −A + Aj, A − Aj, A + Aj |
| 3 | Polarization 1 | A + Aj, −A + Aj, −A + Aj, A − Aj, A − Aj, A − Aj, A − Aj, −A + Aj, A + Aj, A − Aj, A + Aj, A + Aj, A + Aj, A − Aj, A − Aj, −A − Aj, A + Aj, −A − Aj, −A − Aj, −A − Aj, A + Aj, A − Aj, −A + Aj, −A + Aj, −A − Aj, −A − Aj, −A + Aj, −A − Aj, A − Aj, A + Aj, A + Aj, −A − Aj, −A − Aj, A + Aj, −A + Aj, A + Aj, −A − Aj, −A + Aj, −A − Aj, −A + Aj, −A + Aj, A − Aj, −A + Aj, −A − Aj, A + Aj, −A − Aj, A + Aj, A − Aj |
| | Polarization 2 | −A + Aj, A + Aj, A + Aj, −A − Aj, −A − Aj, −A − Aj, −A − Aj, A + Aj, −A + Aj, −A − Aj, −A + Aj, −A + Aj, −A + Aj, −A − Aj, −A − Aj, A − Aj, −A + Aj, A − Aj, A − Aj, A − Aj, −A + Aj, −A − Aj, A + Aj, A + Aj, A − Aj, A − Aj, A + Aj, A − Aj, −A − Aj, −A + Aj, −A + Aj, A − Aj, A − Aj, −A + Aj, A + Aj, −A + Aj, A − Aj, A + Aj, A − Aj, A + Aj, A + Aj, −A − Aj, A + Aj, A − Aj, −A + Aj, A − Aj, −A + Aj, −A − Aj |

TABLE 8-2-continued

| Index | Polarization | Pilot sequence |
|---|---|---|
| 4 | Polarization 1 | A + Aj, −A + Aj, −A + Aj, A − Aj, A − Aj, A − Aj, A − Aj, −A + Aj, A + Aj, A − Aj, A + Aj, A + Aj, A + Aj, A − Aj, A − Aj, −A − Aj, A + Aj, −A − Aj, −A − Aj, −A − Aj, A + Aj, A − Aj, −A + Aj, −A + Aj, −A − Aj, −A − Aj, −A + Aj, −A − Aj, A − Aj, A + Aj, A + Aj, −A − Aj, −A − Aj, A + Aj, −A + Aj, A + Aj, −A − Aj, −A + Aj, −A − Aj, −A + Aj, −A + Aj, A − Aj, −A + Aj, −A − Aj, A + Aj, −A − Aj, A + Aj, A − Aj |
| | Polarization 2 | A − Aj, −A − Aj, −A − Aj, A + Aj, A + Aj, A + Aj, A + Aj, −A − Aj, A − Aj, A + Aj, A − Aj, A − Aj, A − Aj, A + Aj, A + Aj, −A + Aj, A − Aj, −A + Aj, −A + Aj, −A + Aj, A − Aj, A + Aj, −A − Aj, −A − Aj, −A + Aj, −A + Aj, −A − Aj, −A + Aj, A + Aj, A − Aj, A − Aj, −A + Aj, −A + Aj, A − Aj, −A − Aj, A − Aj, −A + Aj, −A − Aj, −A + Aj, −A − Aj, −A − Aj, A + Aj, −A − Aj, −A + Aj, A − Aj, −A + Aj, A − Aj, A + Aj |
| 5 | Polarization 1 | −A + Aj, A + Aj, −A − Aj, A + Aj, −A − Aj, A − Aj, −A + Aj, A − Aj, A − Aj, −A − Aj, A − Aj, −A − Aj, A + Aj, A − Aj, A + Aj, −A − Aj, −A − Aj, A + Aj, A + Aj, −A + Aj, −A − Aj, A − Aj, −A − Aj, −A − Aj, A − Aj, A − Aj, −A + Aj, A + Aj, −A − Aj, −A − Aj, −A − Aj, A + Aj, −A − Aj, −A + Aj, −A + Aj, A + Aj, A + Aj, A + Aj, −A + Aj, A + Aj, A − Aj, −A + Aj, −A + Aj, −A + Aj, −A + Aj, A − Aj, A − Aj, A + Aj |
| | Polarization 2 | −A − Aj, A − Aj, −A + Aj, A − Aj, −A + Aj, A + Aj, −A − Aj, A + Aj, A + Aj, −A + Aj, A + Aj, −A + Aj, A − Aj, A + Aj, A − Aj, −A + Aj, −A + Aj, A − Aj, A − Aj, −A − Aj, −A + Aj, A + Aj, −A + Aj, −A + Aj, A + Aj, A + Aj, −A − Aj, A − Aj, −A + Aj, −A + Aj, −A + Aj, A − Aj, −A + Aj, −A − Aj, −A − Aj, A − Aj, A − Aj, A − Aj, −A − Aj, A − Aj, A + Aj, −A − Aj, −A − Aj, −A − Aj, −A − Aj, A + Aj, A + Aj, A − Aj |
| 6 | Polarization 1 | −A + Aj, A + Aj, −A − Aj, A + Aj, −A − Aj, A − Aj, −A + Aj, A − Aj, A − Aj, −A − Aj, A − Aj, −A − Aj, A + Aj, A − Aj, A + Aj, −A − Aj, −A − Aj, A + Aj, A + Aj, −A + Aj, −A − Aj, A − Aj, −A − Aj, −A − Aj, A − Aj, A − Aj, −A + Aj, A + Aj, −A − Aj, −A − Aj, −A − Aj, A + Aj, −A − Aj, −A + Aj, −A + Aj, A + Aj, A + Aj, A + Aj, −A + Aj, A + Aj, A − Aj, −A + Aj, −A + Aj, −A + Aj, −A + Aj, A − Aj, A − Aj, A + Aj |
| | Polarization 2 | A + Aj, −A + Aj, A − Aj, −A + Aj, A − Aj, −A − Aj, A + Aj, −A − Aj, −A − Aj, A − Aj, −A − Aj, A − Aj, −A + Aj, −A − Aj, −A + Aj, A − Aj, A − Aj, −A + Aj, −A + Aj, A + Aj, A − Aj, −A − Aj, A − Aj, A − Aj, −A − Aj, −A − Aj, A + Aj, −A + Aj, A − Aj, A − Aj, A − Aj, −A + Aj, A − Aj, A + Aj, A + Aj, −A + Aj, −A + Aj, −A + Aj, A + Aj, −A + Aj, −A − Aj, A + Aj, A + Aj, A + Aj, A + Aj, −A − Aj, −A − Aj, −A + Aj |
| 7 | Polarization 1 | A − Aj, −A − Aj, A + Aj, −A − Aj, A + Aj, −A + Aj, A − Aj, −A + Aj, −A + Aj, A + Aj, −A + Aj, A + Aj, −A − Aj, −A + Aj, −A − Aj, A + Aj, A + Aj, −A − Aj, −A − Aj, A − Aj, A + Aj, −A + Aj, A + Aj, A + Aj, −A + Aj, −A + Aj, A − Aj, −A − Aj, A + Aj, A + Aj, A + Aj, −A − Aj, A + Aj, A − Aj, A − Aj, −A − Aj, −A − Aj, −A − Aj, A − Aj, −A − Aj, −A + Aj, A − Aj, A − Aj, A − Aj, A − Aj, −A + Aj, −A + Aj, −A − Aj |
| | Polarization 2 | −A − Aj, A − Aj, −A + Aj, A − Aj, −A + Aj, A + Aj, −A − Aj, A + Aj, A + Aj, −A + Aj, A + Aj, −A + Aj, A − Aj, A + Aj, A − Aj, −A + Aj, −A + Aj, A − Aj, A − Aj, −A − Aj, −A + Aj, A + Aj, −A + Aj, −A + Aj, A + Aj, A + Aj, −A − Aj, A − Aj, −A + Aj, −A + Aj, −A + Aj, A − Aj, −A + Aj, −A − Aj, −A − Aj, A − Aj, A − Aj, A − Aj, −A − Aj, A − Aj, A + Aj, −A − Aj, −A − Aj, −A − Aj, −A − Aj, A + Aj, A + Aj, A − Aj |
| 8 | Polarization 1 | A − Aj, −A − Aj, A + Aj, −A − Aj, A + Aj, −A + Aj, A − Aj, −A + Aj, −A + Aj, A + Aj, −A + Aj, A + Aj, −A − Aj, −A + Aj, −A − Aj, A + Aj, A + Aj, −A − Aj, −A − Aj, A − Aj, A + Aj, −A + Aj, A + Aj, A + Aj, −A + Aj, −A + Aj, A − Aj, −A − Aj, A + Aj, A + Aj, A + Aj, −A − Aj, A + Aj, A − Aj, A − Aj, −A − Aj, −A − Aj, −A − Aj, A − Aj, −A − Aj, −A + Aj, A − Aj, A − Aj, A − Aj, A − Aj, −A + Aj, −A + Aj, −A − Aj |
| | Polarization 2 | A + Aj, −A + Aj, A − Aj, −A + Aj, A − Aj, −A − Aj, A + Aj, −A − Aj, −A − Aj, A − Aj, −A − Aj, A − Aj, −A + Aj, −A − Aj, −A + Aj, A − Aj, A − Aj, −A + Aj, −A + Aj, A + Aj, A − Aj, −A − Aj, A − Aj, A − Aj, −A − Aj, −A − Aj, A + Aj, −A + Aj, A − Aj, A − Aj, A − Aj, −A + Aj, A − Aj, A + Aj, A + Aj, −A + Aj, −A + Aj, −A + Aj, A + Aj, −A + Aj, −A − Aj, A + Aj, A + Aj, A + Aj, A + Aj, −A − Aj, −A − Aj, −A + Aj |
| 9 | Polarization 1 | −A + Aj, A + Aj, A + Aj, A + Aj, A + Aj, A − Aj, A − Aj, −A − Aj, −A + Aj, −A + Aj, A − Aj, −A − Aj, A + Aj, A + Aj, A − Aj, A + Aj, −A + Aj, −A − Aj, −A − Aj, A + Aj, −A − Aj, −A − Aj, −A − Aj, −A − Aj, A − Aj, −A + Aj, −A − Aj, A − Aj, −A + Aj, A + Aj, −A + Aj, A − Aj, −A − Aj, A − Aj, A + Aj, −A − Aj, A − Aj, −A + Aj, A + Aj, A − Aj, −A − Aj, −A − Aj, −A + Aj, −A + Aj, A − Aj, A + Aj, −A + Aj, A + Aj |
| | Polarization 2 | −A + Aj, A − Aj, A − Aj, A − Aj, −A − Aj, A − Aj, A − Aj, −A + Aj, A + Aj, −A − Aj, A − Aj, A − Aj, A + Aj, A + Aj, A + Aj, −A − Aj, A − Aj, A + Aj, A + Aj, −A + Aj, A − Aj, −A − Aj, −A + Aj, −A + Aj, −A − Aj, −A + Aj, A + Aj, −A + Aj, A + Aj, −A − Aj, −A − Aj, A − Aj, −A − Aj, −A + Aj, A + Aj, −A − Aj, A − Aj, −A + Aj, −A + Aj, A + Aj, −A − Aj, A − Aj, −A − Aj, A − Aj, A + Aj, −A + Aj, −A + Aj, −A + Aj |
| 10 | Polarization 1 | −A + Aj, A + Aj, A + Aj, A + Aj, A + Aj, A − Aj, A − Aj, −A − Aj, −A + Aj, −A + Aj, A − Aj, −A − Aj, A + Aj, A + Aj, A − Aj, A + Aj, −A + Aj, −A − Aj, −A − Aj, A + Aj, −A − Aj, −A − Aj, −A − Aj, −A − Aj, A − Aj, −A + Aj, −A − Aj, A − Aj, −A + Aj, A + Aj, −A + Aj, A − Aj, −A − Aj, A − Aj, A + Aj, −A − Aj, A − Aj, −A + Aj, A + Aj, A − Aj, −A − Aj, −A − Aj, −A + Aj, −A + Aj, A − Aj, A + Aj, −A + Aj, A + Aj |
| | Polarization 2 | A − Aj, A − Aj, −A − Aj, A − Aj, A − Aj, −A + Aj, A + Aj, −A − Aj, A − Aj, A − Aj, A + Aj, A + Aj, A + Aj, −A − Aj, A − Aj, A + Aj, A + Aj, −A + Aj, A − Aj, −A − Aj, −A + Aj, −A + Aj, −A − Aj, −A + Aj, A + Aj, −A + Aj, A + Aj, −A − Aj, −A − Aj, A − Aj, −A − Aj, −A + Aj, A + Aj, −A − Aj, A − Aj, −A + Aj, −A + Aj, A + Aj, −A − Aj, A − Aj, −A − Aj, A − Aj, A + Aj, −A + Aj, −A + Aj, −A + Aj, A − Aj, −A + Aj |
| 11 | Polarization 1 | A + Aj, A + Aj, A + Aj, A + Aj, A − Aj, A − Aj, −A − Aj, −A + Aj, −A + Aj, A − Aj, −A − Aj, A + Aj, A + Aj, A − Aj, A + Aj, −A + Aj, −A − Aj, −A − Aj, A + Aj, −A − Aj, −A − Aj, −A − Aj, −A − Aj, A − Aj, −A + Aj, −A − Aj, A − Aj, −A + Aj, A + Aj, −A + Aj, A − Aj, −A − Aj, A − Aj, A + Aj, −A − Aj, A − Aj, −A + Aj, A + Aj, A − Aj, −A − Aj, −A − Aj, −A + Aj, −A + Aj, A − Aj, A + Aj, −A + Aj, A + Aj, −A + Aj |

TABLE 8-2-continued

| Index | Polarization | Pilot sequence |
|---|---|---|
| | Polarization 2 | −A + Aj, A − Aj, A − Aj, A − Aj, −A − Aj, A − Aj, A − Aj, −A + Aj, A + Aj, −A − Aj, A − Aj, A − Aj, A + Aj, A + Aj, A + Aj, −A − Aj, A − Aj, A + Aj, A + Aj, −A + Aj, A − Aj, −A − Aj, −A + Aj, −A + Aj, −A − Aj, −A + Aj, A + Aj, −A + Aj, A + Aj, −A − Aj, −A − Aj, A − Aj, −A − Aj, −A + Aj, A + Aj, −A − Aj, A − Aj, −A + Aj, −A + Aj, A + Aj, −A − Aj, A − Aj, −A − Aj, A − Aj, A + Aj, −A + Aj, −A + Aj, −A + Aj |
| 12 | Polarization 1 | A + Aj, A + Aj, A + Aj, A + Aj, A − Aj, A − Aj, −A − Aj, −A + Aj, −A + Aj, A − Aj, −A − Aj, A + Aj, A + Aj, A − Aj, A + Aj, −A + Aj, −A − Aj, −A − Aj, A + Aj, −A − Aj, −A − Aj, −A − Aj, −A − Aj, A − Aj, −A + Aj, −A − Aj, A − Aj, −A + Aj, A + Aj, −A + Aj, A − Aj, −A − Aj, A − Aj, A + Aj, −A − Aj, A − Aj, −A + Aj, A + Aj, A − Aj, −A − Aj, −A − Aj, −A + Aj, −A + Aj, A − Aj, A + Aj, −A + Aj, A + Aj, −A + Aj |
| | Polarization 2 | A − Aj, A − Aj, −A − Aj, A − Aj, A − Aj, −A + Aj, A + Aj, −A − Aj, A − Aj, A − Aj, A + Aj, A + Aj, A + Aj, −A − Aj, A − Aj, A + Aj, A + Aj, −A + Aj, A − Aj, −A − Aj, −A + Aj, −A + Aj, −A − Aj, −A + Aj, A + Aj, −A + Aj, A + Aj, −A − Aj, −A − Aj, A − Aj, −A − Aj, −A + Aj, A + Aj, −A − Aj, A − Aj, −A + Aj, −A + Aj, A + Aj, −A − Aj, A − Aj, −A − Aj, A − Aj, A + Aj, −A + Aj, −A + Aj, −A + Aj, A − Aj, −A + Aj |
| 13 | Polarization 1 | −A + Aj, A + Aj, −A + Aj, −A + Aj, −A − Aj, A − Aj, A − Aj, A + Aj, −A + Aj, A + Aj, −A + Aj, A + Aj, −A − Aj, A + Aj, −A − Aj, −A − Aj, −A + Aj, A − Aj, −A + Aj, −A − Aj, −A − Aj, A − Aj, −A − Aj, −A − Aj, −A − Aj, −A − Aj, A + Aj, −A + Aj, A + Aj, A − Aj, −A + Aj, A − Aj, A − Aj, A + Aj, A + Aj, −A + Aj, A + Aj, −A + Aj, A − Aj, A − Aj, −A − Aj, A + Aj, −A − Aj, A − Aj, A + Aj, −A − Aj, A + Aj, A − Aj |
| | Polarization 2 | A − Aj, A − Aj, A − Aj, −A + Aj, −A − Aj, A + Aj, −A + Aj, −A − Aj, A − Aj, −A − Aj, A + Aj, −A − Aj, −A + Aj, A − Aj, A + Aj, −A + Aj, A + Aj, A + Aj, −A − Aj, −A − Aj, A − Aj, −A + Aj, −A + Aj, A − Aj, −A − Aj, −A + Aj, A + Aj, −A − Aj, −A + Aj, −A + Aj, A + Aj, −A − Aj, A − Aj, −A + Aj, A − Aj, −A + Aj, −A − Aj, A + Aj, A + Aj, A + Aj, A − Aj, −A + Aj, A − Aj, −A + Aj, A − Aj, −A − Aj, A + Aj, A − Aj |
| 14 | Polarization 1 | −A + Aj, A + Aj, −A + Aj, −A + Aj, −A − Aj, A − Aj, A − Aj, A + Aj, −A + Aj, A + Aj, −A + Aj, A + Aj, −A − Aj, A + Aj, −A − Aj, −A − Aj, −A + Aj, A − Aj, −A + Aj, −A − Aj, −A − Aj, A − Aj, −A − Aj, −A − Aj, −A − Aj, −A − Aj, A + Aj, −A + Aj, A + Aj, A − Aj, −A + Aj, A − Aj, A − Aj, A + Aj, A + Aj, −A + Aj, A + Aj, −A + Aj, A − Aj, A − Aj, −A − Aj, A + Aj, −A − Aj, A − Aj, A + Aj, −A − Aj, A + Aj, A − Aj |
| | Polarization 2 | A − Aj, A − Aj, A − Aj, A − Aj, −A + Aj, −A − Aj, A + Aj, −A + Aj, −A − Aj, A − Aj, −A − Aj, A + Aj, −A − Aj, −A + Aj, A − Aj, A + Aj, −A + Aj, A + Aj, A + Aj, −A − Aj, −A − Aj, A − Aj, −A + Aj, −A + Aj, A − Aj, −A − Aj, −A + Aj, A + Aj, −A − Aj, −A + Aj, −A + Aj, A + Aj, −A − Aj, A − Aj, −A + Aj, A − Aj, −A + Aj, −A − Aj, A + Aj, A + Aj, A + Aj, A − Aj, −A + Aj, A − Aj, −A + Aj, A − Aj, −A − Aj, A + Aj |
| 15 | Polarization 1 | A + Aj, −A + Aj, −A + Aj, −A − Aj, A − Aj, A − Aj, A + Aj, −A + Aj, A + Aj, −A + Aj, A + Aj, −A − Aj, A + Aj, −A − Aj, −A − Aj, −A + Aj, A − Aj, −A + Aj, −A − Aj, −A − Aj, A − Aj, −A − Aj, −A − Aj, −A − Aj, −A − Aj, A + Aj, −A + Aj, A + Aj, A − Aj, −A + Aj, A − Aj, A − Aj, A + Aj, A + Aj, −A + Aj, A + Aj, −A + Aj, A − Aj, A − Aj, −A − Aj, A + Aj, −A − Aj, A − Aj, A + Aj, −A − Aj, A + Aj, A − Aj, −A + Aj |
| | Polarization 2 | A − Aj, A − Aj, A − Aj, −A + Aj, −A − Aj, A + Aj, −A + Aj, −A − Aj, A − Aj, −A − Aj, A + Aj, −A − Aj, −A + Aj, A − Aj, A + Aj, −A + Aj, A + Aj, A + Aj, −A − Aj, −A − Aj, A − Aj, −A + Aj, −A + Aj, A − Aj, −A − Aj, −A + Aj, A + Aj, −A − Aj, −A + Aj, −A + Aj, A + Aj, −A − Aj, A − Aj, −A + Aj, A − Aj, −A + Aj, −A − Aj, A + Aj, A + Aj, A + Aj, A − Aj, −A + Aj, A − Aj, −A + Aj, A − Aj, −A − Aj, A + Aj, A − Aj |
| 16 | Polarization 1 | A + Aj, −A + Aj, −A + Aj, −A − Aj, A − Aj, A − Aj, A + Aj, −A + Aj, A + Aj, −A + Aj, A + Aj, −A − Aj, A + Aj, −A − Aj, −A − Aj, −A + Aj, A − Aj, −A + Aj, −A − Aj, −A − Aj, A − Aj, −A − Aj, −A − Aj, −A − Aj, −A − Aj, A + Aj, −A + Aj, A + Aj, A − Aj, −A + Aj, A − Aj, A − Aj, A + Aj, A + Aj, −A + Aj, A + Aj, −A + Aj, A − Aj, A − Aj, −A − Aj, A + Aj, −A − Aj, A − Aj, A + Aj, −A − Aj, A + Aj, A − Aj, −A + Aj |
| | Polarization 2 | A − Aj, A − Aj, A − Aj, A − Aj, −A + Aj, −A − Aj, A + Aj, −A + Aj, −A − Aj, A − Aj, −A − Aj, A + Aj, −A − Aj, −A + Aj, A − Aj, A + Aj, −A + Aj, A + Aj, A + Aj, −A − Aj, −A − Aj, A − Aj, −A + Aj, −A + Aj, A − Aj, −A − Aj, −A + Aj, A + Aj, −A − Aj, −A + Aj, −A + Aj, A + Aj, −A − Aj, A − Aj, −A + Aj, A − Aj, −A + Aj, −A − Aj, A + Aj, A + Aj, A + Aj, A − Aj, −A + Aj, A − Aj, −A + Aj, A − Aj, −A − Aj, A + Aj |
| 17 | Polarization 1 | −A − Aj, −A + Aj, −A − Aj, A − Aj, A + Aj, −A − Aj, A − Aj, −A + Aj, −A − Aj, −A + Aj, A − Aj, A − Aj, −A + Aj, −A + Aj, −A + Aj, A − Aj, A + Aj, A + Aj, A − Aj, −A − Aj, −A − Aj, A + Aj, −A − Aj, −A − Aj, A − Aj, A + Aj, −A + Aj, A − Aj, A − Aj, −A + Aj, −A − Aj, A + Aj, A + Aj, −A − Aj, A + Aj, A + Aj, A + Aj, −A − Aj, −A − Aj, A − Aj, A − Aj, A + Aj, A + Aj, −A + Aj, −A + Aj, −A + Aj, −A − Aj, A + Aj |
| | Polarization 2 | −A − Aj, A − Aj, A − Aj, −A + Aj, −A + Aj, A + Aj, −A − Aj, −A + Aj, A − Aj, A − Aj, A − Aj, −A + Aj, A − Aj, −A − Aj, A + Aj, −A − Aj, −A − Aj, −A + Aj, A + Aj, A − Aj, −A − Aj, A − Aj, A − Aj, A − Aj, A − Aj, −A − Aj, −A + Aj, A + Aj, −A + Aj, A + Aj, −A + Aj, A + Aj, −A − Aj, −A + Aj, −A + Aj, A − Aj, −A + Aj, A + Aj, A − Aj, A + Aj, −A + Aj, −A + Aj, A + Aj, −A − Aj, A + Aj, −A − Aj, −A − Aj, A + Aj |
| 18 | Polarization 1 | A + Aj, −A − Aj, −A − Aj, −A + Aj, −A − Aj, A − Aj, A + Aj, −A − Aj, A − Aj, −A + Aj, −A − Aj, −A + Aj, A − Aj, A − Aj, −A + Aj, −A + Aj, −A + Aj, A − Aj, A + Aj, A + Aj, A − Aj, −A − Aj, −A − Aj, A + Aj, −A − Aj, −A − Aj, A − Aj, A + Aj, −A + Aj, A − Aj, A − Aj, −A + Aj, −A − Aj, A + Aj, A + Aj, −A − Aj, A + Aj, A + Aj, A + Aj, −A − Aj, −A − Aj, A − Aj, A − Aj, A + Aj, A + Aj, −A + Aj, −A + Aj, −A + Aj |
| | Polarization 2 | −A − Aj, A − Aj, A − Aj, −A + Aj, −A + Aj, A + Aj, −A − Aj, −A + Aj, A − Aj, A − Aj, A − Aj, −A + Aj, A − Aj, −A − Aj, A + Aj, −A − Aj, −A − Aj, −A + Aj, A + Aj, A − Aj, −A − Aj, A − Aj, A − Aj, A − Aj, A − Aj, −A − Aj, −A + Aj, A + Aj, −A + Aj, A + Aj, −A + Aj, A + Aj, −A − Aj, −A + Aj, −A + Aj, A − Aj, −A + Aj, A + Aj, A − Aj, A + Aj, −A + Aj, −A + Aj, A + Aj, −A − Aj, A + Aj, −A − Aj, −A − Aj, A + Aj |

TABLE 8-2-continued

| Index | Polarization | Pilot sequence |
|---|---|---|
| 19 | Polarization 1 | A − Aj, A + Aj, A − Aj, A + Aj, −A + Aj, A − Aj, A − Aj, −A − Aj, −A − Aj, −A + Aj, A + Aj, A − Aj, −A + Aj, −A − Aj, A + Aj, −A + Aj, −A − Aj, −A + Aj, A − Aj, A + Aj, A − Aj, −A + Aj, −A − Aj, A − Aj, −A + Aj, −A − Aj, −A − Aj, −A − Aj, −A − Aj, A + Aj, −A − Aj, −A − Aj, A − Aj, A + Aj, −A + Aj, A + Aj, A + Aj, −A − Aj, −A + Aj, A − Aj, A − Aj, −A − Aj, −A + Aj, −A + Aj, A + Aj, A + Aj, A + Aj, A + Aj |
| | Polarization 2 | A − Aj, −A + Aj, A − Aj, A − Aj, A − Aj, A + Aj, −A + Aj, −A − Aj, −A + Aj, −A − Aj, A + Aj, A − Aj, A − Aj, −A + Aj, −A − Aj, A + Aj, A − Aj, −A − Aj, −A + Aj, −A − Aj, −A − Aj, A + Aj, A − Aj, A + Aj, A − Aj, −A − Aj, A − Aj, A − Aj, −A − Aj, −A + Aj, A − Aj, A + Aj, A + Aj, −A + Aj, −A − Aj, A + Aj, A + Aj, A + Aj, −A + Aj, −A + Aj, −A − Aj, A + Aj, A − Aj, −A + Aj, −A + Aj, −A − Aj, −A + Aj, −A + Aj |
| 20 | Polarization 1 | A − Aj, A + Aj, A − Aj, A + Aj, −A + Aj, A − Aj, A − Aj, −A − Aj, −A − Aj, −A + Aj, A + Aj, A − Aj, −A + Aj, −A − Aj, A + Aj, −A + Aj, −A − Aj, −A + Aj, A − Aj, A + Aj, A − Aj, −A + Aj, −A − Aj, A − Aj, −A + Aj, −A − Aj, −A − Aj, −A − Aj, −A − Aj, A + Aj, −A − Aj, −A − Aj, A − Aj, A + Aj, −A + Aj, A + Aj, A + Aj, −A − Aj, −A + Aj, A − Aj, A − Aj, −A − Aj, −A + Aj, −A + Aj, A + Aj, A + Aj, A + Aj, A + Aj |
| | Polarization 2 | A − Aj, A − Aj, A − Aj, A + Aj, −A + Aj, −A − Aj, −A + Aj, −A − Aj, A + Aj, A − Aj, A − Aj, −A + Aj, −A − Aj, A + Aj, A − Aj, −A − Aj, −A + Aj, −A − Aj, −A − Aj, A + Aj, A − Aj, A + Aj, A − Aj, −A − Aj, A − Aj, A − Aj, −A − Aj, −A + Aj, A − Aj, A + Aj, A + Aj, −A + Aj, −A − Aj, A + Aj, A + Aj, A + Aj, −A + Aj, −A + Aj, −A − Aj, A + Aj, A − Aj, −A + Aj, −A + Aj, −A − Aj, −A + Aj, −A + Aj, −A + Aj, A − Aj |
| 21 | Polarization 1 | A + Aj, A − Aj, A + Aj, −A + Aj, A − Aj, A − Aj, −A − Aj, −A − Aj, −A + Aj, A + Aj, A − Aj, −A + Aj, −A − Aj, A + Aj, −A + Aj, −A − Aj, −A + Aj, A − Aj, A + Aj, A − Aj, −A + Aj, −A − Aj, A − Aj, −A + Aj, −A − Aj, −A − Aj, −A − Aj, −A − Aj, A + Aj, −A − Aj, −A − Aj, A − Aj, A + Aj, −A + Aj, A + Aj, A + Aj, −A − Aj, −A + Aj, A − Aj, A − Aj, −A − Aj, −A + Aj, −A + Aj, A + Aj, A + Aj, A + Aj, A + Aj, A − Aj |
| | Polarization 2 | A − Aj, −A + Aj, A − Aj, A − Aj, A − Aj, A + Aj, −A + Aj, −A − Aj, −A + Aj, −A − Aj, A + Aj, A − Aj, A − Aj, −A + Aj, −A − Aj, A + Aj, A − Aj, −A − Aj, −A + Aj, −A − Aj, −A − Aj, A + Aj, A − Aj, A + Aj, A − Aj, −A − Aj, A − Aj, A − Aj, −A − Aj, −A + Aj, A − Aj, A + Aj, A + Aj, −A + Aj, −A − Aj, A + Aj, A + Aj, A + Aj, −A + Aj, −A + Aj, −A − Aj, A + Aj, A − Aj, −A + Aj, −A + Aj, −A − Aj, −A + Aj, −A + Aj |
| 22 | Polarization 1 | A + Aj, A − Aj, A + Aj, −A + Aj, A − Aj, A − Aj, −A − Aj, −A − Aj, −A + Aj, A + Aj, A − Aj, −A + Aj, −A − Aj, A + Aj, −A + Aj, −A − Aj, −A + Aj, A − Aj, A + Aj, A − Aj, −A + Aj, −A − Aj, A − Aj, −A + Aj, −A − Aj, −A − Aj, −A − Aj, −A − Aj, A + Aj, −A − Aj, −A − Aj, A − Aj, A + Aj, −A + Aj, A + Aj, A + Aj, −A − Aj, −A + Aj, A − Aj, A − Aj, −A − Aj, −A + Aj, −A + Aj, A + Aj, A + Aj, A + Aj, A + Aj, A − Aj |
| | Polarization 2 | A − Aj, A − Aj, A − Aj, A + Aj, −A + Aj, −A − Aj, −A + Aj, −A − Aj, A + Aj, A − Aj, A − Aj, −A + Aj, −A − Aj, A + Aj, A − Aj, −A − Aj, −A + Aj, −A − Aj, −A − Aj, A + Aj, A − Aj, A + Aj, A − Aj, −A − Aj, A − Aj, A − Aj, −A − Aj, −A + Aj, A − Aj, A + Aj, A + Aj, −A + Aj, −A − Aj, A + Aj, A + Aj, A + Aj, −A + Aj, −A + Aj, −A − Aj, A + Aj, A − Aj, −A + Aj, −A + Aj, −A − Aj, −A + Aj, −A + Aj, −A + Aj, A − Aj |
| 23 | Polarization 1 | −A + Aj, A + Aj, −A − Aj, A + Aj, −A + Aj, −A − Aj, A + Aj, −A − Aj, −A + Aj, −A + Aj, A − Aj, A + Aj, A − Aj, A + Aj, A + Aj, −A + Aj, −A + Aj, A − Aj, −A + Aj, A + Aj, A − Aj, A + Aj, −A − Aj, −A − Aj, −A − Aj, −A − Aj, −A + Aj, −A − Aj, −A − Aj, A − Aj, −A + Aj, A − Aj, −A − Aj, −A − Aj, A + Aj, −A − Aj, A + Aj, A − Aj, A + Aj, A − Aj, A + Aj, −A + Aj, −A + Aj, −A − Aj, A − Aj, A − Aj, A + Aj, A − Aj |
| | Polarization 2 | −A + Aj, A + Aj, −A − Aj, −A + Aj, A − Aj, −A + Aj, A − Aj, −A + Aj, A + Aj, A + Aj, A + Aj, −A − Aj, A − Aj, −A + Aj, A − Aj, −A + Aj, −A − Aj, A + Aj, A − Aj, A − Aj, −A − Aj, A + Aj, A − Aj, −A − Aj, −A + Aj, A − Aj, A − Aj, −A + Aj, −A − Aj, −A − Aj, A + Aj, A + Aj, A − Aj, A + Aj, −A + Aj, A − Aj, −A − Aj, A + Aj, −A − Aj, −A + Aj, −A − Aj, A − Aj, A + Aj, −A − Aj, A − Aj, −A + Aj, −A + Aj, −A + Aj |
| 24 | Polarization 1 | −A + Aj, A + Aj, −A − Aj, A + Aj, −A + Aj, −A − Aj, A + Aj, −A − Aj, −A + Aj, −A + Aj, A − Aj, A + Aj, A − Aj, A + Aj, A + Aj, −A + Aj, −A + Aj, A − Aj, −A + Aj, A + Aj, A − Aj, A + Aj, −A − Aj, −A − Aj, −A − Aj, −A − Aj, −A + Aj, −A − Aj, −A − Aj, A − Aj, −A + Aj, A − Aj, −A − Aj, −A − Aj, A + Aj, −A − Aj, A + Aj, A − Aj, A + Aj, A − Aj, A + Aj, −A + Aj, −A + Aj, −A − Aj, A − Aj, A − Aj, A + Aj, A − Aj |
| | Polarization 2 | A + Aj, −A − Aj, −A + Aj, A − Aj, −A + Aj, A − Aj, −A + Aj, A + Aj, A + Aj, A + Aj, −A − Aj, A − Aj, −A + Aj, A − Aj, −A + Aj, −A − Aj, A + Aj, A − Aj, A − Aj, −A − Aj, A + Aj, A − Aj, −A − Aj, −A + Aj, A − Aj, A − Aj, −A + Aj, −A − Aj, −A − Aj, A + Aj, A + Aj, A − Aj, A + Aj, −A + Aj, A − Aj, −A − Aj, A + Aj, −A − Aj, −A + Aj, −A − Aj, A − Aj, A + Aj, −A − Aj, A − Aj, −A + Aj, −A + Aj, −A + Aj, −A + Aj |
| 25 | Polarization 1 | A − Aj, −A + Aj, A + Aj, −A − Aj, A + Aj, −A + Aj, −A − Aj, A + Aj, −A − Aj, −A + Aj, −A + Aj, A − Aj, A + Aj, A − Aj, A + Aj, A + Aj, −A + Aj, −A + Aj, A − Aj, −A + Aj, A + Aj, A − Aj, A + Aj, −A − Aj, −A − Aj, −A − Aj, −A − Aj, −A + Aj, −A − Aj, −A − Aj, A − Aj, −A + Aj, A − Aj, −A − Aj, −A − Aj, A + Aj, −A − Aj, A + Aj, A − Aj, A + Aj, A − Aj, A + Aj, −A + Aj, −A + Aj, −A − Aj, A − Aj, A − Aj, A + Aj |
| | Polarization 2 | −A + Aj, A + Aj, −A − Aj, −A + Aj, A − Aj, −A + Aj, A − Aj, −A + Aj, A + Aj, A + Aj, A + Aj, −A − Aj, A − Aj, −A + Aj, A − Aj, −A + Aj, −A − Aj, A + Aj, A − Aj, A − Aj, −A − Aj, A + Aj, A − Aj, −A − Aj, −A + Aj, A − Aj, A − Aj, −A + Aj, −A − Aj, −A − Aj, A + Aj, A + Aj, A − Aj, A + Aj, −A + Aj, A − Aj, −A − Aj, A + Aj, −A − Aj, −A + Aj, −A − Aj, A − Aj, A + Aj, −A − Aj, A − Aj, −A + Aj, −A + Aj, −A + Aj |
| 26 | Polarization 1 | A − Aj, −A + Aj, A + Aj, −A − Aj, A + Aj, −A + Aj, −A − Aj, A + Aj, −A − Aj, −A + Aj, −A + Aj, A − Aj, A + Aj, A − Aj, A + Aj, A + Aj, −A + Aj, −A + Aj, A − Aj, −A + Aj, A + Aj, A − Aj, A + Aj, −A − Aj, −A − Aj, −A − Aj, −A − Aj, −A + Aj, −A − Aj, −A − Aj, A − Aj, −A + Aj, A − Aj, −A − Aj, −A − Aj, A + Aj, −A − Aj, A + Aj, A − Aj, A + Aj, A − Aj, A + Aj, −A + Aj, −A + Aj, −A − Aj, A − Aj, A − Aj, A + Aj |

TABLE 8-2-continued

| Index | Polarization | Pilot sequence |
|---|---|---|
| | Polarization 2 | A + Aj, −A − Aj, −A + Aj, A − Aj, −A + Aj, A − Aj, −A + Aj, A + Aj, A + Aj, A + Aj, −A − Aj, A − Aj, −A + Aj, A − Aj, −A + Aj, −A − Aj, A + Aj, A − Aj, A − Aj, −A − Aj, A + Aj, A − Aj, −A − Aj, −A + Aj, A − Aj, A − Aj, −A + Aj, −A − Aj, −A − Aj, A + Aj, A + Aj, A − Aj, A + Aj, −A + Aj, A − Aj, −A − Aj, A + Aj, −A − Aj, −A + Aj, −A − Aj, A − Aj, A + Aj, −A − Aj, A − Aj, −A + Aj, −A + Aj, −A + Aj, −A + Aj |
| 27 | Polarization 1 | A − Aj, A − Aj, A − Aj, A + Aj, A + Aj, −A + Aj, −A + Aj, −A − Aj, −A − Aj, A + Aj, A + Aj, A + Aj, −A − Aj, A + Aj, A + Aj, −A − Aj, A − Aj, −A + Aj, −A + Aj, A − Aj, A + Aj, −A + Aj, −A − Aj, −A − Aj, A + Aj, −A − Aj, −A − Aj, −A + Aj, A + Aj, A + Aj, −A + Aj, A − Aj, A − Aj, A − Aj, −A + Aj, −A + Aj, A − Aj, −A − Aj, A − Aj, −A + Aj, −A − Aj, A + Aj, −A + Aj, −A − Aj, A − Aj, −A − Aj, −A − Aj, A + Aj |
| | Polarization 2 | A + Aj, −A − Aj, −A − Aj, A + Aj, −A − Aj, A + Aj, A − Aj, A − Aj, A + Aj, −A + Aj, A + Aj, A − Aj, −A + Aj, A − Aj, A − Aj, −A − Aj, A + Aj, A − Aj, A + Aj, A − Aj, A + Aj, A − Aj, −A − Aj, −A + Aj, −A + Aj, −A + Aj, −A + Aj, −A − Aj, −A + Aj, A + Aj, A − Aj, −A − Aj, −A − Aj, A + Aj, −A − Aj, −A + Aj, A − Aj, −A + Aj, −A + Aj, −A + Aj, A − Aj, −A − Aj, A + Aj, A − Aj, A − Aj, −A + Aj, −A + Aj, −A − Aj |
| 28 | Polarization 1 | A + Aj, −A − Aj, A − Aj, A − Aj, A − Aj, A + Aj, A + Aj, −A + Aj, −A + Aj, −A − Aj, −A − Aj, A + Aj, A + Aj, A + Aj, −A − Aj, A + Aj, A + Aj, −A − Aj, A − Aj, −A + Aj, −A + Aj, A − Aj, A + Aj, −A + Aj, −A − Aj, −A − Aj, A + Aj, −A − Aj, −A − Aj, −A + Aj, A + Aj, A + Aj, −A + Aj, A − Aj, A − Aj, A − Aj, −A + Aj, −A + Aj, A − Aj, −A − Aj, A − Aj, −A + Aj, −A − Aj, A + Aj, −A + Aj, −A − Aj, A − Aj, −A − Aj |
| | Polarization 2 | A + Aj, −A − Aj, −A − Aj, A + Aj, −A − Aj, A + Aj, A − Aj, A − Aj, A + Aj, −A + Aj, A + Aj, A − Aj, −A + Aj, A − Aj, A − Aj, −A − Aj, A + Aj, A − Aj, A + Aj, A − Aj, A + Aj, A − Aj, −A − Aj, −A + Aj, −A + Aj, −A + Aj, −A + Aj, −A − Aj, −A + Aj, A + Aj, A − Aj, −A − Aj, −A − Aj, A + Aj, −A − Aj, −A + Aj, A − Aj, −A + Aj, −A + Aj, −A + Aj, A − Aj, −A − Aj, A + Aj, A − Aj, A − Aj, −A + Aj, −A + Aj, −A − Aj |

(2) It is assumed that $N_{PS}$=56. If a remainder of $N_{TS}$ divided by 4 is 1, the pilot sequence is one item in the following Table 9-1. If a remainder of $N_{TS}$ divided by 4 is 3, the pilot sequence is one item in the following Table 9-1 or Table 9-2.

TABLE 9-1

| Index | Polarization | Pilot sequence |
|---|---|---|
| 1 | Polarization 1 | −A − Aj, −A − Aj, A + Aj, A + Aj, A − Aj, −A − Aj, A + Aj, A − Aj, A + Aj, A + Aj, −A + Aj, A − Aj, A + Aj, −A − Aj, A + Aj, A − Aj, −A + Aj, −A − Aj, A − Aj, A − Aj, A + Aj, −A + Aj, −A − Aj, A − Aj, −A − Aj, −A − Aj, A − Aj, −A − Aj, A − Aj, −A + Aj, A + Aj, A − Aj, −A + Aj, A − Aj, −A + Aj, −A + Aj, A + Aj, −A + Aj, −A + Aj, −A + Aj, −A − Aj, −A + Aj, A − Aj, −A − Aj, −A − Aj, −A − Aj, A + Aj, −A + Aj, −A + Aj, A + Aj, A + Aj, A − Aj, A − Aj, −A − Aj, −A + Aj, A + Aj |
| | Polarization 2 | −A + Aj, −A + Aj, A − Aj, A − Aj, A + Aj, −A + Aj, A − Aj, A + Aj, A − Aj, A − Aj, −A − Aj, A + Aj, A − Aj, −A + Aj, A − Aj, A + Aj, −A − Aj, −A + Aj, A + Aj, A + Aj, A − Aj, −A − Aj, −A + Aj, A + Aj, −A + Aj, −A + Aj, A + Aj, −A + Aj, A + Aj, −A − Aj, A − Aj, A + Aj, −A − Aj, A + Aj, −A − Aj, −A − Aj, A − Aj, −A − Aj, −A − Aj, −A − Aj, −A + Aj, −A − Aj, A + Aj, −A + Aj, −A + Aj, −A + Aj, A − Aj, −A − Aj, −A − Aj, A − Aj, A − Aj, A + Aj, A + Aj, −A + Aj, −A − Aj, A − Aj |
| 2 | Polarization 1 | −A − Aj, −A − Aj, A + Aj, A + Aj, A − Aj, −A − Aj, A + Aj, A − Aj, A + Aj, A + Aj, −A + Aj, A − Aj, A + Aj, −A − Aj, A + Aj, A − Aj, −A + Aj, −A − Aj, A − Aj, A − Aj, A + Aj, −A + Aj, −A − Aj, A − Aj, −A − Aj, −A − Aj, A − Aj, −A − Aj, A − Aj, −A + Aj, A + Aj, A − Aj, −A + Aj, A − Aj, −A + Aj, −A + Aj, A + Aj, −A + Aj, −A + Aj, −A + Aj, −A − Aj, −A + Aj, A − Aj, −A − Aj, −A − Aj, −A − Aj, A + Aj, −A + Aj, −A + Aj, A + Aj, A + Aj, A − Aj, A − Aj, −A − Aj, −A + Aj, A + Aj |
| | Polarization 2 | A − Aj, A − Aj, −A + Aj, −A + Aj, −A − Aj, A − Aj, −A + Aj, −A − Aj, −A + Aj, −A + Aj, A + Aj, −A − Aj, −A + Aj, A − Aj, −A + Aj, −A − Aj, A + Aj, A − Aj, −A − Aj, −A − Aj, −A + Aj, A + Aj, A − Aj, −A − Aj, A − Aj, A − Aj, −A − Aj, A − Aj, −A − Aj, A + Aj, −A + Aj, −A − Aj, A + Aj, −A − Aj, A + Aj, A + Aj, −A + Aj, A + Aj, A + Aj, A + Aj, A − Aj, A + Aj, −A − Aj, A − Aj, A − Aj, A − Aj, −A + Aj, A + Aj, A + Aj, −A + Aj, −A + Aj, −A − Aj, −A − Aj, A − Aj, A + Aj, −A + Aj |
| 3 | Polarization 1 | −A + Aj, −A + Aj, A − Aj, A − Aj, A + Aj, −A + Aj, A − Aj, A + Aj, A − Aj, A − Aj, −A − Aj, A + Aj, A − Aj, −A + Aj, A − Aj, A + Aj, −A − Aj, −A + Aj, A + Aj, A + Aj, A − Aj, −A − Aj, −A + Aj, A + Aj, −A + Aj, −A + Aj, A + Aj, −A + Aj, A + Aj, −A − Aj, A − Aj, A + Aj, −A − Aj, A + Aj, −A − Aj, −A − Aj, A − Aj, −A − Aj, −A − Aj, −A − Aj, −A + Aj, −A − Aj, A + Aj, −A + Aj, −A + Aj, −A + Aj, A − Aj, −A − Aj, −A − Aj, A − Aj, A − Aj, A + Aj, A + Aj, −A + Aj, −A − Aj, A − Aj |
| | Polarization 2 | A + Aj, A + Aj, −A − Aj, −A − Aj, −A + Aj, A + Aj, −A − Aj, −A + Aj, −A − Aj, −A − Aj, A − Aj, −A + Aj, −A − Aj, A + Aj, −A − Aj, −A + Aj, A − Aj, A + Aj, −A + Aj, −A + Aj, −A − Aj, A − Aj, A + Aj, −A + Aj, A + Aj, A + Aj, −A + Aj, A + Aj, −A + Aj, A − Aj, −A − Aj, −A + Aj, A − Aj, −A + Aj, A − Aj, A − Aj, −A − Aj, A − Aj, A − Aj, A − Aj, A + Aj, A − Aj, −A + Aj, A + Aj, A + Aj, A + Aj, −A − Aj, A − Aj, A − Aj, −A − Aj, −A − Aj, −A + Aj, −A + Aj, A + Aj, A − Aj, −A − Aj |
| 4 | Polarization 1 | A − Aj, A − Aj, −A + Aj, −A + Aj, −A − Aj, A − Aj, −A + Aj, −A − Aj, −A + Aj, −A + Aj, A + Aj, −A − Aj, −A + Aj, A − Aj, −A + Aj, −A − Aj, A + Aj, A − Aj, −A − Aj, −A − Aj, −A + Aj, A + Aj, A − Aj, −A − Aj, A − Aj, A − Aj, −A − Aj, A − Aj, −A − Aj, A + Aj, −A + Aj, −A − Aj, A + Aj, −A − Aj, A + Aj, A + Aj, −A + Aj, A + Aj, A + Aj, A + Aj, A − Aj, A + Aj, −A − Aj, A − Aj, A − Aj, A − Aj, −A + Aj, A + Aj, A + Aj, −A + Aj, −A + Aj, −A − Aj, −A − Aj, A − Aj, A + Aj, −A + Aj |

TABLE 9-1-continued

| Index | Polarization | Pilot sequence |
|---|---|---|
| | Polarization 2 | A + Aj, A + Aj, −A − Aj, −A − Aj, −A + Aj, A + Aj, −A − Aj, −A + Aj, −A − Aj, −A − Aj, A − Aj, −A + Aj, −A − Aj, A + Aj, −A − Aj, −A + Aj, A − Aj, A + Aj, −A + Aj, −A + Aj, −A − Aj, A − Aj, A + Aj, −A + Aj, A + Aj, A + Aj, −A + Aj, A + Aj, −A + Aj, A − Aj, −A − Aj, −A + Aj, A − Aj, −A + Aj, A − Aj, A − Aj, −A − Aj, A − Aj, A − Aj, A − Aj, A + Aj, A − Aj, −A + Aj, A + Aj, A + Aj, A + Aj, −A − Aj, A − Aj, A − Aj, −A − Aj, −A − Aj, −A + Aj, −A + Aj, A + Aj, A − Aj, −A − Aj |
| 5 | Polarization 1 | −A − Aj, −A + Aj, A + Aj, A − Aj, A − Aj, −A − Aj, −A − Aj, −A + Aj, −A + Aj, −A − Aj, A + Aj, A + Aj, A + Aj, A − Aj, −A + Aj, A + Aj, −A + Aj, −A + Aj, −A + Aj, −A − Aj, −A + Aj, −A + Aj, A − Aj, −A + Aj, A − Aj, −A − Aj, −A + Aj, A − Aj, A + Aj, A − Aj, A + Aj, A + Aj, A − Aj, A + Aj, −A + Aj, −A − Aj, A − Aj, A − Aj, A + Aj, −A + Aj, A − Aj, −A − Aj, A + Aj, −A − Aj, A − Aj, −A + Aj, −A − Aj, −A − Aj, A − Aj, −A − Aj, A + Aj, A − Aj, −A − Aj, −A − Aj, A + Aj, A + Aj |
| | Polarization 2 | −A + Aj, −A − Aj, A − Aj, A + Aj, A + Aj, −A + Aj, −A + Aj, −A − Aj, −A − Aj, −A + Aj, A − Aj, A − Aj, A − Aj, A + Aj, −A − Aj, A − Aj, −A − Aj, −A − Aj, −A − Aj, −A + Aj, −A − Aj, −A − Aj, A + Aj, −A − Aj, A + Aj, −A + Aj, −A − Aj, A + Aj, A − Aj, A + Aj, A − Aj, A − Aj, A + Aj, A − Aj, −A − Aj, −A + Aj, A + Aj, A + Aj, A − Aj, −A − Aj, A + Aj, −A + Aj, A − Aj, −A + Aj, A + Aj, −A − Aj, −A + Aj, −A + Aj, A + Aj, −A + Aj, A − Aj, A + Aj, −A + Aj, −A + Aj, A − Aj, A − Aj |
| 6 | Polarization 1 | −A − Aj, −A + Aj, A + Aj, A − Aj, A − Aj, −A − Aj, −A − Aj, −A + Aj, −A + Aj, −A − Aj, A + Aj, A + Aj, A + Aj, A − Aj, −A + Aj, A + Aj, −A + Aj, −A + Aj, −A + Aj, −A − Aj, −A + Aj, −A + Aj, A − Aj, −A + Aj, A − Aj, −A − Aj, −A + Aj, A − Aj, A + Aj, A − Aj, A + Aj, A + Aj, A − Aj, A + Aj, −A + Aj, −A − Aj, A − Aj, A − Aj, A + Aj, −A + Aj, A − Aj, −A − Aj, A + Aj, −A − Aj, A − Aj, −A + Aj, −A − Aj, −A − Aj, A − Aj, −A − Aj, A + Aj, A − Aj, −A − Aj, −A − Aj, A + Aj, A + Aj |
| | Polarization 2 | A − Aj, A + Aj, −A + Aj, −A − Aj, −A − Aj, A − Aj, A − Aj, A + Aj, A + Aj, A − Aj, −A + Aj, −A + Aj, −A + Aj, −A − Aj, A + Aj, −A + Aj, A + Aj, A + Aj, A + Aj, A − Aj, A + Aj, A + Aj, −A − Aj, A + Aj, −A − Aj, A − Aj, A + Aj, −A − Aj, −A + Aj, −A − Aj, −A + Aj, −A + Aj, −A − Aj, −A + Aj, A + Aj, A − Aj, −A − Aj, −A − Aj, −A + Aj, A + Aj, −A − Aj, A − Aj, −A + Aj, A − Aj, −A − Aj, A + Aj, A − Aj, A − Aj, −A − Aj, A − Aj, −A + Aj, −A − Aj, A − Aj, A − Aj, −A + Aj, −A + Aj |
| 7 | Polarization 1 | −A + Aj, −A − Aj, A − Aj, A + Aj, A + Aj, −A + Aj, −A + Aj, −A − Aj, −A − Aj, −A + Aj, A − Aj, A − Aj, A − Aj, A + Aj, −A − Aj, A − Aj, −A − Aj, −A − Aj, −A − Aj, −A + Aj, −A − Aj, −A − Aj, A + Aj, −A − Aj, A + Aj, −A + Aj, −A − Aj, A + Aj, A − Aj, A + Aj, A − Aj, A − Aj, A + Aj, A − Aj, −A − Aj, −A + Aj, A + Aj, A + Aj, A − Aj, −A − Aj, A + Aj, −A + Aj, A − Aj, −A + Aj, A + Aj, −A − Aj, −A + Aj, −A + Aj, A + Aj, −A + Aj, A − Aj, A + Aj, −A + Aj, −A + Aj, A − Aj, A − Aj |
| | Polarization 2 | A + Aj, A − Aj, −A − Aj, −A + Aj, −A + Aj, A + Aj, A + Aj, A − Aj, A − Aj, A + Aj, −A − Aj, −A − Aj, −A − Aj, −A + Aj, A − Aj, −A − Aj, A − Aj, A − Aj, A − Aj, A + Aj, A − Aj, A − Aj, −A + Aj, A − Aj, −A + Aj, A + Aj, A − Aj, −A + Aj, −A − Aj, −A + Aj, −A − Aj, −A − Aj, −A + Aj, −A − Aj, A − Aj, A + Aj, −A + Aj, −A + Aj, −A − Aj, A − Aj, −A + Aj, A + Aj, −A − Aj, A + Aj, −A + Aj, A − Aj, A + Aj, A + Aj, −A + Aj, A + Aj, −A − Aj, −A + Aj, A + Aj, A + Aj, −A − Aj, −A − Aj |
| 8 | Polarization 1 | A − Aj, A + Aj, −A + Aj, −A − Aj, −A − Aj, A − Aj, A − Aj, A + Aj, A + Aj, A − Aj, −A + Aj, −A + Aj, −A + Aj, −A − Aj, A + Aj, −A + Aj, A + Aj, A + Aj, A + Aj, A − Aj, A + Aj, A + Aj, −A − Aj, A + Aj, −A − Aj, A − Aj, A + Aj, −A − Aj, −A + Aj, −A − Aj, −A + Aj, −A + Aj, −A − Aj, −A + Aj, A + Aj, A − Aj, −A − Aj, −A − Aj, −A + Aj, A + Aj, −A − Aj, A − Aj, −A + Aj, A − Aj, −A − Aj, A + Aj, A − Aj, A − Aj, −A − Aj, A − Aj, −A + Aj, −A − Aj, A − Aj, A − Aj, −A + Aj, −A + Aj |
| | Polarization 2 | A + Aj, A − Aj, −A − Aj, −A + Aj, −A + Aj, A + Aj, A + Aj, A − Aj, A − Aj, A + Aj, −A − Aj, −A − Aj, −A − Aj, −A + Aj, A − Aj, −A − Aj, A − Aj, A − Aj, A − Aj, A + Aj, A − Aj, A − Aj, −A + Aj, A − Aj, −A + Aj, A + Aj, A − Aj, −A + Aj, −A − Aj, −A + Aj, −A − Aj, −A − Aj, −A + Aj, −A − Aj, A − Aj, A + Aj, −A + Aj, −A + Aj, −A − Aj, A − Aj, −A + Aj, A + Aj, −A − Aj, A + Aj, −A + Aj, A − Aj, A + Aj, A + Aj, −A + Aj, A + Aj, −A − Aj, −A + Aj, A + Aj, A + Aj, −A − Aj, −A − Aj |
| 9 | Polarization 1 | −A − Aj, A + Aj, −A + Aj, A + Aj, −A + Aj, A + Aj, A + Aj, A − Aj, A + Aj, −A + Aj, A − Aj, −A + Aj, −A + Aj, A − Aj, −A − Aj, −A + Aj, −A − Aj, −A + Aj, A + Aj, A − Aj, −A − Aj, −A − Aj, −A − Aj, A + Aj, A − Aj, −A − Aj, A − Aj, −A + Aj, A + Aj, −A + Aj, −A + Aj, A − Aj, A − Aj, −A − Aj, −A − Aj, A − Aj, A − Aj, A − Aj, A + Aj, A + Aj, −A + Aj, −A − Aj, A − Aj, −A − Aj, −A + Aj, A − Aj, −A − Aj, A + Aj, −A + Aj, −A + Aj, −A − Aj, A + Aj, −A − Aj, A + Aj, A + Aj, A − Aj |
| | Polarization 2 | −A − Aj, A + Aj, −A − Aj, −A − Aj, −A + Aj, A − Aj, A + Aj, −A + Aj, −A + Aj, A + Aj, −A + Aj, −A − Aj, −A + Aj, A − Aj, −A + Aj, −A − Aj, −A + Aj, −A − Aj, −A − Aj, −A − Aj, A − Aj, −A + Aj, −A − Aj, A + Aj, −A + Aj, −A − Aj, A + Aj, A + Aj, −A + Aj, A + Aj, −A − Aj, −A − Aj, A + Aj, A + Aj, A + Aj, A − Aj, −A − Aj, A + Aj, A − Aj, A + Aj, −A − Aj, −A + Aj, −A + Aj, −A − Aj, A − Aj, A + Aj, A + Aj, A − Aj, A − Aj, A − Aj, A − Aj, −A − Aj, −A + Aj, −A + Aj, A − Aj, A + Aj |
| 10 | Polarization 1 | −A − Aj, A + Aj, −A + Aj, A + Aj, −A + Aj, A + Aj, A + Aj, A − Aj, A + Aj, −A + Aj, A − Aj, −A + Aj, −A + Aj, A − Aj, −A − Aj, −A + Aj, −A − Aj, −A + Aj, A + Aj, A − Aj, −A − Aj, −A − Aj, −A − Aj, A + Aj, A − Aj, −A − Aj, A − Aj, −A + Aj, A + Aj, −A + Aj, −A + Aj, A − Aj, A − Aj, −A − Aj, −A − Aj, A − Aj, A − Aj, A − Aj, A + Aj, A + Aj, −A + Aj, −A − Aj, A − Aj, −A − Aj, −A + Aj, A − Aj, −A − Aj, A + Aj, −A + Aj, −A + Aj, −A − Aj, A + Aj, −A − Aj, A + Aj, A + Aj, A − Aj |
| | Polarization 2 | A − Aj, −A + Aj, A + Aj, −A + Aj, A + Aj, −A + Aj, −A + Aj, −A − Aj, −A + Aj, A + Aj, −A − Aj, A + Aj, A + Aj, −A − Aj, A − Aj, A + Aj, A − Aj, A + Aj, −A + Aj, −A − Aj, A − Aj, A − Aj, A − Aj, −A + Aj, −A − Aj, A − Aj, −A − Aj, A + Aj, −A + Aj, A + Aj, A + Aj, −A − Aj, −A − Aj, A − Aj, A − Aj, −A − Aj, −A − Aj, −A − Aj, −A + Aj, −A + Aj, A + Aj, A − Aj, −A − Aj, A − Aj, A + Aj, −A − Aj, A − Aj, −A + Aj, A + Aj, A + Aj, A − Aj, −A + Aj, A − Aj, −A + Aj, −A + Aj, −A − Aj |

TABLE 9-1-continued

| Index | Polarization | Pilot sequence |
|---|---|---|
| 11 | Polarization 1 | −A + Aj, A − Aj, −A − Aj, A − Aj, −A − Aj, A − Aj, A − Aj, A + Aj, A − Aj, −A − Aj, A + Aj, −A − Aj, −A − Aj, A + Aj, −A + Aj, −A − Aj, −A + Aj, −A − Aj, A − Aj, A + Aj, −A + Aj, −A + Aj, −A + Aj, A − Aj, A + Aj, −A + Aj, A + Aj, −A − Aj, A − Aj, −A − Aj, −A − Aj, A + Aj, A + Aj, −A + Aj, −A + Aj, A + Aj, A + Aj, A + Aj, A − Aj, A − Aj, −A − Aj, −A + Aj, A + Aj, −A + Aj, −A − Aj, A + Aj, −A + Aj, A − Aj, −A − Aj, −A − Aj, −A + Aj, A − Aj, −A + Aj, A − Aj, A − Aj, A + Aj |
| | Polarization 2 | A + Aj, −A − Aj, A − Aj, −A − Aj, A − Aj, −A − Aj, −A − Aj, −A + Aj, −A − Aj, A − Aj, −A + Aj, A − Aj, A − Aj, −A + Aj, A + Aj, A − Aj, A + Aj, A − Aj, −A − Aj, −A + Aj, A + Aj, A + Aj, A + Aj, −A − Aj, −A + Aj, A + Aj, −A + Aj, A − Aj, −A − Aj, A − Aj, A − Aj, −A + Aj, −A + Aj, A + Aj, A + Aj, −A + Aj, −A + Aj, −A + Aj, −A − Aj, −A − Aj, A − Aj, A + Aj, −A + Aj, A + Aj, A − Aj, −A + Aj, A + Aj, −A − Aj, A − Aj, A − Aj, A + Aj, −A − Aj, A + Aj, −A − Aj, −A − Aj, −A + Aj |
| 12 | Polarization 1 | A − Aj, −A + Aj, A + Aj, −A + Aj, A + Aj, −A + Aj, −A + Aj, −A − Aj, −A + Aj, A + Aj, −A − Aj, A + Aj, A + Aj, −A − Aj, A − Aj, A + Aj, A − Aj, A + Aj, −A + Aj, −A − Aj, A − Aj, A − Aj, A − Aj, −A + Aj, −A − Aj, A − Aj, −A − Aj, A + Aj, −A + Aj, A + Aj, A + Aj, −A − Aj, −A − Aj, A − Aj, A − Aj, −A − Aj, −A − Aj, −A − Aj, −A + Aj, −A + Aj, A + Aj, A − Aj, −A − Aj, A − Aj, A + Aj, −A − Aj, A − Aj, −A + Aj, A + Aj, A + Aj, A − Aj, −A + Aj, A − Aj, −A + Aj, −A + Aj, −A − Aj |
| | Polarization 2 | A + Aj, −A − Aj, A − Aj, −A − Aj, A − Aj, −A − Aj, −A − Aj, −A + Aj, −A − Aj, A − Aj, −A + Aj, A − Aj, A − Aj, −A + Aj, A + Aj, A − Aj, A + Aj, A − Aj, −A − Aj, −A + Aj, A + Aj, A + Aj, A + Aj, −A − Aj, −A + Aj, A + Aj, −A + Aj, A − Aj, −A − Aj, A − Aj, A − Aj, −A + Aj, −A + Aj, A + Aj, A + Aj, −A + Aj, −A + Aj, −A + Aj, −A − Aj, −A − Aj, A − Aj, A + Aj, −A + Aj, A + Aj, A − Aj, −A + Aj, A + Aj, −A − Aj, A − Aj, A − Aj, A + Aj, −A − Aj, A + Aj, −A − Aj, −A − Aj, −A + Aj |
| 13 | Polarization 1 | −A − Aj, A − Aj, A − Aj, −A + Aj, A − Aj, −A + Aj, A + Aj, A + Aj, A − Aj, −A + Aj, −A − Aj, A + Aj, −A + Aj, −A − Aj, −A + Aj, A + Aj, A − Aj, A − Aj, −A − Aj, −A − Aj, −A − Aj, −A + Aj, −A + Aj, −A − Aj, −A − Aj, A + Aj, A + Aj, A − Aj, A + Aj, −A − Aj, −A + Aj, −A − Aj, A − Aj, A + Aj, −A + Aj, −A + Aj, −A − Aj, A − Aj, A + Aj, −A + Aj, A + Aj, −A + Aj, −A − Aj, A + Aj, −A + Aj, −A − Aj, A + Aj, A − Aj, −A − Aj, A − Aj, A − Aj, A + Aj, A − Aj, A + Aj, A − Aj, −A + Aj |
| | Polarization 2 | −A + Aj, A + Aj, A + Aj, −A − Aj, A + Aj, −A − Aj, A − Aj, A − Aj, A + Aj, −A − Aj, −A + Aj, A − Aj, −A − Aj, −A + Aj, −A − Aj, A − Aj, A + Aj, A + Aj, −A + Aj, −A + Aj, −A + Aj, −A − Aj, −A − Aj, −A + Aj, −A + Aj, A − Aj, A − Aj, A + Aj, A − Aj, −A + Aj, −A − Aj, −A + Aj, A + Aj, −A − Aj, −A − Aj, −A − Aj, −A + Aj, A + Aj, A − Aj, −A − Aj, A − Aj, −A − Aj, −A + Aj, A − Aj, A − Aj, −A + Aj, A − Aj, A + Aj, −A + Aj, A + Aj, A + Aj, A − Aj, A + Aj, A − Aj, A + Aj, −A − Aj |
| 14 | Polarization 1 | −A − Aj, A − Aj, A − Aj, −A + Aj, A − Aj, −A + Aj, A + Aj, A + Aj, A − Aj, −A + Aj, −A − Aj, A + Aj, −A + Aj, −A − Aj, −A + Aj, A + Aj, A − Aj, A − Aj, −A − Aj, −A − Aj, −A − Aj, −A + Aj, −A + Aj, −A − Aj, −A − Aj, A + Aj, A + Aj, A − Aj, A + Aj, −A − Aj, −A + Aj, −A − Aj, A − Aj, −A + Aj, −A + Aj, −A + Aj, −A − Aj, A − Aj, A + Aj, −A + Aj, A + Aj, −A + Aj, −A − Aj, A + Aj, A + Aj, −A − Aj, A + Aj, A − Aj, −A − Aj, A − Aj, A − Aj, A + Aj, A − Aj, A + Aj, A − Aj, −A + Aj |
| | Polarization 2 | A − Aj, −A − Aj, −A − Aj, A + Aj, −A − Aj, A + Aj, −A + Aj, −A + Aj, −A − Aj, A + Aj, A − Aj, −A + Aj, A + Aj, A − Aj, A + Aj, −A + Aj, −A − Aj, −A − Aj, A − Aj, A − Aj, A − Aj, A + Aj, A + Aj, A − Aj, A − Aj, −A + Aj, −A + Aj, −A − Aj, −A + Aj, A − Aj, A + Aj, A − Aj, −A − Aj, A + Aj, A + Aj, A + Aj, A − Aj, −A − Aj, −A + Aj, A + Aj, −A + Aj, A + Aj, A − Aj, −A + Aj, −A + Aj, A − Aj, −A + Aj, −A − Aj, A − Aj, −A − Aj, −A − Aj, −A + Aj, −A − Aj, −A + Aj, −A − Aj, A + Aj |
| 15 | Polarization 1 | −A + Aj, A + Aj, A + Aj, −A − Aj, A + Aj, −A − Aj, A − Aj, A − Aj, A + Aj, −A − Aj, −A + Aj, A − Aj, −A − Aj, −A + Aj, −A − Aj, A − Aj, A + Aj, A + Aj, −A + Aj, −A + Aj, −A + Aj, −A − Aj, −A − Aj, −A + Aj, −A + Aj, A − Aj, A − Aj, A + Aj, A − Aj, −A + Aj, −A − Aj, −A + Aj, A + Aj, −A − Aj, −A − Aj, −A − Aj, −A + Aj, A + Aj, A − Aj, −A − Aj, A − Aj, −A − Aj, −A + Aj, A − Aj, A − Aj, −A + Aj, A − Aj, A + Aj, −A + Aj, A + Aj, A + Aj, A − Aj, A + Aj, A − Aj, A + Aj, −A − Aj |
| | Polarization 2 | A + Aj, −A + Aj, −A + Aj, A − Aj, −A + Aj, A − Aj, −A − Aj, −A − Aj, −A + Aj, A − Aj, A + Aj, −A − Aj, A − Aj, A + Aj, A − Aj, −A − Aj, −A + Aj, −A + Aj, A + Aj, A + Aj, A + Aj, A − Aj, A − Aj, A + Aj, A + Aj, −A − Aj, −A − Aj, −A + Aj, −A − Aj, A + Aj, A − Aj, A + Aj, −A + Aj, A − Aj, A − Aj, A − Aj, A + Aj, −A + Aj, −A − Aj, A − Aj, −A − Aj, A − Aj, A + Aj, −A − Aj, −A − Aj, A + Aj, −A − Aj, −A + Aj, A + Aj, −A + Aj, −A + Aj, −A − Aj, −A + Aj, −A − Aj, −A + Aj, A − Aj |
| 16 | Polarization 1 | A − Aj, −A − Aj, −A − Aj, A + Aj, −A − Aj, A + Aj, −A + Aj, −A + Aj, −A − Aj, A + Aj, A − Aj, −A + Aj, A + Aj, A − Aj, A + Aj, −A + Aj, −A − Aj, −A − Aj, A − Aj, A − Aj, A − Aj, A + Aj, A + Aj, A − Aj, A − Aj, −A + Aj, −A + Aj, −A − Aj, −A + Aj, A − Aj, A + Aj, A − Aj, −A − Aj, A + Aj, A + Aj, A + Aj, A − Aj, −A − Aj, −A + Aj, A + Aj, −A + Aj, A + Aj, A − Aj, −A + Aj, −A + Aj, A − Aj, −A + Aj, −A − Aj, A − Aj, −A − Aj, −A − Aj, −A + Aj, −A − Aj, −A + Aj, −A − Aj, A + Aj |
| | Polarization 2 | A + Aj, −A + Aj, −A + Aj, A − Aj, −A + Aj, A − Aj, −A − Aj, −A − Aj, −A + Aj, A − Aj, A + Aj, −A − Aj, A − Aj, A + Aj, A − Aj, −A − Aj, −A + Aj, −A + Aj, A + Aj, A + Aj, A + Aj, A − Aj, A − Aj, A + Aj, A + Aj, −A − Aj, −A − Aj, −A + Aj, −A − Aj, A + Aj, A − Aj, A + Aj, −A + Aj, A − Aj, A − Aj, A − Aj, A + Aj, −A + Aj, −A − Aj, A − Aj, −A − Aj, A − Aj, A + Aj, −A − Aj, −A − Aj, A + Aj, −A − Aj, −A + Aj, A + Aj, −A + Aj, −A + Aj, −A − Aj, −A + Aj, −A − Aj, −A + Aj, A − Aj |
| 17 | Polarization 1 | −A − Aj, −A + Aj, A − Aj, −A − Aj, A − Aj, −A − Aj, −A + Aj, −A + Aj, A + Aj, A − Aj, −A + Aj, A − Aj, A − Aj, A − Aj, −A − Aj, A − Aj, A + Aj, A − Aj, A − Aj, A − Aj, A − Aj, −A − Aj, −A + Aj, A + Aj, −A + Aj, −A − Aj, −A − Aj, −A + Aj, −A − Aj, −A − Aj, −A + Aj, A + Aj, −A − Aj, A − Aj, −A + Aj, A − Aj, −A + Aj, −A + Aj, A + Aj, A + Aj, A + Aj, A + Aj, −A + Aj, A + Aj, −A + Aj, −A − Aj, A + Aj, −A + Aj, A + Aj, A − Aj, A + Aj, −A − Aj, −A − Aj, A + Aj, A + Aj, −A − Aj |
| | Polarization 2 | A − Aj, A − Aj, A + Aj, −A + Aj, −A − Aj, A + Aj, A − Aj, A + Aj, −A + Aj, −A + Aj, A − Aj, A + Aj, A + Aj, A − Aj, A − Aj, A + Aj, A + Aj, −A + Aj, −A + Aj, −A − Aj, A − Aj, −A + Aj, −A − Aj, A + Aj, A + Aj, A − Aj, −A − Aj, −A + Aj, −A + Aj, −A − Aj, A − Aj, A − Aj, −A − Aj, |

TABLE 9-1-continued

| Index | Polarization | Pilot sequence |
|---|---|---|
| | | −A − Aj, −A + Aj, −A − Aj, A + Aj, −A + Aj, −A − Aj, A − Aj, −A − Aj, A − Aj, A − Aj, −A − Aj, A + Aj, −A + Aj, A + Aj, −A + Aj, A + Aj, A + Aj, A − Aj, −A + Aj, −A − Aj, −A − Aj, −A − Aj, −A + Aj |
| 18 | Polarization 1 | −A − Aj, A + Aj, A + Aj, −A − Aj, −A − Aj, A + Aj, −A + Aj, A + Aj, A − Aj, A + Aj, −A − Aj, A − Aj, A + Aj, A − Aj, A + Aj, A + Aj, A + Aj, A + Aj, A − Aj, A − Aj, −A + Aj, A − Aj, −A + Aj, −A − Aj, A + Aj, A − Aj, −A − Aj, −A − Aj, A − Aj, −A − Aj, −A − Aj, A − Aj, A + Aj, A − Aj, −A − Aj, −A + Aj, −A + Aj, −A + Aj, −A + Aj, A + Aj, −A + Aj, −A − Aj, −A + Aj, −A + Aj, −A + Aj, A − Aj, −A + Aj, A + Aj, A − Aj, A − Aj, −A − Aj, −A + Aj, −A − Aj, −A + Aj, A − Aj, −A − Aj |
| | Polarization 2 | A − Aj, −A − Aj, −A − Aj, −A − Aj, A − Aj, −A + Aj, A + Aj, A + Aj, A − Aj, A + Aj, A − Aj, A + Aj, −A − Aj, −A + Aj, −A + Aj, −A − Aj, −A + Aj, −A − Aj, A − Aj, A + Aj, −A − Aj, A − Aj, −A − Aj, −A − Aj, −A + Aj, −A + Aj, −A − Aj, A − Aj, A − Aj, −A − Aj, −A + Aj, A + Aj, A + Aj, −A − Aj, A − Aj, −A + Aj, −A − Aj, A − Aj, A − Aj, A + Aj, A + Aj, −A + Aj, −A + Aj, A + Aj, A + Aj, −A + Aj, A − Aj, A − Aj, A + Aj, −A + Aj, A + Aj, −A − Aj, A − Aj, A + Aj, −A + Aj, −A + Aj |

TABLE 9-2

| Index | Polarization | Pilot sequence |
|---|---|---|
| 1 | Polarization 1 | −A + Aj, A + Aj, −A + Aj, A + Aj, −A − Aj, A + Aj, A + Aj, −A − Aj, −A − Aj, A − Aj, −A − Aj, −A − Aj, A − Aj, A − Aj, −A + Aj, −A + Aj, −A + Aj, A − Aj, −A + Aj, −A − Aj, A + Aj, −A − Aj, −A + Aj, −A − Aj, A − Aj, −A − Aj, A − Aj, A + Aj, −A + Aj, A − Aj, A − Aj, −A + Aj, A + Aj, −A − Aj, −A + Aj, A − Aj, A + Aj, A + Aj, −A + Aj, −A − Aj, −A + Aj, A + Aj, A + Aj, −A − Aj, A − Aj, A + Aj, A + Aj, A + Aj, −A + Aj, A − Aj, −A − Aj, −A − Aj, −A − Aj, A + Aj, A − Aj, A − Aj |
| | Polarization 2 | −A − Aj, A − Aj, −A − Aj, A − Aj, −A + Aj, A − Aj, A − Aj, −A + Aj, −A + Aj, A + Aj, −A + Aj, −A + Aj, A + Aj, A + Aj, −A − Aj, −A − Aj, −A − Aj, A + Aj, −A − Aj, −A + Aj, A − Aj, −A + Aj, −A − Aj, −A + Aj, A + Aj, −A + Aj, A + Aj, A − Aj, −A − Aj, A + Aj, A + Aj, −A − Aj, A − Aj, −A + Aj, −A − Aj, A + Aj, A − Aj, A − Aj, −A − Aj, −A + Aj, −A − Aj, A − Aj, A − Aj, −A + Aj, A + Aj, A − Aj, A − Aj, A − Aj, −A − Aj, A + Aj, −A + Aj, −A + Aj, −A + Aj, A − Aj, A + Aj, A + Aj |
| 2 | Polarization 1 | −A + Aj, A + Aj, −A + Aj, A + Aj, −A − Aj, A + Aj, A + Aj, −A − Aj, −A − Aj, A − Aj, −A − Aj, −A − Aj, A − Aj, A − Aj, −A + Aj, −A + Aj, −A + Aj, A − Aj, −A + Aj, −A − Aj, A + Aj, −A − Aj, −A + Aj, −A − Aj, A − Aj, −A − Aj, A − Aj, A + Aj, −A + Aj, A − Aj, A − Aj, −A + Aj, A + Aj, −A − Aj, −A + Aj, A − Aj, A + Aj, A + Aj, −A + Aj, −A − Aj, −A + Aj, A + Aj, A + Aj, −A − Aj, A − Aj, A + Aj, A + Aj, A + Aj, −A + Aj, A − Aj, −A − Aj, −A − Aj, −A − Aj, A + Aj, A − Aj, A − Aj |
| | Polarization 2 | A + Aj, −A + Aj, A + Aj, −A + Aj, A − Aj, −A + Aj, −A + Aj, A − Aj, A − Aj, −A − Aj, A − Aj, A − Aj, −A − Aj, −A − Aj, A + Aj, A + Aj, A + Aj, −A − Aj, A + Aj, A − Aj, −A + Aj, A − Aj, A + Aj, A − Aj, −A − Aj, A − Aj, −A − Aj, −A + Aj, A + Aj, −A − Aj, −A − Aj, A + Aj, −A + Aj, A − Aj, A + Aj, −A − Aj, −A + Aj, −A + Aj, A + Aj, A − Aj, A + Aj, −A + Aj, −A + Aj, A − Aj, −A − Aj, −A + Aj, −A + Aj, −A + Aj, A + Aj, −A − Aj, A − Aj, A − Aj, A − Aj, −A + Aj, −A − Aj, −A − Aj |
| 3 | Polarization 1 | A − Aj, −A − Aj, A − Aj, −A − Aj, A + Aj, −A − Aj, −A − Aj, A + Aj, A + Aj, −A + Aj, A + Aj, A + Aj, −A + Aj, −A + Aj, A − Aj, A − Aj, A − Aj, −A + Aj, A − Aj, A + Aj, −A − Aj, A + Aj, A − Aj, A + Aj, −A + Aj, A + Aj, −A + Aj, −A − Aj, A − Aj, −A + Aj, −A + Aj, A − Aj, −A − Aj, A + Aj, A − Aj, −A + Aj, −A − Aj, −A − Aj, A − Aj, A + Aj, A − Aj, −A − Aj, −A − Aj, A + Aj, −A + Aj, −A − Aj, −A − Aj, −A − Aj, A − Aj, −A + Aj, A + Aj, A + Aj, A + Aj, −A − Aj, −A + Aj, −A + Aj |
| | Polarization 2 | −A − Aj, A − Aj, −A − Aj, A − Aj, −A + Aj, A − Aj, A − Aj, −A + Aj, −A + Aj, A + Aj, −A + Aj, −A + Aj, A + Aj, A + Aj, −A − Aj, −A − Aj, −A − Aj, A + Aj, −A − Aj, −A + Aj, A − Aj, −A + Aj, −A − Aj, −A + Aj, A + Aj, −A + Aj, A + Aj, A − Aj, −A − Aj, A + Aj, A + Aj, −A − Aj, A − Aj, −A + Aj, −A − Aj, A + Aj, A − Aj, A − Aj, −A − Aj, −A + Aj, −A − Aj, A − Aj, A − Aj, −A + Aj, A + Aj, A − Aj, A − Aj, A − Aj, −A − Aj, A + Aj, −A + Aj, −A + Aj, −A + Aj, A − Aj, A + Aj, A + Aj |
| 4 | Polarization 1 | A − Aj, −A − Aj, A − Aj, −A − Aj, A + Aj, −A − Aj, −A − Aj, A + Aj, A + Aj, −A + Aj, A + Aj, A + Aj, −A + Aj, −A + Aj, A − Aj, A − Aj, A − Aj, −A + Aj, A − Aj, A + Aj, −A − Aj, A + Aj, A − Aj, A + Aj, −A + Aj, A + Aj, −A + Aj, −A − Aj, A − Aj, −A + Aj, −A + Aj, A − Aj, −A − Aj, A + Aj, A − Aj, −A + Aj, −A − Aj, −A − Aj, A − Aj, A + Aj, A − Aj, −A − Aj, −A − Aj, A + Aj, −A + Aj, −A − Aj, −A − Aj, −A − Aj, A − Aj, −A + Aj, A + Aj, A + Aj, A + Aj, −A − Aj, −A + Aj, −A + Aj |
| | Polarization 2 | A + Aj, −A + Aj, A + Aj, −A + Aj, A − Aj, −A + Aj, −A + Aj, A − Aj, A − Aj, −A − Aj, A − Aj, A − Aj, −A − Aj, −A − Aj, A + Aj, A + Aj, A + Aj, −A − Aj, A + Aj, A − Aj, −A + Aj, A − Aj, A + Aj, A − Aj, −A − Aj, A − Aj, −A − Aj, −A + Aj, A + Aj, −A − Aj, −A − Aj, A + Aj, −A + Aj, A − Aj, A + Aj, −A − Aj, −A + Aj, −A + Aj, A + Aj, A − Aj, A + Aj, −A + Aj, −A + Aj, A − Aj, −A − Aj, −A + Aj, −A + Aj, −A + Aj, A + Aj, −A − Aj, A − Aj, A − Aj, A − Aj, −A + Aj, −A − Aj, −A − Aj |
| 5 | Polarization 1 | −A + Aj, −A + Aj, A + Aj, −A − Aj, −A − Aj, −A − Aj, −A + Aj, A − Aj, A + Aj, A + Aj, A + Aj, −A + Aj, −A − Aj, A + Aj, A + Aj, A − Aj, −A − Aj, A − Aj, A + Aj, A + Aj, −A + Aj, A − Aj, −A − Aj, A + Aj, A − Aj, −A + Aj, −A + Aj, A − Aj, A + Aj, −A + Aj, −A − Aj, −A + Aj, −A − Aj, A − Aj, −A − Aj, A + Aj, −A − Aj, A − Aj, −A + Aj, A − Aj, A − Aj, A − Aj, −A + Aj, −A + Aj, −A − Aj, −A − Aj, −A + Aj, −A − Aj, −A − Aj, A + Aj, A + Aj, −A − Aj, A + Aj, A − Aj, A + Aj, A − Aj |
| | Polarization 2 | −A − Aj, −A − Aj, A − Aj, −A + Aj, −A + Aj, −A + Aj, −A − Aj, A + Aj, A − Aj, A − Aj, A − Aj, −A − Aj, −A + Aj, A − Aj, A − Aj, A + Aj, −A + Aj, A + Aj, A − Aj, A − Aj, −A − Aj, A + Aj, −A + Aj, A − Aj, A + Aj, −A − Aj, −A − Aj, A + Aj, A − Aj, −A − Aj, −A + Aj, −A − Aj, −A + Aj, A + Aj, −A + Aj, A − Aj, −A + Aj, A + Aj, −A − Aj, A + Aj, A + Aj, A + Aj, −A − Aj, −A − Aj, −A + Aj, −A + Aj, −A − Aj, −A + Aj, −A + Aj, A − Aj, A − Aj, −A + Aj, A − Aj, A + Aj, A − Aj, A + Aj |
| 6 | Polarization 1 | −A + Aj, −A + Aj, A + Aj, −A − Aj, −A − Aj, −A − Aj, −A + Aj, A − Aj, A + Aj, A + Aj, A + Aj, −A + Aj, −A − Aj, A + Aj, A + Aj, A − Aj, −A − Aj, A − Aj, A + Aj, A + Aj, −A + Aj, A − Aj, −A − Aj, A + Aj, A − Aj, −A + Aj, −A + Aj, A − Aj, A + Aj, −A + Aj, −A − Aj, −A + Aj, −A − Aj, A − Aj, −A − Aj, A + Aj, −A − Aj, A − Aj, −A + Aj, A − Aj, A − Aj, A − Aj, −A + Aj, −A + Aj, −A − Aj, −A − Aj, −A + Aj, −A − Aj, −A − Aj, A + Aj, A + Aj, −A − Aj, A + Aj, A − Aj, A + Aj, A − Aj |

TABLE 9-2-continued

| Index | Polarization | Pilot sequence |
| --- | --- | --- |
| | Polarization 2 | A + Aj, A + Aj, −A + Aj, A − Aj, A − Aj, A − Aj, A + Aj, −A − Aj, −A + Aj, −A + Aj, −A + Aj, A + Aj, A − Aj, −A + Aj, −A + Aj, −A − Aj, A − Aj, −A − Aj, −A + Aj, −A + Aj, A + Aj, −A − Aj, A − Aj, −A + Aj, −A − Aj, A + Aj, A + Aj, −A − Aj, −A + Aj, A + Aj, A − Aj, A + Aj, A − Aj, −A − Aj, A − Aj, −A + Aj, A − Aj, −A − Aj, A + Aj, −A − Aj, −A − Aj, −A − Aj, A + Aj, A + Aj, A − Aj, A − Aj, A + Aj, A − Aj, A − Aj, −A + Aj, −A + Aj, A − Aj, −A + Aj, −A − Aj, −A + Aj, −A − Aj |
| 7 | Polarization 1 | A − Aj, A − Aj, −A − Aj, A + Aj, A + Aj, A + Aj, A − Aj, −A + Aj, −A − Aj, −A − Aj, −A − Aj, A − Aj, A + Aj, −A − Aj, −A − Aj, −A + Aj, A + Aj, −A + Aj, −A − Aj, −A − Aj, A − Aj, −A + Aj, A + Aj, −A − Aj, −A + Aj, A − Aj, A − Aj, −A + Aj, −A − Aj, A − Aj, A + Aj, A − Aj, A + Aj, −A + Aj, A + Aj, −A − Aj, A + Aj, −A + Aj, A − Aj, −A + Aj, −A + Aj, −A + Aj, A − Aj, A − Aj, A + Aj, A + Aj, A − Aj, A + Aj, A + Aj, −A − Aj, −A − Aj, A + Aj, −A − Aj, −A + Aj, −A − Aj, −A + Aj |
| | Polarization 2 | −A − Aj, −A − Aj, A − Aj, −A + Aj, −A + Aj, −A + Aj, −A − Aj, A + Aj, A − Aj, A − Aj, A − Aj, −A − Aj, −A + Aj, A − Aj, A − Aj, A + Aj, −A + Aj, A + Aj, A − Aj, A − Aj, −A − Aj, A + Aj, −A + Aj, A − Aj, A + Aj, −A − Aj, −A − Aj, A + Aj, A − Aj, −A − Aj, −A + Aj, −A − Aj, −A + Aj, A + Aj, −A + Aj, A − Aj, −A + Aj, A + Aj, −A − Aj, A + Aj, A + Aj, A + Aj, −A − Aj, −A − Aj, −A + Aj, −A + Aj, −A − Aj, −A + Aj, −A + Aj, A − Aj, A − Aj, −A + Aj, A − Aj, A + Aj, A − Aj, A + Aj |
| 8 | Polarization 1 | A − Aj, A − Aj, −A − Aj, A + Aj, A + Aj, A + Aj, A − Aj, −A + Aj, −A − Aj, −A − Aj, −A − Aj, A − Aj, A + Aj, −A − Aj, −A − Aj, −A + Aj, A + Aj, −A + Aj, −A − Aj, −A − Aj, A − Aj, −A + Aj, A + Aj, −A − Aj, −A + Aj, A − Aj, A − Aj, −A + Aj, −A − Aj, A − Aj, A + Aj, A − Aj, A + Aj, −A + Aj, A + Aj, −A − Aj, A + Aj, −A + Aj, A − Aj, −A + Aj, −A + Aj, −A + Aj, A − Aj, A − Aj, A + Aj, A + Aj, A − Aj, A + Aj, A + Aj, −A − Aj, −A − Aj, A + Aj, −A − Aj, −A + Aj, −A − Aj, −A + Aj |
| | Polarization 2 | A + Aj, A + Aj, −A + Aj, A − Aj, A − Aj, A − Aj, A + Aj, −A − Aj, −A + Aj, −A + Aj, −A + Aj, A + Aj, A − Aj, −A + Aj, −A + Aj, −A − Aj, A − Aj, −A − Aj, −A + Aj, −A + Aj, A + Aj, −A − Aj, A − Aj, −A + Aj, −A − Aj, A + Aj, A + Aj, −A − Aj, −A + Aj, A + Aj, A − Aj, A + Aj, A − Aj, −A − Aj, A − Aj, −A + Aj, A − Aj, −A − Aj, A + Aj, −A − Aj, −A − Aj, −A − Aj, A + Aj, A + Aj, A − Aj, A − Aj, A + Aj, A − Aj, A − Aj, −A + Aj, −A + Aj, A − Aj, −A + Aj, −A − Aj, −A + Aj, −A − Aj |
| 9 | Polarization 1 | −A − Aj, −A + Aj, A + Aj, A + Aj, −A − Aj, A + Aj, A − Aj, A + Aj, −A − Aj, A + Aj, −A + Aj, −A − Aj, A − Aj, A − Aj, A − Aj, −A + Aj, −A − Aj, A + Aj, −A − Aj, A + Aj, −A + Aj, A − Aj, −A + Aj, A + Aj, A + Aj, A + Aj, A + Aj, A − Aj, −A + Aj, −A − Aj, A + Aj, −A + Aj, A − Aj, A + Aj, −A − Aj, A − Aj, A − Aj, −A + Aj, −A + Aj, −A − Aj, −A + Aj, −A − Aj, A + Aj, −A + Aj, −A − Aj, −A − Aj, −A + Aj, A + Aj, −A − Aj, A − Aj, −A − Aj, −A + Aj, A − Aj, A − Aj, −A − Aj, A − Aj |
| | Polarization 2 | −A + Aj, −A − Aj, −A + Aj, A + Aj, A + Aj, −A + Aj, A − Aj, −A − Aj, −A + Aj, A + Aj, A − Aj, A + Aj, A − Aj, −A + Aj, −A + Aj, A + Aj, A − Aj, A − Aj, A − Aj, A − Aj, −A + Aj, A − Aj, −A − Aj, −A + Aj, A − Aj, A + Aj, −A + Aj, −A − Aj, A − Aj, −A − Aj, −A + Aj, −A − Aj, −A + Aj, −A + Aj, A + Aj, A − Aj, −A − Aj, −A + Aj, A + Aj, −A − Aj, −A − Aj, A + Aj, −A − Aj, A + Aj, −A − Aj, A + Aj, A + Aj, −A + Aj, −A − Aj, A − Aj, −A + Aj, −A − Aj, A − Aj, A + Aj, A − Aj, A − Aj |
| 10 | Polarization 1 | −A + Aj, A + Aj, A + Aj, −A − Aj, A + Aj, A − Aj, A + Aj, −A − Aj, A + Aj, −A + Aj, −A − Aj, A − Aj, A − Aj, A − Aj, −A + Aj, −A − Aj, A + Aj, −A − Aj, A + Aj, −A + Aj, A − Aj, −A + Aj, A + Aj, A + Aj, A + Aj, A + Aj, A − Aj, −A + Aj, −A − Aj, A + Aj, −A + Aj, A − Aj, A + Aj, −A − Aj, A − Aj, A − Aj, −A + Aj, −A + Aj, −A − Aj, −A + Aj, −A − Aj, A + Aj, −A + Aj, −A − Aj, −A − Aj, −A + Aj, A + Aj, −A − Aj, A − Aj, −A − Aj, −A + Aj, A − Aj, A − Aj, −A − Aj, A − Aj, −A − Aj |
| | Polarization 2 | −A + Aj, −A − Aj, −A + Aj, A + Aj, A + Aj, −A + Aj, A − Aj, −A − Aj, −A + Aj, A + Aj, A − Aj, A + Aj, A − Aj, −A + Aj, −A + Aj, A + Aj, A − Aj, A − Aj, A − Aj, A − Aj, −A + Aj, A − Aj, −A − Aj, −A + Aj, A − Aj, A + Aj, −A + Aj, −A − Aj, A − Aj, −A − Aj, −A + Aj, −A − Aj, −A + Aj, −A + Aj, A + Aj, A − Aj, −A − Aj, −A + Aj, A + Aj, −A − Aj, −A − Aj, A + Aj, −A − Aj, A + Aj, −A − Aj, A + Aj, A + Aj, −A + Aj, −A − Aj, A − Aj, −A + Aj, −A − Aj, A − Aj, A + Aj, A − Aj, A − Aj |
| 11 | Polarization 1 | −A − Aj, −A + Aj, −A − Aj, −A + Aj, −A + Aj, A − Aj, −A − Aj, −A + Aj, −A − Aj, A + Aj, A − Aj, −A − Aj, −A − Aj, A − Aj, A + Aj, −A − Aj, A − Aj, −A − Aj, A − Aj, A − Aj, −A + Aj, −A + Aj, −A − Aj, A + Aj, −A + Aj, A − Aj, A + Aj, −A − Aj, A − Aj, −A + Aj, A + Aj, A + Aj, A + Aj, A + Aj, A − Aj, −A + Aj, A − Aj, A + Aj, −A − Aj, A + Aj, −A − Aj, A − Aj, −A + Aj, −A + Aj, −A + Aj, −A − Aj, A − Aj, A + Aj, −A − Aj, A + Aj, −A + Aj, A + Aj, −A − Aj, A + Aj, A + Aj, A − Aj |
| | Polarization 2 | −A + Aj, −A + Aj, A + Aj, −A + Aj, −A − Aj, A − Aj, −A + Aj, −A − Aj, A − Aj, A + Aj, A + Aj, −A − Aj, A + Aj, −A − Aj, A + Aj, −A − Aj, −A − Aj, A + Aj, A − Aj, −A − Aj, −A + Aj, A + Aj, A − Aj, A − Aj, −A − Aj, A − Aj, −A − Aj, −A + Aj, −A − Aj, A − Aj, A + Aj, −A + Aj, A − Aj, −A − Aj, −A + Aj, A − Aj, −A + Aj, −A + Aj, −A + Aj, −A + Aj, A + Aj, A − Aj, A − Aj, −A + Aj, A + Aj, −A + Aj, A + Aj, A − Aj, −A − Aj, −A + Aj, A − Aj, A + Aj, A + Aj, A − Aj, −A − Aj, A − Aj |
| 12 | Polarization 1 | −A + Aj, −A − Aj, −A + Aj, −A + Aj, A − Aj, −A − Aj, −A + Aj, −A − Aj, A + Aj, A − Aj, −A − Aj, −A − Aj, A − Aj, A + Aj, −A − Aj, A − Aj, −A − Aj, A − Aj, A − Aj, −A + Aj, −A + Aj, −A − Aj, A + Aj, −A + Aj, A − Aj, A + Aj, −A − Aj, A − Aj, −A + Aj, A + Aj, A + Aj, A + Aj, A + Aj, A − Aj, −A + Aj, A − Aj, A + Aj, −A − Aj, A + Aj, −A − Aj, A − Aj, −A + Aj, −A + Aj, −A + Aj, −A − Aj, A − Aj, A + Aj, −A − Aj, A + Aj, −A + Aj, A + Aj, −A − Aj, A + Aj, A + Aj, A − Aj, −A − Aj |
| | Polarization 2 | −A + Aj, −A + Aj, A + Aj, −A + Aj, −A − Aj, A − Aj, −A + Aj, −A − Aj, A − Aj, A + Aj, A + Aj, −A − Aj, A + Aj, −A − Aj, A + Aj, −A − Aj, −A − Aj, A + Aj, A − Aj, −A − Aj, −A + Aj, A + Aj, A − Aj, A − Aj, −A − Aj, A − Aj, −A − Aj, −A + Aj, −A − Aj, A − Aj, A + Aj, −A + Aj, A − Aj, −A − Aj, −A + Aj, A − Aj, −A + Aj, −A + Aj, −A + Aj, −A + Aj, A + Aj, A − Aj, A − Aj, −A + Aj, A + Aj, −A + Aj, A + Aj, A − Aj, −A − Aj, −A + Aj, A − Aj, A + Aj, A + Aj, A − Aj, −A − Aj, A − Aj |

(3) It is assumed that $N_{PS}$=57. If a remainder of $N_{TS}$ divided by 4 is 0, the pilot sequence is one item in the following Table 10-1. If a remainder of $N_{TS}$ divided by 4 is 2, the pilot sequence is one item in the following Table 10-1 or Table 10-2.

TABLE 10-1

| Index | Polarization | Pilot sequence |
|---|---|---|
| 1 | Polarization 1 | −A − Aj, −A + Aj, −A − Aj, A + Aj, A − Aj, A + Aj, A − Aj, A − Aj, −A + Aj, A + Aj, A + Aj, −A − Aj, −A − Aj, A − Aj, −A + Aj, −A + Aj, A − Aj, A − Aj, A + Aj, A − Aj, −A + Aj, A + Aj, −A − Aj, A − Aj, A + Aj, A + Aj, A − Aj, A − Aj, A − Aj, −A + Aj, −A − Aj, −A + Aj, A + Aj, −A + Aj, −A + Aj, A − Aj, −A + Aj, −A + Aj, −A + Aj, −A − Aj, −A − Aj, A + Aj, A − Aj, −A − Aj, −A − Aj, −A + Aj, −A − Aj, −A − Aj, −A − Aj, −A − Aj, A + Aj, −A + Aj, A − Aj, A + Aj, −A − Aj, A + Aj, A + Aj |
| | Polarization 2 | −A + Aj, −A − Aj, −A + Aj, A − Aj, A + Aj, A − Aj, A + Aj, A + Aj, −A − Aj, A − Aj, A − Aj, −A + Aj, −A + Aj, A + Aj, −A − Aj, −A − Aj, A + Aj, A + Aj, A − Aj, A + Aj, −A − Aj, A − Aj, −A + Aj, A + Aj, A − Aj, A − Aj, A + Aj, A + Aj, A + Aj, −A − Aj, −A + Aj, −A − Aj, A − Aj, −A − Aj, −A − Aj, A + Aj, −A − Aj, −A − Aj, −A − Aj, −A + Aj, −A + Aj, A − Aj, A + Aj, −A + Aj, −A + Aj, −A − Aj, −A + Aj, −A + Aj, −A + Aj, −A + Aj, A − Aj, −A − Aj, A + Aj, A − Aj, −A + Aj, A − Aj, A − Aj |
| 2 | Polarization 1 | −A − Aj, −A + Aj, −A − Aj, A + Aj, A − Aj, A + Aj, A − Aj, A − Aj, −A + Aj, A + Aj, A + Aj, −A − Aj, −A − Aj, A − Aj, −A + Aj, −A + Aj, A − Aj, A − Aj, A + Aj, A − Aj, −A + Aj, A + Aj, −A − Aj, A − Aj, A + Aj, A + Aj, A − Aj, A − Aj, A − Aj, −A + Aj, −A − Aj, −A + Aj, A + Aj, −A + Aj, −A + Aj, A − Aj, −A + Aj, −A + Aj, −A + Aj, −A − Aj, −A − Aj, A + Aj, A − Aj, −A − Aj, −A − Aj, −A + Aj, −A − Aj, −A − Aj, −A − Aj, −A − Aj, A + Aj, −A + Aj, A − Aj, A + Aj, −A − Aj, A + Aj, A + Aj |
| | Polarization 2 | A − Aj, A + Aj, A − Aj, −A + Aj, −A − Aj, −A + Aj, −A − Aj, −A − Aj, A + Aj, −A + Aj, −A + Aj, A − Aj, A − Aj, −A − Aj, A + Aj, A + Aj, −A − Aj, −A − Aj, −A + Aj, −A − Aj, A + Aj, −A + Aj, A − Aj, −A − Aj, −A + Aj, −A + Aj, −A − Aj, −A − Aj, −A − Aj, A + Aj, A − Aj, A + Aj, −A + Aj, A + Aj, A + Aj, −A − Aj, A + Aj, A + Aj, A + Aj, A − Aj, A − Aj, −A + Aj, −A − Aj, A − Aj, A − Aj, A + Aj, A − Aj, A − Aj, A − Aj, A − Aj, −A + Aj, A + Aj, −A − Aj, −A + Aj, A − Aj, −A + Aj, −A + Aj |
| 3 | Polarization 1 | −A + Aj, −A − Aj, −A + Aj, A − Aj, A + Aj, A − Aj, A + Aj, A + Aj, −A − Aj, A − Aj, A − Aj, −A + Aj, −A + Aj, A + Aj, −A − Aj, −A − Aj, A + Aj, A + Aj, A − Aj, A + Aj, −A − Aj, A − Aj, −A + Aj, A + Aj, A − Aj, A − Aj, A + Aj, A + Aj, A + Aj, −A − Aj, −A + Aj, −A − Aj, A − Aj, −A − Aj, −A − Aj, A + Aj, −A − Aj, −A − Aj, −A − Aj, −A + Aj, −A + Aj, A − Aj, A + Aj, −A + Aj, −A + Aj, −A − Aj, −A + Aj, −A + Aj, −A + Aj, −A + Aj, A − Aj, −A − Aj, A + Aj, A − Aj, −A + Aj, A − Aj, A − Aj |
| | Polarization 2 | A + Aj, A − Aj, A + Aj, −A − Aj, −A + Aj, −A − Aj, −A + Aj, −A + Aj, A − Aj, −A − Aj, −A − Aj, A + Aj, A + Aj, −A + Aj, A − Aj, A − Aj, −A + Aj, −A + Aj, −A − Aj, −A + Aj, A − Aj, −A − Aj, A + Aj, −A + Aj, −A − Aj, −A − Aj, −A + Aj, −A + Aj, −A + Aj, A − Aj, A + Aj, A − Aj, −A − Aj, A − Aj, A − Aj, −A + Aj, A − Aj, A − Aj, A − Aj, A + Aj, A + Aj, −A − Aj, −A + Aj, A + Aj, A + Aj, A − Aj, A + Aj, A + Aj, A + Aj, A + Aj, −A − Aj, A − Aj, −A + Aj, −A − Aj, A + Aj, −A − Aj, −A − Aj |
| 4 | Polarization 1 | A − Aj, A + Aj, A − Aj, −A + Aj, −A − Aj, −A + Aj, −A − Aj, −A − Aj, A + Aj, −A + Aj, −A + Aj, A − Aj, A − Aj, −A − Aj, A + Aj, A + Aj, −A − Aj, −A − Aj, −A + Aj, −A − Aj, A + Aj, −A + Aj, A − Aj, −A − Aj, −A + Aj, −A + Aj, −A − Aj, −A − Aj, −A − Aj, A + Aj, A − Aj, A + Aj, −A + Aj, A + Aj, A + Aj, −A − Aj, A + Aj, A + Aj, A + Aj, A − Aj, A − Aj, −A + Aj, −A − Aj, A − Aj, A − Aj, A + Aj, A − Aj, A − Aj, A − Aj, A − Aj, −A + Aj, A + Aj, −A − Aj, −A + Aj, A − Aj, −A + Aj, −A + Aj |
| | Polarization 2 | A + Aj, A − Aj, A + Aj, −A − Aj, −A + Aj, −A − Aj, −A + Aj, −A + Aj, A − Aj, −A − Aj, −A − Aj, A + Aj, A + Aj, −A + Aj, A − Aj, A − Aj, −A + Aj, −A + Aj, −A − Aj, −A + Aj, A − Aj, −A − Aj, A + Aj, −A + Aj, −A − Aj, −A − Aj, −A + Aj, −A + Aj, −A + Aj, A − Aj, A + Aj, A − Aj, −A − Aj, A − Aj, A − Aj, −A + Aj, A − Aj, A − Aj, A − Aj, A + Aj, A + Aj, −A − Aj, −A + Aj, A + Aj, A + Aj, A − Aj, A + Aj, A + Aj, A + Aj, A + Aj, −A − Aj, A − Aj, −A + Aj, −A − Aj, A + Aj, −A − Aj, −A − Aj |
| 5 | Polarization 1 | −A − Aj, A + Aj, A + Aj, −A − Aj, A + Aj, −A + Aj, A − Aj, A + Aj, −A − Aj, −A − Aj, −A − Aj, −A − Aj, A − Aj, −A − Aj, −A − Aj, −A + Aj, A + Aj, −A − Aj, −A − Aj, A − Aj, A − Aj, A − Aj, −A + Aj, A − Aj, A − Aj, A + Aj, A − Aj, −A − Aj, A − Aj, −A + Aj, −A + Aj, −A + Aj, A + Aj, A + Aj, −A + Aj, −A − Aj, A + Aj, A − Aj, −A + Aj, A + Aj, −A + Aj, −A + Aj, A − Aj, A − Aj, −A + Aj, −A − Aj, −A − Aj, A + Aj, A + Aj, A − Aj, −A + Aj, −A + Aj, A + Aj, −A + Aj, A + Aj, −A − Aj, A − Aj |
| | Polarization 2 | −A + Aj, A − Aj, A − Aj, −A + Aj, A − Aj, −A − Aj, A + Aj, A − Aj, −A + Aj, −A + Aj, −A + Aj, −A + Aj, A + Aj, −A + Aj, −A + Aj, −A − Aj, A − Aj, −A + Aj, −A + Aj, A + Aj, A + Aj, A + Aj, −A − Aj, A + Aj, A + Aj, A − Aj, A + Aj, −A + Aj, A + Aj, −A − Aj, −A − Aj, −A − Aj, A − Aj, A − Aj, −A − Aj, −A + Aj, A − Aj, A + Aj, −A − Aj, A − Aj, −A − Aj, −A − Aj, A + Aj, A + Aj, −A − Aj, −A + Aj, −A + Aj, A − Aj, A − Aj, A + Aj, −A − Aj, −A − Aj, A − Aj, −A − Aj, A − Aj, −A + Aj, A + Aj |
| 6 | Polarization 1 | −A − Aj, A + Aj, A + Aj, −A − Aj, A + Aj, −A + Aj, A − Aj, A + Aj, −A − Aj, −A − Aj, −A − Aj, −A − Aj, A − Aj, −A − Aj, −A − Aj, −A + Aj, A + Aj, −A − Aj, −A − Aj, A − Aj, A − Aj, A − Aj, −A + Aj, A − Aj, A − Aj, A + Aj, A − Aj, −A − Aj, A − Aj, −A + Aj, −A + Aj, −A + Aj, A + Aj, A + Aj, −A + Aj, −A − Aj, A + Aj, A − Aj, −A + Aj, A + Aj, −A + Aj, −A + Aj, A − Aj, A − Aj, −A + Aj, −A − Aj, −A − Aj, A + Aj, A + Aj, A − Aj, −A + Aj, −A + Aj, A + Aj, −A + Aj, A + Aj, −A − Aj, A − Aj |
| | Polarization 2 | A − Aj, −A + Aj, −A + Aj, A − Aj, −A + Aj, A + Aj, −A − Aj, −A + Aj, A − Aj, A − Aj, A − Aj, A − Aj, −A − Aj, A − Aj, A − Aj, A + Aj, −A + Aj, A − Aj, A − Aj, −A − Aj, −A − Aj, −A − Aj, A + Aj, −A − Aj, −A − Aj, −A + Aj, −A − Aj, A − Aj, −A − Aj, A + Aj, A + Aj, A + Aj, −A + Aj, −A + Aj, A + Aj, A − Aj, −A + Aj, −A − Aj, A + Aj, −A + Aj, A + Aj, A + Aj, −A − Aj, −A − Aj, A + Aj, A − Aj, A − Aj, −A + Aj, −A + Aj, −A − Aj, A + Aj, A + Aj, −A + Aj, A + Aj, −A + Aj, A − Aj, −A − Aj |
| 7 | Polarization 1 | −A + Aj, A − Aj, A − Aj, −A + Aj, A − Aj, −A − Aj, A + Aj, A − Aj, −A + Aj, −A + Aj, −A + Aj, −A + Aj, A + Aj, −A + Aj, −A + Aj, −A − Aj, A − Aj, −A + Aj, −A + Aj, A + Aj, A + Aj, A + Aj, −A − Aj, A + Aj, A + Aj, A − Aj, A + Aj, −A + Aj, A + Aj, −A − Aj, −A − Aj, −A − Aj, A − Aj, A − Aj, −A − Aj, −A + Aj, A − Aj, A + Aj, −A − Aj, A − Aj, −A − Aj, −A − Aj, A + Aj, A + Aj, −A − Aj, −A + Aj, −A + Aj, A − Aj, A − Aj, A + Aj, −A − Aj, −A − Aj, A − Aj, −A − Aj, A − Aj, −A + Aj, A + Aj |
| | Polarization 2 | A + Aj, −A − Aj, −A − Aj, A + Aj, −A − Aj, A − Aj, −A + Aj, −A − Aj, A + Aj, A + Aj, A + Aj, A + Aj, −A + Aj, A + Aj, A + Aj, A − Aj, −A − Aj, A + Aj, A + Aj, −A + Aj, −A + Aj, −A + Aj, A − Aj, −A + Aj, −A + Aj, −A − Aj, −A + Aj, A + Aj, −A + Aj, A − Aj, A − Aj, A − Aj, −A − Aj, −A − Aj, A − Aj, A + Aj, −A − Aj, −A + Aj, A − Aj, −A − Aj, A − Aj, A − Aj, −A + Aj, −A + Aj, A − Aj, A + Aj, A + Aj, −A − Aj, −A − Aj, −A + Aj, A − Aj, A − Aj, −A − Aj, A − Aj, −A − Aj, A + Aj, −A + Aj |
| 8 | Polarization 1 | A − Aj, −A + Aj, −A + Aj, A − Aj, −A + Aj, A + Aj, −A − Aj, −A + Aj, A − Aj, A − Aj, A − Aj, A − Aj, −A − Aj, A − Aj, A − Aj, A + Aj, −A + Aj, A − Aj, A − Aj, −A − Aj, −A − Aj, −A − Aj, A + Aj, −A − Aj, −A − Aj, −A + Aj, −A − Aj, A − Aj, −A − Aj, A + Aj, A + Aj, A + Aj, −A + Aj, −A + Aj, A + Aj, A − Aj, −A + Aj, −A − Aj, A + Aj, −A + Aj, A + Aj, A + Aj, −A − Aj, −A − Aj, A + Aj, A − Aj, A − Aj, −A + Aj, −A + Aj, −A − Aj, A + Aj, A + Aj, −A + Aj, A + Aj, −A + Aj, A − Aj, −A − Aj |

TABLE 10-1-continued

| Index | Polarization | Pilot sequence |
|---|---|---|
| | Polarization 2 | A + Aj, −A − Aj, −A − Aj, A + Aj, −A − Aj, A − Aj, −A + Aj, −A − Aj, A + Aj, A + Aj, A + Aj, A + Aj, −A + Aj, A + Aj, A + Aj, A − Aj, −A − Aj, A + Aj, A + Aj, −A + Aj, −A + Aj, −A + Aj, A − Aj, −A + Aj, −A + Aj, −A − Aj, −A + Aj, A + Aj, −A + Aj, A − Aj, A − Aj, A − Aj, −A − Aj, −A − Aj, A − Aj, A + Aj, −A − Aj, −A + Aj, A − Aj, −A − Aj, A − Aj, A − Aj, −A + Aj, −A + Aj, A − Aj, A + Aj, A + Aj, −A − Aj, −A − Aj, −A + Aj, A − Aj, A − Aj, −A − Aj, A − Aj, −A − Aj, A + Aj, −A + Aj |
| 9 | Polarization 1 | −A + Aj, −A − Aj, −A + Aj, A − Aj, −A − Aj, A − Aj, −A − Aj, −A + Aj, −A + Aj, A + Aj, A − Aj, −A + Aj, A − Aj, A − Aj, A − Aj, −A − Aj, A − Aj, A + Aj, A − Aj, A − Aj, A − Aj, A − Aj, −A − Aj, −A + Aj, A + Aj, −A + Aj, −A − Aj, −A − Aj, −A + Aj, −A − Aj, −A − Aj, −A + Aj, A + Aj, −A − Aj, A − Aj, −A + Aj, A − Aj, −A + Aj, −A + Aj, A + Aj, A + Aj, A + Aj, A + Aj, −A + Aj, A + Aj, −A + Aj, −A − Aj, A + Aj, −A + Aj, A + Aj, A − Aj, A + Aj, −A − Aj, −A − Aj, A + Aj, A + Aj, −A − Aj |
| | Polarization 2 | A − Aj, A − Aj, A − Aj, A + Aj, −A + Aj, −A − Aj, A + Aj, A − Aj, A + Aj, −A + Aj, −A + Aj, A − Aj, A + Aj, A + Aj, A − Aj, A − Aj, A + Aj, A + Aj, −A + Aj, −A + Aj, −A − Aj, A − Aj, −A + Aj, −A − Aj, A + Aj, A + Aj, A − Aj, −A − Aj, −A + Aj, −A + Aj, −A − Aj, A − Aj, A − Aj, −A − Aj, −A − Aj, −A + Aj, −A − Aj, A + Aj, −A + Aj, −A − Aj, A − Aj, −A − Aj, A − Aj, A − Aj, −A − Aj, A + Aj, −A + Aj, A + Aj, −A + Aj, A + Aj, A + Aj, A − Aj, −A + Aj, −A − Aj, −A − Aj, −A − Aj, −A + Aj |

TABLE 10-2

| Index | Polarization | Pilot sequence |
|---|---|---|
| 1 | Polarization 1 | −A − Aj, −A + Aj, −A + Aj, A − Aj, A − Aj, −A + Aj, A + Aj, A − Aj, −A − Aj, A − Aj, −A + Aj, −A + Aj, −A − Aj, −A − Aj, −A + Aj, −A − Aj, A + Aj, A − Aj, −A − Aj, −A + Aj, −A + Aj, −A + Aj, A − Aj, −A + Aj, −A + Aj, A + Aj, −A − Aj, −A + Aj, A − Aj, A − Aj, A − Aj, A + Aj, A − Aj, A − Aj, A + Aj, −A + Aj, A − Aj, A + Aj, A + Aj, A + Aj, A + Aj, −A − Aj, −A − Aj, −A − Aj, A − Aj, A + Aj, A + Aj, −A − Aj, A + Aj, −A − Aj, A − Aj, −A + Aj, A − Aj, −A − Aj, −A − Aj, A + Aj, −A + Aj |
| | Polarization 2 | −A + Aj, −A − Aj, −A − Aj, A + Aj, A + Aj, −A − Aj, A − Aj, A + Aj, −A + Aj, A + Aj, −A − Aj, −A − Aj, −A + Aj, −A + Aj, −A − Aj, −A + Aj, A − Aj, A + Aj, −A + Aj, −A − Aj, −A − Aj, −A − Aj, A + Aj, −A − Aj, −A − Aj, A − Aj, −A + Aj, −A − Aj, A + Aj, A + Aj, A + Aj, A − Aj, A + Aj, A + Aj, A − Aj, −A − Aj, A + Aj, A − Aj, A − Aj, A − Aj, A − Aj, −A + Aj, −A + Aj, −A + Aj, A + Aj, A − Aj, A − Aj, −A + Aj, A − Aj, −A + Aj, A + Aj, −A − Aj, A + Aj, −A + Aj, −A + Aj, A − Aj, −A − Aj |
| 2 | Polarization 1 | −A − Aj, −A + Aj, −A + Aj, A − Aj, A − Aj, −A + Aj, A + Aj, A − Aj, −A − Aj, A − Aj, −A + Aj, −A + Aj, −A − Aj, −A − Aj, −A + Aj, −A − Aj, A + Aj, A − Aj, −A − Aj, −A + Aj, −A + Aj, −A + Aj, A − Aj, −A + Aj, −A + Aj, A + Aj, −A − Aj, −A + Aj, A − Aj, A − Aj, A − Aj, A + Aj, A − Aj, A − Aj, A + Aj, −A + Aj, A − Aj, A + Aj, A + Aj, A + Aj, A + Aj, −A − Aj, −A − Aj, −A − Aj, A − Aj, A + Aj, A + Aj, −A − Aj, A + Aj, −A − Aj, A − Aj, −A + Aj, A − Aj, −A − Aj, −A − Aj, A + Aj, −A + Aj |
| | Polarization 2 | A − Aj, A + Aj, A + Aj, −A − Aj, −A − Aj, A + Aj, −A + Aj, −A − Aj, A − Aj, −A − Aj, A + Aj, A + Aj, A − Aj, A − Aj, A + Aj, A − Aj, −A + Aj, −A − Aj, A − Aj, A + Aj, A + Aj, A + Aj, −A − Aj, A + Aj, A + Aj, −A + Aj, A − Aj, A + Aj, −A − Aj, −A − Aj, −A − Aj, −A + Aj, −A − Aj, −A − Aj, −A + Aj, A + Aj, −A − Aj, −A + Aj, −A + Aj, −A + Aj, −A + Aj, A − Aj, A − Aj, A − Aj, −A − Aj, −A + Aj, −A + Aj, A − Aj, −A + Aj, A − Aj, −A − Aj, A + Aj, −A − Aj, A − Aj, A − Aj, −A + Aj, A + Aj |
| 3 | Polarization 1 | A + Aj, A − Aj, A − Aj, −A + Aj, −A + Aj, A − Aj, −A − Aj, −A + Aj, A + Aj, −A + Aj, A − Aj, A − Aj, A + Aj, A + Aj, A − Aj, A + Aj, −A − Aj, −A + Aj, A + Aj, A − Aj, A − Aj, A − Aj, −A + Aj, A − Aj, A − Aj, −A − Aj, A + Aj, A − Aj, −A + Aj, −A + Aj, −A + Aj, −A − Aj, −A + Aj, −A + Aj, −A − Aj, A − Aj, −A + Aj, −A − Aj, −A − Aj, −A − Aj, −A − Aj, A + Aj, A + Aj, A + Aj, −A + Aj, −A − Aj, −A − Aj, A + Aj, −A − Aj, A + Aj, −A + Aj, A − Aj, −A + Aj, A + Aj, A + Aj, −A − Aj, A − Aj |
| | Polarization 2 | −A + Aj, −A − Aj, −A − Aj, A + Aj, A + Aj, −A − Aj, A − Aj, A + Aj, −A + Aj, A + Aj, −A − Aj, −A − Aj, −A + Aj, −A + Aj, −A − Aj, −A + Aj, A − Aj, A + Aj, −A + Aj, −A − Aj, −A − Aj, −A − Aj, A + Aj, −A − Aj, −A − Aj, A − Aj, −A + Aj, −A − Aj, A + Aj, A + Aj, A + Aj, A − Aj, A + Aj, A + Aj, A − Aj, −A − Aj, A + Aj, A − Aj, A − Aj, A − Aj, A − Aj, −A + Aj, −A + Aj, −A + Aj, A + Aj, A − Aj, A − Aj, −A + Aj, A − Aj, −A + Aj, A + Aj, −A − Aj, A + Aj, −A + Aj, −A + Aj, A − Aj, −A − Aj |
| 4 | Polarization 1 | A + Aj, A − Aj, A − Aj, −A + Aj, −A + Aj, A − Aj, −A − Aj, −A + Aj, A + Aj, −A + Aj, A − Aj, A − Aj, A + Aj, A + Aj, A − Aj, A + Aj, −A − Aj, −A + Aj, A + Aj, A − Aj, A − Aj, A − Aj, −A + Aj, A − Aj, A − Aj, −A − Aj, A + Aj, A − Aj, −A + Aj, −A + Aj, −A + Aj, −A − Aj, −A + Aj, −A + Aj, −A − Aj, A − Aj, −A + Aj, −A − Aj, −A − Aj, −A − Aj, −A − Aj, A + Aj, A + Aj, A + Aj, −A + Aj, −A − Aj, −A − Aj, A + Aj, −A − Aj, A + Aj, −A + Aj, A − Aj, −A + Aj, A + Aj, A + Aj, −A − Aj, A − Aj |
| | Polarization 2 | A − Aj, A + Aj, A + Aj, −A − Aj, −A − Aj, A + Aj, −A + Aj, −A − Aj, A − Aj, −A − Aj, A + Aj, A + Aj, A − Aj, A − Aj, A + Aj, A − Aj, −A + Aj, −A − Aj, A − Aj, A + Aj, A + Aj, A + Aj, −A − Aj, A + Aj, A + Aj, −A + Aj, A − Aj, A + Aj, −A − Aj, −A − Aj, −A − Aj, −A + Aj, −A − Aj, −A − Aj, −A + Aj, A + Aj, −A − Aj, −A + Aj, −A + Aj, −A + Aj, −A + Aj, A − Aj, A − Aj, A − Aj, −A − Aj, −A + Aj, −A + Aj, A − Aj, −A + Aj, A − Aj, −A − Aj, A + Aj, −A − Aj, A − Aj, A − Aj, −A + Aj, A + Aj |
| 5 | Polarization 1 | A − Aj, −A + Aj, −A + Aj, −A − Aj, A − Aj, A − Aj, A + Aj, A − Aj, A − Aj, A + Aj, −A + Aj, −A + Aj, A − Aj, −A − Aj, A + Aj, A − Aj, −A − Aj, −A − Aj, A + Aj, A + Aj, −A − Aj, A + Aj, −A − Aj, A + Aj, A + Aj, −A − Aj, A − Aj, −A + Aj, −A − Aj, −A + Aj, −A − Aj, A − Aj, −A + Aj, −A + Aj, −A + Aj, −A + Aj, A − Aj, A − Aj, A − Aj, A − Aj, A + Aj, −A − Aj, A + Aj, A + Aj, A − Aj, −A + Aj, A − Aj, −A − Aj, −A + Aj, −A − Aj, A − Aj, A + Aj, −A + Aj, A + Aj, −A − Aj, −A + Aj, −A + Aj |
| | Polarization 2 | −A − Aj, −A + Aj, A + Aj, A − Aj, A − Aj, A + Aj, −A − Aj, −A − Aj, −A + Aj, A − Aj, A + Aj, A − Aj, −A − Aj, −A + Aj, A + Aj, A − Aj, −A − Aj, −A − Aj, A + Aj, −A − Aj, −A + Aj, A − Aj, A + Aj, −A − Aj, −A − Aj, A + Aj, A − Aj, −A + Aj, A + Aj, A + Aj, A − Aj, −A − Aj, A + Aj, −A − Aj, A − Aj, −A + Aj, −A + Aj, −A − Aj, A + Aj, −A − Aj, −A + Aj, −A + Aj, −A + Aj, −A − Aj, A − Aj, A + Aj, A − Aj, −A + Aj, −A − Aj, A + Aj, −A + Aj, −A + Aj, A + Aj, −A − Aj, A − Aj, A − Aj, A + Aj |
| 6 | Polarization 1 | A + Aj, −A − Aj, A + Aj, A − Aj, −A + Aj, −A + Aj, −A + Aj, A + Aj, A − Aj, A − Aj, −A + Aj, A + Aj, A − Aj, −A − Aj, A − Aj, A − Aj, A − Aj, −A − Aj, −A − Aj, −A + Aj, −A + Aj, −A − Aj, −A − Aj, A − Aj, A − Aj, A − Aj, −A + Aj, −A + Aj, −A − Aj, −A − Aj, A + Aj, A + Aj, A + Aj, −A − Aj, A − Aj, A + Aj, −A + Aj, −A + Aj, A + Aj, −A + Aj, −A − Aj, A + Aj, −A − Aj, A + Aj, A − Aj, |

TABLE 10-2-continued

| Index | Polarization | Pilot sequence |
|---|---|---|
| | | A + Aj, –A + Aj, –A + Aj, A – Aj, A – Aj, A + Aj, –A – Aj, –A – Aj, A + Aj, –A + Aj, A – Aj, –A + Aj |
| | Polarization 2 | –A + Aj, –A – Aj, A – Aj, –A – Aj, –A + Aj, A – Aj, –A + Aj, –A – Aj, A + Aj, –A – Aj, –A + Aj, A – Aj, A + Aj, –A – Aj, –A + Aj, A + Aj, A + Aj, –A – Aj, –A + Aj, –A + Aj, A + Aj, A – Aj, A – Aj, A + Aj, –A + Aj, –A – Aj, A + Aj, –A + Aj, –A – Aj, –A + Aj, –A – Aj, –A + Aj, –A + Aj, –A + Aj, A + Aj, A + Aj, A + Aj, –A – Aj, A – Aj, –A + Aj, A + Aj, A + Aj, –A – Aj, A – Aj, A – Aj, –A – Aj, –A – Aj, A – Aj, A – Aj, A + Aj, A – Aj, A – Aj, A + Aj, –A – Aj, A + Aj, –A – Aj, A – Aj |
| 7 | Polarization 1 | A + Aj, –A – Aj, –A + Aj, –A + Aj, –A – Aj, A – Aj, –A – Aj, A – Aj, A + Aj, –A – Aj, –A + Aj, –A + Aj, –A + Aj, A + Aj, A – Aj, A + Aj, –A – Aj, –A – Aj, A + Aj, –A + Aj, –A – Aj, A + Aj, A – Aj, A + Aj, A – Aj, A – Aj, A – Aj, –A – Aj, A + Aj, –A + Aj, A – Aj, –A + Aj, –A – Aj, A + Aj, A – Aj, –A + Aj, A – Aj, A + Aj, A – Aj, A + Aj, A – Aj, –A – Aj, –A + Aj, –A – Aj, –A – Aj, A + Aj, A + Aj, –A + Aj, –A – Aj, –A + Aj, A – Aj, –A + Aj, A + Aj, A – Aj, A – Aj, –A + Aj, –A + Aj |
| | Polarization 2 | –A + Aj, –A + Aj, –A + Aj, A – Aj, A – Aj, –A – Aj, A + Aj, A – Aj, –A – Aj, A + Aj, A – Aj, A – Aj, A + Aj, A + Aj, A – Aj, –A – Aj, A – Aj, A + Aj, A + Aj, A + Aj, A + Aj, A + Aj, A – Aj, A + Aj, –A + Aj, –A – Aj, A + Aj, A + Aj, –A + Aj, –A + Aj, –A – Aj, –A – Aj, –A – Aj, –A – Aj, A – Aj, –A – Aj, –A + Aj, –A – Aj, A + Aj, –A + Aj, –A + Aj, A + Aj, –A + Aj, –A – Aj, –A – Aj, –A + Aj, –A – Aj, A – Aj, A – Aj, –A – Aj, A – Aj, –A + Aj, A – Aj, A + Aj, –A + Aj, –A + Aj, –A – Aj |
| 8 | Polarization 1 | A + Aj, A – Aj, A – Aj, A – Aj, –A + Aj, A – Aj, A + Aj, –A + Aj, A + Aj, A + Aj, –A – Aj, A – Aj, A + Aj, –A – Aj, –A – Aj, –A + Aj, A – Aj, A – Aj, A – Aj, A + Aj, –A + Aj, –A + Aj, –A + Aj, –A + Aj, –A + Aj, –A – Aj, –A + Aj, –A – Aj, A – Aj, –A – Aj, –A – Aj, –A – Aj, –A + Aj, A – Aj, A – Aj, –A – Aj, –A + Aj, A – Aj, –A – Aj, –A + Aj, –A + Aj, –A + Aj, A + Aj, A + Aj, –A + Aj, A – Aj, A + Aj, A + Aj, –A – Aj, A + Aj, A – Aj, A + Aj, –A – Aj, –A – Aj, A + Aj, A – Aj, A + Aj |
| | Polarization 2 | A – Aj, –A + Aj, –A + Aj, –A – Aj, A + Aj, A – Aj, A + Aj, A + Aj, A + Aj, –A + Aj, –A + Aj, –A + Aj, –A – Aj, A – Aj, A + Aj, –A – Aj, A + Aj, A – Aj, –A – Aj, –A + Aj, –A – Aj, A + Aj, –A + Aj, A + Aj, –A – Aj, –A – Aj, A + Aj, A – Aj, –A + Aj, A – Aj, –A + Aj, –A – Aj, –A + Aj, A – Aj, –A – Aj, –A + Aj, A + Aj, A + Aj, –A – Aj, A – Aj, –A + Aj, A – Aj, A + Aj, –A – Aj, A – Aj, A – Aj, A – Aj, –A – Aj, A + Aj, –A – Aj, –A + Aj, A – Aj, A – Aj, –A – Aj, A + Aj, –A – Aj, A + Aj |

(4) It is assumed that $N_{PS}$=65. If a remainder of $N_{TS}$ divided by 4 is 0, the pilot sequence is one item in the following Table 11-1. If a remainder of $N_{TS}$ divided by 4 is 2, the pilot sequence is one item in the following Table 11-1 or Table 11-2.

TABLE 11-1

| Index | Polarization | Pilot sequence |
|---|---|---|
| 1 | Polarization 1 | –A – Aj, A – Aj, –A + Aj, A – Aj, A + Aj, A – Aj, –A + Aj, –A – Aj, A + Aj, A + Aj, A – Aj, –A + Aj, A + Aj, A – Aj, –A – Aj, –A + Aj, –A + Aj, A + Aj, A + Aj, –A + Aj, A + Aj, –A + Aj, A – Aj, A + Aj, –A + Aj, –A – Aj, A + Aj, –A – Aj, A + Aj, A – Aj, –A – Aj, A – Aj, –A – Aj, –A – Aj, –A – Aj, –A + Aj, A + Aj, –A – Aj, A + Aj, –A + Aj, –A + Aj, –A + Aj, A + Aj, –A – Aj, –A – Aj, –A – Aj, A – Aj, A – Aj, A + Aj, –A – Aj, –A + Aj, –A + Aj, –A – Aj, A – Aj, A – Aj, –A – Aj, –A + Aj, A – Aj, A – Aj, –A – Aj, A – Aj, A + Aj, –A + Aj, A + Aj, A – Aj |
| | Polarization 2 | –A + Aj, A + Aj, –A – Aj, A + Aj, A – Aj, A + Aj, –A – Aj, –A + Aj, A – Aj, A – Aj, A + Aj, –A – Aj, A – Aj, A + Aj, –A + Aj, –A – Aj, –A – Aj, A – Aj, A – Aj, –A – Aj, A – Aj, –A – Aj, A + Aj, A – Aj, –A – Aj, –A + Aj, A – Aj, –A + Aj, A – Aj, A + Aj, –A + Aj, A + Aj, –A + Aj, –A + Aj, –A + Aj, –A – Aj, A – Aj, –A + Aj, A – Aj, –A – Aj, –A – Aj, –A – Aj, A – Aj, –A + Aj, –A + Aj, –A + Aj, A + Aj, A + Aj, A – Aj, –A + Aj, –A – Aj, –A – Aj, –A + Aj, A + Aj, A + Aj, –A + Aj, –A – Aj, A + Aj, A + Aj, –A + Aj, A + Aj, A – Aj, –A – Aj, A – Aj, A + Aj |
| 2 | Polarization 1 | –A – Aj, A – Aj, –A + Aj, A – Aj, A + Aj, A – Aj, –A + Aj, –A – Aj, A + Aj, A + Aj, A – Aj, –A + Aj, A + Aj, A – Aj, –A – Aj, –A + Aj, –A + Aj, A + Aj, A + Aj, –A + Aj, A + Aj, –A + Aj, A – Aj, A + Aj, –A + Aj, –A – Aj, A + Aj, –A – Aj, A + Aj, A – Aj, –A – Aj, A – Aj, –A – Aj, –A – Aj, –A – Aj, –A + Aj, A + Aj, –A – Aj, A + Aj, –A + Aj, –A + Aj, –A + Aj, A + Aj, –A – Aj, –A – Aj, –A – Aj, A – Aj, A – Aj, A + Aj, –A – Aj, –A + Aj, –A + Aj, –A – Aj, A – Aj, A – Aj, –A – Aj, –A + Aj, A – Aj, A – Aj, –A – Aj, A – Aj, A + Aj, –A + Aj, A + Aj, A – Aj |
| | Polarization 2 | A – Aj, –A – Aj, A + Aj, –A – Aj, –A + Aj, –A – Aj, A + Aj, A – Aj, –A + Aj, –A + Aj, –A – Aj, A + Aj, –A + Aj, –A – Aj, A – Aj, A + Aj, A + Aj, –A + Aj, –A + Aj, A + Aj, –A + Aj, A + Aj, –A – Aj, –A + Aj, A + Aj, A – Aj, –A + Aj, A – Aj, –A + Aj, –A – Aj, A – Aj, –A – Aj, A – Aj, A – Aj, A – Aj, A + Aj, –A + Aj, A – Aj, –A + Aj, A + Aj, A + Aj, A + Aj, –A + Aj, A – Aj, A – Aj, A – Aj, –A – Aj, –A – Aj, –A + Aj, A – Aj, A + Aj, A + Aj, A – Aj, –A – Aj, –A – Aj, A – Aj, A + Aj, –A – Aj, –A – Aj, A – Aj, –A – Aj, –A + Aj, A + Aj, –A + Aj, –A – Aj |
| 3 | Polarization 1 | –A + Aj, A + Aj, –A – Aj, A + Aj, A – Aj, A + Aj, –A – Aj, –A + Aj, A – Aj, A – Aj, A + Aj, –A – Aj, A – Aj, A + Aj, –A + Aj, –A – Aj, –A – Aj, A – Aj, A – Aj, –A – Aj, A – Aj, –A – Aj, A + Aj, A – Aj, –A – Aj, –A + Aj, A – Aj, –A + Aj, A – Aj, A + Aj, –A + Aj, A + Aj, –A + Aj, –A + Aj, –A + Aj, –A – Aj, A – Aj, –A + Aj, A – Aj, –A – Aj, –A – Aj, –A – Aj, A – Aj, –A + Aj, –A + Aj, –A + Aj, A + Aj, A + Aj, A – Aj, –A + Aj, –A – Aj, –A – Aj, –A + Aj, A + Aj, A + Aj, –A + Aj, –A – Aj, A + Aj, A + Aj, –A + Aj, A + Aj, A – Aj, –A – Aj, A – Aj, A + Aj |
| | Polarization 2 | A + Aj, –A + Aj, A – Aj, –A + Aj, –A – Aj, –A + Aj, A – Aj, A + Aj, –A – Aj, –A – Aj, –A + Aj, A – Aj, –A – Aj, –A + Aj, A + Aj, A – Aj, A – Aj, –A – Aj, –A – Aj, A – Aj, –A – Aj, A – Aj, –A + Aj, –A – Aj, A – Aj, A + Aj, –A – Aj, A + Aj, –A – Aj, –A + Aj, A + Aj, –A + Aj, A + Aj, A + Aj, A + Aj, A – Aj, –A – Aj, A + Aj, –A – Aj, A – Aj, A – Aj, A – Aj, –A – Aj, A + Aj, A + Aj, A + Aj, –A + Aj, –A + Aj, –A – Aj, A + Aj, A – Aj, A – Aj, A + Aj, –A + Aj, –A + Aj, A + Aj, A – Aj, –A + Aj, –A + Aj, A + Aj, –A + Aj, –A – Aj, A – Aj, –A – Aj, –A + Aj |

TABLE 11-1-continued

| Index | Polarization | Pilot sequence |
|---|---|---|
| 4 | Polarization 1 | A − Aj, −A − Aj, A + Aj, −A − Aj, −A + Aj, −A − Aj, A + Aj, A − Aj, −A + Aj, −A + Aj, −A − Aj, A + Aj, −A + Aj, −A − Aj, A − Aj, A + Aj, A + Aj, −A + Aj, −A + Aj, A + Aj, −A + Aj, A + Aj, −A − Aj, −A + Aj, A + Aj, A − Aj, −A + Aj, A − Aj, −A + Aj, −A − Aj, A − Aj, −A − Aj, A − Aj, A − Aj, A − Aj, A + Aj, −A + Aj, A − Aj, −A + Aj, A + Aj, A + Aj, A + Aj, −A + Aj, A − Aj, A − Aj, A − Aj, −A − Aj, −A − Aj, −A + Aj, A − Aj, A + Aj, A + Aj, A − Aj, −A − Aj, −A − Aj, A − Aj, A + Aj, −A − Aj, −A − Aj, A − Aj, −A − Aj, −A + Aj, A + Aj, −A + Aj, −A − Aj |
| | Polarization 2 | A + Aj, −A + Aj, A − Aj, −A + Aj, −A − Aj, −A + Aj, A − Aj, A + Aj, −A − Aj, −A − Aj, −A + Aj, A − Aj, −A − Aj, −A + Aj, A + Aj, A − Aj, A − Aj, −A − Aj, −A − Aj, A − Aj, −A − Aj, A − Aj, −A + Aj, −A − Aj, A − Aj, A + Aj, −A − Aj, A + Aj, −A − Aj, −A + Aj, A + Aj, −A + Aj, A + Aj, A + Aj, A + Aj, A − Aj, −A − Aj, A + Aj, −A − Aj, A − Aj, A − Aj, A − Aj, −A − Aj, A + Aj, A + Aj, A + Aj, −A + Aj, −A + Aj, −A − Aj, A + Aj, A − Aj, A − Aj, A + Aj, −A + Aj, −A + Aj, A + Aj, A − Aj, −A + Aj, −A + Aj, A + Aj, −A + Aj, −A − Aj, A − Aj, −A − Aj, −A + Aj |
| 5 | Polarization 1 | −A − Aj, A + Aj, A + Aj, A − Aj, A + Aj, A − Aj, A + Aj, −A − Aj, A − Aj, A + Aj, −A + Aj, −A − Aj, −A + Aj, −A + Aj, −A − Aj, −A − Aj, −A + Aj, A + Aj, A + Aj, A − Aj, −A + Aj, A + Aj, −A − Aj, A + Aj, −A + Aj, A + Aj, −A − Aj, −A + Aj, −A − Aj, −A − Aj, A + Aj, A − Aj, −A − Aj, −A + Aj, A − Aj, A + Aj, −A + Aj, A − Aj, −A − Aj, A − Aj, A + Aj, A + Aj, −A + Aj, A − Aj, A − Aj, A + Aj, −A − Aj, −A − Aj, A − Aj, A − Aj, A + Aj, A − Aj, −A + Aj, −A + Aj, −A + Aj, −A − Aj, A − Aj, −A − Aj, −A − Aj, −A − Aj, −A + Aj, −A + Aj, A − Aj, −A + Aj, A − Aj |
| | Polarization 2 | −A + Aj, A − Aj, A − Aj, A + Aj, A − Aj, A + Aj, A − Aj, −A + Aj, A + Aj, A − Aj, −A − Aj, −A + Aj, −A − Aj, −A − Aj, −A + Aj, −A + Aj, −A − Aj, A − Aj, A − Aj, A + Aj, −A − Aj, A − Aj, −A + Aj, A − Aj, −A − Aj, A − Aj, −A + Aj, −A − Aj, −A + Aj, −A + Aj, A − Aj, A + Aj, −A + Aj, −A − Aj, A + Aj, A − Aj, −A − Aj, A + Aj, −A + Aj, A + Aj, A − Aj, A − Aj, −A − Aj, A + Aj, A + Aj, A − Aj, −A + Aj, −A + Aj, A + Aj, A + Aj, A − Aj, A + Aj, −A − Aj, −A − Aj, −A − Aj, −A + Aj, A + Aj, −A + Aj, −A + Aj, −A + Aj, −A − Aj, −A − Aj, A + Aj, −A − Aj, A + Aj |
| 6 | Polarization 1 | −A − Aj, A + Aj, A + Aj, A − Aj, A + Aj, A − Aj, A + Aj, −A − Aj, A − Aj, A + Aj, −A + Aj, −A − Aj, −A + Aj, −A + Aj, −A − Aj, −A − Aj, −A + Aj, A + Aj, A + Aj, A − Aj, −A + Aj, A + Aj, −A − Aj, A + Aj, −A + Aj, A + Aj, −A − Aj, −A + Aj, −A − Aj, −A − Aj, A + Aj, A − Aj, −A − Aj, −A + Aj, A − Aj, A + Aj, −A + Aj, A − Aj, −A − Aj, A − Aj, A + Aj, A + Aj, −A + Aj, A − Aj, A − Aj, A + Aj, −A − Aj, −A − Aj, A − Aj, A − Aj, A + Aj, A − Aj, −A + Aj, −A + Aj, −A + Aj, −A − Aj, A − Aj, −A − Aj, −A − Aj, −A − Aj, −A + Aj, −A + Aj, A − Aj, −A + Aj, A − Aj |
| | Polarization 2 | A − Aj, −A + Aj, −A + Aj, −A − Aj, −A + Aj, −A − Aj, −A + Aj, A − Aj, −A − Aj, −A + Aj, A + Aj, A − Aj, A + Aj, A + Aj, A − Aj, A − Aj, A + Aj, −A + Aj, −A + Aj, −A − Aj, A + Aj, −A + Aj, A − Aj, −A + Aj, A + Aj, −A + Aj, A − Aj, A + Aj, A − Aj, A − Aj, −A + Aj, −A − Aj, A − Aj, A + Aj, −A − Aj, −A + Aj, A + Aj, −A − Aj, A − Aj, −A − Aj, −A + Aj, −A + Aj, A + Aj, −A − Aj, −A − Aj, −A + Aj, A − Aj, A − Aj, −A − Aj, −A − Aj, −A + Aj, −A − Aj, A + Aj, A + Aj, A + Aj, A − Aj, −A − Aj, A − Aj, A − Aj, A − Aj, A + Aj, A + Aj, −A − Aj, A + Aj, −A − Aj |
| 7 | Polarization 1 | −A + Aj, A − Aj, A − Aj, A + Aj, A − Aj, A + Aj, A − Aj, −A + Aj, A + Aj, A − Aj, −A − Aj, −A + Aj, −A − Aj, −A − Aj, −A + Aj, −A + Aj, −A − Aj, A − Aj, A − Aj, A + Aj, −A − Aj, A − Aj, −A + Aj, A − Aj, −A − Aj, A − Aj, −A + Aj, −A − Aj, −A + Aj, −A + Aj, A − Aj, A + Aj, −A + Aj, −A − Aj, A + Aj, A − Aj, −A − Aj, A + Aj, −A + Aj, A + Aj, A − Aj, A − Aj, −A − Aj, A + Aj, A + Aj, A − Aj, −A + Aj, −A + Aj, A + Aj, A + Aj, A − Aj, A + Aj, −A − Aj, −A − Aj, −A − Aj, −A + Aj, A + Aj, −A + Aj, −A + Aj, −A + Aj, −A − Aj, −A − Aj, A + Aj, −A − Aj, A + Aj |
| | Polarization 2 | A + Aj, −A − Aj, −A − Aj, −A + Aj, −A − Aj, −A + Aj, −A − Aj, A + Aj, −A + Aj, −A − Aj, A − Aj, A + Aj, A − Aj, A − Aj, A + Aj, A + Aj, A − Aj, −A − Aj, −A − Aj, −A + Aj, A − Aj, −A − Aj, A + Aj, −A − Aj, A − Aj, −A − Aj, A + Aj, A − Aj, A + Aj, A + Aj, −A − Aj, −A + Aj, A + Aj, A − Aj, −A + Aj, −A − Aj, A − Aj, −A + Aj, A + Aj, −A + Aj, −A − Aj, −A − Aj, A − Aj, −A + Aj, −A + Aj, −A − Aj, A + Aj, A + Aj, −A + Aj, −A + Aj, −A − Aj, −A + Aj, A − Aj, A − Aj, A − Aj, A + Aj, −A + Aj, A + Aj, A + Aj, A + Aj, A − Aj, A − Aj, −A + Aj, A − Aj, −A + Aj |
| 8 | Polarization 1 | A − Aj, −A + Aj, −A + Aj, −A − Aj, −A + Aj, −A − Aj, −A + Aj, A − Aj, −A − Aj, −A + Aj, A + Aj, A − Aj, A + Aj, A + Aj, A − Aj, A − Aj, A + Aj, −A + Aj, −A + Aj, −A − Aj, A + Aj, −A + Aj, A − Aj, −A + Aj, A + Aj, −A + Aj, A − Aj, A + Aj, A − Aj, A − Aj, −A + Aj, −A − Aj, A − Aj, A + Aj, −A − Aj, −A + Aj, A + Aj, −A − Aj, A − Aj, −A − Aj, −A + Aj, −A + Aj, A + Aj, −A − Aj, −A − Aj, −A + Aj, A − Aj, A − Aj, −A − Aj, −A − Aj, −A + Aj, −A − Aj, A + Aj, A + Aj, A + Aj, A − Aj, −A − Aj, A − Aj, A − Aj, A − Aj, A + Aj, A + Aj, −A − Aj, A + Aj, −A − Aj |
| | Polarization 2 | A + Aj, −A − Aj, −A − Aj, −A + Aj, −A − Aj, −A + Aj, −A − Aj, A + Aj, −A + Aj, −A − Aj, A − Aj, A + Aj, A − Aj, A − Aj, A + Aj, A + Aj, A − Aj, −A − Aj, −A − Aj, −A + Aj, A − Aj, −A − Aj, A + Aj, −A − Aj, A − Aj, −A − Aj, A + Aj, A − Aj, A + Aj, A + Aj, −A − Aj, −A + Aj, A + Aj, A − Aj, −A + Aj, −A − Aj, A − Aj, −A + Aj, A + Aj, −A + Aj, −A − Aj, −A − Aj, A − Aj, −A + Aj, −A + Aj, −A − Aj, A + Aj, A + Aj, −A + Aj, −A + Aj, −A − Aj, −A + Aj, A − Aj, A − Aj, A − Aj, A + Aj, −A + Aj, A + Aj, A + Aj, A + Aj, A − Aj, A − Aj, −A + Aj, A − Aj, −A + Aj |
| 9 | Polarization 1 | −A − Aj, −A + Aj, A − Aj, −A + Aj, A − Aj, A − Aj, −A − Aj, −A − Aj, −A − Aj, −A + Aj, −A − Aj, A − Aj, A − Aj, A − Aj, −A + Aj, A + Aj, −A + Aj, −A + Aj, −A − Aj, −A − Aj, A + Aj, −A + Aj, −A + Aj, A − Aj, A + Aj, A + Aj, −A + Aj, −A − Aj, −A + Aj, A − Aj, A + Aj, −A + Aj, A − Aj, −A − Aj, −A + Aj, A + Aj, −A − Aj, −A − Aj, A − Aj, −A − Aj, A + Aj, A − Aj, A + Aj, −A − Aj, A + Aj, A − Aj, −A + Aj, A + Aj, A + Aj, A − Aj, −A − Aj, −A − Aj, A − Aj, A − Aj, −A − Aj, A − Aj, A + Aj, −A + Aj, −A − Aj, A + Aj, −A + Aj, A + Aj, −A + Aj, A + Aj, A + Aj |
| | Polarization 2 | −A + Aj, −A − Aj, A + Aj, −A − Aj, A + Aj, A + Aj, −A + Aj, −A + Aj, −A + Aj, −A − Aj, −A + Aj, A + Aj, A + Aj, A + Aj, −A − Aj, A − Aj, −A − Aj, −A − Aj, −A + Aj, −A + Aj, A − Aj, −A − Aj, −A − Aj, A + Aj, A − Aj, A − Aj, −A − Aj, −A + Aj, −A − Aj, A + Aj, A − Aj, −A − Aj, A + Aj, −A + Aj, −A − Aj, A − Aj, −A + Aj, −A + Aj, A + Aj, −A + Aj, A − Aj, A + Aj, A − Aj, −A + Aj, A − Aj, A + Aj, −A − Aj, A − Aj, A − Aj, A + Aj, −A + Aj, −A + Aj, A + Aj, A + Aj, −A + Aj, A + Aj, A − Aj, −A − Aj, −A + Aj, A − Aj, −A − Aj, A − Aj, −A − Aj, A − Aj, A − Aj |
| 10 | Polarization 1 | −A − Aj, −A + Aj, A − Aj, −A + Aj, A − Aj, A − Aj, −A − Aj, −A − Aj, −A − Aj, −A + Aj, −A − Aj, A − Aj, A − Aj, A − Aj, −A + Aj, A + Aj, −A + Aj, −A + Aj, −A − Aj, −A − Aj, A + Aj, −A + Aj, −A + Aj, A − Aj, A + Aj, A + Aj, −A + Aj, −A − Aj, −A + Aj, A − Aj, A + Aj, −A + Aj, A − Aj, −A − Aj, −A + Aj, A + Aj, −A − Aj, −A − Aj, A − Aj, −A − Aj, A + Aj, A − Aj, A + Aj, −A − Aj, A + Aj, A − Aj, −A + Aj, A + Aj, A + Aj, A − Aj, −A − Aj, −A − Aj, A − Aj, A − Aj, −A − Aj, A − Aj, A + Aj, −A + Aj, −A − Aj, A + Aj, −A + Aj, A + Aj, −A + Aj, A + Aj, A + Aj |

TABLE 11-1-continued

| Index | Polarization | Pilot sequence |
|---|---|---|
| | Polarization 2 | A − Aj, A + Aj, −A − Aj, A + Aj, −A − Aj, −A − Aj, A − Aj, A − Aj, A − Aj, A + Aj, A − Aj, −A − Aj, −A − Aj, −A − Aj, A + Aj, −A + Aj, A + Aj, A + Aj, A − Aj, A − Aj, −A + Aj, A + Aj, A + Aj, −A − Aj, −A + Aj, −A + Aj, A + Aj, A − Aj, A + Aj, −A − Aj, −A + Aj, A + Aj, −A − Aj, A − Aj, A + Aj, −A + Aj, A − Aj, A − Aj, −A − Aj, A − Aj, −A + Aj, −A − Aj, −A + Aj, A − Aj, −A + Aj, −A − Aj, A + Aj, −A + Aj, −A + Aj, −A − Aj, A − Aj, A − Aj, −A − Aj, −A − Aj, A − Aj, −A − Aj, −A + Aj, A + Aj, A − Aj, −A + Aj, A + Aj, −A + Aj, A + Aj, −A + Aj, −A + Aj |
| 11 | Polarization 1 | −A + Aj, −A − Aj, A + Aj, −A − Aj, A + Aj, A + Aj, −A + Aj, −A + Aj, −A + Aj, −A − Aj, −A + Aj, A + Aj, A + Aj, A + Aj, −A − Aj, A − Aj, −A − Aj, −A − Aj, −A + Aj, −A + Aj, A − Aj, −A − Aj, −A − Aj, A + Aj, A − Aj, A − Aj, −A − Aj, −A + Aj, −A − Aj, A + Aj, A − Aj, −A − Aj, A + Aj, −A + Aj, −A − Aj, A − Aj, −A + Aj, −A + Aj, A + Aj, −A + Aj, A − Aj, A + Aj, A − Aj, −A + Aj, A − Aj, A + Aj, −A − Aj, A − Aj, A − Aj, A + Aj, −A + Aj, −A + Aj, A + Aj, A + Aj, −A + Aj, A + Aj, A − Aj, −A − Aj, −A + Aj, A − Aj, −A − Aj, A − Aj, −A − Aj, A − Aj, A − Aj |
| | Polarization 2 | A + Aj, A − Aj, −A + Aj, A − Aj, −A + Aj, −A + Aj, A + Aj, A + Aj, A + Aj, A − Aj, A + Aj, −A + Aj, −A + Aj, −A + Aj, A − Aj, −A − Aj, A − Aj, A − Aj, A + Aj, A + Aj, −A − Aj, A − Aj, A − Aj, −A + Aj, −A − Aj, −A − Aj, A − Aj, A + Aj, A − Aj, −A + Aj, −A − Aj, A − Aj, −A + Aj, A + Aj, A − Aj, −A − Aj, A + Aj, A + Aj, −A + Aj, A + Aj, −A − Aj, −A + Aj, −A − Aj, A + Aj, −A − Aj, −A + Aj, A − Aj, −A − Aj, −A − Aj, −A + Aj, A + Aj, A + Aj, −A + Aj, −A + Aj, A + Aj, −A + Aj, −A − Aj, A − Aj, A + Aj, −A − Aj, A − Aj, −A − Aj, A − Aj, −A − Aj, −A − Aj |
| 12 | Polarization 1 | A − Aj, A + Aj, −A − Aj, A + Aj, −A − Aj, −A − Aj, A − Aj, A − Aj, A − Aj, A + Aj, A − Aj, −A − Aj, −A − Aj, −A − Aj, A + Aj, −A + Aj, A + Aj, A + Aj, A − Aj, A − Aj, −A + Aj, A + Aj, A + Aj, −A − Aj, −A + Aj, −A + Aj, A + Aj, A − Aj, A + Aj, −A − Aj, −A + Aj, A + Aj, −A − Aj, A − Aj, A + Aj, −A + Aj, A − Aj, A − Aj, −A − Aj, A − Aj, −A + Aj, −A − Aj, −A + Aj, A − Aj, −A + Aj, −A − Aj, A + Aj, −A + Aj, −A + Aj, −A − Aj, A − Aj, A − Aj, −A − Aj, −A − Aj, A − Aj, −A − Aj, −A + Aj, A + Aj, A − Aj, −A + Aj, A + Aj, −A + Aj, A + Aj, −A + Aj, −A + Aj |
| | Polarization 2 | A + Aj, A − Aj, −A + Aj, A − Aj, −A + Aj, −A + Aj, A + Aj, A + Aj, A + Aj, A − Aj, A + Aj, −A + Aj, −A + Aj, −A + Aj, A − Aj, −A − Aj, A − Aj, A − Aj, A + Aj, A + Aj, −A − Aj, A − Aj, A − Aj, −A + Aj, −A − Aj, −A − Aj, A − Aj, A + Aj, A − Aj, −A + Aj, −A − Aj, A − Aj, −A + Aj, A + Aj, A − Aj, −A − Aj, A + Aj, A + Aj, −A + Aj, A + Aj, −A − Aj, −A + Aj, −A − Aj, A + Aj, −A − Aj, −A + Aj, A − Aj, −A − Aj, −A − Aj, −A + Aj, A + Aj, A + Aj, −A + Aj, −A + Aj, A + Aj, −A + Aj, −A − Aj, A − Aj, A + Aj, −A − Aj, A − Aj, −A − Aj, A − Aj, −A − Aj, −A − Aj |
| 13 | Polarization 1 | −A − Aj, A + Aj, −A − Aj, A + Aj, A + Aj, −A + Aj, −A − Aj, −A − Aj, −A − Aj, A + Aj, A + Aj, A + Aj, A + Aj, −A + Aj, A − Aj, A + Aj, −A + Aj, −A + Aj, A + Aj, −A + Aj, −A + Aj, −A + Aj, A − Aj, −A − Aj, A + Aj, A − Aj, A − Aj, −A + Aj, A − Aj, A − Aj, A − Aj, −A − Aj, −A + Aj, A + Aj, −A − Aj, A − Aj, −A − Aj, −A − Aj, A − Aj, A − Aj, −A + Aj, −A − Aj, −A + Aj, A + Aj, A − Aj, −A + Aj, −A + Aj, A − Aj, A − Aj, −A − Aj, A + Aj, −A − Aj, −A + Aj, −A − Aj, −A − Aj, A − Aj, −A − Aj, A − Aj, −A + Aj, A + Aj, A + Aj, −A − Aj, A + Aj, −A + Aj, A − Aj |
| | Polarization 2 | −A + Aj, A − Aj, −A + Aj, A − Aj, A − Aj, −A − Aj, −A + Aj, −A + Aj, −A + Aj, A − Aj, A − Aj, A − Aj, A − Aj, −A − Aj, A + Aj, A − Aj, −A − Aj, −A − Aj, A − Aj, −A − Aj, −A − Aj, −A − Aj, A + Aj, −A + Aj, A − Aj, A + Aj, A + Aj, −A − Aj, A + Aj, A + Aj, A + Aj, −A + Aj, −A − Aj, A − Aj, −A + Aj, A + Aj, −A + Aj, −A + Aj, A + Aj, A + Aj, −A − Aj, −A + Aj, −A − Aj, A − Aj, A + Aj, −A − Aj, −A − Aj, A + Aj, A + Aj, −A + Aj, A − Aj, −A + Aj, −A − Aj, −A + Aj, −A + Aj, A + Aj, −A + Aj, A + Aj, −A − Aj, A − Aj, A − Aj, −A + Aj, A − Aj, −A − Aj, A + Aj |
| 14 | Polarization 1 | −A − Aj, A + Aj, −A − Aj, A + Aj, A + Aj, −A + Aj, −A − Aj, −A − Aj, −A − Aj, A + Aj, A + Aj, A + Aj, A + Aj, −A + Aj, A − Aj, A + Aj, −A + Aj, −A + Aj, A + Aj, −A + Aj, −A + Aj, −A + Aj, A − Aj, −A − Aj, A + Aj, A − Aj, A − Aj, −A + Aj, A − Aj, A − Aj, A − Aj, −A − Aj, −A + Aj, A + Aj, −A − Aj, A − Aj, −A − Aj, −A − Aj, A − Aj, A − Aj, −A + Aj, −A − Aj, −A + Aj, A + Aj, A − Aj, −A + Aj, −A + Aj, A − Aj, A − Aj, −A − Aj, A + Aj, −A − Aj, −A + Aj, −A − Aj, −A − Aj, A − Aj, −A − Aj, A − Aj, −A + Aj, A + Aj, A + Aj, −A − Aj, A + Aj, −A + Aj, A − Aj |
| | Polarization 2 | A − Aj, −A + Aj, A − Aj, −A + Aj, −A + Aj, A + Aj, A − Aj, A − Aj, A − Aj, −A + Aj, −A + Aj, −A + Aj, −A + Aj, A + Aj, −A − Aj, −A + Aj, A + Aj, A + Aj, −A + Aj, A + Aj, A + Aj, A + Aj, −A − Aj, A − Aj, −A + Aj, −A − Aj, −A − Aj, A + Aj, −A − Aj, −A − Aj, −A − Aj, A − Aj, A + Aj, −A + Aj, A − Aj, −A − Aj, A − Aj, A − Aj, −A − Aj, −A − Aj, A + Aj, A − Aj, A + Aj, −A + Aj, −A − Aj, A + Aj, A + Aj, −A − Aj, −A − Aj, A − Aj, −A + Aj, A − Aj, A + Aj, A − Aj, A − Aj, −A − Aj, A − Aj, −A − Aj, A + Aj, −A + Aj, −A + Aj, A − Aj, −A + Aj, A + Aj, −A − Aj |
| 15 | Polarization 1 | −A + Aj, A − Aj, −A + Aj, A − Aj, A − Aj, −A − Aj, −A + Aj, −A + Aj, −A + Aj, A − Aj, A − Aj, A − Aj, A − Aj, −A − Aj, A + Aj, A − Aj, −A − Aj, −A − Aj, A − Aj, −A − Aj, −A − Aj, −A − Aj, A + Aj, −A + Aj, A − Aj, A + Aj, A + Aj, −A − Aj, A + Aj, A + Aj, A + Aj, −A + Aj, −A − Aj, A − Aj, −A + Aj, A + Aj, −A + Aj, −A + Aj, A + Aj, A + Aj, −A − Aj, −A + Aj, −A − Aj, A − Aj, A + Aj, −A − Aj, −A − Aj, A + Aj, A + Aj, −A + Aj, A − Aj, −A + Aj, −A − Aj, −A + Aj, −A + Aj, A + Aj, −A + Aj, A + Aj, −A − Aj, A − Aj, A − Aj, −A + Aj, A − Aj, −A − Aj, A + Aj |
| | Polarization 2 | A + Aj, −A − Aj, A + Aj, −A − Aj, −A − Aj, A − Aj, A + Aj, A + Aj, A + Aj, −A − Aj, −A − Aj, −A − Aj, −A − Aj, A − Aj, −A + Aj, −A − Aj, A − Aj, A − Aj, −A − Aj, A − Aj, A − Aj, A − Aj, −A + Aj, A + Aj, −A − Aj, −A + Aj, −A + Aj, A − Aj, −A + Aj, −A + Aj, −A + Aj, A + Aj, A − Aj, −A − Aj, A + Aj, −A + Aj, A + Aj, A + Aj, −A + Aj, −A + Aj, A − Aj, A + Aj, A − Aj, −A − Aj, −A + Aj, A − Aj, A − Aj, −A + Aj, −A + Aj, A + Aj, −A − Aj, A + Aj, A − Aj, A + Aj, A + Aj, −A + Aj, A + Aj, −A + Aj, A − Aj, −A − Aj, −A − Aj, A + Aj, −A − Aj, A − Aj, −A + Aj |
| 16 | Polarization 1 | A − Aj, −A + Aj, A − Aj, −A + Aj, −A + Aj, A + Aj, A − Aj, A − Aj, A − Aj, −A + Aj, −A + Aj, −A + Aj, −A + Aj, A + Aj, −A − Aj, −A + Aj, A + Aj, A + Aj, −A + Aj, A + Aj, A + Aj, A + Aj, −A − Aj, A − Aj, −A + Aj, −A − Aj, −A − Aj, A + Aj, −A − Aj, −A − Aj, −A − Aj, A − Aj, A + Aj, −A + Aj, A − Aj, −A − Aj, A − Aj, A − Aj, −A − Aj, −A − Aj, A + Aj, A − Aj, A + Aj, −A + Aj, −A − Aj, A + Aj, A + Aj, −A − Aj, −A − Aj, A − Aj, −A + Aj, A − Aj, A + Aj, A − Aj, A − Aj, −A − Aj, A − Aj, −A − Aj, A + Aj, −A + Aj, −A + Aj, A − Aj, −A + Aj, A + Aj, −A − Aj |
| | Polarization 2 | A + Aj, −A − Aj, A + Aj, −A − Aj, −A − Aj, A − Aj, A + Aj, A + Aj, A + Aj, −A − Aj, −A − Aj, −A − Aj, −A − Aj, A − Aj, −A + Aj, −A − Aj, A − Aj, A − Aj, −A − Aj, A − Aj, A − Aj, A − Aj, −A + Aj, A + Aj, −A − Aj, −A + Aj, −A + Aj, A − Aj, −A + Aj, −A + Aj, −A + Aj, A + Aj, A − Aj, −A − Aj, A + Aj, −A + Aj, A + Aj, A + Aj, −A + Aj, −A + Aj, A − Aj, A + Aj, A − Aj, −A − Aj, −A + Aj, A − Aj, A − Aj, −A + Aj, −A + Aj, A + Aj, −A − Aj, A + Aj, A − Aj, A + Aj, A + Aj, −A + Aj, A + Aj, −A + Aj, A − Aj, −A − Aj, −A − Aj, A + Aj, −A − Aj, A − Aj, −A + Aj |

TABLE 11-1-continued

| Index | Polarization | Pilot sequence |
|---|---|---|
| 17 | Polarization 1 | –A – Aj, A + Aj, –A + Aj, –A + Aj, A – Aj, –A + Aj, –A + Aj, A + Aj, –A – Aj, –A + Aj, –A – Aj, A + Aj, –A – Aj, A + Aj, A + Aj, A + Aj, –A – Aj, A + Aj, A – Aj, A – Aj, A + Aj, –A + Aj, –A – Aj, –A + Aj, –A + Aj, –A – Aj, –A – Aj, A – Aj, –A – Aj, –A + Aj, –A + Aj, A – Aj, –A – Aj, –A – Aj, –A – Aj, A – Aj, A + Aj, A + Aj, –A + Aj, –A + Aj, A + Aj, –A – Aj, A – Aj, –A + Aj, A – Aj, A – Aj, A – Aj, A – Aj, –A – Aj, –A – Aj, A – Aj, A – Aj, –A + Aj, A + Aj, A – Aj, A + Aj, A – Aj, –A + Aj, A + Aj, A – Aj, –A – Aj, A + Aj, –A – Aj, –A + Aj, A + Aj |
| | Polarization 2 | –A + Aj, A – Aj, –A – Aj, A – Aj, –A – Aj, –A – Aj, A + Aj, –A – Aj, A + Aj, –A – Aj, A – Aj, –A + Aj, –A + Aj, A + Aj, A + Aj, –A – Aj, –A + Aj, –A + Aj, –A + Aj, A – Aj, –A – Aj, A + Aj, –A + Aj, A + Aj, –A + Aj, A – Aj, –A – Aj, A – Aj, A + Aj, –A + Aj, A – Aj, A – Aj, A – Aj, –A + Aj, –A + Aj, –A + Aj, –A – Aj, A + Aj, –A – Aj, –A – Aj, A – Aj, A – Aj, A – Aj, A – Aj, A + Aj, –A + Aj, A + Aj, –A – Aj, –A – Aj, A – Aj, –A + Aj, A + Aj, A + Aj, –A + Aj, –A – Aj, A – Aj, A + Aj, –A – Aj, A + Aj, –A + Aj, –A – Aj, A + Aj, A – Aj, A + Aj, –A + Aj |

TABLE 11-2

| Index | Polarization | Pilot sequence |
|---|---|---|
| 1 | Polarization 1 | –A – Aj, A + Aj, –A – Aj, –A – Aj, A – Aj, A – Aj, A – Aj, A + Aj, A – Aj, –A – Aj, –A – Aj, –A – Aj, A + Aj, –A + Aj, A + Aj, A + Aj, A – Aj, A – Aj, –A + Aj, A + Aj, A + Aj, –A – Aj, –A + Aj, –A + Aj, A + Aj, A – Aj, A + Aj, –A – Aj, –A + Aj, A + Aj, –A – Aj, A – Aj, A + Aj, –A + Aj, A – Aj, A – Aj, –A – Aj, A – Aj, –A + Aj, –A – Aj, –A + Aj, A – Aj, –A + Aj, –A – Aj, A + Aj, –A + Aj, –A + Aj, –A – Aj, A – Aj, A – Aj, –A – Aj, –A – Aj, A – Aj, –A – Aj, –A + Aj, A + Aj, A – Aj, –A + Aj, A + Aj, –A + Aj, A + Aj, –A + Aj, –A + Aj, A – Aj, –A + Aj |
| | Polarization 2 | –A + Aj, A – Aj, –A + Aj, –A + Aj, A + Aj, A + Aj, A + Aj, A – Aj, A + Aj, –A + Aj, –A + Aj, –A + Aj, A – Aj, –A – Aj, A – Aj, A – Aj, A + Aj, A + Aj, –A – Aj, A – Aj, A – Aj, –A + Aj, –A – Aj, –A – Aj, A – Aj, A + Aj, A – Aj, –A + Aj, –A – Aj, A – Aj, –A + Aj, A + Aj, A – Aj, –A – Aj, A + Aj, A + Aj, –A + Aj, A + Aj, –A – Aj, –A + Aj, –A – Aj, A + Aj, –A – Aj, –A + Aj, A – Aj, –A – Aj, –A – Aj, –A + Aj, A + Aj, A + Aj, –A + Aj, –A + Aj, A + Aj, –A + Aj, –A – Aj, A – Aj, A + Aj, –A – Aj, A – Aj, –A – Aj, A – Aj, –A – Aj, –A – Aj, A + Aj, –A – Aj |
| 2 | Polarization 1 | –A – Aj, A + Aj, –A – Aj, –A – Aj, A – Aj, A – Aj, A – Aj, A + Aj, A – Aj, –A – Aj, –A – Aj, –A – Aj, A + Aj, –A + Aj, A + Aj, A + Aj, A – Aj, A – Aj, –A + Aj, A + Aj, A + Aj, –A – Aj, –A + Aj, –A + Aj, A + Aj, A – Aj, A + Aj, –A – Aj, –A + Aj, A + Aj, –A – Aj, A – Aj, A + Aj, –A + Aj, A – Aj, A – Aj, –A – Aj, A – Aj, –A + Aj, –A – Aj, –A + Aj, A – Aj, –A + Aj, –A – Aj, A + Aj, –A + Aj, –A + Aj, –A – Aj, A – Aj, A – Aj, –A – Aj, –A – Aj, A – Aj, –A – Aj, –A + Aj, A + Aj, A – Aj, –A + Aj, A + Aj, –A + Aj, A + Aj, –A + Aj, –A + Aj, A – Aj, –A + Aj |
| | Polarization 2 | A – Aj, –A + Aj, A – Aj, A – Aj, –A – Aj, –A – Aj, –A – Aj, –A + Aj, –A – Aj, A – Aj, A – Aj, A – Aj, –A + Aj, A + Aj, –A + Aj, –A + Aj, –A – Aj, –A – Aj, A + Aj, –A + Aj, –A + Aj, A – Aj, A + Aj, A + Aj, –A + Aj, –A – Aj, –A + Aj, A – Aj, A + Aj, –A + Aj, A – Aj, –A – Aj, –A + Aj, A + Aj, –A – Aj, –A – Aj, A – Aj, –A – Aj, A + Aj, A – Aj, A + Aj, –A – Aj, A + Aj, A – Aj, –A + Aj, A + Aj, A + Aj, A – Aj, –A – Aj, –A – Aj, A – Aj, A – Aj, –A – Aj, A – Aj, A + Aj, –A + Aj, –A – Aj, A + Aj, –A + Aj, A + Aj, –A + Aj, A + Aj, A + Aj, –A – Aj, A + Aj |
| 3 | Polarization 1 | A + Aj, –A – Aj, A + Aj, A + Aj, –A + Aj, –A + Aj, –A + Aj, –A – Aj, –A + Aj, A + Aj, A + Aj, A + Aj, –A – Aj, A – Aj, –A – Aj, –A – Aj, –A + Aj, –A + Aj, A – Aj, –A – Aj, –A – Aj, A + Aj, A – Aj, A – Aj, –A – Aj, –A + Aj, –A – Aj, A + Aj, A – Aj, –A – Aj, A + Aj, –A + Aj, –A – Aj, A – Aj, –A + Aj, –A + Aj, A + Aj, –A + Aj, A – Aj, A + Aj, A – Aj, –A + Aj, A – Aj, A + Aj, –A – Aj, A – Aj, A – Aj, A + Aj, –A + Aj, –A + Aj, A + Aj, A + Aj, –A + Aj, A + Aj, A – Aj, –A – Aj, –A + Aj, A – Aj, –A – Aj, A – Aj, –A – Aj, A – Aj, A – Aj, –A + Aj, A – Aj |
| | Polarization 2 | –A + Aj, A – Aj, –A + Aj, –A + Aj, A + Aj, A + Aj, A + Aj, A – Aj, A + Aj, –A + Aj, –A + Aj, –A + Aj, A – Aj, –A – Aj, A – Aj, A – Aj, A + Aj, A + Aj, –A – Aj, A – Aj, A – Aj, –A + Aj, –A – Aj, –A – Aj, A – Aj, A + Aj, A – Aj, –A + Aj, –A – Aj, A – Aj, –A + Aj, A + Aj, A – Aj, –A – Aj, A + Aj, A + Aj, –A + Aj, A + Aj, –A – Aj, –A + Aj, –A – Aj, A + Aj, –A – Aj, –A + Aj, A – Aj, –A – Aj, –A – Aj, –A + Aj, A + Aj, A + Aj, –A + Aj, –A + Aj, A + Aj, –A + Aj, –A – Aj, A – Aj, A + Aj, –A – Aj, A – Aj, –A – Aj, A – Aj, –A – Aj, –A – Aj, A + Aj, –A – Aj |
| 4 | Polarization 1 | A + Aj, –A – Aj, A + Aj, A + Aj, –A + Aj, –A + Aj, –A + Aj, –A – Aj, –A + Aj, A + Aj, A + Aj, A + Aj, –A – Aj, A – Aj, –A – Aj, –A – Aj, –A + Aj, –A + Aj, A – Aj, –A – Aj, –A – Aj, A + Aj, A – Aj, A – Aj, –A – Aj, –A + Aj, –A – Aj, A + Aj, A – Aj, –A – Aj, A + Aj, –A + Aj, –A – Aj, A – Aj, –A + Aj, –A + Aj, A + Aj, –A + Aj, A – Aj, A + Aj, A – Aj, –A + Aj, A – Aj, A + Aj, –A – Aj, A – Aj, A – Aj, A + Aj, –A + Aj, –A + Aj, A + Aj, A + Aj, –A + Aj, A + Aj, A – Aj, –A – Aj, –A + Aj, A – Aj, –A – Aj, A – Aj, –A – Aj, A – Aj, A – Aj, –A + Aj, A – Aj |
| | Polarization 2 | A – Aj, –A + Aj, A – Aj, A – Aj, –A – Aj, –A – Aj, –A – Aj, –A + Aj, –A – Aj, A – Aj, A – Aj, A – Aj, –A + Aj, A + Aj, –A + Aj, –A + Aj, –A – Aj, –A – Aj, A + Aj, –A + Aj, –A + Aj, A – Aj, A + Aj, A + Aj, –A + Aj, –A – Aj, –A + Aj, A – Aj, A + Aj, –A + Aj, A – Aj, –A – Aj, –A + Aj, A + Aj, –A – Aj, –A – Aj, A – Aj, –A – Aj, A + Aj, A – Aj, A + Aj, –A – Aj, A + Aj, A – Aj, –A + Aj, A + Aj, A + Aj, A – Aj, –A – Aj, –A – Aj, A – Aj, A – Aj, –A – Aj, A – Aj, A + Aj, –A + Aj, –A – Aj, A + Aj, –A + Aj, A + Aj, –A + Aj, A + Aj, A + Aj, –A – Aj, A + Aj |
| 5 | Polarization 1 | –A + Aj, A + Aj, –A + Aj, –A + Aj, –A – Aj, –A + Aj, A + Aj, A + Aj, A – Aj, –A – Aj, –A + Aj, –A – Aj, A + Aj, –A – Aj, A + Aj, A – Aj, A + Aj, –A + Aj, A – Aj, –A – Aj, A + Aj, –A – Aj, –A – Aj, –A + Aj, A – Aj, A + Aj, A + Aj, A – Aj, A + Aj, A – Aj, –A + Aj, –A + Aj, –A + Aj, –A + Aj, A – Aj, –A + Aj, –A – Aj, A – Aj, A + Aj, –A + Aj, –A + Aj, A + Aj, A – Aj, A – Aj, –A + Aj, A + Aj, A – Aj, –A + Aj, A – Aj, A – Aj, –A – Aj, –A – Aj, –A – Aj, A – Aj, A – Aj, –A + Aj, –A – Aj, –A + Aj, –A – Aj, –A – Aj, A + Aj, A – Aj, –A – Aj, A – Aj, A + Aj |
| | Polarization 2 | –A – Aj, A – Aj, –A – Aj, –A – Aj, –A + Aj, –A – Aj, A – Aj, A – Aj, A + Aj, –A + Aj, –A – Aj, –A + Aj, A – Aj, –A + Aj, A – Aj, A + Aj, A – Aj, –A – Aj, A + Aj, –A + Aj, A – Aj, –A + Aj, –A + Aj, –A – Aj, A + Aj, A – Aj, A – Aj, A + Aj, A – Aj, A + Aj, –A – Aj, –A – Aj, –A – Aj, –A – Aj, |

TABLE 11-2-continued

| Index | Polarization | Pilot sequence |
|---|---|---|
| | | A + Aj, −A − Aj, −A + Aj, A + Aj, A − Aj, −A − Aj, −A − Aj, A − Aj, A + Aj, A + Aj, −A − Aj, A − Aj, A + Aj, −A − Aj, A + Aj, A + Aj, −A + Aj, −A + Aj, −A + Aj, A + Aj, A + Aj, −A − Aj, −A + Aj, −A − Aj, −A + Aj, −A + Aj, A − Aj, A + Aj, −A + Aj, A + Aj, A − Aj |
| 6 | Polarization 1 | −A + Aj, A + Aj, −A + Aj, −A + Aj, −A − Aj, −A + Aj, A + Aj, A + Aj, A − Aj, −A − Aj, −A + Aj, −A − Aj, A + Aj, −A − Aj, A + Aj, A − Aj, A + Aj, −A + Aj, A − Aj, −A − Aj, A + Aj, −A − Aj, −A − Aj, −A + Aj, A − Aj, A + Aj, A + Aj, A − Aj, A + Aj, A − Aj, −A + Aj, −A + Aj, −A + Aj, −A + Aj, A − Aj, −A + Aj, −A − Aj, A − Aj, A + Aj, −A + Aj, −A + Aj, A + Aj, A − Aj, A − Aj, −A + Aj, A + Aj, A − Aj, −A + Aj, A − Aj, A − Aj, −A − Aj, −A − Aj, −A − Aj, A − Aj, A − Aj, −A + Aj, −A − Aj, −A + Aj, −A − Aj, −A − Aj, A + Aj, A − Aj, −A − Aj, A − Aj, A + Aj |
| | Polarization 2 | A + Aj, −A + Aj, A + Aj, A + Aj, A − Aj, A + Aj, −A + Aj, −A + Aj, −A − Aj, A − Aj, A + Aj, A − Aj, −A + Aj, A − Aj, −A + Aj, −A − Aj, −A + Aj, A + Aj, −A − Aj, A − Aj, −A + Aj, A − Aj, A − Aj, A + Aj, −A − Aj, −A + Aj, −A + Aj, −A − Aj, −A + Aj, −A − Aj, A + Aj, A + Aj, A + Aj, A + Aj, −A − Aj, A + Aj, A − Aj, −A − Aj, −A + Aj, A + Aj, A + Aj, −A + Aj, −A − Aj, −A − Aj, A + Aj, −A + Aj, −A − Aj, A + Aj, −A − Aj, −A − Aj, A − Aj, A − Aj, A − Aj, −A − Aj, −A − Aj, A + Aj, A − Aj, A + Aj, A − Aj, A − Aj, −A + Aj, −A − Aj, A − Aj, −A − Aj, −A + Aj |
| 7 | Polarization 1 | A − Aj, −A − Aj, A − Aj, A − Aj, A + Aj, A − Aj, −A − Aj, −A − Aj, −A + Aj, A + Aj, A − Aj, A + Aj, −A − Aj, A + Aj, −A − Aj, −A + Aj, −A − Aj, A − Aj, −A + Aj, A + Aj, −A − Aj, A + Aj, A + Aj, A − Aj, −A + Aj, −A − Aj, −A − Aj, −A + Aj, −A − Aj, −A + Aj, A − Aj, A − Aj, A − Aj, A − Aj, −A + Aj, A − Aj, A + Aj, −A + Aj, −A − Aj, A − Aj, A − Aj, −A − Aj, −A + Aj, −A + Aj, A − Aj, −A − Aj, −A + Aj, A − Aj, −A + Aj, −A + Aj, A + Aj, A + Aj, A + Aj, −A + Aj, −A + Aj, A − Aj, A + Aj, A − Aj, A + Aj, A + Aj, −A − Aj, −A + Aj, A + Aj, −A + Aj, −A − Aj |
| | Polarization 2 | −A − Aj, A − Aj, −A − Aj, −A − Aj, −A + Aj, −A − Aj, A − Aj, A − Aj, A + Aj, −A + Aj, −A − Aj, −A + Aj, A − Aj, −A + Aj, A − Aj, A + Aj, A − Aj, −A − Aj, A + Aj, −A + Aj, A − Aj, −A + Aj, −A + Aj, −A − Aj, A + Aj, A − Aj, A − Aj, A + Aj, A − Aj, A + Aj, −A − Aj, −A − Aj, −A − Aj, −A − Aj, A + Aj, −A − Aj, −A + Aj, A + Aj, A − Aj, −A − Aj, −A − Aj, A − Aj, A + Aj, A + Aj, −A − Aj, A − Aj, A + Aj, −A − Aj, A + Aj, A + Aj, −A + Aj, −A + Aj, −A + Aj, A + Aj, A + Aj, −A − Aj, −A + Aj, −A − Aj, −A + Aj, −A + Aj, A − Aj, A + Aj, −A + Aj, A + Aj, A − Aj |
| 8 | Polarization 1 | A − Aj, −A − Aj, A − Aj, A − Aj, A + Aj, A − Aj, −A − Aj, −A − Aj, −A + Aj, A + Aj, A − Aj, A + Aj, −A − Aj, A + Aj, −A − Aj, −A + Aj, −A − Aj, A − Aj, −A + Aj, A + Aj, −A − Aj, A + Aj, A + Aj, A − Aj, −A + Aj, −A − Aj, −A − Aj, −A + Aj, −A − Aj, −A + Aj, A − Aj, A − Aj, A − Aj, A − Aj, −A + Aj, A − Aj, A + Aj, −A + Aj, −A − Aj, A − Aj, A − Aj, −A − Aj, −A + Aj, −A + Aj, A − Aj, −A − Aj, −A + Aj, A − Aj, −A + Aj, −A + Aj, A + Aj, A + Aj, A + Aj, −A + Aj, −A + Aj, A − Aj, A + Aj, A − Aj, A + Aj, A + Aj, −A − Aj, −A + Aj, A + Aj, −A + Aj, −A − Aj |
| | Polarization 2 | A + Aj, −A + Aj, A + Aj, A + Aj, A − Aj, A + Aj, −A + Aj, −A + Aj, −A − Aj, A − Aj, A + Aj, A − Aj, −A + Aj, A − Aj, −A + Aj, −A − Aj, −A + Aj, A + Aj, −A − Aj, A − Aj, −A + Aj, A − Aj, A − Aj, A + Aj, −A − Aj, −A + Aj, −A + Aj, −A − Aj, −A + Aj, −A − Aj, A + Aj, A + Aj, A + Aj, A + Aj, −A − Aj, A + Aj, A − Aj, −A − Aj, −A + Aj, A + Aj, A + Aj, −A + Aj, −A − Aj, −A − Aj, A + Aj, −A + Aj, −A − Aj, A + Aj, −A − Aj, −A − Aj, A − Aj, A − Aj, A − Aj, −A − Aj, −A − Aj, A + Aj, A − Aj, A + Aj, A − Aj, A − Aj, −A + Aj, −A − Aj, A − Aj, −A − Aj, −A + Aj |
| 9 | Polarization 1 | −A − Aj, A + Aj, −A − Aj, −A − Aj, A + Aj, −A + Aj, −A − Aj, −A − Aj, A − Aj, A − Aj, −A + Aj, −A + Aj, A − Aj, A + Aj, −A − Aj, A − Aj, A − Aj, A − Aj, A + Aj, −A − Aj, −A + Aj, −A − Aj, −A − Aj, −A + Aj, −A − Aj, A + Aj, A + Aj, A − Aj, −A + Aj, A + Aj, −A − Aj, A − Aj, −A + Aj, −A − Aj, −A + Aj, A − Aj, −A + Aj, A − Aj, A + Aj, A + Aj, −A − Aj, −A − Aj, −A − Aj, A + Aj, A − Aj, A − Aj, A − Aj, −A − Aj, A − Aj, A + Aj, A − Aj, −A − Aj, A + Aj, A + Aj, −A + Aj, A + Aj, −A + Aj, A − Aj, A − Aj, A + Aj, A + Aj, A + Aj, A − Aj, A − Aj, −A + Aj |
| | Polarization 2 | −A + Aj, A − Aj, −A + Aj, −A + Aj, A − Aj, −A − Aj, −A + Aj, −A + Aj, A + Aj, A + Aj, −A − Aj, −A − Aj, A + Aj, A − Aj, −A + Aj, A + Aj, A + Aj, A + Aj, A − Aj, −A + Aj, −A − Aj, −A + Aj, −A + Aj, −A − Aj, −A + Aj, A − Aj, A − Aj, A + Aj, −A − Aj, A − Aj, −A + Aj, A + Aj, −A − Aj, −A + Aj, −A − Aj, A + Aj, −A − Aj, A + Aj, A − Aj, A − Aj, −A + Aj, −A + Aj, −A + Aj, A − Aj, A + Aj, A + Aj, A + Aj, −A + Aj, A + Aj, A − Aj, A + Aj, −A + Aj, A − Aj, A − Aj, −A − Aj, A − Aj, −A − Aj, A + Aj, A + Aj, A − Aj, A − Aj, A − Aj, A + Aj, A + Aj, −A − Aj |
| 10 | Polarization 1 | −A − Aj, A + Aj, −A − Aj, −A − Aj, A + Aj, −A + Aj, −A − Aj, −A − Aj, A − Aj, A − Aj, −A + Aj, −A + Aj, A − Aj, A + Aj, −A − Aj, A − Aj, A − Aj, A − Aj, A + Aj, −A − Aj, −A + Aj, −A − Aj, −A − Aj, −A + Aj, −A − Aj, A + Aj, A + Aj, A − Aj, −A + Aj, A + Aj, −A − Aj, A − Aj, −A + Aj, −A − Aj, −A + Aj, A − Aj, −A + Aj, A − Aj, A + Aj, A + Aj, −A − Aj, −A − Aj, −A − Aj, A + Aj, A − Aj, A − Aj, A − Aj, −A − Aj, A − Aj, A + Aj, A − Aj, −A − Aj, A + Aj, A + Aj, −A + Aj, A + Aj, −A + Aj, A − Aj, A − Aj, A + Aj, A + Aj, A + Aj, A − Aj, A − Aj, −A + Aj |
| | Polarization 2 | A − Aj, −A + Aj, A − Aj, A − Aj, −A + Aj, A + Aj, A − Aj, A − Aj, −A − Aj, −A − Aj, A + Aj, A + Aj, −A − Aj, −A + Aj, A − Aj, −A − Aj, −A − Aj, −A − Aj, −A + Aj, A − Aj, A + Aj, A − Aj, A − Aj, A + Aj, A − Aj, −A + Aj, −A + Aj, −A − Aj, A + Aj, −A + Aj, A − Aj, −A − Aj, A + Aj, A − Aj, A + Aj, −A − Aj, A + Aj, −A − Aj, −A + Aj, −A + Aj, A − Aj, A − Aj, A − Aj, −A + Aj, −A − Aj, −A − Aj, −A − Aj, A − Aj, −A − Aj, −A + Aj, −A − Aj, A − Aj, −A + Aj, −A + Aj, A + Aj, −A + Aj, A + Aj, −A − Aj, −A − Aj, −A + Aj, −A + Aj, −A + Aj, −A − Aj, −A − Aj, A + Aj |
| 11 | Polarization 1 | A + Aj, −A − Aj, A + Aj, A + Aj, −A − Aj, A − Aj, A + Aj, A + Aj, −A + Aj, −A + Aj, A − Aj, A − Aj, −A + Aj, −A − Aj, A + Aj, −A + Aj, −A + Aj, −A + Aj, −A − Aj, A + Aj, A − Aj, A + Aj, A + Aj, A − Aj, A + Aj, −A − Aj, −A − Aj, −A + Aj, A − Aj, −A − Aj, A + Aj, −A + Aj, A − Aj, A + Aj, A − Aj, −A + Aj, A − Aj, −A + Aj, −A − Aj, −A − Aj, A + Aj, A + Aj, A + Aj, −A − Aj, −A + Aj, −A + Aj, −A + Aj, A + Aj, −A + Aj, −A − Aj, −A + Aj, A + Aj, −A − Aj, −A − Aj, A − Aj, −A − Aj, A − Aj, −A + Aj, −A + Aj, −A − Aj, −A − Aj, −A − Aj, −A + Aj, −A + Aj, A − Aj |
| | Polarization 2 | −A + Aj, A − Aj, −A + Aj, −A + Aj, A − Aj, −A − Aj, −A + Aj, −A + Aj, A + Aj, A + Aj, −A − Aj, −A − Aj, A + Aj, A − Aj, −A + Aj, A + Aj, A + Aj, A + Aj, A − Aj, −A + Aj, −A − Aj, −A + Aj, −A + Aj, −A − Aj, −A + Aj, A − Aj, A − Aj, A + Aj, −A − Aj, A − Aj, −A + Aj, A + Aj, −A − Aj, −A + Aj, −A − Aj, A + Aj, −A − Aj, A + Aj, A − Aj, A − Aj, −A + Aj, −A + Aj, −A + Aj, A − Aj, A + Aj, A + Aj, A + Aj, −A + Aj, A + Aj, A − Aj, A + Aj, −A + Aj, A − Aj, A − Aj, −A − Aj, A − Aj, −A − Aj, A + Aj, A + Aj, A − Aj, A − Aj, A − Aj, A + Aj, A + Aj, −A − Aj |

TABLE 11-2-continued

| Index | Polarization | Pilot sequence |
|---|---|---|
| 12 | Polarization 1 | A + Aj, −A − Aj, A + Aj, A + Aj, −A − Aj, A − Aj, A + Aj, A + Aj, −A + Aj, −A + Aj, A − Aj, A − Aj, −A + Aj, −A − Aj, A + Aj, −A + Aj, −A + Aj, −A + Aj, −A − Aj, A + Aj, A − Aj, A + Aj, A + Aj, A − Aj, A + Aj, −A − Aj, −A − Aj, −A + Aj, A − Aj, −A − Aj, A + Aj, −A + Aj, A − Aj, A + Aj, A − Aj, −A + Aj, A − Aj, −A + Aj, −A − Aj, −A − Aj, A + Aj, A + Aj, A + Aj, −A − Aj, −A + Aj, −A + Aj, −A + Aj, A + Aj, −A + Aj, −A − Aj, −A + Aj, A + Aj, −A − Aj, −A − Aj, A − Aj, −A − Aj, A − Aj, −A + Aj, −A + Aj, −A − Aj, −A − Aj, −A − Aj, −A + Aj, −A + Aj, A − Aj |
| | Polarization 2 | A − Aj, −A + Aj, A − Aj, A − Aj, −A + Aj, A + Aj, A − Aj, A − Aj, −A − Aj, −A − Aj, A + Aj, A + Aj, −A − Aj, −A + Aj, A − Aj, −A − Aj, −A − Aj, −A − Aj, −A + Aj, A − Aj, A + Aj, A − Aj, A − Aj, A + Aj, A − Aj, −A + Aj, −A + Aj, −A − Aj, A + Aj, −A + Aj, A − Aj, −A − Aj, A + Aj, A − Aj, A + Aj, −A − Aj, A + Aj, −A − Aj, −A + Aj, −A + Aj, A − Aj, A − Aj, A − Aj, −A + Aj, −A − Aj, −A − Aj, −A − Aj, A − Aj, −A − Aj, −A + Aj, −A − Aj, A − Aj, −A + Aj, −A + Aj, A + Aj, −A + Aj, A + Aj, −A − Aj, −A − Aj, −A + Aj, −A + Aj, −A + Aj, −A − Aj, −A − Aj, A + Aj |
| 13 | Polarization 1 | A + Aj, −A + Aj, −A − Aj, −A + Aj, −A − Aj, −A − Aj, −A + Aj, A + Aj, −A + Aj, A − Aj, A + Aj, −A − Aj, A + Aj, A + Aj, −A − Aj, A + Aj, A − Aj, A − Aj, −A − Aj, A + Aj, −A − Aj, A − Aj, A − Aj, A − Aj, −A − Aj, A + Aj, −A + Aj, −A + Aj, A − Aj, A + Aj, A + Aj, A − Aj, −A + Aj, A + Aj, A − Aj, A − Aj, −A + Aj, −A + Aj, A + Aj, A + Aj, −A − Aj, −A − Aj, −A + Aj, −A + Aj, A + Aj, −A − Aj, −A + Aj, A − Aj, A − Aj, −A − Aj, A + Aj, A + Aj, −A − Aj, A − Aj, −A + Aj, A − Aj, −A + Aj, −A − Aj, −A + Aj, A − Aj, −A − Aj, A − Aj, −A + Aj, −A + Aj, A − Aj |
| | Polarization 2 | A − Aj, A + Aj, A + Aj, A + Aj, −A + Aj, −A + Aj, A + Aj, A − Aj, A − Aj, A + Aj, −A − Aj, A + Aj, −A + Aj, −A + Aj, A + Aj, −A − Aj, A + Aj, A + Aj, A − Aj, A − Aj, A − Aj, −A − Aj, −A + Aj, −A − Aj, −A + Aj, −A − Aj, A − Aj, −A − Aj, A + Aj, A + Aj, A + Aj, −A − Aj, −A + Aj, −A + Aj, A + Aj, A − Aj, −A − Aj, A − Aj, −A − Aj, −A + Aj, −A − Aj, A − Aj, A − Aj, A − Aj, A + Aj, −A + Aj, −A + Aj, A − Aj, −A − Aj, −A + Aj, A − Aj, A − Aj, −A + Aj, −A − Aj, A + Aj, −A + Aj, −A + Aj, −A − Aj, A − Aj, A + Aj, −A − Aj, −A − Aj, −A − Aj, A + Aj, −A − Aj |
| 14 | Polarization 1 | A + Aj, −A + Aj, −A − Aj, A + Aj, −A + Aj, A − Aj, A − Aj, −A − Aj, −A + Aj, A − Aj, A − Aj, −A + Aj, −A − Aj, A − Aj, A + Aj, −A + Aj, A + Aj, A + Aj, A + Aj, A − Aj, −A + Aj, A + Aj, A − Aj, −A − Aj, A − Aj, −A + Aj, A + Aj, −A + Aj, −A − Aj, −A − Aj, −A + Aj, −A − Aj, A − Aj, A + Aj, A − Aj, −A + Aj, −A − Aj, −A + Aj, −A − Aj, −A + Aj, −A − Aj, A − Aj, A − Aj, −A + Aj, −A − Aj, A + Aj, −A − Aj, −A − Aj, −A − Aj, A − Aj, A + Aj, A + Aj, A + Aj, A − Aj, A + Aj, A − Aj, −A − Aj, −A + Aj, −A + Aj, −A + Aj, −A + Aj, A + Aj, A + Aj, A − Aj, A − Aj |
| | Polarization 2 | −A + Aj, A + Aj, A + Aj, A + Aj, A + Aj, A − Aj, A − Aj, −A + Aj, −A + Aj, A − Aj, −A − Aj, −A + Aj, −A − Aj, −A + Aj, A − Aj, A + Aj, −A − Aj, −A − Aj, A + Aj, A + Aj, A − Aj, A − Aj, A + Aj, −A − Aj, −A − Aj, −A + Aj, A − Aj, −A − Aj, A + Aj, −A − Aj, −A − Aj, A − Aj, A + Aj, −A + Aj, A − Aj, −A − Aj, A − Aj, −A + Aj, −A − Aj, A + Aj, A + Aj, A − Aj, A + Aj, −A − Aj, −A + Aj, A + Aj, −A − Aj, A − Aj, −A + Aj, −A + Aj, −A + Aj, −A + Aj, −A − Aj, −A + Aj, −A + Aj, −A − Aj, −A − Aj, A + Aj, A − Aj, A − Aj, −A + Aj, A + Aj, A + Aj, A − Aj, −A − Aj |
| 15 | Polarization 1 | −A + Aj, −A + Aj, −A + Aj, A + Aj, A + Aj, A − Aj, A − Aj, A − Aj, A − Aj, −A − Aj, −A + Aj, A + Aj, −A + Aj, A + Aj, A + Aj, A + Aj, −A + Aj, −A − Aj, −A − Aj, −A − Aj, A + Aj, −A − Aj, A − Aj, −A + Aj, −A + Aj, −A − Aj, A − Aj, −A − Aj, A − Aj, −A − Aj, A − Aj, −A + Aj, A + Aj, −A + Aj, −A − Aj, A − Aj, −A − Aj, −A − Aj, A − Aj, A + Aj, A − Aj, −A + Aj, −A − Aj, −A + Aj, A + Aj, A − Aj, −A + Aj, A + Aj, A + Aj, A + Aj, A − Aj, A + Aj, −A + Aj, −A − Aj, A − Aj, −A + Aj, −A + Aj, A − Aj, −A − Aj, −A + Aj, −A + Aj, A − Aj, A + Aj, −A − Aj, A − Aj |
| | Polarization 2 | −A + Aj, A + Aj, −A − Aj, −A − Aj, A − Aj, A − Aj, −A − Aj, A − Aj, A − Aj, A − Aj, A − Aj, −A + Aj, −A − Aj, A + Aj, A − Aj, −A − Aj, A + Aj, −A + Aj, A + Aj, A + Aj, −A − Aj, A − Aj, −A + Aj, −A − Aj, −A + Aj, A − Aj, A + Aj, −A + Aj, −A − Aj, −A − Aj, A + Aj, −A − Aj, −A + Aj, A − Aj, −A − Aj, −A − Aj, A + Aj, −A + Aj, −A + Aj, A + Aj, A + Aj, −A − Aj, −A − Aj, A + Aj, −A + Aj, A − Aj, −A − Aj, A − Aj, −A − Aj, −A + Aj, A − Aj, A − Aj, −A + Aj, −A + Aj, A + Aj, A + Aj, A + Aj, A + Aj, A − Aj, −A + Aj, A + Aj, −A + Aj, −A + Aj, A + Aj, −A − Aj |
| 16 | Polarization 1 | −A + Aj, −A + Aj, −A + Aj, A + Aj, A + Aj, A − Aj, A − Aj, A − Aj, A − Aj, −A − Aj, −A + Aj, A + Aj, −A + Aj, A + Aj, A + Aj, A + Aj, −A + Aj, −A − Aj, −A − Aj, −A − Aj, A + Aj, −A − Aj, A − Aj, −A + Aj, −A + Aj, −A − Aj, A − Aj, −A − Aj, A − Aj, −A − Aj, A − Aj, −A + Aj, A + Aj, −A + Aj, −A − Aj, A − Aj, −A − Aj, −A − Aj, A − Aj, A + Aj, A − Aj, −A + Aj, −A − Aj, −A + Aj, A + Aj, A − Aj, −A + Aj, A + Aj, A + Aj, A + Aj, A − Aj, A + Aj, −A + Aj, −A − Aj, A − Aj, −A + Aj, −A + Aj, A − Aj, −A − Aj, −A + Aj, −A + Aj, A − Aj, A + Aj, −A − Aj, A − Aj |
| | Polarization 2 | A + Aj, −A − Aj, −A − Aj, A − Aj, A − Aj, −A − Aj, A − Aj, A − Aj, A − Aj, A − Aj, −A + Aj, −A − Aj, A + Aj, A − Aj, −A − Aj, A + Aj, −A + Aj, A + Aj, A + Aj, −A − Aj, A − Aj, −A + Aj, −A − Aj, −A + Aj, A − Aj, A + Aj, −A + Aj, −A − Aj, −A − Aj, A + Aj, −A − Aj, −A + Aj, A − Aj, −A − Aj, −A − Aj, A + Aj, −A + Aj, −A + Aj, A + Aj, A + Aj, −A − Aj, −A − Aj, A + Aj, −A + Aj, A − Aj, −A − Aj, A − Aj, −A − Aj, −A + Aj, A − Aj, A − Aj, −A + Aj, −A + Aj, A + Aj, A + Aj, A + Aj, A + Aj, A − Aj, −A + Aj, A + Aj, −A + Aj, −A + Aj, A + Aj, −A − Aj, A + Aj |
| 17 | Polarization 1 | −A + Aj, −A + Aj, −A + Aj, A + Aj, A + Aj, A − Aj, A − Aj, A − Aj, A − Aj, −A − Aj, −A + Aj, A + Aj, −A + Aj, A + Aj, A + Aj, A + Aj, −A + Aj, −A − Aj, −A − Aj, −A − Aj, A + Aj, −A − Aj, A − Aj, −A + Aj, −A + Aj, −A − Aj, A − Aj, −A − Aj, A − Aj, −A − Aj, A − Aj, −A + Aj, A + Aj, −A + Aj, −A − Aj, A − Aj, −A − Aj, −A − Aj, A − Aj, A + Aj, A − Aj, −A + Aj, −A − Aj, −A + Aj, A + Aj, A − Aj, −A + Aj, A + Aj, A + Aj, A + Aj, A − Aj, A + Aj, −A + Aj, −A − Aj, A − Aj, −A + Aj, −A + Aj, A − Aj, −A − Aj, −A + Aj, −A + Aj, A − Aj, A + Aj, −A − Aj, A − Aj |
| | Polarization 2 | A + Aj, −A − Aj, −A + Aj, A + Aj, A + Aj, A − Aj, −A + Aj, −A + Aj, A + Aj, −A − Aj, −A − Aj, A − Aj, A − Aj, −A − Aj, A − Aj, A − Aj, A − Aj, A − Aj, −A + Aj, −A − Aj, A + Aj, A − Aj, −A − Aj, A + Aj, −A + Aj, A + Aj, A + Aj, −A − Aj, A − Aj, −A + Aj, −A − Aj, −A + Aj, A − Aj, A + Aj, −A + Aj, −A − Aj, −A − Aj, A + Aj, −A − Aj, −A + Aj, A − Aj, −A − Aj, −A − Aj, A + Aj, −A + Aj, −A + Aj, A + Aj, A + Aj, −A − Aj, −A − Aj, A + Aj, −A + Aj, A − Aj, −A − Aj, A − Aj, −A − Aj, −A + Aj, A − Aj, A − Aj, −A + Aj, −A + Aj, A + Aj, A + Aj, A + Aj, A + Aj |

(5) It is assumed that $N_{PS}$=74, and the pilot sequence is one item in the following Table 12-1. Alternatively, any item is selected from the following Table 12-2 as a pilot sequence in one polarization, and any item is selected from the following Table 12-3 as a pilot sequence in the other polarization. Alternatively, any item is selected from the following Table 12-4 as a pilot sequence in one polarization, and any item is selected from the following Table 12-5 as a pilot sequence in the other polarization.

TABLE 12-1

| Index | Polarization | Pilot sequence |
|---|---|---|
| 1 | Polarization 1 | –A – Aj, –A – Aj, –A + Aj, –A + Aj, A + Aj, A – Aj, –A + Aj, A + Aj, A + Aj, –A – Aj, A + Aj, –A + Aj, A + Aj, A – Aj, A + Aj, –A – Aj, A – Aj, A – Aj, A + Aj, –A + Aj, –A – Aj, A + Aj, –A + Aj, –A + Aj, –A + Aj, A – Aj, A – Aj, A – Aj, A – Aj, –A – Aj, –A – Aj, A – Aj, A – Aj, A – Aj, –A + Aj, –A – Aj, –A + Aj, –A – Aj, –A + Aj, A + Aj, A + Aj, A + Aj, A – Aj, –A + Aj, –A – Aj, A – Aj, –A – Aj, –A – Aj, –A + Aj, –A – Aj, A – Aj, –A – Aj, A – Aj, A + Aj, A + Aj, –A + Aj, –A + Aj, A – Aj, A + Aj, –A + Aj, –A + Aj, –A – Aj, –A + Aj, –A + Aj, A – Aj, A + Aj, A + Aj, –A – Aj, A + Aj, –A – Aj, A – Aj, A + Aj, –A – Aj, A – Aj |
| | Polarization 2 | –A + Aj, A – Aj, –A + Aj, –A – Aj, –A + Aj, –A + Aj, –A – Aj, A – Aj, –A – Aj, –A + Aj, –A – Aj, –A + Aj, –A + Aj, A – Aj, –A – Aj, A + Aj, A – Aj, –A + Aj, –A + Aj, –A + Aj, –A – Aj, –A – Aj, A – Aj, –A + Aj, A + Aj, A – Aj, A + Aj, A + Aj, –A + Aj, –A – Aj, A + Aj, A – Aj, A – Aj, A + Aj, A – Aj, –A + Aj, –A – Aj, A – Aj, A + Aj, –A – Aj, A + Aj, A – Aj, A + Aj, A + Aj, –A + Aj, A + Aj, A + Aj, –A – Aj, –A – Aj, A – Aj, –A + Aj, A – Aj, –A – Aj, A – Aj, A – Aj, –A + Aj, A + Aj, –A – Aj, –A – Aj, A – Aj, A + Aj, –A – Aj, A + Aj, –A + Aj, A + Aj, –A + Aj, A + Aj, A – Aj, –A – Aj, A + Aj, –A – Aj, A – Aj, –A – Aj, A + Aj |
| 2 | Polarization 1 | –A – Aj, –A + Aj, –A + Aj, A + Aj, A – Aj, –A + Aj, A + Aj, A + Aj, –A – Aj, A + Aj, –A + Aj, A + Aj, A – Aj, A + Aj, –A – Aj, A – Aj, A – Aj, A + Aj, –A + Aj, –A – Aj, A + Aj, –A + Aj, –A + Aj, –A + Aj, A – Aj, A – Aj, A – Aj, A – Aj, –A – Aj, –A – Aj, A – Aj, A – Aj, A – Aj, –A + Aj, –A – Aj, –A + Aj, –A – Aj, –A + Aj, A + Aj, A + Aj, A + Aj, A – Aj, –A + Aj, –A – Aj, A – Aj, –A – Aj, –A – Aj, –A + Aj, –A – Aj, A – Aj, –A – Aj, A – Aj, A + Aj, A + Aj, –A + Aj, –A + Aj, A – Aj, A + Aj, –A + Aj, –A + Aj, –A – Aj, –A + Aj, –A + Aj, A – Aj, A + Aj, A + Aj, –A – Aj, A + Aj, –A – Aj, A – Aj, A + Aj, –A – Aj, A – Aj, –A – Aj |
| | Polarization 2 | –A + Aj, A – Aj, –A + Aj, –A – Aj, –A + Aj, –A + Aj, –A – Aj, A – Aj, –A – Aj, –A + Aj, –A – Aj, –A + Aj, –A + Aj, A – Aj, –A – Aj, A + Aj, A – Aj, –A + Aj, –A + Aj, –A + Aj, –A – Aj, –A – Aj, A – Aj, –A + Aj, A + Aj, A – Aj, A + Aj, A + Aj, –A + Aj, –A – Aj, A + Aj, A – Aj, A – Aj, A + Aj, A – Aj, –A + Aj, –A – Aj, A – Aj, A + Aj, –A – Aj, A + Aj, A – Aj, A + Aj, A + Aj, –A + Aj, A + Aj, A + Aj, –A – Aj, –A – Aj, A – Aj, –A + Aj, A – Aj, –A – Aj, A – Aj, A – Aj, –A + Aj, A + Aj, –A – Aj, –A – Aj, A – Aj, A + Aj, –A – Aj, A + Aj, –A + Aj, A + Aj, –A + Aj, A + Aj, A – Aj, –A – Aj, A + Aj, –A – Aj, A – Aj, –A – Aj, A + Aj |
| 3 | Polarization 1 | –A + Aj, –A + Aj, A + Aj, –A + Aj, A + Aj, –A + Aj, A + Aj, –A – Aj, –A – Aj, –A – Aj, –A – Aj, –A + Aj, –A – Aj, A – Aj, –A – Aj, –A + Aj, A – Aj, A – Aj, A – Aj, A – Aj, –A + Aj, A – Aj, A – Aj, –A – Aj, A – Aj, A – Aj, A – Aj, –A + Aj, –A – Aj, A + Aj, –A – Aj, A – Aj, –A + Aj, A + Aj, –A – Aj, –A + Aj, A + Aj, A + Aj, A + Aj, –A + Aj, A – Aj, –A + Aj, –A – Aj, A + Aj, –A + Aj, A – Aj, A + Aj, A + Aj, –A + Aj, A + Aj, –A + Aj, –A + Aj, –A + Aj, –A – Aj, –A – Aj, A + Aj, –A – Aj, –A + Aj, A + Aj, –A – Aj, A – Aj, A + Aj, A – Aj, A + Aj, A + Aj, –A – Aj, A – Aj, –A – Aj, –A + Aj, –A – Aj, A + Aj, A – Aj, A – Aj, A – Aj |
| | Polarization 2 | –A – Aj, A + Aj, A – Aj, A – Aj, A + Aj, A + Aj, –A + Aj, –A + Aj, A + Aj, A + Aj, –A + Aj, A + Aj, A + Aj, A + Aj, A + Aj, –A – Aj, A + Aj, –A – Aj, –A – Aj, A – Aj, A – Aj, –A – Aj, A – Aj, –A + Aj, A + Aj, A + Aj, –A – Aj, –A + Aj, A + Aj, –A + Aj, A – Aj, –A + Aj, A – Aj, A – Aj, –A + Aj, A – Aj, –A – Aj, A – Aj, –A – Aj, A – Aj, –A + Aj, A – Aj, –A – Aj, –A – Aj, –A + Aj, A – Aj, –A + Aj, –A + Aj, –A + Aj, –A + Aj, –A – Aj, A – Aj, A – Aj, –A – Aj, –A + Aj, –A – Aj, –A + Aj, A + Aj, A – Aj, A – Aj, –A – Aj, A – Aj, –A – Aj, A + Aj, –A + Aj, –A – Aj, –A – Aj, –A + Aj, A + Aj, –A – Aj, A + Aj, A + Aj, –A – Aj, A + Aj |
| 4 | Polarization 1 | –A + Aj, A – Aj, –A – Aj, A + Aj, A – Aj, A – Aj, A + Aj, A + Aj, –A + Aj, –A + Aj, A + Aj, A + Aj, –A + Aj, A + Aj, A + Aj, A + Aj, A + Aj, –A – Aj, A + Aj, –A – Aj, –A – Aj, A – Aj, A – Aj, –A – Aj, A – Aj, –A + Aj, A + Aj, A + Aj, –A – Aj, –A + Aj, A + Aj, –A + Aj, A – Aj, –A + Aj, A – Aj, A – Aj, –A + Aj, A – Aj, –A – Aj, A – Aj, –A – Aj, A – Aj, –A + Aj, A – Aj, –A – Aj, –A – Aj, –A + Aj, A – Aj, –A + Aj, –A + Aj, –A + Aj, –A + Aj, –A – Aj, A – Aj, A – Aj, –A – Aj, –A + Aj, –A – Aj, –A + Aj, A + Aj, A – Aj, A – Aj, –A – Aj, A – Aj, –A – Aj, A + Aj, –A + Aj, –A – Aj, –A – Aj, –A + Aj, A + Aj, –A – Aj, A + Aj, A + Aj |
| | Polarization 2 | A + Aj, –A – Aj, A – Aj, A – Aj, –A – Aj, A + Aj, –A + Aj, –A + Aj, A + Aj, –A + Aj, A + Aj, –A + Aj, A + Aj, –A – Aj, –A – Aj, –A – Aj, –A – Aj, –A + Aj, –A – Aj, A – Aj, –A – Aj, –A + Aj, A – Aj, A – Aj, A – Aj, A – Aj, –A + Aj, A – Aj, A – Aj, –A – Aj, A – Aj, A – Aj, A – Aj, –A + Aj, –A – Aj, A + Aj, –A – Aj, A – Aj, –A + Aj, A + Aj, –A – Aj, –A + Aj, A + Aj, A + Aj, A + Aj, –A + Aj, A – Aj, –A + Aj, –A – Aj, A + Aj, –A + Aj, A – Aj, A + Aj, A + Aj, –A + Aj, A + Aj, –A + Aj, –A + Aj, –A + Aj, –A – Aj, –A – Aj, A + Aj, –A – Aj, –A + Aj, A + Aj, –A – Aj, A – Aj, A + Aj, A – Aj, A + Aj, A + Aj, –A – Aj, A – Aj, –A – Aj |
| 5 | Polarization 1 | –A + Aj, –A + Aj, –A + Aj, A + Aj, –A – Aj, A – Aj, –A – Aj, –A + Aj, –A – Aj, A + Aj, A + Aj, –A + Aj, A + Aj, –A + Aj, –A – Aj, A + Aj, A – Aj, –A – Aj, A + Aj, –A – Aj, –A – Aj, A – Aj, A – Aj, A – Aj, A + Aj, A – Aj, A + Aj, A + Aj, –A + Aj, A – Aj, A + Aj, –A – Aj, A – Aj, –A + Aj, A – Aj, A + Aj, A + Aj, A + Aj, A – Aj, –A – Aj, A + Aj, A – Aj, –A + Aj, –A – Aj, A + Aj, –A – Aj, A – Aj, –A + Aj, –A + Aj, –A + Aj, –A – Aj, –A + Aj, –A + Aj, A – Aj, –A + Aj, –A + Aj, –A + Aj, –A + Aj, A – Aj, –A – Aj, –A + Aj, –A – Aj, A – Aj, –A – Aj, –A – Aj, –A – Aj, –A – Aj, A + Aj, A – Aj, A + Aj, A – Aj, A + Aj, A – Aj, A – Aj |
| | Polarization 2 | A + Aj, –A – Aj, A + Aj, A + Aj, –A – Aj, A + Aj, A – Aj, –A – Aj, –A – Aj, A – Aj, A + Aj, –A – Aj, –A + Aj, –A – Aj, –A + Aj, –A + Aj, A + Aj, A – Aj, –A – Aj, A – Aj, –A – Aj, –A + Aj, –A + Aj, –A – Aj, A – Aj, A – Aj, A – Aj, A – Aj, –A + Aj, A – Aj, –A – Aj, –A – Aj, –A + Aj, A – Aj, –A + Aj, –A – Aj, –A + Aj, –A – Aj, –A + Aj, A – Aj, –A + Aj, –A + Aj, A – Aj, –A + Aj, A – Aj, A + Aj, A – Aj, –A – Aj, A + Aj, A + Aj, A – Aj, –A + Aj, –A – Aj, –A + Aj, –A + Aj, –A – Aj, –A – Aj, A + Aj, –A – Aj, A + Aj, A + Aj, A + Aj, A + Aj, A – Aj, A + Aj, A + Aj, A – Aj, A – Aj, A + Aj, A + Aj, –A + Aj, –A + Aj, A + Aj, –A – Aj |
| 6 | Polarization 1 | A + Aj, A + Aj, –A – Aj, A + Aj, A – Aj, –A – Aj, –A – Aj, A – Aj, A + Aj, –A – Aj, –A + Aj, –A – Aj, –A + Aj, –A + Aj, A + Aj, A – Aj, –A – Aj, A – Aj, –A – Aj, –A + Aj, –A + Aj, –A – Aj, A – |

TABLE 12-1-continued

| Index | Polarization | Pilot sequence |
|---|---|---|
| | | Aj, A − Aj, A − Aj, A − Aj, −A + Aj, A − Aj, −A − Aj, −A − Aj, −A + Aj, A − Aj, −A + Aj, −A − Aj, −A + Aj, −A − Aj, −A + Aj, A − Aj, −A + Aj, −A + Aj, A − Aj, −A + Aj, A − Aj, A + Aj, A − Aj, −A − Aj, A + Aj, A + Aj, A − Aj, −A + Aj, −A − Aj, −A + Aj, −A + Aj, −A − Aj, −A − Aj, A + Aj, −A − Aj, A + Aj, A + Aj, A + Aj, A + Aj, A − Aj, A + Aj, A + Aj, A − Aj, A − Aj, A + Aj, A + Aj, −A + Aj, −A + Aj, A + Aj, −A − Aj, −A + Aj, A − Aj |
| | Polarization 2 | −A − Aj, −A + Aj, −A − Aj, A + Aj, A + Aj, −A + Aj, A + Aj, −A + Aj, −A − Aj, A + Aj, A − Aj, −A − Aj, A + Aj, −A − Aj, −A − Aj, A − Aj, A − Aj, A − Aj, A + Aj, A − Aj, A + Aj, A + Aj, −A + Aj, A − Aj, A + Aj, −A − Aj, A − Aj, −A + Aj, A − Aj, A + Aj, A + Aj, A + Aj, A − Aj, −A − Aj, A + Aj, A − Aj, −A + Aj, −A − Aj, A + Aj, −A − Aj, A − Aj, −A + Aj, −A + Aj, −A + Aj, −A − Aj, −A + Aj, −A + Aj, A − Aj, −A + Aj, −A + Aj, −A + Aj, −A + Aj, A − Aj, −A − Aj, −A + Aj, −A − Aj, A − Aj, −A − Aj, −A − Aj, −A − Aj, −A − Aj, A + Aj, A − Aj, A + Aj, A − Aj, A + Aj, A − Aj, A − Aj, A + Aj, −A − Aj, −A + Aj, −A + Aj, −A − Aj, A + Aj |
| 7 | Polarization 1 | −A − Aj, −A + Aj, −A − Aj, A + Aj, −A + Aj, −A − Aj, A + Aj, −A − Aj, A + Aj, A + Aj, −A + Aj, A − Aj, A − Aj, −A − Aj, A − Aj, A − Aj, A + Aj, −A + Aj, A − Aj, A − Aj, A + Aj, A + Aj, −A + Aj, −A − Aj, −A + Aj, −A − Aj, A − Aj, −A − Aj, −A − Aj, −A + Aj, −A − Aj, A − Aj, −A + Aj, A + Aj, A + Aj, A + Aj, A − Aj, −A − Aj, A − Aj, −A − Aj, A − Aj, −A + Aj, −A + Aj, −A + Aj, −A − Aj, −A − Aj, −A + Aj, −A + Aj, −A + Aj, −A + Aj, A − Aj, A − Aj, A − Aj, A + Aj, −A − Aj, A − Aj, A + Aj, −A + Aj, −A + Aj, −A − Aj, A + Aj, −A + Aj, A + Aj, A − Aj, A + Aj, −A − Aj, A + Aj, A + Aj, A − Aj, −A + Aj, A + Aj, A − Aj, A − Aj, −A − Aj |
| | Polarization 2 | A + Aj, −A − Aj, −A + Aj, −A − Aj, A + Aj, −A − Aj, −A + Aj, A + Aj, A − Aj, A + Aj, A − Aj, A + Aj, −A − Aj, A + Aj, −A + Aj, −A − Aj, −A − Aj, A + Aj, A − Aj, −A + Aj, −A + Aj, −A − Aj, −A + Aj, A − Aj, −A + Aj, −A − Aj, −A − Aj, A + Aj, A + Aj, A − Aj, A + Aj, A + Aj, −A + Aj, A + Aj, −A − Aj, A + Aj, −A + Aj, −A − Aj, A − Aj, −A + Aj, A + Aj, −A + Aj, −A + Aj, A + Aj, −A − Aj, A − Aj, A + Aj, A + Aj, −A + Aj, A + Aj, A − Aj, −A + Aj, −A − Aj, −A − Aj, A − Aj, A − Aj, A − Aj, −A + Aj, A + Aj, −A − Aj, −A + Aj, A − Aj, A − Aj, −A − Aj, A − Aj, −A − Aj, −A + Aj, −A − Aj, A − Aj, A − Aj, −A − Aj, A − Aj, −A + Aj, A − Aj |
| 8 | Polarization 1 | −A + Aj, −A − Aj, A + Aj, −A + Aj, −A − Aj, A + Aj, −A − Aj, A + Aj, A + Aj, −A + Aj, A − Aj, A − Aj, −A − Aj, A − Aj, A − Aj, A + Aj, −A + Aj, A − Aj, A − Aj, A + Aj, A + Aj, −A + Aj, −A − Aj, −A + Aj, −A − Aj, A − Aj, −A − Aj, −A − Aj, −A + Aj, −A − Aj, A − Aj, −A + Aj, A + Aj, A + Aj, A + Aj, A − Aj, −A − Aj, A − Aj, −A − Aj, A − Aj, −A + Aj, −A + Aj, −A + Aj, −A − Aj, −A − Aj, −A + Aj, −A + Aj, −A + Aj, −A + Aj, A − Aj, A − Aj, A − Aj, A + Aj, −A − Aj, A − Aj, A + Aj, −A + Aj, −A + Aj, −A − Aj, A + Aj, −A + Aj, A + Aj, A − Aj, A + Aj, −A − Aj, A + Aj, A + Aj, A − Aj, −A + Aj, A + Aj, A − Aj, A − Aj, −A − Aj, −A − Aj |
| | Polarization 2 | A + Aj, −A − Aj, −A + Aj, −A − Aj, A + Aj, −A − Aj, −A + Aj, A + Aj, A − Aj, A + Aj, A − Aj, A + Aj, −A − Aj, A + Aj, −A + Aj, −A − Aj, −A − Aj, A + Aj, A − Aj, −A + Aj, −A + Aj, −A − Aj, −A + Aj, A − Aj, −A + Aj, −A − Aj, −A − Aj, A + Aj, A + Aj, A − Aj, A + Aj, A + Aj, −A + Aj, A + Aj, −A − Aj, A + Aj, −A + Aj, −A − Aj, A − Aj, −A + Aj, A + Aj, −A + Aj, −A + Aj, A + Aj, −A − Aj, A − Aj, A + Aj, A + Aj, −A + Aj, A + Aj, A − Aj, −A + Aj, −A − Aj, −A − Aj, A − Aj, A − Aj, A − Aj, −A + Aj, A + Aj, −A − Aj, −A + Aj, A − Aj, A − Aj, −A − Aj, A − Aj, −A − Aj, −A + Aj, −A − Aj, A − Aj, A − Aj, −A − Aj, A − Aj, −A + Aj, A − Aj |

TABLE 12-2

| Index | Pilot sequence |
|---|---|
| 1 | −A − Aj, −A + Aj, −A + Aj, −A − Aj, A − Aj, A − Aj, −A − Aj, −A + Aj, A − Aj, A − Aj, −A − Aj, A − Aj, A + Aj, −A + Aj, A + Aj, A − Aj, A + Aj, −A − Aj, A − Aj, −A − Aj, A + Aj, −A + Aj, A − Aj, −A − Aj, −A − Aj, A + Aj, −A − Aj, −A − Aj, A + Aj, A + Aj, −A + Aj, −A − Aj, −A − Aj, −A + Aj, −A − Aj, −A + Aj, −A − Aj, A − Aj, −A + Aj, −A + Aj, A − Aj, −A + Aj, A − Aj, −A − Aj, A + Aj, A − Aj, A + Aj, A + Aj, A + Aj, A + Aj, −A − Aj, −A + Aj, A − Aj, −A + Aj, −A + Aj, −A + Aj, −A − Aj, −A + Aj, A + Aj, A + Aj, A − Aj, A − Aj, A − Aj, −A + Aj, A + Aj, −A + Aj, −A + Aj, A − Aj, A − Aj, A + Aj, A + Aj, −A − Aj, A − Aj, A + Aj |
| 2 | −A − Aj, A + Aj, A − Aj, A − Aj, A + Aj, −A + Aj, −A + Aj, A + Aj, A − Aj, −A + Aj, −A + Aj, A + Aj, −A + Aj, −A − Aj, A − Aj, −A − Aj, −A + Aj, −A − Aj, A + Aj, −A + Aj, A + Aj, −A − Aj, A − Aj, −A + Aj, A + Aj, A + Aj, −A − Aj, A + Aj, A + Aj, −A − Aj, −A − Aj, A − Aj, A + Aj, A + Aj, A − Aj, A + Aj, A − Aj, A + Aj, −A + Aj, A − Aj, A − Aj, −A + Aj, A − Aj, −A + Aj, A + Aj, −A − Aj, −A + Aj, −A − Aj, −A − Aj, −A − Aj, −A − Aj, A + Aj, A − Aj, −A + Aj, A − Aj, A − Aj, A − Aj, A + Aj, A − Aj, −A − Aj, −A − Aj, −A + Aj, −A + Aj, −A + Aj, A − Aj, −A − Aj, A − Aj, A − Aj, −A + Aj, −A + Aj, −A − Aj, −A − Aj, A + Aj, −A + Aj |
| 3 | −A + Aj, −A − Aj, A + Aj, A − Aj, A − Aj, A + Aj, −A + Aj, −A + Aj, A + Aj, A − Aj, −A + Aj, −A + Aj, A + Aj, −A + Aj, −A − Aj, A − Aj, −A − Aj, −A + Aj, −A − Aj, A + Aj, −A + Aj, A + Aj, −A − Aj, A − Aj, −A + Aj, A + Aj, A + Aj, −A − Aj, A + Aj, A + Aj, −A − Aj, −A − Aj, A − Aj, A + Aj, A + Aj, A − Aj, A + Aj, A − Aj, A + Aj, −A + Aj, A − Aj, A − Aj, −A + Aj, A − Aj, −A + Aj, A + Aj, −A − Aj, −A + Aj, −A − Aj, −A − Aj, −A − Aj, −A − Aj, A + Aj, A − Aj, −A + Aj, A − Aj, A − Aj, A − Aj, A + Aj, A − Aj, −A − Aj, −A − Aj, −A + Aj, −A + Aj, −A + Aj, A − Aj, −A − Aj, A − Aj, A − Aj, −A + Aj, −A + Aj, −A − Aj, −A − Aj, A + Aj |
| 4 | A − Aj, A + Aj, −A − Aj, −A + Aj, −A + Aj, −A − Aj, A − Aj, A − Aj, −A − Aj, −A + Aj, A − Aj, A − Aj, −A − Aj, A − Aj, A + Aj, −A + Aj, A + Aj, A − Aj, A + Aj, −A − Aj, A − Aj, −A − Aj, A + Aj, −A + Aj, A − Aj, −A − Aj, −A − Aj, A + Aj, −A − Aj, −A − Aj, A + Aj, A + Aj, −A + Aj, −A − Aj, −A − Aj, −A + Aj, −A − Aj, −A + Aj, −A − Aj, A − Aj, −A + Aj, −A + Aj, A − Aj, −A + Aj, A − Aj, −A − Aj, A + Aj, A − Aj, A + Aj, A + Aj, A + Aj, A + Aj, −A − Aj, −A + Aj, A − Aj, −A + Aj, −A + Aj, −A + Aj, −A − Aj, −A + Aj, A + Aj, A + Aj, A − Aj, A − Aj, A − Aj, −A + Aj, A + Aj, −A + Aj, −A + Aj, A − Aj, A − Aj, A + Aj, A + Aj, −A − Aj |
| 5 | A + Aj, −A − Aj, −A + Aj, −A + Aj, −A − Aj, A − Aj, A − Aj, −A − Aj, −A + Aj, A − Aj, A − Aj, −A − Aj, A − Aj, A + Aj, −A + Aj, A + Aj, A − Aj, A + Aj, −A − Aj, A − Aj, −A − Aj, A + Aj, −A + Aj, A − Aj, −A − Aj, −A − Aj, A + Aj, −A − Aj, −A − Aj, A + Aj, A + Aj, −A + Aj, −A − Aj, −A − Aj, −A + Aj, −A − Aj, −A + Aj, −A − Aj, A − Aj, −A + Aj, −A + Aj, A − Aj, −A + Aj, A − Aj, −A − Aj, A + Aj, A − Aj, A + Aj, A + Aj, A + Aj, A + Aj, −A − Aj, |

TABLE 12-2-continued

| Index | Pilot sequence |
|---|---|
| | −A + Aj, A − Aj, −A + Aj, −A + Aj, −A + Aj, −A − Aj, −A + Aj, A + Aj, A + Aj, A − Aj, A − Aj, A − Aj, −A + Aj, A + Aj, −A + Aj, −A + Aj, A − Aj, A − Aj, A + Aj, A + Aj, −A − Aj, A − Aj |
| 6 | A + Aj, A − Aj, A − Aj, A + Aj, −A + Aj, −A + Aj, A + Aj, A − Aj, −A + Aj, −A + Aj, A + Aj, −A + Aj, −A − Aj, A − Aj, −A − Aj, −A + Aj, −A − Aj, A + Aj, −A + Aj, A + Aj, −A − Aj, A − Aj, −A + Aj, A + Aj, A + Aj, −A − Aj, A + Aj, A + Aj, −A − Aj, −A − Aj, A − Aj, A + Aj, A + Aj, A − Aj, A + Aj, A − Aj, A + Aj, −A + Aj, A − Aj, A − Aj, −A + Aj, A − Aj, −A + Aj, A + Aj, −A − Aj, −A + Aj, −A − Aj, −A − Aj, −A − Aj, −A − Aj, A + Aj, A − Aj, −A + Aj, A − Aj, A − Aj, A − Aj, A + Aj, A − Aj, −A − Aj, −A − Aj, −A + Aj, −A + Aj, −A + Aj, A − Aj, −A − Aj, A − Aj, A − Aj, −A + Aj, −A + Aj, −A − Aj, −A − Aj, A + Aj, −A + Aj, −A − Aj |

TABLE 12-3

| Index | Pilot sequence |
|---|---|
| 1 | −A − Aj, −A + Aj, A − Aj, A + Aj, A + Aj, A − Aj, −A − Aj, −A − Aj, A − Aj, A + Aj, −A − Aj, −A − Aj, A − Aj, −A − Aj, −A + Aj, A + Aj, −A + Aj, −A − Aj, −A + Aj, A − Aj, −A − Aj, A − Aj, −A + Aj, A + Aj, −A − Aj, A − Aj, A − Aj, −A + Aj, A − Aj, A − Aj, −A + Aj, −A + Aj, A + Aj, A − Aj, A − Aj, A + Aj, A − Aj, A + Aj, A − Aj, −A − Aj, A + Aj, A + Aj, −A − Aj, A + Aj, −A − Aj, A − Aj, −A + Aj, −A − Aj, −A + Aj, −A + Aj, −A + Aj, −A + Aj, A − Aj, A + Aj, −A − Aj, A + Aj, A + Aj, A + Aj, A − Aj, A + Aj, −A + Aj, −A + Aj, −A − Aj, −A − Aj, −A − Aj, A + Aj, −A + Aj, A + Aj, A + Aj, −A − Aj, −A − Aj, −A + Aj, −A + Aj, A − Aj |
| 2 | −A + Aj, −A − Aj, −A − Aj, −A + Aj, A + Aj, A + Aj, −A + Aj, −A − Aj, A + Aj, A + Aj, −A + Aj, A + Aj, A − Aj, −A − Aj, A − Aj, A + Aj, A − Aj, −A + Aj, A + Aj, −A + Aj, A − Aj, −A − Aj, A + Aj, −A + Aj, −A + Aj, A − Aj, −A + Aj, −A + Aj, A − Aj, A − Aj, −A − Aj, −A + Aj, −A + Aj, −A − Aj, −A + Aj, −A − Aj, −A + Aj, A + Aj, −A − Aj, −A − Aj, A + Aj, −A − Aj, A + Aj, −A + Aj, A − Aj, A + Aj, A − Aj, A − Aj, A − Aj, A − Aj, −A + Aj, −A − Aj, A + Aj, −A − Aj, −A − Aj, −A − Aj, −A + Aj, −A − Aj, A − Aj, A − Aj, A + Aj, A + Aj, A + Aj, −A − Aj, A − Aj, −A − Aj, −A − Aj, A + Aj, A + Aj, A − Aj, A − Aj, −A + Aj, A + Aj, A − Aj |
| 3 | −A + Aj, A − Aj, A + Aj, A + Aj, A − Aj, −A − Aj, −A − Aj, A − Aj, A + Aj, −A − Aj, −A − Aj, A − Aj, −A − Aj, −A + Aj, A + Aj, −A + Aj, −A − Aj, −A + Aj, A − Aj, −A − Aj, A − Aj, −A + Aj, A + Aj, −A − Aj, A − Aj, A − Aj, −A + Aj, A − Aj, A − Aj, −A + Aj, −A + Aj, A + Aj, A − Aj, A − Aj, A + Aj, A − Aj, A + Aj, A − Aj, −A − Aj, A + Aj, A + Aj, −A − Aj, A + Aj, −A − Aj, A − Aj, −A + Aj, −A − Aj, −A + Aj, −A + Aj, −A + Aj, −A + Aj, A − Aj, A + Aj, −A − Aj, A + Aj, A + Aj, A + Aj, A − Aj, A + Aj, −A + Aj, −A + Aj, −A − Aj, −A − Aj, −A − Aj, A + Aj, −A + Aj, A + Aj, A + Aj, −A − Aj, −A − Aj, −A + Aj, −A + Aj, A − Aj, −A − Aj |
| 4 | A − Aj, −A + Aj, −A − Aj, −A − Aj, −A + Aj, A + Aj, A + Aj, −A + Aj, −A − Aj, A + Aj, A + Aj, −A + Aj, A + Aj, A − Aj, −A − Aj, A − Aj, A + Aj, A − Aj, −A + Aj, A + Aj, −A + Aj, A − Aj, −A − Aj, A + Aj, −A + Aj, −A + Aj, A − Aj, −A + Aj, −A + Aj, A − Aj, A − Aj, −A − Aj, −A + Aj, −A + Aj, −A − Aj, −A + Aj, −A − Aj, −A + Aj, A + Aj, −A − Aj, −A − Aj, A + Aj, −A − Aj, A + Aj, −A + Aj, A − Aj, A + Aj, A − Aj, A − Aj, A − Aj, A − Aj, −A + Aj, −A − Aj, A + Aj, −A − Aj, −A − Aj, −A − Aj, −A + Aj, −A − Aj, A − Aj, A − Aj, A + Aj, A + Aj, A + Aj, −A − Aj, A − Aj, −A − Aj, −A − Aj, A + Aj, A + Aj, A − Aj, A − Aj, −A + Aj, A + Aj |
| 5 | A − Aj, A + Aj, A + Aj, A − Aj, −A − Aj, −A − Aj, A − Aj, A + Aj, −A − Aj, −A − Aj, A − Aj, −A − Aj, −A + Aj, A + Aj, −A + Aj, −A − Aj, −A + Aj, A − Aj, −A − Aj, A − Aj, −A + Aj, A + Aj, −A − Aj, A − Aj, A − Aj, −A + Aj, A − Aj, A − Aj, −A + Aj, −A + Aj, A + Aj, A − Aj, A − Aj, A + Aj, A − Aj, A + Aj, A − Aj, −A − Aj, A + Aj, A + Aj, −A − Aj, A + Aj, −A − Aj, A − Aj, −A + Aj, −A − Aj, −A + Aj, −A + Aj, −A + Aj, −A + Aj, A − Aj, A + Aj, −A − Aj, A + Aj, A + Aj, A + Aj, A − Aj, A + Aj, −A + Aj, −A + Aj, −A − Aj, −A − Aj, −A − Aj, A + Aj, −A + Aj, A + Aj, A + Aj, −A − Aj, −A − Aj, −A + Aj, −A + Aj, A − Aj, −A − Aj, −A + Aj |
| 6 | A + Aj, A − Aj, −A + Aj, −A − Aj, −A − Aj, −A + Aj, A + Aj, A + Aj, −A + Aj, −A − Aj, A + Aj, A + Aj, −A + Aj, A + Aj, A − Aj, −A − Aj, A − Aj, A + Aj, A − Aj, −A + Aj, A + Aj, −A + Aj, A − Aj, −A − Aj, A + Aj, −A + Aj, −A + Aj, A − Aj, −A + Aj, −A + Aj, A − Aj, A − Aj, −A − Aj, −A + Aj, −A + Aj, −A − Aj, −A + Aj, −A − Aj, −A + Aj, A + Aj, −A − Aj, −A − Aj, A + Aj, −A − Aj, A + Aj, −A + Aj, A − Aj, A + Aj, A − Aj, A − Aj, A − Aj, A − Aj, −A + Aj, −A − Aj, A + Aj, −A − Aj, −A − Aj, −A − Aj, −A + Aj, −A − Aj, A − Aj, A − Aj, A + Aj, A + Aj, A + Aj, −A − Aj, A − Aj, −A − Aj, −A − Aj, A + Aj, A + Aj, A − Aj, A − Aj, −A + Aj |

TABLE 12-4

| Index | Pilot sequence |
|---|---|
| 1 | −A − Aj, A − Aj, A + Aj, −A − Aj, −A − Aj, A − Aj, A − Aj, −A + Aj, −A + Aj, −A − Aj, −A + Aj, A − Aj, A − Aj, A − Aj, −A − Aj, −A − Aj, −A + Aj, A + Aj, −A + Aj, −A + Aj, −A + Aj, A − Aj, −A + Aj, A + Aj, −A − Aj, −A − Aj, −A − Aj, −A − Aj, A − Aj, −A − Aj, A + Aj, A − Aj, −A + Aj, A − Aj, −A + Aj, −A + Aj, A − Aj, A + Aj, −A + Aj, A + Aj, −A + Aj, A + Aj, A + Aj, −A + Aj, −A − Aj, −A − Aj, A + Aj, A + Aj, −A − Aj, A + Aj, A + Aj, A − Aj, −A + Aj, −A − Aj, A + Aj, A − Aj, A + Aj, −A − Aj, A − Aj, −A − Aj, −A + Aj, −A − Aj, A − Aj, A + Aj, A − Aj, A − Aj, −A + Aj, A + Aj, A − Aj, A − Aj, A + Aj, −A + Aj, −A + Aj, A + Aj |
| 2 | −A − Aj, A + Aj, A + Aj, −A + Aj, −A + Aj, A − Aj, A − Aj, A + Aj, A − Aj, −A + Aj, −A + Aj, −A + Aj, A + Aj, A + Aj, A − Aj, −A − Aj, A − Aj, A − Aj, A − Aj, −A + Aj, A − Aj, −A − Aj, A + Aj, A + Aj, A + Aj, A + Aj, −A + Aj, A + Aj, −A − Aj, −A + Aj, A − Aj, −A + Aj, A − Aj, A − Aj, −A + Aj, −A − Aj, A − Aj, −A − Aj, A − Aj, −A − Aj, −A − Aj, A − Aj, A + Aj, A + Aj, −A − Aj, −A − Aj, A + Aj, −A − Aj, −A − Aj, −A + Aj, A − Aj, A + Aj, −A − Aj, −A + Aj, −A − Aj, A + Aj, −A + Aj, A + Aj, A − Aj, A + Aj, −A + Aj, −A − Aj, −A + Aj, −A + Aj, A − Aj, −A − Aj, −A + Aj, −A + Aj, −A − Aj, A − Aj, A − Aj, −A − Aj, A + Aj, −A + Aj |
| 3 | −A + Aj, −A − Aj, A + Aj, A + Aj, −A + Aj, −A + Aj, A − Aj, A − Aj, A + Aj, A − Aj, −A + Aj, −A + Aj, −A + Aj, A + Aj, A + Aj, A − Aj, −A − Aj, A − Aj, A − Aj, A − Aj, −A + Aj, A − Aj, −A − Aj, A + Aj, A + Aj, A + Aj, A + Aj, −A + Aj, A + Aj, −A − Aj, −A + Aj, A − Aj, −A + Aj, A − Aj, A − Aj, −A + Aj, −A − Aj, A − Aj, −A − Aj, A − Aj, −A − Aj, −A − Aj, A − Aj, A + Aj, A + Aj, −A − Aj, −A − Aj, A + Aj, −A − Aj, −A − Aj, −A + Aj, |

TABLE 12-4-continued

| Index | Pilot sequence |
|---|---|
| | A − Aj, A + Aj, −A − Aj, −A + Aj, −A − Aj, A + Aj, −A + Aj, A + Aj, A − Aj, A + Aj, −A + Aj, −A − Aj, −A + Aj, −A + Aj, A − Aj, −A − Aj, −A + Aj, −A + Aj, −A − Aj, A − Aj, A − Aj, −A − Aj, A + Aj |
| 4 | A − Aj, A + Aj, −A − Aj, −A − Aj, A − Aj, A − Aj, −A + Aj, −A + Aj, −A − Aj, −A + Aj, A − Aj, A − Aj, A − Aj, −A − Aj, −A − Aj, −A + Aj, A + Aj, −A + Aj, −A + Aj, −A + Aj, A − Aj, −A + Aj, A + Aj, −A − Aj, −A − Aj, −A − Aj, −A − Aj, A − Aj, −A − Aj, A + Aj, A − Aj, −A + Aj, A − Aj, −A + Aj, −A + Aj, A − Aj, A + Aj, −A + Aj, A + Aj, −A + Aj, A + Aj, A + Aj, −A + Aj, −A − Aj, −A − Aj, A + Aj, A + Aj, −A − Aj, A + Aj, A + Aj, A − Aj, −A + Aj, −A − Aj, A + Aj, A − Aj, A + Aj, −A − Aj, A − Aj, −A − Aj, −A + Aj, −A − Aj, A − Aj, A + Aj, A − Aj, A − Aj, −A + Aj, A + Aj, A − Aj, A − Aj, A + Aj, −A + Aj, −A + Aj, A + Aj, −A − Aj |
| 5 | A + Aj, −A − Aj, −A − Aj, A − Aj, A − Aj, −A + Aj, −A + Aj, −A − Aj, −A + Aj, A − Aj, A − Aj, A − Aj, −A − Aj, −A − Aj, −A + Aj, A + Aj, −A + Aj, −A + Aj, −A + Aj, A − Aj, −A + Aj, A + Aj, −A − Aj, −A − Aj, −A − Aj, −A − Aj, A − Aj, −A − Aj, A + Aj, A − Aj, −A + Aj, A − Aj, −A + Aj, −A + Aj, A − Aj, A + Aj, −A + Aj, A + Aj, −A + Aj, A + Aj, A + Aj, −A + Aj, −A − Aj, −A − Aj, A + Aj, A + Aj, −A − Aj, A + Aj, A + Aj, A − Aj, −A + Aj, −A − Aj, A + Aj, A − Aj, A + Aj, −A − Aj, A − Aj, −A − Aj, −A + Aj, −A − Aj, A − Aj, A + Aj, A − Aj, A − Aj, −A + Aj, A + Aj, A − Aj, A − Aj, A + Aj, −A + Aj, −A + Aj, A + Aj, −A − Aj, A − Aj |
| 6 | A + Aj, −A + Aj, −A − Aj, A + Aj, A + Aj, −A + Aj, −A + Aj, A − Aj, A − Aj, A + Aj, A − Aj, −A + Aj, −A + Aj, −A + Aj, A + Aj, A + Aj, A − Aj, −A − Aj, A − Aj, A − Aj, A − Aj, −A + Aj, A − Aj, −A − Aj, A + Aj, A + Aj, A + Aj, A + Aj, −A + Aj, A + Aj, −A − Aj, −A + Aj, A − Aj, −A + Aj, A − Aj, A − Aj, −A + Aj, −A − Aj, A − Aj, −A − Aj, A − Aj, −A − Aj, −A − Aj, A − Aj, A + Aj, A + Aj, −A − Aj, −A − Aj, A + Aj, −A − Aj, −A − Aj, −A + Aj, A − Aj, A + Aj, −A − Aj, −A + Aj, −A − Aj, A + Aj, −A + Aj, A + Aj, A − Aj, A + Aj, −A + Aj, −A − Aj, −A + Aj, −A + Aj, A − Aj, −A − Aj, −A + Aj, −A + Aj, −A − Aj, A − Aj, A − Aj, −A − Aj |

TABLE 12-5

| Index | Pilot sequence |
|---|---|
| 1 | −A − Aj, −A + Aj, A − Aj, A − Aj, −A − Aj, −A − Aj, A + Aj, A + Aj, A − Aj, A + Aj, −A − Aj, −A − Aj, −A − Aj, A − Aj, A − Aj, A + Aj, −A + Aj, A + Aj, A + Aj, A + Aj, −A − Aj, A + Aj, −A + Aj, A − Aj, A − Aj, A − Aj, A − Aj, −A − Aj, A − Aj, −A + Aj, −A − Aj, A + Aj, −A − Aj, A + Aj, A + Aj, −A − Aj, −A + Aj, A + Aj, −A + Aj, A + Aj, −A + Aj, −A + Aj, A + Aj, A − Aj, A − Aj, −A + Aj, −A + Aj, A − Aj, −A + Aj, −A + Aj, −A − Aj, A + Aj, A − Aj, −A + Aj, −A − Aj, −A + Aj, A − Aj, −A − Aj, A − Aj, A + Aj, A − Aj, −A − Aj, −A + Aj, −A − Aj, −A − Aj, A + Aj, −A + Aj, −A − Aj, −A − Aj, −A + Aj, A + Aj, A + Aj, −A + Aj, A − Aj |
| 2 | −A + Aj, A − Aj, A − Aj, −A − Aj, −A − Aj, A + Aj, A + Aj, A − Aj, A + Aj, −A − Aj, −A − Aj, −A − Aj, A − Aj, A − Aj, A + Aj, −A + Aj, A + Aj, A + Aj, A + Aj, −A − Aj, A + Aj, −A + Aj, A − Aj, A − Aj, A − Aj, A − Aj, −A − Aj, A − Aj, −A + Aj, −A − Aj, A + Aj, −A − Aj, A + Aj, A + Aj, −A − Aj, −A + Aj, A + Aj, −A + Aj, A + Aj, −A + Aj, −A + Aj, A + Aj, A − Aj, A − Aj, −A + Aj, −A + Aj, A − Aj, −A + Aj, −A + Aj, −A − Aj, A + Aj, A − Aj, −A + Aj, −A − Aj, −A + Aj, A − Aj, −A − Aj, A − Aj, A + Aj, A − Aj, −A − Aj, −A + Aj, −A − Aj, −A − Aj, A + Aj, −A + Aj, −A − Aj, −A − Aj, −A + Aj, A + Aj, A + Aj, −A + Aj, A − Aj, −A − Aj |
| 3 | −A + Aj, A + Aj, A − Aj, −A + Aj, −A + Aj, A + Aj, A + Aj, −A − Aj, −A − Aj, −A + Aj, −A − Aj, A + Aj, A + Aj, A + Aj, −A + Aj, −A + Aj, −A − Aj, A − Aj, −A − Aj, −A − Aj, −A − Aj, A + Aj, −A − Aj, A − Aj, −A + Aj, −A + Aj, −A + Aj, −A + Aj, A + Aj, −A + Aj, A − Aj, A + Aj, −A − Aj, A + Aj, −A − Aj, −A − Aj, A + Aj, A − Aj, −A − Aj, A − Aj, −A − Aj, A − Aj, A − Aj, −A − Aj, −A + Aj, −A + Aj, A − Aj, A − Aj, −A + Aj, A − Aj, A − Aj, A + Aj, −A − Aj, −A + Aj, A − Aj, A + Aj, A − Aj, −A + Aj, A + Aj, −A + Aj, −A − Aj, −A + Aj, A + Aj, A − Aj, A + Aj, A + Aj, −A − Aj, A − Aj, A + Aj, A + Aj, A − Aj, −A − Aj, −A − Aj, A − Aj |
| 4 | A − Aj, −A − Aj, −A + Aj, A − Aj, A − Aj, −A − Aj, −A − Aj, A + Aj, A + Aj, A − Aj, A + Aj, −A − Aj, −A − Aj, −A − Aj, A − Aj, A − Aj, A + Aj, −A + Aj, A + Aj, A + Aj, A + Aj, −A − Aj, A + Aj, −A + Aj, A − Aj, A − Aj, A − Aj, A − Aj, −A − Aj, A − Aj, −A + Aj, −A − Aj, A + Aj, −A − Aj, A + Aj, A + Aj, −A − Aj, −A + Aj, A + Aj, −A + Aj, A + Aj, −A + Aj, −A + Aj, A + Aj, A − Aj, A − Aj, −A + Aj, −A + Aj, A − Aj, −A + Aj, −A + Aj, −A − Aj, A + Aj, A − Aj, −A + Aj, −A − Aj, −A + Aj, A − Aj, −A − Aj, A − Aj, A + Aj, A − Aj, −A − Aj, −A + Aj, −A − Aj, −A − Aj, A + Aj, −A + Aj, −A − Aj, −A − Aj, −A + Aj, A + Aj, A + Aj, −A + Aj |
| 5 | A − Aj, −A + Aj, −A + Aj, A + Aj, A + Aj, −A − Aj, −A − Aj, −A + Aj, −A − Aj, A + Aj, A + Aj, A + Aj, −A + Aj, −A + Aj, −A − Aj, A − Aj, −A − Aj, −A − Aj, −A − Aj, A + Aj, −A − Aj, A − Aj, −A + Aj, −A + Aj, −A + Aj, −A + Aj, A + Aj, −A + Aj, A − Aj, A + Aj, −A − Aj, A + Aj, −A − Aj, −A − Aj, A + Aj, A − Aj, −A − Aj, A − Aj, −A − Aj, A − Aj, A − Aj, −A − Aj, −A + Aj, −A + Aj, A − Aj, A − Aj, −A + Aj, A − Aj, A − Aj, A + Aj, −A − Aj, −A + Aj, A − Aj, A + Aj, A − Aj, −A + Aj, A + Aj, −A + Aj, −A − Aj, −A + Aj, A + Aj, A − Aj, A + Aj, A + Aj, −A − Aj, A − Aj, A + Aj, A + Aj, A − Aj, −A − Aj, −A − Aj, A − Aj, −A + Aj, A + Aj |
| 6 | A + Aj, A − Aj, −A + Aj, −A + Aj, A + Aj, A + Aj, −A − Aj, −A − Aj, −A + Aj, −A − Aj, A + Aj, A + Aj, A + Aj, −A + Aj, −A + Aj, −A − Aj, A − Aj, −A − Aj, −A − Aj, −A − Aj, A + Aj, −A − Aj, A − Aj, −A + Aj, −A + Aj, −A + Aj, −A + Aj, A + Aj, −A + Aj, A − Aj, A + Aj, −A − Aj, A + Aj, −A − Aj, −A − Aj, A + Aj, A − Aj, −A − Aj, A − Aj, −A − Aj, A − Aj, A − Aj, −A − Aj, −A + Aj, −A + Aj, A − Aj, A − Aj, −A + Aj, A − Aj, A − Aj, A + Aj, −A − Aj, −A + Aj, A − Aj, A + Aj, A − Aj, −A + Aj, A + Aj, −A + Aj, −A − Aj, −A + Aj, A + Aj, A − Aj, A + Aj, A + Aj, −A − Aj, A − Aj, A + Aj, A + Aj, A − Aj, −A − Aj, −A − Aj, A − Aj, −A + Aj |

(6) It is assumed that $N_{PS}$=76. If a remainder of $N_{TS}$ divided by 4 is 1, the pilot sequence is one item in the following Table 13-1. If a remainder of $N_{TS}$ divided by 4 is 3, the pilot sequence is one item in the following Table 13-1 or Table 13-2.

TABLE 13-1

| Index | Polarization | Pilot sequence |
|---|---|---|
| 1 | Polarization 1 | −A − Aj, A + Aj, A + Aj, A − Aj, −A + Aj, −A − Aj, −A + Aj, −A − Aj, −A − Aj, A − Aj, −A − Aj, A + Aj, −A − Aj, −A + Aj, −A + Aj, A − Aj, A − Aj, −A + Aj, A + Aj, A − Aj, −A − Aj, A − Aj, −A + Aj, −A + Aj, −A − Aj, −A − Aj, −A + Aj, −A − Aj, A + Aj, A − Aj, −A − Aj, −A + Aj, −A + Aj, −A + Aj, A − Aj, −A + Aj, −A + Aj, A + Aj, −A − Aj, −A + Aj, A − Aj, A − Aj, A − Aj, A + Aj, A − Aj, A − Aj, A + Aj, −A + Aj, A − Aj, A + Aj, A + Aj, A + Aj, A + Aj, −A − Aj, −A − Aj, −A − Aj, A − Aj, A + Aj, A + Aj, −A − Aj, A + Aj, −A − Aj, A − Aj, −A + Aj, A − Aj, −A − Aj, −A − Aj, A + Aj, −A + Aj, A + Aj, −A + Aj, A + Aj, A − Aj, A + Aj, A − Aj, −A + Aj |
| | Polarization 2 | −A + Aj, A − Aj, A − Aj, A + Aj, −A − Aj, −A + Aj, −A − Aj, −A + Aj, −A + Aj, A + Aj, −A + Aj, A − Aj, −A + Aj, −A − Aj, −A − Aj, A + Aj, A + Aj, −A − Aj, A − Aj, A + Aj, −A + Aj, A + Aj, −A − Aj, −A − Aj, −A + Aj, −A + Aj, −A − Aj, −A + Aj, A − Aj, A + Aj, −A + Aj, −A − Aj, −A − Aj, −A − Aj, A + Aj, −A − Aj, −A − Aj, A − Aj, −A + Aj, −A − Aj, A + Aj, A + Aj, A + Aj, A − Aj, A + Aj, A + Aj, A − Aj, −A − Aj, A + Aj, A − Aj, A − Aj, A − Aj, A − Aj, −A + Aj, −A + Aj, −A + Aj, A + Aj, A − Aj, A − Aj, −A + Aj, A − Aj, −A + Aj, A + Aj, −A − Aj, A + Aj, −A + Aj, −A + Aj, A − Aj, −A − Aj, A − Aj, −A − Aj, A − Aj, A + Aj, A − Aj, A + Aj, −A − Aj |
| 2 | Polarization 1 | −A − Aj, A + Aj, A + Aj, A − Aj, −A + Aj, −A − Aj, −A + Aj, −A − Aj, −A − Aj, A − Aj, −A − Aj, A + Aj, −A − Aj, −A + Aj, −A + Aj, A − Aj, A − Aj, −A + Aj, A + Aj, A − Aj, −A − Aj, A − Aj, −A + Aj, −A + Aj, −A − Aj, −A − Aj, −A + Aj, −A − Aj, A + Aj, A − Aj, −A − Aj, −A + Aj, −A + Aj, −A + Aj, A − Aj, −A + Aj, −A + Aj, A + Aj, −A − Aj, −A + Aj, A − Aj, A − Aj, A − Aj, A + Aj, A − Aj, A − Aj, A + Aj, −A + Aj, A − Aj, A + Aj, A + Aj, A + Aj, A + Aj, −A − Aj, −A − Aj, −A − Aj, A − Aj, A + Aj, A + Aj, −A − Aj, A + Aj, −A − Aj, A − Aj, −A + Aj, A − Aj, −A − Aj, −A − Aj, A + Aj, −A + Aj, A + Aj, −A + Aj, A + Aj, A − Aj, A + Aj, A − Aj, −A + Aj |
| | Polarization 2 | A − Aj, −A + Aj, −A + Aj, −A − Aj, A + Aj, A − Aj, A + Aj, A − Aj, A − Aj, −A − Aj, A − Aj, −A + Aj, A − Aj, A + Aj, A + Aj, −A − Aj, −A − Aj, A + Aj, −A + Aj, −A − Aj, A − Aj, −A − Aj, A + Aj, A + Aj, A − Aj, A − Aj, A + Aj, A − Aj, −A + Aj, −A − Aj, A − Aj, A + Aj, A + Aj, A + Aj, −A − Aj, A + Aj, A + Aj, −A + Aj, A − Aj, A + Aj, −A − Aj, −A − Aj, −A − Aj, −A + Aj, −A − Aj, −A − Aj, −A + Aj, A + Aj, −A − Aj, −A + Aj, −A + Aj, −A + Aj, −A + Aj, A − Aj, A − Aj, A − Aj, −A − Aj, −A + Aj, −A + Aj, A − Aj, −A + Aj, A − Aj, −A − Aj, A + Aj, −A − Aj, A − Aj, A − Aj, −A + Aj, A + Aj, −A + Aj, A + Aj, −A + Aj, −A − Aj, −A + Aj, −A − Aj, A + Aj |
| 3 | Polarization 1 | −A + Aj, A − Aj, A − Aj, A + Aj, −A − Aj, −A + Aj, −A − Aj, −A + Aj, −A + Aj, A + Aj, −A + Aj, A − Aj, −A + Aj, −A − Aj, −A − Aj, A + Aj, A + Aj, −A − Aj, A − Aj, A + Aj, −A + Aj, A + Aj, −A − Aj, −A − Aj, −A + Aj, −A + Aj, −A − Aj, −A + Aj, A − Aj, A + Aj, −A + Aj, −A − Aj, −A − Aj, −A − Aj, A + Aj, −A − Aj, −A − Aj, A − Aj, −A + Aj, −A − Aj, A + Aj, A + Aj, A + Aj, A − Aj, A + Aj, A + Aj, A − Aj, −A − Aj, A + Aj, A − Aj, A − Aj, A − Aj, A − Aj, −A + Aj, −A + Aj, −A + Aj, A + Aj, A − Aj, A − Aj, −A + Aj, A − Aj, −A + Aj, A + Aj, −A − Aj, A + Aj, −A + Aj, −A + Aj, A − Aj, −A − Aj, A − Aj, −A − Aj, A − Aj, A + Aj, A − Aj, A + Aj, −A − Aj |
| | Polarization 2 | A + Aj, −A − Aj, −A − Aj, −A + Aj, A − Aj, A + Aj, A − Aj, A + Aj, A + Aj, −A + Aj, A + Aj, −A − Aj, A + Aj, A − Aj, A − Aj, −A + Aj, −A + Aj, A − Aj, −A − Aj, −A + Aj, A + Aj, −A + Aj, A − Aj, A − Aj, A + Aj, A + Aj, A − Aj, A + Aj, −A − Aj, −A + Aj, A + Aj, A − Aj, A − Aj, A − Aj, −A + Aj, A − Aj, A − Aj, −A − Aj, A + Aj, A − Aj, −A + Aj, −A + Aj, −A + Aj, −A − Aj, −A + Aj, −A + Aj, −A − Aj, A − Aj, −A + Aj, −A − Aj, −A − Aj, −A − Aj, −A − Aj, A + Aj, A + Aj, A + Aj, −A + Aj, −A − Aj, −A − Aj, A + Aj, −A − Aj, A + Aj, −A + Aj, A − Aj, −A + Aj, A + Aj, A + Aj, −A − Aj, A − Aj, −A − Aj, A − Aj, −A − Aj, −A + Aj, −A − Aj, −A + Aj, A − Aj |
| 4 | Polarization 1 | A − Aj, −A + Aj, −A + Aj, −A − Aj, A + Aj, A − Aj, A + Aj, A − Aj, A − Aj, −A − Aj, A − Aj, −A + Aj, A − Aj, A + Aj, A + Aj, −A − Aj, −A − Aj, A + Aj, −A + Aj, −A − Aj, A − Aj, −A − Aj, A + Aj, A + Aj, A − Aj, A − Aj, A + Aj, A − Aj, −A + Aj, −A − Aj, A − Aj, A + Aj, A + Aj, A + Aj, −A − Aj, A + Aj, A + Aj, −A + Aj, A − Aj, A + Aj, −A − Aj, −A − Aj, −A − Aj, −A + Aj, −A − Aj, −A − Aj, −A + Aj, A + Aj, −A − Aj, −A + Aj, −A + Aj, −A + Aj, −A + Aj, A − Aj, A − Aj, A − Aj, −A − Aj, −A + Aj, −A + Aj, A − Aj, −A + Aj, A − Aj, −A − Aj, A + Aj, −A − Aj, A − Aj, A − Aj, −A + Aj, A + Aj, −A + Aj, A + Aj, −A + Aj, −A − Aj, −A + Aj, −A − Aj, A + Aj |
| | Polarization 2 | A + Aj, −A − Aj, −A − Aj, −A + Aj, A − Aj, A + Aj, A − Aj, A + Aj, A + Aj, −A + Aj, A + Aj, −A − Aj, A + Aj, A − Aj, A − Aj, −A + Aj, −A + Aj, A − Aj, −A − Aj, −A + Aj, A + Aj, −A + Aj, A − Aj, A − Aj, A + Aj, A + Aj, A − Aj, A + Aj, −A − Aj, −A + Aj, A + Aj, A − Aj, A − Aj, A − Aj, −A + Aj, A − Aj, A − Aj, −A − Aj, A + Aj, A − Aj, −A + Aj, −A + Aj, −A + Aj, −A − Aj, −A + Aj, −A + Aj, −A − Aj, A − Aj, −A + Aj, −A − Aj, −A − Aj, −A − Aj, −A − Aj, A + Aj, A + Aj, A + Aj, −A + Aj, −A − Aj, −A − Aj, A + Aj, −A − Aj, A + Aj, −A + Aj, A − Aj, −A + Aj, A + Aj, A + Aj, −A − Aj, A − Aj, −A − Aj, A − Aj, −A − Aj, −A + Aj, −A − Aj, −A + Aj, A − Aj |
| 5 | Polarization 1 | −A − Aj, A + Aj, −A + Aj, A + Aj, −A + Aj, −A − Aj, −A + Aj, −A − Aj, −A + Aj, A − Aj, A − Aj, A + Aj, −A − Aj, A + Aj, A − Aj, −A + Aj, A − Aj, −A + Aj, −A + Aj, A + Aj, A − Aj, A − Aj, A − Aj, −A + Aj, −A + Aj, −A + Aj, −A + Aj, A + Aj, −A − Aj, −A + Aj, A + Aj, A + Aj, −A + Aj, A + Aj, A + Aj, A + Aj, −A − Aj, A − Aj, −A + Aj, −A − Aj, −A − Aj, A + Aj, −A − Aj, −A − Aj, −A − Aj, A − Aj, A + Aj, −A + Aj, A − Aj, −A − Aj, A − Aj, A − Aj, −A − Aj, −A − Aj, A + Aj, A − Aj, A + Aj, −A + Aj, −A − Aj, A + Aj, A + Aj, −A − Aj, −A − Aj, A − Aj, −A + Aj, A − Aj, A + Aj, A − Aj, A − Aj, −A − Aj, A − Aj, −A − Aj, A + Aj, −A + Aj, −A + Aj, A − Aj |
| | Polarization 2 | −A + Aj, A − Aj, −A − Aj, A − Aj, −A − Aj, −A + Aj, −A − Aj, −A + Aj, −A − Aj, A + Aj, A + Aj, A − Aj, −A + Aj, A − Aj, A + Aj, −A − Aj, A + Aj, −A − Aj, −A − Aj, A − Aj, A + Aj, A + Aj, A + Aj, −A − Aj, −A − Aj, −A − Aj, −A − Aj, A − Aj, −A + Aj, −A − Aj, A − Aj, A − Aj, −A − Aj, A − Aj, A − Aj, A − Aj, −A + Aj, A + Aj, −A − Aj, −A + Aj, −A + Aj, A − Aj, −A + Aj, −A + Aj, −A + Aj, A + Aj, A − Aj, −A − Aj, A + Aj, −A + Aj, A + Aj, A + Aj, −A + Aj, −A + Aj, A − Aj, A + Aj, A − Aj, −A − Aj, −A + Aj, A − Aj, A − Aj, −A + Aj, −A + Aj, A + Aj, −A − Aj, A + Aj, A − Aj, A + Aj, A + Aj, −A + Aj, A + Aj, −A + Aj, A − Aj, −A − Aj, −A − Aj, A + Aj |
| 6 | Polarization 1 | −A − Aj, A + Aj, −A + Aj, A + Aj, −A + Aj, −A − Aj, −A + Aj, −A − Aj, −A + Aj, A − Aj, A − Aj, A + Aj, −A − Aj, A + Aj, A − Aj, −A + Aj, A − Aj, −A + Aj, −A + Aj, A + Aj, A − Aj, A − Aj, A − Aj, −A + Aj, −A + Aj, −A + Aj, −A + Aj, A + Aj, −A − Aj, −A + Aj, A + Aj, A + Aj, −A + Aj, A + Aj, A + Aj, A + Aj, −A − Aj, A − Aj, −A + Aj, −A − Aj, −A − Aj, A + Aj, −A − Aj, −A − Aj, −A − Aj, A − Aj, A + Aj, −A + Aj, A − Aj, −A − Aj, A − Aj, A − Aj, −A − Aj, −A − Aj, A + Aj, A − |

TABLE 13-1-continued

| Index | Polarization | Pilot sequence |
|---|---|---|
| | | Aj, A + Aj, −A + Aj, −A − Aj, A + Aj, A + Aj, −A − Aj, −A − Aj, A − Aj, −A + Aj, A − Aj, A + Aj, A − Aj, A − Aj, −A − Aj, A − Aj, −A − Aj, A + Aj, −A + Aj, −A + Aj, A − Aj |
| | Polarization 2 | A − Aj, −A + Aj, A + Aj, −A + Aj, A + Aj, A − Aj, A + Aj, A − Aj, A + Aj, −A − Aj, −A − Aj, −A + Aj, A − Aj, −A + Aj, −A − Aj, A + Aj, −A − Aj, A + Aj, A + Aj, −A + Aj, −A − Aj, −A − Aj, −A − Aj, A + Aj, A + Aj, A + Aj, A + Aj, −A + Aj, A − Aj, A + Aj, −A + Aj, −A + Aj, A + Aj, −A + Aj, −A + Aj, −A + Aj, A − Aj, −A − Aj, A + Aj, A − Aj, A − Aj, −A + Aj, A − Aj, A − Aj, A − Aj, −A − Aj, −A + Aj, A + Aj, −A − Aj, A − Aj, −A − Aj, −A − Aj, A − Aj, A − Aj, −A + Aj, −A − Aj, −A + Aj, A + Aj, A − Aj, −A + Aj, −A + Aj, A − Aj, A − Aj, −A − Aj, A + Aj, −A − Aj, −A + Aj, −A − Aj, −A − Aj, A − Aj, −A − Aj, A − Aj, −A + Aj, A + Aj, A + Aj, −A − Aj |
| 7 | Polarization 1 | −A + Aj, A − Aj, −A − Aj, A − Aj, −A − Aj, −A + Aj, −A − Aj, −A + Aj, −A − Aj, A + Aj, A + Aj, A − Aj, −A + Aj, A − Aj, A + Aj, −A − Aj, A + Aj, −A − Aj, −A − Aj, A − Aj, A + Aj, A + Aj, A + Aj, −A − Aj, −A − Aj, −A − Aj, −A − Aj, A − Aj, −A + Aj, −A − Aj, A − Aj, A − Aj, −A − Aj, A − Aj, A − Aj, A − Aj, −A + Aj, A + Aj, −A − Aj, −A + Aj, −A + Aj, A − Aj, −A + Aj, −A + Aj, −A + Aj, A + Aj, A − Aj, −A − Aj, A + Aj, −A + Aj, A + Aj, A + Aj, −A + Aj, −A + Aj, A − Aj, A + Aj, A − Aj, −A − Aj, −A + Aj, A − Aj, A − Aj, −A + Aj, −A + Aj, A + Aj, −A − Aj, A + Aj, A − Aj, A + Aj, A + Aj, −A + Aj, A + Aj, −A + Aj, A − Aj, −A − Aj, −A − Aj, A + Aj |
| | Polarization 2 | A + Aj, −A − Aj, A − Aj, −A − Aj, A − Aj, A + Aj, A − Aj, A + Aj, A − Aj, −A + Aj, −A + Aj, −A − Aj, A + Aj, −A − Aj, −A + Aj, A − Aj, −A + Aj, A − Aj, A − Aj, −A − Aj, −A + Aj, −A + Aj, −A + Aj, A − Aj, A − Aj, A − Aj, A − Aj, −A − Aj, A + Aj, A − Aj, −A − Aj, −A − Aj, A − Aj, −A − Aj, −A − Aj, −A − Aj, A + Aj, −A + Aj, A − Aj, A + Aj, A + Aj, −A − Aj, A + Aj, A + Aj, A + Aj, −A + Aj, −A − Aj, A − Aj, −A + Aj, A + Aj, −A + Aj, −A + Aj, A + Aj, A + Aj, −A − Aj, −A + Aj, −A − Aj, A − Aj, A + Aj, −A − Aj, −A − Aj, A + Aj, A + Aj, −A + Aj, A − Aj, −A + Aj, −A − Aj, −A + Aj, −A + Aj, A + Aj, −A + Aj, A + Aj, −A − Aj, A − Aj, A − Aj, −A + Aj |
| 8 | Polarization 1 | A − Aj, −A + Aj, A + Aj, −A + Aj, A + Aj, A − Aj, A + Aj, A − Aj, A + Aj, −A − Aj, −A − Aj, −A + Aj, A − Aj, −A + Aj, −A − Aj, A + Aj, −A − Aj, A + Aj, A + Aj, −A + Aj, −A − Aj, −A − Aj, −A − Aj, A + Aj, A + Aj, A + Aj, A + Aj, −A + Aj, A − Aj, A + Aj, −A + Aj, −A + Aj, A + Aj, −A + Aj, −A + Aj, −A + Aj, A − Aj, −A − Aj, A + Aj, A − Aj, A − Aj, −A + Aj, A − Aj, A − Aj, A − Aj, −A − Aj, −A + Aj, A + Aj, −A − Aj, A − Aj, −A − Aj, −A − Aj, A − Aj, A − Aj, −A + Aj, −A − Aj, −A + Aj, A + Aj, A − Aj, −A + Aj, −A + Aj, A − Aj, A − Aj, −A − Aj, A + Aj, −A − Aj, −A + Aj, −A − Aj, −A − Aj, A − Aj, −A − Aj, A − Aj, −A + Aj, A + Aj, A + Aj, −A − Aj |
| | Polarization 2 | A + Aj, −A − Aj, A − Aj, −A − Aj, A − Aj, A + Aj, A − Aj, A + Aj, A − Aj, −A + Aj, −A + Aj, −A − Aj, A + Aj, −A − Aj, −A + Aj, A − Aj, −A + Aj, A − Aj, A − Aj, −A − Aj, −A + Aj, −A + Aj, −A + Aj, A − Aj, A − Aj, A − Aj, A − Aj, −A − Aj, A + Aj, A − Aj, −A − Aj, −A − Aj, A − Aj, −A − Aj, −A − Aj, −A − Aj, A + Aj, −A + Aj, A − Aj, A + Aj, A + Aj, −A − Aj, A + Aj, A + Aj, A + Aj, −A + Aj, −A − Aj, A − Aj, −A + Aj, A + Aj, −A + Aj, −A + Aj, A + Aj, A + Aj, −A − Aj, −A + Aj, −A − Aj, A − Aj, A + Aj, −A − Aj, −A − Aj, A + Aj, A + Aj, −A + Aj, A − Aj, −A + Aj, −A − Aj, −A + Aj, −A + Aj, A + Aj, −A + Aj, A + Aj, −A − Aj, A − Aj, A − Aj, −A + Aj |
| 9 | Polarization 1 | −A − Aj, −A + Aj, A − Aj, −A − Aj, −A − Aj, A − Aj, −A − Aj, A + Aj, −A − Aj, −A + Aj, −A − Aj, A − Aj, A − Aj, −A − Aj, A + Aj, −A + Aj, −A − Aj, A − Aj, −A + Aj, −A − Aj, A + Aj, −A − Aj, −A − Aj, A + Aj, A + Aj, −A − Aj, −A + Aj, −A + Aj, −A + Aj, A + Aj, A − Aj, A − Aj, A + Aj, −A − Aj, −A + Aj, −A + Aj, A + Aj, −A − Aj, A + Aj, −A + Aj, A − Aj, A + Aj, A + Aj, A − Aj, −A + Aj, A − Aj, −A + Aj, A − Aj, A − Aj, −A − Aj, −A + Aj, −A − Aj, A − Aj, −A − Aj, A + Aj, A − Aj, A − Aj, −A + Aj, −A + Aj, A + Aj, A + Aj, −A + Aj, A − Aj, A − Aj, −A − Aj, A + Aj, A + Aj, A + Aj, A + Aj, A − Aj, −A + Aj, −A − Aj, A − Aj, A + Aj, −A + Aj, −A + Aj |
| | Polarization 2 | A − Aj, A + Aj, A + Aj, A + Aj, −A − Aj, −A − Aj, A − Aj, −A − Aj, −A + Aj, A + Aj, −A − Aj, A + Aj, A + Aj, −A + Aj, A − Aj, −A − Aj, A + Aj, A − Aj, −A − Aj, A − Aj, −A − Aj, −A − Aj, A − Aj, A − Aj, −A − Aj, −A + Aj, A − Aj, −A + Aj, −A + Aj, −A − Aj, A + Aj, −A + Aj, A + Aj, A − Aj, −A + Aj, −A + Aj, A + Aj, −A + Aj, A − Aj, A + Aj, −A + Aj, −A + Aj, −A − Aj, −A + Aj, −A − Aj, −A + Aj, −A − Aj, A + Aj, A + Aj, A − Aj, −A − Aj, A + Aj, A + Aj, −A + Aj, −A − Aj, A + Aj, A − Aj, −A + Aj, −A + Aj, −A + Aj, A − Aj, A + Aj, −A − Aj, −A − Aj, A − Aj, A − Aj, A − Aj, A − Aj, A + Aj, A − Aj, −A − Aj, A + Aj, −A + Aj, A − Aj, −A + Aj, −A − Aj |
| 10 | Polarization 1 | −A − Aj, −A + Aj, A − Aj, −A − Aj, −A − Aj, A − Aj, −A − Aj, A + Aj, −A − Aj, −A + Aj, −A − Aj, A − Aj, A − Aj, −A − Aj, A + Aj, −A + Aj, −A − Aj, A − Aj, −A + Aj, −A − Aj, A + Aj, −A − Aj, −A − Aj, A + Aj, A + Aj, −A − Aj, −A + Aj, −A + Aj, −A + Aj, A + Aj, A − Aj, A − Aj, A + Aj, −A − Aj, −A + Aj, −A + Aj, A + Aj, −A − Aj, A + Aj, −A + Aj, A − Aj, A + Aj, A + Aj, A − Aj, −A + Aj, A − Aj, −A + Aj, A − Aj, A − Aj, −A − Aj, −A + Aj, −A − Aj, A − Aj, −A − Aj, A + Aj, A − Aj, A − Aj, −A + Aj, −A + Aj, A + Aj, A + Aj, −A + Aj, A − Aj, A − Aj, −A − Aj, A + Aj, A + Aj, A + Aj, A + Aj, A − Aj, −A + Aj, −A − Aj, A − Aj, A + Aj, −A + Aj, −A + Aj |
| | Polarization 2 | A + Aj, −A − Aj, −A − Aj, A − Aj, −A − Aj, −A + Aj, A + Aj, −A − Aj, A + Aj, A + Aj, −A + Aj, A − Aj, −A − Aj, A + Aj, A − Aj, −A − Aj, A − Aj, −A − Aj, −A − Aj, A − Aj, A − Aj, −A − Aj, −A + Aj, A − Aj, −A + Aj, −A + Aj, −A − Aj, A + Aj, −A + Aj, A + Aj, A − Aj, −A + Aj, −A + Aj, A + Aj, −A + Aj, A − Aj, A + Aj, −A + Aj, −A + Aj, −A − Aj, −A + Aj, −A − Aj, −A + Aj, −A − Aj, A + Aj, A + Aj, A − Aj, −A − Aj, A + Aj, A + Aj, −A + Aj, −A − Aj, A + Aj, A − Aj, −A + Aj, −A + Aj, −A + Aj, A − Aj, A + Aj, −A − Aj, −A − Aj, A − Aj, A − Aj, A − Aj, A − Aj, A + Aj, A − Aj, −A − Aj, A + Aj, −A + Aj, A − Aj, −A + Aj, −A − Aj, A + Aj, A − Aj, A + Aj |
| 11 | Polarization 1 | −A − Aj, −A + Aj, A − Aj, −A − Aj, −A − Aj, A − Aj, −A − Aj, A + Aj, −A − Aj, −A + Aj, −A − Aj, A − Aj, A − Aj, −A − Aj, A + Aj, −A + Aj, −A − Aj, A − Aj, −A + Aj, −A − Aj, A + Aj, −A − Aj, −A − Aj, A + Aj, A + Aj, −A − Aj, −A + Aj, −A + Aj, −A + Aj, A + Aj, A − Aj, A − Aj, A + Aj, −A − Aj, −A + Aj, −A + Aj, A + Aj, −A − Aj, A + Aj, −A + Aj, A − Aj, A + Aj, A + Aj, A − Aj, −A + Aj, A − Aj, −A + Aj, A − Aj, A − Aj, −A − Aj, −A + Aj, −A − Aj, A − Aj, −A − Aj, A + Aj, A − Aj, A − Aj, −A + Aj, −A + Aj, A + Aj, A + Aj, −A + Aj, A − Aj, A − Aj, −A − Aj, A + Aj, A + Aj, A + Aj, A + Aj, A − Aj, −A + Aj, −A − Aj, A − Aj, A + Aj, −A + Aj, −A + Aj |
| | Polarization 2 | A + Aj, A + Aj, −A − Aj, −A − Aj, A − Aj, −A − Aj, −A + Aj, A + Aj, −A − Aj, A + Aj, A + Aj, −A + Aj, A − Aj, −A − Aj, A + Aj, A − Aj, −A − Aj, A − Aj, −A − Aj, −A − Aj, A − Aj, A − Aj, −A − Aj, −A + Aj, A − Aj, −A + Aj, −A + Aj, −A − Aj, A + Aj, −A + Aj, A + Aj, A − Aj, −A + Aj, −A + Aj, A + Aj, −A + Aj, A − Aj, A + Aj, −A + Aj, −A + Aj, −A − Aj, −A + Aj, −A − Aj, |

TABLE 13-1-continued

| Index | Polarization | Pilot sequence |
|---|---|---|
| | | −A + Aj, −A − Aj, A + Aj, A + Aj, A − Aj, −A − Aj, A + Aj, A + Aj, −A + Aj, −A − Aj, A + Aj, A − Aj, −A + Aj, −A + Aj, −A + Aj, A − Aj, A + Aj, −A − Aj, −A − Aj, A − Aj, A − Aj, A − Aj, A − Aj, A + Aj, A − Aj, −A − Aj, A + Aj, −A + Aj, A − Aj, −A + Aj, −A − Aj, A + Aj, A − Aj |
| 12 | Polarization 1 | −A − Aj, A − Aj, −A + Aj, A − Aj, A + Aj, −A − Aj, −A + Aj, A + Aj, −A + Aj, −A + Aj, −A + Aj, −A + Aj, −A − Aj, −A − Aj, A + Aj, −A + Aj, A − Aj, A − Aj, A − Aj, −A + Aj, A + Aj, −A − Aj, A − Aj, A + Aj, A + Aj, −A − Aj, −A + Aj, A + Aj, A + Aj, −A − Aj, A − Aj, −A − Aj, A − Aj, −A − Aj, A − Aj, A − Aj, A + Aj, −A + Aj, A − Aj, A + Aj, A − Aj, A − Aj, −A + Aj, A + Aj, A − Aj, A + Aj, −A − Aj, A − Aj, A − Aj, −A + Aj, A − Aj, −A − Aj, −A + Aj, −A + Aj, −A − Aj, −A − Aj, −A + Aj, −A − Aj, −A + Aj, A + Aj, −A − Aj, −A + Aj, A − Aj, A + Aj, A + Aj, −A − Aj, A + Aj, A − Aj, −A − Aj, −A + Aj, −A − Aj, −A − Aj, A + Aj, A + Aj, A + Aj, −A + Aj |
| | Polarization 2 | A − Aj, A − Aj, A + Aj, −A + Aj, −A − Aj, A − Aj, −A + Aj, A + Aj, A + Aj, A + Aj, A + Aj, −A − Aj, −A + Aj, −A + Aj, A − Aj, A + Aj, A + Aj, A − Aj, A − Aj, −A + Aj, −A + Aj, A + Aj, −A − Aj, −A + Aj, −A − Aj, A − Aj, −A − Aj, −A + Aj, −A + Aj, A − Aj, −A + Aj, A − Aj, −A + Aj, A + Aj, A + Aj, −A + Aj, A − Aj, A + Aj, −A − Aj, A + Aj, A − Aj, A − Aj, −A − Aj, A + Aj, −A + Aj, −A + Aj, A + Aj, A − Aj, A − Aj, A − Aj, −A − Aj, A + Aj, A + Aj, −A − Aj, −A − Aj, A + Aj, −A − Aj, A − Aj, −A + Aj, −A − Aj, A − Aj, A + Aj, −A − Aj, −A + Aj, −A + Aj, −A − Aj, A − Aj, −A − Aj, A + Aj, −A − Aj, −A + Aj, −A − Aj, −A − Aj, −A + Aj, A − Aj, −A − Aj |
| 13 | Polarization 1 | −A + Aj, A + Aj, −A − Aj, A − Aj, −A + Aj, A − Aj, A + Aj, −A − Aj, −A + Aj, A + Aj, −A + Aj, −A + Aj, −A + Aj, −A + Aj, −A − Aj, −A − Aj, A + Aj, −A + Aj, A − Aj, A − Aj, A − Aj, −A + Aj, A + Aj, −A − Aj, A − Aj, A + Aj, A + Aj, −A − Aj, −A + Aj, A + Aj, A + Aj, −A − Aj, A − Aj, −A − Aj, A − Aj, −A − Aj, A − Aj, A − Aj, A + Aj, −A + Aj, A − Aj, A + Aj, A − Aj, A − Aj, −A + Aj, A + Aj, A − Aj, A + Aj, −A − Aj, A − Aj, A − Aj, −A + Aj, A − Aj, −A − Aj, −A + Aj, −A + Aj, −A − Aj, −A − Aj, −A + Aj, −A − Aj, −A + Aj, A + Aj, −A − Aj, −A + Aj, A − Aj, A + Aj, A + Aj, −A − Aj, A + Aj, A − Aj, −A − Aj, −A + Aj, −A − Aj, −A − Aj, A + Aj, A + Aj |
| | Polarization 2 | A − Aj, A − Aj, A + Aj, −A + Aj, −A − Aj, A − Aj, −A + Aj, A + Aj, A + Aj, A + Aj, A + Aj, −A − Aj, −A + Aj, −A + Aj, A − Aj, A + Aj, A + Aj, A − Aj, A − Aj, −A + Aj, −A + Aj, A + Aj, −A − Aj, −A + Aj, −A − Aj, A − Aj, −A − Aj, −A + Aj, −A + Aj, A − Aj, −A + Aj, A − Aj, −A + Aj, A + Aj, A + Aj, −A + Aj, A − Aj, A + Aj, −A − Aj, A + Aj, A − Aj, A − Aj, −A − Aj, A + Aj, −A + Aj, −A + Aj, A + Aj, A − Aj, A − Aj, A − Aj, −A − Aj, A + Aj, A + Aj, −A − Aj, −A − Aj, A + Aj, −A − Aj, A − Aj, −A + Aj, −A − Aj, A − Aj, A + Aj, −A − Aj, −A + Aj, −A + Aj, −A − Aj, A − Aj, −A − Aj, A + Aj, −A − Aj, −A + Aj, −A − Aj, −A − Aj, −A + Aj, A − Aj, −A − Aj |
| 14 | Polarization 1 | A − Aj, A − Aj, A + Aj, −A + Aj, −A − Aj, A − Aj, −A + Aj, A + Aj, A + Aj, A + Aj, A + Aj, −A − Aj, −A + Aj, −A + Aj, A − Aj, A + Aj, A + Aj, A − Aj, A − Aj, −A + Aj, −A + Aj, A + Aj, −A − Aj, −A + Aj, −A − Aj, A − Aj, −A − Aj, −A + Aj, −A + Aj, A − Aj, −A + Aj, A − Aj, −A + Aj, A + Aj, A + Aj, −A + Aj, A − Aj, A + Aj, −A − Aj, A + Aj, A − Aj, A − Aj, −A − Aj, A + Aj, −A + Aj, −A + Aj, A + Aj, A − Aj, A − Aj, A − Aj, −A − Aj, A + Aj, A + Aj, −A − Aj, −A − Aj, A + Aj, −A − Aj, A − Aj, −A + Aj, −A − Aj, A − Aj, A + Aj, −A − Aj, −A + Aj, −A + Aj, −A − Aj, A − Aj, −A − Aj, A + Aj, −A − Aj, −A + Aj, −A − Aj, −A − Aj, −A + Aj, A − Aj, −A − Aj |
| | Polarization 2 | A + Aj, −A + Aj, A + Aj, −A − Aj, A − Aj, −A + Aj, A − Aj, A + Aj, −A − Aj, −A + Aj, A + Aj, −A + Aj, −A + Aj, −A + Aj, −A + Aj, −A − Aj, −A − Aj, A + Aj, −A + Aj, A − Aj, A − Aj, A − Aj, −A + Aj, A + Aj, −A − Aj, A − Aj, A + Aj, A + Aj, −A − Aj, −A + Aj, A + Aj, A + Aj, −A − Aj, A − Aj, −A − Aj, A − Aj, −A − Aj, A − Aj, A − Aj, A + Aj, −A + Aj, A − Aj, A + Aj, A − Aj, A − Aj, −A + Aj, A + Aj, A − Aj, A + Aj, −A − Aj, A − Aj, A − Aj, −A + Aj, A − Aj, −A − Aj, −A + Aj, −A + Aj, −A − Aj, −A − Aj, −A + Aj, −A − Aj, −A + Aj, A + Aj, −A − Aj, −A + Aj, A − Aj, A + Aj, A + Aj, −A − Aj, A + Aj, A − Aj, −A − Aj, −A + Aj, −A − Aj, −A − Aj, A + Aj |

TABLE 13-2

| Index | Polarization | Pilot sequence |
|---|---|---|
| 1 | Polarization 1 | −A − Aj, A + Aj, −A − Aj, A + Aj, A − Aj, A + Aj, A + Aj, −A + Aj, A − Aj, A + Aj, A − Aj, A + Aj, −A + Aj, −A − Aj, A + Aj, A + Aj, −A + Aj, −A − Aj, A − Aj, A + Aj, A + Aj, A − Aj, A + Aj, −A − Aj, −A − Aj, −A + Aj, −A + Aj, −A − Aj, A + Aj, −A + Aj, −A − Aj, −A + Aj, A − Aj, −A − Aj, −A − Aj, −A + Aj, −A − Aj, −A − Aj, −A + Aj, A + Aj, −A + Aj, A − Aj, −A + Aj, A + Aj, A − Aj, −A + Aj, A + Aj, −A − Aj, −A − Aj, A − Aj, −A − Aj, A + Aj, −A + Aj, A + Aj, −A − Aj, −A + Aj, A − Aj, A − Aj, −A + Aj, −A − Aj, −A − Aj, A + Aj, A − Aj, −A − Aj, A − Aj, A − Aj, −A − Aj, −A + Aj, A − Aj, A + Aj, −A + Aj, A − Aj, A − Aj, A − Aj, −A + Aj, A + Aj |
| | Polarization 2 | −A + Aj, A − Aj, −A + Aj, A − Aj, A + Aj, A − Aj, A − Aj, −A − Aj, A + Aj, A − Aj, A + Aj, A − Aj, −A − Aj, −A + Aj, A − Aj, A − Aj, −A − Aj, −A + Aj, A + Aj, A − Aj, A − Aj, A + Aj, A − Aj, −A + Aj, −A + Aj, −A − Aj, −A − Aj, −A + Aj, A − Aj, −A − Aj, −A + Aj, −A − Aj, A + Aj, −A + Aj, −A + Aj, −A − Aj, −A + Aj, −A + Aj, −A − Aj, A − Aj, −A − Aj, A + Aj, −A − Aj, A − Aj, A + Aj, −A − Aj, A − Aj, −A + Aj, −A + Aj, A + Aj, −A + Aj, A − Aj, −A − Aj, A − Aj, −A + Aj, −A − Aj, A + Aj, A + Aj, −A − Aj, −A + Aj, −A + Aj, A − Aj, A + Aj, −A + Aj, A + Aj, A + Aj, −A + Aj, −A − Aj, A + Aj, A − Aj, −A − Aj, A + Aj, A + Aj, A + Aj, −A − Aj, A − Aj |
| 2 | Polarization 1 | −A − Aj, A + Aj, −A − Aj, A + Aj, A − Aj, A + Aj, A + Aj, −A + Aj, A − Aj, A + Aj, A − Aj, A + Aj, −A + Aj, −A − Aj, A + Aj, A + Aj, −A + Aj, −A − Aj, A − Aj, A + Aj, A + Aj, A − Aj, A + Aj, −A − Aj, −A − Aj, −A + Aj, −A + Aj, −A − Aj, A + Aj, −A + Aj, −A − Aj, −A + Aj, A − Aj, −A − Aj, −A − Aj, −A + Aj, −A − Aj, −A − Aj, −A + Aj, A + Aj, −A + Aj, A − Aj, −A + Aj, A + Aj, A − Aj, −A + Aj, A + Aj, −A − Aj, −A − Aj, A − Aj, −A − Aj, A + Aj, −A + Aj, A + Aj, −A − Aj, −A + Aj, A − Aj, A − Aj, −A + Aj, −A − Aj, −A − Aj, A + Aj, A − Aj, −A − Aj, A − Aj, A − Aj, −A − Aj, −A + Aj, A − Aj, A + Aj, −A + Aj, A − Aj, A − Aj, A − Aj, −A + Aj, A + Aj |
| | Polarization 2 | A − Aj, −A + Aj, A − Aj, −A + Aj, −A − Aj, −A + Aj, −A + Aj, A + Aj, −A − Aj, −A + Aj, −A − Aj, −A + Aj, A + Aj, A − Aj, −A + Aj, −A + Aj, A + Aj, A − Aj, −A − Aj, −A + Aj, −A + Aj, −A − Aj, −A + Aj, A − Aj, A − Aj, A + Aj, A + Aj, A − Aj, −A + Aj, A + Aj, A − Aj, A + Aj, −A − Aj, A − Aj, A − Aj, A + Aj, A − Aj, A − Aj, A + Aj, −A + Aj, A + Aj, −A − Aj, A + Aj, −A + Aj, |

TABLE 13-2-continued

| Index | Polarization | Pilot sequence |
|---|---|---|
| | | −A − Aj, A + Aj, −A + Aj, A − Aj, A − Aj, −A − Aj, A − Aj, −A + Aj, A + Aj, −A + Aj, A − Aj, A + Aj, −A − Aj, −A − Aj, A + Aj, A − Aj, A − Aj, −A + Aj, −A − Aj, A − Aj, −A − Aj, −A − Aj, A − Aj, A + Aj, −A − Aj, −A + Aj, A + Aj, −A − Aj, −A − Aj, −A − Aj, A + Aj, −A + Aj |
| 3 | Polarization 1 | A + Aj, −A − Aj, A + Aj, −A − Aj, −A + Aj, −A − Aj, −A − Aj, A − Aj, −A + Aj, −A − Aj, −A + Aj, −A − Aj, A − Aj, A + Aj, −A − Aj, −A − Aj, A − Aj, A + Aj, −A + Aj, −A − Aj, −A − Aj, −A + Aj, −A − Aj, A + Aj, A + Aj, A − Aj, A − Aj, A + Aj, −A − Aj, A − Aj, A + Aj, A − Aj, −A + Aj, A + Aj, A + Aj, A − Aj, A + Aj, A + Aj, A − Aj, −A − Aj, A − Aj, −A + Aj, A − Aj, −A − Aj, −A + Aj, A − Aj, −A − Aj, A + Aj, A + Aj, −A + Aj, A + Aj, −A − Aj, A − Aj, −A − Aj, A + Aj, A − Aj, −A + Aj, −A + Aj, A − Aj, A + Aj, A + Aj, −A − Aj, −A + Aj, A + Aj, −A + Aj, −A + Aj, A + Aj, A − Aj, −A + Aj, −A − Aj, A − Aj, −A + Aj, −A + Aj, −A + Aj, A − Aj, −A − Aj |
| | Polarization 2 | −A + Aj, A − Aj, −A + Aj, A − Aj, A + Aj, A − Aj, A − Aj, −A − Aj, A + Aj, A − Aj, A + Aj, A − Aj, −A − Aj, −A + Aj, A − Aj, A − Aj, −A − Aj, −A + Aj, A + Aj, A − Aj, A − Aj, A + Aj, A − Aj, −A + Aj, −A + Aj, −A − Aj, −A − Aj, −A + Aj, A − Aj, −A − Aj, −A + Aj, −A − Aj, A + Aj, −A + Aj, −A + Aj, −A − Aj, −A + Aj, −A + Aj, −A − Aj, A − Aj, −A − Aj, A + Aj, −A − Aj, A − Aj, A + Aj, −A − Aj, A − Aj, −A + Aj, −A + Aj, A + Aj, −A + Aj, A − Aj, −A − Aj, A − Aj, −A + Aj, −A − Aj, A + Aj, A + Aj, −A − Aj, −A + Aj, −A + Aj, A − Aj, A + Aj, −A + Aj, A + Aj, A + Aj, −A + Aj, −A − Aj, A + Aj, A − Aj, −A − Aj, A + Aj, A + Aj, A + Aj, −A − Aj, A − Aj |
| 4 | Polarization 1 | A + Aj, −A − Aj, A + Aj, −A − Aj, −A + Aj, −A − Aj, −A − Aj, A − Aj, −A + Aj, −A − Aj, −A + Aj, −A − Aj, A − Aj, A + Aj, −A − Aj, −A − Aj, A − Aj, A + Aj, −A + Aj, −A − Aj, −A − Aj, −A + Aj, −A − Aj, A + Aj, A + Aj, A − Aj, A − Aj, A + Aj, −A − Aj, A − Aj, A + Aj, A − Aj, −A + Aj, A + Aj, A + Aj, A − Aj, A + Aj, A + Aj, A − Aj, −A − Aj, A − Aj, −A + Aj, A − Aj, −A − Aj, −A + Aj, A − Aj, −A − Aj, A + Aj, A + Aj, −A + Aj, A + Aj, −A − Aj, A − Aj, −A − Aj, A + Aj, A − Aj, −A + Aj, −A + Aj, A − Aj, A + Aj, A + Aj, −A − Aj, −A + Aj, A + Aj, −A + Aj, −A + Aj, A + Aj, A − Aj, −A + Aj, −A − Aj, A − Aj, −A + Aj, −A + Aj, −A + Aj, A − Aj, −A − Aj |
| | Polarization 2 | A − Aj, −A + Aj, A − Aj, −A + Aj, −A − Aj, −A + Aj, −A + Aj, A + Aj, −A − Aj, −A + Aj, −A − Aj, −A + Aj, A + Aj, A − Aj, −A + Aj, −A + Aj, A + Aj, A − Aj, −A − Aj, −A + Aj, −A + Aj, −A − Aj, −A + Aj, A − Aj, A − Aj, A + Aj, A + Aj, A − Aj, −A + Aj, A + Aj, A − Aj, A + Aj, −A − Aj, A − Aj, A − Aj, A + Aj, A − Aj, A − Aj, A + Aj, −A + Aj, A + Aj, −A − Aj, A + Aj, −A + Aj, −A − Aj, A + Aj, −A + Aj, A − Aj, A − Aj, −A − Aj, A − Aj, −A + Aj, A + Aj, −A + Aj, A − Aj, A + Aj, −A − Aj, −A − Aj, A + Aj, A − Aj, A − Aj, −A + Aj, −A − Aj, A − Aj, −A − Aj, −A − Aj, A − Aj, A + Aj, −A − Aj, −A + Aj, A + Aj, −A − Aj, −A − Aj, −A − Aj, A + Aj, −A + Aj |
| 5 | Polarization 1 | −A − Aj, −A + Aj, A − Aj, A − Aj, A − Aj, −A + Aj, −A − Aj, A − Aj, −A + Aj, A + Aj, A − Aj, A − Aj, A + Aj, A − Aj, −A − Aj, A + Aj, A + Aj, −A + Aj, A − Aj, A − Aj, −A + Aj, A + Aj, −A − Aj, −A + Aj, −A − Aj, A + Aj, A − Aj, A + Aj, A + Aj, −A − Aj, −A + Aj, A − Aj, −A − Aj, −A + Aj, A − Aj, −A + Aj, −A − Aj, −A + Aj, A + Aj, A + Aj, −A + Aj, A + Aj, A + Aj, A − Aj, −A + Aj, A + Aj, −A + Aj, −A − Aj, A + Aj, −A + Aj, −A + Aj, A + Aj, A + Aj, −A − Aj, A − Aj, −A − Aj, −A − Aj, A − Aj, A + Aj, −A + Aj, −A − Aj, −A − Aj, A + Aj, −A + Aj, −A − Aj, A − Aj, −A − Aj, A − Aj, −A + Aj, −A − Aj, −A − Aj, A − Aj, −A − Aj, A + Aj, −A − Aj, A + Aj |
| | Polarization 2 | −A + Aj, −A − Aj, A + Aj, A + Aj, A + Aj, −A − Aj, −A + Aj, A + Aj, −A − Aj, A − Aj, A + Aj, A + Aj, A − Aj, A + Aj, −A + Aj, A − Aj, A − Aj, −A − Aj, A + Aj, A + Aj, −A − Aj, A − Aj, −A + Aj, −A − Aj, −A + Aj, A − Aj, A + Aj, A − Aj, A − Aj, −A + Aj, −A − Aj, A + Aj, −A + Aj, −A − Aj, A + Aj, −A − Aj, −A + Aj, −A − Aj, A − Aj, A − Aj, −A − Aj, A − Aj, A − Aj, A + Aj, −A − Aj, A − Aj, −A − Aj, −A + Aj, A − Aj, −A − Aj, −A − Aj, A − Aj, A − Aj, −A + Aj, A + Aj, −A + Aj, −A + Aj, A + Aj, A − Aj, −A − Aj, −A + Aj, −A + Aj, A − Aj, −A − Aj, −A + Aj, A + Aj, −A + Aj, A + Aj, −A − Aj, −A + Aj, −A + Aj, A + Aj, −A + Aj, A − Aj, −A + Aj, A − Aj |
| 6 | Polarization 1 | −A − Aj, −A + Aj, A − Aj, A − Aj, A − Aj, −A + Aj, −A − Aj, A − Aj, −A + Aj, A + Aj, A − Aj, A − Aj, A + Aj, A − Aj, −A − Aj, A + Aj, A + Aj, −A + Aj, A − Aj, A − Aj, −A + Aj, A + Aj, −A − Aj, −A + Aj, −A − Aj, A + Aj, A − Aj, A + Aj, A + Aj, −A − Aj, −A + Aj, A − Aj, −A − Aj, −A + Aj, A − Aj, −A + Aj, −A − Aj, −A + Aj, A + Aj, A + Aj, −A + Aj, A + Aj, A + Aj, A − Aj, −A + Aj, A + Aj, −A + Aj, −A − Aj, A + Aj, −A + Aj, −A + Aj, A + Aj, A + Aj, −A − Aj, A − Aj, −A − Aj, −A − Aj, A − Aj, A + Aj, −A + Aj, −A − Aj, −A − Aj, A + Aj, −A + Aj, −A − Aj, A − Aj, −A − Aj, A − Aj, −A + Aj, −A − Aj, −A − Aj, A − Aj, −A − Aj, A + Aj, −A − Aj, A + Aj |
| | Polarization 2 | A − Aj, A + Aj, −A − Aj, −A − Aj, −A − Aj, A + Aj, A − Aj, −A − Aj, A + Aj, −A + Aj, −A − Aj, −A − Aj, −A + Aj, −A − Aj, A − Aj, −A + Aj, −A + Aj, A + Aj, −A − Aj, −A − Aj, A + Aj, −A + Aj, A − Aj, A + Aj, A − Aj, −A + Aj, −A − Aj, −A + Aj, −A + Aj, A − Aj, A + Aj, −A − Aj, A − Aj, A + Aj, −A − Aj, A + Aj, A − Aj, A + Aj, −A + Aj, −A + Aj, A + Aj, −A + Aj, −A + Aj, −A − Aj, A + Aj, −A + Aj, A + Aj, A − Aj, −A + Aj, A + Aj, A + Aj, −A + Aj, −A + Aj, A − Aj, −A − Aj, A − Aj, A − Aj, −A − Aj, −A + Aj, A + Aj, A − Aj, A − Aj, −A + Aj, A + Aj, A − Aj, −A − Aj, A − Aj, −A − Aj, A + Aj, A − Aj, A − Aj, −A − Aj, A − Aj, −A + Aj, A − Aj, −A + Aj |
| 7 | Polarization 1 | A + Aj, A − Aj, −A + Aj, −A + Aj, −A + Aj, A − Aj, A + Aj, −A + Aj, A − Aj, −A − Aj, −A + Aj, −A + Aj, −A − Aj, −A + Aj, A + Aj, −A − Aj, −A − Aj, A − Aj, −A + Aj, −A + Aj, A − Aj, −A − Aj, A + Aj, A − Aj, A + Aj, −A − Aj, −A + Aj, −A − Aj, −A − Aj, A + Aj, A − Aj, −A + Aj, A + Aj, A − Aj, −A + Aj, A − Aj, A + Aj, A − Aj, −A − Aj, −A − Aj, A − Aj, −A − Aj, −A − Aj, −A + Aj, A − Aj, −A − Aj, A − Aj, A + Aj, −A − Aj, A − Aj, A − Aj, −A − Aj, −A − Aj, A + Aj, −A + Aj, A + Aj, A + Aj, −A + Aj, −A − Aj, A − Aj, A + Aj, A + Aj, −A − Aj, A − Aj, A + Aj, −A + Aj, A + Aj, −A + Aj, A − Aj, A + Aj, A + Aj, −A + Aj, A + Aj, −A − Aj, A + Aj, −A − Aj |
| | Polarization 2 | −A + Aj, −A − Aj, A + Aj, A + Aj, A + Aj, −A − Aj, −A + Aj, A + Aj, −A − Aj, A − Aj, A + Aj, A + Aj, A − Aj, A + Aj, −A + Aj, A − Aj, A − Aj, −A − Aj, A + Aj, A + Aj, −A − Aj, A − Aj, −A + Aj, −A − Aj, −A + Aj, A − Aj, A + Aj, A − Aj, A − Aj, −A + Aj, −A − Aj, A + Aj, −A + Aj, −A − Aj, A + Aj, −A − Aj, −A + Aj, −A − Aj, A − Aj, A − Aj, −A − Aj, A − Aj, A − Aj, A + Aj, −A − Aj, A − Aj, −A − Aj, −A + Aj, A − Aj, −A − Aj, −A − Aj, A − Aj, A − Aj, −A + Aj, A + Aj, −A + Aj, −A + Aj, A + Aj, A − Aj, −A − Aj, −A + Aj, −A + Aj, A − Aj, −A − Aj, −A + Aj, A + Aj, −A + Aj, A + Aj, −A − Aj, −A + Aj, −A + Aj, A + Aj, −A + Aj, A − Aj, −A + Aj, A − Aj |
| 8 | Polarization 1 | A + Aj, A − Aj, −A + Aj, −A + Aj, −A + Aj, A − Aj, A + Aj, −A + Aj, A − Aj, −A − Aj, −A + Aj, −A + Aj, −A − Aj, −A + Aj, A + Aj, −A − Aj, −A − Aj, A − Aj, −A + Aj, −A + Aj, A − Aj, −A − Aj, A + Aj, A − Aj, A + Aj, −A − Aj, −A + Aj, −A − Aj, −A − Aj, A + Aj, A − Aj, −A + Aj, A + Aj, A − Aj, −A + Aj, A − Aj, A + Aj, A − Aj, −A − Aj, −A − Aj, A − Aj, −A − Aj, −A − Aj, −A + Aj, |

TABLE 13-2-continued

| Index | Polarization | Pilot sequence |
|---|---|---|
| | | A − Aj, −A − Aj, A − Aj, A + Aj, −A − Aj, A − Aj, A − Aj, −A − Aj, −A − Aj, A + Aj, −A + Aj, A + Aj, A + Aj, −A + Aj, −A − Aj, A − Aj, A + Aj, A + Aj, −A − Aj, A − Aj, A + Aj, −A + Aj, A + Aj, −A + Aj, A − Aj, A + Aj, A + Aj, −A + Aj, A + Aj, −A − Aj, A + Aj, −A − Aj |
| | Polarization 2 | A − Aj, A + Aj, −A − Aj, −A − Aj, −A − Aj, A + Aj, A − Aj, −A − Aj, A + Aj, −A + Aj, −A − Aj, −A − Aj, −A + Aj, −A − Aj, A − Aj, −A + Aj, −A + Aj, A + Aj, −A − Aj, −A − Aj, A + Aj, −A + Aj, A − Aj, A + Aj, A − Aj, −A + Aj, −A − Aj, −A + Aj, −A + Aj, A − Aj, A + Aj, −A − Aj, A − Aj, A + Aj, −A − Aj, A + Aj, A − Aj, A + Aj, −A + Aj, −A + Aj, A + Aj, −A + Aj, −A + Aj, −A − Aj, A + Aj, −A + Aj, A + Aj, A − Aj, −A + Aj, A + Aj, A + Aj, −A + Aj, −A + Aj, A − Aj, −A − Aj, A − Aj, A − Aj, −A − Aj, −A + Aj, A + Aj, A − Aj, A − Aj, −A + Aj, A + Aj, A − Aj, −A − Aj, A − Aj, −A − Aj, A + Aj, A − Aj, A − Aj, −A − Aj, A − Aj, −A + Aj, A − Aj, −A + Aj |
| 9 | Polarization 1 | −A − Aj, A + Aj, A + Aj, A + Aj, −A + Aj, A − Aj, −A + Aj, A − Aj, −A + Aj, −A + Aj, A − Aj, A − Aj, −A + Aj, −A + Aj, −A − Aj, −A + Aj, −A − Aj, A + Aj, A + Aj, A + Aj, A − Aj, −A − Aj, −A + Aj, −A + Aj, A + Aj, A + Aj, A + Aj, A − Aj, −A + Aj, A − Aj, −A + Aj, A − Aj, −A − Aj, A − Aj, A − Aj, A + Aj, A − Aj, −A − Aj, −A − Aj, A + Aj, −A − Aj, A − Aj, −A + Aj, −A − Aj, −A − Aj, −A − Aj, A + Aj, A + Aj, A + Aj, A + Aj, A + Aj, −A + Aj, −A − Aj, −A − Aj, A − Aj, A + Aj, −A − Aj, −A + Aj, A + Aj, A + Aj, −A + Aj, A − Aj, A − Aj, −A − Aj, −A + Aj, A − Aj, −A − Aj, −A − Aj, −A − Aj, −A + Aj, −A − Aj, A − Aj, −A + Aj, −A − Aj, A + Aj, A − Aj |
| | Polarization 2 | A − Aj, A − Aj, A + Aj, A − Aj, −A + Aj, A + Aj, A + Aj, −A + Aj, −A + Aj, −A − Aj, −A − Aj, A − Aj, −A − Aj, A − Aj, −A + Aj, −A − Aj, −A + Aj, A + Aj, A + Aj, A − Aj, −A − Aj, A − Aj, A + Aj, A + Aj, −A − Aj, −A + Aj, −A − Aj, −A − Aj, A − Aj, −A + Aj, −A + Aj, −A + Aj, −A + Aj, A − Aj, A − Aj, A + Aj, −A − Aj, −A − Aj, A + Aj, −A + Aj, −A − Aj, A − Aj, −A + Aj, A − Aj, A − Aj, A − Aj, −A + Aj, −A + Aj, A − Aj, −A − Aj, −A − Aj, −A + Aj, A − Aj, −A − Aj, A + Aj, A − Aj, −A + Aj, A + Aj, −A − Aj, A + Aj, −A + Aj, A + Aj, A − Aj, −A − Aj, −A + Aj, A − Aj, −A + Aj, A + Aj, −A − Aj, −A − Aj, A + Aj, A + Aj, −A + Aj, A − Aj, A + Aj, A + Aj |
| 10 | Polarization 1 | −A − Aj, −A + Aj, A + Aj, −A + Aj, A − Aj, −A − Aj, −A − Aj, A − Aj, A + Aj, A + Aj, A − Aj, A + Aj, −A + Aj, −A + Aj, A + Aj, A − Aj, −A − Aj, −A − Aj, −A + Aj, −A − Aj, −A − Aj, −A − Aj, A − Aj, A − Aj, −A + Aj, −A + Aj, A − Aj, −A − Aj, −A − Aj, −A − Aj, A − Aj, A + Aj, −A + Aj, A + Aj, A + Aj, A − Aj, −A + Aj, −A + Aj, −A + Aj, A − Aj, A + Aj, −A − Aj, A − Aj, A − Aj, −A − Aj, −A − Aj, −A − Aj, A + Aj, A + Aj, A + Aj, A − Aj, −A + Aj, A + Aj, −A − Aj, A − Aj, −A − Aj, −A − Aj, −A − Aj, −A + Aj, A − Aj, A + Aj, −A + Aj, −A + Aj, −A + Aj, A + Aj, −A − Aj, A + Aj, −A + Aj, A − Aj, A + Aj, A − Aj, −A + Aj, A + Aj, A + Aj, A + Aj, A − Aj |
| | Polarization 2 | A − Aj, −A − Aj, −A + Aj, A + Aj, A + Aj, −A + Aj, −A + Aj, A + Aj, −A + Aj, −A + Aj, A − Aj, A + Aj, A − Aj, A + Aj, A − Aj, A + Aj, −A − Aj, A − Aj, −A − Aj, −A + Aj, −A − Aj, A + Aj, A + Aj, −A + Aj, −A − Aj, −A − Aj, A − Aj, A − Aj, A − Aj, −A − Aj, −A − Aj, A − Aj, A − Aj, A + Aj, −A − Aj, A − Aj, A + Aj, −A − Aj, A − Aj, −A + Aj, −A + Aj, A − Aj, A − Aj, −A + Aj, −A − Aj, −A + Aj, A + Aj, A + Aj, −A − Aj, −A + Aj, −A + Aj, −A − Aj, A + Aj, A + Aj, A − Aj, −A + Aj, A − Aj, −A − Aj, −A − Aj, −A + Aj, A − Aj, −A + Aj, −A − Aj, −A + Aj, A − Aj, A + Aj, A − Aj, −A − Aj, A + Aj, −A + Aj, A − Aj, −A − Aj, A + Aj, A + Aj, −A + Aj, −A + Aj |
| 11 | Polarization 1 | −A + Aj, A + Aj, −A − Aj, A − Aj, −A + Aj, −A − Aj, A − Aj, −A − Aj, −A − Aj, −A − Aj, −A + Aj, A − Aj, −A − Aj, −A + Aj, −A + Aj, A − Aj, A + Aj, A + Aj, A − Aj, −A − Aj, A + Aj, −A + Aj, −A − Aj, −A − Aj, A − Aj, A + Aj, A + Aj, A + Aj, A + Aj, A + Aj, −A − Aj, −A − Aj, −A − Aj, A − Aj, −A + Aj, −A − Aj, A + Aj, −A − Aj, −A − Aj, −A + Aj, A + Aj, −A + Aj, −A + Aj, −A − Aj, −A + Aj, A − Aj, −A + Aj, A − Aj, −A + Aj, A + Aj, A + Aj, A + Aj, A − Aj, A − Aj, −A − Aj, −A + Aj, A + Aj, A + Aj, A + Aj, −A − Aj, A − Aj, −A − Aj, A − Aj, A − Aj, −A + Aj, −A + Aj, A − Aj, A − Aj, −A + Aj, A − Aj, −A + Aj, A − Aj, A + Aj, A + Aj, A + Aj, −A − Aj |
| | Polarization 2 | A + Aj, A + Aj, −A + Aj, A − Aj, A + Aj, A + Aj, −A − Aj, −A − Aj, A + Aj, A − Aj, −A + Aj, A − Aj, −A − Aj, −A + Aj, A + Aj, A − Aj, A + Aj, −A − Aj, A + Aj, A − Aj, −A + Aj, A + Aj, −A − Aj, −A + Aj, A − Aj, −A − Aj, −A − Aj, −A + Aj, A − Aj, A − Aj, −A + Aj, −A + Aj, −A + Aj, A − Aj, −A + Aj, −A − Aj, A − Aj, A + Aj, −A − Aj, −A − Aj, A + Aj, −A + Aj, −A + Aj, A − Aj, A − Aj, A − Aj, A − Aj, −A + Aj, −A − Aj, −A − Aj, A − Aj, −A − Aj, A + Aj, A + Aj, −A + Aj, −A − Aj, −A + Aj, A + Aj, A + Aj, A − Aj, −A − Aj, A − Aj, −A + Aj, −A − Aj, −A + Aj, −A − Aj, −A − Aj, A − Aj, A − Aj, A + Aj, A + Aj, A − Aj, −A + Aj, A + Aj, −A + Aj, −A + Aj |
| 12 | Polarization 1 | −A + Aj, A + Aj, A + Aj, A + Aj, A − Aj, −A + Aj, A + Aj, −A + Aj, A − Aj, A + Aj, −A − Aj, A + Aj, A − Aj, A − Aj, A − Aj, A + Aj, −A + Aj, A − Aj, −A − Aj, −A − Aj, −A − Aj, −A + Aj, −A − Aj, A + Aj, A − Aj, −A + Aj, A + Aj, A + Aj, A + Aj, −A − Aj, −A − Aj, −A − Aj, −A + Aj, −A + Aj, −A − Aj, A + Aj, −A + Aj, A − Aj, A − Aj, A − Aj, −A + Aj, A + Aj, A + Aj, A − Aj, A + Aj, −A + Aj, −A − Aj, −A − Aj, −A − Aj, −A + Aj, A − Aj, A − Aj, −A + Aj, −A + Aj, −A − Aj, −A − Aj, −A − Aj, A − Aj, −A − Aj, −A − Aj, −A + Aj, A + Aj, A − Aj, A − Aj, A + Aj, −A + Aj, A + Aj, A + Aj, −A + Aj, −A − Aj, −A − Aj, −A + Aj, A − Aj, A + Aj, A − Aj, −A − Aj |
| | Polarization 2 | A − Aj, A − Aj, A + Aj, A + Aj, −A − Aj, −A + Aj, A − Aj, A + Aj, −A − Aj, −A + Aj, A + Aj, −A + Aj, A − Aj, −A − Aj, A − Aj, −A + Aj, A − Aj, −A − Aj, −A − Aj, −A + Aj, A − Aj, −A + Aj, A + Aj, A + Aj, −A − Aj, A − Aj, A − Aj, −A − Aj, A + Aj, A + Aj, A − Aj, −A − Aj, A − Aj, −A + Aj, −A + Aj, A − Aj, A − Aj, −A + Aj, −A − Aj, A + Aj, −A + Aj, −A − Aj, A + Aj, −A + Aj, −A + Aj, −A − Aj, −A − Aj, −A + Aj, −A + Aj, −A + Aj, −A − Aj, −A − Aj, A − Aj, A + Aj, A + Aj, −A − Aj, A − Aj, −A − Aj, −A + Aj, −A − Aj, A + Aj, −A + Aj, A + Aj, −A + Aj, A + Aj, −A + Aj, A − Aj, A − Aj, A + Aj, A − Aj, A − Aj, A + Aj, A + Aj, A − Aj, −A − Aj, −A + Aj |

(7) It is assumed that $N_{PS}$=50, and the pilot sequence is one item in the following Table 14.

TABLE 14

| Index | Polarization | Pilot sequence |
|---|---|---|
| 1 | Polarization 1 | −A − Aj, −A − Aj, A − Aj, −A − Aj, −A − Aj, A − Aj, −A + Aj, −A + Aj, −A + Aj, −A − Aj, A − Aj, A + Aj, A + Aj, A − Aj, −A − Aj, −A − Aj, −A + Aj, A + Aj, −A − Aj, A + Aj, −A − Aj, −A + Aj, A − Aj, A − Aj, A − Aj, −A − Aj, −A − Aj, −A − Aj, A − Aj, A + Aj, A − Aj, A + Aj, A + Aj, −A + Aj, A − Aj, −A + Aj, A + Aj, A + Aj, A + Aj, A − Aj, −A + Aj, −A + Aj, A − Aj, A − Aj, A + Aj, −A + Aj, A + Aj, −A + Aj, −A + Aj, −A + Aj |
| | Polarization 2 | A + Aj, A + Aj, A − Aj, A − Aj, A + Aj, A + Aj, −A − Aj, A + Aj, A − Aj, A − Aj, −A − Aj, −A + Aj, −A + Aj, −A + Aj, A − Aj, −A + Aj, −A + Aj, −A − Aj, −A + Aj, −A + Aj, A − Aj, −A − Aj, −A − Aj, A + Aj, −A − Aj, A − Aj, −A − Aj, A + Aj, −A − Aj, −A − Aj, A + Aj, −A + Aj, A + Aj, A + Aj, A − Aj, A + Aj, A − Aj, −A − Aj, −A + Aj, −A − Aj, −A − Aj, −A + Aj, −A − Aj, A − Aj, A − Aj, A − Aj, −A + Aj, −A + Aj, A + Aj, A + Aj |
| 2 | Polarization 1 | −A + Aj, −A − Aj, A − Aj, −A − Aj, −A + Aj, A + Aj, A − Aj, −A − Aj, A − Aj, A − Aj, −A + Aj, A + Aj, −A − Aj, −A + Aj, A + Aj, A + Aj, −A + Aj, −A + Aj, A + Aj, A − Aj, −A + Aj, A + Aj, −A + Aj, −A − Aj, −A − Aj, A − Aj, A − Aj, A + Aj, −A − Aj, A − Aj, A − Aj, −A − Aj, A − Aj, A + Aj, −A − Aj, −A − Aj, −A + Aj, A − Aj, −A + Aj, −A − Aj, −A + Aj, A − Aj, −A − Aj, −A + Aj, A − Aj, A + Aj, A + Aj, A + Aj, −A + Aj, A + Aj |
| | Polarization 2 | −A − Aj, −A + Aj, −A − Aj, −A − Aj, −A + Aj, −A − Aj, A − Aj, A − Aj, A − Aj, −A + Aj, −A + Aj, A + Aj, A + Aj, −A − Aj, −A − Aj, −A − Aj, A + Aj, A − Aj, −A + Aj, A − Aj, −A − Aj, A + Aj, −A + Aj, −A + Aj, −A − Aj, −A − Aj, −A − Aj, −A + Aj, −A + Aj, A + Aj, −A + Aj, A + Aj, A − Aj, A + Aj, −A − Aj, A + Aj, A + Aj, A + Aj, A + Aj, −A − Aj, A − Aj, A + Aj, −A + Aj, −A + Aj, A − Aj, A + Aj, A − Aj, A − Aj, A − Aj, A − Aj |
| 3 | Polarization 1 | −A + Aj, −A − Aj, A − Aj, −A − Aj, −A + Aj, A + Aj, A − Aj, −A − Aj, A − Aj, A − Aj, −A + Aj, A + Aj, −A − Aj, −A + Aj, A + Aj, A + Aj, −A + Aj, −A + Aj, A + Aj, A − Aj, −A + Aj, A + Aj, −A + Aj, −A − Aj, −A − Aj, A − Aj, A − Aj, A + Aj, −A − Aj, A − Aj, A − Aj, −A − Aj, A − Aj, A + Aj, −A − Aj, −A − Aj, −A + Aj, A − Aj, −A + Aj, −A − Aj, −A + Aj, A − Aj, −A − Aj, −A + Aj, A − Aj, A + Aj, A + Aj, A + Aj, −A + Aj, A + Aj |
| | Polarization 2 | A − Aj, −A − Aj, −A + Aj, −A − Aj, −A − Aj, −A + Aj, −A − Aj, A − Aj, A − Aj, A − Aj, −A + Aj, −A + Aj, A + Aj, A + Aj, −A − Aj, −A − Aj, −A − Aj, A + Aj, A − Aj, −A + Aj, A − Aj, −A − Aj, A + Aj, −A + Aj, −A + Aj, −A − Aj, −A − Aj, −A − Aj, −A + Aj, −A + Aj, A + Aj, −A + Aj, A + Aj, A − Aj, A + Aj, −A − Aj, A + Aj, A + Aj, A + Aj, A + Aj, −A − Aj, A − Aj, A + Aj, −A + Aj, −A + Aj, A − Aj, A + Aj, A − Aj, A − Aj, A − Aj |
| 4 | Polarization 1 | A − Aj, A − Aj, A − Aj, A + Aj, A − Aj, A + Aj, −A + Aj, −A + Aj, A − Aj, A − Aj, −A + Aj, A + Aj, A + Aj, A + Aj, A − Aj, −A + Aj, A − Aj, A + Aj, A + Aj, −A + Aj, A + Aj, −A + Aj, −A − Aj, −A − Aj, −A − Aj, −A + Aj, −A + Aj, −A + Aj, A − Aj, −A − Aj, A + Aj, −A − Aj, A + Aj, A − Aj, −A − Aj, −A − Aj, −A + Aj, A + Aj, A + Aj, −A + Aj, −A − Aj, A − Aj, A − Aj, A − Aj, −A + Aj, −A − Aj, −A − Aj, −A + Aj, −A − Aj, −A − Aj |
| | Polarization 2 | A + Aj, A + Aj, A − Aj, A − Aj, −A + Aj, −A + Aj, −A + Aj, −A − Aj, A − Aj, −A − Aj, −A − Aj, A − Aj, −A − Aj, −A + Aj, A + Aj, −A + Aj, A + Aj, A + Aj, A − Aj, A + Aj, −A − Aj, −A − Aj, A + Aj, −A − Aj, −A + Aj, −A − Aj, A + Aj, −A − Aj, −A − Aj, −A + Aj, A − Aj, A − Aj, −A − Aj, A − Aj, A − Aj, −A + Aj, A − Aj, A − Aj, A − Aj, −A − Aj, −A + Aj, −A + Aj, A + Aj, −A − Aj, A + Aj, A + Aj, −A + Aj, −A + Aj, A + Aj, A + Aj |
| 5 | Polarization 1 | A + Aj, A − Aj, A + Aj, A + Aj, A + Aj, −A + Aj, A − Aj, −A − Aj, −A + Aj, A − Aj, −A − Aj, A − Aj, −A + Aj, A − Aj, −A − Aj, −A − Aj, A + Aj, −A + Aj, −A − Aj, −A + Aj, −A + Aj, −A − Aj, A + Aj, −A + Aj, −A + Aj, −A − Aj, −A − Aj, A − Aj, A + Aj, A − Aj, −A + Aj, A + Aj, A − Aj, A − Aj, A + Aj, A + Aj, A − Aj, −A − Aj, A + Aj, A − Aj, −A + Aj, −A + Aj, −A − Aj, −A + Aj, A + Aj, A − Aj, −A − Aj, −A + Aj, −A − Aj, A − Aj |
| | Polarization 2 | −A + Aj, −A + Aj, −A + Aj, −A + Aj, A + Aj, −A + Aj, A − Aj, A − Aj, A + Aj, −A + Aj, −A − Aj, A + Aj, A + Aj, A + Aj, A + Aj, −A − Aj, A + Aj, −A + Aj, A + Aj, A − Aj, A + Aj, A − Aj, A − Aj, −A − Aj, −A − Aj, −A − Aj, A − Aj, A − Aj, A + Aj, −A − Aj, −A + Aj, A − Aj, −A + Aj, A + Aj, −A − Aj, −A − Aj, −A − Aj, A + Aj, A + Aj, A − Aj, A − Aj, −A + Aj, −A + Aj, −A + Aj, −A − Aj, A − Aj, −A − Aj, −A − Aj, A − Aj, −A − Aj |
| 6 | Polarization 1 | A + Aj, A − Aj, A + Aj, A + Aj, A + Aj, −A + Aj, A − Aj, −A − Aj, −A + Aj, A − Aj, −A − Aj, A − Aj, −A + Aj, A − Aj, −A − Aj, −A − Aj, A + Aj, −A + Aj, −A − Aj, −A + Aj, −A + Aj, −A − Aj, A + Aj, −A + Aj, −A + Aj, −A − Aj, −A − Aj, A − Aj, A + Aj, A − Aj, −A + Aj, A + Aj, A − Aj, A − Aj, A + Aj, A + Aj, A − Aj, −A − Aj, A + Aj, A − Aj, −A + Aj, −A + Aj, −A − Aj, −A + Aj, A + Aj, A − Aj, −A − Aj, −A + Aj, −A − Aj, A − Aj |
| | Polarization 2 | −A + Aj, −A + Aj, −A + Aj, A + Aj, −A + Aj, A − Aj, A − Aj, A + Aj, −A + Aj, −A − Aj, A + Aj, A + Aj, A + Aj, A + Aj, −A − Aj, A + Aj, −A + Aj, A + Aj, A − Aj, A + Aj, A − Aj, A − Aj, −A − Aj, −A − Aj, −A − Aj, A − Aj, A − Aj, A + Aj, −A − Aj, −A + Aj, A − Aj, −A + Aj, A + Aj, −A − Aj, −A − Aj, −A − Aj, A + Aj, A + Aj, A − Aj, A − Aj, −A + Aj, −A + Aj, −A + Aj, −A − Aj, A − Aj, −A − Aj, −A − Aj, A − Aj, −A − Aj, −A + Aj |
| 7 | Polarization 1 | −A + Aj, A + Aj, −A − Aj, −A − Aj, −A + Aj, −A + Aj, −A − Aj, −A + Aj, A − Aj, A + Aj, −A + Aj, −A − Aj, −A − Aj, −A − Aj, A + Aj, −A − Aj, −A − Aj, A − Aj, −A + Aj, −A − Aj, A + Aj, A + Aj, A + Aj, A − Aj, A + Aj, A + Aj, A − Aj, −A − Aj, A + Aj, A − Aj, A − Aj, A − Aj, A − Aj, −A + Aj, −A + Aj, −A + Aj, A + Aj, A − Aj, A − Aj, −A + Aj, A − Aj, −A + Aj, A + Aj, −A − Aj, A + Aj, −A + Aj, −A + Aj, A − Aj, −A − Aj, A − Aj |
| | Polarization 2 | −A − Aj, A − Aj, −A + Aj, −A + Aj, −A − Aj, −A − Aj, −A + Aj, −A − Aj, A + Aj, A − Aj, −A − Aj, −A + Aj, −A + Aj, −A + Aj, A − Aj, −A + Aj, −A + Aj, A + Aj, −A − Aj, −A + Aj, A − Aj, A − Aj, A − Aj, A + Aj, A − Aj, A − Aj, A + Aj, −A + Aj, A − Aj, A + Aj, A + Aj, A + Aj, A + Aj, −A − Aj, −A − Aj, −A − Aj, A − Aj, A + Aj, A + Aj, −A − Aj, A + Aj, −A − Aj, A − Aj, −A + Aj, A − Aj, −A − Aj, −A − Aj, A + Aj, −A + Aj, A + Aj |
| 8 | Polarization 1 | −A + Aj, A + Aj, −A − Aj, −A − Aj, −A + Aj, −A + Aj, −A − Aj, −A + Aj, A − Aj, A + Aj, −A + Aj, −A − Aj, −A − Aj, −A − Aj, A + Aj, −A − Aj, −A − Aj, A − Aj, −A + Aj, −A − Aj, A + Aj, A + Aj, A + Aj, A − Aj, A + Aj, A + Aj, A − Aj, −A − Aj, A + Aj, A − Aj, A − Aj, A − Aj, A − |

TABLE 14-continued

| Index | Polarization | Pilot sequence |
|---|---|---|
| | | Aj, −A + Aj, −A + Aj, −A + Aj, A + Aj, A − Aj, A − Aj, −A + Aj, A − Aj, −A + Aj, A + Aj, −A − Aj, A + Aj, −A + Aj, −A + Aj, A − Aj, −A − Aj, A − Aj |
| | Polarization 2 | A + Aj, −A + Aj, A − Aj, A − Aj, A + Aj, A + Aj, A − Aj, A + Aj, −A − Aj, −A + Aj, A + Aj, A − Aj, A − Aj, A − Aj, −A + Aj, A − Aj, A − Aj, −A − Aj, A + Aj, A − Aj, −A + Aj, −A + Aj, −A + Aj, −A − Aj, −A + Aj, −A + Aj, −A − Aj, A − Aj, −A + Aj, −A − Aj, −A − Aj, −A − Aj, −A − Aj, A + Aj, A + Aj, A + Aj, −A + Aj, −A − Aj, −A − Aj, A + Aj, −A − Aj, A + Aj, −A + Aj, A − Aj, −A + Aj, A + Aj, A + Aj, −A − Aj, A − Aj, −A − Aj |
| 9 | Polarization 1 | A − Aj, −A − Aj, A + Aj, A + Aj, A − Aj, A − Aj, A + Aj, A − Aj, −A + Aj, −A − Aj, A − Aj, A + Aj, A + Aj, A + Aj, −A − Aj, A + Aj, A + Aj, −A + Aj, A − Aj, A + Aj, −A − Aj, −A − Aj, −A − Aj, −A + Aj, −A − Aj, −A − Aj, −A + Aj, A + Aj, −A − Aj, −A + Aj, −A + Aj, −A + Aj, −A + Aj, A − Aj, A − Aj, A − Aj, −A − Aj, −A + Aj, −A + Aj, A − Aj, −A + Aj, A − Aj, −A − Aj, A + Aj, −A − Aj, A − Aj, A − Aj, −A + Aj, A + Aj, −A + Aj |
| | Polarization 2 | −A − Aj, A − Aj, −A + Aj, −A + Aj, −A − Aj, −A − Aj, −A + Aj, −A − Aj, A + Aj, A − Aj, −A − Aj, −A + Aj, −A + Aj, −A + Aj, A − Aj, −A + Aj, −A + Aj, A + Aj, −A − Aj, −A + Aj, A − Aj, A − Aj, A − Aj, A + Aj, A − Aj, A − Aj, A + Aj, −A + Aj, A − Aj, A + Aj, A + Aj, A + Aj, A + Aj, −A − Aj, −A − Aj, −A − Aj, A − Aj, A + Aj, A + Aj, −A − Aj, A + Aj, −A − Aj, A − Aj, −A + Aj, A − Aj, −A − Aj, −A − Aj, A + Aj, −A + Aj, A + Aj |
| 10 | Polarization 1 | A − Aj, −A − Aj, A + Aj, A + Aj, A − Aj, A − Aj, A + Aj, A − Aj, −A + Aj, −A − Aj, A − Aj, A + Aj, A + Aj, A + Aj, −A − Aj, A + Aj, A + Aj, −A + Aj, A − Aj, A + Aj, −A − Aj, −A − Aj, −A − Aj, −A + Aj, −A − Aj, −A − Aj, −A + Aj, A + Aj, −A − Aj, −A + Aj, −A + Aj, −A + Aj, −A + Aj, A − Aj, A − Aj, A − Aj, −A − Aj, −A + Aj, −A + Aj, A − Aj, −A + Aj, A − Aj, −A − Aj, A + Aj, −A − Aj, A − Aj, A − Aj, −A + Aj, A + Aj, −A + Aj |
| | Polarization 2 | A + Aj, −A + Aj, A − Aj, A − Aj, A + Aj, A + Aj, A − Aj, A + Aj, −A − Aj, −A + Aj, A + Aj, A − Aj, A − Aj, A − Aj, −A + Aj, A − Aj, A − Aj, −A − Aj, A + Aj, A − Aj, −A + Aj, −A + Aj, −A + Aj, −A − Aj, −A + Aj, −A + Aj, −A − Aj, A − Aj, −A + Aj, −A − Aj, −A − Aj, −A − Aj, −A − Aj, A + Aj, A + Aj, A + Aj, −A + Aj, −A − Aj, −A − Aj, A + Aj, −A − Aj, A + Aj, −A + Aj, A − Aj, −A + Aj, A + Aj, A + Aj, −A − Aj, A − Aj, −A − Aj |
| 11 | Polarization 1 | −A + Aj, −A − Aj, −A + Aj, A − Aj, A − Aj, A + Aj, −A − Aj, A + Aj, A − Aj, −A + Aj, A − Aj, −A + Aj, −A + Aj, A + Aj, A − Aj, A − Aj, A − Aj, −A + Aj, −A + Aj, −A + Aj, −A + Aj, A + Aj, −A − Aj, −A + Aj, A + Aj, A + Aj, −A + Aj, A + Aj, A + Aj, A + Aj, −A − Aj, A − Aj, −A + Aj, −A − Aj, −A − Aj, A + Aj, −A − Aj, −A − Aj, −A − Aj, A − Aj, A + Aj, −A + Aj, A − Aj, −A − Aj, A − Aj, A − Aj, −A − Aj, −A − Aj, A + Aj, A − Aj |
| | Polarization 2 | −A − Aj, −A + Aj, −A − Aj, A + Aj, A + Aj, A − Aj, −A + Aj, A − Aj, A + Aj, −A − Aj, A + Aj, −A − Aj, −A − Aj, A − Aj, A + Aj, A + Aj, A + Aj, −A − Aj, −A − Aj, −A − Aj, −A − Aj, A − Aj, −A + Aj, −A − Aj, A − Aj, A − Aj, −A − Aj, A − Aj, A − Aj, A − Aj, −A + Aj, A + Aj, −A − Aj, −A + Aj, −A + Aj, A − Aj, −A + Aj, −A + Aj, −A + Aj, A + Aj, A − Aj, −A − Aj, A + Aj, −A + Aj, A + Aj, A + Aj, −A + Aj, −A + Aj, A − Aj, A + Aj |
| 12 | Polarization 1 | −A + Aj, −A − Aj, −A + Aj, A − Aj, A − Aj, A + Aj, −A − Aj, A + Aj, A − Aj, −A + Aj, A − Aj, −A + Aj, −A + Aj, A + Aj, A − Aj, A − Aj, A − Aj, −A + Aj, −A + Aj, −A + Aj, −A + Aj, A + Aj, −A − Aj, −A + Aj, A + Aj, A + Aj, −A + Aj, A + Aj, A + Aj, A + Aj, −A − Aj, A − Aj, −A + Aj, −A − Aj, −A − Aj, A + Aj, −A − Aj, −A − Aj, −A − Aj, A − Aj, A + Aj, −A + Aj, A − Aj, −A − Aj, A − Aj, A − Aj, −A − Aj, −A − Aj, A + Aj, A − Aj |
| | Polarization 2 | A + Aj, A − Aj, A + Aj, −A − Aj, −A − Aj, −A + Aj, A − Aj, −A + Aj, −A − Aj, A + Aj, −A − Aj, A + Aj, A + Aj, −A + Aj, −A − Aj, −A − Aj, −A − Aj, A + Aj, A + Aj, A + Aj, A + Aj, −A + Aj, A − Aj, A + Aj, −A + Aj, −A + Aj, A + Aj, −A + Aj, −A + Aj, −A + Aj, A − Aj, −A − Aj, A + Aj, A − Aj, A − Aj, −A + Aj, A − Aj, A − Aj, A − Aj, −A − Aj, −A + Aj, A + Aj, −A − Aj, A − Aj, −A − Aj, −A − Aj, A − Aj, A − Aj, −A + Aj, −A − Aj |
| 13 | Polarization 1 | A − Aj, A + Aj, A − Aj, −A + Aj, −A + Aj, −A − Aj, A + Aj, −A − Aj, −A + Aj, A − Aj, −A + Aj, A − Aj, A − Aj, −A − Aj, −A + Aj, −A + Aj, −A + Aj, A − Aj, A − Aj, A − Aj, A − Aj, −A − Aj, A + Aj, A − Aj, −A − Aj, −A − Aj, A − Aj, −A − Aj, −A − Aj, −A − Aj, A + Aj, −A + Aj, A − Aj, A + Aj, A + Aj, −A − Aj, A + Aj, A + Aj, A + Aj, −A + Aj, −A − Aj, A − Aj, −A + Aj, A + Aj, −A + Aj, −A + Aj, A + Aj, A + Aj, −A − Aj, −A + Aj |
| | Polarization 2 | −A − Aj, −A + Aj, −A − Aj, A + Aj, A + Aj, A − Aj, −A + Aj, A − Aj, A + Aj, −A − Aj, A + Aj, −A − Aj, −A − Aj, A − Aj, A + Aj, A + Aj, A + Aj, −A − Aj, −A − Aj, −A − Aj, −A − Aj, A − Aj, −A + Aj, −A − Aj, A − Aj, A − Aj, −A − Aj, A − Aj, A − Aj, A − Aj, −A + Aj, A + Aj, −A − Aj, −A + Aj, −A + Aj, A − Aj, −A + Aj, −A + Aj, −A + Aj, A + Aj, A − Aj, −A − Aj, A + Aj, −A + Aj, A + Aj, A + Aj, −A + Aj, −A + Aj, A − Aj, A + Aj |
| 14 | Polarization 1 | A − Aj, A + Aj, A − Aj, −A + Aj, −A + Aj, −A − Aj, A + Aj, −A − Aj, −A + Aj, A − Aj, −A + Aj, A − Aj, A − Aj, −A − Aj, −A + Aj, −A + Aj, −A + Aj, A − Aj, A − Aj, A − Aj, A − Aj, −A − Aj, A + Aj, A − Aj, −A − Aj, −A − Aj, A − Aj, −A − Aj, −A − Aj, −A − Aj, A + Aj, −A + Aj, A − Aj, A + Aj, A + Aj, −A − Aj, A + Aj, A + Aj, A + Aj, −A + Aj, −A − Aj, A − Aj, −A + Aj, A + Aj, −A + Aj, −A + Aj, A + Aj, A + Aj, −A − Aj, −A + Aj |
| | Polarization 2 | A + Aj, A − Aj, A + Aj, −A − Aj, −A − Aj, −A + Aj, A − Aj, −A + Aj, −A − Aj, A + Aj, −A − Aj, A + Aj, A + Aj, −A + Aj, −A − Aj, −A − Aj, −A − Aj, A + Aj, A + Aj, A + Aj, A + Aj, −A + Aj, A − Aj, A + Aj, −A + Aj, −A + Aj, A + Aj, −A + Aj, −A + Aj, −A + Aj, A − Aj, −A − Aj, A + Aj, A − Aj, A − Aj, −A + Aj, A − Aj, A − Aj, A − Aj, −A − Aj, −A + Aj, A + Aj, −A − Aj, A − Aj, −A − Aj, −A − Aj, A − Aj, A − Aj, −A + Aj, −A − Aj |

(8) When $N_{PS}$=66, the pilot sequence is one item in the following Table 15-1. Alternatively, any item is selected from Table 15-2 as a pilot sequence in one polarization, and any item is selected from Table 15-3 as a pilot sequence in the other polarization. Alternatively, any item is selected from Table 15-4 as a pilot sequence in one polarization, and any item is selected from the following Table 15-5 as a pilot sequence in the other polarization.

TABLE 15-1

| Index | Polarization | Pilot sequence |
|---|---|---|
| 1 | Polarization 1 | −A + Aj, A + Aj, −A + Aj, −A − Aj, A + Aj, A + Aj, A + Aj, −A − Aj, −A + Aj, A − Aj, A − Aj, −A − Aj, A + Aj, A + Aj, −A − Aj, −A − Aj, A + Aj, A − Aj, −A + Aj, A + Aj, −A − Aj, −A + Aj, −A − Aj, −A − Aj, −A − Aj, −A + Aj, A − Aj, A − Aj, A − Aj, A − Aj, −A + Aj, −A + Aj, A + Aj, A + Aj, −A − Aj, A + Aj, −A − Aj, A − Aj, A − Aj, A − Aj, −A + Aj, A − Aj, −A + Aj, −A − Aj, A − Aj, −A + Aj, −A − Aj, −A + Aj, A − Aj, −A − Aj, A − Aj, A + Aj, −A + Aj, −A + Aj, A − Aj, −A + Aj, A + Aj, A − Aj, A + Aj, −A − Aj, A − Aj, −A + Aj, A + Aj, −A − Aj, A + Aj, −A + Aj |
| | Polarization 2 | −A − Aj, −A + Aj, A + Aj, −A + Aj, A − Aj, A − Aj, −A + Aj, A − Aj, A + Aj, −A + Aj, −A − Aj, −A − Aj, A + Aj, −A + Aj, −A − Aj, A − Aj, −A + Aj, −A + Aj, A − Aj, A + Aj, A + Aj, A + Aj, A + Aj, −A − Aj, A + Aj, A + Aj, −A − Aj, −A + Aj, −A − Aj, A + Aj, A − Aj, A − Aj, −A − Aj, −A − Aj, A − Aj, −A + Aj, −A + Aj, A + Aj, −A − Aj, A − Aj, −A − Aj, A − Aj, −A − Aj, A − Aj, −A + Aj, −A + Aj, −A − Aj, A − Aj, A − Aj, −A + Aj, A − Aj, −A − Aj, −A − Aj, −A + Aj, −A + Aj, A + Aj, A + Aj, A + Aj, −A + Aj, A + Aj, −A − Aj, −A − Aj, A − Aj, A − Aj, A − Aj, A + Aj, A + Aj |
| 2 | Polarization 1 | A − Aj, A + Aj, −A − Aj, A + Aj, A − Aj, −A + Aj, −A − Aj, A + Aj, −A + Aj, A + Aj, A − Aj, −A + Aj, A − Aj, A − Aj, A + Aj, −A + Aj, −A − Aj, −A + Aj, A − Aj, −A − Aj, A − Aj, −A + Aj, −A − Aj, A − Aj, −A + Aj, A − Aj, −A + Aj, −A + Aj, −A + Aj, −A − Aj, A + Aj, −A − Aj, A + Aj, A + Aj, A − Aj, A − Aj, −A + Aj, −A + Aj, −A + Aj, −A + Aj, A − Aj, −A − Aj, −A − Aj, −A − Aj, A − Aj, −A − Aj, A + Aj, A − Aj, −A + Aj, A + Aj, −A − Aj, −A − Aj, A + Aj, A + Aj, −A − Aj, −A + Aj, −A + Aj, A − Aj, −A − Aj, A + Aj, A + Aj, A + Aj, −A − Aj, A − Aj, A + Aj, A − Aj |
| | Polarization 2 | A + Aj, A + Aj, −A + Aj, −A + Aj, −A + Aj, −A − Aj, −A − Aj, A + Aj, A − Aj, A + Aj, A + Aj, A + Aj, A − Aj, A − Aj, −A − Aj, −A − Aj, −A + Aj, A − Aj, −A + Aj, −A − Aj, A − Aj, A − Aj, −A + Aj, −A − Aj, −A + Aj, −A − Aj, −A + Aj, −A − Aj, A + Aj, A − Aj, A − Aj, −A + Aj, −A − Aj, −A − Aj, −A + Aj, −A + Aj, A + Aj, −A − Aj, A − Aj, −A − Aj, A + Aj, A + Aj, −A − Aj, A + Aj, A + Aj, A + Aj, A + Aj, −A + Aj, A − Aj, A − Aj, −A + Aj, −A − Aj, A − Aj, A + Aj, −A − Aj, −A − Aj, A − Aj, A + Aj, −A + Aj, A − Aj, −A + Aj, −A + Aj, A − Aj, A + Aj, A − Aj, −A − Aj |

TABLE 15-2

| Index | Pilot sequence |
|---|---|
| 1 | −A − Aj, A − Aj, −A − Aj, A + Aj, −A + Aj, A − Aj, −A − Aj, −A − Aj, A + Aj, −A − Aj, −A − Aj, A + Aj, A + Aj, −A + Aj, −A − Aj, −A − Aj, −A + Aj, −A − Aj, −A + Aj, −A − Aj, A − Aj, −A + Aj, −A + Aj, A − Aj, −A + Aj, A − Aj, −A − Aj, A + Aj, A − Aj, A + Aj, A + Aj, A + Aj, A + Aj, −A − Aj, −A + Aj, A − Aj, −A + Aj, −A + Aj, −A + Aj, −A − Aj, −A + Aj, A + Aj, A + Aj, A − Aj, A − Aj, A − Aj, −A + Aj, A + Aj, −A + Aj, −A + Aj, A − Aj, A − Aj, A + Aj, A + Aj, −A − Aj, A − Aj, A + Aj, A − Aj, A − Aj, −A + Aj, −A − Aj, −A − Aj, A − Aj, −A + Aj, A − Aj, A + Aj |
| 2 | −A − Aj, A + Aj, −A + Aj, A + Aj, −A − Aj, A − Aj, −A + Aj, A + Aj, A + Aj, −A − Aj, A + Aj, A + Aj, −A − Aj, −A − Aj, A − Aj, A + Aj, A + Aj, A − Aj, A + Aj, A − Aj, A + Aj, −A + Aj, A − Aj, A − Aj, −A + Aj, A − Aj, −A + Aj, A + Aj, −A − Aj, −A + Aj, −A − Aj, −A − Aj, −A − Aj, −A − Aj, A + Aj, A − Aj, −A + Aj, A − Aj, A − Aj, A − Aj, A + Aj, A − Aj, −A − Aj, −A − Aj, −A + Aj, −A + Aj, −A + Aj, A − Aj, −A − Aj, A − Aj, A − Aj, −A + Aj, −A + Aj, −A − Aj, −A − Aj, A + Aj, −A + Aj, −A − Aj, −A + Aj, −A + Aj, A − Aj, A + Aj, A + Aj, −A + Aj, A − Aj, −A + Aj |
| 3 | −A + Aj, −A − Aj, A + Aj, −A + Aj, A + Aj, −A − Aj, A − Aj, −A + Aj, A + Aj, A + Aj, −A − Aj, A + Aj, A + Aj, −A − Aj, −A − Aj, A − Aj, A + Aj, A + Aj, A − Aj, A + Aj, A − Aj, A + Aj, −A + Aj, A − Aj, A − Aj, −A + Aj, A − Aj, −A + Aj, A + Aj, −A − Aj, −A + Aj, −A − Aj, −A − Aj, −A − Aj, −A − Aj, A + Aj, A − Aj, −A + Aj, A − Aj, A − Aj, A − Aj, A + Aj, A − Aj, −A − Aj, −A − Aj, −A + Aj, −A + Aj, −A + Aj, A − Aj, −A − Aj, A − Aj, A − Aj, −A + Aj, −A + Aj, −A − Aj, −A − Aj, A + Aj, −A + Aj, −A − Aj, −A + Aj, −A + Aj, A − Aj, A + Aj, A + Aj, −A + Aj, A − Aj |
| 4 | A − Aj, A + Aj, −A − Aj, A − Aj, −A − Aj, A + Aj, −A + Aj, A − Aj, −A − Aj, −A − Aj, A + Aj, −A − Aj, −A − Aj, A + Aj, A + Aj, −A + Aj, −A − Aj, −A − Aj, −A + Aj, −A − Aj, −A + Aj, −A − Aj, A − Aj, −A + Aj, −A + Aj, A − Aj, −A + Aj, A − Aj, −A − Aj, A + Aj, A − Aj, A + Aj, A + Aj, A + Aj, A + Aj, −A − Aj, −A + Aj, A − Aj, −A + Aj, −A + Aj, −A + Aj, −A − Aj, −A + Aj, A + Aj, A + Aj, A − Aj, A − Aj, A − Aj, −A + Aj, A + Aj, −A + Aj, −A + Aj, A − Aj, A − Aj, A + Aj, A + Aj, −A − Aj, A − Aj, A + Aj, A − Aj, A − Aj, −A + Aj, −A − Aj, −A − Aj, A − Aj, −A + Aj |
| 5 | A + Aj, −A − Aj, A − Aj, −A − Aj, A + Aj, −A + Aj, A − Aj, −A − Aj, −A − Aj, A + Aj, −A − Aj, −A − Aj, A + Aj, A + Aj, −A + Aj, −A − Aj, −A − Aj, −A + Aj, −A − Aj, −A + Aj, −A − Aj, A − Aj, −A + Aj, −A + Aj, A − Aj, −A + Aj, A − Aj, −A − Aj, A + Aj, A − Aj, A + Aj, A + Aj, A + Aj, A + Aj, −A − Aj, −A + Aj, A − Aj, −A + Aj, −A + Aj, −A + Aj, −A − Aj, −A + Aj, A + Aj, A + Aj, A − Aj, A − Aj, A − Aj, −A + Aj, A + Aj, −A + Aj, −A + Aj, A − Aj, A − Aj, A + Aj, A + Aj, −A − Aj, A − Aj, A + Aj, A − Aj, A − Aj, −A + Aj, −A − Aj, −A − Aj, A − Aj, −A + Aj, A − Aj |
| 6 | A + Aj, −A + Aj, A + Aj, −A − Aj, A − Aj, −A + Aj, A + Aj, A + Aj, −A − Aj, A + Aj, A + Aj, −A − Aj, −A − Aj, A − Aj, A + Aj, A + Aj, A − Aj, A + Aj, A − Aj, A + Aj, −A + Aj, A − Aj, A − Aj, −A + Aj, A − Aj, −A + Aj, A + Aj, −A − Aj, −A + Aj, −A − Aj, −A − Aj, −A − Aj, −A − Aj, A + Aj, A − Aj, −A + Aj, A − Aj, A − Aj, A − Aj, A + Aj, A − Aj, −A − Aj, −A − Aj, −A + Aj, −A + Aj, −A + Aj, A − Aj, −A − Aj, A − Aj, A − Aj, −A + Aj, −A + Aj, −A − Aj, −A − Aj, A + Aj, −A + Aj, −A − Aj, −A + Aj, −A + Aj, A − Aj, A + Aj, A + Aj, −A + Aj, A − Aj, −A + Aj, −A − Aj |

TABLE 15-3

| Index | Pilot sequence |
|---|---|
| 1 | −A − Aj, −A + Aj, A − Aj, −A − Aj, A − Aj, −A + Aj, A + Aj, −A − Aj, A − Aj, A − Aj, −A + Aj, A − Aj, A − Aj, −A + Aj, −A + Aj, A + Aj, A − Aj, A − Aj, A + Aj, A − Aj, A + Aj, A − Aj, −A − Aj, A + Aj, A + Aj, −A − Aj, A + Aj, −A − Aj, A − Aj, −A + Aj, −A − Aj, −A + Aj, −A + Aj, −A + Aj, −A + Aj, A − Aj, A + Aj, −A − Aj, A + Aj, A + Aj, A + Aj, A − Aj, A + Aj, −A + Aj, −A + Aj, −A − Aj, −A − Aj, −A − Aj, A + Aj, −A + Aj, A + Aj, A + Aj, −A − Aj, −A − Aj, −A + Aj, −A + Aj, A − Aj, −A − Aj, −A + Aj, −A − Aj, −A − Aj, A + Aj, A − Aj, A − Aj, −A − Aj, A + Aj |
| 2 | −A + Aj, A − Aj, −A − Aj, A − Aj, −A + Aj, A + Aj, −A − Aj, A − Aj, A − Aj, −A + Aj, A − Aj, A − Aj, −A + Aj, −A + Aj, A + Aj, A − Aj, A − Aj, A + Aj, A − Aj, A + Aj, A − Aj, −A − Aj, A + Aj, A + Aj, −A − Aj, A + Aj, −A − Aj, A − Aj, −A + Aj, −A − Aj, −A + Aj, −A + Aj, −A + Aj, −A + Aj, A − Aj, A + Aj, −A − Aj, A + Aj, A + Aj, A + Aj, A − Aj, A + Aj, −A + Aj, −A + Aj, −A − Aj, −A − Aj, −A − Aj, A + Aj, −A + Aj, A + Aj, A + Aj, −A − Aj, −A − Aj, −A + Aj, −A + Aj, A − Aj, −A − Aj, −A + Aj, −A − Aj, −A − Aj, A + Aj, A − Aj, A − Aj, −A − Aj, A + Aj, −A − Aj |
| 3 | −A + Aj, A + Aj, −A + Aj, A − Aj, −A − Aj, A + Aj, −A + Aj, −A + Aj, A − Aj, −A + Aj, −A + Aj, A − Aj, A − Aj, −A − Aj, −A + Aj, −A + Aj, −A − Aj, −A + Aj, −A − Aj, −A + Aj, A + Aj, −A − Aj, −A − Aj, A + Aj, −A − Aj, A + Aj, −A + Aj, A − Aj, A + Aj, A − Aj, A − Aj, A − Aj, A − Aj, −A + Aj, −A − Aj, A + Aj, −A − Aj, −A − Aj, −A − Aj, −A + Aj, −A − Aj, A − Aj, A − Aj, A + Aj, A + Aj, A + Aj, −A − Aj, A − Aj, −A − Aj, −A − Aj, A + Aj, A + Aj, A − Aj, A − Aj, −A + Aj, A + Aj, A − Aj, A + Aj, A + Aj, −A − Aj, −A + Aj, −A + Aj, A + Aj, −A − Aj, A + Aj, A − Aj |
| 4 | A − Aj, −A − Aj, A − Aj, −A + Aj, A + Aj, −A − Aj, A − Aj, A − Aj, −A + Aj, A − Aj, A − Aj, −A + Aj, −A + Aj, A + Aj, A − Aj, A − Aj, A + Aj, A − Aj, A + Aj, A − Aj, −A − Aj, A + Aj, A + Aj, −A − Aj, A + Aj, −A − Aj, A − Aj, −A + Aj, −A − Aj, −A + Aj, −A + Aj, −A + Aj, −A + Aj, A − Aj, A + Aj, −A − Aj, A + Aj, A + Aj, A + Aj, A − Aj, A + Aj, −A + Aj, −A + Aj, −A − Aj, −A − Aj, −A − Aj, A + Aj, −A + Aj, A + Aj, A + Aj, −A − Aj, −A − Aj, −A + Aj, −A + Aj, A − Aj, −A − Aj, −A + Aj, −A − Aj, −A − Aj, A + Aj, A − Aj, A − Aj, −A − Aj, A + Aj, −A − Aj, −A + Aj |
| 5 | A − Aj, −A + Aj, A + Aj, −A + Aj, A − Aj, −A − Aj, A + Aj, −A + Aj, −A + Aj, A − Aj, −A + Aj, −A + Aj, A − Aj, A − Aj, −A − Aj, −A + Aj, −A + Aj, −A − Aj, −A + Aj, −A − Aj, −A + Aj, A + Aj, −A − Aj, −A − Aj, A + Aj, −A − Aj, A + Aj, −A + Aj, A − Aj, A + Aj, A − Aj, A − Aj, A − Aj, A − Aj, −A + Aj, −A − Aj, A + Aj, −A − Aj, −A − Aj, −A − Aj, −A + Aj, −A − Aj, A − Aj, A − Aj, A + Aj, A + Aj, A + Aj, −A − Aj, A − Aj, −A − Aj, −A − Aj, A + Aj, A + Aj, A − Aj, A − Aj, −A + Aj, A + Aj, A − Aj, A + Aj, A + Aj, −A − Aj, −A + Aj, −A + Aj, A + Aj, −A − Aj, A + Aj |
| 6 | A + Aj, A − Aj, −A + Aj, A + Aj, −A + Aj, A − Aj, −A − Aj, A + Aj, −A + Aj, −A + Aj, A − Aj, −A + Aj, −A + Aj, A − Aj, A − Aj, −A − Aj, −A + Aj, −A + Aj, −A − Aj, −A + Aj, −A − Aj, −A + Aj, A + Aj, −A − Aj, −A − Aj, A + Aj, −A − Aj, A + Aj, −A + Aj, A − Aj, A + Aj, A − Aj, A − Aj, A − Aj, A − Aj, −A + Aj, −A − Aj, A + Aj, −A − Aj, −A − Aj, −A − Aj, −A + Aj, −A − Aj, A − Aj, A − Aj, A + Aj, A + Aj, A + Aj, −A − Aj, A − Aj, −A − Aj, −A − Aj, A + Aj, A + Aj, A − Aj, A − Aj, −A + Aj, A + Aj, A − Aj, A + Aj, A + Aj, −A − Aj, −A + Aj, −A + Aj, A + Aj, −A − Aj |

TABLE 15-4

| Index | Pilot sequence |
|---|---|
| 1 | −A − Aj, A − Aj, −A + Aj, A − Aj, A + Aj, A + Aj, −A + Aj, A − Aj, A − Aj, −A − Aj, A − Aj, A + Aj, −A − Aj, −A − Aj, A − Aj, A − Aj, −A + Aj, −A + Aj, −A − Aj, −A + Aj, A − Aj, A − Aj, A − Aj, −A − Aj, −A − Aj, −A + Aj, A + Aj, −A + Aj, −A + Aj, −A + Aj, A − Aj, −A + Aj, A + Aj, −A − Aj, −A − Aj, −A − Aj, −A − Aj, A − Aj, −A − Aj, A + Aj, A − Aj, −A + Aj, A − Aj, −A + Aj, −A + Aj, A − Aj, A + Aj, −A + Aj, A + Aj, −A + Aj, A + Aj, A + Aj, −A + Aj, −A − Aj, −A − Aj, A + Aj, A + Aj, −A − Aj, A + Aj, A + Aj, A − Aj, −A + Aj, −A − Aj, A + Aj, A − Aj, A + Aj |
| 2 | −A + Aj, A − Aj, −A + Aj, −A − Aj, −A − Aj, A − Aj, −A + Aj, −A + Aj, A + Aj, −A + Aj, −A − Aj, A + Aj, A + Aj, −A + Aj, −A + Aj, A − Aj, A − Aj, A + Aj, A − Aj, −A + Aj, −A + Aj, −A + Aj, A + Aj, A + Aj, A − Aj, −A − Aj, A − Aj, A − Aj, A − Aj, −A + Aj, A − Aj, −A − Aj, A + Aj, A + Aj, A + Aj, A + Aj, −A + Aj, A + Aj, −A − Aj, −A + Aj, A − Aj, −A + Aj, A − Aj, A − Aj, −A + Aj, −A − Aj, A − Aj, −A − Aj, A − Aj, −A − Aj, −A − Aj, A − Aj, A + Aj, A + Aj, −A − Aj, −A − Aj, A + Aj, −A − Aj, −A − Aj, −A + Aj, A − Aj, A + Aj, −A − Aj, −A + Aj, −A − Aj, A + Aj |
| 3 | −A + Aj, A − Aj, A + Aj, A + Aj, −A + Aj, A − Aj, A − Aj, −A − Aj, A − Aj, A + Aj, −A − Aj, −A − Aj, A − Aj, A − Aj, −A + Aj, −A + Aj, −A − Aj, −A + Aj, A − Aj, A − Aj, A − Aj, −A − Aj, −A − Aj, −A + Aj, A + Aj, −A + Aj, −A + Aj, −A + Aj, A − Aj, −A + Aj, A + Aj, −A − Aj, −A − Aj, −A − Aj, −A − Aj, A − Aj, −A − Aj, A + Aj, A − Aj, −A + Aj, A − Aj, −A + Aj, −A + Aj, A − Aj, A + Aj, −A + Aj, A + Aj, −A + Aj, A + Aj, A + Aj, −A + Aj, −A − Aj, −A − Aj, A + Aj, A + Aj, −A − Aj, A + Aj, A + Aj, A − Aj, −A + Aj, −A − Aj, A + Aj, A − Aj, A + Aj, −A − Aj, A − Aj |
| 4 | A − Aj, −A + Aj, −A − Aj, −A − Aj, A − Aj, −A + Aj, −A + Aj, A + Aj, −A + Aj, −A − Aj, A + Aj, A + Aj, −A + Aj, −A + Aj, A − Aj, A − Aj, A + Aj, A − Aj, −A + Aj, −A + Aj, −A + Aj, A + Aj, A + Aj, A − Aj, −A − Aj, A − Aj, A − Aj, A − Aj, −A + Aj, A − Aj, −A − Aj, A + Aj, A + Aj, A + Aj, A + Aj, −A + Aj, A + Aj, −A − Aj, −A + Aj, A − Aj, −A + Aj, A − Aj, A − Aj, −A + Aj, −A − Aj, A − Aj, −A − Aj, A − Aj, −A − Aj, −A − Aj, A − Aj, A + Aj, A + Aj, −A − Aj, −A − Aj, A + Aj, −A − Aj, −A − Aj, −A + Aj, A − Aj, A + Aj, −A − Aj, −A + Aj, −A − Aj, A + Aj, −A + Aj |
| 5 | A − Aj, −A + Aj, A − Aj, A + Aj, A + Aj, −A + Aj, A − Aj, A − Aj, −A − Aj, A − Aj, A + Aj, −A − Aj, −A − Aj, A − Aj, A − Aj, −A + Aj, −A + Aj, −A − Aj, −A + Aj, A − Aj, A − Aj, A − Aj, −A − Aj, −A − Aj, −A + Aj, A + Aj, −A + Aj, −A + Aj, −A + Aj, A − Aj, −A + Aj, A + Aj, −A − Aj, −A − Aj, −A − Aj, −A − Aj, A − Aj, −A − Aj, A + Aj, A − Aj, −A + Aj, A − Aj, −A + Aj, −A + Aj, A − Aj, A + Aj, −A + Aj, A + Aj, −A + Aj, A + Aj, A + Aj, −A + Aj, −A − Aj, −A − Aj, A + Aj, A + Aj, −A − Aj, A + Aj, A + Aj, A − Aj, −A + Aj, −A − Aj, A + Aj, A − Aj, A + Aj, −A − Aj |
| 6 | A + Aj, −A + Aj, A − Aj, −A + Aj, −A − Aj, −A − Aj, A − Aj, −A + Aj, −A + Aj, A + Aj, −A + Aj, −A − Aj, A + Aj, A + Aj, −A + Aj, −A + Aj, A − Aj, A − Aj, A + Aj, A − Aj, −A + Aj, −A + Aj, −A + Aj, A + Aj, A + Aj, A − Aj, −A − Aj, A − Aj, A − Aj, A − Aj, −A + Aj, A − Aj, −A − Aj, A + Aj, A + Aj, A + Aj, A + Aj, −A + Aj, A + Aj, −A − Aj, −A + Aj, A − Aj, −A + Aj, A − Aj, A − Aj, −A + Aj, −A − Aj, A − Aj, −A − Aj, A − Aj, −A − Aj, −A − Aj, A − Aj, A + Aj, A + Aj, −A − Aj, −A − Aj, A + Aj, −A − Aj, −A − Aj, −A + Aj, A − Aj, A + Aj, −A − Aj, −A + Aj, −A − Aj |

TABLE 15-5

| Index | Pilot sequence |
|---|---|
| 1 | −A − Aj, A + Aj, −A − Aj, −A + Aj, −A + Aj, A + Aj, −A − Aj, −A − Aj, A − Aj, −A − Aj, −A + Aj, A − Aj, A − Aj, −A − Aj, −A − Aj, A + Aj, A + Aj, A − Aj, A + Aj, −A − Aj, −A − Aj, −A − Aj, A − Aj, A − Aj, A + Aj, −A + Aj, A + Aj, A + Aj, A + Aj, −A − Aj, A + Aj, −A + Aj, A − Aj, A − Aj, A − Aj, A − Aj, −A − Aj, A − Aj, −A + Aj, −A − Aj, A + Aj, −A − Aj, A + Aj, A + Aj, −A − Aj, −A + Aj, A + Aj, −A + Aj, A + Aj, −A + Aj, −A + Aj, A + Aj, A − Aj, A − Aj, −A + Aj, −A + Aj, A − Aj, −A + Aj, −A + Aj, −A − Aj, A + Aj, A − Aj, −A + Aj, −A − Aj, −A + Aj, A − Aj |
| 2 | −A − Aj, A + Aj, A − Aj, A − Aj, −A − Aj, A + Aj, A + Aj, −A + Aj, A + Aj, A − Aj, −A + Aj, −A + Aj, A + Aj, A + Aj, −A − Aj, −A − Aj, −A + Aj, −A − Aj, A + Aj, A + Aj, A + Aj, −A + Aj, −A + Aj, −A − Aj, A − Aj, −A − Aj, −A − Aj, −A − Aj, A + Aj, −A − Aj, A − Aj, −A + Aj, −A + Aj, −A + Aj, −A + Aj, A + Aj, −A + Aj, A − Aj, A + Aj, −A − Aj, A + Aj, −A − Aj, −A − Aj, A + Aj, A − Aj, −A − Aj, A − Aj, −A − Aj, A − Aj, A − Aj, −A − Aj, −A + Aj, −A + Aj, A − Aj, A − Aj, −A + Aj, A − Aj, A − Aj, A + Aj, −A − Aj, −A + Aj, A − Aj, A + Aj, A − Aj, −A + Aj, A + Aj |
| 3 | −A + Aj, A + Aj, −A − Aj, A + Aj, A − Aj, A − Aj, −A − Aj, A + Aj, A + Aj, −A + Aj, A + Aj, A − Aj, −A + Aj, −A + Aj, A + Aj, A + Aj, −A − Aj, −A − Aj, −A + Aj, −A − Aj, A + Aj, A + Aj, A + Aj, −A + Aj, −A + Aj, −A − Aj, A − Aj, −A − Aj, −A − Aj, −A − Aj, A + Aj, −A − Aj, A − Aj, −A + Aj, −A + Aj, −A + Aj, −A + Aj, A + Aj, −A + Aj, A − Aj, A + Aj, −A − Aj, A + Aj, −A − Aj, −A − Aj, A + Aj, A − Aj, −A − Aj, A − Aj, −A − Aj, A − Aj, A − Aj, −A − Aj, −A + Aj, −A + Aj, A − Aj, A − Aj, −A + Aj, A − Aj, A − Aj, A + Aj, −A − Aj, −A + Aj, A − Aj, A + Aj, A − Aj |
| 4 | A − Aj, −A − Aj, A + Aj, −A − Aj, −A + Aj, −A + Aj, A + Aj, −A − Aj, −A − Aj, A − Aj, −A − Aj, −A + Aj, A − Aj, A − Aj, −A − Aj, −A − Aj, A + Aj, A + Aj, A − Aj, A + Aj, −A − Aj, −A − Aj, −A − Aj, A − Aj, A − Aj, A + Aj, −A + Aj, A + Aj, A + Aj, A + Aj, −A − Aj, A + Aj, −A + Aj, A − Aj, A − Aj, A − Aj, A − Aj, −A − Aj, A − Aj, −A + Aj, −A − Aj, A + Aj, −A − Aj, A + Aj, A + Aj, −A − Aj, −A + Aj, A + Aj, −A + Aj, A + Aj, −A + Aj, −A + Aj, A + Aj, A − Aj, A − Aj, −A + Aj, −A + Aj, A − Aj, −A + Aj, −A + Aj, −A − Aj, A + Aj, A − Aj, −A + Aj, −A − Aj, −A + Aj |
| 5 | A + Aj, −A − Aj, −A + Aj, −A + Aj, A + Aj, −A − Aj, −A − Aj, A − Aj, −A − Aj, −A + Aj, A − Aj, A − Aj, −A − Aj, −A − Aj, A + Aj, A + Aj, A − Aj, A + Aj, −A − Aj, −A − Aj, −A − Aj, A − Aj, A − Aj, A + Aj, −A + Aj, A + Aj, A + Aj, A + Aj, −A − Aj, A + Aj, −A + Aj, A − Aj, A − Aj, A − Aj, A − Aj, −A − Aj, A − Aj, −A + Aj, −A − Aj, A + Aj, −A − Aj, A + Aj, A + Aj, −A − Aj, −A + Aj, A + Aj, −A + Aj, A + Aj, −A + Aj, −A + Aj, A + Aj, A − Aj, A − Aj, −A + Aj, −A + Aj, A − Aj, −A + Aj, −A + Aj, −A − Aj, A + Aj, A − Aj, −A + Aj, −A − Aj, −A + Aj, A − Aj, −A − Aj |
| 6 | A + Aj, −A − Aj, A + Aj, A − Aj, A − Aj, −A − Aj, A + Aj, A + Aj, −A + Aj, A + Aj, A − Aj, −A + Aj, −A + Aj, A + Aj, A + Aj, −A − Aj, −A − Aj, −A + Aj, −A − Aj, A + Aj, A + Aj, A + Aj, −A + Aj, −A + Aj, −A − Aj, A − Aj, −A − Aj, −A − Aj, −A − Aj, A + Aj, −A − Aj, A − Aj, −A + Aj, −A + Aj, −A + Aj, −A + Aj, A + Aj, −A + Aj, A − Aj, A + Aj, −A − Aj, A + Aj, −A − Aj, −A − Aj, A + Aj, A − Aj, −A − Aj, A − Aj, −A − Aj, A − Aj, A − Aj, −A − Aj, −A + Aj, −A + Aj, A − Aj, A − Aj, −A + Aj, A − Aj, A − Aj, A + Aj, −A − Aj, −A + Aj, A − Aj, A + Aj, A − Aj, −A + Aj |

(9) When $N_{PS}$=68, if a remainder of $N_{TS}$ divided by 4 is 1, the pilot sequence is one item in Table 16-1. If a remainder of $N_{TS}$ divided by 4 is 3, the pilot sequence is one item in Table 16-1 or Table 16-2.

TABLE 16-1

| Index | Polarization | Pilot sequence |
|---|---|---|
| 1 | Polarization 1 | −A − Aj, −A − Aj, A + Aj, A + Aj, A − Aj, A − Aj, −A + Aj, A + Aj, A − Aj, A + Aj, A + Aj, −A − Aj, −A + Aj, −A + Aj, A + Aj, −A − Aj, A + Aj, A − Aj, A + Aj, −A − Aj, −A + Aj, A − Aj, A − Aj, A + Aj, −A − Aj, A − Aj, A + Aj, −A + Aj, −A − Aj, −A − Aj, A − Aj, A − Aj, −A − Aj, A − Aj, −A − Aj, A + Aj, A − Aj, −A − Aj, −A + Aj, A − Aj, −A + Aj, A − Aj, A + Aj, −A + Aj, A + Aj, −A + Aj, −A + Aj, −A + Aj, −A − Aj, A − Aj, −A + Aj, A − Aj, −A − Aj, −A − Aj, −A − Aj, A − Aj, −A + Aj, −A + Aj, −A + Aj, A + Aj, A + Aj, A − Aj, −A + Aj, −A − Aj, −A − Aj, −A + Aj, A + Aj, A + Aj |
| | Polarization 2 | −A + Aj, −A + Aj, A − Aj, A − Aj, A + Aj, A + Aj, −A − Aj, A − Aj, A + Aj, A − Aj, A − Aj, −A + Aj, −A − Aj, −A − Aj, A − Aj, −A + Aj, A − Aj, A + Aj, A − Aj, −A + Aj, −A − Aj, A + Aj, A + Aj, A − Aj, −A + Aj, A + Aj, A − Aj, −A − Aj, −A + Aj, −A + Aj, A + Aj, A + Aj, −A + Aj, A + Aj, −A + Aj, A − Aj, A + Aj, −A + Aj, −A − Aj, A + Aj, −A − Aj, A + Aj, A − Aj, −A − Aj, A − Aj, −A − Aj, −A − Aj, −A − Aj, −A + Aj, A + Aj, −A − Aj, A + Aj, −A + Aj, −A + Aj, −A + Aj, A + Aj, −A − Aj, −A − Aj, −A − Aj, A − Aj, A − Aj, A + Aj, −A − Aj, −A + Aj, −A + Aj, −A − Aj, A − Aj, A − Aj |
| 2 | Polarization 1 | −A − Aj, −A − Aj, A + Aj, A + Aj, A − Aj, A − Aj, −A + Aj, A + Aj, A − Aj, A + Aj, A + Aj, −A − Aj, −A + Aj, −A + Aj, A + Aj, −A − Aj, A + Aj, A − Aj, A + Aj, −A − Aj, −A + Aj, A − Aj, A − Aj, A + Aj, −A − Aj, A − Aj, A + Aj, −A + Aj, −A − Aj, −A − Aj, A − Aj, A − Aj, −A − Aj, A − Aj, −A − Aj, A + Aj, A − Aj, −A − Aj, −A + Aj, A − Aj, −A + Aj, A − Aj, A + Aj, −A + Aj, A + Aj, −A + Aj, −A + Aj, −A + Aj, −A − Aj, A − Aj, −A + Aj, A − Aj, −A − Aj, −A − Aj, −A − Aj, A − Aj, −A + Aj, −A + Aj, −A + Aj, A + Aj, A + Aj, A − Aj, −A + Aj, −A − Aj, −A − Aj, −A + Aj, A + Aj, A + Aj |
| | Polarization 2 | A − Aj, A − Aj, −A + Aj, −A + Aj, −A − Aj, −A − Aj, A + Aj, −A + Aj, −A − Aj, −A + Aj, −A + Aj, A − Aj, A + Aj, A + Aj, −A + Aj, A − Aj, −A + Aj, −A − Aj, −A + Aj, A − Aj, A + Aj, −A − Aj, −A − Aj, −A + Aj, A − Aj, −A − Aj, −A + Aj, A + Aj, A − Aj, A − Aj, −A − Aj, −A − Aj, A − Aj, −A − Aj, A − Aj, −A + Aj, −A − Aj, A − Aj, A + Aj, −A − Aj, A + Aj, −A − Aj, −A + Aj, A + Aj, −A + Aj, A + Aj, A + Aj, A + Aj, A − Aj, −A − Aj, A + Aj, −A − Aj, A − Aj, A − Aj, A − Aj, −A − Aj, A + Aj, A + Aj, A + Aj, −A + Aj, −A + Aj, −A − Aj, A + Aj, A − Aj, A − Aj, A + Aj, −A + Aj, −A + Aj |
| 3 | Polarization 1 | −A + Aj, −A + Aj, A − Aj, A − Aj, A + Aj, A + Aj, −A − Aj, A − Aj, A + Aj, A − Aj, A − Aj, −A + Aj, −A − Aj, −A − Aj, A − Aj, −A + Aj, A − Aj, A + Aj, A − Aj, −A + Aj, −A − Aj, A + Aj, A + Aj, A − Aj, −A + Aj, A + Aj, A − Aj, −A − Aj, −A + Aj, −A + Aj, A + Aj, A + Aj, −A + Aj, A + Aj, −A + Aj, A − Aj, A + Aj, −A + Aj, −A − Aj, A + Aj, −A − Aj, A + Aj, A − Aj, −A − Aj, A − Aj, −A − Aj, −A − Aj, −A − Aj, −A + Aj, A + Aj, −A − Aj, A + Aj, −A + Aj, −A + Aj, −A + Aj, A + Aj, −A − Aj, −A − Aj, −A − Aj, A − Aj, A − Aj, A + Aj, −A − Aj, −A + Aj, −A + Aj, −A − Aj, A − Aj, A − Aj |
| | Polarization 2 | A + Aj, A + Aj, −A − Aj, −A − Aj, −A + Aj, −A + Aj, A − Aj, −A − Aj, −A + Aj, −A − Aj, −A − Aj, A + Aj, A − Aj, A − Aj, −A − Aj, A + Aj, −A − Aj, −A + Aj, −A − Aj, A + Aj, A − Aj, −A + Aj, −A + Aj, −A − Aj, A + Aj, −A − Aj, A − Aj, A + Aj, A + Aj, −A + Aj, −A + Aj, A + Aj, −A + Aj, A + Aj, −A − Aj, −A + Aj, A + Aj, A − Aj, −A + Aj, A − Aj, −A + Aj, −A − Aj, A − Aj, −A − Aj, A − Aj, A − Aj, A − Aj, A + Aj, −A + Aj, A − Aj, −A + Aj, A + Aj, A + Aj, A + Aj, −A + Aj, A − Aj, A − Aj, A − Aj, −A − Aj, −A − Aj, −A + Aj, A − Aj, A + Aj, A + Aj, A − Aj, −A − Aj, −A − Aj |

TABLE 16-1-continued

| Index | Polarization | Pilot sequence |
|---|---|---|
| 4 | Polarization 1 | A − Aj, A − Aj, −A + Aj, −A + Aj, −A − Aj, −A − Aj, A + Aj, −A + Aj, −A − Aj, −A + Aj, −A + Aj, A − Aj, A + Aj, A + Aj, −A + Aj, A − Aj, −A + Aj, −A − Aj, −A + Aj, A − Aj, A + Aj, −A − Aj, −A − Aj, −A + Aj, A − Aj, −A − Aj, −A + Aj, A + Aj, A − Aj, A − Aj, −A − Aj, −A − Aj, A − Aj, −A − Aj, A − Aj, −A + Aj, −A − Aj, A − Aj, A + Aj, −A − Aj, A + Aj, −A − Aj, −A + Aj, A + Aj, −A + Aj, A + Aj, A + Aj, A + Aj, A − Aj, −A − Aj, A + Aj, −A − Aj, A − Aj, A − Aj, A − Aj, −A − Aj, A + Aj, A + Aj, A + Aj, −A + Aj, −A + Aj, −A − Aj, A + Aj, A − Aj, A − Aj, A + Aj, −A + Aj, −A + Aj |
| | Polarization 2 | A + Aj, A + Aj, −A − Aj, −A − Aj, −A + Aj, −A + Aj, A − Aj, −A − Aj, −A + Aj, −A − Aj, −A − Aj, A + Aj, A − Aj, A − Aj, −A − Aj, A + Aj, −A − Aj, −A + Aj, −A − Aj, A + Aj, A − Aj, −A + Aj, −A + Aj, −A − Aj, A + Aj, −A + Aj, −A − Aj, A − Aj, A + Aj, A + Aj, −A + Aj, −A + Aj, A + Aj, −A + Aj, A + Aj, −A − Aj, −A + Aj, A + Aj, A − Aj, −A + Aj, A − Aj, −A + Aj, −A − Aj, A − Aj, −A − Aj, A − Aj, A − Aj, A − Aj, A + Aj, −A + Aj, A − Aj, −A + Aj, A + Aj, A + Aj, A + Aj, −A + Aj, A − Aj, A − Aj, A − Aj, −A − Aj, −A − Aj, −A + Aj, A − Aj, A + Aj, A + Aj, A − Aj, −A − Aj, −A − Aj |
| 5 | Polarization 1 | −A − Aj, A − Aj, −A − Aj, −A + Aj, −A − Aj, A + Aj, −A − Aj, −A + Aj, −A − Aj, −A + Aj, −A + Aj, −A + Aj, A + Aj, −A − Aj, −A + Aj, A − Aj, −A − Aj, −A + Aj, A − Aj, A − Aj, −A − Aj, A − Aj, −A + Aj, −A + Aj, A − Aj, A − Aj, A − Aj, A + Aj, −A + Aj, A − Aj, A + Aj, A − Aj, −A + Aj, −A − Aj, −A − Aj, −A + Aj, A + Aj, A − Aj, A − Aj, A + Aj, A + Aj, A + Aj, A + Aj, −A + Aj, −A − Aj, −A − Aj, A + Aj, A − Aj, A − Aj, −A + Aj, A − Aj, A + Aj, −A − Aj, −A − Aj, −A − Aj, A + Aj, −A − Aj, A + Aj, −A + Aj, −A + Aj, A − Aj, −A − Aj, A + Aj, A + Aj, A − Aj, A + Aj, A + Aj, −A + Aj |
| | Polarization 2 | −A + Aj, A + Aj, −A + Aj, −A − Aj, −A + Aj, A − Aj, −A + Aj, −A − Aj, −A + Aj, −A − Aj, −A − Aj, −A − Aj, A − Aj, −A + Aj, −A − Aj, A + Aj, −A + Aj, −A − Aj, A + Aj, A + Aj, −A + Aj, A + Aj, −A − Aj, −A − Aj, A + Aj, A + Aj, A + Aj, A − Aj, −A − Aj, A + Aj, A − Aj, A + Aj, −A − Aj, −A + Aj, −A + Aj, −A − Aj, A − Aj, A + Aj, A + Aj, A − Aj, A − Aj, A − Aj, A − Aj, −A − Aj, −A + Aj, −A + Aj, A − Aj, A + Aj, A + Aj, −A − Aj, A + Aj, A − Aj, −A + Aj, −A + Aj, −A + Aj, A − Aj, −A + Aj, A − Aj, −A − Aj, −A − Aj, A + Aj, −A + Aj, A − Aj, A − Aj, A + Aj, A − Aj, A − Aj, −A − Aj |
| 6 | Polarization 1 | −A − Aj, A − Aj, −A − Aj, −A + Aj, −A − Aj, A + Aj, −A − Aj, −A + Aj, −A − Aj, −A + Aj, −A + Aj, −A + Aj, A + Aj, −A − Aj, −A + Aj, A − Aj, −A − Aj, −A + Aj, A − Aj, A − Aj, −A − Aj, A − Aj, −A + Aj, −A + Aj, A − Aj, A − Aj, A − Aj, A + Aj, −A + Aj, A − Aj, A + Aj, A − Aj, −A + Aj, −A − Aj, −A − Aj, −A + Aj, A + Aj, A − Aj, A − Aj, A + Aj, A + Aj, A + Aj, A + Aj, −A + Aj, −A − Aj, −A − Aj, A + Aj, A − Aj, A − Aj, −A + Aj, A − Aj, A + Aj, −A − Aj, −A − Aj, −A − Aj, A + Aj, −A − Aj, A + Aj, −A + Aj, −A + Aj, A − Aj, −A − Aj, A + Aj, A + Aj, A − Aj, A + Aj, A + Aj, −A + Aj |
| | Polarization 2 | A − Aj, −A − Aj, A − Aj, A + Aj, A − Aj, −A + Aj, A − Aj, A + Aj, A − Aj, A + Aj, A + Aj, A + Aj, −A + Aj, A − Aj, A + Aj, −A − Aj, A − Aj, A + Aj, −A − Aj, −A − Aj, A − Aj, −A − Aj, A + Aj, A + Aj, −A − Aj, −A − Aj, −A − Aj, −A + Aj, A + Aj, −A − Aj, −A + Aj, −A − Aj, A + Aj, A − Aj, A − Aj, A + Aj, −A + Aj, −A − Aj, −A − Aj, −A + Aj, −A + Aj, −A + Aj, −A + Aj, A + Aj, A − Aj, A − Aj, −A + Aj, −A − Aj, −A − Aj, A + Aj, −A − Aj, −A + Aj, A − Aj, A − Aj, A − Aj, −A + Aj, A − Aj, −A + Aj, A + Aj, A + Aj, −A − Aj, A − Aj, −A + Aj, −A + Aj, −A − Aj, −A + Aj, −A + Aj, A + Aj |
| 7 | Polarization 1 | −A + Aj, A + Aj, −A + Aj, −A − Aj, −A + Aj, A − Aj, −A + Aj, −A − Aj, −A + Aj, −A − Aj, −A − Aj, −A − Aj, A − Aj, −A + Aj, −A − Aj, A + Aj, −A + Aj, −A − Aj, A + Aj, A + Aj, −A + Aj, A + Aj, −A − Aj, −A − Aj, A + Aj, A + Aj, A + Aj, A − Aj, −A − Aj, A + Aj, A − Aj, A + Aj, −A − Aj, −A + Aj, −A + Aj, −A − Aj, A − Aj, A + Aj, A + Aj, A − Aj, A − Aj, A − Aj, A − Aj, −A − Aj, −A + Aj, −A + Aj, A − Aj, A + Aj, A + Aj, −A − Aj, A + Aj, A − Aj, −A + Aj, −A + Aj, −A + Aj, A − Aj, −A + Aj, A − Aj, −A − Aj, −A − Aj, A + Aj, −A + Aj, A − Aj, A − Aj, A + Aj, A − Aj, A − Aj, −A − Aj |
| | Polarization 2 | A + Aj, −A + Aj, A + Aj, A − Aj, A + Aj, −A − Aj, A + Aj, A − Aj, A + Aj, A − Aj, A − Aj, A − Aj, −A − Aj, A + Aj, A − Aj, −A + Aj, A + Aj, A − Aj, −A + Aj, −A + Aj, A + Aj, −A + Aj, A − Aj, A − Aj, −A + Aj, −A + Aj, −A + Aj, −A − Aj, A − Aj, −A + Aj, −A − Aj, −A + Aj, A − Aj, A + Aj, A + Aj, A − Aj, −A − Aj, −A + Aj, −A + Aj, −A − Aj, −A − Aj, −A − Aj, −A − Aj, A − Aj, A + Aj, A + Aj, −A − Aj, −A + Aj, −A + Aj, A − Aj, −A + Aj, −A − Aj, A + Aj, A + Aj, A + Aj, −A − Aj, A + Aj, −A − Aj, A − Aj, A − Aj, −A + Aj, A + Aj, −A − Aj, −A − Aj, −A + Aj, −A − Aj, −A − Aj, A − Aj A − Aj, −A − Aj, A − Aj, A + Aj, A − Aj, −A + Aj, A − Aj, A + Aj, A − Aj, A + Aj, A + Aj, A + Aj, |
| 8 | Polarization 1 | −A + Aj, A − Aj, A + Aj, −A − Aj, A − Aj, A + Aj, −A − Aj, −A − Aj, A − Aj, −A − Aj, A + Aj, A + Aj, −A − Aj, −A − Aj, −A − Aj, −A + Aj, A + Aj, −A − Aj, −A + Aj, −A − Aj, A + Aj, A − Aj, A − Aj, A + Aj, −A + Aj, −A − Aj, −A − Aj, −A + Aj, −A + Aj, −A + Aj, −A + Aj, A + Aj, A − Aj, A − Aj, −A + Aj, −A − Aj, −A − Aj, A + Aj, −A − Aj, −A + Aj, A − Aj, A − Aj, A − Aj, −A + Aj, A − Aj, −A + Aj, A + Aj, A + Aj, −A − Aj, A − Aj, −A + Aj, −A + Aj, −A − Aj, −A + Aj, −A + Aj, A + Aj A + Aj, −A + Aj, A + Aj, A − Aj, A + Aj, −A − Aj, A + Aj, A − Aj, A + Aj, A − Aj, A − Aj, A − Aj, |
| | Polarization 2 | −A − Aj, A + Aj, A − Aj, −A + Aj, A + Aj, A − Aj, −A + Aj, −A + Aj, A + Aj, −A + Aj, A − Aj, A − Aj, −A + Aj, −A + Aj, −A + Aj, −A − Aj, A − Aj, −A + Aj, −A − Aj, −A + Aj, A − Aj, A + Aj, A + Aj, A − Aj, −A − Aj, −A + Aj, −A + Aj, −A − Aj, −A − Aj, −A − Aj, −A − Aj, A − Aj, A + Aj, A + Aj, −A − Aj, −A + Aj, −A + Aj, A − Aj, −A + Aj, −A − Aj, A + Aj, A + Aj, A + Aj, −A − Aj, A + Aj, −A − Aj, A − Aj, A − Aj, −A + Aj, A + Aj, −A − Aj, −A − Aj, −A + Aj, −A − Aj, −A − Aj, A − Aj −A − Aj, −A + Aj, −A + Aj, A + Aj, −A + Aj, −A + Aj, A − Aj, A + Aj, −A − Aj, −A − Aj, −A + Aj, A − Aj, −A + Aj, A − Aj, A − Aj, A − Aj, −A + Aj, A + Aj, −A − Aj, A + Aj, A + Aj, −A + Aj, A − Aj, |
| 9 | Polarization 1 | A − Aj, −A − Aj, −A + Aj, −A + Aj, −A + Aj, −A + Aj, A + Aj, A + Aj, −A + Aj, −A − Aj, A − Aj, A − Aj, −A − Aj, A + Aj, −A + Aj, A + Aj, −A − Aj, −A + Aj, A + Aj, A + Aj, A + Aj, −A − Aj, −A − Aj, A + Aj, A − Aj, A + Aj, A + Aj, −A − Aj, A − Aj, A + Aj, −A − Aj, A − Aj, −A + Aj, −A − Aj, −A − Aj, −A − Aj, A − Aj, −A − Aj, A − Aj, −A + Aj, A − Aj, −A − Aj, A − Aj, A + Aj, A − Aj −A + Aj, −A − Aj, −A − Aj, A − Aj, −A − Aj, −A − Aj, A + Aj, A − Aj, −A + Aj, −A + Aj, −A − Aj, A + Aj, −A − Aj, A + Aj, A + Aj, A + Aj, −A − Aj, A − Aj, −A + Aj, A − Aj, A − Aj, −A − Aj, A + Aj, |
| | Polarization 2 | A + Aj, −A + Aj, −A − Aj, −A − Aj, −A − Aj, −A − Aj, A − Aj, A − Aj, −A − Aj, −A + Aj, A + Aj, A + Aj, −A + Aj, A − Aj, −A − Aj, A − Aj, −A + Aj, −A − Aj, A − Aj, A − Aj, A − Aj, −A + Aj, −A + Aj, A − Aj, A + Aj, A − Aj, A − Aj, −A + Aj, A + Aj, A − Aj, −A + Aj, A + Aj, −A − Aj, −A + Aj, −A + Aj, −A + Aj, A + Aj, −A + Aj, A + Aj, −A − Aj, A + Aj, −A + Aj, A + Aj, A − Aj, A + Aj −A − Aj, −A + Aj, −A + Aj, A + Aj, −A + Aj, −A + Aj, A − Aj, A + Aj, −A − Aj, −A − Aj, −A + Aj, A − Aj, −A + Aj, A − Aj, A − Aj, A − Aj, −A + Aj, A + Aj, −A − Aj, A + Aj, A + Aj, −A + Aj, A − Aj, |
| 10 | Polarization 1 | A − Aj, −A − Aj, −A + Aj, −A + Aj, −A + Aj, −A + Aj, A + Aj, A + Aj, −A + Aj, −A − Aj, A − Aj, A − Aj, −A − Aj, A + Aj, −A + Aj, A + Aj, −A − Aj, −A + Aj, A + Aj, A + Aj, A + Aj, −A − Aj, −A − Aj, A + Aj, A − Aj, A + Aj, A + Aj, −A − Aj, A − Aj, A + Aj, −A − Aj, A − Aj, −A + Aj, −A − Aj, |

TABLE 16-1-continued

| Index | Polarization | Pilot sequence |
|---|---|---|
| | | −A − Aj, −A − Aj, A − Aj, −A − Aj, A − Aj, −A + Aj, A − Aj, −A − Aj, A − Aj, A + Aj, A − Aj |
| | Polarization 2 | A − Aj, A + Aj, A + Aj, −A + Aj, A + Aj, A + Aj, −A − Aj, −A + Aj, A − Aj, A − Aj, A + Aj, −A − Aj, A + Aj, −A − Aj, −A − Aj, −A − Aj, A + Aj, −A + Aj, A − Aj, −A + Aj, −A + Aj, A + Aj, −A − Aj, −A − Aj, A − Aj, A + Aj, A + Aj, A + Aj, A + Aj, −A + Aj, −A + Aj, A + Aj, A − Aj, −A − Aj, −A − Aj, A − Aj, −A + Aj, A + Aj, −A + Aj, A − Aj, A + Aj, −A + Aj, −A + Aj, −A + Aj, A − Aj, A − Aj, −A + Aj, −A − Aj, −A + Aj, −A + Aj, A − Aj, −A − Aj, −A + Aj, A − Aj, −A − Aj, A + Aj, A − Aj, A − Aj, A − Aj, −A − Aj, A − Aj, −A − Aj, A + Aj, −A − Aj, A − Aj, −A − Aj, −A + Aj, −A − Aj |
| 11 | Polarization 1 | −A + Aj, −A − Aj, −A − Aj, A − Aj, −A − Aj, −A − Aj, A + Aj, A − Aj, −A + Aj, −A + Aj, −A − Aj, A + Aj, −A − Aj, A + Aj, A + Aj, A + Aj, −A − Aj, A − Aj, −A + Aj, A − Aj, A − Aj, −A − Aj, A + Aj, A + Aj, −A + Aj, −A − Aj, −A − Aj, −A − Aj, −A − Aj, A − Aj, A − Aj, −A − Aj, −A + Aj, A + Aj, A + Aj, −A + Aj, A − Aj, −A − Aj, A − Aj, −A + Aj, −A − Aj, A − Aj, A − Aj, A − Aj, −A + Aj, −A + Aj, A − Aj, A + Aj, A − Aj, A − Aj, −A + Aj, A + Aj, A − Aj, −A + Aj, A + Aj, −A − Aj, −A + Aj, −A + Aj, −A + Aj, A + Aj, −A + Aj, A + Aj, −A − Aj, A + Aj, −A + Aj, A + Aj, A − Aj, A + Aj |
| | Polarization 2 | A + Aj, A − Aj, A − Aj, −A − Aj, A − Aj, A − Aj, −A + Aj, −A − Aj, A + Aj, A + Aj, A − Aj, −A + Aj, A − Aj, −A + Aj, −A + Aj, −A + Aj, A − Aj, −A − Aj, A + Aj, −A − Aj, −A − Aj, A − Aj, −A + Aj, −A + Aj, A + Aj, A − Aj, A − Aj, A − Aj, A − Aj, −A − Aj, −A − Aj, A − Aj, A + Aj, −A + Aj, −A + Aj, A + Aj, −A − Aj, A − Aj, −A − Aj, A + Aj, A − Aj, −A − Aj, −A − Aj, −A − Aj, A + Aj, A + Aj, −A − Aj, −A + Aj, −A − Aj, −A − Aj, A + Aj, −A + Aj, −A − Aj, A + Aj, −A + Aj, A − Aj, A + Aj, A + Aj, A + Aj, −A + Aj, A + Aj, −A + Aj, A − Aj, −A + Aj, A + Aj, −A + Aj, −A − Aj, −A + Aj |
| 12 | Polarization 1 | A − Aj, A + Aj, A + Aj, −A + Aj, A + Aj, A + Aj, −A − Aj, −A + Aj, A − Aj, A − Aj, A + Aj, −A − Aj, A + Aj, −A − Aj, −A − Aj, −A − Aj, A + Aj, −A + Aj, A − Aj, −A + Aj, −A + Aj, A + Aj, −A − Aj, −A − Aj, A − Aj, A + Aj, A + Aj, A + Aj, A + Aj, −A + Aj, −A + Aj, A + Aj, A − Aj, −A − Aj, −A − Aj, A − Aj, −A + Aj, A + Aj, −A + Aj, A − Aj, A + Aj, −A + Aj, −A + Aj, −A + Aj, A − Aj, A − Aj, −A + Aj, −A − Aj, −A + Aj, −A + Aj, A − Aj, −A − Aj, −A + Aj, A − Aj, −A − Aj, A + Aj, A − Aj, A − Aj, A − Aj, −A − Aj, A − Aj, −A − Aj, A + Aj, −A − Aj, A − Aj, −A − Aj, −A + Aj, −A − Aj |
| | Polarization 2 | A + Aj, A − Aj, A − Aj, −A − Aj, A − Aj, A − Aj, −A + Aj, −A − Aj, A + Aj, A + Aj, A − Aj, −A + Aj, A − Aj, −A + Aj, −A + Aj, −A + Aj, A − Aj, −A − Aj, A + Aj, −A − Aj, −A − Aj, A − Aj, −A + Aj, −A + Aj, A + Aj, A − Aj, A − Aj, A − Aj, A − Aj, −A − Aj, −A − Aj, A − Aj, A + Aj, −A + Aj, −A + Aj, A + Aj, −A − Aj, A − Aj, −A − Aj, A + Aj, A − Aj, −A − Aj, −A − Aj, −A − Aj, A + Aj, A + Aj, −A − Aj, −A + Aj, −A − Aj, −A − Aj, A + Aj, −A + Aj, −A − Aj, A + Aj, −A + Aj, A − Aj, A + Aj, A + Aj, A + Aj, −A + Aj, A + Aj, −A + Aj, A − Aj, −A + Aj, A + Aj, −A + Aj, −A − Aj, −A + Aj |
| 13 | Polarization 1 | −A − Aj, −A + Aj, −A − Aj, A − Aj, −A + Aj, −A − Aj, −A + Aj, A − Aj, A − Aj, A + Aj, −A + Aj, A − Aj, A − Aj, A + Aj, A − Aj, −A − Aj, A + Aj, −A + Aj, A − Aj, −A − Aj, A − Aj, A + Aj, −A + Aj, A + Aj, −A + Aj, A + Aj, −A + Aj, −A − Aj, A + Aj, −A + Aj, −A + Aj, −A + Aj, −A + Aj, −A − Aj, A + Aj, A + Aj, −A − Aj, −A − Aj, −A − Aj, −A − Aj, A + Aj, A − Aj, −A + Aj, A − Aj, −A − Aj, −A − Aj, −A + Aj, A − Aj, A + Aj, A + Aj, A + Aj, −A − Aj, −A − Aj, A + Aj, A − Aj, A − Aj, −A − Aj, −A + Aj, A − Aj, −A + Aj, A − Aj, A − Aj, −A + Aj, −A − Aj, A + Aj, A + Aj, A + Aj, A − Aj |
| | Polarization 2 | A − Aj, A + Aj, A + Aj, −A − Aj, −A + Aj, A + Aj, −A − Aj, −A − Aj, A − Aj, −A + Aj, A − Aj, A + Aj, −A + Aj, A − Aj, −A + Aj, −A + Aj, A + Aj, A − Aj, A + Aj, −A + Aj, A + Aj, A − Aj, −A + Aj, −A − Aj, A − Aj, A + Aj, −A + Aj, −A − Aj, A + Aj, A − Aj, A + Aj, −A − Aj, A + Aj, −A − Aj, A + Aj, A − Aj, A − Aj, A + Aj, A + Aj, A + Aj, A + Aj, A − Aj, A − Aj, −A − Aj, A − Aj, −A − Aj, −A − Aj, −A − Aj, A − Aj, −A + Aj, −A + Aj, −A + Aj, −A − Aj, −A − Aj, −A + Aj, −A + Aj, A − Aj, −A − Aj, −A − Aj, A − Aj, −A − Aj, A − Aj, −A + Aj, A + Aj, −A − Aj, −A + Aj, −A + Aj, −A + Aj |
| 14 | Polarization 1 | −A + Aj, A + Aj, A + Aj, A + Aj, −A − Aj, A − Aj, −A + Aj, −A + Aj, A − Aj, −A + Aj, A − Aj, −A − Aj, −A + Aj, −A + Aj, A + Aj, −A − Aj, −A − Aj, A + Aj, A + Aj, A + Aj, −A + Aj, A − Aj, −A − Aj, −A − Aj, −A + Aj, A − Aj, −A + Aj, A + Aj, −A − Aj, −A − Aj, −A − Aj, −A − Aj, A + Aj, A + Aj, −A − Aj, A − Aj, A − Aj, A − Aj, A − Aj, A + Aj, −A − Aj, A − Aj, A + Aj, A − Aj, A + Aj, A − Aj, A + Aj, −A + Aj, −A − Aj, −A + Aj, A − Aj, A + Aj, −A − Aj, −A + Aj, A + Aj, −A + Aj, −A + Aj, A − Aj, A + Aj, −A + Aj, −A + Aj, A − Aj, −A − Aj, A − Aj, −A + Aj, −A − Aj, A − Aj, −A − Aj |
| | Polarization 2 | A − Aj, A − Aj, A − Aj, −A − Aj, A + Aj, A − Aj, −A + Aj, −A − Aj, −A + Aj, −A − Aj, −A − Aj, −A + Aj, A − Aj, A − Aj, −A − Aj, −A − Aj, A − Aj, A − Aj, A − Aj, −A + Aj, −A − Aj, −A − Aj, −A − Aj, −A + Aj, −A − Aj, −A + Aj, −A + Aj, A + Aj, A + Aj, A + Aj, A + Aj, −A + Aj, −A + Aj, A + Aj, −A − Aj, A + Aj, −A − Aj, A + Aj, −A + Aj, A + Aj, −A − Aj, A − Aj, A + Aj, −A + Aj, −A − Aj, A − Aj, −A + Aj, A + Aj, A − Aj, A + Aj, −A + Aj, A + Aj, A − Aj, A − Aj, −A + Aj, A − Aj, A + Aj, −A + Aj, A − Aj, −A + Aj, −A − Aj, −A − Aj, A + Aj, A − Aj, −A − Aj, A + Aj, A + Aj, −A + Aj −A − Aj, −A − Aj, A + Aj, A + Aj, A − Aj, A − Aj, −A + Aj, A + Aj, A − Aj, A + Aj, A + Aj, −A − Aj, −A + Aj, −A + Aj, A + Aj, −A − Aj, A + Aj, A − Aj, A + Aj, −A − Aj, −A + Aj, A − Aj, A − Aj, |

TABLE 16-2

| Index | Polarization | Pilot sequence |
|---|---|---|
| 1 | Polarization 1 | −A − Aj, −A + Aj, A + Aj, A + Aj, −A + Aj, −A − Aj, A + Aj, A + Aj, −A + Aj, A + Aj, A − Aj, −A − Aj, A − Aj, A + Aj, A − Aj, −A + Aj, A + Aj, −A + Aj, A − Aj, −A − Aj, A + Aj, −A + Aj, −A + Aj, A − Aj, −A + Aj, −A + Aj, A − Aj, A − Aj, −A − Aj, −A + Aj, −A + Aj, −A − Aj, −A + Aj, −A − Aj, −A + Aj, A + Aj, −A − Aj, −A − Aj, A + Aj, −A − Aj, A + Aj, −A + Aj, A − Aj, A + Aj, A − Aj, A − Aj, A − Aj, A − Aj, −A + Aj, −A − Aj, A + Aj, −A − Aj, −A − Aj, −A − Aj, −A + Aj, −A − Aj, A − Aj, A − Aj, A + Aj, A + Aj, A + Aj, −A − Aj, A − Aj, −A − Aj, −A − Aj, A + Aj, A + Aj, A − Aj |
| | Polarization 2 | −A + Aj, −A − Aj, A − Aj, A − Aj, −A − Aj, −A + Aj, A − Aj, A − Aj, −A − Aj, A − Aj, A + Aj, −A + Aj, A + Aj, A − Aj, A + Aj, −A − Aj, A − Aj, −A − Aj, A + Aj, −A + Aj, A − Aj, −A − Aj, −A − Aj, A + Aj, −A − Aj, −A − Aj, A + Aj, A + Aj, −A + Aj, −A − Aj, −A − Aj, −A + Aj, −A − Aj, −A + Aj, −A − Aj, A − Aj, −A + Aj, −A + Aj, A − Aj, −A + Aj, A − Aj, −A − Aj, A + Aj, A − Aj, A + Aj, A + Aj, A + Aj, A + Aj, −A − Aj, |

TABLE 16-2-continued

| Index | Polarization | Pilot sequence |
|---|---|---|
| | | −A + Aj, A − Aj, −A + Aj, −A + Aj, −A + Aj, −A − Aj, −A + Aj, A + Aj, A + Aj, A − Aj, A − Aj, A − Aj, −A + Aj, A + Aj, −A + Aj, −A + Aj, A − Aj, A − Aj, A + Aj |
| 2 | Polarization 1 | −A − Aj, −A + Aj, A + Aj, A + Aj, −A + Aj, −A − Aj, A + Aj, A + Aj, −A + Aj, A + Aj, A − Aj, −A − Aj, A − Aj, A + Aj, A − Aj, −A + Aj, A + Aj, −A + Aj, A − Aj, −A − Aj, A + Aj, −A + Aj, −A + Aj, A − Aj, −A + Aj, −A + Aj, A − Aj, A − Aj, −A − Aj, −A + Aj, −A + Aj, −A − Aj, −A + Aj, −A − Aj, −A + Aj, A + Aj, −A − Aj, −A − Aj, A + Aj, −A − Aj, A + Aj, −A + Aj, A − Aj, A + Aj, A − Aj, A − Aj, A − Aj, A − Aj, −A + Aj, −A − Aj, A + Aj, −A − Aj, −A − Aj, −A − Aj, −A + Aj, −A − Aj, A − Aj, A − Aj, A + Aj, A + Aj, A + Aj, −A − Aj, A − Aj, −A − Aj, −A − Aj, A + Aj, A + Aj, A − Aj |
| | Polarization 2 | A − Aj, A + Aj, −A + Aj, −A + Aj, A + Aj, A − Aj, −A + Aj, −A + Aj, A + Aj, −A + Aj, −A − Aj, A − Aj, −A − Aj, −A + Aj, −A − Aj, A + Aj, −A + Aj, A + Aj, −A − Aj, A − Aj, −A + Aj, A + Aj, A + Aj, −A − Aj, A + Aj, A + Aj, −A − Aj, −A − Aj, A − Aj, A + Aj, A + Aj, A − Aj, A + Aj, A − Aj, A + Aj, −A + Aj, A − Aj, A − Aj, −A + Aj, A − Aj, −A + Aj, A + Aj, −A − Aj, −A + Aj, −A − Aj, −A − Aj, −A − Aj, −A − Aj, A + Aj, A − Aj, −A + Aj, A − Aj, A − Aj, A − Aj, A + Aj, A − Aj, −A − Aj, −A − Aj, −A + Aj, −A + Aj, −A + Aj, A − Aj, −A − Aj, A − Aj, A − Aj, −A + Aj, −A + Aj, −A − Aj |
| 3 | Polarization 1 | A + Aj, A − Aj, −A − Aj, −A − Aj, A − Aj, A + Aj, −A − Aj, −A − Aj, A − Aj, −A − Aj, −A + Aj, A + Aj, −A + Aj, −A − Aj, −A + Aj, A − Aj, −A − Aj, A − Aj, −A + Aj, A + Aj, −A − Aj, A − Aj, A − Aj, −A + Aj, A − Aj, A − Aj, −A + Aj, −A + Aj, A + Aj, A − Aj, A − Aj, A + Aj, A − Aj, A + Aj, A − Aj, −A − Aj, A + Aj, A + Aj, −A − Aj, A + Aj, −A − Aj, A − Aj, −A + Aj, −A − Aj, −A + Aj, −A + Aj, −A + Aj, −A + Aj, A − Aj, A + Aj, −A − Aj, A + Aj, A + Aj, A + Aj, A − Aj, A + Aj, −A + Aj, −A + Aj, −A − Aj, −A − Aj, −A − Aj, A + Aj, −A + Aj, A + Aj, A + Aj, −A − Aj, −A − Aj, −A + Aj |
| | Polarization 2 | −A + Aj, −A − Aj, A − Aj, A − Aj, −A − Aj, −A + Aj, A − Aj, A − Aj, −A − Aj, A − Aj, A + Aj, −A + Aj, A + Aj, A − Aj, A + Aj, −A − Aj, A − Aj, −A − Aj, A + Aj, −A + Aj, A − Aj, −A − Aj, −A − Aj, A + Aj, −A − Aj, −A − Aj, A + Aj, A + Aj, −A + Aj, −A − Aj, −A − Aj, −A + Aj, −A − Aj, −A + Aj, −A − Aj, A − Aj, −A + Aj, −A + Aj, A − Aj, −A + Aj, A − Aj, −A − Aj, A + Aj, A − Aj, A + Aj, A + Aj, A + Aj, A + Aj, −A − Aj, −A + Aj, A − Aj, −A + Aj, −A + Aj, −A + Aj, −A − Aj, −A + Aj, A + Aj, A + Aj, A − Aj, A − Aj, A − Aj, −A + Aj, A + Aj, −A + Aj, −A + Aj, A − Aj, A − Aj, A + Aj |
| 4 | Polarization 1 | A + Aj, A − Aj, −A − Aj, −A − Aj, A − Aj, A + Aj, −A − Aj, −A − Aj, A − Aj, −A − Aj, −A + Aj, A + Aj, −A + Aj, −A − Aj, −A + Aj, A − Aj, −A − Aj, A − Aj, −A + Aj, A + Aj, −A − Aj, A − Aj, A − Aj, −A + Aj, A − Aj, A − Aj, −A + Aj, −A + Aj, A + Aj, A − Aj, A − Aj, A + Aj, A − Aj, A + Aj, A − Aj, −A − Aj, A + Aj, A + Aj, −A − Aj, A + Aj, −A − Aj, A − Aj, −A + Aj, −A − Aj, −A + Aj, −A + Aj, −A + Aj, −A + Aj, A − Aj, A + Aj, −A − Aj, A + Aj, A + Aj, A + Aj, A − Aj, A + Aj, −A + Aj, −A + Aj, −A − Aj, −A − Aj, −A − Aj, A + Aj, −A + Aj, A + Aj, A + Aj, −A − Aj, −A − Aj, −A + Aj |
| | Polarization 2 | A − Aj, A + Aj, −A + Aj, −A + Aj, A + Aj, A − Aj, −A + Aj, −A + Aj, A + Aj, −A + Aj, −A − Aj, A − Aj, −A − Aj, −A + Aj, −A − Aj, A + Aj, −A + Aj, A + Aj, −A − Aj, A − Aj, −A + Aj, A + Aj, A + Aj, −A − Aj, A + Aj, A + Aj, −A − Aj, −A − Aj, A − Aj, A + Aj, A + Aj, A − Aj, A + Aj, A − Aj, A + Aj, −A + Aj, A − Aj, A − Aj, −A + Aj, A − Aj, −A + Aj, A + Aj, −A − Aj, −A + Aj, −A − Aj, −A − Aj, −A − Aj, −A − Aj, A + Aj, A − Aj, −A + Aj, A − Aj, A − Aj, A − Aj, A + Aj, A − Aj, −A − Aj, −A − Aj, −A + Aj, −A + Aj, −A + Aj, A − Aj, −A − Aj, A − Aj, A − Aj, −A + Aj, −A + Aj, −A − Aj |
| 5 | Polarization 1 | −A + Aj, A + Aj, A + Aj, −A − Aj, −A − Aj, −A + Aj, −A − Aj, A + Aj, A + Aj, A + Aj, −A + Aj, −A + Aj, −A − Aj, A − Aj, −A − Aj, −A − Aj, −A − Aj, A + Aj, −A − Aj, A − Aj, −A + Aj, −A + Aj, −A + Aj, −A + Aj, A + Aj, −A + Aj, A − Aj, A + Aj, −A − Aj, A + Aj, −A − Aj, −A − Aj, A + Aj, A − Aj, −A − Aj, A − Aj, −A − Aj, A − Aj, A − Aj, −A − Aj, −A + Aj, −A + Aj, A − Aj, A − Aj, −A + Aj, A − Aj, A − Aj, A + Aj, −A − Aj, −A + Aj, A − Aj, A + Aj, A − Aj, −A + Aj, A + Aj, −A + Aj, −A − Aj, −A + Aj, A + Aj, A − Aj, A + Aj, A + Aj, −A − Aj, A − Aj, A + Aj, A + Aj, A − Aj, −A − Aj |
| | Polarization 2 | −A − Aj, A − Aj, A − Aj, −A + Aj, −A + Aj, −A − Aj, −A + Aj, A − Aj, A − Aj, A − Aj, −A − Aj, −A − Aj, −A + Aj, A + Aj, −A + Aj, −A + Aj, −A + Aj, A − Aj, −A + Aj, A + Aj, −A − Aj, −A − Aj, −A − Aj, −A − Aj, A − Aj, −A − Aj, A + Aj, A − Aj, −A + Aj, A − Aj, −A + Aj, −A + Aj, A − Aj, A + Aj, −A + Aj, A + Aj, −A + Aj, A + Aj, A + Aj, −A + Aj, −A − Aj, −A − Aj, A + Aj, A + Aj, −A − Aj, A + Aj, A + Aj, A − Aj, −A + Aj, −A − Aj, A + Aj, A − Aj, A + Aj, −A − Aj, A − Aj, −A − Aj, −A + Aj, −A − Aj, A − Aj, A + Aj, A − Aj, A − Aj, −A + Aj, A + Aj, A − Aj, A − Aj, A + Aj, −A + Aj |
| 6 | Polarization 1 | −A + Aj, A + Aj, A + Aj, −A − Aj, −A − Aj, −A + Aj, −A − Aj, A + Aj, A + Aj, A + Aj, −A + Aj, −A + Aj, −A − Aj, A − Aj, −A − Aj, −A − Aj, −A − Aj, A + Aj, −A − Aj, A − Aj, −A + Aj, −A + Aj, −A + Aj, −A + Aj, A + Aj, −A + Aj, A − Aj, A + Aj, −A − Aj, A + Aj, −A − Aj, −A − Aj, A + Aj, A − Aj, −A − Aj, A − Aj, −A − Aj, A − Aj, A − Aj, −A − Aj, −A + Aj, −A + Aj, A − Aj, A − Aj, −A + Aj, A − Aj, A − Aj, A + Aj, −A − Aj, −A + Aj, A − Aj, A + Aj, A − Aj, −A + Aj, A + Aj, −A + Aj, −A − Aj, −A + Aj, A + Aj, A − Aj, A + Aj, A + Aj, −A − Aj, A − Aj, A + Aj, A + Aj, A − Aj, −A − Aj |
| | Polarization 2 | A + Aj, −A + Aj, −A + Aj, A − Aj, A − Aj, A + Aj, A − Aj, −A + Aj, −A + Aj, −A + Aj, A + Aj, A + Aj, A − Aj, −A − Aj, A − Aj, A − Aj, A − Aj, −A + Aj, A − Aj, −A − Aj, A + Aj, A + Aj, A + Aj, A + Aj, −A + Aj, A + Aj, −A − Aj, −A + Aj, A − Aj, −A + Aj, A − Aj, A − Aj, −A + Aj, −A − Aj, A − Aj, −A − Aj, A − Aj, −A − Aj, −A − Aj, A − Aj, A + Aj, A + Aj, −A − Aj, −A − Aj, A + Aj, −A − Aj, −A − Aj, −A + Aj, A − Aj, A + Aj, −A − Aj, −A + Aj, −A − Aj, A + Aj, −A + Aj, A + Aj, A − Aj, A + Aj, −A + Aj, −A − Aj, −A + Aj, −A + Aj, A − Aj, −A − Aj, −A + Aj, −A + Aj, −A − Aj, A − Aj |
| 7 | Polarization 1 | A − Aj, −A − Aj, −A − Aj, A + Aj, A + Aj, A − Aj, A + Aj, −A − Aj, −A − Aj, −A − Aj, A − Aj, A − Aj, A + Aj, −A + Aj, A + Aj, A + Aj, A + Aj, −A − Aj, A + Aj, −A + Aj, A − Aj, A − Aj, A − Aj, A − Aj, −A − Aj, A − Aj, −A + Aj, −A − Aj, A + Aj, −A − Aj, A + Aj, A + Aj, −A − Aj, −A + Aj, A + Aj, −A + Aj, A + Aj, −A + Aj, −A + Aj, |

TABLE 16-2-continued

| Index | Polarization | Pilot sequence |
|---|---|---|
| | | A + Aj, A − Aj, A − Aj, −A + Aj, −A + Aj, A − Aj, −A + Aj, −A + Aj, −A − Aj, A + Aj, A − Aj, −A + Aj, −A − Aj, −A + Aj, A − Aj, −A − Aj, A − Aj, A + Aj, A − Aj, −A − Aj, −A + Aj, −A − Aj, −A − Aj, A + Aj, −A + Aj, −A − Aj, −A − Aj, −A + Aj, A + Aj |
| | Polarization 2 | −A − Aj, A − Aj, A − Aj, −A + Aj, −A + Aj, −A − Aj, −A + Aj, A − Aj, A − Aj, A − Aj, −A − Aj, −A − Aj, −A + Aj, A + Aj, −A + Aj, −A + Aj, −A + Aj, A − Aj, −A + Aj, A + Aj, −A − Aj, −A − Aj, −A − Aj, −A − Aj, A − Aj, −A − Aj, A + Aj, A − Aj, −A + Aj, A − Aj, −A + Aj, −A + Aj, A − Aj, A + Aj, −A + Aj, A + Aj, −A + Aj, A + Aj, A + Aj, −A + Aj, −A − Aj, −A − Aj, A + Aj, A + Aj, −A − Aj, A + Aj, A + Aj, A − Aj, −A + Aj, −A − Aj, A + Aj, A − Aj, A + Aj, −A − Aj, A − Aj, −A − Aj, −A + Aj, −A − Aj, A − Aj, A + Aj, A − Aj, A − Aj, −A + Aj, A + Aj, A − Aj, A − Aj, A + Aj, −A + Aj |
| 8 | Polarization 1 | A − Aj, −A − Aj, −A − Aj, A + Aj, A + Aj, A − Aj, A + Aj, −A − Aj, −A − Aj, −A − Aj, A − Aj, A − Aj, A + Aj, −A + Aj, A + Aj, A + Aj, A + Aj, −A − Aj, A + Aj, −A + Aj, A − Aj, A − Aj, A − Aj, A − Aj, −A − Aj, A − Aj, −A + Aj, −A − Aj, A + Aj, −A − Aj, A + Aj, A + Aj, −A − Aj, −A + Aj, A + Aj, −A + Aj, A + Aj, −A + Aj, −A + Aj, A + Aj, A − Aj, A − Aj, −A + Aj, −A + Aj, A − Aj, −A + Aj, −A + Aj, −A − Aj, A + Aj, A − Aj, −A + Aj, −A − Aj, −A + Aj, A − Aj, −A − Aj, A − Aj, A + Aj, A − Aj, −A − Aj, −A + Aj, −A − Aj, −A − Aj, A + Aj, −A + Aj, −A − Aj, −A − Aj, −A + Aj, A + Aj |
| | Polarization 2 | A + Aj, −A + Aj, −A + Aj, A − Aj, A − Aj, A + Aj, A − Aj, −A + Aj, −A + Aj, −A + Aj, A + Aj, A + Aj, A − Aj, −A − Aj, A − Aj, A − Aj, A − Aj, −A + Aj, A − Aj, −A − Aj, A + Aj, A + Aj, A + Aj, A + Aj, −A + Aj, A + Aj, −A − Aj, −A + Aj, A − Aj, −A + Aj, A − Aj, A − Aj, −A + Aj, −A − Aj, A − Aj, −A − Aj, A − Aj, −A − Aj, −A − Aj, A − Aj, A + Aj, A + Aj, −A − Aj, −A − Aj, A + Aj, −A − Aj, −A − Aj, −A + Aj, A − Aj, A + Aj, −A − Aj, −A + Aj, −A − Aj, A + Aj, −A + Aj, A + Aj, A − Aj, A + Aj, −A + Aj, −A − Aj, −A + Aj, −A + Aj, A − Aj, −A − Aj, −A + Aj, −A + Aj, −A − Aj, A − Aj |
| 9 | Polarization 1 | −A − Aj, −A + Aj, −A + Aj, A − Aj, −A − Aj, A + Aj, −A + Aj, −A + Aj, A − Aj, −A + Aj, A − Aj, −A + Aj, A − Aj, A + Aj, A + Aj, −A − Aj, A + Aj, A + Aj, −A − Aj, −A − Aj, A − Aj, −A − Aj, A − Aj, −A − Aj, −A − Aj, A − Aj, −A + Aj, −A − Aj, A − Aj, −A + Aj, A + Aj, −A + Aj, −A − Aj, A − Aj, A + Aj, A + Aj, −A + Aj, −A + Aj, −A + Aj, −A + Aj, −A + Aj, A − Aj, −A − Aj, A − Aj, A − Aj, −A − Aj, A − Aj, −A − Aj, A + Aj, −A − Aj, A + Aj, −A − Aj, −A − Aj, A + Aj, −A + Aj, A − Aj, A + Aj, −A + Aj, −A − Aj, A + Aj, A − Aj, A + Aj, A − Aj, −A − Aj, A + Aj, A + Aj, A + Aj, A + Aj |
| | Polarization 2 | −A + Aj, A − Aj, −A − Aj, A − Aj, −A + Aj, A − Aj, −A − Aj, −A − Aj, −A + Aj, A − Aj, −A + Aj, A + Aj, A + Aj, −A − Aj, A − Aj, A − Aj, −A − Aj, A + Aj, A + Aj, A − Aj, −A − Aj, A − Aj, −A + Aj, −A + Aj, A − Aj, A − Aj, −A + Aj, −A − Aj, A + Aj, −A + Aj, −A − Aj, A + Aj, −A + Aj, −A + Aj, −A − Aj, −A − Aj, −A + Aj, −A + Aj, −A + Aj, −A − Aj, −A − Aj, A − Aj, A + Aj, A + Aj, −A − Aj, A − Aj, −A − Aj, −A + Aj, −A − Aj, A + Aj, −A + Aj, A + Aj, −A + Aj, A + Aj, −A + Aj, A − Aj, A − Aj, A + Aj, A − Aj, A − Aj, A + Aj, A + Aj, A − Aj, −A − Aj, −A + Aj, A + Aj, A + Aj, A − Aj |
| 10 | Polarization 1 | A + Aj, −A − Aj, −A + Aj, −A + Aj, A − Aj, −A − Aj, A + Aj, −A + Aj, −A + Aj, A − Aj, −A + Aj, A − Aj, −A + Aj, A − Aj, A + Aj, A + Aj, −A − Aj, A + Aj, A + Aj, −A − Aj, −A − Aj, A − Aj, −A − Aj, A − Aj, −A − Aj, −A − Aj, A − Aj, −A + Aj, −A − Aj, A − Aj, −A + Aj, A + Aj, −A + Aj, −A − Aj, A − Aj, A + Aj, A + Aj, −A + Aj, −A + Aj, −A + Aj, −A + Aj, −A + Aj, A − Aj, −A − Aj, A − Aj, A − Aj, −A − Aj, A − Aj, −A − Aj, A + Aj, −A − Aj, A + Aj, −A − Aj, −A − Aj, A + Aj, −A + Aj, A − Aj, A + Aj, −A + Aj, −A − Aj, A + Aj, A − Aj, A + Aj, A − Aj, −A − Aj, A + Aj, A + Aj, A + Aj |
| | Polarization 2 | −A + Aj, A − Aj, −A − Aj, A − Aj, −A + Aj, A − Aj, −A − Aj, −A − Aj, −A + Aj, A − Aj, −A + Aj, A + Aj, A + Aj, −A − Aj, A − Aj, A − Aj, −A − Aj, A + Aj, A + Aj, A − Aj, −A − Aj, A − Aj, −A + Aj, −A + Aj, A − Aj, A − Aj, −A + Aj, −A − Aj, A + Aj, −A + Aj, −A − Aj, A + Aj, −A + Aj, −A + Aj, −A − Aj, −A − Aj, −A + Aj, −A + Aj, −A + Aj, −A − Aj, −A − Aj, A − Aj, A + Aj, A + Aj, −A − Aj, A − Aj, −A − Aj, −A + Aj, −A − Aj, A + Aj, −A + Aj, A + Aj, −A + Aj, A + Aj, −A + Aj, A − Aj, A − Aj, A + Aj, A − Aj, A − Aj, A + Aj, A + Aj, A − Aj, −A − Aj, −A + Aj, A + Aj, A + Aj, A − Aj |
| 11 | Polarization 1 | A + Aj, −A − Aj, −A + Aj, −A − Aj, A − Aj, A + Aj, −A + Aj, A − Aj, −A + Aj, −A − Aj, A + Aj, −A + Aj, −A − Aj, −A − Aj, A + Aj, −A + Aj, −A − Aj, −A + Aj, −A + Aj, A + Aj, A + Aj, A − Aj, A + Aj, A + Aj, A + Aj, A + Aj, −A − Aj, −A − Aj, A + Aj, A − Aj, A − Aj, −A + Aj, A + Aj, A + Aj, −A − Aj, A − Aj, A + Aj, −A − Aj, A + Aj, A − Aj, A − Aj, A + Aj, −A − Aj, −A − Aj, −A − Aj, A − Aj, −A + Aj, −A − Aj, A + Aj, −A − Aj, A − Aj, A − Aj, −A − Aj, A − Aj, A − Aj, −A + Aj, −A + Aj, A − Aj, −A − Aj, −A + Aj, A + Aj, A − Aj, −A + Aj, A − Aj, −A − Aj, −A + Aj, −A + Aj, −A + Aj |
| | Polarization 2 | −A − Aj, A − Aj, A − Aj, A + Aj, A + Aj, A + Aj, A − Aj, A − Aj, A − Aj, −A − Aj, −A + Aj, −A − Aj, −A + Aj, A + Aj, A − Aj, A + Aj, −A + Aj, A + Aj, −A + Aj, −A + Aj, A + Aj, A − Aj, A − Aj, A − Aj, A + Aj, −A − Aj, −A + Aj, A − Aj, −A − Aj, A − Aj, A + Aj, −A + Aj, −A − Aj, A − Aj, A + Aj, A + Aj, −A + Aj, A − Aj, −A − Aj, A + Aj, A + Aj, −A − Aj, −A − Aj, −A + Aj, −A + Aj, −A + Aj, −A + Aj, A + Aj, −A + Aj, −A − Aj, A − Aj, −A + Aj, −A − Aj, A − Aj, A − Aj, −A − Aj, −A + Aj, A + Aj, −A − Aj, A − Aj, −A + Aj, −A − Aj, −A + Aj, A + Aj, −A + Aj, A − Aj, −A − Aj, −A − Aj |
| 12 | Polarization 1 | A + Aj, A + Aj, A + Aj, −A − Aj, −A + Aj, A + Aj, −A + Aj, A + Aj, −A − Aj, A − Aj, A + Aj, −A + Aj, A − Aj, A + Aj, −A − Aj, −A − Aj, A + Aj, −A − Aj, A + Aj, −A − Aj, −A + Aj, −A − Aj, −A + Aj, −A + Aj, −A − Aj, −A + Aj, A − Aj, A − Aj, A − Aj, A − Aj, A − Aj, A + Aj, A + Aj, −A + Aj, −A − Aj, A − Aj, A + Aj, A − Aj, −A + Aj, −A − Aj, A − Aj, −A + Aj, −A − Aj, −A − Aj, −A + Aj, −A − Aj, −A + Aj, −A − Aj, −A − Aj, A + Aj, A + Aj, −A − Aj, A + Aj, A + Aj, −A + Aj, A − Aj, −A + Aj, A − Aj, −A + Aj, A − Aj, A − Aj, A + Aj, −A − Aj, −A + Aj, A − Aj, A − Aj, −A − Aj, A + Aj |
| | Polarization 2 | −A + Aj, A + Aj, A + Aj, A − Aj, −A − Aj, −A + Aj, A + Aj, A + Aj, −A + Aj, −A + Aj, A + Aj, −A + Aj, −A + Aj, A − Aj, A + Aj, A − Aj, A + Aj, A − Aj, A + Aj, A − Aj, A + Aj, −A − Aj, A − Aj, −A − Aj, −A + Aj, −A − Aj, A + Aj, A + Aj, −A + Aj, −A − Aj, −A − Aj, A − Aj, A − Aj, A − Aj, −A − Aj, −A − Aj, A − Aj, A − Aj, A + Aj, −A − Aj, A − Aj, A + Aj, −A − Aj, A − Aj, −A + Aj, −A + Aj, A − Aj, A − Aj, −A + Aj, −A − Aj, −A + Aj, |

TABLE 16-2-continued

| Index | Polarization | Pilot sequence |
|---|---|---|
| | | A + Aj, A + Aj, −A − Aj, −A + Aj, −A + Aj, −A − Aj, A + Aj, A + Aj, A − Aj, −A + Aj, A − Aj, −A − Aj, −A − Aj, −A + Aj, A − Aj, −A + Aj, −A − Aj, −A + Aj, A − Aj |
| 13 | Polarization 1 | A + Aj, A + Aj, A + Aj, A + Aj, −A − Aj, −A + Aj, A + Aj, −A + Aj, A + Aj, −A − Aj, A − Aj, A + Aj, −A + Aj, A − Aj, A + Aj, −A − Aj, −A − Aj, A + Aj, −A − Aj, A + Aj, −A − Aj, −A + Aj, −A − Aj, −A + Aj, −A + Aj, −A − Aj, −A + Aj, A − Aj, A − Aj, A − Aj, A − Aj, A − Aj, A + Aj, A + Aj, −A + Aj, −A − Aj, A − Aj, A + Aj, A − Aj, −A + Aj, −A − Aj, A − Aj, −A + Aj, −A − Aj, −A − Aj, −A + Aj, −A − Aj, −A + Aj, −A − Aj, −A − Aj, A + Aj, A + Aj, −A − Aj, A + Aj, A + Aj, −A + Aj, A − Aj, −A + Aj, A − Aj, −A + Aj, A − Aj, A − Aj, A + Aj, −A − Aj, −A + Aj, A − Aj, A − Aj, −A − Aj |
| | Polarization 2 | −A + Aj, A + Aj, A + Aj, A − Aj, −A − Aj, −A + Aj, A + Aj, A + Aj, −A + Aj, −A + Aj, A + Aj, −A + Aj, −A + Aj, A − Aj, A + Aj, A − Aj, A + Aj, A − Aj, A + Aj, −A − Aj, A − Aj, −A − Aj, −A + Aj, −A − Aj, A + Aj, A + Aj, −A + Aj, −A − Aj, −A − Aj, A − Aj, A − Aj, A − Aj, −A − Aj, −A − Aj, A − Aj, A − Aj, A + Aj, −A − Aj, A − Aj, A + Aj, −A − Aj, A − Aj, −A + Aj, −A + Aj, A − Aj, A − Aj, −A + Aj, −A − Aj, −A + Aj, A + Aj, A + Aj, −A − Aj, −A + Aj, −A + Aj, −A − Aj, A + Aj, A + Aj, A − Aj, −A + Aj, A − Aj, −A − Aj, −A − Aj, −A + Aj, A − Aj, −A + Aj, −A − Aj, −A + Aj, A − Aj |
| 14 | Polarization 1 | A − Aj, A − Aj, A − Aj, −A − Aj, −A + Aj, A − Aj, −A + Aj, A + Aj, A − Aj, −A − Aj, −A + Aj, A − Aj, A − Aj, −A + Aj, −A + Aj, −A − Aj, −A + Aj, −A + Aj, −A − Aj, A + Aj, −A − Aj, A − Aj, −A + Aj, −A − Aj, −A − Aj, −A − Aj, A + Aj, −A + Aj, −A + Aj, A + Aj, −A − Aj, A + Aj, −A + Aj, −A − Aj, A + Aj, A + Aj, A − Aj, −A + Aj, −A + Aj, A + Aj, −A − Aj, −A − Aj, A + Aj, A + Aj, A + Aj, A + Aj, −A + Aj, A + Aj, A + Aj, A − Aj, A − Aj, −A − Aj, A − Aj, A + Aj, −A − Aj, −A − Aj, A − Aj, A + Aj, −A − Aj, A − Aj, −A + Aj, A − Aj, A + Aj, −A + Aj, −A − Aj, A − Aj, −A − Aj, A + Aj |
| | Polarization 2 | −A − Aj, −A − Aj, −A + Aj, A − Aj, A + Aj, A − Aj, −A − Aj, A − Aj, −A + Aj, −A − Aj, A + Aj, A − Aj, −A − Aj, −A + Aj, −A + Aj, −A − Aj, A − Aj, −A + Aj, −A − Aj, A − Aj, A + Aj, A − Aj, A − Aj, A − Aj, A − Aj, −A − Aj, −A − Aj, A + Aj, A + Aj, −A − Aj, −A + Aj, A − Aj, A + Aj, A + Aj, −A + Aj, −A − Aj, A − Aj, A + Aj, −A + Aj, −A − Aj, −A + Aj, A − Aj, −A − Aj, A + Aj, −A + Aj, −A + Aj, −A + Aj, A + Aj, A − Aj, A − Aj, A + Aj, A − Aj, A + Aj, −A + Aj, A + Aj, A − Aj, −A − Aj, A − Aj, −A − Aj, −A + Aj, −A + Aj, −A + Aj, A + Aj, A + Aj, A + Aj, −A + Aj, −A + Aj, −A − Aj |

(10) When $N_{PS}$=70, the pilot sequence is one item in the following Table 17.

TABLE 17

| Index | Polarization | Pilot sequence |
|---|---|---|
| 1 | Polarization 1 | −A + Aj, A − Aj, A − Aj, −A + Aj, A − Aj, −A + Aj, A + Aj, −A + Aj, −A − Aj, −A − Aj, A − Aj, −A − Aj, A + Aj, −A + Aj, A + Aj, −A + Aj, A + Aj, A − Aj, −A + Aj, −A + Aj, −A − Aj, A − Aj, A + Aj, A − Aj, −A − Aj, −A + Aj, A + Aj, A + Aj, −A + Aj, A − Aj, −A + Aj, −A − Aj, A + Aj, A + Aj, −A + Aj, −A + Aj, A + Aj, A + Aj, A − Aj, −A − Aj, A − Aj, −A + Aj, −A − Aj, −A − Aj, −A + Aj, A − Aj, −A − Aj, −A − Aj, −A − Aj, A − Aj, A + Aj, −A + Aj, A − Aj, A − Aj, A − Aj, −A − Aj, A − Aj, A − Aj, A − Aj, A + Aj, −A − Aj, −A + Aj, A + Aj, −A − Aj, A + Aj, −A + Aj, −A − Aj, A + Aj, −A − Aj, A + Aj |
| | Polarization 2 | −A − Aj, A + Aj, A + Aj, −A − Aj, A + Aj, −A − Aj, A − Aj, −A − Aj, −A + Aj, −A + Aj, A + Aj, −A + Aj, A − Aj, −A − Aj, A − Aj, −A − Aj, A − Aj, A + Aj, −A − Aj, −A − Aj, −A + Aj, A + Aj, A − Aj, A + Aj, −A + Aj, −A − Aj, A − Aj, A − Aj, −A − Aj, A + Aj, −A − Aj, −A + Aj, A − Aj, A − Aj, −A − Aj, −A − Aj, A − Aj, A − Aj, A + Aj, −A + Aj, A + Aj, −A − Aj, −A + Aj, −A + Aj, −A − Aj, A + Aj, −A + Aj, −A + Aj, −A + Aj, A + Aj, A − Aj, −A − Aj, A + Aj, A + Aj, A + Aj, −A + Aj, A + Aj, A + Aj, A + Aj, A − Aj, −A + Aj, −A − Aj, A − Aj, −A + Aj, A − Aj, −A − Aj, −A + Aj, A − Aj, −A + Aj, A − Aj |
| 2 | Polarization 1 | −A + Aj, A − Aj, A − Aj, −A + Aj, A − Aj, −A + Aj, A + Aj, −A + Aj, −A − Aj, −A − Aj, A − Aj, −A − Aj, A + Aj, −A + Aj, A + Aj, −A + Aj, A + Aj, A − Aj, −A + Aj, −A + Aj, −A − Aj, A − Aj, A + Aj, A − Aj, −A − Aj, −A + Aj, A + Aj, A + Aj, −A + Aj, A − Aj, −A + Aj, −A − Aj, A + Aj, A + Aj, −A + Aj, −A + Aj, A + Aj, A + Aj, A − Aj, −A − Aj, A − Aj, −A + Aj, −A − Aj, −A − Aj, −A + Aj, A − Aj, −A − Aj, −A − Aj, −A − Aj, A − Aj, A + Aj, −A + Aj, A − Aj, A − Aj, A − Aj, −A − Aj, A − Aj, A − Aj, A − Aj, A + Aj, −A − Aj, −A + Aj, A + Aj, −A − Aj, A + Aj, −A + Aj, −A − Aj, A + Aj, −A − Aj, A + Aj |
| | Polarization 2 | A + Aj, −A − Aj, −A − Aj, A + Aj, −A − Aj, A + Aj, −A + Aj, A + Aj, A − Aj, A − Aj, −A − Aj, A − Aj, −A + Aj, A + Aj, −A + Aj, A + Aj, −A + Aj, −A − Aj, A + Aj, A + Aj, A − Aj, −A − Aj, −A + Aj, −A − Aj, A − Aj, A + Aj, −A + Aj, −A + Aj, A + Aj, −A − Aj, A + Aj, A − Aj, −A + Aj, −A + Aj, A + Aj, A + Aj, −A + Aj, −A + Aj, −A − Aj, A − Aj, −A − Aj, A + Aj, A − Aj, A − Aj, A + Aj, −A − Aj, A − Aj, A − Aj, A − Aj, −A − Aj, −A + Aj, A + Aj, −A − Aj, −A − Aj, −A − Aj, A − Aj, −A − Aj, −A − Aj, −A − Aj, −A + Aj, A − Aj, A + Aj, −A + Aj, A − Aj, −A + Aj, A + Aj, A − Aj, −A + Aj, A − Aj, −A + Aj |
| 3 | Polarization 1 | A − Aj, −A + Aj, −A + Aj, A − Aj, −A + Aj, A − Aj, −A − Aj, A − Aj, A + Aj, A + Aj, −A + Aj, A + Aj, −A − Aj, A − Aj, −A − Aj, A − Aj, −A − Aj, −A + Aj, A − Aj, A − Aj, A + Aj, −A + Aj, −A − Aj, −A + Aj, A + Aj, A − Aj, −A − Aj, −A − Aj, A − Aj, −A + Aj, A − Aj, A + Aj, −A − Aj, −A − Aj, A − Aj, A − Aj, −A − Aj, −A − Aj, −A + Aj, A + Aj, −A + Aj, A − Aj, A + Aj, A + Aj, A − Aj, −A + Aj, A + Aj, A + Aj, A + Aj, −A + Aj, −A − Aj, A − Aj, −A + Aj, −A + Aj, −A + Aj, A + Aj, −A + Aj, −A + Aj, −A + Aj, −A − Aj, A + Aj, A − Aj, −A − Aj, A + Aj, −A − Aj, A − Aj, A + Aj, −A − Aj, A + Aj, −A − Aj |
| | Polarization 2 | −A − Aj, A + Aj, A + Aj, −A − Aj, A + Aj, −A − Aj, A − Aj, −A − Aj, −A + Aj, −A + Aj, A + Aj, −A + Aj, A − Aj, −A − Aj, A − Aj, −A − Aj, A − Aj, A + Aj, −A − Aj, −A − Aj, −A + Aj, |

TABLE 17-continued

| Index | Polarization | Pilot sequence |
|---|---|---|
| | | A + Aj, A − Aj, A + Aj, −A + Aj, −A − Aj, A − Aj, A − Aj, −A − Aj, A + Aj, −A − Aj, −A + Aj, A − Aj, A − Aj, −A − Aj, −A − Aj, A − Aj, A − Aj, A + Aj, −A + Aj, A + Aj, −A − Aj, −A + Aj, −A + Aj, −A − Aj, A + Aj, −A + Aj, −A + Aj, −A + Aj, A + Aj, A − Aj, −A − Aj, A + Aj, A + Aj, A + Aj, −A + Aj, A + Aj, A + Aj, A + Aj, A − Aj, −A + Aj, −A − Aj, A − Aj, −A + Aj, A − Aj, −A − Aj, −A + Aj, A − Aj, −A + Aj, A − Aj |
| 4 | Polarization 1 | A − Aj, −A + Aj, −A + Aj, A − Aj, −A + Aj, A − Aj, −A − Aj, A − Aj, A + Aj, A + Aj, −A + Aj, A + Aj, −A − Aj, A − Aj, −A − Aj, A − Aj, −A − Aj, −A + Aj, A − Aj, A − Aj, A + Aj, −A + Aj, −A − Aj, −A + Aj, A + Aj, A − Aj, −A − Aj, −A − Aj, A − Aj, −A + Aj, A − Aj, A + Aj, −A − Aj, −A − Aj, A − Aj, A − Aj, −A − Aj, −A − Aj, −A + Aj, A + Aj, −A + Aj, A − Aj, A + Aj, A + Aj, A − Aj, −A + Aj, A + Aj, A + Aj, A + Aj, −A + Aj, −A − Aj, A − Aj, −A + Aj, −A + Aj, −A + Aj, A + Aj, −A + Aj, −A + Aj, −A + Aj, −A − Aj, A + Aj, A − Aj, −A − Aj, A + Aj, −A − Aj, A − Aj, A + Aj, −A − Aj, A + Aj, −A − Aj |
| | Polarization 2 | A + Aj, −A − Aj, −A − Aj, A + Aj, −A − Aj, A + Aj, −A + Aj, A + Aj, A − Aj, A − Aj, −A − Aj, A − Aj, −A + Aj, A + Aj, −A + Aj, A + Aj, −A + Aj, −A − Aj, A + Aj, A + Aj, A − Aj, −A − Aj, −A + Aj, −A − Aj, A − Aj, A + Aj, −A + Aj, −A + Aj, A + Aj, −A − Aj, A + Aj, A − Aj, −A + Aj, −A + Aj, A + Aj, A + Aj, −A + Aj, −A + Aj, −A − Aj, A − Aj, −A − Aj, A + Aj, A − Aj, A − Aj, A + Aj, −A − Aj, A − Aj, A − Aj, A − Aj, −A − Aj, −A + Aj, A + Aj, −A − Aj, −A − Aj, −A − Aj, A − Aj, −A − Aj, −A − Aj, −A − Aj, −A + Aj, A − Aj, A + Aj, −A + Aj, A − Aj, −A + Aj, A + Aj, A − Aj, −A + Aj, A − Aj, −A + Aj |
| 5 | Polarization 1 | −A − Aj, A + Aj, −A − Aj, A + Aj, −A + Aj, −A − Aj, A + Aj, −A − Aj, −A + Aj, A + Aj, −A − Aj, A − Aj, A − Aj, A − Aj, A + Aj, A − Aj, A − Aj, A − Aj, −A + Aj, −A − Aj, A − Aj, A + Aj, A + Aj, A + Aj, A − Aj, −A + Aj, A + Aj, A + Aj, −A + Aj, A − Aj, A + Aj, A − Aj, −A − Aj, −A − Aj, −A + Aj, −A + Aj, −A − Aj, −A − Aj, A + Aj, −A + Aj, A − Aj, −A + Aj, −A − Aj, −A − Aj, −A + Aj, A + Aj, A − Aj, −A − Aj, A − Aj, A + Aj, −A + Aj, −A + Aj, A − Aj, −A − Aj, −A + Aj, −A − Aj, −A + Aj, −A − Aj, A + Aj, A − Aj, A + Aj, A + Aj, −A + Aj, −A − Aj, −A + Aj, A − Aj, −A + Aj, A − Aj, A − Aj, −A + Aj |
| | Polarization 2 | −A + Aj, A − Aj, −A + Aj, A − Aj, −A − Aj, −A + Aj, A − Aj, −A + Aj, −A − Aj, A − Aj, −A + Aj, A + Aj, A + Aj, A + Aj, A − Aj, A + Aj, A + Aj, A + Aj, −A − Aj, −A + Aj, A + Aj, A − Aj, A − Aj, A − Aj, A + Aj, −A − Aj, A − Aj, A − Aj, −A − Aj, A + Aj, A − Aj, A + Aj, −A + Aj, −A + Aj, −A − Aj, −A − Aj, −A + Aj, −A + Aj, A − Aj, −A − Aj, A + Aj, −A − Aj, −A + Aj, −A + Aj, −A − Aj, A − Aj, A + Aj, −A + Aj, A + Aj, A − Aj, −A − Aj, −A − Aj, A + Aj, −A + Aj, −A − Aj, −A + Aj, −A − Aj, −A + Aj, A − Aj, A + Aj, A − Aj, A − Aj, −A − Aj, −A + Aj, −A − Aj, A + Aj, −A − Aj, A + Aj, A + Aj, −A − Aj |
| 6 | Polarization 1 | −A − Aj, A + Aj, −A − Aj, A + Aj, −A + Aj, −A − Aj, A + Aj, −A − Aj, −A + Aj, A + Aj, −A − Aj, A − Aj, A − Aj, A − Aj, A + Aj, A − Aj, A − Aj, A − Aj, −A + Aj, −A − Aj, A − Aj, A + Aj, A + Aj, A + Aj, A − Aj, −A + Aj, A + Aj, A + Aj, −A + Aj, A − Aj, A + Aj, A − Aj, −A − Aj, −A − Aj, −A + Aj, −A + Aj, −A − Aj, −A − Aj, A + Aj, −A + Aj, A − Aj, −A + Aj, −A − Aj, −A − Aj, −A + Aj, A + Aj, A − Aj, −A − Aj, A − Aj, A + Aj, −A + Aj, −A + Aj, A − Aj, −A − Aj, −A + Aj, −A − Aj, −A + Aj, −A − Aj, A + Aj, A − Aj, A + Aj, A + Aj, −A + Aj, −A − Aj, −A + Aj, A − Aj, −A + Aj, A − Aj, A − Aj, −A + Aj |
| | Polarization 2 | A − Aj, −A + Aj, A − Aj, −A + Aj, A + Aj, A − Aj, −A + Aj, A − Aj, A + Aj, −A + Aj, A − Aj, −A − Aj, −A − Aj, −A − Aj, −A + Aj, −A − Aj, −A − Aj, −A − Aj, A + Aj, A − Aj, −A − Aj, −A + Aj, −A + Aj, −A + Aj, −A − Aj, A + Aj, −A + Aj, −A + Aj, A + Aj, −A − Aj, −A + Aj, −A − Aj, A − Aj, A − Aj, A + Aj, A + Aj, A − Aj, A − Aj, −A + Aj, A + Aj, −A − Aj, A + Aj, A − Aj, A − Aj, A + Aj, −A + Aj, −A − Aj, A − Aj, −A − Aj, −A + Aj, A + Aj, A + Aj, −A − Aj, A − Aj, A + Aj, A − Aj, A + Aj, A − Aj, −A + Aj, −A − Aj, −A + Aj, −A + Aj, A + Aj, A − Aj, A + Aj, −A − Aj, A + Aj, −A − Aj, −A − Aj, A + Aj |
| 7 | Polarization 1 | A + Aj, −A − Aj, A + Aj, −A − Aj, A − Aj, A + Aj, −A − Aj, A + Aj, A − Aj, −A − Aj, A + Aj, −A + Aj, −A + Aj, −A + Aj, −A − Aj, −A + Aj, −A + Aj, −A + Aj, A − Aj, A + Aj, −A + Aj, −A − Aj, −A − Aj, −A − Aj, −A + Aj, A − Aj, −A − Aj, −A − Aj, A − Aj, −A + Aj, −A − Aj, −A + Aj, A + Aj, A + Aj, A − Aj, A − Aj, A + Aj, A + Aj, −A − Aj, A − Aj, −A + Aj, A − Aj, A + Aj, A + Aj, A − Aj, −A − Aj, −A + Aj, A + Aj, −A + Aj, −A − Aj, A − Aj, A − Aj, −A + Aj, A + Aj, A − Aj, A + Aj, A − Aj, A + Aj, −A − Aj, −A + Aj, −A − Aj, −A − Aj, A − Aj, A + Aj, A − Aj, −A + Aj, A − Aj, −A + Aj, −A + Aj, A − Aj |
| | Polarization 2 | −A + Aj, A − Aj, −A + Aj, A − Aj, −A − Aj, −A + Aj, A − Aj, −A + Aj, −A − Aj, A − Aj, −A + Aj, A + Aj, A + Aj, A + Aj, A − Aj, A + Aj, A + Aj, A + Aj, −A − Aj, −A + Aj, A + Aj, A − Aj, A − Aj, A − Aj, A + Aj, −A − Aj, A − Aj, A − Aj, −A − Aj, A + Aj, A − Aj, A + Aj, −A + Aj, −A + Aj, −A − Aj, −A − Aj, −A + Aj, −A + Aj, A − Aj, −A − Aj, A + Aj, −A − Aj, −A + Aj, −A + Aj, −A − Aj, A − Aj, A + Aj, −A + Aj, A + Aj, A − Aj, −A − Aj, −A − Aj, A + Aj, −A + Aj, −A − Aj, −A + Aj, −A − Aj, −A + Aj, A − Aj, A + Aj, A − Aj, A − Aj, −A − Aj, −A + Aj, −A − Aj, A + Aj, −A − Aj, A + Aj, A + Aj, −A − Aj |
| 8 | Polarization 1 | A + Aj, −A − Aj, A + Aj, −A − Aj, A − Aj, A + Aj, −A − Aj, A + Aj, A − Aj, −A − Aj, A + Aj, −A + Aj, −A + Aj, −A + Aj, −A − Aj, −A + Aj, −A + Aj, −A + Aj, A − Aj, A + Aj, −A + Aj, −A − Aj, −A − Aj, −A − Aj, −A + Aj, A − Aj, −A − Aj, −A − Aj, A − Aj, −A + Aj, −A − Aj, −A + Aj, A + Aj, A + Aj, A − Aj, A − Aj, A + Aj, A + Aj, −A − Aj, A − Aj, −A + Aj, A − Aj, A + Aj, A + Aj, A − Aj, −A − Aj, −A + Aj, A + Aj, −A + Aj, −A − Aj, A − Aj, A − Aj, −A + Aj, A + Aj, A − Aj, A + Aj, A − Aj, A + Aj, −A − Aj, −A + Aj, −A − Aj, −A − Aj, A − Aj, A + Aj, A − Aj, −A + Aj, A − Aj, −A + Aj, −A + Aj, A − Aj |
| | Polarization 2 | A − Aj, −A + Aj, A − Aj, −A + Aj, A + Aj, A − Aj, −A + Aj, A − Aj, A + Aj, −A + Aj, A − Aj, −A − Aj, −A − Aj, −A − Aj, −A + Aj, −A − Aj, −A − Aj, −A − Aj, A + Aj, A − Aj, −A − Aj, −A + Aj, −A + Aj, −A + Aj, −A − Aj, A + Aj, −A + Aj, −A + Aj, A + Aj, −A − Aj, −A + Aj, −A − Aj, A − Aj, A − Aj, A + Aj, A + Aj, A − Aj, A − Aj, −A + Aj, A + Aj, −A − Aj, A + Aj, A − Aj, A − Aj, A + Aj, −A + Aj, −A − Aj, A − Aj, −A − Aj, −A + Aj, A + Aj, A + Aj, −A − Aj, A − Aj, A + Aj, A − Aj, A + Aj, A − Aj, −A + Aj, −A − Aj, −A + Aj, −A + Aj, A + Aj, A − Aj, A + Aj, −A − Aj, A + Aj, −A − Aj, −A − Aj, A + Aj |
| 9 | Polarization 1 | −A + Aj, −A − Aj, −A − Aj, A + Aj, A − Aj, A + Aj, A − Aj, −A − Aj, A − Aj, −A + Aj, A − Aj, −A + Aj, −A − Aj, A + Aj, −A + Aj, −A + Aj, −A + Aj, A − Aj, A − Aj, A + Aj, A + Aj, A + Aj, −A + Aj, A + Aj, A − Aj, −A − Aj, −A − Aj, A + Aj, −A − Aj, −A + Aj, −A − Aj, −A − Aj, A − Aj, |

TABLE 17-continued

| Index | Polarization | Pilot sequence |
|---|---|---|
| | | A – Aj, –A + Aj, A – Aj, –A – Aj, A + Aj, A + Aj, –A + Aj, –A + Aj, –A – Aj, A – Aj, –A – Aj, A + Aj, A + Aj, A – Aj, A + Aj, –A – Aj, A – Aj, –A – Aj, –A + Aj, A – Aj, A – Aj, A + Aj, –A – Aj, –A + Aj, –A + Aj, A + Aj, A – Aj, A – Aj, –A + Aj, A + Aj, –A – Aj, –A + Aj, A + Aj, –A + Aj, –A – Aj, A – Aj, –A + Aj |
| | Polarization 2 | –A – Aj, A + Aj, A + Aj, A – Aj, –A – Aj, A – Aj, A – Aj, –A – Aj, –A + Aj, –A – Aj, A + Aj, A + Aj, –A – Aj, –A + Aj, A – Aj, A – Aj, –A – Aj, A – Aj, –A + Aj, –A + Aj, A + Aj, –A – Aj, A + Aj, –A + Aj, A + Aj, –A – Aj, A – Aj, A – Aj, A + Aj, –A – Aj, A – Aj, A + Aj, A + Aj, A – Aj, A – Aj, A + Aj, A – Aj, –A – Aj, –A + Aj, A + Aj, A – Aj, –A + Aj, –A – Aj, –A + Aj, –A – Aj, –A + Aj, –A + Aj, A – Aj, –A + Aj, A – Aj, –A + Aj, A + Aj, –A + Aj, –A + Aj, –A + Aj, –A + Aj, –A – Aj, A + Aj, A + Aj, A + Aj, A + Aj, A – Aj, A – Aj, –A – Aj, –A – Aj, –A – Aj, –A + Aj, A + Aj, –A – Aj, –A – Aj |
| 10 | Polarization 1 | –A + Aj, –A – Aj, –A – Aj, A + Aj, A – Aj, A + Aj, A – Aj, –A – Aj, A – Aj, –A + Aj, A – Aj, –A + Aj, –A – Aj, A + Aj, –A + Aj, –A + Aj, –A + Aj, A – Aj, A – Aj, A + Aj, A + Aj, A + Aj, –A + Aj, A + Aj, A – Aj, –A – Aj, –A – Aj, A + Aj, –A – Aj, –A + Aj, –A – Aj, –A – Aj, A – Aj, A – Aj, –A + Aj, A – Aj, –A – Aj, A + Aj, A + Aj, –A + Aj, –A + Aj, –A – Aj, A – Aj, –A – Aj, A + Aj, A + Aj, A – Aj, A + Aj, –A – Aj, A – Aj, –A – Aj, –A + Aj, A – Aj, A – Aj, A + Aj, –A – Aj, –A + Aj, –A + Aj, A + Aj, A – Aj, A – Aj, –A + Aj, A + Aj, –A – Aj, –A + Aj, A + Aj, –A + Aj, –A – Aj, A – Aj, –A + Aj |
| | Polarization 2 | A + Aj, A + Aj, A – Aj, –A – Aj, A – Aj, A – Aj, –A – Aj, –A + Aj, –A – Aj, A + Aj, A + Aj, –A – Aj, –A + Aj, A – Aj, A – Aj, –A – Aj, A – Aj, –A + Aj, –A + Aj, A + Aj, –A – Aj, A + Aj, –A + Aj, A + Aj, –A – Aj, A – Aj, A – Aj, A + Aj, –A – Aj, A – Aj, A + Aj, A + Aj, A – Aj, A – Aj, A + Aj, A – Aj, –A – Aj, –A + Aj, A + Aj, A – Aj, –A + Aj, –A – Aj, –A + Aj, –A – Aj, –A + Aj, –A + Aj, A – Aj, –A + Aj, A – Aj, –A + Aj, A + Aj, –A + Aj, –A + Aj, –A + Aj, –A + Aj, –A – Aj, A + Aj, A + Aj, A + Aj, A + Aj, A – Aj, A – Aj, –A – Aj, –A – Aj, –A – Aj, –A + Aj, A + Aj, –A – Aj, –A – Aj, –A – Aj |
| 11 | Polarization 1 | A – Aj, –A + Aj, –A – Aj, A – Aj, A + Aj, A – Aj, –A – Aj, A + Aj, A – Aj, –A + Aj, –A + Aj, A + Aj, A – Aj, A – Aj, –A – Aj, A + Aj, –A + Aj, –A + Aj, A – Aj, –A – Aj, –A + Aj, –A – Aj, A + Aj, –A + Aj, A + Aj, A + Aj, –A – Aj, –A + Aj, –A – Aj, A – Aj, A – Aj, A + Aj, A + Aj, –A – Aj, –A + Aj, A – Aj, –A + Aj, –A + Aj, –A – Aj, –A – Aj, A – Aj, –A – Aj, A + Aj, –A – Aj, –A – Aj, –A + Aj, A + Aj, A – Aj, A + Aj, A + Aj, A + Aj, –A + Aj, –A + Aj, A – Aj, A – Aj, A – Aj, A + Aj, –A – Aj, A – Aj, –A + Aj, A – Aj, –A + Aj, –A – Aj, –A + Aj, A + Aj, –A + Aj, A + Aj, –A – Aj, –A – Aj, A – Aj |
| | Polarization 2 | –A – Aj, –A – Aj, –A – Aj, A + Aj, A – Aj, –A – Aj, –A – Aj, –A – Aj, –A + Aj, –A + Aj, A + Aj, A + Aj, A + Aj, A + Aj, –A – Aj, A – Aj, A – Aj, A – Aj, A – Aj, A + Aj, A – Aj, –A + Aj, A – Aj, –A + Aj, A – Aj, A – Aj, –A – Aj, A – Aj, –A – Aj, A – Aj, –A + Aj, A + Aj, A – Aj, –A – Aj, –A + Aj, A + Aj, –A + Aj, –A + Aj, A + Aj, A + Aj, –A + Aj, –A – Aj, A + Aj, –A + Aj, –A + Aj, –A – Aj, A + Aj, A – Aj, A + Aj, –A – Aj, A + Aj, A – Aj, A – Aj, –A + Aj, –A – Aj, –A + Aj, –A + Aj, A – Aj, –A – Aj, A + Aj, A + Aj, –A – Aj, A – Aj, –A – Aj, –A + Aj, –A + Aj, –A – Aj, –A + Aj, A + Aj, A + Aj |
| 12 | Polarization 1 | A – Aj, –A + Aj, –A – Aj, A – Aj, A + Aj, A – Aj, –A – Aj, A + Aj, A – Aj, –A + Aj, –A + Aj, A + Aj, A – Aj, A – Aj, –A – Aj, A + Aj, –A + Aj, –A + Aj, A – Aj, –A – Aj, –A + Aj, –A – Aj, A + Aj, –A + Aj, A + Aj, A + Aj, –A – Aj, –A + Aj, –A – Aj, A – Aj, A – Aj, A + Aj, A + Aj, –A – Aj, –A + Aj, A – Aj, –A + Aj, –A + Aj, –A – Aj, –A – Aj, A – Aj, –A – Aj, A + Aj, –A – Aj, –A – Aj, –A + Aj, A + Aj, A – Aj, A + Aj, A + Aj, A + Aj, –A + Aj, –A + Aj, A – Aj, A – Aj, A – Aj, A + Aj, –A – Aj, A – Aj, –A + Aj, A – Aj, –A + Aj, –A – Aj, –A + Aj, A + Aj, –A + Aj, A + Aj, –A – Aj, –A – Aj, A – Aj |
| | Polarization 2 | –A – Aj, –A – Aj, A + Aj, A – Aj, –A – Aj, –A – Aj, –A – Aj, –A + Aj, –A + Aj, A + Aj, A + Aj, A + Aj, A + Aj, –A – Aj, A – Aj, A – Aj, A – Aj, A – Aj, A + Aj, A – Aj, –A + Aj, A – Aj, –A + Aj, A – Aj, A – Aj, –A – Aj, A – Aj, –A – Aj, A – Aj, –A + Aj, A + Aj, A – Aj, –A – Aj, –A + Aj, A + Aj, –A + Aj, –A + Aj, A + Aj, A + Aj, –A + Aj, –A – Aj, A + Aj, –A + Aj, –A + Aj, –A – Aj, A + Aj, A – Aj, A + Aj, –A – Aj, A + Aj, A – Aj, A – Aj, –A + Aj, –A – Aj, –A + Aj, –A + Aj, A – Aj, –A – Aj, A + Aj, A + Aj, –A – Aj, A – Aj, –A – Aj, –A + Aj, –A + Aj, –A – Aj, –A + Aj, A + Aj, A + Aj, –A – Aj |

(11) When $N_{PS}$=78, the pilot sequence is one item in Table 18-1. Alternatively, any item is selected from Table 18-2 as a pilot sequence in one polarization, and any item is selected from Table 18-3 as a pilot sequence in the other polarization. Alternatively, any item is selected from Table 18-4 as a pilot sequence in one polarization, and any item is selected from Table 18-5 as a pilot sequence in the other polarization.

TABLE 18-1

| Index | Polarization | Pilot sequence |
|---|---|---|
| 1 | Polarization 1 | –A + Aj, A – Aj, –A – Aj, A – Aj, –A – Aj, A – Aj, A + Aj, A – Aj, A + Aj, –A – Aj, A – Aj, –A – Aj, –A + Aj, A + Aj, A – Aj, –A + Aj, –A + Aj, A – Aj, A + Aj, A – Aj, –A – Aj, –A – Aj, A – Aj, A – Aj, –A – Aj, A + Aj, –A + Aj, A – Aj, A – Aj, –A – Aj, –A – Aj, –A + Aj, A – Aj, –A – Aj, –A + Aj, –A – Aj, A – Aj, –A + Aj, A + Aj, A + Aj, A + Aj, –A + Aj, A + Aj, A + Aj, –A – Aj, –A + Aj, A + Aj, –A + Aj, –A + Aj, –A + Aj, –A – Aj, A – Aj, A – Aj, A + Aj, A + Aj, –A + Aj, –A – Aj, A + Aj, –A – Aj, A + Aj, A – Aj, –A + Aj, A – Aj, A – Aj, A + Aj, –A – Aj, –A + Aj, –A – Aj, –A + Aj, –A + Aj, A + Aj, –A + Aj, A – Aj, –A + Aj, –A – Aj, –A – Aj, A + Aj, A + Aj |
| | Polarization 2 | –A – Aj, A + Aj, –A + Aj, A + Aj, –A + Aj, A + Aj, A – Aj, A + Aj, A – Aj, –A + Aj, A + Aj, –A + Aj, –A – Aj, A – Aj, A + Aj, –A – Aj, –A – Aj, A + Aj, A – Aj, A + Aj, –A + Aj, –A + Aj, A + Aj, A + Aj, –A + Aj, A – Aj, –A – Aj, A + Aj, A + Aj, –A + Aj, –A + Aj, –A – Aj, A + Aj, –A + Aj, –A – Aj, –A + Aj, A + Aj, –A – Aj, A – Aj, A – Aj, A – Aj, –A – Aj, A – Aj, A – Aj, –A + Aj, –A – Aj, A – Aj, –A – Aj, –A – Aj, –A – Aj, –A + Aj, A + Aj, A + Aj, A – Aj, A – Aj, –A – Aj, |

TABLE 18-1-continued

| Index | Polarization | Pilot sequence |
|---|---|---|
| | | −A + Aj, A − Aj, −A + Aj, A − Aj, A + Aj, −A − Aj, A + Aj, A + Aj, A − Aj, −A + Aj, −A − Aj, −A + Aj, −A − Aj, −A − Aj, A − Aj, −A − Aj, A + Aj, −A − Aj, −A + Aj, −A + Aj, A − Aj, A − Aj |
| 2 | Polarization 1 | −A + Aj, A − Aj, −A − Aj, A − Aj, −A − Aj, A − Aj, A + Aj, A − Aj, A + Aj, −A − Aj, A − Aj, −A − Aj, −A + Aj, A + Aj, A − Aj, −A + Aj, −A + Aj, A − Aj, A + Aj, A − Aj, −A − Aj, −A − Aj, A − Aj, A − Aj, −A − Aj, A + Aj, −A + Aj, A − Aj, A − Aj, −A − Aj, −A − Aj, −A + Aj, A − Aj, −A − Aj, −A + Aj, −A − Aj, A − Aj, −A + Aj, A + Aj, A + Aj, A + Aj, −A + Aj, A + Aj, A + Aj, −A − Aj, −A + Aj, A + Aj, −A + Aj, −A + Aj, −A + Aj, −A − Aj, A − Aj, A − Aj, A + Aj, A + Aj, −A + Aj, −A − Aj, A + Aj, −A − Aj, A + Aj, A − Aj, −A + Aj, A − Aj, A − Aj, A + Aj, −A − Aj, −A + Aj, −A − Aj, −A + Aj, −A + Aj, A + Aj, −A + Aj, A − Aj, −A + Aj, −A − Aj, −A − Aj, A + Aj, A + Aj |
| | Polarization 2 | A + Aj, −A − Aj, A − Aj, −A − Aj, A − Aj, −A − Aj, −A + Aj, −A − Aj, −A + Aj, A − Aj, −A − Aj, A − Aj, A + Aj, −A + Aj, −A − Aj, A + Aj, A + Aj, −A − Aj, −A + Aj, −A − Aj, A − Aj, A − Aj, −A − Aj, −A − Aj, A − Aj, −A + Aj, A + Aj, −A − Aj, −A − Aj, A − Aj, A − Aj, A + Aj, −A − Aj, A − Aj, A + Aj, A − Aj, −A − Aj, A + Aj, −A + Aj, −A + Aj, −A + Aj, A + Aj, −A + Aj, −A + Aj, A − Aj, A + Aj, −A + Aj, A + Aj, A + Aj, A + Aj, A − Aj, −A − Aj, −A − Aj, −A + Aj, −A + Aj, A + Aj, A − Aj, −A + Aj, A − Aj, −A + Aj, −A − Aj, A + Aj, −A − Aj, −A − Aj, −A + Aj, A − Aj, A + Aj, A − Aj, A + Aj, A + Aj, −A + Aj, A + Aj, −A − Aj, A + Aj, A − Aj, A − Aj, −A + Aj, −A + Aj |
| 3 | Polarization 1 | A − Aj, −A + Aj, A + Aj, −A + Aj, A + Aj, −A + Aj, −A − Aj, −A + Aj, −A − Aj, A + Aj, −A + Aj, A + Aj, A − Aj, −A − Aj, −A + Aj, A − Aj, A − Aj, −A + Aj, −A − Aj, −A + Aj, A + Aj, A + Aj, −A + Aj, −A + Aj, A + Aj, −A − Aj, A − Aj, −A + Aj, −A + Aj, A + Aj, A + Aj, A − Aj, −A + Aj, A + Aj, A − Aj, A + Aj, −A + Aj, A − Aj, −A − Aj, −A − Aj, −A − Aj, A − Aj, −A − Aj, −A − Aj, A + Aj, A − Aj, −A − Aj, A − Aj, A − Aj, A − Aj, A + Aj, −A + Aj, −A + Aj, −A − Aj, −A − Aj, A − Aj, A + Aj, −A − Aj, A + Aj, −A − Aj, −A + Aj, A − Aj, −A + Aj, −A + Aj, −A − Aj, A + Aj, A − Aj, A + Aj, A − Aj, A − Aj, −A − Aj, A − Aj, −A + Aj, A − Aj, A + Aj, A + Aj, −A − Aj, −A − Aj |
| | Polarization 2 | A + Aj, −A − Aj, A − Aj, −A − Aj, A − Aj, −A − Aj, −A + Aj, −A − Aj, −A + Aj, A − Aj, −A − Aj, A − Aj, A + Aj, −A + Aj, −A − Aj, A + Aj, A + Aj, −A − Aj, −A + Aj, −A − Aj, A − Aj, A − Aj, −A − Aj, −A − Aj, A − Aj, −A + Aj, A + Aj, −A − Aj, −A − Aj, A − Aj, A − Aj, A + Aj, −A − Aj, A − Aj, A + Aj, A − Aj, −A − Aj, A + Aj, −A + Aj, −A + Aj, −A + Aj, A + Aj, −A + Aj, −A + Aj, A − Aj, A + Aj, −A + Aj, A + Aj, A + Aj, A + Aj, A − Aj, −A − Aj, −A − Aj, −A + Aj, −A + Aj, A + Aj, A − Aj, −A + Aj, A − Aj, −A + Aj, −A − Aj, A + Aj, −A − Aj, −A − Aj, −A + Aj, A − Aj, A + Aj, A − Aj, A + Aj, A + Aj, −A + Aj, A + Aj, −A − Aj, A + Aj, A − Aj, A − Aj, −A + Aj, −A + Aj |
| 4 | Polarization 1 | A − Aj, −A + Aj, A + Aj, −A + Aj, A + Aj, −A + Aj, −A − Aj, −A + Aj, −A − Aj, A + Aj, −A + Aj, A + Aj, A − Aj, −A − Aj, −A + Aj, A − Aj, A − Aj, −A + Aj, −A − Aj, −A + Aj, A + Aj, A + Aj, −A + Aj, −A + Aj, A + Aj, −A − Aj, A − Aj, −A + Aj, −A + Aj, A + Aj, A + Aj, A − Aj, −A + Aj, A + Aj, A − Aj, A + Aj, −A + Aj, A − Aj, −A − Aj, −A − Aj, −A − Aj, A − Aj, −A − Aj, −A − Aj, A + Aj, A − Aj, −A − Aj, A − Aj, A − Aj, A − Aj, A + Aj, −A + Aj, −A + Aj, −A − Aj, −A − Aj, A − Aj, A + Aj, −A − Aj, A + Aj, −A − Aj, −A + Aj, A − Aj, −A + Aj, −A + Aj, −A − Aj, A + Aj, A − Aj, A + Aj, A − Aj, A − Aj, −A − Aj, A − Aj, −A + Aj, A − Aj, A + Aj, A + Aj, −A − Aj, −A − Aj |
| | Polarization 2 | −A − Aj, A + Aj, −A + Aj, A + Aj, −A + Aj, A + Aj, A − Aj, A + Aj, A − Aj, −A + Aj, A + Aj, −A + Aj, −A − Aj, A − Aj, A + Aj, −A − Aj, −A − Aj, A + Aj, A − Aj, A + Aj, −A + Aj, −A + Aj, A + Aj, A + Aj, −A + Aj, A − Aj, −A − Aj, A + Aj, A + Aj, −A + Aj, −A + Aj, −A − Aj, A + Aj, −A + Aj, −A − Aj, −A + Aj, A + Aj, −A − Aj, A − Aj, A − Aj, A − Aj, −A − Aj, A − Aj, A − Aj, −A + Aj, −A − Aj, A − Aj, −A − Aj, −A − Aj, −A − Aj, −A + Aj, A + Aj, A + Aj, A − Aj, A − Aj, −A − Aj, −A + Aj, A − Aj, −A + Aj, A − Aj, A + Aj, −A − Aj, A + Aj, A + Aj, A − Aj, −A + Aj, −A − Aj, −A + Aj, −A − Aj, −A − Aj, A − Aj, −A − Aj, A + Aj, −A − Aj, −A + Aj, −A + Aj, A − Aj, A − Aj |
| 5 | Polarization 1 | −A − Aj, A − Aj, A − Aj, A + Aj, A − Aj, −A + Aj, A − Aj, A − Aj, −A − Aj, A − Aj, −A + Aj, A + Aj, A − Aj, −A − Aj, A − Aj, A − Aj, −A − Aj, −A + Aj, A − Aj, −A − Aj, −A − Aj, A − Aj, −A − Aj, −A − Aj, −A + Aj, A + Aj, A + Aj, A + Aj, −A + Aj, −A + Aj, −A + Aj, −A − Aj, A + Aj, −A − Aj, A + Aj, A − Aj, A + Aj, A − Aj, A − Aj, −A + Aj, −A + Aj, A − Aj, −A − Aj, A + Aj, −A + Aj, A + Aj, A − Aj, A + Aj, −A + Aj, −A + Aj, A − Aj, A + Aj, −A − Aj, A − Aj, −A + Aj, −A − Aj, −A + Aj, A + Aj, −A − Aj, −A − Aj, A − Aj, A + Aj, A + Aj, A − Aj, −A + Aj, −A + Aj, −A + Aj, A + Aj, −A − Aj, A + Aj, −A + Aj, −A − Aj, −A + Aj, −A − Aj, A + Aj, A + Aj, −A − Aj, −A + Aj |
| | Polarization 2 | −A + Aj, A + Aj, A + Aj, A − Aj, A + Aj, −A − Aj, A + Aj, A + Aj, −A + Aj, A + Aj, −A − Aj, A − Aj, A + Aj, −A + Aj, A + Aj, A + Aj, −A + Aj, −A − Aj, A + Aj, −A + Aj, −A + Aj, A + Aj, −A + Aj, −A + Aj, −A − Aj, A − Aj, A − Aj, A − Aj, −A − Aj, −A − Aj, −A − Aj, −A + Aj, A − Aj, −A + Aj, A − Aj, A + Aj, A − Aj, A + Aj, A + Aj, −A − Aj, −A − Aj, A + Aj, −A + Aj, A − Aj, −A − Aj, A − Aj, A + Aj, A − Aj, −A − Aj, −A − Aj, A + Aj, A − Aj, −A + Aj, A + Aj, −A − Aj, −A + Aj, −A − Aj, A − Aj, −A + Aj, −A + Aj, A + Aj, A − Aj, A − Aj, A + Aj, −A − Aj, −A − Aj, −A − Aj, A − Aj, −A + Aj, A − Aj, −A − Aj, −A + Aj, −A − Aj, −A + Aj, A − Aj, A − Aj, −A + Aj, −A − Aj |
| 6 | Polarization 1 | −A − Aj, A − Aj, A − Aj, A + Aj, A − Aj, −A + Aj, A − Aj, A − Aj, −A − Aj, A − Aj, −A + Aj, A + Aj, A − Aj, −A − Aj, A − Aj, A − Aj, −A − Aj, −A + Aj, A − Aj, −A − Aj, −A − Aj, A − Aj, −A − Aj, −A − Aj, −A + Aj, A + Aj, A + Aj, A + Aj, −A + Aj, −A + Aj, −A + Aj, −A − Aj, A + Aj, −A − Aj, A + Aj, A − Aj, A + Aj, A − Aj, A − Aj, −A + Aj, −A + Aj, A − Aj, −A − Aj, A + Aj, −A + Aj, A + Aj, A − Aj, A + Aj, −A + Aj, −A + Aj, A − Aj, A + Aj, −A − Aj, A − Aj, −A + Aj, −A − Aj, −A + Aj, A + Aj, −A − Aj, −A − Aj, A − Aj, A + Aj, A + Aj, A − Aj, −A + Aj, −A + Aj, −A + Aj, A + Aj, −A − Aj, A + Aj, −A + Aj, −A − Aj, −A + Aj, −A − Aj, A + Aj, A + Aj, −A − Aj, −A + Aj |
| | Polarization 2 | A − Aj, −A − Aj, −A − Aj, −A + Aj, −A − Aj, A + Aj, −A − Aj, −A − Aj, A − Aj, −A − Aj, A + Aj, −A + Aj, −A − Aj, A − Aj, −A − Aj, −A − Aj, A − Aj, A + Aj, −A − Aj, A − Aj, A − Aj, −A − Aj, A − Aj, A − Aj, A + Aj, −A + Aj, −A + Aj, −A + Aj, A + Aj, A + Aj, A + Aj, A − Aj, −A + Aj, A − Aj, −A + Aj, −A − Aj, −A + Aj, −A − Aj, −A − Aj, A + Aj, A + Aj, −A − Aj, A − Aj, −A + Aj, A + Aj, −A + Aj, −A − Aj, −A + Aj, A + Aj, A + Aj, −A − Aj, −A + Aj, A − Aj, −A − Aj, A + Aj, A − Aj, A + Aj, −A + Aj, A − Aj, A − Aj, −A − Aj, −A + Aj, −A + Aj, −A − Aj, A + Aj, A + Aj, A + Aj, −A + Aj, A − Aj, −A + Aj, A + Aj, A − Aj, A + Aj, A − Aj, −A + Aj, −A + Aj, A − Aj, A + Aj |
| 7 | Polarization 1 | A + Aj, −A + Aj, −A + Aj, −A − Aj, −A + Aj, A − Aj, −A + Aj, −A + Aj, A + Aj, −A + Aj, A − Aj, −A − Aj, −A + Aj, A + Aj, −A + Aj, −A + Aj, A + Aj, A − Aj, −A + Aj, A + Aj, A + Aj, −A + Aj, A + Aj, A + Aj, A − Aj, −A − Aj, −A − Aj, −A − Aj, A − Aj, A − Aj, A − Aj, A + Aj, −A − Aj, A + Aj, −A − Aj, −A + Aj, −A − Aj, −A + Aj, −A + Aj, A − Aj, A − Aj, −A + Aj, A + Aj, −A − Aj, A − Aj, −A − Aj, −A + Aj, −A − Aj, A − Aj, A − Aj, −A + Aj, −A − Aj, A + Aj, −A + Aj, A − Aj, A + Aj, A − Aj, |

TABLE 18-1-continued

| Index | Polarization | Pilot sequence |
|---|---|---|
| | | −A − Aj, A + Aj, A + Aj, −A + Aj, −A − Aj, −A − Aj, −A + Aj, A − Aj, A − Aj, A − Aj, −A − Aj, A + Aj, −A − Aj, A − Aj, A + Aj, A − Aj, A + Aj, −A − Aj, −A − Aj, A + Aj, A − Aj |
| | Polarization 2 | −A + Aj, A + Aj, A + Aj, A − Aj, A + Aj, −A − Aj, A + Aj, A + Aj, −A + Aj, A + Aj, −A − Aj, A − Aj, A + Aj, −A + Aj, A + Aj, A + Aj, −A + Aj, −A − Aj, A + Aj, −A + Aj, −A + Aj, A + Aj, −A + Aj, −A + Aj, −A − Aj, A − Aj, A − Aj, A − Aj, −A − Aj, −A − Aj, −A − Aj, −A + Aj, A − Aj, −A + Aj, A − Aj, A + Aj, A − Aj, A + Aj, A + Aj, −A − Aj, −A − Aj, A + Aj, −A + Aj, A − Aj, −A − Aj, A − Aj, A + Aj, A − Aj, −A − Aj, −A − Aj, A + Aj, A − Aj, −A + Aj, A + Aj, −A − Aj, −A + Aj, −A − Aj, A − Aj, −A + Aj, −A + Aj, A + Aj, A − Aj, A − Aj, A + Aj, −A − Aj, −A − Aj, −A − Aj, A − Aj, −A + Aj, A − Aj, −A − Aj, −A + Aj, −A − Aj, −A + Aj, A − Aj, A − Aj, −A + Aj, −A − Aj |
| 8 | Polarization 1 | A + Aj, −A + Aj, −A + Aj, −A − Aj, −A + Aj, A − Aj, −A + Aj, −A + Aj, A + Aj, −A + Aj, A − Aj, −A − Aj, −A + Aj, A + Aj, −A + Aj, −A + Aj, A + Aj, A − Aj, −A + Aj, A + Aj, A + Aj, −A + Aj, A + Aj, A + Aj, A − Aj, −A − Aj, −A − Aj, −A − Aj, A − Aj, A − Aj, A − Aj, A + Aj, −A − Aj, A + Aj, −A − Aj, −A + Aj, −A − Aj, −A + Aj, −A + Aj, A − Aj, A − Aj, −A + Aj, A + Aj, −A − Aj, A − Aj, −A − Aj, −A + Aj, −A − Aj, A − Aj, A − Aj, −A + Aj, −A − Aj, A + Aj, −A + Aj, A − Aj, A + Aj, A − Aj, −A − Aj, A + Aj, A + Aj, −A + Aj, −A − Aj, −A − Aj, −A + Aj, A − Aj, A − Aj, A − Aj, −A − Aj, A + Aj, −A − Aj, A − Aj, A + Aj, A − Aj, A + Aj, −A − Aj, −A − Aj, A + Aj, A − Aj |
| | Polarization 2 | A − Aj, −A − Aj, −A − Aj, −A + Aj, −A − Aj, A + Aj, −A − Aj, −A − Aj, A − Aj, −A − Aj, A + Aj, −A + Aj, −A − Aj, A − Aj, −A − Aj, −A − Aj, A − Aj, A + Aj, −A − Aj, A − Aj, A − Aj, −A − Aj, A − Aj, A − Aj, A + Aj, −A + Aj, −A + Aj, −A + Aj, A + Aj, A + Aj, A + Aj, A − Aj, −A + Aj, A − Aj, −A + Aj, −A − Aj, −A + Aj, −A − Aj, −A − Aj, A + Aj, A + Aj, −A − Aj, A − Aj, −A + Aj, A + Aj, −A + Aj, −A − Aj, −A + Aj, A + Aj, A + Aj, −A − Aj, −A + Aj, A − Aj, −A − Aj, A + Aj, A − Aj, A + Aj, −A + Aj, A − Aj, A − Aj, −A − Aj, −A + Aj, −A + Aj, −A − Aj, A + Aj, A + Aj, A + Aj, −A + Aj, A − Aj, −A + Aj, A + Aj, A − Aj, A + Aj, A − Aj, −A + Aj, −A + Aj, A − Aj, A + Aj |
| 9 | Polarization 1 | −A + Aj, A + Aj, A + Aj, A − Aj, −A + Aj, A − Aj, −A + Aj, −A + Aj, −A − Aj, A + Aj, A − Aj, −A − Aj, −A − Aj, A − Aj, −A − Aj, −A + Aj, −A − Aj, A + Aj, −A − Aj, −A + Aj, −A − Aj, −A + Aj, −A + Aj, −A + Aj, A + Aj, −A − Aj, −A + Aj, A − Aj, −A − Aj, −A + Aj, A − Aj, A − Aj, −A − Aj, A − Aj, −A + Aj, −A + Aj, A − Aj, A − Aj, A − Aj, A + Aj, −A + Aj, A − Aj, A + Aj, A − Aj, −A + Aj, −A − Aj, −A − Aj, −A + Aj, A + Aj, A − Aj, A − Aj, A + Aj, A + Aj, A + Aj, A + Aj, −A + Aj, −A − Aj, −A − Aj, A + Aj, A − Aj, A − Aj, −A + Aj, A − Aj, A + Aj, −A − Aj, −A − Aj, −A − Aj, A + Aj, −A − Aj, A + Aj, −A + Aj, −A + Aj, A − Aj, −A − Aj, A + Aj, A + Aj, A − Aj, A + Aj |
| | Polarization 2 | −A − Aj, A − Aj, A − Aj, A + Aj, −A − Aj, A + Aj, −A − Aj, −A − Aj, −A + Aj, A − Aj, A + Aj, −A + Aj, −A + Aj, A + Aj, −A + Aj, −A − Aj, −A + Aj, A − Aj, −A + Aj, −A − Aj, −A + Aj, −A − Aj, −A − Aj, −A − Aj, A − Aj, −A + Aj, −A − Aj, A + Aj, −A + Aj, −A − Aj, A + Aj, A + Aj, −A + Aj, A + Aj, −A − Aj, −A − Aj, A + Aj, A + Aj, A + Aj, A − Aj, −A − Aj, A + Aj, A − Aj, A + Aj, −A − Aj, −A + Aj, −A + Aj, −A − Aj, A − Aj, A + Aj, A + Aj, A − Aj, A − Aj, A − Aj, A − Aj, −A − Aj, −A + Aj, −A + Aj, A − Aj, A + Aj, A + Aj, −A − Aj, A + Aj, A − Aj, −A + Aj, −A + Aj, −A + Aj, A − Aj, −A + Aj, A − Aj, −A − Aj, −A − Aj, A + Aj, −A + Aj, A − Aj, A − Aj, A + Aj, A − Aj |
| 10 | Polarization 1 | −A + Aj, A + Aj, A + Aj, A − Aj, −A + Aj, A − Aj, −A + Aj, −A + Aj, −A − Aj, A + Aj, A − Aj, −A − Aj, −A − Aj, A − Aj, −A − Aj, −A + Aj, −A − Aj, A + Aj, −A − Aj, −A + Aj, −A − Aj, −A + Aj, −A + Aj, −A + Aj, A + Aj, −A − Aj, −A + Aj, A − Aj, −A − Aj, −A + Aj, A − Aj, A − Aj, −A − Aj, A − Aj, −A + Aj, −A + Aj, A − Aj, A − Aj, A − Aj, A + Aj, −A + Aj, A − Aj, A + Aj, A − Aj, −A + Aj, −A − Aj, −A − Aj, −A + Aj, A + Aj, A − Aj, A − Aj, A + Aj, A + Aj, A + Aj, A + Aj, −A + Aj, −A − Aj, −A − Aj, A + Aj, A − Aj, A − Aj, −A + Aj, A − Aj, A + Aj, −A − Aj, −A − Aj, −A − Aj, A + Aj, −A − Aj, A + Aj, −A + Aj, −A + Aj, A − Aj, −A − Aj, A + Aj, A + Aj, A − Aj, A + Aj |
| | Polarization 2 | A + Aj, −A + Aj, −A + Aj, −A − Aj, A + Aj, −A − Aj, A + Aj, A + Aj, A − Aj, −A + Aj, −A − Aj, A − Aj, A − Aj, −A − Aj, A − Aj, A + Aj, A − Aj, −A + Aj, A − Aj, A + Aj, A − Aj, A + Aj, A + Aj, A + Aj, −A + Aj, A − Aj, A + Aj, −A − Aj, A − Aj, A + Aj, −A − Aj, −A − Aj, A − Aj, −A − Aj, A + Aj, A + Aj, −A − Aj, −A − Aj, −A − Aj, −A + Aj, A + Aj, −A − Aj, −A + Aj, −A − Aj, A + Aj, A − Aj, A − Aj, A + Aj, −A + Aj, −A − Aj, −A − Aj, −A + Aj, −A + Aj, −A + Aj, −A + Aj, A + Aj, A − Aj, A − Aj, −A + Aj, −A − Aj, −A − Aj, A + Aj, −A − Aj, −A + Aj, A − Aj, A − Aj, A − Aj, −A + Aj, A − Aj, −A + Aj, A + Aj, A + Aj, −A − Aj, A − Aj, −A + Aj, −A + Aj, −A − Aj, −A + Aj |
| 11 | Polarization 1 | A − Aj, −A − Aj, −A − Aj, −A + Aj, A − Aj, −A + Aj, A − Aj, A − Aj, A + Aj, −A − Aj, −A + Aj, A + Aj, A + Aj, −A + Aj, A + Aj, A − Aj, A + Aj, −A − Aj, A + Aj, A − Aj, A + Aj, A − Aj, A − Aj, A − Aj, −A − Aj, A + Aj, A − Aj, −A + Aj, A + Aj, A − Aj, −A + Aj, −A + Aj, A + Aj, −A + Aj, A − Aj, A − Aj, −A + Aj, −A + Aj, −A + Aj, −A − Aj, A − Aj, −A + Aj, −A − Aj, −A + Aj, A − Aj, A + Aj, A + Aj, A − Aj, −A − Aj, −A + Aj, −A + Aj, −A − Aj, −A − Aj, −A − Aj, −A − Aj, A − Aj, A + Aj, A + Aj, −A − Aj, −A + Aj, −A + Aj, A − Aj, −A + Aj, −A − Aj, A + Aj, A + Aj, A + Aj, −A − Aj, A + Aj, −A − Aj, A − Aj, A − Aj, −A + Aj, A + Aj, −A − Aj, −A − Aj, −A + Aj, −A − Aj |
| | Polarization 2 | −A − Aj, A − Aj, A − Aj, A + Aj, −A − Aj, A + Aj, −A − Aj, −A − Aj, −A + Aj, A − Aj, A + Aj, −A + Aj, −A + Aj, A + Aj, −A + Aj, −A − Aj, −A + Aj, A − Aj, −A + Aj, −A − Aj, −A + Aj, −A − Aj, −A − Aj, −A − Aj, A − Aj, −A + Aj, −A − Aj, A + Aj, −A + Aj, −A − Aj, A + Aj, A + Aj, −A + Aj, A + Aj, −A − Aj, −A − Aj, A + Aj, A + Aj, A + Aj, A − Aj, −A − Aj, A + Aj, A − Aj, A + Aj, −A − Aj, −A + Aj, −A + Aj, −A − Aj, A − Aj, A + Aj, A + Aj, A − Aj, A − Aj, A − Aj, A − Aj, −A − Aj, −A + Aj, −A + Aj, A − Aj, A + Aj, A + Aj, −A − Aj, A + Aj, A − Aj, −A + Aj, −A + Aj, −A + Aj, A − Aj, −A + Aj, A − Aj, −A − Aj, −A − Aj, A + Aj, −A + Aj, A − Aj, A − Aj, A + Aj, A − Aj |
| 12 | Polarization 1 | A − Aj, −A − Aj, −A − Aj, −A + Aj, A − Aj, −A + Aj, A − Aj, A − Aj, A + Aj, −A − Aj, −A + Aj, A + Aj, A + Aj, −A + Aj, A + Aj, A − Aj, A + Aj, −A − Aj, A + Aj, A − Aj, A + Aj, A − Aj, A − Aj, A − Aj, −A − Aj, A + Aj, A − Aj, −A + Aj, A + Aj, A − Aj, −A + Aj, −A + Aj, A + Aj, −A + Aj, A − Aj, A − Aj, −A + Aj, −A + Aj, −A + Aj, −A − Aj, A − Aj, −A + Aj, −A − Aj, −A + Aj, A − Aj, A + Aj, A + Aj, A − Aj, −A − Aj, −A + Aj, −A + Aj, −A − Aj, −A − Aj, −A − Aj, −A − Aj, A − Aj, A + Aj, A + Aj, −A − Aj, −A + Aj, −A + Aj, A − Aj, −A + Aj, −A − Aj, A + Aj, A + Aj, A + Aj, −A − Aj, A + Aj, −A − Aj, A − Aj, A − Aj, −A + Aj, A + Aj, −A − Aj, −A − Aj, −A + Aj, −A − Aj |
| | Polarization 2 | A + Aj, −A + Aj, −A + Aj, −A − Aj, A + Aj, −A − Aj, A + Aj, A + Aj, A − Aj, −A + Aj, −A − Aj, A − Aj, A − Aj, −A − Aj, A − Aj, A + Aj, A − Aj, −A + Aj, A − Aj, A + Aj, A − Aj, A + Aj, A + Aj, A + Aj, −A + Aj, A − Aj, A + Aj, −A − Aj, A − Aj, A + Aj, −A − Aj, −A − Aj, A − Aj, −A − Aj, A + Aj, A + Aj, −A − Aj, −A − Aj, −A − Aj, −A + Aj, A + Aj, −A − Aj, −A + Aj, −A − Aj, A + Aj, A − Aj, A − Aj, A + Aj, −A + Aj, −A − Aj, −A − Aj, −A + Aj, −A + Aj, −A + Aj, −A + Aj, A + Aj, A − Aj, A − |

TABLE 18-1-continued

| Index | Polarization | Pilot sequence |
|---|---|---|
| | | Aj, −A + Aj, −A − Aj, −A − Aj, A + Aj, −A − Aj, −A + Aj, A − Aj, A − Aj, A − Aj, −A + Aj, A − Aj, −A + Aj, A + Aj, A + Aj, −A − Aj, A − Aj, −A + Aj, −A + Aj, −A − Aj, −A + Aj |
| 13 | Polarization 1 | −A − Aj, A − Aj, −A − Aj, −A − Aj, A + Aj, A − Aj, −A + Aj, −A + Aj, −A − Aj, A + Aj, −A − Aj, A + Aj, A + Aj, A + Aj, −A − Aj, A − Aj, −A + Aj, A − Aj, A − Aj, −A − Aj, A + Aj, A + Aj, −A + Aj, −A − Aj, −A − Aj, −A − Aj, −A − Aj, A − Aj, A − Aj, −A − Aj, −A + Aj, A + Aj, A + Aj, −A + Aj, A − Aj, −A − Aj, A − Aj, −A + Aj, −A − Aj, A − Aj, A − Aj, A − Aj, −A + Aj, −A + Aj, A − Aj, A + Aj, A − Aj, A − Aj, −A + Aj, A + Aj, A − Aj, −A + Aj, A + Aj, −A − Aj, −A + Aj, −A + Aj, −A + Aj, A + Aj, −A + Aj, A + Aj, −A − Aj, A + Aj, −A + Aj, A + Aj, A − Aj, A + Aj, A + Aj, A − Aj, −A − Aj, A + Aj, −A + Aj, −A + Aj, A − Aj, −A + Aj, A − Aj, −A − Aj, −A − Aj, −A + Aj |
| | Polarization 2 | −A + Aj, A + Aj, −A + Aj, −A + Aj, A − Aj, A + Aj, −A − Aj, −A − Aj, −A + Aj, A − Aj, −A + Aj, A − Aj, A − Aj, A − Aj, −A + Aj, A + Aj, −A − Aj, A + Aj, A + Aj, −A + Aj, A − Aj, A − Aj, −A − Aj, −A + Aj, −A + Aj, −A + Aj, −A + Aj, A + Aj, A + Aj, −A + Aj, −A − Aj, A − Aj, A − Aj, −A − Aj, A + Aj, −A + Aj, A + Aj, −A − Aj, −A + Aj, A + Aj, A + Aj, A + Aj, −A − Aj, −A − Aj, A + Aj, A − Aj, A + Aj, A + Aj, −A − Aj, A − Aj, A + Aj, −A − Aj, A − Aj, −A + Aj, −A − Aj, −A − Aj, −A − Aj, A − Aj, −A − Aj, A − Aj, −A + Aj, A − Aj, −A − Aj, A − Aj, A + Aj, A − Aj, A − Aj, A + Aj, −A + Aj, A − Aj, −A − Aj, −A − Aj, A + Aj, −A − Aj, A + Aj, −A + Aj, −A + Aj, −A − Aj |
| 14 | Polarization 1 | −A − Aj, A − Aj, −A − Aj, −A − Aj, A + Aj, A − Aj, −A + Aj, −A + Aj, −A − Aj, A + Aj, −A − Aj, A + Aj, A + Aj, A + Aj, −A − Aj, A − Aj, −A + Aj, A − Aj, A − Aj, −A − Aj, A + Aj, A + Aj, −A + Aj, −A − Aj, −A − Aj, −A − Aj, −A − Aj, A − Aj, A − Aj, −A − Aj, −A + Aj, A + Aj, A + Aj, −A + Aj, A − Aj, −A − Aj, A − Aj, −A + Aj, −A − Aj, A − Aj, A − Aj, A − Aj, −A + Aj, −A + Aj, A − Aj, A + Aj, A − Aj, A − Aj, −A + Aj, A + Aj, A − Aj, −A + Aj, A + Aj, −A − Aj, −A + Aj, −A + Aj, −A + Aj, A + Aj, −A + Aj, A + Aj, −A − Aj, A + Aj, −A + Aj, A + Aj, A − Aj, A + Aj, A + Aj, A − Aj, −A − Aj, A + Aj, −A + Aj, −A + Aj, A − Aj, −A + Aj, A − Aj, −A − Aj, −A − Aj, −A + Aj |
| | Polarization 2 | A − Aj, −A − Aj, A − Aj, A − Aj, −A + Aj, −A − Aj, A + Aj, A + Aj, A − Aj, −A + Aj, A − Aj, −A + Aj, −A + Aj, −A + Aj, A − Aj, −A − Aj, A + Aj, −A − Aj, −A − Aj, A − Aj, −A + Aj, −A + Aj, A + Aj, A − Aj, A − Aj, A − Aj, A − Aj, −A − Aj, −A − Aj, A − Aj, A + Aj, −A + Aj, −A + Aj, A + Aj, −A − Aj, A − Aj, −A − Aj, A + Aj, A − Aj, −A − Aj, −A − Aj, −A − Aj, A + Aj, A + Aj, −A − Aj, −A + Aj, −A − Aj, −A − Aj, A + Aj, −A + Aj, −A − Aj, A + Aj, −A + Aj, A − Aj, A + Aj, A + Aj, A + Aj, −A + Aj, A + Aj, −A + Aj, A − Aj, −A + Aj, A + Aj, −A + Aj, −A − Aj, −A + Aj, −A + Aj, −A − Aj, A − Aj, −A + Aj, A + Aj, A + Aj, −A − Aj, A + Aj, −A − Aj, A − Aj, A − Aj, A + Aj |
| 15 | Polarization 1 | A + Aj, −A + Aj, A + Aj, A + Aj, −A − Aj, −A + Aj, A − Aj, A − Aj, A + Aj, −A − Aj, A + Aj, −A − Aj, −A − Aj, −A − Aj, A + Aj, −A + Aj, A − Aj, −A + Aj, −A + Aj, A + Aj, −A − Aj, −A − Aj, A − Aj, A + Aj, A + Aj, A + Aj, A + Aj, −A + Aj, −A + Aj, A + Aj, A − Aj, −A − Aj, −A − Aj, A − Aj, −A + Aj, A + Aj, −A + Aj, A − Aj, A + Aj, −A + Aj, −A + Aj, −A + Aj, A − Aj, A − Aj, −A + Aj, −A − Aj, −A + Aj, −A + Aj, A − Aj, −A − Aj, −A + Aj, A − Aj, −A − Aj, A + Aj, A − Aj, A − Aj, A − Aj, −A − Aj, A − Aj, −A − Aj, A + Aj, −A − Aj, A − Aj, −A − Aj, −A + Aj, −A − Aj, −A − Aj, −A + Aj, A + Aj, −A − Aj, A − Aj, A − Aj, −A + Aj, A − Aj, −A + Aj, A + Aj, A + Aj, A − Aj |
| | Polarization 2 | −A + Aj, A + Aj, −A + Aj, −A + Aj, A − Aj, A + Aj, −A − Aj, −A − Aj, −A + Aj, A − Aj, −A + Aj, A − Aj, A − Aj, A − Aj, −A + Aj, A + Aj, −A − Aj, A + Aj, A + Aj, −A + Aj, A − Aj, A − Aj, −A − Aj, −A + Aj, −A + Aj, −A + Aj, −A + Aj, A + Aj, A + Aj, −A + Aj, −A − Aj, A − Aj, A − Aj, −A − Aj, A + Aj, −A + Aj, A + Aj, −A − Aj, −A + Aj, A + Aj, A + Aj, A + Aj, −A − Aj, −A − Aj, A + Aj, A − Aj, A + Aj, A + Aj, −A − Aj, A − Aj, A + Aj, −A − Aj, A − Aj, −A + Aj, −A − Aj, −A − Aj, −A − Aj, A − Aj, −A − Aj, A − Aj, −A + Aj, A − Aj, −A − Aj, A − Aj, A + Aj, A − Aj, A − Aj, A + Aj, −A + Aj, A − Aj, −A − Aj, −A − Aj, A + Aj, −A − Aj, A + Aj, −A + Aj, −A + Aj, −A − Aj |
| 16 | Polarization 1 | A + Aj, −A + Aj, A + Aj, A + Aj, −A − Aj, −A + Aj, A − Aj, A − Aj, A + Aj, −A − Aj, A + Aj, −A − Aj, −A − Aj, −A − Aj, A + Aj, −A + Aj, A − Aj, −A + Aj, −A + Aj, A + Aj, −A − Aj, −A − Aj, A − Aj, A + Aj, A + Aj, A + Aj, A + Aj, −A + Aj, −A + Aj, A + Aj, A − Aj, −A − Aj, −A − Aj, A − Aj, −A + Aj, A + Aj, −A + Aj, A − Aj, A + Aj, −A + Aj, −A + Aj, −A + Aj, A − Aj, A − Aj, −A + Aj, −A − Aj, −A + Aj, −A + Aj, A − Aj, −A − Aj, −A + Aj, A − Aj, −A − Aj, A + Aj, A − Aj, A − Aj, A − Aj, −A − Aj, A − Aj, −A − Aj, A + Aj, −A − Aj, A − Aj, −A − Aj, −A + Aj, −A − Aj, −A − Aj, −A + Aj, A + Aj, −A − Aj, A − Aj, A − Aj, −A + Aj, A − Aj, −A + Aj, A + Aj, A + Aj, A − Aj |
| | Polarization 2 | A − Aj, −A − Aj, A − Aj, A − Aj, −A + Aj, −A − Aj, A + Aj, A + Aj, A − Aj, −A + Aj, A − Aj, −A + Aj, −A + Aj, −A + Aj, A − Aj, −A − Aj, A + Aj, −A − Aj, −A − Aj, A − Aj, −A + Aj, −A + Aj, A + Aj, A − Aj, A − Aj, A − Aj, A − Aj, −A − Aj, −A − Aj, A − Aj, A + Aj, −A + Aj, −A + Aj, A + Aj, −A − Aj, A − Aj, −A − Aj, A + Aj, A − Aj, −A − Aj, −A − Aj, −A − Aj, A + Aj, A + Aj, −A − Aj, −A + Aj, −A − Aj, −A − Aj, A + Aj, −A + Aj, −A − Aj, A + Aj, −A + Aj, A − Aj, A + Aj, A + Aj, A + Aj, −A + Aj, A + Aj, −A + Aj, A − Aj, −A + Aj, A + Aj, −A + Aj, −A − Aj, −A + Aj, −A + Aj, −A − Aj, A − Aj, −A + Aj, A + Aj, A + Aj, −A − Aj, A + Aj, −A − Aj, A − Aj, A − Aj, A + Aj |
| 17 | Polarization 1 | −A − Aj, −A − Aj, A + Aj, A + Aj, −A + Aj, A − Aj, −A + Aj, −A − Aj, −A + Aj, −A + Aj, A + Aj, −A + Aj, A + Aj, −A − Aj, A − Aj, A − Aj, −A + Aj, A − Aj, −A − Aj, A + Aj, −A − Aj, A + Aj, −A + Aj, −A − Aj, −A − Aj, A − Aj, A − Aj, A + Aj, −A + Aj, −A + Aj, −A + Aj, −A − Aj, −A + Aj, A + Aj, −A − Aj, −A − Aj, −A + Aj, −A − Aj, −A − Aj, −A − Aj, −A + Aj, A − Aj, A + Aj, −A + Aj, A + Aj, A − Aj, −A + Aj, A + Aj, A + Aj, A − Aj, A − Aj, −A + Aj, −A − Aj, A + Aj, A − Aj, A − Aj, A + Aj, A + Aj, A − Aj, −A − Aj, A − Aj, −A + Aj, −A + Aj, A − Aj, −A − Aj, −A + Aj, A + Aj, A − Aj, A + Aj, −A − Aj, A − Aj, −A − Aj, A − Aj, A + Aj, A − Aj, A + Aj, A − Aj, −A + Aj |
| | Polarization 2 | −A + Aj, −A + Aj, A − Aj, A − Aj, −A − Aj, A + Aj, −A − Aj, −A + Aj, −A − Aj, −A − Aj, A − Aj, −A − Aj, A − Aj, −A + Aj, A + Aj, A + Aj, −A − Aj, A + Aj, −A + Aj, A − Aj, −A + Aj, A − Aj, −A − Aj, −A + Aj, −A + Aj, A + Aj, A + Aj, A − Aj, −A − Aj, −A − Aj, −A − Aj, −A + Aj, −A − Aj, A − Aj, −A + Aj, −A + Aj, −A − Aj, −A + Aj, −A + Aj, −A + Aj, −A − Aj, A + Aj, A − Aj, −A − Aj, A − Aj, A + Aj, −A − Aj, A − Aj, A − Aj, A + Aj, A + Aj, −A − Aj, −A + Aj, A − Aj, A + Aj, A + Aj, A − Aj, A − Aj, A + Aj, −A + Aj, A + Aj, −A − Aj, −A − Aj, A + Aj, −A + Aj, −A − Aj, A − Aj, A + Aj, A − Aj, −A + Aj, A + Aj, −A + Aj, A + Aj, A − Aj, A + Aj, A − Aj, A + Aj, −A − Aj |
| 18 | Polarization 1 | −A − Aj, −A − Aj, A + Aj, A + Aj, −A + Aj, A − Aj, −A + Aj, −A − Aj, −A + Aj, −A + Aj, A + Aj, −A + Aj, A + Aj, −A − Aj, A − Aj, A − Aj, −A + Aj, A − Aj, −A − Aj, A + Aj, −A − Aj, A + Aj, −A + Aj, −A − Aj, −A − Aj, A − Aj, A − Aj, A + Aj, −A + Aj, −A + Aj, −A + Aj, −A − Aj, −A + Aj, A + Aj, −A − Aj, −A − Aj, −A + Aj, −A − Aj, −A − Aj, −A − Aj, −A + Aj, A − Aj, A + Aj, −A + Aj, A + Aj, A − Aj, −A + Aj, A + Aj, A + Aj, A − Aj, A − Aj, −A + Aj, −A − Aj, A + Aj, A − Aj, A − Aj, |

TABLE 18-1-continued

| Index | Polarization | Pilot sequence |
|---|---|---|
| | | A + Aj, A + Aj, A – Aj, –A – Aj, A – Aj, –A + Aj, –A + Aj, A – Aj, –A – Aj, –A + Aj, A + Aj, A – Aj, A + Aj, –A – Aj, A – Aj, –A – Aj, A – Aj, A + Aj, A – Aj, A + Aj, A – Aj, –A + Aj |
| | Polarization 2 | A – Aj, A – Aj, –A + Aj, –A + Aj, A + Aj, –A – Aj, A + Aj, A – Aj, A + Aj, A + Aj, –A + Aj, A + Aj, –A + Aj, A – Aj, –A – Aj, –A – Aj, A + Aj, –A – Aj, A – Aj, –A + Aj, A – Aj, –A + Aj, A + Aj, A – Aj, A – Aj, –A – Aj, –A – Aj, –A + Aj, A + Aj, A + Aj, A + Aj, A – Aj, A + Aj, –A + Aj, A – Aj, A – Aj, A + Aj, A – Aj, A – Aj, A – Aj, A + Aj, –A – Aj, –A + Aj, A + Aj, –A + Aj, –A – Aj, A + Aj, –A + Aj, –A + Aj, –A – Aj, –A – Aj, A + Aj, A – Aj, –A + Aj, –A – Aj, –A – Aj, –A + Aj, –A + Aj, –A – Aj, A – Aj, –A – Aj, A + Aj, A + Aj, –A – Aj, A – Aj, A + Aj, –A + Aj, –A – Aj, –A + Aj, A – Aj, –A – Aj, A – Aj, –A – Aj, –A + Aj, –A – Aj, –A + Aj, –A – Aj, A + Aj |
| 19 | Polarization 1 | A + Aj, A + Aj, –A – Aj, –A – Aj, A – Aj, –A + Aj, A – Aj, A + Aj, A – Aj, A – Aj, –A – Aj, A – Aj, –A – Aj, A + Aj, –A + Aj, –A + Aj, A – Aj, –A + Aj, A + Aj, –A – Aj, A + Aj, –A – Aj, A – Aj, A + Aj, A + Aj, –A + Aj, –A + Aj, –A – Aj, A – Aj, A – Aj, A – Aj, A + Aj, A – Aj, –A – Aj, A + Aj, A + Aj, A – Aj, A + Aj, A + Aj, A + Aj, A – Aj, –A + Aj, –A – Aj, A – Aj, –A – Aj, –A + Aj, A – Aj, –A – Aj, –A – Aj, –A + Aj, –A + Aj, A – Aj, A + Aj, –A – Aj, –A + Aj, –A + Aj, –A – Aj, –A – Aj, –A + Aj, A + Aj, –A + Aj, A – Aj, A – Aj, –A + Aj, A + Aj, A – Aj, –A – Aj, –A + Aj, –A – Aj, A + Aj, –A + Aj, A + Aj, –A + Aj, –A – Aj, –A + Aj, –A – Aj, –A + Aj, A – Aj |
| | Polarization 2 | –A + Aj, –A + Aj, A – Aj, A – Aj, –A – Aj, A + Aj, –A – Aj, –A + Aj, –A – Aj, –A – Aj, A – Aj, –A – Aj, A – Aj, –A + Aj, A + Aj, A + Aj, –A – Aj, A + Aj, –A + Aj, A – Aj, –A + Aj, A – Aj, –A – Aj, –A + Aj, –A + Aj, A + Aj, A + Aj, A – Aj, –A – Aj, –A – Aj, –A – Aj, –A + Aj, –A – Aj, A – Aj, –A + Aj, –A + Aj, –A – Aj, –A + Aj, –A + Aj, –A + Aj, –A – Aj, A + Aj, A – Aj, –A – Aj, A – Aj, A + Aj, –A – Aj, A – Aj, A – Aj, A + Aj, A + Aj, –A – Aj, –A + Aj, A – Aj, A + Aj, A + Aj, A – Aj, A – Aj, A + Aj, –A + Aj, A + Aj, –A – Aj, –A – Aj, A + Aj, –A + Aj, –A – Aj, A – Aj, A + Aj, A – Aj, –A + Aj, A + Aj, –A + Aj, A + Aj, A – Aj, A + Aj, A – Aj, A + Aj, –A – Aj |
| 20 | Polarization 1 | A + Aj, A + Aj, –A – Aj, –A – Aj, A – Aj, –A + Aj, A – Aj, A + Aj, A – Aj, A – Aj, –A – Aj, A – Aj, –A – Aj, A + Aj, –A + Aj, –A + Aj, A – Aj, –A + Aj, A + Aj, –A – Aj, A + Aj, –A – Aj, A – Aj, A + Aj, A + Aj, –A + Aj, –A + Aj, –A – Aj, A – Aj, A – Aj, A – Aj, A + Aj, A – Aj, –A – Aj, A + Aj, A + Aj, A – Aj, A + Aj, A + Aj, A + Aj, A – Aj, –A + Aj, –A – Aj, A – Aj, –A – Aj, –A + Aj, A – Aj, –A – Aj, –A – Aj, –A + Aj, –A + Aj, A – Aj, A + Aj, –A – Aj, –A + Aj, –A + Aj, –A – Aj, –A – Aj, –A + Aj, A + Aj, –A + Aj, A – Aj, A – Aj, –A + Aj, A + Aj, A – Aj, –A – Aj, –A + Aj, –A – Aj, A + Aj, –A + Aj, A + Aj, –A + Aj, –A – Aj, –A + Aj, –A – Aj, –A + Aj, A – Aj |
| | Polarization 2 | A – Aj, A – Aj, –A + Aj, –A + Aj, A + Aj, –A – Aj, A + Aj, A – Aj, A + Aj, A + Aj, –A + Aj, A + Aj, –A + Aj, A – Aj, –A – Aj, –A – Aj, A + Aj, –A – Aj, A – Aj, –A + Aj, A – Aj, –A + Aj, A + Aj, A – Aj, A – Aj, –A – Aj, –A – Aj, –A + Aj, A + Aj, A + Aj, A + Aj, A – Aj, A + Aj, –A + Aj, A – Aj, A – Aj, A + Aj, A – Aj, A – Aj, A – Aj, A + Aj, –A – Aj, –A + Aj, A + Aj, –A + Aj, –A – Aj, A + Aj, –A + Aj, –A + Aj, –A – Aj, –A – Aj, A + Aj, A – Aj, –A + Aj, –A – Aj, –A – Aj, –A + Aj, –A + Aj, –A – Aj, A – Aj, –A – Aj, A + Aj, A + Aj, –A – Aj, A – Aj, A + Aj, –A + Aj, –A – Aj, –A + Aj, A – Aj, –A – Aj, A – Aj, –A – Aj, –A + Aj, –A – Aj, –A + Aj, –A – Aj, A + Aj |
| 21 | Polarization 1 | –A + Aj, A + Aj, –A – Aj, –A – Aj, A + Aj, –A + Aj, A + Aj, –A + Aj, –A – Aj, A + Aj, –A – Aj, –A + Aj, –A + Aj, –A + Aj, A – Aj, –A – Aj, –A – Aj, A – Aj, A + Aj, A + Aj, –A – Aj, –A + Aj, A + Aj, –A + Aj, A – Aj, A + Aj, –A – Aj, A – Aj, –A + Aj, –A + Aj, –A – Aj, A – Aj, –A – Aj, –A + Aj, –A – Aj, A + Aj, A – Aj, –A + Aj, –A + Aj, A – Aj, A – Aj, –A – Aj, A – Aj, –A – Aj, A + Aj, –A – Aj, A + Aj, –A + Aj, –A + Aj, –A + Aj, –A – Aj, –A – Aj, –A – Aj, –A + Aj, A + Aj, A + Aj, A – Aj, A + Aj, A + Aj, A – Aj, –A + Aj, A + Aj, A – Aj, A – Aj, A + Aj, A – Aj, –A – Aj, –A + Aj, A – Aj, A + Aj, A – Aj, A – Aj, –A + Aj, A – Aj, –A – Aj, A – Aj, A – Aj, A + Aj |
| | Polarization 2 | –A – Aj, A – Aj, –A + Aj, –A + Aj, A – Aj, –A – Aj, A – Aj, –A – Aj, –A + Aj, A – Aj, –A + Aj, –A – Aj, –A – Aj, –A – Aj, A + Aj, –A + Aj, –A + Aj, A + Aj, A – Aj, A – Aj, –A + Aj, –A – Aj, A – Aj, –A – Aj, A + Aj, A – Aj, –A + Aj, A + Aj, –A – Aj, –A – Aj, –A + Aj, A + Aj, –A + Aj, –A – Aj, –A + Aj, A – Aj, A + Aj, –A – Aj, –A – Aj, A + Aj, A + Aj, –A + Aj, A + Aj, –A + Aj, A – Aj, –A + Aj, A – Aj, –A – Aj, –A – Aj, –A – Aj, –A + Aj, –A + Aj, –A + Aj, –A – Aj, A – Aj, A – Aj, A + Aj, A – Aj, A – Aj, A + Aj, –A – Aj, A – Aj, A + Aj, A + Aj, A – Aj, A + Aj, –A + Aj, –A – Aj, A + Aj, A – Aj, A + Aj, A + Aj, –A – Aj, A + Aj, –A + Aj, A + Aj, A + Aj, A – Aj |
| 22 | Polarization 1 | –A + Aj, A + Aj, –A – Aj, –A – Aj, A + Aj, –A + Aj, A + Aj, –A + Aj, –A – Aj, A + Aj, –A – Aj, –A + Aj, –A + Aj, –A + Aj, A – Aj, –A – Aj, –A – Aj, A – Aj, A + Aj, A + Aj, –A – Aj, –A + Aj, A + Aj, –A + Aj, A – Aj, A + Aj, –A – Aj, A – Aj, –A + Aj, –A + Aj, –A – Aj, A – Aj, –A – Aj, –A + Aj, –A – Aj, A + Aj, A – Aj, –A + Aj, –A + Aj, A – Aj, A – Aj, –A – Aj, A – Aj, –A – Aj, A + Aj, –A – Aj, A + Aj, –A + Aj, –A + Aj, –A + Aj, –A – Aj, –A – Aj, –A – Aj, –A + Aj, A + Aj, A + Aj, A – Aj, A + Aj, A + Aj, A – Aj, –A + Aj, A + Aj, A – Aj, A – Aj, A + Aj, A – Aj, –A – Aj, –A + Aj, A – Aj, A + Aj, A – Aj, A – Aj, –A + Aj, A – Aj, –A – Aj, A – Aj, A – Aj, A + Aj |
| | Polarization 2 | A + Aj, –A + Aj, A – Aj, A – Aj, –A + Aj, A + Aj, –A + Aj, A + Aj, A – Aj, –A + Aj, A – Aj, A + Aj, A + Aj, A + Aj, –A – Aj, A – Aj, A – Aj, –A – Aj, –A + Aj, –A + Aj, A – Aj, A + Aj, –A + Aj, A + Aj, –A – Aj, –A + Aj, A – Aj, –A – Aj, A + Aj, A + Aj, A – Aj, –A – Aj, A – Aj, A + Aj, A – Aj, –A + Aj, –A – Aj, A + Aj, A + Aj, –A – Aj, –A – Aj, A – Aj, –A – Aj, A – Aj, –A + Aj, A – Aj, –A + Aj, A + Aj, A + Aj, A + Aj, A – Aj, A – Aj, A – Aj, A + Aj, –A + Aj, –A + Aj, –A – Aj, –A + Aj, –A + Aj, –A – Aj, A + Aj, –A + Aj, –A – Aj, –A – Aj, –A + Aj, –A – Aj, A – Aj, A + Aj, –A – Aj, –A + Aj, –A – Aj, –A – Aj, A + Aj, –A – Aj, A – Aj, –A – Aj, –A – Aj, –A + Aj |
| 23 | Polarization 1 | A – Aj, –A – Aj, A + Aj, A + Aj, –A – Aj, A – Aj, –A – Aj, A – Aj, A + Aj, –A – Aj, A + Aj, A – Aj, A – Aj, A – Aj, –A + Aj, A + Aj, A + Aj, –A + Aj, –A – Aj, –A – Aj, A + Aj, A – Aj, –A – Aj, A – Aj, –A + Aj, –A – Aj, A + Aj, –A + Aj, A – Aj, A – Aj, A + Aj, –A + Aj, A + Aj, A – Aj, A + Aj, –A – Aj, –A + Aj, A – Aj, A – Aj, –A + Aj, –A + Aj, A + Aj, –A + Aj, A + Aj, –A – Aj, A + Aj, –A – Aj, A – Aj, A – Aj, A – Aj, A + Aj, A + Aj, A + Aj, A – Aj, –A – Aj, –A – Aj, –A + Aj, –A – Aj, –A – Aj, –A + Aj, A – Aj, –A – Aj, –A + Aj, –A + Aj, –A – Aj, –A + Aj, A + Aj, A – Aj, –A + Aj, –A – Aj, –A + Aj, –A + Aj, A – Aj, –A + Aj, A + Aj, –A + Aj, –A + Aj, –A – Aj |
| | Polarization 2 | –A – Aj, A – Aj, –A + Aj, –A + Aj, A – Aj, –A – Aj, A – Aj, –A – Aj, –A + Aj, A – Aj, –A + Aj, –A – Aj, –A – Aj, –A – Aj, A + Aj, –A + Aj, –A + Aj, A + Aj, A – Aj, A – Aj, –A + Aj, –A – Aj, A – Aj, –A – Aj, A + Aj, A – Aj, –A + Aj, A + Aj, –A – Aj, –A – Aj, –A + Aj, A + Aj, –A + Aj, –A – Aj, –A + Aj, A – Aj, A + Aj, –A – Aj, –A – Aj, A + Aj, A + Aj, –A + Aj, A + Aj, –A + Aj, A – Aj, |

TABLE 18-1-continued

| Index | Polarization | Pilot sequence |
| --- | --- | --- |
| | | −A + Aj, A − Aj, −A − Aj, −A − Aj, −A − Aj, −A + Aj, −A + Aj, −A + Aj, −A − Aj, A − Aj, A − Aj, A + Aj, A − Aj, A − Aj, A + Aj, −A − Aj, A − Aj, A + Aj, A + Aj, A − Aj, A + Aj, −A + Aj, −A − Aj, A + Aj, A − Aj, A + Aj, A + Aj, −A − Aj, A + Aj, −A + Aj, A + Aj, A + Aj, A − Aj |
| 24 | Polarization 1 | A − Aj, −A − Aj, A + Aj, A + Aj, −A − Aj, A − Aj, −A − Aj, A − Aj, A + Aj, −A − Aj, A + Aj, A − Aj, A − Aj, A − Aj, −A + Aj, A + Aj, A + Aj, −A + Aj, −A − Aj, −A − Aj, A + Aj, A − Aj, −A − Aj, A − Aj, −A + Aj, −A − Aj, A + Aj, −A + Aj, A − Aj, A − Aj, A + Aj, −A + Aj, A + Aj, A − Aj, A + Aj, −A − Aj, −A + Aj, A − Aj, A − Aj, −A + Aj, −A + Aj, A + Aj, −A + Aj, A + Aj, −A − Aj, A + Aj, −A − Aj, A − Aj, A − Aj, A − Aj, A + Aj, A + Aj, A + Aj, A − Aj, −A − Aj, −A − Aj, −A + Aj, −A − Aj, −A − Aj, −A + Aj, A − Aj, −A − Aj, −A + Aj, −A + Aj, −A − Aj, −A + Aj, A + Aj, A − Aj, −A + Aj, −A − Aj, −A + Aj, −A + Aj, A − Aj, −A + Aj, A + Aj, −A + Aj, −A + Aj, −A − Aj |
| | Polarization 2 | A + Aj, −A + Aj, A − Aj, A − Aj, −A + Aj, A + Aj, −A + Aj, A + Aj, A − Aj, −A + Aj, A − Aj, A + Aj, A + Aj, A + Aj, −A − Aj, A − Aj, A − Aj, −A − Aj, −A + Aj, −A + Aj, A − Aj, A + Aj, −A + Aj, A + Aj, −A − Aj, −A + Aj, A − Aj, −A − Aj, A + Aj, A + Aj, A − Aj, −A − Aj, A − Aj, A + Aj, A − Aj, −A + Aj, −A − Aj, A + Aj, A + Aj, −A − Aj, −A − Aj, A − Aj, −A − Aj, A − Aj, −A + Aj, A − Aj, −A + Aj, A + Aj, A + Aj, A + Aj, A − Aj, A − Aj, A − Aj, A + Aj, −A + Aj, −A + Aj, −A − Aj, −A + Aj, −A + Aj, −A − Aj, A + Aj, −A + Aj, −A − Aj, −A − Aj, −A + Aj, −A − Aj, A − Aj, A + Aj, −A − Aj, −A + Aj, −A − Aj, −A − Aj, A + Aj, −A − Aj, A − Aj, −A − Aj, −A − Aj, −A + Aj |
| 25 | Polarization 1 | A − Aj, A + Aj, −A − Aj, −A − Aj, A + Aj, A + Aj, −A + Aj, A + Aj, −A − Aj, A − Aj, A + Aj, A + Aj, −A + Aj, −A + Aj, −A + Aj, −A − Aj, A + Aj, −A − Aj, −A − Aj, A + Aj, −A + Aj, A − Aj, A − Aj, −A + Aj, −A − Aj, −A − Aj, A − Aj, −A − Aj, A − Aj, A + Aj, A + Aj, −A − Aj, −A − Aj, A + Aj, A − Aj, −A − Aj, −A + Aj, A − Aj, −A + Aj, A − Aj, −A + Aj, A + Aj, A − Aj, A − Aj, −A + Aj, −A − Aj, A − Aj, −A + Aj, −A + Aj, A + Aj, −A + Aj, −A − Aj, −A + Aj, −A + Aj, −A − Aj, −A − Aj, A + Aj, A − Aj, A − Aj, A − Aj, A + Aj, −A − Aj, −A − Aj, A − Aj, A − Aj, A + Aj, −A + Aj, A + Aj, A + Aj, −A + Aj, −A + Aj, A − Aj, A − Aj, −A − Aj, A + Aj, −A + Aj, −A + Aj, A − Aj |
| | Polarization 2 | A + Aj, A + Aj, A + Aj, A − Aj, −A + Aj, −A − Aj, A + Aj, −A + Aj, A − Aj, A + Aj, −A − Aj, A − Aj, A − Aj, −A + Aj, −A + Aj, −A − Aj, −A + Aj, −A − Aj, A + Aj, −A + Aj, −A − Aj, −A − Aj, −A + Aj, A + Aj, −A − Aj, A − Aj, −A − Aj, −A + Aj, A − Aj, A − Aj, −A − Aj, A − Aj, −A − Aj, A + Aj, −A − Aj, A − Aj, A + Aj, A − Aj, −A − Aj, A + Aj, A + Aj, A + Aj, A − Aj, A − Aj, A − Aj, −A − Aj, A − Aj, A + Aj, −A + Aj, A + Aj, −A + Aj, A − Aj, −A − Aj, A + Aj, −A − Aj, A + Aj, A − Aj, −A − Aj, A − Aj, −A − Aj, A − Aj, −A + Aj, −A − Aj, −A + Aj, −A + Aj, −A + Aj, −A + Aj, −A + Aj, −A − Aj, −A + Aj, A + Aj, −A + Aj, A − Aj, A + Aj, −A + Aj, A + Aj, −A − Aj, A + Aj |
| 26 | Polarization 1 | A − Aj, A + Aj, −A − Aj, −A − Aj, A + Aj, A + Aj, −A + Aj, A + Aj, −A − Aj, A − Aj, A + Aj, A + Aj, −A + Aj, −A + Aj, −A + Aj, −A − Aj, A + Aj, −A − Aj, −A − Aj, A + Aj, −A + Aj, A − Aj, A − Aj, −A + Aj, −A − Aj, −A − Aj, A − Aj, −A − Aj, A − Aj, A + Aj, A + Aj, −A − Aj, −A − Aj, A + Aj, A − Aj, −A − Aj, −A + Aj, A − Aj, −A + Aj, A − Aj, −A + Aj, A + Aj, A − Aj, A − Aj, −A + Aj, −A − Aj, A − Aj, −A + Aj, −A + Aj, A + Aj, −A + Aj, −A − Aj, −A + Aj, −A + Aj, −A − Aj, −A − Aj, A + Aj, A − Aj, A − Aj, A − Aj, A + Aj, −A − Aj, −A − Aj, A − Aj, A − Aj, A + Aj, −A + Aj, A + Aj, A + Aj, −A + Aj, −A + Aj, A − Aj, A − Aj, −A − Aj, A + Aj, −A + Aj, −A + Aj, A − Aj |
| | Polarization 2 | A + Aj, A + Aj, A + Aj, A + Aj, A − Aj, −A + Aj, −A − Aj, A + Aj, −A + Aj, A − Aj, A + Aj, −A − Aj, A − Aj, A − Aj, −A + Aj, −A + Aj, −A − Aj, −A + Aj, −A − Aj, A + Aj, −A + Aj, −A − Aj, −A − Aj, −A + Aj, A + Aj, −A − Aj, A − Aj, −A − Aj, −A + Aj, A − Aj, A − Aj, −A − Aj, A − Aj, −A − Aj, A + Aj, −A − Aj, A − Aj, A + Aj, A − Aj, −A − Aj, A + Aj, A + Aj, A + Aj, A − Aj, A − Aj, A − Aj, −A − Aj, A − Aj, A + Aj, −A + Aj, A + Aj, −A + Aj, A − Aj, −A − Aj, A + Aj, −A − Aj, A + Aj, A − Aj, −A − Aj, A − Aj, −A − Aj, A − Aj, −A + Aj, −A − Aj, −A + Aj, −A + Aj, −A + Aj, −A + Aj, −A + Aj, −A − Aj, −A + Aj, A + Aj, −A + Aj, A − Aj, A + Aj, −A + Aj, A + Aj, −A − Aj |
| 27 | Polarization 1 | A + Aj, −A + Aj, −A + Aj, −A + Aj, −A + Aj, −A + Aj, A − Aj, A + Aj, A + Aj, −A − Aj, A − Aj, −A − Aj, A + Aj, −A − Aj, −A + Aj, A + Aj, A − Aj, A − Aj, A + Aj, A − Aj, A + Aj, −A − Aj, −A − Aj, A + Aj, −A − Aj, −A − Aj, A − Aj, −A + Aj, A + Aj, A + Aj, −A + Aj, −A − Aj, −A − Aj, −A + Aj, −A + Aj, A − Aj, A + Aj, A − Aj, A − Aj, −A − Aj, −A + Aj, −A − Aj, −A + Aj, −A − Aj, −A − Aj, −A − Aj, −A + Aj, A + Aj, −A − Aj, A + Aj, A − Aj, A − Aj, −A − Aj, A − Aj, −A + Aj, −A + Aj, A + Aj, A − Aj, A − Aj, A − Aj, −A − Aj, −A + Aj, −A + Aj, A + Aj, A − Aj, −A + Aj, A + Aj, −A − Aj, A − Aj, A + Aj, −A + Aj, −A + Aj, A − Aj, A − Aj, A − Aj, A + Aj, A + Aj, −A − Aj |
| | Polarization 2 | −A − Aj, A + Aj, A − Aj, −A − Aj, A + Aj, −A − Aj, A + Aj, −A − Aj, −A − Aj, −A − Aj, A − Aj, −A + Aj, −A + Aj, −A − Aj, A + Aj, A − Aj, −A + Aj, A − Aj, A + Aj, A − Aj, −A − Aj, A + Aj, A + Aj, A − Aj, −A − Aj, A + Aj, A − Aj, −A − Aj, A − Aj, A − Aj, −A + Aj, −A + Aj, A + Aj, −A + Aj, A + Aj, A − Aj, A + Aj, A + Aj, A + Aj, −A − Aj, −A + Aj, −A − Aj, −A + Aj, −A + Aj, A − Aj, A − Aj, −A − Aj, −A − Aj, −A + Aj, A − Aj, −A + Aj, −A − Aj, A + Aj, A − Aj, A + Aj, −A + Aj, −A + Aj, −A − Aj, −A + Aj, −A − Aj, −A + Aj, A − Aj, A + Aj, A − Aj, A + Aj, A − Aj, A + Aj, −A + Aj, A − Aj, −A + Aj, −A + Aj, A + Aj, A + Aj, −A − Aj, −A − Aj, −A + Aj, A − Aj, −A − Aj |
| 28 | Polarization 1 | −A + Aj, A − Aj, A − Aj, A + Aj, −A − Aj, −A + Aj, −A + Aj, A − Aj, A − Aj, A + Aj, A + Aj, A − Aj, A + Aj, −A + Aj, −A + Aj, −A − Aj, −A − Aj, A + Aj, −A + Aj, −A + Aj, −A + Aj, A + Aj, −A − Aj, −A − Aj, A − Aj, A − Aj, −A − Aj, A − Aj, A + Aj, A − Aj, A − Aj, −A + Aj, −A − Aj, A − Aj, −A + Aj, −A + Aj, A + Aj, A − Aj, −A + Aj, A − Aj, −A + Aj, A − Aj, −A − Aj, −A + Aj, A + Aj, −A − Aj, −A − Aj, A + Aj, A + Aj, −A + Aj, −A − Aj, −A + Aj, −A − Aj, −A − Aj, A − Aj, −A + Aj, −A + Aj, A − Aj, A + Aj, −A − Aj, −A − Aj, A + Aj, −A − Aj, A − Aj, A − Aj, A − Aj, A + Aj, A + Aj, −A + Aj, −A − Aj, A + Aj, A − Aj, A + Aj, A + Aj, −A − Aj, −A − Aj, A + Aj, −A + Aj |
| | Polarization 2 | −A − Aj, A + Aj, A − Aj, A + Aj, −A + Aj, A − Aj, A + Aj, A − Aj, −A − Aj, A − Aj, A − Aj, A − Aj, A − Aj, A − Aj, −A − Aj, A − Aj, −A + Aj, −A − Aj, −A + Aj, −A − Aj, −A + Aj, A + Aj, −A − Aj, A + Aj, −A − Aj, −A + Aj, A − Aj, A + Aj, A − Aj, A + Aj, −A + Aj, −A − Aj, −A + Aj, −A + Aj, −A + Aj, A + Aj, A + Aj, A + Aj, −A − Aj, −A + Aj, A + Aj, −A + Aj, −A − Aj, A + Aj, −A − Aj, −A + Aj, −A − Aj, −A + Aj, −A + Aj, A − Aj, −A − Aj, −A + Aj, −A − Aj, A + Aj, A − Aj, −A − Aj, −A − Aj, A − Aj, A + Aj, −A − Aj, A − Aj, −A − Aj, A − Aj, A − Aj, −A + Aj, −A + Aj, −A − Aj, A + Aj, −A + Aj, A − Aj, A + Aj, −A − Aj, A − Aj, −A + Aj, A + Aj, A + Aj, A + Aj, A + Aj |
| 29 | Polarization 1 | −A + Aj, A − Aj, A − Aj, A + Aj, −A − Aj, −A + Aj, −A + Aj, A − Aj, A − Aj, A + Aj, A + Aj, A − Aj, A + Aj, −A + Aj, −A + Aj, −A − Aj, −A − Aj, A + Aj, −A + Aj, −A + Aj, −A + Aj, A + Aj, −A − Aj, −A − Aj, A − Aj, A − Aj, −A − Aj, A − Aj, A + Aj, A − Aj, A − Aj, −A + Aj, −A − Aj, A − Aj, −A + Aj, −A + Aj, A + Aj, A − Aj, −A + Aj, A − Aj, −A + Aj, A − Aj, −A − Aj, −A + Aj, A + Aj, −A − Aj, −A − Aj, A + Aj, A + Aj, −A + Aj, −A − Aj, −A + Aj, −A − Aj, −A − Aj, A − Aj, −A + Aj, −A + Aj, A − Aj, |

TABLE 18-1-continued

| Index | Polarization | Pilot sequence |
|---|---|---|
| | | A + Aj, −A − Aj, −A − Aj, A + Aj, −A − Aj, A − Aj, A − Aj, A − Aj, A + Aj, A + Aj, −A + Aj, −A − Aj, A + Aj, A − Aj, A + Aj, A + Aj, −A − Aj, −A − Aj, A + Aj, −A + Aj |
| | Polarization 2 | A + Aj, −A − Aj, A + Aj, A − Aj, A + Aj, −A + Aj, A − Aj, A + Aj, A − Aj, −A − Aj, A − Aj, A − Aj, A − Aj, A − Aj, A − Aj, −A − Aj, A − Aj, −A + Aj, −A − Aj, −A + Aj, −A − Aj, −A + Aj, A + Aj, −A − Aj, A + Aj, −A − Aj, −A + Aj, A − Aj, A + Aj, A − Aj, A + Aj, −A + Aj, −A − Aj, −A + Aj, −A + Aj, −A + Aj, A + Aj, A + Aj, A + Aj, −A − Aj, −A + Aj, A + Aj, −A + Aj, −A − Aj, A + Aj, −A − Aj, −A + Aj, −A − Aj, −A + Aj, −A + Aj, A − Aj, −A − Aj, −A + Aj, −A − Aj, A + Aj, A − Aj, −A − Aj, −A − Aj, A − Aj, A + Aj, −A − Aj, A − Aj, −A − Aj, A − Aj, A − Aj, −A + Aj, −A + Aj, −A − Aj, A + Aj, −A + Aj, A − Aj, A + Aj, −A − Aj, A − Aj, −A + Aj, A + Aj, A + Aj, A + Aj |
| 30 | Polarization 1 | −A − Aj, A + Aj, A + Aj, −A + Aj, −A + Aj, −A + Aj, A − Aj, A − Aj, A + Aj, −A + Aj, −A − Aj, A + Aj, A − Aj, −A + Aj, A + Aj, A − Aj, A − Aj, −A − Aj, −A + Aj, −A + Aj, −A + Aj, A + Aj, A − Aj, A − Aj, −A + Aj, −A − Aj, −A + Aj, −A + Aj, A + Aj, −A − Aj, A + Aj, A − Aj, −A − Aj, −A − Aj, −A − Aj, A − Aj, −A − Aj, A − Aj, −A − Aj, −A + Aj, −A + Aj, A + Aj, −A + Aj, A − Aj, A − Aj, −A − Aj, −A − Aj, A − Aj, A + Aj, A + Aj, A − Aj, −A + Aj, −A − Aj, −A − Aj, A + Aj, −A − Aj, −A − Aj, A + Aj, −A + Aj, A + Aj, −A + Aj, −A + Aj, A + Aj, A − Aj, −A − Aj, A + Aj, −A − Aj, −A + Aj, −A − Aj, A + Aj, A + Aj, −A + Aj, A − Aj, A − Aj, A − Aj, A − Aj, A − Aj, A + Aj |
| | Polarization 2 | −A − Aj, −A + Aj, A − Aj, −A − Aj, −A − Aj, A + Aj, A + Aj, A − Aj, A − Aj, −A + Aj, A − Aj, A + Aj, −A + Aj, A + Aj, −A + Aj, A + Aj, −A + Aj, A − Aj, −A − Aj, A − Aj, −A − Aj, A − Aj, A − Aj, A + Aj, −A + Aj, A + Aj, −A − Aj, A − Aj, −A + Aj, A − Aj, −A − Aj, −A − Aj, −A + Aj, −A + Aj, A − Aj, A − Aj, −A − Aj, A − Aj, −A − Aj, A + Aj, A + Aj, A + Aj, −A + Aj, A + Aj, A − Aj, A + Aj, A − Aj, A − Aj, −A + Aj, −A + Aj, −A − Aj, −A + Aj, A + Aj, −A − Aj, −A + Aj, A + Aj, A + Aj, −A − Aj, −A + Aj, A + Aj, −A + Aj, A − Aj, −A + Aj, A + Aj, −A − Aj, A − Aj, A − Aj, −A + Aj, −A − Aj, −A − Aj, −A − Aj, A + Aj, −A − Aj, A + Aj, −A − Aj, −A + Aj, A + Aj, −A − Aj |

TABLE 18-2

| Index | Pilot sequence |
|---|---|
| 1 | −A − Aj, −A + Aj, A − Aj, A + Aj, A − Aj, A + Aj, A + Aj, −A + Aj, A + Aj, −A − Aj, A + Aj, A − Aj, A − Aj, −A + Aj, −A + Aj, A − Aj, −A − Aj, −A + Aj, A + Aj, −A + Aj, A − Aj, A − Aj, A + Aj, A + Aj, A − Aj, A + Aj, −A − Aj, −A + Aj, A + Aj, A − Aj, A − Aj, A − Aj, −A + Aj, A − Aj, A − Aj, −A − Aj, A + Aj, A − Aj, −A + Aj, −A + Aj, −A + Aj, −A − Aj, −A + Aj, −A + Aj, −A − Aj, A − Aj, −A + Aj, −A − Aj, −A − Aj, −A − Aj, −A − Aj, A + Aj, A + Aj, A + Aj, −A + Aj, −A − Aj, −A − Aj, A + Aj, −A − Aj, A + Aj, −A + Aj, A − Aj, −A + Aj, A + Aj, A + Aj, −A − Aj, A − Aj, −A − Aj, A − Aj, −A − Aj, −A + Aj, −A − Aj, −A + Aj, A − Aj, −A − Aj, A − Aj, A + Aj, −A + Aj |
| 2 | −A + Aj, A − Aj, A + Aj, A − Aj, A + Aj, A + Aj, −A + Aj, A + Aj, −A − Aj, A + Aj, A − Aj, A − Aj, −A + Aj, −A + Aj, A − Aj, −A − Aj, −A + Aj, A + Aj, −A + Aj, A − Aj, A − Aj, A + Aj, A + Aj, A − Aj, A + Aj, −A − Aj, −A + Aj, A + Aj, A − Aj, A − Aj, A − Aj, −A + Aj, A − Aj, A − Aj, −A − Aj, A + Aj, A − Aj, −A + Aj, −A + Aj, −A + Aj, −A − Aj, −A + Aj, −A + Aj, −A − Aj, A − Aj, −A + Aj, −A − Aj, −A − Aj, −A − Aj, −A − Aj, A + Aj, A + Aj, A + Aj, −A + Aj, −A − Aj, −A − Aj, A + Aj, −A − Aj, A + Aj, −A + Aj, A − Aj, −A + Aj, A + Aj, A + Aj, −A − Aj, A − Aj, −A − Aj, A − Aj, −A − Aj, −A + Aj, −A − Aj, −A + Aj, A − Aj, −A − Aj, A − Aj, A + Aj, −A + Aj, −A − Aj |
| 3 | A − Aj, −A + Aj, −A − Aj, −A + Aj, −A − Aj, −A − Aj, A − Aj, −A − Aj, A + Aj, −A − Aj, −A + Aj, −A + Aj, A − Aj, A − Aj, −A + Aj, A + Aj, A − Aj, −A − Aj, A − Aj, −A + Aj, −A + Aj, −A − Aj, −A − Aj, −A + Aj, −A − Aj, A + Aj, A − Aj, −A − Aj, −A + Aj, −A + Aj, −A + Aj, A − Aj, −A + Aj, −A + Aj, A + Aj, −A − Aj, −A + Aj, A − Aj, A − Aj, A − Aj, A + Aj, A − Aj, A − Aj, A + Aj, −A + Aj, A − Aj, A + Aj, A + Aj, A + Aj, A + Aj, −A − Aj, −A − Aj, −A − Aj, A − Aj, A + Aj, A + Aj, −A − Aj, A + Aj, −A − Aj, A − Aj, −A + Aj, A − Aj, −A − Aj, −A − Aj, A + Aj, −A + Aj, A + Aj, −A + Aj, A + Aj, A − Aj, A + Aj, A − Aj, −A + Aj, A + Aj, −A + Aj, −A − Aj, A − Aj, A + Aj |
| 4 | A + Aj, A − Aj, −A + Aj, −A − Aj, −A + Aj, −A − Aj, −A − Aj, A − Aj, −A − Aj, A + Aj, −A − Aj, −A + Aj, −A + Aj, A − Aj, A − Aj, −A + Aj, A + Aj, A − Aj, −A − Aj, A − Aj, −A + Aj, −A + Aj, −A − Aj, −A − Aj, −A + Aj, −A − Aj, A + Aj, A − Aj, −A − Aj, −A + Aj, −A + Aj, −A + Aj, A − Aj, −A + Aj, −A + Aj, A + Aj, −A − Aj, −A + Aj, A − Aj, A − Aj, A − Aj, A + Aj, A − Aj, A − Aj, A + Aj, −A + Aj, A − Aj, A + Aj, A + Aj, A + Aj, A + Aj, −A − Aj, −A − Aj, −A − Aj, A − Aj, A + Aj, A + Aj, −A − Aj, A + Aj, −A − Aj, A − Aj, −A + Aj, A − Aj, −A − Aj, −A − Aj, A + Aj, −A + Aj, A + Aj, −A + Aj, A + Aj, A − Aj, A + Aj, A − Aj, −A + Aj, A + Aj, −A + Aj, −A − Aj, A − Aj |

TABLE 18-3

| Index | Pilot sequence |
|---|---|
| 1 | −A − Aj, A + Aj, A − Aj, A + Aj, A − Aj, A − Aj, −A − Aj, A − Aj, −A + Aj, A − Aj, A + Aj, A + Aj, −A − Aj, −A − Aj, A + Aj, −A + Aj, −A − Aj, A − Aj, −A − Aj, A + Aj, A + Aj, A − Aj, A − Aj, A + Aj, A − Aj, −A + Aj, −A − Aj, A − Aj, A + Aj, A + Aj, A + Aj, −A − Aj, A + Aj, A + Aj, −A + Aj, A − Aj, A + Aj, −A − Aj, −A − Aj, −A − Aj, −A + Aj, −A − Aj, −A − Aj, −A + Aj, A + Aj, −A − Aj, −A + Aj, −A + Aj, −A + Aj, −A + Aj, A − Aj, A − Aj, A − Aj, −A − Aj, −A + Aj, −A + Aj, A − Aj, −A + Aj, A − Aj, −A − Aj, A + Aj, −A − Aj, A − Aj, A − Aj, −A + Aj, A + Aj, −A + Aj, A + Aj, −A + Aj, −A − Aj, −A + Aj, −A − Aj, A + Aj, −A + Aj, A + Aj, A − Aj, −A − Aj, −A + Aj |
| 2 | −A + Aj, −A − Aj, A + Aj, A − Aj, A + Aj, A − Aj, A − Aj, −A − Aj, A − Aj, −A + Aj, A − Aj, A + Aj, A + Aj, −A − Aj, −A − Aj, A + Aj, −A + Aj, −A − Aj, A − Aj, −A − Aj, A + Aj, A + Aj, A − Aj, A − Aj, A + Aj, A − Aj, −A + Aj, −A − Aj, A − Aj, A + Aj, A + Aj, A + Aj, −A − Aj, A + Aj, A + Aj, −A + Aj, A − Aj, A + Aj, −A − Aj, −A − Aj, −A − Aj, −A + Aj, −A − Aj, −A − Aj, −A + Aj, A + Aj, −A − Aj, −A + Aj, −A + Aj, −A + Aj, −A + Aj, A − Aj, A − Aj, A − Aj, −A − Aj, −A + Aj, −A + Aj, A − Aj, −A + Aj, A − Aj, −A − Aj, A + Aj, −A − Aj, A − Aj, A − Aj, −A + Aj, A + Aj, −A + Aj, A + Aj, −A + Aj, −A − Aj, −A + Aj, −A − Aj, A + Aj, −A + Aj, A + Aj, A − Aj, −A − Aj |

TABLE 18-3-continued

| Index | Pilot sequence |
|---|---|
| 3 | A – Aj, A + Aj, –A – Aj, –A + Aj, –A – Aj, –A + Aj, –A + Aj, A + Aj, –A + Aj, A – Aj, –A + Aj, –A – Aj, –A – Aj, A + Aj, A + Aj, –A – Aj, A – Aj, A + Aj, –A + Aj, A + Aj, –A – Aj, –A – Aj, –A + Aj, –A + Aj, –A – Aj, –A + Aj, A – Aj, A + Aj, –A + Aj, –A – Aj, –A – Aj, –A – Aj, A + Aj, –A – Aj, –A – Aj, A – Aj, –A + Aj, –A – Aj, A + Aj, A + Aj, A + Aj, A – Aj, A + Aj, A + Aj, A + Aj, A – Aj, –A – Aj, –A – Aj, A + Aj, A – Aj, A – Aj, A – Aj, A – Aj, A – Aj, –A + Aj, –A + Aj, –A + Aj, A + Aj, A – Aj, A – Aj, –A + Aj, A – Aj, –A + Aj, A + Aj, –A – Aj, A + Aj, –A + Aj, –A + Aj, A – Aj, –A – Aj, A – Aj, –A – Aj, A – Aj, A + Aj, A – Aj, A + Aj, –A – Aj, A – Aj, –A – Aj, –A + Aj, A + Aj |
| 4 | A + Aj, –A – Aj, –A + Aj, –A – Aj, –A + Aj, –A + Aj, A + Aj, –A + Aj, A – Aj, –A + Aj, –A – Aj, –A – Aj, A + Aj, A + Aj, –A – Aj, A – Aj, A + Aj, –A + Aj, A + Aj, –A – Aj, –A – Aj, –A + Aj, –A + Aj, –A – Aj, –A + Aj, A – Aj, A + Aj, –A + Aj, –A – Aj, –A – Aj, –A – Aj, A + Aj, –A – Aj, –A – Aj, –A + Aj, –A + Aj, –A – Aj, A + Aj, A + Aj, A + Aj, A – Aj, A + Aj, A + Aj, A – Aj, –A – Aj, A + Aj, A – Aj, A – Aj, A – Aj, A – Aj, –A + Aj, –A + Aj, –A + Aj, A + Aj, A – Aj, A – Aj, –A + Aj, A – Aj, –A + Aj, A + Aj, –A – Aj, A + Aj, –A + Aj, –A + Aj, A – Aj, –A – Aj, A – Aj, –A – Aj, A – Aj, A + Aj, A – Aj, A + Aj, –A – Aj, A – Aj, –A – Aj, –A + Aj, A + Aj, A – Aj |

TABLE 18-4

| Index | Pilot sequence |
|---|---|
| 1 | –A – Aj, A – Aj, A + Aj, –A + Aj, –A – Aj, –A + Aj, A – Aj, –A – Aj, A – Aj, –A – Aj, –A + Aj, –A – Aj, –A + Aj, –A – Aj, A + Aj, A + Aj, A – Aj, –A + Aj, A – Aj, A + Aj, –A – Aj, A + Aj, –A – Aj, –A – Aj, A – Aj, A + Aj, A + Aj, A + Aj, –A – Aj, –A – Aj, –A – Aj, –A – Aj, –A – Aj, A – Aj, –A + Aj, A – Aj, A – Aj, A – Aj, –A – Aj, A – Aj, A – Aj, A – Aj, –A + Aj, A + Aj, –A – Aj, –A + Aj, –A + Aj, A – Aj, –A + Aj, –A + Aj, –A + Aj, A + Aj, A – Aj, –A – Aj, A + Aj, –A + Aj, A + Aj, A + Aj, –A + Aj, –A + Aj, A – Aj, A + Aj, A – Aj, –A – Aj, –A + Aj, A – Aj, A – Aj, –A + Aj, –A + Aj, A + Aj, –A – Aj, A + Aj, A – Aj, A + Aj, A + Aj, –A + Aj, A + Aj, –A + Aj, A – Aj |
| 2 | –A + Aj, –A – Aj, A – Aj, A + Aj, A – Aj, –A + Aj, A + Aj, –A + Aj, A + Aj, A – Aj, A + Aj, A – Aj, A + Aj, –A – Aj, –A – Aj, –A + Aj, A – Aj, –A + Aj, –A – Aj, A + Aj, –A – Aj, A + Aj, A + Aj, –A + Aj, –A – Aj, –A – Aj, –A – Aj, A + Aj, A + Aj, A + Aj, A + Aj, –A + Aj, A – Aj, A + Aj, –A + Aj, –A + Aj, A + Aj, –A + Aj, –A + Aj, –A + Aj, A – Aj, –A – Aj, A + Aj, A – Aj, A – Aj, –A + Aj, A – Aj, A – Aj, A – Aj, –A – Aj, –A + Aj, A + Aj, –A – Aj, A – Aj, –A – Aj, –A – Aj, A – Aj, A – Aj, –A + Aj, –A – Aj, –A + Aj, A + Aj, A – Aj, –A + Aj, –A + Aj, A – Aj, A – Aj, –A – Aj, A + Aj, –A – Aj, –A + Aj, –A – Aj, –A – Aj, A – Aj, –A – Aj, A – Aj, –A + Aj, A + Aj |
| 3 | A – Aj, A + Aj, –A + Aj, –A – Aj, –A + Aj, A – Aj, –A – Aj, A – Aj, –A – Aj, –A + Aj, –A – Aj, –A + Aj, –A – Aj, A + Aj, A + Aj, A – Aj, –A + Aj, A – Aj, A + Aj, –A – Aj, A + Aj, –A – Aj, –A – Aj, A – Aj, A + Aj, A + Aj, A + Aj, –A – Aj, –A – Aj, –A – Aj, –A – Aj, A – Aj, –A + Aj, –A – Aj, A – Aj, A – Aj, –A – Aj, A – Aj, A – Aj, A – Aj, –A + Aj, A + Aj, –A – Aj, –A + Aj, –A + Aj, A – Aj, –A + Aj, –A + Aj, –A + Aj, A + Aj, A – Aj, –A – Aj, A + Aj, –A + Aj, A + Aj, A + Aj, –A + Aj, –A + Aj, A – Aj, A + Aj, A – Aj, –A – Aj, –A + Aj, A – Aj, A – Aj, –A + Aj, –A + Aj, A + Aj, –A – Aj, A + Aj, A – Aj, A + Aj, A + Aj, –A + Aj, A + Aj, –A + Aj, A – Aj, –A – Aj |
| 4 | A + Aj, –A + Aj, –A – Aj, A – Aj, A + Aj, A – Aj, –A + Aj, A + Aj, –A + Aj, A + Aj, A – Aj, A + Aj, A – Aj, A + Aj, –A – Aj, –A – Aj, –A + Aj, A – Aj, –A + Aj, –A – Aj, A + Aj, –A – Aj, A + Aj, A + Aj, –A + Aj, –A – Aj, –A – Aj, –A – Aj, A + Aj, A + Aj, A + Aj, A + Aj, –A – Aj, A – Aj, A + Aj, –A + Aj, –A + Aj, A + Aj, –A + Aj, –A + Aj, –A + Aj, A – Aj, –A – Aj, A + Aj, A – Aj, A – Aj, –A + Aj, A – Aj, A – Aj, A – Aj, –A – Aj, –A + Aj, A + Aj, –A – Aj, A – Aj, –A – Aj, –A – Aj, A – Aj, A – Aj, –A + Aj, –A – Aj, –A + Aj, A + Aj, A – Aj, –A + Aj, –A + Aj, A – Aj, A – Aj, –A – Aj, A + Aj, –A – Aj, –A + Aj, –A – Aj, –A – Aj, A – Aj, –A – Aj, A – Aj, –A + Aj |

TABLE 18-5

| Index | Pilot sequence |
|---|---|
| 1 | –A – Aj, –A + Aj, A + Aj, A – Aj, A + Aj, –A – Aj, A – Aj, –A – Aj, A – Aj, A + Aj, A – Aj, A + Aj, A – Aj, –A + Aj, –A + Aj, –A – Aj, A + Aj, –A – Aj, –A + Aj, A – Aj, –A + Aj, A – Aj, A – Aj, –A – Aj, –A + Aj, –A + Aj, –A + Aj, A – Aj, A – Aj, A – Aj, A – Aj, –A – Aj, A + Aj, A – Aj, –A – Aj, –A – Aj, A – Aj, –A – Aj, –A – Aj, –A – Aj, A + Aj, –A + Aj, A – Aj, A + Aj, A + Aj, –A – Aj, A + Aj, A + Aj, A + Aj, –A + Aj, –A – Aj, A – Aj, –A + Aj, A + Aj, –A + Aj, –A + Aj, A + Aj, A + Aj, –A – Aj, –A + Aj, –A – Aj, A – Aj, A + Aj, –A – Aj, –A – Aj, A + Aj, A + Aj, –A + Aj, A – Aj, –A + Aj, –A – Aj, –A + Aj, –A + Aj, A + Aj, –A + Aj, A + Aj, –A – Aj, A – Aj |
| 2 | –A + Aj, A + Aj, A – Aj, –A – Aj, –A + Aj, –A – Aj, A + Aj, –A + Aj, A + Aj, –A + Aj, –A – Aj, –A + Aj, –A – Aj, –A + Aj, A – Aj, A – Aj, A + Aj, –A – Aj, A + Aj, A – Aj, –A + Aj, A – Aj, –A + Aj, –A + Aj, A + Aj, A – Aj, A – Aj, A – Aj, –A + Aj, –A + Aj, –A + Aj, –A + Aj, A + Aj, –A – Aj, –A + Aj, A + Aj, A + Aj, –A + Aj, A + Aj, A + Aj, A + Aj, –A – Aj, A – Aj, –A + Aj, –A – Aj, –A – Aj, A + Aj, –A – Aj, –A – Aj, –A – Aj, A – Aj, A + Aj, –A + Aj, A – Aj, –A – Aj, A – Aj, A – Aj, –A – Aj, –A – Aj, A + Aj, A – Aj, A + Aj, –A + Aj, –A – Aj, A + Aj, A + Aj, –A – Aj, –A – Aj, A – Aj, –A + Aj, A – Aj, A + Aj, A – Aj, A – Aj, –A – Aj, A – Aj, –A – Aj, A + Aj |
| 3 | A – Aj, –A – Aj, –A + Aj, A + Aj, A – Aj, A + Aj, –A – Aj, A – Aj, –A – Aj, A – Aj, A + Aj, A – Aj, A + Aj, A – Aj, –A + Aj, –A + Aj, –A – Aj, A + Aj, –A – Aj, –A + Aj, A – Aj, –A + Aj, A – Aj, A – Aj, –A – Aj, –A + Aj, –A + Aj, –A + Aj, A – Aj, A – Aj, A – Aj, A – Aj, –A – Aj, A + Aj, A – Aj, –A – Aj, –A – Aj, A – Aj, –A – Aj, –A – Aj, –A – Aj, A + Aj, –A + Aj, A – Aj, A + Aj, A + Aj, –A – Aj, A + Aj, A + Aj, A + Aj, –A + Aj, –A – Aj, A – Aj, –A + Aj, A + Aj, –A + Aj, –A + Aj, A + Aj, A + Aj, –A – Aj, –A + Aj, –A – Aj, A – Aj, A + Aj, –A – Aj, –A – Aj, A + Aj, A + Aj, –A + Aj, A – Aj, –A + Aj, –A – Aj, –A + Aj, –A + Aj, A + Aj, –A + Aj, A + Aj, –A – Aj |
| 4 | A + Aj, A – Aj, –A – Aj, –A + Aj, –A – Aj, A + Aj, –A + Aj, A + Aj, –A + Aj, –A – Aj, –A + Aj, –A – Aj, –A + Aj, A – Aj, A – Aj, A + Aj, –A – Aj, A + Aj, A – Aj, –A + Aj, A – Aj, –A + Aj, –A + Aj, A + Aj, A – Aj, A – Aj, A – Aj, –A + Aj, –A + Aj, –A + Aj, –A + Aj, A + Aj, –A – Aj, –A + Aj, A + Aj, A + Aj, –A + Aj, A + Aj, A + Aj, A + Aj, –A – Aj, A – Aj, |

TABLE 18-5-continued

| Index | Pilot sequence |
|---|---|
| | –A + Aj, –A – Aj, –A – Aj, A + Aj, –A – Aj, –A – Aj, –A – Aj, A – Aj, A + Aj, –A + Aj, A – Aj, –A – Aj, A – Aj, A – Aj, –A – Aj, –A – Aj, A + Aj, A – Aj, A + Aj, –A + Aj, –A – Aj, A + Aj, A + Aj, –A – Aj, –A – Aj, A – Aj, –A + Aj, A – Aj, A + Aj, A – Aj, A – Aj, –A – Aj, A – Aj, –A – Aj, A + Aj, –A + Aj |

(12) When $N_{PS}$=94, the pilot sequence is one item in Table 19.

TABLE 19

| Index | Polarization | Pilot sequence |
|---|---|---|
| 1 | Polarization 1 | –A + Aj, –A – Aj, –A + Aj, A – Aj, –A – Aj, A – Aj, –A + Aj, –A + Aj, –A – Aj, –A + Aj, A – Aj, A – Aj, –A + Aj, –A – Aj, A – Aj, –A + Aj, A – Aj, –A – Aj, –A + Aj, A + Aj, A – Aj, –A – Aj, A – Aj, A – Aj, A + Aj, A + Aj, –A + Aj, –A + Aj, A – Aj, –A – Aj, A – Aj, A + Aj, A – Aj, –A + Aj, A – Aj, A + Aj, –A + Aj, A + Aj, A + Aj, –A – Aj, A + Aj, –A – Aj, A + Aj, –A + Aj, –A – Aj, –A – Aj, A – Aj, –A + Aj, –A – Aj, –A + Aj, A + Aj, –A + Aj, –A – Aj, A – Aj, A + Aj, A + Aj, A – Aj, A + Aj, –A + Aj, –A – Aj, –A + Aj, A + Aj, A + Aj, A + Aj, A + Aj, –A – Aj, A – Aj, –A + Aj, –A + Aj, A – Aj, A – Aj, A + Aj, –A + Aj, –A – Aj, A + Aj, –A – Aj, A – Aj, –A – Aj, A – Aj, A + Aj, –A – Aj, A – Aj, A + Aj, –A – Aj, –A – Aj, –A – Aj, –A + Aj, A + Aj, –A + Aj, A – Aj, –A + Aj, A – Aj, –A – Aj, A + Aj |
| | Polarization 2 | A + Aj, A + Aj, –A – Aj, –A – Aj, A – Aj, –A – Aj, –A + Aj, A + Aj, –A – Aj, A + Aj, A + Aj, –A + Aj, A – Aj, –A – Aj, A + Aj, A – Aj, –A – Aj, A – Aj, –A – Aj, –A – Aj, A – Aj, A – Aj, –A – Aj, –A + Aj, A – Aj, –A + Aj, –A + Aj, –A – Aj, A + Aj, –A + Aj, A + Aj, A – Aj, –A + Aj, –A + Aj, A + Aj, –A + Aj, A – Aj, A + Aj, –A + Aj, –A + Aj, –A – Aj, –A + Aj, –A – Aj, –A + Aj, –A – Aj, A + Aj, A + Aj, A – Aj, –A – Aj, A + Aj, A + Aj, –A + Aj, –A – Aj, A + Aj, A – Aj, –A + Aj, –A + Aj, –A + Aj, A – Aj, A + Aj, –A – Aj, –A – Aj, A – Aj, A – Aj, A – Aj, A – Aj, A + Aj, A – Aj, –A – Aj, A + Aj, –A + Aj, A – Aj, –A + Aj, –A – Aj, A + Aj, A – Aj, A + Aj, A – Aj, –A – Aj, –A + Aj, A – Aj, A + Aj, A – Aj, –A + Aj, –A – Aj, –A – Aj, –A – Aj, –A – Aj, A – Aj, A + Aj, –A + Aj, A + Aj, –A + Aj, A + Aj |
| 2 | Polarization 1 | –A + Aj, –A – Aj, –A + Aj, A – Aj, –A – Aj, A – Aj, –A + Aj, –A + Aj, –A – Aj, –A + Aj, A – Aj, A – Aj, –A + Aj, –A – Aj, A – Aj, –A + Aj, A – Aj, –A – Aj, –A + Aj, A + Aj, A – Aj, –A – Aj, A – Aj, A – Aj, A + Aj, A + Aj, –A + Aj, –A + Aj, A – Aj, –A – Aj, A – Aj, A + Aj, A – Aj, –A + Aj, A – Aj, A + Aj, –A + Aj, A + Aj, A + Aj, –A – Aj, A + Aj, –A – Aj, A + Aj, –A + Aj, –A – Aj, –A – Aj, A – Aj, –A + Aj, –A – Aj, –A + Aj, A + Aj, –A + Aj, –A – Aj, A – Aj, A + Aj, A + Aj, A – Aj, A + Aj, –A + Aj, –A – Aj, –A + Aj, A + Aj, A + Aj, A + Aj, A + Aj, –A – Aj, A – Aj, –A + Aj, –A + Aj, A – Aj, A – Aj, A + Aj, –A + Aj, –A – Aj, A + Aj, –A – Aj, A – Aj, –A – Aj, A – Aj, A + Aj, –A – Aj, A – Aj, A + Aj, –A – Aj, –A – Aj, –A – Aj, –A + Aj, A + Aj, –A + Aj, A – Aj, –A + Aj, A – Aj, –A – Aj, A + Aj |
| | Polarization 2 | A + Aj, A + Aj, A + Aj, –A – Aj, –A – Aj, A – Aj, –A – Aj, –A + Aj, A + Aj, –A – Aj, A + Aj, A + Aj, –A + Aj, A – Aj, –A – Aj, A + Aj, A – Aj, –A – Aj, A – Aj, –A – Aj, –A – Aj, A – Aj, A – Aj, –A – Aj, –A + Aj, A – Aj, –A + Aj, –A + Aj, –A – Aj, A + Aj, –A + Aj, A + Aj, A – Aj, –A + Aj, –A + Aj, A + Aj, –A + Aj, A – Aj, A + Aj, –A + Aj, –A + Aj, –A – Aj, –A + Aj, –A – Aj, –A + Aj, –A – Aj, A + Aj, A + Aj, A – Aj, –A – Aj, A + Aj, A + Aj, –A + Aj, –A – Aj, A + Aj, A – Aj, –A + Aj, –A + Aj, –A + Aj, A – Aj, A + Aj, –A – Aj, –A – Aj, A – Aj, A – Aj, A – Aj, A – Aj, A + Aj, A – Aj, –A – Aj, A + Aj, –A + Aj, A – Aj, –A + Aj, –A – Aj, A + Aj, A – Aj, A + Aj, A – Aj, –A – Aj, –A + Aj, A – Aj, A + Aj, A – Aj, –A + Aj, –A – Aj, –A – Aj, –A – Aj, –A – Aj, A – Aj, A + Aj, –A + Aj, A + Aj, –A + Aj |
| 3 | Polarization 1 | A + Aj, –A – Aj, –A + Aj, A – Aj, –A + Aj, A – Aj, A + Aj, A – Aj, –A – Aj, –A – Aj, –A – Aj, A + Aj, –A + Aj, –A – Aj, A + Aj, –A + Aj, –A – Aj, –A + Aj, –A – Aj, A + Aj, –A – Aj, A – Aj, A + Aj, –A + Aj, –A + Aj, A – Aj, A – Aj, –A + Aj, –A – Aj, A + Aj, A + Aj, A + Aj, A + Aj, A – Aj, –A – Aj, A – Aj, A + Aj, –A + Aj, A + Aj, A + Aj, –A + Aj, –A – Aj, A – Aj, A + Aj, A – Aj, –A – Aj, A – Aj, –A + Aj, –A – Aj, –A – Aj, A – Aj, A + Aj, –A – Aj, A + Aj, –A – Aj, A + Aj, A + Aj, A – Aj, A + Aj, –A + Aj, A – Aj, –A + Aj, A + Aj, –A + Aj, –A – Aj, –A + Aj, A – Aj, A – Aj, A + Aj, A + Aj, –A + Aj, –A + Aj, –A – Aj, –A + Aj, A + Aj, A – Aj, –A – Aj, –A + Aj, A – Aj, –A + Aj, –A – Aj, A – Aj, –A + Aj, –A + Aj, A – Aj, –A – Aj, A – Aj, A – Aj, –A + Aj, –A – Aj, –A + Aj, A – Aj, –A – Aj, A – Aj |
| | Polarization 2 | A – Aj, A + Aj, A – Aj, A + Aj, –A + Aj, –A – Aj, –A – Aj, –A – Aj, –A – Aj, A – Aj, –A + Aj, A + Aj, –A + Aj, A – Aj, –A – Aj, –A + Aj, A + Aj, –A + Aj, A + Aj, –A – Aj, A – Aj, –A + Aj, A – Aj, A + Aj, –A – Aj, –A + Aj, A + Aj, –A + Aj, –A + Aj, –A + Aj, –A + Aj, –A – Aj, –A – Aj, A + Aj, –A + Aj, A – Aj, A – Aj, A – Aj, –A + Aj, A + Aj, –A – Aj, A – Aj, A + Aj, A + Aj, –A – Aj, –A + Aj, A + Aj, A + Aj, –A – Aj, A – Aj, –A – Aj, A – Aj, –A – Aj, A – Aj, A – Aj, A + Aj, –A + Aj, A – Aj, A + Aj, A – Aj, A – Aj, –A + Aj, A + Aj, A – Aj, A + Aj, –A – Aj, A – Aj, A – Aj, –A + Aj, A – Aj, –A – Aj, –A + Aj, –A + Aj, –A – Aj, –A – Aj, –A + Aj, –A – Aj, –A + Aj, A + Aj, –A – Aj, –A + Aj, A – Aj, A + Aj, A + Aj, –A – Aj, A + Aj, A – Aj, –A – Aj, –A + Aj, –A – Aj, –A – Aj, A + Aj, A + Aj, A + Aj |
| 4 | Polarization 1 | A + Aj, –A – Aj, –A + Aj, A – Aj, –A + Aj, A – Aj, A + Aj, A – Aj, –A – Aj, –A – Aj, –A – Aj, A + Aj, –A + Aj, –A – Aj, A + Aj, –A + Aj, –A – Aj, –A + Aj, –A – Aj, A + Aj, –A – Aj, A – Aj, A + Aj, –A + Aj, –A + Aj, A – Aj, A – Aj, –A + Aj, –A – Aj, A + Aj, A + Aj, A + Aj, A + Aj, A – Aj, –A – Aj, A – Aj, A + Aj, –A + Aj, A + Aj, A + Aj, –A + Aj, –A – Aj, A – Aj, A + Aj, A – Aj, –A – Aj, A – Aj, –A + Aj, –A – Aj, –A – Aj, A – Aj, A + Aj, –A – Aj, A + Aj, –A – Aj, A + Aj, A + Aj, A – Aj, A + Aj, –A + Aj, A – Aj, –A + Aj, A + Aj, –A + Aj, –A – Aj, –A + Aj, |

TABLE 19-continued

| Index | Polarization | Pilot sequence |
|---|---|---|
| | | A − Aj, A − Aj, A + Aj, A + Aj, −A + Aj, −A + Aj, −A − Aj, −A + Aj, A + Aj, A − Aj, −A − Aj, −A + Aj, A − Aj, −A + Aj, −A − Aj, A − Aj, −A + Aj, −A + Aj, A − Aj, −A − Aj, A − Aj, A − Aj, −A + Aj, −A − Aj, −A + Aj, A − Aj, −A − Aj, A − Aj |
| | Polarization 2 | A + Aj, A − Aj, A + Aj, A − Aj, A + Aj, −A + Aj, −A − Aj, −A − Aj, −A − Aj, −A − Aj, A − Aj, −A + Aj, A + Aj, −A + Aj, A − Aj, −A − Aj, −A + Aj, A + Aj, −A + Aj, A + Aj, −A − Aj, A − Aj, −A + Aj, A − Aj, A + Aj, −A − Aj, −A + Aj, A + Aj, −A + Aj, −A + Aj, −A + Aj, −A + Aj, −A − Aj, −A − Aj, A + Aj, −A + Aj, A − Aj, A − Aj, A − Aj, −A + Aj, A + Aj, −A − Aj, A − Aj, A + Aj, A + Aj, −A − Aj, −A + Aj, A + Aj, A + Aj, −A − Aj, A − Aj, −A − Aj, A − Aj, −A − Aj, A − Aj, A − Aj, A + Aj, −A + Aj, A − Aj, A + Aj, A − Aj, A − Aj, −A + Aj, A + Aj, A − Aj, A + Aj, −A − Aj, A − Aj, A − Aj, −A + Aj, A − Aj, −A − Aj, −A + Aj, −A + Aj, −A − Aj, −A − Aj, −A + Aj, −A − Aj, −A + Aj, A + Aj, −A − Aj, −A + Aj, A − Aj, A + Aj, A + Aj, −A − Aj, A + Aj, A − Aj, −A − Aj, −A + Aj, −A − Aj, −A − Aj, A + Aj, A + Aj |

(13) When $N_{PS}$=102, the pilot sequence is one item in the following Table 20-1. Alternatively, any item is selected from Table 20-2 as a pilot sequence in one polarization, and any item is selected from Table 20-3 as a pilot sequence in the other polarization. Alternatively, any item is selected from Table 20-4 as a pilot sequence in one polarization, and any item is selected from Table 20-5 as a pilot sequence in the other polarization.

TABLE 20-1

| Index | Polarization | Pilot sequence |
|---|---|---|
| 1 | Polarization 1 | A + Aj, −A + Aj, A − Aj, −A − Aj, A + Aj, A − Aj, A − Aj, A − Aj, −A + Aj, A + Aj, −A + Aj, −A − Aj, −A + Aj, A + Aj, −A − Aj, −A − Aj, −A − Aj, −A + Aj, −A − Aj, A − Aj, A − Aj, −A + Aj, −A − Aj, A − Aj, −A + Aj, A − Aj, −A + Aj, −A + Aj, A + Aj, A + Aj, A − Aj, A − Aj, −A − Aj, −A + Aj, −A − Aj, −A + Aj, −A + Aj, −A − Aj, A + Aj, −A − Aj, −A − Aj, −A + Aj, A − Aj, A − Aj, −A + Aj, −A + Aj, −A + Aj, A + Aj, −A + Aj, A − Aj, −A + Aj, −A − Aj, −A − Aj, −A + Aj, −A + Aj, −A + Aj, −A − Aj, A − Aj, A + Aj, A − Aj, A − Aj, −A + Aj, A − Aj, A − Aj, A − Aj, A − Aj, −A − Aj, −A − Aj, A + Aj, A + Aj, A − Aj, A + Aj, A + Aj, A + Aj, A + Aj, A − Aj, −A + Aj, A + Aj, −A − Aj, A + Aj, A + Aj, −A − Aj, A + Aj, −A − Aj, A + Aj, A − Aj, A + Aj, −A + Aj, A + Aj, −A − Aj, A − Aj, −A − Aj, A − Aj, −A − Aj, A + Aj, A + Aj, −A + Aj, −A − Aj, A − Aj, −A − Aj, −A + Aj, A + Aj |
| | Polarization 2 | −A − Aj, −A + Aj, −A + Aj, A − Aj, A − Aj, −A + Aj, −A − Aj, A + Aj, A + Aj, A − Aj, A − Aj, −A + Aj, A + Aj, −A − Aj, A − Aj, −A + Aj, −A − Aj, −A − Aj, −A − Aj, A + Aj, −A + Aj, A + Aj, A − Aj, A + Aj, −A + Aj, A − Aj, A − Aj, A − Aj, A + Aj, A − Aj, −A − Aj, −A − Aj, A + Aj, A − Aj, −A − Aj, A + Aj, −A − Aj, A + Aj, A + Aj, −A + Aj, −A + Aj, −A − Aj, −A − Aj, A − Aj, A + Aj, A − Aj, A + Aj, A + Aj, A − Aj, −A + Aj, A − Aj, A − Aj, A + Aj, −A − Aj, −A − Aj, A + Aj, A + Aj, A + Aj, −A + Aj, A + Aj, −A − Aj, A + Aj, A − Aj, A − Aj, A + Aj, A + Aj, A + Aj, A − Aj, −A − Aj, −A + Aj, −A − Aj, −A − Aj, A + Aj, −A − Aj, −A − Aj, −A − Aj, −A − Aj, A − Aj, A − Aj, −A + Aj, −A + Aj, −A − Aj, −A + Aj, −A + Aj, −A + Aj, −A + Aj, −A − Aj, A + Aj, −A + Aj, A − Aj, −A + Aj, −A + Aj, A − Aj, −A + Aj, A − Aj, −A + Aj, −A − Aj, −A + Aj, A + Aj, −A + Aj, A − Aj, −A − Aj |
| 2 | Polarization 1 | A + Aj, −A + Aj, A − Aj, −A − Aj, A + Aj, A − Aj, A − Aj, A − Aj, −A + Aj, A + Aj, −A + Aj, −A − Aj, −A + Aj, A + Aj, −A − Aj, −A − Aj, −A − Aj, −A + Aj, −A − Aj, A − Aj, A − Aj, −A + Aj, −A − Aj, A − Aj, −A + Aj, A − Aj, −A + Aj, −A + Aj, A + Aj, A + Aj, A − Aj, A − Aj, −A − Aj, −A + Aj, −A − Aj, −A + Aj, −A + Aj, −A − Aj, A + Aj, −A − Aj, −A − Aj, −A + Aj, A − Aj, A − Aj, −A + Aj, −A + Aj, −A + Aj, A + Aj, −A + Aj, A − Aj, −A + Aj, −A − Aj, −A − Aj, −A + Aj, −A + Aj, −A + Aj, −A − Aj, A − Aj, A + Aj, A − Aj, A − Aj, −A + Aj, A − Aj, A − Aj, A − Aj, A − Aj, −A − Aj, −A − Aj, A + Aj, A + Aj, A − Aj, A + Aj, A + Aj, A + Aj, A + Aj, A − Aj, −A + Aj, A + Aj, −A − Aj, A + Aj, A + Aj, −A − Aj, A + Aj, −A − Aj, A + Aj, A − Aj, A + Aj, −A + Aj, A + Aj, −A − Aj, A − Aj, −A − Aj, A − Aj, −A − Aj, A + Aj, A + Aj, −A + Aj, −A − Aj, A − Aj, −A − Aj, −A + Aj, A + Aj |
| | Polarization 2 | A + Aj, A + Aj, A − Aj, −A − Aj, −A + Aj, −A − Aj, −A − Aj, A + Aj, −A − Aj, −A − Aj, −A − Aj, −A − Aj, A − Aj, A − Aj, −A + Aj, −A + Aj, −A − Aj, −A + Aj, −A + Aj, −A + Aj, −A + Aj, −A − Aj, A + Aj, −A + Aj, A − Aj, −A + Aj, −A + Aj, A − Aj, −A + Aj, A − Aj, −A + Aj, −A − Aj, −A + Aj, A + Aj, −A + Aj, A − Aj, −A − Aj, A − Aj, −A − Aj, A − Aj, −A + Aj, −A + Aj, A + Aj, A − Aj, −A − Aj, A − Aj, A + Aj, −A + Aj, −A − Aj, A − Aj, −A + Aj, A + Aj, A + Aj, −A + Aj, −A − Aj, A + Aj, A − Aj, −A + Aj, −A − Aj, A − Aj, −A − Aj, −A − Aj, −A + Aj, A − Aj, A + Aj, A + Aj, −A + Aj, A − Aj, A + Aj, −A + Aj, −A + Aj, −A + Aj, A + Aj, −A − Aj, −A − Aj, −A + Aj, A + Aj, −A − Aj, −A + Aj, A − Aj, −A + Aj, A + Aj, A − Aj, A − Aj, A − Aj, −A − Aj, −A + Aj, −A + Aj, A + Aj, −A + Aj, A + Aj, A + Aj, −A − Aj, A + Aj, −A + Aj, −A + Aj, A − Aj, −A − Aj, −A + Aj, A + Aj, A + Aj, A − Aj |
| 3 | Polarization 1 | −A − Aj, −A + Aj, A + Aj, A − Aj, A + Aj, −A + Aj, −A − Aj, −A − Aj, A + Aj, A − Aj, A + Aj, A − Aj, A + Aj, −A − Aj, −A + Aj, −A − Aj, A − Aj, −A − Aj, A + Aj, −A − Aj, A + Aj, −A − Aj, −A − Aj, A + Aj, −A − Aj, −A + Aj, A − Aj, −A − Aj, −A − Aj, −A − Aj, −A − Aj, A − Aj, −A − Aj, −A − Aj, A + Aj, A + Aj, A − Aj, A − Aj, A − Aj, A − Aj, −A + Aj, A − Aj, A − Aj, −A − Aj, A − Aj, A + Aj, −A + Aj, −A + Aj, −A + Aj, A + Aj, A + Aj, −A + Aj, A − Aj, −A + Aj, −A − Aj, −A + Aj, −A + Aj, −A + Aj, A − Aj, A − Aj, −A + Aj, A + Aj, A + Aj, −A − Aj, A + Aj, −A + Aj, −A + Aj, A + Aj, −A + Aj, A + Aj, A − Aj, A − Aj, −A − Aj, −A − Aj, −A + Aj, −A + Aj, A − Aj, −A + Aj, A − Aj, A + Aj, −A + Aj, A − Aj, A − Aj, A + Aj, −A + Aj, A + Aj, A + Aj, A + Aj, −A − Aj, −A + Aj, A + Aj, −A + Aj, −A − Aj, −A + Aj, A − Aj, A − Aj, A − Aj, −A − Aj, A + Aj, A − Aj, −A + Aj, −A − Aj |
| | Polarization 2 | −A + Aj, −A − Aj, A − Aj, A + Aj, A − Aj, −A − Aj, −A + Aj, −A + Aj, A − Aj, A + Aj, A − Aj, A + Aj, A − Aj, −A + Aj, −A − Aj, −A + Aj, A + Aj, −A + Aj, A − Aj, −A + Aj, A − Aj, −A + Aj, −A + Aj, A − Aj, −A + Aj, −A − Aj, A + Aj, −A + Aj, −A + Aj, −A + Aj, −A + Aj, A + Aj, −A + Aj, −A + Aj, A − Aj, A − Aj, A + Aj, A + Aj, A + Aj, A + Aj, −A − Aj, A + Aj, A + Aj, −A + Aj, A + Aj, A − Aj, −A − Aj, −A − Aj, −A − Aj, A − Aj, A − Aj, −A − Aj, A + Aj, −A − Aj, −A + Aj, −A − Aj, −A − Aj, −A − Aj, A + Aj, A + Aj, −A − Aj, A − Aj, A − Aj, −A + Aj, A − Aj, −A − Aj, −A − Aj, A − Aj, −A − Aj, A − Aj, A + Aj, A + Aj, −A + Aj, −A + Aj, −A − Aj, −A − Aj, A + Aj, −A − Aj, A + Aj, A − Aj, −A − Aj, A + Aj, A + Aj, A − Aj, −A − Aj, A − |

TABLE 20-1-continued

| Index | Polarization | Pilot sequence |
|---|---|---|
| | | Aj, A − Aj, A − Aj, −A + Aj, −A − Aj, A − Aj, −A − Aj, −A + Aj, −A − Aj, A + Aj, A + Aj, A + Aj, −A + Aj, A − Aj, A + Aj, −A − Aj, −A + Aj |
| 4 | Polarization 1 | −A − Aj, −A + Aj, A + Aj, A − Aj, A + Aj, −A + Aj, −A − Aj, −A − Aj, A + Aj, A − Aj, A + Aj, A − Aj, A + Aj, −A − Aj, −A + Aj, −A − Aj, A − Aj, −A − Aj, A + Aj, −A − Aj, A + Aj, −A − Aj, −A − Aj, A + Aj, −A − Aj, −A + Aj, A − Aj, −A − Aj, −A − Aj, −A − Aj, −A − Aj, A − Aj, −A − Aj, −A − Aj, A + Aj, A + Aj, A − Aj, A − Aj, A − Aj, A − Aj, −A + Aj, A − Aj, A − Aj, −A − Aj, A − Aj, A + Aj, −A + Aj, −A + Aj, −A + Aj, A + Aj, A + Aj, −A + Aj, A − Aj, −A + Aj, −A − Aj, −A + Aj, −A + Aj, −A + Aj, A − Aj, A − Aj, −A + Aj, A + Aj, A + Aj, −A − Aj, A + Aj, −A + Aj, −A + Aj, A + Aj, −A + Aj, A + Aj, A − Aj, A − Aj, −A − Aj, −A − Aj, −A + Aj, −A + Aj, A − Aj, −A + Aj, A − Aj, A + Aj, −A + Aj, A − Aj, A − Aj, A + Aj, −A + Aj, A + Aj, A + Aj, A + Aj, −A − Aj, −A + Aj, A + Aj, −A + Aj, −A − Aj, −A + Aj, A − Aj, A − Aj, A − Aj, −A − Aj, A + Aj, A − Aj, −A + Aj, −A − Aj |
| | Polarization 2 | A − Aj, A + Aj, −A + Aj, −A − Aj, −A + Aj, A + Aj, A − Aj, A − Aj, −A + Aj, −A − Aj, −A + Aj, −A − Aj, −A + Aj, A − Aj, A + Aj, A − Aj, −A − Aj, A − Aj, −A + Aj, A − Aj, −A + Aj, A − Aj, A − Aj, −A + Aj, A − Aj, A + Aj, −A − Aj, A − Aj, A − Aj, A − Aj, A − Aj, −A − Aj, A − Aj, A − Aj, −A + Aj, −A + Aj, −A − Aj, −A − Aj, −A − Aj, −A − Aj, A + Aj, −A − Aj, −A − Aj, A − Aj, −A − Aj, −A + Aj, A + Aj, A + Aj, A + Aj, −A + Aj, −A + Aj, A + Aj, −A − Aj, A + Aj, A − Aj, A + Aj, A + Aj, A + Aj, −A − Aj, −A − Aj, A + Aj, −A + Aj, −A + Aj, A − Aj, −A + Aj, A + Aj, A + Aj, −A + Aj, A + Aj, −A + Aj, −A − Aj, −A − Aj, A − Aj, A − Aj, A + Aj, A + Aj, −A − Aj, A + Aj, −A − Aj, −A + Aj, A + Aj, −A − Aj, −A − Aj, −A + Aj, A + Aj, −A + Aj, −A + Aj, −A + Aj, A − Aj, A + Aj, −A + Aj, A + Aj, A − Aj, A + Aj, −A − Aj, −A − Aj, −A − Aj, A − Aj, −A + Aj, −A − Aj, A + Aj, A − Aj |
| 5 | Polarization 1 | −A − Aj, −A + Aj, A + Aj, A − Aj, A + Aj, −A + Aj, −A − Aj, −A − Aj, A + Aj, A − Aj, A + Aj, A − Aj, A + Aj, −A − Aj, −A + Aj, −A − Aj, A − Aj, −A − Aj, A + Aj, −A − Aj, A + Aj, −A − Aj, −A − Aj, A + Aj, −A − Aj, −A + Aj, A − Aj, −A − Aj, −A − Aj, −A − Aj, −A − Aj, A − Aj, −A − Aj, −A − Aj, A + Aj, A + Aj, A − Aj, A − Aj, A − Aj, A − Aj, −A + Aj, A − Aj, A − Aj, −A − Aj, A − Aj, A + Aj, −A + Aj, −A + Aj, −A + Aj, A + Aj, A + Aj, −A + Aj, A − Aj, −A + Aj, −A − Aj, −A + Aj, −A + Aj, −A + Aj, A − Aj, A − Aj, −A + Aj, A + Aj, A + Aj, −A − Aj, A + Aj, −A + Aj, −A + Aj, A + Aj, −A + Aj, A + Aj, A − Aj, A − Aj, −A − Aj, −A − Aj, −A + Aj, −A + Aj, A − Aj, −A + Aj, A − Aj, A + Aj, −A + Aj, A − Aj, A − Aj, A + Aj, −A + Aj, A + Aj, A + Aj, A + Aj, −A − Aj, −A + Aj, A + Aj, −A + Aj, −A − Aj, −A + Aj, A − Aj, A − Aj, A − Aj, −A − Aj, A + Aj, A − Aj, −A + Aj, −A − Aj |
| | Polarization 2 | A + Aj, A − Aj, −A + Aj, −A − Aj, −A + Aj, A + Aj, −A + Aj, A − Aj, −A + Aj, A − Aj, −A + Aj, −A + Aj, A − Aj, −A + Aj, −A − Aj, A + Aj, −A + Aj, −A + Aj, −A + Aj, −A + Aj, A + Aj, −A + Aj, −A + Aj, A − Aj, A − Aj, A + Aj, A + Aj, A + Aj, A + Aj, −A − Aj, A + Aj, A + Aj, −A + Aj, A + Aj, A − Aj, −A − Aj, −A − Aj, −A − Aj, A − Aj, A − Aj, −A − Aj, A + Aj, −A − Aj, −A + Aj, −A − Aj, −A − Aj, −A − Aj, A + Aj, A + Aj, −A − Aj, A − Aj, A − Aj, −A + Aj, A − Aj, −A − Aj, −A − Aj, A − Aj, −A − Aj, A − Aj, A + Aj, A + Aj, −A + Aj, −A + Aj, −A − Aj, −A − Aj, A + Aj, −A − Aj, A + Aj, A − Aj, −A − Aj, A + Aj, A + Aj, A − Aj, −A − Aj, A − Aj, A − Aj, A − Aj, −A + Aj, −A − Aj, A − Aj, −A − Aj, −A + Aj, −A − Aj, A + Aj, A + Aj, A + Aj, −A + Aj, A − Aj, A + Aj, −A − Aj, −A + Aj, A − Aj, A − Aj, −A − Aj, −A − Aj, A + Aj, −A + Aj, A − Aj, A − Aj, −A + Aj, −A + Aj, A + Aj |
| 6 | Polarization 1 | A − Aj, A + Aj, A − Aj, A + Aj, −A − Aj, A − Aj, −A − Aj, A − Aj, −A − Aj, −A + Aj, A − Aj, −A − Aj, A − Aj, −A + Aj, −A + Aj, −A + Aj, −A + Aj, A + Aj, −A − Aj, −A − Aj, −A − Aj, A + Aj, −A + Aj, −A + Aj, A + Aj, A + Aj, A + Aj, A + Aj, A − Aj, A + Aj, A − Aj, A − Aj, −A − Aj, −A + Aj, −A + Aj, A + Aj, −A + Aj, −A − Aj, A + Aj, A − Aj, −A − Aj, −A − Aj, A − Aj, A − Aj, −A + Aj, −A + Aj, A + Aj, −A − Aj, −A + Aj, A − Aj, A − Aj, A − Aj, −A + Aj, A − Aj, −A − Aj, A + Aj, −A − Aj, −A − Aj, −A + Aj, A + Aj, A − Aj, −A − Aj, A − Aj, A − Aj, A − Aj, A − Aj, −A − Aj, −A + Aj, A + Aj, −A + Aj, A + Aj, −A + Aj, A + Aj, −A − Aj, −A + Aj, −A + Aj, A − Aj, −A + Aj, A + Aj, A − Aj, A + Aj, −A + Aj, −A + Aj, A + Aj, −A − Aj, A + Aj, −A − Aj, −A − Aj, A + Aj, −A + Aj, −A − Aj, −A + Aj, A − Aj, −A − Aj, A + Aj, A + Aj, −A − Aj, A − Aj, −A + Aj, A − Aj, A + Aj, −A − Aj |
| | Polarization 2 | A + Aj, −A − Aj, A − Aj, −A − Aj, A + Aj, A − Aj, −A − Aj, −A + Aj, −A − Aj, A + Aj, A − Aj, −A + Aj, A − Aj, A + Aj, −A + Aj, −A + Aj, −A − Aj, −A − Aj, −A − Aj, A − Aj, −A − Aj, −A − Aj, A + Aj, −A + Aj, A − Aj, A + Aj, −A − Aj, −A + Aj, A + Aj, −A + Aj, −A + Aj, A + Aj, −A + Aj, −A + Aj, −A + Aj, A + Aj, A + Aj, −A − Aj, A + Aj, −A + Aj, −A + Aj, A − Aj, −A + Aj, A − Aj, −A − Aj, A − Aj, A − Aj, −A + Aj, A − Aj, A + Aj, A + Aj, A + Aj, A − Aj, −A + Aj, −A − Aj, −A − Aj, −A + Aj, −A + Aj, A + Aj, A − Aj, −A − Aj, −A − Aj, −A − Aj, −A − Aj, A + Aj, −A − Aj, A + Aj, A − Aj, −A − Aj, A + Aj, A − Aj, −A + Aj, A + Aj, −A + Aj, −A − Aj, A − Aj, −A − Aj, −A + Aj, A + Aj, A − Aj, A + Aj, A − Aj, −A + Aj, −A − Aj, A − Aj, A + Aj, A + Aj, A − Aj, A − Aj, A − Aj, −A + Aj, −A + Aj, −A − Aj, −A − Aj, A − Aj, −A − Aj, A − Aj, −A + Aj, A + Aj, A + Aj, A + Aj, A − Aj |
| 7 | Polarization 1 | −A − Aj, A + Aj, −A + Aj, A − Aj, −A + Aj, −A − Aj, A + Aj, A + Aj, −A − Aj, −A + Aj, A − Aj, −A − Aj, A − Aj, A + Aj, −A − Aj, −A − Aj, A + Aj, −A − Aj, A + Aj, A − Aj, A − Aj, A + Aj, −A + Aj, A + Aj, A − Aj, −A + Aj, A − Aj, A − Aj, −A − Aj, A + Aj, A − Aj, A + Aj, A − Aj, A + Aj, A − Aj, −A − Aj, −A + Aj, −A + Aj, −A + Aj, −A + Aj, −A − Aj, −A + Aj, A + Aj, A − Aj, −A − Aj, −A − Aj, A + Aj, −A − Aj, −A + Aj, A − Aj, −A + Aj, −A + Aj, −A + Aj, A − Aj, −A − Aj, A + Aj, A − Aj, A − Aj, −A + Aj, −A + Aj, −A − Aj, −A − Aj, −A + Aj, A + Aj, −A − Aj, A − Aj, A + Aj, A − Aj, A − Aj, −A − Aj, −A + Aj, −A + Aj, A + Aj, −A + Aj, A + Aj, A + Aj, A + Aj, A + Aj, A − Aj, A − Aj, A + Aj, −A − Aj, −A − Aj, −A − Aj, A + Aj, A − Aj, A − Aj, A − Aj, A − Aj, −A + Aj, −A − Aj, −A + Aj, A − Aj, −A − Aj, −A + Aj, −A − Aj, −A + Aj, −A − Aj, A + Aj, −A + Aj, A + Aj, −A + Aj |
| | Polarization 2 | −A + Aj, A + Aj, A + Aj, A + Aj, A − Aj, −A + Aj, −A − Aj, −A + Aj, −A − Aj, −A − Aj, A − Aj, A − Aj, −A + Aj, −A + Aj, −A + Aj, A + Aj, A + Aj, −A + Aj, −A − Aj, A − Aj, −A + Aj, A + Aj, −A + Aj, A + Aj, A − Aj, −A − Aj, −A + Aj, −A − Aj, A − Aj, A + Aj, A − Aj, −A + Aj, A + Aj, −A − Aj, −A + Aj, A + Aj, −A − Aj, A + Aj, −A − Aj, −A − Aj, −A − Aj, −A − Aj, −A + Aj, A + Aj, A − Aj, A − Aj, −A − Aj, −A − Aj, A − Aj, −A + Aj, A + Aj, A + Aj, A + Aj, −A + Aj, A − Aj, −A + Aj, −A + Aj, −A − Aj, −A + Aj, A − Aj, −A + Aj, A − Aj, A − Aj, A + Aj, −A − Aj, A + Aj, A + Aj, A − Aj, A − Aj, A − Aj, A + Aj, A − Aj, A − Aj, A + Aj, A − Aj, −A − Aj, A + Aj, −A + Aj, A − Aj, A + Aj, −A − Aj, −A − Aj, −A + Aj, −A − Aj, −A − Aj, −A − Aj, A − Aj, A − Aj, A + Aj, −A + Aj, A − Aj, −A + Aj, A + Aj, −A − Aj, A − Aj, −A − Aj, −A + Aj, A + Aj, −A − Aj, −A + Aj, −A − Aj, A + Aj |

TABLE 20-2

| Index | Pilot sequence |
|---|---|
| 1 | −A − Aj, A − Aj, −A + Aj, A + Aj, −A − Aj, −A + Aj, −A + Aj, −A + Aj, A − Aj, −A − Aj, A − Aj, A + Aj, A − Aj, −A − Aj, A + Aj, A + Aj, A + Aj, A − Aj, A + Aj, −A + Aj, −A + Aj, A − Aj, A + Aj, −A + Aj, A − Aj, −A + Aj, A − Aj, A − Aj, −A − Aj, −A − Aj, −A + Aj, −A + Aj, A + Aj, A − Aj, A + Aj, A − Aj, A − Aj, A + Aj, −A − Aj, A + Aj, A + Aj, A − Aj, −A + Aj, −A + Aj, −A + Aj, A − Aj, A − Aj, A − Aj, −A − Aj, A − Aj, −A + Aj, A − Aj, A + Aj, A + Aj, A − Aj, A − Aj, A − Aj, A + Aj, −A + Aj, −A − Aj, −A + Aj, −A + Aj, A − Aj, −A + Aj, −A + Aj, −A + Aj, −A + Aj, A + Aj, A + Aj, −A − Aj, −A − Aj, −A + Aj, −A − Aj, −A − Aj, −A − Aj, −A − Aj, −A + Aj, A − Aj, −A − Aj, A + Aj, −A − Aj, −A − Aj, A + Aj, −A − Aj, A + Aj, −A − Aj, −A + Aj, −A − Aj, A − Aj, −A − Aj, A + Aj, −A + Aj, A + Aj, −A + Aj, A + Aj, −A − Aj, −A − Aj, A − Aj, A + Aj, −A + Aj, A + Aj, A − Aj, −A − Aj |
| 2 | −A + Aj, −A − Aj, −A − Aj, A + Aj, A + Aj, −A − Aj, −A + Aj, A − Aj, A − Aj, A + Aj, A + Aj, −A − Aj, A − Aj, −A + Aj, A + Aj, −A − Aj, −A + Aj, −A + Aj, −A + Aj, A − Aj, −A − Aj, A − Aj, A + Aj, A − Aj, −A − Aj, A + Aj, A + Aj, A + Aj, A − Aj, A + Aj, −A + Aj, −A + Aj, A − Aj, A + Aj, −A + Aj, A − Aj, −A + Aj, A − Aj, A − Aj, −A − Aj, −A − Aj, −A + Aj, −A + Aj, A + Aj, A − Aj, A + Aj, A − Aj, A − Aj, A + Aj, −A − Aj, A + Aj, A + Aj, A − Aj, −A + Aj, −A + Aj, A − Aj, A − Aj, A − Aj, −A − Aj, A − Aj, −A + Aj, A − Aj, A + Aj, A + Aj, A − Aj, A − Aj, A − Aj, A + Aj, −A + Aj, −A − Aj, −A + Aj, −A + Aj, A − Aj, −A + Aj, −A + Aj, −A + Aj, −A + Aj, A + Aj, A + Aj, −A − Aj, −A − Aj, −A + Aj, −A − Aj, −A − Aj, −A − Aj, −A − Aj, −A + Aj, A − Aj, −A − Aj, A + Aj, −A − Aj, −A − Aj, A + Aj, −A − Aj, A + Aj, −A − Aj, −A + Aj, −A − Aj, A − Aj, −A − Aj, A + Aj, −A + Aj |
| 3 | A − Aj, A + Aj, A + Aj, −A − Aj, −A − Aj, A + Aj, A − Aj, −A + Aj, −A + Aj, −A − Aj, −A − Aj, A + Aj, −A + Aj, A − Aj, −A − Aj, A + Aj, A − Aj, A − Aj, A − Aj, −A + Aj, A + Aj, −A + Aj, −A − Aj, −A + Aj, A + Aj, −A − Aj, −A − Aj, −A − Aj, −A + Aj, −A − Aj, A − Aj, A − Aj, −A + Aj, −A − Aj, A − Aj, −A + Aj, A − Aj, −A + Aj, −A + Aj, A + Aj, A + Aj, A − Aj, A − Aj, −A − Aj, −A + Aj, −A − Aj, −A + Aj, −A + Aj, −A − Aj, A + Aj, −A − Aj, −A − Aj, −A + Aj, A − Aj, A − Aj, −A + Aj, −A + Aj, −A + Aj, A + Aj, −A + Aj, A − Aj, −A + Aj, −A − Aj, −A − Aj, −A + Aj, −A + Aj, −A + Aj, −A − Aj, A − Aj, A + Aj, A − Aj, A − Aj, −A + Aj, A − Aj, A − Aj, A − Aj, A − Aj, −A − Aj, −A − Aj, A + Aj, A + Aj, A − Aj, A + Aj, A + Aj, A + Aj, A + Aj, A − Aj, −A + Aj, A + Aj, −A − Aj, A + Aj, A + Aj, −A − Aj, A + Aj, −A − Aj, A + Aj, A − Aj, A + Aj, −A + Aj, A + Aj, −A − Aj, A − Aj |

TABLE 20-3

| Index | Pilot sequence |
|---|---|
| 1 | −A − Aj, −A + Aj, −A + Aj, A − Aj, A − Aj, −A + Aj, −A − Aj, A + Aj, A + Aj, A − Aj, A − Aj, −A + Aj, A + Aj, −A − Aj, A − Aj, −A + Aj, −A − Aj, −A − Aj, −A − Aj, A + Aj, −A + Aj, A + Aj, A − Aj, A + Aj, −A + Aj, A − Aj, A − Aj, A − Aj, A + Aj, A − Aj, −A − Aj, −A − Aj, A + Aj, A − Aj, −A − Aj, A + Aj, −A − Aj, A + Aj, A + Aj, −A + Aj, −A + Aj, −A − Aj, −A − Aj, A − Aj, A + Aj, A − Aj, A + Aj, A + Aj, A − Aj, −A + Aj, A − Aj, A − Aj, A + Aj, −A − Aj, −A − Aj, A + Aj, A + Aj, A + Aj, −A + Aj, A + Aj, −A − Aj, A + Aj, A − Aj, A − Aj, A + Aj, A + Aj, A + Aj, A − Aj, −A − Aj, −A + Aj, −A − Aj, −A − Aj, A + Aj, −A − Aj, −A − Aj, −A − Aj, −A − Aj, A − Aj, A − Aj, −A + Aj, −A + Aj, −A − Aj, −A + Aj, −A + Aj, −A + Aj, −A + Aj, −A − Aj, A + Aj, −A + Aj, A − Aj, −A + Aj, −A + Aj, A − Aj, −A + Aj, A − Aj, −A + Aj, −A − Aj, −A + Aj, A + Aj, −A + Aj, A − Aj, −A − Aj |
| 2 | −A + Aj, A + Aj, −A − Aj, A − Aj, −A + Aj, −A − Aj, −A − Aj, −A − Aj, A + Aj, −A + Aj, A + Aj, A − Aj, A + Aj, −A + Aj, A − Aj, A − Aj, A − Aj, A + Aj, A − Aj, −A − Aj, −A − Aj, A + Aj, A − Aj, −A − Aj, A + Aj, −A − Aj, A + Aj, A + Aj, −A + Aj, −A + Aj, −A − Aj, −A − Aj, A − Aj, A + Aj, A − Aj, A + Aj, A + Aj, A − Aj, −A + Aj, A − Aj, A − Aj, A + Aj, −A − Aj, −A − Aj, A + Aj, A + Aj, A + Aj, −A + Aj, A + Aj, −A − Aj, A + Aj, A − Aj, A − Aj, A + Aj, A + Aj, A + Aj, A − Aj, −A − Aj, −A + Aj, −A − Aj, −A − Aj, A + Aj, −A − Aj, −A − Aj, −A − Aj, −A − Aj, A − Aj, A − Aj, −A + Aj, −A + Aj, −A − Aj, −A + Aj, −A + Aj, −A + Aj, −A + Aj, −A − Aj, A + Aj, −A + Aj, A − Aj, −A + Aj, −A + Aj, A − Aj, −A + Aj, A − Aj, −A + Aj, −A − Aj, −A + Aj, A + Aj, −A + Aj, A − Aj, −A − Aj, A − Aj, −A − Aj, A − Aj, −A + Aj, −A + Aj, A + Aj, A − Aj, −A − Aj, A − Aj, A + Aj, −A + Aj |
| 3 | A − Aj, −A − Aj, A + Aj, −A + Aj, A − Aj, A + Aj, A + Aj, A + Aj, −A − Aj, A − Aj, −A − Aj, −A + Aj, −A − Aj, A − Aj, −A + Aj, −A + Aj, −A + Aj, −A − Aj, −A + Aj, A + Aj, A + Aj, −A − Aj, −A + Aj, A + Aj, −A − Aj, A + Aj, −A − Aj, −A − Aj, A − Aj, A − Aj, A + Aj, A + Aj, −A + Aj, −A − Aj, −A + Aj, −A − Aj, −A − Aj, −A + Aj, A − Aj, −A + Aj, −A + Aj, −A − Aj, A + Aj, A + Aj, −A − Aj, −A − Aj, −A − Aj, A − Aj, −A − Aj, A + Aj, −A − Aj, −A + Aj, −A + Aj, −A − Aj, −A − Aj, −A − Aj, −A + Aj, A + Aj, A − Aj, A + Aj, A + Aj, −A − Aj, A + Aj, A + Aj, A + Aj, A + Aj, −A + Aj, −A + Aj, A − Aj, A − Aj, A + Aj, A − Aj, A − Aj, A − Aj, A − Aj, A + Aj, −A − Aj, A − Aj, −A + Aj, A − Aj, A − Aj, −A + Aj, A − Aj, −A + Aj, A − Aj, A + Aj, A − Aj, −A − Aj, A − Aj, −A + Aj, A + Aj, −A + Aj, A + Aj, −A + Aj, A − Aj, A − Aj, −A − Aj, −A + Aj, A + Aj, −A + Aj, −A − Aj, A − Aj |
| 4 | A + Aj, A − Aj, A − Aj, −A + Aj, −A + Aj, A − Aj, A + Aj, −A − Aj, −A − Aj, −A + Aj, −A + Aj, A − Aj, −A − Aj, A + Aj, −A + Aj, A − Aj, A + Aj, A + Aj, A + Aj, −A − Aj, A − Aj, −A − Aj, −A + Aj, −A − Aj, A − Aj, −A + Aj, −A + Aj, −A + Aj, −A − Aj, −A + Aj, A + Aj, A + Aj, −A − Aj, −A + Aj, A + Aj, −A − Aj, A + Aj, −A − Aj, −A − Aj, A − Aj, A − Aj, A + Aj, A + Aj, −A + Aj, −A − Aj, −A + Aj, −A − Aj, −A − Aj, −A + Aj, A − Aj, −A + Aj, −A + Aj, −A − Aj, A + Aj, A + Aj, −A − Aj, −A − Aj, −A − Aj, A − Aj, −A − Aj, A + Aj, −A − Aj, −A + Aj, −A + Aj, −A − Aj, −A − Aj, −A − Aj, −A + Aj, A + Aj, A − Aj, A + Aj, A + Aj, −A − Aj, A + Aj, A + Aj, A + Aj, A + Aj, −A + Aj, −A + Aj, A − Aj, A − Aj, A + Aj, A − Aj, A − Aj, A − Aj, A − Aj, A + Aj, −A − Aj, A − Aj, −A + Aj, A − Aj, A − Aj, −A + Aj, A − Aj, −A + Aj, A − Aj, A + Aj, A − Aj, −A − Aj, A − Aj, −A + Aj, A + Aj |

TABLE 20-4

| Index | Pilot sequence |
|---|---|
| 1 | −A + Aj, −A − Aj, A + Aj, A − Aj, A + Aj, −A + Aj, A + Aj, −A − Aj, A + Aj, −A − Aj, A + Aj, A + Aj, −A − Aj, A + Aj, A − Aj, −A + Aj, A + Aj, A + Aj, A + Aj, A + Aj, −A + Aj, A + Aj, A + Aj, −A − Aj, −A − Aj, −A + Aj, −A + Aj, −A + Aj, −A + Aj, A − Aj, −A + Aj, −A + Aj, A + Aj, −A + Aj, −A − Aj, A − Aj, A − Aj, A − Aj, −A − Aj, −A − Aj, A − Aj, |

TABLE 20-4-continued

| Index | Pilot sequence |
|---|---|
| | −A + Aj, A − Aj, A + Aj, A − Aj, A − Aj, A − Aj, −A + Aj, −A + Aj, A − Aj, −A − Aj, −A − Aj, A + Aj, −A − Aj, A − Aj, A − Aj, −A − Aj, A − Aj, −A − Aj, −A + Aj, −A + Aj, A + Aj, A + Aj, A − Aj, A − Aj, −A + Aj, A − Aj, −A + Aj, −A − Aj, A − Aj, −A + Aj, −A + Aj, −A − Aj, A − Aj, −A − Aj, −A − Aj, −A − Aj, A + Aj, A − Aj, −A − Aj, A − Aj, A + Aj, A − Aj, −A + Aj, −A + Aj, −A + Aj, A + Aj, −A − Aj, −A + Aj, A − Aj, A + Aj, −A − Aj, −A − Aj, A − Aj, A − Aj, −A + Aj, A + Aj, −A − Aj, −A − Aj, A + Aj, A + Aj, −A + Aj |
| 2 | A − Aj, A + Aj, −A − Aj, −A + Aj, −A − Aj, A − Aj, −A − Aj, A + Aj, −A − Aj, A + Aj, −A − Aj, −A − Aj, A + Aj, −A − Aj, −A + Aj, A − Aj, −A − Aj, −A − Aj, −A − Aj, −A − Aj, A − Aj, −A − Aj, −A − Aj, A + Aj, A + Aj, A − Aj, A − Aj, A − Aj, A − Aj, −A + Aj, A − Aj, A − Aj, −A − Aj, A − Aj, A + Aj, −A + Aj, −A + Aj, −A + Aj, A + Aj, A + Aj, −A + Aj, A − Aj, −A + Aj, −A − Aj, −A + Aj, −A + Aj, −A + Aj, A − Aj, A − Aj, −A + Aj, A + Aj, A + Aj, −A − Aj, A + Aj, −A + Aj, −A + Aj, A + Aj, −A + Aj, A + Aj, A − Aj, A − Aj, −A − Aj, −A − Aj, −A + Aj, −A + Aj, A − Aj, −A + Aj, A − Aj, A + Aj, −A + Aj, A − Aj, A − Aj, A + Aj, −A + Aj, A + Aj, A + Aj, A + Aj, −A − Aj, −A + Aj, A + Aj, −A + Aj, −A − Aj, −A + Aj, A − Aj, A − Aj, A − Aj, −A − Aj, A + Aj, A − Aj, −A + Aj, −A − Aj, A + Aj, A + Aj, −A + Aj, −A + Aj, A − Aj, −A − Aj, A + Aj, A + Aj, −A − Aj, −A − Aj, A − Aj |
| 3 | A + Aj, A − Aj, −A − Aj, −A + Aj, −A − Aj, A − Aj, A + Aj, A + Aj, −A − Aj, −A + Aj, −A − Aj, −A + Aj, −A − Aj, A + Aj, A − Aj, A + Aj, −A + Aj, A + Aj, −A − Aj, A + Aj, −A − Aj, A + Aj, A + Aj, −A − Aj, A + Aj, A − Aj, −A + Aj, A + Aj, A + Aj, A + Aj, A + Aj, −A + Aj, A + Aj, A + Aj, −A − Aj, −A − Aj, −A + Aj, −A + Aj, −A + Aj, −A + Aj, A − Aj, −A + Aj, −A + Aj, A + Aj, −A + Aj, −A − Aj, A − Aj, A − Aj, A − Aj, −A − Aj, −A − Aj, A − Aj, −A + Aj, A − Aj, A + Aj, A − Aj, A − Aj, A − Aj, −A + Aj, −A + Aj, A − Aj, −A − Aj, −A − Aj, A + Aj, −A − Aj, A − Aj, A − Aj, −A − Aj, A − Aj, −A − Aj, −A + Aj, −A + Aj, A + Aj, A + Aj, A − Aj, A − Aj, −A + Aj, A − Aj, −A + Aj, −A − Aj, A − Aj, −A + Aj, −A + Aj, −A − Aj, A − Aj, −A − Aj, −A − Aj, −A − Aj, A + Aj, A − Aj, −A − Aj, A − Aj, A + Aj, A − Aj, −A + Aj, −A + Aj, −A + Aj, A + Aj, −A − Aj, −A + Aj, A − Aj, A + Aj |

TABLE 20-5

| Index | Pilot sequence |
|---|---|
| 1 | −A − Aj, −A + Aj, A − Aj, A + Aj, A − Aj, −A − Aj, A − Aj, −A + Aj, A − Aj, −A + Aj, A − Aj, A − Aj, −A + Aj, A − Aj, A + Aj, −A − Aj, A − Aj, A − Aj, A − Aj, A − Aj, −A − Aj, A − Aj, A − Aj, −A + Aj, −A + Aj, −A − Aj, −A − Aj, −A − Aj, −A − Aj, A + Aj, −A − Aj, −A − Aj, A − Aj, −A − Aj, −A + Aj, A + Aj, A + Aj, A + Aj, −A + Aj, −A + Aj, A + Aj, −A − Aj, A + Aj, A − Aj, A + Aj, A + Aj, A + Aj, −A − Aj, −A − Aj, A + Aj, −A + Aj, −A + Aj, A − Aj, −A + Aj, A + Aj, A + Aj, −A + Aj, A + Aj, −A + Aj, −A − Aj, −A − Aj, A − Aj, A − Aj, A + Aj, A + Aj, −A − Aj, A + Aj, −A − Aj, −A + Aj, A + Aj, −A − Aj, −A − Aj, −A + Aj, A + Aj, −A + Aj, −A + Aj, −A + Aj, A − Aj, A + Aj, −A + Aj, A + Aj, A − Aj, A + Aj, −A − Aj, −A − Aj, −A − Aj, A − Aj, −A + Aj, −A − Aj, A + Aj, A − Aj, −A + Aj, −A + Aj, A + Aj, A + Aj, −A − Aj, A − Aj, −A + Aj, −A + Aj, A − Aj, A − Aj, −A − Aj |
| 2 | −A + Aj, −A − Aj, A − Aj, A + Aj, A − Aj, −A − Aj, −A + Aj, −A + Aj, A − Aj, A + Aj, A − Aj, A + Aj, A − Aj, −A + Aj, −A − Aj, −A + Aj, A + Aj, −A + Aj, A − Aj, −A + Aj, A − Aj, −A + Aj, −A + Aj, A − Aj, −A + Aj, −A − Aj, A + Aj, −A + Aj, −A + Aj, −A + Aj, −A + Aj, A + Aj, −A + Aj, −A + Aj, A − Aj, A − Aj, A + Aj, A + Aj, A + Aj, A + Aj, −A − Aj, A + Aj, A + Aj, −A + Aj, A + Aj, A − Aj, −A − Aj, −A − Aj, −A − Aj, A − Aj, A − Aj, −A − Aj, A + Aj, −A − Aj, −A + Aj, −A − Aj, −A − Aj, −A − Aj, A + Aj, A + Aj, −A − Aj, A − Aj, A − Aj, −A + Aj, A − Aj, −A − Aj, −A − Aj, A − Aj, −A − Aj, A − Aj, A + Aj, A + Aj, −A + Aj, −A + Aj, −A − Aj, −A − Aj, A + Aj, −A − Aj, A + Aj, A − Aj, −A − Aj, A + Aj, A + Aj, A − Aj, −A − Aj, A − Aj, A − Aj, A − Aj, −A + Aj, −A − Aj, A − Aj, −A − Aj, −A + Aj, −A − Aj, A + Aj, A + Aj, A + Aj, −A + Aj, A − Aj, A + Aj, −A − Aj, −A + Aj |
| 3 | A − Aj, A + Aj, −A + Aj, −A − Aj, −A + Aj, A + Aj, A − Aj, A − Aj, −A + Aj, −A − Aj, −A + Aj, −A − Aj, −A + Aj, A − Aj, A + Aj, A − Aj, −A − Aj, A − Aj, −A + Aj, A − Aj, −A + Aj, A − Aj, A − Aj, −A + Aj, A − Aj, A + Aj, −A − Aj, A − Aj, A − Aj, A − Aj, A − Aj, −A − Aj, A − Aj, A − Aj, −A + Aj, −A + Aj, −A − Aj, −A − Aj, −A − Aj, −A − Aj, A + Aj, −A − Aj, −A − Aj, A − Aj, −A − Aj, −A + Aj, A + Aj, A + Aj, A + Aj, −A + Aj, −A + Aj, A + Aj, −A − Aj, A + Aj, A − Aj, A + Aj, A + Aj, A + Aj, −A − Aj, −A − Aj, A + Aj, −A + Aj, −A + Aj, A − Aj, −A + Aj, A + Aj, A + Aj, −A + Aj, A + Aj, −A + Aj, −A − Aj, −A − Aj, A − Aj, A − Aj, A + Aj, A + Aj, −A − Aj, A + Aj, −A − Aj, −A + Aj, A + Aj, −A − Aj, −A − Aj, −A + Aj, A + Aj, −A + Aj, −A + Aj, −A + Aj, A − Aj, A + Aj, −A + Aj, A + Aj, A − Aj, A + Aj, −A − Aj, −A − Aj, −A − Aj, A − Aj, −A + Aj, −A − Aj, A + Aj, A − Aj |
| 4 | A + Aj, A − Aj, −A + Aj, −A − Aj, −A + Aj, A + Aj, −A + Aj, A − Aj, −A + Aj, A − Aj, −A + Aj, −A + Aj, A − Aj, −A + Aj, −A − Aj, A + Aj, −A + Aj, −A + Aj, −A + Aj, −A + Aj, A + Aj, −A + Aj, −A + Aj, A − Aj, A − Aj, A + Aj, A + Aj, A + Aj, A + Aj, −A − Aj, A + Aj, A + Aj, −A + Aj, A + Aj, A − Aj, −A − Aj, −A − Aj, −A − Aj, A − Aj, A − Aj, −A − Aj, A + Aj, −A − Aj, −A + Aj, −A − Aj, −A − Aj, −A − Aj, A + Aj, A + Aj, −A − Aj, A − Aj, A − Aj, −A + Aj, A − Aj, −A − Aj, −A − Aj, A − Aj, −A − Aj, A − Aj, A + Aj, A + Aj, −A + Aj, −A + Aj, −A − Aj, −A − Aj, A + Aj, −A − Aj, A + Aj, A − Aj, −A − Aj, A + Aj, A + Aj, A − Aj, −A − Aj, A − Aj, A − Aj, A − Aj, −A + Aj, −A − Aj, A − Aj, −A − Aj, −A + Aj, −A − Aj, A + Aj, A + Aj, A + Aj, −A + Aj, A − Aj, A + Aj, −A − Aj, −A + Aj, A − Aj, A − Aj, −A − Aj, −A − Aj, A + Aj, −A + Aj, A − Aj, A − Aj, −A + Aj, −A + Aj, A + Aj |

(14) When $N_{PS}=49$, if a remainder of $N_{TS}$ divided by 4 is 0, the pilot sequence is one item in the following Table 21-1. If a remainder of $N_{TS}$ divided by 4 is 2, the pilot sequence is one item in the following Table 21-1 or Table 21-2.

TABLE 21-1

| Index | Polarization | Pilot sequence |
|---|---|---|
| 1 | Polarization 1 | A − Aj, A + Aj, −A + Aj, −A + Aj, −A + Aj, A − Aj, −A + Aj, −A − Aj, −A − Aj, A + Aj, −A + Aj, −A + Aj, −A − Aj, −A − Aj, A − Aj, −A − Aj, A + Aj, A − Aj, A − Aj, −A + Aj, −A − Aj, −A + Aj, A − Aj, A + Aj, A + Aj, A − Aj, A + Aj, A − Aj, A − Aj, A + Aj, A + Aj, −A − Aj, A + Aj, A − Aj, |

TABLE 21-1-continued

| Index | Polarization | Pilot sequence |
|---|---|---|
| | | −A + Aj, A + Aj, A + Aj, A − Aj, −A + Aj, A − Aj, A − Aj, −A − Aj, A + Aj, −A − Aj, −A + Aj, −A − Aj, −A + Aj, −A − Aj, −A − Aj |
| | Polarization 2 | A + Aj, A + Aj, −A + Aj, −A − Aj, −A − Aj, A + Aj, A − Aj, −A − Aj, A − Aj, −A + Aj, −A − Aj, A + Aj, −A + Aj, A − Aj, A − Aj, A + Aj, −A + Aj, A + Aj, A − Aj, A + Aj, −A − Aj, −A + Aj, A − Aj, A − Aj, −A + Aj, −A + Aj, A + Aj, −A + Aj, A + Aj, −A − Aj, A + Aj, −A − Aj, A − Aj, A − Aj, A − Aj, A + Aj, A + Aj, A + Aj, A − Aj, −A − Aj, −A − Aj, −A + Aj, −A − Aj, −A − Aj, −A + Aj, A − Aj, −A − Aj, −A + Aj, −A + Aj |
| 2 | Polarization 1 | −A − Aj, −A − Aj, A + Aj, −A − Aj, −A + Aj, A − Aj, −A + Aj, A − Aj, A + Aj, A + Aj, A − Aj, −A − Aj, −A − Aj, −A − Aj, −A + Aj, A − Aj, A − Aj, −A − Aj, A − Aj, A − Aj, A − Aj, −A − Aj, −A + Aj, −A − Aj, A + Aj, −A + Aj, −A + Aj, −A − Aj, A − Aj, −A + Aj, A + Aj, A + Aj, −A + Aj, −A + Aj, A + Aj, −A − Aj, −A − Aj, A − Aj, A + Aj, −A + Aj, −A − Aj, A + Aj, A − Aj, A + Aj, −A + Aj, A + Aj, −A + Aj, A + Aj, A − Aj |
| | Polarization 2 | −A + Aj, −A + Aj, A − Aj, −A + Aj, −A − Aj, A + Aj, −A − Aj, A + Aj, A − Aj, A − Aj, A + Aj, −A + Aj, −A + Aj, −A + Aj, −A − Aj, A + Aj, A + Aj, −A + Aj, A + Aj, A + Aj, A + Aj, −A + Aj, −A − Aj, −A + Aj, A − Aj, −A − Aj, −A − Aj, −A + Aj, A + Aj, −A − Aj, A − Aj, A − Aj, −A − Aj, −A − Aj, A − Aj, −A + Aj, −A + Aj, A + Aj, A − Aj, −A − Aj, −A + Aj, A − Aj, A + Aj, A − Aj, −A − Aj, A − Aj, −A − Aj, A − Aj, A + Aj |
| 3 | Polarization 1 | −A − Aj, −A − Aj, A + Aj, −A − Aj, −A + Aj, A − Aj, −A + Aj, A − Aj, A + Aj, A + Aj, A − Aj, −A − Aj, −A − Aj, −A − Aj, −A + Aj, A − Aj, A − Aj, −A − Aj, A − Aj, A − Aj, A − Aj, −A − Aj, −A + Aj, −A − Aj, A + Aj, −A + Aj, −A + Aj, −A − Aj, A − Aj, −A + Aj, A + Aj, A + Aj, −A + Aj, −A + Aj, A + Aj, −A − Aj, −A − Aj, A − Aj, A + Aj, −A + Aj, −A − Aj, A + Aj, A − Aj, A + Aj, −A + Aj, A + Aj, −A + Aj, A + Aj, A − Aj |
| | Polarization 2 | A − Aj, A − Aj, −A + Aj, A − Aj, A + Aj, −A − Aj, A + Aj, −A − Aj, −A + Aj, −A + Aj, −A − Aj, A − Aj, A − Aj, A − Aj, A + Aj, −A − Aj, −A − Aj, A − Aj, −A − Aj, −A − Aj, −A − Aj, A − Aj, A + Aj, A − Aj, −A + Aj, A + Aj, A + Aj, A − Aj, −A − Aj, A + Aj, −A + Aj, −A + Aj, A + Aj, A + Aj, −A + Aj, A − Aj, A − Aj, −A − Aj, −A + Aj, A + Aj, A − Aj, −A + Aj, −A − Aj, −A + Aj, A + Aj, −A + Aj, A + Aj, −A + Aj, −A − Aj |
| 4 | Polarization 1 | −A + Aj, −A + Aj, A − Aj, −A + Aj, −A − Aj, A + Aj, −A − Aj, A + Aj, A − Aj, A − Aj, A + Aj, −A + Aj, −A + Aj, −A + Aj, −A − Aj, A + Aj, A + Aj, −A + Aj, A + Aj, A + Aj, A + Aj, −A + Aj, −A − Aj, −A + Aj, A − Aj, −A − Aj, −A − Aj, −A + Aj, A + Aj, −A − Aj, A − Aj, A − Aj, −A − Aj, −A − Aj, A − Aj, −A + Aj, −A + Aj, A + Aj, A − Aj, −A − Aj, −A + Aj, A − Aj, A + Aj, A − Aj, −A − Aj, A − Aj, −A − Aj, A − Aj, A + Aj |
| | Polarization 2 | A + Aj, A + Aj, −A − Aj, A + Aj, A − Aj, −A + Aj, A − Aj, −A + Aj, −A − Aj, −A − Aj, −A + Aj, A + Aj, A + Aj, A + Aj, A − Aj, −A + Aj, −A + Aj, A + Aj, −A + Aj, −A + Aj, −A + Aj, A + Aj, A − Aj, A + Aj, −A − Aj, A − Aj, A − Aj, A + Aj, −A + Aj, A − Aj, −A − Aj, −A − Aj, A − Aj, A − Aj, −A − Aj, A + Aj, A + Aj, −A + Aj, −A − Aj, A − Aj, A + Aj, −A − Aj, −A + Aj, −A − Aj, A − Aj, −A − Aj, A − Aj, −A − Aj, −A + Aj |
| 5 | Polarization 1 | A − Aj, A − Aj, −A + Aj, A − Aj, A + Aj, −A − Aj, A + Aj, −A − Aj, −A + Aj, −A + Aj, −A − Aj, A − Aj, A − Aj, A − Aj, A + Aj, −A − Aj, −A − Aj, A − Aj, −A − Aj, −A − Aj, −A − Aj, A − Aj, A + Aj, A − Aj, −A + Aj, A + Aj, A + Aj, A − Aj, −A − Aj, A + Aj, −A + Aj, −A + Aj, A + Aj, A + Aj, −A + Aj, A − Aj, A − Aj, −A − Aj, −A + Aj, A + Aj, A − Aj, −A + Aj, −A − Aj, −A + Aj, A + Aj, −A + Aj, A + Aj, −A + Aj, −A − Aj |
| | Polarization 2 | A + Aj, A + Aj, −A − Aj, A + Aj, A − Aj, −A + Aj, A − Aj, −A + Aj, −A − Aj, −A − Aj, −A + Aj, A + Aj, A + Aj, A + Aj, A − Aj, −A + Aj, −A + Aj, A + Aj, −A + Aj, −A + Aj, −A + Aj, A + Aj, A − Aj, A + Aj, −A − Aj, A − Aj, A − Aj, A + Aj, −A + Aj, A − Aj, −A − Aj, −A − Aj, A − Aj, A − Aj, −A − Aj, A + Aj, A + Aj, −A + Aj, −A − Aj, A − Aj, A + Aj, −A − Aj, −A + Aj, −A − Aj, A − Aj, −A − Aj, A − Aj, −A − Aj, −A + Aj |
| 6 | Polarization 1 | −A + Aj, A + Aj, A + Aj, −A + Aj, −A + Aj, A + Aj, A + Aj, A + Aj, A + Aj, −A − Aj, −A − Aj, A − Aj, −A − Aj, −A + Aj, −A − Aj, A − Aj, A − Aj, A − Aj, −A + Aj, −A − Aj, A − Aj, −A + Aj, A − Aj, A + Aj, A − Aj, A + Aj, −A − Aj, −A − Aj, A + Aj, A − Aj, −A − Aj, −A + Aj, A − Aj, −A − Aj, −A + Aj, −A + Aj, −A − Aj, A + Aj, A + Aj, −A + Aj, A − Aj, −A + Aj, −A + Aj, A − Aj, A − Aj, −A − Aj, −A − Aj, −A + Aj, A + Aj |
| | Polarization 2 | A − Aj, A + Aj, A − Aj, A + Aj, A − Aj, −A − Aj, −A − Aj, A − Aj, −A + Aj, A + Aj, −A + Aj, A + Aj, A − Aj, −A − Aj, A − Aj, −A − Aj, A − Aj, −A − Aj, −A − Aj, −A − Aj, A + Aj, −A − Aj, A − Aj, A − Aj, −A + Aj, −A + Aj, A − Aj, −A − Aj, −A − Aj, A + Aj, −A + Aj, A − Aj, A + Aj, A + Aj, −A + Aj, −A + Aj, −A + Aj, A + Aj, −A − Aj, A + Aj, −A + Aj, A − Aj, −A + Aj, A + Aj, A − Aj, −A + Aj, −A − Aj, −A + Aj, A + Aj |
| 7 | Polarization 1 | −A − Aj, A − Aj, −A + Aj, −A + Aj, A + Aj, −A − Aj, −A + Aj, A + Aj, −A − Aj, A − Aj, A + Aj, A + Aj, −A + Aj, −A − Aj, −A + Aj, A − Aj, A − Aj, A + Aj, −A − Aj, −A − Aj, A − Aj, −A + Aj, A − Aj, A + Aj, A + Aj, A − Aj, −A − Aj, A − Aj, −A + Aj, −A + Aj, −A + Aj, A + Aj, A − Aj, −A − Aj, A + Aj, −A − Aj, A − Aj, A − Aj, −A − Aj, −A + Aj, −A − Aj, −A + Aj, A − Aj, −A − Aj, −A − Aj, A + Aj, A + Aj, −A + Aj, A + Aj |
| | Polarization 2 | A − Aj, −A − Aj, −A − Aj, A − Aj, −A − Aj, −A + Aj, A + Aj, A + Aj, A − Aj, −A − Aj, −A − Aj, A − Aj, A − Aj, A − Aj, −A − Aj, −A − Aj, −A + Aj, A − Aj, −A + Aj, A + Aj, A + Aj, A + Aj, −A + Aj, A + Aj, −A + Aj, −A + Aj, −A + Aj, −A − Aj, A − Aj, A + Aj, −A − Aj, A + Aj, −A − Aj, −A + Aj, A − Aj, A + Aj, A − Aj, A + Aj, A + Aj, −A + Aj, A − Aj, A − Aj, −A + Aj, −A + Aj, −A − Aj, A − Aj, −A + Aj, A + Aj, −A − Aj |

TABLE 21-2

| Index | Polarization | Pilot sequence |
|---|---|---|
| 1 | Polarization 1 | −A − Aj, A + Aj, A + Aj, A + Aj, −A − Aj, A + Aj, A − Aj, −A + Aj, A − Aj, A + Aj, A − Aj, −A − Aj, A − Aj, −A − Aj, −A + Aj, A + Aj, −A − Aj, −A − Aj, A + Aj, −A + Aj, A − Aj, A + Aj, −A − Aj, −A + Aj, −A + Aj, A + Aj, A − Aj, A + Aj, −A + Aj, −A + Aj, A − Aj, −A − Aj, −A + Aj, −A + Aj, −A + Aj, A + Aj, −A − Aj, A − Aj, A − Aj, A − Aj, −A + Aj, −A − Aj, −A − Aj, −A − Aj, −A − Aj, A − Aj, A + Aj, −A − Aj, A + Aj |
| | Polarization 2 | A − Aj, −A + Aj, −A + Aj, −A + Aj, A − Aj, −A + Aj, −A − Aj, A + Aj, −A − Aj, −A + Aj, −A − Aj, A − Aj, −A − Aj, A − Aj, A + Aj, −A + Aj, A − Aj, A − Aj, −A + Aj, A + Aj, −A − Aj, −A + Aj, A − Aj, A + Aj, A + Aj, −A + Aj, −A − Aj, −A + Aj, A + Aj, A + Aj, −A − Aj, A − Aj, A + Aj, A + Aj, A + Aj, −A + Aj, A − Aj, −A − Aj, −A − Aj, −A − Aj, A + Aj, A − Aj, A − Aj, A − Aj, A − Aj, −A − Aj, −A + Aj, A − Aj, −A + Aj |
| 2 | Polarization 1 | A + Aj, −A − Aj, −A − Aj, −A − Aj, A + Aj, −A − Aj, −A + Aj, A − Aj, −A + Aj, −A − Aj, −A + Aj, A + Aj, −A + Aj, A + Aj, A − Aj, −A − Aj, A + Aj, A + Aj, −A − Aj, A − Aj, −A + Aj, −A − Aj, A + Aj, A − Aj, A − Aj, −A − Aj, −A + Aj, −A − Aj, A − Aj, A − Aj, −A + Aj, A + Aj, A − Aj, A − Aj, A − Aj, −A − Aj, A + Aj, −A + Aj, −A + Aj, −A + Aj, A − Aj, A + Aj, A + Aj, A + Aj, A + Aj, −A + Aj, −A − Aj, A + Aj, −A − Aj |
| | Polarization 2 | −A + Aj, A − Aj, A − Aj, A − Aj, −A + Aj, A − Aj, A + Aj, −A − Aj, A + Aj, A − Aj, A + Aj, −A + Aj, A + Aj, −A + Aj, −A − Aj, A − Aj, −A + Aj, −A + Aj, A − Aj, −A − Aj, A + Aj, A − Aj, −A + Aj, −A − Aj, −A − Aj, A − Aj, A + Aj, A − Aj, −A − Aj, −A − Aj, A + Aj, −A + Aj, −A − Aj, −A − Aj, −A − Aj, A − Aj, −A + Aj, A + Aj, A + Aj, A + Aj, −A − Aj, −A + Aj, −A + Aj, −A + Aj, −A + Aj, A + Aj, A − Aj, −A + Aj, A − Aj |
| 3 | Polarization 1 | −A − Aj, A + Aj, −A − Aj, A + Aj, −A + Aj, −A − Aj, −A − Aj, −A − Aj, −A − Aj, A − Aj, −A + Aj, −A + Aj, −A + Aj, −A − Aj, A + Aj, A − Aj, A − Aj, A − Aj, −A − Aj, −A + Aj, A − Aj, A − Aj, A + Aj, −A + Aj, A + Aj, A − Aj, A − Aj, −A − Aj, A + Aj, −A + Aj, A − Aj, A + Aj, −A − Aj, −A − Aj, A + Aj, A − Aj, −A − Aj, −A + Aj, −A − Aj, −A + Aj, A + Aj, −A + Aj, A − Aj, −A + Aj, A + Aj, −A − Aj, A + Aj, A + Aj, A + Aj |
| | Polarization 2 | A − Aj, −A + Aj, A − Aj, −A + Aj, A + Aj, A − Aj, A − Aj, A − Aj, A − Aj, −A − Aj, A + Aj, A + Aj, A + Aj, A − Aj, −A + Aj, −A − Aj, −A − Aj, −A − Aj, A − Aj, A + Aj, −A − Aj, −A − Aj, −A + Aj, A + Aj, −A + Aj, −A − Aj, −A − Aj, A − Aj, −A + Aj, A + Aj, −A − Aj, −A + Aj, A − Aj, A − Aj, −A + Aj, −A − Aj, A − Aj, A + Aj, A − Aj, A + Aj, −A + Aj, A + Aj, −A − Aj, A + Aj, −A + Aj, A − Aj, −A + Aj, −A + Aj, −A + Aj |
| 4 | Polarization 1 | A + Aj, −A − Aj, A + Aj, −A − Aj, A − Aj, A + Aj, A + Aj, A + Aj, A + Aj, −A + Aj, A − Aj, A − Aj, A − Aj, A + Aj, −A − Aj, −A + Aj, A + Aj, −A + Aj, A + Aj, A − Aj, −A + Aj, −A + Aj, −A − Aj, A − Aj, −A − Aj, −A + Aj, −A + Aj, A + Aj, −A − Aj, A − Aj, −A + Aj, −A − Aj, A + Aj, A + Aj, −A − Aj, −A + Aj, A + Aj, A − Aj, A + Aj, A − Aj, −A − Aj, A − Aj, −A + Aj, A − Aj, −A − Aj, A + Aj, −A − Aj, −A − Aj, −A − Aj |
| | Polarization 2 | −A + Aj, A − Aj, −A + Aj, A − Aj, −A − Aj, −A + Aj, −A + Aj, −A + Aj, −A + Aj, A + Aj, −A − Aj, −A − Aj, −A − Aj, −A + Aj, A − Aj, A − Aj, A + Aj, A + Aj, A + Aj, −A + Aj, −A − Aj, A + Aj, A + Aj, A − Aj, −A − Aj, A − Aj, A + Aj, A + Aj, −A + Aj, A − Aj, −A − Aj, A + Aj, A − Aj, −A + Aj, −A + Aj, A − Aj, A + Aj, −A + Aj, −A − Aj, −A + Aj, −A − Aj, A − Aj, −A − Aj, A + Aj, −A − Aj, A − Aj, −A + Aj, A − Aj, A − Aj, A − Aj |
| 5 | Polarization 1 | −A − Aj, −A − Aj, −A + Aj, −A − Aj, A + Aj, −A − Aj, A + Aj, A − Aj, −A + Aj, A + Aj, A − Aj, A + Aj, A − Aj, A + Aj, −A + Aj, A + Aj, −A − Aj, A − Aj, A + Aj, −A + Aj, −A − Aj, −A − Aj, A + Aj, A − Aj, A − Aj, A + Aj, A + Aj, A − Aj, −A + Aj, −A − Aj, A − Aj, A − Aj, A + Aj, −A − Aj, A − Aj, −A − Aj, −A + Aj, −A + Aj, −A + Aj, −A − Aj, −A + Aj, −A + Aj, A − Aj, −A − Aj, −A − Aj, −A − Aj, −A + Aj, A + Aj, A + Aj |
| | Polarization 2 | −A + Aj, −A + Aj, −A − Aj, −A + Aj, A − Aj, −A + Aj, A − Aj, A + Aj, −A − Aj, A − Aj, A + Aj, A − Aj, A + Aj, A − Aj, −A − Aj, A − Aj, −A + Aj, A + Aj, A − Aj, −A − Aj, −A + Aj, −A + Aj, A − Aj, A + Aj, A + Aj, A − Aj, A − Aj, A + Aj, −A − Aj, −A + Aj, A + Aj, A + Aj, A − Aj, −A + Aj, A + Aj, −A + Aj, −A − Aj, −A − Aj, −A − Aj, −A + Aj, −A − Aj, −A − Aj, A + Aj, −A + Aj, −A + Aj, −A + Aj, −A − Aj, A − Aj, A − Aj |
| 6 | Polarization 1 | −A − Aj, −A − Aj, −A + Aj, −A − Aj, A + Aj, −A − Aj, A + Aj, A − Aj, −A + Aj, A + Aj, A − Aj, A + Aj, A − Aj, A + Aj, −A + Aj, A + Aj, −A − Aj, A − Aj, A + Aj, −A + Aj, −A − Aj, −A − Aj, A + Aj, A − Aj, A − Aj, A + Aj, A + Aj, A − Aj, −A + Aj, −A − Aj, A − Aj, A − Aj, A + Aj, −A − Aj, A − Aj, −A − Aj, −A + Aj, −A + Aj, −A + Aj, −A − Aj, −A + Aj, −A + Aj, A − Aj, −A − Aj, −A − Aj, −A − Aj, −A + Aj, A + Aj, A + Aj |
| | Polarization 2 | A − Aj, A − Aj, A + Aj, A − Aj, −A + Aj, A − Aj, −A + Aj, −A − Aj, A + Aj, −A + Aj, −A − Aj, −A + Aj, −A − Aj, −A + Aj, A + Aj, −A + Aj, A − Aj, −A − Aj, −A + Aj, A + Aj, A − Aj, A − Aj, −A + Aj, −A − Aj, −A − Aj, −A + Aj, −A + Aj, −A − Aj, A + Aj, A − Aj, −A − Aj, −A − Aj, −A + Aj, A − Aj, −A − Aj, A − Aj, A + Aj, A + Aj, A + Aj, A − Aj, A + Aj, A + Aj, −A − Aj, A − Aj, A − Aj, A − Aj, A + Aj, −A + Aj, −A + Aj |
| 7 | Polarization 1 | −A + Aj, −A + Aj, −A + Aj, −A − Aj, A − Aj, A − Aj, −A − Aj, A + Aj, −A − Aj, A + Aj, −A + Aj, A − Aj, −A + Aj, −A + Aj, A + Aj, −A + Aj, A + Aj, −A − Aj, −A + Aj, −A − Aj, A + Aj, A + Aj, −A − Aj, −A − Aj, A − Aj, A + Aj, −A + Aj, A + Aj, A + Aj, −A + Aj, −A + Aj, A − Aj, −A − Aj, A + Aj, A + Aj, A + Aj, −A − Aj, A + Aj, A − Aj, A − Aj, −A − Aj, −A − Aj, −A − Aj, A − Aj, −A − Aj, −A + Aj, A − Aj, A − Aj, A − Aj |
| | Polarization 2 | −A − Aj, −A − Aj, −A − Aj, −A + Aj, A + Aj, A + Aj, −A + Aj, A − Aj, −A + Aj, A − Aj, −A − Aj, A + Aj, −A − Aj, −A − Aj, A − Aj, −A − Aj, A − Aj, −A + Aj, −A − Aj, −A + Aj, A − Aj, A − Aj, −A + Aj, −A + Aj, A + Aj, A − Aj, −A − Aj, A − Aj, A − Aj, −A − Aj, −A − Aj, A + Aj, −A + Aj, A − Aj, A − Aj, A − Aj, −A + Aj, A − Aj, A + Aj, A + Aj, −A + Aj, −A + Aj, −A + Aj, A + Aj, −A + Aj, −A − Aj, A + Aj, A + Aj, A + Aj |
| 8 | Polarization 1 | −A + Aj, −A + Aj, −A + Aj, −A − Aj, A − Aj, A − Aj, −A − Aj, A + Aj, −A − Aj, A + Aj, −A + Aj, A − Aj, −A + Aj, −A + Aj, A + Aj, −A + Aj, A + Aj, −A − Aj, −A + Aj, −A − Aj, A + Aj, A + Aj, −A − Aj, −A − Aj, A − Aj, A + Aj, −A + Aj, A + Aj, A + Aj, −A + Aj, −A + Aj, A − Aj, −A − Aj, A + Aj, A + Aj, A + Aj, −A − Aj, A + Aj, A − Aj, A − Aj, −A − Aj, −A − Aj, −A − Aj, A − Aj, −A − Aj, −A + Aj, A − Aj, A − Aj, A − Aj |
| | Polarization 2 | A + Aj, A + Aj, A + Aj, A − Aj, −A − Aj, −A − Aj, A − Aj, −A + Aj, A − Aj, −A + Aj, A + Aj, −A − Aj, A + Aj, A + Aj, −A + Aj, A + Aj, −A + Aj, A − Aj, A + Aj, A − Aj, −A + Aj, −A + Aj, A − Aj, A − Aj, −A − Aj, −A + Aj, A + Aj, −A + Aj, −A + Aj, A + Aj, A + Aj, −A − Aj, A − Aj, −A + Aj, |

TABLE 21-2-continued

| Index | Polarization | Pilot sequence |
|---|---|---|
| | | −A + Aj, −A + Aj, A − Aj, −A + Aj, −A − Aj, −A − Aj, A − Aj, A − Aj, A − Aj, −A − Aj, A − Aj, A + Aj, −A − Aj, −A − Aj, −A − Aj |
| 9 | Polarization 1 | A − Aj, A − Aj, A − Aj, A + Aj, −A + Aj, −A + Aj, A + Aj, −A − Aj, A + Aj, −A − Aj, A − Aj, −A + Aj, A − Aj, A − Aj, −A − Aj, A − Aj, −A − Aj, A + Aj, A − Aj, A + Aj, −A − Aj, −A − Aj, A + Aj, A + Aj, −A + Aj, −A − Aj, A − Aj, −A − Aj, −A − Aj, A − Aj, A − Aj, −A + Aj, A + Aj, −A − Aj, −A − Aj, −A − Aj, A + Aj, −A − Aj, −A + Aj, −A + Aj, A + Aj, A + Aj, A + Aj, −A + Aj, A + Aj, A − Aj, −A + Aj, −A + Aj, −A + Aj |
| | Polarization 2 | −A − Aj, −A − Aj, −A − Aj, −A + Aj, A + Aj, A + Aj, −A + Aj, A − Aj, −A + Aj, A − Aj, −A − Aj, A + Aj, −A − Aj, −A − Aj, A − Aj, −A − Aj, A − Aj, −A + Aj, −A − Aj, −A + Aj, A − Aj, A − Aj, −A + Aj, −A + Aj, A + Aj, A − Aj, −A − Aj, A − Aj, A − Aj, −A − Aj, −A − Aj, A + Aj, −A + Aj, A − Aj, A − Aj, A − Aj, −A + Aj, A − Aj, A + Aj, A + Aj, −A + Aj, −A + Aj, −A + Aj, A + Aj, −A + Aj, −A − Aj, A + Aj, A + Aj, A + Aj |
| 10 | Polarization 1 | A − Aj, A − Aj, A − Aj, A + Aj, −A + Aj, −A + Aj, A + Aj, −A − Aj, A + Aj, −A − Aj, A − Aj, −A + Aj, A − Aj, A − Aj, −A − Aj, A − Aj, −A − Aj, A + Aj, A − Aj, A + Aj, −A − Aj, −A − Aj, A + Aj, A + Aj, −A + Aj, −A − Aj, A − Aj, −A − Aj, −A − Aj, A − Aj, A − Aj, −A + Aj, A + Aj, −A − Aj, −A − Aj, −A − Aj, A + Aj, −A − Aj, −A + Aj, −A + Aj, A + Aj, A + Aj, A + Aj, −A + Aj, A + Aj, A − Aj, −A + Aj, −A + Aj, −A + Aj |
| | Polarization 2 | A + Aj, A + Aj, A + Aj, A − Aj, −A − Aj, −A − Aj, A − Aj, −A + Aj, A − Aj, −A + Aj, A + Aj, −A − Aj, A + Aj, A + Aj, −A + Aj, A + Aj, −A + Aj, A − Aj, A + Aj, A − Aj, −A + Aj, −A + Aj, A − Aj, A − Aj, −A − Aj, −A + Aj, A + Aj, −A + Aj, −A + Aj, A + Aj, A + Aj, −A − Aj, A − Aj, −A + Aj, −A + Aj, −A + Aj, A − Aj, −A + Aj, −A − Aj, −A − Aj, A − Aj, A − Aj, A − Aj, −A − Aj, A − Aj, A + Aj, −A − Aj, −A − Aj, −A − Aj |
| 11 | Polarization 1 | A + Aj, A + Aj, A − Aj, A + Aj, −A − Aj, A + Aj, −A − Aj, −A + Aj, A − Aj, −A − Aj, −A + Aj, −A − Aj, −A + Aj, −A − Aj, A − Aj, −A − Aj, A + Aj, −A + Aj, −A − Aj, A − Aj, A + Aj, A + Aj, −A − Aj, −A + Aj, −A + Aj, −A − Aj, −A − Aj, −A + Aj, A − Aj, A + Aj, −A + Aj, −A + Aj, −A − Aj, A + Aj, −A + Aj, A + Aj, A − Aj, A − Aj, A − Aj, A + Aj, A − Aj, A − Aj, −A + Aj, A + Aj, A + Aj, A + Aj, A − Aj, −A − Aj, −A − Aj |
| | Polarization 2 | −A + Aj, −A + Aj, −A − Aj, −A + Aj, A − Aj, −A + Aj, A − Aj, A + Aj, −A − Aj, A − Aj, A + Aj, A − Aj, A + Aj, A − Aj, −A − Aj, A − Aj, −A + Aj, A + Aj, A − Aj, −A − Aj, −A + Aj, −A + Aj, A − Aj, A + Aj, A + Aj, A − Aj, A − Aj, A + Aj, −A − Aj, −A + Aj, A + Aj, A + Aj, A − Aj, −A + Aj, A + Aj, −A + Aj, −A − Aj, −A − Aj, −A − Aj, −A + Aj, −A − Aj, −A − Aj, A + Aj, −A + Aj, −A + Aj, −A + Aj, −A − Aj, A − Aj, A − Aj |
| 12 | Polarization 1 | A + Aj, A + Aj, A − Aj, A + Aj, −A − Aj, A + Aj, −A − Aj, −A + Aj, A − Aj, −A − Aj, −A + Aj, −A − Aj, −A + Aj, −A − Aj, A − Aj, −A − Aj, A + Aj, −A + Aj, −A − Aj, A − Aj, A + Aj, A + Aj, −A − Aj, −A + Aj, −A + Aj, −A − Aj, −A − Aj, −A + Aj, A − Aj, A + Aj, −A + Aj, −A + Aj, −A − Aj, A + Aj, −A + Aj, A + Aj, A − Aj, A − Aj, A − Aj, A + Aj, A − Aj, A − Aj, −A + Aj, A + Aj, A + Aj, A + Aj, A − Aj, −A − Aj, −A − Aj |
| | Polarization 2 | A − Aj, A − Aj, A + Aj, A − Aj, −A + Aj, A − Aj, −A + Aj, −A − Aj, A + Aj, −A + Aj, −A − Aj, −A + Aj, −A − Aj, −A + Aj, A + Aj, −A + Aj, A − Aj, −A − Aj, −A + Aj, A + Aj, A − Aj, A − Aj, −A + Aj, −A − Aj, −A − Aj, −A + Aj, −A + Aj, −A − Aj, A + Aj, A − Aj, −A − Aj, −A − Aj, −A + Aj, A − Aj, −A − Aj, A − Aj, A + Aj, A + Aj, A + Aj, A − Aj, A + Aj, A + Aj, −A − Aj, A − Aj, A − Aj, A − Aj, A + Aj, −A + Aj, −A + Aj |
| 13 | Polarization 1 | A − Aj, A − Aj, A + Aj, A − Aj, A + Aj, −A + Aj, A − Aj, A − Aj, −A − Aj, −A − Aj, −A + Aj, A + Aj, A − Aj, −A + Aj, −A − Aj, A + Aj, −A + Aj, −A − Aj, −A + Aj, A − Aj, A + Aj, A − Aj, −A + Aj, −A − Aj, A − Aj, −A + Aj, −A − Aj, −A − Aj, −A − Aj, −A − Aj, A + Aj, −A − Aj, −A − Aj, A − Aj, A + Aj, −A + Aj, A + Aj, A + Aj, −A − Aj, −A + Aj, A − Aj, A − Aj, −A − Aj, −A + Aj, −A + Aj, A + Aj, A + Aj, A + Aj, A + Aj |
| | Polarization 2 | A − Aj, A − Aj, −A + Aj, A − Aj, A − Aj, A − Aj, A + Aj, −A + Aj, −A − Aj, −A + Aj, −A − Aj, A + Aj, A − Aj, A − Aj, −A + Aj, −A − Aj, A + Aj, A − Aj, −A − Aj, −A + Aj, −A − Aj, −A − Aj, A + Aj, A − Aj, A + Aj, A − Aj, −A − Aj, A − Aj, A − Aj, −A − Aj, −A + Aj, A − Aj, A + Aj, A + Aj, −A + Aj, −A − Aj, A + Aj, A + Aj, A + Aj, −A + Aj, −A + Aj, −A − Aj, A + Aj, A − Aj, −A + Aj, −A + Aj, −A − Aj, −A + Aj, −A + Aj |

(15) When $N_{PS}$=51, the pilot sequence is one item in the following Table 22.

TABLE 22

| Index | Polarization | Pilot sequence |
|---|---|---|
| 1 | Polarization 1 | −A + Aj, −A + Aj, −A + Aj, A + Aj, A − Aj, A − Aj, −A + Aj, −A + Aj, −A − Aj, A − Aj, −A + Aj, −A − Aj, −A + Aj, −A + Aj, A + Aj, −A − Aj, −A + Aj, A − Aj, −A + Aj, −A − Aj, A + Aj, A − Aj, −A − Aj, −A − Aj, −A + Aj, A + Aj, A − Aj, −A − Aj, A − Aj, A − Aj, −A − Aj, A − Aj, −A − Aj, A + Aj, −A + Aj, −A − Aj, A + Aj, −A − Aj, A + Aj, A + Aj, −A + Aj, A + Aj, A + Aj, A + Aj, A − Aj, A + Aj, −A − Aj, A − Aj, A − Aj, A − Aj, −A + Aj |
| | Polarization 2 | −A − Aj, −A − Aj, −A − Aj, A − Aj, A + Aj, A + Aj, −A − Aj, −A − Aj, −A + Aj, A + Aj, −A − Aj, −A + Aj, −A − Aj, −A − Aj, A − Aj, −A + Aj, −A − Aj, A + Aj, −A − Aj, −A + Aj, A − Aj, A + Aj, −A + Aj, −A + Aj, −A − Aj, A − Aj, A + Aj, −A + Aj, A + Aj, A + Aj, −A + Aj, A + Aj, −A + Aj, A − Aj, −A − Aj, −A + Aj, A − Aj, −A + Aj, A − Aj, A − Aj, −A − Aj, A − Aj, A − Aj, A − Aj, A + Aj, A − Aj, −A + Aj, A + Aj, A + Aj, A + Aj, −A − Aj |
| 2 | Polarization 1 | −A + Aj, −A + Aj, −A + Aj, A + Aj, A − Aj, A − Aj, −A + Aj, −A + Aj, −A − Aj, A − Aj, −A + Aj, −A − Aj, −A + Aj, −A + Aj, A + Aj, −A − Aj, −A + Aj, A − Aj, −A + Aj, −A − Aj, A + Aj, A − Aj, −A − Aj, −A − Aj, −A + Aj, A + Aj, A − Aj, −A − Aj, A − Aj, A − Aj, −A − Aj, A − Aj, −A − Aj, A + Aj, −A + Aj, −A − Aj, A + Aj, −A − Aj, A + Aj, A + Aj, −A + Aj, A + Aj, A + Aj, A + Aj, A − Aj, A + Aj, −A − Aj, A − Aj, A − Aj, A − Aj, −A + Aj |

TABLE 22-continued

| Index | Polarization | Pilot sequence |
|---|---|---|
| | Polarization 2 | A + Aj, A + Aj, A + Aj, −A + Aj, −A − Aj, −A − Aj, A + Aj, A + Aj, A − Aj, −A − Aj, A + Aj, A − Aj, A + Aj, A + Aj, −A + Aj, A − Aj, A + Aj, −A − Aj, A + Aj, A − Aj, −A + Aj, −A − Aj, A − Aj, A − Aj, A + Aj, −A + Aj, −A − Aj, A − Aj, −A − Aj, −A − Aj, A − Aj, −A − Aj, A − Aj, −A + Aj, A + Aj, A − Aj, −A + Aj, A − Aj, −A + Aj, −A + Aj, A + Aj, −A + Aj, −A + Aj, −A + Aj, −A − Aj, −A + Aj, A − Aj, −A − Aj, −A − Aj, −A − Aj, A + Aj |
| 3 | Polarization 1 | A − Aj, A − Aj, A − Aj, −A − Aj, −A + Aj, −A + Aj, A − Aj, A − Aj, A + Aj, −A + Aj, A − Aj, A + Aj, A − Aj, A − Aj, −A − Aj, A + Aj, A − Aj, −A + Aj, A − Aj, A + Aj, −A − Aj, −A + Aj, A + Aj, A + Aj, A − Aj, −A − Aj, −A + Aj, A + Aj, −A + Aj, −A + Aj, A + Aj, −A + Aj, A + Aj, −A − Aj, A − Aj, A + Aj, −A − Aj, A + Aj, −A − Aj, −A − Aj, A − Aj, −A − Aj, −A − Aj, −A − Aj, −A + Aj, −A − Aj, A + Aj, −A + Aj, −A + Aj, −A + Aj, A − Aj |
| | Polarization 2 | −A − Aj, −A − Aj, −A − Aj, A − Aj, A + Aj, A + Aj, −A − Aj, −A − Aj, −A + Aj, A + Aj, −A − Aj, −A + Aj, −A − Aj, −A − Aj, A − Aj, −A + Aj, −A − Aj, A + Aj, −A − Aj, −A + Aj, A − Aj, A + Aj, −A + Aj, −A + Aj, −A − Aj, A − Aj, A + Aj, −A + Aj, A + Aj, A + Aj, −A + Aj, A + Aj, −A + Aj, A − Aj, −A − Aj, −A + Aj, A − Aj, −A + Aj, A − Aj, A − Aj, −A − Aj, A − Aj, A − Aj, A − Aj, A + Aj, A − Aj, −A + Aj, A + Aj, A + Aj, A + Aj, −A − Aj |
| 4 | Polarization 1 | A − Aj, A − Aj, A − Aj, −A − Aj, −A + Aj, −A + Aj, A − Aj, A − Aj, A + Aj, −A + Aj, A − Aj, A + Aj, A − Aj, A − Aj, −A − Aj, A + Aj, A − Aj, −A + Aj, A − Aj, A + Aj, −A − Aj, −A + Aj, A + Aj, A + Aj, A − Aj, −A − Aj, −A + Aj, A + Aj, −A + Aj, −A + Aj, A + Aj, −A + Aj, A + Aj, −A − Aj, A − Aj, A + Aj, −A − Aj, A + Aj, −A − Aj, −A − Aj, A − Aj, −A − Aj, −A − Aj, −A − Aj, −A + Aj, −A − Aj, A + Aj, −A + Aj, −A + Aj, −A + Aj, A − Aj |
| | Polarization 2 | A + Aj, A + Aj, A + Aj, −A + Aj, −A − Aj, −A − Aj, A + Aj, A + Aj, A − Aj, −A − Aj, A + Aj, A − Aj, A + Aj, A + Aj, −A + Aj, A − Aj, A + Aj, −A − Aj, A + Aj, A − Aj, −A + Aj, −A − Aj, A − Aj, A − Aj, A + Aj, −A + Aj, −A − Aj, A − Aj, −A − Aj, −A − Aj, A − Aj, −A − Aj, A − Aj, −A + Aj, A + Aj, A − Aj, −A + Aj, A − Aj, −A + Aj, −A + Aj, A + Aj, −A + Aj, −A + Aj, −A + Aj, −A − Aj, −A + Aj, A − Aj, −A − Aj, −A − Aj, −A − Aj, A + Aj |
| 5 | Polarization 1 | −A + Aj, A − Aj, A − Aj, A − Aj, A + Aj, −A − Aj, A − Aj, −A − Aj, −A − Aj, −A − Aj, −A + Aj, −A − Aj, −A − Aj, A + Aj, −A − Aj, A + Aj, −A + Aj, −A − Aj, A + Aj, A − Aj, A + Aj, A − Aj, A − Aj, A + Aj, A − Aj, −A − Aj, −A + Aj, A + Aj, A + Aj, A + Aj, A − Aj, −A − Aj, A + Aj, −A + Aj, A − Aj, −A + Aj, A + Aj, −A − Aj, −A + Aj, −A + Aj, A + Aj, −A + Aj, A − Aj, A + Aj, −A + Aj, −A + Aj, A − Aj, A − Aj, −A − Aj, −A + Aj, −A + Aj, −A + Aj |
| | Polarization 2 | A + Aj, −A − Aj, −A − Aj, −A − Aj, −A + Aj, A − Aj, −A − Aj, A − Aj, A − Aj, A − Aj, A + Aj, A − Aj, A − Aj, −A + Aj, A − Aj, −A + Aj, A + Aj, A − Aj, −A + Aj, −A − Aj, −A + Aj, −A − Aj, −A − Aj, −A + Aj, −A − Aj, A − Aj, A + Aj, −A + Aj, −A + Aj, −A − Aj, A − Aj, −A + Aj, A + Aj, −A − Aj, A + Aj, −A + Aj, A − Aj, A + Aj, A + Aj, −A + Aj, A + Aj, −A − Aj, −A + Aj, A + Aj, A + Aj, −A − Aj, −A − Aj, A − Aj, A + Aj, A + Aj, A + Aj |
| 6 | Polarization 1 | A − Aj, −A + Aj, −A + Aj, −A + Aj, −A − Aj, A + Aj, −A + Aj, A + Aj, A + Aj, A + Aj, A − Aj, A + Aj, A + Aj, −A − Aj, A + Aj, −A − Aj, A − Aj, A + Aj, −A − Aj, −A + Aj, −A − Aj, −A + Aj, −A + Aj, −A − Aj, −A + Aj, A + Aj, A − Aj, −A − Aj, −A − Aj, −A + Aj, A + Aj, −A − Aj, A − Aj, −A + Aj, A − Aj, −A − Aj, A + Aj, A − Aj, A − Aj, −A − Aj, A − Aj, −A + Aj, −A − Aj, A − Aj, A − Aj, −A + Aj, −A + Aj, A + Aj, A − Aj, A − Aj, A − Aj |
| | Polarization 2 | −A − Aj, A + Aj, A + Aj, A + Aj, A − Aj, −A + Aj, A + Aj, −A + Aj, −A + Aj, −A + Aj, −A − Aj, −A + Aj, −A + Aj, A − Aj, −A + Aj, A − Aj, −A − Aj, −A + Aj, A − Aj, A + Aj, A − Aj, A + Aj, A + Aj, A − Aj, A + Aj, −A + Aj, −A − Aj, A − Aj, A − Aj, A + Aj, −A + Aj, A − Aj, −A − Aj, A + Aj, −A − Aj, A − Aj, −A + Aj, −A − Aj, −A − Aj, A − Aj, −A − Aj, A + Aj, A − Aj, −A − Aj, −A − Aj, A + Aj, A + Aj, −A + Aj, −A − Aj, −A − Aj, −A − Aj |
| 7 | Polarization 1 | −A + Aj, −A + Aj, A + Aj, −A − Aj, A + Aj, −A + Aj, A + Aj, −A + Aj, A + Aj, A + Aj, A − Aj, A + Aj, −A + Aj, A − Aj, −A + Aj, −A + Aj, A − Aj, −A − Aj, −A + Aj, −A − Aj, −A + Aj, A + Aj, A − Aj, −A − Aj, −A − Aj, −A − Aj, A + Aj, A − Aj, −A − Aj, A − Aj, −A + Aj, A + Aj, −A + Aj, −A + Aj, A − Aj, A − Aj, −A − Aj, −A − Aj, A − Aj, A − Aj, A − Aj, A + Aj, A + Aj, −A + Aj, −A − Aj, A − Aj, −A − Aj, −A + Aj, A − Aj, −A − Aj, A + Aj |
| | Polarization 2 | −A − Aj, A − Aj, −A + Aj, A − Aj, −A − Aj, A − Aj, −A − Aj, A − Aj, A − Aj, A + Aj, A − Aj, −A − Aj, A + Aj, −A − Aj, −A − Aj, A + Aj, −A + Aj, −A − Aj, −A + Aj, −A − Aj, A − Aj, A + Aj, −A + Aj, −A + Aj, −A + Aj, A − Aj, A + Aj, −A + Aj, A + Aj, −A − Aj, A − Aj, −A − Aj, −A − Aj, A + Aj, A + Aj, −A + Aj, −A + Aj, A + Aj, A + Aj, A + Aj, A − Aj, A − Aj, −A − Aj, −A + Aj, A + Aj, −A + Aj, −A − Aj, A + Aj, −A + Aj, A − Aj, −A − Aj |
| 8 | Polarization 1 | −A + Aj, −A + Aj, A + Aj, −A − Aj, A + Aj, −A + Aj, A + Aj, −A + Aj, A + Aj, A + Aj, A − Aj, A + Aj, −A + Aj, A − Aj, −A + Aj, −A + Aj, A − Aj, −A − Aj, −A + Aj, −A − Aj, −A + Aj, A + Aj, A − Aj, −A − Aj, −A − Aj, −A − Aj, A + Aj, A − Aj, −A − Aj, A − Aj, −A + Aj, A + Aj, −A + Aj, −A + Aj, A − Aj, A − Aj, −A − Aj, −A − Aj, A − Aj, A − Aj, A − Aj, A + Aj, A + Aj, −A + Aj, −A − Aj, A − Aj, −A − Aj, −A + Aj, A − Aj, −A − Aj, A + Aj |
| | Polarization 2 | A + Aj, −A + Aj, A − Aj, −A + Aj, A + Aj, −A + Aj, A + Aj, −A + Aj, −A + Aj, −A − Aj, −A + Aj, A + Aj, −A − Aj, A + Aj, A + Aj, −A − Aj, A − Aj, A + Aj, A − Aj, A + Aj, −A + Aj, −A − Aj, A − Aj, A − Aj, A − Aj, −A + Aj, −A − Aj, A − Aj, −A − Aj, A + Aj, −A + Aj, A + Aj, A + Aj, −A − Aj, −A − Aj, A − Aj, A − Aj, −A − Aj, −A − Aj, −A − Aj, −A + Aj, −A + Aj, A + Aj, A − Aj, −A − Aj, A − Aj, A + Aj, −A − Aj, A − Aj, −A + Aj, A + Aj |
| 9 | Polarization 1 | −A + Aj, −A + Aj, A + Aj, −A − Aj, A + Aj, −A + Aj, A + Aj, −A + Aj, A + Aj, A + Aj, A − Aj, A + Aj, −A + Aj, A − Aj, −A + Aj, −A + Aj, A − Aj, −A − Aj, −A + Aj, −A − Aj, −A + Aj, A + Aj, A − Aj, −A − Aj, −A − Aj, −A − Aj, A + Aj, A − Aj, −A − Aj, A − Aj, −A + Aj, A + Aj, −A + Aj, −A + Aj, A − Aj, A − Aj, −A − Aj, −A − Aj, A − Aj, A − Aj, A − Aj, A + Aj, A + Aj, −A + Aj, −A − Aj, A − Aj, −A − Aj, −A + Aj, A − Aj, −A − Aj, A + Aj |
| | Polarization 2 | A + Aj, A + Aj, −A + Aj, A − Aj, −A + Aj, A + Aj, −A + Aj, A + Aj, −A + Aj, −A + Aj, −A − Aj, −A + Aj, A + Aj, −A − Aj, A + Aj, A + Aj, −A − Aj, A − Aj, A + Aj, A − Aj, A + Aj, −A + Aj, −A − Aj, A − Aj, A − Aj, A − Aj, −A + Aj, −A − Aj, A − Aj, −A − Aj, A + Aj, −A + Aj, A + Aj, A + Aj, −A − Aj, −A + Aj, A − Aj, A − Aj, −A − Aj, −A − Aj, −A − Aj, −A + Aj, −A + Aj, A + Aj, A − Aj, −A − Aj, A − Aj, A + Aj, −A − Aj, A − Aj, −A + Aj |
| 10 | Polarization 1 | −A + Aj, A + Aj, −A − Aj, A + Aj, −A + Aj, A + Aj, −A + Aj, A + Aj, A + Aj, A − Aj, A + Aj, −A + Aj, A − Aj, −A + Aj, −A + Aj, A − Aj, −A − Aj, −A + Aj, −A − Aj, −A + Aj, A + Aj, A − Aj, −A − Aj, −A − Aj, −A − Aj, A + Aj, A − Aj, −A − Aj, A − Aj, −A + Aj, A + Aj, −A + Aj, −A + Aj, A − Aj, A − Aj, −A − Aj, |

TABLE 22-continued

| Index | Polarization | Pilot sequence |
|---|---|---|
| | | −A − Aj, A − Aj, A − Aj, A − Aj, A + Aj, A + Aj, −A + Aj, −A − Aj, A − Aj, −A − Aj, −A + Aj, A − Aj, −A − Aj, A + Aj, −A + Aj |
| | Polarization 2 | −A − Aj, −A − Aj, A − Aj, −A + Aj, A − Aj, −A − Aj, A − Aj, −A − Aj, A − Aj, A − Aj, A + Aj, A − Aj, −A − Aj, A + Aj, −A − Aj, −A − Aj, A + Aj, −A + Aj, −A − Aj, −A + Aj, −A − Aj, A − Aj, A + Aj, −A + Aj, −A + Aj, −A + Aj, A − Aj, A + Aj, −A + Aj, A + Aj, −A − Aj, A − Aj, −A − Aj, −A − Aj, A + Aj, A + Aj, −A + Aj, −A + Aj, A + Aj, A + Aj, A + Aj, A − Aj, A − Aj, −A − Aj, −A + Aj, A + Aj, −A + Aj, −A − Aj, A + Aj, −A + Aj, A − Aj |
| 11 | Polarization 1 | −A + Aj, A + Aj, −A − Aj, A + Aj, −A + Aj, A + Aj, −A + Aj, A + Aj, A + Aj, A − Aj, A + Aj, −A + Aj, A − Aj, −A + Aj, −A + Aj, A − Aj, −A − Aj, −A + Aj, −A − Aj, −A + Aj, A + Aj, A − Aj, −A − Aj, −A − Aj, −A − Aj, A + Aj, A − Aj, −A − Aj, A − Aj, −A + Aj, A + Aj, −A + Aj, −A + Aj, A − Aj, A − Aj, −A − Aj, −A − Aj, A − Aj, A − Aj, A − Aj, A + Aj, A + Aj, −A + Aj, −A − Aj, A − Aj, −A − Aj, −A + Aj, A − Aj, −A − Aj, A + Aj, −A + Aj |
| | Polarization 2 | A + Aj, −A + Aj, A − Aj, −A + Aj, A + Aj, −A + Aj, A + Aj, −A + Aj, −A + Aj, −A − Aj, −A + Aj, A + Aj, −A − Aj, A + Aj, A + Aj, −A − Aj, A − Aj, A + Aj, A − Aj, A + Aj, −A + Aj, −A − Aj, A − Aj, A − Aj, A − Aj, −A + Aj, −A − Aj, A − Aj, −A − Aj, A + Aj, −A + Aj, A + Aj, A + Aj, −A − Aj, −A − Aj, A − Aj, A − Aj, −A − Aj, −A − Aj, −A − Aj, −A + Aj, −A + Aj, A + Aj, A − Aj, −A − Aj, A − Aj, A + Aj, −A − Aj, A − Aj, −A + Aj, A + Aj |
| 12 | Polarization 1 | −A + Aj, A + Aj, −A − Aj, A + Aj, −A + Aj, A + Aj, −A + Aj, A + Aj, A + Aj, A − Aj, A + Aj, −A + Aj, A − Aj, −A + Aj, −A + Aj, A − Aj, −A − Aj, −A + Aj, −A − Aj, −A + Aj, A + Aj, A − Aj, −A − Aj, −A − Aj, −A − Aj, A + Aj, A − Aj, −A − Aj, A − Aj, −A + Aj, A + Aj, −A + Aj, −A + Aj, A − Aj, A − Aj, −A − Aj, −A − Aj, A − Aj, A − Aj, A − Aj, A + Aj, A + Aj, −A + Aj, −A − Aj, A − Aj, −A − Aj, −A + Aj, A − Aj, −A − Aj, A + Aj, −A + Aj |
| | Polarization 2 | A + Aj, A + Aj, −A + Aj, A − Aj, −A + Aj, A + Aj, −A + Aj, A + Aj, −A + Aj, −A + Aj, −A − Aj, −A + Aj, A + Aj, −A − Aj, A + Aj, A + Aj, −A − Aj, A − Aj, A + Aj, A − Aj, A + Aj, −A + Aj, −A − Aj, A − Aj, A − Aj, A − Aj, −A + Aj, −A − Aj, A − Aj, −A − Aj, A + Aj, −A + Aj, A + Aj, A + Aj, −A − Aj, −A − Aj, A − Aj, A − Aj, −A − Aj, −A − Aj, −A − Aj, −A + Aj, −A + Aj, A + Aj, A − Aj, −A − Aj, A − Aj, A + Aj, −A − Aj, A − Aj, −A + Aj |
| 13 | Polarization 1 | A − Aj, −A − Aj, A + Aj, −A − Aj, A − Aj, −A − Aj, A − Aj, −A − Aj, −A − Aj, −A + Aj, −A − Aj, A − Aj, −A + Aj, A − Aj, A − Aj, −A + Aj, A + Aj, A − Aj, A + Aj, A − Aj, −A − Aj, −A + Aj, A + Aj, A + Aj, A + Aj, −A − Aj, −A + Aj, A + Aj, −A + Aj, A − Aj, −A − Aj, A − Aj, A − Aj, −A + Aj, −A + Aj, A + Aj, A + Aj, −A + Aj, −A + Aj, −A + Aj, −A − Aj, −A − Aj, A − Aj, A + Aj, −A + Aj, A + Aj, A − Aj, −A + Aj, A + Aj, −A − Aj, A − Aj |
| | Polarization 2 | −A − Aj, −A − Aj, A − Aj, −A + Aj, A − Aj, −A − Aj, A − Aj, −A − Aj, A − Aj, A − Aj, A + Aj, A − Aj, −A − Aj, A + Aj, −A − Aj, −A − Aj, A + Aj, −A + Aj, −A − Aj, −A + Aj, −A − Aj, A − Aj, A + Aj, −A + Aj, −A + Aj, −A + Aj, A − Aj, A + Aj, −A + Aj, A + Aj, −A − Aj, A − Aj, −A − Aj, −A − Aj, A + Aj, A + Aj, −A + Aj, −A + Aj, A + Aj, A + Aj, A + Aj, A − Aj, A − Aj, −A − Aj, −A + Aj, A + Aj, −A + Aj, −A − Aj, A + Aj, −A + Aj, A − Aj |
| 14 | Polarization 1 | A − Aj, −A − Aj, A + Aj, −A − Aj, A − Aj, −A − Aj, A − Aj, −A − Aj, −A − Aj, −A + Aj, −A − Aj, A − Aj, −A + Aj, A − Aj, A − Aj, −A + Aj, A + Aj, A − Aj, A + Aj, A − Aj, −A − Aj, −A + Aj, A + Aj, A + Aj, A + Aj, −A − Aj, −A + Aj, A + Aj, −A + Aj, A − Aj, −A − Aj, A − Aj, A − Aj, −A + Aj, −A + Aj, A + Aj, A + Aj, −A + Aj, −A + Aj, −A + Aj, −A − Aj, −A − Aj, A − Aj, A + Aj, −A + Aj, A + Aj, A − Aj, −A + Aj, A + Aj, −A − Aj, A − Aj |
| | Polarization 2 | −A − Aj, A − Aj, −A + Aj, A − Aj, −A − Aj, A − Aj, −A − Aj, A − Aj, A − Aj, A + Aj, A − Aj, −A − Aj, A + Aj, −A − Aj, −A − Aj, A + Aj, −A + Aj, −A − Aj, −A + Aj, −A − Aj, A − Aj, A + Aj, −A + Aj, −A + Aj, −A + Aj, A − Aj, A + Aj, −A + Aj, A + Aj, −A − Aj, A − Aj, −A − Aj, −A − Aj, A + Aj, A + Aj, −A + Aj, −A + Aj, A + Aj, A + Aj, A + Aj, A − Aj, A − Aj, −A − Aj, −A + Aj, A + Aj, −A + Aj, −A − Aj, A + Aj, −A + Aj, A − Aj, −A − Aj |
| 15 | Polarization 1 | A − Aj, −A − Aj, A + Aj, −A − Aj, A − Aj, −A − Aj, A − Aj, −A − Aj, −A − Aj, −A + Aj, −A − Aj, A − Aj, −A + Aj, A − Aj, A − Aj, −A + Aj, A + Aj, A − Aj, A + Aj, A − Aj, −A − Aj, −A + Aj, A + Aj, A + Aj, A + Aj, −A − Aj, −A + Aj, A + Aj, −A + Aj, A − Aj, −A − Aj, A − Aj, A − Aj, −A + Aj, −A + Aj, A + Aj, A + Aj, −A + Aj, −A + Aj, −A + Aj, −A − Aj, −A − Aj, A − Aj, A + Aj, −A + Aj, A + Aj, A − Aj, −A + Aj, A + Aj, −A − Aj, A − Aj |
| | Polarization 2 | A + Aj, A + Aj, −A + Aj, A − Aj, −A + Aj, A + Aj, −A + Aj, A + Aj, −A + Aj, −A + Aj, −A − Aj, −A + Aj, A + Aj, −A − Aj, A + Aj, A + Aj, −A − Aj, A − Aj, A + Aj, A − Aj, A + Aj, −A + Aj, −A − Aj, A − Aj, A − Aj, A − Aj, −A + Aj, −A − Aj, A − Aj, −A − Aj, A + Aj, −A + Aj, A + Aj, A + Aj, −A − Aj, −A − Aj, A − Aj, A − Aj, −A − Aj, −A − Aj, −A − Aj, −A + Aj, −A + Aj, A + Aj, A − Aj, −A − Aj, A − Aj, A + Aj, −A − Aj, A − Aj, −A + Aj |
| 16 | Polarization 1 | A − Aj, A − Aj, −A − Aj, A + Aj, −A − Aj, A − Aj, −A − Aj, A − Aj, −A − Aj, −A − Aj, −A + Aj, −A − Aj, A − Aj, −A + Aj, A − Aj, A − Aj, −A + Aj, A + Aj, A − Aj, A + Aj, A − Aj, −A − Aj, −A + Aj, A + Aj, A + Aj, A + Aj, −A − Aj, −A + Aj, A + Aj, −A + Aj, A − Aj, −A − Aj, A − Aj, A − Aj, −A + Aj, −A + Aj, A + Aj, A + Aj, −A + Aj, −A + Aj, −A + Aj, −A − Aj, −A − Aj, A − Aj, A + Aj, −A + Aj, A + Aj, A − Aj, −A + Aj, A + Aj, −A − Aj |
| | Polarization 2 | −A − Aj, −A − Aj, A − Aj, −A + Aj, A − Aj, −A − Aj, A − Aj, −A − Aj, A − Aj, A − Aj, A + Aj, A − Aj, −A − Aj, A + Aj, −A − Aj, −A − Aj, A + Aj, −A + Aj, −A − Aj, −A + Aj, −A − Aj, A − Aj, A + Aj, −A + Aj, −A + Aj, −A + Aj, A − Aj, A + Aj, −A + Aj, A + Aj, −A − Aj, A − Aj, −A − Aj, −A − Aj, A + Aj, A + Aj, −A + Aj, −A + Aj, A + Aj, A + Aj, A + Aj, A − Aj, A − Aj, −A − Aj, −A + Aj, A + Aj, −A + Aj, −A − Aj, A + Aj, −A + Aj, A − Aj |
| 17 | Polarization 1 | A − Aj, A − Aj, −A − Aj, A + Aj, −A − Aj, A − Aj, −A − Aj, A − Aj, −A − Aj, −A − Aj, −A + Aj, −A − Aj, A − Aj, −A + Aj, A − Aj, A − Aj, −A + Aj, A + Aj, A − Aj, A + Aj, A − Aj, −A − Aj, −A + Aj, A + Aj, A + Aj, A + Aj, −A − Aj, −A + Aj, A + Aj, −A + Aj, A − Aj, −A − Aj, A − Aj, A − Aj, −A + Aj, −A + Aj, A + Aj, A + Aj, −A + Aj, −A + Aj, −A + Aj, −A − Aj, −A − Aj, A − Aj, A + Aj, −A + Aj, A + Aj, A − Aj, −A + Aj, A + Aj, −A − Aj |
| | Polarization 2 | −A − Aj, A − Aj, −A + Aj, A − Aj, −A − Aj, A − Aj, −A − Aj, A − Aj, A − Aj, A + Aj, A − Aj, −A − Aj, A + Aj, −A − Aj, −A − Aj, A + Aj, −A + Aj, −A − Aj, −A + Aj, −A − Aj, A − Aj, A + Aj, −A + Aj, −A + Aj, −A + Aj, A − Aj, A + Aj, −A + Aj, A + Aj, −A − Aj, A − Aj, −A − Aj, −A − Aj, A + Aj, A + Aj, −A + Aj, −A + Aj, A + Aj, A + Aj, A + Aj, A − Aj, A − Aj, −A − Aj, −A + Aj, A + Aj, −A + Aj, −A − Aj, A + Aj, −A + Aj, A − Aj, −A − Aj |

TABLE 22-continued

| Index | Polarization | Pilot sequence |
|---|---|---|
| 18 | Polarization 1 | A − Aj, A − Aj, −A − Aj, A + Aj, −A − Aj, A − Aj, −A − Aj, A − Aj, −A − Aj, −A − Aj, −A + Aj, −A − Aj, A − Aj, −A + Aj, A − Aj, A − Aj, −A + Aj, A + Aj, A − Aj, A + Aj, A − Aj, −A − Aj, −A + Aj, A + Aj, A + Aj, A + Aj, −A − Aj, −A + Aj, A + Aj, −A + Aj, A − Aj, −A − Aj, A − Aj, A − Aj, −A + Aj, −A + Aj, A + Aj, A + Aj, −A + Aj, −A + Aj, −A + Aj, −A − Aj, −A − Aj, A − Aj, A + Aj, −A + Aj, A + Aj, A − Aj, −A + Aj, A + Aj, −A − Aj |
| | Polarization 2 | A + Aj, −A + Aj, A − Aj, −A + Aj, A + Aj, −A + Aj, A + Aj, −A + Aj, −A + Aj, −A − Aj, −A + Aj, A + Aj, −A − Aj, A + Aj, A + Aj, −A − Aj, A − Aj, A + Aj, A − Aj, A + Aj, −A + Aj, −A − Aj, A − Aj, A − Aj, A − Aj, −A + Aj, −A − Aj, A − Aj, −A − Aj, A + Aj, −A + Aj, A + Aj, A + Aj, −A − Aj, −A − Aj, A − Aj, A − Aj, −A − Aj, −A − Aj, −A − Aj, −A + Aj, −A + Aj, A + Aj, A − Aj, −A − Aj, A − Aj, A + Aj, −A − Aj, A − Aj, −A + Aj, A + Aj |
| 19 | Polarization 1 | −A + Aj, −A − Aj, A + Aj, A − Aj, −A + Aj, A + Aj, A − Aj, A + Aj, −A + Aj, −A − Aj, −A − Aj, A − Aj, A − Aj, A − Aj, A + Aj, A + Aj, A − Aj, A − Aj, −A + Aj, −A + Aj, −A − Aj, −A + Aj, A − Aj, A + Aj, A − Aj, −A − Aj, A + Aj, A + Aj, A + Aj, A − Aj, −A − Aj, −A + Aj, A + Aj, −A + Aj, A + Aj, A − Aj, −A + Aj, −A + Aj, A − Aj, −A + Aj, −A − Aj, A − Aj, −A − Aj, −A − Aj, −A + Aj, −A − Aj, −A + Aj, −A − Aj, A + Aj, −A − Aj, −A + Aj |
| | Polarization 2 | −A − Aj, −A + Aj, A − Aj, A + Aj, −A − Aj, A − Aj, A + Aj, A − Aj, −A − Aj, −A + Aj, −A + Aj, A + Aj, A + Aj, A + Aj, A − Aj, A − Aj, A + Aj, A + Aj, −A − Aj, −A − Aj, −A + Aj, −A − Aj, A + Aj, A − Aj, A + Aj, −A + Aj, A − Aj, A − Aj, A − Aj, A + Aj, −A + Aj, −A − Aj, A − Aj, −A − Aj, A − Aj, A + Aj, −A − Aj, −A − Aj, A + Aj, −A − Aj, −A + Aj, A + Aj, −A + Aj, −A + Aj, −A − Aj, −A + Aj, −A − Aj, −A + Aj, A − Aj, −A + Aj, −A − Aj |
| 20 | Polarization 1 | −A + Aj, −A − Aj, A + Aj, A − Aj, −A + Aj, A + Aj, A − Aj, A + Aj, −A + Aj, −A − Aj, −A − Aj, A − Aj, A − Aj, A − Aj, A + Aj, A + Aj, A − Aj, A − Aj, −A + Aj, −A + Aj, −A − Aj, −A + Aj, A − Aj, A + Aj, A − Aj, −A − Aj, A + Aj, A + Aj, A + Aj, A − Aj, −A − Aj, −A + Aj, A + Aj, −A + Aj, A + Aj, A − Aj, −A + Aj, −A + Aj, A − Aj, −A + Aj, −A − Aj, A − Aj, −A − Aj, −A − Aj, −A + Aj, −A − Aj, −A + Aj, −A − Aj, A + Aj, −A − Aj, −A + Aj |
| | Polarization 2 | A + Aj, A − Aj, −A + Aj, −A − Aj, A + Aj, −A + Aj, −A − Aj, −A + Aj, A + Aj, A − Aj, A − Aj, −A − Aj, −A − Aj, −A − Aj, −A + Aj, −A + Aj, −A − Aj, −A − Aj, A + Aj, A + Aj, A − Aj, A + Aj, −A − Aj, −A + Aj, −A − Aj, A − Aj, −A + Aj, −A + Aj, −A + Aj, −A − Aj, A − Aj, A + Aj, −A + Aj, A + Aj, −A + Aj, −A − Aj, A + Aj, A + Aj, −A − Aj, A + Aj, A − Aj, −A − Aj, A − Aj, A − Aj, A + Aj, A − Aj, A + Aj, A − Aj, −A + Aj, A − Aj, A + Aj |
| 21 | Polarization 1 | −A + Aj, −A − Aj, A + Aj, A − Aj, −A + Aj, A + Aj, A − Aj, A + Aj, −A + Aj, −A − Aj, −A − Aj, A − Aj, A − Aj, A − Aj, A + Aj, A + Aj, A − Aj, A − Aj, −A + Aj, −A + Aj, −A − Aj, −A + Aj, A − Aj, A + Aj, A − Aj, −A − Aj, A + Aj, A + Aj, A + Aj, A − Aj, −A − Aj, −A + Aj, A + Aj, −A + Aj, A + Aj, A − Aj, −A + Aj, −A + Aj, A − Aj, −A + Aj, −A − Aj, A − Aj, −A − Aj, −A − Aj, −A + Aj, −A − Aj, −A + Aj, −A − Aj, A + Aj, −A − Aj, −A + Aj |
| | Polarization 2 | A + Aj, A + Aj, A − Aj, −A + Aj, −A − Aj, A + Aj, −A + Aj, −A − Aj, −A + Aj, A + Aj, A − Aj, A − Aj, −A − Aj, −A − Aj, −A − Aj, −A + Aj, −A + Aj, −A − Aj, −A − Aj, A + Aj, A + Aj, A − Aj, A + Aj, −A − Aj, −A + Aj, −A − Aj, A − Aj, −A + Aj, −A + Aj, −A + Aj, −A − Aj, A − Aj, A + Aj, −A + Aj, A + Aj, −A + Aj, −A − Aj, A + Aj, A + Aj, −A − Aj, A + Aj, A − Aj, −A − Aj, A − Aj, A − Aj, A + Aj, A − Aj, A + Aj, A − Aj, −A + Aj, A − Aj |
| 22 | Polarization 1 | −A + Aj, −A + Aj, −A − Aj, A + Aj, A − Aj, −A + Aj, A + Aj, A − Aj, A + Aj, −A + Aj, −A − Aj, −A − Aj, A − Aj, A − Aj, A − Aj, A + Aj, A + Aj, A − Aj, A − Aj, −A + Aj, −A + Aj, −A − Aj, −A + Aj, A − Aj, A + Aj, A − Aj, −A − Aj, A + Aj, A + Aj, A + Aj, A − Aj, −A − Aj, −A + Aj, A + Aj, −A + Aj, A + Aj, A − Aj, −A + Aj, −A + Aj, A − Aj, −A + Aj, −A − Aj, A − Aj, −A − Aj, −A − Aj, −A + Aj, −A − Aj, −A + Aj, −A − Aj, A + Aj, −A − Aj |
| | Polarization 2 | −A − Aj, −A − Aj, −A + Aj, A − Aj, A + Aj, −A − Aj, A − Aj, A + Aj, A − Aj, −A − Aj, −A + Aj, −A + Aj, A + Aj, A + Aj, A + Aj, A − Aj, A − Aj, A + Aj, A + Aj, −A − Aj, −A − Aj, −A + Aj, −A − Aj, A + Aj, A − Aj, A + Aj, −A + Aj, A − Aj, A − Aj, A − Aj, A + Aj, −A + Aj, −A − Aj, A − Aj, −A − Aj, A − Aj, A + Aj, −A − Aj, −A − Aj, A + Aj, −A − Aj, −A + Aj, A + Aj, −A + Aj, −A + Aj, −A − Aj, −A + Aj, −A − Aj, −A + Aj, A − Aj, −A + Aj |
| 23 | Polarization 1 | −A + Aj, −A + Aj, −A − Aj, A + Aj, A − Aj, −A + Aj, A + Aj, A − Aj, A + Aj, −A + Aj, −A − Aj, −A − Aj, A − Aj, A − Aj, A − Aj, A + Aj, A + Aj, A − Aj, A − Aj, −A + Aj, −A + Aj, −A − Aj, −A + Aj, A − Aj, A + Aj, A − Aj, −A − Aj, A + Aj, A + Aj, A + Aj, A − Aj, −A − Aj, −A + Aj, A + Aj, −A + Aj, A + Aj, A − Aj, −A + Aj, −A + Aj, A − Aj, −A + Aj, −A − Aj, A − Aj, −A − Aj, −A − Aj, −A + Aj, −A − Aj, −A + Aj, −A − Aj, A + Aj, −A − Aj |
| | Polarization 2 | A + Aj, A − Aj, −A + Aj, −A − Aj, A + Aj, −A + Aj, −A − Aj, −A + Aj, A + Aj, A − Aj, A − Aj, −A − Aj, −A − Aj, −A − Aj, −A + Aj, −A + Aj, −A − Aj, −A − Aj, A + Aj, A + Aj, A − Aj, A + Aj, −A − Aj, −A + Aj, −A − Aj, A − Aj, −A + Aj, −A + Aj, −A + Aj, −A − Aj, A − Aj, A + Aj, −A + Aj, A + Aj, −A + Aj, −A − Aj, A + Aj, A + Aj, −A − Aj, A + Aj, A − Aj, −A − Aj, A − Aj, A − Aj, A + Aj, A − Aj, A + Aj, A − Aj, −A + Aj, A − Aj, A + Aj |
| 24 | Polarization 1 | −A + Aj, −A + Aj, −A − Aj, A + Aj, A − Aj, −A + Aj, A + Aj, A − Aj, A + Aj, −A + Aj, −A − Aj, −A − Aj, A − Aj, A − Aj, A − Aj, A + Aj, A + Aj, A − Aj, A − Aj, −A + Aj, −A + Aj, −A − Aj, −A + Aj, A − Aj, A + Aj, A − Aj, −A − Aj, A + Aj, A + Aj, A + Aj, A − Aj, −A − Aj, −A + Aj, A + Aj, −A + Aj, A + Aj, A − Aj, −A + Aj, −A + Aj, A − Aj, −A + Aj, −A − Aj, A − Aj, −A − Aj, −A − Aj, −A + Aj, −A − Aj, −A + Aj, −A − Aj, A + Aj, −A − Aj |
| | Polarization 2 | A + Aj, A + Aj, A − Aj, −A + Aj, −A − Aj, A + Aj, −A + Aj, −A − Aj, −A + Aj, A + Aj, A − Aj, A − Aj, −A − Aj, −A − Aj, −A − Aj, −A + Aj, −A + Aj, −A − Aj, −A − Aj, A + Aj, A + Aj, A − Aj, A + Aj, −A − Aj, −A + Aj, −A − Aj, A − Aj, −A + Aj, −A + Aj, −A + Aj, −A − Aj, A − Aj, A + Aj, −A + Aj, A + Aj, −A + Aj, −A − Aj, A + Aj, A + Aj, −A − Aj, A + Aj, A − Aj, −A − Aj, A − Aj, A − Aj, A + Aj, A − Aj, A + Aj, A − Aj, −A + Aj, A − Aj |
| 25 | Polarization 1 | A − Aj, A − Aj, A + Aj, −A − Aj, −A + Aj, A − Aj, −A − Aj, −A + Aj, −A − Aj, A − Aj, A + Aj, A + Aj, −A + Aj, −A + Aj, −A + Aj, −A − Aj, −A − Aj, −A + Aj, −A + Aj, A − Aj, A − Aj, A + Aj, A − Aj, −A + Aj, −A − Aj, −A + Aj, A + Aj, −A − Aj, −A − Aj, −A − Aj, −A + Aj, A + Aj, A − Aj, −A − Aj, A − Aj, −A − Aj, −A + Aj, A − Aj, A − Aj, −A + Aj, A − Aj, A + Aj, −A + Aj, A + Aj, A + Aj, A − Aj, A + Aj, A − Aj, A + Aj, −A − Aj, A + Aj |

TABLE 22-continued

| Index | Polarization | Pilot sequence |
|---|---|---|
| | Polarization 2 | –A – Aj, –A – Aj, –A + Aj, A – Aj, A + Aj, –A – Aj, A – Aj, A + Aj, A – Aj, –A – Aj, –A + Aj, –A + Aj, A + Aj, A + Aj, A + Aj, A – Aj, A – Aj, A + Aj, A + Aj, –A – Aj, –A – Aj, –A + Aj, –A – Aj, A + Aj, A – Aj, A + Aj, –A + Aj, A – Aj, A – Aj, A – Aj, A + Aj, –A + Aj, –A – Aj, A – Aj, –A – Aj, A – Aj, A + Aj, –A – Aj, –A – Aj, A + Aj, –A – Aj, –A + Aj, A + Aj, –A + Aj, –A + Aj, –A – Aj, –A + Aj, –A – Aj, –A + Aj, A – Aj, –A + Aj |
| 26 | Polarization 1 | A – Aj, A – Aj, A + Aj, –A – Aj, –A + Aj, A – Aj, –A – Aj, –A + Aj, –A – Aj, A – Aj, A + Aj, A + Aj, –A + Aj, –A + Aj, –A + Aj, –A – Aj, –A – Aj, –A + Aj, –A + Aj, A – Aj, A – Aj, A + Aj, A – Aj, –A + Aj, –A – Aj, –A + Aj, A + Aj, –A – Aj, –A – Aj, –A – Aj, –A + Aj, A + Aj, A – Aj, –A – Aj, A – Aj, –A – Aj, –A + Aj, A – Aj, A – Aj, –A + Aj, A – Aj, A + Aj, –A + Aj, A + Aj, A + Aj, A – Aj, A + Aj, A – Aj, A + Aj, –A – Aj, A + Aj |
| | Polarization 2 | –A – Aj, –A + Aj, A – Aj, A + Aj, –A – Aj, A – Aj, A + Aj, A – Aj, –A – Aj, –A + Aj, –A + Aj, A + Aj, A + Aj, A + Aj, A – Aj, A – Aj, A + Aj, A + Aj, –A – Aj, –A – Aj, –A + Aj, –A – Aj, A + Aj, A – Aj, A + Aj, –A + Aj, A – Aj, A – Aj, A – Aj, A + Aj, –A + Aj, –A – Aj, A – Aj, –A – Aj, A – Aj, A + Aj, –A – Aj, –A – Aj, A + Aj, –A – Aj, –A + Aj, A + Aj, –A + Aj, –A + Aj, –A – Aj, –A + Aj, –A – Aj, –A + Aj, A – Aj, –A + Aj, –A – Aj |
| 27 | Polarization 1 | A – Aj, A – Aj, A + Aj, –A – Aj, –A + Aj, A – Aj, –A – Aj, –A + Aj, –A – Aj, A – Aj, A + Aj, A + Aj, –A + Aj, –A + Aj, –A + Aj, –A – Aj, –A – Aj, –A + Aj, –A + Aj, A – Aj, A – Aj, A + Aj, A – Aj, –A + Aj, –A – Aj, –A + Aj, A + Aj, –A – Aj, –A – Aj, –A – Aj, –A + Aj, A + Aj, A – Aj, –A – Aj, A – Aj, –A – Aj, –A + Aj, A – Aj, A – Aj, –A + Aj, A – Aj, A + Aj, –A + Aj, A + Aj, A + Aj, A – Aj, A + Aj, A – Aj, A + Aj, –A – Aj, A + Aj |
| | Polarization 2 | A + Aj, A + Aj, A – Aj, –A + Aj, –A – Aj, A + Aj, –A + Aj, –A – Aj, –A + Aj, A + Aj, A – Aj, A – Aj, –A – Aj, –A – Aj, –A – Aj, –A + Aj, –A + Aj, –A – Aj, –A – Aj, A + Aj, A + Aj, A – Aj, A + Aj, –A – Aj, –A + Aj, –A – Aj, A – Aj, –A + Aj, –A + Aj, –A + Aj, –A – Aj, A – Aj, A + Aj, –A + Aj, A + Aj, –A + Aj, –A – Aj, A + Aj, A + Aj, –A – Aj, A + Aj, A – Aj, –A – Aj, A – Aj, A – Aj, A + Aj, A – Aj, A + Aj, A – Aj, –A + Aj, A – Aj |
| 28 | Polarization 1 | A – Aj, A + Aj, –A – Aj, –A + Aj, A – Aj, –A – Aj, –A + Aj, –A – Aj, A – Aj, A + Aj, A + Aj, –A + Aj, –A + Aj, –A + Aj, –A – Aj, –A – Aj, –A + Aj, –A + Aj, A – Aj, A – Aj, A + Aj, A – Aj, –A + Aj, –A – Aj, –A + Aj, A + Aj, –A – Aj, –A – Aj, –A – Aj, –A + Aj, A + Aj, A – Aj, –A – Aj, A – Aj, –A – Aj, –A + Aj, A – Aj, A – Aj, –A + Aj, A – Aj, A + Aj, –A + Aj, A + Aj, A + Aj, A – Aj, A + Aj, A – Aj, A + Aj, –A – Aj, A + Aj, A – Aj |
| | Polarization 2 | –A – Aj, –A – Aj, –A + Aj, A – Aj, A + Aj, –A – Aj, A – Aj, A + Aj, A – Aj, –A – Aj, –A + Aj, –A + Aj, A + Aj, A + Aj, A + Aj, A – Aj, A – Aj, A + Aj, A + Aj, –A – Aj, –A – Aj, –A + Aj, –A – Aj, A + Aj, A – Aj, A + Aj, –A + Aj, A – Aj, A – Aj, A – Aj, A + Aj, –A + Aj, –A – Aj, A – Aj, –A – Aj, A – Aj, A + Aj, –A – Aj, –A – Aj, A + Aj, –A – Aj, –A + Aj, A + Aj, –A + Aj, –A + Aj, –A – Aj, –A + Aj, –A – Aj, –A + Aj, A – Aj, –A + Aj |
| 29 | Polarization 1 | A – Aj, A + Aj, –A – Aj, –A + Aj, A – Aj, –A – Aj, –A + Aj, –A – Aj, A – Aj, A + Aj, A + Aj, –A + Aj, –A + Aj, –A + Aj, –A – Aj, –A – Aj, –A + Aj, –A + Aj, A – Aj, A – Aj, A + Aj, A – Aj, –A + Aj, –A – Aj, –A + Aj, A + Aj, –A – Aj, –A – Aj, –A – Aj, –A + Aj, A + Aj, A – Aj, –A – Aj, A – Aj, –A – Aj, –A + Aj, A – Aj, A – Aj, –A + Aj, A – Aj, A + Aj, –A + Aj, A + Aj, A + Aj, A – Aj, A + Aj, A – Aj, A + Aj, –A – Aj, A + Aj, A – Aj |
| | Polarization 2 | –A – Aj, –A + Aj, A – Aj, A + Aj, –A – Aj, A – Aj, A + Aj, A – Aj, –A – Aj, –A + Aj, –A + Aj, A + Aj, A + Aj, A + Aj, A – Aj, A – Aj, A + Aj, A + Aj, –A – Aj, –A – Aj, –A + Aj, –A – Aj, A + Aj, A – Aj, A + Aj, –A + Aj, A – Aj, A – Aj, A – Aj, A + Aj, –A + Aj, –A – Aj, A – Aj, –A – Aj, A – Aj, A + Aj, –A – Aj, –A – Aj, A + Aj, –A – Aj, –A + Aj, A + Aj, –A + Aj, –A + Aj, –A – Aj, –A + Aj, –A – Aj, –A + Aj, A – Aj, –A + Aj, –A – Aj |
| 30 | Polarization 1 | A – Aj, A + Aj, –A – Aj, –A + Aj, A – Aj, –A – Aj, –A + Aj, –A – Aj, A – Aj, A + Aj, A + Aj, –A + Aj, –A + Aj, –A + Aj, –A – Aj, –A – Aj, –A + Aj, –A + Aj, A – Aj, A – Aj, A + Aj, A – Aj, –A + Aj, –A – Aj, –A + Aj, A + Aj, –A – Aj, –A – Aj, –A – Aj, –A + Aj, A + Aj, A – Aj, –A – Aj, A – Aj, –A – Aj, –A + Aj, A – Aj, A – Aj, –A + Aj, A – Aj, A + Aj, –A + Aj, A + Aj, A + Aj, A – Aj, A + Aj, A – Aj, A + Aj, –A – Aj, A + Aj, A – Aj |
| | Polarization 2 | A + Aj, A – Aj, –A + Aj, –A – Aj, A + Aj, –A + Aj, –A – Aj, –A + Aj, A + Aj, A – Aj, A – Aj, –A – Aj, –A – Aj, –A – Aj, –A + Aj, –A + Aj, –A – Aj, –A – Aj, A + Aj, A + Aj, A – Aj, A + Aj, –A – Aj, –A + Aj, –A – Aj, A – Aj, –A + Aj, –A + Aj, –A + Aj, –A – Aj, A – Aj, A + Aj, –A + Aj, A + Aj, –A + Aj, –A – Aj, A + Aj, A + Aj, –A – Aj, A + Aj, A – Aj, –A – Aj, A – Aj, A – Aj, A + Aj, A – Aj, A + Aj, A – Aj, –A + Aj, A – Aj, A + Aj |
| 31 | Polarization 1 | A + Aj, A + Aj, –A + Aj, A – Aj, –A – Aj, –A + Aj, A + Aj, A – Aj, A + Aj, A – Aj, –A + Aj, –A + Aj, A + Aj, A – Aj, A – Aj, A – Aj, A – Aj, –A + Aj, A – Aj, –A – Aj, –A + Aj, A – Aj, A + Aj, –A + Aj, –A – Aj, A – Aj, –A – Aj, –A + Aj, –A – Aj, –A + Aj, –A + Aj, A + Aj, A – Aj, –A – Aj, –A + Aj, A + Aj, –A – Aj, –A – Aj, A + Aj, –A – Aj, A + Aj, –A – Aj, A + Aj, A + Aj, –A + Aj, –A – Aj, A – Aj, –A + Aj, –A – Aj, A – Aj, A + Aj |
| | Polarization 2 | –A + Aj, –A – Aj, –A – Aj, –A + Aj, –A + Aj, A + Aj, A + Aj, –A + Aj, A + Aj, –A + Aj, A + Aj, –A + Aj, –A + Aj, A – Aj, –A – Aj, A + Aj, A – Aj, –A – Aj, A + Aj, –A + Aj, –A – Aj, A + Aj, A + Aj, –A – Aj, A + Aj, A + Aj, A – Aj, A – Aj, –A + Aj, A – Aj, –A + Aj, –A – Aj, –A – Aj, –A + Aj, A – Aj, –A + Aj, –A – Aj, A – Aj, A – Aj, A + Aj, –A – Aj, A – Aj, –A + Aj, A + Aj, A – Aj, A + Aj, –A – Aj, A – Aj, –A – Aj, A – Aj, –A – Aj |
| 32 | Polarization 1 | A + Aj, –A + Aj, –A – Aj, A – Aj, –A + Aj, –A – Aj, A – Aj, A + Aj, A + Aj, –A – Aj, A + Aj, –A – Aj, A + Aj, –A – Aj, –A – Aj, A + Aj, A – Aj, –A – Aj, –A + Aj, A + Aj, A – Aj, –A – Aj, A – Aj, –A – Aj, –A + Aj, –A – Aj, A – Aj, A + Aj, –A + Aj, A – Aj, –A – Aj, –A + Aj, A – Aj, –A + Aj, –A + Aj, –A + Aj, –A + Aj, A + Aj, A – Aj, A – Aj, –A + Aj, A + Aj, –A + Aj, A + Aj, A – Aj, –A – Aj, –A + Aj, A – Aj, A + Aj, A + Aj |
| | Polarization 2 | A – Aj, –A – Aj, –A + Aj, –A – Aj, –A + Aj, –A – Aj, A + Aj, –A + Aj, A + Aj, A – Aj, –A + Aj, –A – Aj, A + Aj, –A + Aj, –A + Aj, –A – Aj, A – Aj, –A + Aj, A – Aj, –A – Aj, –A – Aj, A – Aj, –A + Aj, A – Aj, –A + Aj, –A + Aj, A + Aj, A + Aj, –A – Aj, A + Aj, A + Aj, –A – Aj, A – Aj, A + Aj, –A – Aj, –A + Aj, A + Aj, –A – Aj, –A + Aj, A – Aj, A – Aj, A + Aj, A – Aj, A + Aj, A – Aj, A + Aj, A + Aj, A – Aj, A – Aj, –A – Aj, –A – Aj |
| 33 | Polarization 1 | A + Aj, –A + Aj, –A – Aj, A – Aj, –A + Aj, –A – Aj, A – Aj, A + Aj, A + Aj, –A – Aj, A + Aj, –A – Aj, A + Aj, –A – Aj, –A – Aj, A + Aj, A – Aj, –A – Aj, –A + Aj, A + Aj, A – Aj, A – Aj, –A – Aj, A – Aj, |

TABLE 22-continued

| Index | Polarization | Pilot sequence |
|---|---|---|
| | | −A − Aj, −A + Aj, −A − Aj, A − Aj, A + Aj, −A + Aj, A − Aj, −A − Aj, −A + Aj, A − Aj, −A + Aj, −A + Aj, −A + Aj, −A + Aj, A + Aj, A − Aj, A − Aj, −A + Aj, A + Aj, −A + Aj, A + Aj, A − Aj, −A − Aj, −A + Aj, A − Aj, A + Aj, A + Aj |
| | Polarization 2 | A + Aj, −A − Aj, −A − Aj, A − Aj, −A − Aj, A − Aj, −A + Aj, A − Aj, A + Aj, A + Aj, −A − Aj, A − Aj, −A + Aj, A − Aj, A − Aj, A − Aj, −A + Aj, −A − Aj, A + Aj, −A − Aj, −A − Aj, −A + Aj, −A − Aj, A + Aj, −A − Aj, A − Aj, A + Aj, A + Aj, A − Aj, −A + Aj, A + Aj, A − Aj, −A + Aj, −A + Aj, A − Aj, −A − Aj, A + Aj, A − Aj, −A − Aj, A + Aj, −A + Aj, −A + Aj, A + Aj, −A + Aj, A + Aj, −A + Aj, A + Aj, A + Aj, −A + Aj, −A − Aj, −A − Aj |

(16) When $N_{PS}$=61, if a remainder of $N_{TS}$ divided by 4 is 0, the pilot sequence is one item in the following Table 23-1. If a remainder of $N_{TS}$ divided by 4 is 2, the pilot sequence is one item in the following Table 23-1 or Table 23-2.

TABLE 23-1

| Index | Polarization | Pilot sequence |
|---|---|---|
| 1 | Polarization 1 | −A − Aj, A + Aj, −A + Aj, A + Aj, A − Aj, A − Aj, −A − Aj, A − Aj, −A + Aj, A + Aj, −A + Aj, A + Aj, −A + Aj, −A − Aj, A + Aj, A + Aj, A − Aj, −A − Aj, −A + Aj, −A − Aj, A − Aj, A + Aj, −A + Aj, −A + Aj, A + Aj, −A − Aj, A + Aj, A − Aj, −A + Aj, −A + Aj, A + Aj, A + Aj, −A + Aj, −A + Aj, −A − Aj, A − Aj, −A − Aj, A + Aj, A − Aj, A − Aj, A + Aj, −A − Aj, A − Aj, A − Aj, A − Aj, −A − Aj, −A + Aj, A + Aj, −A − Aj, −A − Aj, −A − Aj, A − Aj, −A − Aj, −A − Aj, −A − Aj, −A + Aj, A − Aj, A + Aj, −A + Aj, A − Aj, −A + Aj |
| | Polarization 2 | −A + Aj, A − Aj, −A − Aj, A − Aj, A + Aj, A + Aj, −A + Aj, A + Aj, −A − Aj, A − Aj, −A − Aj, A − Aj, −A − Aj, −A + Aj, A − Aj, A − Aj, A + Aj, −A + Aj, −A − Aj, −A + Aj, A + Aj, A − Aj, −A − Aj, −A − Aj, A − Aj, −A + Aj, A − Aj, A + Aj, −A − Aj, −A − Aj, A − Aj, A − Aj, −A − Aj, −A − Aj, −A + Aj, A + Aj, −A + Aj, A − Aj, A + Aj, A + Aj, A − Aj, −A + Aj, A + Aj, A + Aj, A + Aj, −A + Aj, −A − Aj, A − Aj, −A + Aj, −A + Aj, −A + Aj, A + Aj, −A + Aj, −A + Aj, −A + Aj, −A − Aj, A + Aj, A − Aj, −A − Aj, A + Aj, −A − Aj |
| 2 | Polarization 1 | −A − Aj, A + Aj, −A + Aj, A + Aj, A − Aj, A − Aj, −A − Aj, A − Aj, −A + Aj, A + Aj, −A + Aj, A + Aj, −A + Aj, −A − Aj, A + Aj, A + Aj, A − Aj, −A − Aj, −A + Aj, −A − Aj, A − Aj, A + Aj, −A + Aj, −A + Aj, A + Aj, −A − Aj, A + Aj, A − Aj, −A + Aj, −A + Aj, A + Aj, A + Aj, −A + Aj, −A + Aj, −A − Aj, A − Aj, −A − Aj, A + Aj, A − Aj, A − Aj, A + Aj, −A − Aj, A − Aj, A − Aj, A − Aj, −A − Aj, −A + Aj, A + Aj, −A − Aj, −A − Aj, −A − Aj, A − Aj, −A − Aj, −A − Aj, −A − Aj, −A + Aj, A − Aj, A + Aj, −A + Aj, A − Aj, −A + Aj |
| | Polarization 2 | A − Aj, −A + Aj, A + Aj, −A + Aj, −A − Aj, −A − Aj, A − Aj, −A − Aj, A + Aj, −A + Aj, A + Aj, −A + Aj, A + Aj, A − Aj, −A + Aj, −A + Aj, −A − Aj, A − Aj, A + Aj, A − Aj, −A − Aj, −A + Aj, A + Aj, A + Aj, −A + Aj, A − Aj, −A + Aj, −A − Aj, A + Aj, A + Aj, −A + Aj, −A + Aj, A + Aj, A + Aj, A − Aj, −A − Aj, A − Aj, −A + Aj, −A − Aj, −A − Aj, −A + Aj, A − Aj, −A − Aj, −A − Aj, −A − Aj, A − Aj, A + Aj, −A + Aj, A − Aj, A − Aj, A − Aj, −A − Aj, A − Aj, A − Aj, A − Aj, A + Aj, −A − Aj, −A + Aj, A + Aj, −A − Aj, A + Aj |
| 3 | Polarization 1 | −A + Aj, A − Aj, −A − Aj, A − Aj, A + Aj, A + Aj, −A + Aj, A + Aj, −A − Aj, A − Aj, −A − Aj, A − Aj, −A − Aj, −A + Aj, A − Aj, A − Aj, A + Aj, −A + Aj, −A − Aj, −A + Aj, A + Aj, A − Aj, −A − Aj, −A − Aj, A − Aj, −A + Aj, A − Aj, A + Aj, −A − Aj, −A − Aj, A − Aj, A − Aj, −A − Aj, −A − Aj, −A + Aj, A + Aj, −A + Aj, A − Aj, A + Aj, A + Aj, A − Aj, −A + Aj, A + Aj, A + Aj, A + Aj, −A + Aj, −A − Aj, A − Aj, −A + Aj, −A + Aj, −A + Aj, A + Aj, −A + Aj, −A + Aj, −A + Aj, −A − Aj, A + Aj, A − Aj, −A − Aj, A + Aj, −A − Aj |
| | Polarization 2 | A + Aj, −A − Aj, A − Aj, −A − Aj, −A + Aj, −A + Aj, A + Aj, −A + Aj, A − Aj, −A − Aj, A − Aj, −A − Aj, A − Aj, A + Aj, −A − Aj, −A − Aj, −A + Aj, A + Aj, A − Aj, A + Aj, −A + Aj, −A − Aj, A − Aj, A − Aj, −A − Aj, A + Aj, −A − Aj, −A + Aj, A − Aj, A − Aj, −A − Aj, −A − Aj, A − Aj, A − Aj, A + Aj, −A + Aj, A + Aj, −A − Aj, −A + Aj, −A + Aj, −A − Aj, A + Aj, −A + Aj, −A + Aj, −A + Aj, A + Aj, A − Aj, −A − Aj, A + Aj, A + Aj, A + Aj, −A + Aj, A + Aj, A + Aj, A + Aj, A − Aj, −A + Aj, −A − Aj, A − Aj, −A + Aj, A − Aj |
| 4 | Polarization 1 | A − Aj, −A + Aj, A + Aj, −A + Aj, −A − Aj, −A − Aj, A − Aj, −A − Aj, A + Aj, −A + Aj, A + Aj, −A + Aj, A + Aj, A − Aj, −A + Aj, −A + Aj, −A − Aj, A − Aj, A + Aj, A − Aj, −A − Aj, −A + Aj, A + Aj, A + Aj, −A + Aj, A − Aj, −A + Aj, −A − Aj, A + Aj, A + Aj, −A + Aj, −A + Aj, A + Aj, A + Aj, A − Aj, −A − Aj, A − Aj, −A + Aj, −A − Aj, −A − Aj, −A + Aj, A − Aj, −A − Aj, −A − Aj, −A − Aj, A − Aj, A + Aj, −A + Aj, A − Aj, A − Aj, A − Aj, −A − Aj, A − Aj, A − Aj, A − Aj, A + Aj, −A − Aj, −A + Aj, A + Aj, −A − Aj, A + Aj |
| | Polarization 2 | A + Aj, −A − Aj, A − Aj, −A − Aj, −A + Aj, −A + Aj, A + Aj, −A + Aj, A − Aj, −A − Aj, A − Aj, −A − Aj, A − Aj, A + Aj, −A − Aj, −A − Aj, −A + Aj, A + Aj, A − Aj, A + Aj, −A + Aj, −A − Aj, A − Aj, A − Aj, −A − Aj, A + Aj, −A − Aj, −A + Aj, A − Aj, A − Aj, −A − Aj, −A − Aj, A − Aj, A − Aj, A + Aj, −A + Aj, A + Aj, −A − Aj, −A + Aj, −A + Aj, −A − Aj, A + Aj, −A + Aj, −A + Aj, −A + Aj, A + Aj, A − Aj, −A − Aj, A + Aj, A + Aj, A + Aj, −A + Aj, A + Aj, A + Aj, A + Aj, A − Aj, −A + Aj, −A − Aj, A − Aj, −A + Aj, A − Aj |
| 5 | Polarization 1 | −A − Aj, −A − Aj, −A + Aj, −A − Aj, −A + Aj, −A − Aj, −A + Aj, A + Aj, −A − Aj, A − Aj, A − Aj, A + Aj, A + Aj, −A − Aj, A + Aj, −A + Aj, A + Aj, A − Aj, A + Aj, −A + Aj, −A − Aj, A − Aj, −A − Aj, −A + Aj, A − Aj, A + Aj, −A + Aj, A − Aj, −A + Aj, A + Aj, −A − Aj, A + Aj, −A − Aj, −A + Aj, −A − Aj, −A − Aj, −A + Aj, A − Aj, −A + Aj, A − Aj, −A + Aj, −A − Aj, A − Aj, A + Aj, A + Aj, A − Aj, −A − Aj, A − Aj, A − Aj, A + Aj, −A − Aj, −A + Aj, A − Aj, A + Aj, A − Aj, A + Aj, −A − Aj, −A + Aj, −A + Aj, A − Aj, A + Aj |
| | Polarization 2 | A − Aj, A − Aj, A + Aj, A − Aj, −A + Aj, −A − Aj, A + Aj, −A + Aj, −A + Aj, −A + Aj, −A − Aj, −A − Aj, −A + Aj, −A + Aj, −A − Aj, A + Aj, A + Aj, −A + Aj, A + Aj, −A − Aj, A + Aj, A + Aj, −A − Aj, −A + Aj, A − Aj, −A − Aj, A + Aj, A − Aj, A − Aj, −A − Aj, −A − Aj, −A + Aj, A + Aj, −A − Aj, −A + Aj, A + Aj, A − Aj, −A + Aj, −A + Aj, A − Aj, A − Aj, A + Aj, A + Aj, A + Aj, A − Aj, −A − Aj, −A + Aj, A + Aj, A − Aj, A − Aj, −A − Aj, A + Aj, −A − Aj, A − Aj, A − Aj, −A − Aj, A − Aj, −A + Aj, −A + Aj, −A − Aj, A − Aj |
| 6 | Polarization 1 | −A − Aj, −A − Aj, −A + Aj, −A − Aj, −A + Aj, −A − Aj, −A + Aj, A + Aj, −A − Aj, A − Aj, A − Aj, A + Aj, A + Aj, −A − Aj, A + Aj, −A + Aj, A + Aj, A − Aj, A + Aj, −A + Aj, −A − Aj, A − Aj, −A − Aj, −A + Aj, A − Aj, A + Aj, −A + Aj, A − Aj, −A + Aj, A + Aj, −A − Aj, A + Aj, −A − Aj, −A + Aj, −A − Aj, −A − Aj, −A + Aj, A − Aj, −A + Aj, A − Aj, −A + Aj, −A − Aj, A − Aj, A + Aj, A + Aj, A − Aj, −A − Aj, A − Aj, A − Aj, A + Aj, −A − Aj, −A + Aj, A − Aj, A + Aj, A − Aj, A + Aj, −A − Aj, −A + Aj, −A + Aj, A − Aj, A + Aj |

TABLE 23-1-continued

| Index | Polarization | Pilot sequence |
|---|---|---|
| | Polarization 2 | A + Aj, −A + Aj, −A + Aj, A + Aj, −A − Aj, A − Aj, −A + Aj, A − Aj, A − Aj, A − Aj, A − Aj, −A − Aj, −A − Aj, A − Aj, A − Aj, −A + Aj, A + Aj, A − Aj, A + Aj, A − Aj, −A + Aj, A + Aj, A − Aj, −A − Aj, A + Aj, −A − Aj, −A + Aj, A + Aj, −A + Aj, −A − Aj, −A − Aj, −A − Aj, A + Aj, A − Aj, −A − Aj, A + Aj, A + Aj, −A − Aj, A − Aj, A + Aj, −A + Aj, −A + Aj, A + Aj, A + Aj, A + Aj, −A − Aj, −A − Aj, A + Aj, A + Aj, −A + Aj, −A − Aj, −A + Aj, A − Aj, −A + Aj, −A + Aj, −A − Aj, −A + Aj, −A − Aj, A − Aj, A − Aj, −A + Aj |
| 7 | Polarization 1 | −A − Aj, −A − Aj, −A + Aj, −A − Aj, −A + Aj, −A − Aj, −A + Aj, A + Aj, −A − Aj, A − Aj, A − Aj, A + Aj, A + Aj, −A − Aj, A + Aj, −A + Aj, A + Aj, A − Aj, A + Aj, −A + Aj, −A − Aj, A − Aj, −A − Aj, −A + Aj, A − Aj, A + Aj, −A + Aj, A − Aj, −A + Aj, A + Aj, −A − Aj, A + Aj, −A − Aj, −A + Aj, −A − Aj, −A − Aj, −A + Aj, A − Aj, −A + Aj, A − Aj, −A + Aj, −A − Aj, A − Aj, A + Aj, A + Aj, A − Aj, −A − Aj, A − Aj, A − Aj, A + Aj, −A − Aj, −A + Aj, A − Aj, A + Aj, A − Aj, A + Aj, −A − Aj, −A + Aj, −A + Aj, A − Aj, A + Aj |
| | Polarization 2 | A + Aj, A − Aj, A − Aj, A + Aj, A − Aj, −A + Aj, −A − Aj, A + Aj, −A + Aj, −A + Aj, −A + Aj, −A − Aj, −A − Aj, −A + Aj, −A + Aj, −A − Aj, A + Aj, A + Aj, −A + Aj, A + Aj, −A − Aj, A + Aj, A + Aj, −A − Aj, −A + Aj, A − Aj, −A − Aj, A + Aj, A − Aj, A − Aj, −A − Aj, −A − Aj, −A + Aj, A + Aj, −A − Aj, −A + Aj, A + Aj, A − Aj, −A + Aj, −A + Aj, A − Aj, A − Aj, A + Aj, A + Aj, A + Aj, A − Aj, −A − Aj, −A + Aj, A + Aj, A − Aj, A − Aj, −A − Aj, A + Aj, −A − Aj, A − Aj, A − Aj, −A − Aj, A − Aj, −A + Aj, −A + Aj, −A − Aj |
| 8 | Polarization 1 | −A − Aj, −A + Aj, A − Aj, A + Aj, A − Aj, A + Aj, −A − Aj, −A + Aj, A − Aj, A − Aj, A − Aj, −A − Aj, A + Aj, A + Aj, A − Aj, A − Aj, −A + Aj, −A − Aj, A + Aj, −A − Aj, A + Aj, −A − Aj, −A − Aj, −A + Aj, −A − Aj, −A + Aj, A − Aj, −A + Aj, A + Aj, −A − Aj, A + Aj, −A + Aj, A − Aj, A + Aj, −A − Aj, −A − Aj, A − Aj, −A + Aj, −A + Aj, A − Aj, A + Aj, A + Aj, −A + Aj, A − Aj, −A + Aj, A + Aj, A − Aj, A − Aj, A − Aj, −A + Aj, A + Aj, −A − Aj, −A + Aj, −A − Aj, −A + Aj, −A − Aj, −A − Aj, −A − Aj, A + Aj, A + Aj, −A + Aj |
| | Polarization 2 | −A + Aj, −A − Aj, A − Aj, A − Aj, −A + Aj, −A − Aj, −A + Aj, −A + Aj, −A − Aj, A + Aj, −A − Aj, −A + Aj, −A + Aj, A + Aj, A − Aj, −A − Aj, −A + Aj, A + Aj, A + Aj, A + Aj, −A + Aj, −A + Aj, A − Aj, A − Aj, −A + Aj, A + Aj, A − Aj, −A − Aj, A + Aj, A − Aj, −A − Aj, −A − Aj, −A + Aj, −A + Aj, A + Aj, −A − Aj, −A + Aj, A − Aj, −A − Aj, A + Aj, A + Aj, −A − Aj, A + Aj, A − Aj, A + Aj, A + Aj, −A − Aj, A − Aj, A − Aj, −A − Aj, −A − Aj, A − Aj, A − Aj, A − Aj, A + Aj, −A − Aj, A − Aj, −A + Aj, A + Aj, −A + Aj, −A + Aj |

TABLE 23-2

| Index | Polarization | Pilot sequence |
|---|---|---|
| 1 | Polarization 1 | −A − Aj, A + Aj, −A − Aj, A + Aj, A − Aj, A − Aj, −A − Aj, −A + Aj, −A − Aj, −A + Aj, A − Aj, A + Aj, A − Aj, A + Aj, A + Aj, −A − Aj, A − Aj, A − Aj, −A + Aj, −A + Aj, A + Aj, −A − Aj, −A − Aj, A + Aj, A + Aj, A − Aj, A + Aj, −A − Aj, A − Aj, −A + Aj, A + Aj, A − Aj, A − Aj, A + Aj, A + Aj, A + Aj, −A − Aj, −A + Aj, −A − Aj, A − Aj, −A − Aj, −A − Aj, A + Aj, −A − Aj, −A − Aj, −A − Aj, −A + Aj, −A + Aj, A − Aj, A + Aj, −A + Aj, −A + Aj, −A − Aj, −A + Aj, −A + Aj, −A + Aj, −A + Aj, A − Aj, −A − Aj, A + Aj, A − Aj |
| | Polarization 2 | A − Aj, −A + Aj, A − Aj, −A + Aj, −A − Aj, −A − Aj, A − Aj, A + Aj, A − Aj, A + Aj, −A − Aj, −A + Aj, −A − Aj, −A + Aj, −A + Aj, A − Aj, −A − Aj, −A − Aj, A + Aj, A + Aj, −A + Aj, A − Aj, A − Aj, −A + Aj, −A + Aj, −A − Aj, −A + Aj, A − Aj, −A − Aj, A + Aj, −A + Aj, −A − Aj, −A − Aj, −A + Aj, −A + Aj, −A + Aj, A − Aj, A + Aj, A − Aj, −A − Aj, A − Aj, A − Aj, −A + Aj, A − Aj, A − Aj, A − Aj, A + Aj, A + Aj, −A − Aj, −A + Aj, A + Aj, A + Aj, A − Aj, A + Aj, A + Aj, A + Aj, A + Aj, −A − Aj, A − Aj, −A + Aj, −A − Aj |
| 2 | Polarization 1 | A + Aj, −A − Aj, A + Aj, −A − Aj, −A + Aj, −A + Aj, A + Aj, A − Aj, A + Aj, A − Aj, −A + Aj, −A − Aj, −A + Aj, −A − Aj, −A − Aj, A + Aj, −A + Aj, −A + Aj, A − Aj, A − Aj, −A − Aj, A + Aj, A + Aj, −A − Aj, −A − Aj, −A + Aj, −A − Aj, A + Aj, −A + Aj, A − Aj, −A − Aj, −A + Aj, −A + Aj, −A − Aj, −A − Aj, −A − Aj, A + Aj, A − Aj, A + Aj, −A + Aj, A + Aj, A + Aj, −A − Aj, A + Aj, A + Aj, A + Aj, A − Aj, A − Aj, −A + Aj, −A − Aj, A − Aj, A − Aj, A + Aj, A − Aj, A − Aj, A − Aj, A − Aj, −A + Aj, A + Aj, −A − Aj, −A + Aj |
| | Polarization 2 | −A + Aj, A − Aj, −A + Aj, A − Aj, A + Aj, A + Aj, −A + Aj, −A − Aj, −A + Aj, −A − Aj, A + Aj, A − Aj, A + Aj, A − Aj, A − Aj, −A + Aj, A + Aj, A + Aj, −A − Aj, −A − Aj, A − Aj, −A + Aj, −A + Aj, A − Aj, A − Aj, A + Aj, A − Aj, −A + Aj, A + Aj, −A − Aj, A − Aj, A + Aj, A + Aj, A − Aj, A − Aj, A − Aj, −A + Aj, −A − Aj, −A + Aj, A + Aj, −A + Aj, −A + Aj, A − Aj, −A + Aj, −A + Aj, −A + Aj, −A − Aj, −A − Aj, A + Aj, A − Aj, −A − Aj, −A − Aj, −A + Aj, −A − Aj, −A − Aj, −A − Aj, −A − Aj, A + Aj, −A + Aj, A − Aj, A + Aj |
| 3 | Polarization 1 | −A + Aj, −A + Aj, −A + Aj, A − Aj, A + Aj, A − Aj, A + Aj, A + Aj, −A + Aj, −A − Aj, A + Aj, A − Aj, A + Aj, −A − Aj, −A + Aj, −A − Aj, −A + Aj, −A − Aj, −A + Aj, A + Aj, A − Aj, −A − Aj, A + Aj, A + Aj, A − Aj, −A + Aj, A + Aj, −A − Aj, −A − Aj, −A − Aj, A + Aj, −A + Aj, A + Aj, −A + Aj, −A − Aj, −A + Aj, −A + Aj, −A − Aj, −A − Aj, −A − Aj, −A − Aj, −A + Aj, A + Aj, A + Aj, A − Aj, A + Aj, A − Aj, A + Aj, −A − Aj, A − Aj, A + Aj, A − Aj, −A + Aj, A − Aj, A − Aj, −A − Aj, −A + Aj, A − Aj, −A − Aj, A − Aj, A − Aj |
| | Polarization 2 | −A + Aj, A + Aj, −A + Aj, A + Aj, −A + Aj, −A + Aj, A − Aj, A − Aj, A − Aj, A + Aj, A − Aj, A + Aj, −A + Aj, −A + Aj, −A − Aj, −A − Aj, A − Aj, −A − Aj, −A + Aj, −A − Aj, A + Aj, −A + Aj, A − Aj, A + Aj, −A − Aj, −A − Aj, −A − Aj, −A + Aj, −A + Aj, A + Aj, A − Aj, −A − Aj, A − Aj, −A − Aj, −A + Aj, A + Aj, −A − Aj, A − Aj, A + Aj, −A − Aj, −A + Aj, A − Aj, −A + Aj, −A − Aj, A − Aj, A + Aj, −A + Aj, −A + Aj, A − Aj, −A − Aj, A − Aj, A + Aj, −A + Aj, A + Aj, A − Aj, −A − Aj, −A + Aj, A + Aj, A − Aj, A − Aj, A + Aj |
| 4 | Polarization 1 | A − Aj, −A + Aj, A − Aj, A + Aj, A + Aj, A − Aj, −A − Aj, A + Aj, −A − Aj, −A + Aj, A − Aj, A − Aj, A + Aj, −A + Aj, A − Aj, A − Aj, −A − Aj, −A − Aj, −A + Aj, A + Aj, −A − Aj, −A + Aj, −A − Aj, A + Aj, −A − Aj, −A + Aj, −A − Aj, A − Aj, A + Aj, A − Aj, A − Aj, −A + Aj, −A + Aj, −A + Aj, A − Aj, A + Aj, A − Aj, A + Aj, A + Aj, −A + Aj, −A − Aj, A + Aj, A − Aj, A + Aj, −A − Aj, −A + Aj, −A − Aj, −A + Aj, −A − Aj, −A + Aj, A + Aj, A − Aj, −A − Aj, A + Aj, A + Aj, A − Aj, −A + Aj, A + Aj, −A − Aj, −A − Aj, −A − Aj |
| | Polarization 2 | A + Aj, −A + Aj, A + Aj, −A + Aj, −A + Aj, A − Aj, A − Aj, A − Aj, A + Aj, A − Aj, A + Aj, −A + Aj, −A + Aj, −A − Aj, −A − Aj, A − Aj, −A − Aj, −A + Aj, −A − Aj, A + Aj, −A + Aj, A − Aj, A + Aj, −A − Aj, |

TABLE 23-2-continued

| Index | Polarization | Pilot sequence |
|---|---|---|
| | | –A – Aj, –A – Aj, –A + Aj, –A + Aj, A + Aj, A – Aj, –A – Aj, A – Aj, –A – Aj, –A + Aj, A + Aj, –A – Aj, A – Aj, A + Aj, –A – Aj, –A + Aj, A – Aj, –A + Aj, –A – Aj, A – Aj, A + Aj, –A + Aj, –A + Aj, A – Aj, –A – Aj, A – Aj, A + Aj, –A + Aj, A + Aj, A – Aj, –A – Aj, –A + Aj, A + Aj, A – Aj, A – Aj, A + Aj, A + Aj |
| 5 | Polarization 1 | A + Aj, –A – Aj, –A – Aj, –A – Aj, –A – Aj, –A + Aj, –A + Aj, A + Aj, –A + Aj, A + Aj, –A + Aj, A + Aj, A + Aj, –A – Aj, –A + Aj, A + Aj, A + Aj, –A – Aj, –A – Aj, A – Aj, –A – Aj, –A + Aj, A + Aj, A + Aj, A + Aj, A – Aj, A + Aj, A – Aj, –A – Aj, –A + Aj, A + Aj, A – Aj, A – Aj, –A + Aj, A – Aj, –A + Aj, –A + Aj, A – Aj, –A – Aj, A – Aj, A + Aj, A – Aj, –A + Aj, –A + Aj, –A + Aj, –A – Aj, –A – Aj, A + Aj, –A – Aj, –A + Aj, A – Aj, A + Aj, A – Aj, A – Aj, –A – Aj, A – Aj, A + Aj, A + Aj, –A – Aj, A – Aj, –A – Aj |
| | Polarization 2 | –A – Aj, –A – Aj, –A – Aj, A + Aj, –A – Aj, A – Aj, –A – Aj, A – Aj, –A – Aj, A + Aj, A – Aj, A – Aj, A – Aj, A + Aj, A – Aj, A – Aj, –A + Aj, A + Aj, –A – Aj, A – Aj, A + Aj, A + Aj, A + Aj, –A – Aj, –A + Aj, –A + Aj, –A – Aj, A – Aj, A + Aj, –A – Aj, A + Aj, A – Aj, –A + Aj, A + Aj, –A – Aj, –A + Aj, –A + Aj, A – Aj, –A + Aj, –A + Aj, A + Aj, –A + Aj, –A + Aj, A – Aj, –A + Aj, –A – Aj, A – Aj, A – Aj, –A – Aj, –A + Aj, –A – Aj, A + Aj, –A + Aj, A – Aj, –A + Aj, A – Aj, A + Aj, A + Aj, –A + Aj, –A – Aj, –A + Aj |

(17) When $N_{PS}$=67, the pilot sequence is one item in the following Table 24.

TABLE 24

| Index | Polarization | Pilot sequence |
|---|---|---|
| 1 | Polarization 1 | –A + Aj, A – Aj, A – Aj, –A – Aj, A – Aj, –A + Aj, A + Aj, A – Aj, –A – Aj, A – Aj, A – Aj, –A – Aj, –A + Aj, A – Aj, –A – Aj, –A – Aj, A – Aj, –A – Aj, –A – Aj, –A + Aj, A + Aj, A + Aj, A + Aj, –A + Aj, –A + Aj, –A + Aj, –A – Aj, A + Aj, –A – Aj, A + Aj, A – Aj, A + Aj, A – Aj, A – Aj, –A + Aj, –A + Aj, A – Aj, –A – Aj, A + Aj, –A + Aj, A + Aj, A – Aj, A + Aj, –A + Aj, –A + Aj, A – Aj, A + Aj, –A – Aj, A – Aj, –A + Aj, –A – Aj, –A + Aj, A + Aj, –A – Aj, –A – Aj, A – Aj, A + Aj, A + Aj, A – Aj, –A + Aj, –A + Aj, –A + Aj, A + Aj, –A – Aj, A + Aj, –A + Aj, –A – Aj |
| | Polarization 2 | A + Aj, –A – Aj, –A – Aj, A – Aj, –A – Aj, A + Aj, –A + Aj, –A – Aj, A – Aj, –A – Aj, –A – Aj, A – Aj, A + Aj, –A – Aj, A – Aj, A – Aj, –A – Aj, A – Aj, A – Aj, A + Aj, –A + Aj, –A + Aj, –A + Aj, A + Aj, A + Aj, A + Aj, A – Aj, –A + Aj, A – Aj, –A + Aj, –A – Aj, –A + Aj, –A – Aj, –A – Aj, A + Aj, A + Aj, –A – Aj, A – Aj, –A + Aj, A + Aj, –A + Aj, –A – Aj, –A + Aj, A + Aj, A + Aj, –A – Aj, –A + Aj, A – Aj, –A – Aj, A + Aj, A – Aj, A + Aj, –A + Aj, A – Aj, A – Aj, –A – Aj, –A + Aj, –A + Aj, –A – Aj, A + Aj, A + Aj, A + Aj, –A + Aj, A – Aj, –A + Aj, A + Aj, A – Aj |
| 2 | Polarization 1 | A – Aj, –A + Aj, –A + Aj, A + Aj, –A + Aj, A – Aj, –A – Aj, –A + Aj, A + Aj, –A + Aj, –A + Aj, A + Aj, A – Aj, –A + Aj, A + Aj, A + Aj, –A + Aj, A + Aj, A + Aj, A – Aj, –A – Aj, –A – Aj, –A – Aj, A – Aj, A – Aj, A – Aj, A + Aj, –A – Aj, A + Aj, –A – Aj, –A + Aj, –A – Aj, –A + Aj, –A + Aj, A – Aj, A – Aj, –A + Aj, A + Aj, –A – Aj, A – Aj, –A – Aj, –A + Aj, –A – Aj, A – Aj, A – Aj, –A + Aj, –A – Aj, A + Aj, –A + Aj, A – Aj, A + Aj, A – Aj, –A – Aj, A + Aj, A + Aj, –A + Aj, –A – Aj, –A – Aj, –A + Aj, A – Aj, A – Aj, A – Aj, –A – Aj, A + Aj, –A – Aj, A – Aj, A + Aj |
| | Polarization 2 | –A – Aj, A + Aj, A + Aj, –A + Aj, A + Aj, –A – Aj, A – Aj, A + Aj, –A + Aj, A + Aj, A + Aj, –A + Aj, –A – Aj, A + Aj, –A + Aj, –A + Aj, A + Aj, –A + Aj, –A + Aj, –A – Aj, A – Aj, A – Aj, A – Aj, –A – Aj, –A – Aj, –A – Aj, –A + Aj, A – Aj, –A + Aj, A – Aj, A + Aj, A – Aj, A + Aj, A + Aj, –A – Aj, –A – Aj, A + Aj, –A + Aj, A – Aj, –A – Aj, A – Aj, A + Aj, A – Aj, –A – Aj, –A – Aj, A + Aj, A – Aj, –A + Aj, A + Aj, –A – Aj, –A + Aj, –A – Aj, A – Aj, –A + Aj, –A + Aj, A + Aj, A – Aj, A – Aj, A + Aj, –A – Aj, –A – Aj, –A – Aj, A – Aj, –A + Aj, A – Aj, –A – Aj, –A + Aj |
| 3 | Polarization 1 | –A + Aj, A + Aj, –A + Aj, –A – Aj, A + Aj, –A – Aj, –A + Aj, –A + Aj, –A + Aj, A – Aj, –A – Aj, –A – Aj, A – Aj, A + Aj, A + Aj, –A – Aj, –A + Aj, A + Aj, –A + Aj, A – Aj, A + Aj, –A – Aj, A – Aj, –A + Aj, –A + Aj, –A – Aj, A – Aj, –A – Aj, –A + Aj, –A – Aj, A + Aj, A – Aj, –A + Aj, –A + Aj, A – Aj, A – Aj, –A – Aj, A – Aj, –A – Aj, A + Aj, –A – Aj, A + Aj, –A + Aj, –A + Aj, –A + Aj, –A – Aj, –A – Aj, –A – Aj, –A + Aj, A + Aj, A + Aj, A – Aj, A + Aj, A + Aj, A – Aj, –A + Aj, A + Aj, A – Aj, A – Aj, A + Aj, A – Aj, –A – Aj, –A + Aj, A – Aj, A + Aj, A – Aj, A – Aj |
| | Polarization 2 | –A – Aj, A – Aj, –A – Aj, –A + Aj, A – Aj, –A + Aj, –A – Aj, –A – Aj, –A – Aj, A + Aj, –A + Aj, –A + Aj, A + Aj, A – Aj, A – Aj, –A + Aj, –A – Aj, A – Aj, –A – Aj, A + Aj, A – Aj, –A + Aj, A + Aj, –A – Aj, –A – Aj, –A + Aj, A + Aj, –A + Aj, –A – Aj, –A + Aj, A – Aj, A + Aj, –A – Aj, –A – Aj, A + Aj, A + Aj, –A + Aj, A + Aj, –A + Aj, A – Aj, –A + Aj, A – Aj, –A – Aj, –A – Aj, –A – Aj, –A + Aj, –A + Aj, –A + Aj, –A – Aj, A – Aj, A – Aj, A + Aj, A – Aj, A – Aj, A + Aj, –A – Aj, A – Aj, A + Aj, A + Aj, A – Aj, A + Aj, –A + Aj, –A – Aj, A + Aj, A – Aj, A + Aj, A + Aj |
| 4 | Polarization 1 | –A + Aj, A + Aj, –A + Aj, –A – Aj, A + Aj, –A – Aj, –A + Aj, –A + Aj, –A + Aj, A – Aj, –A – Aj, –A – Aj, A – Aj, A + Aj, A + Aj, –A – Aj, –A + Aj, A + Aj, –A + Aj, A – Aj, A + Aj, –A – Aj, A – Aj, –A + Aj, –A + Aj, –A – Aj, A – Aj, –A – Aj, –A + Aj, –A – Aj, A + Aj, A – Aj, –A + Aj, –A + Aj, A – Aj, A – Aj, –A – Aj, A – Aj, –A – Aj, A + Aj, –A – Aj, A + Aj, –A + Aj, –A + Aj, –A + Aj, –A – Aj, –A – Aj, –A – Aj, –A + Aj, A + Aj, A + Aj, A – Aj, A + Aj, A + Aj, A – Aj, –A + Aj, A + Aj, A – Aj, A – Aj, A + Aj, A – Aj, –A – Aj, –A + Aj, A – Aj, A + Aj, A – Aj, A – Aj |
| | Polarization 2 | A + Aj, –A + Aj, A + Aj, A – Aj, –A + Aj, A – Aj, A + Aj, A + Aj, A + Aj, –A – Aj, A – Aj, A – Aj, –A – Aj, –A + Aj, –A + Aj, A – Aj, A + Aj, –A + Aj, A + Aj, –A – Aj, –A + Aj, A – Aj, –A – Aj, A + Aj, A + Aj, A – Aj, –A – Aj, A – Aj, A + Aj, A – Aj, –A + Aj, –A – Aj, A + Aj, A + Aj, –A – Aj, –A – Aj, A – Aj, –A – Aj, A – Aj, –A + Aj, A – Aj, –A + Aj, A + Aj, A + Aj, A + Aj, A – Aj, A – Aj, A – Aj, A + Aj, –A + Aj, –A + Aj, –A – Aj, –A + Aj, –A + Aj, –A – Aj, A + Aj, –A + Aj, –A – Aj, –A – Aj, –A + Aj, –A – Aj, A – Aj, A + Aj, –A – Aj, –A + Aj, –A – Aj, –A – Aj |
| 5 | Polarization 1 | A – Aj, –A – Aj, A – Aj, A + Aj, –A – Aj, A + Aj, A – Aj, A – Aj, A – Aj, –A + Aj, A + Aj, A + Aj, –A + Aj, –A – Aj, –A – Aj, A + Aj, A – Aj, –A – Aj, A – Aj, –A + Aj, –A – Aj, A + Aj, –A + Aj, A – Aj, |

TABLE 24-continued

| Index | Polarization | Pilot sequence |
| --- | --- | --- |
| | | A − Aj, A + Aj, −A + Aj, A + Aj, A − Aj, A + Aj, −A − Aj, −A + Aj, A − Aj, A − Aj, −A + Aj, −A + Aj, A + Aj, −A + Aj, A + Aj, −A − Aj, A + Aj, −A − Aj, A − Aj, A − Aj, A − Aj, A + Aj, A + Aj, A + Aj, A − Aj, −A − Aj, −A − Aj, −A + Aj, −A − Aj, −A − Aj, −A + Aj, A − Aj, −A − Aj, −A + Aj, −A + Aj, −A − Aj, −A + Aj, A + Aj, A − Aj, −A + Aj, −A − Aj, −A + Aj, −A + Aj |
| | Polarization 2 | −A − Aj, A − Aj, −A − Aj, −A + Aj, A − Aj, −A + Aj, −A − Aj, −A − Aj, −A − Aj, A + Aj, −A + Aj, −A + Aj, A + Aj, A − Aj, A − Aj, −A + Aj, −A − Aj, A − Aj, −A − Aj, A + Aj, A − Aj, −A + Aj, A + Aj, −A − Aj, −A − Aj, −A + Aj, A + Aj, −A + Aj, −A − Aj, −A + Aj, A − Aj, A + Aj, −A − Aj, −A − Aj, A + Aj, A + Aj, −A + Aj, A + Aj, −A + Aj, A − Aj, −A + Aj, A − Aj, −A − Aj, −A − Aj, −A − Aj, −A + Aj, −A + Aj, −A + Aj, −A − Aj, A − Aj, A − Aj, A + Aj, A − Aj, A − Aj, A + Aj, −A − Aj, A − Aj, A + Aj, A + Aj, A − Aj, A + Aj, −A + Aj, −A − Aj, A + Aj, A − Aj, A + Aj, A + Aj |
| 6 | Polarization 1 | A − Aj, −A − Aj, A − Aj, A + Aj, −A − Aj, A + Aj, A − Aj, A − Aj, A − Aj, −A + Aj, A + Aj, A + Aj, −A + Aj, −A − Aj, −A − Aj, A + Aj, A − Aj, −A − Aj, A − Aj, −A + Aj, −A − Aj, A + Aj, −A + Aj, A − Aj, A − Aj, A + Aj, −A + Aj, A + Aj, A − Aj, A + Aj, −A − Aj, −A + Aj, A − Aj, A − Aj, −A + Aj, −A + Aj, A + Aj, −A + Aj, A + Aj, −A − Aj, A + Aj, −A − Aj, A − Aj, A − Aj, A − Aj, A + Aj, A + Aj, A + Aj, A − Aj, −A − Aj, −A − Aj, −A + Aj, −A − Aj, −A − Aj, −A + Aj, A − Aj, −A − Aj, −A + Aj, −A + Aj, −A − Aj, −A + Aj, A + Aj, A − Aj, −A + Aj, −A − Aj, −A + Aj, −A + Aj |
| | Polarization 2 | A + Aj, −A + Aj, A + Aj, A − Aj, −A + Aj, A − Aj, A + Aj, A + Aj, A + Aj, −A − Aj, A − Aj, A − Aj, −A − Aj, −A + Aj, −A + Aj, A − Aj, A + Aj, −A + Aj, A + Aj, −A − Aj, −A + Aj, A − Aj, −A − Aj, A + Aj, A + Aj, A − Aj, −A − Aj, A − Aj, A + Aj, A − Aj, −A + Aj, −A − Aj, A + Aj, A + Aj, −A − Aj, −A − Aj, A − Aj, −A − Aj, A − Aj, −A + Aj, A − Aj, −A + Aj, A + Aj, A + Aj, A + Aj, A − Aj, A − Aj, A − Aj, A + Aj, −A + Aj, −A + Aj, −A − Aj, −A + Aj, −A + Aj, −A − Aj, A + Aj, −A + Aj, −A − Aj, −A − Aj, −A + Aj, −A − Aj, A − Aj, A + Aj, −A − Aj, −A + Aj, −A − Aj, −A − Aj |
| 7 | Polarization 1 | A + Aj, A − Aj, −A + Aj, A − Aj, −A − Aj, A − Aj, −A − Aj, −A − Aj, A + Aj, −A − Aj, A + Aj, −A − Aj, A − Aj, −A + Aj, −A + Aj, A + Aj, A + Aj, −A − Aj, −A + Aj, −A + Aj, −A + Aj, A − Aj, −A − Aj, A + Aj, −A + Aj, A + Aj, −A + Aj, A − Aj, −A − Aj, A − Aj, A + Aj, −A + Aj, A − Aj, A − Aj, A − Aj, −A + Aj, −A + Aj, −A + Aj, −A − Aj, A + Aj, −A − Aj, −A − Aj, A − Aj, A − Aj, A − Aj, A − Aj, A + Aj, −A + Aj, A + Aj, −A − Aj, −A − Aj, A − Aj, −A + Aj, A + Aj, A + Aj, −A + Aj, −A − Aj, A − Aj, A + Aj, −A − Aj, A + Aj, −A + Aj, −A − Aj, A + Aj, A − Aj, A + Aj, −A + Aj |
| | Polarization 2 | −A + Aj, A + Aj, A − Aj, A − Aj, A + Aj, A − Aj, −A + Aj, −A − Aj, A + Aj, −A + Aj, −A + Aj, −A + Aj, −A − Aj, −A − Aj, −A + Aj, −A + Aj, −A − Aj, A + Aj, A + Aj, −A + Aj, A + Aj, −A − Aj, A + Aj, A + Aj, −A − Aj, −A + Aj, A − Aj, −A − Aj, A + Aj, A − Aj, A − Aj, −A − Aj, −A − Aj, −A + Aj, A + Aj, −A − Aj, −A + Aj, A + Aj, A − Aj, −A + Aj, −A + Aj, A − Aj, A − Aj, A + Aj, A + Aj, A + Aj, A − Aj, −A − Aj, −A + Aj, A + Aj, A − Aj, A − Aj, −A − Aj, A + Aj, −A − Aj, A − Aj, A − Aj, −A − Aj, A − Aj, −A + Aj, −A + Aj, −A − Aj, A − Aj, −A + Aj, A + Aj, −A − Aj, −A − Aj |

(18) A When $N_{PS}$=72, if a remainder of $N_{TS}$ divided by 4 is 1, the pilot sequence is one item in the following Table 25-1. If a remainder of $N_{TS}$ divided by 4 is 3, the pilot sequence is one item in the following Table 25-1 or Table 25-2. Alternatively, any item is selected from the following Table 25-3 as a pilot sequence in one polarization direction, and any item is selected from the following Table 25-4 as a pilot sequence in the other polarization direction. Alternatively, any item is selected from the following Table 25-5 as a pilot sequence in one polarization direction, and any item is selected from the following Table 25-6 as a pilot sequence in the other polarization direction.

TABLE 25-1

| Index | Polarization | Pilot sequence |
| --- | --- | --- |
| 1 | Polarization 1 | −A − Aj, −A − Aj, A − Aj, −A − Aj, A + Aj, −A − Aj, −A + Aj, −A + Aj, A − Aj, A − Aj, −A + Aj, A + Aj, A − Aj, −A − Aj, A − Aj, −A + Aj, −A + Aj, −A − Aj, −A − Aj, −A + Aj, −A − Aj, A + Aj, A − Aj, −A − Aj, −A + Aj, −A + Aj, −A + Aj, A − Aj, −A + Aj, −A + Aj, A + Aj, −A − Aj, −A + Aj, A − Aj, A − Aj, A − Aj, A + Aj, A − Aj, A − Aj, A + Aj, −A + Aj, A − Aj, A + Aj, A + Aj, A + Aj, A + Aj, −A − Aj, −A − Aj, −A − Aj, A − Aj, A + Aj, A + Aj, −A − Aj, A + Aj, −A − Aj, A − Aj, −A + Aj, A − Aj, −A − Aj, −A − Aj, A + Aj, −A + Aj, A + Aj, −A + Aj, A + Aj, A − Aj, A + Aj, A − Aj, −A + Aj, A + Aj, −A + Aj, −A − Aj |
| | Polarization 2 | −A + Aj, −A − Aj, −A + Aj, −A + Aj, A + Aj, −A + Aj, A − Aj, −A + Aj, −A − Aj, −A − Aj, A + Aj, A + Aj, −A − Aj, A − Aj, A + Aj, −A + Aj, A + Aj, −A − Aj, −A − Aj, −A + Aj, −A + Aj, −A − Aj, −A + Aj, A − Aj, A + Aj, −A + Aj, −A − Aj, −A − Aj, −A − Aj, A + Aj, −A − Aj, −A − Aj, A − Aj, −A + Aj, −A − Aj, A + Aj, A + Aj, A + Aj, A − Aj, A + Aj, A + Aj, A − Aj, −A − Aj, A + Aj, A − Aj, A − Aj, A − Aj, A − Aj, −A + Aj, −A + Aj, −A + Aj, A + Aj, A − Aj, A − Aj, −A + Aj, A − Aj, −A + Aj, A + Aj, −A − Aj, A + Aj, −A + Aj, −A + Aj, A − Aj, −A − Aj, A − Aj, −A − Aj, A − Aj, A + Aj, A − Aj, A + Aj, −A − Aj, A − Aj |
| 2 | Polarization 1 | −A − Aj, −A − Aj, A − Aj, −A − Aj, A + Aj, −A − Aj, −A + Aj, −A + Aj, A − Aj, A − Aj, −A + Aj, A + Aj, A − Aj, −A − Aj, A − Aj, −A + Aj, −A + Aj, −A − Aj, −A − Aj, −A + Aj, −A − Aj, A + Aj, A − Aj, −A − Aj, −A + Aj, −A + Aj, −A + Aj, A − Aj, −A + Aj, −A + Aj, A + Aj, −A − Aj, −A + Aj, A − Aj, A − Aj, A − Aj, A + Aj, A − Aj, A − Aj, A + Aj, −A + Aj, A − Aj, A + Aj, A + Aj, A + Aj, A + Aj, −A − Aj, −A − Aj, −A − Aj, A − Aj, A + Aj, A + Aj, −A − Aj, A + Aj, −A − Aj, A − Aj, −A + Aj, A − Aj, −A − Aj, −A − Aj, A + Aj, −A + Aj, A + Aj, −A + Aj, A + Aj, A − Aj, A + Aj, A − Aj, −A + Aj, A + Aj, −A + Aj, −A − Aj |
| | Polarization 2 | A − Aj, A + Aj, A − Aj, A − Aj, −A − Aj, A − Aj, −A + Aj, A − Aj, A + Aj, A + Aj, −A − Aj, −A − Aj, A + Aj, −A + Aj, −A − Aj, A − Aj, −A − Aj, A + Aj, A + Aj, A − Aj, A − Aj, A + Aj, A − Aj, −A + Aj, −A − Aj, A − Aj, A + Aj, A + Aj, A + Aj, −A − Aj, A + Aj, A + Aj, −A + Aj, A − Aj, A + Aj, −A − Aj, −A − Aj, −A − Aj, −A + Aj, −A − Aj, −A − Aj, −A + Aj, A + Aj, −A − Aj, |

TABLE 25-1-continued

| Index | Polarization | Pilot sequence |
|---|---|---|
| | | −A + Aj, −A + Aj, −A + Aj, −A + Aj, A − Aj, A − Aj, A − Aj, −A − Aj, −A + Aj, −A + Aj, A − Aj, −A + Aj, A − Aj, −A − Aj, A + Aj, −A − Aj, A − Aj, A − Aj, −A + Aj, A + Aj, −A + Aj, A + Aj, −A + Aj, −A − Aj, −A + Aj, −A − Aj, A + Aj, −A + Aj |
| 3 | Polarization 1 | −A − Aj, −A + Aj, −A − Aj, −A − Aj, A − Aj, −A − Aj, A + Aj, −A − Aj, −A + Aj, −A + Aj, A − Aj, A − Aj, −A + Aj, A + Aj, A − Aj, −A − Aj, A − Aj, −A + Aj, −A + Aj, −A − Aj, −A − Aj, −A + Aj, −A − Aj, A + Aj, A − Aj, −A − Aj, −A + Aj, −A + Aj, −A + Aj, A − Aj, −A + Aj, −A + Aj, A + Aj, −A − Aj, −A + Aj, A − Aj, A − Aj, A − Aj, A + Aj, A − Aj, A − Aj, A + Aj, −A + Aj, A − Aj, A + Aj, A + Aj, A + Aj, A + Aj, −A − Aj, −A − Aj, −A − Aj, A − Aj, A + Aj, A + Aj, −A − Aj, A + Aj, −A − Aj, A − Aj, −A + Aj, A − Aj, −A − Aj, −A − Aj, A + Aj, −A + Aj, A + Aj, −A + Aj, A + Aj, A − Aj, A + Aj, A − Aj, −A + Aj, A + Aj |
| | Polarization 2 | −A + Aj, −A − Aj, −A + Aj, −A + Aj, A + Aj, −A + Aj, A − Aj, −A + Aj, −A − Aj, −A − Aj, A + Aj, A + Aj, −A − Aj, A − Aj, A + Aj, −A + Aj, A + Aj, −A − Aj, −A − Aj, −A + Aj, −A + Aj, −A − Aj, −A + Aj, A − Aj, A + Aj, −A + Aj, −A − Aj, −A − Aj, −A − Aj, A + Aj, −A − Aj, −A − Aj, A − Aj, −A + Aj, −A − Aj, A + Aj, A + Aj, A + Aj, A − Aj, A + Aj, A + Aj, A − Aj, −A − Aj, A + Aj, A − Aj, A − Aj, A − Aj, A − Aj, −A + Aj, −A + Aj, −A + Aj, A + Aj, A − Aj, A − Aj, −A + Aj, A − Aj, −A + Aj, A + Aj, −A − Aj, A + Aj, −A + Aj, −A + Aj, A − Aj, −A − Aj, A − Aj, −A − Aj, A − Aj, A + Aj, A − Aj, A + Aj, −A − Aj, A − Aj |
| 4 | Polarization 1 | −A − Aj, −A + Aj, −A − Aj, −A − Aj, A − Aj, −A − Aj, A + Aj, −A − Aj, −A + Aj, −A + Aj, A − Aj, A − Aj, −A + Aj, A + Aj, A − Aj, −A − Aj, A − Aj, −A + Aj, −A + Aj, −A − Aj, −A − Aj, −A + Aj, −A − Aj, A + Aj, A − Aj, −A − Aj, −A + Aj, −A + Aj, −A + Aj, A − Aj, −A + Aj, −A + Aj, A + Aj, −A − Aj, −A + Aj, A − Aj, A − Aj, A − Aj, A + Aj, A − Aj, A − Aj, A + Aj, −A + Aj, A − Aj, A + Aj, A + Aj, A + Aj, A + Aj, −A − Aj, −A − Aj, −A − Aj, A − Aj, A + Aj, A + Aj, −A − Aj, A + Aj, −A − Aj, A − Aj, −A + Aj, A − Aj, −A − Aj, −A − Aj, A + Aj, −A + Aj, A + Aj, −A + Aj, A + Aj, A − Aj, A + Aj, A − Aj, −A + Aj, A + Aj |
| | Polarization 2 | −A + Aj, −A + Aj, A + Aj, −A + Aj, A − Aj, −A + Aj, −A − Aj, −A − Aj, A + Aj, A + Aj, −A − Aj, A − Aj, A + Aj, −A + Aj, A + Aj, −A − Aj, −A − Aj, −A + Aj, −A + Aj, −A − Aj, −A + Aj, A − Aj, A + Aj, −A + Aj, −A − Aj, −A − Aj, −A − Aj, A + Aj, −A − Aj, −A − Aj, A − Aj, −A + Aj, −A − Aj, A + Aj, A + Aj, A + Aj, A + Aj, A − Aj, A + Aj, A + Aj, A − Aj, −A − Aj, A + Aj, A − Aj, A − Aj, A − Aj, A − Aj, −A + Aj, −A + Aj, −A + Aj, A + Aj, A − Aj, A − Aj, −A + Aj, A − Aj, −A + Aj, A + Aj, −A − Aj, A + Aj, −A + Aj, −A + Aj, A − Aj, −A − Aj, A − Aj, −A − Aj, A − Aj, A + Aj, A − Aj, A + Aj, −A − Aj, A − Aj, −A − Aj, −A + Aj |
| 5 | Polarization 1 | −A − Aj, −A + Aj, −A − Aj, −A − Aj, A − Aj, −A − Aj, A + Aj, −A − Aj, −A + Aj, −A + Aj, A − Aj, A − Aj, −A + Aj, A + Aj, A − Aj, −A − Aj, A − Aj, −A + Aj, −A + Aj, −A − Aj, −A − Aj, −A + Aj, −A − Aj, A + Aj, A − Aj, −A − Aj, −A + Aj, −A + Aj, −A + Aj, A − Aj, −A + Aj, −A + Aj, A + Aj, −A − Aj, −A + Aj, A − Aj, A − Aj, A − Aj, A + Aj, A − Aj, A − Aj, A + Aj, −A + Aj, A − Aj, A + Aj, A + Aj, A + Aj, A + Aj, −A − Aj, −A − Aj, −A − Aj, A − Aj, A + Aj, A + Aj, −A − Aj, A + Aj, −A − Aj, A − Aj, −A + Aj, A − Aj, −A − Aj, −A − Aj, A + Aj, −A + Aj, A + Aj, −A + Aj, A + Aj, A − Aj, A + Aj, A − Aj, −A + Aj, A + Aj |
| | Polarization 2 | A − Aj, A − Aj, −A − Aj, A − Aj, −A + Aj, A − Aj, A + Aj, A + Aj, −A − Aj, −A − Aj, A + Aj, −A + Aj, −A − Aj, A − Aj, −A − Aj, A + Aj, A + Aj, A − Aj, A − Aj, A + Aj, A − Aj, −A + Aj, −A − Aj, A − Aj, A + Aj, A + Aj, A + Aj, −A − Aj, A + Aj, A + Aj, −A + Aj, A − Aj, A + Aj, −A − Aj, −A − Aj, −A − Aj, −A + Aj, −A − Aj, −A − Aj, −A + Aj, A + Aj, −A − Aj, −A + Aj, −A + Aj, −A + Aj, −A + Aj, A − Aj, A − Aj, A − Aj, −A − Aj, −A + Aj, −A + Aj, A − Aj, −A + Aj, A − Aj, −A − Aj, A + Aj, −A − Aj, A − Aj, A − Aj, −A + Aj, A + Aj, −A + Aj, A + Aj, −A + Aj, −A − Aj, −A + Aj, −A − Aj, A + Aj, −A + Aj, A + Aj, A − Aj |
| 6 | Polarization 1 | −A − Aj, −A + Aj, −A − Aj, −A − Aj, A − Aj, −A − Aj, A + Aj, −A − Aj, −A + Aj, −A + Aj, A − Aj, A − Aj, −A + Aj, A + Aj, A − Aj, −A − Aj, A − Aj, −A + Aj, −A + Aj, −A − Aj, −A − Aj, −A + Aj, −A − Aj, A + Aj, A − Aj, −A − Aj, −A + Aj, −A + Aj, −A + Aj, A − Aj, −A + Aj, −A + Aj, A + Aj, −A − Aj, −A + Aj, A − Aj, A − Aj, A − Aj, A + Aj, A − Aj, A − Aj, A + Aj, −A + Aj, A − Aj, A + Aj, A + Aj, A + Aj, A + Aj, −A − Aj, −A − Aj, −A − Aj, A − Aj, A + Aj, A + Aj, −A − Aj, A + Aj, −A − Aj, A − Aj, −A + Aj, A − Aj, −A − Aj, −A − Aj, A + Aj, −A + Aj, A + Aj, −A + Aj, A + Aj, A − Aj, A + Aj, A − Aj, −A + Aj, A + Aj |
| | Polarization 2 | A − Aj, A + Aj, A − Aj, A − Aj, −A − Aj, A − Aj, −A + Aj, A − Aj, A + Aj, A + Aj, −A − Aj, −A −Aj, A + Aj, −A + Aj, −A − Aj, A − Aj, −A − Aj, A + Aj, A + Aj, A − Aj, A − Aj, A + Aj, A − Aj, −A + Aj, −A − Aj, A − Aj, A + Aj, A + Aj, A + Aj, −A − Aj, A + Aj, A + Aj, −A + Aj, A − Aj, A + Aj, −A − Aj, −A − Aj, −A − Aj, −A + Aj, −A − Aj, −A − Aj, −A + Aj, A + Aj, −A − Aj, −A + Aj, −A + Aj, −A + Aj, −A + Aj, A − Aj, A − Aj, A − Aj, −A − Aj, −A + Aj, −A + Aj, A − Aj, −A + Aj, A − Aj, −A − Aj, A + Aj, −A − Aj, A − Aj, A − Aj, −A + Aj, A + Aj, −A + Aj, A + Aj, −A + Aj, −A − Aj, −A + Aj, −A − Aj, A + Aj, −A + Aj |
| 7 | Polarization 1 | −A + Aj, −A − Aj, −A + Aj, −A + Aj, A + Aj, −A + Aj, A − Aj, −A + Aj, −A − Aj, −A − Aj, A + Aj, A + Aj, −A − Aj, A − Aj, A + Aj, −A + Aj, A + Aj, −A − Aj, −A − Aj, −A + Aj, −A + Aj, −A − Aj, −A + Aj, A − Aj, A + Aj, −A + Aj, −A − Aj, −A − Aj, −A − Aj, A + Aj, −A − Aj, −A − Aj, A − Aj, −A + Aj, −A − Aj, A + Aj, A + Aj, A + Aj, A − Aj, A + Aj, A + Aj, A − Aj, −A − Aj, A + Aj, A − Aj, A − Aj, A − Aj, A − Aj, −A + Aj, −A + Aj, −A + Aj, A + Aj, A − Aj, A − Aj, −A + Aj, A − Aj, −A + Aj, A + Aj, −A − Aj, A + Aj, −A + Aj, −A + Aj, A − Aj, −A − Aj, A − Aj, −A − Aj, A − Aj, A + Aj, A − Aj, A + Aj, −A − Aj, A − Aj |
| | Polarization 2 | A + Aj, A − Aj, A + Aj, A + Aj, −A + Aj, A + Aj, −A − Aj, A + Aj, A − Aj, A − Aj, −A + Aj, −A + Aj, A − Aj, −A − Aj, −A + Aj, A + Aj, −A + Aj, A − Aj, A − Aj, A + Aj, A + Aj, A − Aj, A + Aj, −A − Aj, −A + Aj, A + Aj, A − Aj, A − Aj, A − Aj, −A + Aj, A − Aj, A − Aj, −A − Aj, A + Aj, A − Aj, −A + Aj, −A + Aj, −A + Aj, −A − Aj, −A + Aj, −A + Aj, −A − Aj, A − Aj, −A + Aj, −A − Aj, −A − Aj, −A − Aj, −A − Aj, A + Aj, A + Aj, A + Aj, −A + Aj, −A − Aj, −A − Aj, A + Aj, −A − Aj, A + Aj, −A + Aj, A − Aj, −A + Aj, A + Aj, A + Aj, −A − Aj, A − Aj, −A − Aj, A − Aj, −A − Aj, −A + Aj, −A − Aj, −A + Aj, A − Aj, −A − Aj |
| 8 | Polarization 1 | −A + Aj, −A − Aj, −A + Aj, −A + Aj, A + Aj, −A + Aj, A − Aj, −A + Aj, −A − Aj, −A − Aj, A + Aj, A + Aj, −A − Aj, A − Aj, A + Aj, −A + Aj, A + Aj, −A − Aj, −A − Aj, −A + Aj, −A + Aj, −A − Aj, −A + Aj, A − Aj, A + Aj, −A + Aj, −A − Aj, −A − Aj, −A − Aj, A + Aj, −A − Aj, −A − Aj, |

TABLE 25-1-continued

| Index | Polarization | Pilot sequence |
|---|---|---|
| | | A − Aj, −A + Aj, −A − Aj, A + Aj, A + Aj, A + Aj, A − Aj, A + Aj, A + Aj, A − Aj, −A − Aj, A + Aj, A − Aj, A − Aj, A − Aj, A − Aj, −A + Aj, −A + Aj, −A + Aj, A + Aj, A − Aj, A − Aj, −A + Aj, A − Aj, −A + Aj, A + Aj, −A − Aj, A + Aj, −A + Aj, −A + Aj, A − Aj, −A − Aj, A − Aj, −A − Aj, A − Aj, A + Aj, A − Aj, A + Aj, −A − Aj, A − Aj |
| | Polarization 2 | A + Aj, A + Aj, −A + Aj, A + Aj, −A − Aj, A + Aj, A − Aj, A − Aj, −A + Aj, −A + Aj, A − Aj, −A − Aj, −A + Aj, A + Aj, −A + Aj, A − Aj, A − Aj, A + Aj, A + Aj, A − Aj, A + Aj, −A − Aj, −A + Aj, A + Aj, A − Aj, A − Aj, A − Aj, −A + Aj, A − Aj, A − Aj, −A − Aj, A + Aj, A − Aj, −A + Aj, −A + Aj, −A + Aj, −A − Aj, −A + Aj, −A + Aj, −A − Aj, A − Aj, −A + Aj, −A − Aj, −A − Aj, −A − Aj, −A − Aj, A + Aj, A + Aj, A + Aj, −A + Aj, −A − Aj, −A − Aj, A + Aj, −A − Aj, A + Aj, −A + Aj, A − Aj, −A + Aj, A + Aj, A + Aj, −A − Aj, A − Aj, −A − Aj, A − Aj, −A − Aj, −A + Aj, −A − Aj, −A + Aj, A − Aj, −A − Aj, A − Aj, A + Aj |
| 9 | Polarization 1 | −A + Aj, −A + Aj, A + Aj, −A + Aj, A − Aj, −A + Aj, −A − Aj, −A − Aj, A + Aj, A + Aj, −A − Aj, A − Aj, A + Aj, −A + Aj, A + Aj, −A − Aj, −A − Aj, −A + Aj, −A + Aj, −A − Aj, −A + Aj, A − Aj, A + Aj, −A + Aj, −A − Aj, −A − Aj, −A − Aj, A + Aj, −A − Aj, −A − Aj, A − Aj, −A + Aj, −A − Aj, A + Aj, A + Aj, A + Aj, A − Aj, A + Aj, A + Aj, A − Aj, −A − Aj, A + Aj, A − Aj, A − Aj, A − Aj, A − Aj, −A + Aj, −A + Aj, −A + Aj, A + Aj, A − Aj, A − Aj, −A + Aj, A − Aj, −A + Aj, A + Aj, −A − Aj, A + Aj, −A + Aj, −A + Aj, A − Aj, −A − Aj, A − Aj, −A − Aj, A − Aj, A + Aj, A − Aj, A + Aj, −A − Aj, A − Aj, −A − Aj, −A + Aj |
| | Polarization 2 | A + Aj, A − Aj, A + Aj, A + Aj, −A + Aj, A + Aj, −A − Aj, A + Aj, A − Aj, A − Aj, −A + Aj, −A + Aj, A − Aj, −A − Aj, −A + Aj, A + Aj, −A + Aj, A − Aj, A − Aj, A + Aj, A + Aj, A − Aj, A + Aj, −A − Aj, −A + Aj, A + Aj, A − Aj, A − Aj, A − Aj, −A + Aj, A − Aj, A − Aj, −A − Aj, A + Aj, A − Aj, −A + Aj, −A + Aj, −A + Aj, −A − Aj, −A + Aj, −A + Aj, −A − Aj, A − Aj, −A + Aj, −A − Aj, −A − Aj, −A − Aj, −A − Aj, A + Aj, A + Aj, A + Aj, −A + Aj, −A − Aj, −A − Aj, A + Aj, −A − Aj, A + Aj, −A + Aj, A − Aj, −A + Aj, A + Aj, A + Aj, −A − Aj, A − Aj, −A − Aj, A − Aj, −A − Aj, −A + Aj, −A − Aj, −A + Aj, A − Aj, −A − Aj |
| 10 | Polarization 1 | A − Aj, A − Aj, −A − Aj, A − Aj, −A + Aj, A − Aj, A + Aj, A + Aj, −A − Aj, −A − Aj, A + Aj, −A + Aj, −A − Aj, A − Aj, −A − Aj, A + Aj, A + Aj, A − Aj, A − Aj, A + Aj, A − Aj, −A + Aj, −A − Aj, A − Aj, A + Aj, A + Aj, A + Aj, −A − Aj, A + Aj, A + Aj, −A + Aj, A − Aj, A + Aj, −A − Aj, −A − Aj, −A − Aj, −A + Aj, −A − Aj, −A − Aj, −A + Aj, A + Aj, −A − Aj, −A + Aj, −A + Aj, −A + Aj, −A + Aj, A − Aj, A − Aj, A − Aj, −A − Aj, −A + Aj, −A + Aj, A − Aj, −A + Aj, A − Aj, −A − Aj, A + Aj, −A − Aj, A − Aj, A − Aj, −A + Aj, A + Aj, −A + Aj, A + Aj, −A + Aj, −A − Aj, −A + Aj, −A − Aj, A + Aj, −A + Aj, A + Aj, A − Aj |
| | Polarization 2 | A + Aj, A − Aj, A + Aj, A + Aj, −A + Aj, A + Aj, −A − Aj, A + Aj, A − Aj, A − Aj, −A + Aj, −A + Aj, A − Aj, −A − Aj, −A + Aj, A + Aj, −A + Aj, A − Aj, A − Aj, A + Aj, A + Aj, A − Aj, A + Aj, −A − Aj, −A + Aj, A + Aj, A − Aj, A − Aj, A − Aj, −A + Aj, A − Aj, A − Aj, −A − Aj, A + Aj, A − Aj, −A + Aj, −A + Aj, −A + Aj, −A − Aj, −A + Aj, −A + Aj, −A − Aj, A − Aj, −A + Aj, −A − Aj, −A − Aj, −A − Aj, −A − Aj, A + Aj, A + Aj, A + Aj, −A + Aj, −A − Aj, −A − Aj, A + Aj, −A − Aj, A + Aj, −A + Aj, A − Aj, −A + Aj, A + Aj, A + Aj, −A − Aj, A − Aj, −A − Aj, A − Aj, −A − Aj, −A + Aj, −A − Aj, −A + Aj, A − Aj, −A − Aj |
| 11 | Polarization 1 | A − Aj, A + Aj, A − Aj, A − Aj, −A − Aj, A − Aj, −A + Aj, A − Aj, A + Aj, A + Aj, −A − Aj, −A − Aj, A + Aj, −A + Aj, −A − Aj, A − Aj, −A − Aj, A + Aj, A + Aj, A − Aj, A − Aj, A + Aj, A − Aj, −A + Aj, −A − Aj, A − Aj, A + Aj, A + Aj, A + Aj, −A − Aj, A + Aj, A + Aj, −A + Aj, A − Aj, A + Aj, −A − Aj, −A − Aj, −A − Aj, −A + Aj, −A − Aj, −A − Aj, −A + Aj, A + Aj, −A − Aj, −A + Aj, −A + Aj, −A + Aj, −A + Aj, A − Aj, A − Aj, A − Aj, −A − Aj, −A + Aj, −A + Aj, A − Aj, −A + Aj, A − Aj, −A − Aj, A + Aj, −A − Aj, A − Aj, A − Aj, −A + Aj, A + Aj, −A + Aj, A + Aj, −A + Aj, −A − Aj, −A + Aj, −A − Aj, A + Aj, −A + Aj |
| | Polarization 2 | A + Aj, A − Aj, A + Aj, A + Aj, −A + Aj, A + Aj, −A − Aj, A + Aj, A − Aj, A − Aj, −A + Aj, −A + Aj, A − Aj, −A − Aj, −A + Aj, A + Aj, −A + Aj, A − Aj, A − Aj, A + Aj, A + Aj, A − Aj, A + Aj, −A − Aj, −A + Aj, A + Aj, A − Aj, A − Aj, A − Aj, −A + Aj, A − Aj, A − Aj, −A − Aj, A + Aj, A − Aj, −A + Aj, −A + Aj, −A + Aj, −A − Aj, −A + Aj, −A + Aj, −A − Aj, A − Aj, −A + Aj, −A − Aj, −A − Aj, −A − Aj, −A − Aj, A + Aj, A + Aj, A + Aj, −A + Aj, −A − Aj, −A − Aj, A + Aj, −A − Aj, A + Aj, −A + Aj, A − Aj, −A + Aj, A + Aj, A + Aj, −A − Aj, A − Aj, −A − Aj, A − Aj, −A − Aj, −A + Aj, −A − Aj, −A + Aj, A − Aj, −A − Aj |
| 12 | Polarization 1 | A − Aj, A + Aj, A − Aj, A − Aj, −A − Aj, A − Aj, −A + Aj, A − Aj, A + Aj, A + Aj, −A − Aj, −A − Aj, A + Aj, −A + Aj, −A − Aj, A − Aj, −A − Aj, A + Aj, A + Aj, A − Aj, A − Aj, A + Aj, A − Aj, −A + Aj, −A − Aj, A − Aj, A + Aj, A + Aj, A + Aj, −A − Aj, A + Aj, A + Aj, −A + Aj, A − Aj, A + Aj, −A − Aj, −A − Aj, −A − Aj, −A + Aj, −A − Aj, −A − Aj, −A + Aj, A + Aj, −A − Aj, −A + Aj, −A + Aj, −A + Aj, −A + Aj, A − Aj, A − Aj, A − Aj, −A − Aj, −A + Aj, −A + Aj, A − Aj, −A + Aj, A − Aj, −A − Aj, A + Aj, −A − Aj, A − Aj, A − Aj, −A + Aj, A + Aj, −A + Aj, A + Aj, −A + Aj, −A − Aj, −A + Aj, −A − Aj, A + Aj, −A + Aj |
| | Polarization 2 | A + Aj, A + Aj, −A + Aj, A + Aj, −A − Aj, A + Aj, A − Aj, A − Aj, −A + Aj, −A + Aj, A − Aj, −A − Aj, −A + Aj, A + Aj, −A + Aj, A − Aj, A − Aj, A + Aj, A + Aj, A − Aj, A + Aj, −A − Aj, −A + Aj, A + Aj, A − Aj, A − Aj, A − Aj, −A + Aj, A − Aj, A − Aj, −A − Aj, A + Aj, A − Aj, −A + Aj, −A + Aj, −A + Aj, −A − Aj, −A + Aj, −A + Aj, −A − Aj, A − Aj, −A + Aj, −A − Aj, −A − Aj, −A − Aj, −A − Aj, A + Aj, A + Aj, A + Aj, −A + Aj, −A − Aj, −A − Aj, A + Aj, −A − Aj, A + Aj, −A + Aj, A − Aj, −A + Aj, A + Aj, A + Aj, −A − Aj, A − Aj, −A − Aj, A − Aj, −A − Aj, −A + Aj, −A − Aj, −A + Aj, A − Aj, −A − Aj, A − Aj, A + Aj |
| 13 | Polarization 1 | −A − Aj, −A + Aj, A − Aj, −A − Aj, A − Aj, −A − Aj, −A + Aj, −A − Aj, −A + Aj, −A − Aj, A + Aj, A + Aj, A − Aj, −A + Aj, A − Aj, A + Aj, −A − Aj, A + Aj, −A − Aj, −A − Aj, A − Aj, A + Aj, A + Aj, A + Aj, −A − Aj, −A − Aj, −A − Aj, −A − Aj, A − Aj, −A + Aj, −A − Aj, A − Aj, A − Aj, −A − Aj, A − Aj, A − Aj, A − Aj, −A + Aj, A + Aj, −A − Aj, −A + Aj, −A + Aj, A − Aj, −A + Aj, −A + Aj, −A + Aj, A + Aj, A − Aj, −A − Aj, A + Aj, −A + Aj, A + Aj, A + Aj, −A + Aj, −A + Aj, A − Aj, A + Aj, A − Aj, −A − Aj, −A + Aj, A − Aj, A − Aj, −A + Aj, −A + Aj, A + Aj, −A − Aj, A + Aj, A − Aj, A + Aj, A + Aj, −A + Aj, A + Aj |
| | Polarization 2 | −A + Aj, −A − Aj, A + Aj, −A + Aj, A + Aj, −A + Aj, −A − Aj, −A + Aj, −A − Aj, −A + Aj, A −Aj, A − Aj, A + Aj, −A − Aj, A + Aj, A − Aj, −A + Aj, A − Aj, −A + Aj, −A + Aj, A + Aj, A − Aj, A − Aj, A − Aj, −A + Aj, −A + Aj, −A + Aj, −A + Aj, A + Aj, −A − Aj, −A + Aj, A + Aj, A + Aj, −A + Aj, A + Aj, A + Aj, A + Aj, −A − Aj, A − Aj, −A + Aj, −A − Aj, −A − Aj, A + Aj, |

TABLE 25-1-continued

| Index | Polarization | Pilot sequence |
|---|---|---|
| | | −A − Aj, −A − Aj, −A − Aj, A − Aj, A + Aj, −A + Aj, A − Aj, −A − Aj, A − Aj, A − Aj, −A − Aj, −A − Aj, −A − Aj, A + Aj, A − Aj, A + Aj, −A + Aj, −A − Aj, A + Aj, A + Aj, −A − Aj, −A − Aj, A − Aj, −A + Aj, A − Aj, A + Aj, A − Aj, A − Aj, −A − Aj, A − Aj |
| 14 | Polarization 1 | −A − Aj, −A + Aj, A − Aj, −A − Aj, A − Aj, −A − Aj, −A + Aj, −A − Aj, −A + Aj, −A − Aj, A + Aj, A + Aj, A − Aj, −A + Aj, A − Aj, A + Aj, −A − Aj, A + Aj, −A − Aj, −A − Aj, A − Aj, A + Aj, A + Aj, A + Aj, −A − Aj, −A − Aj, −A − Aj, −A − Aj, A − Aj, −A + Aj, −A − Aj, A − Aj, A − Aj, −A − Aj, A − Aj, A − Aj, A − Aj, −A + Aj, A + Aj, −A − Aj, −A + Aj, −A + Aj, A − Aj, −A + Aj, −A + Aj, −A + Aj, A + Aj, A − Aj, −A − Aj, A + Aj, −A + Aj, A + Aj, A + Aj, −A + Aj, −A + Aj, A − Aj, A + Aj, A − Aj, −A − Aj, −A + Aj, A − Aj, A − Aj, −A + Aj, −A + Aj, A + Aj, −A − Aj, A + Aj, A − Aj, A + Aj, A + Aj, −A + Aj, A + Aj |
| | Polarization 2 | −A + Aj, A + Aj, A − Aj, A + Aj, −A − Aj, A − Aj, −A − Aj, A − Aj, A + Aj, A − Aj, A + Aj, A − Aj, −A + Aj, −A + Aj, −A − Aj, A + Aj, −A − Aj, −A + Aj, A − Aj, −A + Aj, A − Aj, A − Aj, −A − Aj, −A + Aj, −A + Aj, −A + Aj, A − Aj, A − Aj, A − Aj, A − Aj, −A − Aj, A + Aj, A − Aj, −A − Aj, −A − Aj, A − Aj, −A − Aj, −A − Aj, −A − Aj, A + Aj, −A + Aj, A − Aj, A + Aj, A + Aj, −A − Aj, A + Aj, A + Aj, A + Aj, −A + Aj, −A − Aj, A − Aj, −A + Aj, A + Aj, −A + Aj, −A + Aj, A + Aj, A + Aj, −A − Aj, −A + Aj, −A − Aj, A − Aj, A + Aj, −A − Aj, −A − Aj, A + Aj, A + Aj, −A + Aj, A − Aj, −A + Aj, −A − Aj, −A + Aj, −A + Aj |
| 15 | Polarization 1 | −A − Aj, −A + Aj, A − Aj, −A − Aj, A − Aj, −A − Aj, −A + Aj, −A − Aj, −A + Aj, −A − Aj, A + Aj, A + Aj, A − Aj, −A + Aj, A − Aj, A + Aj, −A − Aj, A + Aj, −A − Aj, −A − Aj, A − Aj, A + Aj, A + Aj, A + Aj, −A − Aj, −A − Aj, −A − Aj, −A − Aj, A − Aj, −A + Aj, −A − Aj, A − Aj, A − Aj, −A − Aj, A − Aj, A − Aj, A − Aj, −A + Aj, A + Aj, −A − Aj, −A + Aj, −A + Aj, A − Aj, −A + Aj, −A + Aj, −A + Aj, A + Aj, A − Aj, −A − Aj, A + Aj, −A + Aj, A + Aj, A + Aj, −A + Aj, −A + Aj, A − Aj, A + Aj, A − Aj, −A − Aj, −A + Aj, A − Aj, A − Aj, −A + Aj, −A + Aj, A + Aj, −A − Aj, A + Aj, A − Aj, A + Aj, A + Aj, −A + Aj, A + Aj |
| | Polarization 2 | A − Aj, −A − Aj, −A + Aj, −A − Aj, A + Aj, −A + Aj, A + Aj, −A + Aj, −A − Aj, −A + Aj, −A − Aj, −A + Aj, A − Aj, A − Aj, A + Aj, −A − Aj, A + Aj, A − Aj, −A + Aj, A − Aj, −A + Aj, −A + Aj, A + Aj, A − Aj, A − Aj, A − Aj, −A + Aj, −A + Aj, −A + Aj, −A + Aj, A + Aj, −A − Aj, −A + Aj, A + Aj, A + Aj, −A + Aj, A + Aj, A + Aj, A + Aj, −A − Aj, A − Aj, −A + Aj, −A − Aj, −A − Aj, A + Aj, −A − Aj, −A − Aj, −A − Aj, A − Aj, A + Aj, −A + Aj, A − Aj, −A − Aj, A − Aj, A − Aj, −A − Aj, −A − Aj, A + Aj, A − Aj, A + Aj, −A + Aj, −A − Aj, A + Aj, A + Aj, −A − Aj, −A − Aj, A − Aj, −A + Aj, A − Aj, A + Aj, A − Aj, A − Aj |
| 16 | Polarization 1 | −A − Aj, −A + Aj, A − Aj, −A − Aj, A − Aj, −A − Aj, −A + Aj, −A − Aj, −A + Aj, −A − Aj, A + Aj, A + Aj, A − Aj, −A + Aj, A − Aj, A + Aj, −A − Aj, A + Aj, −A − Aj, −A − Aj, A − Aj, A + Aj, A + Aj, A + Aj, −A − Aj, −A − Aj, −A − Aj, −A − Aj, A − Aj, −A + Aj, −A − Aj, A − Aj, A − Aj, −A − Aj, A − Aj, A − Aj, A − Aj, −A + Aj, A + Aj, −A − Aj, −A + Aj, −A + Aj, A − Aj, −A + Aj, −A + Aj, −A + Aj, A + Aj, A − Aj, −A − Aj, A + Aj, −A + Aj, A + Aj, A + Aj, −A + Aj, −A + Aj, A − Aj, A + Aj, A − Aj, −A − Aj, −A + Aj, A − Aj, A − Aj, −A + Aj, −A + Aj, A + Aj, −A − Aj, A + Aj, A − Aj, A + Aj, A + Aj, −A + Aj, A + Aj |
| | Polarization 2 | A − Aj, A + Aj, −A − Aj, A − Aj, −A − Aj, A − Aj, A + Aj, A − Aj, A + Aj, A − Aj, −A + Aj, −A + Aj, −A − Aj, A + Aj, −A − Aj, −A + Aj, A − Aj, −A + Aj, A − Aj, A − Aj, −A − Aj, −A + Aj, −A + Aj, −A + Aj, A − Aj, A − Aj, A − Aj, A − Aj, −A − Aj, A + Aj, A − Aj, −A − Aj, −A − Aj, A − Aj, −A − Aj, −A − Aj, −A − Aj, A + Aj, −A + Aj, A − Aj, A + Aj, A + Aj, −A − Aj, A + Aj, A + Aj, A + Aj, −A + Aj, −A − Aj, A − Aj, −A + Aj, A + Aj, −A + Aj, −A + Aj, A + Aj, A + Aj, −A − Aj, −A + Aj, −A − Aj, A − Aj, A + Aj, −A − Aj, −A − Aj, A + Aj, A + Aj, −A + Aj, A − Aj, −A + Aj, −A − Aj, −A + Aj, −A + Aj, A + Aj, −A + Aj |
| 17 | Polarization 1 | −A − Aj, A − Aj, A + Aj, A − Aj, −A + Aj, A + Aj, −A + Aj, A + Aj, A − Aj, A + Aj, A − Aj, A + Aj, −A − Aj, −A − Aj, −A + Aj, A − Aj, −A + Aj, −A − Aj, A + Aj, −A − Aj, A + Aj, A + Aj, −A + Aj, −A − Aj, −A − Aj, −A − Aj, A + Aj, A + Aj, A + Aj, A + Aj, −A + Aj, A − Aj, A + Aj, −A + Aj, −A + Aj, A + Aj, −A + Aj, −A + Aj, −A + Aj, A − Aj, −A − Aj, A + Aj, A − Aj, A − Aj, −A + Aj, A − Aj, A − Aj, A − Aj, −A − Aj, −A + Aj, A + Aj, −A − Aj, A − Aj, −A − Aj, −A − Aj, A − Aj, A − Aj, −A + Aj, −A − Aj, −A + Aj, A + Aj, A − Aj, −A + Aj, −A + Aj, A − Aj, A − Aj, −A − Aj, A + Aj, −A − Aj, −A + Aj, −A − Aj, −A − Aj |
| | Polarization 2 | −A + Aj, −A − Aj, A + Aj, −A + Aj, A + Aj, −A + Aj, −A − Aj, −A + Aj, −A − Aj, −A + Aj, A − Aj, A − Aj, A + Aj, −A − Aj, A + Aj, A − Aj, −A + Aj, A − Aj, −A + Aj, −A + Aj, A + Aj, A − Aj, A − Aj, A − Aj, −A + Aj, −A + Aj, −A + Aj, −A + Aj, A + Aj, −A − Aj, −A + Aj, A + Aj, A + Aj, −A + Aj, A + Aj, A + Aj, A + Aj, −A − Aj, A − Aj, −A + Aj, −A − Aj, −A − Aj, A + Aj, −A − Aj, −A − Aj, −A − Aj, A − Aj, A + Aj, −A + Aj, A − Aj, −A − Aj, A − Aj, A − Aj, −A − Aj, −A − Aj, A + Aj, A − Aj, A + Aj, −A + Aj, −A − Aj, A + Aj, A + Aj, −A − Aj, −A − Aj, A − Aj, −A + Aj, A − Aj, A + Aj, A − Aj, A − Aj, −A − Aj, A − Aj |
| 18 | Polarization 1 | −A − Aj, A − Aj, A + Aj, A − Aj, −A + Aj, A + Aj, −A + Aj, A + Aj, A − Aj, A + Aj, A − Aj, A + Aj, −A − Aj, −A − Aj, −A + Aj, A − Aj, −A + Aj, −A − Aj, A + Aj, −A − Aj, A + Aj, A + Aj, −A + Aj, −A − Aj, −A − Aj, −A − Aj, A + Aj, A + Aj, A + Aj, A + Aj, −A + Aj, A − Aj, A + Aj, −A + Aj, −A + Aj, A + Aj, −A + Aj, −A + Aj, −A + Aj, A − Aj, −A − Aj, A + Aj, A − Aj, A − Aj, −A + Aj, A − Aj, A − Aj, A − Aj, −A − Aj, −A + Aj, A + Aj, −A − Aj, A − Aj, −A − Aj, −A − Aj, A − Aj, A − Aj, −A + Aj, −A − Aj, −A + Aj, A + Aj, A − Aj, −A + Aj, −A + Aj, A − Aj, A − Aj, −A − Aj, A + Aj, −A − Aj, −A + Aj, −A − Aj, −A − Aj |
| | Polarization 2 | A − Aj, A + Aj, −A − Aj, A − Aj, −A − Aj, A − Aj, A + Aj, A − Aj, A + Aj, A − Aj, −A + Aj, −A + Aj, −A − Aj, A + Aj, −A − Aj, −A + Aj, A − Aj, −A + Aj, A − Aj, A − Aj, −A − Aj, −A + Aj, −A + Aj, −A + Aj, A − Aj, A − Aj, A − Aj, A − Aj, −A − Aj, A + Aj, A − Aj, −A − Aj, −A − Aj, A − Aj, −A − Aj, −A − Aj, −A − Aj, A + Aj, −A + Aj, A − Aj, A + Aj, A + Aj, −A − Aj, A + Aj, A + Aj, A + Aj, −A + Aj, −A − Aj, A − Aj, −A + Aj, A + Aj, −A + Aj, −A + Aj, A + Aj, A + Aj, −A − Aj, −A + Aj, −A − Aj, A − Aj, A + Aj, −A − Aj, −A − Aj, A + Aj, A + Aj, −A + Aj, A − Aj, −A + Aj, −A − Aj, −A + Aj, −A + Aj, A + Aj, −A + Aj |
| 19 | Polarization 1 | −A + Aj, −A − Aj, A + Aj, −A + Aj, A + Aj, −A + Aj, −A − Aj, −A + Aj, −A − Aj, −A + Aj, A − Aj, A − Aj, A + Aj, −A − Aj, A + Aj, A − Aj, −A + Aj, A − Aj, −A + Aj, −A + Aj, A + Aj, A − Aj, A − Aj, A − Aj, −A + Aj, −A + Aj, −A + Aj, −A + Aj, A + Aj, −A − Aj, −A + Aj, A + Aj, A + Aj, −A + Aj, A + Aj, A + Aj, A + Aj, −A − Aj, A − Aj, −A + Aj, −A − Aj, −A − Aj, A + Aj, |

TABLE 25-1-continued

| Index | Polarization | Pilot sequence |
|---|---|---|
| | | −A − Aj, −A − Aj, −A − Aj, A − Aj, A + Aj, −A + Aj, A − Aj, −A − Aj, A − Aj, A − Aj, −A − Aj, −A − Aj, A + Aj, A − Aj, A + Aj, −A + Aj, −A − Aj, A + Aj, A + Aj, −A − Aj, −A − Aj, A − Aj, −A + Aj, A − Aj, A + Aj, A − Aj, A − Aj, −A − Aj, A − Aj |
| | Polarization 2 | A + Aj, −A + Aj, −A − Aj, −A + Aj, A − Aj, −A − Aj, A − Aj, −A − Aj, −A + Aj, −A − Aj, −A + Aj, −A − Aj, A + Aj, A + Aj, A − Aj, −A + Aj, A − Aj, A + Aj, −A − Aj, A + Aj, −A − Aj, −A − Aj, A − Aj, A + Aj, A + Aj, A + Aj, −A − Aj, −A − Aj, −A − Aj, −A − Aj, A − Aj, −A + Aj, −A − Aj, A − Aj, A − Aj, −A − Aj, A − Aj, A − Aj, A − Aj, −A + Aj, A + Aj, −A − Aj, −A + Aj, −A + Aj, A − Aj, −A + Aj, −A + Aj, −A + Aj, A + Aj, A − Aj, −A − Aj, A + Aj, −A + Aj, A + Aj, A + Aj, −A + Aj, −A + Aj, A − Aj, A + Aj, A − Aj, −A − Aj, −A + Aj, A − Aj, A − Aj, −A + Aj, −A + Aj, A + Aj, −A − Aj, A + Aj, A − Aj, A + Aj, A + Aj |
| 20 | Polarization 1 | −A + Aj, −A − Aj, A + Aj, −A + Aj, A + Aj, −A + Aj, −A − Aj, −A + Aj, −A − Aj, −A + Aj, A − Aj, A − Aj, A + Aj, −A − Aj, A + Aj, A − Aj, −A + Aj, A − Aj, −A + Aj, −A + Aj, A + Aj, A − Aj, A − Aj, A − Aj, −A + Aj, −A + Aj, −A + Aj, −A + Aj, A + Aj, −A − Aj, −A + Aj, A + Aj, A + Aj, −A + Aj, A + Aj, A + Aj, A + Aj, −A − Aj, A − Aj, −A + Aj, −A − Aj, −A − Aj, A + Aj, −A − Aj, −A − Aj, −A − Aj, A − Aj, A + Aj, −A + Aj, A − Aj, −A − Aj, A − Aj, A − Aj, −A − Aj, −A − Aj, A + Aj, A − Aj, A + Aj, −A + Aj, −A − Aj, A + Aj, A + Aj, −A − Aj, −A − Aj, A − Aj, −A + Aj, A − Aj, A + Aj, A − Aj, A − Aj, −A − Aj, A − Aj |
| | Polarization 2 | A + Aj, A − Aj, −A + Aj, A + Aj, −A + Aj, A + Aj, A − Aj, A + Aj, A − Aj, A + Aj, −A − Aj, −A − Aj, −A + Aj, A − Aj, −A + Aj, −A − Aj, A + Aj, −A − Aj, A + Aj, A + Aj, −A + Aj, −A − Aj, −A − Aj, −A − Aj, A + Aj, A + Aj, A + Aj, A + Aj, −A + Aj, A − Aj, A + Aj, −A + Aj, −A + Aj, A + Aj, −A + Aj, −A + Aj, −A + Aj, A − Aj, −A − Aj, A + Aj, A − Aj, A − Aj, −A + Aj, A − Aj, A − Aj, A − Aj, −A − Aj, −A + Aj, A + Aj, −A − Aj, A − Aj, −A − Aj, −A − Aj, A − Aj, A − Aj, −A + Aj, −A − Aj, −A + Aj, A + Aj, A − Aj, −A + Aj, −A + Aj, A − Aj, A − Aj, −A − Aj, A + Aj, −A − Aj, −A + Aj, −A − Aj, −A − Aj, A − Aj, −A − Aj |
| 21 | Polarization 1 | −A + Aj, A + Aj, A − Aj, A + Aj, −A − Aj, A − Aj, −A − Aj, A − Aj, A + Aj, A − Aj, A + Aj, A − Aj, −A + Aj, −A + Aj, −A − Aj, A + Aj, −A − Aj, −A + Aj, A − Aj, −A + Aj, A − Aj, A − Aj, −A − Aj, −A + Aj, −A + Aj, −A + Aj, A − Aj, A − Aj, A − Aj, A − Aj, −A − Aj, A + Aj, A − Aj, −A − Aj, −A − Aj, A − Aj, −A − Aj, −A − Aj, −A − Aj, A + Aj, −A + Aj, A − Aj, A + Aj, A + Aj, −A − Aj, A + Aj, A + Aj, A + Aj, −A + Aj, −A − Aj, A − Aj, −A + Aj, A + Aj, −A + Aj, −A + Aj, A + Aj, A + Aj, −A − Aj, −A + Aj, −A − Aj, A − Aj, A + Aj, −A − Aj, −A − Aj, A + Aj, A + Aj, −A + Aj, A − Aj, −A + Aj, −A − Aj, −A + Aj, −A + Aj |
| | Polarization 2 | A + Aj, A − Aj, −A + Aj, A + Aj, −A + Aj, A + Aj, A − Aj, A + Aj, A − Aj, A + Aj, −A − Aj, −A − Aj, −A + Aj, A − Aj, −A + Aj, −A − Aj, A + Aj, −A − Aj, A + Aj, A + Aj, −A + Aj, −A − Aj, −A − Aj, −A − Aj, A + Aj, A + Aj, A + Aj, A + Aj, −A + Aj, A − Aj, A + Aj, −A + Aj, −A + Aj, A + Aj, −A + Aj, −A + Aj, −A + Aj, A − Aj, −A − Aj, A + Aj, A − Aj, A − Aj, −A + Aj, A − Aj, A − Aj, A − Aj, −A − Aj, −A + Aj, A + Aj, −A − Aj, A − Aj, −A − Aj, −A − Aj, A − Aj, A − Aj, −A + Aj, −A − Aj, −A + Aj, A + Aj, A − Aj, −A + Aj, −A + Aj, A − Aj, A − Aj, −A − Aj, A + Aj, −A − Aj, −A + Aj, −A − Aj, −A − Aj, A − Aj, −A − Aj |
| 22 | Polarization 1 | A − Aj, −A − Aj, −A + Aj, −A − Aj, A + Aj, −A + Aj, A + Aj, −A + Aj, −A − Aj, −A + Aj, −A − Aj, −A + Aj, A − Aj, A − Aj, A + Aj, −A − Aj, A + Aj, A − Aj, −A + Aj, A − Aj, −A + Aj, −A + Aj, A + Aj, A − Aj, A − Aj, A − Aj, −A + Aj, −A + Aj, −A + Aj, −A + Aj, A + Aj, −A − Aj, −A + Aj, A + Aj, A + Aj, −A + Aj, A + Aj, A + Aj, A + Aj, −A − Aj, A − Aj, −A + Aj, −A − Aj, −A − Aj, A + Aj, −A − Aj, −A − Aj, −A − Aj, A − Aj, A + Aj, −A + Aj, A − Aj, −A − Aj, A − Aj, A − Aj, −A − Aj, −A − Aj, A + Aj, A − Aj, A + Aj, −A + Aj, −A − Aj, A + Aj, A + Aj, −A − Aj, −A − Aj, A − Aj, −A + Aj, A − Aj, A + Aj, A − Aj, A − Aj |
| | Polarization 2 | A + Aj, A − Aj, −A + Aj, A + Aj, −A + Aj, A + Aj, A − Aj, A + Aj, A − Aj, A + Aj, −A − Aj, −A − Aj, −A + Aj, A − Aj, −A + Aj, −A − Aj, A + Aj, −A − Aj, A + Aj, A + Aj, −A + Aj, −A − Aj, −A − Aj, −A − Aj, A + Aj, A + Aj, A + Aj, A + Aj, −A + Aj, A − Aj, A + Aj, −A + Aj, −A + Aj, A + Aj, −A + Aj, −A + Aj, −A + Aj, A − Aj, −A − Aj, A + Aj, A − Aj, A − Aj, −A + Aj, A − Aj, A − Aj, A − Aj, −A − Aj, −A + Aj, A + Aj, −A − Aj, A − Aj, −A − Aj, −A − Aj, A − Aj, A − Aj, −A + Aj, −A − Aj, −A + Aj, A + Aj, A − Aj, −A + Aj, −A + Aj, A − Aj, A − Aj, −A − Aj, A + Aj, −A − Aj, −A + Aj, −A − Aj, −A − Aj, A − Aj, −A − Aj |
| 23 | Polarization 1 | A − Aj, A + Aj, −A − Aj, A − Aj, −A − Aj, A − Aj, A + Aj, A − Aj, A + Aj, A − Aj, −A + Aj, −A + Aj, −A − Aj, A + Aj, −A − Aj, −A + Aj, A − Aj, −A + Aj, A − Aj, A − Aj, −A − Aj, −A + Aj, −A + Aj, −A + Aj, A − Aj, A − Aj, A − Aj, A − Aj, −A − Aj, A + Aj, A − Aj, −A − Aj, −A − Aj, A − Aj, −A − Aj, −A − Aj, −A − Aj, A + Aj, −A + Aj, A − Aj, A + Aj, A + Aj, −A − Aj, A + Aj, A + Aj, A + Aj, −A + Aj, −A − Aj, A − Aj, −A + Aj, A + Aj, −A + Aj, −A + Aj, A + Aj, A + Aj, −A − Aj, −A + Aj, −A − Aj, A − Aj, A + Aj, −A − Aj, −A − Aj, A + Aj, A + Aj, −A + Aj, A − Aj, −A + Aj, −A − Aj, −A + Aj, −A + Aj, A + Aj, −A + Aj |
| | Polarization 2 | A + Aj, −A + Aj, −A − Aj, −A + Aj, A − Aj, −A − Aj, A − Aj, −A − Aj, −A + Aj, −A − Aj, −A + Aj, −A − Aj, A + Aj, A + Aj, A − Aj, −A + Aj, A − Aj, A + Aj, −A − Aj, A + Aj, −A − Aj, −A − Aj, A − Aj, A + Aj, A + Aj, A + Aj, −A − Aj, −A − Aj, −A − Aj, −A − Aj, A − Aj, −A + Aj, −A − Aj, A − Aj, A − Aj, −A − Aj, A − Aj, A − Aj, A − Aj, −A + Aj, A + Aj, −A − Aj, −A + Aj, −A + Aj, A − Aj, −A + Aj, −A + Aj, −A + Aj, A + Aj, A − Aj, −A − Aj, A + Aj, −A + Aj, A + Aj, A + Aj, −A + Aj, −A + Aj, A − Aj, A + Aj, A − Aj, −A − Aj, −A + Aj, A − Aj, A − Aj, −A + Aj, −A + Aj, A + Aj, −A − Aj, A + Aj, A − Aj, A + Aj, A + Aj |
| 24 | Polarization 1 | A − Aj, A + Aj, −A − Aj, A − Aj, −A − Aj, A − Aj, A + Aj, A − Aj, A + Aj, A − Aj, −A + Aj, −A + Aj, −A − Aj, A + Aj, −A − Aj, −A + Aj, A − Aj, −A + Aj, A − Aj, A − Aj, −A − Aj, −A + Aj, −A + Aj, −A + Aj, A − Aj, A − Aj, A − Aj, A − Aj, −A − Aj, A + Aj, A − Aj, −A − Aj, −A − Aj, A − Aj, −A − Aj, −A − Aj, −A − Aj, A + Aj, −A + Aj, A − Aj, A + Aj, A + Aj, −A − Aj, A + Aj, A + Aj, A + Aj, −A + Aj, −A − Aj, A − Aj, −A + Aj, A + Aj, −A + Aj, −A + Aj, A + Aj, A + Aj, −A − Aj, −A + Aj, −A − Aj, A − Aj, A + Aj, −A − Aj, −A − Aj, A + Aj, A + Aj, −A + Aj, A − Aj, −A + Aj, −A − Aj, −A + Aj, −A + Aj, A + Aj, −A + Aj |
| | Polarization 2 | A + Aj, A − Aj, −A + Aj, A + Aj, −A + Aj, A + Aj, A − Aj, A + Aj, A − Aj, A + Aj, −A − Aj, −A − Aj, −A + Aj, A − Aj, −A + Aj, −A − Aj, A + Aj, −A − Aj, A + Aj, A + Aj, −A + Aj, −A − Aj, −A − Aj, −A − Aj, A + Aj, A + Aj, A + Aj, A + Aj, −A + Aj, A − Aj, A + Aj, −A + Aj, −A + Aj, A + Aj, −A + Aj, −A + Aj, −A + Aj, A − Aj, −A − Aj, A + Aj, A − Aj, A − Aj, −A + Aj, A − Aj, A − Aj, A − Aj, −A − Aj, −A + Aj, A + Aj, −A − Aj, A − Aj, −A − Aj, −A − Aj, A − Aj, A − Aj, |

TABLE 25-1-continued

| Index | Polarization | Pilot sequence |
|---|---|---|
| | | −A + Aj, −A − Aj, −A + Aj, A + Aj, A − Aj, −A + Aj, −A + Aj, A − Aj, A − Aj, −A − Aj, A + Aj, −A − Aj, −A + Aj, −A − Aj, −A − Aj, A − Aj, −A − Aj |
| 25 | Polarization 1 | −A − Aj, −A − Aj, −A + Aj, −A + Aj, A − Aj, A − Aj, −A + Aj, −A − Aj, −A + Aj, A + Aj, A − Aj, −A + Aj, A + Aj, A − Aj, A − Aj, −A − Aj, A − Aj, A − Aj, A + Aj, A + Aj, A − Aj, −A + Aj, −A − Aj, −A + Aj, A − Aj, −A − Aj, −A + Aj, A + Aj, A + Aj, −A + Aj, −A + Aj, A − Aj, A + Aj, −A + Aj, A − Aj, −A + Aj, A − Aj, A + Aj, −A + Aj, −A − Aj, A + Aj, A − Aj, A + Aj, A + Aj, −A + Aj, −A − Aj, A − Aj, −A + Aj, −A + Aj, A + Aj, −A − Aj, A − Aj, −A − Aj, −A − Aj, −A − Aj, −A − Aj, A + Aj, −A − Aj, −A − Aj, −A − Aj, A + Aj, A − Aj, A − Aj, −A − Aj, A + Aj, −A − Aj, A + Aj, A + Aj, A + Aj, A − Aj, −A + Aj, −A + Aj |
| | Polarization 2 | A + Aj, A − Aj, −A + Aj, A − Aj, A − Aj, −A − Aj, −A − Aj, A + Aj, A + Aj, A + Aj, −A − Aj, A + Aj, −A + Aj, A + Aj, −A − Aj, −A + Aj, A + Aj, −A − Aj, −A − Aj, A + Aj, A − Aj, −A − Aj, A − Aj, A + Aj, −A − Aj, −A + Aj, A − Aj, −A − Aj, A − Aj, A + Aj, A + Aj, −A + Aj, A − Aj, −A − Aj, −A + Aj, −A + Aj, −A + Aj, −A + Aj, −A + Aj, −A − Aj, A − Aj, A − Aj, A − Aj, A + Aj, −A − Aj, −A + Aj, −A + Aj, −A − Aj, A − Aj, A + Aj, −A − Aj, A + Aj, −A − Aj, −A − Aj, A − Aj, −A + Aj, A − Aj, A − Aj, A − Aj, A − Aj, A + Aj, A + Aj, −A + Aj, −A + Aj, −A − Aj, −A + Aj, −A + Aj, A − Aj, A + Aj, A + Aj, −A − Aj, −A + Aj |
| 26 | Polarization 1 | A − Aj, −A + Aj, −A + Aj, −A + Aj, A + Aj, −A + Aj, −A + Aj, −A − Aj, A + Aj, A − Aj, A + Aj, −A − Aj, A + Aj, −A − Aj, −A + Aj, A + Aj, A − Aj, A − Aj, A − Aj, −A − Aj, A + Aj, −A + Aj, −A − Aj, −A − Aj, −A − Aj, −A − Aj, A + Aj, −A − Aj, −A + Aj, A − Aj, A − Aj, A − Aj, −A − Aj, −A + Aj, −A + Aj, −A + Aj, −A − Aj, A + Aj, −A − Aj, A + Aj, −A + Aj, A + Aj, A + Aj, −A + Aj, A + Aj, A + Aj, −A − Aj, A + Aj, A + Aj, A − Aj, A − Aj, −A + Aj, A − Aj, A − Aj, A − Aj, A − Aj, −A + Aj, −A − Aj, −A + Aj, A + Aj, A + Aj, −A − Aj, A − Aj, A + Aj, A − Aj, −A − Aj, −A − Aj, −A − Aj, A − Aj, A − Aj, −A + Aj, −A + Aj |
| | Polarization 2 | A + Aj, −A − Aj, −A − Aj, −A + Aj, −A + Aj, −A + Aj, A − Aj, A + Aj, −A + Aj, A + Aj, A − Aj, A + Aj, A + Aj, −A − Aj, −A + Aj, A − Aj, A + Aj, A − Aj, −A − Aj, A + Aj, −A − Aj, A + Aj, −A − Aj, A + Aj, A + Aj, A + Aj, A − Aj, −A + Aj, −A − Aj, A + Aj, −A − Aj, A − Aj, −A + Aj, A + Aj, −A + Aj, −A − Aj, −A + Aj, A + Aj, −A − Aj, −A − Aj, A + Aj, −A + Aj, −A − Aj, A − Aj, −A − Aj, −A + Aj, A + Aj, A + Aj, −A + Aj, A − Aj, A + Aj, −A − Aj, −A + Aj, A − Aj, −A − Aj, A − Aj, −A + Aj, −A + Aj, A − Aj, −A + Aj, −A − Aj, A − Aj, A − Aj, A − Aj, A − Aj, A − Aj, −A − Aj, −A − Aj, −A + Aj, −A + Aj, A − Aj, A − Aj |
| 27 | Polarization 1 | A − Aj, −A − Aj, A + Aj, A + Aj, −A + Aj, A − Aj, A − Aj, −A − Aj, A − Aj, A − Aj, A + Aj, A + Aj, −A + Aj, −A + Aj, −A + Aj, −A + Aj, A − Aj, −A + Aj, −A − Aj, −A − Aj, A + Aj, −A − Aj, A + Aj, −A + Aj, −A − Aj, A − Aj, A − Aj, −A − Aj, A + Aj, −A + Aj, −A + Aj, −A + Aj, −A − Aj, A − Aj, A − Aj, A − Aj, A − Aj, A − Aj, −A − Aj, −A + Aj, A − Aj, A + Aj, A + Aj, −A + Aj, −A − Aj, −A + Aj, A − Aj, −A − Aj, A + Aj, −A + Aj, −A − Aj, −A + Aj, A + Aj, −A − Aj, −A − Aj, A + Aj, A − Aj, −A − Aj, A + Aj, A − Aj, A + Aj, −A − Aj, A + Aj, A + Aj, A + Aj, −A − Aj, −A − Aj, −A + Aj, −A + Aj, A − Aj, −A + Aj, A + Aj |
| | Polarization 2 | A − Aj, A − Aj, −A + Aj, A + Aj, A + Aj, A + Aj, −A − Aj, A + Aj, −A − Aj, −A + Aj, −A + Aj, A + Aj, −A − Aj, −A − Aj, −A − Aj, A + Aj, −A − Aj, −A − Aj, −A − Aj, −A − Aj, −A + Aj, −A − Aj, A + Aj, A − Aj, A − Aj, −A + Aj, −A − Aj, A − Aj, A + Aj, A + Aj, −A + Aj, A + Aj, −A − Aj, A − Aj, A + Aj, −A + Aj, A − Aj, −A + Aj, A − Aj, A + Aj, −A + Aj, A − Aj, A − Aj, A + Aj, A + Aj, A − Aj, −A − Aj, −A + Aj, A − Aj, −A − Aj, A − Aj, −A + Aj, A + Aj, A + Aj, −A + Aj, −A + Aj, −A − Aj, −A + Aj, −A + Aj, A + Aj, A − Aj, −A + Aj, A + Aj, A − Aj, −A − Aj, A − Aj, −A + Aj, −A + Aj, A − Aj, A − Aj, −A − Aj, −A − Aj |
| 28 | Polarization 1 | −A + Aj, −A + Aj, A − Aj, A − Aj, −A − Aj, −A − Aj, −A + Aj, −A + Aj, −A + Aj, −A + Aj, −A + Aj, −A − Aj, A − Aj, −A + Aj, A − Aj, A − Aj, −A + Aj, −A − Aj, −A + Aj, A − Aj, −A − Aj, A + Aj, −A + Aj, A − Aj, A + Aj, A + Aj, A − Aj, −A − Aj, −A + Aj, −A − Aj, A − Aj, A + Aj, −A − Aj, −A − Aj, A + Aj, A − Aj, −A − Aj, A − Aj, A + Aj, A − Aj, −A + Aj, −A − Aj, A + Aj, −A − Aj, A − Aj, −A + Aj, A + Aj, A + Aj, A + Aj, −A − Aj, A + Aj, −A − Aj, A + Aj, −A − Aj, −A + Aj, A + Aj, −A + Aj, A − Aj, −A − Aj, A + Aj, A + Aj, −A + Aj, A + Aj, A − Aj, A + Aj, −A + Aj, A − Aj, A − Aj, A − Aj, −A − Aj, −A − Aj, A + Aj |
| | Polarization 2 | A − Aj, A − Aj, −A + Aj, −A + Aj, −A − Aj, −A − Aj, −A − Aj, −A + Aj, A + Aj, −A + Aj, −A − Aj, A + Aj, A + Aj, A − Aj, −A − Aj, A − Aj, −A + Aj, −A + Aj, −A + Aj, −A + Aj, A − Aj, −A + Aj, −A + Aj, A + Aj, A + Aj, −A − Aj, A + Aj, A + Aj, A − Aj, A + Aj, A + Aj, A − Aj, A + Aj, −A − Aj, A + Aj, −A − Aj, A − Aj, A − Aj, A − Aj, −A − Aj, −A + Aj, −A + Aj, −A + Aj, A − Aj, −A − Aj, A + Aj, −A − Aj, −A − Aj, −A − Aj, −A − Aj, A − Aj, A + Aj, −A − Aj, −A + Aj, −A + Aj, −A + Aj, A + Aj, A − Aj, −A − Aj, A + Aj, −A − Aj, A + Aj, −A + Aj, A + Aj, −A − Aj, A − Aj, A − Aj, A + Aj, A − Aj, A − Aj, A − Aj, −A + Aj |

TABLE 25-2

| Index | Polarization | Pilot sequence |
|---|---|---|
| 1 | Polarization 1 | −A + Aj, −A − Aj, A − Aj, −A − Aj, A + Aj, −A − Aj, −A + Aj, A − Aj, A + Aj, −A + Aj, A + Aj, A + Aj, −A − Aj, −A − Aj, A − Aj, −A + Aj, −A + Aj, A − Aj, −A − Aj, −A + Aj, A + Aj, −A − Aj, −A + Aj, −A + Aj, A + Aj, −A − Aj, A − Aj, −A + Aj, A − Aj, −A + Aj, −A − Aj, A + Aj, A + Aj, A + Aj, A − Aj, −A + Aj, A − Aj, −A + Aj, A − Aj, −A − Aj, A + Aj, A − Aj, A + Aj, −A − Aj, −A + Aj, A + Aj, A − Aj, A + Aj, A + Aj, −A + Aj, A − Aj, A + Aj, −A + Aj, −A + Aj, −A − Aj, −A − Aj, −A + Aj, A + Aj, −A − Aj, A − Aj, −A − Aj, −A − Aj, A − Aj, A + Aj, A + Aj, −A − Aj, A − Aj, A + Aj, A − Aj, −A − Aj, A − Aj, −A − Aj |
| | Polarization 2 | −A − Aj, −A + Aj, −A + Aj, A − Aj, −A − Aj, A − Aj, A − Aj, A + Aj, A + Aj, −A − Aj, −A + Aj, A − Aj, −A + Aj, A − Aj, A + Aj, A − Aj, −A + Aj, −A + Aj, −A + Aj, A + Aj, −A + Aj, −A + Aj, −A − Aj, A − Aj, A − Aj, A + Aj, −A + Aj, A + Aj, −A + Aj, A + Aj, −A − Aj, A + Aj, −A − Aj, |

TABLE 25-2-continued

| Index | Polarization | Pilot sequence |
|---|---|---|
| | | –A – Aj, –A + Aj, A – Aj, –A + Aj, –A – Aj, –A – Aj, A – Aj, –A – Aj, –A – Aj, –A – Aj, –A – Aj, A + Aj, –A + Aj, A + Aj, A – Aj, –A + Aj, A – Aj, A – Aj, A + Aj, A + Aj, –A + Aj, A + Aj, –A + Aj, A – Aj, A – Aj, –A – Aj, A + Aj, –A – Aj, A – Aj, A + Aj, –A – Aj, A + Aj, A – Aj, –A + Aj, A – Aj, A + Aj, –A + Aj, –A – Aj, A – Aj |
| 2 | Polarization 1 | –A – Aj, –A + Aj, –A – Aj, –A + Aj, A + Aj, –A + Aj, –A – Aj, A + Aj, A + Aj, –A + Aj, –A – Aj, –A – Aj, –A + Aj, –A – Aj, A + Aj, A – Aj, –A – Aj, –A – Aj, A – Aj, A – Aj, A + Aj, –A + Aj, A – Aj, A + Aj, A + Aj, –A + Aj, A + Aj, A – Aj, –A – Aj, A + Aj, –A + Aj, A + Aj, –A – Aj, –A + Aj, A – Aj, –A + Aj, A – Aj, –A + Aj, A + Aj, A + Aj, A + Aj, –A – Aj, A – Aj, –A + Aj, A – Aj, –A + Aj, –A – Aj, A + Aj, A – Aj, A – Aj, –A – Aj, A + Aj, A – Aj, –A – Aj, –A + Aj, A – Aj, A – Aj, –A + Aj, –A – Aj, –A – Aj, A + Aj, A + Aj, A – Aj, A + Aj, –A + Aj, A – Aj, –A – Aj, A + Aj, –A – Aj, –A + Aj, –A – Aj, A – Aj |
| | Polarization 2 | –A + Aj, –A – Aj, A – Aj, A + Aj, –A + Aj, A – Aj, –A + Aj, A + Aj, –A – Aj, A + Aj, –A + Aj, –A – Aj, A + Aj, –A – Aj, –A + Aj, –A + Aj, A – Aj, A + Aj, A – Aj, A + Aj, A + Aj, –A + Aj, –A + Aj, A – Aj, –A + Aj, A + Aj, A – Aj, A + Aj, –A – Aj, –A – Aj, –A – Aj, –A – Aj, –A + Aj, –A – Aj, –A – Aj, A – Aj, –A + Aj, A – Aj, –A – Aj, –A – Aj, A + Aj, –A – Aj, A + Aj, A – Aj, A + Aj, A – Aj, A + Aj, –A + Aj, –A + Aj, –A – Aj, A – Aj, A – Aj, A + Aj, A – Aj, A – Aj, A – Aj, –A + Aj, A + Aj, –A + Aj, A – Aj, –A + Aj, A – Aj, –A – Aj, A + Aj, A + Aj, –A + Aj, –A + Aj, –A – Aj, –A + Aj, A – Aj, A – Aj, –A – Aj |

TABLE 25-3

| Index | Pilot sequence |
|---|---|
| 1 | –A – Aj, A – Aj, –A – Aj, –A + Aj, –A – Aj, –A + Aj, A – Aj, –A – Aj, A – Aj, A + Aj, –A + Aj, –A – Aj, A + Aj, A + Aj, –A – Aj, –A + Aj, –A – Aj, A – Aj, A – Aj, –A – Aj, –A – Aj, A – Aj, –A + Aj, A + Aj, –A – Aj, –A – Aj, A – Aj, A – Aj, A + Aj, –A – Aj, A – Aj, A + Aj, A – Aj, –A – Aj, A + Aj, –A + Aj, –A + Aj, –A + Aj, A + Aj, –A + Aj, –A + Aj, A – Aj, A + Aj, –A + Aj, A + Aj, A + Aj, A + Aj, A – Aj, –A – Aj, –A – Aj, –A + Aj, –A + Aj, A + Aj, A – Aj, –A + Aj, A – Aj, –A + Aj, –A – Aj, A + Aj, –A – Aj, –A – Aj, –A + Aj, A – Aj, A + Aj, A – Aj, A + Aj, A + Aj, –A + Aj, A + Aj, –A – Aj, A + Aj, A – Aj |
| 2 | –A + Aj, A + Aj, –A + Aj, A + Aj, A – Aj, A + Aj, A – Aj, –A + Aj, A + Aj, –A + Aj, –A – Aj, A – Aj, A + Aj, –A – Aj, –A – Aj, A + Aj, A – Aj, A + Aj, –A + Aj, –A + Aj, A + Aj, A + Aj, –A + Aj, A – Aj, –A – Aj, A + Aj, A + Aj, –A + Aj, –A + Aj, –A – Aj, A + Aj, –A + Aj, –A – Aj, –A + Aj, A + Aj, –A – Aj, A – Aj, A – Aj, A – Aj, –A – Aj, A – Aj, A – Aj, –A + Aj, –A – Aj, A – Aj, –A – Aj, –A – Aj, –A – Aj, –A + Aj, A + Aj, A + Aj, A – Aj, A – Aj, –A – Aj, –A + Aj, A – Aj, –A + Aj, A – Aj, A + Aj, –A – Aj, A + Aj, A + Aj, A – Aj, –A + Aj, –A – Aj, –A + Aj, –A – Aj, –A – Aj, A – Aj, –A – Aj, A + Aj, –A – Aj |
| 3 | A – Aj, –A – Aj, A – Aj, –A – Aj, –A + Aj, –A – Aj, –A + Aj, A – Aj, –A – Aj, A – Aj, A + Aj, –A + Aj, –A – Aj, A + Aj, A + Aj, –A – Aj, –A + Aj, –A – Aj, A – Aj, A – Aj, –A – Aj, –A – Aj, A – Aj, –A + Aj, A + Aj, –A – Aj, –A – Aj, A – Aj, A – Aj, A + Aj, –A – Aj, A – Aj, A + Aj, A – Aj, –A – Aj, A + Aj, –A + Aj, –A + Aj, –A + Aj, A + Aj, –A + Aj, –A + Aj, A – Aj, A + Aj, –A + Aj, A + Aj, A + Aj, A + Aj, A – Aj, –A – Aj, –A – Aj, –A + Aj, –A + Aj, A + Aj, A – Aj, –A + Aj, A – Aj, –A + Aj, –A – Aj, A + Aj, –A – Aj, –A – Aj, –A + Aj, A – Aj, A + Aj, A – Aj, A + Aj, A + Aj, –A + Aj, A + Aj, –A – Aj, A + Aj |
| 4 | A + Aj, –A + Aj, A + Aj, A – Aj, A + Aj, A – Aj, –A + Aj, A + Aj, –A + Aj, –A – Aj, A – Aj, A + Aj, –A – Aj, –A – Aj, A + Aj, A – Aj, A + Aj, –A + Aj, –A + Aj, A + Aj, A + Aj, –A + Aj, A – Aj, –A – Aj, A + Aj, A + Aj, –A + Aj, –A + Aj, –A – Aj, A + Aj, –A + Aj, –A – Aj, –A + Aj, A + Aj, –A – Aj, A – Aj, A – Aj, A – Aj, –A – Aj, A – Aj, A – Aj, –A + Aj, –A – Aj, A – Aj, –A – Aj, –A – Aj, –A – Aj, –A + Aj, A + Aj, A + Aj, A – Aj, A – Aj, –A – Aj, –A + Aj, A – Aj, –A + Aj, A – Aj, A + Aj, –A – Aj, A + Aj, A + Aj, A – Aj, –A + Aj, –A – Aj, –A + Aj, –A – Aj, –A – Aj, A – Aj, –A – Aj, A + Aj, –A – Aj, –A + Aj |

TABLE 25-4

| Index | Pilot sequence |
|---|---|
| 1 | –A – Aj, A – Aj, –A – Aj, A – Aj, A + Aj, A – Aj, A + Aj, –A – Aj, A – Aj, –A – Aj, –A + Aj, A + Aj, A – Aj, –A + Aj, –A + Aj, A – Aj, A + Aj, A – Aj, –A – Aj, –A – Aj, A – Aj, A – Aj, –A – Aj, A + Aj, –A + Aj, A – Aj, A – Aj, –A – Aj, –A – Aj, –A + Aj, A – Aj, –A – Aj, –A + Aj, –A – Aj, A – Aj, –A + Aj, A + Aj, A + Aj, A + Aj, –A + Aj, A + Aj, A + Aj, –A – Aj, –A + Aj, A + Aj, –A + Aj, –A + Aj, –A + Aj, –A – Aj, A – Aj, A – Aj, A + Aj, A + Aj, –A + Aj, –A – Aj, A + Aj, –A – Aj, A + Aj, A – Aj, –A + Aj, A – Aj, A – Aj, A + Aj, –A – Aj, –A + Aj, –A – Aj, –A + Aj, –A + Aj, A + Aj, –A + Aj, A – Aj, –A + Aj |
| 2 | –A + Aj, A + Aj, –A + Aj, –A – Aj, –A + Aj, –A – Aj, A + Aj, –A + Aj, A + Aj, A – Aj, –A – Aj, –A + Aj, A – Aj, A – Aj, –A + Aj, –A – Aj, –A + Aj, A + Aj, A + Aj, –A + Aj, –A + Aj, A + Aj, –A – Aj, A – Aj, –A + Aj, –A + Aj, A + Aj, A + Aj, A – Aj, –A + Aj, A + Aj, A – Aj, A + Aj, –A + Aj, A – Aj, –A – Aj, –A – Aj, –A – Aj, A – Aj, –A – Aj, –A – Aj, A + Aj, A – Aj, –A – Aj, A – Aj, A – Aj, A – Aj, A + Aj, –A + Aj, –A + Aj, –A – Aj, –A – Aj, A – Aj, A + Aj, –A – Aj, A + Aj, –A – Aj, –A + Aj, A – Aj, –A + Aj, –A + Aj, –A – Aj, A + Aj, A – Aj, A + Aj, A – Aj, A – Aj, –A – Aj, A – Aj, –A + Aj, A – Aj, A + Aj |
| 3 | A – Aj, –A – Aj, A – Aj, A + Aj, A – Aj, A + Aj, –A – Aj, A – Aj, –A – Aj, –A + Aj, A + Aj, A – Aj, –A + Aj, –A + Aj, A – Aj, A + Aj, A – Aj, –A – Aj, –A – Aj, A – Aj, A – Aj, –A – Aj, A + Aj, –A + Aj, A – Aj, A – Aj, –A – Aj, –A – Aj, –A + Aj, A – Aj, –A – Aj, –A + Aj, –A – Aj, A – Aj, –A + Aj, A + Aj, A + Aj, A + Aj, –A + Aj, A + Aj, A + Aj, –A – |

TABLE 25-4-continued

| Index | Pilot sequence |
|---|---|
| | Aj, −A + Aj, A + Aj, −A + Aj, −A + Aj, −A + Aj, −A − Aj, A − Aj, A − Aj, A + Aj, A + Aj, −A + Aj, −A − Aj, A + Aj, −A − Aj, A + Aj, A − Aj, −A + Aj, A − Aj, A − Aj, A + Aj, −A − Aj, −A + Aj, −A − Aj, −A + Aj, −A + Aj, A + Aj, −A + Aj, A − Aj, −A + Aj, −A − Aj |
| 4 | A + Aj, −A + Aj, A + Aj, −A + Aj, −A − Aj, −A + Aj, −A − Aj, A + Aj, −A + Aj, A + Aj, A − Aj, −A − Aj, −A + Aj, A − Aj, A − Aj, −A + Aj, −A − Aj, −A + Aj, A + Aj, A + Aj, −A + Aj, −A + Aj, A + Aj, −A − Aj, A − Aj, −A + Aj, −A + Aj, A + Aj, A + Aj, A − Aj, −A + Aj, A + Aj, A − Aj, A + Aj, −A + Aj, A − Aj, −A − Aj, −A − Aj, −A − Aj, A − Aj, −A − Aj, −A − Aj, A + Aj, A − Aj, −A − Aj, A − Aj, A − Aj, A − Aj, A + Aj, −A + Aj, −A + Aj, −A − Aj, −A − Aj, A − Aj, A + Aj, −A − Aj, A + Aj, −A − Aj, −A + Aj, A − Aj, −A + Aj, −A + Aj, −A − Aj, A + Aj, A − Aj, A + Aj, A − Aj, A − Aj, −A − Aj, A − Aj, −A + Aj, A − Aj |

TABLE 25-5

| Index | Pilot sequence |
|---|---|
| 1 | −A − Aj, A + Aj, −A − Aj, −A + Aj, −A − Aj, −A − Aj, A − Aj, −A − Aj, A − Aj, −A + Aj, A + Aj, A + Aj, −A − Aj, A + Aj, −A + Aj, A − Aj, −A + Aj, A − Aj, −A − Aj, −A + Aj, −A + Aj, A + Aj, A + Aj, A − Aj, −A − Aj, −A − Aj, −A − Aj, −A + Aj, −A − Aj, A − Aj, −A + Aj, −A + Aj, −A − Aj, −A + Aj, −A + Aj, −A + Aj, −A − Aj, A + Aj, A − Aj, −A − Aj, A − Aj, A + Aj, −A − Aj, A − Aj, A − Aj, A + Aj, A + Aj, −A − Aj, −A + Aj, A − Aj, A + Aj, A + Aj, A − Aj, A − Aj, A + Aj, −A + Aj, A + Aj, −A − Aj, −A − Aj, A + Aj, −A + Aj, −A − Aj, A − Aj, A + Aj, A − Aj, −A + Aj, A + Aj, −A + Aj, A + Aj, A − Aj, A + Aj, A − Aj |
| 2 | −A + Aj, A + Aj, −A − Aj, A + Aj, A − Aj, A + Aj, A + Aj, −A + Aj, A + Aj, −A + Aj, A − Aj, −A − Aj, −A − Aj, A + Aj, −A − Aj, A − Aj, −A + Aj, A − Aj, −A + Aj, A + Aj, A − Aj, A − Aj, −A − Aj, −A − Aj, −A + Aj, A + Aj, A + Aj, A + Aj, A − Aj, A + Aj, −A + Aj, A − Aj, A − Aj, A + Aj, A − Aj, A − Aj, A − Aj, A + Aj, −A − Aj, −A + Aj, A + Aj, −A + Aj, −A − Aj, A + Aj, −A + Aj, −A + Aj, −A − Aj, −A − Aj, A + Aj, A − Aj, −A + Aj, −A − Aj, −A − Aj, −A + Aj, −A + Aj, −A − Aj, A − Aj, −A − Aj, A + Aj, A + Aj, −A − Aj, A − Aj, A + Aj, −A + Aj, −A − Aj, −A + Aj, A − Aj, −A − Aj, A − Aj, −A − Aj, −A + Aj, −A − Aj |
| 3 | A − Aj, −A − Aj, A + Aj, −A − Aj, −A + Aj, −A − Aj, −A − Aj, A − Aj, −A − Aj, A − Aj, −A + Aj, A + Aj, A + Aj, −A − Aj, A + Aj, −A + Aj, A − Aj, −A + Aj, A − Aj, −A − Aj, −A + Aj, −A + Aj, A + Aj, A + Aj, A − Aj, −A − Aj, −A − Aj, −A − Aj, −A + Aj, −A − Aj, A − Aj, −A + Aj, −A + Aj, −A − Aj, −A + Aj, −A + Aj, −A + Aj, −A − Aj, A + Aj, A − Aj, −A − Aj, A − Aj, A + Aj, −A − Aj, A − Aj, A − Aj, A + Aj, A + Aj, −A − Aj, −A + Aj, A − Aj, A + Aj, A + Aj, A − Aj, A − Aj, A + Aj, −A + Aj, A + Aj, −A − Aj, −A − Aj, A + Aj, −A + Aj, −A − Aj, A − Aj, A + Aj, A − Aj, −A + Aj, A + Aj, −A + Aj, A + Aj, A − Aj, A + Aj |
| 4 | A + Aj, −A − Aj, A + Aj, A − Aj, A + Aj, A + Aj, −A + Aj, A + Aj, −A + Aj, A − Aj, −A − Aj, −A − Aj, A + Aj, −A − Aj, A − Aj, −A + Aj, A − Aj, −A + Aj, A + Aj, A − Aj, A − Aj, −A − Aj, −A − Aj, −A + Aj, A + Aj, A + Aj, A + Aj, A − Aj, A + Aj, −A + Aj, A − Aj, A − Aj, A + Aj, A − Aj, A − Aj, A − Aj, A + Aj, −A − Aj, −A + Aj, A + Aj, −A + Aj, −A − Aj, A + Aj, −A + Aj, −A + Aj, −A − Aj, −A − Aj, A + Aj, A − Aj, −A + Aj, −A − Aj, −A − Aj, −A + Aj, −A + Aj, −A − Aj, A − Aj, −A − Aj, A + Aj, A + Aj, −A − Aj, A − Aj, A + Aj, −A + Aj, −A − Aj, −A + Aj, A − Aj, −A − Aj, A − Aj, −A − Aj, −A + Aj, −A − Aj, −A + Aj |

TABLE 25-6

| Index | Pilot sequence |
|---|---|
| 1 | −A − Aj, A + Aj, −A − Aj, −A + Aj, −A − Aj, −A − Aj, A − Aj, −A − Aj, A − Aj, −A + Aj, A + Aj, A + Aj, −A − Aj, A + Aj, −A + Aj, A − Aj, −A + Aj, A − Aj, −A − Aj, −A + Aj, −A + Aj, A + Aj, A + Aj, A − Aj, −A − Aj, −A − Aj, −A − Aj, −A + Aj, −A − Aj, A − Aj, −A + Aj, −A + Aj, −A − Aj, −A + Aj, −A + Aj, −A + Aj, −A − Aj, A + Aj, A − Aj, −A − Aj, A − Aj, A + Aj, −A − Aj, A − Aj, A − Aj, A + Aj, A + Aj, −A − Aj, −A + Aj, A − Aj, A + Aj, A + Aj, A − Aj, A − Aj, A + Aj, −A + Aj, A + Aj, −A − Aj, −A − Aj, A + Aj, −A + Aj, −A − Aj, A − Aj, A + Aj, A − Aj, −A + Aj, A + Aj, −A + Aj, A + Aj, A − Aj, A + Aj, A − Aj |
| 2 | −A + Aj, A + Aj, −A − Aj, A + Aj, A − Aj, A + Aj, A + Aj, −A + Aj, A + Aj, −A + Aj, A − Aj, −A − Aj, −A − Aj, A + Aj, −A − Aj, A − Aj, −A + Aj, A − Aj, −A + Aj, A + Aj, A − Aj, A − Aj, −A − Aj, −A − Aj, −A + Aj, A + Aj, A + Aj, A + Aj, A − Aj, A + Aj, −A + Aj, A − Aj, A − Aj, A + Aj, A − Aj, A − Aj, A − Aj, A + Aj, −A − Aj, −A + Aj, A + Aj, −A + Aj, −A − Aj, A + Aj, −A + Aj, −A + Aj, −A − Aj, −A − Aj, A + Aj, A − Aj, −A + Aj, −A − Aj, −A − Aj, −A + Aj, −A + Aj, −A − Aj, A − Aj, −A − Aj, A + Aj, A + Aj, −A − Aj, A − Aj, A + Aj, −A + Aj, −A − Aj, −A + Aj, A − Aj, −A − Aj, A − Aj, −A − Aj, −A + Aj, −A − Aj |
| 3 | A − Aj, −A − Aj, A + Aj, −A − Aj, −A + Aj, −A − Aj, −A − Aj, A − Aj, −A − Aj, A − Aj, −A + Aj, A + Aj, A + Aj, −A − Aj, A + Aj, −A + Aj, A − Aj, −A + Aj, A − Aj, −A − Aj, −A + Aj, −A + Aj, A + Aj, A + Aj, A − Aj, −A − Aj, −A − Aj, −A − Aj, −A + Aj, −A − Aj, A − Aj, −A + Aj, −A + Aj, −A − Aj, −A + Aj, −A + Aj, −A + Aj, −A − Aj, A + Aj, A − Aj, −A − Aj, A − Aj, A + Aj, −A − Aj, A − Aj, A − Aj, A + Aj, A + Aj, −A − Aj, −A + Aj, A − Aj, A + Aj, A + Aj, A − Aj, A − Aj, A + Aj, −A + Aj, A + Aj, −A − Aj, −A − Aj, A + Aj, −A + Aj, −A − Aj, A − Aj, A + Aj, A − Aj, −A + Aj, A + Aj, −A + Aj, A + Aj, A − Aj, A + Aj |
| 4 | A + Aj, −A − Aj, A + Aj, A − Aj, A + Aj, A + Aj, −A + Aj, A + Aj, −A + Aj, A − Aj, −A − Aj, −A − Aj, A + Aj, −A − Aj, A − Aj, −A + Aj, A − Aj, −A + Aj, A + Aj, A − Aj, A − Aj, −A − Aj, −A − Aj, −A + Aj, A + Aj, A + Aj, A + Aj, A − Aj, A + Aj, −A + Aj, A − Aj, A − Aj, A + Aj, A − Aj, A − Aj, A − Aj, A + Aj, −A − Aj, −A + Aj, A + Aj, −A + Aj, −A − Aj, A + Aj, −A + Aj, −A + Aj, −A − Aj, −A − Aj, A + Aj, A − Aj, −A + Aj, −A − Aj, −A − Aj, −A + Aj, −A + Aj, −A − Aj, A − Aj, −A − Aj, A + Aj, A + Aj, −A − Aj, A − Aj, A + Aj, −A + Aj, −A − Aj, −A + Aj, A − Aj, −A − Aj, A − Aj, −A − Aj, −A + Aj, −A − Aj, −A + Aj |

(19) Particularly, when $N_{PS}$=75, the pilot sequence is one item in the following Table 26.

TABLE 26

| Index | Polarization | Pilot sequence |
|---|---|---|
| 1 | Polarization 1 | −A + Aj, −A − Aj, A + Aj, A − Aj, A − Aj, A + Aj, −A + Aj, −A + Aj, A + Aj, A − Aj, −A + Aj, −A + Aj, A + Aj, −A + Aj, −A − Aj, A − Aj, A − Aj, −A − Aj, −A + Aj, −A − Aj, A + Aj, −A + Aj, A + Aj, −A − Aj, A − Aj, −A + Aj, A + Aj, A + Aj, −A − Aj, A + Aj, A + Aj, −A − Aj, −A − Aj, A − Aj, A + Aj, A + Aj, A − Aj, A + Aj, A − Aj, A + Aj, −A + Aj, A − Aj, A − Aj, −A + Aj, A − Aj, −A + Aj, A + Aj, −A − Aj, −A + Aj, −A − Aj, −A − Aj, −A − Aj, −A − Aj, A + Aj, A − Aj, −A + Aj, A − Aj, A − Aj, A − Aj, A + Aj, A − Aj, −A − Aj, −A − Aj, −A + Aj, −A + Aj, −A + Aj, A − Aj, −A − Aj, A − Aj, A − Aj, −A + Aj, −A + Aj, −A − Aj, −A − Aj, A + Aj, −A + Aj |
| | Polarization 2 | −A − Aj, −A + Aj, A − Aj, A + Aj, A + Aj, A − Aj, −A − Aj, −A − Aj, A − Aj, A + Aj, −A − Aj, −A − Aj, A − Aj, −A − Aj, −A + Aj, A + Aj, −A + Aj, −A − Aj, −A + Aj, A − Aj, −A − Aj, A − Aj, −A + Aj, A + Aj, −A − Aj, A − Aj, A − Aj, −A + Aj, A − Aj, A − Aj, −A + Aj, −A + Aj, A + Aj, A − Aj, A − Aj, A + Aj, A − Aj, A + Aj, A − Aj, −A − Aj, A + Aj, A + Aj, −A − Aj, A + Aj, −A − Aj, A − Aj, −A + Aj, −A − Aj, −A + Aj, −A + Aj, −A + Aj, −A + Aj, A − Aj, A + Aj, −A − Aj, A + Aj, A + Aj, A + Aj, A − Aj, A + Aj, −A + Aj, −A + Aj, −A − Aj, −A − Aj, −A − Aj, A + Aj, −A + Aj, A + Aj, A + Aj, −A − Aj, −A − Aj, −A + Aj, −A + Aj, A − Aj, −A − Aj |
| 2 | Polarization 1 | −A + Aj, −A − Aj, A + Aj, A − Aj, A − Aj, A + Aj, −A + Aj, −A + Aj, A + Aj, A − Aj, −A + Aj, −A + Aj, A + Aj, −A + Aj, −A − Aj, A − Aj, A − Aj, −A − Aj, −A + Aj, −A − Aj, A + Aj, −A + Aj, A + Aj, −A − Aj, A − Aj, −A + Aj, A + Aj, A + Aj, −A − Aj, A + Aj, A + Aj, −A − Aj, −A − Aj, A − Aj, A + Aj, A + Aj, A − Aj, A + Aj, A − Aj, A + Aj, −A + Aj, A − Aj, A − Aj, −A + Aj, A − Aj, −A + Aj, A + Aj, −A − Aj, −A + Aj, −A − Aj, −A − Aj, −A − Aj, −A − Aj, A + Aj, A − Aj, −A + Aj, A − Aj, A − Aj, A − Aj, A + Aj, A − Aj, −A − Aj, −A − Aj, −A + Aj, −A + Aj, −A + Aj, A − Aj, −A − Aj, A − Aj, A − Aj, −A + Aj, −A + Aj, −A − Aj, −A − Aj, A + Aj, −A + Aj |
| | Polarization 2 | A + Aj, A − Aj, −A + Aj, −A − Aj, −A − Aj, −A + Aj, A + Aj, A + Aj, −A + Aj, −A − Aj, A + Aj, A + Aj, −A + Aj, A + Aj, A − Aj, −A − Aj, A − Aj, A + Aj, A − Aj, −A + Aj, A + Aj, −A + Aj, A − Aj, −A − Aj, A + Aj, −A + Aj, −A + Aj, A − Aj, −A + Aj, −A + Aj, A − Aj, A − Aj, −A − Aj, −A + Aj, −A + Aj, −A − Aj, −A + Aj, −A − Aj, −A + Aj, A + Aj, −A − Aj, −A − Aj, A + Aj, −A − Aj, A + Aj, −A + Aj, A − Aj, A + Aj, A − Aj, A − Aj, A − Aj, A − Aj, −A + Aj, −A − Aj, A + Aj, −A − Aj, −A − Aj, −A − Aj, −A + Aj, −A − Aj, A − Aj, A − Aj, A + Aj, A + Aj, A + Aj, −A − Aj, A − Aj, −A − Aj, −A − Aj, A + Aj, A + Aj, A − Aj, A − Aj, −A + Aj, A + Aj |
| 3 | Polarization 1 | −A + Aj, −A − Aj, A + Aj, A − Aj, A − Aj, A + Aj, −A + Aj, −A + Aj, A + Aj, A − Aj, −A + Aj, −A + Aj, A + Aj, −A + Aj, −A − Aj, A − Aj, A − Aj, −A − Aj, −A + Aj, −A − Aj, A + Aj, −A + Aj, A + Aj, −A − Aj, A − Aj, −A + Aj, A + Aj, A + Aj, −A − Aj, A + Aj, A + Aj, −A − Aj, −A − Aj, A − Aj, A + Aj, A + Aj, A − Aj, A + Aj, A − Aj, A + Aj, −A + Aj, A − Aj, A − Aj, −A + Aj, A − Aj, −A + Aj, A + Aj, −A − Aj, −A + Aj, −A − Aj, −A − Aj, −A − Aj, −A − Aj, A + Aj, A − Aj, −A + Aj, A − Aj, A − Aj, A − Aj, A + Aj, A − Aj, −A − Aj, −A − Aj, −A + Aj, −A + Aj, −A + Aj, A − Aj, −A − Aj, A − Aj, A − Aj, −A + Aj, −A + Aj, −A − Aj, −A − Aj, A + Aj, −A + Aj |
| | Polarization 2 | A + Aj, A + Aj, A − Aj, −A + Aj, −A − Aj, −A − Aj, −A + Aj, A + Aj, A + Aj, −A + Aj, −A − Aj, A + Aj, A + Aj, −A + Aj, A + Aj, A − Aj, −A − Aj, A − Aj, A + Aj, A − Aj, −A + Aj, A + Aj, −A + Aj, A − Aj, −A − Aj, A + Aj, −A + Aj, −A + Aj, A − Aj, −A + Aj, −A + Aj, A − Aj, A − Aj, −A − Aj, −A + Aj, −A + Aj, −A − Aj, −A − Aj, −A + Aj, −A − Aj, −A + Aj, A + Aj, −A − Aj, −A − Aj, A + Aj, −A − Aj, A + Aj, −A + Aj, A − Aj, A + Aj, A − Aj, A − Aj, A − Aj, A − Aj, −A + Aj, −A − Aj, A + Aj, −A − Aj, −A − Aj, −A − Aj, −A + Aj, −A − Aj, A − Aj, A − Aj, A + Aj, A + Aj, A + Aj, −A − Aj, A − Aj, −A − Aj, −A − Aj, A + Aj, A + Aj, A − Aj, A − Aj, −A + Aj |
| 4 | Polarization 1 | −A + Aj, −A + Aj, −A − Aj, A + Aj, A − Aj, A − Aj, A + Aj, −A + Aj, −A + Aj, A + Aj, A − Aj, −A + Aj, −A + Aj, A + Aj, −A + Aj, −A − Aj, A − Aj, A − Aj, −A − Aj, −A + Aj, −A − Aj, A + Aj, −A + Aj, A + Aj, −A − Aj, A − Aj, −A + Aj, A + Aj, A + Aj, −A − Aj, A + Aj, A + Aj, −A − Aj, −A − Aj, A − Aj, A + Aj, A + Aj, A − Aj, A + Aj, A − Aj, A + Aj, −A + Aj, A − Aj, A − Aj, −A + Aj, A − Aj, −A + Aj, A + Aj, −A − Aj, −A + Aj, −A − Aj, −A − Aj, −A − Aj, −A − Aj, A + Aj, A − Aj, −A + Aj, A − Aj, A − Aj, A − Aj, A + Aj, A − Aj, −A − Aj, −A − Aj, −A + Aj, −A + Aj, −A + Aj, A − Aj, −A − Aj, A − Aj, A − Aj, −A + Aj, −A + Aj, −A − Aj, −A − Aj, A + Aj |
| | Polarization 2 | −A − Aj, −A − Aj, −A + Aj, A − Aj, A + Aj, A + Aj, A − Aj, −A − Aj, −A − Aj, A − Aj, A + Aj, −A − Aj, −A − Aj, A − Aj, −A − Aj, −A + Aj, A + Aj, −A + Aj, −A − Aj, −A + Aj, A − Aj, −A − Aj, A − Aj, −A + Aj, A + Aj, −A − Aj, A − Aj, A − Aj, −A + Aj, A − Aj, A − Aj, −A + Aj, −A + Aj, A + Aj, A − Aj, A − Aj, A + Aj, A − Aj, A + Aj, A − Aj, −A − Aj, A + Aj, A + Aj, −A − Aj, A + Aj, −A − Aj, A − Aj, −A + Aj, −A − Aj, −A + Aj, −A + Aj, −A + Aj, −A + Aj, A − Aj, A + Aj, −A − Aj, A + Aj, A + Aj, A + Aj, A − Aj, A + Aj, −A + Aj, −A + Aj, −A − Aj, −A − Aj, −A − Aj, A + Aj, −A + Aj, A + Aj, A + Aj, −A − Aj, −A − Aj, −A + Aj, −A + Aj, A − Aj |
| 5 | Polarization 1 | −A + Aj, −A + Aj, −A − Aj, A + Aj, A − Aj, A − Aj, A + Aj, −A + Aj, −A + Aj, A + Aj, A − Aj, −A + Aj, −A + Aj, A + Aj, −A + Aj, −A − Aj, A − Aj, A − Aj, −A − Aj, −A + Aj, −A − Aj, A + Aj, −A + Aj, A + Aj, −A − Aj, A − Aj, −A + Aj, A + Aj, A + Aj, −A − Aj, A + Aj, A + Aj, −A − Aj, −A − Aj, A − Aj, A + Aj, A + Aj, A − Aj, A + Aj, A − Aj, A + Aj, −A + Aj, A − Aj, A − Aj, −A + Aj, A − Aj, −A + Aj, A + Aj, −A − Aj, −A + Aj, −A − Aj, −A − Aj, −A − Aj, −A − Aj, A + Aj, A − Aj, −A + Aj, A − Aj, A − Aj, A − Aj, A + Aj, A − Aj, −A − Aj, −A − Aj, −A + Aj, −A + Aj, −A + Aj, A − Aj, −A − Aj, A − Aj, A − Aj, −A + Aj, −A + Aj, −A − Aj, −A − Aj, A + Aj |
| | Polarization 2 | −A − Aj, −A + Aj, A − Aj, A + Aj, A + Aj, A − Aj, −A − Aj, −A − Aj, A − Aj, A + Aj, −A − Aj, −A − Aj, A − Aj, −A − Aj, −A + Aj, A + Aj, −A + Aj, −A − Aj, −A + Aj, A − Aj, −A − Aj, A − Aj, −A + Aj, A + Aj, −A − Aj, A − Aj, A − Aj, −A + Aj, A − Aj, A − Aj, −A + Aj, −A + Aj, A + Aj, A − Aj, A − Aj, A + Aj, A − Aj, A + Aj, A − Aj, −A − Aj, A + Aj, A + Aj, −A − Aj, A + Aj, −A − Aj, A − Aj, −A + Aj, −A − Aj, −A + Aj, −A + Aj, −A + Aj, −A + Aj, A − Aj, A + Aj, −A − Aj, A + Aj, A + Aj, A + Aj, A − Aj, A + Aj, −A + Aj, −A + Aj, −A − Aj, −A − Aj, −A − Aj, A + Aj, −A + Aj, A + Aj, A + Aj, −A − Aj, −A − Aj, −A + Aj, −A + Aj, A − Aj, −A − Aj |
| 6 | Polarization 1 | −A + Aj, −A + Aj, −A − Aj, A + Aj, A − Aj, A − Aj, A + Aj, −A + Aj, −A + Aj, A + Aj, A − Aj, −A + Aj, −A + Aj, A + Aj, −A + Aj, −A − Aj, A − Aj, A − Aj, −A − Aj, −A + Aj, −A − Aj, A + Aj, −A + Aj, A + Aj, −A − Aj, A − Aj, −A + Aj, A + Aj, A + Aj, −A − Aj, A + Aj, A + Aj, −A − Aj, −A − Aj, A − Aj, A + Aj, A + Aj, A − Aj, A + Aj, A − Aj, A + Aj, −A + Aj, A − Aj, A − Aj, −A + Aj, A − Aj, −A + Aj, A + Aj, −A − Aj, −A + Aj, −A − Aj, −A − Aj, −A − Aj, −A − Aj, A + Aj, A − Aj, −A + Aj, A − |

TABLE 26-continued

| Index | Polarization | Pilot sequence |
|---|---|---|
| | | Aj, A − Aj, A − Aj, A + Aj, A − Aj, −A − Aj, −A − Aj, −A + Aj, −A + Aj, −A + Aj, A − Aj, −A − Aj, A − Aj, A − Aj, −A + Aj, −A + Aj, −A − Aj, −A − Aj, A + Aj |
| | Polarization 2 | A + Aj, A − Aj, −A + Aj, −A − Aj, −A − Aj, −A + Aj, A + Aj, A + Aj, −A + Aj, −A − Aj, A + Aj, A + Aj, −A + Aj, A + Aj, A − Aj, −A − Aj, A − Aj, A + Aj, A − Aj, −A + Aj, A + Aj, −A + Aj, A − Aj, −A − Aj, A + Aj, −A + Aj, −A + Aj, A − Aj, −A + Aj, −A + Aj, A − Aj, A − Aj, −A − Aj, −A + Aj, −A + Aj, −A − Aj, −A + Aj, −A − Aj, −A + Aj, A + Aj, −A − Aj, −A − Aj, A + Aj, −A − Aj, A + Aj, −A + Aj, A − Aj, A + Aj, A − Aj, A − Aj, A − Aj, A − Aj, −A + Aj, −A − Aj, A + Aj, −A − Aj, −A − Aj, −A − Aj, −A + Aj, −A − Aj, A − Aj, A − Aj, A + Aj, A + Aj, A + Aj, −A − Aj, A − Aj, −A − Aj, −A − Aj, A + Aj, A + Aj, A − Aj, A − Aj, −A + Aj, A + Aj |
| 7 | Polarization 1 | −A + Aj, −A + Aj, −A − Aj, A + Aj, A − Aj, A − Aj, A + Aj, −A + Aj, −A + Aj, A + Aj, A − Aj, −A + Aj, −A + Aj, A + Aj, −A + Aj, −A − Aj, A − Aj, −A − Aj, −A + Aj, −A − Aj, A + Aj, −A + Aj, A + Aj, −A − Aj, A − Aj, −A + Aj, A + Aj, A + Aj, −A − Aj, A + Aj, A + Aj, −A − Aj, −A − Aj, A − Aj, A + Aj, A + Aj, A − Aj, A + Aj, A − Aj, A + Aj, −A + Aj, A − Aj, A − Aj, −A + Aj, A − Aj, −A + Aj, A + Aj, −A − Aj, −A + Aj, −A − Aj, −A − Aj, −A − Aj, −A − Aj, A + Aj, A − Aj, −A + Aj, A − Aj, A − Aj, A − Aj, A + Aj, A − Aj, −A − Aj, −A − Aj, −A + Aj, −A + Aj, −A + Aj, A − Aj, −A − Aj, A − Aj, A − Aj, −A + Aj, −A + Aj, −A − Aj, −A − Aj, A + Aj |
| | Polarization 2 | A + Aj, A + Aj, A − Aj, −A + Aj, −A − Aj, −A − Aj, −A + Aj, A + Aj, A + Aj, −A + Aj, −A − Aj, A + Aj, A + Aj, −A + Aj, A + Aj, A − Aj, −A − Aj, A − Aj, A + Aj, A − Aj, −A + Aj, A + Aj, −A + Aj, A − Aj, −A − Aj, A + Aj, −A + Aj, −A + Aj, A − Aj, −A + Aj, −A + Aj, A − Aj, A − Aj, −A − Aj, −A + Aj, −A + Aj, −A − Aj, −A + Aj, −A − Aj, −A + Aj, A + Aj, −A − Aj, −A − Aj, A + Aj, −A − Aj, A + Aj, −A + Aj, A − Aj, A + Aj, A − Aj, A − Aj, A − Aj, A − Aj, −A + Aj, −A − Aj, A + Aj, −A − Aj, −A − Aj, −A − Aj, −A + Aj, −A − Aj, A − Aj, A − Aj, A + Aj, A + Aj, A + Aj, −A − Aj, A − Aj, −A − Aj, −A − Aj, A + Aj, A + Aj, A − Aj, A − Aj, −A + Aj |
| 8 | Polarization 1 | A − Aj, A − Aj, A + Aj, −A − Aj, −A + Aj, −A + Aj, −A − Aj, A − Aj, A − Aj, −A − Aj, −A + Aj, A − Aj, A − Aj, −A − Aj, A − Aj, A + Aj, −A + Aj, A + Aj, A − Aj, A + Aj, −A − Aj, A − Aj, −A − Aj, A + Aj, −A + Aj, A − Aj, −A − Aj, −A − Aj, A + Aj, −A − Aj, −A − Aj, A + Aj, A + Aj, −A + Aj, −A − Aj, −A − Aj, −A + Aj, −A − Aj, −A + Aj, −A − Aj, A − Aj, −A + Aj, −A + Aj, A − Aj, −A + Aj, A − Aj, −A − Aj, A + Aj, A − Aj, A + Aj, A + Aj, A + Aj, A + Aj, −A − Aj, −A + Aj, A − Aj, −A + Aj, −A + Aj, −A + Aj, −A − Aj, −A + Aj, A + Aj, A + Aj, A − Aj, A − Aj, A − Aj, −A + Aj, A + Aj, −A + Aj, −A + Aj, A − Aj, A − Aj, A + Aj, A + Aj, −A − Aj |
| | Polarization 2 | −A − Aj, −A − Aj, −A + Aj, A − Aj, A + Aj, A + Aj, A − Aj, −A − Aj, −A − Aj, A − Aj, A + Aj, −A − Aj, −A − Aj, A − Aj, −A − Aj, −A + Aj, A + Aj, −A + Aj, −A − Aj, −A + Aj, A − Aj, −A − Aj, A − Aj, −A + Aj, A + Aj, −A − Aj, A − Aj, A − Aj, −A + Aj, A − Aj, A − Aj, −A + Aj, −A + Aj, A + Aj, A − Aj, A − Aj, A + Aj, A − Aj, A + Aj, A − Aj, −A − Aj, A + Aj, A + Aj, −A − Aj, A + Aj, −A − Aj, A − Aj, −A + Aj, −A − Aj, −A + Aj, −A + Aj, −A + Aj, −A + Aj, A − Aj, A + Aj, −A − Aj, A + Aj, A + Aj, A + Aj, A − Aj, A + Aj, −A + Aj, −A + Aj, −A − Aj, −A − Aj, −A − Aj, A + Aj, −A + Aj, A + Aj, A + Aj, −A − Aj, −A − Aj, −A + Aj, −A + Aj, A − Aj |
| 9 | Polarization 1 | A − Aj, A − Aj, A + Aj, −A − Aj, −A + Aj, −A + Aj, −A − Aj, A − Aj, A − Aj, −A − Aj, −A + Aj, A − Aj, A − Aj, −A − Aj, A − Aj, A + Aj, −A + Aj, A + Aj, A − Aj, A + Aj, −A − Aj, A − Aj, −A − Aj, A + Aj, −A + Aj, A − Aj, −A − Aj, −A − Aj, A + Aj, −A − Aj, −A − Aj, A + Aj, A + Aj, −A + Aj, −A − Aj, −A − Aj, −A + Aj, −A − Aj, −A + Aj, −A − Aj, A − Aj, −A + Aj, −A + Aj, A − Aj, −A + Aj, A − Aj, −A − Aj, A + Aj, A − Aj, A + Aj, A + Aj, A + Aj, A + Aj, −A − Aj, −A + Aj, A − Aj, −A + Aj, −A + Aj, −A + Aj, −A − Aj, −A + Aj, A + Aj, A + Aj, A − Aj, A − Aj, A − Aj, −A + Aj, A + Aj, −A + Aj, −A + Aj, A − Aj, A − Aj, A + Aj, A + Aj, −A − Aj |
| | Polarization 2 | −A − Aj, −A + Aj, A − Aj, A + Aj, A + Aj, A − Aj, −A − Aj, −A − Aj, A − Aj, A + Aj, −A − Aj, −A − Aj, A − Aj, −A − Aj, −A + Aj, A + Aj, −A + Aj, −A − Aj, −A + Aj, A − Aj, −A − Aj, A − Aj, −A + Aj, A + Aj, −A − Aj, A − Aj, A − Aj, −A + Aj, A − Aj, A − Aj, −A + Aj, −A + Aj, A + Aj, A − Aj, A − Aj, A + Aj, A − Aj, A + Aj, A − Aj, −A − Aj, A + Aj, A + Aj, −A − Aj, A + Aj, −A − Aj, A − Aj, −A + Aj, −A − Aj, −A + Aj, −A + Aj, −A + Aj, −A + Aj, A − Aj, A + Aj, −A − Aj, A + Aj, A + Aj, A + Aj, A − Aj, A + Aj, −A + Aj, −A + Aj, −A − Aj, −A − Aj, −A − Aj, A + Aj, −A + Aj, A + Aj, A + Aj, −A − Aj, −A − Aj, −A + Aj, −A + Aj, A − Aj, −A − Aj |
| 10 | Polarization 1 | A − Aj, A − Aj, A + Aj, −A − Aj, −A + Aj, −A + Aj, −A − Aj, A − Aj, A − Aj, −A − Aj, −A + Aj, A − Aj, A − Aj, −A − Aj, A − Aj, A + Aj, −A + Aj, A + Aj, A − Aj, A + Aj, −A − Aj, A − Aj, −A − Aj, A + Aj, −A + Aj, A − Aj, −A − Aj, −A − Aj, A + Aj, −A − Aj, −A − Aj, A + Aj, A + Aj, −A + Aj, −A − Aj, −A − Aj, −A + Aj, −A − Aj, −A + Aj, −A − Aj, A − Aj, −A + Aj, −A + Aj, A − Aj, −A + Aj, A − Aj, −A − Aj, A + Aj, A − Aj, A + Aj, A + Aj, A + Aj, A + Aj, −A − Aj, −A + Aj, A − Aj, −A + Aj, −A + Aj, −A + Aj, −A − Aj, −A + Aj, A + Aj, A + Aj, A − Aj, A − Aj, A − Aj, −A + Aj, A + Aj, −A + Aj, −A + Aj, A − Aj, A − Aj, A + Aj, A + Aj, −A − Aj |
| | Polarization 2 | A + Aj, A − Aj, −A + Aj, −A − Aj, −A − Aj, −A + Aj, A + Aj, A + Aj, −A + Aj, −A − Aj, A + Aj, A + Aj, −A + Aj, A + Aj, A − Aj, −A − Aj, A − Aj, A + Aj, A − Aj, −A + Aj, A + Aj, −A + Aj, A − Aj, −A − Aj, A + Aj, −A + Aj, −A + Aj, A − Aj, −A + Aj, −A + Aj, A − Aj, A − Aj, −A − Aj, −A + Aj, −A + Aj, −A − Aj, −A + Aj, −A − Aj, −A + Aj, A + Aj, −A − Aj, −A − Aj, A + Aj, −A − Aj, A + Aj, −A + Aj, A − Aj, A + Aj, A − Aj, A − Aj, A − Aj, A − Aj, −A + Aj, −A − Aj, A + Aj, −A − Aj, −A − Aj, −A − Aj, −A + Aj, −A − Aj, A − Aj, A − Aj, A + Aj, A + Aj, A + Aj, −A − Aj, A − Aj, −A − Aj, −A − Aj, A + Aj, A + Aj, A − Aj, A − Aj, −A + Aj, A + Aj |
| 11 | Polarization 1 | A − Aj, A − Aj, A + Aj, −A − Aj, −A + Aj, −A + Aj, −A − Aj, A − Aj, A − Aj, −A − Aj, −A + Aj, A − Aj, A − Aj, −A − Aj, A − Aj, A + Aj, −A + Aj, A + Aj, A − Aj, A + Aj, −A − Aj, A − Aj, −A − Aj, A + Aj, −A + Aj, A − Aj, −A − Aj, −A − Aj, A + Aj, −A − Aj, −A − Aj, A + Aj, A + Aj, −A + Aj, −A − Aj, −A − Aj, −A + Aj, −A − Aj, −A + Aj, −A − Aj, A − Aj, −A + Aj, −A + Aj, A − Aj, −A + Aj, A − Aj, −A − Aj, A + Aj, A − Aj, A + Aj, A + Aj, A + Aj, A + Aj, −A − Aj, −A + Aj, A − Aj, −A + Aj, −A + Aj, −A + Aj, −A − Aj, −A + Aj, A + Aj, A + Aj, A − Aj, A − Aj, A − Aj, −A + Aj, A + Aj, −A + Aj, −A + Aj, A − Aj, A − Aj, A + Aj, A + Aj, −A − Aj |
| | Polarization 2 | A + Aj, A + Aj, A − Aj, −A + Aj, −A − Aj, −A − Aj, −A + Aj, A + Aj, A + Aj, −A + Aj, −A − Aj, A + Aj, A + Aj, −A + Aj, A + Aj, A − Aj, −A − Aj, A − Aj, A + Aj, A − Aj, −A + Aj, A + Aj, −A + Aj, A − Aj, −A − Aj, A + Aj, −A + Aj, −A + Aj, A − Aj, −A + Aj, −A + Aj, A − Aj, A − Aj, −A − Aj, −A + Aj, −A + Aj, −A − Aj, −A + Aj, −A − Aj, −A + Aj, A + Aj, −A − Aj, −A − Aj, A + Aj, −A − Aj, A + Aj, −A + Aj, A − Aj, A + Aj, A − Aj, A − Aj, A − Aj, A − Aj, −A + Aj, −A − Aj, A + Aj, −A − |

TABLE 26-continued

| Index | Polarization | Pilot sequence |
|---|---|---|
| | | Aj, –A – Aj, –A – Aj, –A + Aj, –A – Aj, A – Aj, A – Aj, A + Aj, A + Aj, A + Aj, –A – Aj, A – Aj, –A – Aj, –A – Aj, A + Aj, A + Aj, A – Aj, A – Aj, –A + Aj |
| 12 | Polarization 1 | A – Aj, A + Aj, –A – Aj, –A + Aj, –A + Aj, –A – Aj, A – Aj, A – Aj, –A – Aj, –A + Aj, A – Aj, A – Aj, –A – Aj, A – Aj, A + Aj, –A + Aj, A + Aj, A – Aj, A + Aj, –A – Aj, A – Aj, –A – Aj, A + Aj, –A + Aj, A – Aj, –A – Aj, –A – Aj, A + Aj, –A – Aj, –A – Aj, A + Aj, A + Aj, –A + Aj, –A – Aj, –A – Aj, –A + Aj, –A – Aj, –A + Aj, –A – Aj, A – Aj, –A + Aj, –A + Aj, A – Aj, –A + Aj, A – Aj, –A – Aj, A + Aj, A – Aj, A + Aj, A + Aj, A + Aj, A + Aj, –A – Aj, –A + Aj, A – Aj, –A + Aj, –A + Aj, –A + Aj, –A – Aj, –A + Aj, A + Aj, A + Aj, A – Aj, A – Aj, A – Aj, –A + Aj, A + Aj, –A + Aj, –A + Aj, A – Aj, A – Aj, A + Aj, A + Aj, –A – Aj, A – Aj |
| | Polarization 2 | –A – Aj, –A – Aj, –A + Aj, A – Aj, A + Aj, A + Aj, A – Aj, –A – Aj, –A – Aj, A – Aj, A + Aj, –A – Aj, –A – Aj, A – Aj, –A – Aj, –A + Aj, A + Aj, –A + Aj, –A – Aj, –A + Aj, A – Aj, –A – Aj, A – Aj, –A + Aj, A + Aj, –A – Aj, A – Aj, A – Aj, –A + Aj, A – Aj, A – Aj, –A + Aj, –A + Aj, A + Aj, A – Aj, A – Aj, A + Aj, A – Aj, A + Aj, A – Aj, –A – Aj, A + Aj, A + Aj, –A – Aj, A + Aj, –A – Aj, A – Aj, –A + Aj, –A – Aj, –A + Aj, –A + Aj, –A + Aj, –A + Aj, A – Aj, A + Aj, –A – Aj, A + Aj, A + Aj, A + Aj, A – Aj, A + Aj, –A + Aj, –A + Aj, –A – Aj, –A – Aj, –A – Aj, A + Aj, –A + Aj, A + Aj, A + Aj, –A – Aj, –A – Aj, –A + Aj, –A + Aj, A – Aj |
| 13 | Polarization 1 | A – Aj, A + Aj, –A – Aj, –A + Aj, –A + Aj, –A – Aj, A – Aj, A – Aj, –A – Aj, –A + Aj, A – Aj, A – Aj, –A – Aj, A – Aj, A + Aj, –A + Aj, A + Aj, A – Aj, A + Aj, –A – Aj, A – Aj, –A – Aj, A + Aj, –A + Aj, A – Aj, –A – Aj, –A – Aj, A + Aj, –A – Aj, –A – Aj, A + Aj, A + Aj, –A + Aj, –A – Aj, –A – Aj, –A + Aj, –A – Aj, –A + Aj, –A – Aj, A – Aj, –A + Aj, –A + Aj, A – Aj, –A + Aj, A – Aj, –A – Aj, A + Aj, A – Aj, A + Aj, A + Aj, A + Aj, A + Aj, –A – Aj, –A + Aj, A – Aj, –A + Aj, –A + Aj, –A + Aj, –A – Aj, –A + Aj, A + Aj, A + Aj, A – Aj, A – Aj, A – Aj, –A + Aj, A + Aj, –A + Aj, –A + Aj, A – Aj, A – Aj, A + Aj, A + Aj, –A – Aj, A – Aj |
| | Polarization 2 | –A – Aj, –A + Aj, A – Aj, A + Aj, A + Aj, A – Aj, –A – Aj, –A – Aj, A – Aj, A + Aj, –A – Aj, –A – Aj, A – Aj, –A – Aj, –A + Aj, A + Aj, –A + Aj, –A – Aj, –A + Aj, A – Aj, –A – Aj, A – Aj, –A + Aj, A + Aj, –A – Aj, A – Aj, A – Aj, –A + Aj, A – Aj, A – Aj, –A + Aj, –A + Aj, A + Aj, A – Aj, A – Aj, A + Aj, A – Aj, A + Aj, A – Aj, –A – Aj, A + Aj, A + Aj, –A – Aj, A + Aj, –A – Aj, A – Aj, –A + Aj, –A – Aj, –A + Aj, –A + Aj, –A + Aj, –A + Aj, A – Aj, A + Aj, –A – Aj, A + Aj, A + Aj, A + Aj, A – Aj, A + Aj, –A + Aj, –A + Aj, –A – Aj, –A – Aj, –A – Aj, A + Aj, –A + Aj, A + Aj, A + Aj, –A – Aj, –A – Aj, –A + Aj, –A + Aj, A – Aj, –A – Aj |
| 14 | Polarization 1 | A – Aj, A + Aj, –A – Aj, –A + Aj, –A + Aj, –A – Aj, A – Aj, A – Aj, –A – Aj, –A + Aj, A – Aj, A – Aj, –A – Aj, A – Aj, A + Aj, –A + Aj, A + Aj, A – Aj, A + Aj, –A – Aj, A – Aj, –A – Aj, A + Aj, –A + Aj, A – Aj, –A – Aj, –A – Aj, A + Aj, –A – Aj, –A – Aj, A + Aj, A + Aj, –A + Aj, –A – Aj, –A – Aj, –A + Aj, –A – Aj, –A + Aj, –A – Aj, A – Aj, –A + Aj, –A + Aj, A – Aj, –A + Aj, A – Aj, –A – Aj, A + Aj, A – Aj, A + Aj, A + Aj, A + Aj, A + Aj, –A – Aj, –A + Aj, A – Aj, –A + Aj, –A + Aj, –A + Aj, –A – Aj, –A + Aj, A + Aj, A + Aj, A – Aj, A – Aj, A – Aj, –A + Aj, A + Aj, –A + Aj, –A + Aj, A – Aj, A – Aj, A + Aj, A + Aj, –A – Aj, A – Aj |
| | Polarization 2 | A + Aj, A – Aj, –A + Aj, –A – Aj, –A – Aj, –A + Aj, A + Aj, A + Aj, –A + Aj, –A – Aj, A + Aj, A + Aj, –A + Aj, A + Aj, A – Aj, –A – Aj, A – Aj, A + Aj, A – Aj, –A + Aj, A + Aj, –A + Aj, A – Aj, –A – Aj, A + Aj, –A + Aj, –A + Aj, A – Aj, –A + Aj, –A + Aj, A – Aj, A – Aj, –A – Aj, –A + Aj, –A + Aj, –A – Aj, –A + Aj, –A – Aj, –A + Aj, A + Aj, –A – Aj, –A – Aj, A + Aj, –A – Aj, A + Aj, –A + Aj, A – Aj, A + Aj, A – Aj, A – Aj, A – Aj, A – Aj, –A + Aj, –A – Aj, A + Aj, –A – Aj, –A – Aj, –A – Aj, –A + Aj, –A – Aj, A – Aj, A – Aj, A + Aj, A + Aj, A + Aj, –A – Aj, A – Aj, –A – Aj, –A – Aj, A + Aj, A + Aj, A – Aj, A – Aj, –A + Aj, A + Aj |
| 15 | Polarization 1 | –A + Aj, –A – Aj, A + Aj, A + Aj, –A + Aj, –A + Aj, A – Aj, A – Aj, A + Aj, A – Aj, –A + Aj, –A + Aj, –A + Aj, A + Aj, A + Aj, A – Aj, –A – Aj, A – Aj, A – Aj, A – Aj, –A + Aj, A – Aj, –A – Aj, A + Aj, A + Aj, A + Aj, A + Aj, –A + Aj, A + Aj, –A – Aj, –A + Aj, A – Aj, –A + Aj, A – Aj, A – Aj, –A + Aj, –A – Aj, A – Aj, –A – Aj, A – Aj, –A – Aj, –A – Aj, A – Aj, A + Aj, A + Aj, –A – Aj, –A – Aj, A + Aj, –A – Aj, –A – Aj, –A + Aj, A – Aj, A + Aj, –A – Aj, –A + Aj, –A – Aj, A + Aj, –A + Aj, A + Aj, A – Aj, A + Aj, –A + Aj, –A – Aj, –A + Aj, –A + Aj, A – Aj, –A – Aj, –A + Aj, –A + Aj, –A – Aj, A – Aj, A – Aj, –A – Aj, A + Aj, –A + Aj |
| | Polarization 2 | –A – Aj, –A + Aj, A – Aj, A – Aj, –A – Aj, –A – Aj, A + Aj, A + Aj, A – Aj, A + Aj, –A – Aj, –A – Aj, –A – Aj, A – Aj, A – Aj, A + Aj, –A + Aj, A + Aj, A + Aj, A + Aj, –A – Aj, A + Aj, –A + Aj, A – Aj, A – Aj, A – Aj, A – Aj, –A – Aj, A – Aj, –A + Aj, –A – Aj, A + Aj, –A – Aj, A + Aj, A + Aj, –A – Aj, –A + Aj, A + Aj, –A + Aj, A + Aj, –A + Aj, –A + Aj, A + Aj, A – Aj, A – Aj, –A + Aj, –A + Aj, A – Aj, –A + Aj, –A + Aj, –A – Aj, A + Aj, A – Aj, –A + Aj, –A – Aj, –A + Aj, A – Aj, –A – Aj, A – Aj, A + Aj, A – Aj, –A – Aj, –A + Aj, –A – Aj, –A – Aj, A + Aj, –A + Aj, –A – Aj, –A – Aj, –A + Aj, A + Aj, A + Aj, –A + Aj, A – Aj, –A – Aj |
| 16 | Polarization 1 | –A + Aj, –A – Aj, A + Aj, A + Aj, –A + Aj, –A + Aj, A – Aj, A – Aj, A + Aj, A – Aj, –A + Aj, –A + Aj, –A + Aj, A + Aj, A + Aj, A – Aj, –A – Aj, A – Aj, A – Aj, A – Aj, –A + Aj, A – Aj, –A – Aj, A + Aj, A + Aj, A + Aj, A + Aj, –A + Aj, A + Aj, –A – Aj, –A + Aj, A – Aj, –A + Aj, A – Aj, A – Aj, –A + Aj, –A – Aj, A – Aj, –A – Aj, A – Aj, –A – Aj, –A – Aj, A – Aj, A + Aj, A + Aj, –A – Aj, –A – Aj, A + Aj, –A – Aj, –A – Aj, –A + Aj, A – Aj, A + Aj, –A – Aj, –A + Aj, –A – Aj, A + Aj, –A + Aj, A + Aj, A – Aj, A + Aj, –A + Aj, –A – Aj, –A + Aj, –A + Aj, A – Aj, –A – Aj, –A + Aj, –A + Aj, –A – Aj, A – Aj, A – Aj, –A – Aj, A + Aj, –A + Aj |
| | Polarization 2 | A + Aj, A – Aj, –A + Aj, –A + Aj, A + Aj, A + Aj, –A – Aj, –A – Aj, –A + Aj, –A – Aj, A + Aj, A + Aj, A + Aj, –A + Aj, –A + Aj, –A – Aj, A – Aj, A – Aj, –A – Aj, –A – Aj, –A – Aj, A + Aj, –A – Aj, A – Aj, –A + Aj, –A + Aj, –A + Aj, –A + Aj, A + Aj, –A + Aj, A – Aj, A + Aj, –A – Aj, A + Aj, –A – Aj, –A – Aj, A + Aj, A – Aj, –A – Aj, A – Aj, –A – Aj, A – Aj, A – Aj, –A – Aj, –A + Aj, –A + Aj, A – Aj, A – Aj, –A + Aj, A – Aj, A – Aj, A + Aj, –A – Aj, –A + Aj, A – Aj, A + Aj, A – Aj, –A + Aj, A + Aj, –A + Aj, –A – Aj, –A + Aj, A + Aj, A – Aj, A + Aj, A + Aj, –A – Aj, A – Aj, A + Aj, A + Aj, A – Aj, –A – Aj, –A – Aj, A – Aj, –A + Aj, A + Aj |
| 17 | Polarization 1 | A – Aj, A + Aj, –A – Aj, –A – Aj, A – Aj, A – Aj, –A + Aj, –A + Aj, –A – Aj, –A + Aj, A – Aj, A – Aj, A – Aj, –A – Aj, –A – Aj, –A + Aj, A + Aj, –A + Aj, –A + Aj, –A + Aj, A – Aj, –A + Aj, A + Aj, –A – Aj, –A – Aj, –A – Aj, –A – Aj, A – Aj, –A – Aj, A + Aj, A – Aj, –A + Aj, A – Aj, –A + Aj, –A + Aj, A – Aj, A + Aj, –A + Aj, A + Aj, –A + Aj, A + Aj, A + Aj, –A + Aj, –A – Aj, –A – Aj, A + Aj, A + Aj, –A – Aj, A + Aj, A + Aj, A – Aj, –A + Aj, –A – Aj, A + Aj, A – Aj, A + Aj, |

TABLE 26-continued

| Index | Polarization | Pilot sequence |
|---|---|---|
| | | −A − Aj, A − Aj, −A − Aj, −A + Aj, −A − Aj, A − Aj, A + Aj, A − Aj, A − Aj, −A + Aj, A + Aj, A − Aj, A − Aj, A + Aj, −A + Aj, −A + Aj, A + Aj, −A − Aj, A − Aj |
| | Polarization 2 | −A − Aj, −A + Aj, A − Aj, A − Aj, −A − Aj, −A − Aj, A + Aj, A + Aj, A − Aj, A + Aj, −A − Aj, −A − Aj, −A − Aj, A − Aj, A − Aj, A + Aj, −A + Aj, A + Aj, A + Aj, A + Aj, −A − Aj, A + Aj, −A + Aj, A − Aj, A − Aj, A − Aj, A − Aj, −A − Aj, A − Aj, −A + Aj, −A − Aj, A + Aj, −A − Aj, A + Aj, A + Aj, −A − Aj, −A + Aj, A + Aj, −A + Aj, A + Aj, −A + Aj, −A + Aj, A + Aj, A − Aj, A − Aj, −A + Aj, −A + Aj, A − Aj, −A + Aj, −A + Aj, −A − Aj, A + Aj, A − Aj, −A + Aj, −A − Aj, −A + Aj, A − Aj, −A − Aj, A − Aj, A + Aj, A − Aj, −A − Aj, −A + Aj, −A − Aj, −A − Aj, A + Aj, −A + Aj, −A − Aj, −A − Aj, −A + Aj, A + Aj, A + Aj, −A + Aj, A − Aj, −A − Aj |
| 18 | Polarization 1 | A − Aj, A + Aj, −A − Aj, −A − Aj, A − Aj, A − Aj, −A + Aj, −A + Aj, −A − Aj, −A + Aj, A − Aj, A − Aj, A − Aj, −A − Aj, −A − Aj, −A + Aj, A + Aj, −A + Aj, −A + Aj, −A + Aj, A − Aj, −A + Aj, A + Aj, −A − Aj, −A − Aj, −A − Aj, −A − Aj, A − Aj, −A − Aj, A + Aj, A − Aj, −A + Aj, A − Aj, −A + Aj, −A + Aj, A − Aj, A + Aj, −A + Aj, A + Aj, −A + Aj, A + Aj, A + Aj, −A + Aj, −A − Aj, −A − Aj, A + Aj, A + Aj, −A − Aj, A + Aj, A + Aj, A − Aj, −A + Aj, −A − Aj, A + Aj, A − Aj, A + Aj, −A − Aj, A − Aj, −A − Aj, −A + Aj, −A − Aj, A − Aj, A + Aj, A − Aj, A − Aj, −A + Aj, A + Aj, A − Aj, A − Aj, A + Aj, −A + Aj, −A + Aj, A + Aj, −A − Aj, A − Aj |
| | Polarization 2 | A + Aj, A − Aj, −A + Aj, −A + Aj, A + Aj, A + Aj, −A − Aj, −A − Aj, −A + Aj, −A − Aj, A + Aj, A + Aj, A + Aj, −A + Aj, −A + Aj, −A − Aj, A − Aj, −A − Aj, −A − Aj, −A − Aj, A + Aj, −A − Aj, A − Aj, −A + Aj, −A + Aj, −A + Aj, −A + Aj, A + Aj, −A + Aj, A − Aj, A + Aj, −A − Aj, A + Aj, −A − Aj, −A − Aj, A + Aj, A − Aj, −A − Aj, A − Aj, −A − Aj, A − Aj, A − Aj, −A − Aj, −A + Aj, −A + Aj, A − Aj, A − Aj, −A + Aj, A − Aj, A − Aj, A + Aj, −A − Aj, −A + Aj, A − Aj, A + Aj, A − Aj, −A + Aj, A + Aj, −A + Aj, −A − Aj, −A + Aj, A + Aj, A − Aj, A + Aj, A + Aj, −A − Aj, A − Aj, A + Aj, A + Aj, A − Aj, −A − Aj, −A − Aj, A − Aj, −A + Aj, A + Aj |
| 19 | Polarization 1 | −A + Aj, −A − Aj, −A − Aj, A + Aj, A − Aj, −A + Aj, A + Aj, A − Aj, A + Aj, −A − Aj, −A + Aj, A + Aj, −A − Aj, −A + Aj, −A − Aj, −A − Aj, −A + Aj, −A + Aj, −A − Aj, −A − Aj, A + Aj, −A − Aj, A − Aj, A − Aj, −A + Aj, A − Aj, A + Aj, A + Aj, −A − Aj, A − Aj, A + Aj, A − Aj, A + Aj, −A + Aj, A − Aj, A − Aj, A − Aj, −A − Aj, A − Aj, −A − Aj, A − Aj, −A + Aj, A + Aj, A + Aj, −A − Aj, −A + Aj, A + Aj, A − Aj, A − Aj, −A + Aj, A + Aj, −A − Aj, A − Aj, A − Aj, A + Aj, −A + Aj, A − Aj, −A − Aj, −A + Aj, −A + Aj, −A + Aj, −A + Aj, −A + Aj, A + Aj, −A − Aj, −A + Aj, A − Aj, A + Aj, −A − Aj, A − Aj, −A + Aj, A + Aj, −A + Aj, A + Aj, −A − Aj |
| | Polarization 2 | −A − Aj, −A + Aj, −A + Aj, A + Aj, A − Aj, −A − Aj, −A − Aj, −A + Aj, A − Aj, −A − Aj, −A − Aj, A − Aj, −A − Aj, A + Aj, −A − Aj, −A + Aj, −A − Aj, A − Aj, A − Aj, −A − Aj, A + Aj, −A + Aj, −A − Aj, A − Aj, −A + Aj, −A − Aj, A + Aj, −A − Aj, −A − Aj, A + Aj, A + Aj, −A − Aj, −A + Aj, −A + Aj, −A + Aj, A + Aj, A − Aj, A − Aj, A + Aj, −A − Aj, −A + Aj, −A + Aj, A + Aj, −A − Aj, A + Aj, −A + Aj, A − Aj, A + Aj, A + Aj, A − Aj, −A + Aj, A − Aj, −A + Aj, A − Aj, A − Aj, −A − Aj, −A + Aj, −A − Aj, A − Aj, −A − Aj, A + Aj, A − Aj, A − Aj, −A + Aj, −A + Aj, A + Aj, A + Aj, −A + Aj, A − Aj, A − Aj, −A − Aj, A + Aj, A + Aj, A + Aj, A + Aj |
| 20 | Polarization 1 | A − Aj, −A − Aj, −A + Aj, A + Aj, −A − Aj, A + Aj, A + Aj, −A + Aj, A − Aj, −A − Aj, A + Aj, A − Aj, −A − Aj, A − Aj, −A − Aj, −A − Aj, A − Aj, A − Aj, −A − Aj, −A + Aj, A − Aj, −A + Aj, −A + Aj, −A − Aj, A + Aj, −A + Aj, A + Aj, A − Aj, −A + Aj, −A + Aj, A + Aj, −A + Aj, A − Aj, A + Aj, −A + Aj, −A + Aj, −A − Aj, −A + Aj, −A − Aj, −A + Aj, −A − Aj, A + Aj, A + Aj, A − Aj, −A − Aj, A + Aj, A + Aj, −A + Aj, −A − Aj, A + Aj, A − Aj, −A + Aj, −A + Aj, −A + Aj, A − Aj, A + Aj, −A − Aj, −A − Aj, A − Aj, A − Aj, A − Aj, A − Aj, A + Aj, A − Aj, −A − Aj, A + Aj, −A + Aj, A − Aj, −A + Aj, −A − Aj, A + Aj, A − Aj, A + Aj, A − Aj, −A − Aj |
| | Polarization 2 | −A − Aj, −A + Aj, −A + Aj, A + Aj, A − Aj, −A − Aj, −A − Aj, −A + Aj, A − Aj, −A − Aj, −A − Aj, A − Aj, −A − Aj, A + Aj, −A − Aj, −A + Aj, −A − Aj, A − Aj, A − Aj, −A − Aj, A + Aj, −A + Aj, −A − Aj, A − Aj, −A + Aj, −A − Aj, A + Aj, −A − Aj, −A − Aj, A + Aj, A + Aj, −A − Aj, −A + Aj, −A + Aj, −A + Aj, A + Aj, A − Aj, A − Aj, A + Aj, −A − Aj, −A + Aj, −A + Aj, A + Aj, −A − Aj, A + Aj, −A + Aj, A − Aj, A + Aj, A + Aj, A − Aj, −A + Aj, A − Aj, −A + Aj, A − Aj, A − Aj, −A − Aj, −A + Aj, −A − Aj, A − Aj, −A − Aj, A + Aj, A − Aj, A − Aj, −A + Aj, −A + Aj, A + Aj, A + Aj, −A + Aj, A − Aj, A − Aj, −A − Aj, A + Aj, A + Aj, A + Aj, A + Aj |
| 21 | Polarization 1 | A + Aj, −A + Aj, A + Aj, A + Aj, A − Aj, −A − Aj, −A + Aj, −A − Aj, −A − Aj, A + Aj, A − Aj, −A + Aj, A + Aj, A − Aj, A + Aj, −A − Aj, −A + Aj, A + Aj, −A − Aj, −A + Aj, −A − Aj, −A − Aj, −A + Aj, −A + Aj, −A − Aj, −A − Aj, A + Aj, −A − Aj, A − Aj, A − Aj, −A + Aj, A − Aj, A + Aj, A + Aj, −A − Aj, A − Aj, A + Aj, A − Aj, A + Aj, −A + Aj, A − Aj, A − Aj, A − Aj, −A − Aj, A − Aj, −A − Aj, A − Aj, −A + Aj, A + Aj, A + Aj, −A − Aj, −A + Aj, A + Aj, A − Aj, A − Aj, −A + Aj, A + Aj, −A − Aj, A − Aj, A − Aj, A + Aj, −A + Aj, A − Aj, −A − Aj, −A + Aj, −A + Aj, −A + Aj, −A + Aj, −A + Aj, A + Aj, −A − Aj, −A + Aj, A − Aj, A + Aj, −A − Aj |
| | Polarization 2 | −A − Aj, −A + Aj, −A + Aj, A + Aj, A − Aj, −A − Aj, −A − Aj, −A + Aj, A − Aj, −A − Aj, −A − Aj, A − Aj, −A − Aj, A + Aj, −A − Aj, −A + Aj, −A − Aj, A − Aj, A − Aj, −A − Aj, A + Aj, −A + Aj, −A − Aj, A − Aj, −A + Aj, −A − Aj, A + Aj, −A − Aj, −A − Aj, A + Aj, A + Aj, −A − Aj, −A + Aj, −A + Aj, −A + Aj, A + Aj, A − Aj, A − Aj, A + Aj, −A − Aj, −A + Aj, −A + Aj, A + Aj, −A − Aj, A + Aj, −A + Aj, A − Aj, A + Aj, A + Aj, A − Aj, −A + Aj, A − Aj, −A + Aj, A − Aj, A − Aj, −A − Aj, −A + Aj, −A − Aj, A − Aj, −A − Aj, A + Aj, A − Aj, A − Aj, −A + Aj, −A + Aj, A + Aj, A + Aj, −A + Aj, A − Aj, A − Aj, −A − Aj, A + Aj, A + Aj, A + Aj, A + Aj |
| 22 | Polarization 1 | −A + Aj, A + Aj, −A + Aj, A + Aj, −A − Aj, A − Aj, −A + Aj, A − Aj, A + Aj, −A − Aj, −A + Aj, A + Aj, −A + Aj, −A + Aj, −A + Aj, −A + Aj, −A − Aj, −A − Aj, A + Aj, −A + Aj, A − Aj, A − Aj, A − Aj, −A + Aj, A + Aj, −A − Aj, A − Aj, A + Aj, A + Aj, −A − Aj, −A + Aj, A + Aj, A + Aj, −A − Aj, A − Aj, −A − Aj, A − Aj, −A − Aj, A − Aj, A − Aj, A + Aj, −A + Aj, A − Aj, A + Aj, A − Aj, A − Aj, −A + Aj, A + Aj, A − Aj, A + Aj, −A − Aj, A − Aj, A − Aj, −A + Aj, A − Aj, −A − Aj, −A + Aj, −A + Aj, −A − Aj, −A − Aj, −A + Aj, −A − Aj, −A + Aj, A + Aj, −A − Aj, −A + Aj, A − Aj, A + Aj, A + Aj, −A − Aj, A + Aj, A − Aj, −A − Aj, −A + Aj, −A − Aj |
| | Polarization 2 | −A + Aj, A + Aj, A + Aj, A + Aj, A + Aj, −A − Aj, −A + Aj, −A + Aj, A − Aj, A + Aj, A + Aj, A − Aj, A − Aj, −A + Aj, −A + Aj, A + Aj, −A − Aj, −A + Aj, −A − Aj, A − Aj, −A − Aj, −A + Aj, −A + Aj, A − Aj, −A + Aj, A − Aj, −A + Aj, A + Aj, A + Aj, −A + Aj, A − Aj, A + Aj, −A − Aj, A + Aj, A − Aj, A − Aj, −A − Aj, A + Aj, −A + Aj, −A + Aj, A + Aj, A − Aj, A − Aj, A − Aj, −A − Aj, A + Aj, A + Aj, −A − Aj, −A − Aj, A + Aj, −A − Aj, A − Aj, −A + Aj, −A − Aj, A − Aj, A + Aj, −A − |

TABLE 26-continued

| Index | Polarization | Pilot sequence |
|---|---|---|
| | | Aj, −A + Aj, −A + Aj, −A − Aj, A − Aj, −A − Aj, A + Aj, −A − Aj, −A + Aj, −A − Aj, −A − Aj, −A + Aj, A − Aj, −A − Aj, −A − Aj, −A + Aj, A + Aj, A − Aj, A − Aj |
| 23 | Polarization 1 | A − Aj, −A − Aj, −A + Aj, A + Aj, −A + Aj, A + Aj, −A − Aj, A − Aj, −A + Aj, A − Aj, A + Aj, −A − Aj, −A + Aj, A + Aj, −A + Aj, −A + Aj, −A + Aj, −A + Aj, −A − Aj, −A − Aj, A + Aj, −A + Aj, A − Aj, A − Aj, A − Aj, −A + Aj, A + Aj, −A − Aj, A − Aj, A + Aj, A + Aj, −A − Aj, −A + Aj, A + Aj, A + Aj, −A − Aj, A − Aj, −A − Aj, A − Aj, −A − Aj, A − Aj, A − Aj, A + Aj, −A + Aj, A − Aj, A + Aj, A − Aj, A − Aj, −A + Aj, A + Aj, A − Aj, A + Aj, −A − Aj, A − Aj, A − Aj, −A + Aj, A − Aj, −A − Aj, −A + Aj, −A + Aj, −A − Aj, −A − Aj, −A + Aj, −A − Aj, −A + Aj, A + Aj, −A − Aj, −A + Aj, A − Aj, A + Aj, A + Aj, −A − Aj, A + Aj, A − Aj, −A − Aj |
| | Polarization 2 | −A + Aj, A + Aj, A + Aj, A + Aj, A + Aj, −A − Aj, −A + Aj, −A + Aj, A − Aj, A + Aj, A + Aj, A − Aj, A − Aj, −A + Aj, −A + Aj, A + Aj, −A − Aj, −A + Aj, −A − Aj, A − Aj, −A − Aj, −A + Aj, −A + Aj, A − Aj, −A + Aj, A − Aj, −A + Aj, A + Aj, A + Aj, −A + Aj, A − Aj, A + Aj, −A − Aj, A + Aj, A − Aj, A − Aj, −A − Aj, A + Aj, −A + Aj, −A + Aj, A + Aj, A − Aj, A − Aj, A − Aj, −A − Aj, A + Aj, A + Aj, −A − Aj, −A − Aj, A + Aj, −A − Aj, A − Aj, −A + Aj, −A − Aj, A − Aj, A + Aj, −A − Aj, −A + Aj, −A + Aj, −A − Aj, A − Aj, −A − Aj, A + Aj, −A − Aj, −A + Aj, −A − Aj, −A − Aj, −A + Aj, A − Aj, −A − Aj, −A − Aj, −A + Aj, A + Aj, A − Aj, A − Aj |
| 24 | Polarization 1 | A − Aj, A − Aj, A + Aj, A + Aj, −A − Aj, −A + Aj, A + Aj, −A − Aj, −A − Aj, A − Aj, −A + Aj, A − Aj, A + Aj, −A + Aj, A − Aj, −A + Aj, −A + Aj, A + Aj, A − Aj, A + Aj, −A + Aj, A + Aj, A − Aj, −A + Aj, −A − Aj, A − Aj, A + Aj, −A + Aj, −A − Aj, A + Aj, A − Aj, A + Aj, −A − Aj, A + Aj, −A − Aj, A + Aj, A − Aj, A − Aj, A + Aj, A + Aj, A + Aj, A + Aj, A − Aj, A − Aj, −A − Aj, A − Aj, −A − Aj, −A − Aj, −A − Aj, A − Aj, −A + Aj, −A + Aj, −A + Aj, −A − Aj, −A − Aj, −A + Aj, −A + Aj, A − Aj, −A − Aj, −A − Aj, A − Aj, −A − Aj, A − Aj, −A + Aj, A + Aj, −A − Aj, −A + Aj, −A + Aj, −A + Aj, −A + Aj, A + Aj, −A + Aj, A − Aj, A − Aj, −A − Aj |
| | Polarization 2 | A − Aj, −A + Aj, −A + Aj, −A − Aj, −A − Aj, A − Aj, A + Aj, A + Aj, A − Aj, −A − Aj, A − Aj, −A + Aj, −A − Aj, A − Aj, −A − Aj, A + Aj, −A + Aj, −A + Aj, A − Aj, A + Aj, −A + Aj, −A + Aj, A + Aj, −A − Aj, −A + Aj, A − Aj, A + Aj, −A − Aj, −A + Aj, −A + Aj, A − Aj, A + Aj, A − Aj, A + Aj, A − Aj, A − Aj, −A + Aj, A − Aj, A − Aj, A − Aj, A − Aj, A − Aj, −A + Aj, A + Aj, A − Aj, −A − Aj, −A − Aj, −A − Aj, −A + Aj, A + Aj, −A − Aj, A + Aj, −A − Aj, −A − Aj, −A − Aj, A + Aj, −A + Aj, A + Aj, A + Aj, A − Aj, −A − Aj, −A + Aj, A + Aj, −A + Aj, −A − Aj, −A − Aj, A + Aj, −A − Aj, A + Aj, −A + Aj, −A − Aj, A − Aj, −A + Aj, A + Aj, A + Aj |
| 25 | Polarization 1 | A + Aj, −A − Aj, A − Aj, A − Aj, A + Aj, A + Aj, −A − Aj, −A + Aj, A + Aj, −A − Aj, −A − Aj, A − Aj, −A + Aj, A − Aj, A + Aj, −A + Aj, A − Aj, −A + Aj, −A + Aj, A + Aj, A − Aj, A + Aj, −A + Aj, A + Aj, A − Aj, −A + Aj, −A − Aj, A − Aj, A + Aj, −A + Aj, −A − Aj, A + Aj, A − Aj, A + Aj, −A − Aj, A + Aj, −A − Aj, A + Aj, A − Aj, A − Aj, A + Aj, A + Aj, A + Aj, A + Aj, A − Aj, A − Aj, −A − Aj, A − Aj, −A − Aj, −A − Aj, −A − Aj, A − Aj, −A + Aj, −A + Aj, −A + Aj, −A − Aj, −A − Aj, −A + Aj, −A + Aj, A − Aj, −A − Aj, −A − Aj, A − Aj, −A − Aj, A − Aj, −A + Aj, A + Aj, −A − Aj, −A + Aj, −A + Aj, −A + Aj, −A + Aj, A + Aj, −A + Aj, A − Aj |
| | Polarization 2 | A − Aj, −A + Aj, −A + Aj, −A − Aj, −A − Aj, A − Aj, A + Aj, A + Aj, A − Aj, −A − Aj, A − Aj, −A + Aj, −A − Aj, A − Aj, −A − Aj, A + Aj, −A + Aj, −A + Aj, A − Aj, A + Aj, −A + Aj, −A + Aj, A + Aj, −A − Aj, −A + Aj, A − Aj, A + Aj, −A − Aj, −A + Aj, −A + Aj, A − Aj, A + Aj, A − Aj, A + Aj, A − Aj, A − Aj, −A + Aj, A − Aj, A − Aj, A − Aj, A − Aj, A − Aj, −A + Aj, A + Aj, A − Aj, −A − Aj, −A − Aj, −A − Aj, −A + Aj, A + Aj, −A − Aj, A + Aj, −A − Aj, −A − Aj, −A − Aj, A + Aj, −A + Aj, A + Aj, A + Aj, A − Aj, −A − Aj, −A + Aj, A + Aj, −A + Aj, −A − Aj, −A − Aj, A + Aj, −A − Aj, A + Aj, −A + Aj, −A − Aj, A − Aj, −A + Aj, A + Aj, A + Aj |
| 26 | Polarization 1 | A + Aj, −A − Aj, A + Aj, A + Aj, A − Aj, −A + Aj, −A + Aj, −A + Aj, A + Aj, A − Aj, −A − Aj, A + Aj, A − Aj, −A − Aj, −A + Aj, −A − Aj, A + Aj, −A + Aj, A − Aj, A + Aj, −A − Aj, A − Aj, A + Aj, A + Aj, −A + Aj, A − Aj, A + Aj, A + Aj, −A − Aj, A − Aj, −A + Aj, −A + Aj, A − Aj, A − Aj, −A + Aj, A + Aj, −A + Aj, A − Aj, −A + Aj, A − Aj, −A + Aj, A + Aj, −A + Aj, −A + Aj, A + Aj, A + Aj, A + Aj, A + Aj, −A + Aj, −A − Aj, −A + Aj, −A − Aj, −A − Aj, −A − Aj, −A + Aj, −A − Aj, A − Aj, A − Aj, A − Aj, −A − Aj, −A − Aj, A − Aj, A + Aj, −A − Aj, −A − Aj, −A + Aj, −A − Aj, −A + Aj, −A − Aj, A + Aj, A − Aj, −A − Aj, A − Aj, A − Aj, A − Aj |
| | Polarization 2 | A − Aj, −A + Aj, −A + Aj, −A − Aj, −A − Aj, A − Aj, A + Aj, A + Aj, A − Aj, −A − Aj, A − Aj, −A + Aj, −A − Aj, A − Aj, −A − Aj, A + Aj, −A + Aj, −A + Aj, A − Aj, A + Aj, −A + Aj, −A + Aj, A + Aj, −A − Aj, −A + Aj, A − Aj, A + Aj, −A − Aj, −A + Aj, −A + Aj, A − Aj, A + Aj, A − Aj, A + Aj, A − Aj, A − Aj, −A + Aj, A − Aj, A − Aj, A − Aj, A − Aj, A − Aj, −A + Aj, A + Aj, A − Aj, −A − Aj, −A − Aj, −A − Aj, −A + Aj, A + Aj, −A − Aj, A + Aj, −A − Aj, −A − Aj, −A − Aj, A + Aj, −A + Aj, A + Aj, A + Aj, A − Aj, −A − Aj, −A + Aj, A + Aj, −A + Aj, −A − Aj, −A − Aj, A + Aj, −A − Aj, A + Aj, −A + Aj, −A − Aj, A − Aj, −A + Aj, A + Aj, A + Aj |
| 27 | Polarization 1 | −A + Aj, −A + Aj, A − Aj, A + Aj, A − Aj, A − Aj, A − Aj, A − Aj, −A − Aj, A + Aj, A − Aj, −A + Aj, −A − Aj, −A + Aj, −A − Aj, −A − Aj, −A + Aj, A − Aj, A − Aj, −A − Aj, −A − Aj, A − Aj, A − Aj, A − Aj, −A + Aj, −A − Aj, −A − Aj, −A − Aj, −A + Aj, −A − Aj, −A + Aj, −A + Aj, A + Aj, A + Aj, A + Aj, A + Aj, −A + Aj, −A + Aj, A + Aj, −A − Aj, A + Aj, −A − Aj, A + Aj, −A + Aj, A + Aj, −A − Aj, A − Aj, A + Aj, −A + Aj, −A − Aj, A − Aj, −A + Aj, A + Aj, A − Aj, A + Aj, −A + Aj, A + Aj, A − Aj, A − Aj, −A + Aj, A − Aj, A + Aj, −A + Aj, A − Aj, −A + Aj, −A − Aj, −A − Aj, A + Aj, A − Aj, −A − Aj, A + Aj, A + Aj, −A + Aj, −A + Aj, −A − Aj |
| | Polarization 2 | A + Aj, A + Aj, A + Aj, A − Aj, −A + Aj, −A − Aj, A − Aj, A + Aj, −A − Aj, A + Aj, −A − Aj, −A − Aj, A − Aj, A + Aj, A − Aj, −A − Aj, −A + Aj, A + Aj, A + Aj, A − Aj, A + Aj, −A − Aj, −A − Aj, −A − Aj, A + Aj, −A − Aj, A + Aj, A − Aj, −A − Aj, −A − Aj, −A − Aj, −A + Aj, A + Aj, A − Aj, −A + Aj, −A + Aj, −A + Aj, −A + Aj, −A + Aj, A − Aj, −A + Aj, −A + Aj, A + Aj, −A + Aj, A + Aj, −A + Aj, A − Aj, A − Aj, −A − Aj, A + Aj, −A + Aj, A − Aj, −A − Aj, A + Aj, A − Aj, A − Aj, A + Aj, −A + Aj, A − Aj, A − Aj, A + Aj, −A − Aj, −A + Aj, −A − Aj, A − Aj, −A + Aj, −A − Aj, −A + Aj, A + Aj, A + Aj, −A + Aj, −A − Aj, −A − Aj, A − Aj, A − Aj |

(20) When $N_{PS}$=80, if a remainder of $N_{TS}$ divided by 4 is 1, the pilot sequence is one item in Table 27-1. If a remainder of $N_{TS}$ divided by 4 is 3, the pilot sequence is one item in Table 27-1 or Table 27-2. Alternatively, any item is selected from Table 27-3 as a pilot sequence in one polarization direction, and any item is selected from Table 27-4 as a pilot sequence in the other polarization direction. Alternatively, any item is selected from Table 27-5 as a pilot sequence in one polarization direction, and any item is selected from Table 27-6 as a pilot sequence in the other polarization direction.

TABLE 27-1

| Index | Polarization | Pilot sequence |
|---|---|---|
| 1 | Polarization 1 | −A − Aj, −A + Aj, A + Aj, −A + Aj, −A + Aj, −A + Aj, −A − Aj, −A − Aj, A + Aj, −A − Aj, A + Aj, −A + Aj, −A + Aj, A + Aj, −A + Aj, A + Aj, −A − Aj, A + Aj, A + Aj, −A − Aj, −A − Aj, A − Aj, −A − Aj, −A − Aj, A − Aj, A − Aj, −A + Aj, −A + Aj, −A + Aj, A − Aj, −A + Aj, −A − Aj, A + Aj, −A − Aj, −A + Aj, −A − Aj, A − Aj, −A − Aj, A − Aj, A + Aj, −A + Aj, A − Aj, A − Aj, −A + Aj, A + Aj, −A − Aj, −A + Aj, A − Aj, A + Aj, A + Aj, −A + Aj, −A − Aj, −A + Aj, A + Aj, A + Aj, −A − Aj, A − Aj, A + Aj, A + Aj, A + Aj, −A + Aj, A − Aj, −A − Aj, −A − Aj, −A − Aj, A + Aj, A − Aj, A − Aj, A − Aj, A − Aj, −A − Aj, −A + Aj, A − Aj, −A + Aj, A − Aj, A − Aj, A + Aj, A − Aj, A + Aj, A − Aj |
| 2 | Polarization 2 | −A + Aj, −A − Aj, A − Aj, −A − Aj, −A − Aj, −A − Aj, −A + Aj, −A + Aj, A − Aj, −A + Aj, A − Aj, −A − Aj, −A − Aj, A − Aj, −A − Aj, A − Aj, −A + Aj, A − Aj, A − Aj, −A + Aj, −A + Aj, A + Aj, −A + Aj, −A + Aj, A + Aj, A + Aj, −A − Aj, −A − Aj, −A − Aj, A + Aj, −A − Aj, −A + Aj, A − Aj, −A + Aj, −A − Aj, −A + Aj, A + Aj, −A + Aj, A + Aj, A − Aj, −A − Aj, A + Aj, A + Aj, −A − Aj, A − Aj, −A + Aj, −A − Aj, A + Aj, A − Aj, A − Aj, −A − Aj, −A + Aj, −A − Aj, A − Aj, A − Aj, −A + Aj, A + Aj, A − Aj, A − Aj, A − Aj, −A − Aj, A + Aj, −A + Aj, −A + Aj, −A + Aj, A − Aj, A + Aj, A + Aj, A + Aj, A + Aj, −A + Aj, −A − Aj, A + Aj, −A − Aj, A + Aj, A + Aj, A − Aj, A + Aj, A − Aj, A + Aj |
| | Polarization 1 | −A − Aj, −A + Aj, A + Aj, −A + Aj, −A + Aj, −A + Aj, −A − Aj, −A − Aj, A + Aj, −A − Aj, A + Aj, −A + Aj, −A + Aj, A + Aj, −A + Aj, A + Aj, −A − Aj, A + Aj, A + Aj, −A − Aj, −A − Aj, A − Aj, −A − Aj, −A − Aj, A − Aj, A − Aj, −A + Aj, −A + Aj, −A + Aj, A − Aj, −A + Aj, −A − Aj, A + Aj, −A − Aj, −A + Aj, −A − Aj, A − Aj, −A − Aj, A − Aj, A + Aj, −A + Aj, A − Aj, A − Aj, −A + Aj, A + Aj, −A − Aj, −A + Aj, A − Aj, A + Aj, A + Aj, −A + Aj, −A − Aj, −A + Aj, A + Aj, A + Aj, −A − Aj, A − Aj, A + Aj, A + Aj, A + Aj, −A + Aj, A − Aj, −A − Aj, −A − Aj, −A − Aj, A + Aj, A − Aj, A − Aj, A − Aj, A − Aj, −A − Aj, −A + Aj, A − Aj, −A + Aj, A − Aj, A − Aj, A + Aj, A − Aj, A + Aj, A − Aj |
| | Polarization 2 | A − Aj, A + Aj, −A + Aj, A + Aj, A + Aj, A + Aj, A − Aj, A − Aj, −A + Aj, A − Aj, −A + Aj, A + Aj, A + Aj, −A + Aj, A + Aj, −A + Aj, A − Aj, −A + Aj, −A + Aj, A − Aj, A − Aj, −A − Aj, A − Aj, A − Aj, −A − Aj, −A − Aj, A + Aj, A + Aj, A + Aj, −A − Aj, A + Aj, A − Aj, −A + Aj, A − Aj, A + Aj, A − Aj, −A − Aj, A − Aj, −A − Aj, −A + Aj, A + Aj, −A − Aj, −A − Aj, A + Aj, −A + Aj, A − Aj, A + Aj, −A − Aj, −A + Aj, −A + Aj, A + Aj, A − Aj, A + Aj, −A + Aj, −A + Aj, A − Aj, −A − Aj, −A + Aj, −A + Aj, −A + Aj, A + Aj, −A − Aj, A − Aj, A − Aj, A − Aj, −A + Aj, −A − Aj, −A − Aj, −A − Aj, −A − Aj, A − Aj, A + Aj, −A − Aj, A + Aj, −A − Aj, −A − Aj, −A + Aj, −A − Aj, −A + Aj, −A − Aj |
| 3 | Polarization 1 | −A + Aj, −A − Aj, A − Aj, −A − Aj, −A − Aj, −A − Aj, −A + Aj, −A + Aj, A − Aj, −A + Aj, A − Aj, −A − Aj, −A − Aj, A − Aj, −A − Aj, A − Aj, −A + Aj, A − Aj, A − Aj, −A + Aj, −A + Aj, A + Aj, −A + Aj, −A + Aj, A + Aj, A + Aj, −A − Aj, −A − Aj, −A − Aj, A + Aj, −A − Aj, −A + Aj, A − Aj, −A + Aj, −A − Aj, −A + Aj, A + Aj, −A + Aj, A + Aj, A − Aj, −A − Aj, A + Aj, A + Aj, −A − Aj, A − Aj, −A + Aj, −A − Aj, A + Aj, A − Aj, A − Aj, −A − Aj, −A + Aj, −A − Aj, A − Aj, A − Aj, −A + Aj, A + Aj, A − Aj, A − Aj, A − Aj, −A − Aj, A + Aj, −A + Aj, −A + Aj, −A + Aj, A − Aj, A + Aj, A + Aj, A + Aj, A + Aj, −A + Aj, −A − Aj, A + Aj, −A − Aj, A + Aj, A + Aj, A − Aj, A + Aj, A − Aj, A + Aj |
| | Polarization 2 | A + Aj, A − Aj, −A − Aj, A − Aj, A − Aj, A − Aj, A + Aj, A + Aj, −A − Aj, A + Aj, −A − Aj, A − Aj, A − Aj, −A − Aj, A − Aj, −A − Aj, A + Aj, −A − Aj, −A − Aj, A + Aj, A + Aj, −A + Aj, A + Aj, A + Aj, −A + Aj, −A + Aj, A − Aj, A − Aj, A − Aj, −A + Aj, A − Aj, A + Aj, −A − Aj, A + Aj, A − Aj, A + Aj, −A + Aj, A + Aj, −A + Aj, −A − Aj, A − Aj, −A + Aj, −A + Aj, A − Aj, −A − Aj, A + Aj, A − Aj, −A + Aj, −A − Aj, −A − Aj, A − Aj, A + Aj, A − Aj, −A − Aj, −A − Aj, A + Aj, −A + Aj, −A − Aj, −A − Aj, −A − Aj, A − Aj, −A + Aj, A + Aj, A + Aj, A + Aj, −A − Aj, −A + Aj, −A + Aj, −A + Aj, −A + Aj, A + Aj, A − Aj, −A + Aj, A − Aj, −A + Aj, −A + Aj, −A − Aj, −A + Aj, −A − Aj, −A + Aj |
| 4 | Polarization 1 | A − Aj, A + Aj, −A + Aj, A + Aj, A + Aj, A + Aj, A − Aj, A − Aj, −A + Aj, A − Aj, −A + Aj, A + Aj, A + Aj, −A + Aj, A + Aj, −A + Aj, A − Aj, −A + Aj, −A + Aj, A − Aj, A − Aj, −A − Aj, A − Aj, A − Aj, −A − Aj, −A − Aj, A + Aj, A + Aj, A + Aj, −A − Aj, A + Aj, A − Aj, −A + Aj, A − Aj, A + Aj, A − Aj, −A − Aj, A − Aj, −A − Aj, −A + Aj, A + Aj, −A − Aj, −A − Aj, A + Aj, −A + Aj, A − Aj, A + Aj, −A − Aj, −A + Aj, −A + Aj, A + Aj, A − Aj, A + Aj, −A + Aj, −A + Aj, A − Aj, −A − Aj, −A + Aj, −A + Aj, −A + Aj, A + Aj, −A − Aj, A − Aj, A − Aj, A − Aj, −A + Aj, −A − Aj, −A − Aj, −A − Aj, −A − Aj, A − Aj, A + Aj, −A − Aj, A + Aj, −A − Aj, −A − Aj, −A + Aj, −A − Aj, −A + Aj, −A − Aj |
| | Polarization 2 | A + Aj, A − Aj, −A − Aj, A − Aj, A − Aj, A − Aj, A + Aj, A + Aj, −A − Aj, A + Aj, −A − Aj, A − Aj, A − Aj, −A − Aj, A − Aj, −A − Aj, A + Aj, −A − Aj, −A − Aj, A + Aj, A + Aj, −A + Aj, A + Aj, A + Aj, −A + Aj, −A + Aj, A − Aj, A − Aj, A − Aj, −A + Aj, A − Aj, A + Aj, −A − Aj, A + Aj, A − Aj, A + Aj, −A + Aj, A + Aj, −A + Aj, −A − Aj, A − Aj, −A + Aj, −A + Aj, A − Aj, −A − Aj, A + Aj, A − Aj, −A + Aj, −A − Aj, −A − Aj, A − Aj, A + Aj, A − Aj, −A − Aj, −A − Aj, A + Aj, −A + Aj, −A − Aj, −A − Aj, −A − Aj, A − Aj, −A + Aj, A + Aj, A + Aj, A + Aj, −A − Aj, −A + Aj, −A + Aj, −A + Aj, −A + Aj, A + Aj, A − Aj, −A + Aj, A − Aj, −A + Aj, −A + Aj, −A − Aj, −A + Aj, −A − Aj, −A + Aj |
| 5 | Polarization 1 | −A − Aj, A − Aj, −A − Aj, A − Aj, −A − Aj, −A − Aj, A + Aj, −A − Aj, A + Aj, −A + Aj, −A − Aj, −A − Aj, −A − Aj, −A − Aj, A − Aj, −A + Aj, −A + Aj, −A + Aj, −A − Aj, A + Aj, A − Aj, A − Aj, A − Aj, −A − Aj, −A + Aj, A − Aj, A − Aj, A + Aj, −A + Aj, A + Aj, A − Aj, A − Aj, −A − Aj, A + Aj, −A + Aj, A − Aj, A + Aj, −A − Aj, −A − Aj, A + Aj, A − Aj, −A − Aj, −A + Aj, −A − Aj, −A + Aj, A + Aj, −A + Aj, A − Aj, −A + Aj, A + Aj, −A − Aj, A + Aj, A + Aj, A + Aj, −A − Aj, −A − Aj, −A + Aj, −A + Aj, −A − Aj, −A + Aj, −A + Aj, A − Aj, A − Aj, −A + Aj, A − Aj, A + Aj, A − Aj, A + Aj, A + Aj, A − Aj, −A + Aj, A − Aj, −A + Aj, −A + Aj, A + Aj, A + Aj, A + Aj, A − Aj, A + Aj, −A + Aj |
| | Polarization 2 | −A + Aj, A + Aj, −A + Aj, A + Aj, −A + Aj, −A + Aj, A − Aj, −A + Aj, A − Aj, −A − Aj, −A + Aj, −A + Aj, −A + Aj, −A + Aj, A + Aj, −A − Aj, −A − Aj, −A − Aj, −A + Aj, A − Aj, A + Aj, A + Aj, A + Aj, −A + Aj, −A − Aj, A + Aj, A + Aj, A − Aj, −A − Aj, A − Aj, A + Aj, A + Aj, −A + Aj, A − Aj, −A − Aj, A + Aj, A − Aj, −A + Aj, −A + Aj, A − Aj, A + Aj, −A + Aj, −A − Aj, −A + Aj, −A − Aj, A − Aj, −A − Aj, A + Aj, −A − Aj, A − Aj, −A + Aj, A − Aj, A − Aj, A − Aj, −A + Aj, −A + Aj, −A − Aj, |

TABLE 27-1-continued

| Index | Polarization | Pilot sequence |
|---|---|---|
| | | −A − Aj, −A + Aj, −A − Aj, −A − Aj, A + Aj, A + Aj, −A − Aj, A + Aj, A − Aj, A + Aj, A − Aj, A − Aj, A + Aj, −A − Aj, A + Aj, −A − Aj, −A − Aj, A − Aj, A − Aj, A − Aj, A + Aj, A − Aj, −A − Aj |
| 6 | Polarization 1 | −A − Aj, A − Aj, −A − Aj, A − Aj, −A − Aj, −A − Aj, A + Aj, −A − Aj, A + Aj, −A + Aj, −A − Aj, −A − Aj, −A − Aj, −A − Aj, A − Aj, −A + Aj, −A + Aj, −A + Aj, −A − Aj, A + Aj, A − Aj, A − Aj, A − Aj, −A − Aj, −A + Aj, A − Aj, A − Aj, A + Aj, −A + Aj, A + Aj, A − Aj, A − Aj, −A − Aj, A + Aj, −A + Aj, A − Aj, A + Aj, −A − Aj, −A − Aj, A + Aj, A − Aj, −A − Aj, −A + Aj, −A − Aj, −A + Aj, A + Aj, −A + Aj, A − Aj, −A + Aj, A + Aj, −A − Aj, A + Aj, A + Aj, A + Aj, −A − Aj, −A − Aj, −A + Aj, −A + Aj, −A − Aj, −A + Aj, −A + Aj, A − Aj, A − Aj, −A + Aj, A − Aj, A + Aj, A − Aj, A + Aj, A + Aj, A − Aj, −A + Aj, A − Aj, −A + Aj, −A + Aj, A + Aj, A + Aj, A + Aj, A − Aj, A + Aj, −A + Aj |
| | Polarization 2 | A − Aj, −A − Aj, A − Aj, −A − Aj, A − Aj, A − Aj, −A + Aj, A − Aj, −A + Aj, A + Aj, A − Aj, A − Aj, A − Aj, A − Aj, −A − Aj, A + Aj, A + Aj, A + Aj, A − Aj, −A + Aj, −A − Aj, −A − Aj, −A − Aj, A − Aj, A + Aj, −A − Aj, −A − Aj, −A + Aj, A + Aj, −A + Aj, −A − Aj, −A − Aj, A − Aj, −A + Aj, A + Aj, −A − Aj, −A + Aj, A − Aj, A − Aj, −A + Aj, −A − Aj, A − Aj, A + Aj, A − Aj, A + Aj, −A + Aj, A + Aj, −A − Aj, A + Aj, −A + Aj, A − Aj, −A + Aj, −A + Aj, −A + Aj, A − Aj, A − Aj, A + Aj, A + Aj, A − Aj, A + Aj, A + Aj, −A − Aj, −A − Aj, A + Aj, −A − Aj, −A + Aj, −A − Aj, −A + Aj, −A + Aj, −A − Aj, A + Aj, −A − Aj, A + Aj, A + Aj, −A + Aj, −A + Aj, −A + Aj, −A − Aj, −A + Aj, A + Aj |
| 7 | Polarization 1 | −A + Aj, A + Aj, −A + Aj, A + Aj, −A + Aj, −A + Aj, A − Aj, −A + Aj, A − Aj, −A − Aj, −A + Aj, −A + Aj, −A + Aj, −A + Aj, A + Aj, −A − Aj, −A − Aj, −A − Aj, −A + Aj, A − Aj, A + Aj, A + Aj, A + Aj, −A + Aj, −A − Aj, A + Aj, A + Aj, A − Aj, −A − Aj, A − Aj, A + Aj, A + Aj, −A + Aj, A − Aj, −A − Aj, A + Aj, A − Aj, −A + Aj, −A + Aj, A − Aj, A + Aj, −A + Aj, −A − Aj, −A + Aj, −A − Aj, A − Aj, −A − Aj, A + Aj, −A − Aj, A − Aj, −A + Aj, A − Aj, A − Aj, A − Aj, −A + Aj, −A + Aj, −A − Aj, −A − Aj, −A + Aj, −A − Aj, −A − Aj, A + Aj, A + Aj, −A − Aj, A + Aj, A − Aj, A + Aj, A − Aj, A − Aj, A + Aj, −A − Aj, A + Aj, −A − Aj, −A − Aj, A − Aj, A − Aj, A − Aj, A + Aj, A − Aj, −A − Aj |
| | Polarization 2 | A + Aj, −A + Aj, A + Aj, −A + Aj, A + Aj, A + Aj, −A − Aj, A + Aj, −A − Aj, A − Aj, A + Aj, A + Aj, A + Aj, A + Aj, −A + Aj, A − Aj, A − Aj, A − Aj, A + Aj, −A − Aj, −A + Aj, −A + Aj, −A + Aj, A + Aj, A − Aj, −A + Aj, −A + Aj, −A − Aj, A − Aj, −A − Aj, −A + Aj, −A + Aj, A + Aj, −A − Aj, A − Aj, −A + Aj, −A − Aj, A + Aj, A + Aj, −A − Aj, −A + Aj, A + Aj, A − Aj, A + Aj, A − Aj, −A − Aj, A − Aj, −A + Aj, A − Aj, −A − Aj, A + Aj, −A − Aj, −A − Aj, −A − Aj, A + Aj, A + Aj, A − Aj, A − Aj, A + Aj, A − Aj, A − Aj, −A + Aj, −A + Aj, A − Aj, −A + Aj, −A − Aj, −A + Aj, −A − Aj, −A − Aj, −A + Aj, A − Aj, −A + Aj, A − Aj, A − Aj, −A − Aj, −A − Aj, −A − Aj, −A + Aj, −A − Aj, A − Aj |
| 8 | Polarization 1 | A − Aj, −A − Aj, A − Aj, −A − Aj, A − Aj, A − Aj, −A + Aj, A − Aj, −A + Aj, A + Aj, A − Aj, A − Aj, A − Aj, A − Aj, −A − Aj, A + Aj, A + Aj, A + Aj, A − Aj, −A + Aj, −A − Aj, −A − Aj, −A − Aj, A − Aj, A + Aj, −A − Aj, −A − Aj, −A + Aj, A + Aj, −A + Aj, −A − Aj, −A − Aj, A − Aj, −A + Aj, A + Aj, −A − Aj, −A + Aj, A − Aj, A − Aj, −A + Aj, −A − Aj, A − Aj, A + Aj, A − Aj, A + Aj, −A + Aj, A + Aj, −A − Aj, A + Aj, −A + Aj, A − Aj, −A + Aj, −A + Aj, −A + Aj, A − Aj, A − Aj, A + Aj, A + Aj, A − Aj, A + Aj, A + Aj, −A − Aj, −A − Aj, A + Aj, −A − Aj, −A + Aj, −A − Aj, −A + Aj, −A + Aj, −A − Aj, A + Aj, −A − Aj, A + Aj, A + Aj, −A + Aj, −A + Aj, −A + Aj, −A − Aj, −A + Aj, A + Aj |
| | Polarization 2 | A + Aj, −A + Aj, A + Aj, −A + Aj, A + Aj, A + Aj, −A − Aj, A + Aj, −A − Aj, A − Aj, A + Aj, A + Aj, A + Aj, A + Aj, −A + Aj, A − Aj, A − Aj, A − Aj, A + Aj, −A − Aj, −A + Aj, −A + Aj, −A + Aj, A + Aj, A − Aj, −A + Aj, −A + Aj, −A − Aj, A − Aj, −A − Aj, −A + Aj, −A + Aj, A + Aj, −A − Aj, A − Aj, −A + Aj, −A − Aj, A + Aj, A + Aj, −A − Aj, −A + Aj, A + Aj, A − Aj, A + Aj, A − Aj, −A − Aj, A − Aj, −A + Aj, A − Aj, −A − Aj, A + Aj, −A − Aj, −A − Aj, −A − Aj, A + Aj, A + Aj, A − Aj, A − Aj, A + Aj, A − Aj, A − Aj, −A + Aj, −A + Aj, A − Aj, −A + Aj, −A − Aj, −A + Aj, −A − Aj, −A − Aj, −A + Aj, A − Aj, −A + Aj, A − Aj, A − Aj, −A − Aj, −A − Aj, −A − Aj, −A + Aj, −A − Aj, A − Aj |
| 9 | Polarization 1 | −A − Aj, A + Aj, A + Aj, A − Aj, −A + Aj, −A + Aj, −A + Aj, A + Aj, A − Aj, −A − Aj, A + Aj, A − Aj, −A − Aj, −A + Aj, −A − Aj, A + Aj, −A + Aj, A − Aj, A + Aj, −A − Aj, A − Aj, A + Aj, A + Aj, −A + Aj, A − Aj, A + Aj, A + Aj, −A − Aj, A − Aj, −A + Aj, −A + Aj, A − Aj, A − Aj, −A + Aj, A + Aj, −A + Aj, A − Aj, −A + Aj, A − Aj, −A + Aj, A + Aj, −A + Aj, −A + Aj, A + Aj, A + Aj, A + Aj, A + Aj, −A + Aj, −A − Aj, −A + Aj, −A − Aj, −A − Aj, −A − Aj, −A + Aj, −A − Aj, A − Aj, A − Aj, A − Aj, −A − Aj, −A − Aj, A − Aj, A + Aj, −A − Aj, −A − Aj, −A + Aj, −A − Aj, −A + Aj, −A − Aj, A + Aj, A − Aj, −A − Aj, A − Aj, A − Aj, A − Aj, A + Aj, A − Aj, A + Aj, −A + Aj, −A − Aj, −A − Aj |
| | Polarization 2 | −A + Aj, A + Aj, −A + Aj, A + Aj, −A + Aj, −A − Aj, A + Aj, −A + Aj, −A + Aj, −A + Aj, −A + Aj, −A − Aj, A + Aj, A + Aj, −A − Aj, −A − Aj, −A − Aj, −A − Aj, A + Aj, A − Aj, −A + Aj, A − Aj, −A − Aj, −A − Aj, −A + Aj, A − Aj, A + Aj, A + Aj, A + Aj, −A − Aj, −A − Aj, A + Aj, A − Aj, A − Aj, −A − Aj, −A + Aj, A − Aj, −A + Aj, A − Aj, A − Aj, −A + Aj, −A − Aj, A + Aj, A + Aj, A + Aj, A − Aj, −A + Aj, A − Aj, A + Aj, A − Aj, −A − Aj, −A − Aj, A + Aj, A + Aj, A − Aj, A − Aj, A + Aj, −A − Aj, −A + Aj, A − Aj, −A − Aj, A − Aj, −A − Aj, A + Aj, A − Aj, A + Aj, A + Aj, −A + Aj, −A + Aj, −A + Aj, A − Aj, A − Aj, A − Aj, −A + Aj, −A − Aj, −A − Aj, −A + Aj, A − Aj, −A − Aj, −A + Aj |
| 10 | Polarization 1 | −A + Aj, A + Aj, −A + Aj, A + Aj, −A + Aj, −A − Aj, A + Aj, −A + Aj, −A + Aj, −A + Aj, −A + Aj, −A − Aj, A + Aj, A + Aj, −A − Aj, −A − Aj, −A − Aj, −A − Aj, A + Aj, A − Aj, −A + Aj, A − Aj, −A − Aj, −A − Aj, −A + Aj, A − Aj, A + Aj, A + Aj, A + Aj, −A − Aj, −A − Aj, A + Aj, A − Aj, A − Aj, −A − Aj, −A + Aj, A − Aj, −A + Aj, A − Aj, A − Aj, −A + Aj, −A − Aj, A + Aj, A + Aj, A + Aj, A − Aj, −A + Aj, A − Aj, A + Aj, A − Aj, −A − Aj, −A − Aj, A + Aj, A + Aj, A − Aj, A − Aj, A + Aj, −A − Aj, −A + Aj, A − Aj, −A − Aj, A − Aj, −A − Aj, A + Aj, A − Aj, A + Aj, A + Aj, −A + Aj, −A + Aj, −A + Aj, A − Aj, A − Aj, A − Aj, −A + Aj, −A − Aj, −A − Aj, −A + Aj, A − Aj, −A − Aj, −A + Aj |
| | Polarization 2 | −A + Aj, A + Aj, A + Aj, −A − Aj, A − Aj, A − Aj, A + Aj, A + Aj, −A − Aj, −A + Aj, A + Aj, −A − Aj, −A − Aj, A − Aj, −A + Aj, A − Aj, A + Aj, −A + Aj, A − Aj, −A + Aj, −A + Aj, A + Aj, A − Aj, A + Aj, −A + Aj, A + Aj, A − Aj, −A + Aj, −A − Aj, A − Aj, A + Aj, −A + Aj, −A − Aj, A + Aj, A − Aj, A + Aj, −A − Aj, A + Aj, −A − Aj, A + Aj, A − Aj, A − Aj, A + Aj, A + Aj, A + Aj, A + Aj, A − Aj, A − Aj, −A − Aj, A − Aj, −A − Aj, −A − Aj, −A − Aj, A − Aj, −A + Aj, −A + Aj, −A + Aj, −A − Aj, −A − Aj, −A + Aj, −A + Aj, A − Aj, −A − Aj, −A − Aj, A − Aj, −A − Aj, A − Aj, −A + Aj, A + Aj, −A − Aj, −A + Aj, −A + Aj, −A + Aj, −A + Aj, A + Aj, −A + Aj, A − Aj, A − Aj, −A − Aj, −A − Aj |
| 11 | Polarization 1 | −A + Aj, A + Aj, −A + Aj, A + Aj, −A + Aj, −A − Aj, A + Aj, −A + Aj, −A + Aj, −A + Aj, −A + Aj, −A − Aj, A + Aj, A + Aj, −A − Aj, −A − Aj, −A − Aj, −A − Aj, A + Aj, A − Aj, −A + Aj, A − Aj, −A − Aj, −A − Aj, −A + Aj, A − Aj, A + Aj, A + Aj, A + Aj, −A − Aj, −A − Aj, A + Aj, A − Aj, A − Aj, |

TABLE 27-1-continued

| Index | Polarization | Pilot sequence |
|---|---|---|
| | | −A − Aj, −A + Aj, A − Aj, −A + Aj, A − Aj, A − Aj, −A + Aj, −A − Aj, A + Aj, A + Aj, A + Aj, A − Aj, −A + Aj, A − Aj, A + Aj, A − Aj, −A − Aj, −A − Aj, A + Aj, A + Aj, A − Aj, A − Aj, A + Aj, −A − Aj, −A + Aj, A − Aj, −A − Aj, A − Aj, −A − Aj, A + Aj, A − Aj, A + Aj, A + Aj, −A + Aj, −A + Aj, −A + Aj, A − Aj, A − Aj, A − Aj, −A + Aj, −A − Aj, −A − Aj, −A + Aj, A − Aj, −A − Aj, −A + Aj |
| | Polarization 2 | A + Aj, A + Aj, −A − Aj, A − Aj, A − Aj, A + Aj, A + Aj, −A − Aj, −A + Aj, A + Aj, −A − Aj, −A − Aj, A − Aj, −A + Aj, A − Aj, A + Aj, −A + Aj, A − Aj, −A + Aj, −A + Aj, A + Aj, A − Aj, A + Aj, −A + Aj, A + Aj, A − Aj, −A + Aj, −A − Aj, A − Aj, A + Aj, −A + Aj, −A − Aj, A + Aj, A − Aj, A + Aj, −A − Aj, A + Aj, −A − Aj, A + Aj, A − Aj, A − Aj, A + Aj, A + Aj, A + Aj, A + Aj, A − Aj, A − Aj, −A − Aj, A − Aj, −A − Aj, −A − Aj, −A − Aj, A − Aj, −A + Aj, −A + Aj, −A + Aj, −A − Aj, −A − Aj, −A + Aj, −A + Aj, A − Aj, −A − Aj, −A − Aj, A − Aj, −A − Aj, A − Aj, −A + Aj, A + Aj, −A − Aj, −A + Aj, −A + Aj, −A + Aj, −A + Aj, A + Aj, −A + Aj, A − Aj, A − Aj, −A − Aj, −A − Aj, −A + Aj |
| 12 | Polarization 1 | −A + Aj, A + Aj, −A + Aj, A + Aj, −A + Aj, −A − Aj, A + Aj, −A + Aj, −A + Aj, −A + Aj, −A + Aj, −A − Aj, A + Aj, A + Aj, −A − Aj, −A − Aj, −A − Aj, −A − Aj, A + Aj, A − Aj, −A + Aj, A − Aj, −A − Aj, −A − Aj, −A + Aj, A − Aj, A + Aj, A + Aj, A + Aj, −A − Aj, −A − Aj, A + Aj, A − Aj, A − Aj, −A − Aj, −A + Aj, A − Aj, −A + Aj, A − Aj, A − Aj, −A + Aj, −A − Aj, A + Aj, A + Aj, A + Aj, A − Aj, −A + Aj, A − Aj, A + Aj, A − Aj, −A − Aj, −A − Aj, A + Aj, A + Aj, A − Aj, A − Aj, A + Aj, −A − Aj, −A + Aj, A − Aj, −A − Aj, A − Aj, −A − Aj, A + Aj, A − Aj, A + Aj, A + Aj, −A + Aj, −A + Aj, −A + Aj, A − Aj, A − Aj, A − Aj, −A + Aj, −A − Aj, −A − Aj, −A + Aj, A − Aj, −A − Aj, −A + Aj |
| | Polarization 2 | A + Aj, A + Aj, A − Aj, −A + Aj, −A + Aj, −A + Aj, A + Aj, A − Aj, −A − Aj, A + Aj, A − Aj, −A − Aj, −A + Aj, −A − Aj, A + Aj, −A + Aj, A − Aj, A + Aj, −A − Aj, A − Aj, A + Aj, A + Aj, −A + Aj, A − Aj, A + Aj, A + Aj, −A − Aj, A − Aj, −A + Aj, −A + Aj, A − Aj, A − Aj, −A + Aj, A + Aj, −A + Aj, A − Aj, −A + Aj, A − Aj, −A + Aj, A + Aj, −A + Aj, −A + Aj, A + Aj, A + Aj, A + Aj, A + Aj, −A + Aj, −A − Aj, −A + Aj, −A − Aj, −A − Aj, −A − Aj, −A + Aj, −A − Aj, A − Aj, A − Aj, A − Aj, −A − Aj, −A − Aj, A − Aj, A + Aj, −A − Aj, −A − Aj, −A + Aj, −A − Aj, −A + Aj, −A − Aj, A + Aj, A − Aj, −A − Aj, A − Aj, A − Aj, A − Aj, A + Aj, A − Aj, A + Aj, −A + Aj, −A − Aj, −A − Aj, −A − Aj |
| 13 | Polarization 1 | −A − Aj, −A − Aj, −A − Aj, A − Aj, A + Aj, −A + Aj, A + Aj, −A + Aj, −A + Aj, −A + Aj, −A − Aj, −A + Aj, A + Aj, −A − Aj, A − Aj, −A − Aj, A − Aj, −A − Aj, −A − Aj, A + Aj, −A + Aj, −A − Aj, −A − Aj, −A + Aj, −A + Aj, −A + Aj, −A − Aj, A − Aj, −A − Aj, −A − Aj, −A − Aj, A − Aj, −A − Aj, A − Aj, A + Aj, A + Aj, A + Aj, A + Aj, A − Aj, A − Aj, A + Aj, A − Aj, −A + Aj, A − Aj, −A + Aj, A − Aj, A + Aj, A − Aj, −A + Aj, −A + Aj, A − Aj, A − Aj, −A + Aj, −A − Aj, A + Aj, A + Aj, −A + Aj, A − Aj, A + Aj, A + Aj, −A + Aj, −A − Aj, A + Aj, −A + Aj, A − Aj, A + Aj, −A − Aj, A − Aj, −A − Aj, −A + Aj, A + Aj, −A − Aj, −A + Aj, A + Aj, A − Aj, A − Aj, A − Aj, −A + Aj, A + Aj, A + Aj |
| | Polarization 2 | A − Aj, −A − Aj, −A + Aj, A − Aj, −A − Aj, −A − Aj, A − Aj, −A + Aj, −A + Aj, −A + Aj, A − Aj, A − Aj, A − Aj, A + Aj, A + Aj, −A + Aj, A + Aj, −A − Aj, −A + Aj, −A − Aj, −A + Aj, A − Aj, −A − Aj, A + Aj, −A + Aj, −A + Aj, A + Aj, A + Aj, −A − Aj, −A − Aj, −A + Aj, A + Aj, −A + Aj, A − Aj, −A + Aj, A + Aj, A + Aj, A + Aj, −A − Aj, A − Aj, −A + Aj, −A + Aj, A − Aj, −A + Aj, A − Aj, −A − Aj, −A + Aj, −A + Aj, A + Aj, −A − Aj, −A − Aj, A + Aj, A + Aj, A + Aj, −A + Aj, A − Aj, −A − Aj, −A − Aj, −A + Aj, A − Aj, −A + Aj, A + Aj, −A − Aj, −A − Aj, −A − Aj, −A − Aj, A + Aj, A + Aj, −A − Aj, A − Aj, A − Aj, A − Aj, A − Aj, A + Aj, −A − Aj, A − Aj, A + Aj, A − Aj, A + Aj, A − Aj |
| 14 | Polarization 1 | −A − Aj, −A − Aj, −A + Aj, −A + Aj, A − Aj, A + Aj, A − Aj, A − Aj, A − Aj, A − Aj, −A − Aj, A + Aj, A − Aj, −A + Aj, −A − Aj, −A + Aj, −A − Aj, −A − Aj, −A + Aj, A − Aj, A − Aj, −A − Aj, −A − Aj, A − Aj, A − Aj, A − Aj, −A + Aj, −A − Aj, −A − Aj, −A − Aj, −A + Aj, −A − Aj, −A + Aj, −A + Aj, A + Aj, A + Aj, A + Aj, A + Aj, −A + Aj, −A + Aj, A + Aj, −A − Aj, A + Aj, −A − Aj, A + Aj, −A + Aj, A + Aj, −A − Aj, A − Aj, A + Aj, −A + Aj, −A − Aj, A − Aj, −A + Aj, A + Aj, A − Aj, A + Aj, −A + Aj, A + Aj, A − Aj, A − Aj, −A + Aj, A − Aj, A + Aj, −A + Aj, A − Aj, −A + Aj, −A − Aj, −A − Aj, A + Aj, A − Aj, −A − Aj, A + Aj, A + Aj, −A + Aj, −A + Aj, −A − Aj, A + Aj, A + Aj, A − Aj |
| | Polarization 2 | A − Aj, −A − Aj, −A + Aj, A − Aj, −A − Aj, −A − Aj, A − Aj, −A + Aj, −A + Aj, −A + Aj, A − Aj, A − Aj, A − Aj, A + Aj, A + Aj, −A + Aj, A + Aj, −A − Aj, −A + Aj, −A − Aj, −A + Aj, A − Aj, −A − Aj, A + Aj, −A + Aj, −A + Aj, A + Aj, A + Aj, −A − Aj, −A − Aj, −A + Aj, A + Aj, −A + Aj, A − Aj, −A + Aj, A + Aj, A + Aj, A + Aj, −A − Aj, A − Aj, −A + Aj, −A + Aj, A − Aj, −A + Aj, A − Aj, −A − Aj, −A + Aj, −A + Aj, A + Aj, −A − Aj, −A − Aj, A + Aj, A + Aj, A + Aj, −A + Aj, A − Aj, −A − Aj, −A − Aj, −A + Aj, A − Aj, −A + Aj, A + Aj, −A − Aj, −A − Aj, −A − Aj, −A − Aj, A + Aj, A + Aj, −A − Aj, A − Aj, A − Aj, A − Aj, A − Aj, A + Aj, −A − Aj, A − Aj, A + Aj, A − Aj, A + Aj, A − Aj |
| 15 | Polarization 1 | −A − Aj, −A − Aj, A − Aj, A + Aj, −A + Aj, A + Aj, −A + Aj, −A + Aj, −A + Aj, −A − Aj, −A + Aj, A + Aj, −A − Aj, A − Aj, −A − Aj, A − Aj, −A − Aj, −A − Aj, A + Aj, −A + Aj, −A − Aj, −A − Aj, −A + Aj, −A + Aj, −A + Aj, −A − Aj, A − Aj, −A − Aj, −A − Aj, −A − Aj, A − Aj, −A − Aj, A − Aj, A + Aj, A + Aj, A + Aj, A + Aj, A − Aj, A − Aj, A + Aj, A − Aj, −A + Aj, A − Aj, −A + Aj, A − Aj, A + Aj, A − Aj, −A + Aj, −A + Aj, A − Aj, A − Aj, −A + Aj, −A − Aj, A + Aj, A + Aj, −A + Aj, A − Aj, A + Aj, A + Aj, −A + Aj, −A − Aj, A + Aj, −A + Aj, A − Aj, A + Aj, −A − Aj, A − Aj, −A − Aj, −A + Aj, A + Aj, −A − Aj, −A + Aj, A + Aj, A − Aj, A − Aj, A − Aj, −A + Aj, A + Aj, A + Aj, −A − Aj |
| | Polarization 2 | A − Aj, −A − Aj, −A + Aj, A − Aj, −A − Aj, −A − Aj, A − Aj, −A + Aj, −A + Aj, −A + Aj, A − Aj, A − Aj, A − Aj, A + Aj, A + Aj, −A + Aj, A + Aj, −A − Aj, −A + Aj, −A − Aj, −A + Aj, A − Aj, −A − Aj, A + Aj, −A + Aj, −A + Aj, A + Aj, A + Aj, −A − Aj, −A − Aj, −A + Aj, A + Aj, −A + Aj, A − Aj, −A + Aj, A + Aj, A + Aj, A + Aj, −A − Aj, A − Aj, −A + Aj, −A + Aj, A − Aj, −A + Aj, A − Aj, −A − Aj, −A + Aj, −A + Aj, A + Aj, −A − Aj, −A − Aj, A + Aj, A + Aj, A + Aj, −A + Aj, A − Aj, −A − Aj, −A − Aj, −A + Aj, A − Aj, −A + Aj, A + Aj, −A − Aj, −A − Aj, −A − Aj, −A − Aj, A + Aj, A + Aj, −A − Aj, A − Aj, A − Aj, A − Aj, A − Aj, A + Aj, −A − Aj, A − Aj, A + Aj, A − Aj, A + Aj, A − Aj |
| 16 | Polarization 1 | A − Aj, −A − Aj, −A − Aj, −A + Aj, −A + Aj, A − Aj, A + Aj, A − Aj, A − Aj, A − Aj, A − Aj, −A − Aj, A + Aj, A − Aj, −A + Aj, −A − Aj, −A + Aj, −A − Aj, −A − Aj, −A + Aj, A − Aj, A − Aj, −A − Aj, −A − Aj, A − Aj, A − Aj, A − Aj, −A + Aj, −A − Aj, −A − Aj, −A − Aj, −A + Aj, −A − Aj, −A + Aj, −A + Aj, A + Aj, A + Aj, A + Aj, A + Aj, −A + Aj, −A + Aj, A + Aj, −A − Aj, A + Aj, −A − Aj, A + Aj, −A + Aj, A + Aj, −A − Aj, A − Aj, A + Aj, −A + Aj, −A − Aj, A − Aj, −A + Aj, A + Aj, A − Aj, A + Aj, −A + Aj, A + Aj, A − Aj, A − Aj, −A + Aj, A − Aj, A + Aj, −A + Aj, A − Aj, −A + Aj, −A − Aj, −A − Aj, A + Aj, A − Aj, −A − Aj, A + Aj, A + Aj, −A + Aj, −A + Aj, −A − Aj, A + Aj, A + Aj |
| | Polarization 2 | A − Aj, −A − Aj, −A + Aj, A − Aj, −A − Aj, −A − Aj, A − Aj, −A + Aj, −A + Aj, −A + Aj, A − Aj, A − Aj, A − Aj, A + Aj, A + Aj, −A + Aj, A + Aj, −A − Aj, −A + Aj, −A − Aj, −A + Aj, A − Aj, −A − Aj, A + Aj, −A + Aj, −A + Aj, A + Aj, A + Aj, −A − Aj, −A − Aj, −A + Aj, A + Aj, −A + Aj, A − Aj, −A + Aj, A + Aj, A + Aj, A + Aj, −A − Aj, A − Aj, −A + Aj, −A + Aj, A − Aj, −A + Aj, A − Aj, −A − |

TABLE 27-1-continued

| Index | Polarization | Pilot sequence |
|---|---|---|
| | | Aj, −A + Aj, −A + Aj, A + Aj, −A − Aj, −A − Aj, A + Aj, A + Aj, A + Aj, −A + Aj, A − Aj, −A − Aj, −A − Aj, −A + Aj, A − Aj, −A + Aj, A + Aj, −A − Aj, −A − Aj, −A − Aj, −A − Aj, A + Aj, A + Aj, −A − Aj, A − Aj, A − Aj, A − Aj, A − Aj, A + Aj, −A − Aj, A − Aj, A + Aj, A − Aj, A + Aj, A − Aj |

TABLE 27-2

| Index | Polarization | Pilot sequence |
|---|---|---|
| 1 | Polarization 1 | −A − Aj, A − Aj, −A + Aj, −A − Aj, −A − Aj, A − Aj, −A − Aj, −A − Aj, −A + Aj, −A − Aj, A − Aj, A − Aj, A + Aj, −A + Aj, −A − Aj, −A + Aj, A − Aj, −A + Aj, A − Aj, A + Aj, A − Aj, −A − Aj, A + Aj, −A + Aj, A − Aj, −A + Aj, −A + Aj, −A − Aj, A + Aj, A − Aj, A − Aj, A + Aj, A − Aj, A + Aj, −A − Aj, −A − Aj, −A − Aj, −A − Aj, A + Aj, −A − Aj, −A + Aj, A + Aj, A − Aj, −A − Aj, −A − Aj, A − Aj, A + Aj, A + Aj, −A − Aj, A − Aj, A + Aj, −A − Aj, A + Aj, A + Aj, −A + Aj, −A + Aj, −A + Aj, A + Aj, A + Aj, −A − Aj, −A + Aj, −A − Aj, −A + Aj, −A + Aj, A − Aj, A + Aj, −A + Aj, A + Aj, A − Aj, A + Aj, A + Aj, A + Aj, −A + Aj, A − Aj, A − Aj, A − Aj, −A + Aj, −A + Aj, A + Aj, −A − Aj |
| | Polarization 2 | −A + Aj, A + Aj, −A − Aj, −A + Aj, −A + Aj, A + Aj, −A + Aj, −A + Aj, −A − Aj, −A + Aj, A + Aj, A + Aj, A − Aj, −A − Aj, −A + Aj, −A − Aj, A + Aj, −A − Aj, A + Aj, A − Aj, A + Aj, −A + Aj, A − Aj, −A − Aj, A + Aj, −A − Aj, −A − Aj, −A + Aj, A − Aj, A + Aj, A + Aj, A − Aj, A + Aj, A − Aj, −A + Aj, −A + Aj, −A + Aj, −A + Aj, A − Aj, −A + Aj, −A − Aj, A − Aj, A + Aj, −A + Aj, −A + Aj, A + Aj, A − Aj, A − Aj, −A + Aj, A + Aj, A − Aj, −A + Aj, A − Aj, A − Aj, −A − Aj, −A − Aj, −A − Aj, A − Aj, A − Aj, −A + Aj, −A − Aj, −A + Aj, −A − Aj, −A − Aj, A + Aj, A − Aj, −A − Aj, A − Aj, A + Aj, A − Aj, A − Aj, A − Aj, −A − Aj, A + Aj, A + Aj, A + Aj, −A − Aj, −A − Aj, A − Aj, −A + Aj |
| 2 | Polarization 1 | −A − Aj, A − Aj, −A + Aj, −A − Aj, −A − Aj, A − Aj, −A − Aj, −A − Aj, −A + Aj, −A − Aj, A − Aj, A − Aj, A + Aj, −A + Aj, −A − Aj, −A + Aj, A − Aj, −A + Aj, A − Aj, A + Aj, A − Aj, −A − Aj, A + Aj, −A + Aj, A − Aj, −A + Aj, −A + Aj, −A − Aj, A + Aj, A − Aj, A − Aj, A + Aj, A − Aj, A + Aj, −A − Aj, −A − Aj, −A − Aj, −A − Aj, A + Aj, −A − Aj, −A + Aj, A + Aj, A − Aj, −A − Aj, −A − Aj, A − Aj, A + Aj, A + Aj, −A − Aj, A − Aj, A + Aj, −A − Aj, A + Aj, A + Aj, −A + Aj, −A + Aj, −A + Aj, A + Aj, A + Aj, −A − Aj, −A + Aj, −A − Aj, −A + Aj, −A + Aj, A − Aj, A + Aj, −A + Aj, A + Aj, A − Aj, A + Aj, A + Aj, A + Aj, −A + Aj, A − Aj, A − Aj, A − Aj, −A + Aj, −A + Aj, A + Aj, −A − Aj |
| | Polarization 2 | A − Aj, −A − Aj, A + Aj, A − Aj, A − Aj, −A − Aj, A − Aj, A − Aj, A + Aj, A − Aj, −A − Aj, −A − Aj, −A + Aj, A + Aj, A − Aj, A + Aj, −A − Aj, A + Aj, −A − Aj, −A + Aj, −A − Aj, A − Aj, −A + Aj, A + Aj, −A − Aj, A + Aj, A + Aj, A − Aj, −A + Aj, −A − Aj, −A − Aj, −A + Aj, −A − Aj, −A + Aj, A − Aj, A − Aj, A − Aj, A − Aj, −A + Aj, A − Aj, A + Aj, −A + Aj, −A − Aj, A − Aj, A − Aj, −A − Aj, −A + Aj, −A + Aj, A − Aj, −A − Aj, −A + Aj, A − Aj, −A + Aj, −A + Aj, A + Aj, A + Aj, A + Aj, −A + Aj, −A + Aj, A − Aj, A + Aj, A − Aj, A + Aj, A + Aj, −A − Aj, −A + Aj, A + Aj, −A + Aj, −A − Aj, −A + Aj, −A + Aj, −A + Aj, A + Aj, −A − Aj, −A − Aj, −A − Aj, A + Aj, A + Aj, −A + Aj, A − Aj |
| 3 | Polarization 1 | A + Aj, −A + Aj, A − Aj, A + Aj, A + Aj, −A + Aj, A + Aj, A + Aj, A − Aj, A + Aj, −A + Aj, −A + Aj, −A − Aj, A − Aj, A + Aj, A − Aj, −A + Aj, A − Aj, −A + Aj, −A − Aj, −A + Aj, A + Aj, −A − Aj, A − Aj, −A + Aj, A − Aj, A − Aj, A + Aj, −A − Aj, −A + Aj, −A + Aj, −A − Aj, −A + Aj, −A − Aj, A + Aj, A + Aj, A + Aj, A + Aj, −A − Aj, A + Aj, A − Aj, −A − Aj, −A + Aj, A + Aj, A + Aj, −A + Aj, −A − Aj, −A − Aj, A + Aj, −A + Aj, −A − Aj, A + Aj, −A − Aj, −A − Aj, A − Aj, A − Aj, A − Aj, −A − Aj, −A − Aj, A + Aj, A − Aj, A + Aj, A − Aj, A − Aj, −A + Aj, −A − Aj, A − Aj, −A − Aj, −A + Aj, −A − Aj, −A − Aj, −A − Aj, A − Aj, −A + Aj, −A + Aj, −A + Aj, A − Aj, A − Aj, −A − Aj, A + Aj |
| | Polarization 2 | −A + Aj, A + Aj, −A − Aj, −A + Aj, −A + Aj, A + Aj, −A + Aj, −A + Aj, −A − Aj, −A + Aj, A + Aj, A + Aj, A − Aj, −A − Aj, −A + Aj, −A − Aj, A + Aj, −A − Aj, A + Aj, A − Aj, A + Aj, −A + Aj, A − Aj, −A − Aj, A + Aj, −A − Aj, −A − Aj, −A + Aj, A − Aj, A + Aj, A + Aj, A − Aj, A + Aj, A − Aj, −A + Aj, −A + Aj, −A + Aj, −A + Aj, A − Aj, −A + Aj, −A − Aj, A − Aj, A + Aj, −A + Aj, −A + Aj, A + Aj, A − Aj, A − Aj, −A + Aj, A + Aj, A − Aj, −A + Aj, A − Aj, A − Aj, −A − Aj, −A − Aj, −A − Aj, A − Aj, A − Aj, −A + Aj, −A − Aj, −A + Aj, −A − Aj, −A − Aj, A + Aj, A − Aj, −A − Aj, A − Aj, A + Aj, A − Aj, A − Aj, A − Aj, −A − Aj, A + Aj, A + Aj, A + Aj, −A − Aj, −A − Aj, A − Aj, −A + Aj |
| 4 | Polarization 1 | A + Aj, −A + Aj, A − Aj, A + Aj, A + Aj, −A + Aj, A + Aj, A + Aj, A − Aj, A + Aj, −A + Aj, −A + Aj, −A − Aj, A − Aj, A + Aj, A − Aj, −A + Aj, A − Aj, −A + Aj, −A − Aj, −A + Aj, A + Aj, −A − Aj, A − Aj, −A + Aj, A − Aj, A − Aj, A + Aj, −A − Aj, −A + Aj, −A + Aj, −A − Aj, −A + Aj, −A − Aj, A + Aj, A + Aj, A + Aj, A + Aj, −A − Aj, A + Aj, A − Aj, −A − Aj, −A + Aj, A + Aj, A + Aj, −A + Aj, −A − Aj, −A − Aj, A + Aj, −A + Aj, −A − Aj, A + Aj, −A − Aj, −A − Aj, A − Aj, A − Aj, A − Aj, −A − Aj, −A − Aj, A + Aj, A − Aj, A + Aj, A − Aj, A − Aj, −A + Aj, −A − Aj, A − Aj, −A − Aj, −A + Aj, −A − Aj, −A − Aj, −A − Aj, A − Aj, −A + Aj, −A + Aj, −A + Aj, A − Aj, A − Aj, −A − Aj, A + Aj |
| | Polarization 2 | A − Aj, −A − Aj, A + Aj, A − Aj, A − Aj, −A − Aj, A − Aj, A − Aj, A + Aj, A − Aj, −A − Aj, −A − Aj, −A + Aj, A + Aj, A − Aj, A + Aj, −A − Aj, A + Aj, −A − Aj, −A + Aj, −A − Aj, A − Aj, −A + Aj, A + Aj, −A − Aj, A + Aj, A + Aj, A − Aj, −A + Aj, −A − Aj, −A − Aj, −A + Aj, −A − Aj, −A + Aj, A − Aj, A − Aj, A − Aj, A − Aj, −A + Aj, A − Aj, A + Aj, −A + Aj, −A − Aj, A − Aj, A − Aj, −A − Aj, −A + Aj, −A + Aj, A − Aj, −A − Aj, −A + Aj, A − Aj, −A + Aj, −A + Aj, A + Aj, A + Aj, A + Aj, −A + Aj, −A + Aj, A − Aj, A + Aj, A − Aj, A + Aj, A + Aj, −A − Aj, −A + Aj, A + Aj, −A + Aj, −A − Aj, −A + Aj, −A + Aj, −A + Aj, A + Aj, −A − Aj, −A − Aj, −A − Aj, A + Aj, A + Aj, −A + Aj, A − Aj |
| 5 | Polarization 1 | −A − Aj, A + Aj, A − Aj, A − Aj, −A + Aj, −A + Aj, −A + Aj, A − Aj, A + Aj, A + Aj, A + Aj, −A + Aj, A + Aj, A − Aj, A + Aj, −A + Aj, A − Aj, A − Aj, −A − Aj, A − Aj, −A − Aj, A + Aj, A + Aj, A − Aj, A − Aj, A − Aj, A + Aj, A + Aj, −A − Aj, A + Aj, −A + Aj, −A − Aj, A + Aj, A + Aj, −A + Aj, −A − Aj, −A − Aj, −A + Aj, A + Aj, A − Aj, −A − Aj, A + Aj, −A − Aj, −A − Aj, −A − Aj, −A − Aj, A + Aj, −A + Aj, A + Aj, −A + Aj, −A + Aj, A + Aj, −A − Aj, A − Aj, A − Aj, −A + Aj, A − Aj, A + Aj, −A − Aj, −A + Aj, A + Aj, −A + Aj, A − Aj, −A + Aj, A − Aj, −A − Aj, A − Aj, A + Aj, −A + Aj, −A + Aj, −A − Aj, A − Aj, −A − Aj, −A − Aj, −A + Aj, −A − Aj, −A − Aj, A − Aj, −A + Aj, −A − Aj |
| | Polarization 2 | −A + Aj, A − Aj, A + Aj, A + Aj, −A − Aj, −A − Aj, −A − Aj, A + Aj, A − Aj, A − Aj, A − Aj, −A − Aj, A − Aj, A + Aj, A − Aj, −A − Aj, A + Aj, A + Aj, −A + Aj, A + Aj, −A + Aj, A − Aj, A − Aj, A + Aj, A + Aj, A + Aj, A − Aj, A − Aj, −A + Aj, A − Aj, −A − Aj, −A + Aj, A − Aj, A − Aj, −A − Aj, −A + Aj, −A + Aj, −A − Aj, A − Aj, A + Aj, −A + Aj, A − Aj, −A + Aj, −A + Aj, −A + Aj, −A + Aj, A − Aj, −A − Aj, A − Aj, −A − Aj, |

TABLE 27-2-continued

| Index | Polarization | Pilot sequence |
|---|---|---|
| | | −A − Aj, A − Aj, −A + Aj, A + Aj, A + Aj, −A − Aj, A + Aj, A − Aj, −A + Aj, −A − Aj, A − Aj, −A − Aj, A + Aj, −A − Aj, A + Aj, −A + Aj, A + Aj, A − Aj, −A − Aj, −A − Aj, −A + Aj, A + Aj, −A + Aj, −A + Aj, −A − Aj, −A + Aj, −A + Aj, A + Aj, −A − Aj, −A + Aj |
| 6 | Polarization 1 | −A − Aj, A + Aj, A − Aj, A − Aj, −A + Aj, −A + Aj, −A + Aj, A − Aj, A + Aj, A + Aj, A + Aj, −A + Aj, A + Aj, A − Aj, A + Aj, −A + Aj, A − Aj, A − Aj, −A − Aj, A − Aj, −A − Aj, A + Aj, A + Aj, A − Aj, A − Aj, A − Aj, A + Aj, A + Aj, −A − Aj, A + Aj, −A + Aj, −A − Aj, A + Aj, A + Aj, −A + Aj, −A − Aj, −A − Aj, −A + Aj, A + Aj, A − Aj, −A − Aj, A + Aj, −A − Aj, −A − Aj, −A − Aj, −A − Aj, A + Aj, −A + Aj, A + Aj, −A + Aj, −A + Aj, A + Aj, −A − Aj, A − Aj, A − Aj, −A + Aj, A − Aj, A + Aj, −A − Aj, −A + Aj, A + Aj, −A + Aj, A − Aj, −A + Aj, A − Aj, −A − Aj, A − Aj, A + Aj, −A + Aj, −A + Aj, −A − Aj, A − Aj, −A − Aj, −A − Aj, −A + Aj, −A − Aj, −A − Aj, A − Aj, −A + Aj, −A − Aj |
| | Polarization 2 | A − Aj, −A + Aj, −A − Aj, −A − Aj, A + Aj, A + Aj, A + Aj, −A − Aj, −A + Aj, −A + Aj, −A + Aj, A + Aj, −A + Aj, −A − Aj, −A + Aj, A + Aj, −A − Aj, −A − Aj, A − Aj, −A − Aj, A − Aj, −A + Aj, −A + Aj, −A − Aj, −A − Aj, −A − Aj, −A + Aj, −A + Aj, A − Aj, −A + Aj, A + Aj, A − Aj, −A + Aj, −A + Aj, A + Aj, A − Aj, A − Aj, A + Aj, −A + Aj, −A − Aj, A − Aj, −A + Aj, A − Aj, A − Aj, A − Aj, A − Aj, −A + Aj, A + Aj, −A + Aj, A + Aj, A + Aj, −A + Aj, A − Aj, −A − Aj, −A − Aj, A + Aj, −A − Aj, −A + Aj, A − Aj, A + Aj, −A + Aj, A + Aj, −A − Aj, A + Aj, −A − Aj, A − Aj, −A − Aj, −A + Aj, A + Aj, A + Aj, A − Aj, −A − Aj, A − Aj, A − Aj, A + Aj, A − Aj, A − Aj, −A − Aj, A + Aj, A − Aj |
| 7 | Polarization 1 | A + Aj, −A − Aj, −A + Aj, −A + Aj, A − Aj, A − Aj, A − Aj, −A + Aj, −A − Aj, −A − Aj, −A − Aj, A − Aj, −A − Aj, −A + Aj, −A − Aj, A − Aj, −A + Aj, −A + Aj, A + Aj, −A + Aj, A + Aj, −A − Aj, −A − Aj, −A + Aj, −A + Aj, −A + Aj, −A − Aj, −A − Aj, A + Aj, −A − Aj, A − Aj, A + Aj, −A − Aj, −A − Aj, A − Aj, A + Aj, A + Aj, A − Aj, −A − Aj, −A + Aj, A + Aj, −A − Aj, A + Aj, A + Aj, A + Aj, A + Aj, −A − Aj, A − Aj, −A − Aj, A − Aj, A − Aj, −A − Aj, A + Aj, −A + Aj, −A + Aj, A − Aj, −A + Aj, −A − Aj, A + Aj, A − Aj, −A − Aj, A − Aj, −A + Aj, A − Aj, −A + Aj, A + Aj, −A + Aj, −A − Aj, A − Aj, A − Aj, A + Aj, −A + Aj, A + Aj, A + Aj, A − Aj, A + Aj, A + Aj, −A + Aj, A − Aj, A + Aj |
| | Polarization 2 | −A + Aj, A − Aj, A + Aj, A + Aj, −A − Aj, −A − Aj, −A − Aj, A + Aj, A − Aj, A − Aj, A − Aj, −A − Aj, A − Aj, A + Aj, A − Aj, −A − Aj, A + Aj, A + Aj, −A + Aj, A + Aj, −A + Aj, A − Aj, A − Aj, A + Aj, A + Aj, A + Aj, A − Aj, A − Aj, −A + Aj, A − Aj, −A − Aj, −A + Aj, A − Aj, A − Aj, −A − Aj, −A + Aj, −A + Aj, −A − Aj, A − Aj, A + Aj, −A + Aj, A − Aj, −A + Aj, −A + Aj, −A + Aj, −A + Aj, A − Aj, −A − Aj, A − Aj, −A − Aj, −A − Aj, A − Aj, −A + Aj, A + Aj, A + Aj, −A − Aj, A + Aj, A − Aj, −A + Aj, −A − Aj, A − Aj, −A − Aj, A + Aj, −A − Aj, A + Aj, −A + Aj, A + Aj, A − Aj, −A − Aj, −A − Aj, −A + Aj, A + Aj, −A + Aj, −A + Aj, −A − Aj, −A + Aj, −A + Aj, A + Aj, −A − Aj, −A + Aj |
| 8 | Polarization 1 | A + Aj, −A − Aj, −A + Aj, −A + Aj, A − Aj, A − Aj, A − Aj, −A + Aj, −A − Aj, −A − Aj, −A − Aj, A − Aj, −A − Aj, −A + Aj, −A − Aj, A − Aj, −A + Aj, −A + Aj, A + Aj, −A + Aj, A + Aj, −A − Aj, −A − Aj, −A + Aj, −A + Aj, −A + Aj, −A − Aj, −A − Aj, A + Aj, −A − Aj, A − Aj, A + Aj, −A − Aj, −A − Aj, A − Aj, A + Aj, A + Aj, A − Aj, −A − Aj, −A + Aj, A + Aj, −A − Aj, A + Aj, A + Aj, A + Aj, A + Aj, −A − Aj, A − Aj, −A − Aj, A − Aj, A − Aj, −A − Aj, A + Aj, −A + Aj, −A + Aj, A − Aj, −A + Aj, −A − Aj, A + Aj, A − Aj, −A − Aj, A − Aj, −A + Aj, A − Aj, −A + Aj, A + Aj, −A + Aj, −A − Aj, A − Aj, A − Aj, A + Aj, −A + Aj, A + Aj, A + Aj, A − Aj, A + Aj, A + Aj, −A + Aj, A − Aj, A + Aj |
| | Polarization 2 | A − Aj, −A + Aj, −A − Aj, −A − Aj, A + Aj, A + Aj, A + Aj, −A − Aj, −A + Aj, −A + Aj, −A + Aj, A + Aj, −A + Aj, −A − Aj, −A + Aj, A + Aj, −A − Aj, −A − Aj, A − Aj, −A − Aj, A − Aj, −A + Aj, −A + Aj, −A − Aj, −A − Aj, −A − Aj, −A + Aj, −A + Aj, A − Aj, −A + Aj, A + Aj, A − Aj, −A + Aj, −A + Aj, A + Aj, A − Aj, A − Aj, A + Aj, −A + Aj, −A − Aj, A − Aj, −A + Aj, A − Aj, A − Aj, A − Aj, A − Aj, −A + Aj, A + Aj, −A + Aj, A + Aj, A + Aj, −A + Aj, A − Aj, −A − Aj, −A − Aj, A + Aj, −A − Aj, −A + Aj, A − Aj, A + Aj, −A + Aj, A + Aj, −A − Aj, A + Aj, −A − Aj, A − Aj, −A − Aj, −A + Aj, A + Aj, A + Aj, A − Aj, −A − Aj, A − Aj, A − Aj, A + Aj, A − Aj, A − Aj, −A − Aj, A + Aj, A − Aj |
| 9 | Polarization 1 | A − Aj, −A + Aj, −A − Aj, A − Aj, −A − Aj, A + Aj, −A − Aj, −A − Aj, −A − Aj, A − Aj, A + Aj, A + Aj, A + Aj, A + Aj, A + Aj, −A + Aj, A + Aj, A − Aj, −A + Aj, −A − Aj, −A − Aj, −A + Aj, A − Aj, A − Aj, −A − Aj, A − Aj, A + Aj, −A + Aj, A − Aj, A − Aj, −A + Aj, −A + Aj, −A + Aj, A + Aj, A + Aj, −A + Aj, −A + Aj, A + Aj, −A − Aj, A − Aj, −A − Aj, A + Aj, A + Aj, −A − Aj, −A + Aj, A + Aj, −A + Aj, A + Aj, A − Aj, A − Aj, −A − Aj, −A + Aj, −A − Aj, −A − Aj, A − Aj, −A + Aj, A + Aj, −A − Aj, −A + Aj, −A + Aj, −A − Aj, A − Aj, −A − Aj, A − Aj, A − Aj, −A − Aj, A − Aj, −A + Aj, A + Aj, A + Aj, −A + Aj, −A − Aj, −A + Aj, −A − Aj, −A − Aj, A + Aj, A + Aj, A + Aj, A − Aj, A − Aj |
| | Polarization 2 | −A + Aj, A − Aj, −A − Aj, A − Aj, −A + Aj, A − Aj, −A + Aj, −A + Aj, A − Aj, A − Aj, −A − Aj, −A − Aj, −A + Aj, −A − Aj, −A + Aj, A + Aj, −A + Aj, −A − Aj, A − Aj, A + Aj, −A + Aj, A + Aj, −A − Aj, −A + Aj, A + Aj, A − Aj, A + Aj, A + Aj, A + Aj, A − Aj, −A + Aj, −A + Aj, −A + Aj, −A + Aj, −A + Aj, −A − Aj, A − Aj, A − Aj, −A − Aj, A + Aj, A + Aj, A + Aj, −A + Aj, A − Aj, −A − Aj, −A + Aj, A − Aj, A + Aj, −A + Aj, A − Aj, −A − Aj, A + Aj, −A − Aj, A − Aj, A − Aj, A + Aj, −A − Aj, A − Aj, A + Aj, A − Aj, −A − Aj, −A + Aj, −A + Aj, −A − Aj, −A − Aj, A − Aj, A + Aj, −A + Aj, −A + Aj, A − Aj, −A − Aj, −A − Aj, A + Aj, A + Aj, A − Aj, −A − Aj, A − Aj, A + Aj, A + Aj, −A − Aj |
| 10 | Polarization 1 | −A + Aj, −A + Aj, A + Aj, A + Aj, A + Aj, −A − Aj, −A − Aj, A − Aj, −A − Aj, A − Aj, A + Aj, A + Aj, A − Aj, −A + Aj, −A − Aj, −A + Aj, −A + Aj, −A − Aj, −A + Aj, −A − Aj, A − Aj, A − Aj, −A − Aj, A + Aj, A − Aj, −A + Aj, −A − Aj, −A − Aj, A − Aj, −A − Aj, −A + Aj, −A + Aj, A + Aj, A − Aj, A + Aj, A − Aj, −A − Aj, A + Aj, A + Aj, −A − Aj, −A + Aj, −A − Aj, A + Aj, A − Aj, A − Aj, A + Aj, A + Aj, A − Aj, A − Aj, A − Aj, −A + Aj, −A + Aj, A − Aj, A + Aj, −A + Aj, −A − Aj, −A + Aj, −A + Aj, A − Aj, −A − Aj, −A − Aj, A − Aj, −A + Aj, A + Aj, A − Aj, A + Aj, A + Aj, A + Aj, A + Aj, A + Aj, −A + Aj, −A − Aj, −A − Aj, −A − Aj, A + Aj, −A − Aj, −A + Aj, −A − Aj, A − Aj, −A + Aj |
| | Polarization 2 | −A − Aj, A + Aj, A + Aj, −A + Aj, −A − Aj, −A + Aj, A + Aj, A + Aj, −A − Aj, −A − Aj, −A + Aj, A − Aj, A − Aj, A + Aj, −A + Aj, −A − Aj, −A − Aj, A − Aj, A − Aj, −A − Aj, −A + Aj, A + Aj, −A + Aj, −A − Aj, A + Aj, −A + Aj, −A + Aj, −A − Aj, A + Aj, −A − Aj, −A + Aj, A − Aj, A + Aj, −A + Aj, A − Aj, −A − Aj, −A + Aj, A − Aj, A + Aj, A + Aj, A + Aj, −A − Aj, −A + Aj, −A + Aj, −A − Aj, A − Aj, A − Aj, A − Aj, A − Aj, A − Aj, −A + Aj, A + Aj, A + Aj, A + Aj, −A + Aj, A + Aj, A − Aj, −A − Aj, A + Aj, A − Aj, A + Aj, −A + Aj, −A − Aj, A − Aj, A + Aj, A − Aj, −A − Aj, A − Aj, −A − Aj, −A − Aj, −A + Aj, −A + Aj, A − Aj, A − Aj, −A + Aj, A − Aj, −A + Aj, −A − Aj, −A + Aj, A − Aj |

TABLE 27-3

| Index | Pilot sequence |
| --- | --- |
| 1 | −A + Aj, −A + Aj, A − Aj, A + Aj, A + Aj, A + Aj, A + Aj, −A + Aj, −A − Aj, A + Aj, −A − Aj, A + Aj, A + Aj, A − Aj, A + Aj, A − Aj, A + Aj, −A − Aj, A − Aj, A + Aj, −A + Aj, −A − Aj, −A + Aj, −A + Aj, −A − Aj, −A − Aj, −A + Aj, A + Aj, A + Aj, A − Aj, −A + Aj, A + Aj, −A − Aj, A + Aj, −A + Aj, A + Aj, −A − Aj, −A + Aj, −A − Aj, −A − Aj, A + Aj, A − Aj, −A − Aj, −A + Aj, A − Aj, A + Aj, −A + Aj, A − Aj, −A − Aj, A − Aj, A + Aj, A + Aj, −A + Aj, A − Aj, A − Aj, A + Aj, −A − Aj, −A − Aj, A − Aj, A − Aj, A + Aj, A − Aj, −A + Aj, −A + Aj, −A + Aj, −A − Aj, A − Aj, −A − Aj, −A − Aj, −A − Aj, −A + Aj, −A + Aj, A − Aj, −A + Aj, A − Aj, −A − Aj, −A − Aj, A − Aj, −A − Aj, A − Aj |
| 2 | −A + Aj, A − Aj, A + Aj, A + Aj, A + Aj, A + Aj, −A + Aj, −A − Aj, A + Aj, −A − Aj, A + Aj, A + Aj, A − Aj, A + Aj, A − Aj, A + Aj, −A − Aj, A − Aj, A + Aj, −A + Aj, −A − Aj, −A + Aj, −A + Aj, −A − Aj, −A − Aj, −A + Aj, A + Aj, A + Aj, A − Aj, −A + Aj, A + Aj, −A − Aj, A + Aj, −A + Aj, A + Aj, −A − Aj, −A + Aj, −A − Aj, −A − Aj, A + Aj, A − Aj, −A − Aj, −A + Aj, A − Aj, A + Aj, −A + Aj, A − Aj, −A − Aj, A − Aj, A + Aj, A + Aj, −A + Aj, A − Aj, A − Aj, A + Aj, −A − Aj, −A − Aj, A − Aj, A − Aj, A + Aj, A − Aj, −A + Aj, −A + Aj, −A + Aj, −A − Aj, A − Aj, −A − Aj, −A − Aj, −A − Aj, −A + Aj, −A + Aj, A − Aj, −A + Aj, A − Aj, −A − Aj, −A − Aj, A − Aj, −A − Aj, A − Aj, −A + Aj |
| 3 | A − Aj, −A + Aj, −A − Aj, −A − Aj, −A − Aj, −A − Aj, A − Aj, A + Aj, −A − Aj, A + Aj, −A − Aj, −A − Aj, −A + Aj, −A − Aj, −A + Aj, −A − Aj, A + Aj, −A + Aj, −A − Aj, A − Aj, A + Aj, A − Aj, A − Aj, A + Aj, A + Aj, A − Aj, −A − Aj, −A − Aj, −A + Aj, A − Aj, −A − Aj, A + Aj, −A − Aj, A − Aj, −A − Aj, A + Aj, A − Aj, A + Aj, A + Aj, −A − Aj, −A + Aj, A + Aj, A − Aj, −A + Aj, −A − Aj, A − Aj, −A + Aj, A + Aj, −A + Aj, −A − Aj, −A − Aj, A − Aj, −A + Aj, −A + Aj, −A − Aj, A + Aj, A + Aj, −A + Aj, −A + Aj, −A − Aj, −A + Aj, A − Aj, A − Aj, A − Aj, A + Aj, −A + Aj, A + Aj, A + Aj, A + Aj, A − Aj, A − Aj, −A + Aj, A − Aj, −A + Aj, A + Aj, A + Aj, −A + Aj, A + Aj, −A + Aj, A − Aj |
| 4 | A − Aj, A − Aj, −A + Aj, −A − Aj, −A − Aj, −A − Aj, −A − Aj, A − Aj, A + Aj, −A − Aj, A + Aj, −A − Aj, −A − Aj, −A + Aj, −A − Aj, −A + Aj, −A − Aj, A + Aj, −A + Aj, −A − Aj, A − Aj, A + Aj, A − Aj, A − Aj, A + Aj, A + Aj, A − Aj, −A − Aj, −A − Aj, −A + Aj, A − Aj, −A − Aj, A + Aj, −A − Aj, A − Aj, −A − Aj, A + Aj, A − Aj, A + Aj, A + Aj, −A − Aj, −A + Aj, A + Aj, A − Aj, −A + Aj, −A − Aj, A − Aj, −A + Aj, A + Aj, −A + Aj, −A − Aj, −A − Aj, A − Aj, −A + Aj, −A + Aj, −A − Aj, A + Aj, A + Aj, −A + Aj, −A + Aj, −A − Aj, −A + Aj, A − Aj, A − Aj, A − Aj, A + Aj, −A + Aj, A + Aj, A + Aj, A + Aj, A − Aj, A − Aj, −A + Aj, A − Aj, −A + Aj, A + Aj, A + Aj, −A + Aj, A + Aj, −A + Aj |

TABLE 27-4

| Index | Pilot sequence |
| --- | --- |
| 1 | −A − Aj, −A − Aj, A + Aj, A − Aj, A − Aj, A − Aj, A − Aj, −A − Aj, −A + Aj, A − Aj, −A + Aj, A − Aj, A − Aj, A + Aj, A − Aj, A + Aj, A − Aj, −A + Aj, A + Aj, A − Aj, −A − Aj, −A + Aj, −A − Aj, −A − Aj, −A + Aj, −A + Aj, −A − Aj, A − Aj, A − Aj, A + Aj, −A − Aj, A − Aj, −A + Aj, A − Aj, −A − Aj, A − Aj, −A + Aj, −A − Aj, −A + Aj, −A + Aj, A − Aj, A + Aj, −A + Aj, −A − Aj, A + Aj, A − Aj, −A − Aj, A + Aj, −A + Aj, A + Aj, A − Aj, A − Aj, −A − Aj, A + Aj, A + Aj, A − Aj, −A + Aj, −A + Aj, A + Aj, A + Aj, A − Aj, A + Aj, −A − Aj, −A − Aj, −A − Aj, −A + Aj, A + Aj, −A + Aj, −A + Aj, −A + Aj, −A − Aj, −A − Aj, A + Aj, −A − Aj, A + Aj, −A + Aj, −A + Aj, A + Aj, −A + Aj, A + Aj |
| 2 | −A − Aj, A + Aj, A − Aj, A − Aj, A − Aj, A − Aj, −A − Aj, −A + Aj, A − Aj, −A + Aj, A − Aj, A − Aj, A + Aj, A − Aj, A + Aj, A − Aj, −A + Aj, A + Aj, A − Aj, −A − Aj, −A + Aj, −A − Aj, −A − Aj, −A + Aj, −A + Aj, −A − Aj, A − Aj, A − Aj, A + Aj, −A − Aj, A − Aj, −A + Aj, A − Aj, −A − Aj, A − Aj, −A + Aj, −A − Aj, −A + Aj, −A + Aj, A − Aj, A + Aj, −A + Aj, −A − Aj, A + Aj, A − Aj, −A − Aj, A + Aj, −A + Aj, A + Aj, A − Aj, A − Aj, −A − Aj, A + Aj, A + Aj, A − Aj, −A + Aj, −A + Aj, A + Aj, A + Aj, A − Aj, A + Aj, −A − Aj, −A − Aj, −A − Aj, −A + Aj, A + Aj, −A + Aj, −A + Aj, −A + Aj, −A − Aj, −A − Aj, A + Aj, −A − Aj, A + Aj, −A + Aj, −A + Aj, A + Aj, −A + Aj, A + Aj, −A − Aj |
| 3 | A + Aj, −A − Aj, −A + Aj, −A + Aj, −A + Aj, −A + Aj, A + Aj, A − Aj, −A + Aj, A − Aj, −A + Aj, −A + Aj, −A − Aj, −A + Aj, −A − Aj, −A + Aj, A − Aj, −A − Aj, −A + Aj, A + Aj, A − Aj, A + Aj, A + Aj, A − Aj, A − Aj, A + Aj, −A + Aj, −A + Aj, −A − Aj, A + Aj, −A + Aj, A − Aj, −A + Aj, A + Aj, −A + Aj, A − Aj, A + Aj, A − Aj, A − Aj, −A + Aj, −A − Aj, A − Aj, A + Aj, −A − Aj, −A + Aj, A + Aj, −A − Aj, A − Aj, −A − Aj, −A + Aj, −A + Aj, A + Aj, −A − Aj, −A − Aj, −A + Aj, A − Aj, A − Aj, −A − Aj, −A − Aj, −A + Aj, −A − Aj, A + Aj, A + Aj, A + Aj, A − Aj, −A − Aj, A − Aj, A − Aj, A − Aj, A + Aj, A + Aj, −A − Aj, A + Aj, −A − Aj, A − Aj, A − Aj, −A − Aj, A − Aj, −A − Aj, A + Aj |
| 4 | A + Aj, A + Aj, −A − Aj, −A + Aj, −A + Aj, −A + Aj, −A + Aj, A + Aj, A − Aj, −A + Aj, A − Aj, −A + Aj, −A + Aj, −A − Aj, −A + Aj, −A − Aj, −A + Aj, A − Aj, −A − Aj, −A + Aj, A + Aj, A − Aj, A + Aj, A + Aj, A − Aj, A − Aj, A + Aj, −A + Aj, −A + Aj, −A − Aj, A + Aj, −A + Aj, A − Aj, −A + Aj, A + Aj, −A + Aj, A − Aj, A + Aj, A − Aj, A − Aj, −A + Aj, −A − Aj, A − Aj, A + Aj, −A − Aj, −A + Aj, A + Aj, −A − Aj, A − Aj, −A − Aj, −A + Aj, −A + Aj, A + Aj, −A − Aj, −A − Aj, −A + Aj, A − Aj, A − Aj, −A − Aj, −A − Aj, −A + Aj, −A − Aj, A + Aj, A + Aj, A + Aj, A − Aj, −A − Aj, A − Aj, A − Aj, A − Aj, A + Aj, A + Aj, −A − Aj, A + Aj, −A − Aj, A − Aj, A − Aj, −A − Aj, A − Aj, −A − Aj |

TABLE 27-5

| Index | Pilot sequence |
| --- | --- |
| 1 | −A + Aj, −A − Aj, −A + Aj, −A − Aj, −A − Aj, −A + Aj, A − Aj, −A + Aj, A − Aj, A − Aj, −A − Aj, −A − Aj, −A − Aj, −A + Aj, −A − Aj, A − Aj, A − Aj, A − Aj, −A + Aj, A + Aj, −A + Aj, −A + Aj, −A − Aj, −A − Aj, A + Aj, −A + Aj, −A + Aj, A − Aj, A + Aj, A + Aj, −A + Aj, −A − Aj, −A + Aj, A − Aj, A + Aj, −A + Aj, A − Aj, −A − Aj, −A + Aj, A + Aj, −A − Aj, −A − Aj, A − Aj, −A − Aj, A + Aj, A − Aj, A + Aj, −A − Aj, A + Aj, A − Aj, −A + Aj, A + Aj, A + Aj, A − Aj, −A − Aj, −A − Aj, A − Aj, A − Aj, −A − Aj, A − Aj, A + Aj, −A + Aj, −A − Aj, A + Aj, −A + Aj, A + Aj, −A + Aj, A + Aj, A + Aj, −A − Aj, A + Aj, −A − Aj, A − Aj, A + Aj, A + Aj, A + Aj, A + Aj, −A + Aj, A − Aj, A − Aj |
| 2 | −A + Aj, A − Aj, A + Aj, A − Aj, A + Aj, A + Aj, A − Aj, −A + Aj, A − Aj, −A + Aj, −A + Aj, A + Aj, A + Aj, A + Aj, A − Aj, A + Aj, −A + Aj, −A + Aj, −A + Aj, A − Aj, −A − Aj, A − Aj, A − Aj, A + Aj, A + Aj, −A − Aj, A − Aj, A − Aj, −A + Aj, −A − Aj, −A − Aj, A − Aj, A + Aj, A − Aj, −A + Aj, −A − Aj, A − Aj, −A + Aj, A + Aj, A − Aj, −A − Aj, A + Aj, A + Aj, −A + Aj, A + Aj, −A − Aj, −A + Aj, −A − Aj, A + Aj, −A − Aj, −A + Aj, A − Aj, −A − Aj, −A − Aj, |

TABLE 27-5-continued

| Index | Pilot sequence |
|---|---|
| | −A + Aj, A + Aj, A + Aj, −A + Aj, −A + Aj, A + Aj, −A + Aj, −A − Aj, A − Aj, A + Aj, −A − Aj, A − Aj, −A − Aj, A − Aj, −A − Aj, −A − Aj, A + Aj, −A − Aj, A + Aj, −A + Aj, −A − Aj, −A − Aj, −A − Aj, −A − Aj, A − Aj, −A + Aj |
| 3 | A − Aj, −A + Aj, −A − Aj, −A + Aj, −A − Aj, −A − Aj, −A + Aj, A − Aj, −A + Aj, A − Aj, A − Aj, −A − Aj, −A − Aj, −A − Aj, −A + Aj, −A − Aj, A − Aj, A − Aj, A − Aj, −A + Aj, A + Aj, −A + Aj, −A + Aj, −A − Aj, −A − Aj, A + Aj, −A + Aj, −A + Aj, A − Aj, A + Aj, A + Aj, −A + Aj, −A − Aj, −A + Aj, A − Aj, A + Aj, −A + Aj, A − Aj, −A − Aj, −A + Aj, A + Aj, −A − Aj, −A − Aj, A − Aj, −A − Aj, A + Aj, A − Aj, A + Aj, −A − Aj, A + Aj, A − Aj, −A + Aj, A + Aj, A + Aj, A − Aj, −A − Aj, −A − Aj, A − Aj, A − Aj, −A − Aj, A − Aj, A + Aj, −A + Aj, −A − Aj, A + Aj, −A + Aj, A + Aj, −A + Aj, A + Aj, A + Aj, −A − Aj, A + Aj, −A − Aj, A − Aj, A + Aj, A + Aj, A + Aj, A + Aj, −A + Aj, A − Aj |
| 4 | A − Aj, A + Aj, A − Aj, A + Aj, A + Aj, A − Aj, −A + Aj, A − Aj, −A + Aj, −A + Aj, A + Aj, A + Aj, A + Aj, A − Aj, A + Aj, −A + Aj, −A + Aj, −A + Aj, A − Aj, −A − Aj, A − Aj, A − Aj, A + Aj, A + Aj, −A − Aj, A − Aj, A − Aj, −A + Aj, −A − Aj, −A − Aj, A − Aj, A + Aj, A − Aj, −A + Aj, −A − Aj, A − Aj, −A + Aj, A + Aj, A − Aj, −A − Aj, A + Aj, A + Aj, −A + Aj, A + Aj, −A − Aj, −A + Aj, −A − Aj, A + Aj, −A − Aj, −A + Aj, A − Aj, −A − Aj, −A − Aj, −A + Aj, A + Aj, A + Aj, −A + Aj, −A + Aj, A + Aj, −A + Aj, −A − Aj, A − Aj, A + Aj, −A − Aj, A − Aj, −A − Aj, A − Aj, −A − Aj, −A − Aj, A + Aj, −A − Aj, A + Aj, −A + Aj, −A − Aj, −A − Aj, −A − Aj, −A − Aj, A − Aj, −A + Aj, −A + Aj |

TABLE 27-6

| Index | Pilot sequence |
|---|---|
| 1 | −A − Aj, −A + Aj, −A − Aj, −A + Aj, −A + Aj, −A − Aj, A + Aj, −A − Aj, A + Aj, A + Aj, −A + Aj, −A + Aj, −A + Aj, −A − Aj, −A + Aj, A + Aj, A + Aj, A + Aj, −A − Aj, A − Aj, −A − Aj, −A − Aj, −A + Aj, −A + Aj, A − Aj, −A − Aj, −A − Aj, A + Aj, A − Aj, A − Aj, −A − Aj, −A + Aj, −A − Aj, A + Aj, A − Aj, −A − Aj, A + Aj, −A + Aj, −A − Aj, A − Aj, −A + Aj, −A + Aj, A + Aj, −A + Aj, A − Aj, A + Aj, A − Aj, −A + Aj, A − Aj, A + Aj, −A − Aj, A − Aj, A − Aj, A + Aj, −A + Aj, −A + Aj, A + Aj, A + Aj, −A + Aj, A + Aj, A − Aj, −A − Aj, −A + Aj, A − Aj, −A − Aj, A − Aj, −A − Aj, A − Aj, A − Aj, −A + Aj, A − Aj, −A + Aj, A + Aj, A − Aj, A − Aj, A − Aj, A − Aj, −A − Aj, A + Aj, A + Aj |
| 2 | −A − Aj, A + Aj, A − Aj, A + Aj, A − Aj, A − Aj, A + Aj, −A − Aj, A + Aj, −A − Aj, −A − Aj, A − Aj, A − Aj, A − Aj, A + Aj, A − Aj, −A − Aj, −A − Aj, −A − Aj, A + Aj, −A + Aj, A + Aj, A + Aj, A − Aj, A − Aj, −A + Aj, A + Aj, A + Aj, −A − Aj, −A + Aj, −A + Aj, A + Aj, A − Aj, A + Aj, −A − Aj, −A + Aj, A + Aj, −A − Aj, A − Aj, A + Aj, −A + Aj, A − Aj, A − Aj, −A − Aj, A − Aj, −A + Aj, −A − Aj, −A + Aj, A − Aj, −A + Aj, −A − Aj, A + Aj, −A + Aj, −A + Aj, −A − Aj, A − Aj, A − Aj, −A − Aj, −A − Aj, A − Aj, −A − Aj, −A + Aj, A + Aj, A − Aj, −A + Aj, A + Aj, −A + Aj, A + Aj, −A + Aj, −A + Aj, A − Aj, −A + Aj, A − Aj, −A − Aj, −A + Aj, −A + Aj, −A + Aj, −A + Aj, A + Aj, −A − Aj |
| 3 | A + Aj, −A − Aj, −A + Aj, −A − Aj, −A + Aj, −A + Aj, −A − Aj, A + Aj, −A − Aj, A + Aj, A + Aj, −A + Aj, −A + Aj, −A + Aj, −A − Aj, −A + Aj, A + Aj, A + Aj, A + Aj, −A − Aj, A − Aj, −A − Aj, −A − Aj, −A + Aj, −A + Aj, A − Aj, −A − Aj, −A − Aj, A + Aj, A − Aj, A − Aj, −A − Aj, −A + Aj, −A − Aj, A + Aj, A − Aj, −A − Aj, A + Aj, −A + Aj, −A − Aj, A − Aj, −A + Aj, −A + Aj, A + Aj, −A + Aj, A − Aj, A + Aj, A − Aj, −A + Aj, A − Aj, A + Aj, −A − Aj, A − Aj, A − Aj, A + Aj, −A + Aj, −A + Aj, A + Aj, A + Aj, −A + Aj, A + Aj, A − Aj, −A − Aj, −A + Aj, A − Aj, −A − Aj, A − Aj, −A − Aj, A − Aj, A − Aj, −A + Aj, A − Aj, −A + Aj, A + Aj, A − Aj, A − Aj, A − Aj, A − Aj, −A − Aj, A + Aj |
| 4 | A + Aj, A − Aj, A + Aj, A − Aj, A − Aj, A + Aj, −A − Aj, A + Aj, −A − Aj, −A − Aj, A − Aj, A − Aj, A − Aj, A + Aj, A − Aj, −A − Aj, −A − Aj, −A − Aj, A + Aj, −A + Aj, A + Aj, A + Aj, A − Aj, A − Aj, −A + Aj, A + Aj, A + Aj, −A − Aj, −A + Aj, −A + Aj, A + Aj, A − Aj, A + Aj, −A − Aj, −A + Aj, A + Aj, −A − Aj, A − Aj, A + Aj, −A + Aj, A − Aj, A − Aj, −A − Aj, A − Aj, −A + Aj, −A − Aj, −A + Aj, A − Aj, −A + Aj, −A − Aj, A + Aj, −A + Aj, −A + Aj, −A − Aj, A − Aj, A − Aj, −A − Aj, −A − Aj, A − Aj, −A − Aj, −A + Aj, A + Aj, A − Aj, −A + Aj, A + Aj, −A + Aj, A + Aj, −A + Aj, −A + Aj, A − Aj, −A + Aj, A − Aj, −A − Aj, −A + Aj, −A + Aj, −A + Aj, −A + Aj, A + Aj, −A − Aj, −A − Aj |

(21) When $N_{PS}$=92, if a remainder of $N_{TS}$ divided by 4 is 1, the pilot sequence is one item in Table 28-1. Alternatively, any item is selected from Table 28-2 as a pilot sequence in one polarization direction, and any item is selected from Table 28-3 as a pilot sequence in the other polarization direction. Alternatively, any item is selected from Table 28-4 as a pilot sequence in one polarization direction, and any item is selected from Table 28-5 as a pilot sequence in the other polarization direction. If a remainder of $N_{TS}$ divided by 4 is 3, the pilot sequence is one item in Table 28-1 or Table 28-6. Alternatively, any item is selected from Table 28-2 as a pilot sequence in one polarization direction, and any item is selected from Table 28-3 as a pilot sequence in the other polarization direction. Alternatively, any item is selected from Table 28-4 as a pilot sequence in one polarization direction, and any item is selected from Table 28-5 as a pilot sequence in the other polarization direction.

TABLE 28-1

| Index | Polarization | Pilot sequence |
|---|---|---|
| 1 | Polarization 1 | −A − Aj, A − Aj, A + Aj, −A + Aj, A − Aj, A + Aj, A − Aj, −A − Aj, A + Aj, A + Aj, A − Aj, A + Aj, −A − Aj, −A + Aj, A − Aj, A + Aj, A − Aj, A − Aj, −A + Aj, −A + Aj, −A + Aj, −A + Aj, −A − Aj, −A − Aj, A + Aj, A + Aj, A − Aj, −A − Aj, −A − Aj, A − Aj, A + Aj, A + Aj, A − Aj, A + Aj, A + Aj, −A + Aj, −A + Aj, A − Aj, A − Aj, A − Aj, −A − Aj, A + Aj, −A + Aj, −A + Aj, A + Aj, A − Aj, −A + Aj, −A − Aj, A − Aj, A + Aj, −A + Aj, −A + Aj, A + Aj, −A + Aj, −A + Aj, A + Aj, A + Aj, A + Aj, −A + Aj, −A − Aj, −A + Aj, −A + Aj, −A + Aj, −A − Aj, −A + Aj, −A + Aj, A − Aj, −A − Aj, A − Aj, −A − Aj, A − Aj, −A − Aj, A + Aj, A − Aj, A − Aj, −A − Aj, −A − Aj, −A − Aj, −A − Aj, A + Aj, −A − Aj, A + Aj, −A + Aj, −A − Aj, −A − Aj, −A + Aj, A − Aj, −A − Aj, −A − Aj, A + Aj, A − Aj, A − Aj |
| | Polarization 2 | −A − Aj, A + Aj, A − Aj, −A + Aj, A − Aj, −A + Aj, A + Aj, A + Aj, −A + Aj, −A + Aj, −A − Aj, −A − Aj, −A − Aj, A + Aj, −A + Aj, −A + Aj, −A − Aj, A − Aj, A − Aj, −A + Aj, A − Aj, A + Aj, −A − Aj, A + Aj, A + Aj, −A + Aj, A − Aj, −A + Aj, −A + Aj, −A − Aj, −A + Aj, A + Aj, −A − Aj, A − Aj, |

TABLE 28-1-continued

| Index | Polarization | Pilot sequence |
|---|---|---|
| | | −A + Aj, A − Aj, A − Aj, −A + Aj, A − Aj, A − Aj, A − Aj, A − Aj, −A + Aj, A + Aj, A − Aj, −A + Aj, A − Aj, −A − Aj, −A + Aj, A − Aj, A + Aj, A + Aj, −A − Aj, −A − Aj, A + Aj, A + Aj, −A + Aj, −A − Aj, A + Aj, A + Aj, A + Aj, A + Aj, A + Aj, −A + Aj, A + Aj, −A + Aj, A − Aj, −A − Aj, −A − Aj, −A + Aj, −A − Aj, −A − Aj, −A − Aj, A − Aj, A + Aj, −A − Aj, A − Aj, −A − Aj, A − Aj, −A + Aj, −A + Aj, A + Aj, −A − Aj, A − Aj, −A − Aj, −A − Aj, A + Aj, A + Aj, −A − Aj, A − Aj, A − Aj, −A + Aj |
| 2 | Polarization 1 | −A − Aj, A − Aj, A + Aj, −A + Aj, A − Aj, A + Aj, A − Aj, −A − Aj, A + Aj, A + Aj, A − Aj, A + Aj, −A − Aj, −A + Aj, A − Aj, A + Aj, A − Aj, A − Aj, −A + Aj, −A + Aj, −A + Aj, −A + Aj, −A − Aj, −A − Aj, A + Aj, A + Aj, A − Aj, −A − Aj, −A − Aj, A − Aj, A + Aj, A + Aj, A − Aj, A + Aj, A + Aj, −A + Aj, −A + Aj, A − Aj, A − Aj, A − Aj, −A − Aj, A + Aj, −A + Aj, −A + Aj, A + Aj, A − Aj, −A + Aj, −A − Aj, A − Aj, A + Aj, −A + Aj, −A + Aj, A + Aj, −A + Aj, −A + Aj, A + Aj, A + Aj, A + Aj, −A + Aj, −A − Aj, −A + Aj, −A + Aj, −A + Aj, −A − Aj, −A + Aj, −A + Aj, A − Aj, −A − Aj, A − Aj, −A − Aj, A − Aj, −A − Aj, A + Aj, A − Aj, A − Aj, −A − Aj, −A − Aj, −A − Aj, −A − Aj, A + Aj, −A − Aj, A + Aj, −A + Aj, −A − Aj, −A − Aj, −A + Aj, A − Aj, −A − Aj, −A − Aj, A + Aj, A − Aj, A − Aj |
| | Polarization 2 | −A + Aj, −A − Aj, A + Aj, A − Aj, −A + Aj, A − Aj, −A + Aj, A + Aj, A + Aj, −A + Aj, −A + Aj, −A − Aj, −A − Aj, −A − Aj, A + Aj, −A + Aj, −A + Aj, −A − Aj, A − Aj, A − Aj, −A + Aj, A − Aj, A + Aj, −A − Aj, A + Aj, A + Aj, −A + Aj, A − Aj, −A + Aj, −A + Aj, −A − Aj, −A + Aj, A + Aj, −A − Aj, A − Aj, −A + Aj, A − Aj, A − Aj, −A + Aj, A − Aj, A − Aj, A − Aj, A − Aj, −A + Aj, A + Aj, A − Aj, −A + Aj, A − Aj, −A − Aj, −A + Aj, A − Aj, A + Aj, A + Aj, −A − Aj, −A − Aj, A + Aj, A + Aj, −A + Aj, −A − Aj, A + Aj, A + Aj, A + Aj, A + Aj, A + Aj, −A + Aj, A + Aj, −A + Aj, A − Aj, −A − Aj, −A − Aj, −A + Aj, −A − Aj, −A − Aj, −A − Aj, A − Aj, A + Aj, −A − Aj, A − Aj, −A − Aj, A − Aj, −A + Aj, −A + Aj, A + Aj, −A − Aj, A − Aj, −A − Aj, −A − Aj, A + Aj, A + Aj, −A − Aj, A − Aj, A − Aj |
| 3 | Polarization 1 | −A + Aj, −A + Aj, −A − Aj, A + Aj, A + Aj, −A − Aj, −A − Aj, −A + Aj, −A − Aj, A + Aj, A − Aj, A − Aj, −A + Aj, −A − Aj, −A + Aj, −A − Aj, A + Aj, −A + Aj, −A − Aj, −A − Aj, −A − Aj, A − Aj, −A − Aj, −A − Aj, −A + Aj, A − Aj, A + Aj, A − Aj, A + Aj, A + Aj, A + Aj, A + Aj, A + Aj, −A − Aj, A − Aj, A + Aj, A + Aj, −A − Aj, −A − Aj, A + Aj, A + Aj, −A + Aj, A − Aj, −A − Aj, −A + Aj, A − Aj, −A + Aj, A + Aj, A − Aj, −A + Aj, −A + Aj, −A + Aj, −A + Aj, A − Aj, −A + Aj, −A + Aj, A − Aj, −A + Aj, −A − Aj, A + Aj, A − Aj, −A − Aj, A − Aj, A − Aj, −A + Aj, A − Aj, A + Aj, A + Aj, −A − Aj, A + Aj, −A + Aj, A − Aj, −A + Aj, −A + Aj, −A − Aj, A − Aj, A − Aj, A + Aj, −A − Aj, −A − Aj, −A − Aj, A − Aj, A − Aj, A + Aj, A + Aj, A − Aj, −A + Aj, A − Aj, −A + Aj, A + Aj, −A − Aj, A − Aj |
| | Polarization 2 | −A + Aj, −A + Aj, A + Aj, −A − Aj, −A − Aj, −A + Aj, A − Aj, −A − Aj, −A − Aj, A − Aj, A + Aj, −A − Aj, A + Aj, −A − Aj, −A − Aj, −A − Aj, −A − Aj, −A + Aj, −A + Aj, A + Aj, −A − Aj, −A + Aj, −A − Aj, −A + Aj, −A − Aj, −A + Aj, A − Aj, A − Aj, −A − Aj, A − Aj, A − Aj, A − Aj, −A − Aj, A − Aj, A + Aj, A + Aj, A + Aj, A − Aj, A − Aj, A + Aj, A − Aj, A − Aj, A + Aj, −A + Aj, −A − Aj, A − Aj, −A + Aj, A + Aj, A − Aj, A − Aj, A + Aj, −A − Aj, −A + Aj, −A + Aj, −A + Aj, A − Aj, A − Aj, A + Aj, A + Aj, −A + Aj, A + Aj, A + Aj, −A + Aj, −A − Aj, −A − Aj, −A + Aj, A + Aj, A + Aj, −A − Aj, −A − Aj, A − Aj, A − Aj, A − Aj, A − Aj, −A + Aj, −A + Aj, A + Aj, −A + Aj, A − Aj, −A − Aj, A + Aj, −A + Aj, A + Aj, A + Aj, −A − Aj, −A + Aj, A + Aj, −A + Aj, A − Aj, A + Aj, −A + Aj, −A − Aj |
| 4 | Polarization 1 | −A + Aj, −A + Aj, A + Aj, −A − Aj, −A − Aj, −A + Aj, A − Aj, −A − Aj, −A − Aj, A − Aj, A + Aj, −A − Aj, A + Aj, −A − Aj, −A − Aj, −A − Aj, −A − Aj, −A + Aj, −A + Aj, A + Aj, −A − Aj, −A + Aj, −A − Aj, −A + Aj, −A − Aj, −A + Aj, A − Aj, A − Aj, −A − Aj, A − Aj, A − Aj, A − Aj, −A − Aj, A − Aj, A + Aj, A + Aj, A + Aj, A − Aj, A − Aj, A + Aj, A − Aj, A − Aj, A + Aj, −A + Aj, −A − Aj, A − Aj, −A + Aj, A + Aj, A − Aj, A − Aj, A + Aj, −A − Aj, −A + Aj, −A + Aj, −A + Aj, A − Aj, A − Aj, A + Aj, A + Aj, −A + Aj, A + Aj, A + Aj, −A + Aj, −A − Aj, −A − Aj, −A + Aj, A + Aj, A + Aj, −A − Aj, −A − Aj, A − Aj, A − Aj, A − Aj, A − Aj, −A + Aj, −A + Aj, A + Aj, −A + Aj, A − Aj, −A − Aj, A + Aj, −A + Aj, A + Aj, A + Aj, −A − Aj, −A + Aj, A + Aj, −A + Aj, A − Aj, A + Aj, −A + Aj, −A − Aj |
| | Polarization 2 | A − Aj, −A + Aj, −A + Aj, −A − Aj, A + Aj, A + Aj, −A − Aj, −A − Aj, −A + Aj, −A − Aj, A + Aj, A − Aj, A − Aj, −A + Aj, −A − Aj, −A + Aj, −A − Aj, A + Aj, −A + Aj, −A − Aj, −A − Aj, −A − Aj, A − Aj, −A − Aj, −A − Aj, −A + Aj, A − Aj, A + Aj, A − Aj, A + Aj, A + Aj, A + Aj, A + Aj, A + Aj, −A − Aj, A − Aj, A + Aj, A + Aj, −A − Aj, −A − Aj, A + Aj, A + Aj, −A + Aj, A − Aj, −A − Aj, −A + Aj, A − Aj, −A + Aj, A + Aj, A − Aj, −A + Aj, −A + Aj, −A + Aj, −A + Aj, A − Aj, −A + Aj, −A + Aj, A − Aj, −A + Aj, −A − Aj, A + Aj, A − Aj, −A − Aj, A − Aj, A − Aj, −A + Aj, A − Aj, A + Aj, A + Aj, −A − Aj, A + Aj, −A + Aj, A − Aj, −A + Aj, −A + Aj, −A − Aj, A − Aj, A − Aj, A + Aj, −A − Aj, −A − Aj, −A − Aj, A − Aj, A − Aj, A + Aj, A + Aj, A − Aj, −A + Aj, A − Aj, −A + Aj, A + Aj, −A − Aj |

TABLE 28-2

| Index | Pilot sequence |
|---|---|
| 1 | −A − Aj, A + Aj, −A − Aj, −A + Aj, −A − Aj, −A − Aj, A − Aj, −A + Aj, −A − Aj, −A + Aj, −A − Aj, A − Aj, A + Aj, −A − Aj, −A − Aj, A − Aj, A + Aj, −A + Aj, −A − Aj, −A − Aj, −A + Aj, −A − Aj, A + Aj, A + Aj, A − Aj, A − Aj, A + Aj, −A − Aj, A − Aj, A + Aj, A − Aj, −A + Aj, A + Aj, A + Aj, A − Aj, A + Aj, A + Aj, A − Aj, −A − Aj, A − Aj, −A + Aj, A − Aj, −A − Aj, −A + Aj, A − Aj, −A − Aj, A + Aj, A + Aj, −A + Aj, A + Aj, −A − Aj, A − Aj, −A − Aj, A + Aj, A − Aj, −A + Aj, −A + Aj, A − Aj, A + Aj, A + Aj, −A − Aj, −A + Aj, A + Aj, −A + Aj, −A + Aj, A + Aj, A − Aj, −A + Aj, −A − Aj, A − Aj, −A + Aj, −A + Aj, −A + Aj, A − Aj, −A − Aj, A − Aj, A + Aj, A + Aj, −A + Aj, −A + Aj, −A + Aj, A + Aj, −A − Aj, −A − Aj, −A + Aj, A − Aj, A − Aj, A − Aj, A − Aj, −A + Aj, −A − Aj, A + Aj |
| 2 | −A − Aj, A + Aj, −A − Aj, A + Aj, A − Aj, A + Aj, A + Aj, −A + Aj, A − Aj, A + Aj, A − Aj, A + Aj, −A + Aj, −A − Aj, A + Aj, A + Aj, −A + Aj, −A − Aj, A − Aj, A + Aj, A + Aj, A − Aj, A + Aj, −A − Aj, −A − Aj, −A + Aj, −A + Aj, −A − Aj, A + Aj, −A + Aj, −A − Aj, −A + Aj, A − Aj, −A − Aj, −A − Aj, −A + Aj, −A − Aj, −A − Aj, −A + Aj, A + Aj, −A + Aj, A − Aj, −A + Aj, A + Aj, A − Aj, −A + Aj, A + Aj, −A − Aj, −A − Aj, A − Aj, −A − Aj, A + Aj, −A + Aj, A + Aj, −A − Aj, −A + Aj, A − Aj, A − Aj, −A + Aj, −A − Aj, −A − Aj, A + Aj, A − Aj, −A − Aj, A − Aj, A − Aj, −A − Aj, −A + Aj, A − Aj, A + Aj, −A + Aj, A − Aj, A − Aj, A − Aj, −A + Aj, A + Aj, −A + Aj, −A − Aj, −A − Aj, A − Aj, A − Aj, A − Aj, −A − Aj, A + Aj, A + Aj, A − Aj, −A + Aj, −A + Aj, −A + Aj, −A + Aj, A − Aj, A + Aj |

TABLE 28-2-continued

| Index | Pilot sequence |
|---|---|
| 3 | A + Aj, −A − Aj, A + Aj, −A − Aj, −A + Aj, −A − Aj, −A − Aj, A − Aj, −A + Aj, −A − Aj, −A + Aj, −A − Aj, A − Aj, A + Aj, −A − Aj, −A − Aj, A − Aj, A + Aj, −A + Aj, −A − Aj, −A − Aj, −A + Aj, −A − Aj, A + Aj, A + Aj, A − Aj, A − Aj, A + Aj, −A − Aj, A − Aj, A + Aj, A − Aj, −A + Aj, A + Aj, A + Aj, A − Aj, A + Aj, A + Aj, A − Aj, −A − Aj, A − Aj, −A + Aj, A − Aj, −A − Aj, −A + Aj, A − Aj, −A − Aj, A + Aj, A + Aj, −A + Aj, A + Aj, −A − Aj, A − Aj, −A − Aj, A + Aj, A − Aj, −A + Aj, −A + Aj, A − Aj, A + Aj, A + Aj, −A − Aj, −A + Aj, A + Aj, −A + Aj, −A + Aj, A + Aj, A − Aj, −A + Aj, −A − Aj, A − Aj, −A + Aj, −A + Aj, −A + Aj, A − Aj, −A − Aj, A − Aj, A + Aj, A + Aj, −A + Aj, −A + Aj, −A + Aj, A + Aj, −A − Aj, −A − Aj, −A + Aj, A − Aj, A − Aj, A − Aj, A − Aj, −A + Aj, −A − Aj |
| 4 | A + Aj, −A − Aj, A + Aj, A − Aj, A + Aj, A + Aj, −A + Aj, A − Aj, A + Aj, A − Aj, A + Aj, −A + Aj, −A − Aj, A + Aj, A + Aj, −A + Aj, −A − Aj, A − Aj, A + Aj, A + Aj, A − Aj, A + Aj, −A − Aj, −A − Aj, −A + Aj, −A + Aj, −A − Aj, A + Aj, −A + Aj, −A − Aj, −A + Aj, A − Aj, −A − Aj, −A − Aj, −A + Aj, −A − Aj, −A − Aj, −A + Aj, A + Aj, −A + Aj, A − Aj, −A + Aj, A + Aj, A − Aj, −A + Aj, A + Aj, −A − Aj, −A − Aj, A − Aj, −A − Aj, A + Aj, −A + Aj, A + Aj, −A − Aj, −A + Aj, A − Aj, A − Aj, −A + Aj, −A − Aj, −A − Aj, A + Aj, A − Aj, −A − Aj, A − Aj, A − Aj, −A − Aj, −A + Aj, A − Aj, A + Aj, −A + Aj, A − Aj, A − Aj, A − Aj, −A + Aj, A + Aj, −A + Aj, −A − Aj, −A − Aj, A − Aj, A − Aj, A − Aj, −A − Aj, A + Aj, A + Aj, A − Aj, −A + Aj, −A + Aj, −A + Aj, −A + Aj, A − Aj, A + Aj, −A − Aj |

TABLE 28-3

| Index | Pilot sequence |
|---|---|
| 1 | −A + Aj, A − Aj, −A + Aj, −A − Aj, −A + Aj, −A + Aj, A + Aj, −A − Aj, −A + Aj, −A − Aj, −A + Aj, A + Aj, A − Aj, −A + Aj, −A + Aj, A + Aj, A − Aj, −A − Aj, −A + Aj, −A + Aj, −A − Aj, −A + Aj, A − Aj, A − Aj, A + Aj, A + Aj, A − Aj, −A + Aj, A + Aj, A − Aj, A + Aj, −A − Aj, A − Aj, A − Aj, A + Aj, A − Aj, A − Aj, A + Aj, −A + Aj, A + Aj, −A − Aj, A + Aj, −A + Aj, −A − Aj, A + Aj, −A + Aj, A − Aj, A − Aj, −A − Aj, A − Aj, −A + Aj, A + Aj, −A + Aj, A − Aj, A + Aj, −A − Aj, −A − Aj, A + Aj, A − Aj, A − Aj, −A + Aj, −A − Aj, A − Aj, −A − Aj, −A − Aj, A − Aj, A + Aj, −A − Aj, −A + Aj, A + Aj, −A − Aj, −A − Aj, −A − Aj, A + Aj, −A + Aj, A + Aj, A − Aj, A − Aj, −A − Aj, −A − Aj, −A − Aj, A − Aj, −A + Aj, −A + Aj, −A − Aj, A + Aj, A + Aj, A + Aj, A + Aj, −A − Aj, −A + Aj, A − Aj |
| 2 | −A + Aj, A − Aj, −A + Aj, A − Aj, A + Aj, A − Aj, A − Aj, −A − Aj, A + Aj, A − Aj, A + Aj, A − Aj, −A − Aj, −A + Aj, A − Aj, A − Aj, −A − Aj, −A + Aj, A + Aj, A − Aj, A − Aj, A + Aj, A − Aj, −A + Aj, −A + Aj, −A − Aj, −A − Aj, −A + Aj, A − Aj, −A − Aj, −A + Aj, −A − Aj, A + Aj, −A + Aj, −A + Aj, −A − Aj, −A + Aj, −A + Aj, −A − Aj, A − Aj, −A − Aj, A + Aj, −A − Aj, A − Aj, A + Aj, −A − Aj, A − Aj, −A + Aj, −A + Aj, A + Aj, −A + Aj, A − Aj, −A − Aj, A − Aj, −A + Aj, −A − Aj, A + Aj, A + Aj, −A − Aj, −A + Aj, −A + Aj, A − Aj, A + Aj, −A + Aj, A + Aj, A + Aj, −A + Aj, −A − Aj, A + Aj, A − Aj, −A − Aj, A + Aj, A + Aj, A + Aj, −A − Aj, A − Aj, −A − Aj, −A + Aj, −A + Aj, A + Aj, A + Aj, A + Aj, −A + Aj, A − Aj, A − Aj, A + Aj, −A − Aj, −A − Aj, −A − Aj, −A − Aj, A + Aj, A − Aj |
| 3 | A − Aj, −A + Aj, A − Aj, −A + Aj, −A − Aj, −A + Aj, −A + Aj, A + Aj, −A − Aj, −A + Aj, −A − Aj, −A + Aj, A + Aj, A − Aj, −A + Aj, −A + Aj, A + Aj, A − Aj, −A − Aj, −A + Aj, −A + Aj, −A − Aj, −A + Aj, A − Aj, A − Aj, A + Aj, A + Aj, A − Aj, −A + Aj, A + Aj, A − Aj, A + Aj, −A − Aj, A − Aj, A − Aj, A + Aj, A − Aj, A − Aj, A + Aj, −A + Aj, A + Aj, −A − Aj, A + Aj, −A + Aj, −A − Aj, A + Aj, −A + Aj, A − Aj, A − Aj, −A − Aj, A − Aj, −A + Aj, A + Aj, −A + Aj, A − Aj, A + Aj, −A − Aj, −A − Aj, A + Aj, A − Aj, A − Aj, −A + Aj, −A − Aj, A − Aj, −A − Aj, −A − Aj, A − Aj, A + Aj, −A − Aj, −A + Aj, A + Aj, −A − Aj, −A − Aj, −A − Aj, A + Aj, −A + Aj, A + Aj, A − Aj, A − Aj, −A − Aj, −A − Aj, −A − Aj, A − Aj, −A + Aj, −A + Aj, −A − Aj, A + Aj, A + Aj, A + Aj, A + Aj, −A − Aj, −A + Aj |
| 4 | A − Aj, −A + Aj, A − Aj, A + Aj, A − Aj, A − Aj, −A − Aj, A + Aj, A − Aj, A + Aj, A − Aj, −A − Aj, −A + Aj, A − Aj, A − Aj, −A − Aj, −A + Aj, A + Aj, A − Aj, A − Aj, A + Aj, A − Aj, −A + Aj, −A + Aj, −A − Aj, −A − Aj, −A + Aj, A − Aj, −A − Aj, −A + Aj, −A − Aj, A + Aj, −A + Aj, −A + Aj, −A − Aj, −A + Aj, −A + Aj, −A − Aj, A − Aj, −A − Aj, A + Aj, −A − Aj, A − Aj, A + Aj, −A − Aj, A − Aj, −A + Aj, −A + Aj, A + Aj, −A + Aj, A − Aj, −A − Aj, A − Aj, −A + Aj, −A − Aj, A + Aj, A + Aj, −A − Aj, −A + Aj, −A + Aj, A − Aj, A + Aj, −A + Aj, A + Aj, A + Aj, −A + Aj, −A − Aj, A + Aj, A − Aj, −A − Aj, A + Aj, A + Aj, A + Aj, −A − Aj, A − Aj, −A − Aj, −A + Aj, −A + Aj, A + Aj, A + Aj, A + Aj, −A + Aj, A − Aj, A − Aj, A + Aj, −A − Aj, −A − Aj, −A − Aj, −A − Aj, A + Aj, A − Aj, −A + Aj |

TABLE 28-4

| Index | Pilot sequence |
|---|---|
| 1 | −A − Aj, A − Aj, −A + Aj, −A + Aj, −A + Aj, −A + Aj, A − Aj, −A − Aj, −A − Aj, A + Aj, A − Aj, A − Aj, A − Aj, A + Aj, A + Aj, −A + Aj, −A − Aj, −A + Aj, A − Aj, A − Aj, A − Aj, −A + Aj, −A − Aj, A − Aj, −A + Aj, A + Aj, A − Aj, A − Aj, A + Aj, A − Aj, −A − Aj, A + Aj, A + Aj, −A + Aj, A − Aj, A − Aj, −A + Aj, A + Aj, −A − Aj, −A + Aj, −A − Aj, A + Aj, A − Aj, A + Aj, A + Aj, −A − Aj, −A + Aj, A − Aj, −A − Aj, −A + Aj, A − Aj, −A + Aj, −A − Aj, −A + Aj, A + Aj, A + Aj, −A + Aj, A + Aj, A + Aj, A − Aj, −A + Aj, A + Aj, −A + Aj, −A − Aj, A + Aj, −A + Aj, −A + Aj, A + Aj, A + Aj, −A − Aj, A − Aj, −A − Aj, −A − Aj, A − Aj, A + Aj, −A + Aj, −A − Aj, −A − Aj, A + Aj, −A + Aj, −A − Aj, A − Aj, −A − Aj, A − Aj, −A + Aj, −A − Aj, −A − Aj, A − Aj, −A − Aj, A + Aj, −A − Aj, A + Aj |
| 2 | −A − Aj, A + Aj, −A + Aj, A − Aj, A − Aj, A − Aj, A − Aj, −A + Aj, A + Aj, A + Aj, −A − Aj, −A + Aj, −A + Aj, −A + Aj, −A − Aj, −A − Aj, A − Aj, A + Aj, A − Aj, −A + Aj, −A + Aj, −A + Aj, A − Aj, A + Aj, −A + Aj, A − Aj, −A − Aj, −A + Aj, −A + Aj, −A − Aj, −A + Aj, A + Aj, −A − Aj, −A − Aj, A − Aj, −A + Aj, −A + Aj, A − Aj, −A − Aj, A + Aj, A − Aj, A + Aj, −A − Aj, −A + Aj, −A − Aj, −A − Aj, A + Aj, A − Aj, −A + Aj, A + Aj, A − Aj, −A + Aj, A − Aj, A + Aj, A − Aj, −A − Aj, −A − Aj, A − Aj, −A − Aj, −A − Aj, −A + Aj, A − Aj, −A − Aj, A − Aj, A + Aj, −A − Aj, A − Aj, A − Aj, −A − Aj, −A − Aj, A + Aj, −A + Aj, A + Aj, A + Aj, −A + Aj, −A − Aj, A − Aj, A + Aj, A + Aj, −A − Aj, A − Aj, A + Aj, −A + Aj, A + Aj, −A + Aj, A − Aj, A + Aj, A + Aj, −A + Aj, A + Aj, −A − Aj, A + Aj |
| 3 | A + Aj, −A − Aj, A − Aj, −A + Aj, −A + Aj, −A + Aj, −A + Aj, A − Aj, −A − Aj, −A − Aj, A + Aj, A − Aj, A − Aj, A − Aj, A + Aj, A + Aj, −A + Aj, −A − Aj, −A + Aj, A − Aj, A − Aj, A − Aj, −A + Aj, −A − Aj, A − Aj, −A + Aj, A + Aj, A − Aj, A − Aj, A + Aj, A − Aj, −A − Aj, A + Aj, A + Aj, −A + Aj, A − Aj, A − Aj, −A + Aj, A + Aj, −A − Aj, −A + Aj, |

TABLE 28-4-continued

| Index | Pilot sequence |
|---|---|
| | −A − Aj, A + Aj, A − Aj, A + Aj, A + Aj, −A − Aj, −A + Aj, A − Aj, −A − Aj, −A + Aj, A − Aj, −A + Aj, −A − Aj, −A + Aj, A + Aj, A + Aj, −A + Aj, A + Aj, A + Aj, A − Aj, −A + Aj, A + Aj, −A + Aj, −A − Aj, A + Aj, −A + Aj, −A + Aj, A + Aj, A + Aj, −A − Aj, A − Aj, −A − Aj, −A − Aj, A − Aj, A + Aj, −A + Aj, −A − Aj, −A − Aj, A + Aj, −A + Aj, −A − Aj, A − Aj, −A − Aj, A − Aj, −A + Aj, −A − Aj, −A − Aj, A − Aj, −A − Aj, A + Aj, −A − Aj |
| 4 | A + Aj, −A + Aj, A − Aj, A − Aj, A − Aj, A − Aj, −A + Aj, A + Aj, A + Aj, −A − Aj, −A + Aj, −A + Aj, −A + Aj, −A − Aj, −A − Aj, A − Aj, A + Aj, A − Aj, −A + Aj, −A + Aj, −A + Aj, A − Aj, A + Aj, −A + Aj, A − Aj, −A − Aj, −A + Aj, −A + Aj, −A − Aj, −A + Aj, A + Aj, −A − Aj, −A − Aj, A − Aj, −A + Aj, −A + Aj, A − Aj, −A − Aj, A + Aj, A − Aj, A + Aj, −A − Aj, −A + Aj, −A − Aj, −A − Aj, A + Aj, A − Aj, −A + Aj, A + Aj, A − Aj, −A + Aj, A − Aj, A + Aj, A − Aj, −A − Aj, −A − Aj, A − Aj, −A − Aj, −A − Aj, −A + Aj, A − Aj, −A − Aj, A − Aj, A + Aj, −A − Aj, A − Aj, A − Aj, −A − Aj, −A − Aj, A + Aj, −A + Aj, A + Aj, A + Aj, −A + Aj, −A − Aj, A − Aj, A + Aj, A + Aj, −A − Aj, A − Aj, A + Aj, −A + Aj, A + Aj, −A + Aj, A − Aj, A + Aj, A + Aj, −A + Aj, A + Aj, −A − Aj, A + Aj, −A − Aj |

TABLE 28-5

| Index | Pilot sequence |
|---|---|
| 1 | −A + Aj, A − Aj, −A − Aj, A + Aj, A + Aj, A + Aj, A + Aj, −A − Aj, A − Aj, A − Aj, −A + Aj, −A − Aj, −A − Aj, −A − Aj, −A + Aj, −A + Aj, A + Aj, A − Aj, A + Aj, −A − Aj, −A − Aj, −A − Aj, A + Aj, A − Aj, −A − Aj, A + Aj, −A + Aj, −A − Aj, −A − Aj, −A + Aj, −A − Aj, A − Aj, −A + Aj, −A + Aj, A + Aj, −A − Aj, −A − Aj, A + Aj, −A + Aj, A − Aj, A + Aj, A − Aj, −A + Aj, −A − Aj, −A + Aj, −A + Aj, A − Aj, A + Aj, −A − Aj, A − Aj, A + Aj, −A − Aj, A + Aj, A − Aj, A + Aj, −A + Aj, −A + Aj, A + Aj, −A + Aj, −A + Aj, −A − Aj, A + Aj, −A + Aj, A + Aj, A − Aj, −A + Aj, A + Aj, A + Aj, −A + Aj, −A + Aj, A − Aj, −A − Aj, A − Aj, A − Aj, −A − Aj, −A + Aj, A + Aj, A − Aj, A − Aj, −A + Aj, A + Aj, A − Aj, −A − Aj, A − Aj, −A − Aj, A + Aj, A − Aj, A − Aj, −A − Aj, A − Aj, −A + Aj, A − Aj |
| 2 | −A + Aj, A + Aj, −A − Aj, −A − Aj, −A − Aj, −A − Aj, A + Aj, −A + Aj, −A + Aj, A − Aj, A + Aj, A + Aj, A + Aj, A − Aj, A − Aj, −A − Aj, −A + Aj, −A − Aj, A + Aj, A + Aj, A + Aj, −A − Aj, −A + Aj, A + Aj, −A − Aj, A − Aj, A + Aj, A + Aj, A − Aj, A + Aj, −A + Aj, A − Aj, A − Aj, −A − Aj, A + Aj, A + Aj, −A − Aj, A − Aj, −A + Aj, −A − Aj, −A + Aj, A − Aj, A + Aj, A − Aj, A − Aj, −A + Aj, −A − Aj, A + Aj, −A + Aj, −A − Aj, A + Aj, −A − Aj, −A + Aj, −A − Aj, A − Aj, A − Aj, −A − Aj, A − Aj, A − Aj, A + Aj, −A − Aj, A − Aj, −A − Aj, −A + Aj, A − Aj, −A − Aj, −A − Aj, A − Aj, A − Aj, −A + Aj, A + Aj, −A + Aj, −A + Aj, A + Aj, A − Aj, −A − Aj, −A + Aj, −A + Aj, A − Aj, −A − Aj, −A + Aj, A + Aj, −A + Aj, A + Aj, −A − Aj, −A + Aj, −A + Aj, A + Aj, −A + Aj, A − Aj, −A + Aj, A − Aj |
| 3 | A − Aj, −A − Aj, A + Aj, A + Aj, A + Aj, A + Aj, −A − Aj, A − Aj, A − Aj, −A + Aj, −A − Aj, −A − Aj, −A − Aj, −A + Aj, −A + Aj, A + Aj, A − Aj, A + Aj, −A − Aj, −A − Aj, −A − Aj, A + Aj, A − Aj, −A − Aj, A + Aj, −A + Aj, −A − Aj, −A − Aj, −A + Aj, −A − Aj, A − Aj, −A + Aj, −A + Aj, A + Aj, −A − Aj, −A − Aj, A + Aj, −A + Aj, A − Aj, A + Aj, A − Aj, −A + Aj, −A − Aj, −A + Aj, −A + Aj, A − Aj, A + Aj, −A − Aj, A − Aj, A + Aj, −A − Aj, A + Aj, A − Aj, A + Aj, −A + Aj, −A + Aj, A + Aj, −A + Aj, −A + Aj, −A − Aj, A + Aj, −A + Aj, A + Aj, A − Aj, −A + Aj, A + Aj, A + Aj, −A + Aj, −A + Aj, A − Aj, −A − Aj, A − Aj, A − Aj, −A − Aj, −A + Aj, A + Aj, A − Aj, A − Aj, −A + Aj, A + Aj, A − Aj, −A − Aj, A − Aj, −A − Aj, A + Aj, A − Aj, A − Aj, −A − Aj, A − Aj, −A + Aj, A − Aj, −A + Aj |
| 4 | A − Aj, −A + Aj, A + Aj, −A − Aj, −A − Aj, −A − Aj, −A − Aj, A + Aj, −A + Aj, −A + Aj, A − Aj, A + Aj, A + Aj, A + Aj, A − Aj, A − Aj, −A − Aj, −A + Aj, −A − Aj, A + Aj, A + Aj, A + Aj, −A − Aj, −A + Aj, A + Aj, −A − Aj, A − Aj, A + Aj, A + Aj, A − Aj, A + Aj, −A + Aj, A − Aj, A − Aj, −A − Aj, A + Aj, A + Aj, −A − Aj, A − Aj, −A + Aj, −A − Aj, −A + Aj, A − Aj, A + Aj, A − Aj, A − Aj, −A + Aj, −A − Aj, A + Aj, −A + Aj, −A − Aj, A + Aj, −A − Aj, −A + Aj, −A − Aj, A − Aj, A − Aj, −A − Aj, A − Aj, A − Aj, A + Aj, −A − Aj, A − Aj, −A − Aj, −A + Aj, A − Aj, −A − Aj, −A − Aj, A − Aj, A − Aj, −A + Aj, A + Aj, −A + Aj, −A + Aj, A + Aj, A − Aj, −A − Aj, −A + Aj, −A + Aj, A − Aj, −A − Aj, −A + Aj, A + Aj, −A + Aj, A + Aj, −A − Aj, −A + Aj, −A + Aj, A + Aj, −A + Aj, A − Aj, −A + Aj |

TABLE 28-6

| Index | Polarization | Pilot sequence |
|---|---|---|
| 1 | Polarization 1 | −A − Aj, −A − Aj, −A − Aj, A + Aj, −A + Aj, A + Aj, A − Aj, A + Aj, −A + Aj, A − Aj, A − Aj, A − Aj, A + Aj, A − Aj, −A − Aj, −A − Aj, A + Aj, A − Aj, −A − Aj, A + Aj, −A − Aj, A + Aj, A + Aj, −A + Aj, −A + Aj, −A − Aj, −A − Aj, A − Aj, A + Aj, A − Aj, A + Aj, A + Aj, A − Aj, −A + Aj, A − Aj, A − Aj, A + Aj, −A − Aj, −A − Aj, A + Aj, A + Aj, A + Aj, −A + Aj, A + Aj, −A − Aj, A + Aj, A − Aj, A − Aj, A + Aj, A + Aj, A + Aj, A − Aj, −A − Aj, −A + Aj, −A − Aj, −A − Aj, A + Aj, −A − Aj, −A − Aj, −A − Aj, −A − Aj, A − Aj, A − Aj, −A + Aj, −A + Aj, −A − Aj, −A + Aj, −A + Aj, −A + Aj, −A + Aj, −A − Aj, A + Aj, −A + Aj, A − Aj, −A + Aj, −A + Aj, A − Aj, −A + Aj, A − Aj, −A + Aj, −A − Aj, −A + Aj, A + Aj, −A + Aj, A − Aj, −A − Aj, A − Aj, −A − Aj, A − Aj, −A + Aj, −A + Aj, A + Aj |
| | Polarization 2 | −A + Aj, −A + Aj, −A + Aj, A − Aj, −A − Aj, A − Aj, A + Aj, A − Aj, −A − Aj, A + Aj, A + Aj, A + Aj, A − Aj, A + Aj, −A + Aj, −A + Aj, A − Aj, A + Aj, −A + Aj, A − Aj, −A + Aj, A − Aj, A − Aj, −A − Aj, −A − Aj, −A + Aj, −A + Aj, A + Aj, A − Aj, A + Aj, A − Aj, A − Aj, A + Aj, −A − Aj, A + Aj, A + Aj, A − Aj, −A + Aj, −A + Aj, A − Aj, A − Aj, A − Aj, −A − Aj, A − Aj, −A + Aj, A − Aj, A + Aj, A + Aj, A − Aj, A − Aj, A − Aj, A + Aj, −A + Aj, −A − Aj, −A + Aj, −A + Aj, A − Aj, −A + Aj, −A + Aj, −A + Aj, −A + Aj, A + Aj, A + Aj, −A − Aj, −A − Aj, −A + Aj, −A − Aj, −A − Aj, −A − Aj, −A − Aj, −A + Aj, A − Aj, −A − Aj, A + Aj, −A − Aj, −A − Aj, A + Aj, −A − Aj, A + Aj, −A − Aj, −A + Aj, −A − Aj, A − Aj, −A − Aj, A + Aj, −A + Aj, A + Aj, −A + Aj, A + Aj, −A − Aj, −A − Aj, A − Aj |
| 2 | Polarization 1 | −A − Aj, −A − Aj, −A − Aj, A + Aj, −A + Aj, A + Aj, A − Aj, A + Aj, −A + Aj, A − Aj, A − Aj, A − Aj, A + Aj, A − Aj, −A − Aj, −A − Aj, A + Aj, A − Aj, −A − Aj, A + Aj, −A − Aj, A + Aj, A + Aj, −A + Aj, −A + Aj, −A − Aj, −A − Aj, A − Aj, A + Aj, A − Aj, A + Aj, A + Aj, A − Aj, −A + Aj, A − Aj, A − Aj, A + Aj, −A − Aj, −A − Aj, A + Aj, A + Aj, A + Aj, −A + Aj, A + Aj, −A − Aj, A + Aj, A − Aj, A − Aj, A + Aj, A + Aj, A + Aj, A − Aj, −A − Aj, −A + Aj, −A − Aj, −A − Aj, A + Aj, −A − Aj, −A − Aj, −A − Aj, −A − Aj, A − Aj, A − Aj, −A + Aj, −A + Aj, −A − Aj, −A + Aj, −A + Aj, −A + Aj, −A + Aj, −A − Aj, A + Aj, −A + Aj, A − Aj, −A + Aj, −A + Aj, |

TABLE 28-6-continued

| Index | Polarization | Pilot sequence |
|---|---|---|
| | | A − Aj, −A + Aj, A − Aj, −A + Aj, −A − Aj, −A + Aj, A + Aj, −A + Aj, A − Aj, −A − Aj, A − Aj, −A − Aj, A − Aj, −A + Aj, −A + Aj, A + Aj |
| | Polarization 2 | A − Aj, A − Aj, A − Aj, −A + Aj, A + Aj, −A + Aj, −A − Aj, −A + Aj, A + Aj, −A − Aj, −A − Aj, −A − Aj, −A + Aj, −A − Aj, A − Aj, A − Aj, −A + Aj, −A − Aj, A − Aj, −A + Aj, A − Aj, −A + Aj, −A + Aj, A + Aj, A + Aj, A − Aj, A − Aj, −A − Aj, −A + Aj, −A − Aj, −A + Aj, −A + Aj, −A − Aj, A + Aj, −A − Aj, −A − Aj, −A + Aj, A − Aj, A − Aj, −A + Aj, −A + Aj, −A + Aj, A + Aj, −A + Aj, A − Aj, −A + Aj, −A − Aj, −A − Aj, −A + Aj, −A + Aj, −A + Aj, −A − Aj, A − Aj, A + Aj, A − Aj, A − Aj, −A + Aj, A − Aj, A − Aj, A − Aj, A − Aj, −A − Aj, −A − Aj, A + Aj, A + Aj, A − Aj, A + Aj, A + Aj, A + Aj, A + Aj, A − Aj, −A + Aj, A + Aj, −A − Aj, A + Aj, A + Aj, −A − Aj, A + Aj, −A − Aj, A + Aj, A − Aj, A + Aj, −A + Aj, A + Aj, −A − Aj, A − Aj, −A − Aj, A − Aj, −A − Aj, A + Aj, A + Aj, −A + Aj |
| 3 | Polarization 1 | A + Aj, A + Aj, A + Aj, −A − Aj, A − Aj, −A − Aj, −A + Aj, −A − Aj, A − Aj, −A + Aj, −A + Aj, −A + Aj, −A − Aj, −A + Aj, A + Aj, A + Aj, −A − Aj, −A + Aj, A + Aj, −A − Aj, A + Aj, −A − Aj, −A − Aj, A − Aj, A − Aj, A + Aj, A + Aj, −A + Aj, −A − Aj, −A + Aj, −A − Aj, −A − Aj, −A + Aj, A − Aj, −A + Aj, −A + Aj, −A − Aj, A + Aj, A + Aj, −A − Aj, −A − Aj, −A − Aj, A − Aj, −A − Aj, A + Aj, −A − Aj, −A + Aj, −A + Aj, −A − Aj, −A − Aj, −A − Aj, −A + Aj, A + Aj, A − Aj, A + Aj, A + Aj, −A − Aj, A + Aj, A + Aj, A + Aj, A + Aj, −A + Aj, −A + Aj, A − Aj, A − Aj, A + Aj, A − Aj, A − Aj, A − Aj, A − Aj, A + Aj, −A − Aj, A − Aj, −A + Aj, A − Aj, A − Aj, −A + Aj, A − Aj, −A + Aj, A − Aj, A + Aj, A − Aj, −A − Aj, A − Aj, −A + Aj, A + Aj, −A + Aj, A + Aj, −A + Aj, A − Aj, A − Aj, −A − Aj |
| | Polarization 2 | −A + Aj, −A + Aj, −A + Aj, A − Aj, −A − Aj, A − Aj, A + Aj, A − Aj, −A − Aj, A + Aj, A + Aj, A + Aj, A − Aj, A + Aj, −A + Aj, −A + Aj, A − Aj, A + Aj, −A + Aj, A − Aj, −A + Aj, A − Aj, A − Aj, −A − Aj, −A − Aj, −A + Aj, −A + Aj, A + Aj, A − Aj, A + Aj, A − Aj, A − Aj, A + Aj, −A − Aj, A + Aj, A + Aj, A − Aj, −A + Aj, −A + Aj, A − Aj, A − Aj, A − Aj, −A − Aj, A − Aj, −A + Aj, A − Aj, A + Aj, A + Aj, A − Aj, A − Aj, A − Aj, A + Aj, −A + Aj, −A − Aj, −A + Aj, −A + Aj, A − Aj, −A + Aj, −A + Aj, −A + Aj, −A + Aj, A + Aj, A + Aj, −A − Aj, −A − Aj, −A + Aj, −A − Aj, −A − Aj, −A − Aj, −A − Aj, −A + Aj, A − Aj, −A − Aj, A + Aj, −A − Aj, −A − Aj, A + Aj, −A − Aj, A + Aj, −A − Aj, −A + Aj, −A − Aj, A − Aj, −A − Aj, A + Aj, −A + Aj, A + Aj, −A + Aj, A + Aj, −A − Aj, −A − Aj, A − Aj |
| 4 | Polarization 1 | A + Aj, A + Aj, A + Aj, −A − Aj, A − Aj, −A − Aj, −A + Aj, −A − Aj, A − Aj, −A + Aj, −A + Aj, −A + Aj, −A − Aj, −A + Aj, A + Aj, A + Aj, −A − Aj, −A + Aj, A + Aj, −A − Aj, A + Aj, −A − Aj, −A − Aj, A − Aj, A − Aj, A + Aj, A + Aj, −A + Aj, −A − Aj, −A + Aj, −A − Aj, −A − Aj, −A + Aj, A − Aj, −A + Aj, −A + Aj, −A − Aj, A + Aj, A + Aj, −A − Aj, −A − Aj, −A − Aj, A − Aj, −A − Aj, A + Aj, −A − Aj, −A + Aj, −A + Aj, −A − Aj, −A − Aj, −A − Aj, −A + Aj, A + Aj, A − Aj, A + Aj, A + Aj, −A − Aj, A + Aj, A + Aj, A + Aj, A + Aj, −A + Aj, −A + Aj, A − Aj, A − Aj, A + Aj, A − Aj, A − Aj, A − Aj, A − Aj, A + Aj, −A − Aj, A − Aj, −A + Aj, A − Aj, A − Aj, −A + Aj, A − Aj, −A + Aj, A − Aj, A + Aj, A − Aj, −A − Aj, A − Aj, −A + Aj, A + Aj, −A + Aj, A + Aj, −A + Aj, A − Aj, A − Aj, −A − Aj |
| | Polarization 2 | A − Aj, A − Aj, A − Aj, −A + Aj, A + Aj, −A + Aj, −A − Aj, −A + Aj, A + Aj, −A − Aj, −A − Aj, −A − Aj, −A + Aj, −A − Aj, A − Aj, A − Aj, −A + Aj, −A − Aj, A − Aj, −A + Aj, A − Aj, −A + Aj, −A + Aj, A + Aj, A + Aj, A − Aj, A − Aj, −A − Aj, −A + Aj, −A − Aj, −A + Aj, −A + Aj, −A − Aj, A + Aj, −A − Aj, −A − Aj, −A + Aj, A − Aj, A − Aj, −A + Aj, −A + Aj, −A + Aj, A + Aj, −A + Aj, A − Aj, −A + Aj, −A − Aj, −A − Aj, −A + Aj, −A + Aj, −A + Aj, −A − Aj, A − Aj, A + Aj, A − Aj, A − Aj, −A + Aj, A − Aj, A − Aj, A − Aj, A − Aj, −A − Aj, −A − Aj, A + Aj, A + Aj, A − Aj, A + Aj, A + Aj, A + Aj, A + Aj, A − Aj, −A + Aj, A + Aj, −A − Aj, A + Aj, A + Aj, −A − Aj, A + Aj, −A − Aj, A + Aj, A − Aj, A + Aj, −A + Aj, A + Aj, −A − Aj, A − Aj, −A − Aj, A − Aj, −A − Aj, A + Aj, A + Aj, −A + Aj |
| 5 | Polarization 1 | −A − Aj, −A + Aj, −A + Aj, A − Aj, A + Aj, A − Aj, A + Aj, A − Aj, −A + Aj, −A − Aj, −A + Aj, A + Aj, −A + Aj, A − Aj, −A + Aj, A − Aj, −A + Aj, −A + Aj, A − Aj, −A + Aj, −A − Aj, A + Aj, −A + Aj, −A + Aj, −A + Aj, −A + Aj, A + Aj, −A + Aj, −A + Aj, A − Aj, A − Aj, A + Aj, A + Aj, A + Aj, A + Aj, −A − Aj, A + Aj, A + Aj, −A + Aj, A + Aj, A − Aj, −A − Aj, −A − Aj, −A − Aj, A − Aj, A − Aj, −A − Aj, A + Aj, −A − Aj, −A + Aj, −A − Aj, −A − Aj, −A − Aj, A + Aj, A + Aj, −A − Aj, A − Aj, A − Aj, −A + Aj, A − Aj, −A − Aj, −A − Aj, A − Aj, −A − Aj, A − Aj, A + Aj, A + Aj, −A + Aj, −A + Aj, −A − Aj, −A − Aj, A + Aj, −A − Aj, A + Aj, A − Aj, −A − Aj, A + Aj, A + Aj, A − Aj, −A − Aj, A − Aj, A − Aj, A − Aj, −A + Aj, −A − Aj, A − Aj, −A − Aj, −A + Aj, −A − Aj, A + Aj, A + Aj, A + Aj |
| | Polarization 2 | −A + Aj, −A − Aj, −A − Aj, A + Aj, A − Aj, A + Aj, A − Aj, A + Aj, −A − Aj, −A + Aj, −A − Aj, A − Aj, −A − Aj, A + Aj, −A − Aj, A + Aj, −A − Aj, −A − Aj, A + Aj, −A − Aj, −A + Aj, A − Aj, −A − Aj, −A − Aj, −A − Aj, −A − Aj, A − Aj, −A − Aj, −A − Aj, A + Aj, A + Aj, A − Aj, A − Aj, A − Aj, A − Aj, −A + Aj, A − Aj, A − Aj, −A − Aj, A − Aj, A + Aj, −A + Aj, −A + Aj, −A + Aj, A + Aj, A + Aj, −A + Aj, A − Aj, −A + Aj, −A − Aj, −A + Aj, −A + Aj, −A + Aj, A − Aj, A − Aj, −A + Aj, A + Aj, A + Aj, −A − Aj, A + Aj, −A + Aj, −A + Aj, A + Aj, −A + Aj, A + Aj, A − Aj, A − Aj, −A − Aj, −A − Aj, −A + Aj, −A + Aj, A − Aj, −A + Aj, A − Aj, A + Aj, −A + Aj, A − Aj, A − Aj, A + Aj, −A + Aj, A + Aj, A + Aj, A + Aj, −A − Aj, −A + Aj, A + Aj, −A + Aj, −A − Aj, −A + Aj, A − Aj, A − Aj, A − Aj |
| 6 | Polarization 1 | −A − Aj, −A + Aj, −A + Aj, A − Aj, A + Aj, A − Aj, A + Aj, A − Aj, −A + Aj, −A − Aj, −A + Aj, A + Aj, −A + Aj, A − Aj, −A + Aj, A − Aj, −A + Aj, −A + Aj, A − Aj, −A + Aj, −A − Aj, A + Aj, −A + Aj, −A + Aj, −A + Aj, −A + Aj, A + Aj, −A + Aj, −A + Aj, A − Aj, A − Aj, A + Aj, A + Aj, A + Aj, A + Aj, −A − Aj, A + Aj, A + Aj, −A + Aj, A + Aj, A − Aj, −A − Aj, −A − Aj, −A − Aj, A − Aj, A − Aj, −A − Aj, A + Aj, −A − Aj, −A + Aj, −A − Aj, −A − Aj, −A − Aj, A + Aj, A + Aj, −A − Aj, A − Aj, A − Aj, −A + Aj, A − Aj, −A − Aj, −A − Aj, A − Aj, −A − Aj, A − Aj, A + Aj, A + Aj, −A + Aj, −A + Aj, −A − Aj, −A − Aj, A + Aj, −A − Aj, A + Aj, A − Aj, −A − Aj, A + Aj, A + Aj, A − Aj, −A − Aj, A − Aj, A − Aj, A − Aj, −A + Aj, −A − Aj, A − Aj, −A − Aj, −A + Aj, −A − Aj, A + Aj, A + Aj, A + Aj |
| | Polarization 2 | A − Aj, A + Aj, A + Aj, −A − Aj, −A + Aj, −A − Aj, −A + Aj, −A − Aj, A + Aj, A − Aj, A + Aj, −A + Aj, A + Aj, −A − Aj, A + Aj, −A − Aj, A + Aj, A + Aj, −A − Aj, A + Aj, A − Aj, −A + Aj, A + Aj, A + Aj, A + Aj, A + Aj, −A + Aj, A + Aj, A + Aj, −A − Aj, −A − Aj, −A + Aj, −A + Aj, −A + Aj, −A + Aj, A − Aj, −A + Aj, −A + Aj, A + Aj, −A + Aj, −A − Aj, A − Aj, A − Aj, A − Aj, −A − Aj, −A − Aj, A − Aj, −A + Aj, A − Aj, A + Aj, A − Aj, A − Aj, A − Aj, −A + Aj, −A + Aj, A − Aj, −A − Aj, −A − Aj, A + Aj, −A − Aj, A − Aj, A − Aj, −A − Aj, A − Aj, −A − Aj, −A + Aj, −A + Aj, A + Aj, A + Aj, A − Aj, A − Aj, −A + Aj, A − Aj, −A + Aj, −A − Aj, A − Aj, −A + Aj, −A + Aj, −A − Aj, A − Aj, −A − Aj, −A − Aj, −A − Aj, A + Aj, A − Aj, −A − Aj, A − Aj, A + Aj, A − Aj, −A + Aj, −A + Aj, −A + Aj |
| 7 | Polarization 1 | A + Aj, A − Aj, A − Aj, −A + Aj, −A − Aj, −A + Aj, −A − Aj, −A + Aj, A − Aj, A + Aj, A − Aj, −A − Aj, A − Aj, −A + Aj, A − Aj, −A + Aj, A − Aj, A − Aj, −A + Aj, A − Aj, A + Aj, −A − Aj, A − Aj, A − Aj, A − Aj, A − Aj, −A − Aj, A − Aj, A − Aj, −A + Aj, −A + Aj, −A − Aj, −A − Aj, −A − Aj, −A − Aj, A + Aj, −A − Aj, −A − Aj, A − Aj, −A − Aj, −A + Aj, A + Aj, A + Aj, A + Aj, −A + Aj, −A + Aj, A + Aj, −A − Aj, A + Aj, A − Aj, A + Aj, |

TABLE 28-6-continued

| Index | Polarization | Pilot sequence |
|---|---|---|
| | | A + Aj, A + Aj, −A − Aj, −A − Aj, A + Aj, −A + Aj, −A + Aj, A − Aj, −A + Aj, A + Aj, A + Aj, −A + Aj, A + Aj, −A + Aj, −A − Aj, −A − Aj, A − Aj, A − Aj, A + Aj, A + Aj, −A − Aj, A + Aj, −A − Aj, −A + Aj, A + Aj, −A − Aj, −A − Aj, −A + Aj, A + Aj, −A + Aj, −A + Aj, −A + Aj, A − Aj, A + Aj, −A + Aj, A + Aj, A − Aj, A + Aj, −A − Aj, −A − Aj, −A − Aj |
| | Polarization 2 | −A + Aj, −A − Aj, −A − Aj, A + Aj, A − Aj, A + Aj, A − Aj, A + Aj, −A − Aj, −A + Aj, −A − Aj, A − Aj, −A − Aj, A + Aj, −A − Aj, A + Aj, −A − Aj, −A − Aj, A + Aj, −A − Aj, −A + Aj, A − Aj, −A − Aj, −A − Aj, −A − Aj, −A − Aj, A − Aj, −A − Aj, −A − Aj, A + Aj, A + Aj, A − Aj, A − Aj, A − Aj, A − Aj, −A + Aj, A − Aj, A − Aj, −A − Aj, A − Aj, A + Aj, −A + Aj, −A + Aj, −A + Aj, A + Aj, A + Aj, −A + Aj, A − Aj, −A + Aj, −A − Aj, −A + Aj, −A + Aj, −A + Aj, A − Aj, A − Aj, −A + Aj, A + Aj, A + Aj, −A − Aj, A + Aj, −A + Aj, −A + Aj, A + Aj, −A + Aj, A + Aj, A − Aj, A − Aj, −A − Aj, −A − Aj, −A + Aj, −A + Aj, A − Aj, −A + Aj, A − Aj, A + Aj, −A + Aj, A − Aj, A − Aj, A + Aj, −A + Aj, A + Aj, A + Aj, A + Aj, −A − Aj, −A + Aj, A + Aj, −A + Aj, −A − Aj, −A + Aj, A − Aj, A − Aj, A − Aj |
| 8 | Polarization 1 | A + Aj, A − Aj, A − Aj, −A + Aj, −A − Aj, −A + Aj, −A − Aj, −A + Aj, A − Aj, A + Aj, A − Aj, −A − Aj, A − Aj, −A + Aj, A − Aj, −A + Aj, A − Aj, A − Aj, −A + Aj, A − Aj, A + Aj, −A − Aj, A − Aj, A − Aj, A − Aj, A − Aj, −A − Aj, A − Aj, A − Aj, −A + Aj, −A + Aj, −A − Aj, −A − Aj, −A − Aj, −A − Aj, A + Aj, −A − Aj, −A − Aj, A − Aj, −A − Aj, −A + Aj, A + Aj, A + Aj, A + Aj, −A + Aj, −A + Aj, A + Aj, −A − Aj, A + Aj, A − Aj, A + Aj, A + Aj, A + Aj, −A − Aj, −A − Aj, A + Aj, −A + Aj, −A + Aj, A − Aj, −A + Aj, A + Aj, A + Aj, −A + Aj, A + Aj, −A + Aj, −A − Aj, −A − Aj, A − Aj, A − Aj, A + Aj, A + Aj, −A − Aj, A + Aj, −A − Aj, −A + Aj, A + Aj, −A − Aj, −A − Aj, −A + Aj, A + Aj, −A + Aj, −A + Aj, −A + Aj, A − Aj, A + Aj, −A + Aj, A + Aj, A − Aj, A + Aj, −A − Aj, −A − Aj, −A − Aj |
| | Polarization 2 | A − Aj, A + Aj, A + Aj, −A − Aj, −A + Aj, −A − Aj, −A + Aj, −A − Aj, A + Aj, A − Aj, A + Aj, −A + Aj, A + Aj, −A − Aj, A + Aj, −A − Aj, A + Aj, A + Aj, −A − Aj, A + Aj, A − Aj, −A + Aj, A + Aj, A + Aj, A + Aj, A + Aj, −A + Aj, A + Aj, A + Aj, −A − Aj, −A − Aj, −A + Aj, −A + Aj, −A + Aj, −A + Aj, A − Aj, −A + Aj, −A + Aj, A + Aj, −A + Aj, −A − Aj, A − Aj, A − Aj, A − Aj, −A − Aj, −A − Aj, A − Aj, −A + Aj, A − Aj, A + Aj, A − Aj, A − Aj, A − Aj, −A + Aj, −A + Aj, A − Aj, −A − Aj, −A − Aj, A + Aj, −A − Aj, A − Aj, A − Aj, −A − Aj, A − Aj, −A − Aj, −A + Aj, −A + Aj, A + Aj, A + Aj, A − Aj, A − Aj, −A + Aj, A − Aj, −A + Aj, −A − Aj, A − Aj, −A + Aj, −A + Aj, −A − Aj, A − Aj, −A − Aj, −A − Aj, −A − Aj, A + Aj, A − Aj, −A − Aj, A − Aj, A + Aj, A − Aj, −A + Aj, −A + Aj, −A + Aj |
| 9 | Polarization 1 | −A − Aj, −A − Aj, A + Aj, A + Aj, A + Aj, A + Aj, A + Aj, −A + Aj, A − Aj, A − Aj, A + Aj, A − Aj, A + Aj, −A − Aj, A − Aj, A − Aj, −A + Aj, −A + Aj, A − Aj, A + Aj, −A − Aj, −A − Aj, A − Aj, −A − Aj, A + Aj, −A + Aj, A + Aj, −A + Aj, −A − Aj, −A + Aj, −A − Aj, A − Aj, −A + Aj, A + Aj, −A − Aj, A − Aj, A + Aj, −A + Aj, −A + Aj, −A + Aj, A − Aj, A − Aj, −A − Aj, −A − Aj, −A + Aj, −A + Aj, −A + Aj, −A + Aj, −A + Aj, −A − Aj, A − Aj, −A + Aj, A − Aj, A − Aj, −A + Aj, −A − Aj, −A + Aj, A − Aj, −A − Aj, A + Aj, −A + Aj, A − Aj, A + Aj, A + Aj, A − Aj, −A − Aj, −A + Aj, −A − Aj, A − Aj, A + Aj, −A − Aj, −A − Aj, A + Aj, A − Aj, −A − Aj, A − Aj, A + Aj, A − Aj, −A + Aj, −A − Aj, A + Aj, −A − Aj, A − Aj, −A + Aj, A + Aj, A + Aj, A + Aj, −A − Aj, A + Aj, −A − Aj, A + Aj, −A − Aj |
| | Polarization 2 | −A + Aj, A − Aj, −A + Aj, −A + Aj, −A + Aj, −A − Aj, −A − Aj, A − Aj, A − Aj, A + Aj, −A − Aj, −A + Aj, A − Aj, −A − Aj, −A − Aj, −A − Aj, −A + Aj, −A + Aj, A − Aj, −A − Aj, A − Aj, A − Aj, A + Aj, A + Aj, −A − Aj, −A + Aj, A − Aj, −A + Aj, A − Aj, A + Aj, A − Aj, −A + Aj, −A + Aj, −A + Aj, A + Aj, −A + Aj, −A + Aj, −A − Aj, A − Aj, A − Aj, A + Aj, −A + Aj, A + Aj, −A + Aj, A + Aj, −A − Aj, A + Aj, −A − Aj, −A − Aj, −A + Aj, A − Aj, −A + Aj, −A − Aj, −A − Aj, A − Aj, −A − Aj, −A − Aj, −A − Aj, −A − Aj, A + Aj, −A + Aj, A + Aj, A − Aj, −A + Aj, A − Aj, A − Aj, A + Aj, A + Aj, −A + Aj, A + Aj, −A + Aj, A − Aj, A − Aj, −A − Aj, A + Aj, −A − Aj, A − Aj, A + Aj, −A − Aj, A + Aj, A − Aj, −A + Aj, A − Aj, A + Aj, −A + Aj, −A − Aj, A − Aj, A + Aj, A − Aj, A + Aj, A + Aj, A + Aj |
| 10 | Polarization 1 | −A − Aj, −A − Aj, A + Aj, A + Aj, A + Aj, A + Aj, A + Aj, −A + Aj, A − Aj, A − Aj, A + Aj, A − Aj, A + Aj, −A − Aj, A − Aj, A − Aj, −A + Aj, −A + Aj, A − Aj, A + Aj, −A − Aj, −A − Aj, A − Aj, −A − Aj, A + Aj, −A + Aj, A + Aj, −A + Aj, −A − Aj, −A + Aj, −A − Aj, A − Aj, −A + Aj, A + Aj, −A − Aj, A − Aj, A + Aj, −A + Aj, −A + Aj, −A + Aj, A − Aj, A − Aj, −A − Aj, −A − Aj, −A + Aj, −A + Aj, −A + Aj, −A + Aj, −A + Aj, −A − Aj, A − Aj, −A + Aj, A − Aj, A − Aj, −A + Aj, −A − Aj, −A + Aj, A − Aj, −A − Aj, A + Aj, −A + Aj, A − Aj, A + Aj, A + Aj, A − Aj, −A − Aj, −A + Aj, −A − Aj, A − Aj, A + Aj, −A − Aj, −A − Aj, A + Aj, A − Aj, −A − Aj, A − Aj, A + Aj, A − Aj, −A + Aj, −A − Aj, A + Aj, −A − Aj, A − Aj, −A + Aj, A + Aj, A + Aj, A + Aj, −A − Aj, A + Aj, −A − Aj, A + Aj, −A − Aj |
| | Polarization 2 | A − Aj, −A + Aj, −A + Aj, −A + Aj, −A − Aj, −A − Aj, A − Aj, A − Aj, A + Aj, −A − Aj, −A + Aj, A − Aj, −A − Aj, −A − Aj, −A − Aj, −A + Aj, −A + Aj, A − Aj, −A − Aj, A − Aj, A − Aj, A + Aj, A + Aj, −A − Aj, −A + Aj, A − Aj, −A + Aj, A − Aj, A + Aj, A − Aj, −A + Aj, −A + Aj, −A + Aj, A + Aj, −A + Aj, −A + Aj, −A − Aj, A − Aj, A − Aj, A + Aj, −A + Aj, A + Aj, −A + Aj, A + Aj, −A − Aj, A + Aj, −A − Aj, −A − Aj, −A + Aj, A − Aj, −A + Aj, −A − Aj, −A − Aj, A − Aj, −A − Aj, −A − Aj, −A − Aj, −A − Aj, A + Aj, −A + Aj, A + Aj, A − Aj, −A + Aj, A − Aj, A − Aj, A + Aj, A + Aj, −A + Aj, A + Aj, −A + Aj, A − Aj, A − Aj, −A − Aj, A + Aj, −A − Aj, A − Aj, A + Aj, −A − Aj, A + Aj, A − Aj, −A + Aj, A − Aj, A + Aj, −A + Aj, −A − Aj, A − Aj, A + Aj, A − Aj, A + Aj, A + Aj, A + Aj, −A + Aj |
| 11 | Polarization 1 | −A − Aj, A + Aj, −A − Aj, A + Aj, −A − Aj, A + Aj, A + Aj, A + Aj, A − Aj, −A + Aj, −A − Aj, A + Aj, −A − Aj, A − Aj, −A + Aj, A + Aj, −A + Aj, −A − Aj, −A + Aj, A + Aj, −A − Aj, −A − Aj, A + Aj, −A + Aj, −A − Aj, A − Aj, −A − Aj, −A + Aj, A + Aj, A + Aj, −A + Aj, A − Aj, A + Aj, −A − Aj, −A + Aj, A − Aj, −A − Aj, A − Aj, −A + Aj, −A + Aj, A − Aj, −A + Aj, −A − Aj, A − Aj, A − Aj, A − Aj, A − Aj, A − Aj, −A − Aj, −A − Aj, −A + Aj, −A + Aj, A − Aj, A − Aj, A − Aj, A + Aj, −A + Aj, −A − Aj, A + Aj, A − Aj, −A + Aj, −A − Aj, A − Aj, −A − Aj, A − Aj, A + Aj, A − Aj, A + Aj, −A − Aj, −A + Aj, −A − Aj, −A − Aj, A + Aj, −A + Aj, A − Aj, A − Aj, −A + Aj, −A + Aj, −A − Aj, A + Aj, −A + Aj, A + Aj, −A + Aj, −A + Aj, A − Aj, A + Aj, A + Aj, A + Aj, A + Aj, A + Aj, −A − Aj, −A − Aj |
| | Polarization 2 | A − Aj, A + Aj, A + Aj, A + Aj, −A + Aj, A + Aj, −A + Aj, −A − Aj, A − Aj, A + Aj, −A + Aj, A − Aj, −A + Aj, A + Aj, −A − Aj, A + Aj, −A + Aj, −A − Aj, A + Aj, −A − Aj, −A + Aj, −A + Aj, A − Aj, A + Aj, A − Aj, A + Aj, A + Aj, −A + Aj, −A + Aj, A − Aj, −A + Aj, A + Aj, A − Aj, A + Aj, −A − Aj, −A − Aj, −A − Aj, −A − Aj, −A + Aj, −A − Aj, −A − Aj, A − Aj, −A + Aj, A − Aj, −A − Aj, −A − Aj, A + Aj, −A − Aj, A + Aj, A − Aj, A + Aj, A − Aj, A + Aj, −A + Aj, −A + Aj, −A − Aj, A − Aj, A − Aj, A + Aj, A − Aj, A − Aj, A − Aj, −A + Aj, A + Aj, −A + Aj, A − Aj, −A + Aj, A − Aj, −A − Aj, A + Aj, A + Aj, −A + Aj, −A + Aj, −A − Aj, −A + Aj, A − Aj, A − Aj, −A − Aj, −A − Aj, −A − Aj, −A + Aj, A − Aj, −A − Aj, A + Aj, −A + Aj, −A + Aj, −A − Aj, −A − Aj, A − Aj, A − Aj, A − Aj, −A + Aj |

TABLE 28-6-continued

| Index | Polarization | Pilot sequence |
|---|---|---|
| 12 | Polarization 1 | −A − Aj, A + Aj, −A − Aj, A + Aj, −A − Aj, A + Aj, A + Aj, A + Aj, A − Aj, −A + Aj, −A − Aj, A + Aj, −A − Aj, A − Aj, −A + Aj, A + Aj, −A + Aj, −A − Aj, −A + Aj, A + Aj, −A − Aj, −A − Aj, A + Aj, −A + Aj, −A − Aj, A − Aj, −A − Aj, −A + Aj, A + Aj, A + Aj, −A + Aj, A − Aj, A + Aj, −A − Aj, −A + Aj, A − Aj, −A − Aj, A − Aj, −A + Aj, −A + Aj, A − Aj, −A + Aj, −A − Aj, A − Aj, A − Aj, A − Aj, A − Aj, A − Aj, −A − Aj, −A − Aj, −A + Aj, −A + Aj, A − Aj, A − Aj, A − Aj, A + Aj, −A + Aj, −A − Aj, A + Aj, A − Aj, −A + Aj, −A − Aj, A − Aj, −A − Aj, A − Aj, A + Aj, A − Aj, A + Aj, −A − Aj, −A + Aj, −A − Aj, −A − Aj, A + Aj, −A + Aj, A − Aj, A − Aj, −A + Aj, −A + Aj, −A − Aj, A + Aj, −A + Aj, A + Aj, −A + Aj, −A + Aj, A − Aj, A + Aj, A + Aj, A + Aj, A + Aj, A + Aj, −A − Aj, −A − Aj |
| | Polarization 2 | A + Aj, A + Aj, A + Aj, −A + Aj, A + Aj, −A + Aj, −A − Aj, A − Aj, A + Aj, −A + Aj, A − Aj, −A + Aj, A + Aj, −A − Aj, A + Aj, −A + Aj, −A − Aj, A + Aj, −A − Aj, −A + Aj, −A + Aj, A − Aj, A + Aj, A − Aj, A + Aj, A + Aj, −A + Aj, −A + Aj, A − Aj, −A + Aj, A + Aj, A − Aj, A + Aj, −A − Aj, −A − Aj, −A − Aj, −A − Aj, −A + Aj, −A − Aj, −A − Aj, A − Aj, −A + Aj, A − Aj, −A − Aj, −A − Aj, A + Aj, −A − Aj, A + Aj, A − Aj, A + Aj, A − Aj, A + Aj, −A + Aj, −A + Aj, −A − Aj, A − Aj, A − Aj, A + Aj, A − Aj, A − Aj, A − Aj, −A + Aj, A + Aj, −A + Aj, A − Aj, −A + Aj, A − Aj, −A − Aj, A + Aj, A + Aj, −A + Aj, −A + Aj, −A − Aj, −A + Aj, A − Aj, A − Aj, −A − Aj, −A − Aj, −A − Aj, −A + Aj, A − Aj, −A − Aj, A + Aj, −A + Aj, −A + Aj, −A − Aj, −A − Aj, A − Aj, A − Aj, A − Aj, −A + Aj, A − Aj |

(22) Particularly, when $N_{PS}$=96, if a remainder of $N_{TS}$ divided by 4 is 1, the pilot sequence is one item in Table 29-1. If a remainder of $N_{TS}$ divided by 4 is 3, the pilot sequence is one item in Table 29-1 or Table 29-2. Alternatively, any item is selected from Table 29-3 as a pilot sequence in one polarization direction, and any item is selected from Table 29-4 as a pilot sequence in the other polarization direction. Alternatively, any item is selected from Table 29-5 as a pilot sequence in one polarization direction, and any item is selected from Table 29-6 as a pilot sequence in the other polarization direction.

TABLE 29-1

| Index | Polarization | Pilot sequence |
|---|---|---|
| 1 | Polarization 1 | −A − Aj, −A − Aj, A − Aj, −A + Aj, −A + Aj, −A − Aj, A − Aj, −A + Aj, −A − Aj, A + Aj, −A − Aj, A − Aj, A + Aj, A + Aj, A + Aj, −A + Aj, −A − Aj, −A − Aj, A − Aj, −A − Aj, A − Aj, A − Aj, −A + Aj, A − Aj, −A − Aj, −A − Aj, A + Aj, −A + Aj, −A − Aj, A − Aj, A − Aj, A + Aj, A − Aj, A + Aj, −A − Aj, A − Aj, −A − Aj, −A − Aj, A − Aj, A − Aj, A − Aj, −A + Aj, −A + Aj, A + Aj, −A + Aj, −A − Aj, A + Aj, −A + Aj, −A + Aj, −A + Aj, −A − Aj, −A − Aj, −A + Aj, A + Aj, A + Aj, −A + Aj, A + Aj, A + Aj, A + Aj, A + Aj, −A − Aj, A + Aj, A − Aj, −A + Aj, A + Aj, A − Aj, −A + Aj, A − Aj, −A + Aj, A + Aj, −A + Aj, A − Aj, A + Aj, A − Aj, −A + Aj, −A − Aj, −A + Aj, −A − Aj, −A + Aj, A + Aj, A − Aj, A − Aj, −A + Aj, −A − Aj, −A − Aj, A + Aj, A + Aj, −A − Aj, −A + Aj, A − Aj, A − Aj, A + Aj, A + Aj, −A − Aj, A − Aj, −A + Aj |
| | Polarization 2 | −A + Aj, −A + Aj, A + Aj, −A − Aj, −A − Aj, −A + Aj, A + Aj, −A − Aj, −A + Aj, A − Aj, −A + Aj, A + Aj, A − Aj, A − Aj, A − Aj, −A − Aj, −A + Aj, −A + Aj, A + Aj, −A + Aj, A + Aj, A + Aj, −A − Aj, A + Aj, −A + Aj, −A + Aj, A − Aj, −A − Aj, −A + Aj, A + Aj, A + Aj, A − Aj, A + Aj, A − Aj, −A + Aj, A + Aj, −A + Aj, −A + Aj, A + Aj, A + Aj, A + Aj, −A − Aj, −A − Aj, A − Aj, −A − Aj, −A + Aj, A − Aj, −A − Aj, −A − Aj, −A − Aj, −A + Aj, −A + Aj, −A − Aj, A − Aj, A − Aj, −A − Aj, A − Aj, A − Aj, A − Aj, A − Aj, −A + Aj, A − Aj, A + Aj, −A − Aj, A − Aj, A + Aj, −A − Aj, A + Aj, −A − Aj, A − Aj, −A − Aj, A + Aj, A − Aj, A + Aj, −A − Aj, −A + Aj, −A − Aj, −A + Aj, −A − Aj, A − Aj, A + Aj, A + Aj, −A − Aj, −A + Aj, −A + Aj, A − Aj, A − Aj, −A + Aj, −A − Aj, A + Aj, A + Aj, A − Aj, A − Aj, −A + Aj, A + Aj, −A − Aj |
| 2 | Polarization 1 | −A − Aj, −A − Aj, A − Aj, −A + Aj, −A + Aj, −A − Aj, A − Aj, −A + Aj, −A − Aj, A + Aj, −A − Aj, A − Aj, A + Aj, A + Aj, A + Aj, −A + Aj, −A − Aj, −A − Aj, A − Aj, −A − Aj, A − Aj, A − Aj, −A + Aj, A − Aj, −A − Aj, −A − Aj, A + Aj, −A + Aj, −A − Aj, A − Aj, A − Aj, A + Aj, A − Aj, A + Aj, −A − Aj, A − Aj, −A − Aj, −A − Aj, A − Aj, A − Aj, A − Aj, −A + Aj, −A + Aj, A + Aj, −A + Aj, −A − Aj, A + Aj, −A + Aj, −A + Aj, −A + Aj, −A − Aj, −A − Aj, −A + Aj, A + Aj, A + Aj, −A + Aj, A + Aj, A + Aj, A + Aj, A + Aj, −A − Aj, A + Aj, A − Aj, −A + Aj, A + Aj, A − Aj, −A + Aj, A − Aj, −A + Aj, A + Aj, −A + Aj, A − Aj, A + Aj, A − Aj, −A + Aj, −A − Aj, −A + Aj, −A − Aj, −A + Aj, A + Aj, A − Aj, A − Aj, −A + Aj, −A − Aj, −A − Aj, A + Aj, A + Aj, −A − Aj, −A + Aj, A − Aj, A − Aj, A + Aj, A + Aj, −A − Aj, A − Aj, −A + Aj |
| | Polarization 2 | A − Aj, A − Aj, −A − Aj, A + Aj, A + Aj, A − Aj, −A − Aj, A + Aj, A − Aj, −A + Aj, A − Aj, −A − Aj, −A + Aj, −A + Aj, −A + Aj, A + Aj, A − Aj, A − Aj, −A − Aj, A − Aj, −A − Aj, −A − Aj, A + Aj, −A − Aj, A − Aj, A − Aj, −A + Aj, A + Aj, A − Aj, −A − Aj, −A − Aj, −A + Aj, −A − Aj, −A + Aj, A − Aj, −A − Aj, A − Aj, A − Aj, −A − Aj, −A − Aj, −A − Aj, A + Aj, A + Aj, −A + Aj, A + Aj, A − Aj, −A + Aj, A + Aj, A + Aj, A + Aj, A − Aj, A − Aj, A + Aj, −A + Aj, −A + Aj, A + Aj, −A + Aj, −A + Aj, −A + Aj, −A + Aj, A − Aj, −A + Aj, −A − Aj, A + Aj, −A + Aj, −A − Aj, A + Aj, −A − Aj, A + Aj, −A + Aj, A + Aj, −A − Aj, −A + Aj, −A − Aj, A + Aj, A − Aj, A + Aj, A − Aj, A + Aj, −A + Aj, −A − Aj, −A − Aj, A + Aj, A − Aj, A − Aj, −A + Aj, −A + Aj, A − Aj, A + Aj, −A − Aj, −A − Aj, −A + Aj, −A + Aj, A − Aj, −A − Aj, A + Aj |
| 3 | Polarization 1 | −A + Aj, −A + Aj, A + Aj, −A − Aj, −A − Aj, −A + Aj, A + Aj, −A − Aj, −A + Aj, A − Aj, −A + Aj, A + Aj, A − Aj, A − Aj, A − Aj, −A − Aj, −A + Aj, −A + Aj, A + Aj, −A + Aj, A + Aj, A + Aj, −A − Aj, A + Aj, −A + Aj, −A + Aj, A − Aj, −A − Aj, −A + Aj, A + Aj, A + Aj, A − Aj, A + Aj, A − Aj, −A + Aj, A + Aj, −A + Aj, −A + Aj, A + Aj, A + Aj, A + Aj, −A − Aj, −A − Aj, A − Aj, −A − Aj, −A + Aj, A − Aj, −A − Aj, −A − Aj, −A − Aj, −A + Aj, −A + Aj, −A − Aj, A − Aj, A − Aj, −A − Aj, A − Aj, A − Aj, A − Aj, A − Aj, −A + Aj, A − Aj, A + Aj, −A − Aj, A − Aj, A + Aj, −A − Aj, A + Aj, −A − Aj, A − Aj, −A − Aj, A + Aj, A − Aj, A + Aj, −A − Aj, −A + Aj, −A − Aj, −A + Aj, −A − Aj, A − Aj, A + Aj, A + Aj, −A − Aj, −A + Aj, −A + Aj, A − Aj, A − Aj, −A + Aj, −A − Aj, A + Aj, A + Aj, A − Aj, A − Aj, −A + Aj, A + Aj, −A − Aj |
| | Polarization 2 | A + Aj, A + Aj, −A + Aj, A − Aj, A − Aj, A + Aj, −A + Aj, A − Aj, A + Aj, −A − Aj, A + Aj, −A + Aj, −A − Aj, −A − Aj, −A − Aj, A − Aj, A + Aj, A + Aj, −A + Aj, A + Aj, −A + Aj, −A + Aj, A − Aj, −A + Aj, A + Aj, A + Aj, −A − Aj, A − Aj, A + Aj, −A + Aj, −A + Aj, −A − Aj, −A + Aj, −A − Aj, A + Aj, −A + Aj, A + Aj, A + Aj, −A + Aj, −A + Aj, −A + Aj, A − Aj, A − Aj, −A − Aj, A − Aj, A + Aj, −A − Aj, A − Aj, A − Aj, A − Aj, A + Aj, A + Aj, A − Aj, −A − Aj, −A − Aj, A − Aj, −A − Aj, −A − Aj, −A − Aj, −A − Aj, A + Aj, |

TABLE 29-1-continued

| Index | Polarization | Pilot sequence |
|---|---|---|
| | | −A − Aj, −A + Aj, A − Aj, −A − Aj, −A + Aj, A − Aj, −A + Aj, A − Aj, −A − Aj, A − Aj, −A + Aj, −A − Aj, −A + Aj, A − Aj, A + Aj, A − Aj, A + Aj, A − Aj, −A − Aj, −A + Aj, −A + Aj, A − Aj, A + Aj, A + Aj, −A − Aj, −A − Aj, A + Aj, A − Aj, −A + Aj, −A + Aj, −A − Aj, −A − Aj, A + Aj, −A + Aj, A − Aj |
| 4 | Polarization 1 | A − Aj, A − Aj, −A − Aj, A + Aj, A + Aj, A − Aj, −A − Aj, A + Aj, A − Aj, −A + Aj, A − Aj, −A − Aj, −A + Aj, −A + Aj, −A + Aj, A + Aj, A − Aj, A − Aj, −A − Aj, A − Aj, −A − Aj, −A − Aj, A + Aj, −A − Aj, A − Aj, A − Aj, −A + Aj, A + Aj, A − Aj, −A − Aj, −A − Aj, −A + Aj, −A − Aj, −A + Aj, A − Aj, −A − Aj, A − Aj, A − Aj, −A − Aj, −A − Aj, −A − Aj, A + Aj, A + Aj, −A + Aj, A + Aj, A − Aj, −A + Aj, A + Aj, A + Aj, A + Aj, A − Aj, A − Aj, A + Aj, −A + Aj, −A + Aj, A + Aj, −A + Aj, −A + Aj, −A + Aj, −A + Aj, A − Aj, −A + Aj, −A − Aj, A + Aj, −A + Aj, −A − Aj, A + Aj, −A − Aj, A + Aj, −A + Aj, A + Aj, −A − Aj, −A + Aj, −A − Aj, A + Aj, A − Aj, A + Aj, A − Aj, A + Aj, −A + Aj, −A − Aj, −A − Aj, A + Aj, A − Aj, A − Aj, −A + Aj, −A + Aj, A − Aj, A + Aj, −A − Aj, −A − Aj, −A + Aj, −A + Aj, A − Aj, −A − Aj, A + Aj |
| | Polarization 2 | A + Aj, A + Aj, −A + Aj, A − Aj, A − Aj, A + Aj, −A + Aj, A − Aj, A + Aj, −A − Aj, A + Aj, −A + Aj, −A − Aj, −A − Aj, −A − Aj, A − Aj, A + Aj, A + Aj, −A + Aj, A + Aj, −A + Aj, −A + Aj, A − Aj, −A + Aj, A + Aj, A + Aj, −A − Aj, A − Aj, A + Aj, −A + Aj, −A + Aj, −A − Aj, −A + Aj, −A − Aj, A + Aj, −A + Aj, A + Aj, A + Aj, −A + Aj, −A + Aj, −A + Aj, A − Aj, A − Aj, −A − Aj, A − Aj, A + Aj, −A − Aj, A − Aj, A − Aj, A − Aj, A + Aj, A + Aj, A − Aj, −A − Aj, −A − Aj, A − Aj, −A − Aj, −A − Aj, −A − Aj, −A − Aj, A + Aj, −A − Aj, −A + Aj, A − Aj, −A − Aj, −A + Aj, A − Aj, −A + Aj, A − Aj, −A − Aj, A − Aj, −A + Aj, −A − Aj, −A + Aj, A − Aj, A + Aj, A − Aj, A + Aj, A − Aj, −A − Aj, −A + Aj, −A + Aj, A − Aj, A + Aj, A + Aj, −A − Aj, −A − Aj, A + Aj, A − Aj, −A + Aj, −A + Aj, −A − Aj, −A − Aj, A + Aj, −A + Aj, A − Aj |
| 5 | Polarization 1 | −A − Aj, A + Aj, A − Aj, −A + Aj, −A + Aj, A + Aj, A + Aj, −A − Aj, A − Aj, −A + Aj, −A + Aj, A − Aj, A − Aj, −A − Aj, A + Aj, A + Aj, −A + Aj, −A − Aj, A − Aj, −A − Aj, A − Aj, −A − Aj, A + Aj, −A + Aj, A + Aj, −A − Aj, −A + Aj, −A − Aj, A + Aj, −A − Aj, A + Aj, −A + Aj, −A − Aj, A + Aj, −A + Aj, A − Aj, −A + Aj, −A + Aj, −A + Aj, −A + Aj, −A − Aj, −A + Aj, −A + Aj, −A − Aj, A − Aj, A − Aj, −A − Aj, −A − Aj, −A − Aj, −A + Aj, A − Aj, −A − Aj, −A + Aj, −A − Aj, −A − Aj, A + Aj, A + Aj, A + Aj, A − Aj, A − Aj, A + Aj, A − Aj, −A + Aj, A + Aj, −A + Aj, A + Aj, A + Aj, A − Aj, −A − Aj, −A + Aj, A − Aj, A − Aj, A + Aj, −A − Aj, A + Aj, A + Aj, A − Aj, A + Aj, A − Aj, A − Aj, −A − Aj, −A + Aj, −A + Aj, −A + Aj, A + Aj, A − Aj, −A + Aj, A − Aj, −A − Aj, A + Aj, A − Aj, −A − Aj, −A − Aj, A + Aj, A − Aj, A − Aj |
| | Polarization 2 | −A + Aj, A − Aj, A + Aj, −A − Aj, −A − Aj, A − Aj, A − Aj, −A + Aj, A + Aj, −A − Aj, −A − Aj, A + Aj, A + Aj, −A + Aj, A − Aj, A − Aj, −A − Aj, −A + Aj, A + Aj, −A + Aj, A + Aj, −A + Aj, A − Aj, −A − Aj, A − Aj, −A + Aj, −A − Aj, −A + Aj, A − Aj, −A + Aj, A − Aj, −A − Aj, −A + Aj, A − Aj, −A − Aj, A + Aj, −A − Aj, −A − Aj, −A − Aj, −A − Aj, −A + Aj, −A − Aj, −A − Aj, −A + Aj, A + Aj, A + Aj, −A + Aj, −A + Aj, −A + Aj, −A − Aj, A + Aj, −A + Aj, −A − Aj, −A + Aj, −A + Aj, A − Aj, A − Aj, A − Aj, A + Aj, A + Aj, A − Aj, A + Aj, −A − Aj, A − Aj, −A − Aj, A − Aj, A − Aj, A + Aj, −A + Aj, −A − Aj, A + Aj, A + Aj, A − Aj, −A + Aj, A − Aj, A − Aj, A + Aj, A − Aj, A + Aj, A + Aj, −A + Aj, −A − Aj, −A − Aj, −A − Aj, A − Aj, A + Aj, −A − Aj, A + Aj, −A + Aj, A − Aj, A + Aj, −A + Aj, −A + Aj, A − Aj, A + Aj, A + Aj |
| 6 | Polarization 1 | −A − Aj, A + Aj, A − Aj, −A + Aj, −A + Aj, A + Aj, A + Aj, −A − Aj, A − Aj, −A + Aj, −A + Aj, A − Aj, A − Aj, −A − Aj, A + Aj, A + Aj, −A + Aj, −A − Aj, A − Aj, −A − Aj, A − Aj, −A − Aj, A + Aj, −A + Aj, A + Aj, −A − Aj, −A + Aj, −A − Aj, A + Aj, −A − Aj, A + Aj, −A + Aj, −A − Aj, A + Aj, −A + Aj, A − Aj, −A + Aj, −A + Aj, −A + Aj, −A + Aj, −A − Aj, −A + Aj, −A + Aj, −A − Aj, A − Aj, A − Aj, −A − Aj, −A − Aj, −A − Aj, −A + Aj, A − Aj, −A − Aj, −A + Aj, −A − Aj, −A − Aj, A + Aj, A + Aj, A + Aj, A − Aj, A − Aj, A + Aj, A − Aj, −A + Aj, A + Aj, −A + Aj, A + Aj, A + Aj, A − Aj, −A − Aj, −A + Aj, A − Aj, A − Aj, A + Aj, −A − Aj, A + Aj, A + Aj, A − Aj, A + Aj, A − Aj, A − Aj, −A − Aj, −A + Aj, −A + Aj, −A + Aj, A + Aj, A − Aj, −A + Aj, A − Aj, −A − Aj, A + Aj, A − Aj, −A − Aj, −A − Aj, A + Aj, A − Aj, A − Aj |
| | Polarization 2 | A − Aj, −A + Aj, −A − Aj, A + Aj, A + Aj, −A + Aj, −A + Aj, A − Aj, −A − Aj, A + Aj, A + Aj, −A − Aj, −A − Aj, A − Aj, −A + Aj, −A + Aj, A + Aj, A − Aj, −A − Aj, A − Aj, −A − Aj, A − Aj, −A + Aj, A + Aj, −A + Aj, A − Aj, A + Aj, A − Aj, −A + Aj, A − Aj, −A + Aj, A + Aj, A − Aj, −A + Aj, A + Aj, −A − Aj, A + Aj, A + Aj, A + Aj, A + Aj, A − Aj, A + Aj, A + Aj, A − Aj, −A − Aj, −A − Aj, A − Aj, A − Aj, A − Aj, A + Aj, −A − Aj, A − Aj, A + Aj, A − Aj, A − Aj, −A + Aj, −A + Aj, −A + Aj, −A − Aj, −A − Aj, −A + Aj, −A − Aj, A + Aj, −A + Aj, A + Aj, −A + Aj, −A + Aj, −A − Aj, A − Aj, A + Aj, −A − Aj, −A − Aj, −A + Aj, A − Aj, −A + Aj, −A + Aj, −A − Aj, −A + Aj, −A − Aj, −A − Aj, A − Aj, A + Aj, A + Aj, A + Aj, −A + Aj, −A − Aj, A + Aj, −A − Aj, A − Aj, −A + Aj, −A − Aj, A − Aj, A − Aj, −A + Aj, −A − Aj, −A − Aj |
| 7 | Polarization 1 | −A + Aj, A − Aj, A + Aj, −A − Aj, −A − Aj, A − Aj, A − Aj, −A + Aj, A + Aj, −A − Aj, −A − Aj, A + Aj, A + Aj, −A + Aj, A − Aj, A − Aj, −A − Aj, −A + Aj, A + Aj, −A + Aj, A + Aj, −A + Aj, A − Aj, −A − Aj, A − Aj, −A + Aj, −A − Aj, −A + Aj, A − Aj, −A + Aj, A − Aj, −A − Aj, −A + Aj, A − Aj, −A − Aj, A + Aj, −A − Aj, −A − Aj, −A − Aj, −A − Aj, −A + Aj, −A − Aj, −A − Aj, −A + Aj, A + Aj, A + Aj, −A + Aj, −A + Aj, −A + Aj, −A − Aj, A + Aj, −A + Aj, −A − Aj, −A + Aj, −A + Aj, A − Aj, A − Aj, A − Aj, A + Aj, A + Aj, A − Aj, A + Aj, −A − Aj, A − Aj, −A − Aj, A − Aj, A − Aj, A + Aj, −A + Aj, −A − Aj, A + Aj, A + Aj, A − Aj, −A + Aj, A − Aj, A − Aj, A + Aj, A − Aj, A + Aj, A + Aj, −A + Aj, −A − Aj, −A − Aj, −A − Aj, A − Aj, A + Aj, −A − Aj, A + Aj, −A + Aj, A − Aj, A + Aj, −A + Aj, −A + Aj, A − Aj, A + Aj, A + Aj |
| | Polarization 2 | A + Aj, −A − Aj, −A + Aj, A − Aj, A − Aj, −A − Aj, −A − Aj, A + Aj, −A + Aj, A − Aj, A − Aj, −A + Aj, −A + Aj, A + Aj, −A − Aj, −A − Aj, A − Aj, A + Aj, −A + Aj, A + Aj, −A + Aj, A + Aj, −A − Aj, A − Aj, −A − Aj, A + Aj, A − Aj, A + Aj, −A − Aj, A + Aj, −A − Aj, A − Aj, A + Aj, −A − Aj, A − Aj, −A + Aj, A − Aj, A − Aj, A − Aj, A − Aj, A + Aj, A − Aj, A − Aj, A + Aj, −A + Aj, −A + Aj, A + Aj, A + Aj, A + Aj, A − Aj, −A + Aj, A + Aj, A − Aj, A + Aj, A + Aj, −A − Aj, −A − Aj, −A − Aj, −A + Aj, −A + Aj, −A − Aj, −A + Aj, A − Aj, −A − Aj, A − Aj, −A − Aj, −A − Aj, −A + Aj, A + Aj, A − Aj, −A + Aj, −A + Aj, −A − Aj, A + Aj, −A − Aj, −A − Aj, −A + Aj, −A − Aj, −A + Aj, −A + Aj, A + Aj, A − Aj, A − Aj, A − Aj, −A − Aj, −A + Aj, A − Aj, −A + Aj, A + Aj, −A − Aj, −A + Aj, A + Aj, A + Aj, −A − Aj, −A + Aj, −A + Aj |
| 8 | Polarization 1 | A − Aj, −A + Aj, −A − Aj, A + Aj, A + Aj, −A + Aj, −A + Aj, A − Aj, −A − Aj, A + Aj, A + Aj, −A − Aj, −A − Aj, A − Aj, −A + Aj, −A + Aj, A + Aj, A − Aj, −A − Aj, A − Aj, −A − Aj, A − Aj, −A + Aj, A + Aj, −A + Aj, A − Aj, A + Aj, A − Aj, −A + Aj, A − Aj, −A + Aj, A + Aj, A − Aj, −A + Aj, A + Aj, −A − Aj, A + Aj, A + Aj, A + Aj, A + Aj, A − Aj, A + Aj, A + Aj, A − Aj, −A − Aj, −A − Aj, A − Aj, A − Aj, A − Aj, A + Aj, −A − Aj, A − Aj, A + Aj, A − Aj, A − Aj, −A + Aj, −A + Aj, −A + Aj, −A − Aj, −A − Aj, −A + Aj, −A − Aj, A + Aj, −A + Aj, A + Aj, −A + Aj, −A + Aj, −A − Aj, A − Aj, A + Aj, −A − Aj, −A − Aj, −A + Aj, A − Aj, −A + Aj, −A + Aj, −A − Aj, −A + Aj, −A − Aj, −A − Aj, A − Aj, A + Aj, A + Aj, A + Aj, −A + Aj, −A − Aj, A + Aj, −A − Aj, A − Aj, −A + Aj, −A − Aj, A − Aj, A − Aj, −A + Aj, −A − Aj, −A − Aj |
| | Polarization 2 | A + Aj, −A − Aj, −A + Aj, A − Aj, A − Aj, −A − Aj, −A − Aj, A + Aj, −A + Aj, A − Aj, A − Aj, −A + Aj, −A + Aj, A + Aj, −A − Aj, −A − Aj, A − Aj, A + Aj, −A + Aj, A + Aj, −A + Aj, A + Aj, −A − Aj, A − Aj, −A − Aj, A + Aj, A − Aj, A + Aj, −A − Aj, A + Aj, −A − Aj, A − Aj, A + Aj, −A − Aj, A − Aj, −A + Aj, A − |

TABLE 29-1-continued

| Index | Polarization | Pilot sequence |
|---|---|---|
| | | Aj, A − Aj, A − Aj, A − Aj, A + Aj, A − Aj, A − Aj, A + Aj, −A + Aj, −A + Aj, A + Aj, A + Aj, A + Aj, A − Aj, −A + Aj, A + Aj, A − Aj, A + Aj, A + Aj, −A − Aj, −A − Aj, −A − Aj, −A + Aj, −A + Aj, −A − Aj, −A + Aj, A − Aj, −A − Aj, A − Aj, −A − Aj, −A − Aj, −A + Aj, A + Aj, A − Aj, −A + Aj, −A + Aj, −A − Aj, A + Aj, −A − Aj, −A − Aj, −A + Aj, −A − Aj, −A + Aj, −A + Aj, A + Aj, A − Aj, A − Aj, A − Aj, −A − Aj, −A + Aj, A − Aj, −A + Aj, A + Aj, −A − Aj, −A + Aj, A + Aj, A + Aj, −A − Aj, −A + Aj, −A + Aj |
| 9 | Polarization 1 | A − Aj, −A + Aj, A + Aj, A + Aj, A + Aj, A − Aj, −A − Aj, A + Aj, A + Aj, −A − Aj, A − Aj, A − Aj, −A − Aj, −A − Aj, A − Aj, −A − Aj, −A + Aj, −A + Aj, −A + Aj, −A + Aj, A − Aj, −A − Aj, A − Aj, A + Aj, −A + Aj, A − Aj, −A − Aj, A − Aj, −A − Aj, −A + Aj, A − Aj, −A + Aj, −A + Aj, A + Aj, A + Aj, −A + Aj, −A + Aj, A − Aj, A − Aj, A + Aj, A + Aj, −A − Aj, A + Aj, A + Aj, −A − Aj, −A − Aj, −A − Aj, −A − Aj, −A + Aj, A − Aj, −A − Aj, −A − Aj, A + Aj, A + Aj, A + Aj, −A + Aj, A − Aj, −A + Aj, A − Aj, A − Aj, −A + Aj, −A − Aj, A − Aj, A − Aj, A + Aj, A + Aj, A − Aj, −A + Aj, A + Aj, −A + Aj, −A − Aj, −A − Aj, −A + Aj, A + Aj, −A − Aj, A − Aj, A + Aj, −A + Aj, −A − Aj, A − Aj, A − Aj, −A + Aj, −A + Aj, A − Aj, −A − Aj, A + Aj, −A + Aj, −A + Aj, A − Aj, A + Aj, −A + Aj, A + Aj, −A − Aj, −A − Aj, −A − Aj, A + Aj |
| | Polarization 2 | A + Aj, A + Aj, −A + Aj, A + Aj, A − Aj, −A − Aj, A − Aj, A − Aj, −A − Aj, A − Aj, −A − Aj, −A − Aj, −A − Aj, −A + Aj, −A + Aj, −A − Aj, −A − Aj, A − Aj, −A − Aj, −A − Aj, A + Aj, −A + Aj, −A + Aj, −A + Aj, A + Aj, −A + Aj, A − Aj, A + Aj, A + Aj, A − Aj, −A − Aj, −A + Aj, −A + Aj, −A − Aj, A + Aj, A − Aj, −A − Aj, −A + Aj, −A − Aj, A − Aj, A + Aj, A − Aj, A + Aj, A − Aj, A + Aj, A + Aj, −A + Aj, A + Aj, −A + Aj, −A − Aj, A − Aj, A + Aj, A + Aj, −A + Aj, A − Aj, A + Aj, −A − Aj, A − Aj, −A − Aj, −A − Aj, A − Aj, A + Aj, −A + Aj, −A + Aj, −A − Aj, A − Aj, −A + Aj, A − Aj, −A + Aj, A + Aj, A − Aj, A + Aj, −A − Aj, −A − Aj, −A + Aj, −A − Aj, A + Aj, A − Aj, A − Aj, A + Aj, −A − Aj, A + Aj, A + Aj, A − Aj, A − Aj, −A − Aj, −A + Aj, −A + Aj, A − Aj, −A + Aj, A − Aj, −A + Aj, −A + Aj, −A − Aj, A + Aj, −A + Aj |
| 10 | Polarization 1 | A + Aj, A + Aj, −A + Aj, A + Aj, A − Aj, −A − Aj, A − Aj, A − Aj, −A − Aj, A − Aj, −A − Aj, −A − Aj, −A − Aj, −A + Aj, −A + Aj, −A − Aj, −A − Aj, A − Aj, −A − Aj, −A − Aj, A + Aj, −A + Aj, −A + Aj, −A + Aj, A + Aj, −A + Aj, A − Aj, A + Aj, A + Aj, A − Aj, −A − Aj, −A + Aj, −A + Aj, −A − Aj, A + Aj, A − Aj, −A − Aj, −A + Aj, −A − Aj, A − Aj, A + Aj, A − Aj, A + Aj, A − Aj, A + Aj, A + Aj, −A + Aj, A + Aj, −A + Aj, −A − Aj, A − Aj, A + Aj, A + Aj, −A + Aj, A − Aj, A + Aj, −A − Aj, A − Aj, −A − Aj, −A − Aj, A − Aj, A + Aj, −A + Aj, −A + Aj, −A − Aj, A − Aj, −A + Aj, A − Aj, −A + Aj, A + Aj, A − Aj, A + Aj, −A − Aj, −A − Aj, −A + Aj, −A − Aj, A + Aj, A − Aj, A − Aj, A + Aj, −A − Aj, A + Aj, A + Aj, A − Aj, A − Aj, −A − Aj, −A + Aj, −A + Aj, A − Aj, −A + Aj, A − Aj, −A + Aj, −A + Aj, −A − Aj, A + Aj, −A + Aj |
| | Polarization 2 | A + Aj, A + Aj, A + Aj, A − Aj, −A − Aj, A + Aj, A + Aj, −A − Aj, A − Aj, A − Aj, −A − Aj, −A − Aj, A − Aj, −A − Aj, −A + Aj, −A + Aj, −A + Aj, −A + Aj, A − Aj, −A − Aj, A − Aj, A + Aj, −A + Aj, A − Aj, −A − Aj, A − Aj, −A − Aj, −A + Aj, A − Aj, −A + Aj, −A + Aj, A + Aj, A + Aj, −A + Aj, −A + Aj, A − Aj, A − Aj, A + Aj, A + Aj, −A − Aj, A + Aj, A + Aj, −A − Aj, −A − Aj, −A − Aj, −A − Aj, −A + Aj, A − Aj, −A − Aj, −A − Aj, A + Aj, A + Aj, A + Aj, −A + Aj, A − Aj, −A + Aj, A − Aj, A − Aj, −A + Aj, −A − Aj, A − Aj, A − Aj, A + Aj, A + Aj, A − Aj, −A + Aj, A + Aj, −A + Aj, −A − Aj, −A − Aj, −A + Aj, A + Aj, −A − Aj, A − Aj, A + Aj, −A + Aj, −A − Aj, A − Aj, A − Aj, −A + Aj, −A + Aj, A − Aj, −A − Aj, A + Aj, −A + Aj, −A + Aj, A − Aj, A + Aj, −A + Aj, A + Aj, −A − Aj, −A − Aj, −A − Aj, A + Aj, −A + Aj, A − Aj |
| 11 | Polarization 1 | −A + Aj, A − Aj, A + Aj, −A − Aj, −A − Aj, −A − Aj, A + Aj, A − Aj, A + Aj, −A + Aj, A − Aj, A − Aj, A + Aj, −A − Aj, −A + Aj, A − Aj, A − Aj, −A + Aj, −A + Aj, −A − Aj, A − Aj, A + Aj, −A + Aj, −A − Aj, A + Aj, A − Aj, −A − Aj, −A − Aj, A − Aj, A + Aj, A − Aj, −A + Aj, A + Aj, A + Aj, −A + Aj, −A + Aj, −A − Aj, A − Aj, −A + Aj, −A + Aj, A − Aj, −A + Aj, A − Aj, A + Aj, A + Aj, A + Aj, −A − Aj, −A − Aj, −A + Aj, A − Aj, −A − Aj, −A − Aj, −A − Aj, −A − Aj, A + Aj, A + Aj, −A − Aj, A + Aj, A + Aj, −A + Aj, −A + Aj, A − Aj, A − Aj, A + Aj, A + Aj, A − Aj, A − Aj, −A + Aj, A − Aj, −A − Aj, −A + Aj, −A − Aj, −A + Aj, A − Aj, A + Aj, −A + Aj, −A − Aj, −A + Aj, A − Aj, A − Aj, A − Aj, A − Aj, −A − Aj, −A + Aj, −A − Aj, −A − Aj, −A + Aj, −A + Aj, −A − Aj, A + Aj, A + Aj, −A − Aj, −A + Aj, A + Aj, A + Aj, A + Aj |
| | Polarization 2 | A − Aj, A + Aj, −A − Aj, A − Aj, A − Aj, −A + Aj, A − Aj, −A + Aj, A − Aj, A − Aj, −A − Aj, −A + Aj, −A + Aj, A + Aj, A + Aj, −A − Aj, A + Aj, −A + Aj, −A + Aj, A + Aj, −A − Aj, A − Aj, −A − Aj, −A − Aj, A + Aj, −A + Aj, A + Aj, A − Aj, −A + Aj, A − Aj, −A + Aj, −A − Aj, A − Aj, A − Aj, A + Aj, −A + Aj, −A − Aj, −A − Aj, −A + Aj, −A − Aj, A + Aj, −A + Aj, A − Aj, A + Aj, A + Aj, −A + Aj, −A − Aj, A − Aj, A + Aj, A − Aj, A + Aj, A + Aj, −A + Aj, A + Aj, −A + Aj, A + Aj, −A + Aj, −A − Aj, A − Aj, −A − Aj, −A + Aj, A + Aj, −A − Aj, A − Aj, A − Aj, −A − Aj, −A + Aj, A + Aj, A + Aj, −A + Aj, A − Aj, A + Aj, A − Aj, A − Aj, A − Aj, A + Aj, −A − Aj, −A − Aj, −A + Aj, −A − Aj, −A − Aj, A − Aj, A − Aj, −A − Aj, −A − Aj, −A − Aj, −A + Aj, −A − Aj, −A + Aj, −A + Aj, −A − Aj, −A + Aj, A + Aj, A − Aj, A + Aj, A + Aj |
| 12 | Polarization 1 | A − Aj, A + Aj, −A − Aj, A − Aj, A − Aj, −A + Aj, A − Aj, −A + Aj, A − Aj, A − Aj, −A − Aj, −A + Aj, −A + Aj, A + Aj, A + Aj, −A − Aj, A + Aj, −A + Aj, −A + Aj, A + Aj, −A − Aj, A − Aj, −A − Aj, −A − Aj, A + Aj, −A + Aj, A + Aj, A − Aj, −A + Aj, A − Aj, −A + Aj, −A − Aj, A − Aj, A − Aj, A + Aj, −A + Aj, −A − Aj, −A − Aj, −A + Aj, −A − Aj, A + Aj, −A + Aj, A − Aj, A + Aj, A + Aj, −A + Aj, −A − Aj, A − Aj, A + Aj, A − Aj, A + Aj, A + Aj, −A + Aj, A + Aj, −A + Aj, A + Aj, −A + Aj, −A − Aj, A − Aj, −A − Aj, −A + Aj, A + Aj, −A − Aj, A − Aj, A − Aj, −A − Aj, −A + Aj, A + Aj, A + Aj, −A + Aj, A − Aj, A + Aj, A − Aj, A − Aj, A − Aj, A + Aj, −A − Aj, −A − Aj, −A + Aj, −A − Aj, −A − Aj, A − Aj, A − Aj, −A − Aj, −A − Aj, −A − Aj, −A + Aj, −A − Aj, −A + Aj, −A + Aj, −A − Aj, −A + Aj, A + Aj, A − Aj, A + Aj, A + Aj |
| | Polarization 2 | A + Aj, −A − Aj, −A − Aj, −A − Aj, A + Aj, A − Aj, A + Aj, −A + Aj, A − Aj, A − Aj, A + Aj, −A − Aj, −A + Aj, A − Aj, A − Aj, −A + Aj, −A + Aj, −A − Aj, A − Aj, A + Aj, −A + Aj, −A − Aj, A + Aj, A − Aj, −A − Aj, −A − Aj, A − Aj, A + Aj, A − Aj, −A + Aj, A + Aj, A + Aj, −A + Aj, −A + Aj, −A − Aj, A − Aj, −A + Aj, −A + Aj, A − Aj, −A + Aj, A − Aj, A + Aj, A + Aj, A + Aj, −A − Aj, −A − Aj, −A + Aj, A − Aj, −A − Aj, −A − Aj, −A − Aj, −A − Aj, A + Aj, A + Aj, −A − Aj, A + Aj, A + Aj, −A + Aj, −A + Aj, A − Aj, A − Aj, A + Aj, A + Aj, A − Aj, A − Aj, −A + Aj, A − Aj, −A − Aj, −A + Aj, −A − Aj, −A + Aj, A − Aj, A + Aj, −A + Aj, −A − Aj, −A + Aj, A − Aj, A − Aj, A − Aj, A − Aj, −A − Aj, −A + Aj, −A − Aj, −A − Aj, −A + Aj, −A + Aj, −A − Aj, A + Aj, A + Aj, −A − Aj, −A + Aj, A + Aj, A + Aj, A + Aj, A − Aj, −A + Aj |

TABLE 29-2

| Index | Polarization | Pilot sequence |
|---|---|---|
| 1 | Polarization 1 | −A − Aj, A − Aj, A − Aj, A + Aj, A − Aj, −A + Aj, −A + Aj, −A − Aj, −A − Aj, −A − Aj, A + Aj, −A + Aj, A − Aj, A + Aj, −A − Aj, A − Aj, A + Aj, −A − Aj, A − Aj, −A − Aj, A − Aj, A − Aj, A + Aj, −A + Aj, A + Aj, −A + Aj, A + Aj, A + Aj, −A + Aj, −A + Aj, A + Aj, A − Aj, A + Aj, A − Aj, A − Aj, −A − Aj, A − Aj, A + Aj, −A − Aj, −A + Aj, A − Aj, A − Aj, −A + Aj, −A − Aj, −A − Aj, −A + Aj, A + Aj, A + Aj, A + Aj, A + Aj, −A + Aj, −A − Aj, −A − Aj, A − Aj, A − Aj, −A + Aj, −A − Aj, A + Aj, A + Aj, A + Aj, −A − Aj, −A − Aj, A − Aj, A + Aj, A − Aj, −A − Aj, A − Aj, −A − Aj, −A + Aj, A + Aj, −A + Aj, A − Aj, A + Aj, A + Aj, −A − Aj, A + Aj, A + Aj, −A + Aj, −A + Aj, −A − Aj, −A − Aj, A + Aj, −A + Aj, −A + Aj, −A + Aj, −A − Aj, −A + Aj, −A − Aj, −A + Aj, −A − Aj, A − Aj, A − Aj, A − Aj, −A + Aj, −A + Aj, −A − Aj |
| | Polarization 2 | A + Aj, −A − Aj, −A − Aj, A + Aj, A + Aj, −A − Aj, −A + Aj, A − Aj, −A + Aj, A + Aj, −A − Aj, A + Aj, A − Aj, A − Aj, −A + Aj, −A + Aj, A + Aj, −A + Aj, A − Aj, −A − Aj, −A + Aj, −A − Aj, −A − Aj, −A − Aj, −A − Aj, A + Aj, A − Aj, −A − Aj, A + Aj, A + Aj, −A + Aj, A − Aj, A − Aj, −A − Aj, −A − Aj, A − Aj, −A − Aj, A + Aj, A − Aj, −A + Aj, −A − Aj, A + Aj, −A − Aj, −A + Aj, −A − Aj, A + Aj, −A + Aj, A − Aj, −A − Aj, A − Aj, A − Aj, −A − Aj, A + Aj, A + Aj, A − Aj, −A − Aj, A − Aj, A + Aj, A + Aj, A + Aj, A − Aj, −A + Aj, A − Aj, −A + Aj, A − Aj, A + Aj, A + Aj, A + Aj, −A + Aj, A + Aj, A − Aj, A − Aj, −A + Aj, A − Aj, −A + Aj, −A + Aj, −A + Aj, A + Aj, −A − Aj, A − Aj, A − Aj, −A − Aj, −A − Aj, −A + Aj, A − Aj, A + Aj, −A + Aj, A − Aj, −A + Aj, −A + Aj, A − Aj, −A + Aj, −A − Aj, −A + Aj, −A + Aj, −A + Aj |
| 2 | Polarization 1 | −A − Aj, A − Aj, A − Aj, −A + Aj, −A + Aj, −A + Aj, −A − Aj, A − Aj, −A − Aj, A − Aj, −A − Aj, A − Aj, A − Aj, A − Aj, A + Aj, −A − Aj, −A − Aj, A − Aj, A − Aj, A + Aj, A + Aj, −A − Aj, A + Aj, A + Aj, −A + Aj, A − Aj, A + Aj, A − Aj, −A − Aj, −A + Aj, −A − Aj, −A + Aj, A + Aj, −A + Aj, −A − Aj, −A − Aj, A + Aj, A + Aj, A + Aj, −A − Aj, A − Aj, −A + Aj, −A + Aj, −A − Aj, −A − Aj, A − Aj, A + Aj, A + Aj, A + Aj, A + Aj, A − Aj, −A − Aj, −A − Aj, A − Aj, −A + Aj, −A + Aj, A − Aj, −A − Aj, A + Aj, −A + Aj, −A − Aj, −A + Aj, −A + Aj, A + Aj, −A + Aj, A + Aj, A − Aj, A − Aj, A + Aj, A + Aj, A − Aj, A + Aj, A − Aj, A + Aj, −A + Aj, −A + Aj, −A − Aj, −A + Aj, −A − Aj, A + Aj, −A + Aj, −A − Aj, A + Aj, −A + Aj, A − Aj, A + Aj, −A − Aj, −A − Aj, −A − Aj, A − Aj, A − Aj, −A + Aj, A + Aj, −A + Aj, −A + Aj, −A − Aj |
| | Polarization 2 | A − Aj, A − Aj, A − Aj, −A − Aj, A − Aj, −A + Aj, A − Aj, A − Aj, −A + Aj, A − Aj, A + Aj, −A + Aj, A − Aj, −A − Aj, −A − Aj, −A + Aj, −A + Aj, −A − Aj, A + Aj, A − Aj, A − Aj, A − Aj, −A + Aj, A − Aj, −A + Aj, −A + Aj, A + Aj, A − Aj, A + Aj, A + Aj, A + Aj, −A + Aj, A − Aj, −A + Aj, A − Aj, −A + Aj, A + Aj, A + Aj, A + Aj, −A + Aj, −A − Aj, −A + Aj, A + Aj, A + Aj, −A − Aj, −A + Aj, −A + Aj, −A − Aj, −A + Aj, A − Aj, A + Aj, −A − Aj, A − Aj, −A − Aj, A + Aj, −A − Aj, A − Aj, −A + Aj, A + Aj, −A − Aj, −A + Aj, −A − Aj, −A − Aj, −A + Aj, −A + Aj, A − Aj, A + Aj, A + Aj, −A − Aj, −A + Aj, A + Aj, −A − Aj, −A − Aj, −A − Aj, −A − Aj, A − Aj, −A − Aj, −A + Aj, A − Aj, A + Aj, A − Aj, A − Aj, −A + Aj, −A + Aj, A + Aj, −A − Aj, A + Aj, A − Aj, −A + Aj, A − Aj, −A − Aj, A + Aj, A + Aj, −A − Aj, −A − Aj, A + Aj |
| 3 | Polarization 1 | −A − Aj, −A − Aj, −A + Aj, −A − Aj, −A − Aj, A − Aj, −A − Aj, A − Aj, A + Aj, −A − Aj, −A + Aj, A − Aj, A + Aj, −A + Aj, −A − Aj, A + Aj, −A + Aj, A − Aj, −A + Aj, A − Aj, A + Aj, A + Aj, −A − Aj, −A − Aj, A + Aj, A − Aj, A + Aj, A + Aj, A − Aj, −A − Aj, −A − Aj, −A − Aj, A + Aj, −A + Aj, A + Aj, −A + Aj, A + Aj, −A − Aj, A + Aj, −A + Aj, −A − Aj, −A + Aj, −A + Aj, −A + Aj, A + Aj, A − Aj, −A + Aj, A − Aj, −A + Aj, A + Aj, A + Aj, A − Aj, A + Aj, −A − Aj, A − Aj, A − Aj, −A + Aj, −A − Aj, −A − Aj, −A − Aj, −A − Aj, −A + Aj, −A + Aj, −A − Aj, A + Aj, A + Aj, A − Aj, A − Aj, −A − Aj, A + Aj, −A + Aj, −A + Aj, −A + Aj, −A − Aj, A − Aj, A + Aj, A + Aj, −A + Aj, −A − Aj, A − Aj, −A + Aj, A + Aj, A − Aj, A − Aj, A − Aj, A + Aj, A − Aj, A + Aj, −A + Aj, A − Aj, A + Aj, A − Aj, −A − Aj, −A + Aj, −A − Aj, A − Aj |
| | Polarization 2 | −A + Aj, −A + Aj, −A − Aj, −A + Aj, −A + Aj, A + Aj, −A + Aj, A + Aj, A − Aj, −A + Aj, −A − Aj, A + Aj, A − Aj, −A − Aj, −A + Aj, A − Aj, −A − Aj, A + Aj, −A − Aj, A + Aj, A − Aj, A − Aj, −A + Aj, −A + Aj, A − Aj, A + Aj, A − Aj, A − Aj, A + Aj, −A + Aj, −A + Aj, −A + Aj, A − Aj, −A − Aj, A − Aj, −A − Aj, A − Aj, −A + Aj, A − Aj, −A − Aj, −A + Aj, −A − Aj, −A − Aj, −A − Aj, A − Aj, A + Aj, −A − Aj, A + Aj, −A − Aj, A − Aj, A − Aj, A + Aj, A − Aj, −A + Aj, A + Aj, A + Aj, −A − Aj, −A + Aj, −A + Aj, −A + Aj, −A + Aj, −A − Aj, −A − Aj, −A + Aj, A − Aj, A − Aj, A + Aj, A + Aj, −A + Aj, A − Aj, −A − Aj, −A − Aj, −A − Aj, −A + Aj, A + Aj, A − Aj, A − Aj, −A − Aj, −A + Aj, A + Aj, −A − Aj, A − Aj, A + Aj, A + Aj, A + Aj, A − Aj, A + Aj, A − Aj, −A − Aj, A + Aj, A − Aj, A + Aj, −A + Aj, −A − Aj, −A + Aj, A + Aj |
| 4 | Polarization 1 | −A − Aj, −A − Aj, −A + Aj, −A − Aj, −A − Aj, A − Aj, −A − Aj, A − Aj, A + Aj, −A − Aj, −A + Aj, A − Aj, A + Aj, −A + Aj, −A − Aj, A + Aj, −A + Aj, A − Aj, −A + Aj, A − Aj, A + Aj, A + Aj, −A − Aj, −A − Aj, A + Aj, A − Aj, A + Aj, A + Aj, A − Aj, −A − Aj, −A − Aj, −A − Aj, A + Aj, −A + Aj, A + Aj, −A + Aj, A + Aj, −A − Aj, A + Aj, −A + Aj, −A − Aj, −A + Aj, −A + Aj, −A + Aj, A + Aj, A − Aj, −A + Aj, A − Aj, −A + Aj, A + Aj, A + Aj, A − Aj, A + Aj, −A − Aj, A − Aj, A − Aj, −A + Aj, −A − Aj, −A − Aj, −A − Aj, −A − Aj, −A + Aj, −A + Aj, −A − Aj, A + Aj, A + Aj, A − Aj, A − Aj, −A − Aj, A + Aj, −A + Aj, −A + Aj, −A + Aj, −A − Aj, A − Aj, A + Aj, A + Aj, −A + Aj, −A − Aj, A − Aj, −A + Aj, A + Aj, A − Aj, A − Aj, A − Aj, A + Aj, A − Aj, A + Aj, −A + Aj, A − Aj, A + Aj, A − Aj, −A − Aj, −A + Aj, −A − Aj, A − Aj |
| | Polarization 2 | A − Aj, A − Aj, A + Aj, A − Aj, A − Aj, −A − Aj, A − Aj, −A − Aj, −A + Aj, A − Aj, A + Aj, −A − Aj, −A + Aj, A + Aj, A − Aj, −A + Aj, A + Aj, −A − Aj, A + Aj, −A − Aj, −A + Aj, −A + Aj, A − Aj, A − Aj, −A + Aj, −A − Aj, −A + Aj, −A + Aj, −A − Aj, A − Aj, A − Aj, A − Aj, −A + Aj, A + Aj, −A + Aj, A + Aj, −A + Aj, A − Aj, −A + Aj, A + Aj, A − Aj, A + Aj, A + Aj, A + Aj, −A + Aj, −A − Aj, A + Aj, −A − Aj, A + Aj, −A + Aj, −A + Aj, −A − Aj, −A + Aj, A − Aj, −A − Aj, −A − Aj, A + Aj, A − Aj, A − Aj, A − Aj, A − Aj, A + Aj, A + Aj, A − Aj, −A + Aj, −A + Aj, −A − Aj, −A − Aj, A − Aj, −A + Aj, A + Aj, A + Aj, A + Aj, A − Aj, −A − Aj, −A + Aj, −A + Aj, A + Aj, A − Aj, −A − Aj, A + Aj, −A + Aj, −A − Aj, −A − Aj, −A − Aj, −A + Aj, −A − Aj, −A + Aj, A + Aj, −A − Aj, −A + Aj, −A − Aj, A − Aj, A + Aj, A − Aj, −A − Aj |
| 5 | Polarization 1 | A + Aj, A + Aj, A − Aj, A + Aj, A + Aj, −A + Aj, A + Aj, −A + Aj, −A − Aj, A + Aj, A − Aj, −A + Aj, −A − Aj, A − Aj, A + Aj, −A − Aj, A − Aj, −A + Aj, A − Aj, −A + Aj, −A − Aj, −A − Aj, A + Aj, A + Aj, −A − Aj, −A + Aj, −A − Aj, −A − Aj, −A + Aj, A + Aj, A + Aj, A + Aj, −A − Aj, A − Aj, −A − Aj, A − Aj, −A − Aj, A + Aj, −A − Aj, A − Aj, A + Aj, A − Aj, A − Aj, A − Aj, −A − Aj, −A + Aj, A − Aj, −A + Aj, A − Aj, −A − Aj, −A − Aj, −A + Aj, −A − Aj, A + Aj, −A + Aj, −A + Aj, A − Aj, A + Aj, A + Aj, A + Aj, A + Aj, A − Aj, A − Aj, A + Aj, −A − Aj, −A − Aj, −A + Aj, −A + Aj, A + Aj, −A − Aj, A − Aj, A − Aj, A − Aj, A + Aj, −A + Aj, −A − Aj, −A − Aj, A − Aj, A + Aj, −A + Aj, A − Aj, −A − Aj, −A + Aj, −A + Aj, −A + Aj, −A − Aj, −A + Aj, −A − Aj, A − Aj, −A + Aj, −A − Aj, −A + Aj, A + Aj, A − Aj, A + Aj, −A + Aj |
| | Polarization 2 | −A + Aj, −A + Aj, −A − Aj, −A + Aj, −A + Aj, A + Aj, −A + Aj, A + Aj, A − Aj, −A + Aj, −A − Aj, A + Aj, A − Aj, −A − Aj, −A + Aj, A − Aj, −A − Aj, A + Aj, −A − Aj, A + Aj, A − Aj, A − Aj, −A + Aj, −A + Aj, A − Aj, A + Aj, A − Aj, A − Aj, A + Aj, −A + Aj, −A + Aj, −A + Aj, A − Aj, −A − Aj, A − Aj, −A − Aj, A − Aj, −A + Aj, A − Aj, −A − Aj, −A + Aj, −A − Aj, −A − Aj, −A − Aj, A − Aj, A + Aj, −A − Aj, |

TABLE 29-2-continued

| Index | Polarization | Pilot sequence |
|---|---|---|
| | | A + Aj, −A − Aj, A − Aj, A − Aj, A + Aj, A − Aj, −A + Aj, A + Aj, A + Aj, −A − Aj, −A + Aj, −A + Aj, −A + Aj, −A + Aj, −A − Aj, −A − Aj, −A + Aj, A − Aj, A − Aj, A + Aj, A + Aj, −A + Aj, A − Aj, −A − Aj, −A − Aj, −A − Aj, −A + Aj, A + Aj, A − Aj, A − Aj, −A − Aj, −A + Aj, A + Aj, −A − Aj, A − Aj, A + Aj, A + Aj, A + Aj, A − Aj, A + Aj, A − Aj, −A − Aj, A + Aj, A − Aj, A + Aj, −A + Aj, −A − Aj, −A + Aj, A + Aj |
| 6 | Polarization 1 | A + Aj, A + Aj, A − Aj, A + Aj, A + Aj, −A + Aj, A + Aj, −A + Aj, −A − Aj, A + Aj, A − Aj, −A + Aj, −A − Aj, A − Aj, A + Aj, −A − Aj, A − Aj, −A + Aj, A − Aj, −A + Aj, −A − Aj, −A − Aj, A + Aj, A + Aj, −A − Aj, −A + Aj, −A − Aj, −A − Aj, −A + Aj, A + Aj, A + Aj, A + Aj, −A − Aj, A − Aj, −A − Aj, A − Aj, −A − Aj, A + Aj, −A − Aj, A − Aj, A + Aj, A − Aj, A − Aj, A − Aj, −A − Aj, −A + Aj, A − Aj, −A + Aj, A − Aj, −A − Aj, −A − Aj, −A + Aj, −A − Aj, A + Aj, −A + Aj, −A + Aj, A − Aj, A + Aj, A + Aj, A + Aj, A + Aj, A − Aj, A − Aj, A + Aj, −A − Aj, −A − Aj, −A + Aj, −A + Aj, A + Aj, −A − Aj, A − Aj, A − Aj, A − Aj, A + Aj, −A + Aj, −A − Aj, −A − Aj, A − Aj, A + Aj, −A + Aj, A − Aj, −A − Aj, −A + Aj, −A + Aj, −A + Aj, −A − Aj, −A + Aj, −A − Aj, A − Aj, −A + Aj, −A − Aj, −A + Aj, A + Aj, A − Aj, A + Aj, −A + Aj |
| | Polarization 2 | A − Aj, A − Aj, A + Aj, A − Aj, A − Aj, −A − Aj, A − Aj, −A − Aj, −A + Aj, A − Aj, A + Aj, −A − Aj, −A + Aj, A + Aj, A − Aj, −A + Aj, A + Aj, −A − Aj, A + Aj, −A − Aj, −A + Aj, −A + Aj, A − Aj, A − Aj, −A + Aj, −A − Aj, −A + Aj, −A + Aj, −A − Aj, A − Aj, A − Aj, A − Aj, −A + Aj, A + Aj, −A + Aj, A + Aj, −A + Aj, A − Aj, −A + Aj, A + Aj, A − Aj, A + Aj, A + Aj, A + Aj, −A + Aj, −A − Aj, A + Aj, −A − Aj, A + Aj, −A + Aj, −A + Aj, −A − Aj, −A + Aj, A − Aj, −A − Aj, −A − Aj, A + Aj, A − Aj, A − Aj, A − Aj, A − Aj, A + Aj, A + Aj, A − Aj, −A + Aj, −A + Aj, −A − Aj, −A − Aj, A − Aj, −A + Aj, A + Aj, A + Aj, A + Aj, A − Aj, −A − Aj, −A + Aj, −A + Aj, A + Aj, A − Aj, −A − Aj, A + Aj, −A + Aj, −A − Aj, −A − Aj, −A − Aj, −A + Aj, −A − Aj, −A + Aj, A + Aj, −A − Aj, −A + Aj, −A − Aj, A − Aj, A + Aj, A − Aj, −A − Aj |
| 7 | Polarization 1 | −A + Aj, −A − Aj, A − Aj, −A − Aj, −A + Aj, A + Aj, −A + Aj, A − Aj, A + Aj, −A + Aj, A + Aj, −A + Aj, −A + Aj, −A + Aj, A + Aj, A − Aj, −A + Aj, −A − Aj, A − Aj, A + Aj, A + Aj, −A + Aj, −A − Aj, A − Aj, A − Aj, A − Aj, A + Aj, −A − Aj, −A + Aj, −A + Aj, A + Aj, A + Aj, −A − Aj, A − Aj, A − Aj, −A − Aj, −A − Aj, −A − Aj, −A − Aj, A − Aj, −A + Aj, −A + Aj, −A − Aj, A + Aj, −A + Aj, A + Aj, A + Aj, A − Aj, −A + Aj, A − Aj, −A + Aj, A + Aj, A − Aj, A − Aj, A − Aj, −A − Aj, A − Aj, A + Aj, −A − Aj, A + Aj, A − Aj, A + Aj, A − Aj, A + Aj, −A − Aj, −A − Aj, −A − Aj, −A + Aj, A + Aj, A + Aj, −A + Aj, A + Aj, −A − Aj, −A − Aj, A + Aj, A + Aj, −A + Aj, A − Aj, −A + Aj, A − Aj, A + Aj, −A − Aj, A − Aj, A + Aj, −A + Aj, A − Aj, −A − Aj, A + Aj, −A + Aj, −A − Aj, −A + Aj, −A − Aj, −A − Aj, A − Aj, −A − Aj, −A − Aj |
| | Polarization 2 | −A − Aj, −A + Aj, A + Aj, −A + Aj, −A − Aj, A − Aj, −A − Aj, A + Aj, A − Aj, −A − Aj, A − Aj, −A − Aj, −A − Aj, −A − Aj, A − Aj, A + Aj, −A − Aj, −A + Aj, A + Aj, A − Aj, A − Aj, −A − Aj, −A + Aj, A + Aj, A + Aj, A + Aj, A − Aj, −A + Aj, −A − Aj, −A − Aj, A − Aj, A − Aj, −A + Aj, A + Aj, A + Aj, −A + Aj, −A + Aj, −A + Aj, −A + Aj, A + Aj, −A − Aj, −A − Aj, −A + Aj, A − Aj, −A − Aj, A − Aj, A − Aj, A + Aj, −A − Aj, A + Aj, −A − Aj, A − Aj, A + Aj, A + Aj, A + Aj, −A + Aj, A + Aj, A − Aj, −A + Aj, A − Aj, A + Aj, A − Aj, A + Aj, A − Aj, −A + Aj, −A + Aj, −A + Aj, −A − Aj, A − Aj, A − Aj, −A − Aj, A − Aj, −A + Aj, −A + Aj, A − Aj, A − Aj, −A − Aj, A + Aj, −A − Aj, A + Aj, A − Aj, −A + Aj, A + Aj, A − Aj, −A − Aj, A + Aj, −A + Aj, A − Aj, −A − Aj, −A + Aj, −A − Aj, −A + Aj, −A + Aj, A + Aj, −A + Aj, −A + Aj |
| 8 | Polarization 1 | −A + Aj, −A − Aj, A − Aj, −A − Aj, −A + Aj, A + Aj, −A + Aj, A − Aj, A + Aj, −A + Aj, A + Aj, −A + Aj, −A + Aj, −A + Aj, A + Aj, A − Aj, −A + Aj, −A − Aj, A − Aj, A + Aj, A + Aj, −A + Aj, −A − Aj, A − Aj, A − Aj, A − Aj, A + Aj, −A − Aj, −A + Aj, −A + Aj, A + Aj, A + Aj, −A − Aj, A − Aj, A − Aj, −A − Aj, −A − Aj, −A − Aj, −A − Aj, A − Aj, −A + Aj, −A + Aj, −A − Aj, A + Aj, −A + Aj, A + Aj, A + Aj, A − Aj, −A + Aj, A − Aj, −A + Aj, A + Aj, A − Aj, A − Aj, A − Aj, −A − Aj, A − Aj, A + Aj, −A − Aj, A + Aj, A − Aj, A + Aj, A − Aj, A + Aj, −A − Aj, −A − Aj, −A − Aj, −A + Aj, A + Aj, A + Aj, −A + Aj, A + Aj, −A − Aj, −A − Aj, A + Aj, A + Aj, −A + Aj, A − Aj, −A + Aj, A − Aj, A + Aj, −A − Aj, A − Aj, A + Aj, −A + Aj, A − Aj, −A − Aj, A + Aj, −A + Aj, −A − Aj, −A + Aj, −A − Aj, −A − Aj, A − Aj, −A − Aj, −A − Aj |
| | Polarization 2 | A + Aj, A − Aj, −A − Aj, A − Aj, A + Aj, −A + Aj, A + Aj, −A − Aj, −A + Aj, A + Aj, −A + Aj, A + Aj, A + Aj, A + Aj, −A + Aj, −A − Aj, A + Aj, A − Aj, −A − Aj, −A + Aj, −A + Aj, A + Aj, A − Aj, −A − Aj, −A − Aj, −A − Aj, −A + Aj, A − Aj, A + Aj, A + Aj, −A + Aj, −A + Aj, A − Aj, −A − Aj, −A − Aj, A − Aj, A − Aj, A − Aj, A − Aj, −A − Aj, A + Aj, A + Aj, A − Aj, −A + Aj, A + Aj, −A + Aj, −A + Aj, −A − Aj, A + Aj, −A − Aj, A + Aj, −A + Aj, −A − Aj, −A − Aj, −A − Aj, A − Aj, −A − Aj, −A + Aj, A − Aj, −A + Aj, −A − Aj, −A + Aj, −A − Aj, −A + Aj, A − Aj, A − Aj, A − Aj, A + Aj, −A + Aj, −A + Aj, A + Aj, −A + Aj, A − Aj, A − Aj, −A + Aj, −A + Aj, A + Aj, −A − Aj, A + Aj, −A − Aj, −A + Aj, A − Aj, −A − Aj, −A + Aj, A + Aj, −A − Aj, A − Aj, −A + Aj, A + Aj, A − Aj, A + Aj, A − Aj, A − Aj, −A − Aj, A − Aj, A − Aj |
| 9 | Polarization 1 | A − Aj, A + Aj, −A + Aj, A + Aj, A − Aj, −A − Aj, A − Aj, −A + Aj, −A − Aj, A − Aj, −A − Aj, A − Aj, A − Aj, A − Aj, −A − Aj, −A + Aj, A − Aj, A + Aj, −A + Aj, −A − Aj, −A − Aj, A − Aj, A + Aj, −A + Aj, −A + Aj, −A + Aj, −A − Aj, A + Aj, A − Aj, A − Aj, −A − Aj, −A − Aj, A + Aj, −A + Aj, −A + Aj, A + Aj, A + Aj, A + Aj, A + Aj, −A + Aj, A − Aj, A − Aj, A + Aj, −A − Aj, A − Aj, −A − Aj, −A − Aj, −A + Aj, A − Aj, −A + Aj, A − Aj, −A − Aj, −A + Aj, −A + Aj, −A + Aj, A + Aj, −A + Aj, −A − Aj, A + Aj, −A − Aj, −A + Aj, −A − Aj, −A + Aj, −A − Aj, A + Aj, A + Aj, A + Aj, A − Aj, −A − Aj, −A − Aj, A − Aj, −A − Aj, A + Aj, A + Aj, −A − Aj, −A − Aj, A − Aj, −A + Aj, A − Aj, −A + Aj, −A − Aj, A + Aj, −A + Aj, −A − Aj, A − Aj, −A + Aj, A + Aj, −A − Aj, A − Aj, A + Aj, A − Aj, A + Aj, A + Aj, −A + Aj, A + Aj, A + Aj |
| | Polarization 2 | −A − Aj, −A + Aj, A + Aj, −A + Aj, −A + Aj, A − Aj, A − Aj, −A + Aj, A + Aj, A − Aj, −A + Aj, A + Aj, A + Aj, −A − Aj, −A + Aj, A + Aj, A + Aj, A − Aj, A − Aj, A + Aj, A − Aj, −A + Aj, −A − Aj, −A + Aj, A − Aj, −A − Aj, A + Aj, A − Aj, −A + Aj, A − Aj, A − Aj, A − Aj, −A + Aj, −A − Aj, −A − Aj, A + Aj, A − Aj, A + Aj, −A + Aj, A − Aj, A + Aj, A − Aj, A − Aj, A − Aj, A + Aj, A + Aj, −A − Aj, A − Aj, −A + Aj, −A + Aj, A + Aj, A − Aj, A − Aj, −A + Aj, −A + Aj, −A + Aj, −A + Aj, A − Aj, −A − Aj, A − Aj, A + Aj, A + Aj, A − Aj, −A + Aj, −A + Aj, −A − Aj, −A − Aj, −A − Aj, −A − Aj, −A + Aj, −A − Aj, A − Aj, A − Aj, −A + Aj, A − Aj, A + Aj, A + Aj, A + Aj, −A − Aj, A + Aj, −A − Aj, A + Aj, A + Aj, −A + Aj, −A + Aj, −A − Aj, −A + Aj, −A + Aj, A − Aj, −A + Aj, A + Aj, −A + Aj, A + Aj, −A + Aj, A − Aj, −A − Aj |
| 10 | Polarization 1 | A − Aj, A + Aj, −A + Aj, A + Aj, A − Aj, −A − Aj, A − Aj, −A + Aj, −A − Aj, A − Aj, −A − Aj, A − Aj, A − Aj, A − Aj, −A − Aj, −A + Aj, A − Aj, A + Aj, −A + Aj, −A − Aj, −A − Aj, A − Aj, A + Aj, −A + Aj, −A + Aj, −A + Aj, −A − Aj, A + Aj, A − Aj, A − Aj, −A − Aj, −A − Aj, A + Aj, −A + Aj, −A + Aj, A + Aj, A + Aj, A + Aj, A + Aj, −A + Aj, A − Aj, A − Aj, A + Aj, −A − Aj, A − Aj, −A − Aj, −A − Aj, −A + Aj, A − Aj, −A + Aj, A − Aj, −A − Aj, −A + Aj, −A + Aj, −A + Aj, A + Aj, −A + Aj, −A − Aj, A + Aj, −A − Aj, −A + Aj, −A − Aj, −A + Aj, −A − Aj, A + Aj, A + Aj, A + Aj, A − Aj, −A − Aj, −A − Aj, A − Aj, −A − Aj, A + Aj, A + Aj, −A − Aj, −A − Aj, A − Aj, −A + Aj, A − Aj, −A + Aj, −A − Aj, A + Aj, −A + Aj, −A − Aj, A − Aj, −A + Aj, A + Aj, −A − Aj, A − Aj, A + Aj, A − Aj, A + Aj, A + Aj, −A + Aj, A + Aj, A + Aj |

TABLE 29-2-continued

| Index | Polarization | Pilot sequence |
| --- | --- | --- |
| | Polarization 2 | A + Aj, A – Aj, –A – Aj, A – Aj, A + Aj, –A + Aj, A + Aj, –A – Aj, –A + Aj, A + Aj, –A + Aj, A + Aj, A + Aj, A + Aj, –A + Aj, –A – Aj, A + Aj, A – Aj, –A – Aj, –A + Aj, –A + Aj, A + Aj, A – Aj, –A – Aj, –A – Aj, –A – Aj, –A + Aj, A – Aj, A + Aj, A + Aj, –A + Aj, –A + Aj, A – Aj, –A – Aj, –A – Aj, A – Aj, A – Aj, A – Aj, A – Aj, –A – Aj, A + Aj, A + Aj, A – Aj, –A + Aj, A + Aj, –A + Aj, –A + Aj, –A – Aj, A + Aj, –A – Aj, A + Aj, –A + Aj, –A – Aj, –A – Aj, –A – Aj, A – Aj, –A – Aj, –A + Aj, A – Aj, –A + Aj, –A – Aj, –A + Aj, –A – Aj, –A + Aj, A – Aj, A – Aj, A – Aj, A + Aj, –A + Aj, –A + Aj, A + Aj, –A + Aj, A – Aj, A – Aj, –A + Aj, –A + Aj, A + Aj, –A – Aj, A + Aj, –A – Aj, –A + Aj, A – Aj, –A – Aj, –A + Aj, A + Aj, –A – Aj, A – Aj, –A + Aj, A + Aj, A – Aj, A + Aj, A – Aj, A – Aj, –A – Aj, A – Aj, A – Aj |

TABLE 29-3

| Index | Pilot sequence |
| --- | --- |
| 1 | –A – Aj, –A + Aj, A – Aj, A + Aj, –A – Aj, A + Aj, –A + Aj, A + Aj, –A + Aj, –A – Aj, –A + Aj, A + Aj, –A + Aj, A + Aj, –A – Aj, –A – Aj, A + Aj, –A + Aj, –A – Aj, –A – Aj, A + Aj, A + Aj, –A + Aj, –A + Aj, A + Aj, –A – Aj, A – Aj, A – Aj, –A – Aj, –A – Aj, A + Aj, –A – Aj, –A – Aj, A – Aj, –A + Aj, A – Aj, A – Aj, A – Aj, –A – Aj, A – Aj, A – Aj, –A + Aj, –A – Aj, –A + Aj, A – Aj, –A + Aj, –A + Aj, A – Aj, –A + Aj, –A – Aj, A – Aj, A + Aj, A – Aj, A + Aj, –A – Aj, –A + Aj, –A – Aj, A – Aj, –A + Aj, A + Aj, A – Aj, –A – Aj, A – Aj, A + Aj, –A + Aj, A – Aj, A + Aj, A + Aj, A – Aj, A – Aj, –A + Aj, A + Aj, –A – Aj, –A + Aj, A + Aj, A + Aj, A – Aj, –A + Aj, –A – Aj, –A – Aj, A – Aj, A + Aj, A + Aj, A + Aj, A – Aj, A + Aj, –A + Aj, –A + Aj, A – Aj, –A – Aj, –A – Aj, –A – Aj, –A + Aj, A + Aj, –A – Aj, A + Aj |
| 2 | –A – Aj, A + Aj, –A – Aj, –A + Aj, A – Aj, A + Aj, –A – Aj, A + Aj, –A + Aj, A + Aj, –A + Aj, –A – Aj, –A + Aj, A + Aj, –A + Aj, A + Aj, –A – Aj, –A – Aj, A + Aj, –A + Aj, –A – Aj, –A – Aj, A + Aj, A + Aj, –A + Aj, –A + Aj, A + Aj, –A – Aj, A – Aj, A – Aj, –A – Aj, –A – Aj, A + Aj, –A – Aj, –A – Aj, A – Aj, –A + Aj, A – Aj, A – Aj, A – Aj, –A – Aj, A – Aj, A – Aj, –A + Aj, –A – Aj, –A + Aj, A – Aj, –A + Aj, –A + Aj, A – Aj, –A + Aj, –A – Aj, A – Aj, A + Aj, A – Aj, A + Aj, –A – Aj, –A + Aj, –A – Aj, A – Aj, –A + Aj, A + Aj, A – Aj, –A – Aj, A – Aj, A + Aj, –A + Aj, A – Aj, A + Aj, A + Aj, A – Aj, A – Aj, –A + Aj, A + Aj, –A – Aj, –A + Aj, A + Aj, A + Aj, A – Aj, –A + Aj, –A – Aj, –A – Aj, A – Aj, A + Aj, A + Aj, A + Aj, A – Aj, A + Aj, –A + Aj, –A + Aj, A – Aj, –A – Aj, –A – Aj, –A – Aj, –A + Aj, A + Aj |
| 3 | –A – Aj, A + Aj, A – Aj, –A + Aj, –A – Aj, A + Aj, –A – Aj, A – Aj, –A – Aj, A – Aj, A + Aj, A – Aj, –A – Aj, A – Aj, –A – Aj, A + Aj, A + Aj, –A – Aj, A – Aj, A + Aj, A + Aj, –A – Aj, –A – Aj, A – Aj, A – Aj, –A – Aj, A + Aj, –A + Aj, –A + Aj, A + Aj, A + Aj, –A – Aj, A + Aj, A + Aj, –A + Aj, A – Aj, –A + Aj, –A + Aj, –A + Aj, A + Aj, –A + Aj, –A + Aj, A – Aj, A + Aj, A – Aj, –A + Aj, A – Aj, A – Aj, –A + Aj, A – Aj, A + Aj, –A + Aj, –A – Aj, –A + Aj, –A – Aj, A + Aj, A – Aj, A + Aj, –A + Aj, A – Aj, –A – Aj, –A + Aj, A + Aj, –A + Aj, –A – Aj, A – Aj, –A + Aj, –A – Aj, –A – Aj, –A + Aj, –A + Aj, A – Aj, –A – Aj, A + Aj, A – Aj, –A – Aj, –A – Aj, –A + Aj, A – Aj, A + Aj, A + Aj, –A + Aj, –A – Aj, –A – Aj, –A – Aj, –A + Aj, –A – Aj, A – Aj, A – Aj, –A + Aj, A + Aj, A + Aj, A + Aj, A – Aj, –A – Aj, A + Aj |
| 4 | A + Aj, –A – Aj, –A + Aj, A – Aj, A + Aj, –A – Aj, A + Aj, –A + Aj, A + Aj, –A + Aj, –A – Aj, –A + Aj, A + Aj, –A + Aj, A + Aj, –A – Aj, –A – Aj, A + Aj, –A + Aj, –A – Aj, –A – Aj, A + Aj, A + Aj, –A + Aj, –A + Aj, A + Aj, –A – Aj, A – Aj, A – Aj, –A – Aj, –A – Aj, A + Aj, –A – Aj, –A – Aj, A – Aj, –A + Aj, A – Aj, A – Aj, A – Aj, –A – Aj, A – Aj, A – Aj, –A + Aj, –A – Aj, –A + Aj, A – Aj, –A + Aj, –A + Aj, A – Aj, –A + Aj, –A – Aj, A – Aj, A + Aj, A – Aj, A + Aj, –A – Aj, –A + Aj, –A – Aj, A – Aj, –A + Aj, A + Aj, A – Aj, –A – Aj, A – Aj, A + Aj, –A + Aj, A – Aj, A + Aj, A + Aj, A – Aj, A – Aj, –A + Aj, A + Aj, –A – Aj, –A + Aj, A + Aj, A + Aj, A – Aj, –A + Aj, –A – Aj, –A – Aj, A – Aj, A + Aj, A + Aj, A + Aj, A – Aj, A + Aj, –A + Aj, –A + Aj, A – Aj, –A – Aj, –A – Aj, –A – Aj, –A + Aj, A + Aj, –A – Aj |
| 5 | A + Aj, –A – Aj, A + Aj, A – Aj, –A + Aj, –A – Aj, A + Aj, –A – Aj, A – Aj, –A – Aj, A – Aj, A + Aj, A – Aj, –A – Aj, A – Aj, –A – Aj, A + Aj, A + Aj, –A – Aj, A – Aj, A + Aj, A + Aj, –A – Aj, –A – Aj, A – Aj, A – Aj, –A – Aj, A + Aj, –A + Aj, –A + Aj, A + Aj, A + Aj, –A – Aj, A + Aj, A + Aj, –A + Aj, A – Aj, –A + Aj, –A + Aj, –A + Aj, A + Aj, –A + Aj, –A + Aj, A – Aj, A + Aj, A – Aj, –A + Aj, A – Aj, A – Aj, –A + Aj, A – Aj, A + Aj, –A + Aj, –A – Aj, –A + Aj, –A – Aj, A + Aj, A – Aj, A + Aj, –A + Aj, A – Aj, –A – Aj, –A + Aj, A + Aj, –A + Aj, –A – Aj, A – Aj, –A + Aj, –A – Aj, –A – Aj, –A + Aj, –A + Aj, A – Aj, –A – Aj, A + Aj, A – Aj, –A – Aj, –A – Aj, –A + Aj, A – Aj, A + Aj, A + Aj, –A + Aj, –A – Aj, –A – Aj, –A – Aj, –A + Aj, –A – Aj, A – Aj, A – Aj, –A + Aj, A + Aj, A + Aj, A + Aj, A – Aj, –A – Aj |
| 6 | A + Aj, A – Aj, –A + Aj, –A – Aj, A + Aj, –A – Aj, A – Aj, –A – Aj, A – Aj, A + Aj, A – Aj, –A – Aj, A – Aj, –A – Aj, A + Aj, A + Aj, –A – Aj, A – Aj, A + Aj, A + Aj, –A – Aj, –A – Aj, A – Aj, A – Aj, –A – Aj, A + Aj, –A + Aj, –A + Aj, A + Aj, A + Aj, –A – Aj, A + Aj, A + Aj, –A + Aj, A – Aj, –A + Aj, –A + Aj, –A + Aj, A + Aj, –A + Aj, –A + Aj, A – Aj, A + Aj, A – Aj, –A + Aj, A – Aj, A – Aj, –A + Aj, A – Aj, A + Aj, –A + Aj, –A – Aj, –A + Aj, –A – Aj, A + Aj, A – Aj, A + Aj, –A + Aj, A – Aj, –A – Aj, –A + Aj, A + Aj, –A + Aj, –A – Aj, A – Aj, –A + Aj, –A – Aj, –A – Aj, –A + Aj, –A + Aj, A – Aj, –A – Aj, A + Aj, A – Aj, –A – Aj, –A – Aj, –A + Aj, A – Aj, A + Aj, A + Aj, –A + Aj, –A – Aj, –A – Aj, –A – Aj, –A + Aj, –A – Aj, A – Aj, A – Aj, –A + Aj, A + Aj, A + Aj, A + Aj, A – Aj, –A – Aj, A + Aj, –A – Aj |

TABLE 29-4

| Index | Pilot sequence |
| --- | --- |
| 1 | –A + Aj, –A – Aj, A + Aj, A – Aj, –A + Aj, A – Aj, –A – Aj, A – Aj, –A – Aj, –A + Aj, –A – Aj, A – Aj, –A – Aj, A – Aj, –A + Aj, –A + Aj, A – Aj, –A – Aj, –A + Aj, –A + Aj, A – Aj, A – Aj, –A – Aj, –A – Aj, A – Aj, –A + Aj, A + Aj, A + Aj, –A + Aj, –A + Aj, A – Aj, –A + Aj, –A + Aj, A + Aj, –A – Aj, A + Aj, A + Aj, A + Aj, –A + Aj, A + Aj, A + Aj, –A – Aj, –A + Aj, –A – Aj, A + Aj, –A – Aj, –A – Aj, A + Aj, –A – Aj, –A + Aj, A + Aj, A – Aj, A + Aj, A – Aj, –A + Aj, –A – Aj, –A + Aj, A + Aj, –A – Aj, A – Aj, A + Aj, –A + Aj, A + Aj, A – Aj, –A – Aj, A + Aj, A – Aj, A – Aj, A + Aj, A + Aj, –A – Aj, A – Aj, –A + Aj, –A – Aj, A – Aj, A – Aj, A + Aj, –A – Aj, –A + Aj, –A + Aj, A + Aj, A – Aj, A – Aj, A – Aj, A + Aj, A – Aj, –A – Aj, –A – Aj, A + Aj, –A + Aj, –A + Aj, –A + Aj, –A – Aj, A – Aj, –A + Aj, A – Aj |
| 2 | –A + Aj, A – Aj, –A + Aj, –A – Aj, A + Aj, A – Aj, –A + Aj, A – Aj, –A – Aj, A – Aj, –A – Aj, –A + Aj, –A – Aj, A – Aj, –A – Aj, A – Aj, –A + Aj, –A + Aj, A – Aj, –A – Aj, –A + Aj, –A + Aj, A – Aj, A – Aj, –A – Aj, –A – Aj, A – Aj, –A + Aj, |

TABLE 29-4-continued

| Index | Pilot sequence |
|---|---|
| | A + Aj, A + Aj, −A + Aj, −A + Aj, A − Aj, −A + Aj, −A + Aj, A + Aj, −A − Aj, A + Aj, A + Aj, A + Aj, −A + Aj, A + Aj, A + Aj, −A − Aj, −A + Aj, −A − Aj, A + Aj, −A − Aj, −A − Aj, A + Aj, −A − Aj, −A + Aj, A + Aj, A − Aj, A + Aj, A − Aj, −A + Aj, −A − Aj, −A + Aj, A + Aj, −A − Aj, A − Aj, A + Aj, −A + Aj, A + Aj, A − Aj, −A − Aj, A + Aj, A − Aj, A − Aj, A + Aj, A + Aj, −A − Aj, A − Aj, −A + Aj, −A − Aj, A − Aj, A − Aj, A + Aj, −A − Aj, −A + Aj, −A + Aj, A + Aj, A − Aj, A − Aj, A − Aj, A + Aj, A − Aj, −A − Aj, −A − Aj, A + Aj, −A + Aj, −A + Aj, −A + Aj, −A − Aj, A − Aj |
| 3 | −A + Aj, A − Aj, A + Aj, −A − Aj, −A + Aj, A − Aj, −A + Aj, A + Aj, −A + Aj, A + Aj, A − Aj, A + Aj, −A + Aj, A + Aj, −A + Aj, A − Aj, A − Aj, −A + Aj, A + Aj, A − Aj, A − Aj, −A + Aj, −A + Aj, A + Aj, A + Aj, −A + Aj, A − Aj, −A − Aj, −A − Aj, A − Aj, A − Aj, −A + Aj, A − Aj, A − Aj, −A − Aj, A + Aj, −A − Aj, −A − Aj, −A − Aj, A − Aj, −A − Aj, −A − Aj, A + Aj, A − Aj, A + Aj, −A − Aj, A + Aj, A + Aj, −A − Aj, A + Aj, A − Aj, −A − Aj, −A + Aj, −A − Aj, −A + Aj, A − Aj, A + Aj, A − Aj, −A − Aj, A + Aj, −A + Aj, −A − Aj, A − Aj, −A − Aj, −A + Aj, A + Aj, −A − Aj, −A + Aj, −A + Aj, −A − Aj, −A − Aj, A + Aj, −A + Aj, A − Aj, A + Aj, −A + Aj, −A + Aj, −A − Aj, A + Aj, A − Aj, A − Aj, −A − Aj, −A + Aj, −A + Aj, −A + Aj, −A − Aj, −A + Aj, A + Aj, A + Aj, −A − Aj, A − Aj, A − Aj, A − Aj, A + Aj, −A + Aj, A − Aj |
| 4 | A − Aj, −A + Aj, −A − Aj, A + Aj, A − Aj, −A + Aj, A − Aj, −A − Aj, A − Aj, −A − Aj, −A + Aj, −A − Aj, A − Aj, −A − Aj, A − Aj, −A + Aj, −A + Aj, A − Aj, −A − Aj, −A + Aj, −A + Aj, A − Aj, A − Aj, −A − Aj, −A − Aj, A − Aj, −A + Aj, A + Aj, A + Aj, −A + Aj, −A + Aj, A − Aj, −A + Aj, −A + Aj, A + Aj, −A − Aj, A + Aj, A + Aj, A + Aj, −A + Aj, A + Aj, A + Aj, −A − Aj, −A + Aj, −A − Aj, A + Aj, −A − Aj, −A − Aj, A + Aj, −A − Aj, −A + Aj, A + Aj, A − Aj, A + Aj, A − Aj, −A + Aj, −A − Aj, −A + Aj, A + Aj, −A − Aj, A − Aj, A + Aj, −A + Aj, A + Aj, A − Aj, −A − Aj, A + Aj, A − Aj, A − Aj, A + Aj, A + Aj, −A − Aj, A − Aj, −A + Aj, −A − Aj, A − Aj, A − Aj, A + Aj, −A − Aj, −A + Aj, −A + Aj, A + Aj, A − Aj, A − Aj, A − Aj, A + Aj, A − Aj, −A − Aj, −A − Aj, A + Aj, −A + Aj, −A + Aj, −A + Aj, −A − Aj, A − Aj, −A + Aj |
| 5 | A − Aj, −A + Aj, A − Aj, A + Aj, −A − Aj, −A + Aj, A − Aj, −A + Aj, A + Aj, −A + Aj, A + Aj, A − Aj, A + Aj, −A + Aj, A + Aj, −A + Aj, A − Aj, A − Aj, −A + Aj, A + Aj, A − Aj, A − Aj, −A + Aj, −A + Aj, A + Aj, A + Aj, −A + Aj, A − Aj, −A − Aj, −A − Aj, A − Aj, A − Aj, −A + Aj, A − Aj, A − Aj, −A − Aj, A + Aj, −A − Aj, −A − Aj, −A − Aj, A − Aj, −A − Aj, −A − Aj, A + Aj, A − Aj, A + Aj, −A − Aj, A + Aj, A + Aj, −A − Aj, A + Aj, A − Aj, −A − Aj, −A + Aj, −A − Aj, −A + Aj, A − Aj, A + Aj, A − Aj, −A − Aj, A + Aj, −A + Aj, −A − Aj, A − Aj, −A − Aj, −A + Aj, A + Aj, −A − Aj, −A + Aj, −A + Aj, −A − Aj, −A − Aj, A + Aj, −A + Aj, A − Aj, A + Aj, −A + Aj, −A + Aj, −A − Aj, A + Aj, A − Aj, A − Aj, −A − Aj, −A + Aj, −A + Aj, −A + Aj, −A − Aj, −A + Aj, A + Aj, A + Aj, −A − Aj, A − Aj, A − Aj, A − Aj, A + Aj, −A + Aj |
| 6 | A − Aj, A + Aj, −A − Aj, −A + Aj, A − Aj, −A + Aj, A + Aj, −A + Aj, A + Aj, A − Aj, A + Aj, −A + Aj, A + Aj, −A + Aj, A − Aj, A − Aj, −A + Aj, A + Aj, A − Aj, A − Aj, −A + Aj, −A + Aj, A + Aj, A + Aj, −A + Aj, A − Aj, −A − Aj, −A − Aj, A − Aj, A − Aj, −A + Aj, A − Aj, A − Aj, −A − Aj, A + Aj, −A − Aj, −A − Aj, −A − Aj, A − Aj, −A − Aj, −A − Aj, A + Aj, A − Aj, A + Aj, −A − Aj, A + Aj, A + Aj, −A − Aj, A + Aj, A − Aj, −A − Aj, −A + Aj, −A − Aj, −A + Aj, A − Aj, A + Aj, A − Aj, −A − Aj, A + Aj, −A + Aj, −A − Aj, A − Aj, −A − Aj, −A + Aj, A + Aj, −A − Aj, −A + Aj, −A + Aj, −A − Aj, −A − Aj, A + Aj, −A + Aj, A − Aj, A + Aj, −A + Aj, −A + Aj, −A − Aj, A + Aj, A − Aj, A − Aj, −A − Aj, −A + Aj, −A + Aj, −A + Aj, −A − Aj, −A + Aj, A + Aj, A + Aj, −A − Aj, A − Aj, A − Aj, A − Aj, A + Aj, −A + Aj, A − Aj, −A + Aj |

TABLE 29-5

| Index | Pilot sequence |
|---|---|
| 1 | −A − Aj, −A + Aj, A + Aj, A + Aj, A + Aj, A − Aj, −A + Aj, −A + Aj, −A − Aj, A − Aj, −A − Aj, −A − Aj, −A − Aj, A − Aj, A + Aj, A + Aj, −A + Aj, A − Aj, −A − Aj, −A − Aj, −A + Aj, A + Aj, −A − Aj, −A + Aj, A − Aj, A − Aj, −A − Aj, −A − Aj, A − Aj, −A + Aj, −A − Aj, A − Aj, A + Aj, A − Aj, −A − Aj, −A + Aj, A − Aj, A + Aj, −A + Aj, A + Aj, −A − Aj, A − Aj, −A − Aj, A − Aj, A + Aj, −A + Aj, A − Aj, −A + Aj, −A + Aj, A − Aj, −A + Aj, A + Aj, −A + Aj, A − Aj, A − Aj, A + Aj, A − Aj, A − Aj, A − Aj, −A + Aj, A − Aj, A + Aj, A + Aj, −A − Aj, A + Aj, A + Aj, A − Aj, A − Aj, A + Aj, −A − Aj, −A + Aj, −A + Aj, −A − Aj, −A − Aj, A + Aj, A + Aj, −A + Aj, −A − Aj, A + Aj, A + Aj, −A − Aj, −A + Aj, −A − Aj, −A + Aj, A + Aj, −A + Aj, −A − Aj, −A + Aj, −A − Aj, A + Aj, −A − Aj, A − Aj, −A + Aj, A + Aj, −A − Aj, A + Aj |
| 2 | −A − Aj, A + Aj, −A − Aj, −A + Aj, A + Aj, A + Aj, A + Aj, A − Aj, −A + Aj, −A + Aj, −A − Aj, A − Aj, −A − Aj, −A − Aj, −A − Aj, A − Aj, A + Aj, A + Aj, −A + Aj, A − Aj, −A − Aj, −A − Aj, −A + Aj, A + Aj, −A − Aj, −A + Aj, A − Aj, A −Aj, −A − Aj, −A − Aj, A − Aj, −A + Aj, −A − Aj, A − Aj, A + Aj, A − Aj, −A − Aj, −A + Aj, A − Aj, A + Aj, −A + Aj, A + Aj, −A − Aj, A − Aj, −A − Aj, A − Aj, A + Aj, −A + Aj, A − Aj, −A + Aj, −A + Aj, A − Aj, −A + Aj, A + Aj, −A + Aj, A − Aj, A − Aj, A + Aj, A − Aj, A − Aj, A − Aj, −A + Aj, A − Aj, A + Aj, A + Aj, −A − Aj, A + Aj, A + Aj, A − Aj, A − Aj, A + Aj, −A − Aj, −A + Aj, −A + Aj, −A − Aj, −A − Aj, A + Aj, A + Aj, −A + Aj, −A − Aj, A + Aj, A + Aj, −A − Aj, −A + Aj, −A − Aj, −A + Aj, A + Aj, −A + Aj, −A − Aj, −A + Aj, −A − Aj, A + Aj, −A − Aj, A − Aj, −A + Aj, A + Aj |
| 3 | −A − Aj, A + Aj, A − Aj, −A − Aj, −A − Aj, −A − Aj, −A + Aj, A − Aj, A − Aj, A + Aj, −A + Aj, A + Aj, A + Aj, A + Aj, −A + Aj, −A − Aj, −A − Aj, A − Aj, −A + Aj, A + Aj, A + Aj, A − Aj, −A − Aj, A + Aj, A − Aj, −A + Aj, −A + Aj, A + Aj, A + Aj, −A + Aj, A − Aj, A + Aj, −A + Aj, −A − Aj, −A + Aj, A + Aj, A − Aj, −A + Aj, −A − Aj, A − Aj, −A − Aj, A + Aj, −A + Aj, A + Aj, −A + Aj, −A − Aj, A − Aj, −A + Aj, A − Aj, A − Aj, −A + Aj, A − Aj, −A − Aj, A − Aj, −A + Aj, −A + Aj, −A − Aj, −A + Aj, −A + Aj, −A + Aj, A − Aj, −A + Aj, −A − Aj, −A − Aj, A + Aj, −A − Aj, −A − Aj, −A + Aj, −A + Aj, −A − Aj, A + Aj, A − Aj, A − Aj, A + Aj, A + Aj, −A − Aj, −A − Aj, A − Aj, A + Aj, −A − Aj, −A − Aj, A + Aj, A − Aj, A + Aj, A − Aj, −A − Aj, A − Aj, A + Aj, A − Aj, A + Aj, −A − Aj, A + Aj, −A + Aj, A − Aj, −A − Aj, A + Aj |

TABLE 29-5-continued

| Index | Pilot sequence |
|---|---|
| 4 | A + Aj, −A − Aj, −A + Aj, A + Aj, A + Aj, A + Aj, A − Aj, −A + Aj, −A + Aj, −A − Aj, A − Aj, −A − Aj, −A − Aj, −A − Aj, A − Aj, A + Aj, A + Aj, −A + Aj, A − Aj, −A − Aj, −A − Aj, −A + Aj, A + Aj, −A − Aj, −A + Aj, A − Aj, A − Aj, −A − Aj, −A − Aj, A − Aj, −A + Aj, −A − Aj, A − Aj, A + Aj, A − Aj, −A − Aj, −A + Aj, A − Aj, A + Aj, −A + Aj, A + Aj, −A − Aj, A − Aj, −A − Aj, A − Aj, A + Aj, −A + Aj, A − Aj, −A + Aj, −A + Aj, A − Aj, −A + Aj, A + Aj, −A + Aj, A − Aj, A − Aj, A + Aj, A − Aj, A − Aj, A − Aj, −A + Aj, A − Aj, A + Aj, A + Aj, −A − Aj, A + Aj, A + Aj, A − Aj, A − Aj, A + Aj, −A − Aj, −A + Aj, −A + Aj, −A − Aj, −A − Aj, A + Aj, A + Aj, −A + Aj, −A − Aj, A + Aj, A + Aj, −A − Aj, −A + Aj, −A − Aj, −A + Aj, A + Aj, −A + Aj, −A − Aj, −A + Aj, −A − Aj, A + Aj, −A − Aj, A − Aj, −A + Aj, A + Aj, −A − Aj |
| 5 | A + Aj, −A − Aj, A + Aj, A − Aj, −A − Aj, −A − Aj, −A − Aj, −A + Aj, A − Aj, A − Aj, A + Aj, −A + Aj, A + Aj, A + Aj, A + Aj, −A + Aj, −A − Aj, −A − Aj, A − Aj, −A + Aj, A + Aj, A + Aj, A − Aj, −A − Aj, A + Aj, A − Aj, −A + Aj, −A + Aj, A + Aj, A + Aj, −A + Aj, A − Aj, A + Aj, −A + Aj, −A − Aj, −A + Aj, A + Aj, A − Aj, −A + Aj, −A − Aj, A − Aj, −A − Aj, A + Aj, −A + Aj, A + Aj, −A + Aj, −A − Aj, A − Aj, −A + Aj, A − Aj, A − Aj, −A + Aj, A − Aj, −A − Aj, A − Aj, −A + Aj, −A + Aj, −A − Aj, −A + Aj, −A + Aj, −A + Aj, A − Aj, −A + Aj, −A − Aj, −A − Aj, A + Aj, −A − Aj, −A − Aj, A + Aj, −A + Aj, −A − Aj, A + Aj, A − Aj, A − Aj, A + Aj, A + Aj, −A − Aj, −A − Aj, A − Aj, A + Aj, −A − Aj, −A − Aj, −A + Aj, A − Aj, A + Aj, A − Aj, −A − Aj, A − Aj, A + Aj, A − Aj, A + Aj, −A − Aj, A + Aj, −A + Aj, A − Aj, −A − Aj |
| 6 | A + Aj, A − Aj, −A − Aj, −A − Aj, −A − Aj, −A + Aj, A − Aj, A − Aj, A + Aj, −A + Aj, A + Aj, A + Aj, A + Aj, −A + Aj, −A − Aj, −A − Aj, A − Aj, −A + Aj, A + Aj, A + Aj, A − Aj, −A − Aj, A + Aj, A − Aj, −A + Aj, −A + Aj, A + Aj, A + Aj, −A + Aj, A − Aj, A + Aj, −A + Aj, −A − Aj, −A + Aj, A + Aj, A − Aj, −A + Aj, −A − Aj, A − Aj, −A − Aj, A + Aj, −A + Aj, A + Aj, −A + Aj, −A − Aj, A − Aj, −A + Aj, A − Aj, A − Aj, −A + Aj, A − Aj, −A − Aj, A − Aj, −A + Aj, −A + Aj, −A − Aj, −A + Aj, −A + Aj, −A + Aj, A − Aj, −A + Aj, −A − Aj, −A − Aj, A + Aj, −A − Aj, −A − Aj, −A + Aj, −A + Aj, −A − Aj, A + Aj, A − Aj, A − Aj, A + Aj, A + Aj, −A − Aj, −A − Aj, A − Aj, A + Aj, −A − Aj, −A − Aj, A + Aj, A − Aj, A + Aj, A − Aj, −A − Aj, A − Aj, A + Aj, A − Aj, A + Aj, −A − Aj, A + Aj, −A + Aj, A − Aj, −A − Aj, A + Aj, −A − Aj |

TABLE 29-6

| Index | Pilot sequence |
|---|---|
| 1 | −A + Aj, −A − Aj, A − Aj, A − Aj, A − Aj, A + Aj, −A − Aj, −A − Aj, −A + Aj, A + Aj, −A + Aj, −A + Aj, −A + Aj, A + Aj, A − Aj, A − Aj, −A − Aj, A + Aj, −A + Aj, −A + Aj, −A − Aj, A − Aj, −A + Aj, −A − Aj, A + Aj, A + Aj, −A + Aj, −A + Aj, A + Aj, −A − Aj, −A + Aj, A + Aj, A − Aj, A + Aj, −A + Aj, −A − Aj, A + Aj, A − Aj, −A − Aj, A − Aj, −A + Aj, A + Aj, −A + Aj, A + Aj, A − Aj, −A − Aj, A + Aj, −A − Aj, −A − Aj, A + Aj, −A − Aj, A − Aj, −A − Aj, A + Aj, A + Aj, A − Aj, A + Aj, A + Aj, A + Aj, −A − Aj, A + Aj, A − Aj, A − Aj, −A + Aj, A − Aj, A − Aj, A + Aj, A + Aj, A − Aj, −A + Aj, −A − Aj, −A − Aj, −A + Aj, −A + Aj, A − Aj, A − Aj, −A − Aj, −A + Aj, A − Aj, A − Aj, −A + Aj, −A − Aj, −A + Aj, −A − Aj, A − Aj, −A − Aj, −A + Aj, −A − Aj, −A + Aj, A − Aj, −A + Aj, A + Aj, −A − Aj, A − Aj, −A + Aj, A − Aj |
| 2 | −A + Aj, A − Aj, −A + Aj, −A − Aj, A − Aj, A − Aj, A − Aj, A + Aj, −A − Aj, −A − Aj, −A + Aj, A + Aj, −A + Aj, −A + Aj, −A + Aj, A + Aj, A − Aj, A − Aj, −A − Aj, A + Aj, −A + Aj, −A + Aj, −A − Aj, A − Aj, −A + Aj, −A − Aj, A + Aj, A + Aj, −A + Aj, −A + Aj, A + Aj, −A − Aj, −A + Aj, A + Aj, A − Aj, A + Aj, −A + Aj, −A − Aj, A + Aj, A − Aj, −A − Aj, A − Aj, −A + Aj, A + Aj, −A + Aj, A + Aj, A − Aj, −A − Aj, A + Aj, −A − Aj, −A − Aj, A + Aj, −A − Aj, A − Aj, −A − Aj, A + Aj, A + Aj, A − Aj, A + Aj, A + Aj, A + Aj, −A − Aj, A + Aj, A − Aj, A − Aj, −A + Aj, A − Aj, A − Aj, A + Aj, A + Aj, A − Aj, −A + Aj, −A − Aj, −A − Aj, −A + Aj, −A + Aj, A − Aj, A − Aj, −A − Aj, −A + Aj, A − Aj, A − Aj, −A + Aj, −A − Aj, −A + Aj, −A − Aj, A − Aj, −A − Aj, −A + Aj, −A − Aj, −A + Aj, A − Aj, −A + Aj, A + Aj, −A − Aj, A − Aj |
| 3 | −A + Aj, A − Aj, A + Aj, −A + Aj, −A + Aj, −A + Aj, −A − Aj, A + Aj, A + Aj, A − Aj, −A − Aj, A − Aj, A − Aj, A − Aj, −A − Aj, −A + Aj, −A + Aj, A + Aj, −A − Aj, A − Aj, A − Aj, A + Aj, −A + Aj, A − Aj, A + Aj, −A − Aj, −A − Aj, A − Aj, A − Aj, −A − Aj, A + Aj, A − Aj, −A − Aj, −A + Aj, −A − Aj, A − Aj, A + Aj, −A − Aj, −A + Aj, A + Aj, −A + Aj, A − Aj, −A − Aj, A − Aj, −A − Aj, −A + Aj, A + Aj, −A − Aj, A + Aj, A + Aj, −A − Aj, A + Aj, −A + Aj, A + Aj, −A − Aj, −A − Aj, −A + Aj, −A − Aj, −A − Aj, −A − Aj, A + Aj, −A − Aj, −A + Aj, −A + Aj, A − Aj, −A + Aj, −A + Aj, −A − Aj, −A − Aj, −A + Aj, A − Aj, A + Aj, A + Aj, A − Aj, A − Aj, −A + Aj, −A + Aj, A + Aj, A − Aj, −A + Aj, −A + Aj, A − Aj, A + Aj, A − Aj, A + Aj, −A + Aj, A + Aj, A − Aj, A + Aj, A − Aj, −A + Aj, A − Aj, −A − Aj, A + Aj, −A + Aj, A − Aj |
| 4 | A − Aj, −A + Aj, −A − Aj, A − Aj, A − Aj, A − Aj, A + Aj, −A − Aj, −A − Aj, −A + Aj, A + Aj, −A + Aj, −A + Aj, −A + Aj, A + Aj, A − Aj, A − Aj, −A − Aj, A + Aj, −A + Aj, −A + Aj, −A − Aj, A − Aj, −A + Aj, −A − Aj, A + Aj, A + Aj, −A + Aj, −A + Aj, A + Aj, −A − Aj, −A + Aj, A + Aj, A − Aj, A + Aj, −A + Aj, −A − Aj, A + Aj, A − Aj, −A − Aj, A − Aj, −A + Aj, A + Aj, −A + Aj, A + Aj, A − Aj, −A − Aj, A + Aj, −A − Aj, −A − Aj, A + Aj, −A − Aj, A − Aj, −A − Aj, A + Aj, A + Aj, A − Aj, A + Aj, A + Aj, A + Aj, −A − Aj, A + Aj, A − Aj, A − Aj, −A + Aj, A − Aj, A − Aj, A + Aj, A + Aj, A − Aj, −A + Aj, −A − Aj, −A − Aj, −A + Aj, −A + Aj, A − Aj, A − Aj, −A − Aj, −A + Aj, A − Aj, A − Aj, −A + Aj, −A − Aj, −A + Aj, −A − Aj, A − Aj, −A − Aj, −A + Aj, −A − Aj, −A + Aj, A − Aj, −A + Aj, A + Aj, −A − Aj, A − Aj, −A + Aj |
| 5 | A − Aj, −A + Aj, A − Aj, A + Aj, −A + Aj, −A + Aj, −A + Aj, −A − Aj, A + Aj, A + Aj, A − Aj, −A − Aj, A − Aj, A − Aj, A − Aj, −A − Aj, −A + Aj, −A + Aj, A + Aj, −A − Aj, A − Aj, A − Aj, A + Aj, −A + Aj, A − Aj, A + Aj, −A − Aj, −A − Aj, A − Aj, A − Aj, −A − Aj, A + Aj, A − Aj, −A − Aj, −A + Aj, −A − Aj, A − Aj, A + Aj, −A − Aj, −A + Aj, A + Aj, −A + Aj, A − Aj, −A − Aj, A − Aj, −A − Aj, −A + Aj, A + Aj, −A − Aj, A + Aj, A + Aj, −A − Aj, A + Aj, −A + Aj, A + Aj, −A − Aj, −A − Aj, −A + Aj, −A − Aj, −A − Aj, −A − Aj, A + Aj, −A − Aj, −A + Aj, −A + Aj, A − Aj, −A + Aj, −A + Aj, −A − Aj, −A − Aj, −A + Aj, A − Aj, A + Aj, A + Aj, A − Aj, A − Aj, −A + Aj, −A + Aj, A + Aj, A − Aj, −A + Aj, −A + Aj, A − Aj, A + Aj, A − Aj, A + Aj, −A + Aj, A + Aj, A − Aj, A + Aj, A − Aj, −A + Aj, A − Aj, −A − Aj, A + Aj, −A + Aj |
| 6 | A − Aj, A + Aj, −A + Aj, −A + Aj, −A + Aj, −A − Aj, A + Aj, A + Aj, A − Aj, −A − Aj, A − Aj, A − Aj, A − Aj, −A − Aj, −A + Aj, −A + Aj, A + Aj, −A − Aj, A − Aj, A − Aj, A + Aj, −A + Aj, A − Aj, A + Aj, −A − Aj, −A − Aj, A − Aj, A − Aj, −A − Aj, A + Aj, A − Aj, −A − Aj, −A + Aj, −A − Aj, A − Aj, A + Aj, −A − Aj, −A + Aj, A + Aj, −A + Aj, A − Aj, −A − Aj, A − Aj, −A − Aj, −A + Aj, A + Aj, −A − Aj, A + Aj, A + Aj, −A − Aj, A + Aj, −A + Aj, A + Aj, −A − Aj, −A − Aj, −A + Aj, −A − Aj, −A − Aj, −A − Aj, A + Aj, −A − Aj, −A + Aj, −A + Aj, A − Aj, −A + Aj, −A + Aj, −A − Aj, −A − Aj, −A + Aj, A − Aj, A + Aj, A + Aj, A − Aj, A − Aj, −A + Aj, −A + Aj, A + Aj, A − Aj, −A + Aj, −A + Aj, A − Aj, A + Aj, A − Aj, A + Aj, −A + Aj, A + Aj, A − Aj, A + Aj, A − Aj, −A + Aj, A − Aj, −A − Aj, A + Aj, −A + Aj, A − Aj, −A + Aj |

(23) Particularly, when $N_{PS}$=104, if a remainder of $N_{TS}$ divided by 4 is 1, the pilot sequence is one item in Table 30-1. If a remainder of $N_{TS}$ divided by 4 is 3, the pilot sequence is one item in Table 30-1 or Table 30-2. Alternatively, any item is selected from Table 30-3 as a pilot sequence in one polarization direction, and any item is selected from Table 30-4 as a pilot sequence in the other polarization direction. Alternatively, any item is selected from Table 30-5 as a pilot sequence in one polarization direction, and any item is selected from Table 30-6 as a pilot sequence in the other polarization direction.

TABLE 30-1

| Index | Polarization | Pilot sequence |
|---|---|---|
| 1 | Polarization 1 | −A − Aj, A − Aj, −A − Aj, −A + Aj, A + Aj, A − Aj, −A − Aj, A + Aj, −A + Aj, −A + Aj, A + Aj, A − Aj, −A + Aj, −A − Aj, A + Aj, A − Aj, −A − Aj, A − Aj, A − Aj, A + Aj, −A − Aj, −A + Aj, −A + Aj, A + Aj, −A − Aj, −A + Aj, A + Aj, A + Aj, A + Aj, −A + Aj, A − Aj, A − Aj, A + Aj, −A + Aj, A − Aj, A + Aj, −A − Aj, A + Aj, −A + Aj, −A − Aj, −A − Aj, −A − Aj, A − Aj, A + Aj, A + Aj, −A + Aj, A + Aj, −A + Aj, −A + Aj, A − Aj, −A + Aj, A + Aj, A + Aj, −A − Aj, A − Aj, A + Aj, −A + Aj, −A + Aj, −A − Aj, −A + Aj, −A − Aj, A + Aj, −A + Aj, A + Aj, A + Aj, −A + Aj, −A + Aj, −A + Aj, A − Aj, A − Aj, −A − Aj, A − Aj, A + Aj, −A − Aj, A − Aj, A − Aj, A − Aj, A + Aj, A + Aj, A − Aj, −A − Aj, −A − Aj, A − Aj, −A − Aj, −A − Aj, −A − Aj, −A − Aj, A + Aj, −A − Aj, −A + Aj, A − Aj, −A − Aj, −A + Aj, A − Aj, −A + Aj, A − Aj, −A − Aj, A − Aj, −A + Aj, −A − Aj, −A + Aj, A − Aj, A + Aj, A − Aj |
| 2 | Polarization 2 | −A + Aj, A + Aj, −A + Aj, −A − Aj, A − Aj, A + Aj, −A + Aj, A − Aj, −A − Aj, −A − Aj, A − Aj, A + Aj, −A − Aj, −A + Aj, A − Aj, A + Aj, −A + Aj, A + Aj, A + Aj, A − Aj, −A + Aj, −A − Aj, −A − Aj, A − Aj, −A + Aj, −A − Aj, A − Aj, A − Aj, A − Aj, −A − Aj, A + Aj, A + Aj, A − Aj, −A − Aj, A + Aj, A − Aj, −A + Aj, A − Aj, −A − Aj, −A + Aj, −A + Aj, −A + Aj, A + Aj, A − Aj, A − Aj, −A − Aj, A − Aj, −A − Aj, −A − Aj, A + Aj, −A − Aj, A − Aj, A − Aj, −A + Aj, A + Aj, A − Aj, −A − Aj, −A − Aj, −A + Aj, −A − Aj, −A + Aj, A − Aj, −A − Aj, A − Aj, A − Aj, −A − Aj, −A − Aj, −A − Aj, A + Aj, A + Aj, −A + Aj, A + Aj, A − Aj, −A + Aj, A + Aj, A + Aj, A + Aj, A − Aj, A − Aj, A + Aj, −A + Aj, −A + Aj, A + Aj, −A + Aj, −A + Aj, −A + Aj, −A + Aj, A − Aj, −A + Aj, −A − Aj, A + Aj, −A + Aj, −A − Aj, A + Aj, −A − Aj, A + Aj, −A + Aj, A + Aj, −A − Aj, −A + Aj, −A − Aj, A + Aj, A − Aj, A + Aj |
| | Polarization 1 | −A − Aj, A − Aj, −A − Aj, −A + Aj, A + Aj, A − Aj, −A − Aj, A + Aj, −A + Aj, −A + Aj, A + Aj, A − Aj, −A + Aj, −A − Aj, A + Aj, A − Aj, −A − Aj, A − Aj, A − Aj, A + Aj, −A − Aj, −A + Aj, −A + Aj, A + Aj, −A − Aj, −A + Aj, A + Aj, A + Aj, A + Aj, −A + Aj, A − Aj, A − Aj, A + Aj, −A + Aj, A − Aj, A + Aj, −A − Aj, A + Aj, −A + Aj, −A − Aj, −A − Aj, −A − Aj, A − Aj, A + Aj, A + Aj, −A + Aj, A + Aj, −A + Aj, −A + Aj, A − Aj, −A + Aj, A + Aj, A + Aj, −A − Aj, A − Aj, A + Aj, −A + Aj, −A + Aj, −A − Aj, −A + Aj, −A − Aj, A + Aj, −A + Aj, A + Aj, A + Aj, −A + Aj, −A + Aj, −A + Aj, A − Aj, A − Aj, −A − Aj, A − Aj, A + Aj, −A − Aj, A − Aj, A − Aj, A − Aj, A + Aj, A + Aj, A − Aj, −A − Aj, −A − Aj, A − Aj, −A − Aj, −A − Aj, −A − Aj, −A − Aj, A + Aj, −A − Aj, −A + Aj, A − Aj, −A − Aj, −A + Aj, A − Aj, −A + Aj, A − Aj, −A − Aj, A − Aj, −A + Aj, −A − Aj, −A + Aj, A − Aj, A + Aj, A − Aj |
| | Polarization 2 | A − Aj, −A − Aj, A − Aj, A + Aj, −A + Aj, −A − Aj, A − Aj, −A + Aj, A + Aj, A + Aj, −A + Aj, −A − Aj, A + Aj, A − Aj, −A + Aj, −A − Aj, A − Aj, −A − Aj, −A − Aj, −A + Aj, A − Aj, A + Aj, A + Aj, −A + Aj, A − Aj, A + Aj, −A + Aj, −A + Aj, −A + Aj, A + Aj, −A − Aj, −A − Aj, −A + Aj, A + Aj, −A − Aj, −A + Aj, A − Aj, −A + Aj, A + Aj, A − Aj, A − Aj, A − Aj, −A − Aj, −A + Aj, −A + Aj, A + Aj, −A + Aj, A + Aj, A + Aj, −A − Aj, A + Aj, −A + Aj, −A + Aj, A − Aj, −A − Aj, −A + Aj, A + Aj, A + Aj, A − Aj, A + Aj, A − Aj, −A + Aj, A + Aj, −A + Aj, −A + Aj, A + Aj, A + Aj, A + Aj, −A − Aj, −A − Aj, A − Aj, −A − Aj, −A + Aj, A − Aj, −A − Aj, −A − Aj, −A − Aj, −A + Aj, −A + Aj, −A − Aj, A − Aj, A − Aj, −A − Aj, A − Aj, A − Aj, A − Aj, A − Aj, −A + Aj, A − Aj, A + Aj, −A − Aj, A − Aj, A + Aj, −A − Aj, A + Aj, −A − Aj, A − Aj, −A − Aj, A + Aj, A − Aj, A + Aj, −A − Aj, −A + Aj, −A − Aj |
| 3 | Polarization 1 | −A + Aj, A + Aj, −A + Aj, −A − Aj, A − Aj, A + Aj, −A + Aj, A − Aj, −A − Aj, −A − Aj, A − Aj, A + Aj, −A − Aj, −A + Aj, A − Aj, A + Aj, −A + Aj, A + Aj, A + Aj, A − Aj, −A + Aj, −A − Aj, −A − Aj, A − Aj, −A + Aj, −A − Aj, A − Aj, A − Aj, A − Aj, −A − Aj, A + Aj, A + Aj, A − Aj, −A − Aj, A + Aj, A − Aj, −A + Aj, A − Aj, −A − Aj, −A + Aj, −A + Aj, −A + Aj, A + Aj, A − Aj, A − Aj, −A − Aj, A − Aj, −A − Aj, −A − Aj, A + Aj, −A − Aj, A − Aj, A − Aj, −A + Aj, A + Aj, A − Aj, −A − Aj, −A − Aj, −A + Aj, −A − Aj, −A + Aj, A − Aj, −A − Aj, A − Aj, A − Aj, −A − Aj, −A − Aj, −A − Aj, A + Aj, A + Aj, −A + Aj, A + Aj, A − Aj, −A + Aj, A + Aj, A + Aj, A + Aj, A − Aj, A − Aj, A + Aj, −A + Aj, −A + Aj, A + Aj, −A + Aj, −A + Aj, −A + Aj, −A + Aj, A − Aj, −A + Aj, −A − Aj, A + Aj, −A + Aj, −A − Aj, A + Aj, −A − Aj, A + Aj, −A + Aj, A + Aj, −A − Aj, −A + Aj, −A − Aj, A + Aj, A − Aj, A + Aj |
| | Polarization 2 | A + Aj, −A + Aj, A + Aj, A − Aj, −A − Aj, −A + Aj, A + Aj, −A − Aj, A − Aj, A − Aj, −A − Aj, −A + Aj, A − Aj, A + Aj, −A − Aj, −A + Aj, A + Aj, −A + Aj, −A + Aj, −A − Aj, A + Aj, A − Aj, A − Aj, −A − Aj, A + Aj, A − Aj, −A − Aj, −A − Aj, −A − Aj, A − Aj, −A + Aj, −A + Aj, −A − Aj, A − Aj, −A + Aj, −A − Aj, A + Aj, −A − Aj, A − Aj, A + Aj, A + Aj, A + Aj, −A + Aj, −A − Aj, −A − Aj, A − Aj, −A − Aj, A − Aj, A − Aj, −A + Aj, A − Aj, −A − Aj, −A − Aj, A + Aj, −A + Aj, −A − Aj, A − Aj, A − Aj, A + Aj, A − Aj, A + Aj, −A − Aj, A − Aj, −A − Aj, −A − Aj, A − Aj, A − Aj, A − Aj, −A + Aj, −A + Aj, A + Aj, −A + Aj, −A − Aj, A + Aj, −A + Aj, −A + Aj, −A + Aj, −A − Aj, −A − Aj, −A + Aj, A + Aj, A + Aj, −A + Aj, A + Aj, A + Aj, A + Aj, A + Aj, −A − Aj, A + Aj, A − Aj, −A + Aj, A + Aj, A − Aj, −A + Aj, A − Aj, −A + Aj, A + Aj, −A + Aj, A − Aj, A + Aj, A − Aj, −A + Aj, −A − Aj, −A + Aj |
| 4<br><br>5 | Polarization 1 | A − Aj, −A − Aj, A − Aj, A + Aj, −A + Aj, −A − Aj, A − Aj, −A + Aj, A + Aj, A + Aj, −A + Aj, −A − Aj, A + Aj, A − Aj, −A + Aj, −A − Aj, A − Aj, −A − Aj, −A − Aj, −A + Aj, A − Aj, A + Aj, A + Aj, −A + Aj, A − Aj, A + Aj, −A + Aj, −A + Aj, −A + Aj, A + Aj, −A − Aj, −A − Aj, −A + Aj, A + Aj, −A − Aj, −A + Aj, A − Aj, −A + Aj, A + Aj, A − Aj, A − Aj, A − Aj, −A − Aj, −A + Aj, −A + Aj, A + Aj, −A + Aj, A + Aj, A + Aj, −A − Aj, A + Aj, −A + Aj, −A + Aj, A − Aj, −A − Aj, −A + Aj, A + Aj, A + Aj, A − Aj, A + Aj, A − Aj, −A + Aj, A + Aj, −A + Aj, −A + Aj, A + Aj, A + Aj, A + Aj, −A − Aj, −A − Aj, A − Aj, −A − Aj, −A + Aj, A − Aj, −A − Aj, −A − Aj, −A − Aj, −A + Aj, −A + Aj, −A − Aj, A − Aj, A − Aj, −A − Aj, A − Aj, A − Aj, A − Aj, A − Aj, −A + Aj, A − Aj, A + Aj, −A − Aj, A − Aj, A + Aj, −A − Aj, A + Aj, −A − Aj, A − Aj, −A − Aj, A + Aj, A − Aj, A + Aj, −A − Aj, −A + Aj, −A − Aj |
| | Polarization 2 | A + Aj, −A + Aj, A + Aj, A − Aj, −A − Aj, −A + Aj, A + Aj, −A − Aj, A − Aj, A − Aj, −A − Aj, −A + Aj, A − Aj, A + Aj, −A − Aj, −A + Aj, A + Aj, −A + Aj, −A + Aj, −A − Aj, A + Aj, A − Aj, A − Aj, −A − Aj, A + Aj, A − Aj, −A − Aj, −A − Aj, −A − Aj, A − Aj, −A + Aj, −A + Aj, −A − Aj, A − Aj, −A + Aj, −A − Aj, A + Aj, −A − Aj, A − Aj, A + Aj, A + Aj, A + Aj, −A + Aj, −A − Aj, −A − Aj, A − Aj, −A − Aj, A − Aj, A − Aj, −A + Aj, A − Aj, −A − Aj, −A − Aj, A + Aj, −A + Aj, −A − Aj, A − Aj, A − Aj, A + Aj, A − Aj, A + Aj, −A − Aj, A − Aj, −A − Aj, −A − Aj, A − Aj, A − Aj, A − Aj, −A + Aj, −A + Aj, A + Aj, −A + Aj, −A − Aj, |

TABLE 30-1-continued

| Index | Polarization | Pilot sequence |
|---|---|---|
| | | A + Aj, −A + Aj, −A + Aj, −A + Aj, −A − Aj, −A − Aj, −A + Aj, A + Aj, A + Aj, −A + Aj, A + Aj, A + Aj, A + Aj, A + Aj, −A − Aj, A + Aj, A − Aj, −A + Aj, A + Aj, A − Aj, −A + Aj, A − Aj, −A + Aj, A + Aj, −A + Aj, A − Aj, A + Aj, A − Aj, −A + Aj, −A − Aj, −A + Aj |
| | Polarization 1 | −A − Aj, −A − Aj, −A + Aj, −A + Aj, −A + Aj, A − Aj, −A + Aj, −A + Aj, −A − Aj, A − Aj, A − Aj, −A − Aj, −A − Aj, A − Aj, A + Aj, A − Aj, A − Aj, −A + Aj, −A + Aj, A − Aj, A + Aj, −A − Aj, A − Aj, −A − Aj, A − Aj, −A − Aj, A + Aj, A + Aj, A − Aj, −A + Aj, A − Aj, −A + Aj, A + Aj, −A + Aj, −A − Aj, −A − Aj, −A − Aj, −A − Aj, −A + Aj, A − Aj, A + Aj, −A + Aj, −A + Aj, −A + Aj, −A − Aj, −A − Aj, A + Aj, A − Aj, A − Aj, A − Aj, A + Aj, −A + Aj, A + Aj, −A − Aj, A − Aj, A − Aj, A + Aj, A − Aj, −A + Aj, A + Aj, A − Aj, A − Aj, A + Aj, −A − Aj, −A − Aj, −A + Aj, −A − Aj, A − Aj, A + Aj, A + Aj, −A + Aj, −A − Aj, A + Aj, A − Aj, A + Aj, −A + Aj, A − Aj, A + Aj, A + Aj, −A − Aj, A + Aj, A − Aj, −A − Aj, A + Aj, −A + Aj, A + Aj, A + Aj, −A − Aj, −A + Aj, A + Aj, A − Aj, −A + Aj, −A + Aj, A + Aj, −A − Aj, −A + Aj, −A − Aj, −A − Aj, A − Aj, −A + Aj, A + Aj, −A − Aj, A + Aj, −A + Aj |
| | Polarization 2 | −A + Aj, −A + Aj, −A − Aj, −A − Aj, −A − Aj, A + Aj, −A − Aj, −A − Aj, −A + Aj, A + Aj, A + Aj, −A + Aj, −A + Aj, A + Aj, A − Aj, A + Aj, A + Aj, −A − Aj, −A − Aj, A + Aj, A − Aj, −A + Aj, A + Aj, −A + Aj, A + Aj, −A + Aj, A − Aj, A − Aj, A + Aj, −A − Aj, A + Aj, −A − Aj, A − Aj, −A − Aj, −A + Aj, −A + Aj, −A + Aj, −A + Aj, −A − Aj, A + Aj, A − Aj, −A − Aj, −A − Aj, −A − Aj, −A + Aj, −A + Aj, A − Aj, A + Aj, A + Aj, A + Aj, A − Aj, −A − Aj, A − Aj, −A + Aj, A + Aj, A + Aj, A − Aj, A + Aj, −A − Aj, A − Aj, A + Aj, A + Aj, A − Aj, −A + Aj, −A + Aj, −A − Aj, −A + Aj, A + Aj, A − Aj, A − Aj, −A − Aj, −A + Aj, A − Aj, A + Aj, A − Aj, −A − Aj, A + Aj, A − Aj, A − Aj, −A + Aj, A − Aj, A + Aj, −A + Aj, A − Aj, −A − Aj, A − Aj, A − Aj, −A + Aj, −A − Aj, A − Aj, A + Aj, −A − Aj, −A − Aj, A − Aj, −A + Aj, −A − Aj, −A + Aj, −A + Aj, A + Aj, −A − Aj, A − Aj, −A + Aj, A − Aj, −A − Aj |
| 6 7 | Polarization 1 | −A − Aj, −A − Aj, −A + Aj, −A + Aj, −A + Aj, A − Aj, −A + Aj, −A + Aj, −A − Aj, A − Aj, A − Aj, −A − Aj, −A − Aj, A − Aj, A + Aj, A − Aj, A − Aj, −A + Aj, −A + Aj, A − Aj, A + Aj, −A − Aj, A − Aj, −A − Aj, A − Aj, −A − Aj, A + Aj, A + Aj, A − Aj, −A + Aj, A − Aj, −A + Aj, A + Aj, −A + Aj, −A − Aj, −A − Aj, −A − Aj, −A − Aj, −A + Aj, A − Aj, A + Aj, −A + Aj, −A + Aj, −A + Aj, −A − Aj, −A − Aj, A + Aj, A − Aj, A − Aj, A − Aj, A + Aj, −A + Aj, A + Aj, −A − Aj, A − Aj, A − Aj, A + Aj, A − Aj, −A + Aj, A + Aj, A − Aj, A − Aj, A + Aj, −A − Aj, −A − Aj, −A + Aj, −A − Aj, A − Aj, A + Aj, A + Aj, −A + Aj, −A − Aj, A + Aj, A − Aj, A + Aj, −A + Aj, A − Aj, A + Aj, A + Aj, −A − Aj, A + Aj, A − Aj, −A − Aj, A + Aj, −A + Aj, A + Aj, A + Aj, −A − Aj, −A + Aj, A + Aj, A − Aj, −A + Aj, −A + Aj, A + Aj, −A − Aj, −A + Aj, −A − Aj, −A − Aj, A − Aj, −A + Aj, A + Aj, −A − Aj, A + Aj, −A + Aj |
| | Polarization 2 | A − Aj, A − Aj, A + Aj, A + Aj, A + Aj, −A − Aj, A + Aj, A + Aj, A − Aj, −A − Aj, −A − Aj, A − Aj, A − Aj, −A − Aj, −A + Aj, −A − Aj, −A − Aj, A + Aj, A + Aj, −A − Aj, −A + Aj, A − Aj, −A − Aj, A − Aj, −A − Aj, A − Aj, −A + Aj, −A + Aj, −A − Aj, A + Aj, −A − Aj, A + Aj, −A + Aj, A + Aj, A − Aj, A − Aj, A − Aj, A − Aj, A + Aj, −A − Aj, −A + Aj, A + Aj, A + Aj, A + Aj, A − Aj, A − Aj, −A + Aj, −A − Aj, −A − Aj, −A − Aj, −A + Aj, A + Aj, −A + Aj, A − Aj, −A − Aj, −A − Aj, −A + Aj, −A − Aj, A + Aj, −A + Aj, −A − Aj, −A − Aj, −A + Aj, A − Aj, A − Aj, A + Aj, A − Aj, −A − Aj, −A + Aj, −A + Aj, A + Aj, A − Aj, −A + Aj, −A − Aj, −A + Aj, A + Aj, −A − Aj, −A + Aj, −A + Aj, A − Aj, −A + Aj, −A − Aj, A − Aj, −A + Aj, A + Aj, −A + Aj, −A + Aj, A − Aj, A + Aj, −A + Aj, −A − Aj, A + Aj, A + Aj, −A + Aj, A − Aj, A + Aj, A − Aj, A − Aj, −A − Aj, A + Aj, −A + Aj, A − Aj, −A + Aj, A + Aj |
| | Polarization 1 | −A + Aj, −A + Aj, −A − Aj, −A − Aj, −A − Aj, A + Aj, −A − Aj, −A − Aj, −A + Aj, A + Aj, A + Aj, −A + Aj, −A + Aj, A + Aj, A − Aj, A + Aj, A + Aj, −A − Aj, −A − Aj, A + Aj, A − Aj, −A + Aj, A + Aj, −A + Aj, A + Aj, −A + Aj, A − Aj, A − Aj, A + Aj, −A − Aj, A + Aj, −A − Aj, A − Aj, −A − Aj, −A + Aj, −A + Aj, −A + Aj, −A + Aj, −A − Aj, A + Aj, A − Aj, −A − Aj, −A − Aj, −A − Aj, −A + Aj, −A + Aj, A − Aj, A + Aj, A + Aj, A + Aj, A − Aj, −A − Aj, A − Aj, −A + Aj, A + Aj, A + Aj, A − Aj, A + Aj, −A − Aj, A − Aj, A + Aj, A + Aj, A − Aj, −A + Aj, −A + Aj, −A − Aj, −A + Aj, A + Aj, A − Aj, A − Aj, −A − Aj, −A + Aj, A − Aj, A + Aj, A − Aj, −A − Aj, A + Aj, A − Aj, A − Aj, −A + Aj, A − Aj, A + Aj, −A + Aj, A − Aj, −A − Aj, A − Aj, A − Aj, −A + Aj, −A − Aj, A − Aj, A + Aj, −A − Aj, −A − Aj, A − Aj, −A + Aj, −A − Aj, −A + Aj, −A + Aj, A + Aj, −A − Aj, A − Aj, −A + Aj, A − Aj, −A − Aj |
| | Polarization 2 | A + Aj, A + Aj, A − Aj, A − Aj, A − Aj, −A + Aj, A − Aj, A − Aj, A + Aj, −A + Aj, −A + Aj, A + Aj, A + Aj, −A + Aj, −A − Aj, −A + Aj, −A + Aj, A − Aj, A − Aj, −A + Aj, −A − Aj, A + Aj, −A + Aj, A + Aj, −A + Aj, A + Aj, −A − Aj, −A − Aj, −A + Aj, A − Aj, −A + Aj, A − Aj, −A − Aj, A − Aj, A + Aj, A + Aj, A + Aj, A + Aj, A − Aj, −A + Aj, −A − Aj, A − Aj, A − Aj, A − Aj, A + Aj, A + Aj, −A − Aj, −A + Aj, −A + Aj, −A + Aj, −A − Aj, A − Aj, −A − Aj, A + Aj, −A + Aj, −A + Aj, −A − Aj, −A + Aj, A − Aj, −A − Aj, −A + Aj, −A + Aj, −A − Aj, A + Aj, A + Aj, A − Aj, A + Aj, −A + Aj, −A − Aj, −A − Aj, A − Aj, A + Aj, −A − Aj, A − Aj, −A − Aj, −A + Aj, A − Aj, −A − Aj, −A − Aj, A + Aj, −A − Aj, A − Aj, −A + Aj, −A − Aj, A − Aj, −A − Aj, −A − Aj, A + Aj, A − Aj, −A − Aj, −A + Aj, A − Aj, A − Aj, −A − Aj, A + Aj, A − Aj, A + Aj, A + Aj, −A + Aj, A − Aj, −A − Aj, A + Aj, −A − Aj, A − Aj |
| 8 | Polarization 1 | A − Aj, A − Aj, A + Aj, A + Aj, A + Aj, −A − Aj, A + Aj, A + Aj, A − Aj, −A − Aj, −A − Aj, A − Aj, A − Aj, −A − Aj, −A + Aj, −A − Aj, −A − Aj, A + Aj, A + Aj, −A − Aj, −A + Aj, A − Aj, −A − Aj, A − Aj, −A − Aj, A − Aj, −A + Aj, −A + Aj, −A − Aj, A + Aj, −A − Aj, A + Aj, −A + Aj, A + Aj, A − Aj, A − Aj, A − Aj, A − Aj, A + Aj, −A − Aj, −A + Aj, A + Aj, A + Aj, A + Aj, A − Aj, A − Aj, −A + Aj, −A − Aj, −A − Aj, −A − Aj, −A + Aj, A + Aj, −A + Aj, A − Aj, −A − Aj, −A − Aj, −A + Aj, −A − Aj, A + Aj, −A + Aj, −A − Aj, −A − Aj, −A + Aj, A − Aj, A − Aj, A + Aj, A − Aj, −A − Aj, −A + Aj, −A + Aj, A + Aj, A − Aj, −A + Aj, −A − Aj, −A + Aj, A + Aj, −A − Aj, −A + Aj, −A + Aj, A − Aj, −A + Aj, −A − Aj, A − Aj, −A + Aj, A + Aj, −A + Aj, −A + Aj, A − Aj, A + Aj, −A + Aj, −A − Aj, A + Aj, A + Aj, −A + Aj, A − Aj, A + Aj, A − Aj, A − Aj, −A − Aj, A + Aj, −A + Aj, A − Aj, −A + Aj, A + Aj |
| 9 | Polarization 2 | A + Aj, A + Aj, A − Aj, A − Aj, A − Aj, −A + Aj, A − Aj, A − Aj, A + Aj, −A + Aj, −A + Aj, A + Aj, A + Aj, −A + Aj, −A − Aj, −A + Aj, −A + Aj, A − Aj, A − Aj, −A + Aj, −A − Aj, A + Aj, −A + Aj, A + Aj, −A + Aj, A + Aj, −A − Aj, −A − Aj, −A + Aj, A − Aj, −A + Aj, A − Aj, −A − Aj, A − Aj, A + Aj, A + Aj, A + Aj, A + Aj, A − Aj, −A + Aj, −A − Aj, A − Aj, A − Aj, A − Aj, A + Aj, A + Aj, −A − Aj, −A + Aj, −A + Aj, −A + Aj, −A − Aj, A − Aj, −A − Aj, A + Aj, −A + Aj, −A + Aj, −A − Aj, −A + Aj, A − Aj, −A − Aj, −A + Aj, −A + Aj, −A − Aj, A + Aj, A + Aj, A − Aj, A + Aj, −A + Aj, −A − Aj, −A − Aj, A − Aj, A + Aj, −A − Aj, A − Aj, −A − Aj, −A + Aj, A − Aj, −A − Aj, −A − Aj, A + Aj, −A − Aj, A − Aj, −A + Aj, −A − Aj, A − Aj, −A − Aj, −A − Aj, A + Aj, A − Aj, −A − Aj, −A + Aj, A − Aj, A − Aj, −A − Aj, A + Aj, A − Aj, A + Aj, A + Aj, −A + Aj, A − Aj, −A − Aj, A + Aj, −A − Aj, A − Aj |

TABLE 30-1-continued

| Index | Polarization | Pilot sequence |
|---|---|---|
| | Polarization 1 | −A − Aj, −A + Aj, A − Aj, −A + Aj, −A − Aj, A + Aj, A − Aj, A − Aj, −A − Aj, A − Aj, −A + Aj, −A − Aj, −A − Aj, A + Aj, −A + Aj, −A − Aj, A − Aj, −A + Aj, −A + Aj, −A − Aj, −A + Aj, A − Aj, A + Aj, −A + Aj, A − Aj, −A + Aj, −A + Aj, A + Aj, −A − Aj, −A + Aj, A + Aj, −A + Aj, A − Aj, −A − Aj, −A + Aj, −A + Aj, A + Aj, A − Aj, −A − Aj, A − Aj, A − Aj, −A + Aj, A + Aj, A + Aj, −A + Aj, −A − Aj, A + Aj, −A + Aj, A + Aj, A + Aj, A − Aj, −A + Aj, −A − Aj, −A + Aj, A + Aj, A + Aj, A + Aj, −A + Aj, A − Aj, A − Aj, −A − Aj, −A − Aj, −A − Aj, −A + Aj, A + Aj, −A − Aj, A − Aj, A − Aj, A − Aj, A − Aj, −A − Aj, −A + Aj, −A − Aj, A + Aj, −A − Aj, A + Aj, −A + Aj, −A + Aj, A − Aj, A + Aj, A − Aj, A + Aj, A − Aj, −A + Aj, A + Aj, −A − Aj, −A − Aj, A + Aj, A + Aj, −A + Aj, A + Aj, A − Aj, A − Aj, A + Aj, A + Aj, A − Aj, −A − Aj, −A − Aj, A + Aj, −A − Aj, −A − Aj, −A − Aj, A − Aj, A − Aj |
| | Polarization 2 | −A + Aj, −A − Aj, A + Aj, −A − Aj, −A + Aj, A − Aj, A + Aj, A + Aj, −A + Aj, A + Aj, −A − Aj, −A + Aj, −A + Aj, A − Aj, −A − Aj, −A + Aj, A + Aj, −A − Aj, −A − Aj, −A + Aj, −A − Aj, A + Aj, A − Aj, −A − Aj, A + Aj, −A − Aj, −A − Aj, A − Aj, −A + Aj, −A − Aj, A − Aj, −A − Aj, A + Aj, −A + Aj, −A − Aj, −A − Aj, A − Aj, A + Aj, −A + Aj, A + Aj, A + Aj, −A − Aj, A − Aj, A − Aj, −A − Aj, −A + Aj, A − Aj, −A − Aj, A − Aj, A − Aj, A + Aj, −A − Aj, −A + Aj, −A − Aj, A − Aj, A − Aj, A − Aj, −A − Aj, A + Aj, A + Aj, −A + Aj, −A + Aj, −A + Aj, −A − Aj, A − Aj, −A + Aj, A + Aj, A + Aj, A + Aj, A + Aj, −A + Aj, −A − Aj, −A + Aj, A − Aj, −A + Aj, A − Aj, −A − Aj, −A − Aj, A + Aj, A − Aj, A + Aj, A − Aj, A + Aj, −A − Aj, A − Aj, −A + Aj, −A + Aj, A − Aj, A − Aj, −A − Aj, A − Aj, A + Aj, A + Aj, A − Aj, A − Aj, A + Aj, −A + Aj, −A + Aj, A − Aj, −A + Aj, −A + Aj, −A + Aj, A + Aj, A + Aj |
| 10 | Polarization 1 | −A − Aj, −A + Aj, A − Aj, −A + Aj, −A − Aj, A + Aj, A − Aj, A − Aj, −A − Aj, A − Aj, −A + Aj, −A − Aj, −A − Aj, A + Aj, −A + Aj, −A − Aj, A − Aj, −A + Aj, −A + Aj, −A − Aj, −A + Aj, A − Aj, A + Aj, −A + Aj, A − Aj, −A + Aj, −A + Aj, A + Aj, −A − Aj, −A + Aj, A + Aj, −A + Aj, A − Aj, −A − Aj, −A + Aj, −A + Aj, A + Aj, A − Aj, −A − Aj, A − Aj, A − Aj, −A + Aj, A + Aj, A + Aj, −A + Aj, −A − Aj, A + Aj, −A + Aj, A + Aj, A + Aj, A − Aj, −A + Aj, −A − Aj, −A + Aj, A + Aj, A + Aj, A + Aj, −A + Aj, A − Aj, A − Aj, −A − Aj, −A − Aj, −A − Aj, −A + Aj, A + Aj, −A − Aj, A − Aj, A − Aj, A − Aj, A − Aj, −A − Aj, −A + Aj, −A − Aj, A + Aj, −A − Aj, A + Aj, −A + Aj, −A + Aj, A − Aj, A + Aj, A − Aj, A + Aj, A − Aj, −A + Aj, A + Aj, −A − Aj, −A − Aj, A + Aj, A + Aj, −A + Aj, A + Aj, A − Aj, A − Aj, A + Aj, A + Aj, A − Aj, −A − Aj, −A − Aj, A + Aj, −A − Aj, −A − Aj, −A − Aj, A − Aj, A − Aj |
| | Polarization 2 | A − Aj, A + Aj, −A − Aj, A + Aj, A − Aj, −A + Aj, −A − Aj, −A − Aj, A − Aj, −A − Aj, A + Aj, A − Aj, A − Aj, −A + Aj, A + Aj, A − Aj, −A − Aj, A + Aj, A + Aj, A − Aj, A + Aj, −A − Aj, −A + Aj, A + Aj, −A − Aj, A + Aj, A + Aj, −A + Aj, A − Aj, A + Aj, −A + Aj, A + Aj, −A − Aj, A − Aj, A + Aj, A + Aj, −A + Aj, −A − Aj, A − Aj, −A − Aj, −A − Aj, A + Aj, −A + Aj, −A + Aj, A + Aj, A − Aj, −A + Aj, A + Aj, −A + Aj, −A + Aj, −A − Aj, A + Aj, A − Aj, A + Aj, −A + Aj, −A + Aj, −A + Aj, A + Aj, −A − Aj, −A − Aj, A − Aj, A − Aj, A − Aj, A + Aj, −A + Aj, A − Aj, −A − Aj, −A − Aj, −A − Aj, −A − Aj, A − Aj, A + Aj, A − Aj, −A + Aj, A − Aj, −A + Aj, A + Aj, A + Aj, −A − Aj, −A + Aj, −A − Aj, −A + Aj, −A − Aj, A + Aj, −A + Aj, A − Aj, A − Aj, −A + Aj, −A + Aj, A + Aj, −A + Aj, −A − Aj, −A − Aj, −A + Aj, −A + Aj, −A − Aj, A − Aj, A − Aj, −A + Aj, A − Aj, A − Aj, A − Aj, −A − Aj, −A − Aj |
| 11 | Polarization 1 | −A + Aj, −A − Aj, A + Aj, −A − Aj, −A + Aj, A − Aj, A + Aj, A + Aj, −A + Aj, A + Aj, −A − Aj, −A + Aj, −A + Aj, A − Aj, −A − Aj, −A + Aj, A + Aj, −A − Aj, −A − Aj, −A + Aj, −A − Aj, A + Aj, A − Aj, −A − Aj, A + Aj, −A − Aj, −A − Aj, A − Aj, −A + Aj, −A − Aj, A − Aj, −A − Aj, A + Aj, −A + Aj, −A − Aj, −A − Aj, A − Aj, A + Aj, −A + Aj, A + Aj, A + Aj, −A − Aj, A − Aj, A − Aj, −A − Aj, −A + Aj, A − Aj, −A − Aj, A − Aj, A − Aj, A + Aj, −A − Aj, −A + Aj, −A − Aj, A − Aj, A − Aj, A − Aj, −A − Aj, A + Aj, A + Aj, −A + Aj, −A + Aj, −A + Aj, −A − Aj, A − Aj, −A + Aj, A + Aj, A + Aj, A + Aj, A + Aj, −A + Aj, −A − Aj, −A + Aj, A − Aj, −A + Aj, A − Aj, −A − Aj, −A − Aj, A + Aj, A − Aj, A + Aj, A − Aj, A + Aj, −A − Aj, A − Aj, −A + Aj, −A + Aj, A − Aj, A − Aj, −A − Aj, A − Aj, A + Aj, A + Aj, A − Aj, A − Aj, A + Aj, −A + Aj, −A + Aj, A − Aj, −A + Aj, −A + Aj, −A + Aj, A + Aj, A + Aj |
| 12 | Polarization 2 | A + Aj, A − Aj, −A + Aj, A − Aj, A + Aj, −A − Aj, −A + Aj, −A + Aj, A + Aj, −A + Aj, A − Aj, A + Aj, A + Aj, −A − Aj, A − Aj, A + Aj, −A + Aj, A − Aj, A − Aj, A + Aj, A − Aj, −A + Aj, −A − Aj, A − Aj, −A + Aj, A − Aj, A − Aj, −A − Aj, A + Aj, A − Aj, −A − Aj, A − Aj, −A + Aj, A + Aj, A − Aj, A − Aj, −A − Aj, −A + Aj, A + Aj, −A + Aj, −A + Aj, A − Aj, −A − Aj, −A − Aj, A − Aj, A + Aj, −A − Aj, A − Aj, −A − Aj, −A − Aj, −A + Aj, A − Aj, A + Aj, A − Aj, −A − Aj, −A − Aj, −A − Aj, A − Aj, −A + Aj, −A + Aj, A + Aj, A + Aj, A + Aj, A − Aj, −A − Aj, A + Aj, −A + Aj, −A + Aj, −A + Aj, −A + Aj, A + Aj, A − Aj, A + Aj, A − Aj, A + Aj, −A − Aj, A − Aj, A − Aj, −A + Aj, −A − Aj, −A + Aj, −A − Aj, −A + Aj, A − Aj, −A − Aj, −A + Aj, A + Aj, −A − Aj, −A − Aj, A − Aj, −A − Aj, −A + Aj, −A + Aj, −A − Aj, −A − Aj, −A + Aj, A + Aj, A + Aj, −A − Aj, A + Aj, A + Aj, A + Aj, −A + Aj, −A + Aj |
| | Polarization 1 | A − Aj, A + Aj, −A − Aj, A + Aj, A − Aj, −A + Aj, −A − Aj, −A − Aj, A − Aj, −A − Aj, A + Aj, A − Aj, A − Aj, −A + Aj, A + Aj, A − Aj, −A − Aj, A + Aj, A + Aj, A − Aj, A + Aj, −A − Aj, −A + Aj, A + Aj, −A − Aj, A + Aj, A + Aj, −A + Aj, A − Aj, A + Aj, −A + Aj, A + Aj, −A − Aj, A − Aj, A + Aj, A + Aj, −A + Aj, −A − Aj, A − Aj, −A − Aj, −A − Aj, A + Aj, −A + Aj, −A + Aj, A + Aj, A − Aj, −A + Aj, A + Aj, −A + Aj, −A + Aj, −A − Aj, A + Aj, A − Aj, A + Aj, −A + Aj, −A + Aj, −A + Aj, A + Aj, −A − Aj, −A − Aj, A − Aj, A − Aj, A − Aj, A + Aj, −A + Aj, A − Aj, −A − Aj, −A − Aj, −A − Aj, −A − Aj, A − Aj, A + Aj, A − Aj, −A + Aj, A − Aj, −A + Aj, A + Aj, A + Aj, −A − Aj, −A + Aj, −A − Aj, −A + Aj, −A − Aj, A + Aj, −A + Aj, A − Aj, A − Aj, −A + Aj, −A + Aj, A + Aj, −A + Aj, −A − Aj, −A − Aj, −A + Aj, −A + Aj, −A − Aj, A − Aj, A − Aj, −A + Aj, A − Aj, A − Aj, A − Aj, −A − Aj, −A − Aj |
| | Polarization 2 | A + Aj, A − Aj, −A + Aj, A − Aj, A + Aj, −A − Aj, −A + Aj, −A + Aj, A + Aj, −A + Aj, A − Aj, A + Aj, A + Aj, −A − Aj, A − Aj, A + Aj, −A + Aj, A − Aj, A − Aj, A + Aj, A − Aj, −A + Aj, −A − Aj, A − Aj, −A + Aj, A − Aj, A − Aj, −A − Aj, A + Aj, A − Aj, −A − Aj, A − Aj, −A + Aj, A + Aj, A − Aj, A − Aj, −A − Aj, −A + Aj, A + Aj, −A + Aj, −A + Aj, A − Aj, −A − Aj, −A − Aj, A − Aj, A + Aj, −A − Aj, A − Aj, −A − Aj, −A − Aj, −A + Aj, A − Aj, A + Aj, A − Aj, −A − Aj, −A − Aj, −A − Aj, A − Aj, −A + Aj, −A + Aj, A + Aj, A + Aj, A + Aj, A − Aj, −A − Aj, A + Aj, −A + Aj, −A + Aj, −A + Aj, −A + Aj, A + Aj, A − Aj, A + Aj, −A − Aj, A + Aj, −A − Aj, A − Aj, A − Aj, −A + Aj, −A − Aj, −A + Aj, −A − Aj, −A + Aj, A − Aj, −A − Aj, A + Aj, A + Aj, −A − Aj, −A − Aj, A − Aj, −A − Aj, −A + Aj, −A + Aj, −A − Aj, −A − Aj, −A + Aj, A + Aj, A + Aj, −A − Aj, A + Aj, A + Aj, A + Aj, −A + Aj, −A + Aj |
| 13 | Polarization 1 | −A − Aj, A − Aj, −A − Aj, A + Aj, −A + Aj, A + Aj, −A − Aj, −A + Aj, −A − Aj, A + Aj, −A − Aj, A + Aj, −A + Aj, −A − Aj, A + Aj, −A + Aj, A − Aj, −A + Aj, −A + Aj, −A + Aj, −A + Aj, −A − Aj, −A + Aj, −A + Aj, −A − Aj, A − Aj, A − Aj, −A − Aj, −A − Aj, −A − Aj, −A + Aj, A − Aj, −A − Aj, −A + Aj, −A − Aj, |

TABLE 30-1-continued

| Index | Polarization | Pilot sequence |
|---|---|---|
| 14 | | −A − Aj, A + Aj, A + Aj, A + Aj, A − Aj, A − Aj, A + Aj, A − Aj, −A + Aj, A + Aj, −A + Aj, A + Aj, A + Aj, A − Aj, −A − Aj, −A + Aj, A − Aj, A − Aj, A + Aj, −A − Aj, A + Aj, A + Aj, A − Aj, A + Aj, A − Aj, A − Aj, −A − Aj, −A + Aj, −A + Aj, −A + Aj, A + Aj, A − Aj, −A + Aj, A − Aj, −A − Aj, A + Aj, A − Aj, −A − Aj, −A − Aj, A + Aj, A − Aj, A − Aj, A − Aj, A + Aj, −A + Aj, A − Aj, A + Aj, A + Aj, −A + Aj, A − Aj, −A − Aj, −A − Aj, −A + Aj, −A − Aj, A − Aj, −A + Aj, A + Aj, −A − Aj, A − Aj, A + Aj, A + Aj, A − Aj, −A + Aj, −A − Aj, A − Aj, A + Aj, −A + Aj, −A − Aj, −A + Aj |
| | Polarization 2 | −A + Aj, A + Aj, −A + Aj, A − Aj, −A − Aj, A − Aj, −A + Aj, −A − Aj, −A + Aj, A − Aj, −A + Aj, A − Aj, −A − Aj, −A + Aj, A − Aj, −A − Aj, A + Aj, −A − Aj, −A − Aj, −A − Aj, −A − Aj, −A + Aj, −A − Aj, −A − Aj, −A + Aj, A + Aj, A + Aj, −A + Aj, −A + Aj, −A + Aj, −A − Aj, A + Aj, −A + Aj, −A − Aj, −A + Aj, −A + Aj, A − Aj, A − Aj, A − Aj, A + Aj, A + Aj, A − Aj, A + Aj, −A − Aj, A − Aj, −A − Aj, A − Aj, A − Aj, A + Aj, −A + Aj, −A − Aj, A + Aj, A + Aj, A − Aj, −A + Aj, A − Aj, A − Aj, A + Aj, A − Aj, A + Aj, A + Aj, −A + Aj, −A − Aj, −A − Aj, −A − Aj, A − Aj, A + Aj, −A − Aj, A + Aj, −A + Aj, A − Aj, A + Aj, −A + Aj, −A + Aj, A − Aj, A + Aj, A + Aj, A + Aj, A − Aj, −A − Aj, A + Aj, A − Aj, A − Aj, −A − Aj, A + Aj, −A + Aj, −A + Aj, −A − Aj, −A + Aj, A + Aj, −A − Aj, A − Aj, −A + Aj, A + Aj, A − Aj, A − Aj, A + Aj, −A − Aj, −A + Aj, A + Aj, A − Aj, −A − Aj, −A + Aj, −A − Aj |
| | Polarization 1 | −A − Aj, A − Aj, −A − Aj, A + Aj, −A + Aj, A + Aj, −A − Aj, −A + Aj, −A − Aj, A + Aj, −A − Aj, A + Aj, −A + Aj, −A − Aj, A + Aj, −A + Aj, A − Aj, −A + Aj, −A + Aj, −A + Aj, −A + Aj, −A − Aj, −A + Aj, −A + Aj, −A − Aj, A − Aj, A − Aj, −A − Aj, −A − Aj, −A − Aj, −A + Aj, A − Aj, −A − Aj, −A + Aj, −A − Aj, −A − Aj, A + Aj, A + Aj, A + Aj, A − Aj, A − Aj, A + Aj, A − Aj, −A + Aj, A + Aj, −A + Aj, A + Aj, A + Aj, A − Aj, −A − Aj, −A + Aj, A − Aj, A − Aj, A + Aj, −A − Aj, A + Aj, A + Aj, A − Aj, A + Aj, A − Aj, A − Aj, −A − Aj, −A + Aj, −A + Aj, −A + Aj, A + Aj, A − Aj, −A + Aj, A − Aj, −A − Aj, A + Aj, A − Aj, −A − Aj, −A − Aj, A + Aj, A − Aj, A − Aj, A − Aj, A + Aj, −A + Aj, A − Aj, A + Aj, A + Aj, −A + Aj, A − Aj, −A − Aj, −A − Aj, −A + Aj, −A − Aj, A − Aj, −A + Aj, A + Aj, −A − Aj, A − Aj, A + Aj, A + Aj, A − Aj, −A + Aj, −A − Aj, A − Aj, A + Aj, −A + Aj, −A − Aj, −A + Aj |
| | Polarization 2 | A − Aj, −A − Aj, A − Aj, −A + Aj, A + Aj, −A + Aj, A − Aj, A + Aj, A − Aj, −A + Aj, A − Aj, −A + Aj, A + Aj, A − Aj, −A + Aj, A + Aj, −A − Aj, A + Aj, A + Aj, A + Aj, A + Aj, A − Aj, A + Aj, A + Aj, A − Aj, −A − Aj, −A − Aj, A − Aj, A − Aj, A − Aj, A + Aj, −A − Aj, A − Aj, A + Aj, A − Aj, A − Aj, −A + Aj, −A + Aj, −A + Aj, −A − Aj, −A − Aj, −A + Aj, −A − Aj, A + Aj, −A + Aj, A + Aj, −A + Aj, −A + Aj, −A − Aj, A − Aj, A + Aj, −A − Aj, −A − Aj, −A + Aj, A − Aj, −A + Aj, −A + Aj, −A − Aj, −A + Aj, −A − Aj, −A − Aj, A − Aj, A + Aj, A + Aj, A + Aj, −A + Aj, −A − Aj, A + Aj, −A − Aj, A − Aj, −A + Aj, −A − Aj, A − Aj, A − Aj, −A + Aj, −A − Aj, −A − Aj, −A − Aj, −A + Aj, A + Aj, −A − Aj, −A + Aj, −A + Aj, A + Aj, −A − Aj, A − Aj, A − Aj, A + Aj, A − Aj, −A − Aj, A + Aj, −A + Aj, A − Aj, −A − Aj, −A + Aj, −A + Aj, −A − Aj, A + Aj, A − Aj, −A − Aj, −A + Aj, A + Aj, A − Aj, A + Aj |
| 15 16 | Polarization 1 | −A + Aj, A + Aj, −A + Aj, A − Aj, −A − Aj, A − Aj, −A + Aj, −A − Aj, −A + Aj, A − Aj, −A + Aj, A − Aj, −A − Aj, −A + Aj, A − Aj, −A − Aj, A + Aj, −A − Aj, −A − Aj, −A − Aj, −A − Aj, −A + Aj, −A − Aj, −A − Aj, −A + Aj, A + Aj, A + Aj, −A + Aj, −A + Aj, −A + Aj, −A − Aj, A + Aj, −A + Aj, −A − Aj, −A + Aj, −A + Aj, A − Aj, A − Aj, A − Aj, A + Aj, A + Aj, A − Aj, A + Aj, −A − Aj, A − Aj, −A − Aj, A − Aj, A − Aj, A + Aj, −A + Aj, −A − Aj, A + Aj, A + Aj, A − Aj, −A + Aj, A − Aj, A − Aj, A + Aj, A − Aj, A + Aj, A + Aj, −A + Aj, −A − Aj, −A − Aj, −A − Aj, A − Aj, A + Aj, −A − Aj, A + Aj, −A + Aj, A − Aj, A + Aj, −A + Aj, −A + Aj, A − Aj, A + Aj, A + Aj, A + Aj, A − Aj, −A − Aj, A + Aj, A − Aj, A − Aj, −A − Aj, A + Aj, −A + Aj, −A + Aj, −A − Aj, −A + Aj, A + Aj, −A − Aj, A − Aj, −A + Aj, A + Aj, A − Aj, A − Aj, A + Aj, −A − Aj, −A + Aj, A + Aj, A − Aj, −A − Aj, −A + Aj, −A − Aj |
| | Polarization 2 | A + Aj, −A + Aj, A + Aj, −A − Aj, A − Aj, −A − Aj, A + Aj, A − Aj, A + Aj, −A − Aj, A + Aj, −A − Aj, A − Aj, A + Aj, −A − Aj, A − Aj, −A + Aj, A − Aj, A − Aj, A − Aj, A − Aj, A + Aj, A − Aj, A − Aj, A + Aj, −A + Aj, −A + Aj, A + Aj, A + Aj, A + Aj, A − Aj, −A + Aj, A + Aj, A − Aj, A + Aj, A + Aj, −A − Aj, −A − Aj, −A − Aj, −A + Aj, −A + Aj, −A − Aj, −A + Aj, A − Aj, −A − Aj, A − Aj, −A − Aj, −A − Aj, −A + Aj, A + Aj, A − Aj, −A + Aj, −A + Aj, −A − Aj, A + Aj, −A − Aj, −A − Aj, −A + Aj, −A − Aj, −A + Aj, −A + Aj, A + Aj, A − Aj, A − Aj, A − Aj, −A − Aj, −A + Aj, A − Aj, −A + Aj, A + Aj, −A − Aj, −A + Aj, A + Aj, A + Aj, −A − Aj, −A + Aj, −A + Aj, −A + Aj, −A − Aj, A − Aj, −A + Aj, −A − Aj, −A − Aj, A − Aj, −A + Aj, A + Aj, A + Aj, A − Aj, A + Aj, −A + Aj, A − Aj, −A − Aj, A + Aj, −A + Aj, −A − Aj, −A − Aj, −A + Aj, A − Aj, A + Aj, −A + Aj, −A − Aj, A − Aj, A + Aj, A − Aj |
| | Polarization 1 | A − Aj, −A − Aj, A − Aj, −A + Aj, A + Aj, −A + Aj, A − Aj, A + Aj, A − Aj, −A + Aj, A − Aj, −A + Aj, A + Aj, A − Aj, −A + Aj, A + Aj, −A − Aj, A + Aj, A + Aj, A + Aj, A + Aj, A − Aj, A + Aj, A + Aj, A − Aj, −A − Aj, −A − Aj, A − Aj, A − Aj, A − Aj, A + Aj, −A − Aj, A − Aj, A + Aj, A − Aj, A − Aj, −A + Aj, −A + Aj, −A + Aj, −A − Aj, −A − Aj, −A + Aj, −A − Aj, A + Aj, −A + Aj, A + Aj, −A + Aj, −A + Aj, −A − Aj, A − Aj, A + Aj, −A − Aj, −A − Aj, −A + Aj, A − Aj, −A + Aj, −A + Aj, −A − Aj, −A + Aj, −A − Aj, −A − Aj, A − Aj, A + Aj, A + Aj, A + Aj, −A + Aj, −A − Aj, A + Aj, −A − Aj, A − Aj, −A + Aj, −A − Aj, A − Aj, A − Aj, −A + Aj, −A − Aj, −A − Aj, −A − Aj, −A + Aj, A + Aj, −A − Aj, −A + Aj, −A + Aj, A + Aj, −A − Aj, A − Aj, A − Aj, A + Aj, A − Aj, −A − Aj, A + Aj, −A + Aj, A − Aj, −A − Aj, −A + Aj, −A + Aj, −A − Aj, A + Aj, A − Aj, −A − Aj, −A + Aj, A + Aj, A − Aj, A + Aj |
| 17 | Polarization 2 | A + Aj, −A + Aj, A + Aj, −A − Aj, A − Aj, −A − Aj, A + Aj, A − Aj, A + Aj, −A − Aj, A + Aj, −A − Aj, A − Aj, A + Aj, −A − Aj, A − Aj, −A + Aj, A − Aj, A − Aj, A − Aj, A − Aj, A + Aj, A − Aj, A − Aj, A + Aj, −A + Aj, −A + Aj, A + Aj, A + Aj, A + Aj, A − Aj, −A + Aj, A + Aj, A − Aj, A + Aj, A + Aj, −A − Aj, −A − Aj, −A − Aj, −A + Aj, −A + Aj, −A − Aj, −A + Aj, A − Aj, −A − Aj, A − Aj, −A − Aj, −A − Aj, −A + Aj, A + Aj, A − Aj, −A + Aj, −A + Aj, −A − Aj, A + Aj, −A − Aj, −A − Aj, −A + Aj, −A − Aj, −A + Aj, −A + Aj, A + Aj, A − Aj, A − Aj, A − Aj, −A − Aj, −A + Aj, A − Aj, −A + Aj, A + Aj, −A − Aj, −A + Aj, A + Aj, A + Aj, −A − Aj, −A + Aj, −A + Aj, −A + Aj, −A − Aj, A − Aj, −A + Aj, −A − Aj, −A − Aj, A − Aj, −A + Aj, A + Aj, A + Aj, A − Aj, A + Aj, −A + Aj, A − Aj, −A − Aj, A + Aj, −A + Aj, −A − Aj, −A − Aj, −A + Aj, A − Aj, A + Aj, −A + Aj, −A − Aj, A − Aj, A + Aj, A − Aj |
| 18 | Polarization 1 | −A − Aj, −A + Aj, −A + Aj, A + Aj, A + Aj, A − Aj, A + Aj, A − Aj, A − Aj, −A + Aj, A − Aj, −A − Aj, −A + Aj, −A + Aj, −A − Aj, A − Aj, −A − Aj, A + Aj, A − Aj, −A − Aj, −A − Aj, A + Aj, −A − Aj, A + Aj, A − Aj, A − Aj, A − Aj, −A − Aj, A + Aj, A + Aj, −A + Aj, A − Aj, −A + Aj, −A − Aj, A − Aj, −A − Aj, −A + Aj, −A + Aj, −A + Aj, −A − Aj, A + Aj, A + Aj, A − Aj, −A + Aj, −A − Aj, −A + Aj, A − Aj, A − Aj, A + Aj, −A + Aj, A − Aj, −A − Aj, A + Aj, A + Aj, A + Aj, −A + Aj, −A − Aj, −A − Aj, A − Aj, A + Aj, −A − Aj, A − Aj, A + Aj, A + Aj, −A + Aj, A − Aj, A − Aj, −A + Aj, −A − Aj, −A − Aj, −A + Aj, A + Aj, −A − Aj, |

TABLE 30-1-continued

| Index | Polarization | Pilot sequence |
|---|---|---|
| | | −A + Aj, A + Aj, −A + Aj, −A + Aj, A + Aj, −A − Aj, −A + Aj, A − Aj, A + Aj, A − Aj, A + Aj, −A − Aj, −A − Aj, A − Aj, −A + Aj, −A − Aj, A − Aj, −A + Aj, A + Aj, A − Aj, −A + Aj, −A − Aj, A − Aj, A + Aj, −A − Aj, A + Aj, −A + Aj, −A − Aj, −A + Aj, A − Aj, A + Aj |
| | Polarization 2 | −A − Aj, A + Aj, A − Aj, −A + Aj, −A − Aj, A + Aj, −A + Aj, A + Aj, A + Aj, −A + Aj, −A + Aj, −A + Aj, −A − Aj, −A + Aj, −A − Aj, A + Aj, −A + Aj, −A − Aj, A − Aj, A + Aj, −A + Aj, −A + Aj, A − Aj, −A − Aj, −A + Aj, A + Aj, A + Aj, A + Aj, −A − Aj, A + Aj, −A + Aj, −A + Aj, A + Aj, −A + Aj, A + Aj, −A + Aj, A + Aj, A − Aj, A − Aj, −A − Aj, A − Aj, −A − Aj, −A − Aj, −A + Aj, −A + Aj, −A + Aj, A + Aj, A − Aj, −A + Aj, A − Aj, −A + Aj, A − Aj, −A − Aj, A + Aj, A − Aj, −A + Aj, A − Aj, −A − Aj, −A − Aj, A + Aj, A + Aj, A − Aj, −A − Aj, A − Aj, A − Aj, A − Aj, A − Aj, A − Aj, −A + Aj, −A − Aj, A − Aj, A − Aj, A − Aj, −A − Aj, −A + Aj, −A − Aj, −A − Aj, A − Aj, −A + Aj, A + Aj, A + Aj, A + Aj, A + Aj, A − Aj, A + Aj, −A + Aj, A + Aj, A + Aj, A − Aj, −A − Aj, A + Aj, −A − Aj, −A + Aj, A − Aj, A − Aj, −A − Aj, −A − Aj, −A − Aj, −A − Aj, A + Aj, −A + Aj, A − Aj, −A − Aj, −A − Aj |
| | Polarization 1 | −A − Aj, A + Aj, A − Aj, −A + Aj, −A − Aj, A + Aj, −A + Aj, A + Aj, A + Aj, −A + Aj, −A + Aj, −A + Aj, −A − Aj, −A + Aj, −A − Aj, A + Aj, −A + Aj, −A − Aj, A − Aj, A + Aj, −A + Aj, −A + Aj, A − Aj, −A − Aj, −A + Aj, A + Aj, A + Aj, A + Aj, −A − Aj, A + Aj, −A + Aj, −A + Aj, A + Aj, −A + Aj, A + Aj, −A + Aj, A + Aj, A − Aj, A − Aj, −A − Aj, A − Aj, −A − Aj, −A − Aj, −A + Aj, −A + Aj, −A + Aj, A + Aj, A − Aj, −A + Aj, A − Aj, −A + Aj, A − Aj, −A − Aj, A + Aj, A − Aj, −A + Aj, A − Aj, −A − Aj, −A − Aj, A + Aj, A + Aj, A − Aj, −A − Aj, A − Aj, A − Aj, A − Aj, A − Aj, A − Aj, −A + Aj, −A − Aj, A − Aj, A − Aj, A − Aj, −A − Aj, −A + Aj, −A − Aj, −A − Aj, A − Aj, −A + Aj, A + Aj, A + Aj, A + Aj, A + Aj, A − Aj, A + Aj, −A + Aj, A + Aj, A + Aj, A − Aj, −A − Aj, A + Aj, −A − Aj, −A + Aj, A − Aj, A − Aj, −A − Aj, −A − Aj, −A − Aj, −A − Aj, A + Aj, −A + Aj, A − Aj, −A − Aj, −A − Aj |
| | Polarization 2 | A + Aj, −A − Aj, −A − Aj, A − Aj, A + Aj, A + Aj, A + Aj, −A + Aj, A + Aj, −A + Aj, −A − Aj, A + Aj, −A − Aj, −A − Aj, A − Aj, A − Aj, −A + Aj, −A − Aj, −A + Aj, A + Aj, −A − Aj, −A − Aj, −A + Aj, A − Aj, −A + Aj, A + Aj, −A + Aj, −A + Aj, −A − Aj, −A + Aj, A + Aj, A − Aj, A + Aj, −A − Aj, A − Aj, −A + Aj, −A − Aj, −A − Aj, A − Aj, A − Aj, A − Aj, −A + Aj, A + Aj, A + Aj, −A − Aj, A − Aj, −A − Aj, A + Aj, −A + Aj, −A + Aj, A − Aj, A + Aj, −A − Aj, −A + Aj, A + Aj, A + Aj, A − Aj, A − Aj, −A − Aj, −A + Aj, −A + Aj, A − Aj, −A + Aj, −A + Aj, A + Aj, A − Aj, A + Aj, −A + Aj, −A − Aj, A − Aj, −A − Aj, −A − Aj, A + Aj, A − Aj, −A − Aj, A + Aj, A − Aj, A − Aj, A + Aj, A − Aj, −A − Aj, A + Aj, −A + Aj, A + Aj, −A + Aj, A − Aj, −A − Aj, −A + Aj, −A − Aj, A − Aj, −A + Aj, −A − Aj, A + Aj, A + Aj, −A − Aj, A − Aj, −A + Aj, −A + Aj, A − Aj, −A + Aj, A − Aj, A − Aj, −A − Aj, A + Aj |
| 19 | Polarization 1 | −A − Aj, A + Aj, A − Aj, −A + Aj, −A − Aj, A + Aj, −A + Aj, A + Aj, A + Aj, −A + Aj, −A + Aj, −A + Aj, −A − Aj, −A + Aj, −A − Aj, A + Aj, −A + Aj, −A − Aj, A − Aj, A + Aj, −A + Aj, −A + Aj, A − Aj, −A − Aj, −A + Aj, A + Aj, A + Aj, A + Aj, −A − Aj, A + Aj, −A + Aj, −A + Aj, A + Aj, −A + Aj, A + Aj, −A + Aj, A + Aj, A − Aj, A − Aj, −A − Aj, A − Aj, −A − Aj, −A − Aj, −A + Aj, −A + Aj, −A + Aj, A + Aj, A − Aj, −A + Aj, A − Aj, −A + Aj, A − Aj, −A − Aj, A + Aj, A − Aj, −A + Aj, A − Aj, −A − Aj, −A − Aj, A + Aj, A + Aj, A − Aj, −A − Aj, A − Aj, A − Aj, A − Aj, A − Aj, A − Aj, −A + Aj, −A − Aj, A − Aj, A − Aj, A − Aj, −A − Aj, −A + Aj, −A − Aj, −A − Aj, A − Aj, −A + Aj, A + Aj, A + Aj, A + Aj, A + Aj, A − Aj, A + Aj, −A + Aj, A + Aj, A + Aj, A − Aj, −A − Aj, A + Aj, −A − Aj, −A + Aj, A − Aj, A − Aj, −A − Aj, −A − Aj, −A − Aj, −A − Aj, A + Aj, −A + Aj, A − Aj, −A − Aj, −A − Aj |
| | Polarization 2 | A + Aj, A − Aj, −A − Aj, −A + Aj, −A + Aj, A + Aj, A + Aj, A − Aj, A + Aj, A − Aj, A − Aj, −A + Aj, A − Aj, −A − Aj, −A + Aj, −A + Aj, −A − Aj, A − Aj, −A − Aj, A + Aj, A − Aj, −A − Aj, −A − Aj, A + Aj, −A − Aj, A + Aj, A − Aj, A − Aj, A − Aj, −A − Aj, A + Aj, A + Aj, −A + Aj, A − Aj, −A + Aj, −A − Aj, A − Aj, −A − Aj, −A + Aj, −A + Aj, −A + Aj, −A − Aj, A + Aj, A + Aj, A − Aj, −A + Aj, −A − Aj, −A + Aj, A − Aj, A − Aj, A + Aj, −A + Aj, A − Aj, −A − Aj, A + Aj, A + Aj, A + Aj, −A + Aj, −A − Aj, −A − Aj, A − Aj, A + Aj, −A − Aj, A − Aj, A + Aj, A + Aj, −A + Aj, A − Aj, A − Aj, −A + Aj, −A − Aj, −A − Aj, −A + Aj, A + Aj, −A − Aj, −A + Aj, A + Aj, −A + Aj, −A + Aj, A + Aj, −A − Aj, −A + Aj, A − Aj, A + Aj, A − Aj, A + Aj, −A − Aj, −A − Aj, A − Aj, −A + Aj, −A − Aj, A − Aj, −A + Aj, A + Aj, A − Aj, −A + Aj, −A − Aj, A − Aj, A + Aj, −A − Aj, A + Aj, −A + Aj, −A − Aj, −A + Aj |
| 20 | Polarization 1 | −A − Aj, −A − Aj, −A + Aj, A − Aj, A + Aj, −A − Aj, −A − Aj, −A − Aj, −A − Aj, −A + Aj, −A + Aj, A − Aj, −A − Aj, A + Aj, −A − Aj, −A + Aj, A + Aj, A + Aj, A − Aj, A + Aj, −A + Aj, A + Aj, A + Aj, A + Aj, A + Aj, A − Aj, −A + Aj, −A − Aj, −A − Aj, A − Aj, −A − Aj, −A + Aj, −A + Aj, −A + Aj, −A − Aj, A − Aj, −A + Aj, −A + Aj, −A + Aj, −A + Aj, −A + Aj, −A − Aj, −A + Aj, A + Aj, A + Aj, −A − Aj, −A − Aj, −A + Aj, A − Aj, −A + Aj, A + Aj, −A − Aj, −A + Aj, A − Aj, −A + Aj, A − Aj, −A + Aj, A + Aj, A − Aj, A − Aj, A − Aj, −A − Aj, −A − Aj, −A + Aj, −A − Aj, −A + Aj, −A + Aj, A + Aj, A − Aj, A + Aj, A − Aj, A + Aj, A − Aj, A − Aj, A + Aj, −A − Aj, A + Aj, A + Aj, A + Aj, A − Aj, −A − Aj, −A + Aj, A − Aj, A − Aj, A + Aj, −A + Aj, −A − Aj, A − Aj, A + Aj, −A − Aj, A − Aj, −A − Aj, A − Aj, A − Aj, A − Aj, A + Aj, A + Aj, A − Aj, A + Aj, −A − Aj, A − Aj, −A + Aj, A + Aj, −A − Aj |
| 21 | Polarization 2 | A − Aj, −A − Aj, A − Aj, A + Aj, −A − Aj, A + Aj, −A + Aj, −A − Aj, A − Aj, −A + Aj, A + Aj, A − Aj, −A + Aj, −A − Aj, A − Aj, −A + Aj, −A − Aj, −A − Aj, A + Aj, −A + Aj, A + Aj, −A + Aj, A − Aj, −A − Aj, A + Aj, A − Aj, A − Aj, A + Aj, A − Aj, −A − Aj, A + Aj, A − Aj, −A − Aj, −A − Aj, A − Aj, −A + Aj, −A + Aj, A − Aj, A + Aj, A + Aj, −A + Aj, −A − Aj, A + Aj, −A + Aj, −A − Aj, −A − Aj, A − Aj, A + Aj, A + Aj, A + Aj, −A − Aj, −A + Aj, A − Aj, A + Aj, −A + Aj, −A + Aj, A − Aj, −A − Aj, A − Aj, −A + Aj, A + Aj, A + Aj, −A − Aj, A − Aj, A − Aj, A − Aj, −A − Aj, −A + Aj, −A − Aj, A − Aj, −A + Aj, A − Aj, A + Aj, A + Aj, −A − Aj, −A + Aj, −A + Aj, −A + Aj, A + Aj, −A − Aj, A + Aj, −A − Aj, −A − Aj, −A + Aj, A + Aj, −A − Aj, −A + Aj, −A − Aj, A − Aj, A − Aj, −A − Aj, −A + Aj, A − Aj, −A + Aj, −A + Aj, A + Aj, −A + Aj, A + Aj, A + Aj, A − Aj, A − Aj, −A − Aj, −A + Aj, A + Aj |
| | Polarization 1 | −A − Aj, −A − Aj, −A + Aj, A − Aj, A + Aj, −A − Aj, −A − Aj, −A − Aj, −A − Aj, −A + Aj, −A + Aj, A − Aj, −A − Aj, A + Aj, −A − Aj, −A + Aj, A + Aj, A + Aj, A − Aj, A + Aj, −A + Aj, A + Aj, A + Aj, A + Aj, A + Aj, A − Aj, −A + Aj, −A − Aj, −A − Aj, A − Aj, −A − Aj, −A + Aj, −A + Aj, −A + Aj, −A − Aj, A − Aj, −A + Aj, −A + Aj, −A + Aj, −A + Aj, −A + Aj, −A − Aj, −A + Aj, A + Aj, A + Aj, −A − Aj, −A − Aj, −A + Aj, A − Aj, −A + Aj, A + Aj, −A − Aj, −A + Aj, A − Aj, −A + Aj, A − Aj, −A + Aj, A + Aj, A − Aj, A − Aj, A − Aj, −A − Aj, −A − Aj, −A + Aj, −A − Aj, −A + Aj, −A + Aj, A + Aj, A − Aj, A + Aj, A − Aj, A + Aj, A − Aj, A − Aj, A + Aj, −A − Aj, A + Aj, A + Aj, A + Aj, A − Aj, −A − Aj, −A + Aj, A − Aj, A − Aj, A + Aj, −A + Aj, −A − Aj, A − Aj, A + Aj, −A − Aj, A − Aj, −A − Aj, A − Aj, A − Aj, A − Aj, A + Aj, A + Aj, A − Aj, A + Aj, −A − Aj, A − Aj, −A + Aj, A + Aj, −A − Aj |
| | Polarization 2 | A + Aj, −A − Aj, −A + Aj, −A + Aj, A − Aj, −A + Aj, A − Aj, A − Aj, −A + Aj, −A − Aj, A + Aj, A + Aj, −A − Aj, A − Aj, −A + Aj, −A − Aj, A − Aj, −A − Aj, −A + Aj, A − Aj, A + Aj, A − Aj, A + Aj, −A − Aj, −A + Aj, A + Aj, −A + Aj, −A + Aj, A + Aj, −A − Aj, −A + Aj, A + Aj, −A − Aj, −A − Aj, −A + Aj, −A − Aj, |

TABLE 30-1-continued

| Index | Polarization | Pilot sequence |
|---|---|---|
| | | A − Aj, A + Aj, −A + Aj, A + Aj, A − Aj, A − Aj, −A + Aj, A − Aj, A − Aj, −A − Aj, −A + Aj, −A + Aj, A + Aj, A + Aj, A − Aj, −A − Aj, A + Aj, −A + Aj, A − Aj, A − Aj, A + Aj, −A − Aj, −A + Aj, −A − Aj, A + Aj, A + Aj, A − Aj, −A + Aj, −A + Aj, −A + Aj, −A − Aj, −A − Aj, A − Aj, −A + Aj, −A − Aj, A + Aj, A + Aj, A + Aj, A − Aj, −A − Aj, A − Aj, A − Aj, A + Aj, A − Aj, −A + Aj, A − Aj, −A − Aj, −A − Aj, −A + Aj, A − Aj, −A − Aj, A − Aj, −A + Aj, −A + Aj, −A − Aj, −A − Aj, A + Aj, −A − Aj, A − Aj, A + Aj, A − Aj, A + Aj, A + Aj, A + Aj, −A + Aj, −A − Aj, −A − Aj, A + Aj |
| 22 | Polarization 1 | −A − Aj, −A − Aj, −A + Aj, A − Aj, A + Aj, −A − Aj, −A − Aj, −A − Aj, −A − Aj, −A + Aj, −A + Aj, A − Aj, −A − Aj, A + Aj, −A − Aj, −A + Aj, A + Aj, A + Aj, A − Aj, A + Aj, −A + Aj, A + Aj, A + Aj, A + Aj, A + Aj, A − Aj, −A + Aj, −A − Aj, −A − Aj, A − Aj, −A − Aj, −A + Aj, −A + Aj, −A + Aj, −A − Aj, A − Aj, −A + Aj, −A + Aj, −A + Aj, −A + Aj, −A + Aj, −A − Aj, −A + Aj, A + Aj, A + Aj, −A − Aj, −A − Aj, −A + Aj, A − Aj, −A + Aj, A + Aj, −A − Aj, −A + Aj, A − Aj, −A + Aj, A − Aj, −A + Aj, A + Aj, A − Aj, A − Aj, A − Aj, −A − Aj, −A − Aj, −A + Aj, −A − Aj, −A + Aj, −A + Aj, A + Aj, A − Aj, A + Aj, A − Aj, A + Aj, A − Aj, A − Aj, A + Aj, −A − Aj, A + Aj, A + Aj, A + Aj, A − Aj, −A − Aj, −A + Aj, A − Aj, A − Aj, A + Aj, −A + Aj, −A − Aj, A − Aj, A + Aj, −A − Aj, A − Aj, −A − Aj, A − Aj, A − Aj, A − Aj, A + Aj, A + Aj, A − Aj, A + Aj, −A − Aj, A − Aj, −A + Aj, A + Aj, −A − Aj |
| | Polarization 2 | A + Aj, −A + Aj, A − Aj, −A − Aj, A − Aj, A + Aj, −A − Aj, A + Aj, −A + Aj, −A − Aj, A − Aj, −A + Aj, A + Aj, A − Aj, −A + Aj, −A − Aj, A − Aj, −A + Aj, −A − Aj, −A − Aj, A + Aj, −A + Aj, A + Aj, −A + Aj, A − Aj, −A − Aj, A + Aj, A − Aj, A − Aj, A + Aj, A − Aj, −A − Aj, A + Aj, A − Aj, −A − Aj, −A − Aj, A − Aj, −A + Aj, −A + Aj, A − Aj, A + Aj, A + Aj, −A + Aj, −A − Aj, A + Aj, −A + Aj, −A − Aj, −A − Aj, A − Aj, A + Aj, A + Aj, A + Aj, −A − Aj, −A + Aj, A − Aj, A + Aj, −A + Aj, −A + Aj, A − Aj, −A − Aj, A − Aj, −A + Aj, A + Aj, A + Aj, −A − Aj, A − Aj, A − Aj, A − Aj, −A − Aj, −A + Aj, −A − Aj, A − Aj, −A + Aj, A − Aj, A + Aj, A + Aj, −A − Aj, −A + Aj, −A + Aj, −A + Aj, A + Aj, −A − Aj, A + Aj, −A − Aj, −A − Aj, −A + Aj, A + Aj, −A − Aj, −A + Aj, −A − Aj, A − Aj, A − Aj, −A − Aj, −A + Aj, A − Aj, −A + Aj, −A + Aj, A + Aj, −A + Aj, A + Aj, A + Aj, A − Aj, A − Aj, −A − Aj, |

TABLE 30-2

| Index | Polarization | Pilot sequence |
|---|---|---|
| 1 | Polarization 1 | −A − Aj, −A − Aj, −A + Aj, −A + Aj, −A − Aj, A + Aj, A + Aj, A − Aj, −A − Aj, −A + Aj, A + Aj, A + Aj, −A + Aj, A − Aj, A − Aj, A − Aj, −A − Aj, A − Aj, −A − Aj, −A − Aj, −A + Aj, A − Aj, −A − Aj, A − Aj, A − Aj, A + Aj, A + Aj, A − Aj, A − Aj, −A + Aj, A − Aj, A + Aj, −A − Aj, A + Aj, A + Aj, −A − Aj, −A − Aj, −A − Aj, −A + Aj, −A − Aj, −A − Aj, A + Aj, −A − Aj, A − Aj, A − Aj, A + Aj, −A − Aj, −A + Aj, −A − Aj, A − Aj, −A − Aj, A − Aj, A − Aj, −A − Aj, −A − Aj, −A − Aj, −A + Aj, A + Aj, A + Aj, −A + Aj, A + Aj, −A − Aj, A + Aj, −A + Aj, A + Aj, A − Aj, −A − Aj, A + Aj, A + Aj, −A − Aj, A + Aj, A + Aj, A + Aj, A + Aj, A − Aj, A − Aj, A − Aj, −A + Aj, −A + Aj, A + Aj, −A + Aj, A − Aj, A − Aj, A + Aj, A + Aj, −A + Aj, −A + Aj, A + Aj, −A + Aj, −A + Aj, −A + Aj, −A + Aj, −A − Aj, A + Aj, −A − Aj, A + Aj, A − Aj, A − Aj, −A + Aj, −A − Aj, A + Aj, −A + Aj, −A + Aj, A − Aj |
| | Polarization 2 | A + Aj, −A − Aj, −A − Aj, A + Aj, A − Aj, A − Aj, A + Aj, −A + Aj, −A + Aj, −A − Aj, −A + Aj, −A − Aj, −A − Aj, −A − Aj, A + Aj, −A − Aj, −A + Aj, −A + Aj, −A + Aj, A + Aj, A + Aj, −A + Aj, −A − Aj, A + Aj, −A + Aj, A − Aj, −A + Aj, A + Aj, A − Aj, −A − Aj, −A − Aj, −A − Aj, A − Aj, −A − Aj, −A + Aj, A − Aj, −A + Aj, −A + Aj, −A + Aj, A − Aj, −A − Aj, A − Aj, −A + Aj, −A − Aj, −A + Aj, −A + Aj, −A − Aj, −A − Aj, −A − Aj, −A − Aj, A + Aj, A + Aj, A − Aj, A + Aj, A − Aj, −A + Aj, A − Aj, A + Aj, A + Aj, −A − Aj, −A + Aj, A + Aj, A − Aj, −A + Aj, A + Aj, A + Aj, A + Aj, A + Aj, −A + Aj, −A + Aj, −A − Aj, A − Aj, A + Aj, A − Aj, A + Aj, −A + Aj, −A + Aj, A + Aj, A − Aj, A − Aj, A + Aj, A − Aj, A − Aj, A − Aj, A − Aj, A − Aj, −A + Aj, A − Aj, −A − Aj, A + Aj, −A + Aj, −A − Aj, A − Aj, −A + Aj, A − Aj, A − Aj, A + Aj, −A − Aj, A − Aj, A + Aj, −A − Aj, A + Aj, −A − Aj, A + Aj |
| 2 | Polarization 1 | −A − Aj, −A − Aj, −A + Aj, −A + Aj, −A − Aj, A + Aj, A + Aj, A − Aj, −A − Aj, −A + Aj, A + Aj, A + Aj, −A + Aj, A − Aj, A − Aj, A − Aj, −A − Aj, A − Aj, −A − Aj, −A − Aj, −A + Aj, A − Aj, −A − Aj, A − Aj, A − Aj, A + Aj, A + Aj, A − Aj, A − Aj, −A + Aj, A − Aj, A + Aj, −A − Aj, A + Aj, A + Aj, −A − Aj, −A − Aj, −A − Aj, −A + Aj, −A − Aj, −A − Aj, A + Aj, −A − Aj, A − Aj, A − Aj, A + Aj, −A − Aj, −A + Aj, −A − Aj, A − Aj, −A − Aj, A − Aj, A − Aj, −A − Aj, −A − Aj, −A − Aj, −A + Aj, A + Aj, A + Aj, −A + Aj, A + Aj, −A − Aj, A + Aj, −A + Aj, A + Aj, A − Aj, −A − Aj, A + Aj, A + Aj, −A − Aj, A + Aj, A + Aj, A + Aj, A + Aj, A − Aj, A − Aj, A − Aj, −A + Aj, −A + Aj, A + Aj, −A + Aj, A − Aj, A − Aj, A + Aj, A + Aj, −A + Aj, −A + Aj, A + Aj, −A + Aj, −A + Aj, −A + Aj, −A + Aj, −A − Aj, A + Aj, −A − Aj, A + Aj, A − Aj, A − Aj, −A + Aj, −A − Aj, A + Aj, −A + Aj, −A + Aj, A − Aj |
| | Polarization 2 | −A + Aj, A + Aj, A + Aj, A − Aj, A + Aj, −A + Aj, A − Aj, −A − Aj, −A − Aj, −A + Aj, −A + Aj, A + Aj, −A − Aj, −A + Aj, −A + Aj, A − Aj, −A − Aj, −A + Aj, A − Aj, A − Aj, A − Aj, A + Aj, −A + Aj, A − Aj, A + Aj, A + Aj, A + Aj, A − Aj, −A + Aj, −A + Aj, A + Aj, A − Aj, −A + Aj, −A − Aj, −A − Aj, −A + Aj, −A − Aj, A + Aj, −A − Aj, A − Aj, −A + Aj, −A − Aj, A − Aj, A − Aj, A − Aj, A + Aj, A − Aj, −A + Aj, A + Aj, −A − Aj, −A + Aj, A + Aj, A + Aj, A − Aj, −A − Aj, A − Aj, −A − Aj, A + Aj, A − Aj, −A − Aj, A + Aj, −A − Aj, A + Aj, −A + Aj, −A − Aj, −A + Aj, A − Aj, −A − Aj, −A + Aj, −A + Aj, −A + Aj, −A − Aj, −A − Aj, A + Aj, A + Aj, −A + Aj, −A − Aj, −A − Aj, A − Aj, −A − Aj, A − Aj, −A + Aj, A + Aj, A − Aj, A + Aj, A + Aj, A − Aj, −A + Aj, A − Aj, −A − Aj, −A − Aj, A − Aj, A − Aj, −A + Aj, A + Aj, A + Aj, −A − Aj, −A − Aj, A + Aj, A − Aj, A − Aj, A + Aj, −A + Aj, −A + Aj |
| 3 | Polarization 1 | −A + Aj, A − Aj, A − Aj, A + Aj, A − Aj, A + Aj, −A − Aj, A − Aj, −A + Aj, −A + Aj, A − Aj, −A − Aj, A + Aj, −A − Aj, A − Aj, A − Aj, A − Aj, A − Aj, A + Aj, A − Aj, A − Aj, A + Aj, A + Aj, −A + Aj, −A + Aj, A − Aj, A + Aj, A − Aj, A − Aj, −A + Aj, −A + Aj, −A + Aj, A + Aj, A + Aj, A + Aj, A + Aj, −A − Aj, A + Aj, A + Aj, −A − Aj, −A + Aj, A + Aj, A − Aj, A + Aj, −A − Aj, A + Aj, A − Aj, A + Aj, A + Aj, A − Aj, A − Aj, −A − Aj, −A − Aj, −A + Aj, −A + Aj, −A − Aj, −A + Aj, −A − Aj, A − Aj, −A − Aj, A + Aj, A + Aj, −A + Aj, −A − Aj, A + Aj, −A − Aj, −A − Aj, A − Aj, −A − Aj, −A − Aj, A + Aj, A + Aj, −A − Aj, A + Aj, −A + Aj, A − Aj, −A + Aj, −A + Aj, A + Aj, A + Aj, −A + Aj, −A + Aj, −A − Aj, A + Aj, A − Aj, −A − Aj, −A − Aj, −A + Aj, −A − Aj, −A + Aj, −A + Aj, −A + Aj, A − Aj, A − Aj, A + Aj, A − Aj, −A − Aj, −A + Aj, A + Aj, A + Aj, −A − Aj, A − Aj, A − Aj, −A − Aj, −A − Aj |

TABLE 30-2-continued

| Index | Polarization | Pilot sequence |
|---|---|---|
| | Polarization 2 | A − Aj, A − Aj, A + Aj, −A + Aj, −A + Aj, A + Aj, −A − Aj, −A − Aj, A + Aj, A + Aj, A − Aj, −A + Aj, A + Aj, −A − Aj, −A − Aj, −A + Aj, A − Aj, −A + Aj, A + Aj, A + Aj, −A + Aj, A + Aj, A − Aj, −A + Aj, −A − Aj, −A + Aj, −A − Aj, −A − Aj, A − Aj, A + Aj, A + Aj, −A − Aj, −A − Aj, A − Aj, A − Aj, A − Aj, A − Aj, −A + Aj, A − Aj, −A − Aj, A − Aj, A + Aj, −A − Aj, A + Aj, −A − Aj, −A + Aj, A + Aj, −A − Aj, A + Aj, −A − Aj, −A + Aj, A + Aj, A + Aj, A − Aj, −A − Aj, A − Aj, A − Aj, −A + Aj, A + Aj, −A + Aj, A + Aj, −A + Aj, −A − Aj, A − Aj, −A + Aj, −A − Aj, A + Aj, −A − Aj, A − Aj, −A − Aj, −A − Aj, A − Aj, A + Aj, A + Aj, A − Aj, A − Aj, −A + Aj, A + Aj, A + Aj, A + Aj, −A + Aj, A − Aj, A + Aj, −A + Aj, A + Aj, −A + Aj, A − Aj, −A − Aj, −A + Aj, A − Aj, A − Aj, −A − Aj, A + Aj, A − Aj, A − Aj, −A − Aj, A − Aj, −A + Aj, A − Aj, A + Aj, −A + Aj, A + Aj, A + Aj, A − Aj |
| 4 | Polarization 1 | −A + Aj, A − Aj, A − Aj, A + Aj, −A − Aj, A − Aj, −A + Aj, −A + Aj, A − Aj, −A − Aj, A + Aj, −A − Aj, A − Aj, A − Aj, A − Aj, A − Aj, A + Aj, A − Aj, A − Aj, A + Aj, A + Aj, −A + Aj, −A + Aj, A − Aj, A + Aj, A − Aj, A − Aj, −A + Aj, −A + Aj, −A + Aj, A + Aj, A + Aj, A + Aj, A + Aj, −A − Aj, A + Aj, A + Aj, −A − Aj, −A + Aj, A + Aj, A − Aj, A + Aj, −A − Aj, A + Aj, A − Aj, A + Aj, A + Aj, A − Aj, A − Aj, −A − Aj, −A − Aj, −A + Aj, −A + Aj, −A − Aj, −A + Aj, −A − Aj, A − Aj, −A − Aj, A + Aj, A + Aj, −A + Aj, −A − Aj, A + Aj, −A − Aj, −A − Aj, A − Aj, −A − Aj, −A − Aj, −A − Aj, A + Aj, A + Aj, −A − Aj, A + Aj, −A + Aj, A − Aj, −A + Aj, −A + Aj, A + Aj, A + Aj, −A + Aj, −A + Aj, −A − Aj, A + Aj, A − Aj, −A − Aj, −A − Aj, −A + Aj, −A − Aj, −A + Aj, −A + Aj, −A + Aj, A − Aj, A − Aj, A + Aj, A − Aj, −A − Aj, −A + Aj, A + Aj, A + Aj, −A − Aj, A − Aj, A − Aj, −A − Aj, −A − Aj |
| | Polarization 2 | A − Aj, A + Aj, −A + Aj, −A + Aj, A + Aj, −A − Aj, −A − Aj, A + Aj, A + Aj, A − Aj, −A + Aj, −A + Aj, −A − Aj, −A − Aj, −A + Aj, A − Aj, −A + Aj, A + Aj, A + Aj, −A + Aj, A + Aj, A − Aj, −A + Aj, −A − Aj, −A + Aj, −A − Aj, −A − Aj, A − Aj, A + Aj, A + Aj, −A − Aj, −A − Aj, A − Aj, A − Aj, A − Aj, −A − Aj, A + Aj, A − Aj, −A − Aj, A − Aj, A + Aj, −A − Aj, A + Aj, −A − Aj, −A + Aj, A + Aj, −A − Aj, −A + Aj, A − Aj, −A + Aj, A + Aj, A + Aj, A − Aj, −A − Aj, A − Aj, A − Aj, −A + Aj, A + Aj, −A + Aj, −A + Aj, A + Aj, −A − Aj, A − Aj, −A + Aj, −A − Aj, A + Aj, −A − Aj, A − Aj, −A − Aj, −A − Aj, A − Aj, −A + Aj, A + Aj, A − Aj, A − Aj, −A + Aj, A + Aj, A + Aj, A + Aj, −A + Aj, A − Aj, A + Aj, −A + Aj, −A + Aj, A + Aj, A − Aj, −A − Aj, −A + Aj, A − Aj, A − Aj, −A − Aj, A + Aj, A − Aj, A − Aj, −A − Aj, −A − Aj, A + Aj, A − Aj, A + Aj, −A + Aj, A + Aj, A + Aj, A − Aj, A − Aj, |

TABLE 30-3

| Index | Pilot sequence |
|---|---|
| 1 | −A − Aj, −A + Aj, A + Aj, −A + Aj, −A − Aj, A − Aj, A + Aj, −A + Aj, A + Aj, A + Aj, −A − Aj, A − Aj, −A + Aj, −A − Aj, A − Aj, A − Aj, −A − Aj, −A − Aj, A − Aj, A + Aj, −A − Aj, A − Aj, −A − Aj, −A + Aj, −A + Aj, A + Aj, A + Aj, A − Aj, −A + Aj, A + Aj, A + Aj, −A + Aj, A + Aj, A − Aj, −A + Aj, −A + Aj, −A − Aj, A + Aj, −A − Aj, −A + Aj, −A − Aj, A + Aj, −A + Aj, A − Aj, A + Aj, A − Aj, A − Aj, A − Aj, −A − Aj, A − Aj, −A + Aj, −A + Aj, A + Aj, −A + Aj, −A + Aj, A + Aj, −A − Aj, −A − Aj, −A − Aj, −A + Aj, A + Aj, A − Aj, A − Aj, A + Aj, −A + Aj, −A + Aj, −A − Aj, A − Aj, −A + Aj, A − Aj, −A + Aj, −A − Aj, A + Aj, A + Aj, A + Aj, −A + Aj, −A + Aj, −A + Aj, A + Aj, A − Aj, A + Aj, A − Aj, A − Aj, −A − Aj, A + Aj, −A − Aj, A − Aj, A − Aj, A − Aj, A + Aj, −A − Aj, −A − Aj, A + Aj, A + Aj, A − Aj, −A − Aj, A − Aj, −A − Aj, −A − Aj, −A − Aj, −A − Aj, A − Aj, A + Aj, A + Aj, |
| 2 | −A − Aj, A + Aj, A − Aj, −A − Aj, A − Aj, A + Aj, −A + Aj, −A − Aj, A − Aj, −A − Aj, −A − Aj, A + Aj, −A + Aj, A − Aj, A + Aj, −A + Aj, −A + Aj, A + Aj, A + Aj, −A + Aj, −A − Aj, A + Aj, −A + Aj, A + Aj, A − Aj, A − Aj, −A − Aj, −A − Aj, −A + Aj, A − Aj, −A − Aj, −A − Aj, A − Aj, −A − Aj, −A + Aj, A − Aj, A − Aj, A + Aj, −A − Aj, A + Aj, A − Aj, A + Aj, −A − Aj, A − Aj, A + Aj, −A − Aj, −A + Aj, −A + Aj, −A + Aj, A + Aj, −A + Aj, A − Aj, A − Aj, −A − Aj, A − Aj, A − Aj, −A − Aj, A + Aj, A + Aj, A + Aj, A − Aj, −A − Aj, −A + Aj, −A + Aj, −A − Aj, A − Aj, A − Aj, A + Aj, −A + Aj, A − Aj, −A + Aj, A − Aj, A + Aj, −A − Aj, −A − Aj, −A − Aj, A − Aj, A − Aj, A − Aj, −A − Aj, −A + Aj, −A − Aj, −A + Aj, −A + Aj, A + Aj, −A − Aj, A + Aj, A + Aj, −A + Aj, −A + Aj, −A − Aj, A + Aj, A + Aj, −A − Aj, −A − Aj, −A + Aj, A + Aj, −A + Aj, A + Aj, A + Aj, A + Aj, A + Aj, −A + Aj, A − Aj, |
| 3 | −A + Aj, A + Aj, −A + Aj, −A − Aj, A − Aj, A + Aj, −A + Aj, A + Aj, A + Aj, −A − Aj, A − Aj, −A + Aj, −A − Aj, A − Aj, A − Aj, −A − Aj, −A − Aj, A − Aj, A + Aj, −A − Aj, A − Aj, −A − Aj, −A + Aj, −A + Aj, A + Aj, A + Aj, A − Aj, −A + Aj, A + Aj, A + Aj, −A + Aj, A + Aj, A − Aj, −A + Aj, −A + Aj, −A − Aj, A + Aj, −A − Aj, −A + Aj, −A − Aj, A + Aj, −A + Aj, −A − Aj, A + Aj, A − Aj, A − Aj, A − Aj, −A − Aj, A − Aj, −A + Aj, −A + Aj, A + Aj, −A + Aj, −A + Aj, A + Aj, −A − Aj, −A − Aj, −A − Aj, −A + Aj, A + Aj, A − Aj, A − Aj, A + Aj, −A + Aj, −A + Aj, −A − Aj, A − Aj, −A + Aj, A − Aj, −A + Aj, −A − Aj, A + Aj, A + Aj, A + Aj, −A + Aj, −A + Aj, −A + Aj, A + Aj, A − Aj, A + Aj, A − Aj, A − Aj, −A − Aj, A + Aj, −A − Aj, A − Aj, A − Aj, A − Aj, A + Aj, −A − Aj, −A − Aj, A + Aj, A + Aj, A − Aj, −A − Aj, A − Aj, −A − Aj, −A − Aj, −A − Aj, −A − Aj, A − Aj, −A + Aj, A + Aj, −A − Aj, |
| 4 | A − Aj, −A − Aj, A − Aj, A + Aj, −A + Aj, −A − Aj, A − Aj, −A − Aj, −A − Aj, A + Aj, −A + Aj, A − Aj, A + Aj, −A + Aj, A + Aj, A + Aj, A + Aj, −A + Aj, −A − Aj, A + Aj, −A + Aj, A + Aj, A − Aj, A − Aj, −A − Aj, −A − Aj, −A + Aj, A − Aj, −A − Aj, −A − Aj, A − Aj, −A − Aj, −A + Aj, A − Aj, A − Aj, A + Aj, −A − Aj, A + Aj, A − Aj, A + Aj, −A − Aj, A − Aj, A + Aj, −A − Aj, −A + Aj, −A + Aj, −A + Aj, A + Aj, −A + Aj, A − Aj, A − Aj, −A − Aj, A − Aj, A − Aj, −A − Aj, A + Aj, A + Aj, A + Aj, A − Aj, −A − Aj, −A + Aj, −A + Aj, −A − Aj, A − Aj, A − Aj, A + Aj, −A + Aj, A − Aj, −A + Aj, A − Aj, A + Aj, −A − Aj, −A − Aj, −A − Aj, A − Aj, A − Aj, A − Aj, −A − Aj, −A + Aj, −A − Aj, −A + Aj, −A + Aj, A + Aj, −A − Aj, A + Aj, −A + Aj, −A + Aj, −A + Aj, −A − Aj, A + Aj, A + Aj, −A − Aj, −A − Aj, −A + Aj, A + Aj, −A + Aj, A + Aj, A + Aj, A + Aj, A + Aj, −A + Aj, A − Aj, −A − Aj, A + Aj, |
| 5 | A + Aj, −A − Aj, −A + Aj, A + Aj, −A + Aj, −A − Aj, A − Aj, A + Aj, −A + Aj, A + Aj, A + Aj, −A − Aj, A − Aj, −A + Aj, −A − Aj, A − Aj, A − Aj, −A − Aj, −A − Aj, A − Aj, A + Aj, −A − Aj, A − Aj, −A − Aj, −A + Aj, −A + Aj, A + Aj, A + Aj, A − Aj, A + Aj, A + Aj, A + Aj, −A + Aj, A + Aj, A − Aj, −A + Aj, −A + Aj, −A − Aj, A + Aj, −A − Aj, −A + Aj, −A − Aj, A + Aj, A + Aj, −A − Aj, A + Aj, A − Aj, A − Aj, A − Aj, −A − Aj, A − Aj, −A + Aj, −A + Aj, A + Aj, −A + Aj, −A + Aj, A + Aj, −A − Aj, −A − Aj, −A − Aj, −A + Aj, A + Aj, A − Aj, A − Aj, A + Aj, −A + Aj, −A + Aj, −A − Aj, A − Aj, −A + Aj, A − Aj, −A + Aj, A − Aj, A + Aj, A + Aj, A + Aj, −A + Aj, −A + Aj, −A + Aj, A + Aj, A − Aj, A + Aj, A − Aj, A − Aj, −A − Aj, A + Aj, −A − Aj, A − Aj, A − Aj, A − Aj, A + Aj, −A − Aj, −A − Aj, A + Aj, A + Aj, A − Aj, −A − Aj, A − Aj, −A − Aj, −A − Aj, −A − Aj, −A − Aj, A − Aj, −A + Aj, |
| 6 | A + Aj, A − Aj, −A − Aj, A − Aj, A + Aj, −A + Aj, −A − Aj, A − Aj, −A − Aj, −A − Aj, A + Aj, −A + Aj, A − Aj, A + Aj, A + Aj, −A + Aj, A + Aj, A + Aj, −A + Aj, −A − Aj, A + Aj, −A + Aj, A + Aj, A − Aj, A − Aj, −A − Aj, −A − Aj, −A + Aj, A − |

TABLE 30-3-continued

| Index | Pilot sequence |
|---|---|
| | Aj, −A − Aj, −A − Aj, A − Aj, −A − Aj, −A + Aj, A − Aj, A − Aj, A + Aj, −A − Aj, A + Aj, A − Aj, A + Aj, −A − Aj, A − Aj, A + Aj, −A − Aj, −A + Aj, −A + Aj, −A + Aj, A + Aj, −A + Aj, A − Aj, A − Aj, −A − Aj, A − Aj, A − Aj, −A − Aj, A + Aj, A + Aj, A + Aj, A − Aj, −A − Aj, −A + Aj, −A + Aj, −A − Aj, A − Aj, A − Aj, A + Aj, −A + Aj, A − Aj, −A + Aj, A − Aj, A + Aj, −A − Aj, −A − Aj, −A − Aj, A − Aj, A − Aj, A − Aj, −A − Aj, −A + Aj, −A − Aj, −A + Aj, −A + Aj, A + Aj, −A − Aj, A + Aj, A + Aj, −A + Aj, −A + Aj, −A − Aj, A + Aj, A + Aj, −A − Aj, −A − Aj, −A + Aj, A + Aj, −A + Aj, A + Aj, A + Aj, A + Aj, A + Aj, −A + Aj, A − Aj, −A − Aj, |

TABLE 30-4

| Index | Pilot sequence |
|---|---|
| 1 | −A − Aj, A − Aj, −A − Aj, −A + Aj, A + Aj, A − Aj, −A − Aj, A − Aj, A − Aj, −A + Aj, A + Aj, −A − Aj, −A + Aj, A + Aj, A + Aj, −A + Aj, −A + Aj, A + Aj, A − Aj, −A + Aj, A + Aj, −A + Aj, −A − Aj, −A − Aj, A − Aj, A − Aj, A + Aj, −A − Aj, A − Aj, A − Aj, −A − Aj, A − Aj, A + Aj, −A − Aj, −A − Aj, −A + Aj, A − Aj, −A + Aj, −A − Aj, −A + Aj, A − Aj, −A − Aj, A + Aj, A − Aj, A + Aj, A + Aj, A + Aj, −A + Aj, A + Aj, −A − Aj, −A − Aj, A − Aj, −A − Aj, −A − Aj, A − Aj, −A + Aj, A + Aj, −A + Aj, −A − Aj, A − Aj, A + Aj, A + Aj, A − Aj, −A − Aj, −A − Aj, −A + Aj, A + Aj, −A − Aj, A + Aj, −A − Aj, A + Aj, A − Aj, A − Aj, A − Aj, −A − Aj, −A − Aj, −A − Aj, A − Aj, A + Aj, A − Aj, A + Aj, A + Aj, −A + Aj, A − Aj, A + Aj, A + Aj, A + Aj, A + Aj, A − Aj, −A + Aj, −A + Aj, A − Aj, A − Aj, A + Aj, −A + Aj, A + Aj, −A + Aj, −A + Aj, A + Aj, −A + Aj, A + Aj, −A − Aj, A − Aj, −A + Aj, |
| 2 | −A + Aj, −A − Aj, A − Aj, −A − Aj, −A + Aj, A + Aj, A − Aj, −A − Aj, A − Aj, A − Aj, −A + Aj, A + Aj, −A − Aj, −A + Aj, A + Aj, A + Aj, −A + Aj, −A + Aj, A + Aj, A − Aj, −A + Aj, A + Aj, −A + Aj, −A − Aj, −A − Aj, A − Aj, A − Aj, A + Aj, A − Aj, A − Aj, A − Aj, −A − Aj, A − Aj, A + Aj, −A − Aj, −A − Aj, −A + Aj, A − Aj, −A + Aj, −A − Aj, −A + Aj, A − Aj, −A − Aj, −A + Aj, A − Aj, A + Aj, A + Aj, A + Aj, −A + Aj, A + Aj, −A − Aj, −A − Aj, A − Aj, −A − Aj, −A − Aj, A − Aj, A + Aj, −A + Aj, −A + Aj, −A − Aj, A − Aj, A + Aj, A + Aj, A − Aj, −A − Aj, −A − Aj, −A + Aj, A + Aj, −A − Aj, A + Aj, A − Aj, −A + Aj, A − Aj, A − Aj, A − Aj, −A − Aj, −A − Aj, −A − Aj, A − Aj, A + Aj, A − Aj, A + Aj, A + Aj, −A + Aj, A − Aj, −A + Aj, A + Aj, A + Aj, A + Aj, A − Aj, −A + Aj, −A + Aj, A − Aj, A − Aj, A + Aj, −A + Aj, A + Aj, −A + Aj, −A + Aj, A + Aj, −A + Aj, A + Aj, −A − Aj, A − Aj, |
| 3 | −A + Aj, A − Aj, A + Aj, −A + Aj, A + Aj, A − Aj, −A − Aj, −A + Aj, A + Aj, −A + Aj, −A + Aj, A − Aj, −A − Aj, A + Aj, A − Aj, −A − Aj, −A − Aj, A − Aj, A − Aj, −A − Aj, −A + Aj, A − Aj, −A − Aj, A − Aj, A + Aj, A + Aj, −A + Aj, −A + Aj, −A − Aj, A + Aj, −A + Aj, −A + Aj, A + Aj, −A + Aj, −A − Aj, A + Aj, A + Aj, A − Aj, −A + Aj, A − Aj, A + Aj, A − Aj, A + Aj, A + Aj, A − Aj, −A + Aj, −A − Aj, −A − Aj, −A − Aj, A − Aj, −A − Aj, A + Aj, A + Aj, −A + Aj, A + Aj, A + Aj, A + Aj, A − Aj, A − Aj, A − Aj, A + Aj, −A + Aj, −A − Aj, −A − Aj, −A + Aj, A + Aj, A + Aj, A − Aj, −A − Aj, A + Aj, −A − Aj, A + Aj, A − Aj, −A + Aj, −A + Aj, −A + Aj, A + Aj, A + Aj, A + Aj, −A + Aj, −A − Aj, −A + Aj, −A − Aj, −A − Aj, A − Aj, −A + Aj, A − Aj, −A − Aj, −A − Aj, −A − Aj, −A + Aj, A − Aj, A − Aj, −A + Aj, −A + Aj, −A − Aj, A − Aj, −A − Aj, A − Aj, A − Aj, A − Aj, A − Aj, −A − Aj, A + Aj, |
| 4 | A − Aj, −A + Aj, −A − Aj, A − Aj, −A − Aj, −A + Aj, A + Aj, A − Aj, −A − Aj, A − Aj, A − Aj, −A + Aj, A + Aj, −A − Aj, A + Aj, A + Aj, A + Aj, −A + Aj, −A + Aj, A + Aj, A − Aj, −A + Aj, A + Aj, −A + Aj, −A − Aj, −A − Aj, A − Aj, A − Aj, A + Aj, −A − Aj, A − Aj, A − Aj, −A − Aj, A − Aj, A + Aj, −A − Aj, −A − Aj, −A + Aj, A − Aj, −A + Aj, −A − Aj, −A + Aj, A − Aj, −A − Aj, −A + Aj, A − Aj, A + Aj, A + Aj, A + Aj, −A + Aj, A + Aj, −A − Aj, −A − Aj, A − Aj, −A − Aj, −A − Aj, A − Aj, −A + Aj, −A + Aj, −A + Aj, −A − Aj, A − Aj, A + Aj, A + Aj, A − Aj, −A − Aj, −A − Aj, −A + Aj, A + Aj, −A − Aj, A + Aj, A − Aj, −A + Aj, A − Aj, A − Aj, A − Aj, −A − Aj, −A − Aj, −A − Aj, A − Aj, A + Aj, A − Aj, A + Aj, A + Aj, −A + Aj, A − Aj, −A + Aj, A + Aj, A + Aj, A + Aj, A − Aj, −A + Aj, −A + Aj, A − Aj, A − Aj, A + Aj, −A + Aj, A + Aj, −A + Aj, −A + Aj, A + Aj, −A + Aj, A + Aj, −A − Aj, |
| 5 | A − Aj, A + Aj, −A + Aj, A + Aj, A − Aj, −A − Aj, −A + Aj, A + Aj, −A + Aj, −A + Aj, A − Aj, −A − Aj, A + Aj, A − Aj, A − Aj, −A − Aj, A − Aj, A − Aj, −A − Aj, −A + Aj, A − Aj, −A − Aj, A − Aj, A + Aj, A + Aj, −A + Aj, −A + Aj, −A − Aj, A + Aj, −A + Aj, −A + Aj, A + Aj, −A + Aj, −A − Aj, A + Aj, A + Aj, A − Aj, −A + Aj, A − Aj, A + Aj, A − Aj, −A + Aj, A + Aj, A − Aj, −A + Aj, −A − Aj, −A − Aj, −A − Aj, A − Aj, −A − Aj, A + Aj, A + Aj, −A + Aj, A + Aj, A + Aj, −A + Aj, A − Aj, A − Aj, A − Aj, A + Aj, −A + Aj, −A − Aj, −A − Aj, −A + Aj, A + Aj, A + Aj, A − Aj, −A − Aj, A + Aj, −A − Aj, A + Aj, A − Aj, −A + Aj, −A + Aj, −A + Aj, A + Aj, A + Aj, A + Aj, −A + Aj, −A − Aj, −A + Aj, −A − Aj, −A − Aj, A − Aj, −A + Aj, A − Aj, −A − Aj, −A − Aj, −A − Aj, −A + Aj, A − Aj, A − Aj, −A + Aj, −A + Aj, −A − Aj, A − Aj, −A − Aj, A − Aj, A − Aj, A − Aj, A − Aj, −A − Aj, A + Aj, −A + Aj, |
| 6 | A + Aj, −A + Aj, A + Aj, A − Aj, −A − Aj, −A + Aj, A + Aj, −A + Aj, −A + Aj, A − Aj, −A − Aj, A + Aj, A − Aj, −A − Aj, A − Aj, A − Aj, A − Aj, −A − Aj, −A + Aj, A − Aj, −A − Aj, A − Aj, A + Aj, A + Aj, −A + Aj, −A + Aj, −A − Aj, A + Aj, A + Aj, −A + Aj, A + Aj, −A + Aj, −A − Aj, A + Aj, A + Aj, A − Aj, −A + Aj, A − Aj, A + Aj, A − Aj, −A + Aj, A + Aj, A − Aj, −A + Aj, −A − Aj, −A − Aj, −A − Aj, A − Aj, −A − Aj, A + Aj, A + Aj, −A + Aj, A + Aj, A + Aj, −A + Aj, A − Aj, A − Aj, A − Aj, A + Aj, −A + Aj, −A − Aj, −A − Aj, −A + Aj, A + Aj, A + Aj, A − Aj, −A − Aj, A + Aj, −A − Aj, A + Aj, A − Aj, −A + Aj, −A + Aj, −A + Aj, A + Aj, A + Aj, A + Aj, −A + Aj, −A − Aj, −A + Aj, −A − Aj, −A − Aj, A − Aj, −A + Aj, A − Aj, −A − Aj, −A − Aj, −A − Aj, −A + Aj, A − Aj, A − Aj, −A + Aj, −A + Aj, −A − Aj, A − Aj, −A − Aj, A − Aj, A − Aj, A − Aj, A − Aj, −A − Aj, A + Aj, −A + Aj, A − Aj, |

TABLE 30-5

| Index | Pilot sequence |
|---|---|
| 1 | −A − Aj, −A + Aj, A − Aj, A + Aj, A + Aj, A + Aj, A + Aj, A − Aj, A + Aj, A − Aj, −A − Aj, −A − Aj, A + Aj, A + Aj, −A − Aj, A − Aj, A − Aj, A − Aj, A + Aj, −A − Aj, A + Aj, A − Aj, A − Aj, −A − Aj, A − Aj, −A − Aj, −A + Aj, −A + Aj, −A + Aj, −A − Aj, −A − Aj, −A − Aj, A + Aj, −A + Aj, A − Aj, −A + Aj, A − Aj, A + Aj, −A + Aj, −A + Aj, −A − Aj, A − Aj, A − Aj, −A − Aj, −A + Aj, A + Aj, A + Aj, A + Aj, −A − Aj, −A + Aj, −A + Aj, −A − Aj, −A + Aj, A + Aj, A − Aj, A + Aj, A − Aj, A − Aj, A − Aj, −A − Aj, A + Aj, −A + Aj, −A − Aj, A + Aj, −A + Aj, A + Aj, −A − |

TABLE 30-5-continued

| Index | Pilot sequence |
|---|---|
| | Aj, A + Aj, −A + Aj, −A + Aj, A − Aj, −A − Aj, −A + Aj, −A − Aj, −A − Aj, −A + Aj, A − Aj, −A − Aj, −A − Aj, A + Aj, −A + Aj, A + Aj, A − Aj, A + Aj, −A − Aj, A − Aj, A + Aj, A + Aj, A − Aj, A − Aj, A + Aj, −A + Aj, A − Aj, A + Aj, −A − Aj, −A − Aj, −A + Aj, −A − Aj, A − Aj, A + Aj, −A + Aj, −A − Aj, −A + Aj, A + Aj, |
| 2 | −A − Aj, A + Aj, A − Aj, −A + Aj, −A − Aj, −A − Aj, −A − Aj, −A − Aj, −A + Aj, −A − Aj, −A + Aj, A + Aj, A + Aj, A − Aj, −A − Aj, A + Aj, −A + Aj, −A + Aj, −A + Aj, −A − Aj, A + Aj, −A − Aj, −A + Aj, −A + Aj, A + Aj, −A + Aj, A + Aj, A − Aj, A − Aj, A − Aj, A + Aj, A + Aj, A + Aj, −A − Aj, A − Aj, −A + Aj, A − Aj, −A + Aj, −A − Aj, A − Aj, A − Aj, A + Aj, −A + Aj, −A + Aj, A + Aj, A − Aj, −A − Aj, −A − Aj, −A − Aj, A + Aj, A − Aj, A − Aj, A + Aj, A − Aj, A − Aj, −A + Aj, −A − Aj, −A + Aj, −A + Aj, −A + Aj, A + Aj, −A − Aj, A − Aj, A + Aj, −A − Aj, A − Aj, −A − Aj, A + Aj, −A − Aj, A − Aj, A − Aj, −A + Aj, A + Aj, A − Aj, A + Aj, A + Aj, A − Aj, −A + Aj, A + Aj, A + Aj, A − Aj, A − Aj, −A − Aj, −A + Aj, −A − Aj, A + Aj, −A + Aj, −A − Aj, −A − Aj, −A + Aj, −A + Aj, −A − Aj, A − Aj, A + Aj, −A − Aj, A + Aj, A + Aj, A − Aj, A + Aj, −A + Aj, −A − Aj, A − Aj, A + Aj, A − Aj, |
| 3 | −A + Aj, A − Aj, A + Aj, A + Aj, A + Aj, A + Aj, A − Aj, A + Aj, A − Aj, −A − Aj, −A − Aj, A + Aj, A + Aj, −A − Aj, A − Aj, A − Aj, A − Aj, A + Aj, −A − Aj, A + Aj, A − Aj, A − Aj, −A − Aj, A − Aj, −A − Aj, −A + Aj, −A + Aj, A + Aj, −A − Aj, −A − Aj, −A − Aj, A + Aj, −A + Aj, A − Aj, −A + Aj, A − Aj, A + Aj, −A + Aj, −A + Aj, −A − Aj, A − Aj, A − Aj, −A − Aj, −A + Aj, A + Aj, A + Aj, A + Aj, −A − Aj, −A + Aj, −A + Aj, −A − Aj, −A + Aj, −A + Aj, A − Aj, A + Aj, A − Aj, A − Aj, A − Aj, −A − Aj, A + Aj, −A + Aj, −A − Aj, A + Aj, −A + Aj, A + Aj, −A − Aj, A + Aj, −A + Aj, −A + Aj, A − Aj, −A − Aj, −A + Aj, −A − Aj, −A − Aj, −A + Aj, A − Aj, −A − Aj, −A − Aj, −A + Aj, −A + Aj, A + Aj, A − Aj, A + Aj, −A − Aj, A − Aj, A + Aj, A + Aj, A − Aj, A − Aj, A + Aj, −A + Aj, A − Aj, A + Aj, −A − Aj, −A − Aj, −A + Aj, −A − Aj, A − Aj, A + Aj, −A + Aj, −A − Aj, −A + Aj, A + Aj, −A − Aj, |
| 4 | A − Aj, −A + Aj, −A − Aj, −A − Aj, −A − Aj, −A − Aj, −A + Aj, −A − Aj, −A + Aj, A + Aj, A + Aj, −A − Aj, −A − Aj, A + Aj, −A + Aj, −A + Aj, −A + Aj, −A − Aj, A + Aj, −A − Aj, −A + Aj, −A + Aj, A + Aj, −A + Aj, A + Aj, A − Aj, A − Aj, A − Aj, A + Aj, A + Aj, A + Aj, −A − Aj, A − Aj, −A + Aj, A − Aj, −A + Aj, −A − Aj, A − Aj, A − Aj, A + Aj, −A + Aj, −A + Aj, A + Aj, A − Aj, −A − Aj, −A − Aj, −A − Aj, A + Aj, A − Aj, A − Aj, A + Aj, A − Aj, A − Aj, A + Aj, −A − Aj, −A + Aj, −A + Aj, −A + Aj, A + Aj, −A − Aj, A − Aj, A + Aj, −A − Aj, A − Aj, −A − Aj, A + Aj, A − Aj, A − Aj, A − Aj, −A + Aj, A + Aj, A − Aj, A + Aj, A + Aj, A − Aj, −A + Aj, A + Aj, A + Aj, A − Aj, A − Aj, A − Aj, −A + Aj, −A − Aj, A + Aj, −A + Aj, −A − Aj, −A − Aj, −A + Aj, −A + Aj, −A − Aj, A − Aj, −A + Aj, −A − Aj, A + Aj, A + Aj, A − Aj, A + Aj, −A + Aj, −A − Aj, A − Aj, A + Aj, A − Aj, −A − Aj, A + Aj, |
| 5 | A + Aj, −A − Aj, −A + Aj, A − Aj, A + Aj, A + Aj, A + Aj, A + Aj, A − Aj, A + Aj, A − Aj, −A − Aj, −A − Aj, A + Aj, A + Aj, −A − Aj, A − Aj, A − Aj, A − Aj, A + Aj, −A − Aj, A + Aj, A − Aj, A − Aj, −A − Aj, A − Aj, −A − Aj, A + Aj, −A + Aj, −A + Aj, −A − Aj, −A − Aj, −A − Aj, A + Aj, −A + Aj, A − Aj, −A + Aj, A − Aj, A + Aj, −A + Aj, A + Aj, −A − Aj, A − Aj, A − Aj, −A − Aj, −A + Aj, A + Aj, A + Aj, A + Aj, −A − Aj, −A + Aj, −A + Aj, −A − Aj, A + Aj, −A + Aj, A − Aj, A + Aj, A − Aj, A − Aj, A − Aj, −A − Aj, A + Aj, −A + Aj, −A − Aj, A + Aj, −A + Aj, A + Aj, −A − Aj, A + Aj, −A + Aj, −A + Aj, A − Aj, −A − Aj, −A + Aj, −A − Aj, −A − Aj, −A + Aj, A − Aj, −A − Aj, A − Aj, −A + Aj, −A + Aj, A + Aj, A − Aj, A + Aj, −A − Aj, A − Aj, A + Aj, A + Aj, A − Aj, A − Aj, A + Aj, A + Aj, A − Aj, A + Aj, −A − Aj, −A − Aj, −A + Aj, −A − Aj, A − Aj, A + Aj, −A + Aj, −A − Aj, −A + Aj, |
| 6 | A + Aj, A − Aj, −A + Aj, −A − Aj, −A − Aj, −A − Aj, −A − Aj, −A + Aj, −A − Aj, −A + Aj, A + Aj, A + Aj, −A − Aj, A − Aj, A + Aj, −A + Aj, −A + Aj, −A + Aj, −A − Aj, A + Aj, −A − Aj, −A + Aj, −A + Aj, A + Aj, −A + Aj, A + Aj, A − Aj, A − Aj, A − Aj, A + Aj, A + Aj, A + Aj, −A − Aj, A − Aj, −A + Aj, A − Aj, −A + Aj, −A − Aj, A − Aj, A − Aj, A + Aj, −A + Aj, −A + Aj, A + Aj, A − Aj, −A − Aj, −A − Aj, −A − Aj, A + Aj, A − Aj, A − Aj, A + Aj, A − Aj, A − Aj, −A + Aj, −A − Aj, −A + Aj, −A + Aj, −A + Aj, A + Aj, −A − Aj, A − Aj, A + Aj, −A − Aj, A − Aj, −A − Aj, A + Aj, −A − Aj, A − Aj, A − Aj, −A + Aj, A + Aj, A − Aj, A + Aj, A + Aj, A − Aj, −A + Aj, A + Aj, A + Aj, A − Aj, A − Aj, −A − Aj, −A + Aj, −A − Aj, A + Aj, −A + Aj, −A − Aj, −A − Aj, −A + Aj, −A + Aj, −A − Aj, A − Aj, −A + Aj, −A − Aj, A + Aj, A + Aj, A − Aj, A + Aj, −A + Aj, −A − Aj, A − Aj, A + Aj, A − Aj, −A − Aj, |

TABLE 30-6

| Index | Pilot sequence |
|---|---|
| 1 | −A − Aj, A + Aj, A − Aj, A − Aj, A − Aj, A − Aj, A + Aj, A − Aj, A + Aj, −A + Aj, −A + Aj, A − Aj, A − Aj, −A + Aj, A + Aj, A + Aj, A + Aj, A − Aj, −A + Aj, A − Aj, A + Aj, A + Aj, −A + Aj, A + Aj, −A + Aj, −A − Aj, −A − Aj, −A − Aj, −A + Aj, −A + Aj, −A + Aj, A − Aj, −A − Aj, A + Aj, −A − Aj, A + Aj, A − Aj, −A − Aj, −A − Aj, −A + Aj, A + Aj, A + Aj, −A + Aj, −A − Aj, A − Aj, A − Aj, A − Aj, −A + Aj, −A − Aj, −A − Aj, −A + Aj, −A − Aj, −A − Aj, A + Aj, A − Aj, A + Aj, A + Aj, A + Aj, −A + Aj, A − Aj, −A − Aj, −A + Aj, A − Aj, −A − Aj, A − Aj, −A + Aj, A − Aj, −A − Aj, −A − Aj, A + Aj, −A + Aj, −A − Aj, −A + Aj, −A + Aj, −A − Aj, A + Aj, −A + Aj, −A + Aj, −A − Aj, A − Aj, A − Aj, A + Aj, A − Aj, −A + Aj, A + Aj, A − Aj, A − Aj, A + Aj, A + Aj, A − Aj, −A − Aj, A + Aj, A − Aj, A + Aj, −A + Aj, −A − Aj, −A + Aj, A + Aj, A − Aj, −A − Aj, −A + Aj, −A − Aj, A − Aj, −A + Aj, |
| 2 | −A + Aj, −A − Aj, A + Aj, A − Aj, A − Aj, A − Aj, A − Aj, A + Aj, A − Aj, A + Aj, −A + Aj, −A + Aj, A − Aj, A − Aj, −A + Aj, A + Aj, A + Aj, A + Aj, A − Aj, −A + Aj, A − Aj, A + Aj, A + Aj, −A + Aj, A + Aj, −A + Aj, −A − Aj, A − Aj, −A − Aj, −A + Aj, −A + Aj, −A + Aj, A − Aj, −A − Aj, A + Aj, −A − Aj, A + Aj, A − Aj, −A − Aj, −A − Aj, A + Aj, A + Aj, A + Aj, −A + Aj, −A − Aj, A − Aj, A − Aj, A − Aj, −A + Aj, −A − Aj, −A − Aj, −A + Aj, −A − Aj, −A − Aj, A + Aj, A − Aj, A + Aj, A + Aj, A + Aj, −A + Aj, A − Aj, −A − Aj, −A + Aj, A − Aj, −A − Aj, A − Aj, −A + Aj, A − Aj, −A − Aj, −A − Aj, A + Aj, −A + Aj, −A − Aj, −A + Aj, −A + Aj, −A − Aj, A + Aj, −A + Aj, −A + Aj, −A − Aj, −A − Aj, A − Aj, A + Aj, A − Aj, −A + Aj, A + Aj, A − Aj, A − Aj, A + Aj, A + Aj, A − Aj, −A − Aj, A + Aj, A − Aj, A + Aj, −A + Aj, −A − Aj, −A + Aj, A + Aj, A − Aj, −A − Aj, −A + Aj, −A − Aj, A − Aj, |
| 3 | A − Aj, −A + Aj, −A − Aj, A + Aj, A − Aj, A − Aj, A − Aj, A − Aj, A + Aj, A − Aj, A + Aj, −A + Aj, −A + Aj, A − Aj, A − Aj, −A + Aj, A + Aj, A + Aj, A + Aj, A − Aj, −A + Aj, A − Aj, A + Aj, A + Aj, −A + Aj, A + Aj, −A + Aj, −A − Aj, −A − Aj, −A − Aj, −A + Aj, −A + Aj, −A + Aj, A − Aj, −A − Aj, A + Aj, −A − Aj, A + Aj, A − Aj, −A − Aj, −A − Aj, −A + Aj, A + Aj, A + Aj, −A + Aj, −A − Aj, A − Aj, A − Aj, A − Aj, −A + Aj, −A − Aj, −A − Aj, −A + Aj, −A − Aj, −A − Aj, A + Aj, A − Aj, A + Aj, A + Aj, A + Aj, −A + Aj, A − Aj, −A − Aj, −A + Aj, A − Aj, −A − Aj, A − Aj, A + Aj, A − Aj, −A − Aj, −A − Aj, A + Aj, −A + Aj, −A − Aj, −A + Aj, −A + Aj, −A − Aj, A + Aj, −A + Aj, −A + Aj, −A − Aj, −A − Aj, A − Aj, A + Aj, A − Aj, −A + Aj, A + Aj, A − Aj, A − Aj, A + Aj, A + Aj, A − Aj, −A − Aj, A + Aj, A − Aj, −A + Aj, −A + Aj, −A − Aj, −A + Aj, A + Aj, A − Aj, −A − Aj, −A + Aj, −A − Aj, |

TABLE 30-6-continued

| Index | Pilot sequence |
| --- | --- |
| 4 | A − Aj, −A + Aj, −A − Aj, A + Aj, A − Aj, A − Aj, A − Aj, A − Aj, A + Aj, A − Aj, A + Aj, −A + Aj, −A + Aj, A − Aj, A − Aj, −A + Aj, A + Aj, A + Aj, A + Aj, A − Aj, −A + Aj, A − Aj, A + Aj, A + Aj, −A + Aj, A + Aj, −A + Aj, −A − Aj, −A − Aj, −A − Aj, −A + Aj, −A + Aj, −A + Aj, A − Aj, −A − Aj, A + Aj, −A − Aj, A + Aj, A − Aj, −A − Aj, −A − Aj, −A + Aj, A + Aj, A + Aj, −A + Aj, −A − Aj, A − Aj, A − Aj, A − Aj, −A + Aj, −A − Aj, −A − Aj, −A + Aj, −A − Aj, −A − Aj, A + Aj, A − Aj, A + Aj, A + Aj, A + Aj, −A + Aj, A − Aj, −A − Aj, −A + Aj, A − Aj, −A − Aj, A − Aj, A + Aj, A − Aj, −A − Aj, −A − Aj, A + Aj, −A + Aj, −A − Aj, −A + Aj, −A + Aj, −A − Aj, A + Aj, −A + Aj, −A + Aj, −A − Aj, −A − Aj, A − Aj, A + Aj, A − Aj, −A + Aj, A + Aj, A − Aj, A − Aj, A + Aj, A + Aj, A − Aj, −A − Aj, A + Aj, A − Aj, −A + Aj, −A + Aj, −A − Aj, −A + Aj, A + Aj, A − Aj, −A − Aj, −A + Aj, −A − Aj, |
| 5 | A − Aj, A + Aj, −A − Aj, −A + Aj, −A + Aj, −A + Aj, −A + Aj, −A − Aj, −A + Aj, −A − Aj, A − Aj, A − Aj, −A + Aj, A + Aj, A − Aj, −A − Aj, −A − Aj, −A − Aj, −A + Aj, A − Aj, −A + Aj, −A − Aj, −A − Aj, A − Aj, −A − Aj, A − Aj, A + Aj, A + Aj, A + Aj, A − Aj, A − Aj, A − Aj, −A + Aj, A + Aj, −A − Aj, A + Aj, −A − Aj, −A + Aj, A + Aj, A + Aj, A − Aj, −A − Aj, −A − Aj, A − Aj, A + Aj, −A + Aj, −A + Aj, −A + Aj, A − Aj, A + Aj, A + Aj, A − Aj, A + Aj, A + Aj, −A − Aj, −A + Aj, −A − Aj, −A − Aj, −A − Aj, A − Aj, −A + Aj, A + Aj, A − Aj, −A + Aj, A + Aj, A + Aj, A − Aj, −A + Aj, A + Aj, A + Aj, −A − Aj, A − Aj, A + Aj, A − Aj, A − Aj, A + Aj, −A − Aj, A − Aj, A − Aj, A + Aj, A + Aj, −A + Aj, −A − Aj, −A + Aj, A − Aj, −A − Aj, −A + Aj, −A + Aj, −A − Aj, −A − Aj, −A + Aj, A + Aj, −A − Aj, −A + Aj, A − Aj, A − Aj, A + Aj, A − Aj, −A − Aj, −A + Aj, A + Aj, A − Aj, A + Aj, −A + Aj, |
| 6 | A + Aj, −A − Aj, −A + Aj, −A + Aj, −A + Aj, −A + Aj, −A − Aj, −A + Aj, −A − Aj, A − Aj, A − Aj, −A + Aj, −A + Aj, A − Aj, −A − Aj, −A − Aj, −A − Aj, −A + Aj, A − Aj, −A + Aj, −A − Aj, −A − Aj, A − Aj, −A − Aj, A − Aj, A + Aj, A + Aj, A + Aj, A − Aj, A − Aj, A − Aj, −A + Aj, A + Aj, −A − Aj, A + Aj, −A − Aj, −A + Aj, A + Aj, A + Aj, A − Aj, −A − Aj, −A − Aj, A − Aj, A + Aj, −A + Aj, −A + Aj, −A + Aj, A − Aj, A + Aj, A + Aj, A − Aj, A + Aj, A + Aj, −A − Aj, −A + Aj, −A − Aj, −A − Aj, −A − Aj, A − Aj, −A + Aj, A + Aj, A − Aj, −A + Aj, A + Aj, −A + Aj, A − Aj, A + Aj, A + Aj, A + Aj, −A − Aj, A − Aj, A + Aj, A − Aj, A − Aj, A + Aj, −A − Aj, A − Aj, A − Aj, A + Aj, A + Aj, A + Aj, −A − Aj, −A + Aj, A − Aj, −A − Aj, −A + Aj, −A + Aj, −A − Aj, −A − Aj, −A + Aj, A + Aj, −A − Aj, −A + Aj, A − Aj, A − Aj, A + Aj, A − Aj, −A − Aj, −A + Aj, A + Aj, A − Aj, A + Aj, −A + Aj, A − Aj, |

Third, there may be the following several possible training sequences, which can also ensure a relatively good cross-correlation between training sequences in the two polarization directions.

(1) It is assumed that $N_{TS}=6$, and the training sequence may be any item in Table 31.

TABLE 31

| Index | Polarization | Training sequence |
| --- | --- | --- |
| 1 | Polarization 1 | −A − Aj, −A + Aj, A + Aj, −A − Aj, A − Aj, A + Aj |
| | Polarization 2 | −A + Aj, −A + Aj, −A − Aj, A + Aj, A − Aj, A − Aj |
| 2 | Polarization 1 | −A + Aj, A + Aj, A − Aj, −A + Aj, −A − Aj, A − Aj |
| | Polarization 2 | −A − Aj, −A − Aj, A − Aj, −A + Aj, A + Aj, A + Aj |
| 3 | Polarization 1 | −A + Aj, A + Aj, A + Aj, −A − Aj, −A − Aj, A − Aj |
| | Polarization 2 | −A + Aj, −A − Aj, A − Aj, −A + Aj, A + Aj, A − Aj |
| 4 | Polarization 1 | −A + Aj, A + Aj, A − Aj, −A + Aj, −A − Aj, A − Aj |
| | Polarization 2 | −A + Aj, −A − Aj, −A − Aj, A + Aj, A + Aj, A − Aj |
| 5 | Polarization 1 | A − Aj, A + Aj, −A + Aj, A − Aj, −A − Aj, −A + Aj |
| | Polarization 2 | −A − Aj, −A − Aj, −A + Aj, A − Aj, A + Aj, A + Aj |
| 6 | Polarization 1 | A − Aj, A − Aj, −A − Aj, A + Aj, −A + Aj, −A + Aj |
| | Polarization 2 | −A − Aj, A − Aj, A + Aj, −A − Aj, −A + Aj, A + Aj |
| 7 | Polarization 1 | A − Aj, A + Aj, A + Aj, −A − Aj, −A − Aj, −A + Aj |
| | Polarization 2 | A − Aj, −A − Aj, −A + Aj, A − Aj, A + Aj, −A + Aj |
| 8 | Polarization 1 | A − Aj, A + Aj, −A + Aj, A − Aj, −A − Aj, −A + Aj |
| | Polarization 2 | A − Aj, −A − Aj, −A − Aj, A + Aj, A + Aj, −A + Aj |
| 9 | Polarization 1 | A − Aj, A − Aj, A + Aj, −A − Aj, −A + Aj, −A + Aj |
| | Polarization 2 | A + Aj, A − Aj, −A − Aj, A + Aj, −A + Aj, −A − Aj |

TABLE 31-continued

| Index | Polarization | Training sequence |
| --- | --- | --- |
| 10 | Polarization 1 | A + Aj, A − Aj, A − Aj, −A + Aj, −A + Aj, −A − Aj |
| | Polarization 2 | −A − Aj, A − Aj, A + Aj, −A − Aj, −A + Aj, A + Aj |
| 11 | Polarization 1 | A + Aj, A − Aj, −A − Aj, A + Aj, −A + Aj, −A − Aj |
| | Polarization 2 | −A − Aj, A − Aj, A − Aj, −A + Aj, −A + Aj, A + Aj |
| 12 | Polarization 1 | A + Aj, −A + Aj, −A + Aj, A − Aj, A − Aj, −A − Aj |
| | Polarization 2 | −A − Aj, −A + Aj, A + Aj, −A − Aj, A − Aj, A + Aj |
| 13 | Polarization 1 | A + Aj, −A + Aj, −A − Aj, A + Aj, A − Aj, −A − Aj |
| | Polarization 2 | −A − Aj, −A + Aj, −A + Aj, A − Aj, A − Aj, A + Aj |
| 14 | Polarization 1 | A + Aj, A + Aj, A − Aj, −A + Aj, −A − Aj, −A − Aj |
| | Polarization 2 | −A + Aj, −A − Aj, A − Aj, −A + Aj, A + Aj, A − Aj |
| 15 | Polarization 1 | A + Aj, −A + Aj, −A − Aj, A + Aj, A − Aj, −A − Aj |
| | Polarization 2 | −A + Aj, −A + Aj, A + Aj, −A − Aj, A − Aj, A − Aj |
| 16 | Polarization 1 | A + Aj, A + Aj, −A + Aj, A − Aj, −A − Aj, −A − Aj |
| | Polarization 2 | A − Aj, −A − Aj, −A + Aj, A − Aj, A + Aj, −A + Aj |

(2) When $N_{TS}=8$, the training sequence is one item in Table 32.

TABLE 32

| Index | Polarization | Training sequence |
| --- | --- | --- |
| 1 | Polarization 1 | A + Aj, A − Aj, A − Aj, −A + Aj, A + Aj, −A − Aj, −A + Aj, −A − Aj |
| | Polarization 2 | A − Aj, −A + Aj, A − Aj, A + Aj, A + Aj, −A − Aj, −A − Aj, −A + Aj |
| 2 | Polarization 1 | A + Aj, A − Aj, A − Aj, −A + Aj, A + Aj, −A − Aj, −A + Aj, −A − Aj |
| | Polarization 2 | A + Aj, −A − Aj, A + Aj, −A + Aj, −A + Aj, A − Aj, A − Aj, −A − Aj |

TABLE 32-continued

| Index | Polarization | Training sequence |
|---|---|---|
| 3 | Polarization 1 | A + Aj, A − Aj, A − Aj, −A + Aj, A + Aj, −A − Aj, −A + Aj, −A − Aj |
| | Polarization 2 | −A − Aj, A + Aj, −A − Aj, A − Aj, A − Aj, −A + Aj, −A + Aj, A + Aj |
| 4 | Polarization 1 | A + Aj, A − Aj, A − Aj, −A + Aj, A + Aj, −A − Aj, −A + Aj, −A − Aj |
| | Polarization 2 | −A + Aj, A − Aj, −A + Aj, −A − Aj, −A − Aj, A + Aj, A + Aj, A − Aj |
| 5 | Polarization 1 | A + Aj, A − Aj, A + Aj, −A − Aj, A − Aj, −A + Aj, −A + Aj, −A − Aj |
| | Polarization 2 | A − Aj, A + Aj, A + Aj, −A − Aj, −A − Aj, −A + Aj, A − Aj, −A + Aj |
| 6 | Polarization 1 | A + Aj, A − Aj, A + Aj, −A − Aj, A − Aj, −A + Aj, −A + Aj, −A − Aj |
| | Polarization 2 | A + Aj, −A + Aj, −A + Aj, A − Aj, A − Aj, −A − Aj, A + Aj, −A − Aj |
| 7 | Polarization 1 | A + Aj, A − Aj, A + Aj, −A − Aj, A − Aj, −A + Aj, −A + Aj, −A − Aj |
| | Polarization 2 | −A − Aj, A − Aj, A − Aj, −A + Aj, −A + Aj, A + Aj, −A − Aj, A + Aj |
| 8 | Polarization 1 | A + Aj, A − Aj, A + Aj, −A − Aj, A − Aj, −A + Aj, −A + Aj, −A − Aj |
| | Polarization 2 | −A + Aj, −A − Aj, −A − Aj, A + Aj, A + Aj, A − Aj, −A + Aj, A − Aj |
| 9 | Polarization 1 | A − Aj, A + Aj, A − Aj, −A + Aj, A + Aj, −A − Aj, −A − Aj, −A + Aj |
| | Polarization 2 | A + Aj, A − Aj, A − Aj, −A + Aj, −A + Aj, −A − Aj, A + Aj, −A − Aj |
| 10 | Polarization 1 | A − Aj, A + Aj, A − Aj, −A + Aj, A + Aj, −A − Aj, −A − Aj, −A + Aj |
| | Polarization 2 | A − Aj, −A − Aj, −A − Aj, A + Aj, A + Aj, −A + Aj, A − Aj, −A + Aj |
| 11 | Polarization 1 | A − Aj, A + Aj, A − Aj, −A + Aj, A + Aj, −A − Aj, −A − Aj, −A + Aj |
| | Polarization 2 | −A + Aj, A + Aj, A + Aj, −A − Aj, −A − Aj, A − Aj, −A + Aj, A − Aj |
| 12 | Polarization 1 | A − Aj, A + Aj, A − Aj, −A + Aj, A + Aj, −A − Aj, −A − Aj, −A + Aj |
| | Polarization 2 | −A − Aj, −A + Aj, −A + Aj, A − Aj, A − Aj, A + Aj, −A − Aj, A + Aj |
| 13 | Polarization 1 | A − Aj, A + Aj, A + Aj, −A − Aj, A − Aj, −A + Aj, −A − Aj, −A + Aj |
| | Polarization 2 | A + Aj, −A − Aj, A + Aj, A − Aj, A − Aj, −A + Aj, −A + Aj, −A − Aj |
| 14 | Polarization 1 | A − Aj, A + Aj, A + Aj, −A − Aj, A − Aj, −A + Aj, −A − Aj, −A + Aj |
| | Polarization 2 | A − Aj, −A + Aj, A − Aj, −A − Aj, −A − Aj, A + Aj, A + Aj, −A + Aj |
| 15 | Polarization 1 | A − Aj, A + Aj, A + Aj, −A − Aj, A − Aj, −A + Aj, −A − Aj, −A + Aj |
| | Polarization 2 | −A + Aj, A − Aj, −A + Aj, A + Aj, A + Aj, −A − Aj, −A − Aj, A − Aj |
| 16 | Polarization 1 | A − Aj, A + Aj, A + Aj, −A − Aj, A − Aj, −A + Aj, −A − Aj, −A + Aj |
| | Polarization 2 | −A − Aj, A + Aj, −A − Aj, −A + Aj, −A + Aj, A − Aj, A − Aj, A + Aj |
| 17 | Polarization 1 | A + Aj, −A − Aj, A + Aj, A − Aj, A − Aj, −A + Aj, −A + Aj, −A − Aj |
| | Polarization 2 | A + Aj, −A + Aj, −A + Aj, A − Aj, A + Aj, −A − Aj, A − Aj, −A − Aj |
| 18 | Polarization 1 | A + Aj, −A − Aj, A + Aj, A − Aj, A − Aj, −A + Aj, −A + Aj, −A − Aj |
| | Polarization 2 | −A − Aj, A − Aj, A − Aj, −A + Aj, −A − Aj, A + Aj, −A + Aj, A + Aj |
| 19 | Polarization 1 | A + Aj, −A − Aj, A + Aj, A − Aj, A − Aj, −A + Aj, −A + Aj, −A − Aj |
| | Polarization 2 | −A + Aj, −A − Aj, −A − Aj, A + Aj, −A + Aj, A − Aj, A + Aj, A − Aj |
| 20 | Polarization 1 | A − Aj, −A + Aj, A − Aj, A + Aj, A + Aj, −A − Aj, −A − Aj, −A + Aj |
| | Polarization 2 | A − Aj, −A − Aj, −A − Aj, A + Aj, A − Aj, −A + Aj, A + Aj, −A + Aj |
| 21 | Polarization 1 | A − Aj, −A + Aj, A − Aj, A + Aj, A + Aj, −A − Aj, −A − Aj, −A + Aj |
| | Polarization 2 | −A + Aj, A + Aj, A + Aj, −A − Aj, −A + Aj, A − Aj, −A − Aj, A − Aj |
| 22 | Polarization 1 | A − Aj, −A + Aj, A − Aj, A + Aj, A + Aj, −A − Aj, −A − Aj, −A + Aj |
| | Polarization 2 | −A − Aj, −A + Aj, −A + Aj, A − Aj, −A − Aj, A + Aj, A − Aj, A + Aj |
| 23 | Polarization 1 | A + Aj, A − Aj, A − Aj, −A + Aj, −A + Aj, −A − Aj, A + Aj, −A − Aj |
| | Polarization 2 | A + Aj, −A + Aj, A + Aj, −A − Aj, −A + Aj, A − Aj, A − Aj, −A − Aj |
| 24 | Polarization 1 | A + Aj, A − Aj, A − Aj, −A + Aj, −A + Aj, −A − Aj, A + Aj, −A − Aj |
| | Polarization 2 | −A − Aj, A − Aj, −A − Aj, A + Aj, A − Aj, −A + Aj, −A + Aj, A + Aj |
| 25 | Polarization 1 | A + Aj, A − Aj, A − Aj, −A + Aj, −A + Aj, −A − Aj, A + Aj, −A − Aj |
| | Polarization 2 | −A + Aj, −A − Aj, −A + Aj, A − Aj, −A − Aj, A + Aj, A + Aj, A − Aj |
| 26 | Polarization 1 | A − Aj, A + Aj, A + Aj, −A − Aj, −A − Aj, −A + Aj, A − Aj, −A + Aj |
| | Polarization 2 | A − Aj, −A − Aj, A − Aj, −A + Aj, −A − Aj, A + Aj, A + Aj, −A + Aj |
| 27 | Polarization 1 | A − Aj, A + Aj, A + Aj, −A − Aj, −A − Aj, −A + Aj, A − Aj, −A + Aj |
| | Polarization 2 | −A + Aj, A + Aj, −A + Aj, A − Aj, A + Aj, −A − Aj, −A − Aj, A − Aj |
| 28 | Polarization 1 | A − Aj, A + Aj, A + Aj, −A − Aj, −A − Aj, −A + Aj, A − Aj, −A + Aj |
| | Polarization 2 | −A − Aj, −A + Aj, −A − Aj, A + Aj, −A + Aj, A − Aj, A − Aj, A + Aj |
| 29 | Polarization 1 | A + Aj, −A + Aj, −A + Aj, A − Aj, A + Aj, −A − Aj, A − Aj, −A − Aj |
| | Polarization 2 | A − Aj, −A + Aj, A − Aj, −A − Aj, −A − Aj, A + Aj, A + Aj, −A + Aj |
| 30 | Polarization 1 | A + Aj, −A + Aj, −A + Aj, A − Aj, A + Aj, −A − Aj, A − Aj, −A − Aj |
| | Polarization 2 | −A + Aj, A − Aj, −A + Aj, A + Aj, A + Aj, −A − Aj, −A − Aj, A − Aj |
| 31 | Polarization 1 | A + Aj, −A + Aj, −A + Aj, A − Aj, A + Aj, −A − Aj, A − Aj, −A − Aj |
| | Polarization 2 | −A − Aj, A + Aj, −A − Aj, −A + Aj, −A + Aj, A − Aj, A − Aj, A + Aj |
| 32 | Polarization 1 | A + Aj, −A + Aj, −A + Aj, A − Aj, A − Aj, −A − Aj, A + Aj, −A − Aj |
| | Polarization 2 | A − Aj, −A − Aj, A − Aj, −A + Aj, −A − Aj, A + Aj, A + Aj, −A + Aj |
| 33 | Polarization 1 | A + Aj, −A + Aj, −A + Aj, A − Aj, A − Aj, −A − Aj, A + Aj, −A − Aj |
| | Polarization 2 | −A + Aj, A + Aj, −A + Aj, A − Aj, A + Aj, −A − Aj, −A − Aj, A − Aj |
| 34 | Polarization 1 | A + Aj, −A + Aj, −A + Aj, A − Aj, A − Aj, −A − Aj, A + Aj, −A − Aj |
| | Polarization 2 | −A − Aj, −A + Aj, −A − Aj, A + Aj, −A + Aj, A − Aj, A − Aj, A + Aj |
| 35 | Polarization 1 | A − Aj, −A − Aj, −A − Aj, A + Aj, A + Aj, −A + Aj, A − Aj, −A + Aj |
| | Polarization 2 | A + Aj, −A + Aj, A + Aj, −A − Aj, −A + Aj, A − Aj, A − Aj, −A − Aj |
| 36 | Polarization 1 | A − Aj, −A − Aj, −A − Aj, A + Aj, A + Aj, −A + Aj, A − Aj, −A + Aj |
| | Polarization 2 | −A − Aj, A − Aj, −A − Aj, A + Aj, A − Aj, −A + Aj, −A + Aj, A + Aj |
| 37 | Polarization 1 | A − Aj, −A − Aj, −A − Aj, A + Aj, A + Aj, −A + Aj, A − Aj, −A + Aj |
| | Polarization 2 | −A + Aj, −A − Aj, −A + Aj, A − Aj, −A − Aj, A + Aj, A + Aj, A − Aj |
| 38 | Polarization 1 | A − Aj, −A − Aj, −A − Aj, A + Aj, A − Aj, −A + Aj, A + Aj, −A + Aj |
| | Polarization 2 | A + Aj, −A − Aj, A + Aj, −A + Aj, −A + Aj, A − Aj, A − Aj, −A − Aj |
| 39 | Polarization 1 | A − Aj, −A − Aj, −A − Aj, A + Aj, A − Aj, −A + Aj, A + Aj, −A + Aj |
| | Polarization 2 | −A − Aj, A + Aj, −A − Aj, A − Aj, A − Aj, −A + Aj, −A + Aj, A + Aj |
| 40 | Polarization 1 | A − Aj, −A − Aj, −A − Aj, A + Aj, A − Aj, −A + Aj, A + Aj, −A + Aj |
| | Polarization 2 | −A + Aj, A − Aj, −A + Aj, −A − Aj, −A − Aj, A + Aj, A + Aj, A − Aj |

TABLE 32-continued

| Index | Polarization | Training sequence |
|---|---|---|
| 41 | Polarization 1 | A + Aj, −A + Aj, A + Aj, −A − Aj, −A + Aj, A − Aj, A − Aj, −A − Aj |
| | Polarization 2 | −A + Aj, A + Aj, A + Aj, −A − Aj, −A − Aj, A − Aj, −A + Aj, A − Aj |
| 42 | Polarization 1 | A + Aj, −A + Aj, A + Aj, −A − Aj, −A + Aj, A − Aj, A − Aj, −A − Aj |
| | Polarization 2 | −A − Aj, −A + Aj, −A + Aj, A − Aj, A − Aj, A + Aj, −A − Aj, A + Aj |
| 43 | Polarization 1 | A + Aj, −A − Aj, A + Aj, −A + Aj, −A + Aj, A − Aj, A − Aj, −A − Aj |
| | Polarization 2 | −A + Aj, A + Aj, A + Aj, −A − Aj, −A + Aj, A − Aj, −A − Aj, A − Aj |
| 44 | Polarization 1 | A + Aj, −A − Aj, A + Aj, −A + Aj, −A + Aj, A − Aj, A − Aj, −A − Aj |
| | Polarization 2 | −A − Aj, −A + Aj, −A + Aj, A − Aj, −A − Aj, A + Aj, A − Aj, A + Aj |
| 45 | Polarization 1 | A − Aj, −A + Aj, A − Aj, −A − Aj, −A − Aj, A + Aj, A + Aj, −A + Aj |
| | Polarization 2 | −A − Aj, A − Aj, A − Aj, −A + Aj, −A − Aj, A + Aj, −A + Aj, A + Aj |
| 46 | Polarization 1 | A − Aj, −A + Aj, A − Aj, −A − Aj, −A − Aj, A + Aj, A + Aj, −A + Aj |
| | Polarization 2 | −A + Aj, −A − Aj, −A − Aj, A + Aj, −A + Aj, A − Aj, A + Aj, A − Aj |
| 47 | Polarization 1 | A − Aj, −A − Aj, A − Aj, −A + Aj, −A − Aj, A + Aj, A + Aj, −A + Aj |
| | Polarization 2 | −A − Aj, A − Aj, A − Aj, −A + Aj, −A + Aj, A + Aj, −A − Aj, A + Aj |
| 48 | Polarization 1 | A − Aj, −A − Aj, A − Aj, −A + Aj, −A − Aj, A + Aj, A + Aj, −A + Aj |
| | Polarization 2 | −A + Aj, −A − Aj, −A − Aj, A + Aj, A + Aj, A − Aj, −A + Aj, A − Aj |
| 49 | Polarization 1 | −A + Aj, A + Aj, −A + Aj, A − Aj, A + Aj, −A − Aj, −A − Aj, A − Aj |
| | Polarization 2 | −A − Aj, A − Aj, A − Aj, −A + Aj, −A + Aj, A + Aj, −A − Aj, A + Aj |
| 50 | Polarization 1 | −A + Aj, A + Aj, −A + Aj, A − Aj, A + Aj, −A − Aj, −A − Aj, A − Aj |
| | Polarization 2 | −A + Aj, −A − Aj, −A − Aj, A + Aj, A + Aj, A − Aj, −A + Aj, A − Aj |
| 51 | Polarization 1 | −A + Aj, A − Aj, −A + Aj, A + Aj, A + Aj, −A − Aj, −A − Aj, A − Aj |
| | Polarization 2 | −A − Aj, A − Aj, A − Aj, −A + Aj, −A − Aj, A + Aj, −A + Aj, A + Aj |
| 52 | Polarization 1 | −A + Aj, A − Aj, −A + Aj, A + Aj, A + Aj, −A − Aj, −A − Aj, A − Aj |
| | Polarization 2 | −A + Aj, −A − Aj, −A − Aj, A + Aj, −A + Aj, A − Aj, A + Aj, A − Aj |
| 53 | Polarization 1 | −A − Aj, A + Aj, −A − Aj, A − Aj, A − Aj, −A + Aj, −A + Aj, A + Aj |
| | Polarization 2 | −A + Aj, A + Aj, A + Aj, −A − Aj, −A + Aj, A − Aj, −A − Aj, A − Aj |
| 54 | Polarization 1 | −A − Aj, A + Aj, −A − Aj, A − Aj, A − Aj, −A + Aj, −A + Aj, A + Aj |
| | Polarization 2 | −A − Aj, −A + Aj, −A + Aj, A − Aj, −A − Aj, A + Aj, A − Aj, A + Aj |
| 55 | Polarization 1 | −A − Aj, A − Aj, −A − Aj, A + Aj, A − Aj, −A + Aj, −A + Aj, A + Aj |
| | Polarization 2 | −A + Aj, A + Aj, A + Aj, −A − Aj, −A − Aj, A − Aj, −A + Aj, A − Aj |
| 56 | Polarization 1 | −A − Aj, A − Aj, −A − Aj, A + Aj, A − Aj, −A + Aj, −A + Aj, A + Aj |
| | Polarization 2 | −A − Aj, −A + Aj, −A + Aj, A − Aj, A − Aj, A + Aj, −A − Aj, A + Aj |
| 57 | Polarization 1 | −A + Aj, A + Aj, A + Aj, −A − Aj, −A + Aj, A − Aj, −A − Aj, A − Aj |
| | Polarization 2 | −A + Aj, A − Aj, −A + Aj, −A − Aj, −A − Aj, A + Aj, A + Aj, A − Aj |
| 58 | Polarization 1 | −A + Aj, A + Aj, A + Aj, −A − Aj, −A − Aj, A − Aj, −A + Aj, A − Aj |
| | Polarization 2 | −A + Aj, −A − Aj, −A + Aj, A − Aj, −A − Aj, A + Aj, A + Aj, A − Aj |
| 59 | Polarization 1 | −A − Aj, A − Aj, A − Aj, −A + Aj, −A + Aj, A + Aj, −A − Aj, A + Aj |
| | Polarization 2 | −A − Aj, −A + Aj, −A − Aj, A + Aj, −A + Aj, A − Aj, A − Aj, A + Aj |
| 60 | Polarization 1 | −A − Aj, A − Aj, A − Aj, −A + Aj, −A − Aj, A + Aj, −A + Aj, A + Aj |
| | Polarization 2 | −A − Aj, A + Aj, −A − Aj, −A + Aj, −A + Aj, A − Aj, A − Aj, A + Aj |
| 61 | Polarization 1 | −A + Aj, −A − Aj, −A − Aj, A + Aj, A + Aj, A − Aj, −A + Aj, A − Aj |
| | Polarization 2 | −A − Aj, −A + Aj, −A − Aj, A + Aj, −A + Aj, A − Aj, A − Aj, A + Aj |
| 62 | Polarization 1 | −A − Aj, −A + Aj, −A + Aj, A − Aj, A − Aj, A + Aj, −A − Aj, A + Aj |
| | Polarization 2 | −A + Aj, −A − Aj, −A + Aj, A − Aj, −A − Aj, A + Aj, A + Aj, A − Aj |
| 63 | Polarization 1 | −A + Aj, A − Aj, −A + Aj, −A − Aj, −A − Aj, A + Aj, A + Aj, A − Aj |
| | Polarization 2 | −A − Aj, −A + Aj, −A + Aj, A − Aj, −A − Aj, A + Aj, A − Aj, A + Aj |
| 64 | Polarization 1 | −A − Aj, A + Aj, −A − Aj, −A + Aj, −A + Aj, A − Aj, A − Aj, A + Aj |
| | Polarization 2 | −A + Aj, −A − Aj, −A − Aj, A + Aj, −A + Aj, A − Aj, A + Aj, A − Aj |

(3) When $N_{TS}$=10, the training sequence is one item in the following Table 33.

TABLE 33

| Index | Polarization | Training sequence |
|---|---|---|
| 1 | Polarization 1 | A + Aj, −A − Aj, A + Aj, A + Aj, A − Aj, A − Aj, −A + Aj, −A + Aj, −A − Aj, −A − Aj |
| | Polarization 2 | A − Aj, A − Aj, A + Aj, −A − Aj, −A + Aj, −A + Aj, A − Aj, −A + Aj, A + Aj, −A − Aj |
| 2 | Polarization 1 | A + Aj, −A − Aj, A + Aj, A + Aj, A − Aj, A − Aj, −A + Aj, −A + Aj, −A − Aj, −A − Aj |
| | Polarization 2 | −A + Aj, −A + Aj, −A − Aj, A + Aj, A − Aj, A − Aj, −A + Aj, A − Aj, −A − Aj, A + Aj |
| 3 | Polarization 1 | A − Aj, −A + Aj, A − Aj, A − Aj, A + Aj, A + Aj, −A − Aj, −A − Aj, −A + Aj, −A + Aj |
| | Polarization 2 | A + Aj, A + Aj, A − Aj, −A + Aj, −A − Aj, −A − Aj, A + Aj, −A − Aj, A − Aj, −A + Aj |
| 4 | Polarization 1 | A − Aj, −A + Aj, A − Aj, A − Aj, A + Aj, A + Aj, −A − Aj, −A − Aj, −A + Aj, −A + Aj |
| | Polarization 2 | −A − Aj, −A − Aj, −A + Aj, A − Aj, A + Aj, A + Aj, −A − Aj, A + Aj, −A + Aj, A − Aj |
| 5 | Polarization 1 | A − Aj, −A + Aj, A + Aj, −A − Aj, A + Aj, A + Aj, A − Aj, −A + Aj, −A − Aj, −A − Aj |
| | Polarization 2 | A − Aj, A − Aj, A + Aj, A + Aj, −A − Aj, −A − Aj, −A + Aj, −A + Aj, A − Aj, −A + Aj |
| 6 | Polarization 1 | A − Aj, −A + Aj, A + Aj, −A − Aj, A + Aj, A + Aj, A − Aj, −A + Aj, −A − Aj, −A − Aj |
| | Polarization 2 | −A + Aj, −A + Aj, −A − Aj, −A − Aj, A + Aj, A + Aj, A − Aj, A − Aj, −A + Aj, A − Aj |
| 7 | Polarization 1 | A + Aj, −A − Aj, A − Aj, −A + Aj, A − Aj, A − Aj, A + Aj, −A − Aj, −A + Aj, −A + Aj |
| | Polarization 2 | A + Aj, A + Aj, A − Aj, A − Aj, −A + Aj, −A + Aj, −A − Aj, −A − Aj, A + Aj, −A − Aj |
| 8 | Polarization 1 | A + Aj, −A − Aj, A − Aj, −A + Aj, A − Aj, A − Aj, A + Aj, −A − Aj, −A + Aj, −A + Aj |
| | Polarization 2 | −A − Aj, −A − Aj, −A + Aj, −A + Aj, A − Aj, A − Aj, A + Aj, A + Aj, −A − Aj, A + Aj |
| 9 | Polarization 1 | −A + Aj, A − Aj, A + Aj, −A − Aj, A + Aj, A + Aj, −A + Aj, A − Aj, −A − Aj, −A − Aj |
| | Polarization 2 | A − Aj, A − Aj, −A − Aj, −A − Aj, A + Aj, A + Aj, −A + Aj, −A + Aj, A − Aj, −A + Aj |
| 10 | Polarization 1 | −A + Aj, A − Aj, A + Aj, −A − Aj, A + Aj, A + Aj, −A + Aj, A − Aj, −A − Aj, −A − Aj |
| | Polarization 2 | −A + Aj, −A + Aj, A + Aj, A + Aj, −A − Aj, −A − Aj, A − Aj, A − Aj, −A + Aj, A − Aj |

TABLE 33-continued

| Index | Polarization | Training sequence |
|---|---|---|
| 11 | Polarization 1 | −A − Aj, A + Aj, A − Aj, −A + Aj, A − Aj, A − Aj, −A − Aj, A + Aj, −A + Aj, −A + Aj |
| | Polarization 2 | A + Aj, A + Aj, −A + Aj, −A + Aj, A − Aj, A − Aj, −A − Aj, −A − Aj, A + Aj, −A − Aj |
| 12 | Polarization 1 | −A − Aj, A + Aj, A − Aj, −A + Aj, A − Aj, A − Aj, −A − Aj, A + Aj, −A + Aj, −A + Aj |
| | Polarization 2 | −A − Aj, −A − Aj, A − Aj, A − Aj, −A + Aj, −A + Aj, A + Aj, A + Aj, −A − Aj, A + Aj |
| 13 | Polarization 1 | A + Aj, −A − Aj, A + Aj, A + Aj, −A + Aj, −A + Aj, A − Aj, A − Aj, −A − Aj, −A − Aj |
| | Polarization 2 | −A + Aj, −A + Aj, A + Aj, −A − Aj, A − Aj, A − Aj, −A + Aj, A − Aj, A + Aj, −A − Aj |
| 14 | Polarization 1 | A + Aj, −A − Aj, A + Aj, A + Aj, −A + Aj, −A + Aj, A − Aj, A − Aj, −A − Aj, −A − Aj |
| | Polarization 2 | A − Aj, A − Aj, −A − Aj, A + Aj, −A + Aj, −A + Aj, A − Aj, −A + Aj, −A − Aj, A + Aj |
| 15 | Polarization 1 | A − Aj, −A + Aj, A − Aj, A − Aj, −A − Aj, −A − Aj, A + Aj, A + Aj, −A + Aj, −A + Aj |
| | Polarization 2 | −A − Aj, −A − Aj, A − Aj, −A + Aj, A + Aj, A + Aj, −A − Aj, A + Aj, A − Aj, −A + Aj |
| 16 | Polarization 1 | A − Aj, −A + Aj, A − Aj, A − Aj, −A − Aj, −A − Aj, A + Aj, A + Aj, −A + Aj, −A + Aj |
| | Polarization 2 | A + Aj, A + Aj, −A + Aj, A − Aj, −A − Aj, −A − Aj, A + Aj, −A − Aj, −A + Aj, A − Aj |
| 17 | Polarization 1 | A + Aj, A + Aj, A − Aj, A − Aj, −A + Aj, −A + Aj, −A − Aj, −A − Aj, A + Aj, −A − Aj |
| | Polarization 2 | −A − Aj, A + Aj, −A + Aj, A − Aj, −A + Aj, −A + Aj, −A − Aj, A + Aj, A − Aj, A − Aj |
| 18 | Polarization 1 | A − Aj, A − Aj, A + Aj, A + Aj, −A − Aj, −A − Aj, −A + Aj, −A + Aj, A − Aj, −A + Aj |
| | Polarization 2 | −A + Aj, A − Aj, −A − Aj, A + Aj, −A − Aj, −A − Aj, −A + Aj, A − Aj, A + Aj, A + Aj |
| 19 | Polarization 1 | A + Aj, A + Aj, −A + Aj, −A + Aj, A − Aj, A − Aj, −A − Aj, −A − Aj, A + Aj, −A − Aj |
| | Polarization 2 | A + Aj, −A − Aj, −A + Aj, A − Aj, −A + Aj, −A + Aj, A + Aj, −A − Aj, A − Aj, A − Aj |
| 20 | Polarization 1 | A − Aj, A − Aj, −A − Aj, −A − Aj, A + Aj, A + Aj, −A + Aj, −A + Aj, A − Aj, −A + Aj |
| | Polarization 2 | A − Aj, −A + Aj, −A − Aj, A + Aj, −A − Aj, −A − Aj, A − Aj, −A + Aj, A + Aj, A + Aj |
| 21 | Polarization 1 | A − Aj, A − Aj, A + Aj, −A − Aj, −A + Aj, −A + Aj, A − Aj, −A + Aj, A + Aj, −A − Aj |
| | Polarization 2 | −A − Aj, A + Aj, −A − Aj, −A − Aj, −A + Aj, −A + Aj, A − Aj, A − Aj, A + Aj, A + Aj |
| 22 | Polarization 1 | A + Aj, A + Aj, A − Aj, −A + Aj, −A − Aj, −A − Aj, A + Aj, −A − Aj, A − Aj, −A + Aj |
| | Polarization 2 | −A + Aj, A − Aj, −A + Aj, −A + Aj, −A − Aj, −A − Aj, A + Aj, A + Aj, A − Aj, A − Aj |
| 23 | Polarization 1 | −A + Aj, −A + Aj, A + Aj, −A − Aj, A − Aj, A − Aj, −A + Aj, A − Aj, A + Aj, −A − Aj |
| | Polarization 2 | −A − Aj, A + Aj, −A − Aj, −A − Aj, A − Aj, A − Aj, −A + Aj, −A + Aj, A + Aj, A + Aj |
| 24 | Polarization 1 | −A − Aj, −A − Aj, A − Aj, −A + Aj, A + Aj, A + Aj, −A − Aj, A + Aj, A − Aj, −A + Aj |
| | Polarization 2 | −A + Aj, A − Aj, −A + Aj, −A + Aj, A + Aj, A + Aj, −A − Aj, −A − Aj, A − Aj, A − Aj |
| 25 | Polarization 1 | A + Aj, A + Aj, −A + Aj, A − Aj, −A − Aj, −A − Aj, A + Aj, −A − Aj, −A + Aj, A − Aj |
| | Polarization 2 | −A + Aj, A − Aj, −A + Aj, −A + Aj, A + Aj, A + Aj, −A − Aj, −A − Aj, A − Aj, A − Aj |
| 26 | Polarization 1 | A − Aj, A − Aj, −A − Aj, A + Aj, −A + Aj, −A + Aj, A − Aj, −A + Aj, −A − Aj, A + Aj |
| | Polarization 2 | −A − Aj, A + Aj, −A − Aj, −A − Aj, A − Aj, A − Aj, −A + Aj, −A + Aj, A + Aj, A + Aj |
| 27 | Polarization 1 | −A − Aj, −A − Aj, −A + Aj, A − Aj, A + Aj, A + Aj, −A − Aj, A + Aj, −A + Aj, A − Aj |
| | Polarization 2 | −A + Aj, A − Aj, −A + Aj, −A + Aj, −A − Aj, −A − Aj, A + Aj, A + Aj, A − Aj, A − Aj |
| 28 | Polarization 1 | −A + Aj, −A + Aj, −A − Aj, A + Aj, A − Aj, A − Aj, −A + Aj, A − Aj, −A − Aj, A + Aj |
| | Polarization 2 | −A − Aj, A + Aj, −A − Aj, −A − Aj, −A + Aj, −A + Aj, A − Aj, A − Aj, A + Aj, A + Aj |
| 29 | Polarization 1 | −A + Aj, −A + Aj, A + Aj, A + Aj, −A − Aj, −A − Aj, A − Aj, A − Aj, −A + Aj, A − Aj |
| | Polarization 2 | A − Aj, −A + Aj, −A − Aj, A + Aj, −A − Aj, −A − Aj, A − Aj, −A + Aj, A + Aj, A + Aj |
| 30 | Polarization 1 | −A − Aj, −A − Aj, A − Aj, A − Aj, −A + Aj, −A + Aj, A + Aj, A + Aj, −A − Aj, A + Aj |
| | Polarization 2 | A + Aj, −A − Aj, −A + Aj, A − Aj, −A + Aj, −A + Aj, A + Aj, −A − Aj, A − Aj, A − Aj |
| 31 | Polarization 1 | −A + Aj, −A + Aj, −A − Aj, −A − Aj, A + Aj, A + Aj, A − Aj, A − Aj, −A + Aj, A − Aj |
| | Polarization 2 | −A + Aj, A − Aj, −A − Aj, A + Aj, −A − Aj, −A − Aj, −A + Aj, A − Aj, A + Aj, A + Aj |
| 32 | Polarization 1 | −A − Aj, −A − Aj, −A + Aj, −A + Aj, A − Aj, A − Aj, A + Aj, A + Aj, −A − Aj, A + Aj |
| | Polarization 2 | −A − Aj, A + Aj, −A + Aj, A − Aj, −A + Aj, −A + Aj, −A − Aj, A + Aj, A − Aj, A − Aj |

(4) When $N_{TS}$=12, the training sequence is one item in the following Table 34.

TABLE 34

| Index | Polarization | Training sequence |
|---|---|---|
| 1 | Polarization 1 | A + Aj, A − Aj, −A + Aj, A − Aj, A + Aj, −A + Aj, A + Aj, A − Aj, −A − Aj, −A − Aj, −A + Aj, −A − Aj |
| | Polarization 2 | −A + Aj, −A − Aj, −A − Aj, A + Aj, A − Aj, A + Aj, A + Aj, −A + Aj, A − Aj, A − Aj, −A + Aj, −A − Aj |
| 2 | Polarization 1 | A + Aj, A − Aj, −A + Aj, A − Aj, A + Aj, −A + Aj, A + Aj, A − Aj, −A − Aj, −A − Aj, −A + Aj, −A − Aj |
| | Polarization 2 | A + Aj, −A + Aj, −A + Aj, A − Aj, −A − Aj, A − Aj, A − Aj, A + Aj, −A − Aj, −A − Aj, A + Aj, −A + Aj |
| 3 | Polarization 1 | A + Aj, A − Aj, −A + Aj, A − Aj, A + Aj, −A + Aj, A + Aj, A − Aj, −A − Aj, −A − Aj, −A + Aj, −A − Aj |
| | Polarization 2 | −A − Aj, A − Aj, A − Aj, −A + Aj, A + Aj, −A + Aj, −A + Aj, −A − Aj, A + Aj, A + Aj, −A − Aj,A − Aj |
| 4 | Polarization 1 | A + Aj, A − Aj, −A + Aj, A − Aj, A + Aj, −A + Aj, A + Aj, A − Aj, −A − Aj, −A − Aj, −A + Aj, −A − Aj |
| | Polarization 2 | A − Aj, A + Aj, A + Aj, −A − Aj, −A + Aj, −A − Aj, −A − Aj, A − Aj, −A + Aj, −A + Aj, A − Aj, A + Aj |
| 5 | Polarization 1 | A − Aj, A + Aj, −A − Aj, A + Aj, A − Aj, −A − Aj, A − Aj, A + Aj, −A + Aj, −A + Aj, −A − Aj, −A + Aj |
| | Polarization 2 | −A − Aj, −A + Aj, −A + Aj, A − Aj, A + Aj, A − Aj, A − Aj, −A − Aj, A + Aj, A + Aj, −A − Aj, −A + Aj |
| 6 | Polarization 1 | A − Aj, A + Aj, −A − Aj, A + Aj, A − Aj, −A − Aj, A − Aj, A + Aj, −A + Aj, −A + Aj, −A − Aj, −A + Aj |

TABLE 34-continued

| Index | Polarization | Training sequence |
|---|---|---|
| | Polarization 2 | A − Aj, −A − Aj, −A − Aj, A + Aj, −A + Aj, A + Aj, A + Aj, A − Aj, −A + Aj, −A + Aj, A − Aj, −A − Aj |
| 7 | Polarization 1 | A − Aj, A + Aj, −A − Aj, A + Aj, A − Aj, −A − Aj, A − Aj, A + Aj, −A + Aj, −A + Aj, −A − Aj, −A + Aj |
| | Polarization 2 | −A + Aj, A + Aj, A + Aj, −A − Aj, A − Aj, −A − Aj, −A − Aj, −A + Aj, A − Aj, A − Aj, −A + Aj, A + Aj |
| 8 | Polarization 1 | A − Aj, A + Aj, −A − Aj, A + Aj, A − Aj, −A − Aj, A − Aj, A + Aj, −A + Aj, −A + Aj, −A − Aj, −A + Aj |
| | Polarization 2 | A + Aj, A − Aj, A − Aj, −A + Aj, −A − Aj, −A + Aj, −A + Aj, A + Aj, −A − Aj, −A − Aj, A + Aj, A − Aj |
| 9 | Polarization 1 | −A + Aj, −A − Aj, A + Aj, A + Aj, −A − Aj, A − Aj, A − Aj, A + Aj, A − Aj, −A + Aj, −A + Aj, −A − Aj |
| | Polarization 2 | A − Aj, A + Aj, A − Aj, A − Aj, −A − Aj, −A + Aj, A + Aj, −A + Aj, −A − Aj, A + Aj, −A − Aj, −A + Aj |
| 10 | Polarization 1 | −A + Aj, −A − Aj, A + Aj, A + Aj, −A − Aj, A − Aj, A − Aj, A + Aj, A − Aj, −A + Aj, −A + Aj, −A − Aj |
| | Polarization 2 | A + Aj, −A + Aj, A + Aj, A + Aj, A − Aj, −A − Aj, −A + Aj, −A − Aj, A − Aj, −A + Aj, A − Aj, −A − Aj |
| 11 | Polarization 1 | −A + Aj, −A − Aj, A + Aj, A + Aj, −A − Aj, A − Aj, A − Aj, A + Aj, A − Aj, −A + Aj, −A + Aj, −A − Aj |
| | Polarization 2 | −A − Aj, A − Aj, −A − Aj, −A − Aj, −A + Aj, A + Aj, A − Aj, A + Aj, −A + Aj, A − Aj, −A + Aj, A + Aj |
| 12 | Polarization 1 | −A + Aj, −A − Aj, A + Aj, A + Aj, −A − Aj, A − Aj, A − Aj, A + Aj, A − Aj, −A + Aj, −A + Aj, −A − Aj |

TABLE 34-continued

| Index | Polarization | Training sequence |
|---|---|---|
| | Polarization 2 | −A + Aj, −A − Aj, −A + Aj, −A + Aj, A + Aj, A − Aj, −A − Aj, A − Aj, A + Aj, −A − Aj, A + Aj, A − Aj |
| 13 | Polarization 1 | −A − Aj, −A + Aj, A − Aj, A − Aj, −A + Aj, A + Aj, A + Aj, A − Aj, A + Aj, −A − Aj, −A − Aj, −A + Aj |
| | Polarization 2 | A + Aj, A − Aj, A + Aj, A + Aj, −A + Aj, −A − Aj, A − Aj, −A − Aj, −A + Aj, A − Aj, −A + Aj, −A − Aj |
| 14 | Polarization 1 | −A − Aj, −A + Aj, A − Aj, A − Aj, −A + Aj, A + Aj, A + Aj, A − Aj, A + Aj, −A − Aj, −A − Aj, −A + Aj |
| | Polarization 2 | A − Aj, −A − Aj, A − Aj, A − Aj, A + Aj, −A + Aj, −A − Aj, −A + Aj, A + Aj, −A − Aj, A + Aj, −A + Aj |
| 15 | Polarization 1 | −A − Aj, −A + Aj, A − Aj, A − Aj, −A + Aj, A + Aj, A + Aj, A − Aj, A + Aj, −A − Aj, −A − Aj, −A + Aj |
| | Polarization 2 | −A + Aj, A + Aj, −A + Aj, −A + Aj, −A − Aj, A − Aj, A + Aj, A − Aj, −A − Aj, A + Aj, −A − Aj, A − Aj |
| 16 | Polarization 1 | −A − Aj, −A + Aj, A − Aj, A − Aj, −A + Aj, A + Aj, A + Aj, A − Aj, A + Aj, −A − Aj, −A − Aj, −A + Aj |
| | Polarization 2 | −A − Aj, −A + Aj, −A − Aj, −A − Aj, A − Aj, A + Aj, −A + Aj, A + Aj, A − Aj, −A + Aj, A − Aj, A + Aj |
| 17 | Polarization 1 | A + Aj, A − Aj, A + Aj, A + Aj, −A + Aj, −A − Aj, A − Aj, −A − Aj, −A + Aj, A − Aj, −A + Aj, −A − Aj |
| | Polarization 2 | A − Aj, −A − Aj, A + Aj, A + Aj, −A − Aj, −A + Aj, −A + Aj, A + Aj, −A + Aj, A − Aj, A − Aj, −A − Aj |
| 18 | Polarization 1 | A + Aj, A − Aj, A + Aj, A + Aj, −A + Aj, −A − Aj, A − Aj, −A − Aj, −A + Aj, A − Aj, −A + Aj, −A − Aj |
| | Polarization 2 | −A + Aj, A + Aj, −A − Aj, −A − Aj, A + Aj, A − Aj, A − Aj, −A − Aj, A − Aj, −A + Aj, −A + Aj, A + Aj |
| 19 | Polarization 1 | A + Aj, A − Aj, A + Aj, A + Aj, −A + Aj, −A − Aj, A − Aj, −A − Aj, −A + Aj, A − Aj, −A + Aj, −A − Aj |
| | Polarization 2 | A + Aj, A − Aj, −A + Aj, −A + Aj, A − Aj, −A − Aj, −A − Aj, −A + Aj, −A − Aj, A + Aj, A + Aj, A − Aj |
| 20 | Polarization 1 | A − Aj, A + Aj, A − Aj, A − Aj, −A − Aj, −A + Aj, A + Aj, −A + Aj, −A − Aj, A + Aj, −A − Aj, −A + Aj |
| | Polarization 2 | A + Aj, −A + Aj, A − Aj, A − Aj, −A + Aj, −A − Aj, −A − Aj, A − Aj, −A − Aj, A + Aj, A + Aj, −A + Aj |
| 21 | Polarization 1 | A − Aj, A + Aj, A − Aj, A − Aj, −A − Aj, −A + Aj, A + Aj, −A + Aj, −A − Aj, A + Aj, −A − Aj, −A + Aj |
| | Polarization 2 | −A − Aj, A − Aj, −A + Aj, −A + Aj, A − Aj, A + Aj, A + Aj, −A + Aj, A + Aj, −A − Aj, −A − Aj, A − Aj |
| 22 | Polarization 1 | A − Aj, A + Aj, A − Aj, A − Aj, −A − Aj, −A + Aj, A + Aj, −A + Aj, −A − Aj, A + Aj, −A − Aj, −A + Aj |
| | Polarization 2 | A − Aj, A + Aj, −A − Aj, −A − Aj, A + Aj, −A + Aj, −A + Aj, −A − Aj, −A + Aj, A − Aj, A − Aj, A + Aj |
| 23 | Polarization 1 | −A + Aj, −A − Aj, −A − Aj, A + Aj, A − Aj, A + Aj, A + Aj, −A + Aj, A − Aj, A − Aj, −A + Aj, −A − Aj |
| | Polarization 2 | A − Aj, −A − Aj, A + Aj, −A − Aj, A − Aj, A + Aj, A − Aj, −A − Aj, −A + Aj, −A + Aj, A + Aj, −A + Aj |
| 24 | Polarization 1 | −A + Aj, −A − Aj, −A − Aj, A + Aj, A − Aj, A + Aj, A + Aj, −A + Aj, A − Aj, A − Aj, −A + Aj, −A − Aj |
| | Polarization 2 | −A + Aj, A + Aj, −A − Aj, A + Aj, −A + Aj, −A − Aj, −A + Aj, A + Aj, A − Aj, A − Aj, −A − Aj, A − Aj |
| 25 | Polarization 1 | −A + Aj, −A − Aj, −A − Aj, A + Aj, A − Aj, A + Aj, A + Aj, −A + Aj, A − Aj, A − Aj, −A + Aj, −A − Aj |
| | Polarization 2 | −A − Aj, −A + Aj, A − Aj, −A + Aj, −A − Aj, A − Aj, −A − Aj, −A + Aj, A + Aj, A + Aj, A − Aj, A + Aj |
| 26 | Polarization 1 | −A − Aj, −A + Aj, −A + Aj, A − Aj, A + Aj, A − Aj, A − Aj, −A − Aj, A + Aj, A + Aj, −A − Aj, −A + Aj |
| | Polarization 2 | A + Aj, −A + Aj, A − Aj, −A + Aj, A + Aj, A − Aj, A + Aj, −A + Aj, −A − Aj, −A − Aj, A − Aj, −A − Aj |
| 27 | Polarization 1 | −A − Aj, −A + Aj, −A + Aj, A − Aj, A + Aj, A − Aj, A − Aj, −A − Aj, A + Aj, A + Aj, −A − Aj, −A + Aj |
| | Polarization 2 | −A − Aj, A − Aj, −A + Aj, A − Aj, −A − Aj, −A + Aj, −A − Aj, A − Aj, A + Aj, A + Aj, −A + Aj, A + Aj |
| 28 | Polarization 1 | −A − Aj, −A + Aj, −A + Aj, A − Aj, A + Aj, A − Aj, A − Aj, −A − Aj, A + Aj, A + Aj, −A − Aj, −A + Aj |
| | Polarization 2 | −A + Aj, −A − Aj, A + Aj, −A − Aj, −A + Aj, A + Aj, −A + Aj, −A − Aj, A − Aj, A − Aj, A + Aj, A − Aj |
| 29 | Polarization 1 | A + Aj, −A + Aj, A − Aj, −A + Aj, A + Aj, A − Aj, A + Aj, −A + Aj, −A − Aj, −A − Aj, A − Aj, −A − Aj |
| | Polarization 2 | A − Aj, −A − Aj, −A − Aj, A + Aj, −A + Aj, A + Aj, A + Aj, A − Aj, −A + Aj, −A + Aj, A − Aj, −A − Aj |
| 30 | Polarization 1 | A + Aj, −A + Aj, A − Aj, −A + Aj, A + Aj, A − Aj, A + Aj, −A + Aj, −A − Aj, −A − Aj, A − Aj, −A − Aj |
| | Polarization 2 | −A + Aj, A + Aj, A + Aj, −A − Aj, A − Aj, −A − Aj, −A − Aj, −A + Aj, A − Aj, A − Aj, −A + Aj, A + Aj |
| 31 | Polarization 1 | A + Aj, −A + Aj, A − Aj, −A + Aj, A + Aj, A − Aj, A + Aj, −A + Aj, −A − Aj, −A − Aj, A − Aj, −A − Aj |
| | Polarization 2 | A + Aj, A − Aj, A − Aj, −A + Aj, −A − Aj, −A + Aj, −A + Aj, A + Aj, −A − Aj, −A − Aj, A + Aj, A − Aj |
| 32 | Polarization 1 | A − Aj, −A − Aj, A + Aj, −A − Aj, A − Aj, A + Aj, A − Aj, −A − Aj, −A + Aj, −A + Aj, A + Aj, −A + Aj |
| | Polarization 2 | A + Aj, −A + Aj, −A + Aj, A − Aj, −A − Aj, A − Aj, A − Aj, A + Aj, −A − Aj, −A − Aj, A + Aj, −A + Aj |
| 33 | Polarization 1 | A − Aj, −A − Aj, A + Aj, −A − Aj, A − Aj, A + Aj, A − Aj, −A − Aj, −A + Aj, −A + Aj, A + Aj, −A + Aj |
| | Polarization 2 | −A − Aj, A − Aj, A − Aj, −A + Aj, A + Aj, −A + Aj, −A + Aj, −A − Aj, A + Aj, A + Aj, −A − Aj, A − Aj |
| 34 | Polarization 1 | A − Aj, −A − Aj, A + Aj, −A − Aj, A − Aj, A + Aj, A − Aj, −A − Aj, −A + Aj, −A + Aj, A + Aj, −A + Aj |
| | Polarization 2 | A − Aj, A + Aj, A + Aj, −A − Aj, −A + Aj, −A − Aj, −A − Aj, A − Aj, −A + Aj, −A + Aj, A − Aj, A + Aj |
| 35 | Polarization 1 | A − Aj, −A − Aj, −A − Aj, A + Aj, −A + Aj, A + Aj, A + Aj, A − Aj, −A + Aj, −A + Aj, A − Aj, −A − Aj |
| | Polarization 2 | −A − Aj, A − Aj, −A + Aj, A − Aj, −A − Aj, −A + Aj, −A − Aj, A − Aj, A + Aj, A + Aj, −A + Aj, A + Aj |
| 36 | Polarization 1 | A − Aj, −A − Aj, −A − Aj, A + Aj, −A + Aj, A + Aj, A + Aj, A − Aj, −A + Aj, −A + Aj, A − Aj, −A − Aj |
| | Polarization 2 | −A + Aj, −A − Aj, A + Aj, −A − Aj, −A + Aj, A + Aj, −A + Aj, −A − Aj, A − Aj, A − Aj, A + Aj, A − Aj |
| 37 | Polarization 1 | A + Aj, −A + Aj, −A + Aj, A − Aj, −A − Aj, A − Aj, A − Aj, A + Aj, −A − Aj, −A − Aj, A + Aj, −A + Aj |
| | Polarization 2 | −A + Aj, A + Aj, −A − Aj, A + Aj, −A + Aj, −A − Aj, −A + Aj, A + Aj, A − Aj, A − Aj, −A − Aj, A − Aj |
| 38 | Polarization 1 | A + Aj, −A + Aj, −A + Aj, A − Aj, −A − Aj, A − Aj, A − Aj, A + Aj, −A − Aj, −A − Aj, A + Aj, −A + Aj |
| | Polarization 2 | −A − Aj, −A + Aj, A − Aj, −A + Aj, −A − Aj, A − Aj, −A − Aj, −A + Aj, A + Aj, A + Aj, A − Aj, A + Aj |
| 39 | Polarization 1 | A + Aj, −A + Aj, A + Aj, A + Aj, A − Aj, −A − Aj, −A + Aj, −A − Aj, A − Aj, −A + Aj, A − Aj, −A − Aj |
| | Polarization 2 | A + Aj, −A + Aj, A − Aj, A − Aj, −A + Aj, −A − Aj, −A − Aj, A − Aj, −A − Aj, A + Aj, A + Aj, −A + Aj |
| 40 | Polarization 1 | A + Aj, −A + Aj, A + Aj, A + Aj, A − Aj, −A − Aj, −A + Aj, −A − Aj, A − Aj, −A + Aj, A − Aj, −A − Aj |
| | Polarization 2 | −A − Aj, A − Aj, −A + Aj, −A + Aj, A − Aj, A + Aj, A + Aj, −A + Aj, A + Aj, −A − Aj, −A − Aj, A − Aj |
| 41 | Polarization 1 | A + Aj, −A + Aj, A + Aj, A + Aj, A − Aj, −A − Aj, −A + Aj, −A − Aj, A − Aj, −A + Aj, A − Aj, −A − Aj |
| | Polarization 2 | A − Aj, A + Aj, −A − Aj, −A − Aj, A + Aj, −A + Aj, −A + Aj, −A − Aj, −A + Aj, A − Aj, A − Aj, A + Aj |
| 42 | Polarization 1 | A − Aj, −A − Aj, A − Aj, A − Aj, A + Aj, −A + Aj, −A − Aj, −A + Aj, A + Aj, −A − Aj, A + Aj, −A + Aj |
| | Polarization 2 | A − Aj, −A − Aj, A + Aj, A + Aj, −A − Aj, −A + Aj, −A + Aj, A + Aj, −A + Aj, A − Aj, A − Aj, −A − Aj |
| 43 | Polarization 1 | A − Aj, −A − Aj, A − Aj, A − Aj, A + Aj, −A + Aj, −A − Aj, −A + Aj, A + Aj, −A − Aj, A + Aj, −A + Aj |
| | Polarization 2 | −A + Aj, A + Aj, −A − Aj, −A − Aj, A + Aj, A − Aj, A − Aj, −A − Aj, A − Aj, −A + Aj, −A + Aj, A + Aj |
| 44 | Polarization 1 | A − Aj, −A − Aj, A − Aj, A − Aj, A + Aj, −A + Aj, −A − Aj, −A + Aj, A + Aj, −A − Aj, A + Aj, −A + Aj |
| | Polarization 2 | A + Aj, A − Aj, −A + Aj, −A + Aj, A − Aj, −A − Aj, −A − Aj, −A + Aj, −A − Aj, A + Aj, A + Aj, A − Aj |
| 45 | Polarization 1 | A − Aj, −A − Aj, A + Aj, A + Aj, −A − Aj, −A + Aj, −A + Aj, A + Aj, −A + Aj, A − Aj, A − Aj, −A − Aj |
| | Polarization 2 | −A + Aj, A + Aj, −A + Aj, −A + Aj, −A − Aj, A − Aj, A + Aj, A − Aj, −A − Aj, A + Aj, −A − Aj, A − Aj |
| 46 | Polarization 1 | A − Aj, −A − Aj, A + Aj, A + Aj, −A − Aj, −A + Aj, −A + Aj, A + Aj, −A + Aj, A − Aj, A − Aj, −A − Aj |
| | Polarization 2 | −A − Aj, −A + Aj, −A − Aj, −A − Aj, A − Aj, A + Aj, −A + Aj, A + Aj, A − Aj, −A + Aj, A − Aj, A + Aj |
| 47 | Polarization 1 | A + Aj, −A + Aj, A − Aj, A − Aj, −A + Aj, −A − Aj, −A − Aj, A − Aj, −A − Aj, A + Aj, A + Aj, −A + Aj |
| | Polarization 2 | −A − Aj, A − Aj, −A − Aj, −A − Aj, −A + Aj, A + Aj, A − Aj, A + Aj, −A + Aj, A − Aj, −A + Aj, A + Aj |
| 48 | Polarization 1 | A + Aj, −A + Aj, A − Aj, A − Aj, −A + Aj, −A − Aj, −A − Aj, A − Aj, −A − Aj, A + Aj, A + Aj, −A + Aj |
| | Polarization 2 | −A + Aj, −A − Aj, −A + Aj, −A + Aj, A + Aj, A − Aj, −A − Aj, A − Aj, A + Aj, −A − Aj, A + Aj, A − Aj |
| 49 | Polarization 1 | −A − Aj, A − Aj, −A + Aj, −A + Aj, A − Aj, A + Aj, A + Aj, −A + Aj, A + Aj, −A − Aj, −A − Aj, A − Aj |
| | Polarization 2 | −A − Aj, A − Aj, −A − Aj, −A − Aj, −A + Aj, A + Aj, A − Aj, A + Aj, −A + Aj, A − Aj, −A + Aj, A + Aj |
| 50 | Polarization 1 | −A − Aj, A − Aj, −A + Aj, −A + Aj, A − Aj, A + Aj, A + Aj, −A + Aj, A + Aj, −A − Aj, −A − Aj, A − Aj |

TABLE 34-continued

| Index | Polarization | Training sequence |
|---|---|---|
| | Polarization 2 | −A + Aj, −A − Aj, −A + Aj, −A + Aj, A + Aj, A − Aj, −A − Aj, A − Aj, A + Aj, −A − Aj, A + Aj, A − Aj |
| 51 | Polarization 1 | −A + Aj, A + Aj, −A − Aj, −A − Aj, A + Aj, A − Aj, A − Aj, −A − Aj, A − Aj, −A + Aj, −A + Aj, A + Aj |
| | Polarization 2 | −A + Aj, A + Aj, −A + Aj, −A + Aj, −A − Aj, A − Aj, A + Aj, A − Aj, −A − Aj, A + Aj, −A − Aj, A − Aj |
| 52 | Polarization 1 | −A + Aj, A + Aj, −A − Aj, −A − Aj, A + Aj, A − Aj, A − Aj, −A − Aj, A − Aj, −A + Aj, −A + Aj, A + Aj |
| | Polarization 2 | −A − Aj, −A + Aj, −A − Aj, −A − Aj, A − Aj, A + Aj, −A + Aj, A + Aj, A − Aj, −A + Aj, A − Aj, A + Aj |
| 53 | Polarization 1 | −A + Aj, A + Aj, −A + Aj, −A + Aj, −A − Aj, A − Aj, A + Aj, A − Aj, −A − Aj, A + Aj, −A − Aj, A − Aj |
| | Polarization 2 | A + Aj, A − Aj, −A + Aj, −A + Aj, A − Aj, −A − Aj, −A − Aj, −A + Aj, −A − Aj, A + Aj, A + Aj, A − Aj |
| 54 | Polarization 1 | −A − Aj, A − Aj, −A − Aj, −A − Aj, −A + Aj, A + Aj, A − Aj, A + Aj, −A + Aj, A − Aj, −A + Aj, A + Aj |
| | Polarization 2 | A − Aj, A + Aj, −A − Aj, −A − Aj, A + Aj, −A + Aj, −A + Aj, −A − Aj, −A + Aj, A − Aj, A − Aj, A + Aj |
| 55 | Polarization 1 | −A − Aj, A − Aj, A − Aj, −A + Aj, A + Aj, −A + Aj, −A + Aj, −A − Aj, A + Aj, A + Aj, −A − Aj, A − Aj |
| | Polarization 2 | −A + Aj, A + Aj, −A − Aj, A + Aj, −A + Aj, −A − Aj, −A + Aj, A + Aj, A − Aj, A − Aj, −A − Aj, A − Aj |
| 56 | Polarization 1 | −A − Aj, A − Aj, A − Aj, −A + Aj, A + Aj, −A + Aj, −A + Aj, −A − Aj, A + Aj, A + Aj, −A − Aj, A − Aj |
| | Polarization 2 | −A − Aj, −A + Aj, A − Aj, −A + Aj, −A − Aj, A − Aj, −A − Aj, −A + Aj, A + Aj, A + Aj, A − Aj, A + Aj |
| 57 | Polarization 1 | −A + Aj, A + Aj, A + Aj, −A − Aj, A − Aj, −A − Aj, −A − Aj, −A + Aj, A − Aj, A − Aj, −A + Aj, A + Aj |
| | Polarization 2 | −A − Aj, A − Aj, −A + Aj, A − Aj, −A − Aj, −A + Aj, −A − Aj, A − Aj, A + Aj, A + Aj, −A + Aj, A + Aj |
| 58 | Polarization 1 | −A + Aj, A + Aj, A + Aj, −A − Aj, A − Aj, −A − Aj, −A − Aj, −A + Aj, A − Aj, A − Aj, −A + Aj, A + Aj |
| | Polarization 2 | −A + Aj, −A − Aj, A + Aj, −A − Aj, −A + Aj, A + Aj, −A + Aj, −A − Aj, A − Aj, A − Aj, A + Aj, A − Aj |
| 59 | Polarization 1 | −A + Aj, A + Aj, −A − Aj, A + Aj, −A + Aj, −A − Aj, −A + Aj, A + Aj, A − Aj, A − Aj, −A − Aj, A − Aj |
| | Polarization 2 | A − Aj, A + Aj, A + Aj, −A − Aj, −A + Aj, −A − Aj, −A − Aj, A − Aj, −A + Aj, −A + Aj, A − Aj, A + Aj |
| 60 | Polarization 1 | −A − Aj, A − Aj, −A + Aj, A − Aj, −A − Aj, −A + Aj, −A − Aj, A − Aj, A + Aj, A + Aj, −A + Aj, A + Aj |
| | Polarization 2 | A + Aj, A − Aj, A − Aj, −A + Aj, −A − Aj, −A + Aj, −A + Aj, A + Aj, −A − Aj, −A − Aj, A + Aj, A − Aj |
| 61 | Polarization 1 | A + Aj, A − Aj, A − Aj, −A + Aj, −A − Aj, −A + Aj, −A + Aj, A + Aj, −A − Aj, −A − Aj, A + Aj, A − Aj |
| | Polarization 2 | −A + Aj, −A − Aj, A + Aj, −A − Aj, −A + Aj, A + Aj, −A + Aj, −A − Aj, A − Aj, A − Aj, A + Aj, A − Aj |
| 62 | Polarization 1 | A − Aj, A + Aj, A + Aj, −A − Aj, −A + Aj, −A − Aj, −A − Aj, A − Aj, −A + Aj, −A + Aj, A − Aj, A + Aj |
| | Polarization 2 | −A − Aj, −A + Aj, A − Aj, −A + Aj, −A − Aj, A − Aj, −A − Aj, −A + Aj, A + Aj, A + Aj, A − Aj, A + Aj |
| 63 | Polarization 1 | −A + Aj, −A − Aj, −A + Aj, −A + Aj, A + Aj, A − Aj, −A − Aj, A − Aj, A + Aj, −A − Aj, A + Aj, A − Aj |
| | Polarization 2 | A − Aj, A + Aj, −A − Aj, −A − Aj, A + Aj, −A + Aj, −A + Aj, −A − Aj, −A + Aj, A − Aj, A − Aj, A + Aj |
| 64 | Polarization 1 | −A − Aj, −A + Aj, −A − Aj, −A − Aj, A − Aj, A + Aj, −A + Aj, A + Aj, A − Aj, −A + Aj, A − Aj, A + Aj |
| | Polarization 2 | A + Aj, A − Aj, −A + Aj, −A + Aj, A − Aj, −A − Aj, −A − Aj, −A + Aj, −A − Aj, A + Aj, A + Aj, A − Aj |

(5) When $N_{TS}$=14, the training sequence is one item in the following Table 35.

TABLE 35

| Index | Polarization | Training sequence |
|---|---|---|
| 1 | Polarization 1 | −A + Aj, A − Aj, A − Aj, A + Aj, −A + Aj, A + Aj, A − Aj, −A + Aj, A − Aj, −A − Aj, −A − Aj, A + Aj, −A + Aj, −A − Aj |
| | Polarization 2 | −A − Aj, A + Aj, −A − Aj, −A − Aj, A − Aj, A + Aj, −A − Aj, A + Aj, −A + Aj, A + Aj, A − Aj, A − Aj, −A + Aj, −A + Aj |
| 2 | Polarization 1 | −A + Aj, A − Aj, A − Aj, A + Aj, −A + Aj, A + Aj, A − Aj, −A + Aj, A − Aj, −A − Aj, −A − Aj, A + Aj, −A + Aj, −A − Aj |
| | Polarization 2 | A + Aj, −A − Aj, A + Aj, A + Aj, −A + Aj, −A − Aj, A + Aj, −A − Aj, A − Aj, −A − Aj, −A + Aj, −A + Aj, A − Aj, A − Aj |
| 3 | Polarization 1 | −A − Aj, A + Aj, A + Aj, A − Aj, −A − Aj, A − Aj, A + Aj, −A − Aj, A + Aj, −A + Aj, −A + Aj, A − Aj, −A − Aj, −A + Aj |
| | Polarization 2 | −A + Aj, A − Aj, −A + Aj, −A + Aj, A + Aj, A − Aj, −A + Aj, A − Aj, −A − Aj, A − Aj, A + Aj, A + Aj, −A − Aj, −A − Aj |
| 4 | Polarization 1 | −A − Aj, A + Aj, A + Aj, A − Aj, −A − Aj, A − Aj, A + Aj, −A − Aj, A + Aj, −A + Aj, −A + Aj, A − Aj, −A − Aj, −A + Aj |
| | Polarization 2 | A − Aj, −A + Aj, A − Aj, A − Aj, −A − Aj, −A + Aj, A − Aj, −A + Aj, A + Aj, −A + Aj, −A − Aj, −A − Aj, A + Aj, A + Aj |
| 5 | Polarization 1 | A − Aj, −A + Aj, A − Aj, A − Aj, A + Aj, −A + Aj, A − Aj, −A + Aj, −A − Aj, −A + Aj, A + Aj, A + Aj, −A − Aj, −A − Aj |
| | Polarization 2 | A + Aj, −A − Aj, −A − Aj, A − Aj, A + Aj, A − Aj, −A − Aj, A + Aj, −A − Aj, −A + Aj, −A + Aj, A − Aj, A + Aj, −A + Aj |
| 6 | Polarization 1 | A − Aj, −A + Aj, A − Aj, A − Aj, A + Aj, −A + Aj, A − Aj, −A + Aj, −A − Aj, −A + Aj, A + Aj, A + Aj, −A − Aj, −A − Aj |
| | Polarization 2 | −A − Aj, A + Aj, A + Aj, −A + Aj, −A − Aj, −A + Aj, A + Aj, −A − Aj, A + Aj, A − Aj, A − Aj, −A + Aj, −A − Aj, A − Aj |
| 7 | Polarization 1 | A + Aj, −A − Aj, A + Aj, A + Aj, A − Aj, −A − Aj, A + Aj, −A − Aj, −A + Aj, −A − Aj, A − Aj, A − Aj, −A + Aj, −A + Aj |
| | Polarization 2 | A − Aj, −A + Aj, −A + Aj, A + Aj, A − Aj, A + Aj, −A + Aj, A − Aj, −A + Aj, −A − Aj, −A − Aj, A + Aj, A − Aj, −A − Aj |
| 8 | Polarization 1 | A + Aj, −A − Aj, A + Aj, A + Aj, A − Aj, −A − Aj, A + Aj, −A − Aj, −A + Aj, −A − Aj, A − Aj, A − Aj, −A + Aj, −A + Aj |
| | Polarization 2 | −A + Aj, A − Aj, A − Aj, −A − Aj, −A + Aj, −A − Aj, A − Aj, −A + Aj, A − Aj, A + Aj, A + Aj, −A − Aj, −A + Aj, A + Aj |
| 9 | Polarization 1 | −A + Aj, A − Aj, −A + Aj, −A + Aj, A + Aj, A − Aj, −A + Aj, A − Aj, −A − Aj, A − Aj, A + Aj, A + Aj, −A − Aj, −A − Aj |
| | Polarization 2 | A + Aj, −A − Aj, −A − Aj, −A + Aj, A + Aj, −A + Aj, −A − Aj, A + Aj, −A − Aj, A − Aj, A − Aj, −A + Aj, A + Aj, A − Aj |
| 10 | Polarization 1 | −A − Aj, A + Aj, −A − Aj, −A − Aj, A − Aj, A + Aj, −A − Aj, A + Aj, −A + Aj, A + Aj, A − Aj, A − Aj, −A + Aj, −A + Aj |
| | Polarization 2 | A − Aj, −A + Aj, −A + Aj, −A − Aj, A − Aj, −A − Aj, −A + Aj, A − Aj, −A + Aj, A + Aj, A + Aj, −A − Aj, A − Aj, A + Aj |
| 11 | Polarization 1 | A − Aj, A − Aj, −A + Aj, −A + Aj, A + Aj, A − Aj, A + Aj, −A − Aj, A + Aj, −A + Aj, −A − Aj, −A − Aj, A + Aj, −A − Aj |
| | Polarization 2 | A + Aj, −A + Aj, −A − Aj, A + Aj, A + Aj, A − Aj, −A + Aj, A − Aj, −A − Aj, −A + Aj, −A − Aj, A − Aj, A − Aj, −A + Aj |
| 12 | Polarization 1 | A − Aj, A − Aj, −A + Aj, −A + Aj, A + Aj, A − Aj, A + Aj, −A − Aj, A + Aj, −A + Aj, −A − Aj, −A − Aj, A + Aj, −A − Aj |
| | Polarization 2 | −A − Aj, A − Aj, A + Aj, −A − Aj, −A − Aj, −A + Aj, A − Aj, −A + Aj, A + Aj, A − Aj, A + Aj, −A + Aj, −A + Aj, A − Aj |
| 13 | Polarization 1 | A + Aj, A + Aj, −A − Aj, −A − Aj, A − Aj, A + Aj, A − Aj, −A + Aj, A − Aj, −A − Aj, −A + Aj, −A + Aj, A − Aj, −A + Aj |
| | Polarization 2 | A − Aj, −A − Aj, −A + Aj, A − Aj, A − Aj, A + Aj, −A − Aj, A + Aj, −A + Aj, −A − Aj, −A + Aj, A + Aj, A + Aj, −A − Aj |
| 14 | Polarization 1 | A + Aj, A + Aj, −A − Aj, −A − Aj, A − Aj, A + Aj, A − Aj, −A + Aj, A − Aj, −A − Aj, −A + Aj, −A + Aj, A − Aj, −A + Aj |

TABLE 35-continued

| Index | Polarization | Training sequence |
|---|---|---|
| | Polarization 2 | −A + Aj, A + Aj, A − Aj, −A + Aj, −A + Aj, −A − Aj, A + Aj, −A − Aj, A − Aj, A + Aj, A − Aj, −A − Aj, −A − Aj, A + Aj |
| 15 | Polarization 1 | −A + Aj, −A + Aj, A − Aj, A − Aj, A + Aj, −A + Aj, A + Aj, −A − Aj, A + Aj, A − Aj, −A − Aj, −A − Aj, A + Aj, −A − Aj |
| | Polarization 2 | −A − Aj, −A + Aj, A + Aj, −A − Aj, −A − Aj, A − Aj, −A + Aj, A − Aj, A + Aj, −A + Aj, A + Aj, A − Aj, A − Aj, −A + Aj |
| 16 | Polarization 1 | −A + Aj, −A + Aj, A − Aj, A − Aj, A + Aj, −A + Aj, A + Aj, −A − Aj, A + Aj, A − Aj, −A − Aj, −A − Aj, A + Aj, −A − Aj |
| | Polarization 2 | A + Aj, A − Aj, −A − Aj, A + Aj, A + Aj, −A + Aj, A − Aj, −A + Aj, −A − Aj, A − Aj, −A − Aj, −A + Aj, −A + Aj, A − Aj |
| 17 | Polarization 1 | −A − Aj, −A − Aj, A + Aj, A + Aj, A − Aj, −A − Aj, A − Aj, −A + Aj, A − Aj, A + Aj, −A + Aj, −A + Aj, A − Aj, −A + Aj |
| | Polarization 2 | −A + Aj, −A − Aj, A − Aj, −A + Aj, −A + Aj, A + Aj, −A − Aj, A + Aj, A − Aj, −A − Aj, A − Aj, A + Aj, A + Aj, −A − Aj |
| 18 | Polarization 1 | −A − Aj, −A − Aj, A + Aj, A + Aj, A − Aj, −A − Aj, A − Aj, −A + Aj, A − Aj, A + Aj, −A + Aj, −A + Aj, A − Aj, −A + Aj |
| | Polarization 2 | A − Aj, A + Aj, −A + Aj, A − Aj, A − Aj, −A − Aj, A + Aj, −A − Aj, −A + Aj, A + Aj, −A + Aj, −A − Aj, −A − Aj, A + Aj |
| 19 | Polarization 1 | A − Aj, −A + Aj, −A + Aj, A + Aj, A − Aj, A + Aj, −A + Aj, A − Aj, −A + Aj, −A − Aj, −A − Aj, A + Aj, A − Aj, −A − Aj |
| | Polarization 2 | −A − Aj, A + Aj, −A − Aj, −A − Aj, −A + Aj, A + Aj, −A − Aj, A + Aj, A − Aj, A + Aj, −A + Aj, −A + Aj, A − Aj, A − Aj |
| 20 | Polarization 1 | A − Aj, −A − Aj, −A + Aj, A − Aj, A − Aj, A + Aj, −A − Aj, A + Aj, −A + Aj, −A − Aj, −A + Aj, A + Aj, A + Aj, −A − Aj |
| | Polarization 2 | −A − Aj, −A − Aj, A + Aj, A + Aj, −A + Aj, −A − Aj, −A + Aj, A − Aj, −A + Aj, A + Aj, A − Aj, A − Aj, −A + Aj, A − Aj |
| 21 | Polarization 1 | A + Aj, −A + Aj, −A − Aj, A + Aj, A + Aj, A − Aj, −A + Aj, A − Aj, −A − Aj, −A + Aj, −A − Aj, A − Aj, A − Aj, −A + Aj |
| | Polarization 2 | −A + Aj, −A + Aj, A − Aj, A − Aj, −A − Aj, −A + Aj, −A − Aj, A + Aj, −A − Aj, A − Aj, A + Aj, A + Aj, −A − Aj, A + Aj |
| 22 | Polarization 1 | A + Aj, −A − Aj, −A − Aj, A − Aj, A + Aj, A − Aj, −A − Aj, A + Aj, −A − Aj, −A + Aj, −A + Aj, A − Aj, A + Aj, −A + Aj |
| | Polarization 2 | −A + Aj, A − Aj, −A + Aj, −A + Aj, −A − Aj, A − Aj, −A + Aj, A − Aj, A + Aj, A − Aj, −A − Aj, −A − Aj, A + Aj, A + Aj |
| 23 | Polarization 1 | −A + Aj, −A − Aj, A − Aj, −A + Aj, −A + Aj, A + Aj, −A − Aj, A + Aj, A − Aj, −A − Aj, A − Aj, A + Aj, A + Aj, −A − Aj |
| | Polarization 2 | A + Aj, A + Aj, −A − Aj, −A − Aj, −A + Aj, A + Aj, −A + Aj, A − Aj, −A + Aj, −A − Aj, A − Aj, A − Aj, −A + Aj, A − Aj |
| 24 | Polarization 1 | −A − Aj, −A + Aj, A + Aj, −A − Aj, −A − Aj, A − Aj, −A + Aj, A − Aj, A + Aj, −A + Aj, A + Aj, A − Aj, A − Aj, −A + Aj |
| | Polarization 2 | A − Aj, A − Aj, −A + Aj, −A + Aj, −A − Aj, A − Aj, −A − Aj, A + Aj, −A − Aj, −A + Aj, A + Aj, A + Aj, −A − Aj, A + Aj |
| 25 | Polarization 1 | A + Aj, A − Aj, −A − Aj, A + Aj, A + Aj, −A + Aj, A − Aj, −A + Aj, −A − Aj, A − Aj, −A − Aj, −A + Aj, −A + Aj, A − Aj |
| | Polarization 2 | A − Aj, A − Aj, −A + Aj, −A + Aj, −A − Aj, A − Aj, −A − Aj, A + Aj, −A − Aj, −A + Aj, A + Aj, A + Aj, −A − Aj, A + Aj |
| 26 | Polarization 1 | A − Aj, A + Aj, −A + Aj, A − Aj, A − Aj, −A − Aj, A + Aj, −A − Aj, −A + Aj, A + Aj, −A + Aj, −A − Aj, −A − Aj, A + Aj |
| | Polarization 2 | A + Aj, A + Aj, −A − Aj, −A − Aj, −A + Aj, A + Aj, −A + Aj, A − Aj, −A + Aj, −A − Aj, A − Aj, A − Aj, −A + Aj, A − Aj |
| 27 | Polarization 1 | −A − Aj, A + Aj, A + Aj, −A + Aj, −A − Aj, −A + Aj, A + Aj, −A − Aj, A + Aj, A − Aj, A − Aj, −A + Aj, −A − Aj, A − Aj |
| | Polarization 2 | −A + Aj, A − Aj, −A + Aj, −A + Aj, −A − Aj, A − Aj, −A + Aj, A − Aj, A + Aj, A − Aj, −A − Aj, −A − Aj, A + Aj, A + Aj |
| 28 | Polarization 1 | −A − Aj, A − Aj, A + Aj, −A − Aj, −A − Aj, −A + Aj, A − Aj, −A + Aj, A + Aj, A − Aj, A + Aj, −A + Aj, −A + Aj, A − Aj |
| | Polarization 2 | −A + Aj, −A + Aj, A − Aj, A − Aj, −A − Aj, −A + Aj, −A − Aj, A + Aj, −A − Aj, A − Aj, A + Aj, A + Aj, −A − Aj, A + Aj |
| 29 | Polarization 1 | −A + Aj, A + Aj, A − Aj, −A + Aj, −A + Aj, −A − Aj, A + Aj, −A − Aj, A − Aj, A + Aj, A − Aj, −A − Aj, −A − Aj, A + Aj |
| | Polarization 2 | −A − Aj, −A − Aj, A + Aj, A + Aj, −A + Aj, −A − Aj, −A + Aj, A − Aj, −A + Aj, A + Aj, A − Aj, A − Aj, −A + Aj, A − Aj |
| 30 | Polarization 1 | −A + Aj, A − Aj, A − Aj, −A − Aj, −A + Aj, −A − Aj, A − Aj, −A + Aj, A − Aj, A + Aj, A + Aj, −A − Aj, −A + Aj, A + Aj |
| | Polarization 2 | −A − Aj, A + Aj, −A − Aj, −A − Aj, −A + Aj, A + Aj, −A − Aj, A + Aj, A − Aj, A + Aj, −A + Aj, −A + Aj, A − Aj, A − Aj |
| 31 | Polarization 1 | A + Aj, −A − Aj, A + Aj, A + Aj, −A + Aj, −A − Aj, A + Aj, −A − Aj, A − Aj, −A − Aj, −A + Aj, −A + Aj, A − Aj, A − Aj |
| | Polarization 2 | A − Aj, −A + Aj, −A + Aj, −A − Aj, A − Aj, −A − Aj, −A + Aj, A − Aj, −A + Aj, A + Aj, A + Aj, −A − Aj, A − Aj, A + Aj |
| 32 | Polarization 1 | A − Aj, −A + Aj, A − Aj, A − Aj, −A − Aj, −A + Aj, A − Aj, −A + Aj, A + Aj, −A + Aj, −A − Aj, −A − Aj, A + Aj, A + Aj |
| | Polarization 2 | A + Aj, −A − Aj, −A − Aj, −A + Aj, A + Aj, −A + Aj, −A − Aj, A + Aj, −A − Aj, A − Aj, A − Aj, −A + Aj, A + Aj, A − Aj |

(6) When $N_{TS}$=16, the training sequence is one item in the following Table 36.

TABLE 36

| Index | Polarization | Training sequence |
|---|---|---|
| 1 | Polarization 1 | A + Aj, A − Aj, A − Aj, −A − Aj, A − Aj, −A + Aj, A + Aj, −A + Aj, A + Aj, A − Aj, −A + Aj, A + Aj, −A + Aj, −A − Aj, −A − Aj, −A − Aj |
| | Polarization 2 | A − Aj, A − Aj, A − Aj, A + Aj, −A + Aj, A − Aj, −A + Aj, −A − Aj, −A − Aj, A + Aj, −A + Aj, −A − Aj, −A + Aj, A + Aj, A + Aj, −A − Aj |
| 2 | Polarization 1 | A + Aj, A − Aj, A − Aj, −A − Aj, A − Aj, −A + Aj, A + Aj, −A + Aj, A + Aj, A − Aj, −A + Aj, A + Aj, −A + Aj, −A − Aj, −A − Aj, −A − Aj |
| | Polarization 2 | −A − Aj, −A − Aj, −A − Aj, A − Aj, A + Aj, −A − Aj, A + Aj, −A + Aj, −A + Aj, A − Aj, A + Aj, −A + Aj, A + Aj, A − Aj, A − Aj, −A + Aj |

TABLE 36-continued

| Index | Polarization | Training sequence |
|---|---|---|
| 3 | Polarization 1 | A + Aj, A − Aj, A − Aj, −A − Aj, A − Aj, −A + Aj, A + Aj, −A + Aj, A + Aj, A − Aj, −A + Aj, A + Aj, −A + Aj, −A − Aj, −A − Aj, −A − Aj |
| | Polarization 2 | A + Aj, A + Aj, A + Aj, −A + Aj, −A − Aj, A + Aj, −A − Aj, A − Aj, A − Aj, −A + Aj, −A − Aj, A − Aj, −A − Aj, −A + Aj, −A + Aj, A − Aj |
| 4 | Polarization 1 | A + Aj, A − Aj, A − Aj, −A − Aj, A − Aj, −A + Aj, A + Aj, −A + Aj, A + Aj, A − Aj, −A + Aj, A + Aj, −A + Aj, −A − Aj, −A − Aj, −A − Aj |
| | Polarization 2 | −A + Aj, −A + Aj, −A + Aj, −A − Aj, A − Aj, −A + Aj, A − Aj, A + Aj, A + Aj, −A − Aj, A − Aj, A + Aj, A − Aj, −A − Aj, −A − Aj, A + Aj |
| 5 | Polarization 1 | A − Aj, A + Aj, A + Aj, −A + Aj, A + Aj, −A − Aj, A − Aj, −A − Aj, A − Aj, A + Aj, −A − Aj, A − Aj, −A − Aj, −A + Aj, −A + Aj, −A + Aj |
| | Polarization 2 | A + Aj, A + Aj, A + Aj, A − Aj, −A − Aj, A + Aj, −A − Aj, −A + Aj, −A + Aj, A − Aj, −A − Aj, −A + Aj, −A − Aj, A − Aj, A − Aj, −A + Aj |
| 6 | Polarization 1 | A − Aj, A + Aj, A + Aj, −A + Aj, A + Aj, −A − Aj, A − Aj, −A − Aj, A − Aj, A + Aj, −A − Aj, A − Aj, −A − Aj, −A + Aj, −A + Aj, −A + Aj |
| | Polarization 2 | −A + Aj, −A + Aj, −A + Aj, A + Aj, A − Aj, −A + Aj, A − Aj, −A − Aj, −A − Aj, A + Aj, A − Aj, −A − Aj, A − Aj, A + Aj, A + Aj, −A − Aj |
| 7 | Polarization 1 | A − Aj, A + Aj, A + Aj, −A + Aj, A + Aj, −A − Aj, A − Aj, −A − Aj, A − Aj, A + Aj, −A − Aj, A − Aj, −A − Aj, −A + Aj, −A + Aj, −A + Aj |
| | Polarization 2 | A − Aj, A − Aj, A − Aj, −A − Aj, −A + Aj, A − Aj, −A + Aj, A + Aj, A + Aj, −A − Aj, −A + Aj, A + Aj, −A + Aj, −A − Aj, −A − Aj, A + Aj |
| 8 | Polarization 1 | A − Aj, A + Aj, A + Aj, −A + Aj, A + Aj, −A − Aj, A − Aj, −A − Aj, A − Aj, A + Aj, −A − Aj, A − Aj, −A − Aj, −A + Aj, −A + Aj, −A + Aj |
| | Polarization 2 | −A − Aj, −A − Aj, −A − Aj, −A + Aj, A + Aj, −A − Aj, A + Aj, A − Aj, A − Aj, −A + Aj, A + Aj, A − Aj, A + Aj, −A + Aj, −A + Aj, A − Aj |
| 9 | Polarization 1 | A − Aj, −A + Aj, −A + Aj, A + Aj, A − Aj, A + Aj, −A + Aj, A − Aj, A − Aj, A + Aj, −A − Aj, A + Aj, −A + Aj, −A − Aj, −A − Aj, −A − Aj |
| | Polarization 2 | A − Aj, A − Aj, A − Aj, A + Aj, −A + Aj, A + Aj, −A − Aj, −A + Aj, A + Aj, −A + Aj, A + Aj, −A − Aj, A − Aj, −A − Aj, −A − Aj, −A + Aj |
| 10 | Polarization 1 | A − Aj, −A + Aj, −A + Aj, A + Aj, A − Aj, A + Aj, −A + Aj, A − Aj, A − Aj, A + Aj, −A − Aj, A + Aj, −A + Aj, −A − Aj, −A − Aj, −A − Aj |
| | Polarization 2 | A + Aj, A + Aj, A + Aj, −A + Aj, −A − Aj, −A + Aj, A − Aj, −A − Aj, −A + Aj, −A − Aj, −A + Aj, A − Aj, A + Aj, A − Aj, A − Aj, −A − Aj |
| 11 | Polarization 1 | A − Aj, −A + Aj, −A + Aj, A + Aj, A − Aj, A + Aj, −A + Aj, A − Aj, A − Aj, A + Aj, −A − Aj, A + Aj, −A + Aj, −A − Aj, −A − Aj, −A − Aj |
| | Polarization 2 | −A − Aj, −A − Aj, −A − Aj, A − Aj, A + Aj, A − Aj, −A + Aj, A + Aj, A − Aj, A + Aj, A − Aj, −A + Aj, −A − Aj, −A + Aj, −A + Aj, A + Aj |
| 12 | Polarization 1 | A − Aj, −A + Aj, −A + Aj, A + Aj, A − Aj, A + Aj, −A + Aj, A − Aj, A − Aj, A + Aj, −A − Aj, A + Aj, −A + Aj, −A − Aj, −A − Aj, −A − Aj |
| | Polarization 2 | −A + Aj, −A + Aj, −A + Aj, −A − Aj, A − Aj, −A − Aj, A + Aj, A − Aj, −A − Aj, A − Aj, −A − Aj, A + Aj, −A + Aj, A + Aj, A + Aj, A − Aj |
| 13 | Polarization 1 | A + Aj, −A − Aj, −A − Aj, A − Aj, A + Aj, A − Aj, −A − Aj, A + Aj, A + Aj, A − Aj, −A + Aj, A − Aj, −A − Aj, −A + Aj, −A + Aj, −A + Aj |
| | Polarization 2 | A + Aj, A + Aj, A + Aj, A − Aj, −A − Aj, A − Aj, −A + Aj, −A − Aj, A − Aj, −A − Aj, A − Aj, −A + Aj, A + Aj, −A + Aj, −A + Aj, −A − Aj |
| 14 | Polarization 1 | A + Aj, −A − Aj, −A − Aj, A − Aj, A + Aj, A − Aj, −A − Aj, A + Aj, A + Aj, A − Aj, −A + Aj, A − Aj, −A − Aj, −A + Aj, −A + Aj, −A + Aj |
| | Polarization 2 | A − Aj, A − Aj, A − Aj, −A − Aj, −A + Aj, −A − Aj, A + Aj, −A + Aj, −A − Aj, −A + Aj, −A − Aj, A + Aj, A − Aj, A + Aj, A + Aj, −A + Aj |
| 15 | Polarization 1 | A + Aj, −A − Aj, −A − Aj, A − Aj, A + Aj, A − Aj, −A − Aj, A + Aj, A + Aj, A − Aj, −A + Aj, A − Aj, −A − Aj, −A + Aj, −A + Aj, −A + Aj |
| | Polarization 2 | −A + Aj, −A + Aj, −A + Aj, A + Aj, A − Aj, A + Aj, −A − Aj, A − Aj, A + Aj, A − Aj, A + Aj, −A − Aj, −A + Aj, −A − Aj, −A − Aj, A − Aj |

TABLE 36-continued

| Index | Polarization | Training sequence |
|---|---|---|
| 16 | Polarization 1 | A + Aj, −A − Aj, −A − Aj, A − Aj, A + Aj, A − Aj, −A − Aj, A + Aj, A + Aj, A − Aj, −A + Aj, A − Aj, −A − Aj, −A + Aj, −A + Aj, −A + Aj |
| | Polarization 2 | −A − Aj, −A − Aj, −A − Aj, −A + Aj, A + Aj, −A + Aj, A − Aj, A + Aj, −A + Aj, A + Aj, −A + Aj, A − Aj, −A − Aj, A − Aj, A − Aj, A + Aj |
| 17 | Polarization 1 | A + Aj, A + Aj, A + Aj, A − Aj, −A − Aj, A − Aj, −A + Aj, −A − Aj, A − Aj, −A − Aj, A − Aj, −A + Aj, A + Aj, −A + Aj, −A + Aj, −A − Aj |
| | Polarization 2 | −A + Aj, A − Aj, A − Aj, A + Aj, −A + Aj, A + Aj, A − Aj, −A + Aj, −A + Aj, A + Aj, −A − Aj, A + Aj, A − Aj, −A − Aj, −A − Aj, −A − Aj |
| 18 | Polarization 1 | A + Aj, A + Aj, A + Aj, A − Aj, −A − Aj, A − Aj, −A + Aj, −A − Aj, A − Aj, −A − Aj, A − Aj, −A + Aj, A + Aj, −A + Aj, −A + Aj, −A − Aj |
| | Polarization 2 | A − Aj, −A + Aj, −A + Aj, −A − Aj, A − Aj, −A − Aj, −A + Aj, A − Aj, A − Aj, −A − Aj, A + Aj, −A − Aj, −A + Aj, A + Aj, A + Aj, A + Aj |
| 19 | Polarization 1 | A + Aj, A + Aj, A + Aj, A − Aj, −A − Aj, A − Aj, −A + Aj, −A − Aj, A − Aj, −A − Aj, A − Aj, −A + Aj, A + Aj, −A + Aj, −A + Aj, −A − Aj |
| | Polarization 2 | −A − Aj, A + Aj, A + Aj, −A + Aj, −A − Aj, −A + Aj, A + Aj, −A − Aj, −A − Aj, −A + Aj, A − Aj, −A + Aj, A + Aj, A − Aj, A − Aj, A − Aj |
| 20 | Polarization 1 | A − Aj, A − Aj, A − Aj, A + Aj, −A + Aj, A + Aj, −A − Aj, −A + Aj, A + Aj, −A + Aj, A + Aj, −A − Aj, A − Aj, −A − Aj, −A − Aj, −A + Aj |
| | Polarization 2 | −A − Aj, A + Aj, A + Aj, A − Aj, −A − Aj, A − Aj, A + Aj, −A − Aj, −A − Aj, A − Aj, −A + Aj, A − Aj, A + Aj, −A + Aj, −A + Aj, −A + Aj |
| 21 | Polarization 1 | A − Aj, A − Aj, A − Aj, A + Aj, −A + Aj, A + Aj, −A − Aj, −A + Aj, A + Aj, −A + Aj, A + Aj, −A − Aj, A − Aj, −A − Aj, −A − Aj, −A + Aj |
| | Polarization 2 | A + Aj, −A − Aj, −A − Aj, −A + Aj, A + Aj, −A + Aj, −A − Aj, A + Aj, A + Aj, −A + Aj, A − Aj, −A + Aj, −A − Aj, A − Aj, A − Aj, A − Aj |
| 22 | Polarization 1 | A − Aj, A − Aj, A − Aj, A + Aj, −A + Aj, A + Aj, −A − Aj, −A + Aj, A + Aj, −A + Aj, A + Aj, −A − Aj, A − Aj, −A − Aj, −A − Aj, −A + Aj |
| | Polarization 2 | −A + Aj, A − Aj, A − Aj, −A − Aj, −A + Aj, −A − Aj, A − Aj, −A + Aj, −A + Aj, −A − Aj, A + Aj, −A − Aj, A − Aj, A + Aj, A + Aj, A + Aj |
| 23 | Polarization 1 | −A + Aj, A − Aj, A − Aj, A + Aj, −A + Aj, A + Aj, A − Aj, −A + Aj, −A + Aj, A + Aj, −A − Aj, A + Aj, A − Aj, −A − Aj, −A − Aj, −A − Aj |
| | Polarization 2 | A − Aj, A − Aj, A − Aj, −A − Aj, −A + Aj, −A − Aj, A + Aj, −A + Aj, −A − Aj, −A + Aj, −A − Aj, A + Aj, A − Aj, A + Aj, A + Aj, −A + Aj |
| 24 | Polarization 1 | −A + Aj, A − Aj, A − Aj, A + Aj, −A + Aj, A + Aj, A − Aj, −A + Aj, −A + Aj, A + Aj, −A − Aj, A + Aj, A − Aj, −A − Aj, −A − Aj, −A − Aj |
| | Polarization 2 | −A + Aj, −A + Aj, −A + Aj, A + Aj, A − Aj, A + Aj, −A − Aj, A − Aj, A + Aj, A − Aj, A + Aj, −A − Aj, −A + Aj, −A − Aj, −A − Aj, A − Aj |
| 25 | Polarization 1 | −A + Aj, A − Aj, A − Aj, A + Aj, −A + Aj, A + Aj, A − Aj, −A + Aj, −A + Aj, A + Aj, −A − Aj, A + Aj, A − Aj, −A − Aj, −A − Aj, −A − Aj |
| | Polarization 2 | −A − Aj, −A − Aj, −A − Aj, −A + Aj, A + Aj, −A + Aj, A − Aj, A + Aj, −A + Aj, A + Aj, −A + Aj, A − Aj, −A − Aj, A − Aj, A − Aj, A + Aj |
| 26 | Polarization 1 | −A − Aj, A + Aj, A + Aj, A − Aj, −A − Aj, A − Aj, A + Aj, −A − Aj, −A − Aj, A − Aj, −A + Aj, A − Aj, A + Aj, −A + Aj, −A + Aj, −A + Aj |
| | Polarization 2 | A + Aj, A + Aj, A + Aj, −A + Aj, −A − Aj, −A + Aj, A − Aj, −A − Aj, −A + Aj, −A − Aj, −A + Aj, A − Aj, A + Aj, A − Aj, A − Aj, −A − Aj |
| 27 | Polarization 1 | −A − Aj, A + Aj, A + Aj, A − Aj, −A − Aj, A − Aj, A + Aj, −A − Aj, −A − Aj, A − Aj, −A + Aj, A − Aj, A + Aj, −A + Aj, −A + Aj, −A + Aj |
| | Polarization 2 | −A − Aj, −A − Aj, −A − Aj, A − Aj, A + Aj, A − Aj, −A + Aj, A + Aj, A − Aj, A + Aj, A − Aj, −A + Aj, −A − Aj, −A + Aj, −A + Aj, A + Aj |
| 28 | Polarization 1 | −A − Aj, A + Aj, A + Aj, A − Aj, −A − Aj, A − Aj, A + Aj, −A − Aj, −A − Aj, A − Aj, −A + Aj, A − Aj, A + Aj, −A + Aj, −A + Aj, −A + Aj |
| | Polarization 2 | −A + Aj, −A + Aj, −A + Aj, −A − Aj, A − Aj, −A − Aj, A + Aj, A − Aj, −A − Aj, A − Aj, −A − Aj, A + Aj, −A + Aj, A + Aj, A + Aj, A − Aj |

TABLE 36-continued

| Index | Polarization | Training sequence |
|---|---|---|
| 29 | Polarization 1 | A + Aj, −A + Aj, −A + Aj, −A − Aj, −A + Aj, A − Aj, A + Aj, A − Aj, A + Aj, −A + Aj, A − Aj, A + Aj, A − Aj, −A − Aj, −A − Aj, −A − Aj |
| | Polarization 2 | A + Aj, A + Aj, A + Aj, A − Aj, −A − Aj, A + Aj, −A − Aj, −A + Aj, −A + Aj, A − Aj, −A − Aj, −A + Aj, −A − Aj, A − Aj, A − Aj, −A + Aj |
| 30 | Polarization 1 | A + Aj, −A + Aj, −A + Aj, −A − Aj, −A + Aj, A − Aj, A + Aj, A − Aj, A + Aj, −A + Aj, A − Aj, A + Aj, A − Aj, −A − Aj, −A − Aj, −A − Aj |
| | Polarization 2 | −A + Aj, −A + Aj, −A + Aj, A + Aj, A − Aj, −A + Aj, A − Aj, −A − Aj, −A − Aj, A + Aj, A − Aj, −A − Aj, A − Aj, A + Aj, A + Aj, −A − Aj |
| 31 | Polarization 1 | A + Aj, −A + Aj, −A + Aj, −A − Aj, −A + Aj, A − Aj, A + Aj, A − Aj, A + Aj, −A + Aj, A − Aj, A + Aj, A − Aj, −A − Aj, −A − Aj, −A − Aj |
| | Polarization 2 | A − Aj, A − Aj, A − Aj, −A − Aj, −A + Aj, A − Aj, −A + Aj, A + Aj, A + Aj, −A − Aj, −A + Aj, A + Aj, −A + Aj, −A − Aj, −A − Aj, A + Aj |
| 32 | Polarization 1 | A + Aj, −A + Aj, −A + Aj, −A − Aj, −A + Aj, A − Aj, A + Aj, A − Aj, A + Aj, −A + Aj, A − Aj, A + Aj, A − Aj, −A − Aj, −A − Aj, −A − Aj |
| | Polarization 2 | −A − Aj, −A − Aj, −A − Aj, −A + Aj, A + Aj, −A − Aj, A + Aj, A − Aj, A − Aj, −A + Aj, A + Aj, A − Aj, A + Aj, −A + Aj, −A + Aj, A − Aj |
| 33 | Polarization 1 | A − Aj, −A − Aj, −A − Aj, −A + Aj, −A − Aj, A + Aj, A − Aj, A + Aj, A − Aj, −A − Aj, A + Aj, A − Aj, A + Aj, −A + Aj, −A + Aj, −A + Aj |
| | Polarization 2 | A − Aj, A − Aj, A − Aj, A + Aj, −A + Aj, A − Aj, −A + Aj, −A − Aj, −A − Aj, A + Aj, −A + Aj, −A − Aj, −A + Aj, A + Aj, A + Aj, −A − Aj |
| 34 | Polarization 1 | A − Aj, −A − Aj, −A − Aj, −A + Aj, −A − Aj, A + Aj, A − Aj, A + Aj, A − Aj, −A − Aj, A + Aj, A − Aj, A + Aj, −A + Aj, −A + Aj, −A + Aj |
| | Polarization 2 | −A − Aj, −A − Aj, −A − Aj, A − Aj, A + Aj, −A − Aj, A + Aj, −A + Aj, −A + Aj, A − Aj, A + Aj, −A + Aj, A + Aj, A − Aj, A − Aj, −A + Aj |
| 35 | Polarization 1 | A − Aj, −A − Aj, −A − Aj, −A + Aj, −A − Aj, A + Aj, A − Aj, A + Aj, A − Aj, −A − Aj, A + Aj, A − Aj, A + Aj, −A + Aj, −A + Aj, −A + Aj |
| | Polarization 2 | A + Aj, A + Aj, A + Aj, −A + Aj, −A − Aj, A + Aj, −A − Aj, A − Aj, A − Aj, −A + Aj, −A − Aj, A − Aj, −A − Aj, −A + Aj, −A + Aj, A − Aj |
| 36 | Polarization 1 | A − Aj, −A − Aj, −A − Aj, −A + Aj, −A − Aj, A + Aj, A − Aj, A + Aj, A − Aj, −A − Aj, A + Aj, A − Aj, A + Aj, −A + Aj, −A + Aj, −A + Aj |
| | Polarization 2 | −A + Aj, −A + Aj, −A + Aj, −A − Aj, A − Aj, −A + Aj, A − Aj, A + Aj, A + Aj, −A − Aj, A − Aj, A + Aj, A − Aj, −A − Aj, −A − Aj, A + Aj |
| 37 | Polarization 1 | A − Aj, A − Aj, A − Aj, A + Aj, −A + Aj, A − Aj, −A + Aj, −A − Aj, −A − Aj, A + Aj, −A + Aj, −A − Aj, −A + Aj, A + Aj, A + Aj, −A − Aj |
| | Polarization 2 | −A + Aj, A + Aj, A + Aj, A − Aj, A + Aj, −A − Aj, −A + Aj, −A − Aj, −A + Aj, A + Aj, −A − Aj, −A + Aj, −A − Aj, A − Aj, A − Aj, A − Aj |
| 38 | Polarization 1 | A − Aj, A − Aj, A − Aj, A + Aj, −A + Aj, A − Aj, −A + Aj, −A − Aj, −A − Aj, A + Aj, −A + Aj, −A − Aj, −A + Aj, A + Aj, A + Aj, −A − Aj |
| | Polarization 2 | −A − Aj, −A + Aj, −A + Aj, A + Aj, −A + Aj, A − Aj, −A − Aj, A − Aj, −A − Aj, −A + Aj, A − Aj, −A − Aj, A − Aj, A + Aj, A + Aj, A + Aj |
| 39 | Polarization 1 | A + Aj, A + Aj, A + Aj, A − Aj, −A − Aj, A + Aj, −A − Aj, −A + Aj, −A + Aj, A − Aj, −A − Aj, −A + Aj, −A − Aj, A − Aj, A − Aj, −A + Aj |
| | Polarization 2 | −A − Aj, A − Aj, A − Aj, A + Aj, A − Aj, −A + Aj, −A − Aj, −A + Aj, −A − Aj, A − Aj, −A + Aj, −A − Aj, −A + Aj, A + Aj, A + Aj, A + Aj |
| 40 | Polarization 1 | A + Aj, A + Aj, A + Aj, A − Aj, −A − Aj, A + Aj, −A − Aj, −A + Aj, −A + Aj, A − Aj, −A − Aj, −A + Aj, −A − Aj, A − Aj, A − Aj, −A + Aj |
| | Polarization 2 | −A + Aj, −A − Aj, −A − Aj, A − Aj, −A − Aj, A + Aj, −A + Aj, A + Aj, −A + Aj, −A − Aj, A + Aj, −A + Aj, A + Aj, A − Aj, A − Aj, A − Aj |
| 41 | Polarization 1 | −A + Aj, −A + Aj, −A + Aj, A + Aj, A − Aj, −A + Aj, A − Aj, −A − Aj, −A − Aj, A + Aj, A − Aj, −A − Aj, A − Aj, A + Aj, A + Aj, −A − Aj |
| | Polarization 2 | −A − Aj, A − Aj, A − Aj, A + Aj, A − Aj, −A + Aj, −A − Aj, −A + Aj, −A − Aj, A − Aj, −A + Aj, −A − Aj, −A + Aj, A + Aj, A + Aj, A + Aj |

TABLE 36-continued

| Index | Polarization | Training sequence |
|---|---|---|
| 42 | Polarization 1 | −A + Aj, −A + Aj, −A + Aj, A + Aj, A − Aj, −A + Aj, A − Aj, −A − Aj, −A − Aj, A + Aj, A − Aj, −A − Aj, A − Aj, A + Aj, A + Aj, −A − Aj |
| | Polarization 2 | −A + Aj, −A − Aj, −A − Aj, A − Aj, −A − Aj, A + Aj, −A + Aj, A + Aj, −A + Aj, −A − Aj, A + Aj, −A + Aj, A + Aj, A − Aj, A − Aj, A − Aj |
| 43 | Polarization 1 | −A − Aj, −A − Aj, −A − Aj, A − Aj, A + Aj, −A − Aj, A + Aj, −A + Aj, −A + Aj, A − Aj, A + Aj, −A + Aj, A + Aj, A − Aj, A − Aj, −A + Aj |
| | Polarization 2 | −A + Aj, A + Aj, A + Aj, A − Aj, A + Aj, −A − Aj, −A + Aj, −A − Aj, −A + Aj, A + Aj, −A − Aj, −A + Aj, −A − Aj, A − Aj, A − Aj, A − Aj |
| 44 | Polarization 1 | −A − Aj, −A − Aj, −A − Aj, A − Aj, A + Aj, −A − Aj, A + Aj, −A + Aj, −A + Aj, A − Aj, A + Aj, −A + Aj, A + Aj, A − Aj, A − Aj, −A + Aj |
| | Polarization 2 | −A − Aj, −A + Aj, −A + Aj, A + Aj, −A + Aj, A − Aj, −A − Aj, A − Aj, −A − Aj, −A + Aj, A − Aj, −A − Aj, A − Aj, A + Aj, A + Aj, A + Aj |
| 45 | Polarization 1 | A + Aj, A + Aj, A + Aj, −A + Aj, −A − Aj, −A + Aj, A − Aj, −A − Aj, −A + Aj, −A − Aj, −A + Aj, A − Aj, A + Aj, A − Aj, A − Aj, −A − Aj |
| | Polarization 2 | A + Aj, −A − Aj, −A − Aj, −A + Aj, A + Aj, −A + Aj, −A − Aj, A + Aj, A + Aj, −A + Aj, A − Aj, −A + Aj, −A − Aj, A − Aj, A − Aj, A − Aj |
| 46 | Polarization 1 | A + Aj, A + Aj, A + Aj, −A + Aj, −A − Aj, −A + Aj, A − Aj, −A − Aj, −A + Aj, −A − Aj, −A + Aj, A − Aj, A + Aj, A − Aj, A − Aj, −A − Aj |
| | Polarization 2 | −A + Aj, A − Aj, A − Aj, −A − Aj, −A + Aj, −A − Aj, A − Aj, −A + Aj, −A + Aj, −A − Aj, A + Aj, −A − Aj, A − Aj, A + Aj, A + Aj, A + Aj |
| 47 | Polarization 1 | A − Aj, A − Aj, A − Aj, −A − Aj, −A + Aj, −A − Aj, A + Aj, −A + Aj, −A − Aj, −A + Aj, −A − Aj, A + Aj, A − Aj, A + Aj, A + Aj, −A + Aj |
| | Polarization 2 | A − Aj, −A + Aj, −A + Aj, −A − Aj, A − Aj, −A − Aj, −A + Aj, A − Aj, A − Aj, −A − Aj, A + Aj, −A − Aj, −A + Aj, A + Aj, A + Aj, A + Aj |
| 48 | Polarization 1 | A − Aj, A − Aj, A − Aj, −A − Aj, −A + Aj, −A − Aj, A + Aj, −A + Aj, −A − Aj, −A + Aj, −A − Aj, A + Aj, A − Aj, A + Aj, A + Aj, −A + Aj |
| | Polarization 2 | −A − Aj, A + Aj, A + Aj, −A + Aj, −A − Aj, −A + Aj, A + Aj, −A − Aj, −A − Aj, −A + Aj, A − Aj, −A + Aj, A + Aj, A − Aj, A − Aj, A − Aj |
| 49 | Polarization 1 | −A + Aj, −A + Aj, −A + Aj, A + Aj, A − Aj, A + Aj, −A − Aj, A − Aj, A + Aj, A − Aj, A + Aj, −A − Aj, −A + Aj, −A − Aj, −A − Aj, A − Aj |
| | Polarization 2 | A − Aj, −A + Aj, −A + Aj, −A − Aj, A − Aj, −A − Aj, −A + Aj, A − Aj, A − Aj, −A − Aj, A + Aj, −A − Aj, −A + Aj, A + Aj, A + Aj, A + Aj |
| 50 | Polarization 1 | −A + Aj, −A + Aj, −A + Aj, A + Aj, A − Aj, A + Aj, −A − Aj, A − Aj, A + Aj, A − Aj, A + Aj, −A − Aj, −A + Aj, −A − Aj, −A − Aj, A − Aj |
| | Polarization 2 | −A − Aj, A + Aj, A + Aj, −A + Aj, −A − Aj, −A + Aj, A + Aj, −A − Aj, −A − Aj, −A + Aj, A − Aj, −A + Aj, A + Aj, A − Aj, A − Aj, A − Aj |
| 51 | Polarization 1 | −A − Aj, −A − Aj, −A − Aj, A − Aj, A + Aj, A − Aj, −A + Aj, A + Aj, A − Aj, A + Aj, A − Aj, −A + Aj, −A − Aj, −A + Aj, −A + Aj, A + Aj |
| | Polarization 2 | A + Aj, −A − Aj, −A − Aj, −A + Aj, A + Aj, −A + Aj, −A − Aj, A + Aj, A + Aj, −A + Aj, A − Aj, −A + Aj, −A − Aj, A − Aj, A − Aj, A − Aj |
| 52 | Polarization 1 | −A − Aj, −A − Aj, −A − Aj, A − Aj, A + Aj, A − Aj, −A + Aj, A + Aj, A − Aj, A + Aj, A − Aj, −A + Aj, −A − Aj, −A + Aj, −A + Aj, A + Aj |
| | Polarization 2 | −A + Aj, A − Aj, A − Aj, −A − Aj, −A + Aj, −A − Aj, A − Aj, −A + Aj, −A + Aj, −A − Aj, A + Aj, −A − Aj, A − Aj, A + Aj, A + Aj, A + Aj |
| 53 | Polarization 1 | A + Aj, A + Aj, A + Aj, −A + Aj, −A − Aj, A + Aj, −A − Aj, A − Aj, A − Aj, −A + Aj, −A − Aj, A − Aj, −A − Aj, −A + Aj, −A + Aj, A − Aj |
| | Polarization 2 | −A + Aj, A + Aj, A + Aj, A − Aj, A + Aj, −A − Aj, −A + Aj, −A − Aj, −A + Aj, A + Aj, −A − Aj, −A + Aj, −A − Aj, A − Aj, A − Aj, A − Aj |
| 54 | Polarization 1 | A + Aj, A + Aj, A + Aj, −A + Aj, −A − Aj, A + Aj, −A − Aj, A − Aj, A − Aj, −A + Aj, −A − Aj, A − Aj, −A − Aj, −A + Aj, −A + Aj, A − Aj |
| | Polarization 2 | −A − Aj, −A + Aj, −A + Aj, A + Aj, −A + Aj, A − Aj, −A − Aj, A − Aj, −A − Aj, −A + Aj, A − Aj, −A − Aj, A − Aj, A + Aj, A + Aj, A + Aj |

TABLE 36-continued

| Index | Polarization | Training sequence |
|---|---|---|
| 55 | Polarization 1 | A − Aj, A − Aj, A − Aj, −A − Aj, −A + Aj, A − Aj, −A + Aj, A + Aj, A + Aj, −A − Aj, −A + Aj, A + Aj, −A + Aj, −A − Aj, −A − Aj, A + Aj |
| | Polarization 2 | −A − Aj, A − Aj, A − Aj, A + Aj, A − Aj, −A + Aj, −A − Aj, −A + Aj, −A − Aj, A − Aj, −A + Aj, −A − Aj, −A + Aj, A + Aj, A + Aj, A + Aj |
| 56 | Polarization 1 | A − Aj, A − Aj, A − Aj, −A − Aj, −A + Aj, A − Aj, −A + Aj, A + Aj, A + Aj, −A − Aj, −A + Aj, A + Aj, −A + Aj, −A − Aj, −A − Aj, A + Aj |
| | Polarization 2 | −A + Aj, −A − Aj, −A − Aj, A − Aj, −A − Aj, A + Aj, −A + Aj, A + Aj, −A + Aj, −A − Aj, A + Aj, −A + Aj, A + Aj, A − Aj, A − Aj, A − Aj |
| 57 | Polarization 1 | −A − Aj, −A − Aj, −A − Aj, −A + Aj, A + Aj, −A − Aj, A + Aj, A − Aj, A − Aj, −A + Aj, A + Aj, A − Aj, A + Aj, −A + Aj, −A + Aj, A − Aj |
| | Polarization 2 | −A − Aj, A − Aj, A − Aj, A + Aj, A − Aj, −A + Aj, −A − Aj, −A + Aj, −A − Aj, A − Aj, −A + Aj, −A − Aj, −A + Aj, A + Aj, A + Aj, A + Aj |
| 58 | Polarization 1 | −A − Aj, −A − Aj, −A − Aj, −A + Aj, A + Aj, −A − Aj, A + Aj, A − Aj, A − Aj, −A + Aj, A + Aj, A − Aj, A + Aj, −A + Aj, −A + Aj, A − Aj |
| | Polarization 2 | −A + Aj, −A − Aj, −A − Aj, A − Aj, −A − Aj, A + Aj, −A + Aj, A + Aj, −A + Aj, −A − Aj, A + Aj, −A + Aj, A + Aj, A − Aj, A − Aj, A − Aj |
| 59 | Polarization 1 | −A + Aj, −A + Aj, −A + Aj, −A − Aj, A − Aj, −A + Aj, A − Aj, A + Aj, A + Aj, −A − Aj, A − Aj, A + Aj, A − Aj, −A − Aj, −A − Aj, A + Aj |
| | Polarization 2 | −A + Aj, A + Aj, A + Aj, A − Aj, A + Aj, −A − Aj, −A + Aj, −A − Aj, −A + Aj, A + Aj, −A − Aj, −A + Aj, −A − Aj, A − Aj, A − Aj, A − Aj |
| 60 | Polarization 1 | −A + Aj, −A + Aj, −A + Aj, −A − Aj, A − Aj, −A + Aj, A − Aj, A + Aj, A + Aj, −A − Aj, A − Aj, A + Aj, A − Aj, −A − Aj, −A − Aj, A + Aj |
| | Polarization 2 | −A − Aj, −A + Aj, −A + Aj, A + Aj, −A + Aj, A − Aj, −A − Aj, A − Aj, −A − Aj, −A + Aj, A − Aj, −A − Aj, A − Aj, A + Aj, A + Aj, A + Aj |
| 61 | Polarization 1 | A + Aj, −A − Aj, −A − Aj, −A + Aj, A + Aj, −A + Aj, −A − Aj, A + Aj, A + Aj, −A + Aj, A − Aj, −A + Aj, −A − Aj, A − Aj, A − Aj, A − Aj |
| | Polarization 2 | −A + Aj, −A + Aj, −A + Aj, −A − Aj, A − Aj, −A − Aj, A + Aj, A − Aj, −A − Aj, A − Aj, −A − Aj, A + Aj, −A + Aj, A + Aj, A + Aj, A − Aj |
| 62 | Polarization 1 | A − Aj, −A + Aj, −A + Aj, −A − Aj, A − Aj, −A − Aj, −A + Aj, A − Aj, A − Aj, −A − Aj, A + Aj, −A − Aj, −A + Aj, A + Aj, A + Aj, A + Aj |
| | Polarization 2 | −A − Aj, −A − Aj, −A − Aj, −A + Aj, A + Aj, −A + Aj, A − Aj, A + Aj, −A + Aj, A + Aj, −A + Aj, A − Aj, −A − Aj, A − Aj, A − Aj, A + Aj |
| 63 | Polarization 1 | −A + Aj, −A + Aj, −A + Aj, −A − Aj, A − Aj, −A − Aj, A + Aj, A − Aj, −A − Aj, A − Aj, −A − Aj, A + Aj, −A + Aj, A + Aj, A + Aj, A − Aj |
| | Polarization 2 | −A + Aj, A − Aj, A − Aj, −A − Aj, −A + Aj, −A − Aj, A − Aj, −A + Aj, −A + Aj, −A − Aj, A + Aj, −A − Aj, A − Aj, A + Aj, A + Aj, A + Aj |
| 64 | Polarization 1 | −A − Aj, −A − Aj, −A − Aj, −A + Aj, A + Aj, −A + Aj, A − Aj, A + Aj, −A + Aj, A + Aj, −A + Aj, A − Aj, −A − Aj, A − Aj, A − Aj, A + Aj |
| | Polarization 2 | −A − Aj, A + Aj, A + Aj, −A + Aj, −A − Aj, −A + Aj, A + Aj, −A − Aj, −A − Aj, −A + Aj, A − Aj, −A + Aj, A + Aj, A − Aj, A − Aj, A − Aj |

(7) When $N_{TS}$=18, the training sequence is one item in the following Table 37.

TABLE 37

| Index | Polarization | Training sequence |
|---|---|---|
| 1 | Polarization 1 | A + Aj, −A − Aj, A − Aj, A + Aj, A − Aj, −A + Aj, −A − Aj, −A + Aj, A + Aj, A + Aj, −A − Aj, A − Aj, A − Aj, −A + Aj, A − Aj, −A + Aj, −A + Aj, −A − Aj |
| | Polarization 2 | −A − Aj, −A − Aj, A + Aj, A + Aj, A − Aj, −A + Aj, A + Aj, A + Aj, A − Aj, −A − Aj, A + Aj, −A + Aj, −A + Aj, A − Aj, −A − Aj, A − Aj, −A + Aj, −A − Aj |

TABLE 37-continued

| Index | Polarization | Training sequence |
|---|---|---|
| 2 | Polarization 1 | A + Aj, −A − Aj, A − Aj, A + Aj, A − Aj, −A + Aj, −A − Aj, −A + Aj, A + Aj, A + Aj, −A − Aj, A − Aj, A − Aj, −A + Aj, A − Aj, −A + Aj, −A + Aj, −A − Aj |
| | Polarization 2 | A + Aj, A + Aj, −A − Aj, −A − Aj, −A + Aj, A − Aj, −A − Aj, −A − Aj, −A + Aj, A + Aj, −A − Aj, A − Aj, A − Aj, −A + Aj, A + Aj, −A + Aj, A − Aj, A + Aj |
| 3 | Polarization 1 | A − Aj, −A + Aj, A + Aj, A − Aj, A + Aj, −A − Aj, −A + Aj, −A − Aj, A − Aj, A − Aj, −A + Aj, A + Aj, A + Aj, −A − Aj, A + Aj, −A − Aj, −A − Aj, −A + Aj |
| | Polarization 2 | −A + Aj, −A + Aj, A − Aj, A − Aj, A + Aj, −A − Aj, A − Aj, A − Aj, A + Aj, −A + Aj, A − Aj, −A − Aj,−A − Aj, A + Aj, −A + Aj, A + Aj, −A − Aj, −A + Aj |
| 4 | Polarization 1 | A − Aj, −A + Aj, A + Aj, A − Aj, A + Aj, −A − Aj, −A + Aj, −A − Aj, A − Aj, A − Aj, −A + Aj, A + Aj, A + Aj, −A − Aj, A + Aj, −A − Aj, −A − Aj, −A + Aj |
| | Polarization 2 | A − Aj, A − Aj, −A + Aj, −A + Aj, −A − Aj, A + Aj, −A + Aj, −A + Aj, −A − Aj, A − Aj, −A + Aj, A + Aj, A + Aj, −A − Aj, A − Aj, −A − Aj, A + Aj, A − Aj |
| 5 | Polarization 1 | −A + Aj, A − Aj, A + Aj, −A − Aj, A − Aj, −A − Aj, A + Aj, A − Aj, −A − Aj, −A + Aj, A + Aj, A + Aj, A − Aj, −A − Aj, A + Aj, −A + Aj, −A + Aj, −A − Aj |
| | Polarization 2 | A − Aj, A + Aj, −A + Aj, −A + Aj, A − Aj, −A − Aj, A + Aj, A − Aj, A − Aj, −A − Aj, A + Aj, −A − Aj, A + Aj, −A + Aj, −A − Aj, A − Aj, −A + Aj, −A + Aj |
| 6 | Polarization 1 | −A + Aj, A − Aj, A + Aj, −A − Aj, A − Aj, −A − Aj, A + Aj, A − Aj, −A − Aj, −A + Aj, A + Aj, A + Aj, A − Aj, −A − Aj, A + Aj, −A + Aj, −A + Aj, −A − Aj |
| | Polarization 2 | −A + Aj, −A − Aj, A − Aj, A − Aj, −A + Aj, A + Aj, −A − Aj, −A + Aj, −A + Aj, A + Aj, −A − Aj, A + Aj, −A − Aj, A − Aj, A + Aj, −A + Aj, A − Aj, A − Aj |
| 7 | Polarization 1 | −A − Aj, A + Aj, A − Aj, −A + Aj, A + Aj, −A + Aj, A − Aj, A + Aj, −A + Aj, −A − Aj, A − Aj, A − Aj, A + Aj, −A + Aj, A − Aj, −A − Aj, −A − Aj, −A + Aj |
| | Polarization 2 | A + Aj, A − Aj, −A − Aj, −A − Aj, A + Aj, −A + Aj, A − Aj, A + Aj, A + Aj, −A + Aj, A − Aj, −A + Aj, A − Aj, −A − Aj, −A + Aj, A + Aj, −A − Aj, −A − Aj |
| 8 | Polarization 1 | −A − Aj, A + Aj, A − Aj, −A + Aj, A + Aj, −A + Aj, A − Aj, A + Aj, −A + Aj, −A − Aj, A − Aj, A − Aj, A + Aj, −A + Aj, A − Aj, −A − Aj, −A − Aj, −A + Aj |
| | Polarization 2 | −A − Aj, −A + Aj, A + Aj, A + Aj, −A − Aj, A − Aj, −A + Aj, −A − Aj, −A − Aj, A − Aj, −A + Aj, A − Aj, −A + Aj, A + Aj, A − Aj, −A − Aj, A + Aj, A + Aj |
| 9 | Polarization 1 | A + Aj, A − Aj, −A − Aj, −A − Aj, A + Aj, −A + Aj, A − Aj, A + Aj, A + Aj, −A + Aj, A − Aj, −A + Aj, A − Aj, −A − Aj, −A + Aj, A + Aj, −A − Aj, −A − Aj |
| | Polarization 2 | A + Aj, −A − Aj, −A + Aj, A − Aj, −A − Aj, A − Aj, −A + Aj, −A − Aj, A − Aj, A + Aj, −A + Aj, −A + Aj, −A − Aj, A − Aj, −A + Aj, A + Aj, A + Aj, A − Aj |
| 10 | Polarization 1 | A − Aj, A + Aj, −A + Aj, −A + Aj, A − Aj, −A − Aj, A + Aj, A − Aj, A − Aj, −A − Aj, A + Aj, −A − Aj, A + Aj, −A + Aj, −A − Aj, A − Aj, −A + Aj, −A + Aj |
| | Polarization 2 | A − Aj, −A + Aj, −A − Aj, A + Aj, −A + Aj, A + Aj, −A − Aj, −A + Aj, A + Aj, A − Aj, −A − Aj, −A − Aj, −A + Aj, A + Aj, −A − Aj, A − Aj, A − Aj, A + Aj |
| 11 | Polarization 1 | −A − Aj, −A − Aj, A + Aj, A + Aj, A − Aj, −A + Aj, A + Aj, A + Aj, A − Aj, −A − Aj, A + Aj, −A + Aj, −A + Aj, A − Aj, −A − Aj, A − Aj, −A + Aj, −A − Aj |
| | Polarization 2 | −A − Aj, A + Aj, −A + Aj, −A − Aj, −A + Aj, A − Aj, A + Aj, A − Aj, −A − Aj, −A − Aj, A + Aj, −A + Aj, −A + Aj, A − Aj, −A + Aj, A − Aj, A − Aj, A + Aj |
| 12 | Polarization 1 | −A + Aj, −A + Aj, A − Aj, A − Aj, A + Aj, −A − Aj, A − Aj, A − Aj, A + Aj, −A + Aj, A − Aj, −A − Aj,−A − Aj, A + Aj, −A + Aj, A + Aj, −A − Aj, −A + Aj |
| | Polarization 2 | −A + Aj, A − Aj, −A − Aj, −A + Aj, −A − Aj, A + Aj, A − Aj, A + Aj, −A + Aj, −A + Aj, A − Aj, −A − Aj, −A − Aj, A + Aj, −A − Aj, A + Aj, A + Aj, A − Aj |
| 13 | Polarization 1 | A + Aj, −A + Aj, −A − Aj, −A − Aj, A + Aj, A − Aj, −A + Aj, A + Aj, A + Aj, A − Aj, −A + Aj, A − Aj, −A + Aj, −A − Aj, A − Aj, A + Aj, −A − Aj, −A − Aj |
| | Polarization 2 | A + Aj, −A − Aj, A − Aj, −A + Aj, −A − Aj, −A + Aj, A − Aj, −A − Aj, −A + Aj, A + Aj, A − Aj, A − Aj, −A − Aj, −A + Aj, A − Aj, A + Aj, A + Aj, −A + Aj |
| 14 | Polarization 1 | A + Aj, −A + Aj, −A − Aj, −A − Aj, A + Aj, A − Aj, −A + Aj, A + Aj, A + Aj, A − Aj, −A + Aj, A − Aj, −A + Aj, −A − Aj, A − Aj, A + Aj, −A − Aj, −A − Aj |
| | Polarization 2 | −A − Aj, A + Aj, −A + Aj, A − Aj, A + Aj, A − Aj, −A + Aj, A + Aj, A − Aj, −A − Aj, −A + Aj, −A + Aj, A + Aj, A − Aj, −A + Aj, −A − Aj, −A − Aj, A − Aj |

TABLE 37-continued

| Index | Polarization | Training sequence |
|---|---|---|
| 15 | Polarization 1 | A − Aj, −A − Aj, −A + Aj, −A + Aj, A − Aj, A + Aj, −A − Aj, A − Aj, A − Aj, A + Aj, −A − Aj, A + Aj,−A − Aj, −A + Aj, A + Aj, A − Aj, −A + Aj, −A + Aj |
| | Polarization 2 | A − Aj, −A + Aj, A + Aj, −A − Aj, −A + Aj, −A − Aj, A + Aj, −A + Aj, −A − Aj, A − Aj, A + Aj, A + Aj, −A + Aj, −A − Aj, A + Aj, A − Aj, A − Aj, −A − Aj |
| 16 | Polarization 1 | A − Aj, −A − Aj, −A + Aj, −A + Aj, A − Aj, A + Aj, −A − Aj, A − Aj, A − Aj, A + Aj, −A − Aj, A + Aj,−A − Aj, −A + Aj, A + Aj, A − Aj, −A + Aj, −A + Aj |
| | Polarization 2 | −A + Aj, A − Aj, −A − Aj, A + Aj, A − Aj, A + Aj, −A − Aj, A − Aj, A + Aj, −A + Aj, −A − Aj, −A − Aj, A − Aj, A + Aj, −A − Aj, −A + Aj, −A + Aj, A + Aj |
| 17 | Polarization 1 | A + Aj, A + Aj, −A − Aj, A − Aj, A + Aj, −A + Aj, A − Aj, −A + Aj, A − Aj, −A − Aj, −A − Aj, −A + Aj, A − Aj, −A − Aj, A + Aj, A + Aj, −A + Aj, −A − Aj |
| | Polarization 2 | −A + Aj, −A − Aj, −A − Aj, A − Aj, −A + Aj, A + Aj, A − Aj, A − Aj, −A − Aj, −A + Aj, A + Aj, A − Aj, −A + Aj, A + Aj, −A + Aj, A − Aj, A + Aj, −A − Aj |
| 18 | Polarization 1 | A + Aj, A + Aj, −A − Aj, A − Aj, A + Aj, −A + Aj, A − Aj, −A + Aj, A − Aj, −A − Aj, −A − Aj, −A + Aj, A − Aj, −A − Aj, A + Aj, A + Aj, −A + Aj, −A − Aj |
| | Polarization 2 | A − Aj, A + Aj, A + Aj, −A + Aj, A − Aj, −A − Aj, −A + Aj, −A + Aj, A + Aj, A − Aj, −A − Aj, −A + Aj, A − Aj, −A − Aj, A − Aj, −A + Aj, −A − Aj, A + Aj |
| 19 | Polarization 1 | A − Aj, A − Aj, −A + Aj, A + Aj, A − Aj, −A − Aj, A + Aj, −A − Aj, A + Aj, −A + Aj, −A + Aj, −A − Aj, A + Aj, −A + Aj, A − Aj, A − Aj, −A − Aj, −A + Aj |
| | Polarization 2 | −A − Aj, −A + Aj, −A + Aj, A + Aj, −A − Aj, A − Aj, A + Aj, A + Aj, −A + Aj, −A − Aj, A − Aj, A + Aj, −A − Aj, A − Aj, −A − Aj, A + Aj, A − Aj, −A + Aj |
| 20 | Polarization 1 | A − Aj, A − Aj, −A + Aj, A + Aj, A − Aj, −A − Aj, A + Aj, −A − Aj, A + Aj, −A + Aj, −A + Aj, −A − Aj, A + Aj, −A + Aj, A − Aj, A − Aj, −A − Aj, −A + Aj |
| | Polarization 2 | A + Aj, A − Aj, A − Aj, −A − Aj, A + Aj, −A + Aj, −A − Aj, −A − Aj, A − Aj, A + Aj, −A + Aj, −A − Aj, A + Aj, −A + Aj, A + Aj, −A − Aj, −A + Aj, A − Aj |
| 21 | Polarization 1 | −A − Aj, A − Aj, −A + Aj, −A − Aj, −A + Aj, A − Aj, A − Aj, A + Aj, −A − Aj, −A + Aj, A + Aj, A + Aj, A − Aj, −A + Aj, A + Aj, A + Aj, −A − Aj, −A − Aj |
| | Polarization 2 | A + Aj, −A + Aj, −A + Aj, A − Aj, −A + Aj, A − Aj, A − Aj, A + Aj, −A − Aj, −A − Aj, −A + Aj, A + Aj, −A + Aj, A − Aj, −A − Aj, A − Aj, A + Aj, −A − Aj |
| 22 | Polarization 1 | −A − Aj, A − Aj, −A + Aj, −A − Aj, −A + Aj, A − Aj, A − Aj, A + Aj, −A − Aj, −A + Aj, A + Aj, A + Aj, A − Aj, −A + Aj, A + Aj, A + Aj, −A − Aj, −A − Aj |
| | Polarization 2 | −A − Aj, A − Aj, A − Aj, −A + Aj, A − Aj, −A + Aj, −A + Aj, −A − Aj, A + Aj, A + Aj, A − Aj, −A − Aj, A − Aj, −A + Aj, A + Aj, −A + Aj, −A − Aj, A + Aj |
| 23 | Polarization 1 | −A + Aj, A + Aj, −A − Aj, −A + Aj, −A − Aj, A + Aj, A + Aj, A − Aj, −A + Aj, −A − Aj, A − Aj, A − Aj, A + Aj, −A − Aj, A − Aj, A − Aj, −A + Aj, −A + Aj |
| | Polarization 2 | A − Aj, −A − Aj, −A − Aj, A + Aj, −A − Aj, A + Aj, A + Aj, A − Aj, −A + Aj, −A + Aj, −A − Aj, A − Aj, −A − Aj, A + Aj, −A + Aj, A + Aj, A − Aj, −A + Aj |
| 24 | Polarization 1 | −A + Aj, A + Aj, −A − Aj, −A + Aj, −A − Aj, A + Aj, A + Aj, A − Aj, −A + Aj, −A − Aj, A − Aj, A − Aj, A + Aj, −A − Aj, A − Aj, A − Aj, −A + Aj, −A + Aj |
| | Polarization 2 | −A + Aj, A + Aj, A + Aj, −A − Aj, A + Aj, −A − Aj, −A − Aj, −A + Aj, A − Aj, A − Aj, A + Aj, −A + Aj, A + Aj, −A − Aj, A − Aj, −A − Aj, −A + Aj, A − Aj |
| 25 | Polarization 1 | −A − Aj, −A + Aj, A − Aj, −A − Aj, A − Aj, −A + Aj, −A + Aj, A + Aj, −A − Aj, A − Aj, A + Aj, A + Aj, −A + Aj, A − Aj, A + Aj, A + Aj, −A − Aj, −A − Aj |
| | Polarization 2 | A + Aj, A − Aj, A − Aj, −A + Aj, A − Aj, −A + Aj, −A + Aj, A + Aj, −A − Aj, −A − Aj, A − Aj, A + Aj, A − Aj, −A + Aj, −A − Aj, −A + Aj, A + Aj, −A − Aj |
| 26 | Polarization 1 | −A − Aj, −A + Aj, A − Aj, −A − Aj, A − Aj, −A + Aj, −A + Aj, A + Aj, −A − Aj, A − Aj, A + Aj, A + Aj, −A + Aj, A − Aj, A + Aj, A + Aj, −A − Aj, −A − Aj |
| | Polarization 2 | −A − Aj, −A + Aj, −A + Aj, A − Aj, −A + Aj, A − Aj, A − Aj, −A − Aj, A + Aj, A + Aj, −A + Aj, −A − Aj, −A + Aj, A − Aj, A + Aj, A − Aj, −A − Aj, A + Aj |
| 27 | Polarization 1 | −A + Aj, −A − Aj, A + Aj, −A + Aj, A + Aj, −A − Aj, −A − Aj, A − Aj, −A + Aj, A + Aj, A − Aj, A − Aj, −A − Aj, A + Aj, A − Aj, A − Aj, −A + Aj, −A + Aj |
| | Polarization 2 | A − Aj, A + Aj, A + Aj, −A − Aj, A + Aj, −A − Aj, −A − Aj, A − Aj, −A + Aj, −A + Aj, A + Aj, A − Aj, A + Aj, −A − Aj, −A + Aj, −A − Aj, A − Aj, −A + Aj |

TABLE 37-continued

| Index | Polarization | Training sequence |
|---|---|---|
| 28 | Polarization 1 | −A + Aj, −A − Aj, A + Aj, −A + Aj, A + Aj, −A − Aj, −A − Aj, A − Aj, −A + Aj, A + Aj, A − Aj, A − Aj, −A − Aj, A + Aj, A − Aj, A − Aj, −A + Aj, −A + Aj |
| | Polarization 2 | −A + Aj, −A − Aj, −A − Aj, A + Aj, −A − Aj, A + Aj, A + Aj, −A + Aj, A − Aj, A − Aj, −A − Aj, −A + Aj, −A − Aj, A + Aj, A − Aj, A + Aj, −A + Aj, A − Aj |
| 29 | Polarization 1 | A + Aj, A − Aj, A − Aj, −A + Aj, A − Aj, −A + Aj, −A + Aj, A + Aj, −A − Aj, −A − Aj, A − Aj, A + Aj, A − Aj, −A + Aj, −A − Aj, −A + Aj, A + Aj, −A − Aj |
| | Polarization 2 | A + Aj, A − Aj, −A + Aj, A + Aj, −A + Aj, A − Aj, A − Aj, −A − Aj, A + Aj, −A + Aj, −A − Aj, −A − Aj, A − Aj, −A + Aj, −A − Aj, −A − Aj, A + Aj, A + Aj |
| 30 | Polarization 1 | A − Aj, A + Aj, A + Aj, −A − Aj, A + Aj, −A − Aj, −A − Aj, A − Aj, −A + Aj, −A + Aj, A + Aj, A − Aj, A + Aj, −A − Aj, −A + Aj, −A − Aj, A − Aj, −A + Aj |
| | Polarization 2 | A − Aj, A + Aj, −A − Aj, A − Aj, −A − Aj, A + Aj, A + Aj, −A + Aj, A − Aj, −A − Aj, −A + Aj, −A + Aj, A + Aj, −A − Aj, −A + Aj, −A + Aj, A − Aj, A − Aj |
| 31 | Polarization 1 | −A − Aj, −A − Aj, A + Aj, A + Aj, −A + Aj, A − Aj, A + Aj, A + Aj, −A + Aj, −A − Aj, A + Aj, A − Aj, A − Aj, −A + Aj, −A − Aj, −A + Aj, A − Aj, −A − Aj |
| | Polarization 2 | A + Aj, −A − Aj, −A + Aj, A + Aj, −A + Aj, A − Aj, −A − Aj, A − Aj, A + Aj, A + Aj, −A − Aj, −A + Aj, −A + Aj, A − Aj, −A + Aj, A − Aj, A − Aj, −A − Aj |
| 32 | Polarization 1 | −A − Aj, −A − Aj, A + Aj, A + Aj, −A + Aj, A − Aj, A + Aj, A + Aj, −A + Aj, −A − Aj, A + Aj, A − Aj, A − Aj, −A + Aj, −A − Aj, −A + Aj, A − Aj, −A − Aj |
| | Polarization 2 | −A − Aj, A + Aj, A − Aj, −A − Aj, A − Aj, −A + Aj, A + Aj, −A + Aj, −A − Aj, −A − Aj, A + Aj, A − Aj, A − Aj, −A + Aj, A − Aj, −A + Aj, −A + Aj, A + Aj |
| 33 | Polarization 1 | −A + Aj, −A + Aj, A − Aj, A − Aj, −A − Aj, A + Aj, A − Aj, A − Aj, −A − Aj, −A + Aj, A − Aj, A + Aj, A + Aj, −A − Aj, −A + Aj, −A − Aj, A + Aj, −A + Aj |
| | Polarization 2 | A − Aj, −A + Aj, −A − Aj, A − Aj, −A − Aj, A + Aj, −A + Aj, A + Aj, A − Aj, A − Aj, −A + Aj, −A − Aj, −A − Aj, A + Aj, −A − Aj, A + Aj, A + Aj, −A + Aj |
| 34 | Polarization 1 | −A + Aj, −A + Aj, A − Aj, A − Aj, −A − Aj, A + Aj, A − Aj, A − Aj, −A − Aj, −A + Aj, A − Aj, A + Aj, A + Aj, −A − Aj, −A + Aj, −A − Aj, A + Aj, −A + Aj |
| | Polarization 2 | −A + Aj, A − Aj, A + Aj, −A + Aj, A + Aj, −A − Aj, A − Aj, −A − Aj, −A + Aj, −A + Aj, A − Aj, A + Aj, A + Aj, −A − Aj, A + Aj, −A − Aj, −A − Aj, A − Aj |
| 35 | Polarization 1 | A − Aj, −A − Aj, −A − Aj, −A + Aj, A − Aj, A + Aj, −A + Aj, −A + Aj, −A − Aj, A − Aj, A + Aj, −A + Aj, A − Aj, A + Aj, A − Aj, −A + Aj, A + Aj, −A − Aj |
| | Polarization 2 | A + Aj, A + Aj, −A − Aj, −A + Aj, A + Aj, A − Aj, −A + Aj, A − Aj, −A + Aj, −A − Aj, −A − Aj, A − Aj, −A + Aj, −A − Aj, A + Aj, A + Aj, A − Aj, −A − Aj |
| 36 | Polarization 1 | A − Aj, −A − Aj, −A − Aj, −A + Aj, A − Aj, A + Aj, −A + Aj, −A + Aj, −A − Aj, A − Aj, A + Aj, −A + Aj, A − Aj, A + Aj, A − Aj, −A + Aj, A + Aj, −A − Aj |
| | Polarization 2 | −A − Aj, −A − Aj, A + Aj, A − Aj, −A − Aj, −A + Aj, A − Aj, −A + Aj, A − Aj, A + Aj, A + Aj, −A + Aj, A − Aj, A + Aj, −A − Aj, −A − Aj, −A + Aj, A + Aj |
| 37 | Polarization 1 | A + Aj, −A + Aj, −A + Aj, −A − Aj, A + Aj, A − Aj, −A − Aj, −A − Aj, −A + Aj, A + Aj, A − Aj, −A − Aj, A + Aj, A − Aj, A + Aj, −A − Aj, A − Aj, −A + Aj |
| | Polarization 2 | A − Aj, A − Aj, −A + Aj, −A − Aj, A − Aj, A + Aj, −A − Aj, A + Aj, −A − Aj, −A + Aj, −A + Aj, A + Aj, −A − Aj, −A + Aj, A − Aj, A − Aj, A + Aj, −A + Aj |
| 38 | Polarization 1 | A + Aj, −A + Aj, −A + Aj, −A − Aj, A + Aj, A − Aj, −A − Aj, −A − Aj, −A + Aj, A + Aj, A − Aj, −A − Aj, A + Aj, A − Aj, A + Aj, −A − Aj, A − Aj, −A + Aj |
| | Polarization 2 | −A + Aj, −A + Aj, A − Aj, A + Aj, −A + Aj, −A − Aj, A + Aj, −A − Aj, A + Aj, A − Aj, A − Aj, −A − Aj, A + Aj, A − Aj, −A + Aj, −A + Aj, −A − Aj, A − Aj |
| 39 | Polarization 1 | A + Aj, −A − Aj, −A + Aj, A + Aj, −A + Aj, A − Aj, −A − Aj, A − Aj, A + Aj, A + Aj, −A − Aj, −A + Aj, −A + Aj, A − Aj, −A + Aj, A − Aj, A − Aj, −A − Aj |
| | Polarization 2 | A + Aj, A + Aj, −A − Aj, −A − Aj, −A − Aj, A − Aj, −A + Aj, −A − Aj, −A − Aj, A − Aj, A + Aj, −A − Aj, −A + Aj, −A + Aj, A − Aj, A + Aj, A − Aj, −A + Aj, A + Aj |
| 40 | Polarization 1 | A − Aj, −A + Aj, −A − Aj, A − Aj, −A − Aj, A + Aj, −A + Aj, A + Aj, A − Aj, A − Aj, −A + Aj, −A − Aj, −A − Aj, A + Aj, −A − Aj, A + Aj, A + Aj, −A + Aj |
| | Polarization 2 | A − Aj, A − Aj, −A + Aj, −A + Aj, A + Aj, −A − Aj, −A + Aj, −A + Aj, A + Aj, A − Aj, −A + Aj, −A − Aj, −A − Aj, A + Aj, A − Aj, A + Aj, −A − Aj, A − Aj |

TABLE 37-continued

| Index | Polarization | Training sequence |
|---|---|---|
| 41 | Polarization 1 | A + Aj, −A + Aj, −A + Aj, A − Aj, −A + Aj, A − Aj, A − Aj, A + Aj, −A − Aj, −A − Aj, −A + Aj, A + Aj, −A + Aj, A − Aj, −A − Aj, A − Aj, A + Aj, −A − Aj |
| | Polarization 2 | A + Aj, −A + Aj, A − Aj, A + Aj, A − Aj, −A + Aj, −A + Aj, −A − Aj, A + Aj, A − Aj, −A − Aj, −A − Aj, −A + Aj, A − Aj, −A − Aj, −A − Aj, A + Aj, A + Aj |
| 42 | Polarization 1 | A − Aj, −A − Aj, −A − Aj, A + Aj, −A − Aj, A + Aj, A + Aj, A − Aj, −A + Aj, −A + Aj, −A − Aj, A − Aj, −A − Aj, A + Aj, −A + Aj, A + Aj, A − Aj, −A + Aj |
| | Polarization 2 | A − Aj, −A − Aj, A + Aj, A − Aj, A + Aj, −A − Aj, −A − Aj, −A + Aj, A − Aj, A + Aj, −A + Aj, −A + Aj, −A − Aj, A + Aj, −A + Aj, −A + Aj, A − Aj, A − Aj |
| 43 | Polarization 1 | −A + Aj, −A − Aj, −A − Aj, A − Aj, −A + Aj, A + Aj, A − Aj, A − Aj, −A − Aj, −A + Aj, A + Aj, A − Aj, −A + Aj, A + Aj, −A + Aj, A − Aj, A + Aj, −A − Aj |
| | Polarization 2 | −A − Aj, −A − Aj, A + Aj, −A + Aj, −A − Aj, A − Aj, −A + Aj, A − Aj, −A + Aj, A + Aj, A + Aj, A − Aj, −A + Aj, A + Aj, −A − Aj, −A − Aj, A − Aj, A + Aj |
| 44 | Polarization 1 | −A − Aj, −A + Aj, −A + Aj, A + Aj, −A − Aj, A − Aj, A + Aj, A + Aj, −A + Aj, −A − Aj, A − Aj, A + Aj, −A − Aj, A − Aj, −A − Aj, A + Aj, A − Aj, −A + Aj |
| | Polarization 2 | −A + Aj, −A + Aj, A − Aj, −A − Aj, −A + Aj, A + Aj, −A − Aj, A + Aj, −A − Aj, A − Aj, A − Aj, A + Aj, −A − Aj, A − Aj, −A + Aj, −A + Aj, A + Aj, A − Aj |
| 45 | Polarization 1 | A + Aj, A + Aj, −A − Aj, −A + Aj, A + Aj, A − Aj, −A + Aj, A − Aj, −A + Aj, −A − Aj, −A − Aj, A − Aj, −A + Aj, −A − Aj, A + Aj, A + Aj, A − Aj, −A − Aj |
| | Polarization 2 | −A + Aj, A + Aj, A + Aj, A − Aj, −A + Aj, −A − Aj, A − Aj, A − Aj, A + Aj, −A + Aj, −A − Aj, A − Aj, −A + Aj, −A − Aj, −A + Aj, A − Aj, −A − Aj, A + Aj |
| 46 | Polarization 1 | A − Aj, A − Aj, −A + Aj, −A − Aj, A − Aj, A + Aj, −A − Aj, A + Aj, −A − Aj, −A + Aj, −A + Aj, A + Aj, −A − Aj, −A + Aj, A − Aj, A − Aj, A + Aj, −A + Aj |
| | Polarization 2 | −A − Aj, A − Aj, A − Aj, A + Aj, −A − Aj, −A + Aj, A + Aj, A + Aj, A − Aj, −A − Aj, −A + Aj, A + Aj, −A − Aj, −A + Aj, −A − Aj, A + Aj, −A + Aj, A − Aj |
| 47 | Polarization 1 | A − Aj, −A + Aj, A + Aj, −A − Aj, −A + Aj, −A − Aj, A + Aj, −A + Aj, −A − Aj, A − Aj, A + Aj, A + Aj, −A + Aj, −A − Aj, A + Aj, A − Aj, A − Aj, −A − Aj |
| | Polarization 2 | −A + Aj, A + Aj, A − Aj, A − Aj, −A + Aj, −A − Aj, A + Aj, −A + Aj, −A + Aj, −A − Aj, A + Aj, −A − Aj, A + Aj, A − Aj, −A − Aj, −A + Aj, A − Aj, A − Aj |
| 48 | Polarization 1 | A + Aj, −A − Aj, A − Aj, −A + Aj, −A − Aj, −A + Aj, A − Aj, −A − Aj, −A + Aj, A + Aj, A − Aj, A − Aj, −A − Aj, −A + Aj, A − Aj, A + Aj, A + Aj, −A + Aj |
| | Polarization 2 | −A − Aj, A − Aj, A + Aj, A + Aj, −A − Aj, −A + Aj, A − Aj, −A − Aj, −A − Aj, −A + Aj, A − Aj, −A + Aj, A − Aj, A + Aj, −A + Aj, −A − Aj, A + Aj, A + Aj |
| 49 | Polarization 1 | −A − Aj, A + Aj, −A + Aj, A − Aj, A + Aj, A − Aj, −A + Aj, A + Aj, A − Aj, −A − Aj, −A + Aj, −A + Aj, A + Aj, A − Aj, −A + Aj, −A − Aj, −A − Aj, A − Aj |
| | Polarization 2 | −A − Aj, A − Aj, A + Aj, A + Aj, −A − Aj, −A + Aj, A − Aj, −A − Aj, −A − Aj, −A + Aj, A − Aj, −A + Aj, A − Aj, A + Aj, −A + Aj, −A − Aj, A + Aj, A + Aj |
| 50 | Polarization 1 | −A + Aj, A − Aj, −A − Aj, A + Aj, A − Aj, A + Aj, −A − Aj, A − Aj, A + Aj, −A + Aj, −A − Aj, −A − Aj, A − Aj, A + Aj, −A − Aj, −A + Aj, −A + Aj, A + Aj |
| | Polarization 2 | −A + Aj, A + Aj, A − Aj, A − Aj, −A + Aj, −A − Aj, A + Aj, −A + Aj, −A + Aj, −A − Aj, A + Aj, −A − Aj, A + Aj, A − Aj, −A − Aj, −A + Aj, A − Aj, A − Aj |
| 51 | Polarization 1 | −A + Aj, −A + Aj, A − Aj, A + Aj, −A + Aj, −A − Aj, A + Aj, −A − Aj, A + Aj, A − Aj, A − Aj, −A − Aj, A + Aj, A − Aj, −A + Aj, −A + Aj, −A − Aj, A − Aj |
| | Polarization 2 | −A − Aj, A − Aj, A − Aj, A + Aj, −A − Aj, −A + Aj, A + Aj, A + Aj, A − Aj, −A − Aj, −A + Aj, A + Aj, −A − Aj, −A + Aj, −A − Aj, A + Aj, −A + Aj, A − Aj |
| 52 | Polarization 1 | −A − Aj, −A − Aj, A + Aj, A − Aj, −A − Aj, −A + Aj, A − Aj, −A + Aj, A − Aj, A + Aj, A + Aj, −A + Aj, A − Aj, A + Aj, −A − Aj, −A − Aj, −A + Aj, A + Aj |
| | Polarization 2 | −A + Aj, A + Aj, A + Aj, A − Aj, −A + Aj, −A − Aj, A − Aj, A − Aj, A + Aj, −A + Aj, −A − Aj, A − Aj, −A + Aj, −A − Aj, −A + Aj, A − Aj, −A − Aj, A + Aj |
| 53 | Polarization 1 | A + Aj, A − Aj, A − Aj, −A − Aj, A + Aj, −A + Aj, −A − Aj, −A − Aj, A − Aj, A + Aj, −A + Aj, −A − Aj, A + Aj, −A + Aj, A + Aj, −A − Aj, −A + Aj, A − Aj |
| | Polarization 2 | −A + Aj, −A + Aj, A − Aj, −A − Aj, −A + Aj, A + Aj, −A − Aj, A + Aj, −A − Aj, A − Aj, A − Aj, A + Aj, −A − Aj, A − Aj, −A + Aj, −A + Aj, A + Aj, A − Aj |

TABLE 37-continued

| Index | Polarization | Training sequence |
|---|---|---|
| 54 | Polarization 1 | A − Aj, A + Aj, A + Aj, −A + Aj, A − Aj, −A − Aj, −A + Aj, −A + Aj, A + Aj, A − Aj, −A − Aj, −A + Aj, A − Aj, −A − Aj, A − Aj, −A + Aj, −A − Aj, A + Aj |
| | Polarization 2 | −A − Aj, −A − Aj, A + Aj, −A + Aj, −A − Aj, A − Aj, −A + Aj, A − Aj, −A + Aj, A + Aj, A + Aj, A − Aj, −A + Aj, A + Aj, −A − Aj, −A − Aj, A − Aj, A + Aj |
| 55 | Polarization 1 | −A + Aj, A + Aj, A + Aj, −A − Aj, A + Aj, −A − Aj, −A − Aj, −A + Aj, A − Aj, A − Aj, A + Aj, −A + Aj, A + Aj, −A − Aj, A − Aj, −A − Aj, −A + Aj, A − Aj |
| | Polarization 2 | A − Aj, −A − Aj, A + Aj, A − Aj, A + Aj, −A − Aj, −A − Aj, −A + Aj, A − Aj, A + Aj, −A + Aj, −A + Aj, −A − Aj, A + Aj, −A + Aj, −A + Aj, A − Aj, A − Aj |
| 56 | Polarization 1 | −A − Aj, A − Aj, A − Aj, −A + Aj, A − Aj, −A + Aj, −A + Aj, −A − Aj, A + Aj, A + Aj, A − Aj, −A − Aj, A − Aj, −A + Aj, A + Aj, −A + Aj, −A − Aj, A + Aj |
| | Polarization 2 | A + Aj, −A + Aj, A − Aj, A + Aj, A − Aj, −A + Aj, −A + Aj, −A − Aj, A + Aj, A − Aj, −A − Aj, −A − Aj, −A + Aj, A − Aj, −A − Aj, −A − Aj, A + Aj, A + Aj |
| 57 | Polarization 1 | −A + Aj, A − Aj, A + Aj, −A + Aj, A + Aj, −A − Aj, A − Aj, −A − Aj, −A + Aj, −A + Aj, A − Aj, A + Aj, A + Aj, −A − Aj, A + Aj, −A − Aj, −A − Aj, A − Aj |
| | Polarization 2 | A − Aj, A − Aj, −A + Aj, −A + Aj, A + Aj, −A − Aj, −A + Aj, −A + Aj, A + Aj, A − Aj, −A + Aj, −A − Aj, −A − Aj, A + Aj, A − Aj, A + Aj, −A − Aj, A − Aj |
| 58 | Polarization 1 | −A − Aj, A + Aj, A − Aj, −A − Aj, A − Aj, −A + Aj, A + Aj, −A + Aj, −A − Aj, −A − Aj, A + Aj, A − Aj, A − Aj, −A + Aj, A − Aj, −A + Aj, −A + Aj, A + Aj |
| | Polarization 2 | A + Aj, A + Aj, −A − Aj, −A − Aj, A − Aj, −A + Aj, −A − Aj, −A − Aj, A − Aj, A + Aj, −A − Aj, −A + Aj, −A + Aj, A − Aj, A + Aj, A − Aj, −A + Aj, A + Aj |
| 59 | Polarization 1 | −A + Aj, −A − Aj, −A − Aj, A + Aj, −A − Aj, A + Aj, A + Aj, −A + Aj, A − Aj, A − Aj, −A − Aj, −A + Aj, −A − Aj, A + Aj, A − Aj, A + Aj, −A + Aj, A − Aj |
| | Polarization 2 | A − Aj, A + Aj, −A − Aj, A − Aj, −A − Aj, A + Aj, A + Aj, −A + Aj, A − Aj, −A − Aj, −A + Aj, −A + Aj, A + Aj, −A − Aj, −A + Aj, −A + Aj, A − Aj, A − Aj |
| 60 | Polarization 1 | −A − Aj, −A + Aj, −A + Aj, A − Aj, −A + Aj, A − Aj, A − Aj, −A − Aj, A + Aj, A + Aj, −A + Aj, −A − Aj, −A + Aj, A − Aj, A + Aj, A − Aj, −A − Aj, A + Aj |
| | Polarization 2 | A + Aj, A − Aj, −A + Aj, A + Aj, −A + Aj, A − Aj, A − Aj, −A − Aj, A + Aj, −A + Aj, −A − Aj, −A − Aj, A − Aj, −A + Aj, −A − Aj, −A − Aj, A + Aj, A + Aj |
| 61 | Polarization 1 | A − Aj, A − Aj, −A + Aj, −A + Aj, −A − Aj, A + Aj, −A + Aj, −A + Aj, −A − Aj, A − Aj, −A + Aj, A + Aj, A + Aj, −A − Aj, A − Aj, −A − Aj, A + Aj, A − Aj |
| | Polarization 2 | −A + Aj, A − Aj, −A − Aj, −A + Aj, −A − Aj, A + Aj, A − Aj, A + Aj, −A + Aj, −A + Aj, A − Aj, −A − Aj, −A − Aj, A + Aj, −A − Aj, A + Aj, A + Aj, A − Aj |
| 62 | Polarization 1 | A + Aj, A + Aj, −A − Aj, −A − Aj, −A + Aj, A − Aj, −A − Aj, −A − Aj, −A + Aj, A + Aj, −A − Aj, A − Aj, A − Aj, −A + Aj, A + Aj, −A + Aj, A − Aj, A + Aj |
| | Polarization 2 | −A − Aj, A + Aj, −A + Aj, −A − Aj, −A + Aj, A − Aj, A + Aj, A − Aj, −A − Aj, −A − Aj, A + Aj, −A + Aj, −A + Aj, A − Aj, −A + Aj, A − Aj, A − Aj, A + Aj |
| 63 | Polarization 1 | −A + Aj, −A − Aj, A − Aj, A − Aj, −A + Aj, A + Aj, −A − Aj, −A + Aj, −A + Aj, A + Aj, −A − Aj, A + Aj, −A − Aj, A − Aj, A + Aj, −A + Aj, A − Aj, A − Aj |
| | Polarization 2 | A − Aj, −A + Aj, −A − Aj, A + Aj, −A + Aj, A + Aj, −A − Aj, −A + Aj, A + Aj, A − Aj, −A − Aj, −A − Aj, −A + Aj, A + Aj, −A − Aj, A − Aj, A − Aj, A + Aj |
| 64 | Polarization 1 | −A − Aj, −A + Aj, A + Aj, A + Aj, −A − Aj, A − Aj, −A + Aj, −A − Aj, −A − Aj, A − Aj, −A + Aj, A − Aj, −A + Aj, A + Aj, A − Aj, −A − Aj, A + Aj, A + Aj |
| | Polarization 2 | A + Aj, −A − Aj, −A + Aj, A − Aj, −A − Aj, A − Aj, −A + Aj, −A − Aj, A − Aj, A + Aj, −A + Aj, −A + Aj, −A − Aj, A − Aj, −A + Aj, A + Aj, A + Aj, A − Aj |

(8) When $N_{TS}$=7, the training sequence is one item in the following Table 38.

TABLE 38

| Index | Polarization | Training sequence |
|---|---|---|
| 1 | Polarization 1 | −A − Aj, A − Aj, A + Aj, A − Aj, −A + Aj, −A + Aj, −A − Aj |
| | Polarization 2 | −A − Aj, −A − Aj, A + Aj, −A − Aj, −A + Aj, A − Aj, A + Aj |
| 2 | Polarization 1 | −A − Aj, A − Aj, A − Aj, A + Aj, −A − Aj, −A + Aj, −A + Aj |
| | Polarization 2 | −A − Aj, −A + Aj, A + Aj, −A − Aj, A − Aj, A + Aj, −A − Aj |
| 3 | Polarization 1 | −A − Aj, −A + Aj, A − Aj, A − Aj, A + Aj, −A − Aj, −A + Aj |
| | Polarization 2 | −A − Aj, −A − Aj, A + Aj, −A − Aj, A − Aj, −A + Aj, A + Aj |
| 4 | Polarization 1 | −A − Aj, A − Aj, A + Aj, −A − Aj, −A + Aj, A + Aj, −A − Aj |
| | Polarization 2 | −A − Aj, −A + Aj, −A + Aj, A + Aj, −A − Aj, A − Aj, A − Aj |
| 5 | Polarization 1 | −A − Aj, −A + Aj, A + Aj, −A + Aj, A − Aj, A − Aj, −A − Aj |
| | Polarization 2 | −A − Aj, −A − Aj, A + Aj, −A − Aj, A − Aj, −A + Aj, A + Aj |
| 6 | Polarization 1 | −A − Aj, A − Aj, −A + Aj, −A + Aj, A + Aj, −A − Aj, A − Aj |
| | Polarization 2 | −A − Aj, −A − Aj, A + Aj, −A − Aj, −A + Aj, A − Aj, A + Aj |
| 7 | Polarization 1 | −A − Aj, A − Aj, A + Aj, A + Aj, −A − Aj, −A + Aj, −A − Aj |
| | Polarization 2 | −A + Aj, A − Aj, −A − Aj, −A + Aj, −A + Aj, A − Aj, A + Aj |
| 8 | Polarization 1 | −A − Aj, A − Aj, A + Aj, A − Aj, −A − Aj, −A + Aj, −A + Aj |
| | Polarization 2 | −A + Aj, −A + Aj, A + Aj, −A − Aj, A + Aj, −A − Aj, A − Aj |
| 9 | Polarization 1 | −A − Aj, A + Aj, A − Aj, −A − Aj, A − Aj, −A + Aj, −A + Aj |
| | Polarization 2 | −A + Aj, −A − Aj, A − Aj, −A + Aj, A + Aj, A + Aj, −A − Aj |
| 10 | Polarization 1 | −A − Aj, A − Aj, −A + Aj, A + Aj, A − Aj, −A + Aj, −A − Aj |
| | Polarization 2 | −A + Aj, −A − Aj, −A + Aj, A + Aj, A + Aj, −A − Aj, A − Aj |
| 11 | Polarization 1 | −A − Aj, A + Aj, A − Aj, −A − Aj, −A − Aj, A + Aj, −A + Aj |
| | Polarization 2 | −A + Aj, −A − Aj, A − Aj, A − Aj, −A + Aj, A + Aj, −A + Aj |
| 12 | Polarization 1 | −A − Aj, −A + Aj, A + Aj, A + Aj, −A − Aj, A − Aj, −A − Aj |
| | Polarization 2 | −A + Aj, A − Aj, A + Aj, −A + Aj, −A + Aj, A − Aj, −A − Aj |
| 13 | Polarization 1 | −A − Aj, −A + Aj, A − Aj, A + Aj, −A + Aj, A − Aj, −A − Aj |
| | Polarization 2 | −A + Aj, A + Aj, −A + Aj, −A − Aj, −A − Aj, A + Aj, A − Aj |
| 14 | Polarization 1 | −A − Aj, −A + Aj, A + Aj, −A − Aj, A − Aj, A − Aj, −A + Aj |
| | Polarization 2 | −A + Aj, A − Aj, A + Aj, −A + Aj, A + Aj, −A − Aj, −A − Aj |
| 15 | Polarization 1 | −A − Aj, A − Aj, A + Aj, −A − Aj, −A + Aj, −A + Aj, A − Aj |
| | Polarization 2 | −A + Aj, A − Aj, −A − Aj, −A + Aj, −A − Aj, A + Aj, A + Aj |
| 16 | Polarization 1 | −A − Aj, −A − Aj, A − Aj, −A + Aj, A − Aj, −A + Aj, A + Aj |
| | Polarization 2 | −A + Aj, A + Aj, A − Aj, A + Aj, −A + Aj, −A − Aj, −A − Aj |
| 17 | Polarization 1 | −A − Aj, −A + Aj, −A − Aj, A − Aj, A − Aj, −A + Aj, A + Aj |
| | Polarization 2 | −A + Aj, A + Aj, −A − Aj, A − Aj, A + Aj, −A − Aj, −A + Aj |
| 18 | Polarization 1 | −A − Aj, A + Aj, −A + Aj, −A − Aj, −A + Aj, A − Aj, A − Aj |
| | Polarization 2 | −A + Aj, A + Aj, A − Aj, −A + Aj, −A − Aj, −A − Aj, A + Aj |
| 19 | Polarization 1 | −A − Aj, A + Aj, −A + Aj, −A − Aj, −A − Aj, A + Aj, A − Aj |
| | Polarization 2 | −A + Aj, A + Aj, A − Aj, A − Aj, −A + Aj, −A − Aj, −A + Aj |
| 20 | Polarization 1 | −A − Aj, A − Aj, −A − Aj, −A + Aj, −A + Aj, A − Aj, A + Aj |
| | Polarization 2 | −A + Aj, −A − Aj, A + Aj, A − Aj, −A − Aj, A + Aj, −A + Aj |
| 21 | Polarization 1 | −A − Aj, −A + Aj, A + Aj, −A + Aj, −A − Aj, A − Aj, A − Aj |
| | Polarization 2 | −A + Aj, −A + Aj, −A − Aj, A + Aj, −A − Aj, A + Aj, A − Aj |
| 22 | Polarization 1 | −A − Aj, −A − Aj, −A + Aj, A − Aj, −A + Aj, A − Aj, A + Aj |
| | Polarization 2 | −A + Aj, −A − Aj, A − Aj, −A − Aj, −A + Aj, A + Aj, A + Aj |
| 23 | Polarization 1 | −A − Aj, A − Aj, A + Aj, A + Aj, −A − Aj, −A + Aj, −A − Aj |
| | Polarization 2 | A − Aj, −A + Aj, A + Aj, A − Aj, A − Aj, −A + Aj, −A − Aj |
| 24 | Polarization 1 | −A − Aj, A − Aj, A + Aj, A − Aj, −A − Aj, −A + Aj, −A + Aj |
| | Polarization 2 | A − Aj, A − Aj, −A − Aj, A + Aj, −A − Aj, A + Aj, −A + Aj |
| 25 | Polarization 1 | −A − Aj, A + Aj, A − Aj, −A − Aj, A − Aj, −A + Aj, −A + Aj |
| | Polarization 2 | A − Aj, A + Aj, −A + Aj, A − Aj, −A − Aj, −A − Aj, A + Aj |
| 26 | Polarization 1 | −A − Aj, A − Aj, −A + Aj, A + Aj, A − Aj, −A + Aj, −A − Aj |
| | Polarization 2 | A − Aj, A + Aj, A − Aj, −A − Aj, −A − Aj, A + Aj, −A + Aj |
| 27 | Polarization 1 | −A − Aj, A + Aj, A − Aj, −A − Aj, −A − Aj, A + Aj, −A + Aj |
| | Polarization 2 | A − Aj, A + Aj, −A + Aj, −A + Aj, A − Aj, −A − Aj, A − Aj |
| 28 | Polarization 1 | −A − Aj, −A + Aj, A + Aj, A + Aj, −A − Aj, A − Aj, −A − Aj |
| | Polarization 2 | A − Aj, −A + Aj, −A − Aj, A − Aj, A − Aj, −A + Aj, A + Aj |
| 29 | Polarization 1 | −A − Aj, −A + Aj, A − Aj, A + Aj, −A + Aj, A − Aj, −A − Aj |
| | Polarization 2 | A − Aj, −A − Aj, A − Aj, A + Aj, A + Aj, −A − Aj, −A + Aj |
| 30 | Polarization 1 | −A − Aj, −A + Aj, A + Aj, −A − Aj, A − Aj, A − Aj, −A + Aj |
| | Polarization 2 | A − Aj, −A + Aj, −A − Aj, A − Aj, −A − Aj, A + Aj, A + Aj |
| 31 | Polarization 1 | −A − Aj, A − Aj, A + Aj, −A − Aj, −A + Aj, −A + Aj, A − Aj |
| | Polarization 2 | A − Aj, −A + Aj, A + Aj, A − Aj, A + Aj, −A − Aj, −A − Aj |
| 32 | Polarization 1 | −A − Aj, −A − Aj, A − Aj, −A + Aj, A − Aj, −A + Aj, A + Aj |
| | Polarization 2 | A − Aj, −A − Aj, −A + Aj, −A − Aj, A − Aj, A + Aj, A + Aj |
| 33 | Polarization 1 | −A − Aj, −A + Aj, −A − Aj, A − Aj, A − Aj, −A + Aj, A + Aj |
| | Polarization 2 | A − Aj, −A − Aj, A + Aj, −A + Aj, −A − Aj, A + Aj, A − Aj |
| 34 | Polarization 1 | −A − Aj, A + Aj, −A + Aj, −A − Aj, −A + Aj, A − Aj, A − Aj |
| | Polarization 2 | A − Aj, −A − Aj, −A + Aj, A − Aj, A + Aj, A + Aj, −A − Aj |
| 35 | Polarization 1 | −A − Aj, A + Aj, −A + Aj, −A − Aj, −A − Aj, A + Aj, A − Aj |
| | Polarization 2 | A − Aj, −A − Aj, −A + Aj, −A + Aj, A − Aj, A + Aj, A − Aj |
| 36 | Polarization 1 | −A − Aj, A − Aj, −A − Aj, −A + Aj, −A + Aj, A − Aj, A + Aj |
| | Polarization 2 | A − Aj, A + Aj, −A − Aj, −A + Aj, A + Aj, −A − Aj, A − Aj |
| 37 | Polarization 1 | −A − Aj, −A + Aj, A + Aj, −A + Aj, −A − Aj, A − Aj, A − Aj |
| | Polarization 2 | A − Aj, A − Aj, A + Aj, −A − Aj, A + Aj, −A − Aj, −A + Aj |

TABLE 38-continued

| Index | Polarization | Training sequence |
|---|---|---|
| 38 | Polarization 1 | −A − Aj, −A − Aj, −A + Aj, A − Aj, −A + Aj, A − Aj, A + Aj |
| | Polarization 2 | A − Aj, A + Aj, −A + Aj, A + Aj, A − Aj, −A − Aj, −A − Aj |
| 39 | Polarization 1 | −A − Aj, A − Aj, A + Aj, A − Aj, −A + Aj, −A + Aj, −A − Aj |
| | Polarization 2 | A + Aj, A + Aj, −A − Aj, A + Aj, A − Aj, −A + Aj, −A − Aj |
| 40 | Polarization 1 | −A − Aj, A − Aj, A − Aj, A + Aj, −A − Aj, −A + Aj, −A + Aj |
| | Polarization 2 | A + Aj, A + Aj, A − Aj, −A − Aj, A + Aj, −A + Aj, −A − Aj |
| 41 | Polarization 1 | −A − Aj, A − Aj, A − Aj, A + Aj, −A − Aj, −A + Aj, −A + Aj |
| | Polarization 2 | A + Aj, A − Aj, −A − Aj, A + Aj, −A + Aj, −A − Aj, A + Aj |
| 42 | Polarization 1 | −A − Aj, −A + Aj, A − Aj, A − Aj, A + Aj, −A − Aj, −A + Aj |
| | Polarization 2 | A + Aj, A + Aj, −A − Aj, A + Aj, −A + Aj, A − Aj, −A − Aj |
| 43 | Polarization 1 | −A − Aj, A − Aj, A + Aj, −A − Aj, −A + Aj, A + Aj, −A − Aj |
| | Polarization 2 | A + Aj, A − Aj, A − Aj, −A − Aj, A + Aj, −A + Aj, −A + Aj |
| 44 | Polarization 1 | −A − Aj, −A + Aj, A + Aj, −A + Aj, A − Aj, A − Aj, −A − Aj |
| | Polarization 2 | A + Aj, A + Aj, −A − Aj, A + Aj, −A + Aj, A − Aj, −A − Aj |
| 45 | Polarization 1 | −A − Aj, −A + Aj, A + Aj, −A − Aj, A − Aj, A + Aj, −A − Aj |
| | Polarization 2 | A + Aj, −A + Aj, −A + Aj, −A − Aj, A + Aj, A − Aj, A − Aj |
| 46 | Polarization 1 | −A − Aj, −A − Aj, A − Aj, A + Aj, −A − Aj, −A + Aj, A + Aj |
| | Polarization 2 | A + Aj, A − Aj, A − Aj, −A − Aj, A + Aj, −A + Aj, −A + Aj |
| 47 | Polarization 1 | −A − Aj, A − Aj, −A + Aj, −A + Aj, A + Aj, −A − Aj, A − Aj |
| | Polarization 2 | A + Aj, A + Aj, −A − Aj, A + Aj, A − Aj, −A + Aj, −A − Aj |
| 48 | Polarization 1 | −A − Aj, −A − Aj, A + Aj, −A − Aj, A − Aj, −A + Aj, A + Aj |
| | Polarization 2 | A + Aj, A − Aj, −A − Aj, A − Aj, −A + Aj, −A + Aj, A + Aj |
| 49 | Polarization 1 | −A − Aj, −A − Aj, A + Aj, −A − Aj, A − Aj, −A + Aj, A + Aj |
| | Polarization 2 | A + Aj, A − Aj, −A + Aj, −A + Aj, −A − Aj, A + Aj, A − Aj |
| 50 | Polarization 1 | −A − Aj, −A − Aj, A + Aj, −A − Aj, −A + Aj, A − Aj, A + Aj |
| | Polarization 2 | A + Aj, −A + Aj, A − Aj, A − Aj, −A − Aj, A + Aj, −A + Aj |
| 51 | Polarization 1 | −A − Aj, −A − Aj, A + Aj, −A − Aj, −A + Aj, A − Aj, A + Aj |
| | Polarization 2 | A + Aj, −A + Aj, −A − Aj, −A + Aj, A − Aj, A − Aj, A + Aj |
| 52 | Polarization 1 | −A − Aj, −A + Aj, −A + Aj, A + Aj, −A − Aj, A − Aj, A − Aj |
| | Polarization 2 | A + Aj, A + Aj, −A + Aj, −A − Aj, A + Aj, A − Aj, −A − Aj |
| 53 | Polarization 1 | −A − Aj, −A + Aj, −A + Aj, A + Aj, −A − Aj, A − Aj, A − Aj |
| | Polarization 2 | A + Aj, −A + Aj, −A − Aj, A + Aj, A − Aj, −A − Aj, A + Aj |
| 54 | Polarization 1 | −A − Aj, −A − Aj, −A + Aj, A + Aj, −A − Aj, A − Aj, A + Aj |
| | Polarization 2 | A + Aj, −A + Aj, −A + Aj, −A − Aj, A + Aj, A − Aj, A − Aj |
| 55 | Polarization 1 | −A + Aj, A + Aj, A + Aj, A − Aj, −A + Aj, −A − Aj, −A − Aj |
| | Polarization 2 | −A + Aj, −A − Aj, A − Aj, −A + Aj, A + Aj, A − Aj, −A + Aj |
| 56 | Polarization 1 | −A + Aj, A + Aj, A + Aj, A − Aj, −A + Aj, −A − Aj, −A − Aj |
| | Polarization 2 | −A + Aj, −A + Aj, −A − Aj, A − Aj, −A + Aj, A + Aj, A − Aj |
| 57 | Polarization 1 | −A + Aj, A + Aj, A − Aj, A + Aj, −A − Aj, −A − Aj, −A + Aj |
| | Polarization 2 | −A + Aj, −A + Aj, A − Aj, −A + Aj, −A − Aj, A + Aj, A − Aj |
| 58 | Polarization 1 | −A + Aj, −A − Aj, A + Aj, A + Aj, A − Aj, −A + Aj, −A − Aj |
| | Polarization 2 | −A + Aj, −A + Aj, A − Aj, −A + Aj, A + Aj, −A − Aj, A − Aj |
| 59 | Polarization 1 | −A + Aj, A + Aj, A − Aj, −A + Aj, −A − Aj, A − Aj, −A + Aj |
| | Polarization 2 | −A + Aj, −A − Aj, −A − Aj, A − Aj, −A + Aj, A + Aj, A + Aj |
| 60 | Polarization 1 | −A + Aj, −A − Aj, A − Aj, −A − Aj, A + Aj, A + Aj, −A + Aj |
| | Polarization 2 | −A + Aj, −A + Aj, A − Aj, −A + Aj, A + Aj, −A − Aj, A − Aj |
| 61 | Polarization 1 | −A + Aj, −A + Aj, A + Aj, A − Aj, −A + Aj, −A − Aj, A − Aj |
| | Polarization 2 | −A + Aj, −A − Aj, −A − Aj, A − Aj, −A + Aj, A + Aj, A + Aj |
| 62 | Polarization 1 | −A + Aj, A + Aj, −A − Aj, −A − Aj, A − Aj, −A + Aj, A + Aj |
| | Polarization 2 | −A + Aj, −A + Aj, A − Aj, −A + Aj, −A − Aj, A + Aj, A − Aj |
| 63 | Polarization 1 | −A + Aj, A + Aj, A + Aj, A − Aj, −A + Aj, −A − Aj, −A − Aj |
| | Polarization 2 | A − Aj, A + Aj, −A + Aj, A − Aj, −A − Aj, −A + Aj, A − Aj |
| 64 | Polarization 1 | −A + Aj, A + Aj, A − Aj, A + Aj, −A − Aj, −A − Aj, −A + Aj |
| | Polarization 2 | A − Aj, A − Aj, −A + Aj, A − Aj, A + Aj, −A − Aj, −A + Aj |
| 65 | Polarization 1 | −A + Aj, −A − Aj, A + Aj, A + Aj, A − Aj, −A + Aj, −A − Aj |
| | Polarization 2 | A − Aj, A − Aj, −A + Aj, A − Aj, −A − Aj, A + Aj, −A + Aj |
| 66 | Polarization 1 | −A + Aj, A + Aj, A − Aj, −A + Aj, −A − Aj, A − Aj, −A + Aj |
| | Polarization 2 | A − Aj, A + Aj, A + Aj, −A + Aj, A − Aj, −A − Aj, −A − Aj |
| 67 | Polarization 1 | −A + Aj, −A − Aj, A − Aj, −A + Aj, A + Aj, A − Aj, −A + Aj |
| | Polarization 2 | A − Aj, −A − Aj, −A − Aj, −A + Aj, A − Aj, A + Aj, A + Aj |
| 68 | Polarization 1 | −A + Aj, −A − Aj, A − Aj, −A − Aj, A + Aj, A + Aj, −A + Aj |
| | Polarization 2 | A − Aj, A − Aj, −A + Aj, A − Aj, −A − Aj, A + Aj, −A + Aj |
| 69 | Polarization 1 | −A + Aj, A + Aj, −A − Aj, −A − Aj, A − Aj, −A + Aj, A + Aj |
| | Polarization 2 | A − Aj, A − Aj, −A + Aj, A − Aj, A + Aj, −A − Aj, −A + Aj |
| 70 | Polarization 1 | −A + Aj, −A + Aj, A − Aj, −A + Aj, A + Aj, −A − Aj, A − Aj |
| | Polarization 2 | A − Aj, A + Aj, −A + Aj, A + Aj, −A − Aj, −A − Aj, A − Aj |
| 71 | Polarization 1 | −A + Aj, −A + Aj, A − Aj, −A + Aj, A + Aj, −A − Aj, A − Aj |
| | Polarization 2 | A − Aj, A + Aj, −A − Aj, −A − Aj, −A + Aj, A − Aj, A + Aj |
| 72 | Polarization 1 | −A + Aj, −A + Aj, A − Aj, −A + Aj, −A − Aj, A + Aj, A − Aj |
| | Polarization 2 | A − Aj, −A − Aj, A + Aj, A + Aj, −A + Aj, A − Aj, −A − Aj |
| 73 | Polarization 1 | −A + Aj, −A + Aj, A − Aj, −A + Aj, −A − Aj, A + Aj, A − Aj |
| | Polarization 2 | A − Aj, −A − Aj, −A + Aj, −A − Aj, A + Aj, A + Aj, A − Aj |
| 74 | Polarization 1 | −A + Aj, −A − Aj, −A − Aj, A − Aj, −A + Aj, A + Aj, A + Aj |
| | Polarization 2 | A − Aj, −A − Aj, −A + Aj, A − Aj, A + Aj, −A + Aj, A − Aj |
| 75 | Polarization 1 | −A + Aj, A + Aj, A − Aj, A + Aj, −A + Aj, −A − Aj, −A − Aj |
| | Polarization 2 | A + Aj, A + Aj, −A + Aj, A − Aj, −A + Aj, A − Aj, −A − Aj |
| 76 | Polarization 1 | −A + Aj, A + Aj, A − Aj, A − Aj, −A + Aj, −A − Aj, −A + Aj |
| | Polarization 2 | A + Aj, −A − Aj, A − Aj, A + Aj, A + Aj, −A − Aj, −A + Aj |

TABLE 38-continued

| Index | Polarization | Training sequence |
|---|---|---|
| 77 | Polarization 1 | −A + Aj, A − Aj, A + Aj, −A + Aj, A + Aj, −A − Aj, −A − Aj |
| | Polarization 2 | A + Aj, A − Aj, −A − Aj, A + Aj, −A + Aj, −A + Aj, A − Aj |
| 78 | Polarization 1 | −A + Aj, A + Aj, −A − Aj, A − Aj, A + Aj, −A − Aj, −A + Aj |
| | Polarization 2 | A + Aj, A − Aj, A + Aj, −A + Aj, −A + Aj, A − Aj, −A − Aj |
| 79 | Polarization 1 | −A + Aj, A − Aj, A + Aj, −A + Aj, −A + Aj, A − Aj, −A − Aj |
| | Polarization 2 | A + Aj, A − Aj, −A − Aj, −A − Aj, A + Aj, −A + Aj, A + Aj |
| 80 | Polarization 1 | −A + Aj, −A − Aj, A + Aj, A − Aj, −A − Aj, A + Aj, −A + Aj |
| | Polarization 2 | A + Aj, −A + Aj, A + Aj, A − Aj, A − Aj, −A + Aj, −A − Aj |
| 81 | Polarization 1 | −A + Aj, −A − Aj, A − Aj, A − Aj, −A + Aj, A + Aj, −A + Aj |
| | Polarization 2 | A + Aj, −A − Aj, −A + Aj, A + Aj, A + Aj, −A − Aj, A − Aj |
| 82 | Polarization 1 | −A + Aj, −A − Aj, A − Aj, −A + Aj, A + Aj, A + Aj, −A − Aj |
| | Polarization 2 | A + Aj, −A − Aj, −A + Aj, A + Aj, −A + Aj, A − Aj, A − Aj |
| 83 | Polarization 1 | −A + Aj, A + Aj, A − Aj, −A + Aj, −A − Aj, −A − Aj, A + Aj |
| | Polarization 2 | A + Aj, −A − Aj, A − Aj, A + Aj, A − Aj, −A + Aj, −A + Aj |
| 84 | Polarization 1 | −A + Aj, −A + Aj, A + Aj, −A − Aj, A + Aj, −A − Aj, A − Aj |
| | Polarization 2 | A + Aj, −A + Aj, −A − Aj, −A + Aj, A + Aj, A − Aj, A − Aj |
| 85 | Polarization 1 | −A + Aj, −A − Aj, −A + Aj, A + Aj, A + Aj, −A − Aj, A − Aj |
| | Polarization 2 | A + Aj, −A + Aj, A − Aj, −A − Aj, −A + Aj, A − Aj, A + Aj |
| 86 | Polarization 1 | −A + Aj, A + Aj, −A + Aj, −A − Aj, −A − Aj, A + Aj, A − Aj |
| | Polarization 2 | A + Aj, A − Aj, −A + Aj, −A − Aj, A − Aj, −A + Aj, A + Aj |
| 87 | Polarization 1 | −A + Aj, A − Aj, −A − Aj, −A + Aj, −A + Aj, A − Aj, A + Aj |
| | Polarization 2 | A + Aj, −A + Aj, −A − Aj, −A − Aj, A + Aj, A − Aj, A + Aj |
| 88 | Polarization 1 | −A + Aj, A − Aj, −A − Aj, −A + Aj, −A − Aj, A + Aj, A + Aj |
| | Polarization 2 | A + Aj, −A + Aj, −A − Aj, A + Aj, A − Aj, A − Aj, −A + Aj |
| 89 | Polarization 1 | −A + Aj, −A − Aj, A − Aj, −A − Aj, −A + Aj, A + Aj, A + Aj |
| | Polarization 2 | A + Aj, A + Aj, A − Aj, −A + Aj, A − Aj, −A + Aj, −A − Aj |
| 90 | Polarization 1 | −A + Aj, −A + Aj, −A − Aj, A + Aj, −A − Aj, A + Aj, A − Aj |
| | Polarization 2 | A + Aj, A − Aj, −A − Aj, A − Aj, A + Aj, −A + Aj, −A + Aj |
| 91 | Polarization 1 | A − Aj, A + Aj, A + Aj, −A + Aj, A − Aj, −A − Aj, −A − Aj |
| | Polarization 2 | A − Aj, A − Aj, −A − Aj, −A + Aj, A − Aj, A + Aj, −A + Aj |
| 92 | Polarization 1 | A − Aj, A + Aj, A + Aj, −A + Aj, A − Aj, −A − Aj, −A − Aj |
| | Polarization 2 | A − Aj, −A − Aj, −A + Aj, A − Aj, A + Aj, −A + Aj, A − Aj |
| 93 | Polarization 1 | A − Aj, A − Aj, A + Aj, −A + Aj, A − Aj, −A − Aj, −A + Aj |
| | Polarization 2 | A − Aj, −A − Aj, −A − Aj, −A + Aj, A − Aj, A + Aj, A + Aj |
| 94 | Polarization 1 | A − Aj, A − Aj, −A + Aj, A − Aj, A + Aj, −A − Aj, −A + Aj |
| | Polarization 2 | A − Aj, −A − Aj, A + Aj, A + Aj, −A + Aj, A − Aj, −A − Aj |
| 95 | Polarization 1 | A − Aj, A − Aj, −A + Aj, A − Aj, A + Aj, −A − Aj, −A + Aj |
| | Polarization 2 | A − Aj, −A − Aj, −A + Aj, −A − Aj, A + Aj, A + Aj, A − Aj |
| 96 | Polarization 1 | A − Aj, A − Aj, −A + Aj, A − Aj, −A − Aj, A + Aj, −A + Aj |
| | Polarization 2 | A − Aj, A + Aj, −A + Aj, A + Aj, −A − Aj, −A − Aj, A − Aj |
| 97 | Polarization 1 | A − Aj, A − Aj, −A + Aj, A − Aj, −A − Aj, A + Aj, −A + Aj |
| | Polarization 2 | A − Aj, A + Aj, −A − Aj, −A − Aj, −A + Aj, A − Aj, A + Aj |
| 98 | Polarization 1 | A − Aj, A + Aj, −A + Aj, A − Aj, −A − Aj, −A + Aj, A − Aj |
| | Polarization 2 | A − Aj, −A − Aj, −A − Aj, −A + Aj, A − Aj, A + Aj, A + Aj |
| 99 | Polarization 1 | A − Aj, A − Aj, A + Aj, −A − Aj, A + Aj, −A − Aj, −A + Aj |
| | Polarization 2 | A + Aj, A − Aj, −A − Aj, A − Aj, A + Aj, −A + Aj, −A + Aj |
| 100 | Polarization 1 | A − Aj, A + Aj, −A + Aj, A + Aj, A − Aj, −A − Aj, −A − Aj |
| | Polarization 2 | A + Aj, A + Aj, A − Aj, −A + Aj, A − Aj, −A + Aj, −A − Aj |
| 101 | Polarization 1 | A − Aj, −A + Aj, A + Aj, A − Aj, A + Aj, −A − Aj, −A − Aj |
| | Polarization 2 | A + Aj, −A + Aj, −A − Aj, A + Aj, A − Aj, A − Aj, −A + Aj |
| 102 | Polarization 1 | A − Aj, −A + Aj, A + Aj, A − Aj, A − Aj, −A + Aj, −A − Aj |
| | Polarization 2 | A + Aj, −A + Aj, −A − Aj, −A − Aj, A + Aj, A − Aj, A + Aj |
| 103 | Polarization 1 | A − Aj, −A − Aj, A − Aj, A + Aj, A + Aj, −A − Aj, −A + Aj |
| | Polarization 2 | A + Aj, A − Aj, −A + Aj, −A − Aj, A − Aj, −A + Aj, A + Aj |
| 104 | Polarization 1 | A − Aj, A + Aj, A − Aj, −A − Aj, −A − Aj, A + Aj, −A + Aj |
| | Polarization 2 | A + Aj, −A + Aj, A − Aj, −A − Aj, −A + Aj, A − Aj, A + Aj |
| 105 | Polarization 1 | A − Aj, A − Aj, −A − Aj, A + Aj, −A − Aj, A + Aj, −A + Aj |
| | Polarization 2 | A + Aj, −A + Aj, −A − Aj, −A + Aj, A + Aj, A − Aj, A − Aj |
| 106 | Polarization 1 | A − Aj, −A − Aj, −A + Aj, A − Aj, A + Aj, A + Aj, −A − Aj |
| | Polarization 2 | A + Aj, −A − Aj, A − Aj, A + Aj, A − Aj, −A + Aj, −A + Aj |
| 107 | Polarization 1 | A − Aj, A + Aj, −A + Aj, A − Aj, −A − Aj, −A − Aj, A + Aj |
| | Polarization 2 | A + Aj, −A − Aj, −A + Aj, A + Aj, −A + Aj, A − Aj, A − Aj |
| 108 | Polarization 1 | A − Aj, A + Aj, −A + Aj, −A + Aj, A − Aj, −A − Aj, A − Aj |
| | Polarization 2 | A + Aj, −A − Aj, −A + Aj, A + Aj, A + Aj, −A − Aj, A − Aj |
| 109 | Polarization 1 | A − Aj, A + Aj, −A − Aj, −A + Aj, A + Aj, −A − Aj, A − Aj |
| | Polarization 2 | A + Aj, −A + Aj, A + Aj, A − Aj, A − Aj, −A + Aj, −A − Aj |
| 110 | Polarization 1 | A − Aj, −A + Aj, −A − Aj, A − Aj, A − Aj, −A + Aj, A + Aj |
| | Polarization 2 | A + Aj, A − Aj, −A − Aj, −A − Aj, A + Aj, −A + Aj, A + Aj |
| 111 | Polarization 1 | A − Aj, −A − Aj, A + Aj, −A + Aj, −A − Aj, A + Aj, A − Aj |
| | Polarization 2 | A + Aj, A − Aj, A + Aj, −A + Aj, −A + Aj, A − Aj, −A − Aj |
| 112 | Polarization 1 | A − Aj, −A + Aj, −A − Aj, A − Aj, −A − Aj, A + Aj, A + Aj |
| | Polarization 2 | A + Aj, A − Aj, −A − Aj, A + Aj, −A + Aj, −A + Aj, A − Aj |
| 113 | Polarization 1 | A − Aj, −A − Aj, −A + Aj, −A + Aj, A − Aj, A + Aj, A − Aj |
| | Polarization 2 | A + Aj, −A − Aj, A − Aj, A + Aj, A + Aj, −A − Aj, −A + Aj |
| 114 | Polarization 1 | A − Aj, −A − Aj, −A + Aj, −A − Aj, A − Aj, A + Aj, A + Aj |
| | Polarization 2 | A + Aj, A + Aj, −A + Aj, A − Aj, −A + Aj, A − Aj, −A − Aj |
| 115 | Polarization 1 | A + Aj, A − Aj, A − Aj, −A − Aj, A + Aj, −A + Aj, −A + Aj |
| | Polarization 2 | A + Aj, −A + Aj, −A − Aj, A + Aj, A − Aj, −A − Aj, A + Aj |

TABLE 38-continued

| Index | Polarization | Training sequence |
|---|---|---|
| 116 | Polarization 1 | A + Aj, A + Aj, −A − Aj, A + Aj, A − Aj, −A + Aj, −A − Aj |
| | Polarization 2 | A + Aj, −A + Aj, A − Aj, A − Aj, −A − Aj, A + Aj, −A + Aj |
| 117 | Polarization 1 | A + Aj, A + Aj, −A − Aj, A + Aj, A − Aj, −A + Aj, −A − Aj |
| | Polarization 2 | A + Aj, −A + Aj, −A − Aj, −A + Aj, A − Aj, A − Aj, A + Aj |
| 118 | Polarization 1 | A + Aj, A + Aj, −A − Aj, A + Aj, −A + Aj, A − Aj, −A − Aj |
| | Polarization 2 | A + Aj, A − Aj, −A − Aj, A − Aj, −A + Aj, −A + Aj, A + Aj |
| 119 | Polarization 1 | A + Aj, A + Aj, −A − Aj, A + Aj, −A + Aj, A − Aj, −A − Aj |
| | Polarization 2 | A + Aj, A − Aj, −A + Aj, −A + Aj, −A − Aj, A + Aj, A − Aj |
| 120 | Polarization 1 | A + Aj, A − Aj, −A − Aj, A + Aj, −A + Aj, −A − Aj, A + Aj |
| | Polarization 2 | A + Aj, −A + Aj, −A + Aj, −A − Aj, A + Aj, A − Aj, A − Aj |

(9) When $N_{TS}$=9, the training sequence TS is one item in the following Table 39.

TABLE 39

| Index | Polarization | Training sequence |
|---|---|---|
| 1 | Polarization 1 | −A − Aj, A − Aj, A + Aj, A − Aj, −A − Aj, A + Aj, −A − Aj, −A + Aj, −A + Aj |
| | Polarization 2 | −A − Aj, −A + Aj, −A − Aj, A − Aj, A + Aj, A − Aj, −A + Aj, −A − Aj, A + Aj |
| 2 | Polarization 1 | −A − Aj, A − Aj, −A − Aj, −A + Aj, A + Aj, −A + Aj, A − Aj, −A − Aj, A + Aj |
| | Polarization 2 | −A − Aj, −A + Aj, A + Aj, −A + Aj, −A − Aj, A + Aj, −A − Aj, A − Aj, A − Aj |
| 3 | Polarization 1 | −A − Aj, A − Aj, A + Aj, A − Aj, −A − Aj, A + Aj, −A − Aj, −A + Aj, −A + Aj |
| | Polarization 2 | −A + Aj, A + Aj, −A + Aj, −A − Aj, A − Aj, −A − Aj, A + Aj, −A + Aj, A − Aj |
| 4 | Polarization 1 | −A − Aj, −A + Aj, −A − Aj, A − Aj, A + Aj, A − Aj, −A + Aj, −A − Aj, A + Aj |
| | Polarization 2 | −A + Aj, −A − Aj, A − Aj, −A − Aj, −A + Aj, A − Aj, −A + Aj, A + Aj, A + Aj |
| 5 | Polarization 1 | −A − Aj, A − Aj, −A − Aj, −A + Aj, A + Aj, −A + Aj, A − Aj, −A − Aj, A + Aj |
| | Polarization 2 | −A + Aj, A + Aj, A − Aj, A + Aj, −A + Aj, A − Aj, −A + Aj, −A − Aj, −A − Aj |
| 6 | Polarization 1 | −A − Aj, −A + Aj, A + Aj, −A + Aj, −A − Aj, A + Aj, −A − Aj, A − Aj, A − Aj |
| | Polarization 2 | −A + Aj, −A − Aj, −A + Aj, A + Aj, A − Aj, A + Aj, −A − Aj, −A + Aj, A − Aj |
| 7 | Polarization 1 | −A − Aj, A − Aj, A + Aj, A − Aj, −A − Aj, A + Aj, −A − Aj, −A + Aj, −A + Aj |
| | Polarization 2 | A − Aj, −A − Aj, A − Aj, A + Aj, −A + Aj, A + Aj, −A − Aj, A − Aj, −A + Aj |
| 8 | Polarization 1 | −A − Aj, −A + Aj, −A − Aj, A − Aj, A + Aj, A − Aj, −A + Aj, −A − Aj, A + Aj |
| | Polarization 2 | A − Aj, A + Aj, −A + Aj, A + Aj, A − Aj, −A + Aj, A − Aj, −A − Aj, −A − Aj |
| 9 | Polarization 1 | −A − Aj, A − Aj, −A − Aj, −A + Aj, A + Aj, −A + Aj, A − Aj, −A − Aj, A + Aj |
| | Polarization 2 | A − Aj, −A − Aj, −A + Aj, −A − Aj, A − Aj, −A + Aj, A − Aj, A + Aj, A + Aj |
| 10 | Polarization 1 | −A − Aj, −A + Aj, A + Aj, −A + Aj, −A − Aj, A + Aj, −A − Aj, A − Aj, A − Aj |
| | Polarization 2 | A − Aj, A + Aj, A − Aj, −A − Aj, −A + Aj, −A − Aj, A + Aj, A − Aj, −A + Aj |
| 11 | Polarization 1 | −A − Aj, A − Aj, A + Aj, A − Aj, −A − Aj, A + Aj, −A − Aj, −A + Aj, −A + Aj |
| | Polarization 2 | A + Aj, A − Aj, A + Aj, −A + Aj, −A − Aj, −A + Aj, A − Aj, A + Aj, −A − Aj |
| 12 | Polarization 1 | −A − Aj, −A + Aj, −A − Aj, A − Aj, A + Aj, A − Aj, −A + Aj, −A − Aj, A + Aj |
| | Polarization 2 | A + Aj, −A + Aj, −A − Aj, −A + Aj, A + Aj, −A − Aj, A + Aj, A − Aj, A − Aj |
| 13 | Polarization 1 | −A − Aj, A − Aj, −A − Aj, −A + Aj, A + Aj, −A + Aj, A − Aj, −A − Aj, A + Aj |
| | Polarization 2 | A + Aj, A − Aj, −A − Aj, A − Aj, A + Aj, −A − Aj, A + Aj, −A + Aj, −A + Aj |
| 14 | Polarization 1 | −A − Aj, −A + Aj, A + Aj, −A + Aj, −A − Aj, A + Aj, −A − Aj, A − Aj, A − Aj |
| | Polarization 2 | A + Aj, −A + Aj, A + Aj, A − Aj, −A − Aj, A − Aj, −A + Aj, A + Aj, −A − Aj |
| 15 | Polarization 1 | −A + Aj, A + Aj, A − Aj, A + Aj, −A + Aj, A − Aj, −A + Aj, −A − Aj, −A − Aj |
| | Polarization 2 | −A + Aj, −A − Aj, −A + Aj, A + Aj, A − Aj, A + Aj, −A − Aj, −A + Aj, A − Aj |
| 16 | Polarization 1 | −A + Aj, A + Aj, −A + Aj, −A − Aj, A − Aj, −A − Aj, A + Aj, −A + Aj, A − Aj |
| | Polarization 2 | −A + Aj, −A − Aj, A − Aj, −A − Aj, −A + Aj, A − Aj, −A + Aj, A + Aj, A + Aj |
| 17 | Polarization 1 | −A + Aj, A + Aj, A − Aj, A + Aj, −A + Aj, A − Aj, −A + Aj, −A − Aj, −A − Aj |
| | Polarization 2 | A − Aj, A + Aj, A − Aj, −A − Aj, −A + Aj, −A − Aj, A + Aj, A − Aj, −A + Aj |
| 18 | Polarization 1 | −A + Aj, −A − Aj, −A + Aj, A + Aj, A − Aj, A + Aj, −A − Aj, −A + Aj, A − Aj |
| | Polarization 2 | A − Aj, −A − Aj, −A + Aj, −A − Aj, A − Aj, −A + Aj, A − Aj, A + Aj, A + Aj |
| 19 | Polarization 1 | −A + Aj, A + Aj, −A + Aj, −A − Aj, A − Aj, −A − Aj, A + Aj, −A + Aj, A − Aj |
| | Polarization 2 | A − Aj, A + Aj, −A + Aj, A + Aj, A − Aj, −A + Aj, A − Aj, −A − Aj, −A − Aj |
| 20 | Polarization 1 | −A + Aj, −A − Aj, A − Aj, −A − Aj, −A + Aj, A − Aj, −A + Aj, A + Aj, A + Aj |
| | Polarization 2 | A − Aj, −A − Aj, A − Aj, A + Aj, −A + Aj, A + Aj, −A − Aj, A − Aj, −A + Aj |
| 21 | Polarization 1 | −A + Aj, A + Aj, A − Aj, A + Aj, −A + Aj, A − Aj, −A + Aj, −A − Aj, −A − Aj |
| | Polarization 2 | A + Aj, −A + Aj, A + Aj, A − Aj, −A − Aj, A − Aj, −A + Aj, A + Aj, −A − Aj |
| 22 | Polarization 1 | −A + Aj, −A − Aj, −A + Aj, A + Aj, A − Aj, A + Aj, −A − Aj, −A + Aj, A − Aj |
| | Polarization 2 | A + Aj, A − Aj, −A − Aj, A − Aj, A + Aj, −A − Aj, A + Aj, −A + Aj, −A + Aj |
| 23 | Polarization 1 | −A + Aj, A + Aj, −A + Aj, −A − Aj, A − Aj, −A − Aj, A + Aj, −A + Aj, A − Aj |
| | Polarization 2 | A + Aj, −A + Aj, −A − Aj, −A + Aj, A + Aj, −A − Aj, A + Aj, A − Aj, A − Aj |
| 24 | Polarization 1 | −A + Aj, −A − Aj, A − Aj, −A − Aj, −A + Aj, A − Aj, −A + Aj, A + Aj, A + Aj |
| | Polarization 2 | A + Aj, A − Aj, A + Aj, −A + Aj, −A − Aj, −A + Aj, A − Aj, A + Aj, −A − Aj |
| 25 | Polarization 1 | A − Aj, A + Aj, −A + Aj, A + Aj, A − Aj, −A + Aj, A − Aj, −A − Aj, −A − Aj |
| | Polarization 2 | A − Aj, −A − Aj, A − Aj, A + Aj, −A + Aj, A + Aj, −A − Aj, A − Aj, −A + Aj |
| 26 | Polarization 1 | A − Aj, A + Aj, A − Aj, −A − Aj, −A + Aj, −A − Aj, A + Aj, A − Aj, −A + Aj |
| | Polarization 2 | A − Aj, −A − Aj, −A + Aj, −A − Aj, A − Aj, −A + Aj, A − Aj, A + Aj, A + Aj |
| 27 | Polarization 1 | A − Aj, A + Aj, −A + Aj, A + Aj, A − Aj, −A + Aj, A − Aj, −A − Aj, −A − Aj |
| | Polarization 2 | A + Aj, A − Aj, A + Aj, −A + Aj, −A − Aj, −A + Aj, A − Aj, A + Aj, −A − Aj |
| 28 | Polarization 1 | A − Aj, −A − Aj, A − Aj, A + Aj, −A + Aj, A + Aj, −A − Aj, A − Aj, −A + Aj |
| | Polarization 2 | A + Aj, −A + Aj, −A − Aj, −A + Aj, A + Aj, −A − Aj, A + Aj, A − Aj, A − Aj |

TABLE 39-continued

| Index | Polarization | Training sequence |
|---|---|---|
| 29 | Polarization 1 | A − Aj, A + Aj, A − Aj, −A − Aj, −A + Aj, −A − Aj, A + Aj, A − Aj, −A + Aj |
| | Polarization 2 | A + Aj, A − Aj, −A − Aj, A − Aj, A + Aj, −A − Aj, A + Aj, −A + Aj, −A + Aj |
| 30 | Polarization 1 | A − Aj, −A − Aj, −A + Aj, −A − Aj, A − Aj, −A + Aj, A − Aj, A + Aj, A + Aj |
| | Polarization 2 | A + Aj, −A + Aj, A + Aj, A − Aj, −A − Aj, A − Aj, −A + Aj, A + Aj, −A − Aj |
| 31 | Polarization 1 | A + Aj, A − Aj, −A − Aj, A − Aj, A + Aj, −A − Aj, A + Aj, −A + Aj, −A + Aj |
| | Polarization 2 | A + Aj, −A + Aj, A + Aj, A − Aj, −A − Aj, A − Aj, −A + Aj, A + Aj, −A − Aj |
| 32 | Polarization 1 | A + Aj, A − Aj, A + Aj, −A + Aj, −A − Aj, −A + Aj, A − Aj, A + Aj, −A − Aj |
| | Polarization 2 | A + Aj, −A + Aj, −A − Aj, −A + Aj, A + Aj, −A − Aj, A + Aj, A − Aj, A − Aj |

(10) When $N_{TS}$=11, the training sequence is one item in the following Table 40.

TABLE 40

| Index | Polarization | Training sequence |
|---|---|---|
| 1 | Polarization 1 | −A − Aj, A − Aj, A − Aj, −A + Aj, −A − Aj, A + Aj, A − Aj, −A + Aj, A + Aj, −A + Aj, −A − Aj |
| | Polarization 2 | −A − Aj, −A − Aj, A + Aj, A + Aj, A − Aj, A + Aj, −A − Aj, −A + Aj, −A − Aj, A − Aj, −A + Aj |
| 2 | Polarization 1 | −A − Aj, −A + Aj, −A + Aj, A − Aj, −A − Aj, A + Aj, −A + Aj, A − Aj, A + Aj, A − Aj, −A − Aj |
| | Polarization 2 | −A − Aj, −A − Aj, A + Aj, A + Aj, −A + Aj, A + Aj, −A − Aj, A − Aj, −A − Aj, −A + Aj, A − Aj |
| 3 | Polarization 1 | −A − Aj, A − Aj, A + Aj, −A + Aj, A + Aj, A − Aj, A + Aj, −A − Aj, −A + Aj, −A − Aj, −A − Aj |
| | Polarization 2 | −A + Aj, −A − Aj, −A + Aj, A + Aj, A − Aj, −A + Aj, −A + Aj, A + Aj, −A − Aj, A − Aj, A − Aj |
| 4 | Polarization 1 | −A − Aj, −A + Aj, A + Aj, A − Aj, A + Aj, −A + Aj, A + Aj, −A − Aj, A − Aj, −A − Aj, −A − Aj |
| | Polarization 2 | −A + Aj, A + Aj, −A + Aj, −A − Aj, A − Aj, −A + Aj, −A + Aj, −A − Aj, A + Aj, A − Aj, A − Aj |
| 5 | Polarization 1 | −A − Aj, −A + Aj, −A − Aj, A − Aj, A + Aj, −A − Aj, −A − Aj, A − Aj, −A + Aj, A + Aj, A + Aj |
| | Polarization 2 | −A + Aj, A + Aj, A − Aj, −A − Aj, A − Aj, A + Aj, A − Aj, −A + Aj, −A − Aj, −A + Aj, −A + Aj |
| 6 | Polarization 1 | −A − Aj, A − Aj, −A − Aj, −A + Aj, A + Aj, −A − Aj, −A − Aj, −A + Aj, A − Aj, A + Aj, A + Aj |
| | Polarization 2 | −A + Aj, −A − Aj, A − Aj, A + Aj, A − Aj, −A − Aj, A − Aj, −A + Aj, A + Aj, −A + Aj, −A + Aj |
| 7 | Polarization 1 | −A − Aj, A − Aj, A + Aj, −A + Aj, A + Aj, A − Aj, A + Aj, −A − Aj, −A + Aj, −A − Aj, −A − Aj |
| | Polarization 2 | A − Aj, A + Aj, A − Aj, −A − Aj, −A + Aj, A − Aj, A − Aj, −A − Aj, A + Aj, −A + Aj, −A + Aj |
| 8 | Polarization 1 | −A − Aj, −A + Aj, A + Aj, A − Aj, A + Aj, −A + Aj, A + Aj, −A − Aj, A − Aj, −A − Aj, −A − Aj |
| | Polarization 2 | A − Aj, −A − Aj, A − Aj, A + Aj, −A + Aj, A − Aj, A − Aj, A + Aj, −A − Aj, −A + Aj, −A + Aj |
| 9 | Polarization 1 | −A − Aj, −A + Aj, −A − Aj, A − Aj, A + Aj, −A − Aj, −A − Aj, A − Aj, −A + Aj, A + Aj, A + Aj |
| | Polarization 2 | A − Aj, −A − Aj, −A + Aj, A + Aj, −A + Aj, −A − Aj, −A + Aj, A − Aj, A + Aj, A − Aj, A − Aj |
| 10 | Polarization 1 | −A − Aj, A − Aj, −A − Aj, −A + Aj, A + Aj, −A − Aj, −A − Aj, −A + Aj, A − Aj, A + Aj, A + Aj |
| | Polarization 2 | A − Aj, A + Aj, −A + Aj, −A − Aj, −A + Aj, A + Aj, −A + Aj, A − Aj, −A − Aj, A − Aj, A − Aj |
| 11 | Polarization 1 | −A − Aj, A − Aj, A − Aj, −A + Aj, −A − Aj, A + Aj, A − Aj, −A + Aj, A + Aj, −A + Aj, −A − Aj |
| | Polarization 2 | A + Aj, A + Aj, −A − Aj, −A − Aj, −A + Aj, −A − Aj, A + Aj, A − Aj, A + Aj, −A + Aj, A − Aj |
| 12 | Polarization 1 | −A − Aj, −A − Aj, A + Aj, A + Aj, A − Aj, A + Aj, −A − Aj, −A + Aj, −A − Aj, A − Aj, −A + Aj |
| | Polarization 2 | A + Aj, −A + Aj, −A + Aj, A − Aj, A + Aj, −A − Aj, −A + Aj, A − Aj, −A − Aj, A − Aj, A + Aj |
| 13 | Polarization 1 | −A − Aj, −A + Aj, −A + Aj, A − Aj, −A − Aj, A + Aj, −A + Aj, A − Aj, A + Aj, A − Aj, −A − Aj |
| | Polarization 2 | A + Aj, A + Aj, −A − Aj, −A − Aj, A − Aj, −A − Aj, A + Aj, −A + Aj, A + Aj, A − Aj, −A + Aj |
| 14 | Polarization 1 | −A − Aj, −A − Aj, A + Aj, A + Aj, −A + Aj, A + Aj, −A − Aj, A − Aj, −A − Aj, −A + Aj, A − Aj |
| | Polarization 2 | A + Aj, A − Aj, A − Aj, −A + Aj, A + Aj, −A − Aj, A − Aj, −A + Aj, −A − Aj, −A + Aj, A + Aj |
| 15 | Polarization 1 | −A + Aj, A + Aj, A + Aj, −A − Aj, −A + Aj, A − Aj, A + Aj, −A − Aj, A − Aj, −A − Aj, −A + Aj |
| | Polarization 2 | −A + Aj, −A + Aj, A − Aj, A − Aj, A + Aj, A − Aj, −A + Aj, −A − Aj, −A + Aj, A + Aj, −A − Aj |
| 16 | Polarization 1 | −A + Aj, −A − Aj, −A − Aj, A + Aj, −A + Aj, A − Aj, −A − Aj, A + Aj, A − Aj, A + Aj, −A + Aj |
| | Polarization 2 | −A + Aj, −A + Aj, A − Aj, A − Aj, −A − Aj, A − Aj, −A + Aj, A + Aj, −A + Aj, −A − Aj, A + Aj |
| 17 | Polarization 1 | −A + Aj, A + Aj, A + Aj, −A − Aj, −A + Aj, A − Aj, A + Aj, −A − Aj, A − Aj, −A − Aj, −A + Aj |
| | Polarization 2 | A − Aj, A − Aj, −A + Aj, −A + Aj, −A − Aj, −A + Aj, A − Aj, A + Aj, A − Aj, −A − Aj, A + Aj |
| 18 | Polarization 1 | −A + Aj, −A + Aj, A − Aj, A − Aj, A + Aj, A − Aj, −A + Aj, −A − Aj, −A + Aj, A + Aj, −A − Aj |
| | Polarization 2 | A − Aj, −A − Aj, −A − Aj, A + Aj, A − Aj, −A + Aj, −A − Aj, A + Aj, −A + Aj, A + Aj, A − Aj |
| 19 | Polarization 1 | −A + Aj, −A − Aj, −A − Aj, A + Aj, −A + Aj, A − Aj, −A − Aj, A + Aj, A − Aj, A + Aj, −A + Aj |
| | Polarization 2 | A − Aj, A − Aj, −A + Aj, −A + Aj, A + Aj, −A + Aj, A − Aj, −A − Aj, A − Aj, A + Aj, −A − Aj |
| 20 | Polarization 1 | −A + Aj, −A + Aj, A − Aj, A − Aj, −A − Aj, A − Aj, −A + Aj, A + Aj, −A + Aj, −A − Aj, A + Aj |
| | Polarization 2 | A − Aj, A + Aj, A + Aj, −A − Aj, A − Aj, −A + Aj, A + Aj, −A − Aj, −A + Aj, −A − Aj, A − Aj |
| 21 | Polarization 1 | −A + Aj, A + Aj, A − Aj, −A − Aj, A − Aj, A + Aj, A − Aj, −A + Aj, −A − Aj, −A + Aj, −A + Aj |
| | Polarization 2 | A + Aj, A − Aj, A + Aj, −A + Aj, −A − Aj, A + Aj, A + Aj, −A + Aj, A − Aj, −A − Aj, −A − Aj |
| 22 | Polarization 1 | −A + Aj, −A − Aj, A − Aj, A + Aj, A − Aj, −A − Aj, A − Aj, −A + Aj, A + Aj, −A + Aj, −A + Aj |
| | Polarization 2 | A + Aj, −A + Aj, A + Aj, A − Aj, −A − Aj, A + Aj, A + Aj, A − Aj, −A + Aj, −A − Aj, −A − Aj |
| 23 | Polarization 1 | −A + Aj, −A − Aj, −A + Aj, A + Aj, A − Aj, −A + Aj, −A + Aj, A + Aj, −A − Aj, A − Aj, A − Aj |
| | Polarization 2 | A + Aj, −A + Aj, −A − Aj, A − Aj, −A − Aj, −A + Aj, −A − Aj, A + Aj, A − Aj, A + Aj, A + Aj |
| 24 | Polarization 1 | −A + Aj, A + Aj, −A + Aj, −A − Aj, A − Aj, −A + Aj, −A + Aj, −A − Aj, A + Aj, A − Aj, A − Aj |
| | Polarization 2 | A + Aj, A − Aj, −A − Aj, −A + Aj, −A − Aj, A − Aj, −A − Aj, A + Aj, −A + Aj, A + Aj, A + Aj |
| 25 | Polarization 1 | A − Aj, A − Aj, −A + Aj, −A + Aj, A + Aj, −A + Aj, A − Aj, −A − Aj, A − Aj, A + Aj, −A − Aj |
| | Polarization 2 | A − Aj, A + Aj, A + Aj, −A − Aj, A − Aj, −A + Aj, A + Aj, −A − Aj, −A + Aj, −A − Aj, A − Aj |
| 26 | Polarization 1 | A − Aj, A − Aj, −A + Aj, −A + Aj, −A − Aj, −A + Aj, A − Aj, A + Aj, A − Aj, −A − Aj, A + Aj |
| | Polarization 2 | A − Aj, −A − Aj, −A − Aj, A + Aj, A − Aj, −A + Aj, −A − Aj, A + Aj, −A + Aj, A + Aj, A − Aj |
| 27 | Polarization 1 | A − Aj, −A − Aj, A − Aj, A + Aj, −A + Aj, A − Aj, A − Aj, A + Aj, −A − Aj, −A + Aj, −A + Aj |
| | Polarization 2 | A + Aj, A − Aj, −A − Aj, −A + Aj, −A − Aj, A − Aj, −A − Aj, A + Aj, −A + Aj, A + Aj, A + Aj |
| 28 | Polarization 1 | A − Aj, A + Aj, A − Aj, −A − Aj, −A + Aj, A − Aj, A − Aj, −A − Aj, A + Aj, −A + Aj, −A + Aj |
| | Polarization 2 | A + Aj, −A + Aj, −A − Aj, A − Aj, −A − Aj, −A + Aj, −A − Aj, A + Aj, A − Aj, A + Aj, A + Aj |
| 29 | Polarization 1 | A − Aj, A + Aj, −A + Aj, −A − Aj, −A + Aj, A + Aj, −A + Aj, A − Aj, −A − Aj, A − Aj, A − Aj |
| | Polarization 2 | A + Aj, −A + Aj, A + Aj, A − Aj, −A − Aj, A + Aj, A + Aj, A − Aj, −A + Aj, −A − Aj, −A − Aj |

TABLE 40-continued

| Index | Polarization | Training sequence |
|---|---|---|
| 30 | Polarization 1 | A − Aj, −A − Aj, −A + Aj, A + Aj, −A + Aj, −A − Aj, −A + Aj, A − Aj, A + Aj, A − Aj, A − Aj |
| | Polarization 2 | A + Aj, A − Aj, A + Aj, −A + Aj, −A − Aj, A + Aj, A + Aj, −A + Aj, A − Aj, −A − Aj, −A − Aj |
| 31 | Polarization 1 | A + Aj, A + Aj, −A − Aj, −A − Aj, A − Aj, −A − Aj, A + Aj, −A + Aj, A + Aj, A − Aj, −A + Aj |
| | Polarization 2 | A + Aj, A − Aj, A − Aj, −A + Aj, A + Aj, −A − Aj, A − Aj, −A + Aj, −A − Aj, −A + Aj, A + Aj |
| 32 | Polarization 1 | A + Aj, A + Aj, −A − Aj, −A − Aj, −A + Aj, −A − Aj, A + Aj, A − Aj, A + Aj, −A + Aj, A − Aj |
| | Polarization 2 | A + Aj, −A + Aj, −A + Aj, A − Aj, A + Aj, −A − Aj, −A + Aj, A − Aj, −A − Aj, A − Aj, A + Aj |

(11) When $N_{TS}$=13, the training sequence is one item in the following Table 41.

TABLE 41

| Index | Polarization | Training sequence |
|---|---|---|
| 1 | Polarization 1 | −A − Aj, −A − Aj, A − Aj, A + Aj, A − Aj, −A − Aj, A + Aj, −A − Aj, −A + Aj, −A + Aj, A − Aj, A + Aj, −A + Aj |
| | Polarization 2 | −A − Aj, A + Aj, −A + Aj, A − Aj, −A − Aj, −A − Aj, −A + Aj, A − Aj, −A + Aj, −A − Aj, A − Aj, A + Aj, A + Aj |
| 2 | Polarization 1 | −A − Aj, A + Aj, A − Aj, −A + Aj, −A − Aj, −A − Aj, A − Aj, −A + Aj, A − Aj, −A − Aj, −A + Aj, A + Aj, A + Aj |
| | Polarization 2 | −A − Aj, −A − Aj, −A + Aj, A + Aj, −A + Aj, −A − Aj, A + Aj, −A − Aj, A − Aj, A − Aj, −A + Aj, A + Aj, A − Aj |
| 3 | Polarization 1 | −A − Aj, −A − Aj, A − Aj, A + Aj, A − Aj, −A − Aj, A + Aj, −A − Aj, −A + Aj, −A + Aj, A − Aj, A + Aj, −A + Aj |
| | Polarization 2 | −A + Aj, A − Aj, A + Aj, −A − Aj, −A + Aj, −A + Aj, A + Aj, −A − Aj, A + Aj, −A + Aj, −A − Aj, A − Aj, A − Aj |
| 4 | Polarization 1 | −A − Aj, A + Aj, A − Aj, −A + Aj, −A − Aj, −A − Aj, A − Aj, −A + Aj, A − Aj, −A − Aj, −A + Aj, A + Aj, A + Aj |
| | Polarization 2 | −A + Aj, −A + Aj, A + Aj, A − Aj, A + Aj, −A + Aj, A − Aj, −A + Aj, −A − Aj, −A − Aj, A + Aj, A − Aj, −A − Aj |
| 5 | Polarization 1 | −A − Aj, −A − Aj, −A + Aj, A + Aj, −A + Aj, −A − Aj, A + Aj, −A − Aj, A − Aj, A − Aj, −A + Aj, A + Aj, A − Aj |
| | Polarization 2 | −A + Aj, A − Aj, −A − Aj, A + Aj, −A + Aj, −A + Aj, −A − Aj, A + Aj, −A − Aj, −A + Aj, A + Aj, A − Aj, A − Aj |
| 6 | Polarization 1 | −A − Aj, A + Aj, −A + Aj, A − Aj, −A − Aj, −A − Aj, −A + Aj, A − Aj, −A + Aj, −A − Aj, A − Aj, A + Aj, A + Aj |
| | Polarization 2 | −A + Aj, −A + Aj, −A − Aj, A − Aj, −A − Aj, −A + Aj, A − Aj, −A + Aj, A + Aj, A + Aj, −A − Aj, A − Aj, A + Aj |
| 7 | Polarization 1 | −A − Aj, −A − Aj, A − Aj, A + Aj, A − Aj, −A − Aj, A + Aj, −A − Aj, −A + Aj, −A + Aj, A − Aj, A + Aj, −A + Aj |
| | Polarization 2 | A − Aj, −A + Aj, −A − Aj, A + Aj, A − Aj, A − Aj, −A − Aj, A + Aj, −A − Aj, A − Aj, A + Aj, −A + Aj, −A + Aj |
| 8 | Polarization 1 | −A − Aj, A + Aj, A − Aj, −A + Aj, −A − Aj, −A − Aj, A − Aj, −A + Aj, A − Aj, −A − Aj, −A + Aj, A + Aj, A + Aj |
| | Polarization 2 | A − Aj, A − Aj, −A − Aj, −A + Aj, −A − Aj, A − Aj, −A + Aj, A − Aj, A + Aj, A + Aj, −A − Aj, −A + Aj, A + Aj |
| 9 | Polarization 1 | −A − Aj, −A − Aj, −A + Aj, A + Aj, −A + Aj, −A − Aj, A + Aj, −A − Aj, A − Aj, A − Aj, −A + Aj, A + Aj, A − Aj |
| | Polarization 2 | A − Aj, −A + Aj, A + Aj, −A − Aj, A − Aj, A − Aj, A + Aj, −A − Aj, A + Aj, A − Aj, −A − Aj, −A + Aj, −A + Aj |
| 10 | Polarization 1 | −A − Aj, A + Aj, −A + Aj, A − Aj, −A − Aj, −A − Aj, −A + Aj, A − Aj, −A + Aj, −A − Aj, A − Aj, A + Aj, A + Aj |
| | Polarization 2 | A − Aj, A − Aj, A + Aj, −A + Aj, A + Aj, A − Aj, −A + Aj, A − Aj, −A − Aj, −A − Aj, A + Aj, −A + Aj, −A − Aj |
| 11 | Polarization 1 | −A − Aj, −A − Aj, A − Aj, A + Aj, A − Aj, −A − Aj, A + Aj, −A − Aj, −A + Aj, −A + Aj, A − Aj, A + Aj, −A + Aj |
| | Polarization 2 | A + Aj, −A − Aj, A − Aj, −A + Aj, A + Aj, A + Aj, A − Aj, −A + Aj, A − Aj, A + Aj, −A + Aj, −A − Aj, −A − Aj |
| 12 | Polarization 1 | −A − Aj, A + Aj, A − Aj, −A + Aj, −A − Aj, −A − Aj, A − Aj, −A + Aj, A − Aj, −A − Aj, −A + Aj, A + Aj, A + Aj |
| | Polarization 2 | A + Aj, A + Aj, A − Aj, −A − Aj, A − Aj, A + Aj, −A − Aj, A + Aj, −A + Aj, −A + Aj, A − Aj, −A − Aj, −A + Aj |
| 13 | Polarization 1 | −A − Aj, −A − Aj, −A + Aj, A + Aj, −A + Aj, −A − Aj, A + Aj, −A − Aj, A − Aj, A − Aj, −A + Aj, A + Aj, A − Aj |
| | Polarization 2 | A + Aj, −A − Aj, −A + Aj, A − Aj, A + Aj, A + Aj, −A + Aj, A − Aj, −A + Aj, A + Aj, A − Aj, −A − Aj, −A − Aj |
| 14 | Polarization 1 | −A − Aj, A + Aj, −A + Aj, A − Aj, −A − Aj, −A − Aj, −A + Aj, A − Aj, −A + Aj, −A − Aj, A − Aj, A + Aj, A + Aj |
| | Polarization 2 | A + Aj, A + Aj, −A + Aj, −A − Aj, −A + Aj, A + Aj, −A − Aj, A + Aj, A − Aj, A − Aj, −A + Aj, −A − Aj, A − Aj |
| 15 | Polarization 1 | −A + Aj, −A + Aj, A + Aj, A − Aj, A + Aj, −A + Aj, A − Aj, −A + Aj, −A − Aj, −A − Aj, A + Aj, A − Aj, −A − Aj |
| | Polarization 2 | −A + Aj, A − Aj, −A − Aj, A + Aj, −A + Aj, −A + Aj, −A − Aj, A + Aj, −A − Aj, −A + Aj, A + Aj, A − Aj, A − Aj |

TABLE 41-continued

| Index | Polarization | Training sequence |
|---|---|---|
| 16 | Polarization 1 | −A + Aj, A − Aj, A + Aj, −A − Aj, −A + Aj, −A + Aj, A + Aj, −A − Aj, A + Aj, −A + Aj, −A − Aj, A − Aj, A − Aj |
| | Polarization 2 | −A + Aj, −A + Aj, −A − Aj, A − Aj, −A − Aj, −A + Aj, A − Aj, −A + Aj, A + Aj, A + Aj, −A − Aj, A − Aj, A + Aj |
| 17 | Polarization 1 | −A + Aj, −A + Aj, A + Aj, A − Aj, A + Aj, −A + Aj, A − Aj, −A + Aj, −A − Aj, −A − Aj, A + Aj, A − Aj, −A − Aj |
| | Polarization 2 | A − Aj, −A + Aj, A + Aj, −A − Aj, A − Aj, A − Aj, A + Aj, −A − Aj, A + Aj, A − Aj, −A − Aj, −A + Aj, −A + Aj |
| 18 | Polarization 1 | −A + Aj, A − Aj, A + Aj, −A − Aj, −A + Aj, −A + Aj, A + Aj, −A − Aj, A + Aj, −A + Aj, −A − Aj, A − Aj, A − Aj |
| | Polarization 2 | A − Aj, A − Aj, A + Aj, −A + Aj, A + Aj, A − Aj, −A + Aj, A − Aj, −A − Aj, −A − Aj, A + Aj, −A + Aj, −A − Aj |
| 19 | Polarization 1 | −A + Aj, −A + Aj, −A − Aj, A − Aj, −A − Aj, −A + Aj, A − Aj, −A + Aj, A + Aj, A + Aj, −A − Aj, A − Aj, A + Aj |
| | Polarization 2 | A − Aj, −A + Aj, −A − Aj, A + Aj, A − Aj, A − Aj, −A − Aj, A + Aj, −A − Aj, A − Aj, A + Aj, −A + Aj, −A + Aj |
| 20 | Polarization 1 | −A + Aj, A − Aj, −A − Aj, A + Aj, −A + Aj, −A + Aj, −A − Aj, A + Aj, −A − Aj, −A + Aj, A + Aj, A − Aj, A − Aj |
| | Polarization 2 | A − Aj, A − Aj, −A − Aj, −A + Aj, −A − Aj, A − Aj, −A + Aj, A − Aj, A + Aj, A + Aj, −A − Aj, −A + Aj, A + Aj |
| 21 | Polarization 1 | −A + Aj, −A + Aj, A + Aj, A − Aj, A + Aj, −A + Aj, A − Aj, −A + Aj, −A − Aj, −A − Aj, A + Aj, A − Aj, −A − Aj |
| | Polarization 2 | A + Aj, −A − Aj, −A + Aj, A − Aj, A + Aj, A + Aj, −A + Aj, A − Aj, −A + Aj, A + Aj, A − Aj, −A − Aj, −A − Aj |
| 22 | Polarization 1 | −A + Aj, A − Aj, A + Aj, −A − Aj, −A + Aj, −A + Aj, A + Aj, −A − Aj, A + Aj, −A + Aj, −A − Aj, A − Aj, A − Aj |
| | Polarization 2 | A + Aj, A + Aj, −A + Aj, −A − Aj, −A + Aj, A + Aj, −A − Aj, A + Aj, A − Aj, A − Aj, −A + Aj, −A − Aj, A − Aj |
| 23 | Polarization 1 | −A + Aj, −A + Aj, −A − Aj, A − Aj, −A − Aj, −A + Aj, A − Aj, −A + Aj, A + Aj, A + Aj, −A − Aj, A − Aj, A + Aj |
| | Polarization 2 | A + Aj, −A − Aj, A − Aj, −A + Aj, A + Aj, A + Aj, A − Aj, −A + Aj, A − Aj, A + Aj, −A + Aj, −A − Aj, −A − Aj |
| 24 | Polarization 1 | −A + Aj, A − Aj, −A − Aj, A + Aj, −A + Aj, −A + Aj, −A − Aj, A + Aj, −A − Aj, −A + Aj, A + Aj, A − Aj, A − Aj |
| | Polarization 2 | A + Aj, A + Aj, A − Aj, −A − Aj, A − Aj, A + Aj, −A − Aj, A + Aj, −A + Aj, −A + Aj, A − Aj, −A − Aj, −A + Aj |
| 25 | Polarization 1 | A − Aj, −A + Aj, A + Aj, −A − Aj, A − Aj, A − Aj, A + Aj, −A − Aj, A + Aj, A − Aj, −A − Aj, −A + Aj, −A + Aj |
| | Polarization 2 | A − Aj, A − Aj, −A − Aj, −A + Aj, −A − Aj, A − Aj, −A + Aj, A − Aj, A + Aj, A + Aj, −A − Aj, −A + Aj, A + Aj |
| 26 | Polarization 1 | A − Aj, A − Aj, A + Aj, −A + Aj, A + Aj, A − Aj, −A + Aj, A − Aj, −A − Aj, −A − Aj, A + Aj, −A + Aj, −A − Aj |
| | Polarization 2 | A − Aj, −A + Aj, −A − Aj, A + Aj, A − Aj, A − Aj, −A − Aj, A + Aj, −A − Aj, A − Aj, A + Aj, −A + Aj, −A + Aj |
| 27 | Polarization 1 | A − Aj, −A + Aj, A + Aj, −A − Aj, A − Aj, A − Aj, A + Aj, −A − Aj, A + Aj, A − Aj, −A − Aj, −A + Aj, −A + Aj |
| | Polarization 2 | A + Aj, A + Aj, A − Aj, −A − Aj, A − Aj, A + Aj, −A − Aj, A + Aj, −A + Aj, −A + Aj, A − Aj, −A − Aj, −A + Aj |
| 28 | Polarization 1 | A − Aj, A − Aj, A + Aj, −A + Aj, A + Aj, A − Aj, −A + Aj, A − Aj, −A − Aj, −A − Aj, A + Aj, −A + Aj, −A − Aj |
| | Polarization 2 | A + Aj, −A − Aj, A − Aj, −A + Aj, A + Aj, A + Aj, A − Aj, −A + Aj, A − Aj, A + Aj, −A + Aj, −A − Aj, −A − Aj |
| 29 | Polarization 1 | A − Aj, −A + Aj, −A − Aj, A + Aj, A − Aj, A − Aj, −A − Aj, A + Aj, −A − Aj, A − Aj, A + Aj, −A + Aj, −A + Aj |
| | Polarization 2 | A + Aj, A + Aj, −A + Aj, −A − Aj, −A + Aj, A + Aj, −A − Aj, A + Aj, A − Aj, A − Aj, −A + Aj, −A − Aj, A − Aj |
| 30 | Polarization 1 | A − Aj, A − Aj, −A − Aj, −A + Aj, −A − Aj, A − Aj, −A + Aj, A − Aj, A + Aj, A + Aj, −A − Aj, −A + Aj, A + Aj |
| | Polarization 2 | A + Aj, −A − Aj, −A + Aj, A − Aj, A + Aj, A + Aj, −A + Aj, A − Aj, −A + Aj, A + Aj, A − Aj, −A − Aj, −A − Aj |
| 31 | Polarization 1 | A + Aj, −A − Aj, A − Aj, −A + Aj, A + Aj, A + Aj, A − Aj, −A + Aj, A − Aj, A + Aj, −A + Aj, −A − Aj, −A − Aj |
| | Polarization 2 | A + Aj, A + Aj, −A + Aj, −A − Aj, −A + Aj, A + Aj, −A − Aj, A + Aj, A − Aj, A − Aj, −A + Aj, −A − Aj, A − Aj |
| 32 | Polarization 1 | A + Aj, A + Aj, A − Aj, −A − Aj, A − Aj, A + Aj, −A − Aj, A + Aj, −A + Aj, −A + Aj, A − Aj, −A − Aj, −A + Aj |
| | Polarization 2 | A + Aj, −A − Aj, −A + Aj, A − Aj, A + Aj, A + Aj, −A + Aj, A − Aj, −A + Aj, A + Aj, A − Aj, −A − Aj, −A − Aj |

(12) When $N_{TS}$=15, the training sequence is one item in the following Table 42.

TABLE 42

| Index | Polarization | Training sequence |
|---|---|---|
| 1 | Polarization 1 | −A − Aj, −A − Aj, A + Aj, −A + Aj, A + Aj, A − Aj, −A + Aj, A − Aj, −A − Aj, A − Aj, A + Aj, A − Aj, −A − Aj, −A + Aj, −A + Aj |
| | Polarization 2 | −A − Aj, −A + Aj, −A − Aj, A + Aj, A − Aj, A + Aj, −A + Aj, −A − Aj, −A − Aj, A + Aj, −A + Aj, −A − Aj, A + Aj, A − Aj, A − Aj |
| 2 | Polarization 1 | −A − Aj, A − Aj, −A − Aj, A + Aj, −A + Aj, A + Aj, A − Aj, −A − Aj, −A − Aj, A + Aj, A − Aj, −A − Aj, A + Aj, −A + Aj, −A + Aj |
| | Polarization 2 | −A − Aj, −A − Aj, A + Aj, A − Aj, A + Aj, −A + Aj, A − Aj, −A + Aj, −A − Aj, −A + Aj, A + Aj, −A + Aj, −A − Aj, A − Aj, A − Aj |
| 3 | Polarization 1 | −A − Aj, −A − Aj, A − Aj, −A + Aj, A + Aj, −A + Aj, −A − Aj, A + Aj, A + Aj, −A − Aj, A + Aj, A − Aj, −A − Aj, A − Aj, −A + Aj |
| | Polarization 2 | −A − Aj, −A − Aj, −A + Aj, A − Aj, −A + Aj, −A − Aj, A + Aj, A − Aj, A − Aj, −A − Aj, A + Aj, −A + Aj, −A + Aj, A − Aj, A + Aj |
| 4 | Polarization 1 | −A − Aj, −A − Aj, −A + Aj, A − Aj, A + Aj, A − Aj, −A − Aj, A + Aj, A + Aj, −A − Aj, A + Aj, −A + Aj, −A − Aj, −A + Aj, A − Aj |
| | Polarization 2 | −A − Aj, −A − Aj, A − Aj, −A + Aj, A − Aj, −A − Aj, A + Aj, −A + Aj, −A + Aj, −A − Aj, A + Aj, A − Aj, A − Aj, −A + Aj, A + Aj |
| 5 | Polarization 1 | −A − Aj, A + Aj, −A + Aj, −A + Aj, A − Aj, −A − Aj, A + Aj, A − Aj, A + Aj, −A − Aj, A − Aj, A + Aj, −A − Aj, −A − Aj, −A + Aj |
| | Polarization 2 | −A + Aj, −A + Aj, −A − Aj, A + Aj, A − Aj, −A − Aj, −A − Aj, −A + Aj, A − Aj, −A + Aj, A − Aj, A + Aj, −A + Aj, A + Aj, A − Aj |
| 6 | Polarization 1 | −A − Aj, −A − Aj, A − Aj, −A + Aj, A + Aj, A − Aj, A − Aj, −A − Aj, A + Aj, −A − Aj, A + Aj, −A + Aj, −A − Aj, −A + Aj, A + Aj |
| | Polarization 2 | −A + Aj, A − Aj, A + Aj, A + Aj, −A − Aj, −A + Aj, A − Aj, −A − Aj, A − Aj, −A + Aj, −A − Aj, A − Aj, −A + Aj, −A + Aj, A + Aj |
| 7 | Polarization 1 | −A − Aj, A + Aj, A − Aj, A − Aj, −A + Aj, −A − Aj, A + Aj, −A + Aj, A + Aj, −A − Aj, −A + Aj, A + Aj, −A − Aj, −A − Aj, A − Aj |
| | Polarization 2 | −A + Aj, −A + Aj, A + Aj, −A − Aj, A − Aj, A + Aj, A + Aj, −A + Aj, A − Aj, −A + Aj, A − Aj, −A − Aj, −A + Aj, −A − Aj, A − Aj |
| 8 | Polarization 1 | −A − Aj, −A − Aj, −A + Aj, A − Aj, A + Aj, −A + Aj, −A + Aj, −A − Aj, A + Aj, −A − Aj, A + Aj, A − Aj, −A − Aj, A − Aj, A + Aj |
| | Polarization 2 | −A + Aj, A − Aj, −A − Aj, −A − Aj, A + Aj, −A + Aj, A − Aj, A + Aj, A − Aj, −A + Aj, A + Aj, A − Aj, −A + Aj, −A + Aj, −A − Aj |
| 9 | Polarization 1 | −A − Aj, A + Aj, −A + Aj, −A + Aj, A − Aj, −A − Aj, A + Aj, A − Aj, A + Aj, −A − Aj, A − Aj, A + Aj, −A − Aj, −A − Aj, −A + Aj |
| | Polarization 2 | A − Aj, A − Aj, A + Aj, −A − Aj, −A + Aj, A + Aj, A + Aj, A − Aj, −A + Aj, A − Aj, −A + Aj, −A − Aj, A − Aj, −A − Aj, −A + Aj |
| 10 | Polarization 1 | −A − Aj, −A − Aj, A − Aj, −A + Aj, A + Aj, A − Aj, A − Aj, −A − Aj, A + Aj, −A − Aj, A + Aj, −A + Aj, −A − Aj, −A + Aj, A + Aj |
| | Polarization 2 | A − Aj, −A + Aj, −A − Aj, −A − Aj, A + Aj, A − Aj, −A + Aj, A + Aj, −A + Aj, A − Aj, A + Aj, −A + Aj, A − Aj, A − Aj, −A − Aj |
| 11 | Polarization 1 | −A − Aj, A + Aj, A − Aj, A − Aj, −A + Aj, −A − Aj, A + Aj, −A + Aj, A + Aj, −A − Aj, −A + Aj, A + Aj, −A − Aj, −A − Aj, A − Aj |
| | Polarization 2 | A − Aj, A − Aj, −A − Aj, A + Aj, −A + Aj, −A − Aj, −A − Aj, A − Aj, −A + Aj, A − Aj, −A + Aj, A + Aj, A − Aj, A + Aj, −A + Aj |
| 12 | Polarization 1 | −A − Aj, −A − Aj, −A + Aj, A − Aj, A + Aj, −A + Aj, −A + Aj, −A − Aj, A + Aj, −A − Aj, A + Aj, A − Aj, −A − Aj, A − Aj, A + Aj |
| | Polarization 2 | A − Aj, −A + Aj, A + Aj, A + Aj, −A − Aj, A − Aj, −A + Aj, −A − Aj, −A + Aj, A − Aj, −A − Aj, −A + Aj, A − Aj, A − Aj, A + Aj |
| 13 | Polarization 1 | −A − Aj, −A − Aj, A + Aj, −A + Aj, A + Aj, A − Aj, −A + Aj, A − Aj, −A − Aj, A − Aj, A + Aj, A − Aj, −A − Aj, −A + Aj, −A + Aj |
| | Polarization 2 | A + Aj, A − Aj, A + Aj, −A − Aj, −A + Aj, −A − Aj, A − Aj, A + Aj, A + Aj, −A − Aj, A − Aj, A + Aj, −A − Aj, −A + Aj, −A + Aj |
| 14 | Polarization 1 | −A − Aj, A − Aj, −A − Aj, A + Aj, −A + Aj, A + Aj, A − Aj, −A − Aj, −A − Aj, A + Aj, A − Aj, −A − Aj, A + Aj, −A + Aj, −A + Aj |
| | Polarization 2 | A + Aj, A + Aj, −A − Aj, −A + Aj, −A − Aj, A − Aj, −A + Aj, A − Aj, A + Aj, A − Aj, −A − Aj, A − Aj, A + Aj, −A + Aj, −A + Aj |
| 15 | Polarization 1 | −A − Aj, −A − Aj, A − Aj, −A + Aj, A + Aj, −A + Aj, −A − Aj, A + Aj, A + Aj, −A − Aj, A + Aj, A − Aj, A − Aj, A − Aj, −A + Aj |
| | Polarization 2 | A + Aj, A + Aj, A − Aj, −A + Aj, A − Aj, A + Aj, −A − Aj, −A + Aj, −A + Aj, A + Aj, −A − Aj, A − Aj, A − Aj, −A + Aj, −A − Aj |
| 16 | Polarization 1 | −A − Aj, −A − Aj, −A + Aj, A − Aj, A + Aj, A − Aj, −A − Aj, A + Aj, A + Aj, −A − Aj, A + Aj, −A + Aj, −A − Aj, −A + Aj, A − Aj |
| | Polarization 2 | A + Aj, A + Aj, −A + Aj, A − Aj, −A + Aj, A + Aj, −A − Aj, A − Aj, A − Aj, A + Aj, −A − Aj, −A + Aj, −A + Aj, A − Aj, −A − Aj |
| 17 | Polarization 1 | −A − Aj, −A − Aj, A − Aj, −A + Aj, A − Aj, −A − Aj, A + Aj, −A + Aj, −A + Aj, −A − Aj, A + Aj, A − Aj, A − Aj, −A + Aj, A + Aj |
| | Polarization 2 | A + Aj, A + Aj, A − Aj, −A + Aj, −A − Aj, −A + Aj, A + Aj, −A − Aj, −A − Aj, A + Aj, −A − Aj, A − Aj, A + Aj, A − Aj, −A + Aj |
| 18 | Polarization 1 | −A − Aj, −A − Aj, A + Aj, A − Aj, A + Aj, −A + Aj, A − Aj, −A + Aj, −A − Aj, −A + Aj, A + Aj, −A + Aj, −A − Aj, A − Aj, A − Aj |
| | Polarization 2 | A + Aj, −A + Aj, A + Aj, −A − Aj, A − Aj, −A − Aj, −A + Aj, A + Aj, A + Aj, −A − Aj, −A + Aj, A + Aj, −A − Aj, A − Aj, A − Aj |
| 19 | Polarization 1 | −A − Aj, −A − Aj, −A + Aj, A − Aj, −A + Aj, −A − Aj, A + Aj, A − Aj, A − Aj, −A − Aj, A + Aj, −A + Aj, −A + Aj, A − Aj, A + Aj |

TABLE 42-continued

| Index | Polarization | Training sequence |
|---|---|---|
| | Polarization 2 | A + Aj, A + Aj, −A + Aj, A − Aj, −A − Aj, A − Aj, A + Aj, −A − Aj, −A − Aj, A + Aj, −A − Aj, −A + Aj, A + Aj, −A + Aj, A − Aj |
| 20 | Polarization 1 | −A − Aj, −A + Aj, −A − Aj, A + Aj, A − Aj, A + Aj, −A + Aj, −A − Aj, −A − Aj, A + Aj, −A + Aj, −A − Aj, A + Aj, A − Aj, A − Aj |
| | Polarization 2 | A + Aj, A + Aj, −A − Aj, A − Aj, −A − Aj, −A + Aj, A − Aj, −A + Aj, A + Aj, −A + Aj, −A − Aj, −A + Aj, A + Aj, A − Aj, A − Aj |
| 21 | Polarization 1 | −A + Aj, −A + Aj, A − Aj, −A − Aj, A − Aj, A + Aj, −A − Aj, A + Aj, −A + Aj, A + Aj, A − Aj, A + Aj, −A + Aj, −A − Aj, −A − A |
| | Polarization 2 | −A + Aj, −A − Aj, −A + Aj, A − Aj, A + Aj, A − Aj, −A − Aj, −A + Aj, −A + Aj, A − Aj, −A − Aj, A + Aj, A − Aj, A + Aj, A + Aj |
| 22 | Polarization 1 | −A + Aj, A + Aj, −A + Aj, A − Aj, −A − Aj, A − Aj, A + Aj, −A + Aj, −A + Aj, A − Aj, A + Aj, −A + Aj, A − Aj, −A − Aj, −A − Aj |
| | Polarization 2 | −A + Aj, −A + Aj, A − Aj, A + Aj, A − Aj, −A − Aj, A + Aj, −A − Aj, −A + Aj, −A − Aj, A − Aj, −A − Aj, −A + Aj, A + Aj, A + Aj |
| 23 | Polarization 1 | −A + Aj, −A + Aj, A + Aj, −A − Aj, A − Aj, −A − Aj, −A + Aj, A − Aj, A − Aj, −A + Aj, A − Aj, A + Aj, −A + Aj, A + Aj, −A − Aj |
| | Polarization 2 | −A + Aj, −A + Aj, −A − Aj, A + Aj, −A − Aj, −A + Aj, A − Aj, A + Aj, A + Aj, −A + Aj, A − Aj, −A − Aj, −A − Aj, A + Aj, A − Aj |
| 24 | Polarization 1 | −A + Aj, −A + Aj, −A − Aj, A + Aj, A − Aj, A + Aj, −A + Aj, A − Aj, A − Aj, −A + Aj, A − Aj, −A − Aj, −A + Aj, −A − Aj, A + Aj |
| | Polarization 2 | −A + Aj, −A + Aj, A + Aj, −A − Aj, A + Aj, −A + Aj, A − Aj, −A − Aj, −A − Aj, −A + Aj, A − Aj, A + Aj, A + Aj, −A − Aj, A − Aj |
| 25 | Polarization 1 | −A + Aj, −A + Aj, A − Aj, −A − Aj, A − Aj, A + Aj, −A − Aj, A + Aj, −A + Aj, A + Aj, A − Aj, A + Aj, −A + Aj, −A − Aj, −A − Aj |
| | Polarization 2 | A − Aj, A + Aj, A − Aj, −A + Aj, −A − Aj, −A + Aj, A + Aj, A − Aj, A − Aj, −A + Aj, A + Aj, A − Aj, −A + Aj, −A − Aj, −A − Aj |
| 26 | Polarization 1 | −A + Aj, A + Aj, −A + Aj, A − Aj, −A − Aj, A − Aj, A + Aj, −A + Aj, −A + Aj, A − Aj, A + Aj, −A + Aj, A − Aj, −A − Aj, −A − Aj |
| | Polarization 2 | A − Aj, A − Aj, −A + Aj, −A − Aj, −A + Aj, A + Aj, −A − Aj, A + Aj, A − Aj, A + Aj, −A + Aj, A + Aj, A − Aj, −A − Aj, −A − Aj |
| 27 | Polarization 1 | −A + Aj, −A + Aj, A + Aj, −A − Aj, A − Aj, −A − Aj, −A + Aj, A − Aj, A − Aj, −A + Aj, A − Aj, A + Aj, −A + Aj, A + Aj, −A − Aj |
| | Polarization 2 | A − Aj, A − Aj, A + Aj, −A − Aj, A + Aj, A − Aj, −A + Aj, −A − Aj, −A − Aj, A − Aj, −A + Aj, A + Aj, A + Aj, −A − Aj, −A + Aj |
| 28 | Polarization 1 | −A + Aj, −A + Aj, −A − Aj, A + Aj, A − Aj, A + Aj, −A + Aj, A − Aj, A − Aj, −A + Aj, A − Aj, −A − Aj, −A + Aj, −A − Aj, A + Aj |
| | Polarization 2 | A − Aj, A − Aj, −A − Aj, A + Aj, −A − Aj, A − Aj, −A + Aj, A + Aj, A + Aj, A − Aj, −A + Aj, −A − Aj, −A − Aj, A + Aj, −A + Aj |
| 29 | Polarization 1 | −A + Aj, −A + Aj, A + Aj, −A − Aj, A + Aj, −A + Aj, A − Aj, −A − Aj, −A − Aj, −A + Aj, A − Aj, A + Aj, A + Aj, −A − Aj, A − Aj |
| | Polarization 2 | A − Aj, A − Aj, A + Aj, −A − Aj, −A + Aj, −A − Aj, A − Aj, −A + Aj, −A + Aj, A − Aj, −A + Aj, A + Aj, A − Aj, A + Aj, −A − Aj |
| 30 | Polarization 1 | −A + Aj, −A + Aj, A − Aj, A + Aj, A − Aj, −A − Aj, A + Aj, −A − Aj, −A + Aj, −A − Aj, A − Aj, −A − Aj, −A + Aj, A + Aj, A + Aj |
| | Polarization 2 | A − Aj, −A − Aj, A − Aj, −A + Aj, A + Aj, −A + Aj, −A − Aj, A − Aj, A − Aj, −A + Aj, −A − Aj, A − Aj, −A + Aj, A + Aj, A + Aj |
| 31 | Polarization 1 | −A + Aj, −A + Aj, −A − Aj, A + Aj, −A − Aj, −A + Aj, A − Aj, A + Aj, A + Aj, −A + Aj, A − Aj, −A − Aj, −A − Aj, A + Aj, A − Aj |
| | Polarization 2 | A − Aj, A − Aj, −A − Aj, A + Aj, −A + Aj, A + Aj, A − Aj, −A + Aj, −A + Aj, A − Aj, −A + Aj, −A − Aj, A − Aj, −A − Aj, A + Aj |
| 32 | Polarization 1 | −A + Aj, −A − Aj, −A + Aj, A − Aj, A + Aj, A − Aj, −A − Aj, −A + Aj, −A + Aj, A − Aj, −A − Aj, − −A + Aj, A − Aj, A + Aj, A + Aj |
| | Polarization 2 | A − Aj, A − Aj, −A + Aj, A + Aj, −A + Aj, −A − Aj, A + Aj, −A − Aj, A − Aj, −A − Aj, −A + Aj, −A − Aj, A − Aj, A + Aj, A + Aj |
| 33 | Polarization 1 | −A + Aj, A − Aj, −A − Aj, −A − Aj, A + Aj, −A + Aj, A − Aj, A + Aj, A − Aj, −A + Aj, A + Aj, A − Aj, −A + Aj, −A + Aj, −A − Aj |
| | Polarization 2 | A + Aj, A + Aj, A − Aj, −A + Aj, −A − Aj, A − Aj, A − Aj, A + Aj, −A − Aj, A + Aj, −A − Aj, −A + Aj, A + Aj, −A + Aj, −A − Aj |
| 34 | Polarization 1 | −A + Aj, −A + Aj, A + Aj, −A − Aj, A − Aj, A + Aj, A + Aj, −A + Aj, A − Aj, −A + Aj, A − Aj, −A − Aj, −A + Aj, −A − Aj, A − Aj |
| | Polarization 2 | A + Aj, −A − Aj, −A + Aj, −A + Aj, A − Aj, A + Aj, −A − Aj, A − Aj, −A − Aj, A + Aj, A − Aj, −A − Aj, A + Aj, A + Aj, −A + Aj |
| 35 | Polarization 1 | −A + Aj, A − Aj, A + Aj, A + Aj, −A − Aj, −A + Aj, A − Aj, −A − Aj, A − Aj, −A + Aj, −A − Aj, A − Aj, −A + Aj, −A + Aj, A + Aj |
| | Polarization 2 | A + Aj, A + Aj, −A + Aj, A − Aj, −A − Aj, −A + Aj, −A + Aj, A + Aj, −A − Aj, A + Aj, −A − Aj, A − Aj, A + Aj, A − Aj, −A − Aj |
| 36 | Polarization 1 | −A + Aj, −A + Aj, −A − Aj, A + Aj, A − Aj, −A − Aj, −A − Aj, −A + Aj, A − Aj, −A + Aj, A − Aj, A + Aj, −A + Aj, A + Aj, A − Aj |
| | Polarization 2 | A + Aj, −A − Aj, A − Aj, A − Aj, −A + Aj, A + Aj, −A − Aj, −A + Aj, −A − Aj, A + Aj, −A + Aj, −A − Aj, A + Aj, A + Aj, A − Aj |
| 37 | Polarization 1 | A − Aj, A + Aj, A − Aj, −A + Aj, −A − Aj, −A + Aj, A + Aj, A − Aj, A − Aj, −A + Aj, A + Aj, A − Aj, −A + Aj, −A − Aj, −A − Aj |
| | Polarization 2 | A − Aj, A − Aj, −A + Aj, A + Aj, −A + Aj, −A − Aj, A + Aj, −A − Aj, A − Aj, −A − Aj, −A + Aj, −A − Aj, A − Aj, A + Aj, A + Aj |
| 38 | Polarization 1 | A − Aj, A − Aj, A + Aj, −A − Aj, A + Aj, A − Aj, −A + Aj, −A − Aj, −A − Aj, A − Aj, −A + Aj, A + Aj, A + Aj, −A − Aj, −A + Aj |
| | Polarization 2 | A − Aj, A − Aj, −A − Aj, A + Aj, −A + Aj, A + Aj, A − Aj, −A + Aj, −A + Aj, A − Aj, −A + Aj, −A − Aj, A − Aj, −A − Aj, A + Aj |

TABLE 42-continued

| Index | Polarization | Training sequence |
|---|---|---|
| 39 | Polarization 1 | A − Aj, A − Aj, −A + Aj, −A − Aj, −A + Aj, A + Aj, −A − Aj, A + Aj, A − Aj, A + Aj, −A + Aj, A + Aj, A − Aj, −A − Aj, −A − Aj |
| | Polarization 2 | A − Aj, −A − Aj, A − Aj, −A + Aj, A + Aj, −A + Aj, −A − Aj, A − Aj, A − Aj, −A + Aj, −A − Aj, A − Aj, −A + Aj, A + Aj, A + Aj |
| 40 | Polarization 1 | A − Aj, A − Aj, −A − Aj, A + Aj, −A − Aj, A − Aj, −A + Aj, A + Aj, A + Aj, A − Aj, −A + Aj, −A − Aj, −A − Aj, A + Aj, −A + Aj |
| | Polarization 2 | A − Aj, A − Aj, A + Aj, −A − Aj, −A + Aj, −A − Aj, A − Aj, −A + Aj, −A + Aj, A − Aj, −A + Aj, A + Aj, A − Aj, A + Aj, −A − Aj |
| 41 | Polarization 1 | A − Aj, A − Aj, A + Aj, −A − Aj, −A + Aj, A + Aj, A + Aj, A − Aj, −A + Aj, A − Aj, −A + Aj, −A − Aj, A − Aj, −A − Aj, −A + Aj |
| | Polarization 2 | A + Aj, −A − Aj, A − Aj, A − Aj, −A + Aj, A + Aj, −A − Aj, −A + Aj, −A − Aj, A + Aj, −A + Aj, −A − Aj, A + Aj, A + Aj, A − Aj |
| 42 | Polarization 1 | A − Aj, −A + Aj, −A − Aj, −A − Aj, A + Aj, A − Aj, −A + Aj, A + Aj, −A + Aj, A − Aj, A + Aj, −A + Aj, A − Aj, A − Aj, −A − Aj |
| | Polarization 2 | A + Aj, A + Aj, −A + Aj, A − Aj, −A − Aj, −A + Aj, −A + Aj, A + Aj, −A − Aj, A + Aj, −A − Aj, A − Aj, A + Aj, A − Aj, −A − Aj |
| 43 | Polarization 1 | A − Aj, A − Aj, −A − Aj, A + Aj, −A + Aj, −A − Aj, −A − Aj, A − Aj, −A + Aj, A − Aj, −A + Aj, A + Aj, A − Aj, A + Aj, −A + Aj |
| | Polarization 2 | A + Aj, −A − Aj, −A + Aj, −A + Aj, A − Aj, A + Aj, −A − Aj, A − Aj, −A − Aj, A + Aj, A − Aj, −A − Aj, A + Aj, A + Aj, −A + Aj |
| 44 | Polarization 1 | A − Aj, −A + Aj, A + Aj, A + Aj, −A − Aj, A − Aj, −A + Aj, −A − Aj, −A + Aj, A − Aj, −A − Aj, −A + Aj, A − Aj, A − Aj, A + Aj |
| | Polarization 2 | A + Aj, A + Aj, A − Aj, −A + Aj, −A − Aj, A − Aj, A − Aj, A + Aj, −A − Aj, A + Aj, −A − Aj, −A + Aj, A + Aj, −A + Aj, −A − Aj |
| 45 | Polarization 1 | A + Aj, A − Aj, A + Aj, −A − Aj, −A + Aj, −A − Aj, A − Aj, A + Aj, A + Aj, −A − Aj, A − Aj, A + Aj, −A − Aj, −A + Aj, −A + Aj |
| | Polarization 2 | A + Aj, A + Aj, −A − Aj, A − Aj, −A − Aj, −A + Aj, A − Aj, −A + Aj, A + Aj, −A + Aj, −A − Aj, −A + Aj, A + Aj, A − Aj, A − Aj |
| 46 | Polarization 1 | A + Aj, A + Aj, A − Aj, −A + Aj, A − Aj, A + Aj, −A − Aj, −A + Aj, −A + Aj, A + Aj, −A − Aj, A − Aj, A − Aj, −A + Aj, −A − Aj |
| | Polarization 2 | A + Aj, A + Aj, −A + Aj, A − Aj, −A − Aj, A − Aj, A + Aj, −A − Aj, −A − Aj, A + Aj, −A − Aj, −A + Aj, A + Aj, −A + Aj, A − Aj |
| 47 | Polarization 1 | A + Aj, A + Aj, −A − Aj, −A + Aj, −A − Aj, A − Aj, −A + Aj, A − Aj, A + Aj, A − Aj, −A − Aj, A − Aj, A + Aj, −A + Aj, −A + Aj |
| | Polarization 2 | A + Aj, −A + Aj, A + Aj, −A − Aj, A − Aj, −A − Aj, −A + Aj, A + Aj, A + Aj, −A − Aj, −A + Aj, A + Aj, −A − Aj, A − Aj, A − Aj |
| 48 | Polarization 1 | A + Aj, A + Aj, −A + Aj, A − Aj, −A + Aj, A + Aj, −A − Aj, A − Aj, A − Aj, A + Aj, −A − Aj, −A + Aj, −A + Aj, A − Aj, −A − Aj |
| | Polarization 2 | A + Aj, A + Aj, A − Aj, −A + Aj, −A − Aj, −A + Aj, A + Aj, −A − Aj, −A − Aj, A + Aj, −A − Aj, A − Aj, A + Aj, A − Aj, −A + Aj |

(13) When $N_{TS}$=17, the training sequence is one item in the following Table 43.

TABLE 43

| Index | Polarization | Training sequence |
|---|---|---|
| 1 | Polarization 1 | −A − Aj, A − Aj, A + Aj, −A − Aj, A − Aj, A − Aj, −A − Aj, A + Aj, −A − Aj, −A + Aj, −A + Aj, A + Aj, −A − Aj, −A + Aj, A − Aj, A + Aj, −A + Aj |
| | Polarization 2 | −A − Aj, −A − Aj, A − Aj, A + Aj, −A − Aj, −A + Aj, −A − Aj, −A + Aj, A + Aj, A − Aj, −A − Aj, A − Aj, −A + Aj, A − Aj, A + Aj, −A + Aj, A + Aj |
| 2 | Polarization 1 | −A − Aj, −A + Aj, A + Aj, −A − Aj, −A + Aj, −A + Aj, −A − Aj, A + Aj, −A − Aj, A − Aj, A − Aj, A + Aj, −A − Aj, A − Aj, −A + Aj, A + Aj, A − Aj |
| | Polarization 2 | −A − Aj, −A − Aj, −A + Aj, A + Aj, −A − Aj, A − Aj, −A − Aj, A − Aj, A + Aj, −A + Aj, −A − Aj, −A + Aj, A − Aj, −A + Aj, A + Aj, A − Aj, A + Aj |
| 3 | Polarization 1 | −A − Aj, A − Aj, A + Aj, −A − Aj, A − Aj, A − Aj, −A − Aj, A + Aj, −A − Aj, −A + Aj, −A + Aj, A + Aj, −A − Aj, −A + Aj, A − Aj, A + Aj, −A + Aj |
| | Polarization 2 | −A + Aj, −A + Aj, −A − Aj, A − Aj, −A + Aj, A + Aj, −A + Aj, A + Aj, A − Aj, −A − Aj, −A + Aj, −A − Aj, A + Aj, −A − Aj, A − Aj, A + Aj, A − Aj |
| 4 | Polarization 1 | −A − Aj, −A − Aj, A − Aj, A + Aj, −A − Aj, −A + Aj, −A − Aj, −A + Aj, A + Aj, A − Aj, −A − Aj, A − Aj, −A + Aj, A − Aj, A + Aj, −A + Aj, A + Aj |
| | Polarization 2 | −A + Aj, −A − Aj, A − Aj, −A + Aj, −A − Aj, −A − Aj, −A + Aj, A − Aj, −A + Aj, A + Aj, A + Aj, A − Aj, −A + Aj, A + Aj, −A − Aj, A − Aj, A + Aj |
| 5 | Polarization 1 | −A − Aj, −A + Aj, A + Aj, −A − Aj, −A + Aj, −A + Aj, −A − Aj, A + Aj, −A − Aj, A − Aj, A − Aj, A + Aj, −A − Aj, A − Aj, −A + Aj, A + Aj, A − Aj |
| | Polarization 2 | −A + Aj, −A + Aj, A + Aj, A − Aj, −A + Aj, −A − Aj, −A + Aj, −A − Aj, A − Aj, A + Aj, −A + Aj, A + Aj, −A − Aj, A + Aj, A − Aj, −A − Aj, A − Aj |
| 6 | Polarization 1 | −A − Aj, −A − Aj, −A + Aj, A + Aj, −A − Aj, A − Aj, −A − Aj, A − Aj, A + Aj, −A + Aj, −A − Aj, −A + Aj, A − Aj, −A + Aj, A + Aj, A − Aj, A + Aj |
| | Polarization 2 | −A + Aj, A + Aj, A − Aj, −A + Aj, A + Aj, A + Aj, −A + Aj, A − Aj, −A + Aj, −A − Aj, −A − Aj, A − Aj, −A + Aj, −A − Aj, A + Aj, A − Aj, −A − Aj |
| 7 | Polarization 1 | −A − Aj, A − Aj, A + Aj, −A − Aj, A − Aj, A − Aj, −A − Aj, A + Aj, −A − Aj, −A + Aj, −A + Aj, A + Aj, −A − Aj, −A + Aj, A − Aj, A + Aj, −A + Aj |

TABLE 43-continued

| Index | Polarization | Training sequence |
|---|---|---|
| | Polarization 2 | A − Aj, A − Aj, A + Aj, −A + Aj, A − Aj, −A − Aj, A − Aj, −A − Aj, −A + Aj, A + Aj, A − Aj, A + Aj, −A − Aj, A + Aj, −A + Aj, −A − Aj, −A + Aj |
| 8 | Polarization 1 | −A − Aj, −A − Aj, A − Aj, A + Aj, −A − Aj, −A + Aj, −A − Aj, −A + Aj, A + Aj, A − Aj, −A − Aj, A − Aj, −A + Aj, A − Aj, A + Aj, −A + Aj, A + Aj |
| | Polarization 2 | A − Aj, A + Aj, −A + Aj, A − Aj, A + Aj, A + Aj, A − Aj, −A + Aj, A − Aj, −A − Aj, −A − Aj, −A + Aj, A − Aj, −A − Aj, A + Aj, −A + Aj, −A − Aj |
| 9 | Polarization 1 | −A − Aj, −A + Aj, A + Aj, −A − Aj, −A + Aj, −A + Aj, −A − Aj, A + Aj, −A − Aj, A − Aj, A − Aj, A + Aj, −A − Aj, A − Aj, −A + Aj, A + Aj, A − Aj |
| | Polarization 2 | A − Aj, A − Aj, −A − Aj, −A + Aj, A − Aj, A + Aj, A − Aj, A + Aj, −A + Aj, −A − Aj, A − Aj, −A − Aj, A + Aj, −A − Aj, −A + Aj, A + Aj, −A + Aj |
| 10 | Polarization 1 | −A − Aj, −A − Aj, −A + Aj, A + Aj, −A − Aj, A − Aj, −A − Aj, A − Aj, A + Aj, −A + Aj, −A − Aj, −A + Aj, A − Aj, −A + Aj, A + Aj, A − Aj, A + Aj |
| | Polarization 2 | A − Aj, −A − Aj, −A + Aj, A − Aj, −A − Aj, −A − Aj, A − Aj, −A + Aj, A − Aj, A + Aj, A + Aj, −A + Aj, A − Aj, A + Aj, −A − Aj, −A + Aj, A + Aj |
| 11 | Polarization 1 | −A − Aj, A − Aj, A + Aj, −A − Aj, A − Aj, A − Aj, −A − Aj, A + Aj, −A − Aj, −A + Aj, −A + Aj, A + Aj, −A − Aj, −A + Aj, A − Aj, A + Aj, −A + Aj |
| | Polarization 2 | A + Aj, A + Aj, −A + Aj, −A − Aj, A + Aj, A − Aj, A + Aj, A − Aj, −A − Aj, −A + Aj, A + Aj, −A + Aj, A − Aj, −A + Aj, −A − Aj, A − Aj, −A − Aj |
| 12 | Polarization 1 | −A − Aj, −A − Aj, A − Aj, A + Aj, −A − Aj, −A + Aj, −A − Aj, −A + Aj, A + Aj, A − Aj, −A − Aj, A − Aj, −A + Aj, A − Aj, A + Aj, −A + Aj, A + Aj |
| | Polarization 2 | A + Aj, −A + Aj, −A − Aj, A + Aj, −A + Aj, −A + Aj, A + Aj, −A − Aj, A + Aj, A − Aj, A − Aj, −A − Aj, A + Aj, A − Aj, −A + Aj, −A − Aj, A − Aj |
| 13 | Polarization 1 | −A − Aj, −A + Aj, A + Aj, −A − Aj, −A + Aj, −A + Aj, −A − Aj, A + Aj, −A − Aj, A − Aj, A − Aj, A + Aj, −A − Aj, A − Aj, −A + Aj, A + Aj, A − Aj |
| | Polarization 2 | A + Aj, A + Aj, A − Aj, −A − Aj, A + Aj, −A + Aj, A + Aj, −A + Aj, −A − Aj, A − Aj, A + Aj, A − Aj, −A + Aj, A − Aj, −A − Aj, −A + Aj, −A − Aj |
| 14 | Polarization 1 | −A − Aj, −A − Aj, −A + Aj, A + Aj, −A − Aj, A − Aj, −A − Aj, A − Aj, A + Aj, −A + Aj, −A − Aj, −A + Aj, A − Aj, −A + Aj, A + Aj, A − Aj, A + Aj |
| | Polarization 2 | A + Aj, A − Aj, −A − Aj, A + Aj, A − Aj, A − Aj, A + Aj, −A − Aj, A + Aj, −A + Aj, −A + Aj, −A − Aj, A + Aj, −A + Aj, A − Aj, −A − Aj, −A + Aj |
| 15 | Polarization 1 | −A + Aj, A + Aj, A − Aj, −A + Aj, A + Aj, A + Aj, −A + Aj, A − Aj, −A + Aj, −A − Aj, −A − Aj, A − Aj, −A + Aj, −A − Aj, A + Aj, A − Aj, −A − Aj |
| | Polarization 2 | −A + Aj, −A + Aj, A + Aj, A − Aj, −A + Aj, −A − Aj, −A + Aj, −A − Aj, A − Aj, A + Aj, −A + Aj, A + Aj, −A − Aj, A + Aj, A − Aj, −A − Aj, A − Aj |
| 16 | Polarization 1 | −A + Aj, −A − Aj, A − Aj, −A + Aj, −A − Aj, −A − Aj, −A + Aj, A − Aj, −A + Aj, A + Aj, A + Aj, A − Aj, −A + Aj, A + Aj, −A − Aj, A − Aj, A + Aj |
| | Polarization 2 | −A + Aj, −A + Aj, −A − Aj, A − Aj, −A + Aj, A + Aj, −A + Aj, A + Aj, A − Aj, −A − Aj, −A + Aj, −A − Aj, A + Aj, −A − Aj, A − Aj, A + Aj, A − Aj |
| 17 | Polarization 1 | −A + Aj, A + Aj, A − Aj, −A + Aj, A + Aj, A + Aj, −A + Aj, A − Aj, −A + Aj, −A − Aj, −A − Aj, A − Aj, −A + Aj, −A − Aj, A + Aj, A − Aj, −A − Aj |
| | Polarization 2 | A − Aj, A − Aj, −A − Aj, −A + Aj, A − Aj, A + Aj, A − Aj, A + Aj, −A + Aj, −A − Aj, A − Aj, −A − Aj, A + Aj, −A − Aj, −A + Aj, A + Aj, −A + Aj |
| 18 | Polarization 1 | −A + Aj, −A + Aj, A + Aj, A − Aj, −A + Aj, −A − Aj, −A + Aj, −A − Aj, A − Aj, A + Aj, −A + Aj, A + Aj, −A − Aj, A + Aj, A − Aj, −A − Aj, A − Aj |
| | Polarization 2 | A − Aj, −A − Aj, −A + Aj, A − Aj, −A − Aj, −A − Aj, A − Aj, −A + Aj, A − Aj, A + Aj, A + Aj, −A + Aj, A − Aj, A + Aj, −A − Aj, −A + Aj, A + Aj |
| 19 | Polarization 1 | −A + Aj, −A − Aj, A − Aj, −A + Aj, −A − Aj, −A − Aj, −A + Aj, A − Aj, −A + Aj, A + Aj, A + Aj, A − Aj, −A + Aj, A + Aj, −A − Aj, A − Aj, A + Aj |
| | Polarization 2 | A − Aj, A − Aj, A + Aj, −A + Aj, A − Aj, −A − Aj, A − Aj, −A − Aj, −A + Aj, A + Aj, A − Aj, A + Aj, −A − Aj, A + Aj, −A + Aj, −A − Aj, −A + Aj |
| 20 | Polarization 1 | −A + Aj, −A + Aj, −A − Aj, A − Aj, −A + Aj, A + Aj, −A + Aj, A + Aj, A − Aj, −A − Aj, −A + Aj, −A − Aj, A + Aj, −A − Aj, A − Aj, A + Aj, A − Aj |
| | Polarization 2 | A − Aj, A + Aj, −A + Aj, A − Aj, A + Aj, A + Aj, A − Aj, −A + Aj, A − Aj, −A − Aj, −A − Aj, −A + Aj, A − Aj, −A − Aj, A + Aj, −A + Aj, −A − Aj |
| 21 | Polarization 1 | −A + Aj, A + Aj, A − Aj, −A + Aj, A + Aj, A + Aj, −A + Aj, A − Aj, −A + Aj, −A − Aj, −A − Aj, A − Aj, −A + Aj, −A − Aj, A + Aj, A − Aj, −A − Aj |
| | Polarization 2 | A + Aj, A + Aj, A − Aj, −A − Aj, A + Aj, −A + Aj, A + Aj, −A + Aj, −A − Aj, A − Aj, A + Aj, A − Aj, −A + Aj, A − Aj, −A − Aj, −A + Aj, −A − Aj |
| 22 | Polarization 1 | −A + Aj, −A + Aj, A + Aj, A − Aj, −A + Aj, −A − Aj, −A + Aj, −A − Aj, A − Aj, A + Aj, −A + Aj, A + Aj, −A − Aj, A + Aj, A − Aj, −A − Aj, A − Aj |
| | Polarization 2 | A + Aj, A − Aj, −A − Aj, A + Aj, A − Aj, A − Aj, A + Aj, −A − Aj, A + Aj, −A + Aj, −A + Aj, −A − Aj, A + Aj, −A + Aj, A − Aj, −A − Aj, −A + Aj |
| 23 | Polarization 1 | −A + Aj, −A − Aj, A − Aj, −A + Aj, −A − Aj, −A − Aj, −A + Aj, A − Aj, −A + Aj, A + Aj, A + Aj, A − Aj, −A + Aj, A + Aj, −A − Aj, A − Aj, A + Aj |
| | Polarization 2 | A + Aj, A + Aj, −A + Aj, −A − Aj, A + Aj, A − Aj, A + Aj, A − Aj, −A − Aj, −A + Aj, A + Aj, −A + Aj, A − Aj, −A + Aj, −A − Aj, A − Aj, −A − Aj |
| 24 | Polarization 1 | −A + Aj, −A + Aj, −A − Aj, A − Aj, −A + Aj, A + Aj, −A + Aj, A + Aj, A − Aj, −A − Aj, −A + Aj, −A − Aj, A + Aj, −A − Aj, A − Aj, A + Aj, A − Aj |
| | Polarization 2 | A + Aj, −A + Aj, −A − Aj, A + Aj, −A + Aj, −A + Aj, A + Aj, −A − Aj, A + Aj, A − Aj, A − Aj, −A − Aj, A + Aj, A − Aj, −A + Aj, −A − Aj, A − Aj |
| 25 | Polarization 1 | A − Aj, A − Aj, A + Aj, −A + Aj, A − Aj, −A − Aj, A − Aj, −A − Aj, −A + Aj, A + Aj, A − Aj, A + Aj, −A − Aj, A + Aj, −A + Aj, −A − Aj, −A + Aj |
| | Polarization 2 | A − Aj, A + Aj, −A + Aj, A − Aj, A + Aj, A + Aj, A − Aj, −A + Aj, A − Aj, −A − Aj, −A − Aj, −A + Aj, A − Aj, −A − Aj, A + Aj, −A + Aj, −A − Aj |
| 26 | Polarization 1 | A − Aj, A − Aj, −A − Aj, −A + Aj, A − Aj, A + Aj, A − Aj, A + Aj, −A + Aj, −A − Aj, A − Aj, −A − Aj, A + Aj, −A − Aj, −A + Aj, A + Aj, −A + Aj |
| | Polarization 2 | A − Aj, −A − Aj, −A + Aj, A − Aj, −A − Aj, −A − Aj, A − Aj, −A + Aj, A − Aj, A + Aj, A + Aj, −A + Aj, A − Aj, A + Aj, −A − Aj, −A + Aj, A + Aj |

TABLE 43-continued

| Index | Polarization | Training sequence |
|---|---|---|
| 27 | Polarization 1 | A − Aj, A − Aj, A + Aj, −A + Aj, A − Aj, −A − Aj, A − Aj, −A − Aj, −A + Aj, A + Aj, A − Aj, A + Aj, −A − Aj, A + Aj, −A + Aj, −A − Aj, −A + Aj |
| | Polarization 2 | A + Aj, −A + Aj, −A − Aj, A + Aj, −A + Aj, −A + Aj, A + Aj, −A − Aj, A + Aj, A − Aj, A − Aj, −A − Aj, A + Aj, A − Aj, −A + Aj, −A − Aj, A − Aj |
| 28 | Polarization 1 | A − Aj, A + Aj, −A + Aj, A − Aj, A + Aj, A + Aj, A − Aj, −A + Aj, A − Aj, −A − Aj, −A − Aj, −A + Aj, A − Aj, −A − Aj, A + Aj, −A + Aj, −A − Aj |
| | Polarization 2 | A + Aj, A + Aj, −A + Aj, −A − Aj, A + Aj, A − Aj, A + Aj, A − Aj, −A − Aj, −A + Aj, A + Aj, −A + Aj, A − Aj, −A + Aj, −A − Aj, A − Aj, −A − Aj |
| 29 | Polarization 1 | A − Aj, A − Aj, −A − Aj, −A + Aj, A − Aj, A + Aj, A − Aj, A + Aj, −A + Aj, −A − Aj, A − Aj, −A − Aj, A + Aj, −A − Aj, −A + Aj, A + Aj, −A + Aj |
| | Polarization 2 | A + Aj, A − Aj, −A − Aj, A + Aj, A − Aj, A − Aj, A + Aj, −A − Aj, A + Aj, −A + Aj, −A + Aj, −A − Aj, A + Aj, −A + Aj, A − Aj, −A − Aj, −A + Aj |
| 30 | Polarization 1 | A − Aj, −A − Aj, −A + Aj, A − Aj, −A − Aj, −A − Aj, A − Aj, −A + Aj, A − Aj, A + Aj, A + Aj, −A + Aj, A − Aj, A + Aj, −A − Aj, −A + Aj, A + Aj |
| | Polarization 2 | A + Aj, A + Aj, A − Aj, −A − Aj, A + Aj, −A + Aj, A + Aj, −A + Aj, −A − Aj, A − Aj, A + Aj, A − Aj, −A + Aj, A − Aj, −A − Aj, −A + Aj, −A − Aj |
| 31 | Polarization 1 | A + Aj, A + Aj, A − Aj, −A − Aj, A + Aj, −A + Aj, A + Aj, −A + Aj, −A − Aj, A − Aj, A + Aj, A − Aj, −A + Aj, A − Aj, −A − Aj, −A + Aj, −A − Aj |
| | Polarization 2 | A + Aj, A − Aj, −A − Aj, A + Aj, A − Aj, A − Aj, A + Aj, −A − Aj, A + Aj, −A + Aj, −A + Aj, −A − Aj, A + Aj, −A + Aj, A − Aj, −A − Aj, −A + Aj |
| 32 | Polarization 1 | A + Aj, A + Aj, −A + Aj, −A − Aj, A + Aj, A − Aj, A + Aj, A − Aj, −A − Aj, −A + Aj, A + Aj, −A + Aj, A − Aj, −A + Aj, −A − Aj, A − Aj, −A − Aj |
| | Polarization 2 | A + Aj, −A + Aj, −A − Aj, A + Aj, −A + Aj, −A + Aj, A + Aj, −A − Aj, A + Aj, A − Aj, A − Aj, −A − Aj, A + Aj, A − Aj, −A + Aj, −A − Aj, A − Aj |

(14) When $N_{TS}=19$, the training sequence is one item in the following Table 44.

TABLE 44

| Index | Polarization | Training sequence |
|---|---|---|
| 1 | Polarization 1 | −A − Aj, −A − Aj, −A − Aj, A + Aj, A + Aj, A − Aj, −A − Aj, A + Aj, A − Aj, −A + Aj, A − Aj, A + Aj, −A − Aj, −A + Aj, A − Aj, A − Aj, −A + Aj, −A + Aj, −A + Aj |
| | Polarization 2 | −A − Aj, −A − Aj, −A − Aj, A + Aj, A + Aj, −A + Aj, −A − Aj, A + Aj, −A + Aj, −A − Aj, A + Aj, −A − Aj, A + Aj, A − Aj, −A + Aj, −A + Aj, A − Aj, A − Aj, A − Aj |
| 2 | Polarization 1 | −A − Aj, −A − Aj, −A − Aj, A + Aj, A + Aj, A − Aj, −A − Aj, A + Aj, A − Aj, −A − Aj, A + Aj, −A − Aj, A + Aj, −A + Aj, A − Aj, A − Aj, −A + Aj, −A + Aj, −A + Aj |
| | Polarization 2 | −A − Aj, −A − Aj, −A − Aj, A + Aj, A + Aj, −A + Aj, −A − Aj, A + Aj, −A + Aj, A − Aj, −A + Aj, A + Aj, −A − Aj, A − Aj, −A + Aj, −A + Aj, A − Aj, A − Aj, A − Aj |
| 3 | Polarization 1 | −A − Aj, −A − Aj, −A − Aj, A + Aj, A + Aj, A − Aj, −A − Aj, A + Aj, A − Aj, −A + Aj, A − Aj, A + Aj, −A − Aj, −A + Aj, A − Aj, A − Aj, −A + Aj, −A + Aj, −A + Aj |
| | Polarization 2 | A + Aj, A + Aj, A + Aj, −A − Aj, −A − Aj, A − Aj, A + Aj, −A − Aj, A − Aj, A + Aj, −A − Aj, A + Aj, −A − Aj, −A + Aj, A − Aj, A − Aj, −A + Aj, −A + Aj, −A + Aj |
| 4 | Polarization 1 | −A − Aj, −A − Aj, −A − Aj, A + Aj, A + Aj, A − Aj, −A − Aj, A + Aj, A − Aj, −A − Aj, A + Aj, −A − Aj, A + Aj, −A + Aj, A − Aj, A − Aj, −A + Aj, −A + Aj, −A + Aj |
| | Polarization 2 | A + Aj, A + Aj, A + Aj, −A − Aj, −A − Aj, A − Aj, A + Aj, −A − Aj, A − Aj, −A + Aj, A − Aj, −A − Aj, A + Aj, −A + Aj, A − Aj, A − Aj, −A + Aj, −A + Aj, −A + Aj |
| 5 | Polarization 1 | −A − Aj, −A − Aj, −A − Aj, A + Aj, A + Aj, −A + Aj, −A − Aj, A + Aj, −A + Aj, A − Aj, −A + Aj, A + Aj, −A − Aj, A − Aj, −A + Aj, −A + Aj, A − Aj, A − Aj, A − Aj |
| | Polarization 2 | A + Aj, A + Aj, A + Aj, −A − Aj, −A − Aj, −A + Aj, A + Aj, −A − Aj, −A + Aj, A + Aj, −A − Aj, A + Aj, −A − Aj, A − Aj, −A + Aj, −A + Aj, A − Aj, A − Aj, A − Aj |
| 6 | Polarization 1 | −A − Aj, −A − Aj, −A − Aj, A + Aj, A + Aj, −A + Aj, −A − Aj, A + Aj, −A + Aj, −A − Aj, A + Aj, −A − Aj, A + Aj, A − Aj, −A + Aj, −A + Aj, A − Aj, A − Aj, A − Aj |
| | Polarization 2 | A + Aj, A + Aj, A + Aj, −A − Aj, −A − Aj, −A + Aj, A + Aj, −A − Aj, −A + Aj, A − Aj, −A + Aj, −A − Aj, A + Aj, A − Aj, −A + Aj, −A + Aj, A − Aj, A − Aj, A − Aj |
| 7 | Polarization 1 | −A + Aj, −A + Aj, −A + Aj, A − Aj, A − Aj, A + Aj, −A + Aj, A − Aj, A + Aj, −A − Aj, A + Aj, A − Aj, −A + Aj, −A − Aj, A + Aj, A + Aj, −A − Aj, −A − Aj, −A − Aj |
| | Polarization 2 | −A + Aj, −A + Aj, −A + Aj, A − Aj, A − Aj, −A − Aj, −A + Aj, A − Aj, −A − Aj, −A + Aj, A − Aj, −A + Aj, A − Aj, A + Aj, −A − Aj, −A − Aj, A + Aj, A + Aj, A + Aj |
| 8 | Polarization 1 | −A + Aj, −A + Aj, −A + Aj, A − Aj, A − Aj, A + Aj, −A + Aj, A − Aj, A + Aj, −A + Aj, A − Aj, −A + Aj, A − Aj, −A − Aj, A + Aj, A + Aj, −A − Aj, −A − Aj, −A − Aj |
| | Polarization 2 | −A + Aj, −A + Aj, −A + Aj, A − Aj, A − Aj, −A − Aj, −A + Aj, A − Aj, −A − Aj, A + Aj, −A − Aj, A − Aj, −A + Aj, A + Aj, −A − Aj, −A − Aj, A + Aj, A + Aj, A + Aj |
| 9 | Polarization 1 | −A + Aj, −A + Aj, −A + Aj, A − Aj, A − Aj, A + Aj, −A + Aj, A − Aj, A + Aj, −A − Aj, A + Aj, A − Aj, −A + Aj, −A − Aj, A + Aj, A + Aj, −A − Aj, −A − Aj, −A − Aj |
| | Polarization 2 | A − Aj, A − Aj, A − Aj, −A + Aj, −A + Aj, A + Aj, A − Aj, −A + Aj, A + Aj, A − Aj, −A + Aj, A − Aj, −A + Aj, −A − Aj, A + Aj, A + Aj, −A − Aj, −A − Aj, −A − Aj |
| 10 | Polarization 1 | −A + Aj, −A + Aj, −A + Aj, A − Aj, A − Aj, A + Aj, −A + Aj, A − Aj, A + Aj, −A + Aj, A − Aj, −A + Aj, A − Aj, −A − Aj, A + Aj, A + Aj, −A − Aj, −A − Aj, −A − Aj |
| | Polarization 2 | A − Aj, A − Aj, A − Aj, −A + Aj, −A + Aj, A + Aj, A − Aj, −A + Aj, A + Aj, −A − Aj, A + Aj, −A + Aj, A − Aj, −A − Aj, A + Aj, A + Aj, −A − Aj, −A − Aj, −A − Aj |
| 11 | Polarization 1 | −A + Aj, −A + Aj, −A + Aj, A − Aj, A − Aj, −A − Aj, −A + Aj, A − Aj, −A − Aj, A + Aj, −A − Aj, A − Aj, −A + Aj, A + Aj, −A − Aj, −A − Aj, A + Aj, A + Aj, A + Aj |

TABLE 44-continued

| Index | Polarization | Training sequence |
|---|---|---|
| | Polarization 2 | A − Aj, A − Aj, A − Aj, −A + Aj, −A + Aj, −A − Aj, A − Aj, −A + Aj, −A − Aj, A − Aj, −A + Aj, A − Aj, −A + Aj, A + Aj, −A − Aj, −A − Aj, A + Aj, A + Aj, A + Aj |
| 12 | Polarization 1 | −A + Aj, −A + Aj, −A + Aj, A − Aj, A − Aj, −A − Aj, −A + Aj, A − Aj, −A − Aj, −A + Aj, A − Aj, −A + Aj, A − Aj, A + Aj, −A − Aj, −A − Aj, A + Aj, A + Aj, A + Aj |
| | Polarization 2 | A − Aj, A − Aj, A − Aj, −A + Aj, −A + Aj, −A − Aj, A − Aj, −A + Aj, −A − Aj, A + Aj, −A − Aj, −A + Aj, A − Aj, A + Aj, −A − Aj, −A − Aj, A + Aj, A + Aj, A + Aj |
| 13 | Polarization 1 | A − Aj, A − Aj, A − Aj, −A + Aj, −A + Aj, A + Aj, A − Aj, −A + Aj, A + Aj, A − Aj, −A + Aj, A − Aj, −A + Aj, −A − Aj, A + Aj, A + Aj, −A − Aj, −A − Aj, −A − Aj |
| | Polarization 2 | A − Aj, A − Aj, A − Aj, −A + Aj, −A + Aj, −A − Aj, A − Aj, −A + Aj, −A − Aj, A + Aj, −A − Aj, −A + Aj, A − Aj, A + Aj, −A − Aj, −A − Aj, A + Aj, A + Aj, A + Aj |
| 14 | Polarization 1 | A − Aj, A − Aj, A − Aj, −A + Aj, −A + Aj, A + Aj, A − Aj, −A + Aj, A + Aj, −A − Aj, A + Aj, −A + Aj, A − Aj, −A − Aj, A + Aj, A + Aj, −A − Aj, −A − Aj, −A − Aj |
| | Polarization 2 | A − Aj, A − Aj, A − Aj, −A + Aj, −A + Aj, −A − Aj, A − Aj, −A + Aj, −A − Aj, A − Aj, −A + Aj, A − Aj, −A + Aj, A + Aj, −A − Aj, −A − Aj, A + Aj, A + Aj, A + Aj |
| 15 | Polarization 1 | A + Aj, A + Aj, A + Aj, −A − Aj, −A − Aj, A − Aj, A + Aj, −A − Aj, A − Aj, A + Aj, −A − Aj, A + Aj, −A − Aj, −A + Aj, A − Aj, A − Aj, −A + Aj, −A + Aj, −A + Aj |
| | Polarization 2 | A + Aj, A + Aj, A + Aj, −A − Aj, −A − Aj, −A + Aj, A + Aj, −A − Aj, −A + Aj, A − Aj, −A + Aj, −A − Aj, A + Aj, A − Aj, −A + Aj, −A + Aj, A − Aj, A − Aj, A − Aj |
| 16 | Polarization 1 | A + Aj, A + Aj, A + Aj, −A − Aj, −A − Aj, A − Aj, A + Aj, −A − Aj, A − Aj, −A + Aj, A − Aj, −A − Aj, A + Aj, −A + Aj, A − Aj, A − Aj, −A + Aj, −A + Aj, −A + Aj |
| | Polarization 2 | A + Aj, A + Aj, A + Aj, −A − Aj, −A − Aj, −A + Aj, A + Aj, −A − Aj, −A + Aj, A + Aj, −A − Aj, A + Aj, −A − Aj, A − Aj, −A + Aj, −A + Aj, A − Aj, A − Aj, A − Aj |

Figure 7:
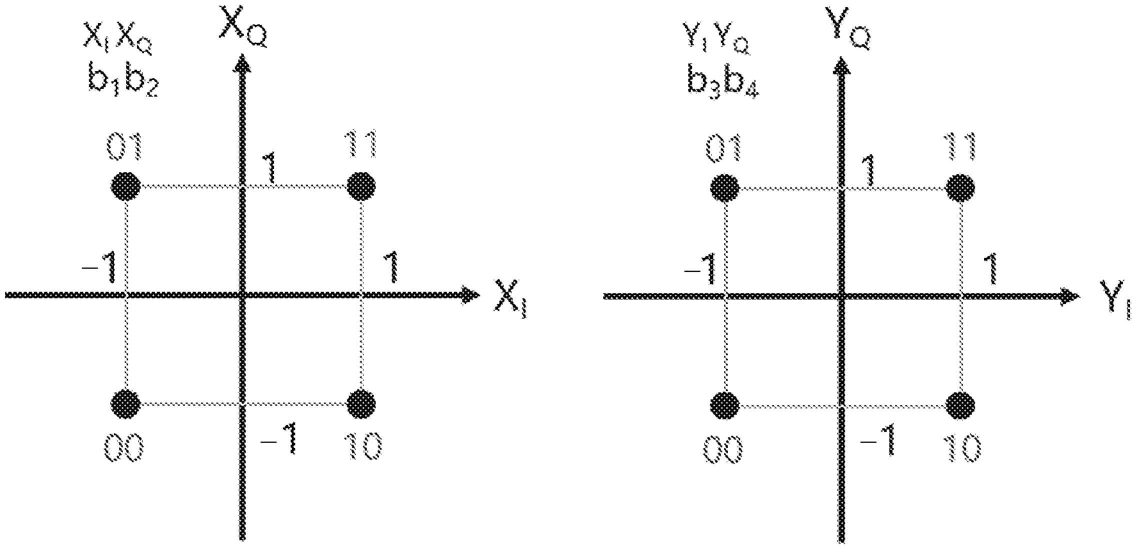
FIG. 7 shows a mapping relationship between a DP-QPSK symbol and a bit.
Figure 8:
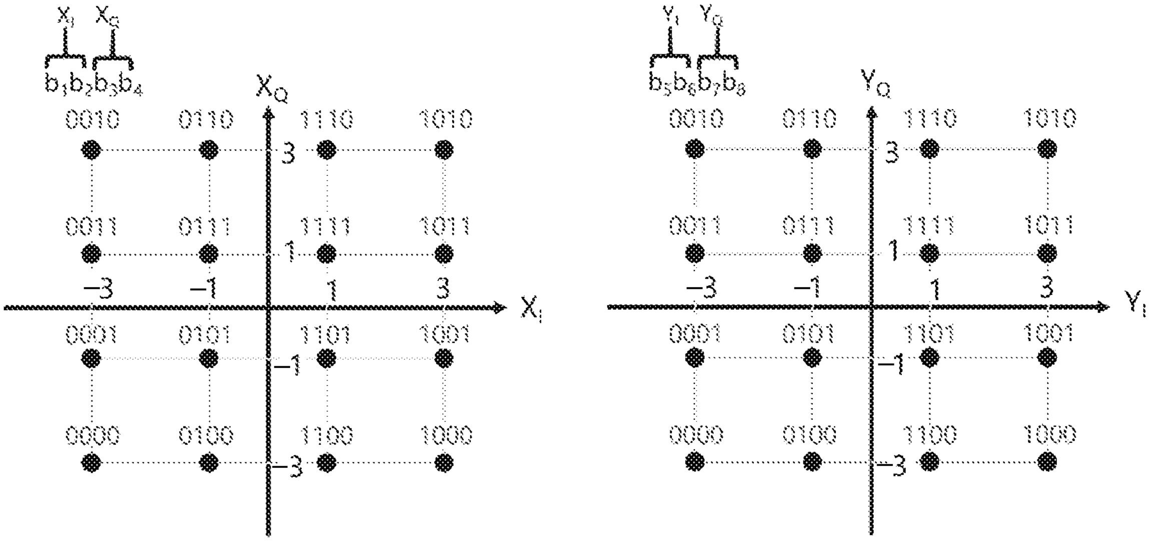
FIG. 8 shows a mapping relationship between a DP-16QAM symbol and a bit.

It should be noted that the frame alignment word sequence, the pilot sequence, and the training sequence described above are all provided in the form of symbols. Equivalently, they may be provided in the form of bits. For example, FIG. 7 and FIG. 8 respectively show mapping relationships between a DP-QPSK symbol and a bit, and between a DP-16QAM symbol and a bit. A QPSK symbol consists of two bits. 01 in bits is −1+1j, and 11 is 1+1j. 16QAM consists of four bits. 0000 is −3 to 3j, 1010 is 3+3j, and so on. Taking QPSK as an example, if a sequence is 1+1j, 1+1j, 1−1j, −1+1j, a corresponding bit sequence is 11111001. The bit sequence is subjected to corresponding modulation, and then is converted into a symbol sequence for output.

An embodiment of this application further provides several specific super-frame formats, which are described as follows:

Embodiment 1: Symbols before framing are obtained through CFEC encoding. A quantity of the symbols is 175616. The following table lists parameters $N_{SF}$, $N_{TS}$, $N_{PS}$, $N_{FAW}$, $N_{RES}$, $N_S$, $N_F$, and OH corresponding to the super-frame.

| $N_{SF}$ | $N_{PS}$ | $N_S$ | $N_F$ | OH | $N_{FAW}$ | $N_{TS}$ | $N_{RES}$ |
|---|---|---|---|---|---|---|---|
| 49 | 57 | 3648 | 178752 | 1.79% | 24 | 6 | 74 |

Figure 9:
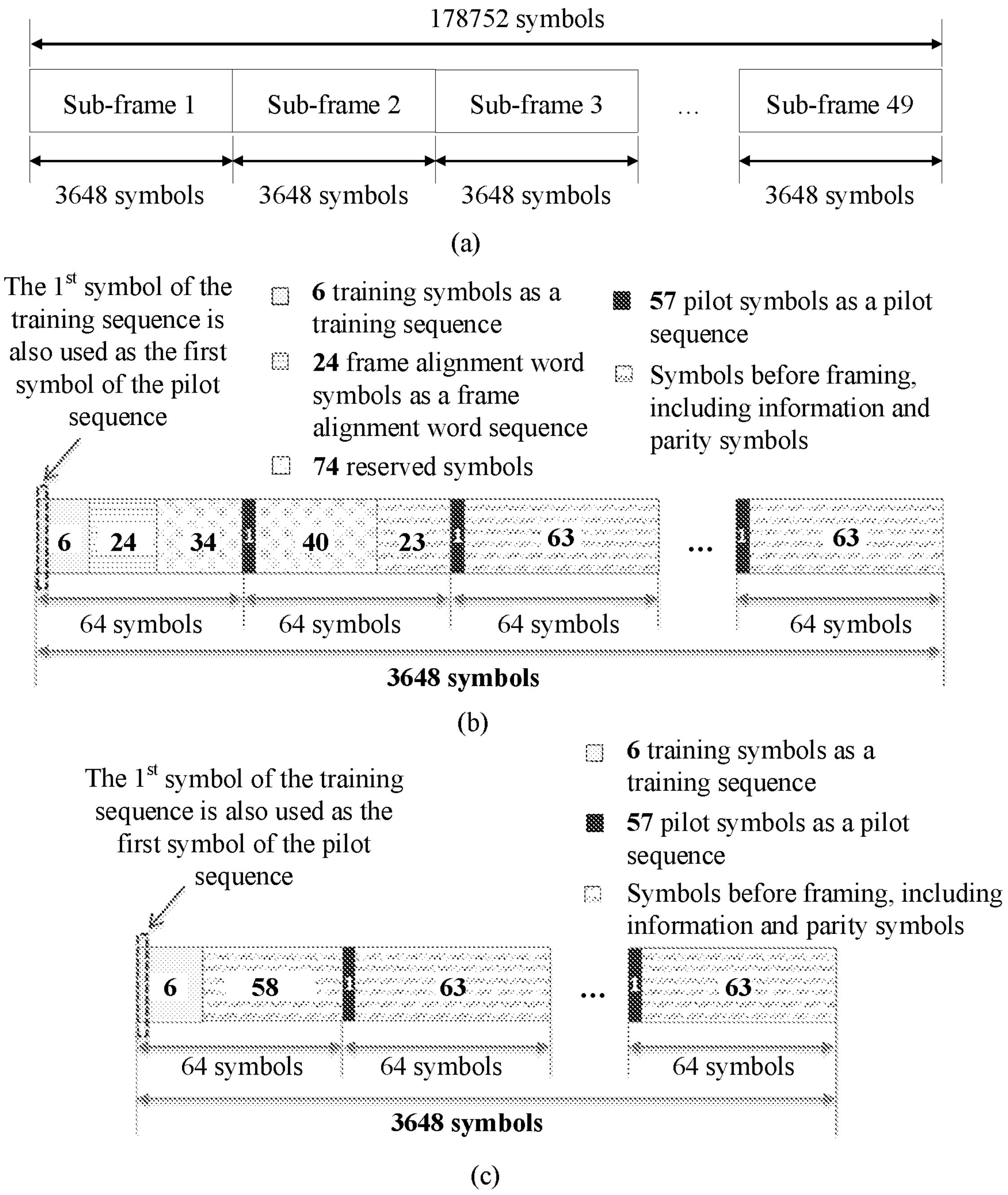
FIG. 9 shows diagrams of structures of a specific super-frame, the $1^{st}$ sub-frame in the super-frame, and another sub-frame other than the $1^{st}$ sub-frame in the super-frame according to an embodiment of this application.

A super-frame structure thereof is shown in FIG. 9. The super-frame includes 49 sub-frames, and each sub-frame includes 3648 symbols, as shown in (a) in FIG. 9. The 1st sub-frame is shown in (b) in FIG. 9, including 6 training symbols, 24 frame alignment word symbols, and 74 reserved symbols. The 2nd to 49th sub-frames each also have 6 training symbols, as shown in (c) in FIG. 9. In addition, in each sub-frame, the 1st symbol in every 64 symbols is a pilot symbol. A frame alignment word sequence with a length of 24 is one item in Table 7. A training sequence with a length of 6 may be one item in Table 31. A pilot sequence with a length of 57, according to the super-frame structure, is one item in Table 10-1 or Table 10-2 of which the 1st symbol is the same as the 1st symbol of the used training sequence. For example, the frame alignment word sequence with a symbol length of 24 is the following sequence:

| Polarization | Frame alignment word sequence |
|---|---|
| X | A + Aj, A − Aj, A + Aj, −A + Aj, A + Aj, −A − Aj, A − Aj, A − Aj, −A + Aj, A + Aj, A + Aj, −A + Aj, A − Aj, A − Aj, −A + Aj, −A − Aj, −A − Aj, A − Aj, A + Aj, −A − Aj, −A − Aj, −A + Aj, −A − Aj, −A + Aj |
| Y | −A − Aj, A − Aj, −A − Aj, −A + Aj, −A − Aj, A + Aj, A − Aj, A − Aj, −A + Aj, −A − Aj, −A − Aj, −A + Aj, A − Aj, A − Aj, −A + Aj, A + Aj, A + Aj, A − Aj, −A − Aj, A + Aj, A + Aj, −A + Aj, A + Aj, −A + Aj |

Figure 10:
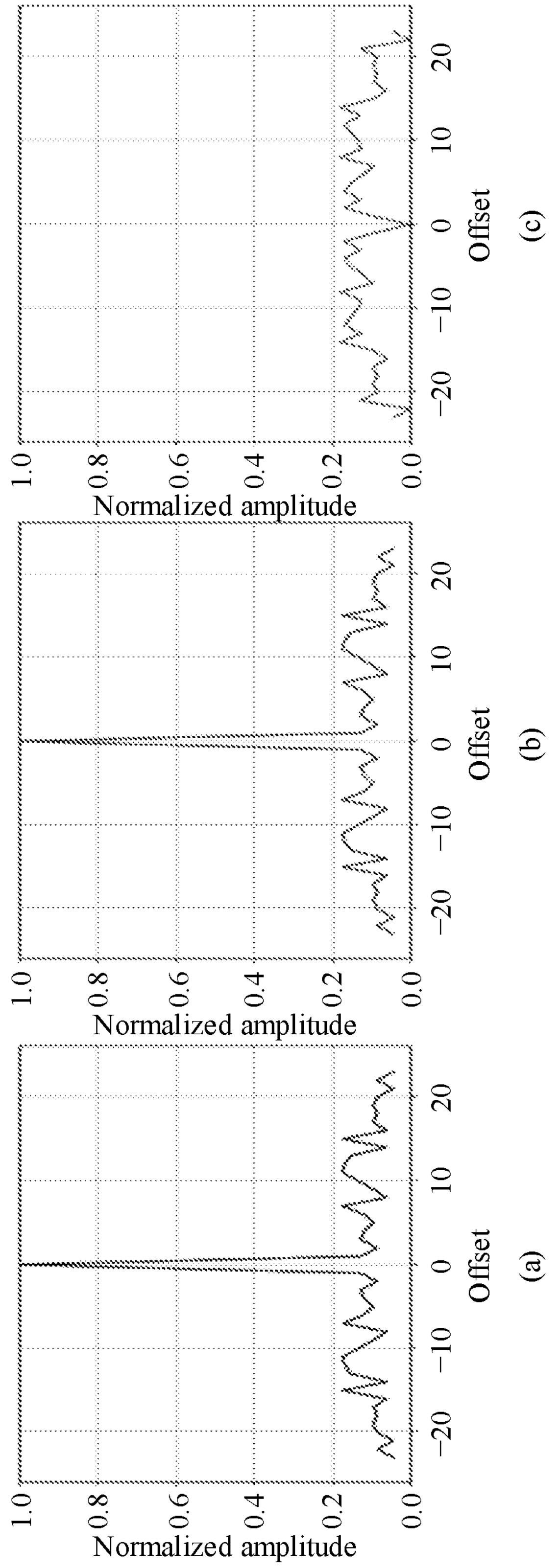
FIG. 10 shows a graph of an aperiodic autocorrelation result of a specific frame alignment word sequence in an X polarization direction, a graph of an aperiodic autocorrelation result of the specific frame alignment word sequence in a Y polarization direction, and a graph of an aperiodic cross-correlation result of the specific frame alignment word sequence in the two polarization directions according to an embodiment of this application.

Correlation characteristics corresponding to the frame alignment word sequence are shown in FIG. 10. (a) in FIG. 10 shows an aperiodic autocorrelation result of the frame alignment word sequence in the X polarization direction, (b) in FIG. 10 shows an aperiodic autocorrelation result of the frame alignment word sequence in the Y polarization direction, and (c) in FIG. 10 shows an aperiodic cross-correlation result of the frame alignment word sequence in the X and Y polarization directions. A sidelobe value of an aperiodic autocorrelation function of the symbol sequence in the two polarization directions is not greater than 0.172 (normalized amplitude), and an aperiodic cross-correlation function value of the symbol sequence in the two polarization directions is not greater than 0.177 (normalized amplitude).

The training sequence with a symbol length of 6 is the following sequence: IC 7,

| Polarization | Training sequence |
|---|---|
| X | −A + Aj, −A + Aj, −A − Aj, A + Aj, A − Aj, A − Aj |
| Y | −A − Aj, −A + Aj, A + Aj, −A − Aj, A − Aj, A + Aj |

Figure 11:
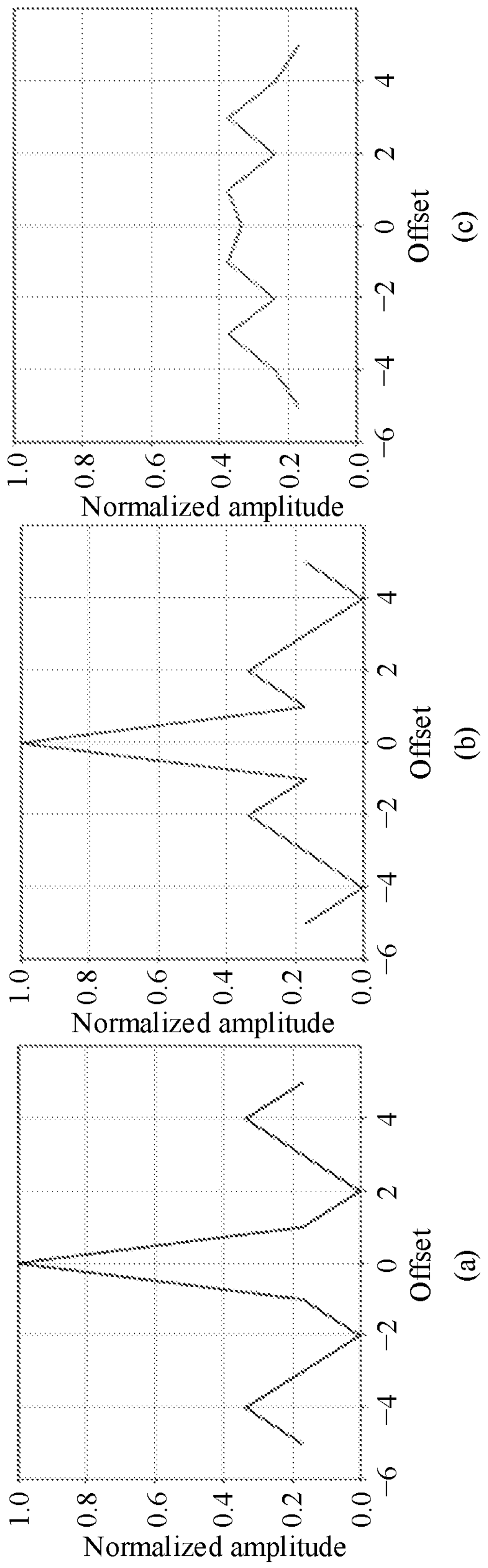
FIG. 11 shows a graph of an aperiodic autocorrelation result of a specific training sequence in an X polarization direction, a graph of an aperiodic autocorrelation result of the specific training sequence in a Y polarization direction, and a graph of an aperiodic cross-correlation result of the specific training sequence in the two polarization directions according to an embodiment of this application.

Correlation characteristics corresponding to the training sequence are shown in FIG. 11. (a) in FIG. 11 shows an aperiodic autocorrelation result of the training sequence in the X polarization direction, (b) in FIG. 11 shows an aperiodic autocorrelation result of the training sequence in the Y polarization direction, and (c) in FIG. 11 shows an aperiodic cross-correlation result of the training sequence in the X and Y polarization directions. A sidelobe value of an aperiodic autocorrelation function of the symbol sequence in the two polarization directions is not greater than 0.34 (normalized amplitude), and an aperiodic cross-correlation function value of the symbol sequence in the two polarization directions is not greater than 0.38 (normalized amplitude).

The pilot sequence with a symbol length of 57 is the following sequence:

| Polarization | Pilot sequence |
|---|---|
| X | −A + Aj, −A − Aj, −A + Aj, A − Aj, A + Aj, A − Aj, A + Aj, A + Aj, −A − Aj, A − Aj, A − Aj, −A + Aj, −A + Aj, A + Aj, −A − Aj, −A − Aj, A + Aj, A + Aj, A − Aj, A + Aj, −A − Aj, A − Aj, −A + Aj, A + Aj, A − Aj, A − Aj, A + Aj, A + Aj, A + Aj, −A − Aj, −A + Aj, −A − Aj, A − Aj, −A − Aj, −A − Aj, A + Aj, −A − Aj, −A −Aj, −A − Aj, −A + Aj, −A + Aj, A − Aj, A + Aj, −A + Aj, −A + Aj, −A − Aj, −A + Aj, −A + Aj, −A + Aj, −A + Aj, A − Aj, −A − Aj, A + Aj, A − Aj, −A + Aj, A − Aj, A − Aj |
| Y | −A − Aj, −A + Aj, −A − Aj, A + Aj, A − Aj, A + Aj, A − Aj, A − Aj, −A + Aj, A + Aj, A + Aj, −A − Aj, −A −Aj, A − Aj, −A + Aj, −A + Aj, A − Aj, A − Aj, A + Aj, A − Aj, −A + Aj, A + Aj, −A − Aj, A − Aj, A + Aj, A + Aj, A − Aj, A − Aj, A − Aj, −A + Aj, −A − Aj, −A + Aj, A + Aj, −A + Aj, −A + Aj, A − Aj, −A + Aj, −A + Aj, −A + Aj, −A − Aj, −A − Aj, A + Aj, A − Aj, −A − Aj, −A − Aj, −A + Aj, −A − Aj, −A − Aj, −A − Aj, −A − Aj, A + Aj, −A + Aj, A − Aj, A + Aj, −A − Aj, A + Aj, A + Aj |

Figure 12:
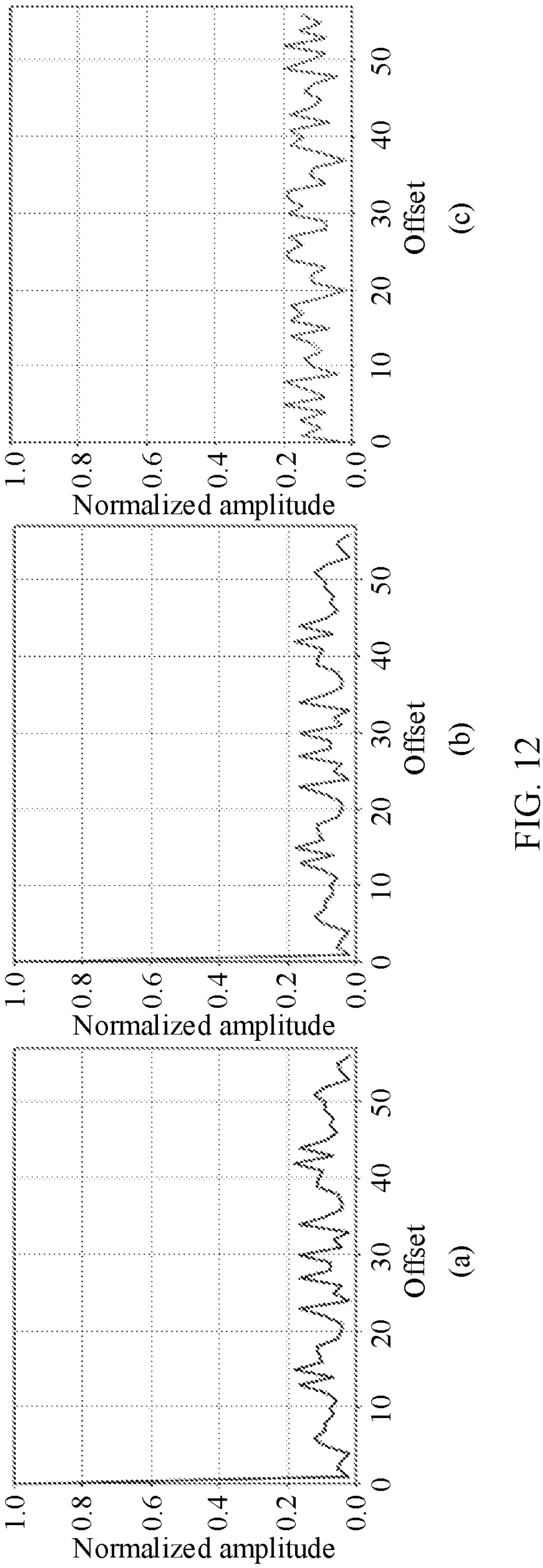
FIG. 12 shows a graph of a periodic autocorrelation result of a specific pilot sequence in an X polarization direction, a graph of a periodic autocorrelation result of the specific pilot sequence in a Y polarization direction, and a graph of a periodic cross-correlation result of the specific pilot sequence in the two polarization directions according to an embodiment of this application.

Correlation characteristics corresponding to the pilot sequence are shown in FIG. 12. (a) in FIG. 12 shows a periodic autocorrelation result of the pilot sequence in the X polarization direction, (b) in FIG. 12 shows a periodic autocorrelation result of the pilot sequence in the Y polarization direction, and (c) in FIG. 12 shows a periodic cross-correlation result of the pilot sequence in the X and Y polarization directions. A sidelobe value of aperiodic autocorrelation function of the symbol sequence in the two polarization directions is not greater than 0.177 (normalized amplitude), and aperiodic cross-correlation function value of the symbol sequence in the two polarization directions is not greater than 0.197 (normalized amplitude). It should be understood that, for the correlation characteristics of the foregoing sequences, a value of A does not affect a normalized amplitude value of a correlation function, that is, the correlation characteristics are independent of a modulation format used. Therefore, when the correlation characteristics of the sequence are verified in this embodiment and the subsequent embodiments, the value of A is not limited, which is not repeated in this application.

It can be learned that a frame overhead of the super-frame structure provided in this embodiment of this application is as low as 1.79%, and the designed sequence has relatively good autocorrelation and cross-correlation characteristics. The frame alignment word sequence can further meet direct current balance, and the training sequence and the pilot sequence can also be combined together to meet direct current balance, which helps improve quality of a signal restored at the receiver end.

Based on received signals in the two polarization directions, the receiver end performs signal processing by using the frame alignment word sequence, the training sequence, and the pilot sequence, to restore the signals. For example, the polarization directions can be distinguished by calculating correlation values between the received signals in the two polarization directions and sequence symbols of the training sequence in the X and Y polarizations respectively, and sub-frame alignment may be performed; super-frame alignment is performed by using the frame alignment word sequence; and carrier phase recovery is performed by using the pilot signal.

In addition, the three symbol sequences in this embodiment may be represented in the form of bit sequences. Taking DP-16QAM and DP-QPSK as an example, the bit sequences may be shown in the following tables, where $b_1$ to $b_8$ are the corresponding bits in FIG. 7 and FIG. 8.

A bit sequence corresponding to the frame alignment word sequence is as follows:

| Index | DP-16QAM $b_1b_2b_3b_4$ | $b_5b_6b_7b_8$ | DP-QPSK $b_1b_2$ | $b_3b_4$ |
|---|---|---|---|---|
| 1 | 1010 | 0000 | 11 | 00 |
| 2 | 1000 | 1000 | 10 | 10 |
| 3 | 1010 | 0000 | 11 | 00 |
| 4 | 0010 | 0010 | 01 | 01 |
| 5 | 1010 | 0000 | 11 | 00 |
| 6 | 0000 | 1010 | 00 | 11 |
| 7 | 1000 | 1000 | 10 | 10 |
| 8 | 1000 | 1000 | 10 | 10 |
| 9 | 0010 | 0010 | 01 | 01 |
| 10 | 1010 | 0000 | 11 | 00 |
| 11 | 1010 | 0000 | 11 | 00 |
| 12 | 0010 | 0010 | 01 | 01 |
| 13 | 1000 | 1000 | 10 | 10 |
| 14 | 1000 | 1000 | 10 | 10 |
| 15 | 0010 | 0010 | 01 | 01 |
| 16 | 0000 | 1010 | 00 | 11 |
| 17 | 0000 | 1010 | 00 | 11 |
| 18 | 1000 | 1000 | 10 | 10 |
| 19 | 1010 | 0000 | 11 | 00 |
| 20 | 0000 | 1010 | 00 | 11 |
| 21 | 0000 | 1010 | 00 | 11 |
| 22 | 0010 | 0010 | 01 | 01 |
| 23 | 0000 | 1010 | 00 | 11 |
| 24 | 0010 | 0010 | 01 | 01 |

A bit sequence corresponding to the training sequence is as follows:

| Index | DP-16QAM $b_1b_2b_3b_4$ | $b_5b_6b_7b_8$ | DP-QPSK $b_1b_2$ | $b_3b_4$ |
|---|---|---|---|---|
| 1 | 0000 | 0010 | 00 | 01 |
| 2 | 0010 | 0010 | 01 | 01 |
| 3 | 1010 | 0000 | 11 | 00 |
| 4 | 0000 | 1010 | 00 | 11 |
| 5 | 1000 | 1000 | 10 | 10 |
| 6 | 1010 | 1000 | 11 | 10 |

A bit sequence corresponding to the pilot sequence is as follows:

| Index | DP-16QAM $b_1b_2b_3b_4$ | $b_5b_6b_7b_8$ | DP-QPSK $b_1b_2$ | $b_3b_4$ |
|---|---|---|---|---|
| 1 | 0010 | 0000 | 01 | 00 |
| 2 | 0000 | 0010 | 00 | 01 |
| 3 | 0010 | 0000 | 01 | 00 |
| 4 | 1000 | 1010 | 10 | 11 |
| 5 | 1010 | 1000 | 11 | 10 |
| 6 | 1000 | 1010 | 10 | 11 |

-continued

| Index | DP-16QAM $b_1b_2b_3b_4$ | $b_5b_6b_7b_8$ | DP-QPSK $b_1b_2$ | $b_3b_4$ |
|---|---|---|---|---|
| 7 | 1010 | 1000 | 11 | 10 |
| 8 | 1010 | 1000 | 11 | 10 |
| 9 | 0000 | 0010 | 00 | 01 |
| 10 | 1000 | 1010 | 10 | 11 |
| 11 | 1000 | 1010 | 10 | 11 |
| 12 | 0010 | 0000 | 01 | 00 |
| 13 | 0010 | 0000 | 01 | 00 |
| 14 | 1010 | 1000 | 11 | 10 |
| 15 | 0000 | 0010 | 00 | 01 |
| 16 | 0000 | 0010 | 00 | 01 |
| 17 | 1010 | 1000 | 11 | 10 |
| 18 | 1010 | 1000 | 11 | 10 |
| 19 | 1000 | 1010 | 10 | 11 |
| 20 | 1010 | 1000 | 11 | 10 |
| 21 | 0000 | 0010 | 00 | 01 |
| 22 | 1000 | 1010 | 10 | 11 |
| 23 | 0010 | 000 | 01 | 00 |
| 24 | 1010 | 1000 | 11 | 10 |
| 25 | 1000 | 1010 | 10 | 11 |
| 26 | 1000 | 1010 | 10 | 11 |
| 27 | 1010 | 1000 | 11 | 10 |
| 28 | 1010 | 1000 | 11 | 10 |
| 29 | 1010 | 1000 | 11 | 10 |
| 30 | 0000 | 0010 | 00 | 01 |
| 31 | 0010 | 0000 | 01 | 00 |
| 32 | 0000 | 0010 | 00 | 01 |
| 33 | 1000 | 1010 | 10 | 11 |
| 34 | 0000 | 0010 | 00 | 01 |
| 35 | 0000 | 0010 | 00 | 01 |
| 36 | 1010 | 1000 | 11 | 10 |
| 37 | 0000 | 0010 | 00 | 01 |
| 38 | 0000 | 0010 | 00 | 01 |
| 39 | 0000 | 0010 | 00 | 01 |
| 40 | 0010 | 0000 | 01 | 00 |
| 41 | 0010 | 0000 | 01 | 00 |
| 42 | 1000 | 1010 | 10 | 11 |
| 43 | 1010 | 1000 | 11 | 10 |
| 44 | 0010 | 0000 | 01 | 00 |
| 45 | 0010 | 0000 | 01 | 00 |
| 46 | 0000 | 0010 | 00 | 01 |
| 47 | 0010 | 0000 | 01 | 00 |
| 48 | 0010 | 0000 | 01 | 00 |
| 49 | 0010 | 0000 | 01 | 00 |
| 50 | 0010 | 0000 | 01 | 00 |
| 51 | 1000 | 1010 | 10 | 11 |
| 52 | 0000 | 0010 | 00 | 01 |
| 53 | 1010 | 1000 | 11 | 10 |
| 54 | 1000 | 1010 | 10 | 11 |
| 55 | 0010 | 0000 | 01 | 00 |
| 56 | 1000 | 1010 | 10 | 11 |
| 57 | 1000 | 1010 | 10 | 11 |

Figure 13:
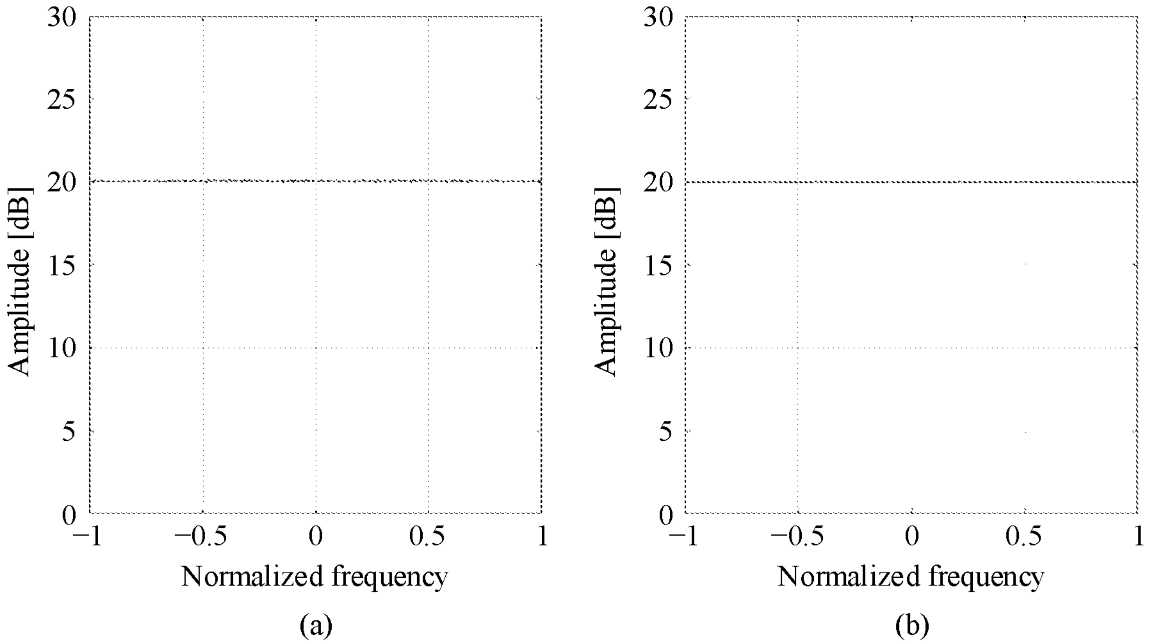
FIG. 13 shows a spectrum diagram of a super-frame for DP-16QAM and a spectrum diagram of a random DP-16QAM signal when the super-frame structure shown in FIG. 9 is used.
Figure 14:
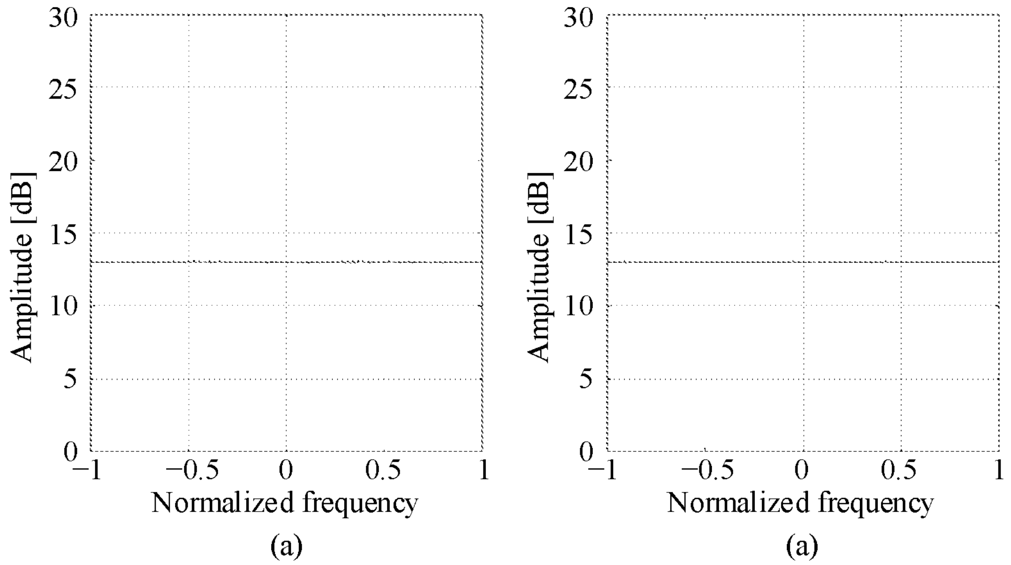
FIG. 14 shows a spectrum diagram of a super-frame for DP-QPSK and a spectrum diagram of a random DP-QPSK signal when the super-frame structure shown in FIG. 9 is used.

Further, in this embodiment, spectral flatness characteristics of a super-frame in different modulation formats are further simulated. (a) in FIG. 13 provides a spectrum diagram of a super-frame structure shown in FIG. 9 that includes 300 super-frames for DP-16QAM. (b) in FIG. 13 is a spectrum diagram of a random DP-16QAM signal with the same length. (a) in FIG. 14 provides a spectrum diagram of the super-frame structure shown in FIG. 9 that includes 300 super-frames for DP-QPSK. (b) in FIG. 14 is a spectrum diagram of a random DP-QPSK signal with the same length. It can be learned that, for not only DP-16QAM bur also DP-QPSK, there is a very small difference between spectral flatness characteristics of the super-frame structure provided in this embodiment and spectral flatness characteristics of a random modulation signal with the same length, as well as very good flatness.

It should be understood that, because spectral flatness characteristics of a signal in the two polarization directions are very similar, in this embodiment of this application, only one polarization direction is used as an example to provide a simulation result. The same is true for the subsequent embodiments, which is not repeated in this application.

Embodiment 2: This embodiment of this application further provides a specific super-frame format. Symbols before framing are obtained through CFEC encoding. A quantity of the symbols is 175616. The following table lists parameters $N_{SF}$, $N_{TS}$, $N_{PS}$, $N_{FAW}$, $N_{RES}$, $N_S$, $N_F$, and OH corresponding to the super-frame, and the like.

| $N_{SF}$ | $N_{PS}$ | $N_S$ | $N_F$ | OH | $N_{FAW}$ | $N_{TS}$ | $N_{RES}$ |
|---|---|---|---|---|---|---|---|
| 43 | 65 | 4160 | 178880 | 1.86% | 22 | 10 | 60 |

Figure 15:
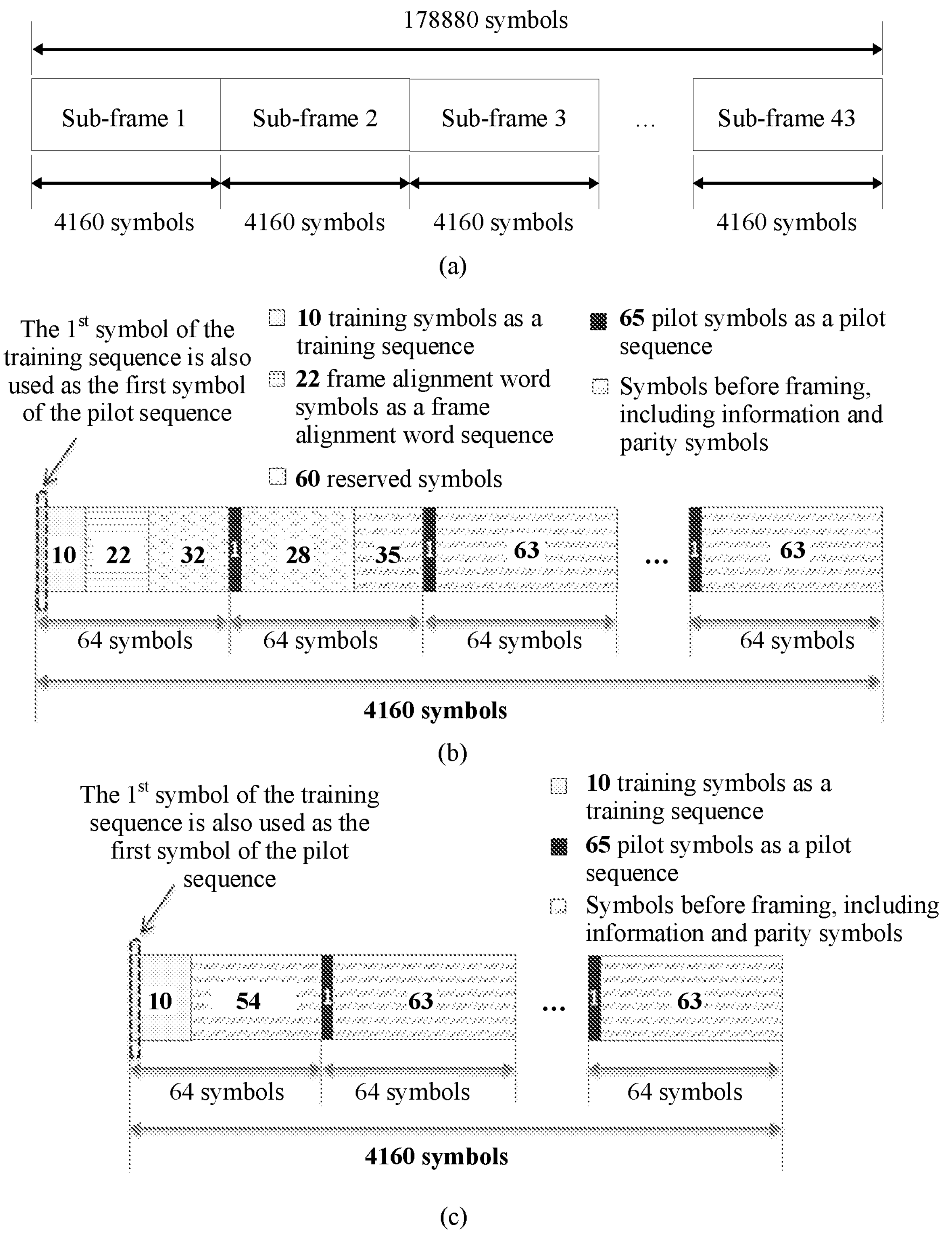
FIG. 15 shows a diagram of a structure of a specific super-frame, a diagram of a structure of the $1^{st}$ sub-frame in the specific super-frame, and a diagram of a structure of another sub-frame other than the $1^{st}$ sub-frame in the specific super-frame according to another embodiment of this application.

A super-frame structure thereof is shown in FIG. 15. The super-frame includes 43 sub-frames, and each sub-frame includes 4160 symbols, as shown in (a) in FIG. 15. The $1^{st}$ sub-frame is shown in (b) in FIG. 15, including 10 training symbols, 22 frame alignment word symbols, and 60 reserved symbols. The $2^{nd}$ to $43^{rd}$ sub-frames each also have 10 training symbols, as shown in (c) in FIG. 15. In addition, in each sub-frame, the $1^{st}$ symbol in every 64 symbols is a pilot symbol. A frame alignment word sequence with a length of 22 is one item in Table 6. A training sequence with a length of 10 may be one item in Table 33. A pilot sequence with a length of 65, according to the super-frame structure, is one item in Table 11-1 or Table 11-2 of which the $1^{st}$ symbol is the same as the $1^{st}$ symbol of the used training sequence. For example, the frame alignment word sequence with a symbol length of 22 is the following sequence:

| Polarization | Frame alignment word sequence |
|---|---|
| X | A − Aj, A − Aj, A + Aj, −A − Aj, A + Aj, A + Aj, A + Aj, −A + Aj, A − Aj, A − Aj, −A − Aj, A − Aj, A + Aj, −A + Aj, −A − Aj, −A + Aj, −A + Aj, A + Aj, −A − Aj, −A − Aj, −A − Aj, −A + Aj |
| Y | A + Aj, −A + Aj, −A + Aj, A + Aj, A − Aj, A − Aj, A + Aj, −A − Aj, −A + Aj, A − Aj, −A + Aj, −A − Aj, A − Aj, −A + Aj, A + Aj, −A + Aj, A − Aj, −A − Aj, A + Aj, A − Aj, −A − Aj, −A − Aj |

Figure 16:
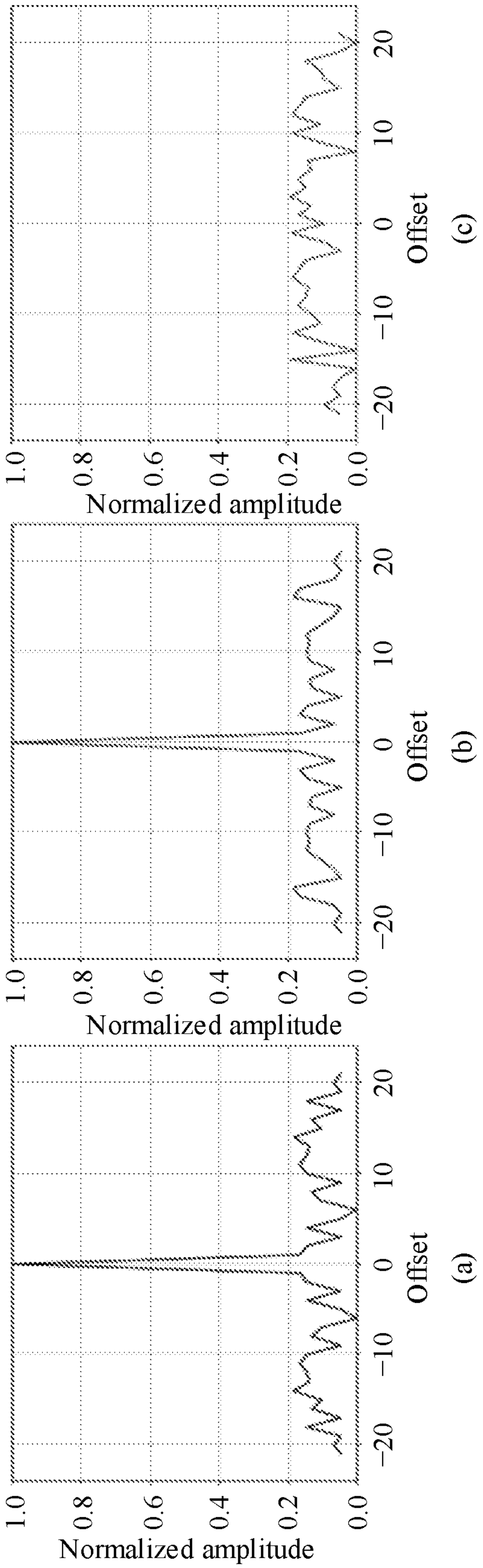
FIG. 16 shows a graph of an aperiodic autocorrelation result of a specific frame alignment word sequence in an X polarization direction, a graph of an aperiodic autocorrelation result of the specific frame alignment word sequence in a Y polarization direction, and a graph of an aperiodic cross-correlation result of the specific frame alignment word sequence in the two polarization directions according to another embodiment of this application.

Correlation characteristics corresponding to the frame alignment word sequence are shown in FIG. 16. (a) in FIG. 16 shows an aperiodic autocorrelation result of the frame alignment word sequence in the X polarization direction, (b) in FIG. 16 shows an aperiodic autocorrelation result of the frame alignment word sequence in the Y polarization direction, and (c) in FIG. 16 shows an aperiodic cross-correlation result of the frame alignment word sequence in the X and Y polarization directions. A sidelobe value of an aperiodic autocorrelation function of the symbol sequence in the two polarization directions is not greater than 0.182 (normalized amplitude), and an aperiodic cross-correlation function value of the symbol sequence in the two polarization directions is not greater than 0.188 (normalized amplitude).

In some actual applications, the frame alignment word sequence with a length of 22 may be an existing symbol sequence, for example, a sequence used for OIF-400ZR However, the sequence has relatively poor cross-correlation in the X polarization and the Y polarization, and the receiver end needs to use more symbols to ensure a sufficiently low alignment error probability during alignment.

The training sequence with a symbol length of 10 is the following sequence:

| Polarization | Training sequence |
|---|---|
| X | −A + Aj, A − Aj, −A + Aj, −A + Aj, −A − Aj, −A − Aj, A + Aj, A + Aj, A − Aj, A − Aj |
| Y | −A − Aj, −A − Aj, −A + Aj, A − Aj, A + Aj, A + Aj, −A − Aj, A + Aj, −A + Aj, A − Aj |

Figure 17:
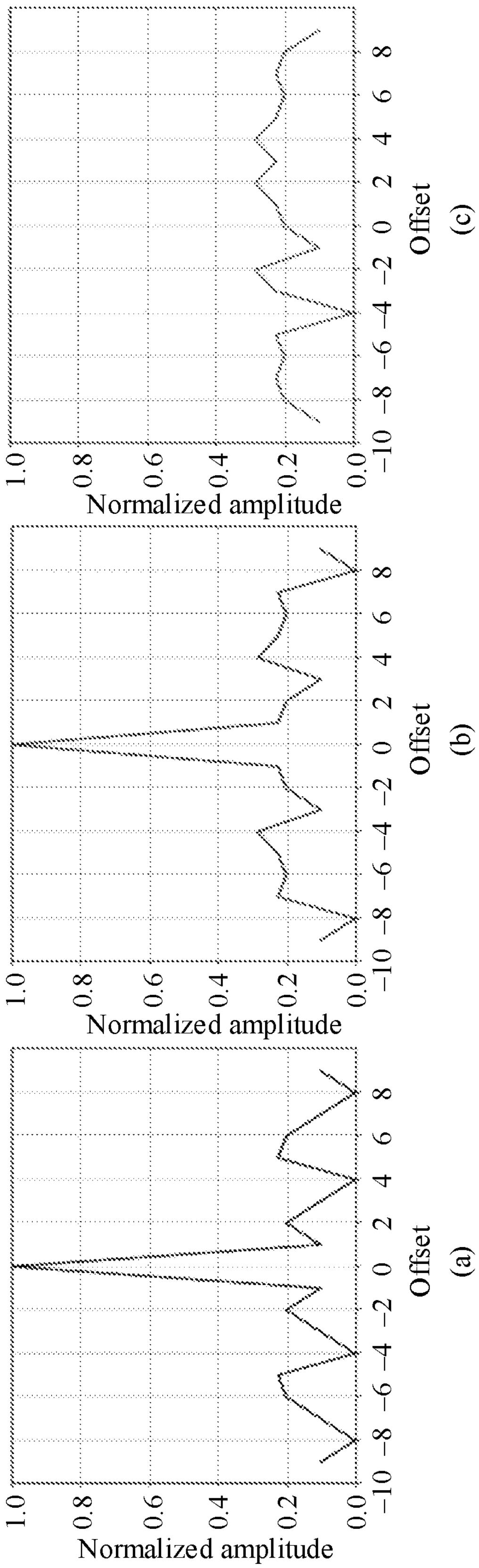
FIG. 17 shows a graph of an aperiodic autocorrelation result of a specific training sequence in an X polarization direction, a graph of an aperiodic autocorrelation result of the specific training sequence in a Y polarization direction, and a graph of an aperiodic cross-correlation result of the specific training sequence in the two polarization directions according to another embodiment of this application.

Correlation characteristics corresponding to the training sequence are shown in FIG. 17. (a) in FIG. 17 shows an aperiodic autocorrelation result of the training sequence in the X polarization direction, (b) in FIG. 17 shows an aperiodic autocorrelation result of the training sequence in the Y polarization direction, and (c) in FIG. 17 shows an aperiodic cross-correlation result of the training sequence in the X and Y polarization directions. A sidelobe value of an aperiodic autocorrelation function of the symbol sequence in the two polarization directions is not greater than 0.283 (normalized amplitude), and an aperiodic cross-correlation function value of the symbol sequence in the two polarization directions is not greater than 0.283 (normalized amplitude).

The pilot sequence with a symbol length of 65 is the following sequence:

| Polarization | Pilot sequence |
|---|---|
| X | −A + Aj, A − Aj, −A + Aj, −A + Aj, A + Aj, A + Aj, A + Aj, A − Aj, A + Aj, −A + Aj, −A + Aj, −A + Aj, A − Aj, −A − Aj, A − Aj, A − Aj, A + Aj, A + Aj, −A − Aj, A − Aj, A − Aj, −A + Aj, −A − Aj, −A − Aj, A − Aj, A + Aj, A − Aj, −A + Aj, −A − Aj, A − Aj, −A + Aj, A + Aj, A − Aj, −A − Aj, A + Aj, A + Aj, −A + Aj, A + Aj, −A − Aj, −A + Aj, −A − Aj, A + Aj, −A − Aj, −A + Aj, A − Aj, −A − Aj, −A − Aj, −A + Aj, A + Aj, A + Aj, −A + Aj, −A + Aj, A + Aj, −A + Aj, −A − Aj, A − Aj, A + Aj, −A − Aj, A − Aj, −A − Aj, A − Aj, −A − Aj, −A − Aj, A + Aj, −A − Aj |
| Y | −A − Aj, A + Aj, −A − Aj, −A − Aj, A − Aj, A − Aj, A − Aj, A + Aj, A − Aj, −A − Aj, −A − Aj, −A − Aj, A + Aj, −A + Aj, A + Aj, A + Aj, A − Aj, A − Aj, −A + Aj, A + Aj, A + Aj, −A − Aj, −A + Aj, −A + Aj, A + Aj, A − Aj, A + Aj, −A − Aj, −A + Aj, A + Aj, −A − Aj, A − Aj, A + Aj, −A + Aj, A − Aj, A − Aj, −A − Aj, A − Aj, −A + Aj, −A − Aj, −A + Aj, A − Aj, −A + Aj, −A − Aj, A + Aj, −A + Aj, −A + Aj, −A − Aj, A − Aj, A − Aj, −A − Aj, −A − Aj, A − Aj, −A − Aj, −A + Aj, A + Aj, A − Aj, −A + Aj, A + Aj, −A + Aj, A + Aj, −A + Aj, −A + Aj, A − Aj, −A + Aj |

Figure 18:
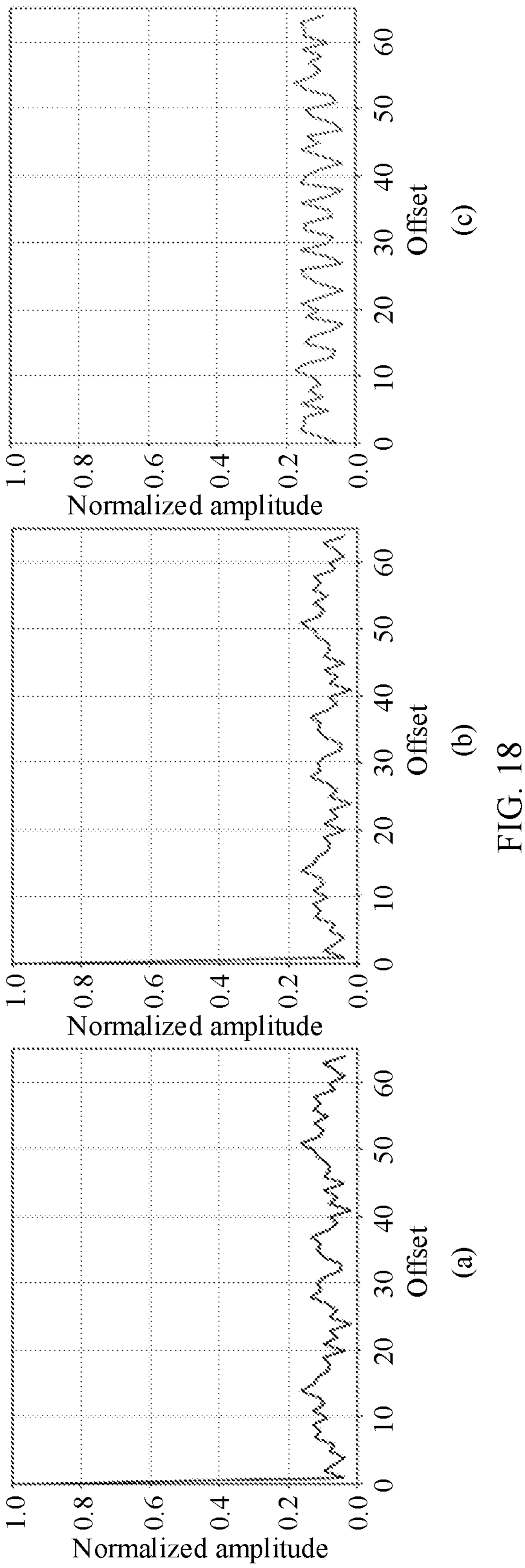
FIG. 18 shows a graph of a periodic autocorrelation result of a specific pilot sequence in an X polarization direction, a graph of a periodic autocorrelation result of the specific pilot sequence in a Y polarization direction, and a graph of a periodic cross-correlation result of the specific pilot sequence in the two polarization directions according to another embodiment of this application.

Correlation characteristics corresponding to the pilot sequence are shown in FIG. 18. (a) in FIG. 18 shows a periodic autocorrelation result of the pilot sequence in the X polarization direction, (b) in FIG. 18 shows a periodic autocorrelation result of the pilot sequence in the Y polarization direction, and (c) in FIG. 18 shows a periodic cross-correlation result of the pilot sequence in the X and Y polarization directions. A sidelobe value of a periodic autocorrelation function of the symbol sequence in the two polarization directions is not greater than 0.161 (normalized amplitude), and a periodic cross-correlation function value of the symbol sequence in the two polarization directions is not greater than 0.173 (normalized amplitude).

It can be learned that a frame overhead of the super-frame structure provided in this embodiment of this application is also as low as 1.86%, and the designed sequence has relatively good autocorrelation and cross-correlation characteristics. The frame alignment word sequence can further meet direct current balance, and the training sequence and the pilot sequence can also be combined together to meet direct current balance, which helps improve quality of a signal restored at the receiver end.

Figure 19:
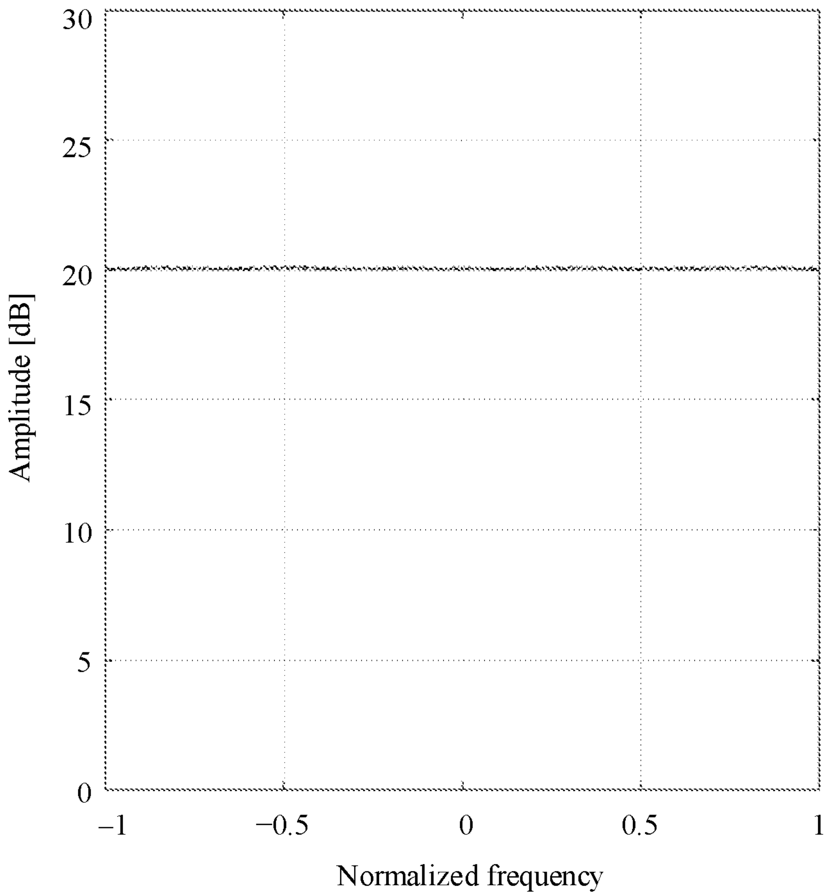
FIG. 19 is a spectrum diagram of a super-frame for DP-16QAM when the super-frame structure shown in FIG. 15 is used.

Further, in this embodiment, taking DP-16QAM as an example, spectral flatness characteristics of a super-frame are further simulated. A result is shown in FIG. 19, which uses a spectrum diagram of the super-frame structure shown in FIG. 15 that includes 300 super-frames. It can be learned that there is a very small difference between spectral flatness characteristics of the super-frame structure provided in this embodiment and spectral flatness characteristics of a random modulation signal with the same length, as well as very good flatness.

Embodiment 3: This embodiment of this application further provides a specific super-frame format. Symbols before framing are obtained through CFEC encoding. A quantity of the symbols is 175616. The following table lists parameters $N_{SF}$, $N_{TS}$, $N_{PS}$, $N_{FAW}$, $N_{RES}$, $N_S$, $N_F$, and OH corresponding to the super-frame, and the like.

| $N_{SF}$ | $N_{PS}$ | $N_S$ | $N_F$ | OH | $N_{FAW}$ | $N_{TS}$ | $N_{RES}$ |
|---|---|---|---|---|---|---|---|
| 50 | 56 | 3584 | 179200 | 2.04% | 22 | 15 | 62 |

Figure 20:
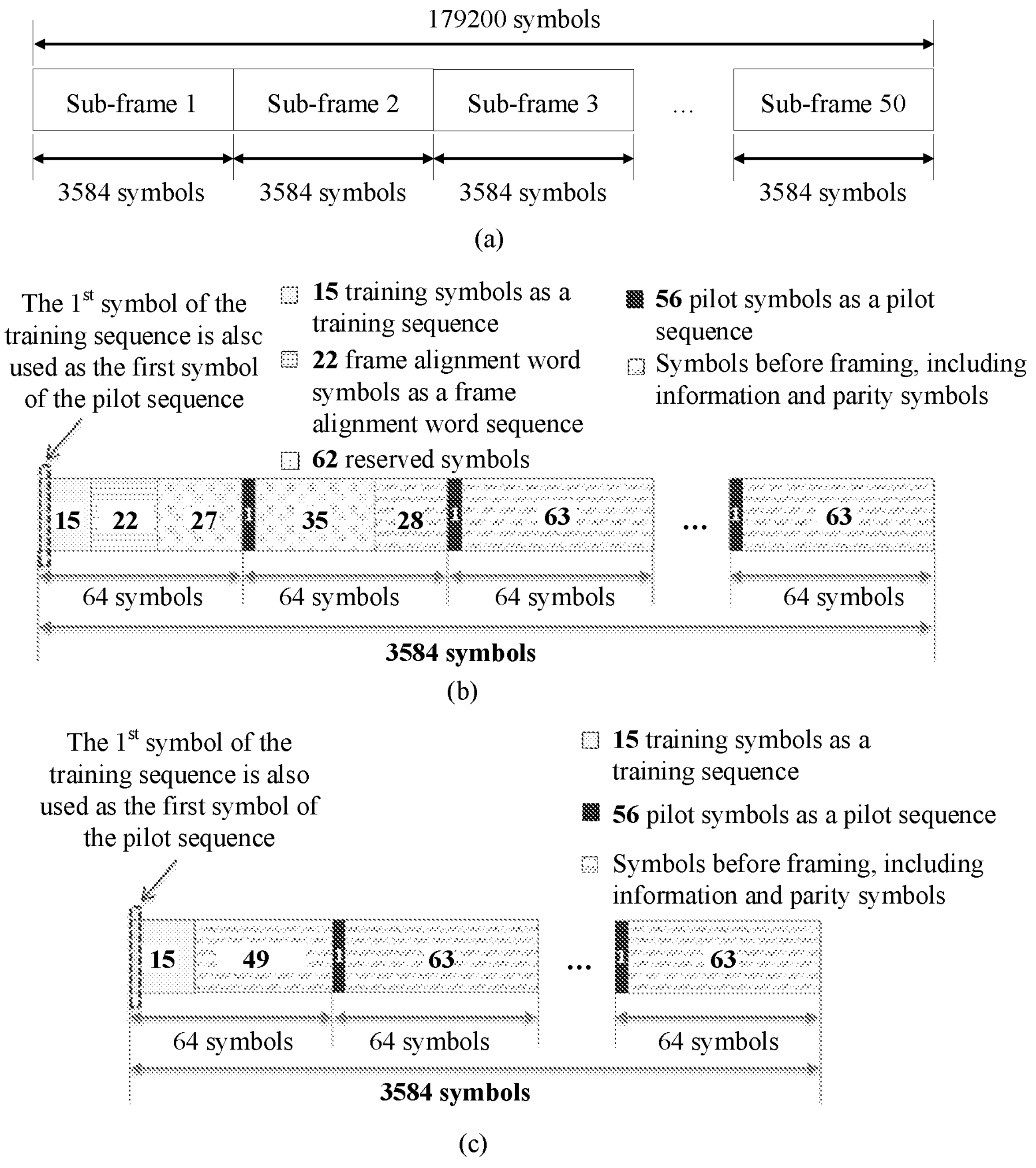
FIG. 20 shows a diagram of a structure of a specific super-frame, a diagram of a structure of the $1^{st}$ sub-frame in the specific super-frame, and a diagram of a structure of another sub-frame other than the $1^{st}$ sub-frame in the specific super-frame according to another embodiment of this application.

A super-frame structure thereof is shown in FIG. 20. The super-frame includes 50 sub-frames, and each sub-frame includes 3584 symbols, as shown in (a) in FIG. 20. The 1$^{st}$ sub-frame is shown in (b) in FIG. 20, including 15 training symbols, 22 frame alignment word symbols, and 62 reserved symbols. The 2$^{nd}$ to 50$^{th}$ sub-frames each also have 15 training symbols, as shown in (c) in FIG. 20. In addition, in each sub-frame, the 1$^{st}$ symbol in every 64 symbols is a pilot symbol. A frame alignment word sequence with a length of 22 is one item in Table 6. A training sequence with a length of 15 may be one item in Table 42. A pilot sequence with a length of 56, according to the super-frame structure, is one item in Table 9-1 or Table 9-2 of which the 1$^{st}$ symbol is the same as the 1$^{st}$ symbol of the used training sequence. For example, considering that the frame alignment word sequence with a symbol length of 22 uses the same sequence as that in Embodiment 2, a correlation simulation result corresponding to the frame alignment word sequence is shown in FIG. 16.

The training sequence with a symbol length of 15 uses the following sequence:

| Polarization | Training sequence |
|---|---|
| X | −A + Aj, A − Aj, −A − Aj, −A − Aj, A + Aj, −A + Aj, A − Aj, A + Aj, A − Aj, −A + Aj, A + Aj, A − Aj, −A + Aj, −A + Aj, −A − Aj |
| Y | −A − Aj, −A − Aj, −A + Aj, A − Aj, A + Aj, −A + Aj, −A + Aj, −A − Aj, A + Aj, −A − Aj, A + Aj, A − Aj, −A − Aj, A − Aj, A + Aj |

Figure 21:
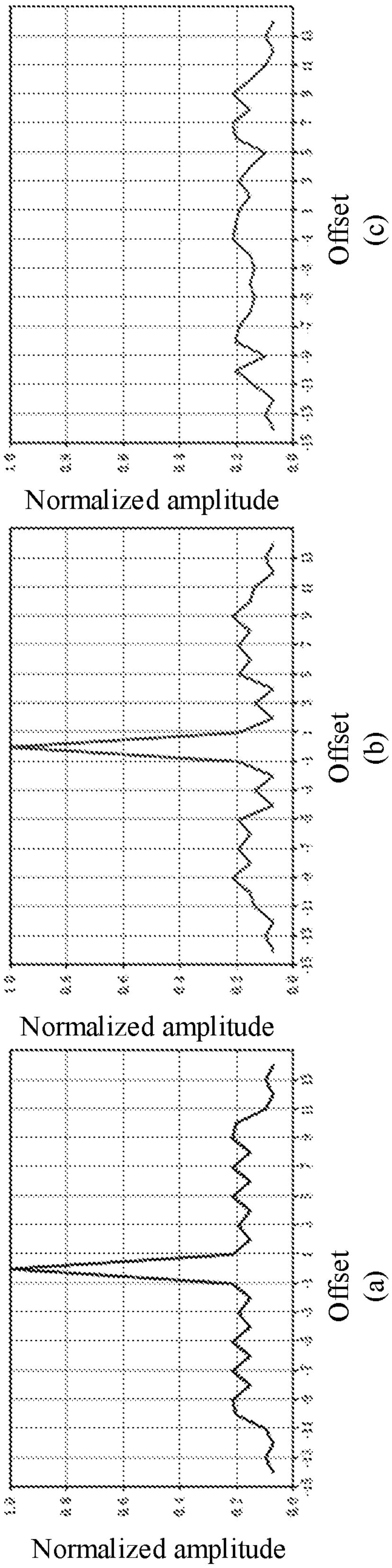
FIG. 21 shows a graph of an aperiodic autocorrelation result of a specific training sequence in an X polarization direction, a graph of an aperiodic autocorrelation result of the specific training sequence in a Y polarization direction, and a graph of an aperiodic cross-correlation result of the specific training sequence in the two polarization directions according to another embodiment of this application.

Correlation characteristics corresponding to the training sequence are shown in FIG. 21. (a) in FIG. 21 shows an aperiodic autocorrelation result of the training sequence in the X polarization direction, (b) in FIG. 21 shows an aperiodic autocorrelation result of the training sequence in the Y polarization direction, and (c) in FIG. 21 shows an aperiodic cross-correlation result of the training sequence in the X and Y polarization directions. A sidelobe value of an aperiodic autocorrelation function of the symbol sequence in the two polarization directions is not greater than 0.211 (normalized amplitude), and an aperiodic cross-correlation function value of the symbol sequence in the two polarization directions is not greater than 0.211 (normalized amplitude).

The pilot sequence with a symbol length of 56 uses the following sequence:

| Polarization | Pilot sequence |
|---|---|
| X | −A + Aj, A + Aj, −A + Aj, A + Aj, −A − Aj, A + Aj, A + Aj, −A − Aj, −A − Aj, A − Aj, −A − Aj, −A − Aj, A − Aj, A − Aj, −A + Aj, −A + Aj, −A + Aj, A − Aj, −A + Aj, −A − Aj, A + Aj, −A − Aj, −A + Aj, −A − Aj, A − Aj, −A − Aj, A − Aj, A + Aj, −A + Aj, A − Aj, A − Aj, −A + Aj, A + Aj, −A − Aj, −A + Aj, A − Aj, A + Aj, A + Aj, −A + Aj, −A − Aj, −A + Aj, A + Aj, A + Aj, −A − Aj, A − Aj, A + Aj, A + Aj, A + Aj, −A + Aj, A − Aj, −A − Aj, −A − Aj, −A − Aj, A + Aj, A − Aj, A − Aj |
| Y | −A − Aj, A − Aj, −A − Aj, A − Aj, −A + Aj, A − Aj, A − Aj, −A + Aj, −A + Aj, A + Aj, −A + Aj, −A + Aj, A + Aj, A + Aj, −A − Aj, −A − Aj, −A − Aj, A + Aj, −A − Aj, −A + Aj, A − Aj, −A + Aj, −A − Aj, −A + Aj, A + Aj, −A + Aj, A + Aj, A − Aj, −A − Aj, A + Aj, A + Aj, −A − Aj, A − Aj, −A + Aj, −A − Aj, A + Aj, A − Aj, A − Aj, −A − Aj, −A + Aj, −A − Aj, A − Aj, A − Aj, −A + Aj, A + Aj, A − Aj, A − Aj, A − Aj, −A − Aj, A + Aj, −A + Aj, −A + Aj, −A + Aj, A − Aj, A + Aj, A + Aj |

Figure 22:
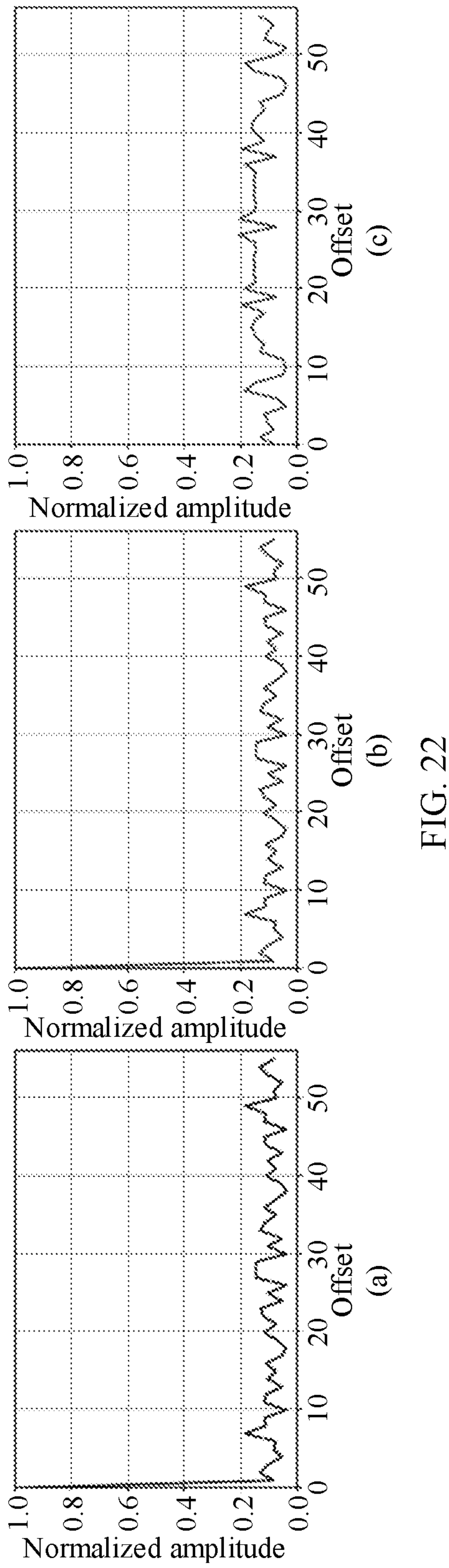
FIG. 22 shows a graph of a periodic autocorrelation result of a specific pilot sequence in an X polarization direction, a graph of a periodic autocorrelation result of the specific pilot sequence in a Y polarization direction, and a graph of a periodic cross-correlation result of the specific pilot sequence in the two polarization directions according to another embodiment of this application.

Correlation characteristics corresponding to the pilot sequence are shown in FIG. 22. (a) in FIG. 22 shows a periodic autocorrelation result of the pilot sequence in the X polarization direction, (b) in FIG. 22 shows a periodic autocorrelation result of the pilot sequence in the Y polarization direction, and (c) in FIG. 22 shows a periodic cross-correlation result of the pilot sequence in the X and Y polarization directions. A sidelobe value of a periodic autocorrelation function of the symbol sequence in the two polarization directions is not greater than 0.183 (normalized amplitude), and a periodic cross-correlation function value of the symbol sequence in the two polarization directions is not greater than 0.203 (normalized amplitude).

It can be learned that a frame overhead of the super-frame structure provided in this embodiment of this application is also as low as 2.03%; the training sequence is relatively long, so that the receiver end performs frame alignment; and the designed sequence has relatively good autocorrelation and cross-correlation characteristics. The frame alignment word sequence can further meet direct current balance, and the training sequence and the pilot sequence can also be combined together to meet direct current balance, which helps improve quality of a signal restored at the receiver end.

Figure 23:
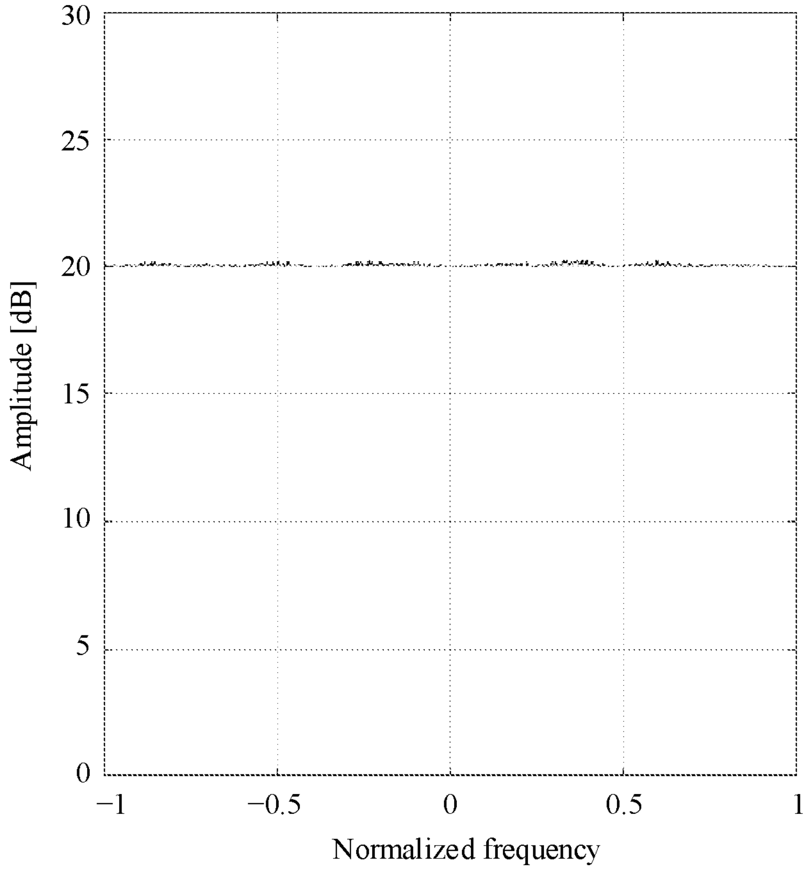
FIG. 23 is a spectrum diagram of a super-frame for DP-16QAM when the super-frame structure shown in FIG. 20 is used.

Further, in this embodiment, taking DP-16QAM as an example, spectral flatness characteristics of a super-frame are further simulated. A result is shown in FIG. 23, which uses a spectrum diagram of the super-frame structure shown in FIG. 20 that includes 300 super-frames. It can be learned that there is a very small difference between spectral flatness characteristics of the super-frame structure provided in this embodiment and spectral flatness characteristics of a random modulation signal with the same length, as well as very good flatness.

Embodiment 4: This embodiment of this application provides a specific super-frame format. Symbols before framing are obtained through open FEC (OFEC) encoding. A quantity of the symbols is 172032. The following table lists parameters $N_{SF}$, $N_{TS}$, $N_{PS}$, $N_{FAW}$, $N_{RES}$, $N_S$, $N_F$, and OH corresponding to the super-frame, and the like.

| $N_{SF}$ | $N_{PS}$ | $N_S$ | $N_F$ | OH | $N_{FAW}$ | $N_{TS}$ | $N_{RES}$ |
|---|---|---|---|---|---|---|---|
| 48 | 57 | 3648 | 175104 | 1.79% | 24 | 6 | 72 |

Figure 24:
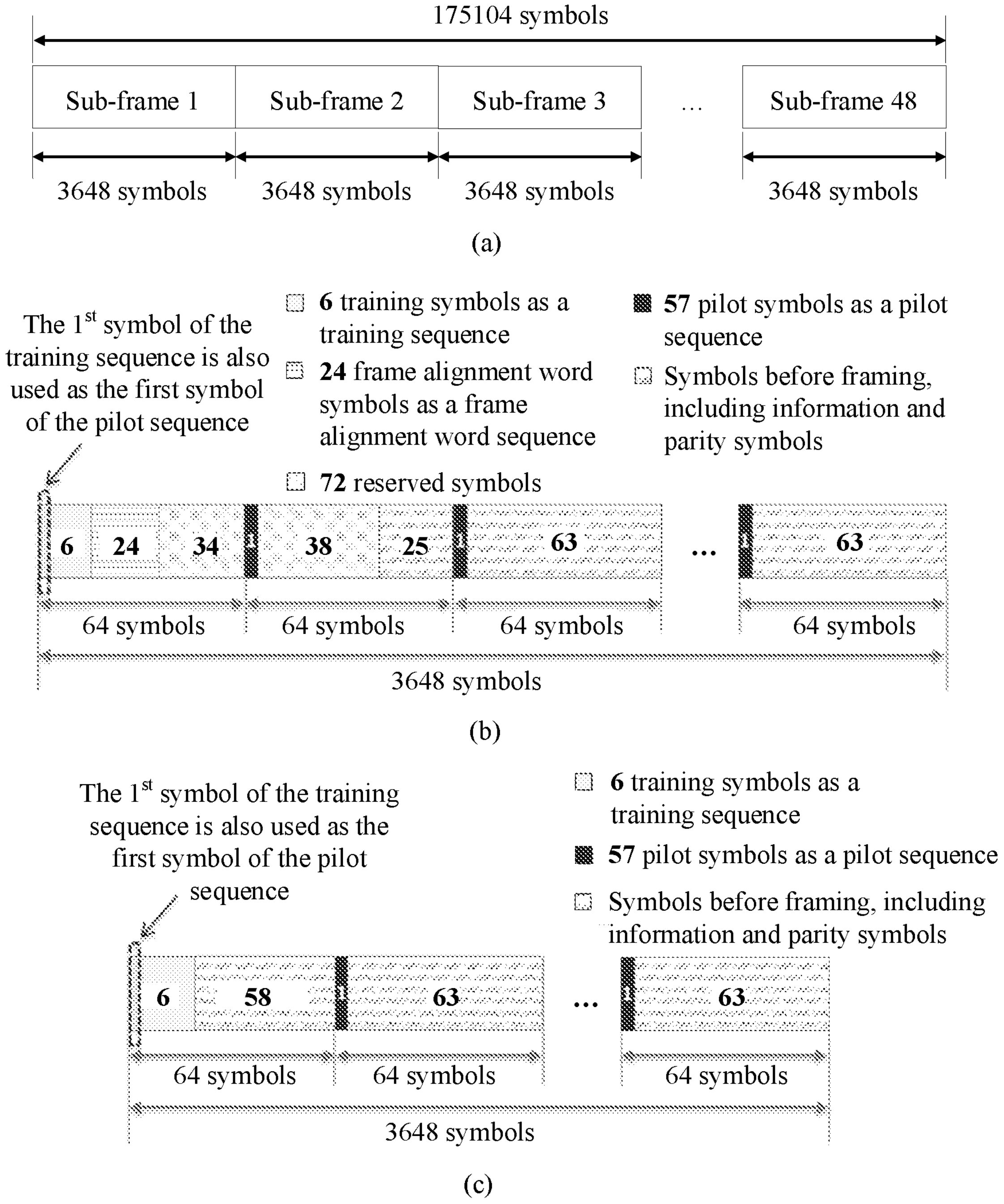
FIG. 24 shows a diagram of a structure of a specific super-frame, a diagram of a structure of the $1^{st}$ sub-frame in the specific super-frame, and a diagram of a structure of another sub-frame other than the $1^{st}$ sub-frame in the specific super-frame according to another embodiment of this application.

A super-frame structure thereof is shown in FIG. 24. The super-frame includes 48 sub-frames, and each sub-frame includes 3648 symbols, as shown in (a) in FIG. 24. The 1st sub-frame is shown in (b) in FIG. 24, including 6 training symbols, 24 frame alignment word symbols, and 72 reserved symbols. The 2nd to 48th sub-frames each also have 6 training symbols, as shown in (c) in FIG. 24. In addition, in each sub-frame, the 1st symbol in every 64 symbols is a pilot symbol. A frame alignment word sequence with a length of 24 is one item in Table 7. A training sequence with a length of 6 may be one item in Table 31. A pilot sequence with a length of 57, according to the super-frame structure, is one item in Table 10-1 or Table 10-2 of which the 1st symbol is the same as the 1st symbol of the used training sequence. For example, the same frame alignment word sequence, training sequence, and pilot sequence as those in Embodiment 1 are used, and correlations thereof are respectively shown in FIG. 10 to FIG. 12.

Figure 25:
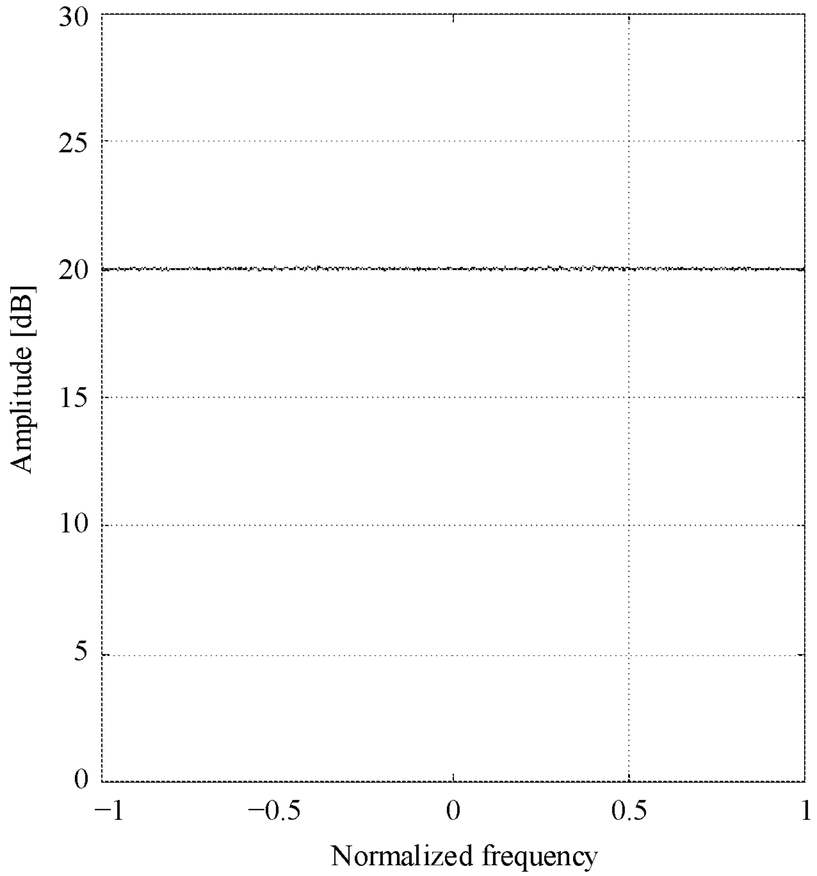
FIG. 25 is a spectrum diagram of a super-frame for DP-16QAM when the super-frame structure shown in FIG. 24 is used.

Further, in this embodiment, taking DP-16QAM as an example, spectral flatness characteristics of a super-frame are further simulated. A result is shown in FIG. 25, which uses a spectrum diagram of the super-frame structure shown in FIG. 24 that includes 300 super-frames. It can be learned that there is a very small difference between spectral flatness characteristics of the super-frame structure provided in this embodiment and spectral flatness characteristics of a random modulation signal with the same length, as well as very good flatness.

Embodiment 5: This embodiment of this application provides a specific super-frame format. Symbols before framing are obtained through CFEC encoding. A quantity of the symbols is 175616. The following table lists parameters $N_{SF}$, $N_{TS}$, $N_{PS}$, $N_{FAW}$, $N_{RES}$, $N_S$, $N_F$, and OH corresponding to the super-frame, and the like.

| $N_{SF}$ | $N_{PS}$ | $N_S$ | $N_F$ | OH | $N_{FAW}$ | $N_{TS}$ | $N_{RES}$ |
|---|---|---|---|---|---|---|---|
| 50 | 75 | 3600 | 180000 | 2.50% | 22 | 12 | 62 |

Figure 26:
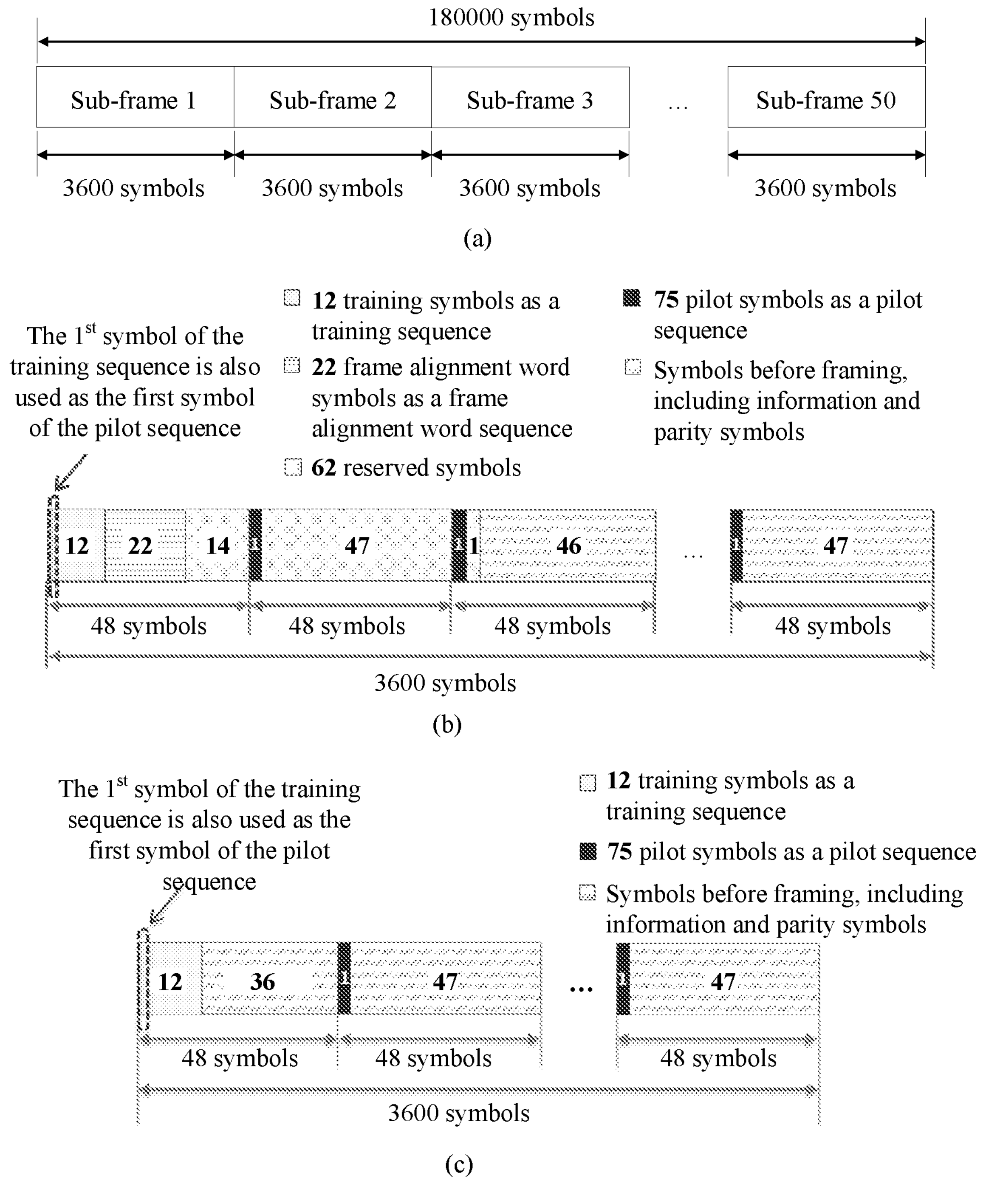
FIG. 26 shows a diagram of a structure of a specific super-frame, a diagram of a structure of the $1^{st}$ sub-frame in the specific super-frame, and a diagram of a structure of another sub-frame other than the $1^{st}$ sub-frame in the specific super-frame according to another embodiment of this application.

A super-frame structure thereof is shown in FIG. 26. The super-frame includes 50 sub-frames, and each sub-frame includes 3600 symbols, as shown in (a) in FIG. 26. The 1st sub-frame is shown in (b) in FIG. 26, including 12 training symbols, 22 frame alignment word symbols, and 62 reserved symbols. The 2nd to 50th sub-frames each also have 12 training symbols, as shown in (c) in FIG. 26. In addition, in each sub-frame, the 1st symbol in every 48 symbols is a pilot symbol. A frame alignment word sequence with a length of 22 is one item in Table 6. A training sequence with a length of 12 may be one item in Table 34. A pilot sequence with a length of 75, according to the super-frame structure, is one item in Table 26 of which the 1st symbol is the same as the 1st symbol of the used training sequence. For example, considering that the frame alignment word sequence with a symbol length of 22 uses the same sequence as that in Embodiment 2, a correlation simulation result corresponding to the frame alignment word sequence is shown in FIG. 16.

The training sequence with a symbol length of 12 uses the following sequence:

| Polarization | Training sequence |
|---|---|
| X | −A + Aj, −A − Aj, −A − Aj A + Aj, A − Aj, A + Aj, A + Aj, −A + Aj, A − Aj, A − Aj, −A + Aj, −A − Aj |
| Y | −A − Aj, −A + Aj, A − Aj, −A + Aj, −A − Aj, A − Aj, −A − Aj, −A + Aj, A + Aj, A + Aj, A − Aj, A + Aj |

Figure 27:
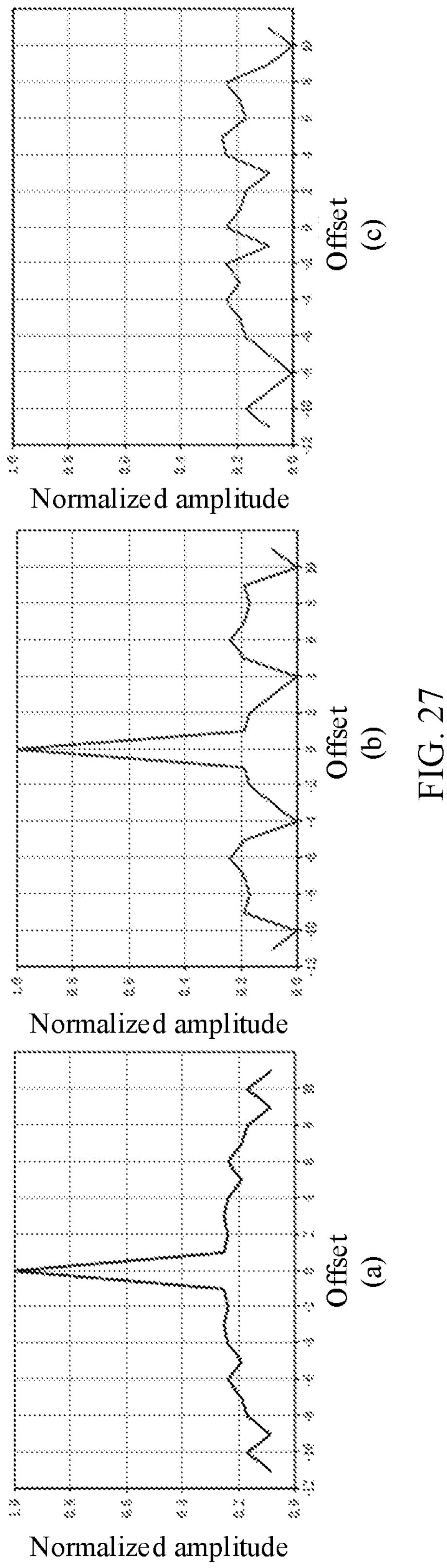
FIG. 27 shows a graph of an aperiodic autocorrelation result of a specific training sequence in an X polarization direction, a graph of an aperiodic autocorrelation result of the specific training sequence in a Y polarization direction, and a graph of an aperiodic cross-correlation result of the specific training sequence in the two polarization directions according to another embodiment of this application.

Correlation characteristics corresponding to the training sequence are shown in FIG. 27. (a) in FIG. 27 shows an aperiodic autocorrelation result of the training sequence in the X polarization direction, (b) in FIG. 27 shows an aperiodic autocorrelation result of the training sequence in the Y polarization direction, and (c) in FIG. 27 shows an aperiodic cross-correlation result of the training sequence in the X and Y polarization directions. A sidelobe value of an aperiodic autocorrelation function of the symbol sequence in the two polarization directions is not greater than 0.251 (normalized amplitude), and an aperiodic cross-correlation function value of the symbol sequence in the two polarization directions is not greater than 0.251 (normalized amplitude).

The pilot sequence with a symbol length of 75 uses the following sequence:

| Polarization | Pilot sequence |
|---|---|
| X | −A + Aj, −A − Aj, A + Aj, A − Aj, A − Aj, A + Aj, −A + Aj, −A + Aj, A + Aj, A − Aj, −A + Aj, −A + Aj, A + Aj, −A + Aj, −A − Aj, A − Aj, −A − Aj, −A + Aj, −A − Aj, A + Aj, −A + Aj, A + Aj, −A − Aj, A − Aj, −A + Aj, A + Aj, A + Aj, −A − Aj, A + Aj, A + Aj, −A − Aj, −A − Aj, A − Aj, A − Aj, A + Aj, A + Aj, A − Aj, A + Aj, A − Aj, A + Aj, −A + Aj, A − Aj, A − Aj, −A + Aj, A − Aj, −A + Aj, A + Aj, −A − Aj, −A + Aj, −A − Aj, −A − Aj, −A − Aj, −A − Aj, A + Aj, A − Aj, −A + Aj, A − Aj, A − Aj, A − Aj, A + Aj, A − Aj, −A − Aj, −A − Aj, −A + Aj, −A + Aj, −A + Aj, A − Aj, −A − Aj, A − Aj, A − Aj, −A + Aj, −A + Aj, −A − Aj, −A − Aj, A + Aj, −A + Aj |
| Y | −A − Aj, −A + Aj, A − Aj, A + Aj, A + Aj, A − Aj, −A − Aj, −A − Aj, A − Aj, A + Aj, −A − Aj, −A − Aj, A − Aj, −A − Aj, −A + Aj, A + Aj, −A + Aj, −A − Aj, −A + Aj, A − Aj, −A − Aj, A − Aj, −A + Aj, A + Aj, −A − Aj, A − Aj, A − Aj, −A + Aj, A − Aj, A − Aj, −A + Aj, −A + Aj, A + Aj, A − Aj, A − Aj, A + Aj, A − Aj, A + Aj, A − Aj, −A − Aj, A + Aj, A + Aj, −A − Aj, A + Aj, −A − Aj, A − Aj, −A + Aj, −A − Aj, −A + Aj, −A + Aj, −A + Aj, −A + Aj, A − Aj, A + Aj, −A − Aj, A + Aj, A + Aj, A + Aj, A + Aj, A − Aj, A + Aj, −A + Aj, −A + Aj, −A − Aj, −A − Aj, −A − Aj, A + Aj, −A + Aj, A + Aj, A + Aj, −A − Aj, −A − Aj, −A + Aj, −A + Aj, A − Aj, −A − Aj |

Figure 28:
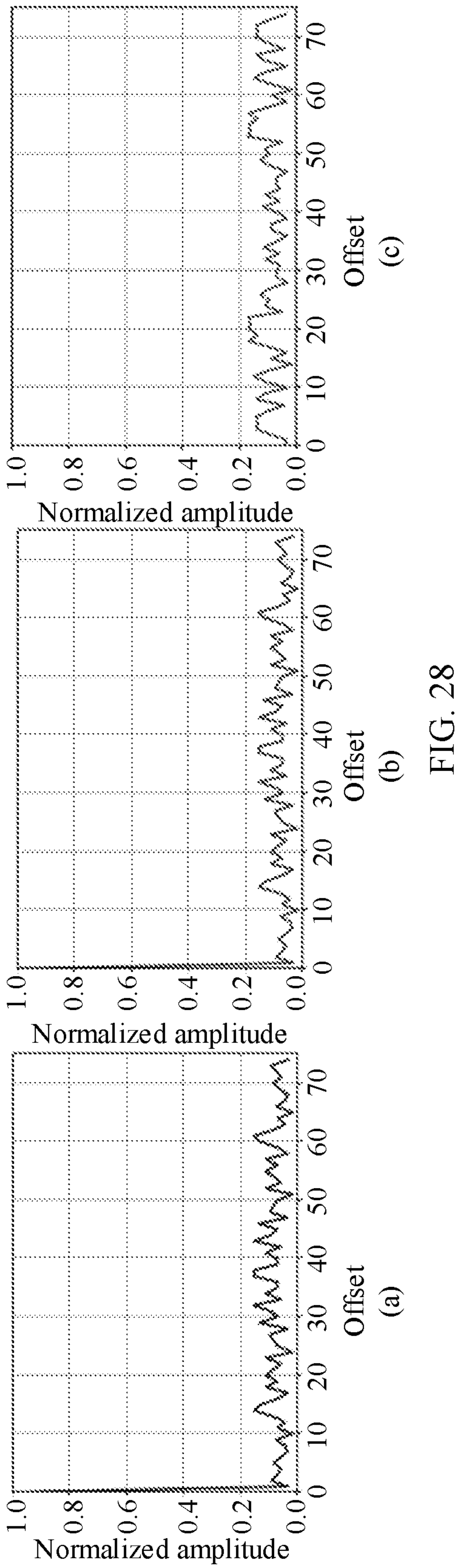
FIG. 28 shows a graph of a periodic autocorrelation result of a specific pilot sequence in an X polarization direction, a graph of a periodic autocorrelation result of the specific pilot sequence in a Y polarization direction, and a graph of a periodic cross-correlation result of the specific pilot sequence in the two polarization directions according to another embodiment of this application.

Correlation characteristics corresponding to the pilot sequence are shown in FIG. 28. (a) in FIG. 28 shows a periodic autocorrelation result of the pilot sequence in the X polarization direction, (b) in FIG. 28 shows a periodic autocorrelation result of the pilot sequence in the Y polarization direction, and (c) in FIG. 28 shows a periodic cross-correlation result of the pilot sequence in the X and Y polarization directions. A sidelobe value of a periodic autocorrelation function of the symbol sequence in the two polarization directions is not greater than 0.150 (normalized amplitude), and a periodic cross-correlation function value of the symbol sequence in the two polarization directions is not greater than 0.168 (normalized amplitude).

A frame overhead of the super-frame structure provided in this embodiment of this application is also as low as 2.50%, and the designed sequence has relatively good autocorrelation and cross-correlation characteristics. The frame alignment word sequence can further meet direct current balance, and the training sequence and the pilot sequence can also be combined together to meet direct current balance, which helps improve quality of a signal restored at the receiver end.

Figure 29:
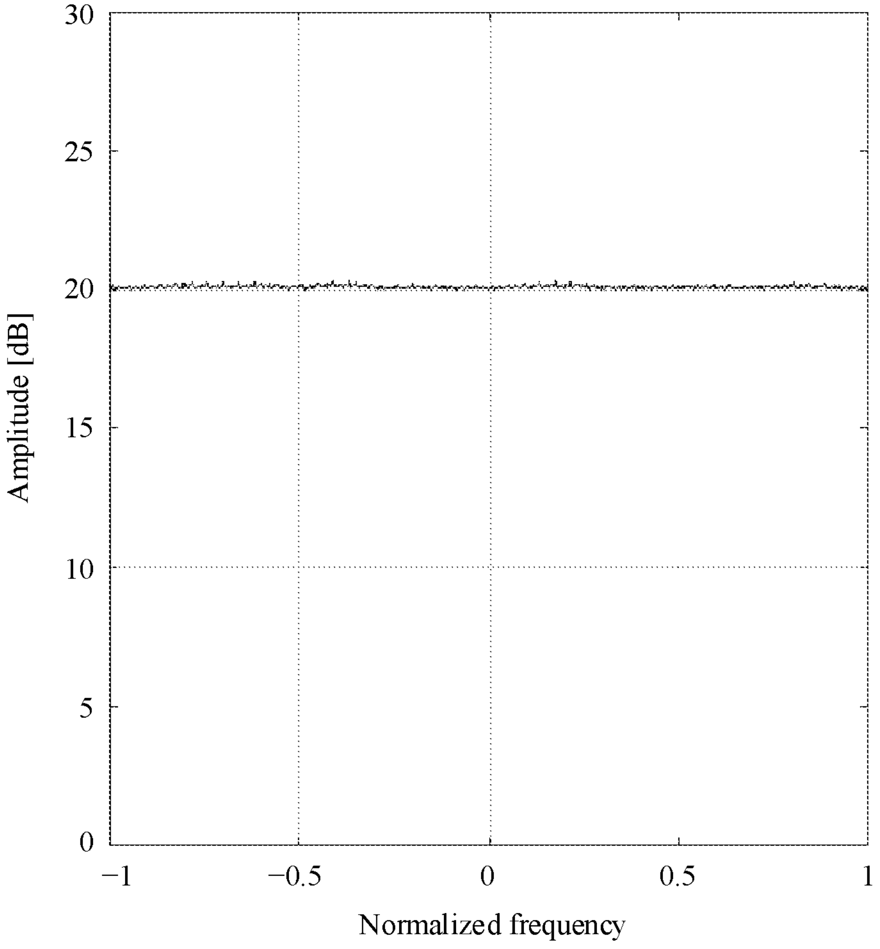
FIG. 29 is a spectrum diagram of a super-frame for DP-16QAM when the super-frame structure shown in FIG. 26 is used.

Further, in this embodiment, taking DP-16QAM as an example, spectral flatness characteristics of a super-frame are further simulated. A result is shown in FIG. 29, which uses a spectrum diagram of the super-frame structure shown in FIG. 26 that includes 300 super-frames. It can be learned that there is a very small difference between spectral flatness characteristics of the super-frame structure provided in this embodiment and spectral flatness characteristics of a random modulation signal with the same length, as well as very good flatness.

Embodiment 6: This embodiment of this application provides a specific super-frame format. Symbols before framing are obtained through OFEC encoding. A quantity of the symbols is 172032. The following table lists parameters $N_{SF}$, $N_{TS}$, $N_{PS}$, $N_{FAW}$, $N_{RES}$, $N_S$, $N_F$, OH, and the like corresponding to the super-frame.

| $N_{SF}$ | $N_{PS}$ | $N_S$ | $N_F$ | OH | $N_{FAW}$ | $N_{TS}$ | $N_{RES}$ |
|---|---|---|---|---|---|---|---|
| 49 | 75 | 3600 | 176400 | 2.54% | 22 | 12 | 132 |

Figure 30:
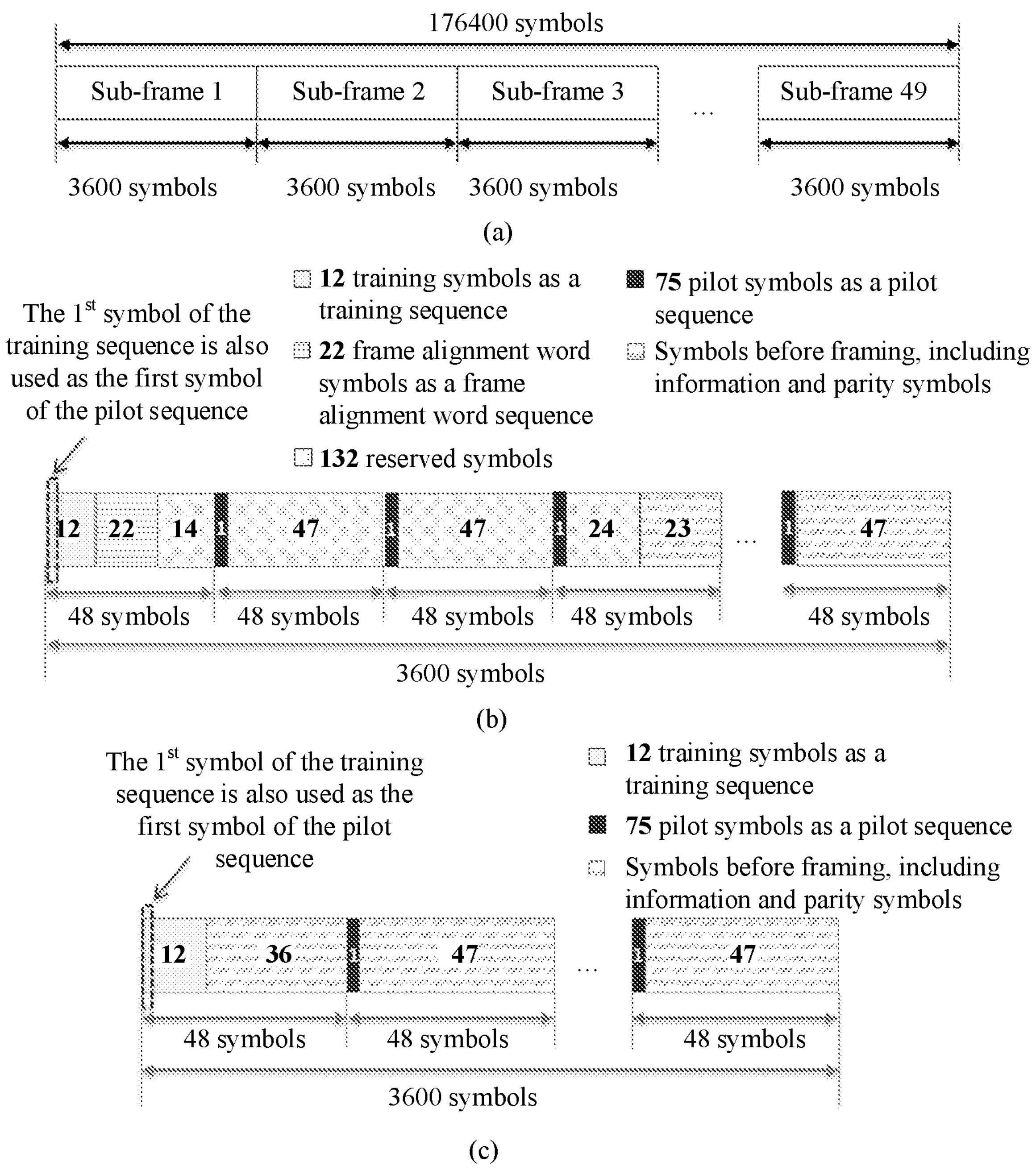
FIG. 30 shows a diagram of a structure of a specific super-frame, a diagram of a structure of the 11 sub-frame in the specific super-frame, and a diagram of a structure of another sub-frame other than the 1st sub-frame in the specific super-frame according to another embodiment of this application.

A super-frame structure thereof is shown in FIG. 30. The super-frame includes 49 sub-frames, and each sub-frame includes 3600 symbols, as shown in (a) in FIG. 30. The $1^{st}$ sub-frame is shown in (b) in FIG. 30, including 12 training symbols, 22 frame alignment word symbols, and 132 reserved symbols. The $2^{nd}$ to $49^{th}$ sub-frames each also have 12 training symbols, as shown in (c) in FIG. 30. In addition, in each sub-frame, the $1^{st}$ symbol in every 48 symbols is a pilot symbol. A frame alignment word sequence with a length of 22 is one item in Table 6. A training sequence with a length of 12 may be one item in Table 34. A pilot sequence with a length of 75, according to the super-frame structure, is one item in Table 26 of which the $1^{st}$ symbol is the same as the $1^{st}$ symbol of the used training sequence. For example, the same frame alignment word sequence, training sequence, and pilot sequence as those in Embodiment 5 are used, and correlations thereof are respectively shown in FIG. 16, FIG. 27, and FIG. 28.

A frame overhead of the super-frame structure provided in this embodiment of this application is also as low as 2.54%, and the designed sequence has relatively good autocorrelation and cross-correlation characteristics. The frame alignment word sequence can further meet direct current balance, and the training sequence and the pilot sequence can also be combined together to meet direct current balance, which helps improve quality of a signal restored at the receiver end.

Figure 31:
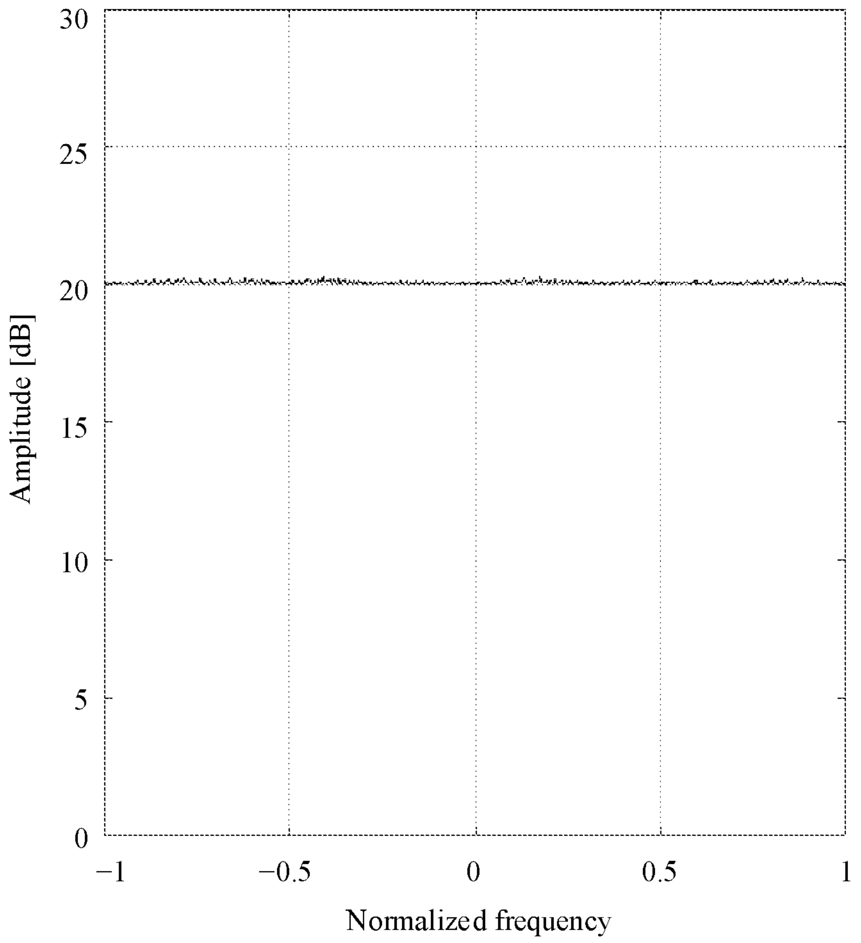
FIG. 31 is a spectrum diagram of a super-frame for DP-16QAM when the super-frame structure shown in FIG. 30 is used.

Further, in this embodiment, taking DP-16QAM as an example, spectral flatness characteristics of a super-frame are further simulated. A result is shown in FIG. 31, which uses a spectrum diagram of the super-frame structure shown in FIG. 30 that includes 300 super-frames. It can be learned that there is a very small difference between spectral flatness characteristics of the super-frame structure provided in this embodiment and spectral flatness characteristics of a random modulation signal with the same length, as well as very good flatness.

Figure 32:
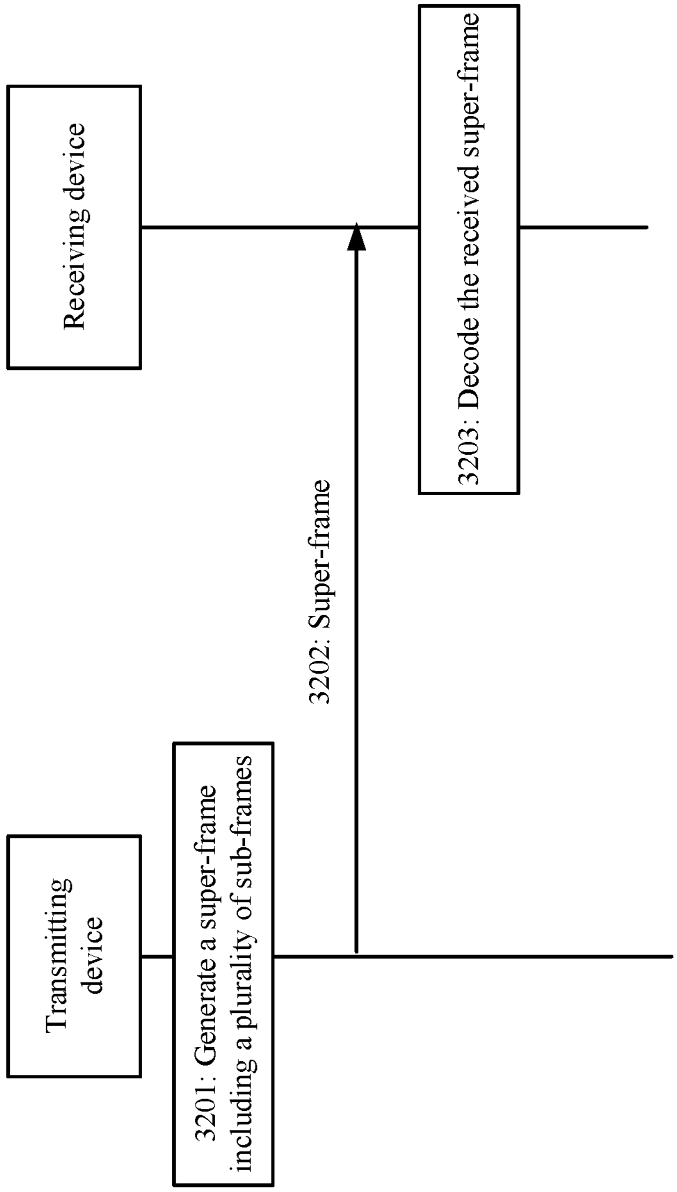
FIG. 32 is a flowchart of a transmission method for optical communication according to an embodiment of this application.

With reference to the communication system described in the foregoing embodiment corresponding to FIG. 1 and the framing process described in the embodiment corresponding to FIG. 2 or FIG. 3, an embodiment of this application further provides another transmission method for optical communication. As shown in FIG. 32, the transmission method includes the following steps.

3201: A transmitting device generates a super-frame including a plurality of sub-frames, each of which includes training symbols and pilot symbols, where in one polarization direction, there is one symbol that is both a training symbol and a pilot symbol, and each of the training symbols and the pilot symbols is one of −A−Aj, −A+Aj, A−Aj, and A+Aj, A being a real number; in each sub-frame, in the one polarization direction, the pilot symbols are generated based on a target polynomial and a seed, there are $N_{PS}$ pilot symbols combined with $N_{TS}$ training symbols to achieve direct current balance, $N_{TS}$ is a quantity of the training symbols in each sub-frame in one polarization direction, and $N_{TS}+N_{PS}$ is an odd number; and the target polynomial is one item in the following Table X-1.

TABLE X-1

| Index | Target polynomial |
|---|---|
| 1 | $x^{10} + x^9 + x^8 + x^7 + x^6 + 1$ |
| 2 | $x^{10} + x^9 + x^8 + x^6 + x^4 + 1$ |
| 3 | $x^{10} + x^9 + x^7 + x^6 + x^4 + 1$ |
| 4 | $x^{10} + x^9 + x^6 + x^3 + 1$ |
| 5 | $x^{10} + x^8 + x^5 + x^3 + 1$ |
| 6 | $x^{10} + x^8 + x^6 + x^5 + x^3 + 1$ |
| 7 | $x^{10} + x^8 + x^7 + x^4 + x^3 + 1$ |
| 8 | $x^{10} + x^6 + x^5 + x^4 + x^3 + 1$ |
| 9 | $x^{10} + x^9 + x^6 + x^2 + 1$ |
| 10 | $x^{10} + x^7 + x^6 + x^2 + 1$ |
| 11 | $x^{10} + x^7 + x^5 + x^2 + 1$ |
| 12 | $x^{10} + x^8 + x^7 + x^5 + x^2 + 1$ |
| 13 | $x^{10} + x^9 + x^8 + x^7 + x^4 + x^2 + 1$ |
| 14 | $x^{10} + x^7 + x^5 + x^4 + x^2 + 1$ |
| 15 | $x^{10} + x^9 + x^7 + x^5 + x^4 + x^2 + 1$ |
| 16 | $x^{10} + x^9 + x^8 + x^3 + x^2 + 1$ |
| 17 | $x^{10} + x^9 + x^8 + x^7 + x^3 + x^2 + 1$ |
| 18 | $x^{10} + x^7 + x^6 + x^3 + x^2 + 1$ |
| 19 | $x^{10} + x^8 + x^5 + x + 1$ |
| 20 | $x^{10} + x^8 + x^4 + x + 1$ |
| 21 | $x^{10} + x^9 + x^8 + x^7 + x^4 + x + 1$ |
| 22 | $x^{10} + x^8 + x^5 + x^4 + x + 1$ |
| 23 | $x^{10} + x^5 + x^3 + x + 1$ |
| 24 | $x^{10} + x^8 + x^6 + x^5 + x^3 + x + 1$ |
| 25 | $x^{10} + x^9 + x^8 + x^7 + x^4 + x^3 + x + 1$ |
| 26 | $x^{10} + x^6 + x^4 + x^3 + x + 1$ |
| 27 | $x^{10} + x^8 + x^7 + x^2 + x + 1$ |
| 28 | $x^{10} + x^9 + x^8 + x^7 + x^4 + x^2 + x + 1$ |
| 29 | $x^{10} + x^9 + x^6 + x^3 + x^2 + x + 1$ |
| 30 | $x^{10} + x^8 + x^6 + x^3 + x^2 + x + 1$ |
| 31 | $x^{10} + x^6 + x^5 + x^3 + x^2 + x + 1$ |
| 32 | $x^{10} + x^4 + x^3 + x^2 + x + 1$ |
| 33 | $x^{10} + x^9 + x^7 + x^3 + 1$ |
| 34 | $x^{10} + x^9 + x^6 + x + 1$ |
| 35 | $x^{10} + x^9 + x^4 + x + 1$ |
| 36 | $x^{10} + x^7 + x^3 + x + 1$ |

3202: The transmitting device transmits the super-frame, and correspondingly, a receiving device receives the super-frame including the plurality of sub-frames.

3203: The receiving device decodes the received super-frame.

Figure 5A:
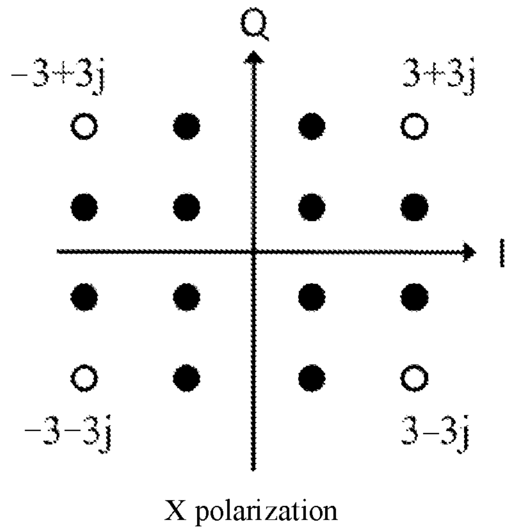
FIG. 5A is a schematic diagram of positions of training symbols or pilot symbols in a constellation diagram for DP-16QAM.
Figure 5B:
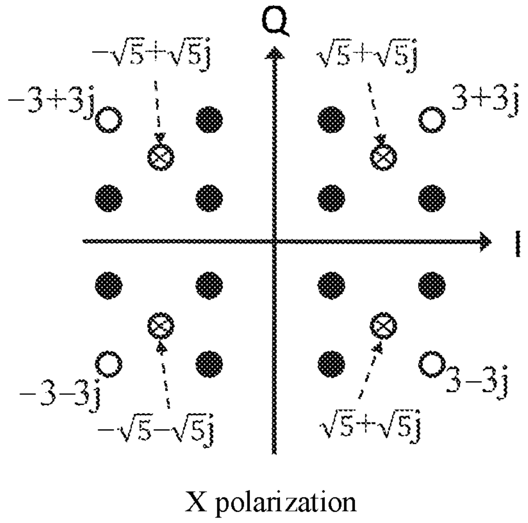
FIG. 5B is another schematic diagram of positions of training symbols or pilot symbols in a constellation diagram for DP-16QAM.

In this embodiment of this application, a value of A is determined by a modulation format used when a symbol is generated, which can be understood by referring to the corresponding content in embodiments of FIG. 4 and FIG. 5A. It should be noted that, in some actual application scenarios, the pilot symbols and the training symbols, −A−Aj, −A+Aj, A−Aj, and A+Aj, may not be symbols in a constellation diagram of the used modulation format, and may be four symbols in a middle area between the outermost four symbols and the innermost four symbols in the constellation diagram. In this case, the training symbols and the pilot symbols have fair noise and sensitivity, but have a relatively low peak-to-average power ratio. Taking 16QAM as an example, values of the 16 symbols in the 16QAM constellation diagram are {±1±1j, ±1±3j, ±3±1j, ±3±3j}, and a value of the real number A meets 1≤A≤3. More specifically, as shown in FIG. 5B, the outermost four symbols in the constellation diagram are 3+3j, 3−3j, −3+3j, and −3−3j, and the innermost four symbols in the constellation diagram are 1+1j, 1−1j, −1+1j, and −1−1j. The values of the pilot symbols and the training symbols, −A−Aj, −A+Aj, A−Aj, and A+Aj, may be four symbols in the middle area between the outermost four symbols and the innermost four symbols in the 16QAM constellation diagram. A specific value of the real number A may be selected according to an actual application scenario, so that the peak-to-average power ratio, noise, and sensitivity of the training symbols and the pilot symbols have a good compromise. For example, the real number $A=\sqrt{5}$, and the values of the pilot symbols and the training symbols are $\{-\sqrt{5}-\sqrt{5}j, -\sqrt{5}+\sqrt{5}j, \sqrt{5}-\sqrt{5}j, \sqrt{5}+\sqrt{5}j\}$. In addition, when the 16 symbols in the 16QAM constellation diagram are subjected to power normalization and have values of $1/\sqrt{10}j$, $\pm1/\sqrt{10}\pm2/\sqrt{10}j$, $\pm3/\sqrt{10\pm1/\sqrt{10}j,\pm3/\sqrt{10}\pm10j}$♯, the value of the real number A meets $1/\sqrt{10}\le A\le 3/\sqrt{10}$. For example, the real number $A=\sqrt{2}/2$, and the values of the pilot symbols and the training symbols are $\{-\sqrt{2}/2-\sqrt{2}/2j, -\sqrt{2}/2+\sqrt{2}/2j, \sqrt{2}/2-\sqrt{2}/2j, \sqrt{2}/2+\sqrt{2}/2j\}$.

In addition, in this embodiment of this application, there are two polarization directions, and the two polarization directions are orthogonal to each other. In other words, when one polarization direction is the X polarization, the other polarization direction is the Y polarization; and when one polarization direction is the Y polarization, the other polarization direction is the X polarization. The two polarization directions may also be described by a polarization 1 and a polarization 2. In this embodiment of this application, in one polarization direction, a sum of quantities of training symbols and pilot symbols included in one sub-frame is $N_{TS}+N_{PS}-1$. Because one symbol is both a training symbol and a pilot symbol, the sum of quantities is not $N_{TS}+N_{PS}$, and is one less than the sum of quantities of the two types of symbols.

In the solution of this embodiment of this application, the pilot symbols are generated based on the target polynomial and the seed. The target polynomial is any item in the foregoing Table X-1, and the target polynomial and the corresponding seed can meet that a combination of the generated $N_{PS}$ pilot symbols and $N_{TS}$ training symbols achieves direct current balance, that is, in one polarization direction, a sum of real parts of complex numbers corresponding to the training symbols and the pilot symbols in one sub-frame is 0, and a sum of imaginary parts thereof is also 0, which helps a receiver end restore a signal better, and improves quality of the signal at the receiver end.

A structure of the super-frame provided in this embodiment of this application can be understood by referring to the corresponding content in (a) in FIG. 6 to (c) in FIG. 6, and details are not described herein again.

The solution provided in this embodiment of this application is applicable to a row indexed 18 and a row indexed 9 in Table 2 in the foregoing embodiment.

The two super-frame formats are separately described below.

For the row indexed 18 in the foregoing Table 2, in one polarization direction, a quantity of symbols before framing is 172032, and the following Table X-2 lists parameters $N_{SF}$, $N_{PS}$, $N_{TS}$, $N_S$, $N_F$, $N_{FAW}$, $N_{RES}$, and OH corresponding to the super-frame, and the like.

TABLE X-2

| $N_{SF}$ | $N_{PS}$ | $N_S$ | $N_F$ | OH | $N_{TS}$ | $N_{FAW}+N_{RES}$ |
|---|---|---|---|---|---|---|
| 24 | 114 | 7296 | 175104 | 1.79% | 11 | 96 |

Figure 33:
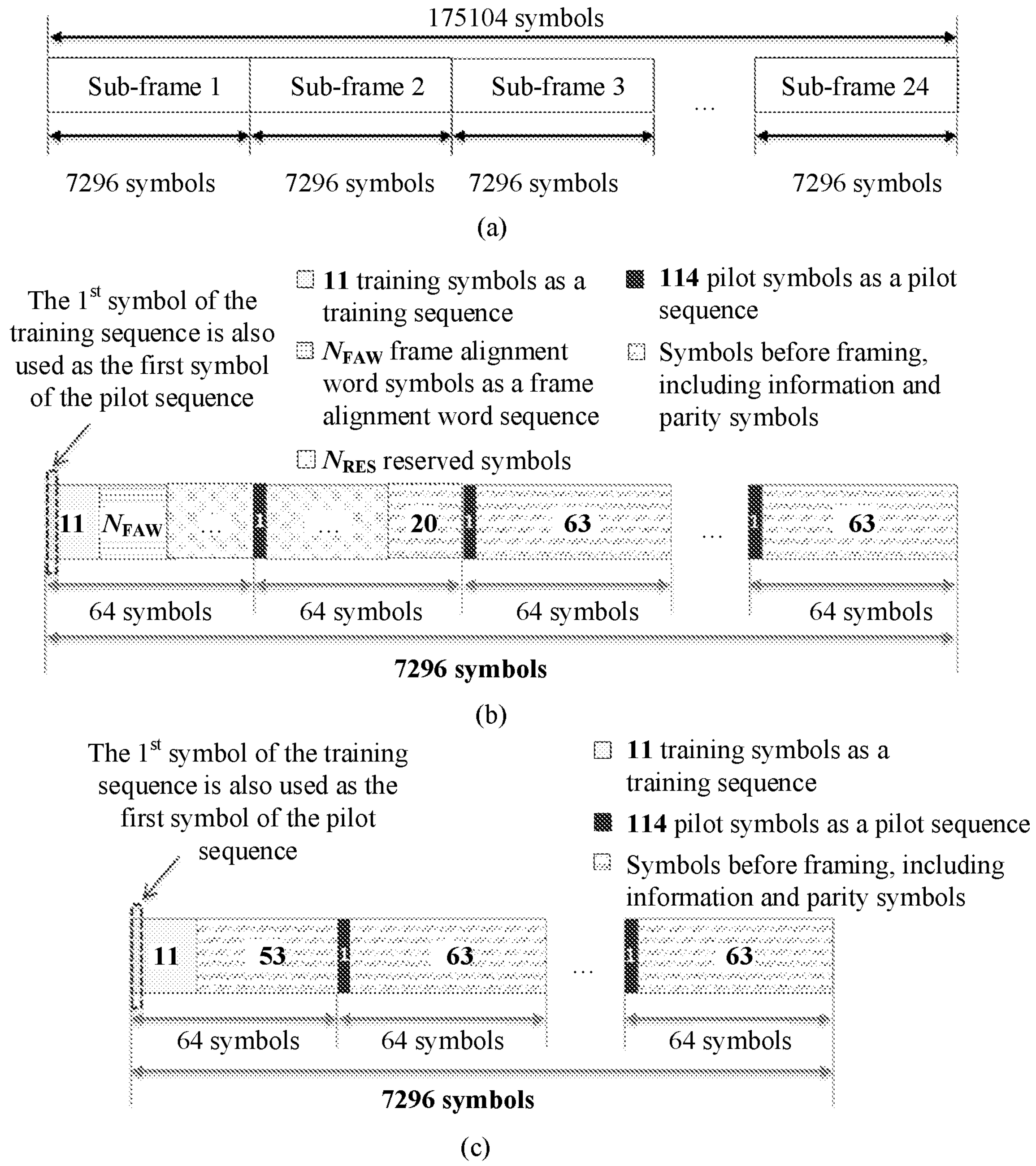
FIG. 33 shows diagrams of structures of a specific super-frame, the 1st sub-frame in the super-frame, and another sub-frame other than the 1st sub-frame in the super-frame according to an embodiment of this application.

A super-frame structure thereof is shown in (a) in FIG. 33. The super-frame includes 24 sub-frames, and each sub-frame includes 7296 symbols. The $1^{st}$ sub-frame is shown in (b) in FIG. 33, including 11 training symbols, $N_{FAW}$ frame alignment word symbols, and $N_{RES}$ reserved symbols, and $N_{FAW}+N_{RES}=96$. As shown in (c) in FIG. 33, the $2^{nd}$ to $24^{th}$ sub-frames each also have 11 training symbols. In addition, in each sub-frame, the $1^{st}$ symbol in every 64 symbols is a pilot symbol, and each sub-frame includes 114 pilot symbols.

In (b) in FIG. 33, $N_{FAW}=22$ and $N_{RES}=74$ are used as an example for description. A sequence of 22 frame alignment word symbols can be understood by referring to the following Table X-3:

TABLE X-3

| Polarization | Sequence of frame alignment word symbols |
|---|---|
| Polarization 1 | A − Aj, A + Aj, A + Aj, A + Aj, A − Aj, A − Aj, −A − Aj, A + Aj, −A − Aj, −A + Aj, −A + Aj, A − Aj, −A − Aj, −A − Aj, −A + Aj, A + Aj, −A − Aj, A − Aj, −A + Aj, A + Aj, −A − Aj, −A + Aj |
| Polarization 2 | A + Aj, −A + Aj, −A − Aj, −A + Aj, A − Aj, A + Aj, A − Aj, A − Aj, −A − Aj, A − Aj, A + Aj, −A + Aj, −A + Aj, A + Aj, −A − Aj, A + Aj, −A − Aj, −A + Aj, A − Aj, −A − Aj, A − Aj, −A + Aj |

A sequence of 11 training symbols can be understood by referring to the following Table X-4:

TABLE X-4

| Polarization | Sequence of training symbols |
|---|---|
| Polarization 1 | −A + Aj, A + Aj, −A + Aj, A + Aj, −A − Aj, A + Aj, −A − Aj, −A − Aj, A + Aj, A − Aj, A − Aj |
| Polarization 2 | −A − Aj, −A − Aj, A − Aj, −A + Aj, −A + Aj, A + Aj, −A − Aj, −A + Aj, A −Aj, A + Aj, A − Aj |

In this example, the 114 pilot symbols are determined based on the target polynomial and the corresponding seed. In this embodiment of this application, the target polynomial is a 10-order polynomial, and the 10-order polynomial may be expressed as:

$$x^{10}+a_9 \times x^9+a_8 \times x^8+a^7 \times x^7+a_6 \times x^6+a_5 \times x^5+a_4 \times x^4+a_3 \times x^3+a_2 \times x^2+a_1 \times x+1$$

where a value of $a_9 \ldots a_1$ may be 0 or 1.

Figure 34:
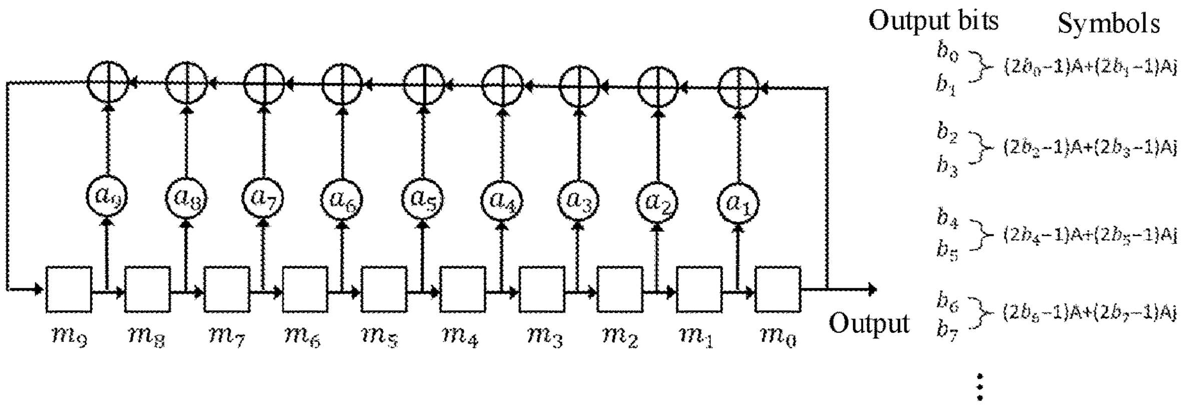
FIG. 34 is a schematic diagram of a pilot symbol generation structure according to an embodiment of this application.

A pilot symbol generation structure can be understood by referring to FIG. 34. As shown in FIG. 34, a seed may be expressed as $m_9$, $m_8$, $m_7$, $m_6$, $m_5$, $m_4$, $m_3$, $m_2$, $m_1$, $m_0$ in the binary form. Certainly, the seed may also be expressed in the hexadecimal or decimal form, and when computed with the target polynomial, the seed needs to be converted into a binary form. For example, 0110111000 is expressed as 0x1B8 in the hexadecimal form, or is expressed as 440 in the decimal form.

In this embodiment of this application, the same target generator polynomial may be used for pilot symbols in two orthogonal polarization directions. However, due to different seeds, correspondingly, pilot symbols output in the two polarization directions are not completely the same.

As shown in FIG. 34, for a scenario in which 114 pilot symbols need to be generated, a bit sequence with a continuous length of 228, $b_0, b_1, b_2, \ldots b_{227}$, is obtained based on the target polynomial and the seed. Every two consecutive bits in the bit sequence $b_0, b_1, b_2, \ldots b_{227}$ are mapped to one symbol, where $b_{2t}$ and $b_{2t+1}$ are mapped to one symbol $(2b_{2t}-1)A+(2b_{2t+1}-1)Aj$, $0 \le t \le 114$. It should be noted that the symbols $(2b_{2t}-1)A+(2b_{2t+1}-1)Aj$ may not be symbols in a constellation diagram of the used modulation format, and may be four symbols in a middle area between the outermost four symbols and the innermost four symbols in the constellation diagram of the used modulation format. In this case, the training symbols and the pilot symbols have fair noise and sensitivity, but have a relatively low peak-to-average power ratio. Taking 16QAM as an example, values of the 16 symbols in the 16QAM constellation diagram are {±1±1j, ±1±3j, ±3±1j, ±3±3j}, and a value of the real number A meets $1 \le A \le 3$. A specific value of the real number A may be selected according to an actual application scenario, so that the peak-to-average power ratio, noise, and sensitivity of the training symbols and the pilot symbols have a good compromise. For example, the real number $A=\sqrt{5}$, and the values of the pilot symbols and the training symbols are $\{-\sqrt{5}-\sqrt{5}j, -\sqrt{5}+-\sqrt{5}j, \sqrt{5}-\sqrt{5}j, \sqrt{5}+\sqrt{5}j\}$. In addition, when the 16 symbols in the 16QAM constellation diagram are subjected to power normalization and have values of $$\left\{\pm\frac{1}{\sqrt{10}}\pm\frac{1}{\sqrt{10}}j, \pm\frac{1}{\sqrt{10}}\pm\frac{3}{\sqrt{10}}j, \pm\frac{3}{\sqrt{10}}\pm\frac{1}{\sqrt{10}}j, \pm\frac{3}{\sqrt{10}}\pm\frac{3}{\sqrt{10}}j\right\},$$

meets $$\frac{1}{\sqrt{10}} \le A \le \frac{3}{\sqrt{10}}.$$

For example, the real number $$A=\frac{\sqrt{2}}{2},$$

and the values of the pilot symbols and the training symbols are $$\left\{-\frac{\sqrt{2}}{2}-\frac{\sqrt{2}}{2}j, -\frac{\sqrt{2}}{2}+\frac{\sqrt{2}}{2}j, \frac{\sqrt{2}}{2}-\frac{\sqrt{2}}{2}j, \frac{\sqrt{2}}{2}+\frac{\sqrt{2}}{2}j\right\}.$$

In this embodiment of this application, the target polynomial and the seed may be determined by designing values of the coefficients $a_9 \ldots a_1$ in the polynomial, so that a symbol sequence of the generated pilot symbols in the X polarization or the Y polarization has relatively good autocorrelation characteristics, and symbol sequences in the two polarizations have relatively good cross-correlation characteristics. Particularly, a normalized amplitude of a sidelobe value of a periodic autocorrelation function of a symbol sequence in the two polarization directions is not greater than a preset value TO, and a normalized amplitude of a periodic cross-correlation function value of the symbol sequence in the two polarization directions is not greater than a preset value T1.

When the target polynomial and hexadecimal seeds in two polarization directions are one row in the following Table X-5, a normalized amplitude of a sidelobe value of a periodic autocorrelation function of pilot symbols in the same polarization direction is not greater than 0.2, and a normalized amplitude of aperiodic cross-correlation function value of pilot symbols in different polarization directions is not greater than 0.2, that is, T0=0.2 and T1=0.2.

TABLE X-5

| Index | Target polynomial | Seed in the direction of polarization 1 | Seed in the direction of polarization 2 |
|---|---|---|---|
| 1 | $x^{10} + x^9 + x^8 + x^7 + x^6 + 1$ | 0x122 | 0x0E4 |
| 2 | $x^{10} + x^9 + x^8 + x^7 + x^6 + 1$ | 0x122 | 0x06C |
| 3 | $x^{10} + x^9 + x^8 + x^7 + x^6 + 1$ | 0x362 | 0x1C4 |
| 4 | $x^{10} + x^9 + x^8 + x^7 + x^6 + 1$ | 0x362 | 0x0DC |
| 5 | $x^{10} + x^9 + x^8 + x^7 + x^6 + 1$ | 0x31A | 0x0E4 |
| 6 | $x^{10} + x^9 + x^8 + x^7 + x^6 + 1$ | 0x31A | 0x06C |
| 7 | $x^{10} + x^9 + x^8 + x^7 + x^6 + 1$ | 0x046 | 0x384 |
| 8 | $x^{10} + x^9 + x^8 + x^7 + x^6 + 1$ | 0x046 | 0x3C4 |
| 9 | $x^{10} + x^9 + x^8 + x^7 + x^6 + 1$ | 0x046 | 0x2DC |
| 10 | $x^{10} + x^9 + x^8 + x^7 + x^6 + 1$ | 0x246 | 0x348 |
| 11 | $x^{10} + x^9 + x^8 + x^7 + x^6 + 1$ | 0x246 | 0x1C4 |
| 12 | $x^{10} + x^9 + x^8 + x^7 + x^6 + 1$ | 0x246 | 0x0DC |
| 13 | $x^{10} + x^9 + x^8 + x^7 + x^6 + 1$ | 0x0F6 | 0x384 |
| 14 | $x^{10} + x^9 + x^8 + x^7 + x^6 + 1$ | 0x0F6 | 0x1C4 |
| 15 | $x^{10} + x^9 + x^8 + x^7 + x^6 + 1$ | 0x0F6 | 0x0DC |
| 16 | $x^{10} + x^9 + x^8 + x^7 + x^6 + 1$ | 0x08E | 0x0E4 |
| 17 | $x^{10} + x^9 + x^8 + x^7 + x^6 + 1$ | 0x08E | 0x06C |
| 18 | $x^{10} + x^9 + x^8 + x^6 + x^4 + 1$ | 0x022 | 0x080 |
| 19 | $x^{10} + x^9 + x^8 + x^6 + x^4 + 1$ | 0x022 | 0x220 |
| 20 | $x^{10} + x^9 + x^8 + x^6 + x^4 + 1$ | 0x022 | 0x1FC |
| 21 | $x^{10} + x^9 + x^7 + x^6 + x^4 + 1$ | 0x3A2 | 0x1A4 |
| 22 | $x^{10} + x^9 + x^7 + x^6 + x^4 + 1$ | 0x03A | 0x1A4 |
| 23 | $x^{10} + x^9 + x^6 + x^3 + 1$ | 0x076 | 0x07C |
| 24 | $x^{10} + x^8 + x^5 + x^3 + 1$ | 0x3CE | 0x19C |
| 25 | $x^{10} + x^8 + x^6 + x^5 + x^3 + 1$ | 0x186 | 0x048 |
| 26 | $x^{10} + x^8 + x^6 + x^5 + x^3 + 1$ | 0x186 | 0x034 |
| 27 | $x^{10} + x^8 + x^7 + x^4 + x^3 + 1$ | 0x1A2 | 0x2A0 |
| 28 | $x^{10} + x^8 + x^7 + x^4 + x^3 + 1$ | 0x1A2 | 0x330 |
| 29 | $x^{10} + x^8 + x^7 + x^4 + x^3 + 1$ | 0x10A | 0x334 |
| 30 | $x^{10} + x^8 + x^7 + x^4 + x^3 + 1$ | 0x10A | 0x08C |
| 31 | $x^{10} + x^8 + x^7 + x^4 + x^3 + 1$ | 0x3EA | 0x350 |
| 32 | $x^{10} + x^8 + x^7 + x^4 + x^3 + 1$ | 0x3EA | 0x184 |
| 33 | $x^{10} + x^8 + x^7 + x^4 + x^3 + 1$ | 0x2E6 | 0x2A0 |
| 34 | $x^{10} + x^8 + x^7 + x^4 + x^3 + 1$ | 0x2E6 | 0x330 |
| 35 | $x^{10} + x^6 + x^5 + x^4 + x^3 + 1$ | 0x166 | 0x0CC |
| 36 | $x^{10} + x^9 + x^6 + x^2 + 1$ | 0x21E | 0x028 |
| 37 | $x^{10} + x^9 + x^6 + x^2 + 1$ | 0x21E | 0x014 |
| 38 | $x^{10} + x^7 + x^6 + x^2 + 1$ | 0x0BE | 0x1B8 |
| 39 | $x^{10} + x^7 + x^5 + x^2 + 1$ | 0x342 | 0x16C |
| 40 | $x^{10} + x^8 + x^7 + x^5 + x^2 + 1$ | 0x0D6 | 0x0CC |
| 41 | $x^{10} + x^9 + x^8 + x^7 + x^4 + x^2 + 1$ | 0x16A | 0x0DC |
| 42 | $x^{10} + x^9 + x^8 + x^7 + x^4 + x^2 + 1$ | 0x2A6 | 0x0DC |
| 43 | $x^{10} + x^7 + x^5 + x^4 + x^2 + 1$ | 0x18A | 0x324 |
| 44 | $x^{10} + x^7 + x^5 + x^4 + x^2 + 1$ | 0x1C6 | 0x324 |
| 45 | $x^{10} + x^9 + x^7 + x^5 + x^4 + x^2 + 1$ | 0x26E | 0x38C |
| 46 | $x^{10} + x^9 + x^7 + x^5 + x^4 + x^2 + 1$ | 0x26E | 0x27C |
| 47 | $x^{10} + x^9 + x^8 + x^3 + x^2 + 1$ | 0x102 | 0x1F0 |
| 48 | $x^{10} + x^9 + x^8 + x^3 + x^2 + 1$ | 0x022 | 0x1AC |
| 49 | $x^{10} + x^9 + x^8 + x^3 + x^2 + 1$ | 0x00A | 0x144 |
| 50 | $x^{10} + x^9 + x^8 + x^3 + x^2 + 1$ | 0x14A | 0x07C |
| 51 | $x^{10} + x^9 + x^8 + x^3 + x^2 + 1$ | 0x0A6 | 0x07C |
| 52 | $x^{10} + x^9 + x^8 + x^3 + x^2 + 1$ | 0x176 | 0x1AC |
| 53 | $x^{10} + x^9 + x^8 + x^3 + x^2 + 1$ | 0x0BE | 0x07C |
| 54 | $x^{10} + x^9 + x^8 + x^7 + x^3 + x^2 + 1$ | 0x082 | 0x264 |
| 55 | $x^{10} + x^7 + x^6 + x^3 + x^2 + 1$ | 0x202 | 0x170 |
| 56 | $x^{10} + x^7 + x^6 + x^3 + x^2 + 1$ | 0x202 | 0x3F4 |
| 57 | $x^{10} + x^7 + x^6 + x^3 + x^2 + 1$ | 0x142 | 0x2E0 |
| 58 | $x^{10} + x^7 + x^6 + x^3 + x^2 + 1$ | 0x142 | 0x054 |
| 59 | $x^{10} + x^7 + x^6 + x^3 + x^2 + 1$ | 0x142 | 0x07C |
| 60 | $x^{10} + x^7 + x^6 + x^3 + x^2 + 1$ | 0x2EA | 0x150 |
| 61 | $x^{10} + x^7 + x^6 + x^3 + x^2 + 1$ | 0x306 | 0x220 |
| 62 | $x^{10} + x^7 + x^6 + x^3 + x^2 + 1$ | 0x306 | 0x094 |
| 63 | $x^{10} + x^8 + x^5 + x + 1$ | 0x3FE | 0x0E0 |
| 64 | $x^{10} + x^8 + x^4 + x + 1$ | 0x28E | 0x0F4 |
| 65 | $x^{10} + x^9 + x^8 + x^7 + x^4 + x + 1$ | 0x102 | 0x248 |
| 66 | $x^{10} + x^8 + x^5 + x^4 + x + 1$ | 0x10A | 0x0EC |
| 67 | $x^{10} + x^5 + x^3 + x + 1$ | 0x1C6 | 0x07C |
| 68 | $x^{10} + x^8 + x^6 + x^5 + x^3 + x + 1$ | 0x246 | 0x24C |
| 69 | $x^{10} + x^9 + x^8 + x^7 + x^4 + x^3 + x + 1$ | 0x1C6 | 0x130 |
| 70 | $x^{10} + x^6 + x^4 + x^3 + x + 1$ | 0x25A | 0x23C |
| 71 | $x^{10} + x^6 + x^4 + x^3 + x + 1$ | 0x2F6 | 0x23C |
| 72 | $x^{10} + x^8 + x^7 + x^2 + x + 1$ | 0x022 | 0x1CC |
| 73 | $x^{10} + x^8 + x^7 + x^2 + x + 1$ | 0x022 | 0x3DC |
| 74 | $x^{10} + x^8 + x^7 + x^2 + x + 1$ | 0x226 | 0x1CC |
| 75 | $x^{10} + x^8 + x^7 + x^2 + x + 1$ | 0x226 | 0x3DC |
| 76 | $x^{10} + x^8 + x^7 + x^2 + x + 1$ | 0x316 | 0x1C4 |
| 77 | $x^{10} + x^8 + x^7 + x^2 + x + 1$ | 0x316 | 0x2EC |
| 78 | $x^{10} + x^8 + x^7 + x^2 + x + 1$ | 0x12E | 0x1C4 |
| 79 | $x^{10} + x^8 + x^7 + x^2 + x + 1$ | 0x12E | 0x2EC |
| 80 | $x^{10} + x^9 + x^8 + x^7 + x^4 + x^2 + x + 1$ | 0x38A | 0x07C |
| 81 | $x^{10} + x^9 + x^6 + x^3 + x^2 + x + 1$ | 0x252 | 0x398 |
| 82 | $x^{10} + x^9 + x^6 + x^3 + x^2 + x + 1$ | 0x13A | 0x330 |
| 83 | $x^{10} + x^9 + x^6 + x^3 + x^2 + x + 1$ | 0x13A | 0x398 |
| 84 | $x^{10} + x^8 + x^6 + x^3 + x^2 + x + 1$ | 0x31A | 0x310 |
| 85 | $x^{10} + x^8 + x^6 + x^3 + x^2 + x + 1$ | 0x31A | 0x1C4 |
| 86 | $x^{10} + x^6 + x^5 + x^3 + x^2 + x + 1$ | 0x262 | 0x3A4 |
| 87 | $x^{10} + x^6 + x^5 + x^3 + x^2 + x + 1$ | 0x292 | 0x36C |
| 88 | $x^{10} + x^4 + x^3 + x^2 + x + 1$ | 0x222 | 0x048 |
| 89 | $x^{10} + x^4 + x^3 + x^2 + x + 1$ | 0x222 | 0x138 |
| 90 | $x^{10} + x^4 + x^3 + x^2 + x + 1$ | 0x322 | 0x368 |
| 91 | $x^{10} + x^4 + x^3 + x^2 + x + 1$ | 0x322 | 0x1D8 |
| 92 | $x^{10} + x^4 + x^3 + x^2 + x + 1$ | 0x322 | 0x0E4 |
| 93 | $x^{10} + x^4 + x^3 + x^2 + x + 1$ | 0x0E2 | 0x368 |
| 94 | $x^{10} + x^4 + x^3 + x^2 + x + 1$ | 0x0E2 | 0x1D8 |
| 95 | $x^{10} + x^4 + x^3 + x^2 + x + 1$ | 0x0E2 | 0x0E4 |
| 96 | $x^{10} + x^4 + x^3 + x^2 + x + 1$ | 0x07A | 0x2C4 |
| 97 | $x^{10} + x^4 + x^3 + x^2 + x + 1$ | 0x07A | 0x3B4 |
| 98 | $x^{10} + x^4 + x^3 + x^2 + x + 1$ | 0x04E | 0x2F0 |
| 99 | $x^{10} + x^4 + x^3 + x^2 + x + 1$ | 0x04E | 0x224 |
| 100 | $x^{10} + x^4 + x^3 + x^2 + x + 1$ | 0x36E | 0x2C4 |
| 101 | $x^{10} + x^4 + x^3 + x^2 + x + 1$ | 0x36E | 0x0EC |
| 102 | $x^{10} + x^4 + x^3 + x^2 + x + 1$ | 0x21E | 0x368 |
| 103 | $x^{10} + x^4 + x^3 + x^2 + x + 1$ | 0x21E | 0x1D8 |

When the target polynomial and hexadecimal seeds in two polarization directions are one row in the following Table X-6 (Table X-6 is a subset of Table X-5), in one polarization direction, in a combination of 114 pilot symbols and 11 training symbols, quantities of −A−Aj, −A+Aj, A−Aj, and A+Aj in one polarization direction are all 31.

TABLE X-6

| Index | Target polynomial | Seed in the direction of polarization 1 | Seed in the direction of polarization 2 |
|---|---|---|---|
| 1 | $x^{10} + x^9 + x^8 + x^7 + x^6 + 1$ | 0x046 | 0x384 |
| 2 | $x^{10} + x^9 + x^8 + x^7 + x^6 + 1$ | 0x046 | 0x3C4 |
| 3 | $x^{10} + x^9 + x^6 + x^3 + 1$ | 0x076 | 0x07C |
| 4 | $x^{10} + x^8 + x^7 + x^4 + x^3 + 1$ | 0x1A2 | 0x330 |
| 5 | $x^{10} + x^8 + x^7 + x^4 + x^3 + 1$ | 0x2E6 | 0x330 |
| 6 | $x^{10} + x^8 + x^7 + x^2 + x + 1$ | 0x226 | 0x3DC |
| 7 | $x^{10} + x^9 + x^6 + x^3 + x^2 + x + 1$ | 0x13A | 0x330 |
| 8 | $x^{10} + x^4 + x^3 + x^2 + x + 1$ | 0x322 | 0x368 |
| 9 | $x^{10} + x^4 + x^3 + x^2 + x + 1$ | 0x322 | 0x0E4 |
| 10 | $x^{10} + x^4 + x^3 + x^2 + x + 1$ | 0x0E2 | 0x368 |

TABLE X-6-continued

| Index | Target polynomial | Seed in the direction of polarization 1 | Seed in the direction of polarization 2 |
|---|---|---|---|
| 11 | $x^{10} + x^4 + x^3 + x^2 + x + 1$ | 0x0E2 | 0x0E4 |
| 12 | $x^{10} + x^4 + x^3 + x^2 + x + 1$ | 0x04E | 0x2F0 |

Considering that a sequence generated when the target polynomial is a primitive polynomial generally has relatively good randomness, and that more non-zero terms of the target polynomial indicate more complex implementation, when the target polynomial uses the primitive polynomial and there are no more than 5 non-zero terms of the target polynomial, and when the target polynomial and hexadecimal seeds in two polarization directions are one row in the following Table X-7, a normalized amplitude of a sidelobe value of a periodic autocorrelation function of pilot symbols in the same polarization direction is not greater than 0.25, and a normalized amplitude of aperiodic cross-correlation function value of pilot symbols in different polarization directions is not greater than 0.25.

TABLE X-7

| Index | Target polynomial | Seed in the direction of polarization 1 | Seed in the direction of polarization 2 |
|---|---|---|---|
| 1 | $x^{10} + x^9 + x^7 + x^3 + 1$ | 0x23E | 0x094 |
| 2 | $x^{10} + x^7 + x^6 + x^2 + 1$ | 0x0BE | 0x1B8 |
| 3 | $x^{10} + x^9 + x^6 + x + 1$ | 0x002 | 0x210 |
| 4 | $x^{10} + x^9 + x^6 + x + 1$ | 0x002 | 0x308 |
| 5 | $x^{10} + x^9 + x^6 + x + 1$ | 0x002 | 0x184 |
| 6 | $x^{10} + x^9 + x^6 + x + 1$ | 0x1C2 | 0x040 |
| 7 | $x^{10} + x^8 + x^5 + x + 1$ | 0x3FE | 0x0E0 |
| 8 | $x^{10} + x^8 + x^5 + x + 1$ | 0x3FE | 0x270 |
| 9 | $x^{10} + x^8 + x^5 + x + 1$ | 0x3FE | 0x304 |
| 10 | $x^{10} + x^9 + x^4 + x + 1$ | 0x3B6 | 0x1A0 |
| 11 | $x^{10} + x^9 + x^4 + x + 1$ | 0x3B6 | 0x0D0 |
| 12 | $x^{10} + x^9 + x^4 + x + 1$ | 0x3B6 | 0x058 |
| 13 | $x^{10} + x^9 + x^4 + x + 1$ | 0x3B6 | 0x22C |
| 14 | $x^{10} + x^7 + x^3 + x + 1$ | 0x34E | 0x084 |

Figure 35:
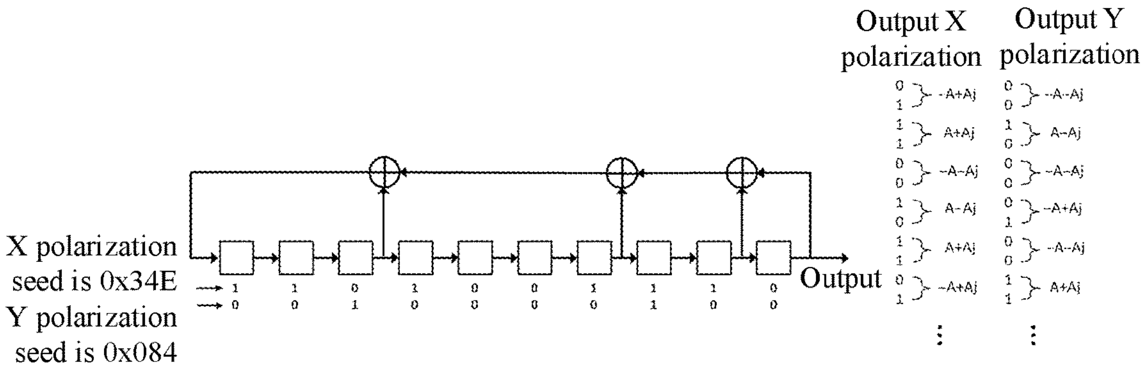
FIG. 35 is a schematic diagram of another pilot symbol generation structure according to an embodiment of this application.

In Table X-7, in a row indexed 14, when the target polynomial, which may also referred to as a primitive polynomial, is $x^{10}+x^7+x^3+x+1$, and the corresponding hexadecimal seeds in the two polarization directions are 0x34E and 0x084, a process of generating 114 pilot symbols can be understood by referring to FIG. 35.

As shown in FIG. 35, in the X polarization direction, the input polarization seed is 0x34E, which is 1101001110 after being converted into a binary sequence, that is, values of $m_9$ to $m_0$. If two bits 1 and 0 are output consecutively in sequence, a pilot symbol in the X polarization direction is A−Aj. If two bits 0 and 0 are output consecutively in sequence, a pilot symbol in the X polarization direction is −A−Aj. If two bits 1 and 1 are output consecutively in sequence, a pilot symbol in the X polarization direction is A+Aj. If two bits 0 and 1 are output consecutively in sequence, a pilot symbol in the X polarization direction is −A+Aj. By analogy, 114 pilot symbols in the X polarization direction may be obtained.

As shown in FIG. 35, in the Y polarization direction, the input polarization seed is 0x084, which is 0010000100 after being converted into a binary sequence, that is, values of $m_9$ to $m_0$. If two bits 1 and 0 are output consecutively in sequence, a pilot symbol in the Y polarization direction is A−Aj. If two bits 0 and 0 are output consecutively in sequence, a pilot symbol in the Y polarization direction is −A−Aj. If two bits 1 and 1 are output consecutively in sequence, a pilot symbol in the Y polarization direction is A+Aj. If two bits 0 and 1 are output consecutively in sequence, a pilot symbol in the Y polarization direction is −A+Aj. By analogy, 114 pilot symbols in the Y polarization direction may be obtained.

The polarization seed in the X polarization direction may be interchanged with the polarization seed in the Y polarization direction. Therefore, 114 pilot symbols shown in the following Table X-8 may be obtained.

TABLE X-8

| Polarization direction | Pilot symbol |
|---|---|
| Polarization 1 | −A + Aj, A + Aj, −A − Aj, A − Aj, A + Aj, −A + Aj, A − Aj, A + Aj, −A − Aj, −A − Aj, A + Aj, −A − Aj, A + Aj, −A − Aj, −A + Aj, −A − Aj, −A + Aj, −A + Aj, −A − Aj, −A + Aj, A − Aj, A − Aj, A − Aj, A − Aj, A − Aj, A + Aj, A + Aj, −A + Aj, −A − Aj, A − Aj, A + Aj, A − Aj, −A + Aj, −A − Aj, A − Aj, −A + Aj, −A − Aj, −A − Aj, −A + Aj, −A − Aj, −A + Aj, −A − Aj, −A − Aj, A + Aj, A + Aj, −A − Aj, A + Aj, A + Aj, −A + Aj, A − Aj, −A + Aj, A − Aj, −A + Aj, A − Aj, A − Aj, A + Aj, −A − Aj, −A + Aj, A − Aj, A − Aj, −A − Aj, A + Aj, A − Aj, −A − Aj, A + Aj, A + Aj, A + Aj, −A − Aj, −A − Aj, A + Aj, A + Aj, A − Aj, A − Aj, A + Aj, A − Aj, A − Aj, A + Aj, −A + Aj, A + Aj, −A + Aj, A + Aj, −A + Aj, A − Aj, −A + Aj, −A − Aj, −A − Aj, A − Aj, −A + Aj, A + Aj, A − Aj, A − Aj, −A − Aj, −A + Aj, −A + Aj, −A + Aj, −A − Aj, −A − Aj, −A + Aj, −A + Aj, −A + Aj, A − Aj, −A + Aj, −A + Aj, A − Aj, −A + Aj, −A − Aj, A − Aj, A + Aj, −A + Aj, −A − Aj, A − Aj, −A − Aj, A + Aj, A + Aj |
| Polarization 2 | −A − Aj, A − Aj, −A − Aj, −A + Aj, −A − Aj, A + Aj, A + Aj, −A + Aj, −A − Aj, −A − Aj, A − Aj, A − Aj, A − Aj, −A − Aj, −A − Aj, A − Aj, A − Aj, A + Aj, −A − Aj, A − Aj, A + Aj, −A − Aj, A − Aj, −A + Aj, −A + Aj, A − Aj, A − Aj, −A + Aj, −A − Aj, −A + Aj, A + Aj, A + Aj, −A − Aj, −A + Aj, −A + Aj, −A − Aj, A + Aj, A + Aj, A − Aj, −A + Aj, A − Aj, −A − Aj, −A − Aj, −A + Aj, A − Aj, −A + Aj, −A − Aj, −A + Aj, A − Aj, A + Aj, A − Aj, −A − Aj, A + Aj, −A + Aj, A − Aj, −A − Aj, A + Aj, A + Aj, −A + Aj, −A + Aj, −A − Aj, −A − Aj, A + Aj, −A − Aj, −A + Aj, −A + Aj, −A + Aj, A + Aj, −A + Aj, A + Aj, A + Aj, A + Aj, −A + Aj, A + Aj, −A − Aj, −A − Aj, A − Aj, −A + Aj, −A + Aj, A + Aj, A − Aj, A + Aj, −A + Aj, A + Aj, A − Aj, A − Aj, A + Aj, −A − Aj, A + Aj, A + Aj, A − Aj, A + Aj, A + Aj, −A − Aj, A + Aj, −A + Aj, −A − Aj, A − Aj, A − Aj, A − Aj, A + Aj, −A + Aj, −A − Aj, −A − Aj, −A + Aj, A + Aj, −A − Aj, A − Aj, A − Aj, −A + Aj, −A − Aj, A − Aj, A − Aj, −A + Aj |

In the foregoing Table X-8, in one polarization direction, in a combination of 114 pilot symbols and 11 training symbols, quantities of −A−Aj, −A+Aj, A−Aj, and A+Aj in the one polarization direction are all 31.

Figure 36:
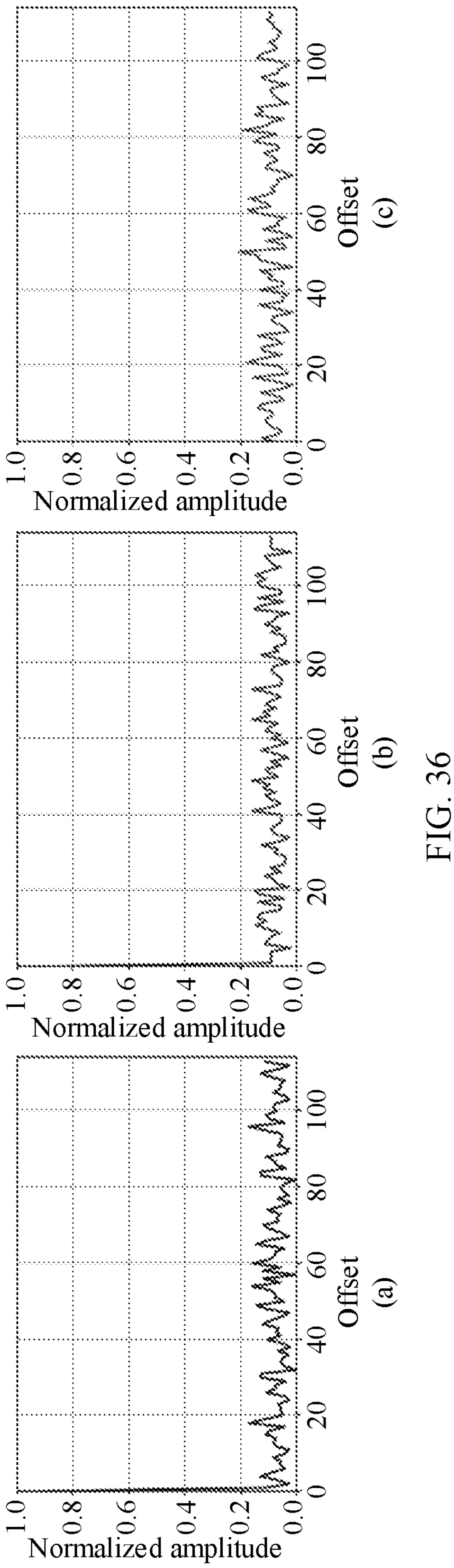
FIG. 36 shows a graph of a periodic autocorrelation result of a specific sequence of pilot symbols in an X polarization direction, a graph of a periodic autocorrelation result of the specific sequence of pilot symbols in a Y polarization direction, and a graph of a periodic cross-correlation result of the specific sequence of pilot symbols in the two polarization directions according to an embodiment of this application.

In the solution of the foregoing Table X-8, correlation characteristics corresponding to the pilot symbols are shown in FIG. 36. (a) in FIG. 36 shows a periodic autocorrelation result of the sequence of pilot symbols in the X polarization direction, (b) in FIG. 36 shows a periodic autocorrelation result of the sequence of pilot symbols in the Y polarization direction, and (c) in FIG. 36 shows a periodic cross-correlation result of the sequence of pilot symbols in the X and Y polarization directions. A normalized amplitude of a sidelobe value of a periodic autocorrelation function of a symbol sequence in the two polarization directions is not greater than 0.167, and a normalized amplitude of a sidelobe value of a periodic cross-correlation function of the symbol sequence in the two polarization directions is not greater than 0.202. A frame overhead of the super-frame structure provided in this embodiment of this application is also as low as 1.79%, and the sequence of pilot symbols has relatively good autocorrelation and cross-correlation characteristics. The training symbols and the pilot symbols can also be combined together to meet direct current balance, which helps the receiver end restore a signal, and improves quality of the restored signal.

Another example of the foregoing super-frame structure is further provided below. When the target polynomial is $x^{10}+x^7+x^6+x^4+1$, and the corresponding hexadecimal seeds in the two polarization directions are 0x0BE and 0x1B8, a process of generating pilot symbols in the two polarization directions can be understood by referring to FIG. 37.

Figure 37:
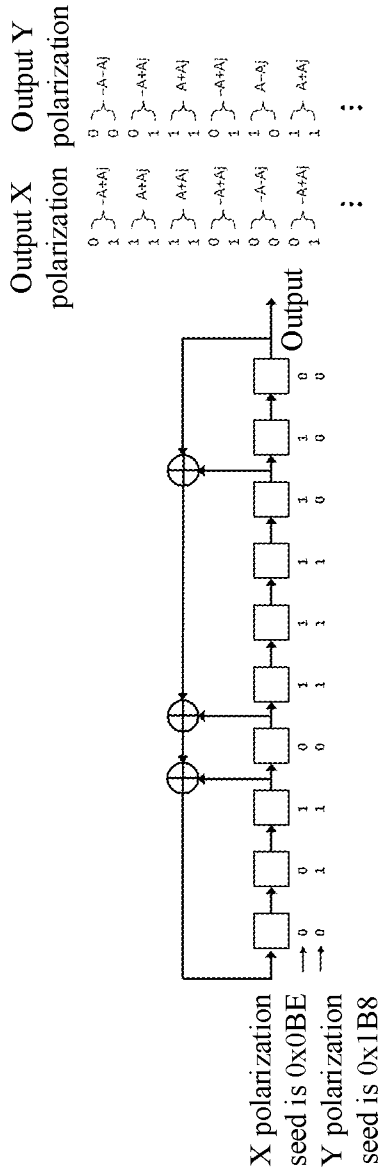
FIG. 37 is a schematic diagram of another pilot symbol generation structure according to an embodiment of this application.

As shown in FIG. 37, in the X polarization direction, the input polarization seed is 0x0BE, which is 0010111110 after being converted into a binary sequence, that is, values of $m_9$ to $m_0$. If two bits 1 and 0 are output consecutively in sequence, a pilot symbol in the X polarization direction is A−Aj. If two bits 0 and 0 are output consecutively in sequence, a pilot symbol in the X polarization direction is −A−Aj. If two bits 1 and 1 are output consecutively in sequence, a pilot symbol in the X polarization direction is A+Aj. If two bits 0 and 1 are output consecutively in sequence, a pilot symbol in the X polarization direction is −A+Aj. By analogy, 114 pilot symbols in the X polarization direction may be obtained.

As shown in FIG. 37, in the Y polarization direction, the input polarization seed is 0x1B8, which is 0110111000 after being converted into a binary sequence, that is, values of $m_9$ to $m_0$. If two bits 1 and 0 are output consecutively in sequence, a pilot symbol in the Y polarization direction is A−Aj. If two bits 0 and 0 are output consecutively in sequence, a pilot symbol in the Y polarization direction is −A−Aj. If two bits 1 and 1 are output consecutively in sequence, a pilot symbol in the Y polarization direction is A+Aj. If two bits 0 and 1 are output consecutively in sequence, a pilot symbol in the Y polarization direction is −A+Aj. By analogy, 114 pilot symbols in the Y polarization direction may be obtained.

The polarization seed in the X polarization direction may be interchanged with the polarization seed in the Y polarization direction. Therefore, 114 pilot symbols shown in the following Table X-9 may be obtained.

TABLE X-9

| Polarization direction | Pilot symbol |
|---|---|
| Polarization 1 | −A + Aj, A + Aj, A + Aj, −A + Aj, −A − Aj, −A + Aj, −A − Aj, −A + Aj, −A + Aj, A − Aj, A + Aj, A − Aj, −A − Aj, −A + Aj, −A + Aj, A − Aj, −A − Aj, A + Aj, −A + Aj, A − Aj, −A − Aj, −A + Aj, A − Aj, −A + Aj, −A − Aj, A − Aj, A − Aj, −A − Aj, A + Aj, A + Aj, −A − Aj, A + Aj, A − Aj, −A − Aj, −A + Aj, A + Aj, A + Aj, A − Aj, −A + Aj, −A − Aj, A + Aj, −A − Aj, A − Aj, −A − Aj, −A + Aj, A + Aj, −A − Aj, A + Aj, −A − Aj, A + Aj, A − Aj, A + Aj, −A − Aj, A − Aj, −A − Aj, A + Aj, A − Aj, A − Aj, −A + Aj, −A + Aj, A − Aj, A − Aj, −A − Aj, A − Aj, A − Aj, A + Aj, −A + Aj, A + Aj, A − Aj, −A + Aj, −A − Aj, −A + Aj, −A + Aj, −A − Aj, A − Aj, −A − Aj, A − Aj, −A − Aj, −A − Aj, A − Aj, A + Aj, −A + Aj, −A + Aj, −A + Aj, A − Aj, −A − Aj, A − Aj, −A + Aj, −A + Aj, −A + Aj, −A + Aj, −A − Aj, A + Aj, −A + Aj, −A + Aj, A − Aj, −A + Aj, −A − Aj, A + Aj, A − Aj, A + Aj, A − Aj, A + Aj, A − Aj, −A + Aj, A + Aj, A + Aj, −A + Aj, A − Aj, −A − Aj, A − Aj, A + Aj, −A − Aj, A + Aj |
| Polarization 2 | −A − Aj, −A + Aj, A + Aj, −A + Aj, A − Aj, A + Aj, −A + Aj, A + Aj, −A + Aj, −A − Aj, −A + Aj, A − Aj, −A − Aj, A + Aj, −A − Aj, A − Aj, A + Aj, −A − Aj, A − Aj, A + Aj, A − Aj, A + Aj, −A + Aj, −A − Aj, A − Aj, −A − Aj, −A − Aj, −A + Aj, A − Aj, −A − Aj, A − Aj, −A − Aj, −A + Aj, A − Aj, −A − Aj, −A − Aj, −A + Aj, A + Aj, −A − Aj, −A + Aj, −A + Aj, −A + Aj, −A − Aj, A − Aj, −A + Aj, A − Aj, A + Aj, −A + Aj, A − Aj, −A + Aj, A + Aj, −A − Aj, A − Aj, A − Aj, −A + Aj, −A + Aj, −A + Aj, A + Aj, −A + Aj, −A + Aj, A + Aj, −A − Aj, A + Aj, −A + Aj, A + Aj, −A + Aj, A − Aj, −A − Aj, −A − Aj, A − Aj, A − Aj, −A + Aj, A − Aj, −A − Aj, A − Aj, A − Aj, −A − Aj, −A − Aj, A − Aj, −A + Aj, −A − Aj, A + Aj, A + Aj, A + Aj, −A + Aj, A − Aj, A − Aj, A + Aj, −A + Aj, A − Aj, A − Aj, A − Aj, −A + Aj, −A + Aj, A + Aj, A − Aj, A + Aj, A + Aj, A − Aj, −A + Aj, A + Aj, A − Aj, −A + Aj, −A + Aj, −A + Aj, A − Aj, −A + Aj, A − Aj, A − Aj, −A − Aj, −A + Aj, A + Aj, A − Aj, A − Aj |

Figure 38:
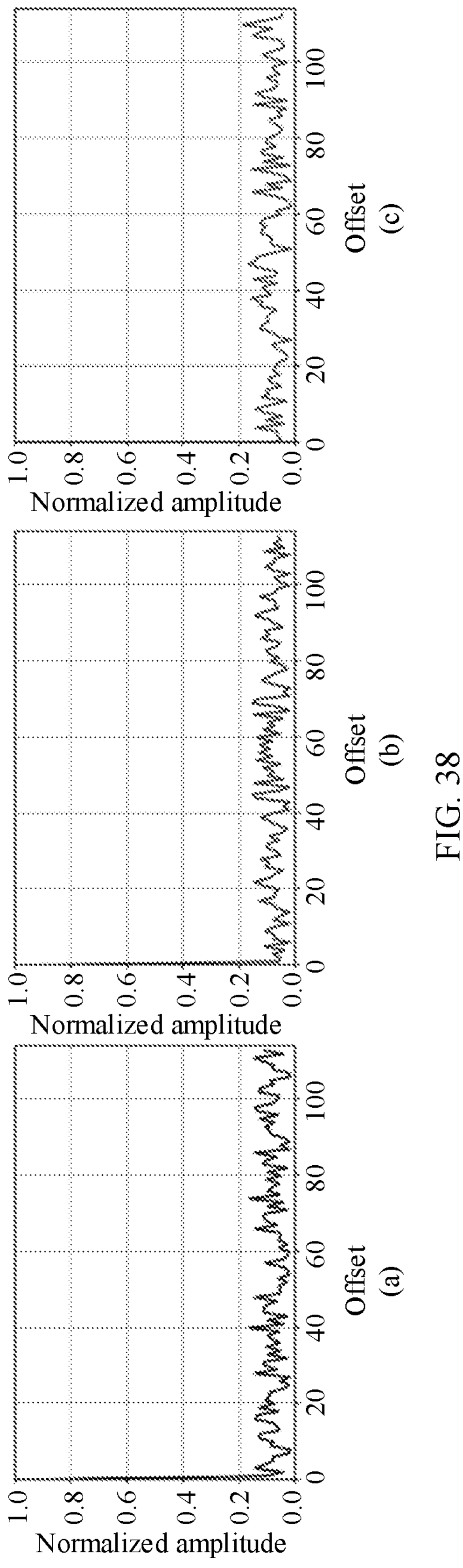
FIG. 38 shows a graph of a periodic autocorrelation result of a specific sequence of pilot symbols in an X polarization direction, a graph of a periodic autocorrelation result of the specific sequence of pilot symbols in a Y polarization direction, and a graph of a periodic cross-correlation result of the specific sequence of pilot symbols in the two polarization directions according to an embodiment of this application.

In the foregoing Table. X-9, correlation characteristics corresponding to the pilot symbols are shown in FIG. 38. (a) in FIG. 38 shows a periodic autocorrelation result of the sequence of pilot symbols in the X polarization direction, (b) in FIG. 38 shows a periodic autocorrelation result of the sequence of pilot symbols in the Y polarization direction, and (c) in FIG. 38 shows a periodic cross-correlation result of the sequence of pilot symbols in the X and Y polarization directions. A normalized amplitude of a sidelobe value of a periodic autocorrelation function of a symbol sequence in the two polarization directions is not greater than 0.162, and a normalized amplitude of a sidelobe value of a periodic cross-correlation function of the symbol sequence in the two polarization directions is not greater than 0.185. A frame overhead of the super-frame structure provided in this embodiment of this application is also as low as 1.79%, and the designed sequence of pilot symbols has relatively good autocorrelation and cross-correlation characteristics. The training sequence and the sequence of pilot symbols can also be combined together to meet direct current balance, which helps the receiver end restore a signal, and improves quality of the restored signal.

The super-frame structure corresponding to the row indexed 18 in the foregoing Table 2 and the content of the process of generating pilot symbols thereof. The corresponding content of the super-frame corresponding to the row indexed 9 in the foregoing Table 2 is described below.

For the row indexed 9 in the foregoing Table 2, a quantity of symbols before framing is 172032, and the following Table X-10 lists parameters $N_{SF}$, $N_{PS}$, $N_{TS}$, $N_S$, $N_F$, $N_{FAW}$, $N_{RES}$, and OH corresponding to the super-frame, and the like.

TABLE X-10

| $N_{SF}$ | $N_{PS}$ | $N_S$ | $N_F$ | OH | $N_{TS}$ | $N_{FAW} + N_{RES}$ |
|---|---|---|---|---|---|---|
| 48 | 57 | 3648 | 175104 | 1.79% | 6 | 96 |

Figure 39:
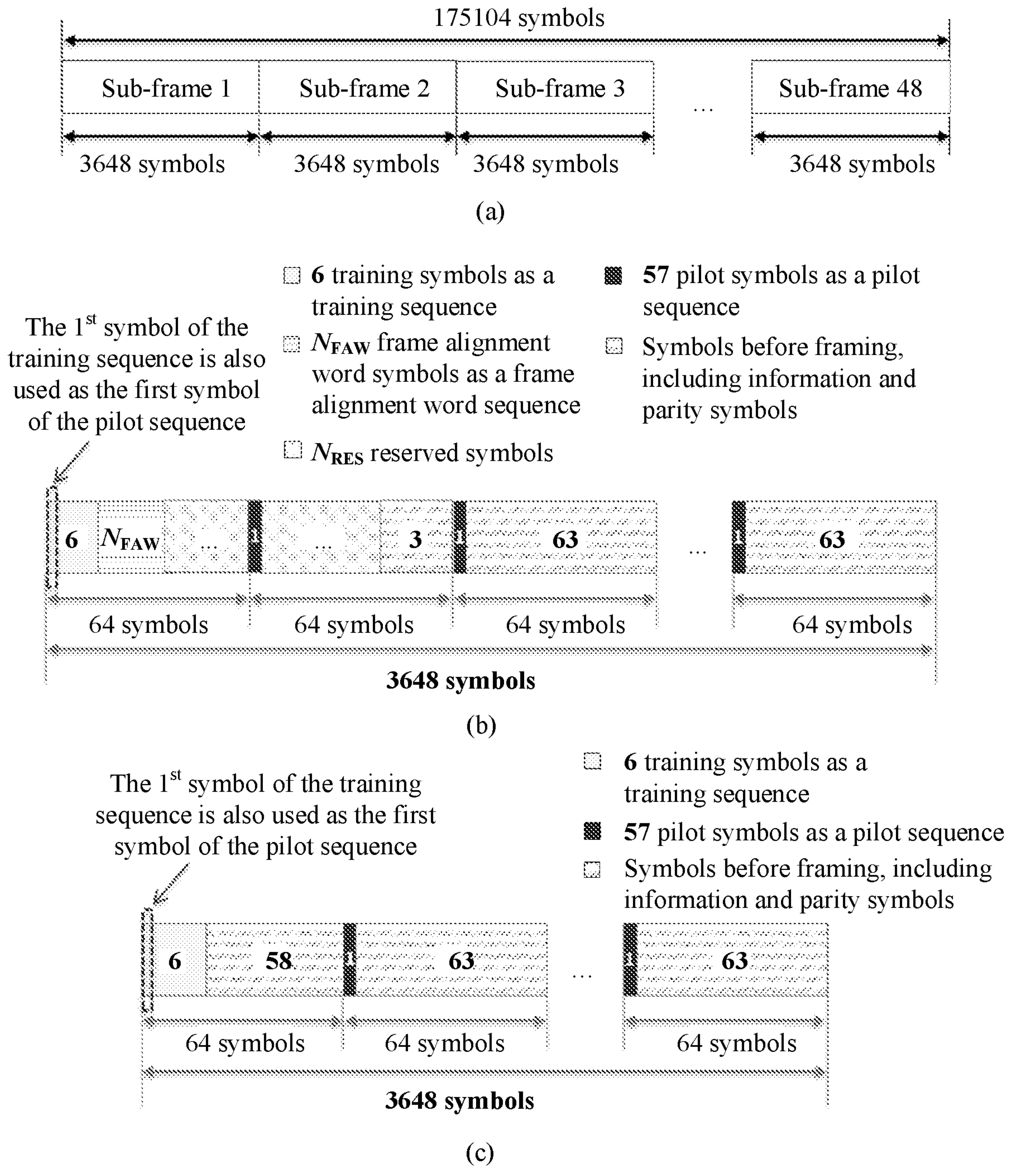
FIG. 39 shows diagrams of structures of a specific super-frame, the 1st sub-frame in the super-frame, and another sub-frame other than the 1st sub-frame in the super-frame according to an embodiment of this application.

A super-frame structure thereof is shown in (a) in FIG. 39. The super-frame includes 48 sub-frames, and each sub-frame includes 3648 symbols. The 1st sub-frame is shown in (b) in FIG. 39, including 6 training symbols, $N_{FAW}$ frame alignment word symbols, and $N_{RES}$ reserved symbols, and $N_{FAW}+N_{RES}=96$. As shown in (c) in FIG. 39, the 2nd to 48st sub-frames each also have 6 training symbols. In addition, in each sub-frame, the 1st symbol in every 64 symbols is a pilot symbol, and each sub-frame includes 57 pilot symbols.

In (b) in FIG. 39, $N_{FAW}=22$ and $N_{RES}=74$ are used as an example for description. A sequence of 22 frame alignment word symbols can be understood by referring to the Table X-3. It is considered that a start symbol of the 6 training symbols needs to be the same as a start symbol of the 57 pilot symbols. In (b) in FIG. 39, a sequence of 6 training symbols can be understood by referring to the following Table X-11:

TABLE X-11

| Polarization | Sequence of training symbols |
|---|---|
| Polarization 1 | A − Aj, A + Aj, A + Aj, −A − Aj, −A − Aj, −A + Aj |
| Polarization 2 | A − Aj, −A − Aj, −A + Aj, A − Aj, A + Aj, −A + Aj |

In this example, the 57 pilot symbols are determined based on the target polynomial and the corresponding seed. In this embodiment of this application, the structure for generating the pilot symbols based on the target polynomial and the seed can be understood by referring to the corresponding content in FIG. 34.

For a scenario in which 57 pilot symbols need to be generated, a bit sequence with a continuous length of 114, $b_0$, $b_1$, $b_2$, . . . $b_{113}$, is obtained based on the target polynomial and the seed. Every two consecutive bits in the bit sequence $b_0$, $b_1$, $b_2$, . . . $b_{113}$ are mapped to one symbol, where $b_{2t}$ and $b_{2t+1}$ are mapped to one symbol $(2b_{2t-1})A+(2b_{2t+1}-1)Aj$. It should be noted that the symbols $(2b_{2t}-1)A+(2b_{2t+1}-1)Aj$ may not be symbols in a constellation diagram of the used modulation format, and may be four symbols in a middle area between the outermost four symbols and the innermost four symbols in the constellation diagram of the used modulation format. In this case, the training symbols and the pilot symbols have fair noise and sensitivity, but have a relatively low peak-to-average power ratio. Taking 16QAM as an example, values of the 16 symbols in the 16QAM constellation diagram are {±1±1j, ±1±3j, ±3±1j, ±3±3j}, and a value of the real number A meets 1≤A≤3. A specific value of the real number A may be selected according to an actual application scenario, so that the peak-to-average power ratio, noise, and sensitivity of the training symbols and the pilot symbols have a good compromise. For example, the real number $A=\sqrt{5}$, and the values of the pilot symbols and the training symbols are $\{-\sqrt{5}-\sqrt{5}j, -\sqrt{5}+\sqrt{5}j, \sqrt{5}-\sqrt{5}j, \sqrt{5}+\sqrt{5}j\}$. In addition, when the 16 symbols in the 16QAM constellation diagram are subjected to power normalization and have values of $$\left\{\pm\frac{1}{\sqrt{10}}\pm\frac{1}{\sqrt{10}}j, \pm\frac{1}{\sqrt{10}}\pm\frac{3}{\sqrt{10}}j, \pm\frac{3}{\sqrt{10}}\pm\frac{1}{\sqrt{10}}j, \pm\frac{3}{\sqrt{10}}\pm\frac{3}{\sqrt{10}}j\right\},$$

the value of the real number A meets $$\frac{1}{\sqrt{10}}\leq A\leq\frac{3}{\sqrt{10}}.$$

For example, the real number $$A=\frac{\sqrt{2}}{2},$$

and the values of the pilot symbols and the training symbols are $$\{-\frac{\sqrt{2}}{2}-\frac{\sqrt{2}}{2}j, -\frac{\sqrt{2}}{2}+\frac{\sqrt{2}}{2}j, \frac{\sqrt{2}}{2}-\frac{\sqrt{2}}{2}j, \frac{\sqrt{2}}{2}+\frac{\sqrt{2}}{2}j\}.$$

When the target polynomial and hexadecimal seeds in two polarization directions are one row in the following Table X-12, a normalized amplitude of a sidelobe value of a periodic autocorrelation function of pilot symbols in the same polarization direction is not greater than 0.23, and a normalized amplitude of a periodic cross-correlation function value of pilot symbols in different polarization directions is not greater than 0.23.

TABLE X-12

| Index | Target polynomial | Seed in one polarization direction | Seed in the other polarization direction |
|---|---|---|---|
| 1 | $x^{10} + x^7 + x^3 + x + 1$ | 0x204 | 0x279 |
| 2 | $x^{10} + x^7 + x^3 + x + 1$ | 0x0B1 | 0x3E9 |
| 3 | $x^{10} + x^7 + x^3 + x + 1$ | 0x0B1 | 0x279 |

Figure 40:
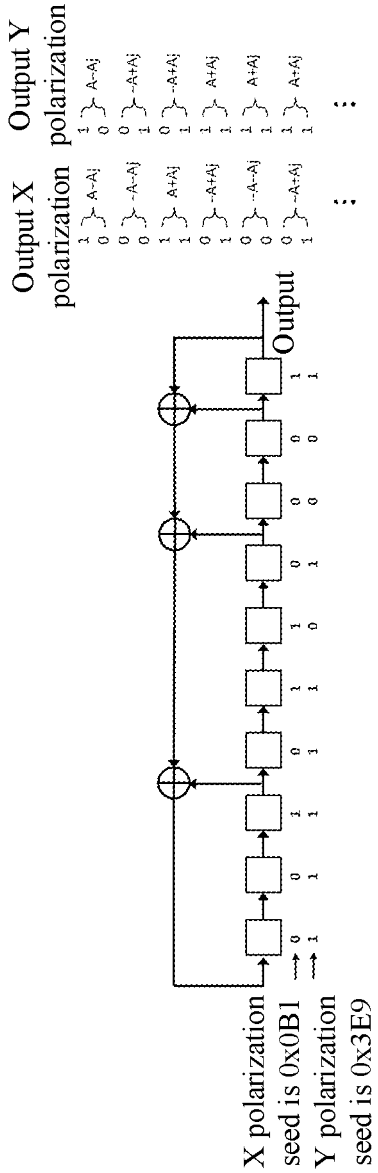
FIG. 40 is a schematic diagram of another pilot symbol generation structure according to an embodiment of this application.

When the target polynomial is $x^{10}+x^7+x^3+x+1$, and the corresponding hexadecimal seeds in the two polarization directions are 0x0B1 and 0x3E9, that is, the row indexed 2 in the foregoing Table X-12, a process of generating 57 pilot symbols can be understood by referring to FIG. 40.

As shown in FIG. 40, in the X polarization direction, the input polarization seed is 0x0B1, which is 0010110001 after being converted into a binary sequence, that is, values of $m_9$ to $m_0$. If two bits 1 and 0 are output consecutively in sequence, a pilot symbol in the X polarization direction is A−Aj. If two bits 0 and 0 are output consecutively in sequence, a pilot symbol in the X polarization direction is −A−Aj. If two bits 1 and 1 are output consecutively in sequence, a pilot symbol in the X polarization direction is A+Aj. If two bits 0 and 1 are output consecutively in sequence, a pilot symbol in the X polarization direction is −A+Aj. By analogy, 57 pilot symbols in the X polarization direction may be obtained.

As shown in FIG. 40, in the Y polarization direction, the input polarization seed is 0x3E9, which is 1111101001 after being converted into a binary sequence, that is, values of $m_9$ to $m_0$. If two bits 1 and 0 are output consecutively in sequence, a pilot symbol in the Y polarization direction is A−Aj. If two bits 0 and 0 are output consecutively in sequence, a pilot symbol in the Y polarization direction is −A−Aj. If two bits 1 and 1 are output consecutively in sequence, a pilot symbol in the Y polarization direction is A+Aj. If two bits 0 and 1 are output consecutively in sequence, a pilot symbol in the Y polarization direction is −A+Aj. By analogy, 57 pilot symbols in the Y polarization direction may be obtained.

Figure 42:
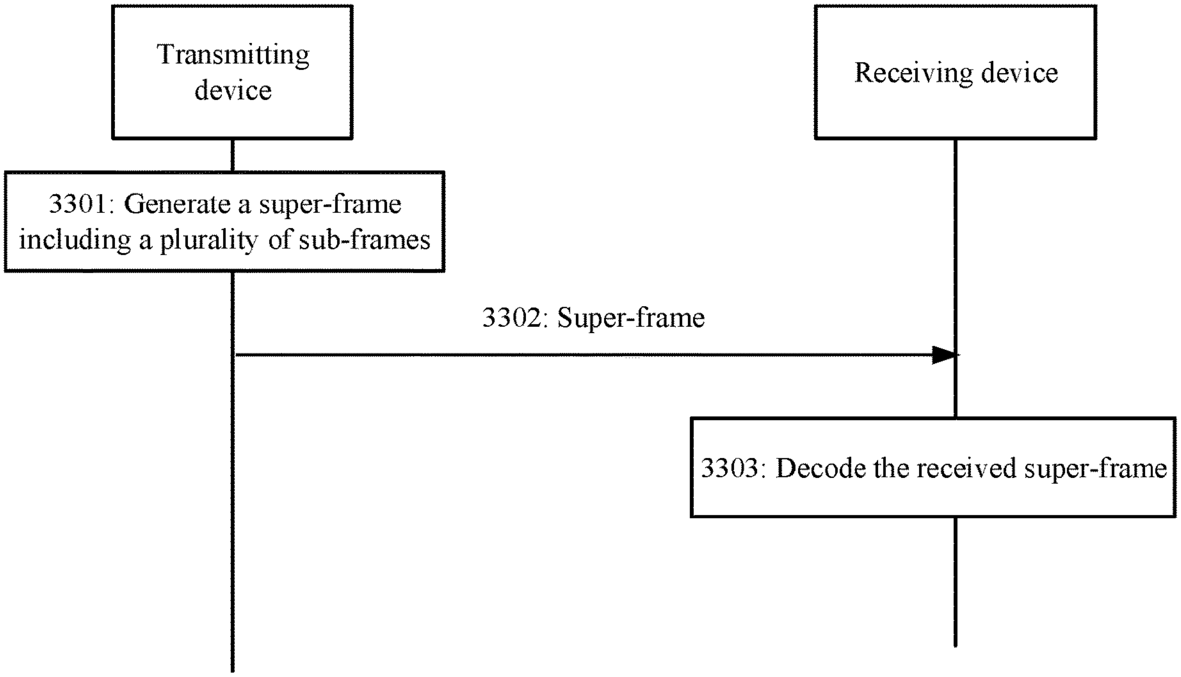
FIG. 42 is a flowchart of another transmission method for optical communication according to an embodiment of this application.

The polarization seed in the X polarization direction may be interchanged with the polarization seed in the Y polarization direction. Therefore, 57 pilot symbols shown in the following Table X-13 may be obtained.

to FIG. 2 or FIG. 3, an embodiment of this application further provides another transmission method for optical communication. As shown in FIG. 42, the transmission method includes the following steps.

3301: A transmitting device generates a super-frame including a plurality of sub-frames, where the sub-frame includes training symbols and pilot symbols.

In each sub-frame, in one polarization direction, there are $N_{PS}$ pilot symbols, a value of which is one of $-A_2-A_2j$, $-A_2+A_2j$, $A_2-A_2j$, and $A_2+A_2j$, where $A_2$ is a real number, and $N_{PS}$ is an even number. The $N_{PS}$ pilot symbols achieve direct current balance, and a combination of the training symbols and the $N_{PS}$ pilot symbols achieves direct current balance.

The pilot symbols are generated based on a target polynomial and a seed. The target polynomial is a primitive polynomial, and there are no more than 5 non-zero terms of the target polynomial. The target polynomial is one item in the following Table Y-1.

TABLE Y-1

| Index | Target polynomial |
|---|---|
| 1 | $x^{10} + x^9 + x^7 + x^6 + 1$ |
| 2 | $x^{10} + x^9 + x^7 + x^3 + 1$ |

TABLE X-13

| Polarization direction | Pilot symbol |
|---|---|
| Polarization 1 | A − Aj, −A − Aj, A + Aj, −A + Aj, −A − Aj, −A + Aj, A + Aj, −A − Aj, −A + Aj, A + Aj, A + Aj, A − Aj, −A − Aj, −A + Aj, A + Aj, A + Aj, −A + Aj, −A + Aj, A + Aj, −A + Aj, −A + Aj, A − Aj, A + Aj, A − Aj, A + Aj, A − Aj, A + Aj, −A − Aj, A − Aj, −A − Aj, −A + Aj, −A − Aj, A + Aj, A + Aj, −A + Aj, −A − Aj, −A − Aj, A − Aj, A − Aj, A − Aj, −A − Aj, −A − Aj, A − Aj, A − Aj, A + Aj, −A − Aj, A − Aj, A + Aj, −A − Aj, A − Aj, −A + Aj, −A + Aj, A − Aj, A − Aj, −A + Aj, −A − Aj, −A + Aj |
| Polarization 2 | A − Aj, −A + Aj, −A + Aj, A + Aj, A + Aj, A + Aj, A + Aj, A − Aj, −A − Aj, A + Aj, A − Aj, A + Aj, A − Aj, −A + Aj, −A + Aj, A − Aj, A + Aj, −A + Aj, A − Aj, −A − Aj, −A + Aj, A − Aj, −A + Aj, A − Aj, −A − Aj, A − Aj, −A − Aj, A − Aj, A − Aj, −A − Aj, A + Aj, −A + Aj, −A + Aj, −A + Aj, −A + Aj, −A + Aj, A + Aj, A − Aj, A − Aj, −A + Aj, −A + Aj, A + Aj, −A − Aj, A − Aj, −A + Aj, −A − Aj, A − Aj, −A − Aj, −A − Aj, A − Aj, −A − Aj, A − Aj, −A − Aj, −A + Aj, A + Aj, A − Aj, −A + Aj |

Figure 41:
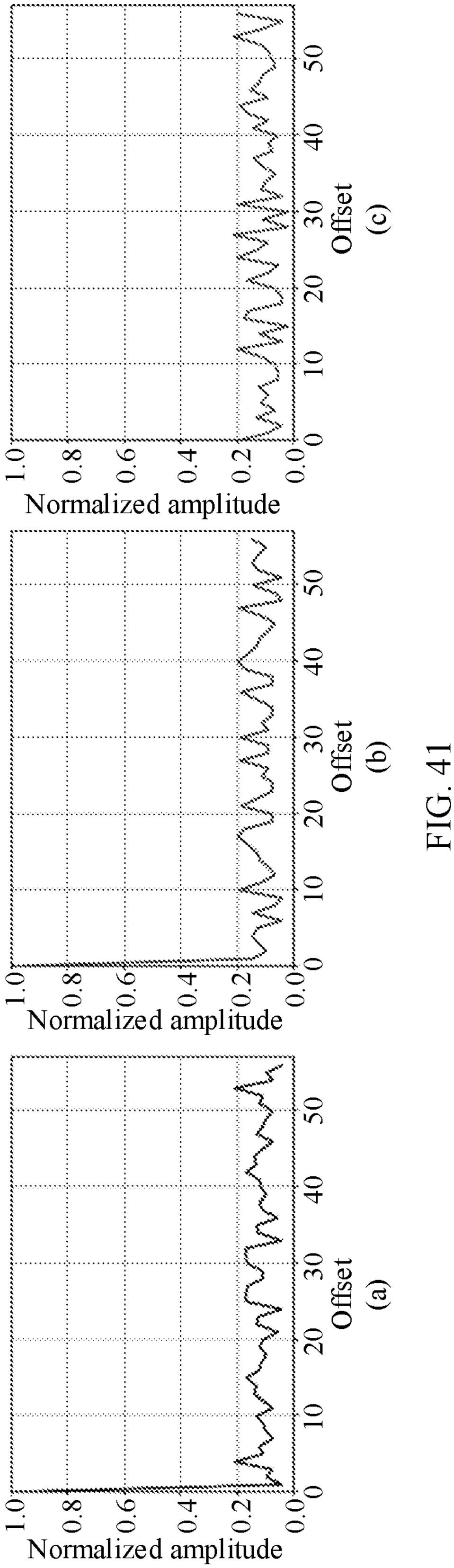
FIG. 41 shows a graph of a periodic autocorrelation result of a specific sequence of pilot symbols in an X polarization direction, a graph of a periodic autocorrelation result of the specific sequence of pilot symbols in a Y polarization direction, and a graph of a periodic cross-correlation result of the specific sequence of pilot symbols in the two polarization directions according to an embodiment of this application.

In the foregoing Table. X-13, correlation characteristics corresponding to the pilot symbols are shown in FIG. 41. (a) in FIG. 41 shows a periodic autocorrelation result of the sequence of pilot symbols in the X polarization direction, (b) in FIG. 41 shows a periodic autocorrelation result of the sequence of pilot symbols in the Y polarization direction, and (c) in FIG. 41 shows a periodic cross-correlation result of the sequence of pilot symbols in the X and Y polarization directions. A normalized amplitude of a sidelobe value of a periodic autocorrelation function of a symbol sequence in the two polarization directions is not greater than 0.206, and a normalized amplitude of a sidelobe value of a periodic cross-correlation function of the symbol sequence in the two polarization directions is not greater than 0.212. A frame overhead of the super-frame structure provided in this embodiment of this application is also as low as 1.79%, and the designed sequence of pilot symbols has relatively good autocorrelation and cross-correlation characteristics. The training sequence and the sequence of pilot symbols can also be combined together to meet direct current balance, which helps the receiver end restore a signal, and improves quality of the restored signal.

With reference to the communication system described in the foregoing embodiment corresponding to FIG. 1 and the framing process described in the embodiment corresponding TABLE Y-1-continued

| Index | Target polynomial |
|---|---|
| 3 | $x^{10} + x^8 + x^4 + x^3 + 1$ |
| 4 | $x^{10} + x^7 + x^6 + x^2 + 1$ |
| 5 | $x^{10} + x^9 + x^6 + x + 1$ |
| 6 | $x^{10} + x^9 + x^4 + x + 1$ |
| 7 | $x^{10} + x^7 + x^3 + x + 1$ |
| 8 | $x^{10} + x^4 + x^3 + x + 1$ |

3302: The transmitting device transmits the super-frame, and correspondingly, a receiving device receives the super-frame including the plurality of sub-frames.

3303: The receiving device decodes the received super-frame.

In the solution of this embodiment of this application, the pilot symbols are generated based on the target polynomial and the seed. The target polynomial is any item in the foregoing Table Y-1, and the target polynomial and the corresponding seed can meet that the generated $N_{PS}$ pilot symbols achieve direct current balance, and that a combination of the training symbols and the $N_{PS}$ pilot symbols achieves direct current balance, which helps a receiver end restore a signal better, and improves quality of the signal at the receiver end.

A structure of the super-frame provided in this embodiment of this application can be understood by referring to the corresponding content in (a) in FIG. 33 to (c) in FIG. 33, and details are not described herein again.

In this embodiment of this application, the following specific super-frame format is considered. A quantity of symbols before framing is 172032, and the symbols are encoded symbols. An encoding scheme may be encoding multiple times using open FEC (OFEC) or using Hamming codes with a code length of 128 bits, or another encoding scheme may be used. The following table lists parameters $N_{SF}$, $N_{TS}$, $N_{PS}$, $N_{FAW}$, $N_{RES}$, $N_S$, $N_F$, and OH corresponding to the super-frame, and the like.

| $N_{SF}$ | $N_{PS}$ | $N_S$ | $N_F$ | OH | $N_{TS}$ | $N_{FAW} + N_{RES}$ |
|---|---|---|---|---|---|---|
| 24 | 114 | 7296 | 175104 | 1.79% | 11 | 96 |

The super-frame includes 24 sub-frames, and each sub-frame includes 7296 symbols, as shown in (a) in FIG. 33. The 1st sub-frame is shown in (b) in FIG. 33, including 11 training symbols, $N_{FAW}$ frame alignment word symbols, and $N_{RES}$ reserved symbols, where $N_{FAW}+N_{RES}=96$. The 2nd to 24th sub-frames each also include 11 training symbols, as shown in (c) in FIG. 33. In addition, in each sub-frame, the 1st symbol in every 64 symbols is a pilot symbol. Each sub-frame includes 114 pilot symbols.

Herein, the quantity of frame alignment word symbols $N_{FAW}=22$ and the quantity of reserved symbols $N_{RES}=74$ are used as an example for description, as shown in (b) in FIG. 33.

A frame alignment word sequence with a length of 22 is shown in the following Table Y-2, where a value of the real number $A_{FAW}$ is not specifically limited. The value may be selected according to an actual application scenario, so that the peak-to-average power ratio, noise, and sensitivity of the FAW symbols have a good compromise. Taking 16QAM as an example, values of the 16 symbols in the 16QAM constellation diagram are $\{\pm1\pm1j, \pm1\pm3j, \pm3\pm1j, \pm3\pm3j\}$, and a value of the real number $A_{FAW}$ meets $1 \le A \le 3$. For example, the real number $A=\sqrt{5}$, and the values of the pilot symbols are $\{-\sqrt{5}-\sqrt{5}j, -\sqrt{5}+-\sqrt{5}j, \sqrt{5}-\sqrt{5}j, \sqrt{5}+\sqrt{5}j\}$.

TABLE Y-2

| Polarization | Frame alignment word sequence |
|---|---|
| Polarization 1 | $A_{FAW} - A_{FAW}j$, $A_{FAW} + A_{FAW}j$, $A_{FAW} + A_{FAW}j$, $A_{FAW} + A_{FAW}j$, $A_{FAW} - A_{FAW}j$, $A_{FAW} - A_{FAW}J$, $-A_{FAW} - A_{FAW}J$, $A_{FAW} + A_{FAW}j$, $-A_{FAW} - A_{FAW}J$, $-A_{FAW} + A_{FAW}J$, $-A_{FAW} + A_{FAW}j$, $A_{FAW} - A_{FAW}j$, $-A_{FAW} - A_{FAW}J$, $-A_{FAW} - A_{FAW}j$, $-A_{FAW} + A_{FAW}J$, $A_{FAW} + A_{FAW}J$, $-A_{FAW} - A_{FAW}j$, $A_{FAW} - A_{FAW}j$, $-A_{FAW} + A_{FAW}j$, $A_{FAW} + A_{FAW}j$, $-A_{FAW} - A_{FAW}j$, $-A_{FAW} + A_{FAW}j$ |
| Polarization 2 | $A_{FAW} + A_{FAW}J$, $-A_{FAW} + A_{FAW}J$, $-A_{FAW} - A_{FAW}J$, $-A_{FAW} + A_{FAW}j$, $A_{FAW} - A_{FAW}J$, $A_{FAW} + A_{FAW}j$, $A_{FAW} - A_{FAW}j$, $A_{FAW} - A_{FAW}j$, $-A_{FAW} - A_{FAW}j$, $A_{FAW} - A_{FAW}j$, $A_{FAW} + A_{FAW}j$, $-A_{FAW} + A_{FAW}J$, $-A_{FAW} + A_{FAW}J$, $A_{FAW} + A_{FAW}J$, $-A_{FAW} - A_{FAW}j$, $A_{FAW} + A_{FAW}J$, $-A_{FAW} - A_{FAW}j$, $-A_{FAW} + A_{FAW}J$, $A_{FAW} - A_{FAW}j$, $-A_{FAW} - A_{FAW}j$, $A_{FAW} - A_{FAW}j$, $-A_{FAW} + A_{FAW}j$ |

The 114 pilot symbols are determined based on the target polynomial and the corresponding seed. In this embodiment of this application, the target polynomial is a 10-order polynomial, and the 10-order polynomial may be expressed as:

$$x^{10}+a_9 \times x^9+a_8 \times x^8+a_7 \times x^7+a_6 \times x^6+a_5 \times x^5+a_4 \times x^4+a_3 \times x^3+a_2 \times x^2+a_1 \times x+1$$

where a value of $a_9 \ldots a_1$ may be 0 or 1.

A pilot symbol generation structure can be understood by referring to the foregoing FIG. 34. As shown in FIG. 34, a seed may be expressed as $m_9, m_8, m_7, m_6, m_5, m_4, m_3, m_2, m_1, m_0$ in the binary form. Certainly, the seed may also be expressed in the hexadecimal or decimal form, and when computed with the target polynomial, the seed needs to be converted into a binary form. For example, 0110111000 is expressed as 0x1B8 in the hexadecimal form, or is expressed as 440 in the decimal form.

In this embodiment of this application, the same target generator polynomial may be used for pilot symbols in two orthogonal polarization directions. However, due to different seeds, correspondingly, pilot symbols output in the two polarization directions are not completely the same.

As shown in FIG. 34, for a scenario in which 114 pilot symbols need to be generated, a bit sequence with a continuous length of 228, $b_0, b_1, b_2, \ldots b_{227}$, is obtained based on the target polynomial and the seed. Every two consecutive bits in the bit sequence $b_0, b_1, b_2, \ldots b_{227}$ are mapped to one symbol, where $b_{2t}$ and $b_{2t+1}$ are mapped to one symbol $(2b_{2t}-1)A_2+(2b_{2t+1}-1)A_2j$, $0 \le t \le 114$.

It should be understood that, when the pilot symbols are the outermost four symbols in the constellation diagram, the pilot symbols have a relatively high sensitivity, but have a relatively large peak-to-average power ratio; and when the values of the pilot symbols are the innermost four symbols in the constellation diagram, the training symbols and the pilot symbols have relatively small noise, but have a relatively low sensitivity.

It should be noted that the pilot symbols may not be symbols in a constellation diagram of the used modulation format, and may be four symbols in a middle area between the outermost four symbols and the innermost four symbols in the constellation diagram of the used modulation format. In this case, the pilot symbols have fair noise and sensitivity, but have a relatively low peak-to-average power ratio. Taking 16QAM as an example, values of the 16 symbols in the 16QAM constellation diagram are $\{\pm1\pm1j, \pm1\pm3j, \pm3\pm1j, \pm3\pm3j\}$, and a value of the real number $A_2$ meets $1 \le A_2 \le 3$. A specific value of the real number $A_2$ may be selected according to an actual application scenario, so that the peak-to-average power ratio, noise, and sensitivity of the training symbols or the pilot symbols have a good compromise. For example, the real number $A_2=\sqrt{5}$, and the values of the pilot symbols and the training symbols are $\{-\sqrt{5}-\sqrt{5}j, -\sqrt{5}+\sqrt{5}j, \sqrt{5}-\sqrt{5}j, \sqrt{5}+\sqrt{5}j\}$. In addition, when the 16 symbols in the 16QAM constellation diagram are subjected to power normalization and have values of $$\{\pm\frac{1}{\sqrt{10}}\pm\frac{1}{\sqrt{10}}j,\pm\frac{1}{\sqrt{10}}\pm\frac{3}{\sqrt{10}}j,\pm\frac{3}{\sqrt{10}}\pm\frac{1}{\sqrt{10}}j,\pm\frac{3}{\sqrt{10}}\pm\frac{3}{\sqrt{10}}j\},$$

the value of the real number $A_2$ meets $$\frac{1}{\sqrt{10}}\leq A\leq\frac{3}{\sqrt{10}}.$$

For example, the real number $$A_2=\frac{\sqrt{2}}{2},$$

and the values of the pilot symbols are $$\{-\frac{\sqrt{2}}{2}-\frac{\sqrt{2}}{2}j,-\frac{\sqrt{2}}{2}+\frac{\sqrt{2}}{2}j,\frac{\sqrt{2}}{2}-\frac{\sqrt{2}}{2}j,\frac{\sqrt{2}}{2}+\frac{\sqrt{2}}{2}j\}.$$

Considering that a sequence generated when the target polynomial is a primitive polynomial generally has relatively good randomness, and that more non-zero terms of the target polynomial indicate more complex implementation, when the target polynomial uses the primitive polynomial and there are no more than 5 non-zero terms of the target polynomial, and when the target polynomial and hexadecimal seeds in two polarization directions are one row in the following Table Y-3, a normalized amplitude of a sidelobe value of a periodic autocorrelation function of pilot symbols in the same polarization direction is not greater than 0.25, and a normalized amplitude of a periodic cross-correlation function value of pilot symbols in different polarization directions is not greater than 0.25.

TABLE Y-3

| Index | Target polynomial | Seed in the direction of polarization 1 | Seed in the direction of polarization 2 |
|---|---|---|---|
| 1 | $x^{10}+x^9+x^7+x^6+1$ | 0x002 | 0x3C6 |
| 2 | $x^{10}+x^9+x^7+x^6+1$ | 0x002 | 0x38D |
| 3 | $x^{10}+x^9+x^7+x^3+1$ | 0x094 | 0x11F |
| 4 | $x^{10}+x^9+x^7+x^3+1$ | 0x129 | 0x11F |
| 5 | $x^{10}+x^8+x^4+x^3+1$ | 0x07A | 0x167 |
| 6 | $x^{10}+x^8+x^4+x^3+1$ | 0x07A | 0x2CF |
| 7 | $x^{10}+x^7+x^6+x^2+1$ | 0x1B8 | 0x22F |
| 8 | $x^{10}+x^7+x^6+x^2+1$ | 0x1B8 | 0x05F |
| 9 | $x^{10}+x^9+x^6+x+1$ | 0x040 | 0x210 |
| 10 | $x^{10}+x^9+x^6+x+1$ | 0x040 | 0x308 |
| 11 | $x^{10}+x^9+x^6+x+1$ | 0x040 | 0x184 |
| 12 | $x^{10}+x^9+x^6+x+1$ | 0x040 | 0x0C2 |
| 13 | $x^{10}+x^9+x^6+x+1$ | 0x040 | 0x0E1 |
| 14 | $x^{10}+x^9+x^6+x+1$ | 0x040 | 0x0D7 |
| 15 | $x^{10}+x^9+x^6+x+1$ | 0x040 | 0x1AF |
| 16 | $x^{10}+x^9+x^6+x+1$ | 0x210 | 0x201 |
| 17 | $x^{10}+x^9+x^6+x+1$ | 0x308 | 0x201 |
| 18 | $x^{10}+x^9+x^6+x+1$ | 0x184 | 0x201 |
| 19 | $x^{10}+x^9+x^6+x+1$ | 0x0C2 | 0x201 |
| 20 | $x^{10}+x^9+x^6+x+1$ | 0x201 | 0x0E1 |
| 21 | $x^{10}+x^9+x^6+x+1$ | 0x201 | 0x0D7 |
| 22 | $x^{10}+x^9+x^6+x+1$ | 0x201 | 0x1AF |
| 23 | $x^{10}+x^9+x^4+x+1$ | 0x1A0 | 0x2D9 |
| 24 | $x^{10}+x^9+x^4+x+1$ | 0x1A0 | 0x3DB |
| 25 | $x^{10}+x^9+x^4+x+1$ | 0x0DO | 0x2D9 |
| 26 | $x^{10}+x^9+x^4+x+1$ | 0x0DO | 0x3DB |
| 27 | $x^{10}+x^9+x^4+x+1$ | 0x058 | 0x2D9 |
| 28 | $x^{10}+x^9+x^4+x+1$ | 0x058 | 0x3DB |
| 29 | $x^{10}+x^9+x^4+x+1$ | 0x22C | 0x2D9 |
| 30 | $x^{10}+x^9+x^4+x+1$ | 0x22C | 0x3DB |
| 31 | $x^{10}+x^9+x^4+x+1$ | 0x2D2 | 0x2D9 |
| 32 | $x^{10}+x^9+x^4+x+1$ | 0x2D2 | 0x3DB |
| 33 | $x^{10}+x^9+x^4+x+1$ | 0x2D9 | 0x1A5 |
| 34 | $x^{10}+x^9+x^4+x+1$ | 0x2D9 | 0x3DD |
| 35 | $x^{10}+x^9+x^4+x+1$ | 0x1A5 | 0x3DB |
| 36 | $x^{10}+x^9+x^4+x+1$ | 0x3DD | 0x3DB |
| 37 | $x^{10}+x^7+x^3+x+1$ | 0x084 | 0x1A7 |
| 38 | $x^{10}+x^7+x^3+x+1$ | 0x109 | 0x1A7 |
| 39 | $x^{10}+x^4+x^3+x+1$ | 0x365 | 0x3EB |
| 40 | $x^{10}+x^4+x^3+x+1$ | 0x2CB | 0x3EB |

Figure 43:
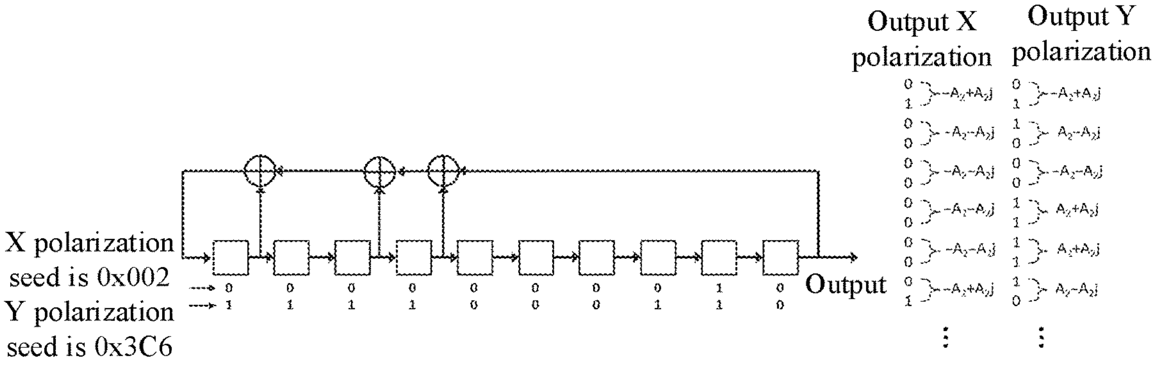
FIG. 43 is a schematic diagram of another pilot symbol generation structure according to an embodiment of this application.

In Table Y-3, in a row indexed 1, when a primitive polynomial used by the target polynomial is $x^{10}+x^9+x^7+x^6+1$, and the corresponding hexadecimal seeds in the two polarization directions are 0x002 and 0x3C6, a process of generating 114 pilot symbols can be understood by referring to FIG. 43.

As shown in FIG. 43, in the X polarization direction, the input polarization seed is 0x002, which is 0000000010 after being converted into a binary sequence, that is, values of $m_9$ to $m_0$. If two bits 1 and 0 are output consecutively in sequence, a pilot symbol in the X polarization direction is $A_2-A_2j$. If two bits 0 and 0 are output consecutively in sequence, a pilot symbol in the X polarization direction is $-A_2-A_2j$. If two bits 1 and 1 are output consecutively in sequence, a pilot symbol in the X polarization direction is $A_2+A_2j$. If two bits 0 and 1 are output consecutively in sequence, a pilot symbol in the X polarization direction is $-A_2+A_2j$. By analogy, 114 pilot symbols in the X polarization direction may be obtained.

As shown in FIG. 43, in the Y polarization direction, the input polarization seed is 0x3C6, which is 0010000100 after being converted into a binary sequence, that is, values of $m_9$ to $m_0$. If two bits 1 and 0 are output consecutively in sequence, a pilot symbol in the Y polarization direction is $A_2-A_2j$. If two bits 0 and 0 are output consecutively in sequence, a pilot symbol in the Y polarization direction is $-A_2-A_2j$. If two bits 1 and 1 are output consecutively in sequence, a pilot symbol in the Y polarization direction is $A_2+A_2j$. If two bits 0 and 1 are output consecutively in sequence, a pilot symbol in the Y polarization direction is $-A_2+A_2j$. By analogy, 114 pilot symbols in the Y polarization direction may be obtained.

The polarization seed in the X polarization direction may be interchanged with the polarization seed in the Y polarization direction. Therefore, 114 pilot symbols shown in the following Table Y4 may be obtained.

TABLE Y-4

| Polarization direction | Pilot symbol |
|---|---|
| Polarization 1 | $-A_2 + A_2j, -A_2 - A_2j, -A_2 - A_2j, -A_2 - A_2j, -A_2 - A_2j, -A_2 + A_2j, A_2 + A_2j, -A_2 - A_2j, -A_2 + A_2j, A_2 + A_2j, -A_2 + A_2j, -A_2 - A_2j, A_2 - A_2j, -A_2 - A_2j, -A_2 + A_2j, A_2 - A_2j, A_2 + A_2j, A_2 - A_2j, -A_2 - A_2j, A_2 - A_2j, A_2 - A_2j, -A_2 - A_2j, -A_2 - A_2j, -A_2 - A_2j, A_2 + A_2j, -A_2 + A_2j, A_2 - A_2j, A_2 + A_2j, -A_2 + A_2j, -A_2 - A_2j, A_2 + A_2j, -A_2 + A_2j, -A_2 - A_2j, A_2 + A_2j, A_2 - A_2j, A_2 - A_2j, A_2 + A_2j, -A_2 + A_2j, -A_2 - A_2j, -A_2 + A_2j, -A_2 - A_2j, -A_2 - A_2j, -A_2 + A_2j, A_2 + A_2j, -A_2 + A_2j, A_2 - A_2j, A_2 + A_2j, -A_2 - A_2j, A_2 + A_2j, A_2 + A_2j, -A_2 - A_2j, A_2 + A_2j, A_2 - A_2j, A_2 - A_2j, -A_2 - A_2j, A_2 + A_2j, -A_2 - A_2j, A_2 - A_2j, A_2 - A_2j, A_2 - A_2j, -A_2 - A_2j, A_2 + A_2j, -A_2 + A_2j, -A_2 + A_2j, A_2 - A_2j, A_2 + A_2j, A_2 + A_2j, A_2 - A_2j, -A_2 + A_2j, A_2 + A_2j, A_2 - A_2j, A_2 - A_2j, -A_2 + A_2j, -A_2 + A_2j, A_2 + A_2j, A_2 + A_2j, -A_2 - A_2j, -A_2 - A_2j, -A_2 + A_2j, -A_2 + A_2j, A_2 + A_2j, -A_2 - A_2j, -A_2 + A_2j, A_2 - A_2j, A_2 - A_2j, -A_2 - A_2j, A_2 + A_2j, A_2 + A_2j, -A_2 - A_2j, A_2 - A_2j, -A_2 + A_2j, A_2 - A_2j, -A_2 + A_2j, -A_2 - A_2j, -A_2 + A_2j, A_2 - A_2j, -A_2 - A_2j, A_2 - A_2j, -A_2 + A_2j, -A_2 + A_2j, A_2 - A_2j, A_2 + A_2j, A_2 - A_2j, -A_2 + A_2j, -A_2 + A_2j, A_2 - A_2j, -A_2 + A_2j, A_2 + A_2j, -A_2 + A_2j, A_2 + A_2j, A_2 + A_2j, A_2 - A_2j, A_2 - A_2j, A_2 + A_2j$ |
| Polarization 2 | $-A_2 + A_2j, A_2 - A_2j, -A_2 - A_2j, A_2 + A_2j, A_2 + A_2j, A_2 - A_2j, A_2 + A_2j, -A_2 + A_2j, -A_2 - A_2j, -A_2 - A_2j, A_2 + A_2j, -A_2 - A_2j, -A_2 - A_2j, -A_2 - A_2j, -A_2 - A_2j, A_2 - A_2j, -A_2 + A_2j, -A_2 - A_2j, A_2 - A_2j, -A_2 + A_2j, A_2 + A_2j, -A_2 + A_2j, A_2 - A_2j, -A_2 - A_2j, A_2 - A_2j, A_2 + A_2j, -A_2 - A_2j, A_2 - A_2j, -A_2 + A_2j, A_2 + A_2j, A_2 - A_2j, -A_2 - A_2j, -A_2 - A_2j, -A_2 + A_2j, -A_2 + A_2j, A_2 - A_2j, A_2 + A_2j, -A_2 + A_2j, A_2 + A_2j, -A_2 + A_2j, -A_2 + A_2j, A_2 + A_2j, -A_2 + A_2j, -A_2 - A_2j, A_2 + A_2j, A_2 + A_2j, -A_2 + A_2j, A_2 + A_2j, -A_2 - A_2j, A_2 + A_2j, -A_2 - A_2j, -A_2 - A_2j, A_2 - A_2j, -A_2 + A_2j, A_2 - A_2j, A_2 + A_2j, -A_2 + A_2j, -A_2 + A_2j, -A_2 - A_2j, -A_2 + A_2j, -A_2 + A_2j, -A_2 - A_2j, A_2 + A_2j, A_2 - A_2j, -A_2 + A_2j, -A_2 + A_2j, -A_2 + A_2j, A_2 + A_2j, A_2 + A_2j, A_2 - A_2j, -A_2 + A_2j, -A_2 + A_2j, A_2 + A_2j, A_2 - A_2j, A_2 + A_2j, -A_2 - A_2j, -A_2 - A_2j, A_2 - A_2j, A_2 - A_2j, -A_2 - A_2j, A_2 + A_2j, A_2 - A_2j, A_2 + A_2j, A_2 - A_2j, -A_2 - A_2j, -A_2 + A_2j, -A_2 - A_2j, -A_2 - A_2j, A_2 + A_2j, A_2 - A_2j, -A_2 + A_2j, -A_2 - A_2j, A_2 - A_2j, A_2 + A_2j, A_2 - A_2j, -A_2 + A_2j, -A_2 - A_2j, -A_2 + A_2j, -A_2 + A_2j, A_2 - A_2j, A_2 - A_2j, A_2 - A_2j, A_2 + A_2j, -A_2 - A_2j, A_2 - A_2j, A_2 - A_2j, -A_2 + A_2j, A_2 - A_2j, A_2 + A_2j, A_2 - A_2j, A_2 + A_2j, -A_2 - A_2j, A_2 - A_2j, A_2 + A_2j$ |

In the foregoing Table Y-4, in one polarization direction, quantities of $-A_2-A_2j$, $-A_2+A_2j$, $A_2-A_2j$, and $A_2+A_2j$ in the 114 pilot symbols are respectively 28, 29, 29, and 28 in the one polarization direction. In one polarization direction, quantities of $-A_2-A_2j$, $-A_2+A_{2j}$, $A_2-A_2j$, and $A_2+A_2j$ in the pilot symbols included in one sub-frame are close to each other. In addition, in one polarization direction, a sum of the 114 pilot symbols in one sub-frame is 0, which can achieve direct current balance and facilitate quality of a signal restored at the receiver end.

In this embodiment of this application, the 1st symbol in each sub-frame is used as both a pilot symbol and a training symbol. The 1st symbol of the 11 training symbols considered is the same as the 1st symbol of the 114 pilot symbols. In one polarization direction, each sub-frame further includes 10 training symbols in addition to the 1st symbol. A value of each of the 10 training symbols is one of $-A_1$-$A_1j$, $-A_1+A_1j$, $A_1$-$A_1j$, and $A_1+A_1j$, where $A_1$ is a real number. A specific value of the real number $A_1$ may be selected according to an actual application scenario, so that the peak-to-average power ratio, noise, and sensitivity of the training symbols or the pilot symbols have a good compromise. $A_1$ may be not be equal to $A_2$. Taking 16QAM as an example, values of the 16 symbols in the 16QAM constellation diagram are $\{\pm1\pm1j, \pm1\pm3j, \pm3\pm1j, \pm3\pm3j\}$, and a value of the real number $A_1$ meets $1 \le A_2 \le 3$. For example, the real number $A_1=\sqrt{5}$, and values of the 10 training symbols in each sub-frame except the 1st symbol are $\{-\sqrt{5}-\sqrt{5}j, -\sqrt{5}+\sqrt{5}j, \sqrt{5}-\sqrt{5}j, \sqrt{5}+\sqrt{5}j\}$. In addition, when the 16 symbols in the 16QAM constellation diagram are subjected to power normalization and have values of $$\{\pm\frac{1}{\sqrt{10}}\pm\frac{1}{\sqrt{10}}j,\pm\frac{1}{\sqrt{10}}\pm\frac{3}{\sqrt{10}}j,\pm\frac{3}{\sqrt{10}}\pm\frac{1}{\sqrt{10}}j,\pm\frac{3}{\sqrt{10}}\pm\frac{3}{\sqrt{10}}j\},$$

the value of the real number $A_2$ meets $$\frac{1}{\sqrt{10}}\leq A\leq\frac{3}{\sqrt{10}}.$$

For example, the real number $$A_1=\frac{\sqrt{2}}{2},$$

and the values of the pilot symbols are $$\{-\frac{\sqrt{2}}{2}-\frac{\sqrt{2}}{2}j,-\frac{\sqrt{2}}{2}+\frac{\sqrt{2}}{2}j,\frac{\sqrt{2}}{2}-\frac{\sqrt{2}}{2}j,\frac{\sqrt{2}}{2}+\frac{\sqrt{2}}{2}j\}.$$

In (b) in FIG. 33, the training sequence with a length of 11 may be one item in Table 40 of which start symbols in the two polarizations are −A+Aj, a real number A used in the start symbol in each polarization direction is set to $A_2$, and a real number A used in the remaining 10 symbols except the start symbol is set to $A_1$. The training sequence is one item indexed 15 in Table 40, as shown in the following Table Y-5.

TABLE Y-5

| Polarization | Training sequence |
|---|---|
| Polarization 1 | $-A_2+A_2j$, $A_1+A_1j$, $A_1+A_1j$, $-A_1-A_1j$, $-A_1+A_1j$, $A_1-A_1j$, $A_1+A_1j$, $-A_1-A_1j$, $A_1-A_1j$, $-A_1-A_1j$, $-A_1+A_1j$ |
| Polarization 2 | $-A_2+A_2j$, $-A_1+A_1j$, $A_1-A_1j$, $A_1-A_1j$, $A_1+A_1j$, $A_1-A_1j$, $-A_1+A_1j$, $-A_1-A_1j$, $-A_1+A_1j$, $A_1+A_1j$, $-A_1-A_1j$ |

With the foregoing 114 pilot symbols and 11 training symbols, in one polarization direction, a combination of the pilot symbols and the training symbols included in one sub-frame meets direct current balance.

It should be noted that, when values of the real numbers $A_1$ and $A_2$ are not equal, the 1st symbol of the 11 training symbols in the foregoing Table Y-5 is $-A_2+A_2j$, which is not equal to any one of values $-A_1-A_1j$, $-A_1+A_1j$, $A_1-A_1j$, and $A_1+A_1j$ of the following 10 training symbols. In some actual application scenarios, for ease of implementation, in one polarization direction, the 1st symbol in each sub-frame is used only as a pilot symbol and is no longer used as a training symbol. In this case, the quantity of training symbols in the sub-frame is reduced to 10, and a value of the training symbols is one of $-A_1-A_1j$, $-A_1+A_1j$, A, $-A_1j$, and $A_1+A_1j$, which facilitates implementation of equalization. In this case, the training sequence with a length of 10 may be one item in Table 33, and the real number A is set to $A_1$.

Figure 44:
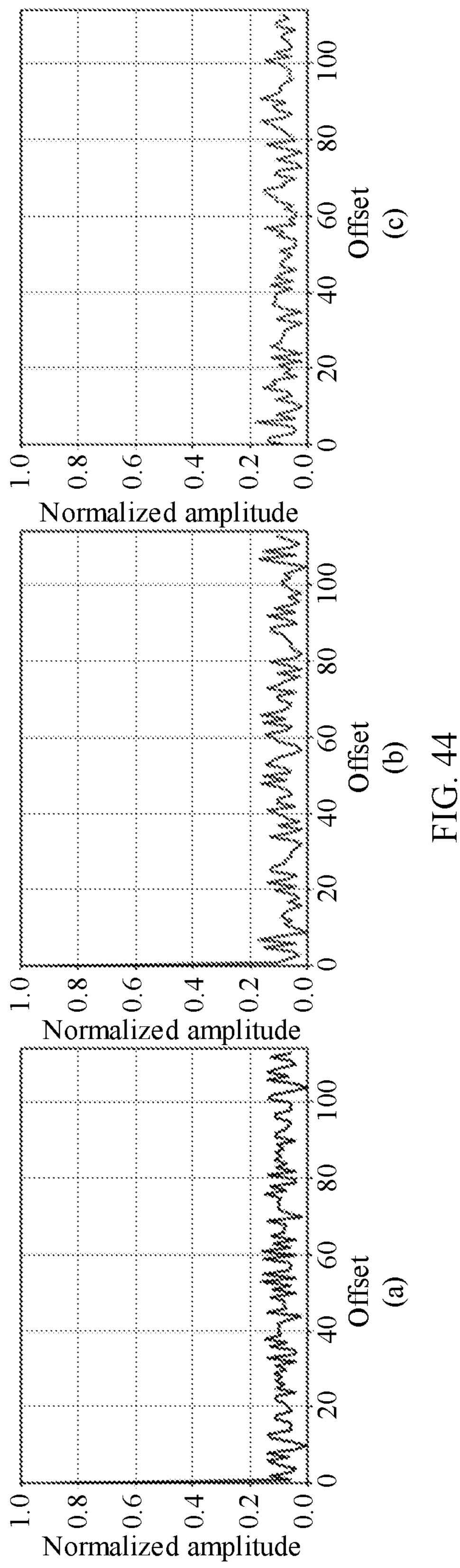
FIG. 44 shows a graph of a periodic autocorrelation result of a specific sequence of pilot symbols in an X polarization direction, a graph of a periodic autocorrelation result of the specific sequence of pilot symbols in a Y polarization direction, and a graph of a periodic cross-correlation result of the specific sequence of pilot symbols in the two polarization directions according to an embodiment of this application.

In the foregoing solution, correlation characteristics corresponding to the pilot symbols are shown in the following FIG. 44. (a) in FIG. 44 shows a periodic autocorrelation result of the sequence of pilot symbols in the X polarization direction, (b) in FIG. 44 shows a periodic autocorrelation result of the sequence of pilot symbols in the Y polarization direction, and (c) in FIG. 44 shows a periodic cross-correlation result of the sequence of pilot symbols in the X and Y polarization directions. A normalized amplitude of a sidelobe value of a periodic autocorrelation function of a symbol sequence in the two polarization directions is not greater than 0.167, and a normalized amplitude of a sidelobe value of a periodic cross-correlation function of the symbol sequence in the two polarization directions is not greater than 0.176. A frame overhead of the super-frame structure provided in this embodiment of this application is also as low as 1.79%, and the sequence of pilot symbols has relatively good autocorrelation and cross-correlation characteristics. The training symbols and the pilot symbols can also be combined together to meet direct current balance, which helps the receiver end restore a signal, and improves quality of the restored signal.

Persons skilled in the art should understand that embodiments of this application may be provided as a method or a computer program product. Therefore, this application may be in the form of a hardware-only embodiment, a software-only embodiment, or an embodiment with a combination of software and hardware. In addition, this application may be in the form of a computer program product implemented on one or more computer-usable storage media (including but not limited to a disk memory, a CD-ROM, an optical memory, and the like) that include computer-usable program code.

The foregoing descriptions are merely embodiments of the technical solutions of this application, but are not intended to limit the protection scope of this application. Any modifications, equivalent replacements, improvements, or the like within the spirit and principle of this application shall fall within the protection scope of this application.

What is claimed is:

1. A transmitting device comprising one or more memories and one or more processors, wherein the one or more processors are configured to:

generate a super-frame comprising a plurality of sub-frames, wherein each sub-frame comprises training symbols and pilot symbols; in one polarization direction, a sum of quantities of training symbols and pilot symbols comprised in the sub-frame is not less than 5, and there is one symbol that is both a training symbol and a pilot symbol; and each of the training symbols and the pilot symbols is one of −A−Aj, −A+Aj, A−Aj, or A+Aj, A being a real number;

wherein in the training symbols and the pilot symbols comprised in each sub-frame, quantities of −A−Aj, −A+Aj, A−Aj, and A+Aj in one polarization direction are respectively $\lfloor(N_{TS}+N_{PS}-1)/4\rfloor$, $(N_{TS}+N_{PS}-1)/2-\lfloor(N_{TS}+N_{PS}-1)/4\rfloor$, $(N_{TS}+N_{PS}-1)/2-\lfloor(N_{TS}+N_{PS}-1)/4\rfloor$, and $\lfloor(N_{TS}+N_{PS}-1)/4\rfloor$, and quantities thereof in the other polarization direction are respectively $(N_{TS}+N_{PS}-1)/2-(N_{TS}+N_{PS}-1)/4\rfloor$, $\lfloor(N_{TS}+N_{PS}-1)/4\rfloor$, $\lfloor(N_{TS}+N_{PS}-1)/4\rfloor$, and $(N_{TS}+N_{PS}-1)/2-\lfloor(N_{TS}+N_{PS}-1)/4\rfloor$, wherein $N_{TS}$ is a quantity of the training symbols in each sub-frame in one polarization direction, $N_{PS}$ is a quantity of the pilot symbols in each sub-frame in one polarization direction, $N_{TS}+N_{PS}$ is an odd number, and the two polarization directions are orthogonal to each other; and transmit the super-frame.

2. The transmitting device according to claim 1, wherein in one sub-frame, a sequence consisting of training symbols in one polarization direction is different from a sequence consisting of training symbols in the other polarization direction, and a sequence consisting of pilot symbols in one polarization direction is different from a sequence consisting of pilot symbols in the other polarization direction.

3. The transmitting device according to claim 1, wherein the training symbols are consecutively arranged in the sub-frame, and in one polarization direction, in the training symbols comprised in the sub-frame, a quantity of consecutive same real part elements is not greater than 5, and a quantity of consecutive same imaginary part elements is not greater than 5.

4. The transmitting device according to claim 3, wherein in one polarization direction, a quantity of consecutive same training symbols in one sub-frame does not exceed 4.

5. The transmitting device according to claim 1, wherein a modulation format of the symbols in the super-frame is 16QAM, and a value of A is ±1, ±3, or $\pm\sqrt{5}$.

6. The transmitting device according to claim 1, wherein in each sub-frame, a symbol at a fixed position in every 64 symbols is the pilot symbol.

7. The transmitting device according to claim 1, wherein in each sub-frame, a symbol at a fixed position in every 48 symbols is the pilot symbol.

8. A receiving device comprising one or more memories and one or more processors, wherein the one or more processors are configured to:

receive a super-frame comprising a plurality of sub-frames, wherein each sub-frame comprises training symbols and pilot symbols; in one polarization direction, a sum of quantities of training symbols and pilot symbols comprised in the sub-frame is not less than 5, and there is one symbol that is both a training symbol and a pilot symbol; and each of the training symbols and the pilot symbols is one of −A−Aj, −A+Aj, A−Aj, or A+Aj, A being a real number;

wherein in the training symbols and the pilot symbols comprised in each sub-frame, quantities of −A−Aj, −A+Aj, A−Aj, and A+Aj in one polarization direction are respectively $\lfloor(N_{TS}+N_{PS}-1)/4\rfloor$, $(N_{TS}+N_{PS}-1)/2-\lfloor(N_{TS}+N_{PS}-1)/4\rfloor$, $(N_{TS}+N_{PS}-1)/2-\lfloor(N_{TS}+N_{PS}-1)/4\rfloor$, and $\lfloor(N_{TS}+N_{PS}-1)/4\rfloor$, and quantities thereof in the other polarization direction are respectively $(N_{TS}+N_{PS}-1)/2-\lfloor(N_{TS}+N_{PS}-1)/4\rfloor$, $\lfloor(N_{TS}+N_{PS}-1)/4\rfloor$, $\lfloor(N_{TS}+N_{PS}-1)/4\rfloor$, and $(N_{TS}+N_{PS}-1)/2-\lfloor(N_{TS}+N_{PS}-1)/4\rfloor$, wherein $N_{TS}$ is a quantity of the training symbols in each sub-frame in one polarization direction, $N_{PS}$ is a quantity of the pilot symbols in each sub-frame in one polarization direction, $N_{TS}+N_{PS}$ is an odd number, and the two polarization directions are orthogonal to each other; and decode the received super-frame.

9. The receiving device according to claim 8, wherein in one sub-frame, a sequence consisting of training symbols in one polarization direction is different from a sequence consisting of training symbols in the other polarization direction, and a sequence consisting of pilot symbols in one polarization direction is different from a sequence consisting of pilot symbols in the other polarization direction.

10. The receiving device according to claim 8, wherein the training symbols are consecutively arranged in the sub-frame, and in one polarization direction, in the training symbols comprised in the sub-frame, a quantity of consecutive same real part elements is not greater than 5, and a quantity of consecutive same imaginary part elements is not greater than 5.

11. The receiving device according to claim 10, wherein in one polarization direction, a quantity of consecutive same training symbols in one sub-frame does not exceed 4.

12. The receiving device according to claim 8, wherein a modulation format of the symbols in the super-frame is 16QAM, and a value of A is ±1, ±3, or $\pm\sqrt{5}$.

13. The receiving device according to claim 8, wherein in each sub-frame, a symbol at a fixed position in every 64 symbols is the pilot symbol, or in each sub-frame, a symbol at a fixed position in every 48 symbols is the pilot symbol.

14. A transmitting device comprising one or more memories and one or more processors, wherein the one or more processors are configured to:

generate a super-frame comprising a plurality of sub-frames, wherein each sub-frame comprises training symbols and pilot symbols; in one polarization direction, there is one symbol that is both a training symbol and a pilot symbol; in each sub-frame, in the one polarization direction, the pilot symbols are generated based on a target polynomial and a seed, there are $N_{PS}$ pilot symbols and $N_{TS}$ training symbols, and $N_{TS}+N_{PS}$ is an odd number; and the target polynomial is $x^{10}+x^7+x^3+x+1$; and transmit the super-frame.

15. The transmitting device according to claim 14, wherein in one polarization direction, a total quantity $N_F$, of symbols in the super-frame is 175104, a quantity $N_{SF}$, of sub-frames is 24, a quantity $N_S$ of symbols in each sub-frame is 7296, $N_{TS}$=11, and $N_{PS}$=114, and a quantity of symbols before framing of the super-frame is 172032.

16. The transmitting device according to claim 15, wherein a sum $N_{FAW}+N_{RES}$ of a quantity $N_{FAW}$ of frame alignment word symbols and a quantity $N_{RES}$ of reserved symbols is 96.

17. The transmitting device according to claim 14, wherein the target polynomial and hexadecimal seeds in two polarization directions are in the following Table:

| Index | Target polynomial | Seed in the direction of polarization 1 | Seed in the direction of polarization 2 |
|---|---|---|---|
| 1 | $x^{10} + x^7 + x^3 + x + 1$ | 0x34E | 0x084 |

18. The transmitting device according to claim 14, wherein each of the training symbols and the pilot symbols is one of −A−Aj, −A+Aj, A−Aj, and A+Aj, A being a real number, and wherein in one polarization direction, in a combination of 114 pilot symbols and 11 training symbols, quantities of −A−Aj, −A+Aj, A−Aj, and A+Aj in the one polarization direction are all 31.

19. The transmitting device according to claim 14, wherein each of the training symbols and the pilot symbols is one of −A−Aj, −A+Aj, A−Aj, and A+Aj, A being a real number, and wherein in one polarization direction, in a combination of 114 pilot symbols and 11 training symbols, the respective 114 pilot symbols in the two polarization directions are shown in the following table:

| Polarization direction | Pilot symbol |
| --- | --- |
| Polarization 1 | −A + Aj, A + Aj, −A − Aj, A − Aj, A + Aj, −A + Aj, A − Aj, A + Aj, −A − Aj, −A − Aj, A + Aj, −A − Aj, A + Aj, −A − Aj, −A + Aj, −A − Aj, −A + Aj, −A + Aj, −A − Aj, −A + Aj, A − Aj, A − Aj, A − Aj, A − Aj, A − Aj, A + Aj, A + Aj, −A + Aj, −A − Aj, A − Aj, A + Aj, A − Aj, −A + Aj, −A − Aj, A − Aj, −A + Aj, −A − Aj, −A − Aj, −A + Aj, −A − Aj, −A + Aj, −A − Aj, −A − Aj, A + Aj, A + Aj, −A − Aj, A + Aj, A + Aj, −A + Aj, A − Aj, −A + Aj, A − Aj, −A + Aj, A − Aj, A − Aj, A + Aj, −A − Aj, −A + Aj, A − Aj, A − Aj, −A − Aj, A + Aj, A − Aj, −A − Aj, A + Aj, A + Aj, A + Aj, −A − Aj, −A − Aj, A + Aj, A + Aj, A − Aj, A − Aj, A + Aj, A − Aj, A − Aj, A + Aj, −A + Aj, A + Aj, −A + Aj, A + Aj, −A + Aj, A − Aj, −A + Aj, −A − Aj, −A − Aj, A − Aj, −A + Aj, A + Aj, A − Aj, A − Aj, −A − Aj, −A + Aj, −A + Aj, −A + Aj, −A − Aj, −A − Aj, −A + Aj, −A + Aj, −A + Aj, A − Aj, −A + Aj, −A + Aj, A − Aj, −A + Aj, −A − Aj, A − Aj, A + Aj, −A + Aj, −A − Aj, A − Aj, −A − Aj, A + Aj, A + Aj |
| Polarization 2 | −A − Aj, A − Aj, −A − Aj, −A + Aj, −A − Aj, A + Aj, A + Aj, −A + Aj, −A − Aj, −A − Aj, A − Aj, A − Aj, A − Aj, −A − Aj, −A − Aj, A − Aj, A − Aj, A + Aj, −A − Aj, A − Aj, A + Aj, −A − Aj, A − Aj, −A + Aj, −A + Aj, A − Aj, A − Aj, −A + Aj, −A − Aj, −A + Aj, A + Aj, A + Aj, −A − Aj, −A + Aj, −A + Aj, −A − Aj, A + Aj, A + Aj, A − Aj, −A + Aj, A − Aj, −A − Aj, −A − Aj, −A + Aj, A − Aj, −A + Aj, −A − Aj, −A + Aj, A − Aj, A + Aj, A − Aj, −A − Aj, A + Aj, −A + Aj, A − Aj, −A − Aj, A + Aj, A + Aj, −A + Aj, −A + Aj, −A − Aj, −A − Aj, A + Aj, −A − Aj, −A + Aj, −A + Aj, −A + Aj, A + Aj, −A + Aj, A + Aj, A + Aj, A + Aj, −A + Aj, A + Aj, −A − Aj, −A − Aj, A − Aj, −A + Aj, −A + Aj, A + Aj, A − Aj, A + Aj, −A + Aj, A + Aj, A − Aj, A − Aj, A + Aj, −A − Aj, A + Aj, A + Aj, A − Aj, A + Aj, A + Aj, −A − Aj, A + Aj, −A + Aj, −A − Aj, A − Aj, A − Aj, A − Aj, A + Aj, −A + Aj, −A − Aj, −A − Aj, −A + Aj, A + Aj, −A − Aj, A − Aj, A − Aj, −A + Aj, −A − Aj, A − Aj, A − Aj, −A + Aj |

20. The transmitting device according to claim 14, wherein the $N_{PS}$ pilot symbols are combined with the $N_{TS}$ training symbols to achieve direct current balance.

21. A receiving device comprising one or more memories and one or more processors, wherein the one or more processors are configured to:

receive a super-frame comprising a plurality of sub-frames, wherein the sub-frame comprises training symbols and pilot symbols; in one polarization direction, there is one symbol that is both a training symbol and a pilot symbol; in each sub-frame, in the one polarization direction, the pilot symbols are generated based on a target polynomial and a seed, there are $N_{PS}$ pilot symbols and $N_{TS}$ training symbols, and $N_{TS}+N_{PS}$ is an odd number; and the target polynomial is $x^{10}+x^7+x^3+x+1$; and decode the received super-frame.

22. The receiving device according to claim 21, wherein in one polarization direction, a total quantity $N_F$ of symbols in the super-frame is 175104, a quantity $N_{SF}$, of sub-frames is 24, a quantity $N_S$ of symbols in each sub-frame is 7296, $N_{TS}$=11, and $N_{PS}$=114, and a quantity of symbols before framing of the super-frame is 172032.

23. The receiving device according to claim 22, wherein a sum $N_{FAW}+N_{RES}$ of a quantity $N_{FAW}$ of frame alignment word symbols and a quantity $N_{RES}$ of reserved symbols is 96.

24. The receiving device according to claim 21, wherein the target polynomial and hexadecimal seeds in two polarization directions are in the following Table:

| Index | Target polynomial | Seed in the direction of polarization 1 | Seed in the direction of polarization 2 |
| --- | --- | --- | --- |
| 1 | $x^{10} + x^7 + x^3 + x + 1$ | 0x34E | 0x084 |

25. The receiving device according to claim 21, wherein each of the training symbols and the pilot symbols is one of −A−Aj, −A+Aj, A−Aj, and A+Aj, A being a real number, and wherein in one polarization direction, in a combination of 114 pilot symbols and 11 training symbols, quantities of −A−Aj, −A+Aj, A−Aj, and A+Aj in the one polarization direction are all 31.

26. The receiving device according to claim 21, wherein each of the training symbols and the pilot symbols is one of −A−Aj, −A+Aj, A−Aj, and A+Aj, A being a real number, and wherein in one polarization direction, in a combination of 114 pilot symbols and 11 training symbols, the respective 114 pilot symbols in the two polarization directions are shown in the following table:

| Polarization direction | Pilot symbol |
| --- | --- |
| Polarization 1 | −A + Aj, A + Aj, −A − Aj, A − Aj, A + Aj, −A + Aj, A − Aj, A + Aj, −A − Aj, −A − Aj, A + Aj, −A − Aj, A + Aj, −A − Aj, −A + Aj, −A − Aj, −A + Aj, −A + Aj, −A − Aj, −A + Aj, A − Aj, A − Aj, A − Aj, A − Aj, A − Aj, A + Aj, A + Aj, −A + Aj, −A − Aj, A − Aj, A + Aj, A − Aj, −A + Aj, −A − Aj, A − Aj, −A + Aj, −A − Aj, −A − Aj, −A + Aj, −A − Aj, −A + Aj, −A − Aj, −A − Aj, A + Aj, A + Aj, −A − Aj, A + Aj, A + Aj, −A + Aj, A − Aj, −A + Aj, A − Aj, −A + Aj, A − Aj, A − Aj, A + Aj, −A − Aj, −A + Aj, A − Aj, A − Aj, −A − Aj, A + Aj, A − Aj, −A − Aj, A + Aj, A + Aj, A + Aj, −A − Aj, −A − Aj, A + Aj, A + Aj, A − Aj, A − Aj, A + Aj, A − Aj, A − Aj, A + Aj, −A + Aj, A + Aj, −A + Aj, A + Aj, −A + Aj, A − Aj, −A + Aj, −A − Aj, −A − Aj, A − Aj, −A + Aj, A + Aj, A − Aj, A − Aj, −A − Aj, −A + Aj, −A + Aj, −A + Aj, −A − Aj, −A − Aj, −A + Aj, −A + Aj, −A + Aj, A − Aj, −A + Aj, −A + Aj, A − Aj, −A + Aj, −A − Aj, A − Aj, A + Aj, −A + Aj, −A − Aj, A − Aj, −A − Aj, A + Aj, A + Aj |
| Polarization 2 | −A − Aj, A − Aj, −A − Aj, −A + Aj, −A − Aj, A + Aj, A + Aj, −A + Aj, −A − Aj, −A − Aj, A − Aj, A − Aj, A − Aj, −A − Aj, −A − Aj, A − Aj, A − Aj, A + Aj, −A − Aj, A − Aj, A + Aj, −A − Aj, A − Aj, −A + Aj, −A + Aj, A − Aj, A − Aj, −A + Aj, −A − Aj, −A + Aj, A + Aj, A + Aj, −A − Aj, −A + Aj, −A + Aj, −A − Aj, A + Aj, A + Aj, A − Aj, −A + Aj, A − Aj, −A − Aj, −A − Aj, −A + Aj, A − Aj, −A + Aj, −A − Aj, −A + Aj, A − Aj, A + Aj, A − Aj, −A − Aj, A + Aj, −A + Aj, A − Aj, −A − Aj, |

-continued

| Polarization direction | Pilot symbol |
|---|---|
| | A + Aj, A + Aj, −A + Aj, −A + Aj, −A − Aj, −A − Aj, A + Aj, −A − Aj, −A + Aj, −A + Aj, −A + Aj, A + Aj, −A + Aj, A + Aj, A + Aj, A + Aj, −A + Aj, A + Aj, −A − Aj, −A − Aj, A − Aj, −A + Aj, −A + Aj, A + Aj, A − Aj, A + Aj, −A + Aj, A + Aj, A − Aj, A − Aj, A + Aj, −A − Aj, A + Aj, A + Aj, A − Aj, A + Aj, A + Aj, −A − Aj, A + Aj, −A + Aj, −A − Aj, A − Aj, A − Aj, A − Aj, A − Aj, A + Aj, −A + Aj, −A − Aj, −A − Aj, −A + Aj, A + Aj, −A − Aj, A − Aj, A − Aj, −A + Aj, −A − Aj, A − Aj, A − Aj, −A + Aj |

27. The receiving device according to claim 21, wherein the $N_{PS}$ pilot symbols are combined with the $N_{TS}$ training symbols to achieve direct current balance.

28. A communication system comprising a transmitting device and a receiving device, wherein the transmitting device is configured to:

generate a super-frame comprising a plurality of sub-frames, wherein each sub-frame comprises training symbols and pilot symbols; in one polarization direction, a sum of quantities of training symbols and pilot symbols comprised in the sub-frame is not less than 5, and there is one symbol that is both a training symbol and a pilot symbol; and each of the training symbols and the pilot symbols is one of −A−Aj, −A+Aj, A−Aj, or A+Aj, A being a real number;

wherein in the training symbols and the pilot symbols comprised in each sub-frame, quantities of −A−Aj, −A+Aj, A−Aj, and A+Aj in one polarization direction are respectively $\lfloor(N_{TS}+N_{PS}-1)/4\rfloor$, $(N_{TS}+N_{PS}-1)/2-\lfloor(N_{TS}+N_{PS}-1)/4\rfloor$, $(N_{TS}+N_{PS}-1)/2-\lfloor(N_{TS}+N_{PS}-1)/4\rfloor$, and $\lfloor(N_{TS}+N_{PS}-1)/4\rfloor$, and quantities thereof in the other polarization direction are respectively $(N_{TS}+N_{PS}-1)/2-\lfloor(N_{TS}+N_{PS}-1)/4\rfloor$, $\lfloor(N_{TS}+N_{PS}-1)/4\rfloor$, $\lfloor(N_{TS}+N_{PS}-1)/41$, and $(N_{TS}+N_{PS}-1)/2-\lfloor(N_{TS}+N_{PS}-1)/4\rfloor$, wherein $N_{TS}$ is a quantity of the training symbols in each sub-frame in one polarization direction, $N_{PS}$ is a quantity of the pilot symbols in each sub-frame in one polarization direction, $N_{TS}+N_{PS}$ is an odd number, and the two polarization directions are orthogonal to each other; and transmit the super-frame;

wherein the receiving device is configured to:

receive the super-frame; and decode the received super-frame.

29. The communication system according to claim 28, wherein in one sub-frame, a sequence consisting of training symbols in one polarization direction is different from a sequence consisting of training symbols in the other polarization direction, and a sequence consisting of pilot symbols in one polarization direction is different from a sequence consisting of pilot symbols in the other polarization direction.

30. The communication system according to claim 28, wherein the training symbols are consecutively arranged in the sub-frame, and in one polarization direction, in the training symbols comprised in the sub-frame, a quantity of consecutive same real part elements is not greater than 5, and a quantity of consecutive same imaginary part elements is not greater than 5.

31. The communication system according to claim 30, wherein in one polarization direction, a quantity of consecutive same training symbols in one sub-frame does not exceed 4.

32. The communication system according to claim 28, wherein a modulation format of the symbols in the super-frame is 16QAM, and a value of A is ±1, ±3, or $\pm\sqrt{5}$.

33. The communication system according to claim 28, wherein in each sub-frame, a symbol at a fixed position in every 64 symbols is the pilot symbol.

34. The communication system according to claim 28, wherein in each sub-frame, a symbol at a fixed position in every 48 symbols is the pilot symbol.

35. A communication system comprising a transmitting device and a receiving device, wherein the transmitting device is configured to:

generate a super-frame comprising a plurality of sub-frames, wherein each sub-frame comprises training symbols and pilot symbols: in one polarization direction, there is one symbol that is both a training symbol and a pilot symbol: in each sub-frame, in the one polarization direction, the pilot symbols are generated based on a target polynomial and a seed, there are $N_{PS}$ pilot symbols and $N_{TS}$ training symbols, and $N_{TS}+N_{PS}$ is an odd number; and the target polynomial is $x^{10}+x^7+x^3+x+1$; and transmit the super-frame;

wherein the receiving device is configured to:

receive the super-frame; and decode the received super-frame.

36. The communication system according to claim 35, wherein in one polarization direction, a total quantity $N_F$ of symbols in the super-frame is 175104, a quantity $N_{SF}$, of sub-frames is 24, a quantity $N_S$ of symbols in each sub-frame is 7296, $N_{TS}$=11, and $N_{PS}$=114, and a quantity of symbols before framing of the super-frame is 172032.

37. The communication system according to claim 36, wherein a sum $N_{FAW}+N_{RES}$ of a quantity $N_{FAW}$ of frame alignment word symbols and a quantity $N_{RES}$ of reserved symbols is 96.

38. The communication system according to claim 35, wherein the target polynomial and hexadecimal seeds in two polarization directions are in the following Table:

| Index | Target polynomial | Seed in the direction of polarization 1 | Seed in the direction of polarization 2 |
|---|---|---|---|
| 1 | $x^{10} + x^7 + x^3 + x + 1$ | 0x34E | 0x084 |

39. The communication system according to claim 35, wherein each of the training symbols and the pilot symbols is one of −A−Aj, −A+Aj, A−Aj, and A+Aj, A being a real number, and wherein in one polarization direction, in a combination of 114 pilot symbols and 11 training symbols, quantities of −A−Aj, −A+Aj, A−Aj, and A+Aj in the one polarization direction are all 31.

40. The communication system according to claim 35, wherein each of the training symbols and the pilot symbols is one of −A−Aj, −A+Aj, A−Aj, and A+Aj, A being a real number, and wherein in one polarization direction, in a combination of 114 pilot symbols and 11 training symbols, the respective 114 pilot symbols in the two polarization directions are shown in the following table:

| Polarization direction | Pilot symbol |
|---|---|
| Polarization 1 | −A + Aj, A + Aj, −A − Aj, A − Aj, A + Aj, −A + Aj, A − Aj, A + Aj, −A − Aj, −A − Aj, A + Aj, −A − Aj, A + Aj, −A − Aj, −A + Aj, −A − Aj, −A + Aj, −A + Aj, −A − Aj, −A + Aj, A − Aj, A − Aj, A − Aj, A − Aj, A − Aj, A + Aj, A + Aj, −A + Aj, −A − Aj, A − Aj, A + Aj, A − Aj, −A + Aj, −A − Aj, A − Aj, −A + Aj, −A − Aj, −A − Aj, −A + Aj, −A − Aj, −A + Aj, −A − Aj, −A − Aj, A + Aj, A + Aj, −A − Aj, A + Aj, A + Aj, −A + Aj, A − Aj, −A + Aj, A − Aj, −A + Aj, A − Aj, A − Aj, A + Aj, −A − Aj, −A + Aj, A − Aj, A − Aj, −A − Aj, A + Aj, A − Aj, −A − Aj, A + Aj, A + Aj, A + Aj, −A − Aj, −A − Aj, A + Aj, A + Aj, A − Aj, A − Aj, A + Aj, A − Aj, A − Aj, A + Aj, −A + Aj, A + Aj, −A + Aj, A + Aj, −A + Aj, A − Aj, −A + Aj, −A − Aj, −A − Aj, A − Aj, −A + Aj, A + Aj, A − Aj, A − Aj, −A − Aj, −A + Aj, −A + Aj, −A + Aj, −A − Aj, −A − Aj, −A + Aj, −A + Aj, −A + Aj, A − Aj, −A + Aj, −A + Aj, A − Aj, −A + Aj, −A − Aj, A − Aj, A + Aj, −A + Aj, −A − Aj, A − Aj, −A − Aj, A + Aj, A + Aj |
| Polarization 2 | −A − Aj, A − Aj, −A − Aj, −A + Aj, −A − Aj, A + Aj, A + Aj, −A + Aj, −A − Aj, −A − Aj, A − Aj, A − Aj, A − Aj, −A − Aj, −A − Aj, A − Aj, A − Aj, A + Aj, −A − Aj, A − Aj, A + Aj, −A − Aj, A − Aj, −A + Aj, −A + Aj, A − Aj, A − Aj, −A + Aj, −A − Aj, −A + Aj, A + Aj, A + Aj, −A − Aj, −A + Aj, −A + Aj, −A − Aj, A + Aj, A + Aj, A − Aj, −A + Aj, A − Aj, −A − Aj, −A − Aj, −A + Aj, A − Aj, −A + Aj, −A − Aj, −A + Aj, A − Aj, A + Aj, A − Aj, −A − Aj, A + Aj, −A + Aj, A − Aj, −A − Aj, A + Aj, A + Aj, −A + Aj, −A + Aj, −A − Aj, −A − Aj, A + Aj, −A − Aj, −A + Aj, −A + Aj, −A + Aj, A + Aj, −A + Aj, A + Aj, A + Aj, A + Aj, −A + Aj, A + Aj, −A − Aj, −A − Aj, A − Aj, −A + Aj, −A + Aj, A + Aj, A − Aj, A + Aj, −A + Aj, A + Aj, A − Aj, A − Aj, A + Aj, −A − Aj, A + Aj, A + Aj, A − Aj, A + Aj, A + Aj, −A − Aj, A + Aj, −A + Aj, −A − Aj, A − Aj, A − Aj, A − Aj, A + Aj, −A + Aj, −A − Aj, −A − Aj, −A + Aj, A + Aj, −A − Aj, A − Aj, A − Aj, −A + Aj, −A − Aj, A − Aj, A − Aj, −A + Aj |

* * * * *